US012671964B2

(12) United States Patent
Ogandzhanyants et al.

(10) Patent No.: US 12,671,964 B2
(45) Date of Patent: *Jun. 30, 2026

(54) COMPLEX COMPUTING NETWORK FOR IMPROVING ESTABLISHMENT AND ACCESS OF COMMUNICATION AMONG COMPUTING DEVICES

(71) Applicant: Rizz IP Ltd, Saint Michael (BB)

(72) Inventors: Andrey Ogandzhanyants, St. Joseph (BB); Sergey Frolovichev, Monaco (MC); Pavel Shumakov, London (GB)

(73) Assignee: Rizz IP Ltd, Saint Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 19/370,507

(22) Filed: Oct. 27, 2025

(65) Prior Publication Data

US 2026/0052359 A1 Feb. 19, 2026

Related U.S. Application Data

(63) Continuation-in-part of application No. 19/195,241, filed on Apr. 30, 2025, now Pat. No. 12,457,476, (Continued)

(51) Int. Cl.
*H04W 4/08* (2009.01)
*H04H 20/91* (2008.01)
(Continued)

(52) U.S. Cl.
CPC .............. *H04W 4/08* (2013.01); *H04H 20/91* (2013.01); *H04H 20/95* (2013.01); *H04L 67/306* (2013.01)

(58) Field of Classification Search
CPC ......... H04W 4/08; H04H 20/91; H04H 20/95; H04L 67/306
See application file for complete search history.

(56) References Cited

U.S. PATENT DOCUMENTS 4,811,334 A 3/1989 Matt
8,139,721 B2 3/2012 O'Connell et al.
(Continued)

FOREIGN PATENT DOCUMENTS

WO 2009052428 A1 4/2009

OTHER PUBLICATIONS

Office Action dated Oct. 16, 2020 in connection with U.S. Appl. No. 17/003,878.
(Continued)

*Primary Examiner* — Ankur Jain
(74) *Attorney, Agent, or Firm* — Baker & McKenzie LLP

(57) ABSTRACT

Disclosed are systems, methods, and computer program products for improving establishment and broadcasting of communication among mobile computing devices. An exemplary method includes: determining a first user accesses a mobile application on a first mobile device of the first user; determining a second user accesses the mobile application on a second mobile device of the second user; transmitting first content from the first user to the second user; receiving, from the second user, a first action associated with the first user; transmitting second content from the second user to the first user; receiving, from the first user, a second action associated with the second user; generating a communication channel for interaction between the first user and the second user; determining a third user accesses the mobile application on a third mobile device of the third user; and transmitting third content from the third user to the second user.

24 Claims, 322 Drawing Sheets

Related U.S. Application Data which is a continuation-in-part of application No. 18/817,979, filed on Aug. 28, 2024, now Pat. No. 12,425,812, which is a continuation-in-part of application No. 18/400,786, filed on Dec. 29, 2023, now Pat. No. 12,082,079, which is a continuation-in-part of application No. 18/138,617, filed on Apr. 24, 2023, now Pat. No. 11,864,066, which is a continuation-in-part of application No. 17/947,855, filed on Sep. 19, 2022, now Pat. No. 11,792,610, which is a continuation-in-part of application No. 17/588,030, filed on Jan. 28, 2022, now Pat. No. 11,451,937, which is a continuation-in-part of application No. 17/507,690, filed on Oct. 21, 2021, now Pat. No. 11,317,253, which is a continuation-in-part of application No. 17/467,405, filed on Sep. 6, 2021, now Pat. No. 11,290,292, which is a continuation-in-part of application No. 17/219,880, filed on Mar. 31, 2021, now Pat. No. 11,212,126, and a continuation-in-part of application No. 17/216,400, filed on Mar. 29, 2021, now Pat. No. 11,246,012, said application No. 17/219,880 is a continuation-in-part of application No. 17/214,906, filed on Mar. 28, 2021, now Pat. No. 11,165,911, which is a continuation-in-part of application No. 17/175,435, filed on Feb. 12, 2021, now Pat. No. 11,128,997, said application No. 17/216,400 is a continuation of application No. 17/003,868, filed on Aug. 26, 2020, now Pat. No. 10,966,062, said application No. 17/175,435 is a continuation-in-part of application No. 17/003,868, filed on Aug. 26, 2020, now Pat. No. 10,966,062.

(51) Int. Cl.
H04H 20/95 (2008.01)
H04L 67/306 (2022.01)

(56) References Cited

U.S. PATENT DOCUMENTS

| | | | | |
|---|---|---|---|---|
| 8,464,163 | B2 | 6/2013 | Heikes et al. | |
| 9,083,811 | B2 | 7/2015 | Sharma et al. | |
| 9,374,682 | B2 | 6/2016 | Weng et al. | |
| 9,380,264 | B1 | 6/2016 | Vakalapudi | |
| 9,402,170 | B1 | 7/2016 | Shaltiel et al. | |
| 10,084,914 | B1 | 9/2018 | Chiang et al. | |
| 10,129,594 | B2 | 11/2018 | David et al. | |
| 10,129,720 | B1 | 11/2018 | Bouzid et al. | |
| 10,171,657 | B1 | 1/2019 | Anandadoss et al. | |
| 10,498,892 | B2 | 12/2019 | Nimbavikar et al. | |
| 10,680,995 | B1 | 6/2020 | Hinkle et al. | |
| 10,966,062 | B1 | 3/2021 | Nugumanov et al. | |
| 10,972,612 | B1 | 4/2021 | Frolovichev et al. | |
| 10,986,469 | B1 | 4/2021 | Nugumanov et al. | |
| 11,057,232 | B1 | 7/2021 | Frolovichev et al. | |
| 11,064,071 | B1 | 7/2021 | Frolovichev et al. | |
| 11,102,452 | B1 | 8/2021 | Nugumanov et al. | |
| 11,115,540 | B1 * | 9/2021 | Nugumanov | H04M 1/27457 |
| 11,128,997 | B1 * | 9/2021 | Ogandzhanyants | H04M 1/72469 |
| 11,146,688 | B1 * | 10/2021 | Frolovichev | H04M 1/576 |
| 11,165,911 | B1 * | 11/2021 | Frolovichev | H04W 4/08 |
| 11,196,867 | B1 * | 12/2021 | Frolovichev | H04W 4/16 |
| 11,212,126 | B1 * | 12/2021 | Ogandzhanyants | H04L 12/1813 |
| 11,212,651 | B1 * | 12/2021 | Nugumanov | H04W 4/12 |
| 11,228,873 | B1 | 1/2022 | Frolovichev et al. | |
| 11,246,012 | B1 | 2/2022 | Nugumanov et al. | |
| 11,265,685 | B1 * | 3/2022 | Frolovichev | H04H 20/95 |
| 11,290,292 | B2 | 3/2022 | Frolovichev et al. | |
| 11,297,469 | B2 * | 4/2022 | Frolovichev | H04W 4/12 |
| 11,317,253 | B2 | 4/2022 | Frolovichev et al. | |
| 11,451,937 | B2 | 9/2022 | Frolovichev et al. | |
| 11,792,610 | B2 | 10/2023 | Frolovichev et al. | |
| 11,864,066 | B2 | 1/2024 | Frolovichev et al. | |
| 12,082,079 | B2 | 9/2024 | Frolovichev et al. | |
| 12,118,999 | B2 * | 10/2024 | Piernot | H04W 4/025 |
| 12,120,459 | B2 * | 10/2024 | Gal | H04L 12/1822 |
| 12,123,654 | B2 * | 10/2024 | Poltorak | F28F 13/12 |
| 12,124,761 | B2 * | 10/2024 | Feldman | H04L 65/611 |
| 12,125,137 | B2 * | 10/2024 | Tveito | G06N 3/084 |
| 12,127,817 | B2 * | 10/2024 | Salcido | G16H 50/20 |
| 12,132,763 | B2 * | 10/2024 | Keith, Jr. | G06F 21/35 |
| D1,051,142 | S | 11/2024 | Feng | |
| 12,136,419 | B2 * | 11/2024 | Greborio | G10L 15/22 |
| 12,137,302 | B2 * | 11/2024 | Ahn | H04M 3/2281 |
| 12,141,756 | B1 * | 11/2024 | Beauchamp | G06Q 10/06313 |
| 12,141,834 | B1 * | 11/2024 | Johnson | G06Q 30/0251 |
| 12,143,419 | B2 * | 11/2024 | Keith, Jr. | G06Q 20/3823 |
| 12,147,655 | B2 * | 11/2024 | Triverio | G06F 3/04847 |
| 12,149,570 | B2 * | 11/2024 | Jia | G06F 3/0482 |
| 12,150,086 | B2 * | 11/2024 | Obaidi | H04W 64/003 |
| 12,154,218 | B2 * | 11/2024 | Manzari | G06F 3/04847 |
| 12,155,637 | B2 * | 11/2024 | Keith, Jr. | H04L 63/08 |
| 12,155,968 | B2 * | 11/2024 | Kasaba | H04L 12/1827 |
| D1,053,901 | S | 12/2024 | Clarke | |
| 12,159,262 | B1 * | 12/2024 | Adams | G06F 3/0486 |
| 12,160,741 | B2 * | 12/2024 | Moon | H04W 12/08 |
| 12,165,227 | B2 * | 12/2024 | Christensen | G06Q 20/405 |
| 12,170,578 | B2 * | 12/2024 | Laaksonen | H04L 12/1822 |
| 12,170,579 | B2 * | 12/2024 | Meyer | H04N 7/15 |
| 12,210,730 | B2 * | 1/2025 | Anzures | H04L 51/10 |
| D1,065,228 | S | 3/2025 | Lee et al. | |
| D1,065,229 | S | 3/2025 | Lee et al. | |
| D1,065,230 | S | 3/2025 | Lee et al. | |
| 12,265,696 | B2 * | 4/2025 | Kim | G06F 3/04842 |
| 12,267,622 | B2 * | 4/2025 | O'Leary | G06V 40/28 |
| 12,301,893 | B2 * | 5/2025 | Loheide | H04N 21/2187 |
| 12,301,979 | B2 * | 5/2025 | O'Leary | H04N 23/632 |
| 12,302,035 | B2 * | 5/2025 | Cranfill | G06F 3/04817 |
| 2005/0186970 | A1 | 8/2005 | Yates et al. | |
| 2005/0281237 | A1 | 12/2005 | Heinonen et al. | |
| 2007/0037573 | A1 | 2/2007 | Kyung et al. | |
| 2008/0181423 | A1 | 7/2008 | Duarte et al. | |
| 2009/0147778 | A1 | 6/2009 | Wanless et al. | |
| 2010/0034363 | A1 | 2/2010 | O'Connell et al. | |
| 2010/0201780 | A1 | 8/2010 | Bennett et al. | |
| 2010/0251137 | A1 | 9/2010 | Qureshi | |
| 2011/0122827 | A1 | 5/2011 | Bjorsell et al. | |
| 2011/0277537 | A1 | 11/2011 | Tsuzuki et al. | |
| 2012/0056971 | A1 | 3/2012 | Kumar et al. | |
| 2012/0075338 | A1 | 3/2012 | Curtis et al. | |
| 2012/0122590 | A1 | 5/2012 | Nguyen | |
| 2012/0246582 | A1 | 9/2012 | Leacock et al. | |
| 2012/0270578 | A1 | 10/2012 | Feghali | |
| 2012/0278388 | A1 | 11/2012 | Kleinbart et al. | |
| 2013/0231049 | A1 | 9/2013 | Sharma et al. | |
| 2014/0051402 | A1 | 2/2014 | Qureshi | |
| 2014/0136949 | A1 | 5/2014 | Wang | |
| 2014/0148209 | A1 | 5/2014 | Weng et al. | |
| 2014/0200049 | A1 | 7/2014 | Shen et al. | |
| 2014/0228010 | A1 | 8/2014 | Barbulescu et al. | |
| 2014/0368601 | A1 | 12/2014 | deCharms | |
| 2015/0170645 | A1 | 6/2015 | Di Censo et al. | |
| 2015/0213604 | A1 | 7/2015 | Li et al. | |
| 2015/0341297 | A1 | 11/2015 | Barfield, Jr. et al. | |
| 2016/0127291 | A1 | 5/2016 | Kassab et al. | |
| 2016/0227386 | A1 | 8/2016 | Shaltiel et al. | |
| 2016/0277903 | A1 | 9/2016 | Poosala et al. | |
| 2016/0381110 | A1 | 12/2016 | Barnett et al. | |
| 2017/0109843 | A1 | 4/2017 | Berg et al. | |
| 2018/0089880 | A1 | 3/2018 | Garrido et al. | |
| 2018/0191792 | A1 | 7/2018 | Paul | |
| 2018/0192142 | A1 | 7/2018 | Paul | |
| 2018/0278999 | A1 | 9/2018 | David et al. | |
| 2019/0037075 | A1 | 1/2019 | Nimbavikar et al. | |
| 2019/0052223 | A1 | 2/2019 | Liu | |
| 2019/0082223 | A1 | 3/2019 | David et al. | |
| 2019/0215482 | A1 | 7/2019 | Sathya et al. | |
| 2020/0128322 | A1 | 4/2020 | Sabin et al. | |

(56) References Cited

U.S. PATENT DOCUMENTS

| | | | |
|---|---|---|---|
| 2020/0145615 A1 | 5/2020 | Seko et al. | |
| 2020/0184524 A1 | 6/2020 | Herken et al. | |
| 2020/0344357 A1 | 10/2020 | Scriven et al. | |
| 2021/0014610 A1 | 1/2021 | Carrigan et al. | |
| 2022/0070010 A1 | 3/2022 | Frolovichev et al. | |
| 2022/0070011 A1* | 3/2022 | Frolovichev | H04L 67/1396 |
| 2022/0070626 A1 | 3/2022 | Nugumanov et al. | |
| 2022/0070629 A1* | 3/2022 | Frolovichev | H04L 51/52 |
| 2022/0159419 A1* | 5/2022 | Frolovichev | G06F 3/04845 |
| 2023/0026917 A1* | 1/2023 | Frolovichev | H04L 65/4015 |
| 2023/0262425 A1* | 8/2023 | Frolovichev | H04H 20/91 |
| | | | 455/518 |
| 2024/0137733 A1* | 4/2024 | Frolovichev | H04L 67/60 |
| 2025/0016528 A1* | 1/2025 | Frolovichev | G06Q 40/04 |

OTHER PUBLICATIONS

Office Action dated Nov. 12, 2020 in connection with U.S. Appl. No. 17/003,888.

Notice of Allowance dated Nov. 12, 2020 in connection with U.S. Appl. No. 17/003,868.

Office Action dated Nov. 17, 2020 in connection with U.S. Appl. No. 17/003,891.

Office Action dated Nov. 19, 2020 in connection with U.S. Appl. No. 17/003,896.

Notice of Allowance dated Dec. 4, 2020 in connection with U.S. Appl. No. 17/003,895.

Office Action dated Dec. 10, 2020 in connection with U.S. Appl. No. 17/003,885.

Notice of Allowance dated Dec. 11, 2020 in connection with U.S. Appl. No. 17/003,893.

Office Action dated Dec. 24, 2020 in connection with U.S. Appl. No. 17/003,876.

Final Office Action dated Feb. 5, 2021 in connection with U.S. Appl. No. 17/003,878.

Notice of Allowance dated Feb. 17, 2021 in connection with U.S. Appl. No. 17/003,868.

Notice of Allowance dated Mar. 5, 2021 in connection with U.S. Appl. No. 17/003,891.

Final Office Action dated Mar. 10, 2021 in connection with U.S. Appl. No. 17/003,896.

Notice of Allowance dated Apr. 26, 2021 in connection with U.S. Appl. No. 17/003,876.

Office Action dated Apr. 30, 2021 in connection with U.S. Appl. No. 17/003,885.

Notice of Allowance dated May 11, 2021 in connection with U.S. Appl. No. 17/175,435.

Notice of Allowance dated Jun. 1, 2021 in connection with U.S. Appl. No. 17/003,896.

Notice of Allowance dated Jun. 24, 2021 in connection with U.S. Appl. No. 17/214,906.

Notice of Allowance dated Jul. 2, 2021 in connection with U.S. Appl. No. 17/222,795.

Notice of Allowance dated Jul. 15, 2021 in connection with U.S. Appl. No. 17/216,400.

Notice of Allowance dated Aug. 16, 2021 in connection with U.S. Appl. No. 17/219,880.

Notice of Allowance dated Aug. 18, 2021 in connection with U.S. Appl. No. 17/003,885.

Notice of Allowance dated Sep. 3, 2021 in connection with U.S. Appl. No. 17/234,635.

Notice of Allowance dated Sep. 22, 2021 in connection with U.S. Appl. No. 17/367,494.

Notice of Allowance dated Nov. 19, 2021 in connection with U.S. Appl. No. 17/467,405.

International Search Report and Written Opinion dated Nov. 22, 2021 in connection with International Application No. PCT/IB2021/00584, 10 pages.

International Search Report and Written Opinion dated Nov. 22, 2021 in connection with International Application No. PCT/IB2021/00586, 10 pages.

International Search Report and Written Opinion dated Nov. 22, 2021 in connection with International Application No. PCT/IB2021/00587, 10 pages.

Notice of Allowance dated Nov. 24, 2021 in connection with U.S. Appl. No. 17/372,911.

Notice of Allowance dated Dec. 6, 2021 in connection with U.S. Appl. No. 17/467,405.

Notice of Allowance dated Dec. 10, 2021 in connection with U.S. Appl. No. 17/507,690.

Notice of Allowance dated Dec. 15, 2021 in connection with U.S. Appl. No. 17/372,911.

Notice of Allowance dated May 3, 2022 in connection with U.S. Appl. No. 17/588,030.

International Preliminary Report on Patentability dated Feb. 28, 2023 in connection to International Application No. PCT/IB2022/000584, 6 pages.

International Preliminary Report on Patentability dated Feb. 28, 2023 in connection to International Application No. PCT/IB2022/000586, 6 pages.

International Preliminary Report on Patentability dated Feb. 28, 2023 in connection to International Application No. PCT/IB2022/000587, 6 pages.

International Search Report dated Mar. 17, 2023 in connection with International Application No. PCT/IB2022/000620, 3 pages.

Written Opinion of the International Searching Authority dated Mar. 14, 2023 in connection with International Application No. PCT/IB2022/000620, 5 pages.

International Preliminary Report on Patentability dated Apr. 23, 2024 in connection with International Application No. PCT/IB2022/000620, 6 pages.

* cited by examiner

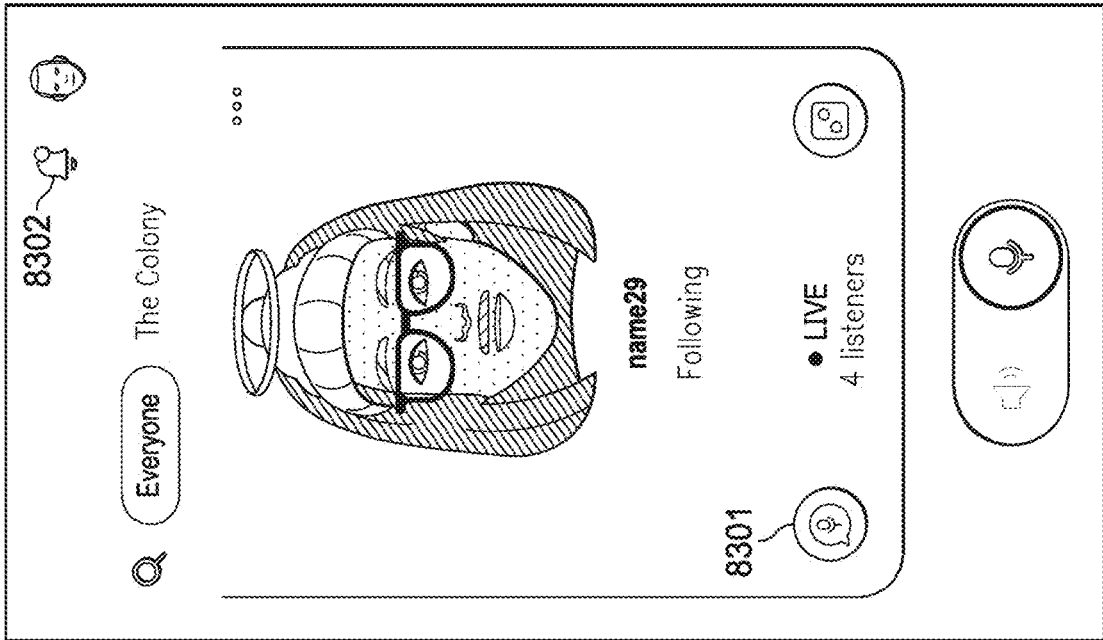
FIG. 83
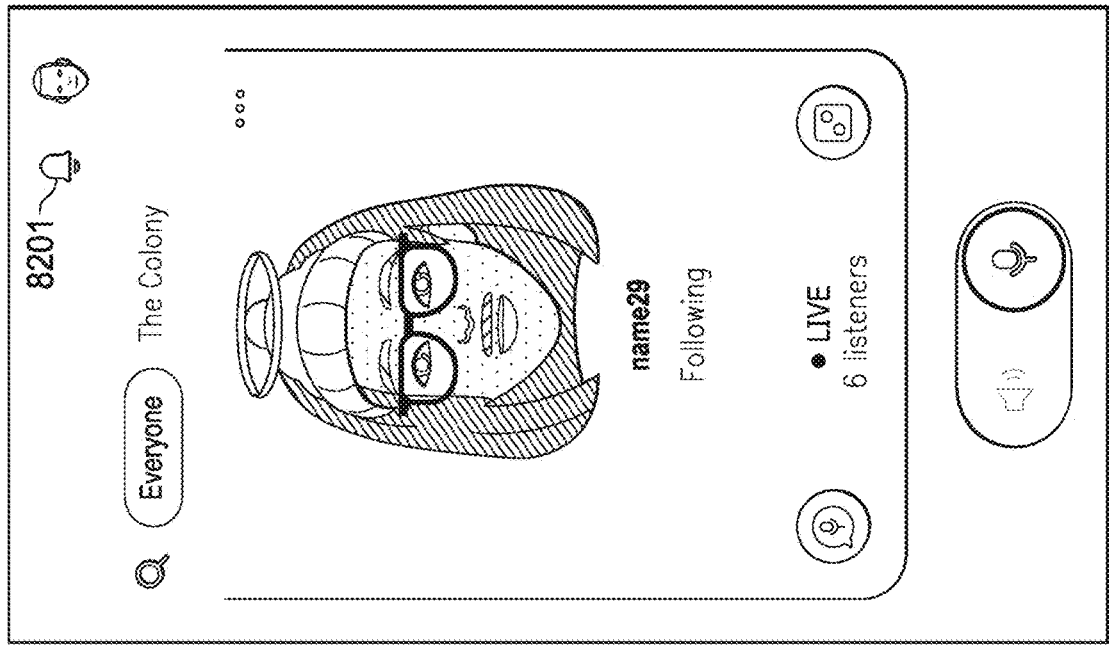
FIG. 82

8501

8401

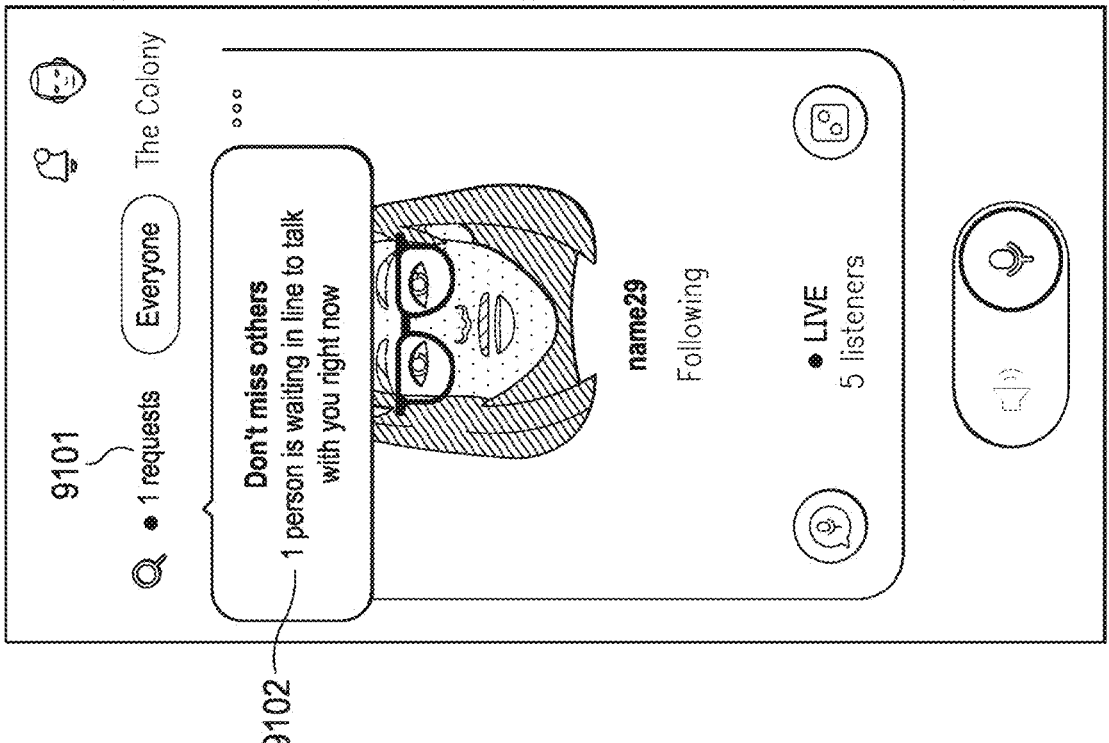
FIG. 91
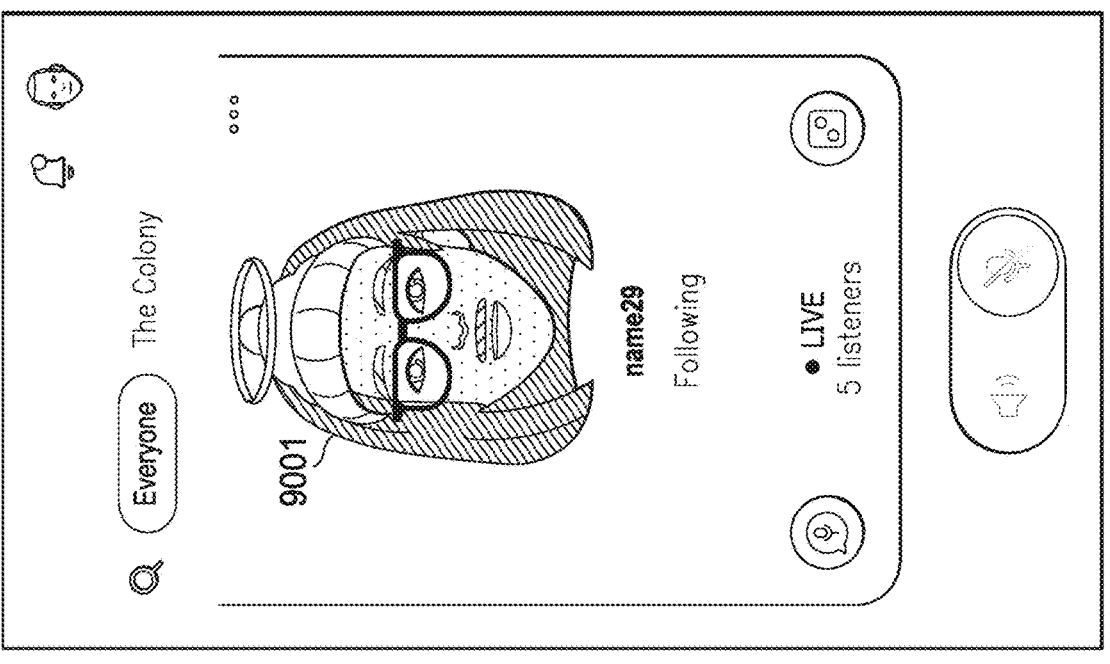
FIG. 90

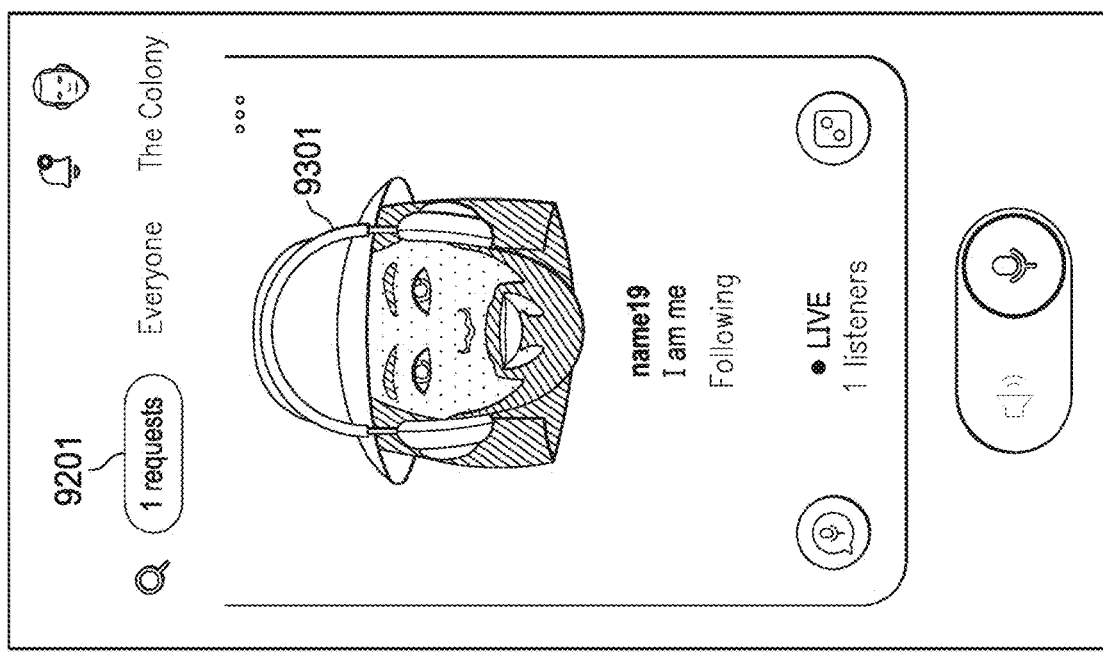
FIG. 93
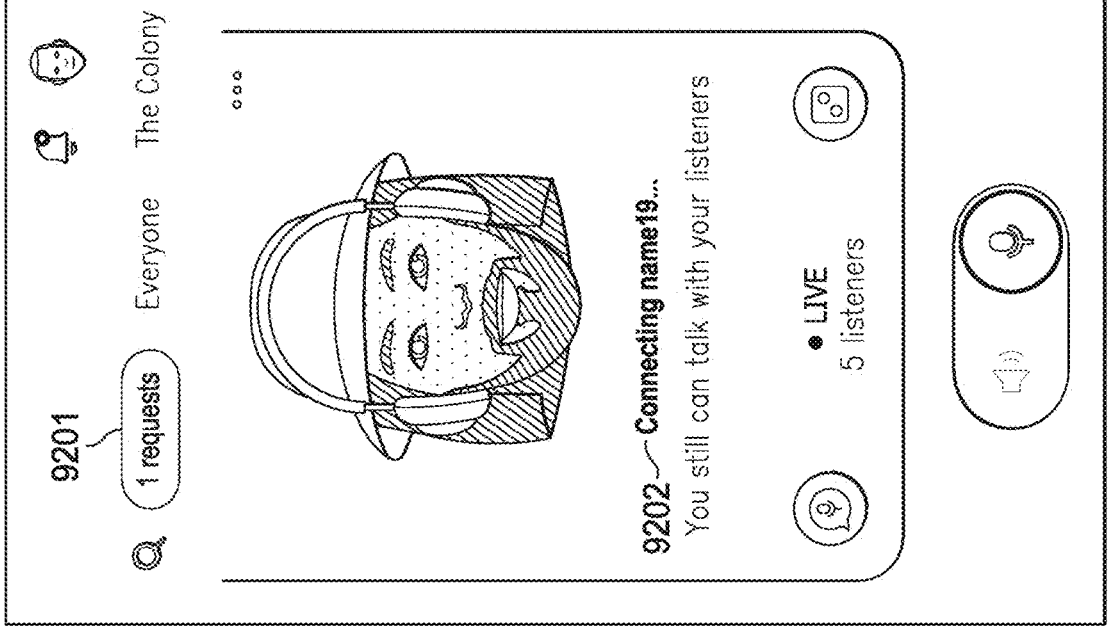
FIG. 92

Delete account — 9501

Help us improve your experience, tell us why you're deleting the app.

I don't like the app — 9502

I wasn't meeting new people — 9503

My friends don't use this app — 9504

It's hard to use — 9505

Other — 9506

Searching for a new talker 1 requests — Everyone — The Colony

9401 name19
I am me
Following

● LIVE
1 listeners

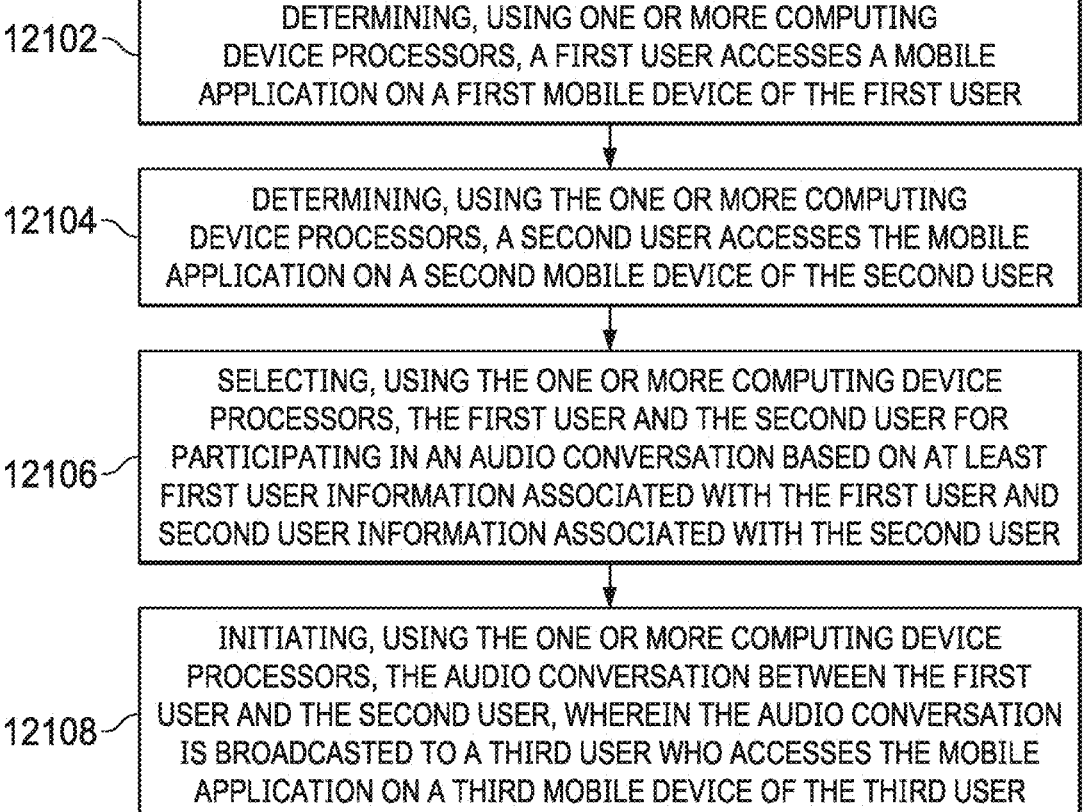

12102 — DETERMINING, USING ONE OR MORE COMPUTING DEVICE PROCESSORS, A FIRST USER ACCESSES A MOBILE APPLICATION ON A FIRST MOBILE DEVICE OF THE FIRST USER

12104 — DETERMINING, USING THE ONE OR MORE COMPUTING DEVICE PROCESSORS, A SECOND USER ACCESSES THE MOBILE APPLICATION ON A SECOND MOBILE DEVICE OF THE SECOND USER

12106 — SELECTING, USING THE ONE OR MORE COMPUTING DEVICE PROCESSORS, THE FIRST USER AND THE SECOND USER FOR PARTICIPATING IN AN AUDIO CONVERSATION BASED ON AT LEAST FIRST USER INFORMATION ASSOCIATED WITH THE FIRST USER AND SECOND USER INFORMATION ASSOCIATED WITH THE SECOND USER

12108 — INITIATING, USING THE ONE OR MORE COMPUTING DEVICE PROCESSORS, THE AUDIO CONVERSATION BETWEEN THE FIRST USER AND THE SECOND USER, WHEREIN THE AUDIO CONVERSATION IS BROADCASTED TO A THIRD USER WHO ACCESSES THE MOBILE APPLICATION ON A THIRD MOBILE DEVICE OF THE THIRD USER

Firstname Lastname 1791

Username

American media personality,
businesswoman, socialite, model,
singer, actress

Profiles In Eccentricity

Subscribe

23 shows    283 followers    198 following

TODAY

FANS ONLY
User3 & User4

Sim Racing to Real-World McLaren GT3
Good morning everyone! Today we will be
talking food with Name1. Name1 is a chef, app
streamer, and personality! Today...

293 · 1 hr 5 min

YESTERDAY

 User3 & User4

Sim Racing to Real-World McLaren GT3

Connect your social accounts

Connecting your Social Media accounts creates trust in your App account. Make sure you connect all of your main social media accounts.

| | |
|---|---|
| Email | Enter your email |
| Social Media1 | Link account |
| Social Media2 | Link account |
| Social Media3 | Link account |
| Social Media4 | Link account |
| Social Media5 | Link account |
| Social Media6 | Link account |
| Podcast | Link account |

Congrats! You're invited to join the App Monetization Program!

Here's what you will earn under the Program:

Terms

Once you accept the Monetization Term by clicking "I agree" below, you can begin implementing exclusive features and earning Rewards under the Program.

I agree

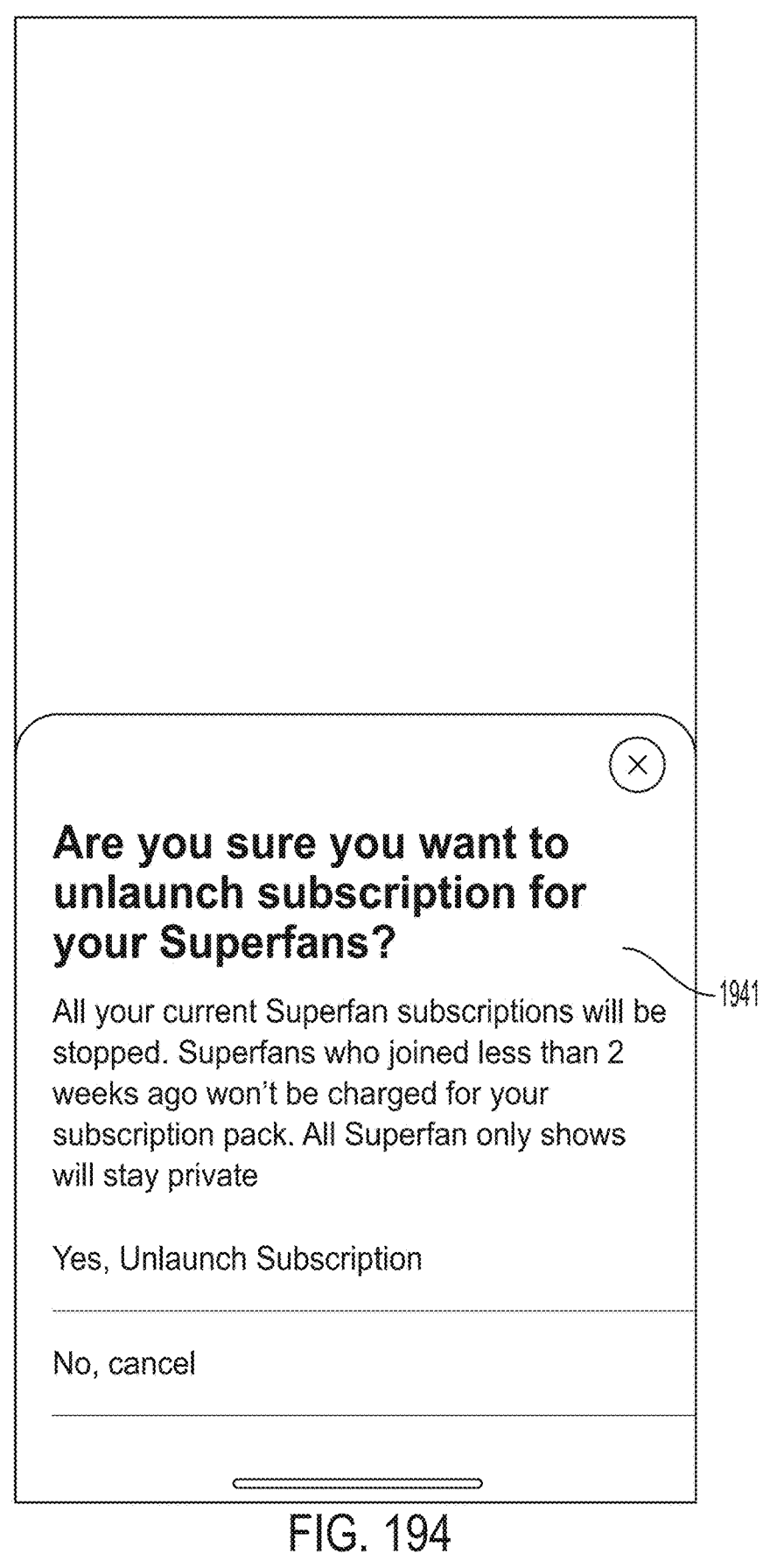

Are you sure you want to unlaunch subscription for your Superfans?

— 1941

All your current Superfan subscriptions will be stopped. Superfans who joined less than 2 weeks ago won't be charged for your subscription pack. All Superfan only shows will stay private Yes, Unlaunch Subscription No, cancel

FIG. 194

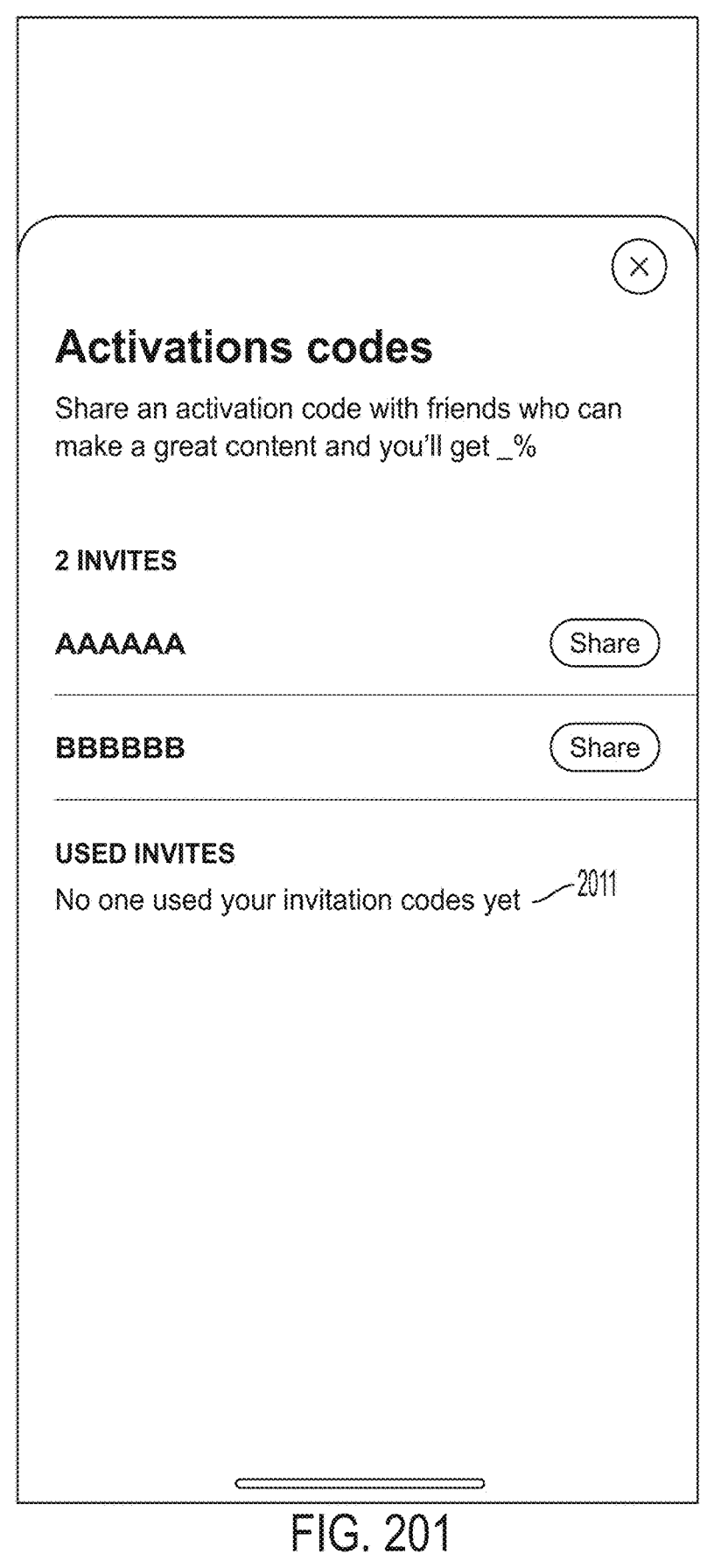

Activations codes

Share an activation code with friends who can make a great content and you'll get _%

2 INVITES

AAAAAA    Share

BBBBBB    Share

USED INVITES

No one used your invitation codes yet —2011

FIG. 201

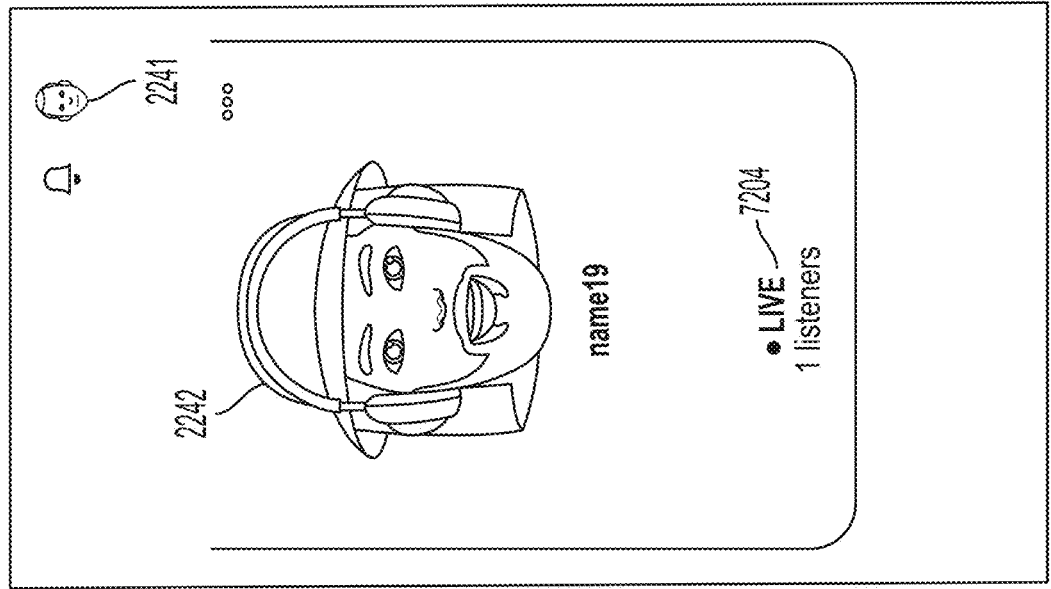
2241
2242
name19
● LIVE ⎯ 7204
1 listeners
FIG. 224
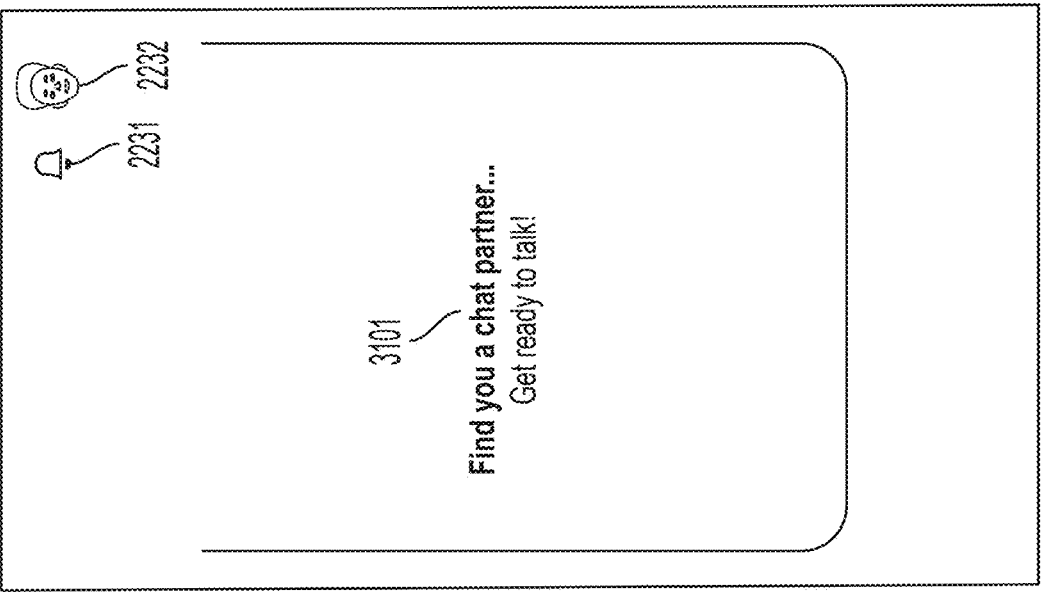
2231  2232
3101
Find you a chat partner...
Get ready to talk!
FIG. 223

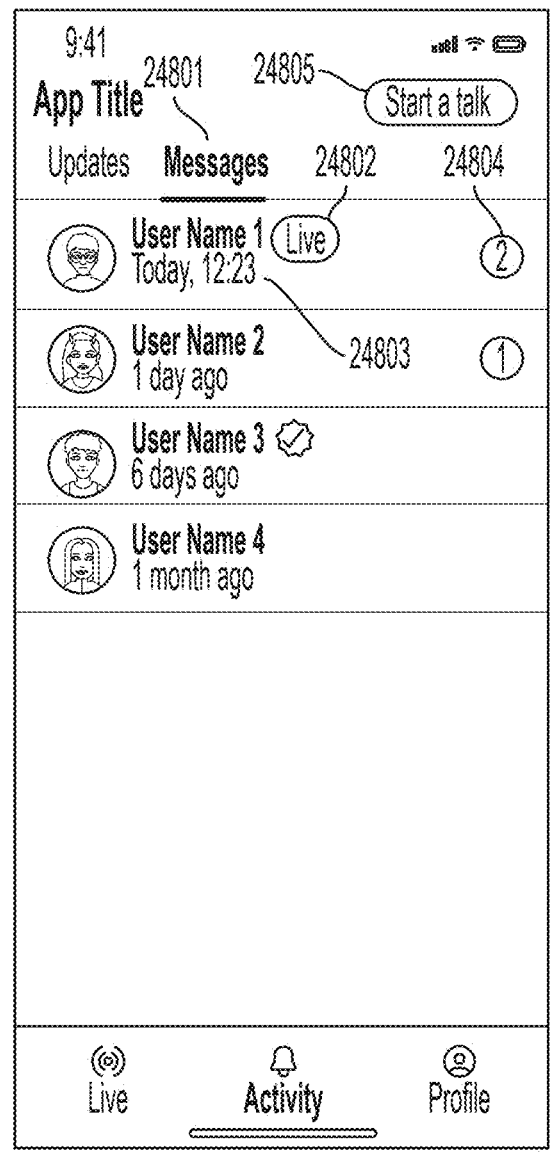
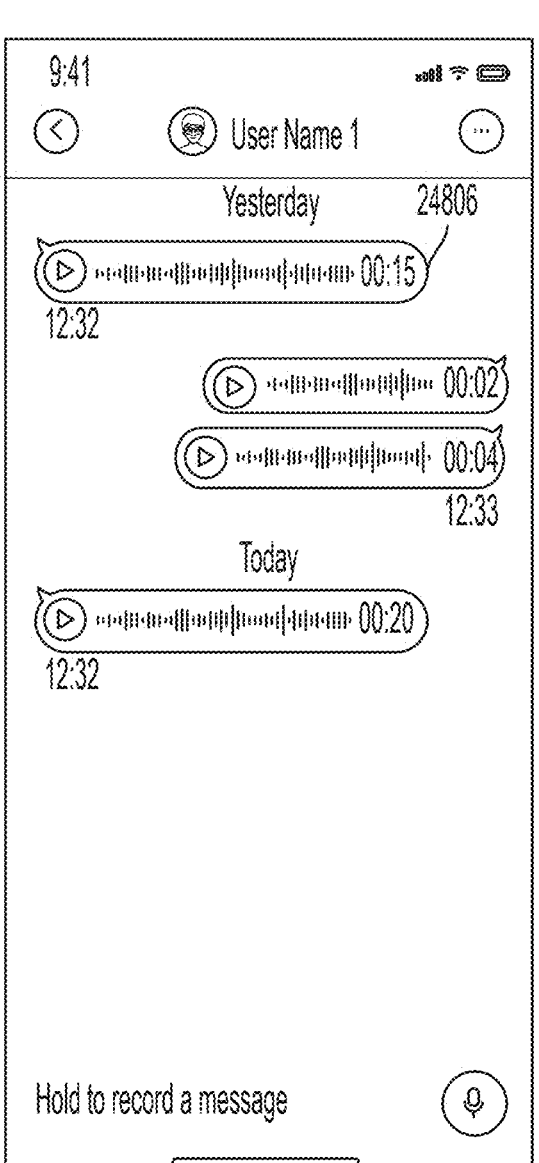
FIG. 248

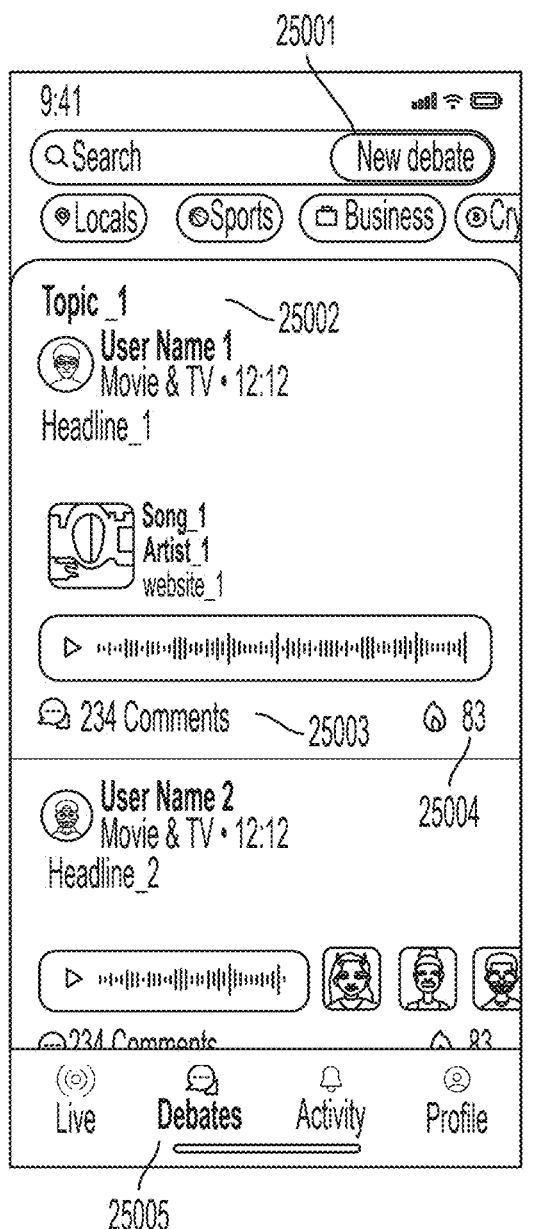
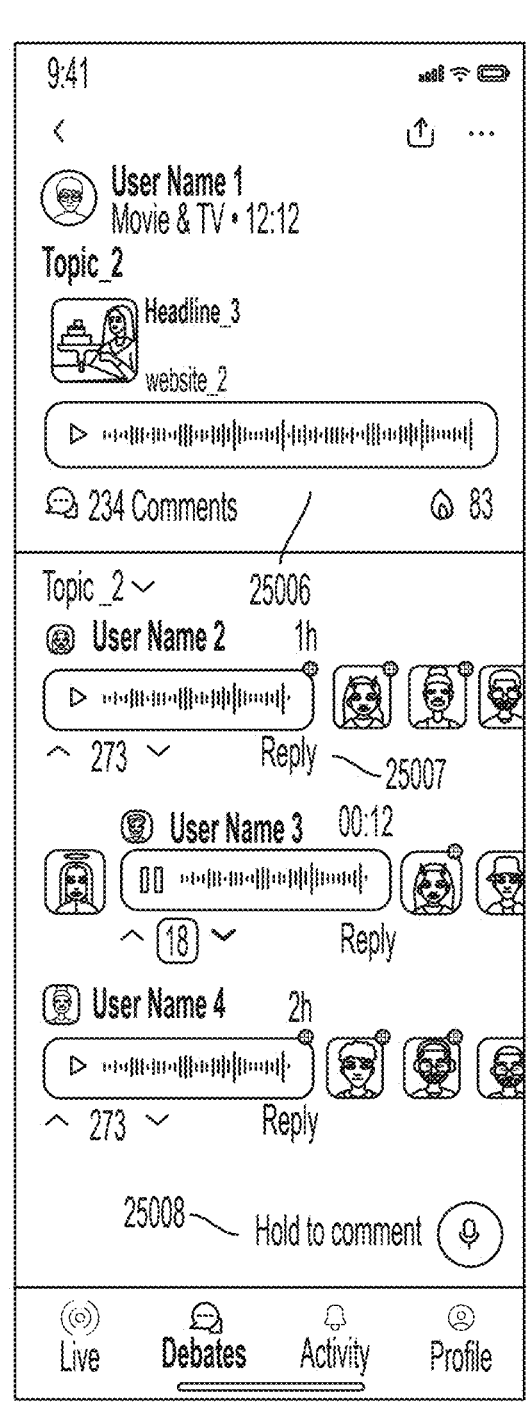
FIG. 250

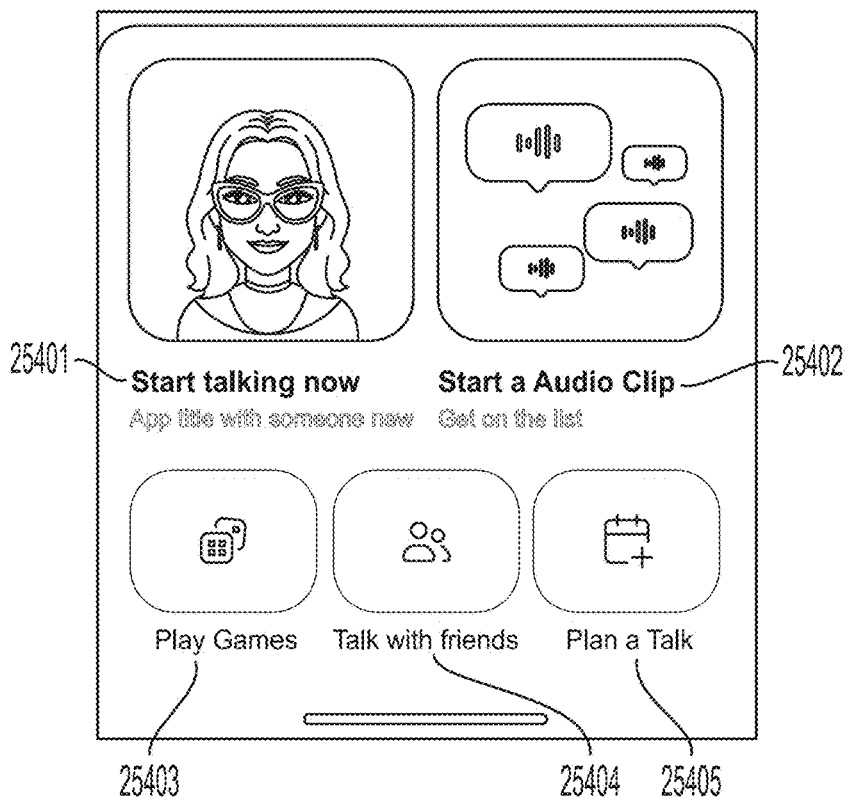
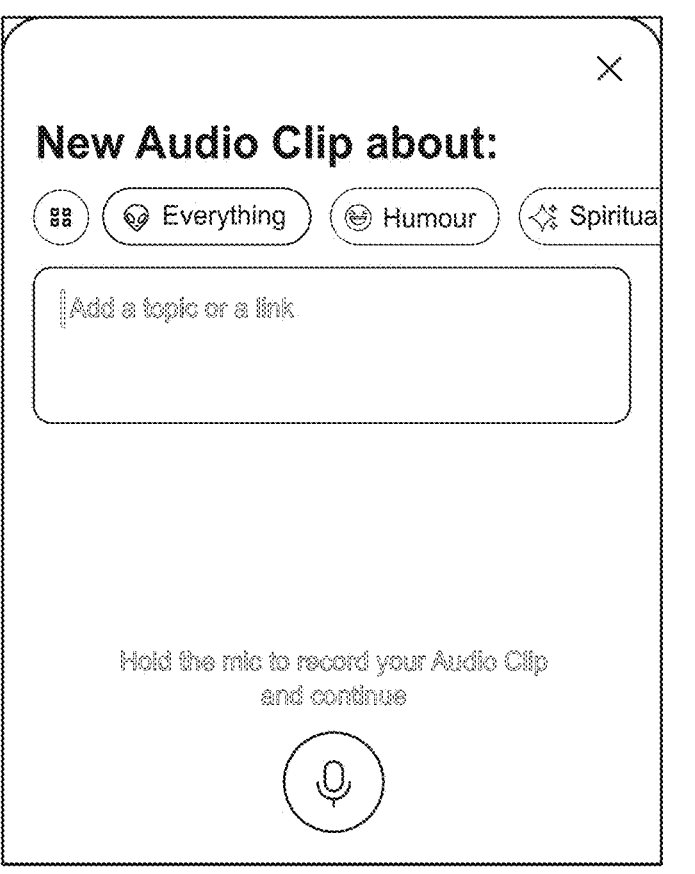
FIG. 254A

FROM

TO

26102

26105

FROM

Best places in Rome?

26302

TO

FROM

26401

27101

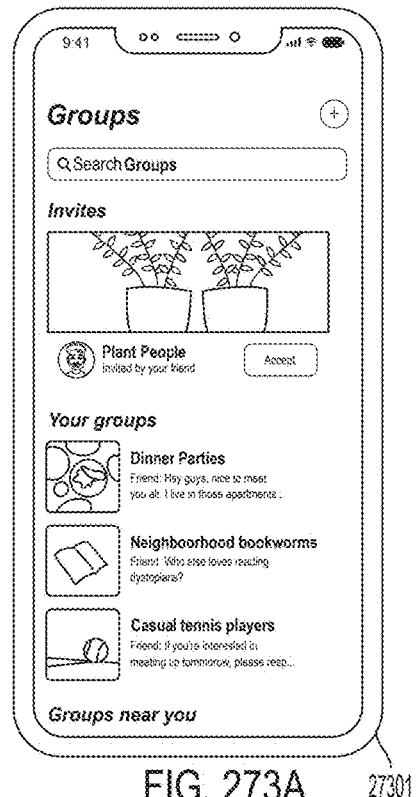
FIG. 273A    27301
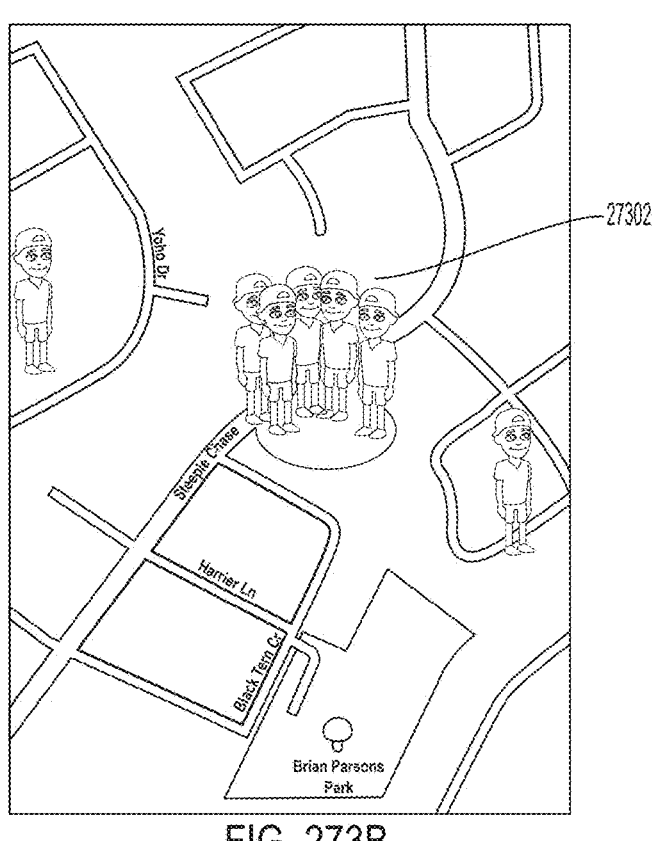
FIG. 273B

28601

28701

28801

29001

29201

31601
31602
31603

DATER
PLEDGE

Condition 1

Condition 2

Condition 3

TAP TO SIGN

Accept

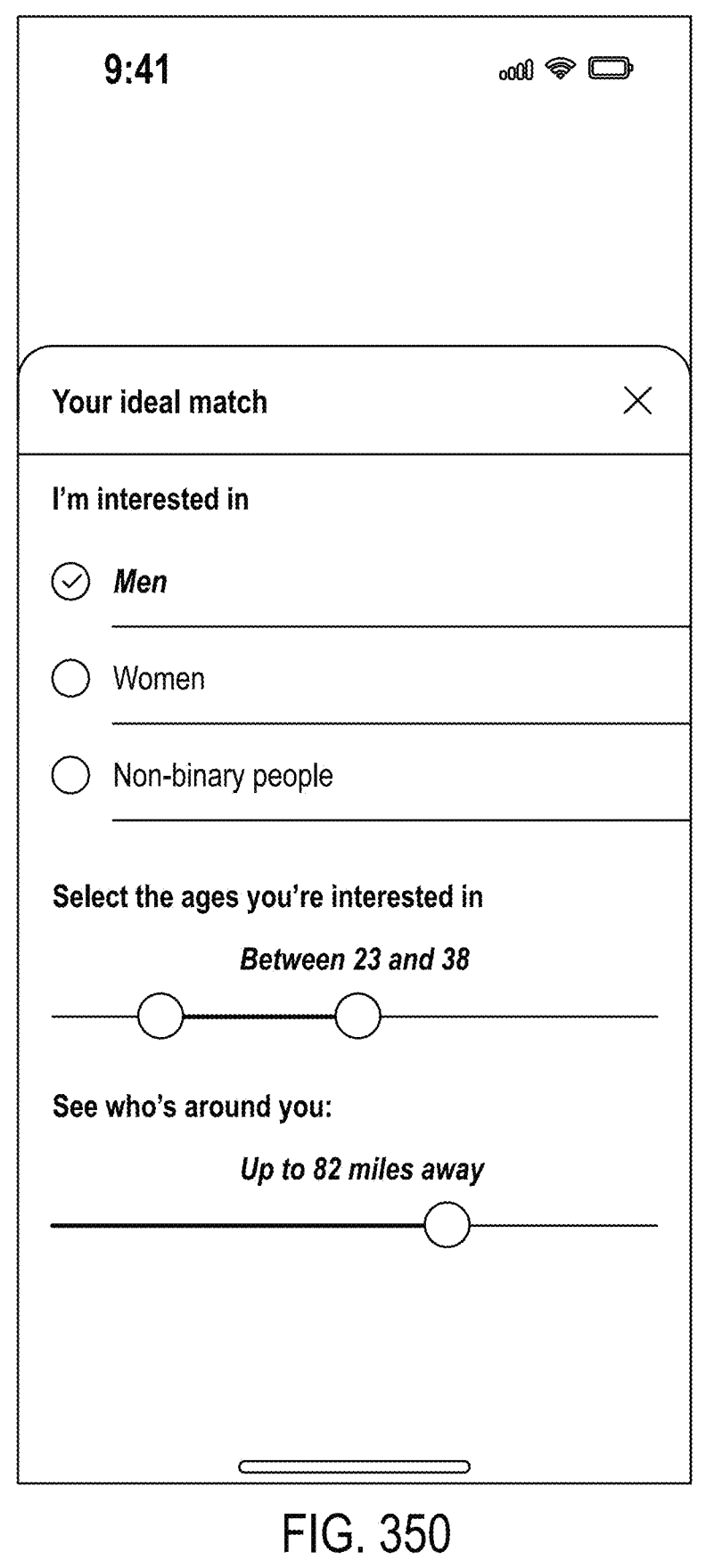

Your ideal match ✕

I'm interested in

⊘ *Men*

◯ Women

◯ Non-binary people

Select the ages you're interested in

*Between 23 and 38*

See who's around you:

*Up to 82 miles away*

FIG. 350

COMPLEX COMPUTING NETWORK FOR IMPROVING ESTABLISHMENT AND ACCESS OF COMMUNICATION AMONG COMPUTING DEVICES

CROSS-REFERENCE TO RELATED APPLICATIONS

This U.S. patent application claims priority to and is a continuation-in-part (CIP) of U.S. patent application Ser. No. 19/195,241, filed on Apr. 30, 2025, which claims priority to and is a continuation-in-part (CIP) of U.S. patent application Ser. No. 18/817,979, filed on Aug. 28, 2024, now issued as U.S. Pat. No. 12,425,812 on Sep. 23, 2025, which claims priority to and is a continuation-in-part (CIP) of U.S. patent application Ser. No. 18/400,786, filed on Dec. 29, 2023, now issued as U.S. Pat. No. 12,082,079 on Sep. 3, 2024, which claims priority to and is a continuation-in-part (CIP) of U.S. patent application Ser. No. 18/138,617, filed on Apr. 24, 2023, now issued as U.S. Pat. No. 11,864,066 on Jan. 2, 2024, which claims priority to and is a continuation-in-part (CIP) of U.S. patent application Ser. No. 17/947,855, filed on Sep. 19, 2022, now issued as U.S. Pat. No. 11,792,610 on Oct. 17, 2023, which claims priority to and is a continuation-in-part (CIP) of U.S. patent application Ser. No. 17/588,030, filed on Jan. 28, 2022, now issued as U.S. Pat. No. 11,451,937 on Sep. 20, 2022, which claims priority to and is a continuation-in-part (CIP) of U.S. patent application Ser. No. 17/507,690, filed on Oct. 21, 2021, now issued as U.S. Pat. No. 11,317,253 on Apr. 26, 2022, which claims priority to and is a continuation-in-part (CIP) of U.S. patent application Ser. No. 17/467,405, filed on Sep. 6, 2021, now issued as U.S. Pat. No. 11,290,292 on Mar. 29, 2022, which claims priority to and is a continuation-in-part (CIP) of U.S. patent application Ser. No. 17/216,400, filed on Mar. 29, 2021, now issued as U.S. Pat. No. 11,246,012 on Feb. 8, 2022, which claims priority to and is a continuation of U.S. patent application Ser. No. 17/003,868, filed on Aug. 26, 2020, now issued as U.S. Pat. No. 10,966,062 on Mar. 30, 2021, all of which are incorporated by reference herein in their entirety for all purposes. U.S. patent application Ser. No. 17/467,405, filed on Sep. 6, 2021, now issued as U.S. Pat. No. 11,290,292 on Mar. 29, 2022, also claims priority to and is a continuation-in-part (CIP) of U.S. patent application Ser. No. 17/219,880, filed on Mar. 31, 2021, now issued as U.S. Pat. No. 11,212,126 on Dec. 28, 2021, which claims priority to and is a continuation-in-part (CIP) of U.S. patent application Ser. No. 17/214,906, filed on Mar. 28, 2021, now issued as U.S. Pat. No. 11,165,911 on Nov. 2, 2021, which claims priority to and is a continuation-in-part (CIP) of U.S. patent application Ser. No. 17/175,435, filed on Feb. 12, 2021, now issued as U.S. Pat. No. 11,128,997 on Sep. 21, 2021, which claims priority to and is a continuation-in-part (CIP) of U.S. patent application Ser. No. 17/003,868, filed on Aug. 26, 2020, now issued as U.S. Pat. No. 10,966,062 on Mar. 30, 2021, all of which are incorporated by reference herein in their entirety for all purposes. This application also incorporates by reference, for all purposes, U.S. patent application Ser. No. 17/409,638, filed on Aug. 23, 2021, now issued as U.S. Pat. No. 11,722,328 on Aug. 8, 2023.

BACKGROUND

People use software applications to establish audio communication with friends, family, and known acquaintances. In each instance, a person knows the contact information of the person he or she is seeking to communicate with and uses the contact information to establish communication. There is a need for a person to expand his or her communication beyond friends, family, and known acquaintances, and benefit from sharing and listening to perspectives beyond the person's immediate social network. While social networking applications enable text-based communication among people, they do not provide a smooth and efficient way for people to actually talk and have meaningful live conversations beyond one's immediate network of friends, family, and known acquaintances. Therefore, there is a need to provide an improved computing environment for establishing and broadcasting audio communication, and thereby optimize both a speaker's and listener's experience during the audio communication.

SUMMARY

In some embodiments, systems, methods, and computer program products are provided for initiating and streaming audio conversations. An exemplary method comprises: determining, using one or more computing device processors, a first user accesses a mobile application on a first mobile device of the first user; determining, using the one or more computing device processors, a second user accesses the mobile application on a second mobile device of the second user; receiving, using the one or more computing device processors, from the first mobile device of the first user, a selection of the second user; receiving, using the one or more computing device processors, from the first mobile device of the first user, audio conversation information associated with an audio conversation; initiating, using the one or more computing device processors, the audio conversation involving at least the first user and the second user; streaming, using the one or more computing device processors, the audio conversation to a third user who accesses the mobile application on a third mobile device of the third user; transmitting, using the one or more computing device processors, to the third mobile device for visual display, during the audio conversation, on a first user interface of the mobile application on the third mobile device, a first visual representation of the first user not comprising a first video of the first user; transmitting, using the one or more computing device processors, to the third mobile device for visual display, during the audio conversation, on the first user interface of the mobile application on the third mobile device, a second visual representation of the second user not comprising a second video of the second user; and transmitting, using the one or more computing device processors, to the third mobile device for visual display, during the audio conversation, on the first user interface of the mobile application on the third mobile device, the audio conversation information associated with the audio conversation.

In some embodiments, the audio conversation is added to a first user profile of the first user or a second user profile of the second user.

In some embodiments, the first user interface or a second user interface indicates a number of listeners or mobile application users listening to the audio conversation.

In some embodiments, the method further comprises recording the audio conversation.

In some embodiments, the audio conversation is indexed for publication on an audio publication platform or network.

In some embodiments, the audio conversation can be continued when the first user accesses, during the audio conversation, a second mobile application on the first mobile device, a home screen of the first mobile device, or a non-conversation function in the mobile application.

In some embodiments, the first user interface of the mobile application on the third mobile device presents a conversation mode option for the third user to request joining into the audio conversation, and wherein a visual representation of the conversation mode option is modified when the third user selects the conversation mode option.

In some embodiments, the first visual representation comprises at least one of an avatar, an emoji, a symbol, a persona, an animation, a cartoon, an indicia, an illustration, a histogram, or a graph.

In some embodiments, the first visual representation comprises a first image uploaded or captured by the first user.

In some embodiments, a method for initiating and streaming audio conversations is provided, the method comprising: determining, using one or more computing device processors, a first user accesses a mobile application on a first mobile device of the first user; receiving, using the one or more computing device processors, from the first mobile device of the first user, a selection of a second user (or a group of second users), wherein the second user is on a second mobile device; receiving, using the one or more computing device processors, from the first mobile device of the first user, audio conversation information associated with an audio conversation; initiating, using the one or more computing device processors, the audio conversation involving at least the first user and the second user; streaming, using the one or more computing device processors, the audio conversation to a third user on a third mobile device of the third user; transmitting, using the one or more computing device processors, to the third mobile device for visual display, during the audio conversation, on a first user interface of the mobile application on the third mobile device, a first visual representation of the first user not comprising a first video of the first user; transmitting, using the one or more computing device processors, to the third mobile device for visual display, during the audio conversation, on the first user interface of the mobile application on the third mobile device, a second visual representation of the second user not comprising a second video of the second user; and transmitting, using the one or more computing device processors, to the third mobile device for visual display, during the audio conversation, on the first user interface of the mobile application on the third mobile device, the audio conversation information associated with the audio conversation.

In some embodiments, the method further comprises searching for users or audio conversations based on a search input parameter.

In some embodiments, the first user interface of the mobile application on the third mobile device presents a conversation mode option for the third user to request joining into the audio conversation, and wherein a visual representation of the conversation mode option is modified when the third user selects the conversation mode option.

In some embodiments, the first user interface of the mobile application on the third mobile device presents, during the audio conversation, a third visual representation of the third user not comprising a third video of the third user.

In some embodiments, the first visual representation comprises a first image uploaded or captured by the first user.

In some embodiments, the audio conversation is sharable with a social network outside the mobile application.

In some embodiments, the audio conversation is terminated when the first user terminates the audio conversation on the first mobile device.

In some embodiments, an apparatus is provided for initiating and streaming audio conversations, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; receive, from the first mobile device of the first user, a selection of the second user; receive, from the first mobile device of the first user, audio conversation information associated with an audio conversation; initiate the audio conversation involving at least the first user and the second user; stream the audio conversation to a third user on a third mobile device of the third user; transmit, to the third mobile device for visual display, during the audio conversation, on a first user interface of the mobile application on the third mobile device, a first visual representation of the first user not comprising a first video of the first user; transmit, to the third mobile device for visual display, during the audio conversation, on the first user interface of the mobile application on the third mobile device, a second visual representation of the second user not comprising a second video of the second user; and transmit, to the third mobile device for visual display, during the audio conversation, on the first user interface of the mobile application on the third mobile device, the audio conversation information associated with the audio conversation.

In some embodiments, the apparatus comprises at least one of an application server, the first mobile device, the second mobile device, or the third mobile device.

In some embodiments, the audio conversation is sharable with a social network outside the mobile application.

In some embodiments, the audio conversation is streamable on a social network outside the mobile application.

Another exemplary method comprises: determining, using one or more computing device processors, a first user accesses a mobile application on a first mobile device of the first user; receiving, using the one or more computing device processors, from the first mobile device of the first user, audio conversation information associated with an audio stream; initiating, using the one or more computing device processors, the audio stream involving the first user, wherein a second user can join the first user's audio stream as a speaker based on receiving an invite from the first user or based on sending an audio stream joining request to the first user and the audio stream joining request being approved by the first user; and streaming the audio stream along with visual representations (only photographic or still images; no video) associated with the first user and/or the second user to listeners. In some embodiments, the first user may assign privileges (e.g., moderator privileges) to the second speaker. This stream may be recorded. This stream may be added to profile pages associated with the speakers and/or listeners. The speaker may share a link to the audio stream with social network users (e.g., associated with social network applications different from the mobile application) such that the audio stream may be directly played in those social networks or selecting the link may open the audio stream in the mobile application or may present an option to download the mobile application (if the social network user does not have the mobile application installed on their mobile device. In some embodiments, users of the mobile application may send visual (e.g., text) messages to other users of the mobile application. In some embodiments, users in an audio conversation may send visual (e.g., text) messages to other users in the audio conversation. Therefore, in some embodiments, the mobile application may be a podcasting application that enables users to conduct, publish, and share live or recorded solo (e.g., single user) or group (e.g., multiple user) podcasts. In some embodiments, games may be provided on the mobile application such that the users of the mobile application may participate in games with each other while engaging in audio conversations as described in this disclosure.

In some embodiments, a method is provided for initiating and streaming audio conversations, and transmitting hashtags, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first mobile device of the first user and the second mobile device of the second user; receiving, using the one or more computing device processors, from at least one of the first mobile device or the second mobile device, a hashtag associated with the audio conversation; initiating, using the one or more computing device processors, the audio conversation between the first user and the second user; streaming, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user not comprising a first photographic or video image of the first user; transmitting, using the one or more computing device processors, to the third mobile device for visual display, during the audio conversation, on the user interface of the mobile application on the third mobile device, a second visual representation of the second user not comprising a second photographic or video image of the second user; and transmitting, using the one or more computing device processors, to the third mobile device for visual display, during the audio conversation, on the user interface of the mobile application on the third mobile device, the hashtag associated with the audio conversation, wherein selecting the hashtag initiates visual display of information associated with the hashtag on a second user interface, different from the user interface, or on the first user interface, of the mobile application on the third mobile device.

In some embodiments, the hashtag is received at least one of before, after, or during the audio conversation.

In some embodiments, the method further comprises establishing a relationship between the hashtag and at least one of the first user or the second user.

In some embodiments, the method further comprises establishing a relationship between the audio conversation and a second audio conversation based on the hashtag associated with the audio conversation and a second hashtag associated with the second audio conversation.

In some methods, a method is provided for initiating and streaming audio conversations, and transmitting descriptive operators, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first mobile device of the first user and the second mobile device of the second user; determining, using the one or more computing device processors, a descriptive operator for the audio conversation; initiating, using the one or more computing device processors, the audio conversation between the first mobile device of the first user and the second mobile device of the second user; streaming, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user not comprising a first photographic or video image of the first user; transmitting, using the one or more computing device processors, to the third mobile device for visual display, during the audio conversation, on the user interface of the mobile application on the third mobile device, a second visual representation of the second user not comprising a second photographic or video image of the second user; and transmitting, using the one or more computing device processors, to the third mobile device for visual display, during the audio conversation, on the user interface of the mobile application on the third mobile device, the descriptive operator associated with the audio conversation, wherein selecting the descriptive operator initiates visual display of information associated with the descriptive operator on a second user interface, different from the user interface, or on the first user interface, of the mobile application on the third mobile device.

In some embodiments, the descriptive operator comprises a hashtag or a selectable hashtag.

In some embodiments, the descriptive operator is received from at least one of the first mobile device of the first user or the second mobile device of the second user.

In some embodiments, the first visual representation comprises at least one of an avatar, an emoji, a symbol, a persona, an animation, a cartoon, an indicia, an illustration, a histogram, or a graph.

In some embodiments, the method further comprises searching, based on the descriptive operator, an external social network or a second mobile application, and integrating a search result associated with the external social network or the second mobile application into the second user interface or a third user interface associated with the mobile application. In some embodiments, a link associated with the audio conversation (associated with the descriptive operator) on the mobile application is presented on a user interface of the external social network or the second mobile application that presents visual or audio posts associated with the same or related descriptive operator. Selecting the link may take the user to the mobile application or open the audio conversation within the external social network or second mobile application.

In some embodiments, the descriptive operator is automatically determined based on the audio conversation.

In some embodiments, the method further comprises determining a second descriptive operator for the audio conversation.

In some embodiments, the descriptive operator is related to the second descriptive operator, or wherein the second descriptive operator is determined based on the descriptive operator.

In some embodiments, the descriptive operator and the second descriptive operator are part of a descriptive operator hierarchy or tree-like structure.

In some embodiments, the audio conversation is displayed as a search result when a fourth user on a fourth mobile device searches for at least a portion of the descriptive operator in a search query associated with or in the mobile application.

In some embodiments, at least one of the first user or the second user is displayed as a search result when a fourth user on a fourth mobile device searches for at least a portion of the descriptive operator in a search query associated with or in the mobile application.

In some embodiments, at least one of the first user or the second user can edit the descriptive operator at least one of before, during, or after the audio conversation. In some embodiments, the descriptive operator may be locked from editing a certain period. In some embodiments, the descriptive operator may be edited, replaced (or other descriptive operators may be added or deleted) as the mobile applications or system learns and analyzes audio conversations over time.

In some embodiments, the descriptive operator comprises at least two descriptive operators.

In some embodiments, the descriptive operator comprises an operative indicator.

In some embodiments, the descriptive operator is received from the third mobile device of the third user.

In some embodiments, the descriptive operator is a suggested descriptive operator presented to and selected by at least one of the first user on the mobile device, the second user on the mobile device, or the third user on the third mobile device.

In some embodiments, the method further comprises establishing, based on the descriptive operator, a relationship between the first user and the second user.

In some embodiments, the method further comprises establishing, based on the descriptive operator, a relationship between the third user and at least one of the first user or the second user.

In some embodiments, the method further comprises establishing, based on the descriptive operator, a relationship between the audio conversation and at least one of the first user, the second user, or the third user.

In some embodiments, the method further comprises associating a descriptive operator with the first user based on at least one of a speaking, listening, or searching history of the user, one or more users that follow the first user, one or more second users that the user follows, a location associated with the first user, mobile application information associated with the first user, or social network information associated with the first user.

In some embodiments, an apparatus is provided for initiating and streaming audio conversations, and transmitting descriptive operators, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; initiate an audio conversation between the first user and the second user; determine a descriptive operator associated with the audio conversation; initiate, the audio conversation between the first user and the second user; stream the audio conversation to a third user who accesses the mobile application on a third mobile device of the third user; transmit, to the third mobile device for visual display, during the audio conversation, on a user interface of the mobile application on the third mobile device, a first visual representation of the first user; transmit, to the third mobile device for visual display, during the audio conversation, on the user interface of the mobile application on the third mobile device, a second visual representation of the second user; and transmit, to the third mobile device for visual display, during the audio conversation, on the user interface of the mobile application on the third mobile device, the descriptive operator associated with the audio conversation, wherein selecting the descriptive operator initiates visual display of information associated with the descriptive operator on a second user interface, different from the user interface, or on the first user interface, of the mobile application on the third mobile device.

In some embodiments, the apparatus comprises at least one of an application server, the first mobile device, the second mobile device, or the third mobile device.

In some embodiments, the code is further configured to filter audio conversations, speakers to talk to, or speakers to listen to based on a descriptive operator associated with or input by a fourth user on the mobile application on a fourth mobile device.

In some embodiments, the code is further configured to automatically associate, with a second audio conversation, a descriptive operator associated with at least one of the first user or the second user, when the first user or the second user do not input a second descriptive operator to associate with the second audio conversation.

In some embodiments, the code is further configured to create, based on a search parameter, a descriptive operator and store the descriptive parameter in a database, in response to the search parameter not substantially matching descriptive operators in the database.

In some embodiments, a method is provided for initiating and streaming audio conversations, and transmitting information associated with descriptive operators, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first mobile device of the first user and the second mobile device of the second user, wherein a descriptive operator is associated with the audio conversation; initiating, using the one or more computing device processors, the audio conversation between the first user and the second user; streaming, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user; determine a descriptive operator associated with the audio conversation; transmitting, using the one or more computing device processors, to the third mobile device for visual display, during the audio conversation, on the user interface of the mobile application on the third mobile device, a second visual representation of the second user; transmitting, using the one or more computing device processors, to the third mobile device for visual display, during the audio conversation, on the user interface of the mobile application on the third mobile device, the descriptive operator associated with the audio conversation; and transmitting, using the one or more computing device processors, to the third mobile device for visual display on a second user interface, different from the user interface, of the mobile application on the third mobile device, information associated with the descriptive operator associated with the audio conversation. In some embodiments, the descriptive operator may be a selectable descriptive operator. In other embodiments, the descriptive operator may be a non-selectable descriptive operator.

In some embodiments, the information associated with the descriptive operator comprises one or more live, recorded, or upcoming audio conversations.

In some embodiments, the information associated with the descriptive operator comprises one or more speakers associated with one or more live, recorded, or upcoming audio conversations.

In some embodiments, the information associated with the descriptive operator comprises one or more listeners associated with one or more live, recorded, or upcoming audio conversations.

In some embodiments, the information comprises one or more users following the descriptive operator.

In some embodiments, the information comprises an option to share the descriptive operator with a fourth user on the mobile application or on a social network or a second mobile application different from the mobile application.

In some embodiments, the transmitting the information associated with the descriptive operator associated with the audio conversation is performed in response to receiving a selection of the descriptive operator from the user interface of the mobile application.

In some embodiments, the transmitting the information associated with the descriptive operator associated with the audio conversation is performed in response to receiving a selection of the descriptive operator from a user interface displaying a user profile on the mobile application.

In some embodiments, the user profile is associated with a fourth user associated with the descriptive operator.

In some embodiments, an association of the fourth user with the descriptive operator is established based on at least one of a speaking history, a listening history, or a searching history of the user.

In some embodiments, the method further comprises: receiving, from the third mobile device, a search parameter on a third user interface of the mobile application on the third mobile device; searching, based on the search parameter, at least one database; and performing the transmitting the information associated with the descriptive operator associated with the audio conversation in response to the searching the at least one database.

In some embodiments, the search parameter comprises a portion of the descriptive operator.

In some embodiments, the descriptive operator comprises a hash operator or a non-hash operator comprised in the descriptive operator.

In some embodiments, the descriptive operator is part of a descriptive operator hierarchy or tree-like structure and associated with at least one descriptive operator in the descriptive operator indicator hierarchy or tree-like structure.

In some embodiments, an apparatus is provided for initiating and streaming audio conversations, and transmitting information associated with descriptive operators, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; initiate an audio conversation between the first mobile device of the first user and the second mobile device of the second user, wherein a descriptive operator is associated with the audio conversation; initiate the audio conversation between the first user and the second user; stream the audio conversation to a third user who accesses the mobile application on a third mobile device of the third user; determine a descriptive operator associated with the audio conversation; transmit, to the third mobile device for visual display, during the audio conversation, on a user interface of the mobile application on the third mobile device, a first visual representation of the first user; transmit to the third mobile device for visual display, during the audio conversation, on the user interface of the mobile application on the third mobile device, a second visual representation of the second user; determine a descriptive operator associated with the audio conversation; transmit to the third mobile device for visual display, during the audio conversation, on the user interface of the mobile application on the third mobile device, the descriptive operator associated with the audio conversation; and transmit, to the third mobile device for visual display on a second user interface, different from the user interface, of the mobile application on the third mobile device, information associated with the descriptive operator associated with the audio conversation.

In some embodiments, the apparatus comprises at least one of an application server, the first mobile device, the second mobile device, or the third mobile device.

In some embodiments, the code is further configured to select the first user and the second user for participating in an audio conversation based on at least partially matching first user information associated with the first user and second user information associated with the second user.

In some embodiments, the second user interface periodically or dynamically aggregates the information associated with the descriptive operator.

In some embodiments, the method further comprises organizing or segmenting at least one of users or audio conversations associated with the mobile application based on at least one descriptive operator associated with the at least one of the user or the audio conversations.

In some embodiments, a method is provided for initiating and streaming audio conversations, and transmitting information associated with selectable descriptive operators, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first mobile device of the first user and the second mobile device of the second user, wherein a descriptive operator is associated with at least one of the audio conversation, the first user, or the second user; initiating, using the one or more computing device processors, the audio conversation between the first user and the second user; streaming, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user; transmitting, using the one or more computing device processors, to the third mobile device for visual display, during the audio conversation, on the user interface of the mobile application on the third mobile device, a second visual representation of the second user; determining, using the one or more computing device processors, a selectable descriptive operator associated with the audio conversation; transmitting, using the one or more computing device processors, to the third mobile device for visual display, during the audio conversation, on the user interface of the mobile application on the third mobile device, the selectable descriptive operator associated with the audio conversation; and transmitting, using the one or more computing device processors, to the third mobile device for visual display on a second user interface, different from the user interface, of the mobile application on the third mobile device, information associated with the descriptive operator associated with the at least one of the audio conversation, the first user, or the second user.

In some embodiments, a method is provided for initiating and streaming audio conversations, and matching users based on descriptive operators, the method comprising: determining, using one or more computing device processors, a first user accesses a mobile application on a first mobile device of the first user, wherein the first user is associated with a first descriptive operator; determining, using the one or more computing device processors, a second user accesses the mobile application on a second mobile device of the second user; determining, using the one or more computing device processors, that the first user wants to establish an audio conversation; in response to determining the first user wants to establish an audio conversation, selecting, using the one or more computing device processors, based on the first descriptive operator, the second user; initiating, using the one or more computing device processors, an audio conversation between the first mobile device of the first user and the second mobile device of the second user; initiating, using the one or more computing device processors, the audio conversation between the first user and the second user; streaming, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user, a first visual representation of the first user not comprising a first photographic or video image of the first user; transmitting, using the one or more computing device processors, to the third mobile device for visual display, during the audio conversation, on the user interface of the mobile application on the third mobile device, a second visual representation of the second user, a second visual representation of the second user not comprising a second photographic or video image of the second user.

In some embodiments, the first user is associated with the first descriptive operator based on the first descriptive operator being selected by or input by the first user.

In some embodiments, the first user is associated with the first descriptive operator based on the first descriptive operator being selected by or input by the first user at least one of when registering with the mobile application, when logging into the mobile application, when prompted by the mobile application.

In some embodiments, the first user is associated with the first descriptive operator based on at least one of speaking, listening, or searching history of the first user on the mobile application.

In some embodiments, the second user is associated with a second descriptive operator.

In some embodiments, the second user is selected based on the second descriptive operator substantially matching the first descriptive operator.

In some embodiments, the second user is selected based on the second descriptive operator being related to the first descriptive operator.

In some embodiments, the method further comprises associating the first descriptive operator with the second user.

In some embodiments, the method further comprises associating the first descriptive operator with the audio conversation.

In some embodiments, the method further comprises selecting the second user based on at least one of matching at least one of a first listening, speaking, or searching history of the first user on the mobile application with at least one of a second listening, speaking, or searching history of the second user on the mobile application.

In some embodiments, the method further comprises prompting, based on the first descriptive operator, the first user to speak with or schedule a second audio conversation with a third user.

In some embodiments, the first descriptive operator comprises a first hashtag.

In some embodiments, the method further comprises transmitting, to the first mobile device of the first user, one or more descriptive operators for the first user to follow on the mobile application.

In some embodiments, the one or more descriptive operators are determined based on at least one of a speaking, listening, or searching history of the first user on the mobile application.

In some embodiments, the one or more descriptive operators are determined using an artificial intelligence ("AI") or big data operation.

In some embodiments, the method further comprises learning, during a period, at least one topic that the first user is interested in and transmitting, to the first user, and based on the learning, one or more speakers to talk to or schedule an audio conversation, or one or more descriptive operators or users to follow.

In some embodiments, an apparatus is provided for initiating and streaming audio conversations, and matching users based on descriptive operators, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; determine that the first user wants to establish an audio conversation; in response to determining the first user wants to establish an audio conversation, select, based on the first descriptive operator, the second user; initiate an audio conversation between the first mobile device of the first user and the second mobile device of the second user; initiate the audio conversation between the first user and the second user; stream the audio conversation to a third user who accesses the mobile application on a third mobile device of the third user; transmit, to the third mobile device for visual display, during the audio conversation, on a user interface of the mobile application on the third mobile device, a first visual representation of the first user; transmit, to the third mobile device for visual display, during the audio conversation, on the user interface of the mobile application on the third mobile device, a second visual representation of the second user.

In some embodiments, the apparatus comprises at least one of an application server, the first mobile device, the second mobile device, or the third mobile device.

In some embodiments, the code is further configured to select the first user and the second user for participating in an audio conversation based on at least partially matching first user information associated with the first user and second user information associated with the second user.

In some embodiments, the first descriptive operator comprises a selectable descriptive operator on the mobile application.

In some embodiments, the second user is part of a speaker feed.

In some embodiments, the code is further configured to provide a speaker feed to the first user, wherein the second user is part of the speaker feed.

In some embodiments, the first user can swipe through speakers comprised in the speaker feed.

In some embodiments, a position of the second user in the speaker feed is based on the first descriptive operator.

In some embodiments, a position of the second user in the speaker feed is based on matching, using at least one of the first descriptive operator, first user information associated with the first user, or second user information associated with the second user.

As used herein, a descriptive operator, a descriptive indicator, and a descriptor may refer to the same element. In some embodiments, this element may include a # symbol, a $ symbol, or any other symbol.

In some embodiments, a method is provided for streaming audio conversations, and matching users with audio conversations or speakers, based on descriptive operators, the method comprising: determining, using one or more computing device processors, a first user accesses a mobile application on a first mobile device of the first user, wherein the first user is associated with a first descriptive operator; determining, using the one or more computing device processors, that the first user wants to listen to an audio conversation; in response to determining the first user wants to listen to an audio conversation, selecting, using the one or more computing device processors, based on the first descriptive operator, an audio conversation involving a first speaker and a second speaker; streaming, using the one or more computing device processors, the audio conversation to the first mobile device of the first user; transmitting, using the one or more computing device processors, to the first mobile device for visual display, during the audio conversation, on a user interface of the mobile application on the first mobile device, a first visual representation of the first speaker, a first visual representation of the first speaker not comprising a first photographic or video image of the first speaker; and transmitting, using the one or more computing device processors, to the first mobile device for visual display, during the audio conversation, on the user interface of the mobile application on the first mobile device, a second visual representation of the second speaker, a second visual representation of the second speaker not comprising a second photographic or video image of the second speaker.

In some embodiments, the first user is associated with the first descriptive operator based on the first descriptive operator being selected by or input by the first user.

In some embodiments, the first user is associated with the first descriptive operator based on the first descriptive operator being selected by or input by the first user at least one of when registering with the mobile application, when logging into the mobile application, when prompted by the mobile application.

In some embodiments, the first user is associated with the first descriptive operator based on at least one of speaking, listening, or searching history of the first user on the mobile application.

In some embodiments, the first speaker or the audio conversation is associated with a second descriptive operator.

In some embodiments, the first speaker or the audio conversation is selected based on the second descriptive operator substantially matching the first descriptive operator.

In some embodiments, the first speaker or the audio conversation is selected based on the second descriptive operator being related to the first descriptive operator.

In some embodiments, the method further comprises associating the first descriptive operator with at least one of the first speaker or the second speaker.

In some embodiments, the method further comprises associating the first descriptive operator with the audio conversation.

In some embodiments, the method further comprises selecting the audio conversation based on at least one of matching at least one of a first listening, speaking, or searching history of the first user on the mobile application with at least one of a second listening, speaking, or searching history of the first speaker on the mobile application.

In some embodiments, the first descriptive operator comprises a first hashtag.

In some embodiments, the method further comprises transmitting, to the first mobile device of the first user, one or more descriptive indicators for the first user to follow on the mobile application.

In some embodiments, the one or more descriptive operators are determined based on at least one of a speaking, listening, or searching history of the first user on the mobile application.

In some embodiments, the one or more descriptive operators are determined using an artificial intelligence or big data operation.

In some embodiments, the method further comprises learning, during a period, at least one topic that the first user is interested in and transmitting, to the first user, and based on the learning, one or more speakers to listen to, one or more audio conversations for the user to listen to, or one or more descriptive indicators or users to follow.

In some embodiments, the audio conversation is selected based on partially matching, based on the descriptive operator, the first user and the first speaker.

In some embodiments, the audio conversation comprises either at least one of a live audio conversation, a recorded audio conversation, or an upcoming audio conversation.

In some embodiments, an apparatus is provided for streaming audio conversations, and matching users with audio conversations or speakers, the apparatus comprising: one or more computing device processors; one or more memory systems comprising code, executable by the one or more computing device processors, and configured to: determine a first user accesses a mobile application on a first mobile device of the first user, wherein the first user is associated with a first descriptive operator; determine that the first user wants to listen to an audio conversation; in response to determining the first user wants to listen to an audio conversation, select, based on the first descriptive operator, an audio conversation involving a first speaker and a second speaker; stream, using the one or more computing device processors, the audio conversation to the first mobile device of the first user; transmit, using the one or more computing device processors, to the first mobile device for visual display, during the audio conversation, on a user interface of the mobile application on the first mobile device, a first visual representation of the first speaker; transmit, using the one or more computing device processors, to the first mobile device for visual display, during the audio conversation, on the user interface of the mobile application on the first mobile device, a second visual representation of the second speaker.

In some embodiments, the apparatus comprises at least one of an application server, the first mobile device, the second mobile device, or the third mobile device.

In some embodiments, the first descriptive operator comprises a selectable descriptive operator on the mobile application.

In some embodiments, the audio conversation is part of an audio conversation feed.

In some embodiments, the code is further configured to provide an audio conversation feed to the first user, wherein the audio conversation is part of the audio conversation feed.

In some embodiments, the first user can swipe through audio conversations comprised in the audio conversation feed.

In some embodiments, a position of the audio conversation in the audio conversation feed is based on the first descriptive operator.

In some embodiments, a position of the audio conversation in the audio conversation feed is based on matching, using at least one of the first descriptive operator, first user information associated with the first user, and second user information associated with the first speaker or the second speaker.

In some embodiments, a method is provided for streaming or transmitting audio conversation clips. The method comprises: determining, using one or more computing device processors, a first user accesses a mobile application using a first mobile device of the first user; determining, using the one or more computing device processors, a second user accesses the mobile application using a second mobile device of the second user; receiving, using the one or more computing device processors, from the first mobile device of the first user, audio conversation information associated with an audio conversation thread or board; receiving, using the one or more computing device processors, at a first time, from the first mobile device of the first user, a first audio clip; adding, using the one or more computing device processors, the first audio clip to the audio conversation thread or board; receiving, using the one or more computing device processors, at a second time, from the second mobile device of the second user, a second audio clip; adding, using the one or more computing device processors, the second audio clip to the audio conversation thread or board; determining, using the one or more computing device processors, a third user accesses the mobile application using a third mobile device of the third user; transmitting, using the one or more computing device processors, to the third mobile device of the third user, available audio conversation information for one or more audio conversation threads or boards available to the third mobile device, wherein the one or more audio conversation threads or boards comprises the audio conversation thread or board; receiving, using the one or more computing device processors, from the third mobile device of the third user, a selection of the audio conversation thread or board; receiving, using the one or more computing device processors, from the third mobile device of the third user, a selection of the first audio conversation clip; streaming or transmitting, using the one or more computing device processors, the first audio conversation clip to the third mobile device of the third user; transmitting, using the one or more computing device processors, to the third mobile device for visual display, on a first user interface of the mobile application, a first visual representation of the first user not comprising a first video of the first user, such that the first visual representation is displayed during playing of the first audio conversation clip on the third mobile device of the third user; receiving, using the one or more computing device processors, from the third mobile device of the third user, a selection of the second audio conversation clip; streaming or transmitting, using the one or more computing device processors, the second audio conversation clip to the third mobile device of the third user; transmitting, using the one or more computing device processors, to the third mobile device for visual display, on the first user interface of the mobile application, a second visual representation of the second user not comprising a second video of the second user, such that the first visual representation is displayed during playing of the second audio conversation clip on the third mobile device of the third user; and transmitting, using the one or more computing device processors, to the third mobile device for visual display, on the first user interface of the mobile application, the audio conversation information associated with the audio conversation thread or board, such that the audio conversation information is displayed during playing of the first audio conversation clip on the third mobile device of the third user.

In some embodiments, another method is provided for streaming or transmitting audio conversation clips. The method comprises: determining, using one or more computing device processors, a first user accesses a mobile application using a first mobile device of the first user; determining, using the one or more computing device processors, a second user accesses the mobile application using a second mobile device of the second user; receiving, using the one or more computing device processors, from the first mobile device of the first user, audio conversation information associated with an audio conversation thread or board; receiving, using the one or more computing device processors, at a first time, from the first mobile device of the first user, a first audio clip; adding, using the one or more computing device processors, the first audio clip to the audio conversation thread or board; receiving, using the one or more computing device processors, at a second time, from the second mobile device of the second user, a second audio clip; adding, using the one or more computing device processors, the second audio clip to the audio conversation thread or board; determining, using the one or more computing device processors, a third user accesses the mobile application using a third mobile device of the third user; transmitting, using the one or more computing device processors, to the third mobile device of the third user, available audio conversation information for one or more audio conversation threads or boards available to the third mobile device, wherein the one or more audio conversation threads or boards comprises the audio conversation thread or board; receiving, using the one or more computing device processors, from the third mobile device of the third user, a selection of the audio conversation thread or board; receiving, using the one or more computing device processors, from the third mobile device of the third user, a selection of the first audio conversation clip; streaming or transmitting, using the one or more computing device processors, the first audio conversation clip to the third mobile device of the third user; transmitting, using the one or more computing device processors, to the third mobile device for visual display, on a first user interface of the mobile application, a first visual representation of the first user not comprising a first live video of the first user, such that the first visual representation is displayed during playing of the first audio conversation clip on the third mobile device of the third user; receiving, using the one or more computing device processors, from the third mobile device of the third user, a selection of the second audio conversation clip; streaming or transmitting, using the one or more computing device processors, the second audio conversation clip to the third mobile device of the third user; transmitting, using the one or more computing device processors, to the third mobile device for visual display, on the first user interface of the mobile application, a second visual representation of the second user not comprising a second video of the second user, such that the first visual representation is displayed during playing of the second audio conversation clip on the third mobile device of the third user; and transmitting, using the one or more computing device processors, to the third mobile device for visual display, on the first user interface of the mobile application, the audio conversation information associated with the audio conversation thread or board, such that the audio conversation information is displayed during playing of the first audio conversation clip on the third mobile device of the third user.

In some embodiments, an apparatus is provided for streaming or transmitting audio communication clips. The apparatus comprises one or more computing device processors; one or more memory systems comprising code, executable by the one or more computing device processors, and configured to: determine a first user accesses a mobile application using a first mobile device of the first user; receive, from the first mobile device of the first user, a first audio communication clip; receive, from the first mobile device of the first user, audio communication information associated with the first audio communication clip; add the first audio communication clip to a first user profile of the first user or to a first audio communication thread or board; determine a second user accesses the mobile application using a second mobile device of the second user; in response to determining the second user accesses the mobile application using the second mobile device of the second user, transmit the audio communication information associated with the first audio communication clip for display on a first user interface on the second mobile device, of the second user, using the mobile application; in response to receiving a first selection of the first audio communication clip from the second mobile device, stream the first audio communication clip to the second mobile device, of the second user, using the mobile application; determine a third user accesses the mobile application using a third mobile device of the second user; in response to determining the third user accesses the mobile application using the third mobile device of the third user, transmit the audio communication information associated with the first audio communication clip for display on a second user interface on the third mobile device, of the third user, using the mobile application; in response to receiving a second selection of the first audio communication clip from the third mobile device, stream the first audio communication clip to the third mobile device, of the third user, using the mobile application; transmit, to the second mobile device for visual display, during the streaming of the first audio communication clip on the second mobile device, on the first user interface on the second mobile device, a first visual representation of the first user not comprising a first live video of the first user; and transmit, to the third mobile device for visual display, during the streaming of the first audio communication clip on the third mobile device, on the second user interface on the third mobile device, the first visual representation of the first user not comprising the first video of the first user.

In some embodiments, the apparatus comprises or is comprised in at least one of an application server, the first mobile device, the second mobile device, the third mobile device, or the fourth mobile device.

In some embodiments, a method comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; transmitting, using the one or more computing device processors, at least a first portion of the first user profile to the second user such that the at least the first portion of the first user profile is displayable on the second mobile device of the second user; receiving, using the one or more computing device processors, from the first mobile device of the first user, a first content comprising first audio; adding, using the one or more computing device processors, the first content comprising the first audio to an content list associated with the second user; transmitting, using the one or more computing device processors, a notification of the first content comprising the first audio, or the content list, to the second user; streaming or transmitting, using the one or more computing device processors, the first content comprising the first audio to the second mobile device of the second user; transmitting, using the one or more computing device processors, to the second mobile device for visual display, on a first user interface of the mobile application, a first visual representation not comprising a first video of the first user, such that the first visual representation is displayable on the second mobile device during or prior to transmitting of the first content comprising the first audio to the second mobile device of the second user; before, during, or after transmitting of the first content comprising the first audio to the second mobile device of the second user, enabling, using the one or more computing device processors, the second user to execute a first action associated with the first user profile or associated with the first content comprising the first audio; transmitting, using the one or more computing device processors, to the first mobile device for visual display, on a second user interface of the mobile application, a second visual representation not comprising a second video of the second user, such that the second visual representation is displayable on the first mobile device prior to transmitting of the first content comprising the first audio to the second mobile device of the second user; and before, during, or after transmitting of the first content comprising the first audio to the second mobile device of the second user, enabling, using the one or more computing device processors, the first user to execute a second action associated with the second user profile.

In some embodiments, the method further comprises enabling the first user to create or record the first content comprising the first audio on the first mobile device of the first user: in response to a selection, by the first user on the first mobile device, of a first prompt associated with the second user profile; or in response to a third action, executed by the first user, using the first mobile device, associated with the second user profile.

In some embodiments, at least one of an audio prompt or a text-based prompt; wherein the first prompt is displayed on the second user profile in response to a fourth action executed by the first user, using the first mobile device, associated with the second user profile; or wherein the first content comprising the first audio comprises at least two audio messages associated with at least two prompts associated with the second user profile.

In some embodiments, at least one of: wherein the first visual representation or the second visual representation comprises text only; wherein the first visual representation or the second visual representation comprises a blurred or altered image, or a blurred or altered visual representation; or wherein the first user accesses the mobile application on the first mobile device of the first user at a first time, and wherein the second user accesses the mobile application on the second mobile device of the second user at a second time different from the first time.

In some embodiments, at least one of: wherein the first user profile comprises the first visual representation; or wherein the second user profile comprises the second visual representation.

In some embodiments, at least one of: wherein the first content comprising the first audio is less than or equal to a first duration; wherein the first content comprising the first audio is not broadcasted to a third user accessing the mobile application on a third mobile device; wherein the first user profile comprises a first interactable or selectable prompt; or wherein the second user profile comprises a second interactable or selectable prompt.

In some embodiments, the method further comprises enabling the second user to interact, using the second mobile device of the second user, with the first content comprising the first audio, or with the first user profile; or enabling the first user to interact, using the first mobile device of the first user, with the second user profile.

In some embodiments, wherein the first action or the second action: activates a first option for the first user to initiate first interaction with the second user; activates at least partially removing alteration of first profile content associated with the first user profile (e.g., when the first user sends a first message (e.g., text, audio, video, etc.) to the second user and/or when the second user initiates an action with regard to the first message or the first user profile, the first profile content (e.g., photo) is altered to a certain number of pixels (e.g., 4 pixels); and when the first user sends a second message (e.g., text, audio, video, etc.) to the second user, and/or when the second user initiates an action with regard to the first message or the first user profile, the first profile content (e.g., photo) is altered to a larger number of pixels (e.g., 16 pixels), such that each subsequent message increases the number of pixels used to display the first profile content (e.g., until the maximum number of pixels are reached)); activates visual display of first additional profile content associated with the first user profile; activates a second option for the second user to initiate second interaction with the first user; activates at least partially removing alteration of second profile content associated with the second user profile; or activates visual display of second additional profile content associated with the second user profile, wherein the first interaction or the second interaction comprises at least one of a live audio conversation, a live video conversation, an audio message, or a visual message.

In some embodiments, at least one of: wherein the first profile content or the first additional profile content comprises the first visual representation; or wherein the second profile content or the second additional profile content comprises the second visual representation.

In some embodiments, the method further comprises matching the first user and the second user based on at least one of a first preference or first setting established by the first user or a second preference or second setting established by the second user.

In some embodiments, wherein the second user profile is comprised in a stack or list of users presented to the first user on the first mobile device, and wherein at least a third portion of the second user profile or of the second visual representation is visually altered or is not visible to the first user.

In some embodiments, the method further comprises in response to the first action, transmitting, to the second user, for visual display on the second mobile device of the second user: a stack or list of users associated with at least one content recorded for, or transmitted for or to the second user; or a third user associated with a second audio.

In some embodiments, the method further comprises at least one of: enabling the second user to download or export the first content comprising the first audio to the second mobile device or a second mobile application different from the mobile application; preparing a visual transcription of the first content comprising the first audio; analyzing the first content comprising the first audio for objectionable audio content; enabling the second user to select an option to receive the first content comprising the first audio or a second audio; enabling the second user to transmit a first content comprising a first audio or video message or a first visual message to the first user; or enabling the first user to transmit a second content comprising a second audio or video message or a second visual message to the second user.

In some embodiments, at least one of: wherein the mobile application comprises one or more instances of the mobile application; wherein the first visual representation comprises at least one of an avatar, an emoji, a symbol, a persona, an animation, a cartoon, an indicia, an illustration, a histogram, a graph, a first image uploaded or captured by the first user, a moving avatar, a moving emoji, a moving symbol, a moving persona, a moving cartoon, moving indicia, or a moving illustration; wherein the first video of the first user comprises a first live video of the first user; or wherein the second video of the second user comprises a second live video of the second user.

In some embodiments, wherein the first content comprising the first audio continues to stream or transmit to the second mobile device such that the first content comprising the first audio is played or executed when a second user interface of a second mobile application, or a home screen of the second mobile device, is displayed on the second mobile device.

In some embodiments, transmitting, using the one or more computing device processors, at least a second portion of the second user profile to the first user such that the at least the second portion of the second user profile is displayable on the first mobile device of the first user, wherein the at least the second portion of the second user profile is altered.

In some embodiments, wherein the first content comprises at least one of a second video or a first visual message.

In some embodiments, the method further comprises enabling the second user to view the first visual representation before playing or executing the first content comprising the first audio.

In some embodiments, the method further comprises enabling the second user to view a third visual representation associated with a second content comprising a second audio.

In some embodiments, an apparatus is provided for streaming or transmitting audio. The apparatus comprises one or more computing device processors; and one or more memory systems comprising code, executable by the one or more computing device processors, and configured to: determine a first user accesses a mobile application using a first mobile device of the first user; enable the first user to create or modify a first user profile using the first mobile device of the first user; determine a second user accesses the mobile application using a second mobile device of the second user; enable the second user to create or modify a second user profile using the second mobile device of the second user; transmit at least a first portion of the first user profile to the second user such that the at least the first portion of the first user profile is displayable on the second mobile device of the second user; receive, from the first mobile device of the first user, a first content comprising the first audio; add the first content comprising the first audio to a content list associated with the second user; transmit a notification of the first content comprising the first audio, or the content list, to the second user; in response to selection of the first content comprising the first audio by the second user on the second mobile device, stream or transmit the first content comprising the first audio to the second mobile device of the second user; transmit, to the second mobile device for visual display, on a first user interface of the mobile application, a first visual representation not comprising a first video of the first user, such that the first visual representation is displayable on the second mobile device during or prior to transmitting of the first content comprising the first audio to the second mobile device of the second user; before, during, or after transmitting of the first content comprising the first audio to the second mobile device of the second user, enable the second user to execute a first action associated with the first user profile or associated with the first content comprising the first audio; transmit, to the first mobile device for visual display, on a second user interface of the mobile application, a second visual representation not comprising a second video of the second user, such that the second visual representation is displayable on the first mobile device prior to transmitting of the first content comprising the first audio to the second mobile device of the second user; and before, during, or after transmitting of the first content comprising the first audio to the second mobile device of the second user, enable the first user to execute a second action associated with the second user profile.

In some embodiments, wherein the apparatus comprises or is comprised in at least one of an application server, the first mobile device, or the second mobile device.

In some embodiments, a method is provided for initiating audio conversations. The method comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; matching, using the one or more computing device processors, the first user and the second user based on a first preference or first setting established by the first user or a second preference or second setting established by the second user; enabling, facilitating, or initiating, using the one or more computing device processors, a communication between the first user using the first mobile device and the second user using the second mobile device; transmitting, using the one or more computing device processors, to the second mobile device of the second user for visual display, on a first user interface of the mobile application, a first visual representation not comprising a first video of the first user, such that the first visual representation is displayable on the second mobile device during the communication; transmitting, using the one or more computing device processors, to the first mobile device of the first user for visual display, on a second user interface of the mobile application, a second visual representation not comprising a second video of the second user, such that the second visual representation is displayable on the first mobile device during the communication; during or after the communication, enabling, using the one or more computing device processors, the second user, using the second mobile device, to execute a first action associated with the first user; during or after the communication, enabling, using the one or more computing device processors, the first user, using the first mobile device, to execute a second action associated with the second user; transmitting, using the one or more computing device processors, to the second mobile device of the second user for visual display, on the first user interface of the mobile application or on a third user interface of the mobile application, a third visual representation not comprising the first video of the first user, such that the third visual representation is displayable on the second mobile device after execution of the first action associated with the first user; transmitting, using the one or more computing device processors, to the first mobile device of the first user for visual display, on the second user interface of the mobile application or on a fourth user interface of the mobile application, a fourth visual representation not comprising the second video of the second user, such that the fourth visual representation is displayable on the first mobile device after execution of the second action associated with the second user; transmitting, using the one or more computing device processors, to a third mobile device of a third user for visual display, on a fifth user interface of the mobile application, the second visual representation not comprising the second video of the second user, or the fourth visual representation not comprising the second video of the second user, such that the second visual representation, or the fourth visual representation, is displayable on the third mobile device during or after the communication, wherein the communication is not transmitted to the third mobile device; and transmitting, using the one or more computing device processors, to a fourth mobile device of a fourth user for visual display, on a sixth user interface of the mobile application, the first visual representation not comprising the first video of the first user, or the third visual representation not comprising the first video of the first user, such that the first visual representation, or the third visual representation, is displayable on the fourth mobile device during or after the communication, wherein the communication is not transmitted to the fourth mobile device.

In some embodiments, at least one of: wherein the first visual representation or the second visual representation comprises a blurred or altered image, or a blurred or altered visual representation; wherein the first user profile comprises at least one of the first visual representation or the third visual representation; wherein the second user profile comprises at least one of the second visual representation or the fourth visual representation; or wherein the communication automatically stops after a first period.

In some embodiments, wherein the first action or the second action: activates a first option for the first user to initiate first interaction with the second user; activates at least partially removing alteration of first profile content associated with the first user profile; activates visual display of first additional profile content associated with the first user profile; activates a second option for the second user to initiate second interaction with the first user; activates at least partially removing alteration of second profile content associated with the second user profile; or activates visual display of second additional profile content associated with the second user profile.

In some embodiments, wherein the communication comprises at least one visual communication, an audio communication, or a video communication.

In some embodiments, wherein the first visual representation is at least partially altered or blurred, and wherein the second visual representation is at least partially altered or blurred.

In some embodiments, wherein the first action comprises a first approval, by the second user, of the first user, and the second action comprises a second approval, by the first user, of the second user.

In some embodiments, the method further comprises in response to both execution of the first action and execution of the second action, the communication is saved and viewable by both the first user and the second user.

In some embodiments, wherein the third visual representation is not at least partially altered or not at least blurred, and wherein the fourth visual representation is not at least partially altered or not at least blurred.

In some embodiments, wherein the first action comprises a first disapproval, by the second user, of the first user, or the second action comprises a second disapproval, by the first user, of the second user, and wherein the communication is not saved for both the first user and the second user in response to: the first action or the second action.

In one embodiment, an exemplary method for streaming audio content comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; transmitting, using the one or more computing device processors, at least a first portion of the first user profile to the second user such that the at least the first portion of the first user profile is displayable on the second mobile device of the second user; receiving, using the one or more computing device processors, from the first mobile device of the first user, a first content comprising first audio, wherein the first content is associated with a first prompt; streaming or transmitting, using the one or more computing device processors, the first content comprising the first audio to the second mobile device of the second user; transmitting, using the one or more computing device processors, to the second mobile device for visual display, on a first user interface of the mobile application, a first visual representation not comprising a first video of the first user, such that the first visual representation is displayable on the second mobile device during or prior to transmitting of the first content comprising the first audio to the second mobile device of the second user; before, during, or after transmitting of the first content comprising the first audio to the second mobile device of the second user, enabling, using the one or more computing device processors, the second user to execute a first action associated with the first user profile or associated with the first content; transmitting, using the one or more computing device processors, a first notification associated with the first action associated with the first user profile or associated with the first content, to the first mobile device of the first user; transmitting, using the one or more computing device processors, to the first mobile device for visual display, on a second user interface of the mobile application, a second visual representation not comprising a second video of the second user, such that the second visual representation is displayable on the first mobile device during or prior to transmitting of the first notification associated with the first action associated with the first user profile or associated with the first content, to the first mobile device of the first user; before, during, or after transmitting of the first content comprising the first audio to the second mobile device of the second user, enabling, using the one or more computing device processors, the first user to execute a second action associated with the second user profile; determining, using the one or more computing device processors, a third user accesses the mobile application using a third mobile device of the third user; enabling, using the one or more computing device processors, the third user to create or modify a third user profile using the third mobile device of the third user; receiving, using the one or more computing device processors, from the third mobile device of the third user, a second content comprising second audio, wherein the second content is associated with the first prompt; receiving, using the one or more computing device processors, from the second mobile device of the second user, a first transitional interaction associated with the first user interface of the mobile application; transmitting, using the one or more computing device processors, after the first transitional interaction associated with the first user interface of the mobile application, at least a second portion of the third user profile to the second user such that the at least the second portion of the third user profile is displayable on the second mobile device of the second user; streaming or transmitting, using the one or more computing device processors, after the first transitional interaction associated with the first user interface of the mobile application, the second content comprising the second audio to the second mobile device of the second user; and transmitting, using the one or more computing device processors, after the first transitional interaction associated with the first user interface of the mobile application, to the second mobile device for visual display, on the first user interface of the mobile application, a third visual representation not comprising a third video of the third user, such that the third visual representation is displayable on the second mobile device during or prior to transmitting of the second content comprising the second audio to the second mobile device of the second user.

According to one embodiment, the method further comprises: determining, using the one or more computing device processors, a fourth user accesses the mobile application using a fourth mobile device of the fourth user; enabling, using the one or more computing device processors, the fourth user to create or modify a fourth user profile using the fourth mobile device of the fourth user; receiving, using the one or more computing device processors, from the fourth mobile device of the fourth user, a third content comprising third audio, wherein the third content is associated with a second prompt; receiving, using the one or more computing device processors, from the second mobile device of the second user, a second transitional interaction associated with the first user interface of the mobile application; transmitting, using the one or more computing device processors, after the second transitional interaction associated with the first user interface of the mobile application, at least a third portion of the fourth user profile to the second user such that the at least the third portion of the fourth user profile is displayable on the second mobile device of the second user; streaming or transmitting, using the one or more computing device processors, after the second transitional interaction associated with the first user interface of the mobile application, the third content comprising the third audio to the second mobile device of the second user; and transmitting, using the one or more computing device processors, after the second transitional interaction associated with the first user interface of the mobile application, to the second mobile device for visual display, on the first user interface of the mobile application, a fourth visual representation not comprising a fourth video of the fourth user, such that the fourth visual representation is displayable on the second mobile device during or prior to transmitting of the third content comprising the third audio to the second mobile device of the second user.

Furthermore, in another embodiment, the first transitional interaction comprises an at least partially horizontal swipe or a first selection, and the second transitional interaction comprises an at least partially vertical swipe or a second selection.

In some cases, the method at least one of: the first content comprising the first audio further comprises at least one of: a fourth video or first text, the first action associated with the first user profile or associated with the first content comprises or is based on at least one of: a third audio, a fifth video, or second text, the second content associated with the second audio further comprises at least one of: a sixth video or third text, or the second action associated with the second user profile comprises or is based on at least one of: a fourth audio, a seventh video, or fourth text.

According to some embodiments, the first user interface displays the first content before the first transitional interaction, and the first user interface displays the second content after the first transitional interaction.

In one embodiment, the first user interface displays the first content or the second content before the second transitional interaction, and the first user interface displays the third content after the second transitional interaction.

According to some embodiments, the method further comprises: before, during or after enabling the first user to execute the second action associated with the second user profile, generating, using the one or more computing device processors, a first communication channel for the first user to interact with the second user and for the second user to interact with the first user, wherein the first user transmits a first interaction to the second user in the first communication channel, and wherein the second user transmits a second interaction to the first user in the first communication channel; determining, using the one or more computing device processors, a fourth user accesses the mobile application using a fourth mobile device of the fourth user; enabling, using the one or more computing device processors, the fourth user to create or modify a fourth user profile using the fourth mobile device of the fourth user; receiving, using the one or more computing device processors, a first request from the first user to generate a first group; generating, using the one or more computing device processors, based on the receiving the first request from the first user to generate the first group, the first group associated with the first user; receiving, using the one or more computing device processors, a second request from the first user to add the fourth user to the first group; transmitting, using the one or more computing device processors, the second request to the fourth user; after the transmitting the second request to the fourth user, enabling, using the one or more computing device processors, the fourth user to join the first group, thereby resulting in the fourth user joining the first group; enabling, using the one or more computing device processors, the fourth user to access the first communication channel, such that the fourth user cannot transmit a third interaction in the first communication channel, such that the first interaction and the second interaction are viewable to the third user, and such that the first visual representation not comprising the first video and the second visual representation not comprising the second video are viewable to the fourth user; and after enabling the fourth user to join the first group, generating, using the one or more computing device processors, a second communication channel for the first user to interact with the fourth user, wherein the first user transmits a fourth interaction to the fourth user in the second communication channel, wherein the fourth user transmits a fifth interaction to the first user in the second communication channel, and wherein the second user cannot access the second communication channel, such that the first visual representation not comprising the first video is viewable to the third user.

In one embodiment, the first group comprises at least three users.

In another embodiment, the method further comprises streaming or transmitting, using the one or more computing device processors, at least one of: the first content or the second content to a fourth user using a fourth mobile device.

In yet another embodiment, the method further comprises enabling, using the one or more computing device processors, at least one of: the first user using the first mobile device to send, receive, or view a first threshold number of contents during a first period, the second user using the second mobile device to send, receive, or view a second threshold number of contents during a second period, or the third user using the third mobile device to send, receive, or view a third threshold number of contents during a third period.

In still another embodiment, the method further comprises at least one of: enabling, using the one or more computing device processors, the first user using the first mobile device to send, receive, or view greater than the first threshold number of contents during the first period based on the first user executing a first computing operation for transmitting digital exchangeables from a first digital exchangeables account associated with the first user, enabling, using the one or more computing device processors, the second user using the second mobile device to send, receive, or view greater than the second threshold number of contents during the second period based on the second user executing a second computing operation for transmitting digital exchangeables from a second digital exchangeables account associated with the second user, or enabling, using the one or more computing device processors, the third user using the third mobile device to send, receive, or view greater than the third threshold number of contents during the third period based on the third user executing a third computing operation for transmitting digital exchangeables from a third digital exchangeables account associated with the third user.

In some embodiments, the one or more computing device processors are comprised in one or more computing systems, wherein the one or more computing systems are located in one or more locations.

According to some embodiments, an apparatus is provided for streaming audio content, the apparatus comprising: an apparatus comprising: one or more computing device processors; and one or more memory systems comprising code, executable by the one or more computing device processors, configured to: determine a first user accesses a mobile application using a first mobile device of the first user; enable the first user to create or modify a first user profile using the first mobile device of the first user; determine a second user accesses the mobile application using a second mobile device of the second user; enable the second user to create or modify a second user profile using the second mobile device of the second user; transmit at least a first portion of the first user profile to the second user such that the at least the first portion of the first user profile is displayable on the second mobile device of the second user; receive from the first mobile device of the first user, a first content comprising first audio, wherein the first content is associated with a first prompt; stream or transmit the first content comprising the first audio to the second mobile device of the second user; transmit to the second mobile device for visual display, on a first user interface of the mobile application, a first visual representation not comprising a first video of the first user, such that the first visual representation is displayable on the second mobile device during or prior to transmitting of the first content comprising the first audio to the second mobile device of the second user; before, during, or after the transmit the first content comprising the first audio to the second mobile device of the second user, enable the second user to execute a first action associated with the first user profile or associated with the first content; transmit a first notification associated with the first action associated with the first user profile or associated with the first content, to the first mobile device of the first user; transmit to the first mobile device for visual display, on a second user interface of the mobile application, a second visual representation not comprising a second video of the second user, such that the second visual representation is displayable on the first mobile device during or prior to transmitting of the first notification associated with the first action associated with the first user profile or associated with the first content, to the first mobile device of the first user; before, during, or after the transmit the first content comprising the first audio to the second mobile device of the second user, enable the first user to execute a second action associated with the second user profile; determine a third user accesses the mobile application using a third mobile device of the third user; enable the third user to create or modify a third user profile using the third mobile device of the third user; receive from the third mobile device of the third user, a second content comprising second audio, wherein the second content is associated with the first prompt; receive from the second mobile device of the second user, a transitional interaction associated with the first user interface of the mobile application; transmit, after the transitional interaction associated with the first user interface of the mobile application, at least a second portion of the third user profile to the second user such that the at least the second portion of the third user profile is displayable on the second mobile device of the second user; stream or transmit, after the transitional interaction associated with the first user interface of the mobile application, the second content comprising the second audio to the second mobile device of the second user; and transmit, after the transitional interaction associated with the first user interface of the mobile application, to the second mobile device for visual display, on the first user interface of the mobile application, a third visual representation not comprising a third video of the third user, such that the third visual representation is displayable on the second mobile device during or prior to transmitting of the second content comprising the second audio to the second mobile device of the second user.

In one embodiment, the apparatus comprises or is comprised in one or more computing systems associated with one or more locations.

In some embodiments, a method for streaming audio content comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; transmitting, using the one or more computing device processors, at least a first portion of the first user profile to the second user such that the at least the first portion of the first user profile is displayable on the second mobile device of the second user; receiving, using the one or more computing device processors, from the first mobile device of the first user, a first content comprising first audio, wherein the first content is associated with a first prompt; streaming or transmitting, using the one or more computing device processors, to the second mobile device of the second user, for display on a first user interface of the mobile application, the first content comprising the first audio; transmitting, using the one or more computing device processors, to the second mobile device, for visual display on the first user interface of the mobile application, a first visual representation not comprising a first video of the first user, such that the first visual representation is displayable on the second mobile device during or prior to transmitting of the first content comprising the first audio to the second mobile device of the second user; before, during, or after transmitting of the first content comprising the first audio to the second mobile device of the second user, enabling, using the one or more computing device processors, the second user to execute a first action associated with the first user profile or associated with the first content; transmitting, using the one or more computing device processors, a first notification associated with the first action associated with the first user profile or associated with the first content, to the first mobile device of the first user; transmitting, using the one or more computing device processors, to the first mobile device, for visual display on a second user interface of the mobile application, a second visual representation not comprising a second video of the second user, such that the second visual representation is displayable on the first mobile device during or prior to transmitting of the first notification associated with the first action associated with the first user profile or associated with the first content, to the first mobile device of the first user; before, during, or after transmitting of the first content comprising the first audio to the second mobile device of the second user, enabling, using the one or more computing device processors, the first user to execute a second action associated with the second user profile; determining, using the one or more computing device processors, a third user accesses the mobile application using a third mobile device of the third user; enabling, using the one or more computing device processors, the third user to create or modify a third user profile using the third mobile device of the third user; receiving, using the one or more computing device processors, from the third mobile device of the third user, a second content comprising second audio, wherein the second content is associated with the first prompt; receiving, using the one or more computing device processors, from the second mobile device of the second user, a first transitional interaction associated with the first user interface of the mobile application; transmitting, using the one or more computing device processors, after the first transitional interaction associated with the first user interface of the mobile application, at least a second portion of the third user profile to the second user such that the at least the second portion of the third user profile is displayable on the second mobile device of the second user; streaming or transmitting, using the one or more computing device processors, after the first transitional interaction associated with the first user interface of the mobile application, to the second mobile device of the second user, for display on the first user interface of the mobile application, the second content comprising the second audio; and transmitting, using the one or more computing device processors, after the first transitional interaction associated with the first user interface of the mobile application, to the second mobile device, for visual display on the first user interface of the mobile application, a third visual representation not comprising a third video of the third user, such that the third visual representation is displayable on the second mobile device during or prior to transmitting of the second content comprising the second audio to the second mobile device of the second user.

In another embodiment, the method further comprises: determining, using the one or more computing device processors, a fourth user accesses the mobile application using a fourth mobile device of the fourth user; enabling, using the one or more computing device processors, the fourth user to create or modify a fourth user profile using the fourth mobile device of the fourth user; receiving, using the one or more computing device processors, from the fourth mobile device of the fourth user, a third content comprising third audio, wherein the third content is associated with a second prompt; receiving, using the one or more computing device processors, from the second mobile device of the second user, a second transitional interaction associated with the first user interface of the mobile application; transmitting, using the one or more computing device processors, after the second transitional interaction associated with the first user interface of the mobile application, at least a third portion of the fourth user profile to the second user such that the at least the third portion of the fourth user profile is displayable on the second mobile device of the second user; streaming or transmitting, using the one or more computing device processors, after the second transitional interaction associated with the first user interface of the mobile application, to the second mobile device of the second user, on the first user interface of the mobile application, the third content comprising the third audio; and transmitting, using the one or more computing device processors, after the second transitional interaction associated with the first user interface of the mobile application, to the second mobile device for visual display, on the first user interface of the mobile application, a fourth visual representation not comprising a fourth video of the fourth user, such that the fourth visual representation is displayable on the second mobile device during or prior to transmitting of the third content comprising the third audio to the second mobile device of the second user.

According to some embodiments, the first transitional interaction comprises an at least partially horizontal swipe or a first selection, and the second transitional interaction comprises an at least partially vertical swipe or a second selection.

In some cases, the method further comprises: before, during or after enabling the first user to execute the second action associated with the second user profile, generating, using the one or more computing device processors, a first communication channel for the first user to interact with the second user and for the second user to interact with the first user, wherein the first user transmits a first interaction to the second user in the first communication channel, and wherein the second user transmits a second interaction to the first user in the first communication channel; determining, using the one or more computing device processors, a fourth user accesses the mobile application using a fourth mobile device of the fourth user; enabling, using the one or more computing device processors, the fourth user to create or modify a fourth user profile using the fourth mobile device of the fourth user; receiving, using the one or more computing device processors, a first request from the first user to generate a first group; generating, using the one or more computing device processors, based on the receiving the first request from the first user to generate the first group, the first group associated with the first user; receiving, using the one or more computing device processors, a second request from the first user to add the fourth user to the first group; transmitting, using the one or more computing device processors, the second request to the fourth user; after the transmitting the second request to the fourth user, enabling, using the one or more computing device processors, the fourth user to join the first group, thereby resulting in the fourth user joining the first group; enabling, using the one or more computing device processors, the fourth user to access the first communication channel, such that the fourth user cannot transmit a third interaction in the first communication channel, such that the first interaction and the second interaction are viewable to the third user, and such that the first visual representation not comprising the first video and the second visual representation not comprising the second video are viewable to the fourth user; and after enabling the fourth user to join the first group, generating, using the one or more computing device processors, a second communication channel for the first user to interact with the fourth user, wherein the first user transmits a fourth interaction to the fourth user in the second communication channel, wherein the fourth user transmits a fifth interaction to the first user in the second communication channel, and wherein the second user cannot access the second communication channel, such that the first visual representation not comprising the first video is viewable to the third user.

In other cases, the method further comprises: generating, using the one or more computing device processors, a first link to the first communication channel; and initiating, using the one or more computing device processors, via the second communication channel, display of the first link to the first user and the fourth user.

According to some embodiments, the method further comprises: generating, using the one or more computing device processors, a second link to the second communication channel; and initiating, using the one or more computing device processors, via the first communication channel, display of the second link to the first user or the fourth user, and not the second user.

In one embodiment, the first prompt is generated by the mobile application, the first prompt is received from the first user, or the first prompt was previously received from a fourth user.

According to another embodiment, the first action is associated with the first prompt.

In yet another embodiment, the first notification associated with the first action associated with the first user profile or associated with the first content is comprised in a list of notifications associated with the first user profile or associated with the first content or associated with third content, wherein the list of notifications is displayable on the first mobile device.

In still another embodiment, at least one of: the first content is streamed or transmitted to the second mobile device of the second user based on a filter associated with the second user or the second user profile; the second content is streamed or transmitted to the second mobile device of the second user based on the filter associated with the second user of the second user profile.

Furthermore, according to one embodiment, the filter comprises at least one of: an age filter, a gender filter, or a location filter.

According to some embodiments, the third content is streamed or transmitted to the second mobile device of the second user based on a filter associated with the second user or the second user profile.

In one embodiment, an exemplary method for streaming video content comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; receiving, using the one or more computing device processors, from the first mobile device of the first user, first content comprising first video, wherein the first content is associated with a first prompt; adding, using the one or more computing device processors, the first content comprising the first video to a first content list; streaming or transmitting, using the one or more computing device processors, the first content comprising the first video to the second mobile device of the second user; transmitting, using the one or more computing device processors, to the second mobile device for visual display, on a first user interface of the mobile application, a first visual representation not comprising the first video, such that the first visual representation is displayable on the second mobile device during or prior to the streaming or transmitting the first content comprising the first video, to the second mobile device of the second user; before, during, or after transmitting of the first content comprising the first video to the second mobile device of the second user, enabling, using the one or more computing device processors, the second user to execute a first action associated with the first user or associated with the first content; logging, using the one or more computing device processors, the first action to a first log, wherein the first log is associated with at least one of: the first user or the second user, wherein the first log is associated with at least one data store; receiving, using the one or more computing device processors, from the second mobile device of the second user, second content comprising second video, wherein the second content is associated with the first prompt or a second prompt; adding, using the one or more computing device processors, the second content comprising the second video to a second content list; streaming or transmitting, using the one or more computing device processors, the second content comprising the second video to the first mobile device of the first user; transmitting, using the one or more computing device processors, to the first mobile device for visual display, on a second user interface of the mobile application, a second visual representation not comprising the second video to the first mobile device of the first user; before, during, or after transmitting of the first content comprising the first video to the second mobile device of the second user, enabling, using the one or more computing device processors, the first user to execute a second action associated with the second user or associated with the second content; logging, using the one or more computing device processors, the second action to the first log or a second log, wherein the second log is associated with at least one of: the first user or the second user, wherein the second log is associated with at least one data store; before, during or after enabling the first user to execute the second action associated with the second user or associated with the second content, generating, using the one or more computing device processors, a first communication channel for the first user to interact with the second user and for the second user to interact with the first user; determining, using the one or more computing device processors, a third user accesses the mobile application using a third mobile device of the third user; enabling, using the one or more computing device processors, the third user to create or modify a third user profile using the third mobile device of the third user; receiving, using the one or more computing device processors, from the third mobile device of the third user, third content comprising third video, wherein the third content is associated with the first prompt, the second prompt, or a third prompt; adding, using the one or more computing device processors, the third content comprising the third video to the first content list; before, during, or after enabling the second user to execute the first action associated with the first user or associated with the first content, streaming or transmitting, using the one or more computing device processors, the third content comprising the third video to the second mobile device of the second user; and before, during, or after enabling the second user to execute the first action associated with the first user or associated with the first content, transmitting, using the one or more computing device processors, to the second mobile device for visual display, on the first user interface or a third user interface of the mobile application, a third visual representation not comprising the third video of the third user, such that the third visual representation is displayable on the second mobile device during or prior to the streaming or transmitting the third content comprising the third video to the second mobile device of the second user.

In some embodiments, the first action comprises at least one of: the second user liking the first user, the second user disliking the first user, the second user skipping the first user, or the second user executing a transitional interaction associated with the first user.

According to one embodiment, the first user executes the second action associated with the second user or associated with the second content while being presented with the first content list, or while being presented with at least one potential match associated with the first user.

In other embodiments, the second action comprises at least one of: the first user liking the second user, the first user disliking the second user, the first user skipping the second user, or the first user executing a transitional interaction associated with the second user.

According to another embodiment, the method further comprising: receiving, using the one or more computing device processors, from the first mobile device of the first user, a fourth content comprising fourth video, wherein the fourth content is associated with a fourth prompt; and before, during, or after enabling the second user to execute the first action associated with the first user or associated with the first content, streaming or transmitting, using the one or more computing device processors, the fourth content comprising the fourth video to the second mobile device of the second user.

In some cases, the method further comprises transmitting, using the one or more computing device processors, a first notification associated with the second action associated with the second user or associated with the second content, to the second mobile device of the second user.

In other cases, at least one of the first prompt, the second prompt, or the third prompt: is created by the first user, the second user, or the third user, is created by a fourth user, or is created by or randomized by the mobile application.

According to one embodiment, the receiving, from the first mobile device of the first user, the first content comprising the first video comprises: enabling the first user to capture the first content using the mobile application, or enabling the first user to upload the first content to the mobile application.

In another embodiment, the first communication channel expires after a first time if at least one of: the first user does not transmit a first interaction to the second user in the first communication channel, or the second user does not transmit a second interaction to the first user in the first communication channel.

According to yet another embodiment, the first content comprising the first video further comprises a selectable link associated with a fourth user.

In still another embodiment, the second user cannot view the first user profile and the first user cannot view the second user profile.

In another embodiment, an exemplary method for streaming video content comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; receiving, using the one or more computing device processors, from the first mobile device of the first user, first content comprising first video; adding, using the one or more computing device processors, the first content comprising the first video to a first content list; streaming or transmitting, using the one or more computing device processors, the first content comprising the first video to the second mobile device of the second user; transmitting, using the one or more computing device processors, to the second mobile device for visual display, on a first user interface of the mobile application, a first visual representation not comprising the first video of the first user, such that the first visual representation is displayable on the second mobile device during or prior to the streaming or transmitting the first content comprising the first video, to the second mobile device of the second user; before, during, or after transmitting of the first content comprising the first video to the second mobile device of the second user, enabling, using the one or more computing device processors, the second user to execute a first action associated with the first user or associated with the first content; logging, using the one or more computing device processors, the first action to a first log, wherein the first log is associated with at least one of: the first user or the second user, wherein the first log is associated with at least one data store; receiving, using the one or more computing device processors, from the second mobile device of the second user, second content comprising second video; adding, using the one or more computing device processors, the second content comprising the second video to a second content list; streaming or transmitting, using the one or more computing device processors, the second content comprising the second video to the first mobile device of the first user; transmitting, using the one or more computing device processors, to the first mobile device for visual display, on a second user interface of the mobile application, a second visual representation not comprising the second video to the first mobile device of the first user; before, during, or after transmitting of the first content comprising the first video to the second mobile device of the second user, enabling, using the one or more computing device processors, the first user to execute a second action associated with the second user or associated with the second content; logging, using the one or more computing device processors, the second action to the first log or a second log, wherein the second log is associated with at least one of: the first user or the second user, wherein the second log is associated with at least one data store; before, during or after enabling the first user to execute the second action associated with the second user or associated with the second content, generating, using the one or more computing device processors, a first communication channel for the first user to interact with the second user and for the second user to interact with the first user; determining, using the one or more computing device processors, a third user accesses the mobile application using a third mobile device of the third user; enabling, using the one or more computing device processors, the third user to create or modify a third user profile using the third mobile device of the third user; receiving, using the one or more computing device processors, from the third mobile device of the third user, third content comprising third video; adding, using the one or more computing device processors, the third content comprising the third video to the first content list; before, during, or after enabling the second user to execute the first action associated with the first user or associated with the first content, streaming or transmitting, using the one or more computing device processors, the third content comprising the third video to the second mobile device of the second user; and before, during, or after enabling the second user to execute the first action associated with the first user or associated with the first content, transmitting, using the one or more computing device processors, to the second mobile device for visual display, on the first user interface or a third user interface of the mobile application, a third visual representation not comprising the third video of the third user, such that the third visual representation is displayable on the second mobile device during or prior to the streaming or transmitting the third content comprising the third video to the second mobile device of the second user.

According to some embodiments, at least one of: the first content comprising the first video is associated with or responsive to a first prompt, the second content comprising the second video is associated with or responsive to the first prompt or a second prompt, or the third content comprising the third video is associated with or responsive to the first prompt, the second prompt, or a third prompt.

In other embodiments, the first action comprises at least one of: the second user liking the first user, the second user disliking the first user, the second user skipping the first user, or the second user executing a transitional interaction associated with the first user.

According to other embodiments, the first user executes the second action associated with the second user or associated with the second content while being presented with the first content list, or while being presented with at least one potential match associated with the first user.

In still other embodiments, the second action comprises at least one of: the first user liking the second user, the first user disliking the second user, the first user skipping the second user, or the first user executing a transitional interaction associated with the second user.

In some cases, the method further comprises: receiving, using the one or more computing device processors, from the first mobile device of the first user, a fourth content comprising fourth video; and before, during, or after enabling the second user to execute the first action associated with the first user or associated with the first content, streaming or transmitting, using the one or more computing device processors, the fourth content comprising the fourth video to the second mobile device of the second user.

In one embodiment, the receiving, from the first mobile device of the first user, the first content comprising the first video comprises: enabling the first user to capture the first content using the mobile application, or enabling the first user to upload the first content to the mobile application.

According to another embodiment, the first communication channel expires after a first time if at least one of: the first user does not transmit a first interaction to the second user in the first communication channel, or the second user does not transmit a second interaction to the first user in the first communication channel.

In yet another embodiment, an exemplary method for streaming video content comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; receiving, using the one or more computing device processors, from the first mobile device of the first user, first content comprising first video, wherein the first content is associated with a first prompt; adding, using the one or more computing device processors, the first content comprising the first video to a first content list; streaming or transmitting, using the one or more computing device processors, the first content comprising the first video to the second mobile device of the second user; transmitting, using the one or more computing device processors, to the second mobile device for visual display, on a first user interface of the mobile application, a first visual representation not comprising the first video, such that the first visual representation is displayable on the second mobile device during or prior to the streaming or transmitting the first content comprising the first video, to the second mobile device of the second user; before, during, or after transmitting of the first content comprising the first video to the second mobile device of the second user, enabling, using the one or more computing device processors, the second user to execute a first action associated with the first user or associated with the first content; logging, using the one or more computing device processors, the first action to a first log, wherein the first log is associated with at least one of: the first user or the second user, wherein the first log is associated with at least one data store; before, during or after enabling the second user to execute the first action associated with the first user or associated with the first content, generating, using the one or more computing device processors, a first communication channel for the first user to interact with the second user and for the second user to interact with the first user; determining, using the one or more computing device processors, a third user accesses the mobile application using a third mobile device of the third user; enabling, using the one or more computing device processors, the third user to create or modify a third user profile using the third mobile device of the third user; receiving, using the one or more computing device processors, from the third mobile device of the third user, second content comprising second video, wherein the second content is associated with the first prompt or a second prompt; adding, using the one or more computing device processors, the second content comprising the second video to the first content list; before, during, or after enabling the second user to execute the first action associated with the first user or associated with the first content, streaming or transmitting, using the one or more computing device processors, the second content comprising the second video to the second mobile device of the second user; and before, during, or after enabling the second user to execute the first action associated with the first user or associated with the first content, transmitting, using the one or more computing device processors, to the second mobile device for visual display, on the first user interface or a second user interface of the mobile application, a second visual representation not comprising the second video of the third user, such that the second visual representation is displayable on the second mobile device during or prior to the streaming or transmitting the second content comprising the second video to the second mobile device of the second user.

In some cases, the first action comprises at least one of: the second user liking the first user, the second user disliking the first user, the second user skipping the first user, the second user executing a transitional interaction associated with the first user, the second user initiating a computing operation associated with transmitting digital exchangeables, or the second user transmitting a first interaction to the first user in the first communication channel.

According to some embodiments, the method further comprises: receiving, using the one or more computing device processors, from the first mobile device of the first user, a fourth content comprising fourth video, wherein the fourth content is associated with a fourth prompt; and before, during, or after enabling the second user to execute the first action associated with the first user or associated with the first content, streaming or transmitting, using the one or more computing device processors, the fourth content comprising the fourth video to the second mobile device of the second user.

In other embodiments, the method further comprises transmitting, using the one or more computing device processors, a first notification associated with the first action associated with the first user or associated with the first content, to the first mobile device of the first user.

According to one embodiment, at least one of the first prompt or the second prompt: is created by the first user, the second user, or the third user, is created by a fourth user, or is created by or randomized by the mobile application.

In another embodiment, the receiving, from the first mobile device of the first user, the first content comprising the first video comprises: enabling the first user to capture the first content using the mobile application, or enabling the first user to upload the first content to the mobile application.

In some embodiments, at least one of: the first communication channel expires after a first time if at least one of: the first user does not transmit a first interaction to the second user in the first communication channel, or the second user does not transmit a second interaction to the first user in the first communication channel, or the first content comprising the first video further comprises a link associated with a fourth user.

According to other embodiments, the method further comprises enabling, using the one or more computing device processors, at least one of: the first user using the first mobile device to send, receive, or view a first threshold number of contents or no content during a first period, the second user using the second mobile device to send, receive, or view a second threshold number of contents or no content during a second period, or the third user using the third mobile device to send, receive, or view a third threshold number of contents or no content during a third period.

Furthermore, in some cases, the method further comprises at least one of: enabling, using the one or more computing device processors, the first user using the first mobile device to send, receive, or view greater than the first threshold number of contents or no content during the first period based on the first user executing a first computing operation for transmitting digital exchangeables from a first digital exchangeables account associated with the first user; enabling, using the one or more computing device processors, the second user using the second mobile device to send, receive, or view greater than the second threshold number of contents or no content during the second period based on the second user executing a second computing operation for transmitting digital exchangeables from a second digital exchangeables account associated with the second user; or enabling, using the one or more computing device processors, the third user using the third mobile device to send, receive, or view greater than the third threshold number of contents or no content during the third period based on the third user executing a third computing operation for transmitting digital exchangeables from a third digital exchangeables account associated with the third user.

In one embodiment, wherein at least one of: the first content is streamed or transmitted to the second mobile device of the second user based on a first filter associated with the second user or the second user profile, the second content is streamed or transmitted to the first mobile device of the first user based on a second filter associated with the first user or the first user profile, or the third content is streamed or transmitted to the second mobile device of the second user based on the first filter associated with the second user or the second user profile.

Furthermore, in some embodiments, at least one of: the first filter comprises at least one of: a first age filter, a first gender filter, or a first location filter, or the second filter comprises at least one of: a second age filter, a second gender filter, or a second location filter.

According to another embodiment, the method further comprises sequencing, using the one or more computing device processors, based on at least one activity (e.g., a recent activity) associated with the second user, the first content list.

In some embodiments, a method for streaming content comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; receiving, using the one or more computing device processors, from the first mobile device of the first user, first content; adding, using the one or more computing device processors, the first content to a first content list; streaming or transmitting, using the one or more computing device processors, the first content to the second mobile device of the second user; transmitting, using the one or more computing device processors, to the second mobile device for visual display, on a first user interface of the mobile application, a first visual representation of the first user not comprising the first content, such that the first visual representation is displayable on the second mobile device during or prior to the streaming or transmitting the first content, to the second mobile device of the second user; before, during, or after transmitting of the first content to the second mobile device of the second user, enabling, using the one or more computing device processors, the second user to execute a first action associated with the first user or associated with the first content; logging, using the one or more computing device processors, the first action to a first log, wherein the first log is associated with at least one of: the first user or the second user, wherein the first log is associated with at least one data store; after enabling the second user to execute the first action associated with the first user or associated with the first content, adding, using the one or more computing device processors, based on the first action, the first content or second content associated with the first user to a second content list, wherein the first user is enabled to interact with or execute a second action associated with the second user or at least one fourth user; determining, using the one or more computing device processors, a third user accesses the mobile application using a third mobile device of the third user; enabling, using the one or more computing device processors, the third user to create or modify a third user profile using the third mobile device of the third user; receiving, using the one or more computing device processors, from the third mobile device of the third user, third content; adding, using the one or more computing device processors, the third content to the first content list; before, during, or after enabling the second user to execute the first action associated with the first user or associated with the first content, streaming or transmitting, using the one or more computing device processors, the third content to the second mobile device of the second user; before, during, or after enabling the second user to execute the first action associated with the first user or associated with the first content, transmitting, using the one or more computing device processors, to the second mobile device for visual display, on the first user interface or a third user interface of the mobile application, a second visual representation of the third user not comprising the second content, such that the second visual representation is displayable on the second mobile device during or prior to the streaming or transmitting the third content to the second mobile device of the second user; before, during, or after streaming or transmitting the third content to the second mobile device of the second user, enabling, using the one or more computing device processors, the second user to execute a third action associated with the third user or associated with the third content; logging, using the one or more computing device processors, the third action to the first log or a second log, wherein the second log is associated with at least one of: the third user or the second user, wherein the second log is associated with the at least one data store; and after enabling the second user to execute the third action associated with the third user or associated with the third content, not adding, using the one or more computing device processors, based on the third action, at a first time, the third content or fourth content associated with the third user to the second content list, wherein the third user is not enabled to interact with or execute a fourth action associated with the second user or the at least one fourth user.

According to one embodiment, at least one of: the first action comprises a first voting action associated with first permissions associated with the first user and the mobile application, the first action comprises the second user voting to remove the first user, the first action comprises the second user voting to enable the first user to interact with one or more first users in the mobile application, the first action comprises the second user executing a first transitional interaction associated with the first user, the second action comprises a second voting action associated with second permissions associated with the third user and the mobile application, the second action comprises the second user voting to remove the third user from the mobile application, the second action comprises the second user voting to enable the third user to interact with one or more second users in the mobile application, the second action comprises the second user executing a second transitional interaction associated with the third user, the third action comprises the first user liking the second user or the at least one fourth user, the third action comprises the first user disliking the second user or the at least one fourth user, the third action comprises the first user skipping the second user or the at least one fourth user, the fourth action comprises the third user liking the second user or the at least one fourth user, the fourth action comprises the third user disliking the second user or the at least one fourth user, the fourth action comprises the third user skipping the second user or the at least one fourth user, or the first content list comprises a voting tab and the second content list comprises a feed tab.

In another embodiment, the method further comprises transmitting, using the one or more computing device processors, a first notification associated with the first action associated with the first user or associated with the first content, to the first mobile device of the first user.

According to yet another embodiment, the method further comprises at least one of: adding, using the one or more computing device processors, the first content or the second content to a third content list; adding, using the one or more computing device processors, the third content or the fourth content to a fourth content list; removing, using the one or more computing device processors, the third content from the first content list; or removing, using the one or more computing device processors, the first content from the first content list.

In still another embodiment, the first user and the third user are associated with at least one of: a geographical area or at least one parameter that corresponds with or is associated with the second user or settings associated with the second user.

In some cases, at least one of: the first content is associated with or responsive to a first prompt, or the second content is associated with or responsive to the first prompt or a second prompt.

In other cases, the method further comprises adding, using the one or more computing device processors, at a second time after the first time, the third content or the fourth content associated with the third user to the second content list, wherein the third user is enabled to interact with or execute the fourth action associated with the second user or the at least one fourth user.

In yet other cases, the method further comprises: receiving, using the one or more computing device processors, from the second mobile device of the second user, fifth content; streaming or transmitting, using the one or more computing device processors, the fifth content to the first mobile device of the first user; transmitting, using the one or more computing device processors, to the first mobile device for visual display, on a fourth user interface of the mobile application, a third visual representation of the second user not comprising the fifth content, such that the third visual representation is displayable on the first mobile device during or prior to the streaming or transmitting the fifth content to the first mobile device of the first user; enabling, using the one or more computing device processors, the first user to execute a fifth action associated with the second user or associated with the fifth content; and logging, using the one or more computing device processors, the fifth action to the first log, the second log, or a third log, wherein the third log is associated with at least one of: the first user or the second user, wherein the third log is associated with the at least one data store.

In still other cases, the one or more computing device processors are comprised in one or more computing systems, wherein the one or more computing systems are located in one or more locations.

In other embodiments, a method for streaming content comprises: determining, using one or more computing device processors, a first user accesses a mobile application using a first mobile device of the first user; enabling, using the one or more computing device processors, the first user to create or modify a first user profile using the first mobile device of the first user; determining, using the one or more computing device processors, a second user accesses the mobile application using a second mobile device of the second user; enabling, using the one or more computing device processors, the second user to create or modify a second user profile using the second mobile device of the second user; receiving, using the one or more computing device processors, from the first mobile device of the first user, first content; adding, using the one or more computing device processors, the first content to a first content list; streaming or transmitting, using the one or more computing device processors, the first content to the second mobile device of the second user; transmitting, using the one or more computing device processors, to the second mobile device for visual display, on a first user interface of the mobile application, a first visual representation of the first user not comprising the first content, such that the first visual representation is displayable on the second mobile device during or prior to the streaming or transmitting the first content, to the second mobile device of the second user; before, during, or after transmitting of the first content to the second mobile device of the second user, enabling, using the one or more computing device processors, the second user to execute a first action associated with the first user or associated with the first content; logging, using the one or more computing device processors, the first action to a first log, wherein the first log is associated with at least one of: the first user or the second user, wherein the first log is associated with at least one data store; before, during or after enabling the first user to execute the first action associated with the first user or associated with the first content, enabling the first user to interact with or execute a second action associated with the second user or at least one fourth user; determining, using the one or more computing device processors, a third user accesses the mobile application using a third mobile device of the third user; enabling, using the one or more computing device processors, the third user to create or modify a third user profile using the third mobile device of the third user; receiving, using the one or more computing device processors, from the third mobile device of the third user, second content; adding, using the one or more computing device processors, the second content to the first content list; before, during, or after enabling the second user to execute the first action associated with the first user or associated with the first content, streaming or transmitting, using the one or more computing device processors, the second content to the second mobile device of the second user; before, during, or after enabling the second user to execute the first action associated with the first user or associated with the first content, transmitting, using the one or more computing device processors, to the second mobile device for visual display, on the first user interface or a third user interface of the mobile application, a second visual representation of the third user not comprising the second content, such that the second visual representation is displayable on the second mobile device during or prior to the streaming or transmitting the second content to the second mobile device of the second user; before, during, or after streaming or transmitting the second content to the second mobile device of the second user, enabling, using the one or more computing device processors, the second user to execute a third action associated with the third user or associated with the second content; logging, using the one or more computing device processors, the third action to the first log or a second log, wherein the second log is associated with at least one of: the third user or the second user, wherein the second log is associated with the at least one data store; and after enabling the second user to execute the third action associated with the third user or associated with the second content, not enabling the third user to interact with or execute a fourth action associated with the second user or the at least one fourth user.

In one embodiment, at least one of: the first action comprises the second user liking the first user, the first action comprises the second user disliking the first user, the first action comprises the second user skipping the first user, the first action comprises the second user voting to remove the first user, the first action comprises a first voting action associated with first permissions associated with the first user and the mobile application, the first action comprises the second user executing a first transitional interaction associated with the first user, the second action comprises the second user liking the third user, the second action comprises the second user disliking the third user, the second action comprises the second user skipping the third user, the second action comprises the second user voting to remove the third user, the second action comprises a second voting action associated with second permissions associated with the third user and the mobile application, the second action comprises the second user executing a second transitional interaction associated with the third user, the third action comprises the first user liking the second user or the at least one fourth user, the third action comprises the first user disliking the second user or the at least one fourth user, the third action comprises the first user skipping the second user or the at least one fourth user, the fourth action comprises the third user liking the second user or the at least one fourth user, the fourth action comprises the third user disliking the second user or the at least one fourth user, or the fourth action comprises the third user skipping the second user or the at least one fourth user.

According to another embodiment, the method further comprises: receiving, using the one or more computing device processors, from the second mobile device of the second user, fifth content; streaming or transmitting, using the one or more computing device processors, the fifth content to the first mobile device of the first user; and transmitting, using the one or more computing device processors, to the first mobile device for visual display, on a fourth user interface of the mobile application, a third visual representation of the second user not comprising the fifth content, such that the third visual representation is displayable on the first mobile device during or prior to the streaming or transmitting the fifth content to the first mobile device of the first user.

Furthermore, in yet another embodiment, the method further comprises: enabling, using the one or more computing device processors, the first user to execute a fifth action associated with the second user or associated with the fifth content; logging, using the one or more computing device processors, the fifth action to the first log, the second log, or a third log, wherein the third log is associated with at least one of: the first user or the second user, wherein the third log is associated with the at least one data store; and before, during or after enabling the first user to execute the fifth action associated with the second user or associated with the fifth content, generating, using the one or more computing device processors, a first communication channel for the first user to interact with the second user and for the second user to interact with the first user.

According to still another embodiment, the first communication channel expires after a first time if at least one of: the first user does not transmit a first interaction to the second user in the first communication channel, or the second user does not transmit a second interaction to the first user in the first communication channel.

It is appreciated that, in some embodiments, the not enabling the third user to interact with or execute the fourth action associated with the second user or the at least one fourth user comprises at least one of: removing the second content from the first content list or a second content list, or removing third content associated with the third user from the first content list or a third content list.

In other embodiments, the method further comprises transmitting, using the one or more computing device processors, a first notification associated with the first action associated with the first user or associated with the first content, to the first mobile device of the first user.

According to yet other embodiments, the first user and the third user are associated with at least one of: a geographical area or at least one parameter that corresponds with or is associated with the second user or settings associated with the second user.

In still other embodiments, at least one of: the first content is associated with or responsive to a first prompt, the second content is associated with or responsive to the first prompt or a second prompt, the first content is streamed or transmitted to the second mobile device of the second user based on a first filter associated with the second user or the second user profile, or the second content is streamed or transmitted to the second mobile device of the second user based on the first filter associated with the second user or the second user profile.

Furthermore, in some cases, the first filter comprises at least one of: an age filter, a gender filter, a location filter, or a preference filter.

In other cases, the one or more computing device processors are comprised in one or more computing systems, wherein the one or more computing systems are located in one or more locations.

According to one embodiment, adding, based on the first action, the first content or the second content associated with the first user to the second content list is further based on at least one additional action executed by the at least one fourth user.

In another embodiment, not adding, based on the third action, at the first time, the third content or the fourth content associated with the third user to the second content list is further based on at least one additional action executed by the at least one fourth user.

According to yet another embodiment, enabling, based on the first action, the first user to interact with or execute a second action associated with the second user or at least one fourth user is further based on at least one additional action executed by the at least one fourth user.

In still another embodiment, not enabling, based on the third action, the third user to interact with or execute a fourth action associated with the second user or the at least one fourth user is further based on at least one additional action executed by the at least one fourth user.

BRIEF DESCRIPTION OF THE DRAWINGS

FIGS. 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66*a*, 66*b*, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101*a*, 101*b*, 101*c*, 101*d*, 101*e*, 102, 103, 104, 105, 106, 107, 108, 109, 110, 111, 112, 113, 114, 115, 116, 117, 118, 119, 120, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254*a*, 254*b*, 254*c*, 255*a*, 255*b*, 255*c*, 256*a*, 256*b*, 256*c*, 257*a*, 257*b*, 258*a*, 258*b*, 258*c*, 259, 260, 261*a*, 261*b*, 261*c*, 262*a*, 262*b*, 262*c*, 263*a*, 263*b*, 263*c*, 264*a*, 264*b*, 264*c*, 265*a*, 265*b*, 265*c*, 266*a*, 266*b*, 266*c*, 267, 268*a*, 268*b*, 268*c*, 269, 270*a*, 270*b*, 271*a*, 271*b*, 271*c*, 272*a*, 272*b*, 273*a*, 273*b*, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, and 372 illustrate user interfaces of a mobile application, in accordance with example embodiments described herein;

FIG. 121 is a flowchart illustrating a method for establishing and broadcasting audio communication between mobile devices, in accordance with example embodiments described herein;

DETAILED DESCRIPTION

Figure 1:
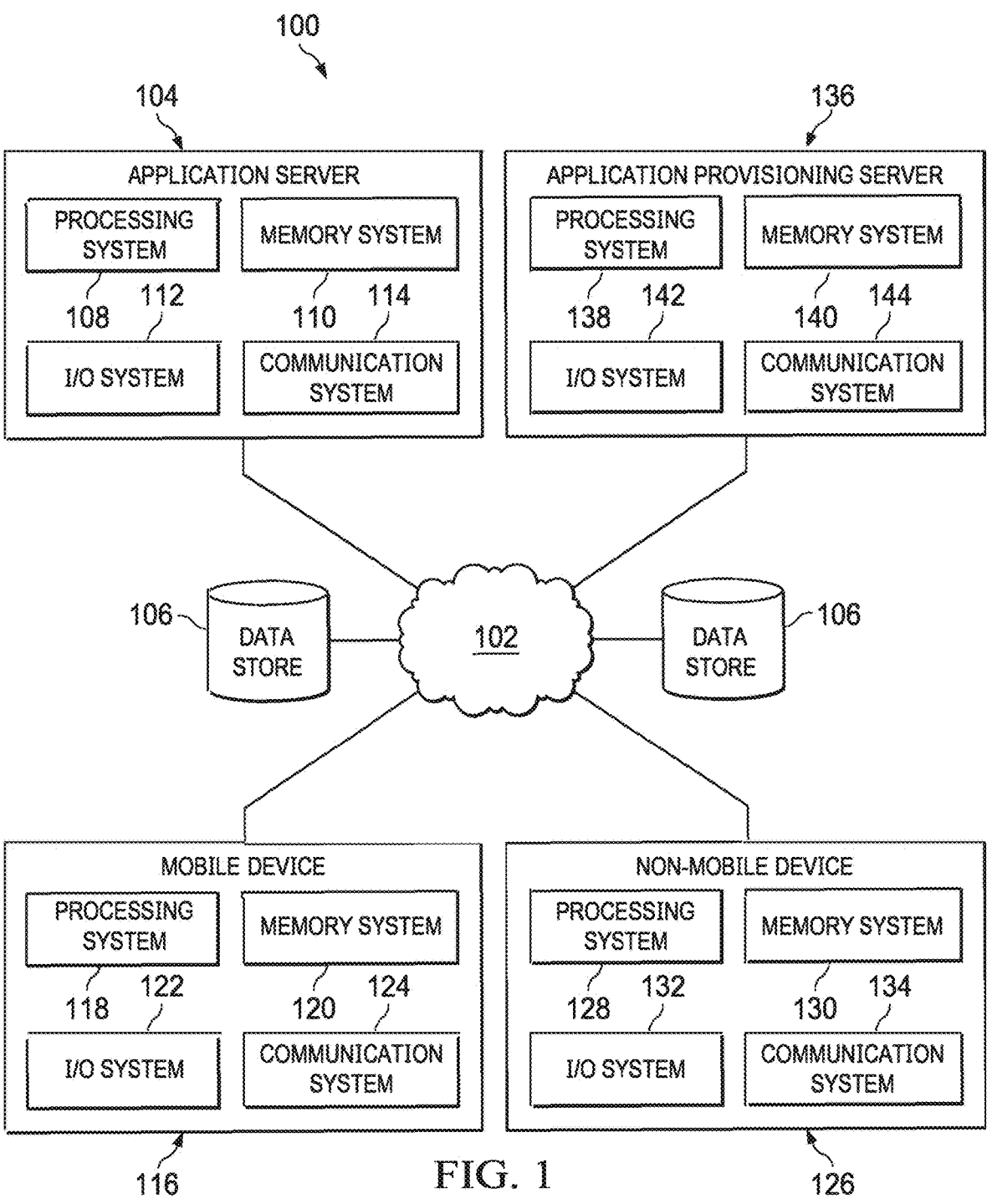
FIG. 1 is a high-level network system within which an application server may be implemented, in accordance with example embodiments described herein.

Illustrated in FIG. 1 is a high-level network system environment 100 within which an application server for a mobile application may be implemented. In the depicted implementation, the system environment 100 may include an application server 104 coupled to a network 102. The network system environment 100 may also include a plurality of data stores 106 communicatively coupled to each other and to the application server 104 and/or the application provisioning server 136 via the network 102, a mobile device 116, a non-mobile device 126, and an application provisioning server 136. While a single application server 104, a single application provisioning server 136, a single mobile device 116, and a single non-mobile device 126 are illustrated, the disclosed principles and techniques can be expanded to include multiple application servers, application provisioning servers, mobile devices, and non-mobile devices.

In some embodiments, the application server 104, the application provisioning server 136, the mobile device 116, and/or the non-mobile device 126 may include at least one computing device such as a mainframe server, a content server, a communication server, a laptop computer, a desktop computer, a handheld computing device, a smart phone, a wearable device, a touch screen, a biometric device, a video processing device, an audio processing device, a virtual machine, a cloud-based computing system and/or service, and/or the like. The application server 104, the application provisioning server 136, the mobile device 116, and/or the non-mobile device 126 may include a plurality of computing devices configured to communicate with one another and/or implement the techniques described herein. In some embodiments, the mobile device 116 and the non-mobile device 126 may include a plurality of computing devices configured to communicate with one another or with other computing devices coupled to the network 102 and/or implement the techniques described herein.

In some instances, the application server 104 may include various elements of a computing environment as described with reference to FIG. 1. For example, the application server 104 may include a processing system 108, a memory system 110, an input/output (I/O) system 112, and/or a communication system 114. A user (e.g., network administrator) may operate the application server 104 either locally or remotely.

The mobile device 116 may include various elements of a computing environment as described with reference to FIG. 1. For example, the mobile device 116 may include a processing system 118, a memory system 120, an input/output (I/O) system 122, and/or a communication system 124.

The non-mobile device 126 may include various elements of a computing environment as described with reference to FIG. 1. For example, the non-mobile device 126 may include a processing system 128, a memory system 130, an input/output (I/O) system 132, and/or a communication system 134.

The application provisioning server 136 may include various elements of a computing environment as described with reference to FIG. 1. For example, the application provisioning server 136 may include a processing system 138, a memory system 140, an input/output (I/O) system 142, and/or a communication system 144. A user (e.g., network administrator) may operate the application provisioning server 136 either locally or remotely.

According to some implementations, the application provisioning server 136 may store one or more executable copies of an application that may execute on the mobile device 116 or non-mobile device 126. The mobile device 116 or non-mobile device 126 may send a message to the application provisioning server requesting sending an executable copy of the application to the mobile device 116 or non-mobile device 126. The application provisioning server 136 may send to the mobile device 116 or non-mobile device 126 the executable copy after determining the mobile device 116 or non-mobile device 126 meets a predefined set of criteria, such as meeting hardware or software requirements or the like. In some embodiments, a user of the mobile device 116 or the non-mobile device 126 may need to authenticate to a user account associated with downloading software applications to mobile device 116 or the non-mobile device 126 to be able to download the executable copy of the application. Afterward, the user of the mobile device 116 or non-mobile device 126 can install the application on the device and utilize the application. Periodically, an updated version of the application may be pushed to the device such that the updated version is either automatically installed, based on receiving prior approval from the user, or installed promptly (or at a scheduled time in the future) upon receiving approval from the user.

According to some implementations, when a user utilizes the application on the mobile device 116 or non-mobile device 126, the application may send one or more messages to the application server 104 for implementing the user's request. The application server 104 may utilize its computing resources (either singly or in combination with the computing resources of the mobile device 116 or non-mobile device 126) to perform operations as requested by the user. In some embodiments, the application server 104 may use external components such as the data stores 106 to retrieve information for completing the user's request. The data stores may include one or more database structures used for categorizing and storing of data. Data may include user account data, application-specific data, user account data associated with the application, user account data associated with the application provisioning server 136, etc.

It is appreciated that the mobile device 116 may include a handheld computing device, a smart phone, a tablet, a laptop computer, a personal digital assistant (PDA), a wearable device, a biometric device, an implanted device, a camera, a video recorder, an audio recorder, a touchscreen, a computer server, a virtual server, a virtual machine, and/or a video communication server. In some embodiments, the mobile device 116 may include a plurality of endpoint computing devices configured to communicate with one another and/or implement the techniques described herein.

The non-mobile device 126 may include computing devices, such as a desktop computer system, a server, and/or other large scale computing systems or the like.

The network system environment 100 may include a plurality of networks. For instance, the network 102 may include any wired/wireless communication network that facilitates communication between the components of the network system environment 100. The network 102, in some instances, may include an Ethernet network, a cellular network (2G, 3G, 4G, 5G, LTE, etc.), a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

Figure 2:
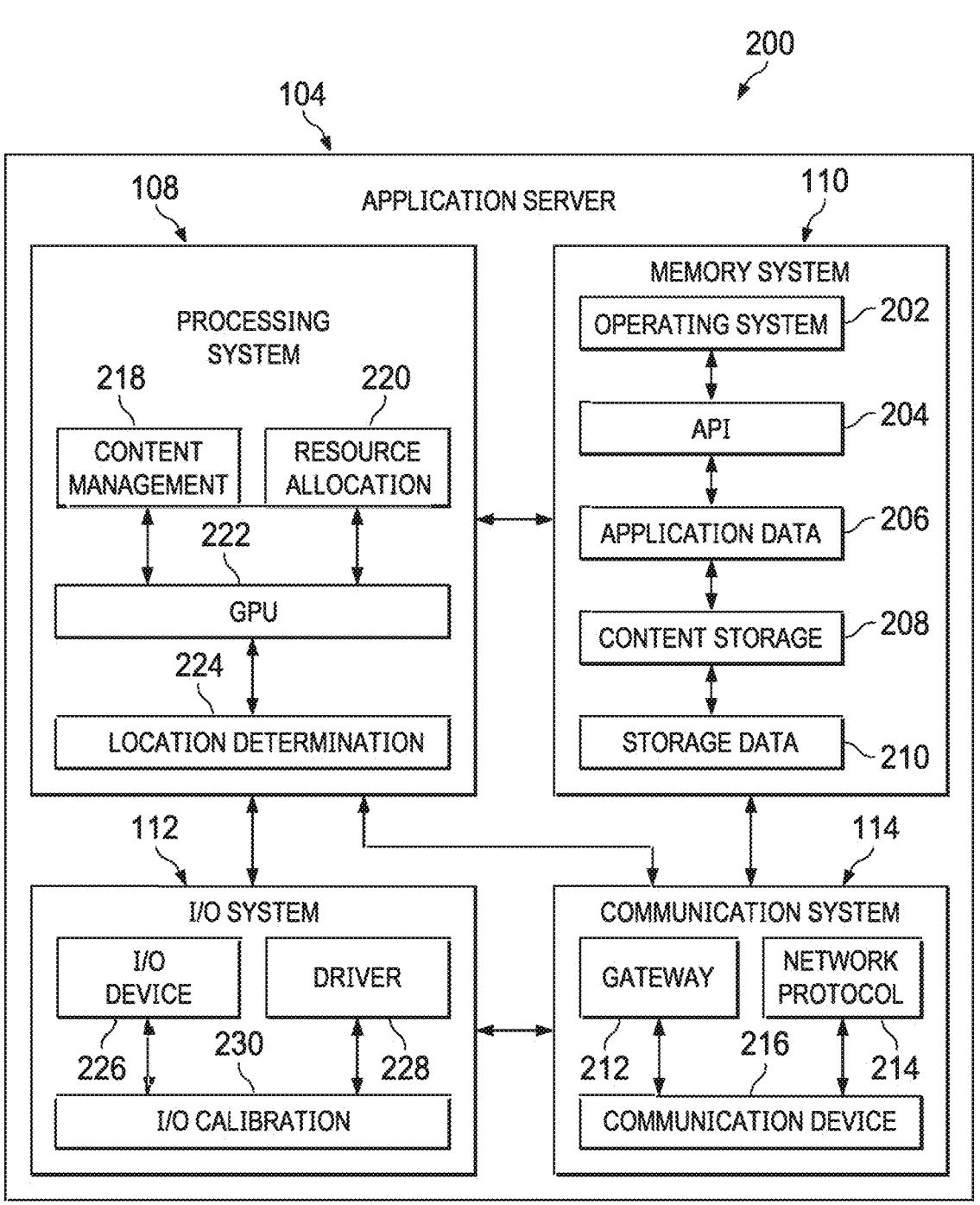
FIG. 2 is a detailed system diagram of the application server of FIG. 1, in accordance with example embodiments described herein.

FIG. 2 illustrates an exemplary system diagram of application server 104. Specifically, FIG. 2 provides exemplary relationships between the exemplary aspects of the application server 104.

As seen in FIG. 2, the processing system 108, the memory system 110, the I/O system 112, and the communication system 114 may include one or more units and/or subunits for performing operations described herein. Additionally, each unit 108, 110, 112, 114 and/or subunit 218, 220, 222, 224, 226, 228, 230, 202, 204, 206, 208, 210, 212, 214, 216 may be operatively and/or otherwise communicatively coupled with each other so as to facilitate the operations described herein. The application server 104, and/or any of its units and/or subunits, may include general hardware, specifically-purposed hardware, and/or a combination thereof. Each unit and/or subunit may be implemented entirely in hardware, or entirely in software, or a combination of hardware and software.

Importantly, the application server 104 and any units and/or subunits of FIG. 2 may be included in one or more elements of system environment 100 as described with reference to FIG. 1. For example, one or more elements (e.g., units and/or subunits) of the application server 104 may be included in the mobile device 116, non-mobile device 126, and/or the application provisioning server 136. In some embodiments, any description of the components of the application server 104 may apply equally to components of the mobile device 116, non-mobile device 126, and/or the application provisioning server 136. Therefore, any references or description with regard to application server 104 can be applied to the mobile device 116, non-mobile device 126, and/or the application provisioning server 136.

The processing system 108 may control one or more of the memory system 110, the I/O system 112, and the communication system 114, as well as any included subunits, elements, components, devices, and/or functions performed by the memory system 110, the I/O system 112, and the communication system 114. The described units of the application server 104 may also be included in any of the other units and/or subunits and/or systems included in the system environment 100 of FIG. 1. Additionally, any actions described herein as being performed by a processor or one or more processors of a computing device (or one or more computing device processors/one or more computing system processors), may be taken by the processing system 108 of FIG. 2 alone and/or by the processing system 108 in conjunction with one or more additional processors, units, subunits, elements, components, devices, and/or the like. Further, while one processing system 108 may be shown in FIG. 2, multiple processing units may be present and/or otherwise included in the application server 104 or elsewhere in the overall system (e.g., network system environment 100 of FIG. 1). Thus, while instructions may be described as being executed by the processing system 108 (and/or units of the processing system 108), the instructions may be executed simultaneously, serially, and/or otherwise by one or multiple processing systems 108 on one or more devices.

In some embodiments, the processing system 108 may be implemented as one or more computer processing unit (CPU) chips and/or graphical processing unit (GPU) chips and may include a hardware device capable of executing computer instructions. The processing system 108 may execute instructions, codes, computer programs, and/or scripts. The instructions, codes, computer programs, and/or scripts may be received from and/or stored in the memory system 110, the I/O system 112, the communication system 114, subunits, and/or elements of the aforementioned units, other devices and/or computing environments, and/or the like.

In some embodiments, the processing system 108 may include, among other elements, subunits such as a content management system 218, a location determination system 224, a graphical processing unit (GPU) 222, and a resource allocation system 220. Each of the aforementioned subunits of the processing system 108 may be communicatively and/or otherwise operably coupled with each other.

The content management system 218 may facilitate generation, modification, analysis, transmission, and/or presentation of content. Content may be file content, media content, user content, application content, operating system content, etc., or any combination thereof. In some instances, content on which the content management system 218 may operate includes device information, user interface data, images, text, themes, audio data, video data, documents, and/or the like. Additionally, the content management system 218 may control the audio and/or appearance of application data during execution of various processes. In some embodiments, the content management system 218 may interface with a third-party content server and/or memory location for execution of its operations.

The location determination system 224 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, router information (or cellphone tower location) associated with router (or cellphone tower) connected to application server 104 (or computing device in communication with the application server 104) for connecting to the Internet, and/or the like. In some embodiments, the location determination system 224 may include various sensors, radar, and/or other specifically-purposed hardware elements for the location determination system 224 to acquire, measure, and/or otherwise transform location information.

The GPU 222 may facilitate generation, modification, analysis, processing, transmission, and/or presentation of content described above, as well as any data (e.g., scanning instructions, scan data, and/or the like) described herein. In some embodiments, the GPU 222 may be utilized to render content for presentation on a computing device. The GPU 222 may also include multiple GPUs and therefore may be configured to perform and/or execute multiple processes in parallel. In some implementations, the GPU 222 may be used in conjunction with other subunits associated with the memory system 110, the I/O system 112, the communication system 114, and/or a combination thereof.

The resource allocation system 220 may facilitate the determination, monitoring, analysis, and/or allocation of computing resources throughout the application server 104 and/or other computing environments. Computing resources of the application server utilized by the processing system 108, the memory system 110, the I/O system 112, and/or the communication system 114 (and/or any subunit of the aforementioned units) such as processing power, data storage space, network bandwidth, and/or the like may be in high demand at various times during operation. Accordingly, the resource allocation system 220 may include sensors and/or other specially-purposed hardware for monitoring performance of each unit and/or subunit of the application server 104, as well as hardware for responding to the computing resource needs of each unit and/or subunit. In some embodiments, the resource allocation system 220 may utilize computing resources of a second computing environment separate and distinct from the application server 104 to facilitate a desired operation.

For example, the resource allocation system 220 may determine a number of simultaneous computing processes and/or requests. The resource allocation system 220 may also determine that the number of simultaneous computing processes and/or requests meets and/or exceeds a predetermined threshold value. Based on this determination, the resource allocation system 220 may determine an amount of additional computing resources (e.g., processing power, storage space of a particular non-transitory computer-readable memory medium, network bandwidth, and/or the like) required by the processing system 108, the memory system 110, the I/O system 112, and/or the communication system 114, and/or any subunit of the aforementioned units for safe and efficient operation of the computing environment while supporting the number of simultaneous computing processes and/or requests. The resource allocation system 220 may then retrieve, transmit, control, allocate, and/or otherwise distribute determined amount(s) of computing resources to each element (e.g., unit and/or subunit) of the application server 104 and/or another computing environment.

In some embodiments, factors affecting the allocation of computing resources by the resource allocation system 220 may include the number of computing processes and/or requests, a duration of time during which computing resources are required by one or more elements of the application server 104, and/or the like. In some implementations, computing resources may be allocated to and/or distributed amongst a plurality of second computing environments included in the application server 104 based on one or more factors mentioned above. In some embodiments, the allocation of computing resources of the resource allocation system 220 may include the resource allocation system 220 flipping a switch, adjusting processing power, adjusting memory size, partitioning a memory element, transmitting data, controlling one or more input and/or output devices, modifying various communication protocols, and/or the like. In some embodiments, the resource allocation system 220 may facilitate utilization of parallel processing techniques such as dedicating a plurality of GPUs included in the processing system 108 for running a multitude of processes.

The memory system 110 may be utilized for storing, recalling, receiving, transmitting, and/or accessing various files and/or data (e.g., scan data, and/or the like) during operation of application server 104. For example, memory system 110 may be utilized for storing, recalling, and/or updating scan history information as well as other data associated with, resulting from, and/or generated by any unit, or combination of units and/or subunits of the application server 104. In some embodiments, the memory system 110 may store instructions and/or data that may be executed by the processing system 108. For instance, the memory system 110 may store instructions that execute operations associated with one or more units and/or one or more subunits of the application server 104. For example, the memory system 110 may store instructions for the processing system 108, the I/O system 112, the communication system 114, and itself.

Memory system 110 may include various types of data storage media such as solid state storage media, hard disk storage media, virtual storage media, and/or the like. Memory system 110 may include dedicated hardware elements such as hard drives and/or servers, as well as software elements such as cloud-based storage drives. In some implementations, memory system 110 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 108. For example, the instructions stored may be a command, a current operating state of application server 104, an intended operating state of application server 104, and/or the like. As a further example, data stored in the memory system 110 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage. Secondary storage may be comprised of one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory system 110 may include one or more data storage devices 210 (shown in FIG. 2) for storing any data described herein. Additionally or alternatively, one or more secondary databases located remotely from application server 104 may be used and/or accessed by memory system 110. In some embodiments, memory system 110 and/or its subunits may be local to the application server 104 and/or remotely located in relation to the application server 104.

Turning back to FIG. 2, the memory system 110 may include subunits such as an operating system 202, an application programming interface 204, an application data 206, and a content storage 208. Each of the aforementioned subunits of the memory system 110 may be communicatively and/or otherwise operably coupled with each other and other units and/or subunits of the application server 104.

The operating system 202 may facilitate deployment, storage, access, execution, and/or utilization of an operating system utilized by the application server 104, and/or any other computing environment described herein. In some embodiments, operating system 202 may include various hardware and/or software elements that serve as a structural framework for processing system 108 to execute various operations described herein. Operating system 202 may further store various pieces of data associated with operation of the operating system and/or application server 104 as a whole, such as a status of computing resources (e.g., processing power, memory availability, resource utilization, and/or the like), runtime information, systems to direct execution of operations described herein, user permissions, security credentials, and/or the like. In some embodiments, the operating system 202 may comprise a mobile operating system. A user may configure portions of the mobile operating to more efficiently operate or configure the application being executed on any mobile device described herein.

The application data 206 may facilitate deployment, storage, access, execution, and/or utilization of an application utilized by the application server 104, the application provisioning server 136, the mobile device 116, or the non-mobile device 126, and/or any other computing environment described herein. For example, the application server 104, the application provisioning server 136, the mobile device 116, or the non-mobile device 126, may be required to download, install, access, and/or otherwise utilize a software application. As such, application data 206 may represent any data associated with such a software application. The application data 206 may further store various data associated with the operation of an application and/or associated with one or more of the application server 104, the application provisioning server 136, the mobile device 116, or the non-mobile device 126, such as a status of computing resources (e.g., processing power, memory availability, resource utilization, and/or the like), runtime information, user interfaces, systems to direct execution of operations described herein to, user permissions, security credentials, and/or the like.

The application programming interface (API) 204 may facilitate deployment, storage, access, execution, and/or utilization of information associated with APIs of application server 104 and/or any other computing environment described herein. For example, application server 104 may include one or more APIs for various devices, applications, units, subunits, elements, and/or other computing environments to communicate with each other and/or utilize any data described herein. Accordingly, API 204 may include API databases containing information that may be accessed and/or utilized by applications, units, subunits, elements, and/or operating systems of other devices and/or computing environments. In some embodiments, each API database may be associated with a customized physical circuit included in memory system 110 and/or API 204. Additionally, each API database may be public and/or private, wherein authentication credentials may be required to access information in an API database. In some embodiments, the API 204 may enable the application provisioning server 136, the application server 104, the mobile device 116, and the non-mobile device 126 to communicate with each other or with any other computing devices, including third-party systems, or may enable the application to be installed on a variety of other computing devices to facilitate communication with the application server 104, the application provisioning server 136, the mobile device 116, and the non-mobile device 126.

The content storage 208 may facilitate deployment, storage, access, and/or utilization of information associated with performance of operations and/or API-based processes by application server 104, the application provisioning server 136, the mobile device 116, and the non-mobile device 126 and/or any other computing environment described herein. In some embodiments, content storage 208 may communicate with a content management system 218 to receive and/or transmit content data (e.g., any of the data described herein including application-specific data, user data, etc.). According to some embodiments, the application server 104 may also include instructions associated with one or more security products/systems to facilitate the determining security issues associated with the application as well as detecting threats posed by threat-actors or hackers. For example, the application server 104 may include threat detection logic associated with access control software, anti-keyloggers, anti-malware, anti-spyware, anti-subversion software, anti-tamper software, antivirus software, cryptographic software, computer-aided dispatch (CAD), firewall (web or otherwise), IDS, IPS, log management software, records management software, sandboxes, security information management, security information and event management (SIEM) software, anti-theft software, parental control software, cloud-based security protection, and/or the like.

The I/O system 112 may include hardware and/or software elements for the application server 104 to receive, and/or transmit, and/or present information useful for processes as described herein. For example, elements of the I/O system 112 may be used to receive input from a user of the application server 104, the application provisioning server 136, the mobile device 116, or the non-mobile device 126. As described herein, I/O system 112 may include units such as an I/O device 226, a driver 228, and/or an I/O calibration system 230.

The I/O device 226 may facilitate the receipt, transmission, processing, presentation, display, input, and/or output of data as a result of executed processes described herein. In some embodiments, the I/O device 226 may include a plurality of I/O devices. In some embodiments, I/O device 226 may include a variety of elements that enable a user to interface with application server 104. For example, I/O device 226 may include a keyboard, a touchscreen, an option, a sensor, a biometric scanner, a laser, a microphone, a camera, and/or another element for receiving and/or collecting input from a user. Additionally and/or alternatively, I/O device 226 may include a display, a screen, a sensor, a vibration mechanism, a light emitting diode (LED), a speaker, radio frequency identification (RFID) scanner, and/or another element for presenting and/or otherwise outputting data to a user. In some embodiments, the I/O device 226 may communicate with one or more elements of processing system 108 and/or memory system 110 to execute any of the operations described herein.

The I/O calibration system 230 may facilitate the calibration of the I/O device 226. For example, I/O calibration system 230 may detect and/or determine one or more settings of I/O device 226, and then adjust and/or modify settings so that the I/O device 226 may operate more efficiently.

In some embodiments, the I/O calibration system 230 may utilize a driver 228 (or multiple drivers) to calibrate I/O device 226. For example, the driver 228 may include software that is to be installed by the I/O calibration system 230 so that an element (e.g., unit, subunit, etc.) of the application server 104, the application provisioning server 136, the mobile device 116, and the non-mobile device 126 (or an element of another computing environment) may recognize and/or integrate with the I/O device 226 for the operations described herein.

The communication system 114 may facilitate establishment, maintenance, monitoring, and/or termination of communications among the application server 104, the application provisioning server 136, the mobile device 116, and the non-mobile device 126, and other computing environments, third party computing systems, and/or the like. The communication system 114 may also facilitate internal communications between various elements (e.g., units and/or subunits) of application server 104, or of any other system in FIG. 1. In some embodiments, communication system 114 may include a network protocol 214, a gateway 212, and/or a communication device 216. The communication system 114 may include hardware and/or software elements.

The network protocol 214 may facilitate establishment, maintenance, and/or termination of a communication connection for application server 104, the application provisioning server 136, the mobile device 116, and the non-mobile device 126, by way of a network. For example, the network protocol 214 may detect and/or define a communication protocol required by a particular network and/or network type. Communication protocols utilized by network protocol 214 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for application server 104 may include transforming and/or translating data from being compatible with a first communication protocol to being compatible with a second communication protocol. In some embodiments, network protocol 214 may determine and/or monitor an amount of data traffic to consequently determine which particular network protocol is to be used for establishing a secure communication connection, transmitting data, and/or performing scanning or security operations.

The gateway 212 may facilitate other devices and/or computing environments to access API 204 or other software code comprised in the memory system 110 of the application server 104. For example, an application server 104 may access API 204 or other executable code of the application server 104 via gateway 212. In some embodiments, gateway 212 may be required to validate user credentials associated with a user prior to providing access to information or data requested by a user. Gateway 212 may include instructions for application server 104 to communicate with another device and/or between elements of the application server 104.

The communication device 216 may include a variety of hardware and/or software specifically purposed to facilitate communication for the application server 104. In some embodiments, the communication device 216 may include one or more radio transceivers, chips, analog front end (AFE) units, antennas, processing units, memory, other logic, and/or other components to implement communication protocols (wired or wireless) and related functionality for facilitating communication for the application server 104. Additionally and/or alternatively, the communication device 216 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

The present disclosure provides an improved computer system environment, including associated hardware and software, for social networking and/or optimizing duration (e.g., speaking time) and quality/content of social networking conversations or talks among users and/or optimizing listening time associated the social networking conversations. The optimizing of speaking time and listening time is enabled using hardware along with specially purposed software code defining specially purposed routines and specially purposed user interfaces. The specially purposed software code is associated with and takes the form of a mobile application and/or specially purposed application programming interfaces (APIs) associated with the mobile application and/or associated with an application server that works with the mobile application to execute functions described in this disclosure. The specially purposed software code may be designed to work with a particular operating system such that the specially purposed software code may not work with another operating system. In some embodiments, the specially purposed software code may work on several distinct operating systems. The specially purposed software code may be configured to work with a processing system, a memory, a hard drive, a microphone, and a speaker associated with the computing device (e.g., mobile computing device) on which the specially purposed software code is executed. In some embodiments, the specially purposed software code may execute many of the functions described herein on the computing device without assistance from other computing devices or servers. In other embodiments, the specially purposed software code is in network communication with an application server such that many of the functions of the mobile application are executed based on communication between the computing device and an applications server. The application server itself may have specially purposed software code to execute the functions described herein. The user interfaces described herein have been specially designed to improve the speed of a user's navigation through the mobile application and to reduce the number of steps to reach desired data or functionality of the mobile application. For example, a user interface is provided to enable a user to efficiently switch from listening mode to conversation mode, and vice versa. Moreover, embodiments of the disclosure enable video-like conversations that can help people with psychological problems to conduct a video-like conversation without capturing video or images of the speaker. In such embodiments, an audiovisual conversation is conducted between customized visual representations of the speakers. In some embodiments, the data associated with the conversations on the platform is curated and published on a platform for consumption (e.g., audio-based engagement) by users. Users may be able to search for or start listening/streaming audio content based on topics selected by the mobile application, search parameters defined by the user (either text or speech), including usernames, names, hashtags, text, category, length of audio, number of listeners, identity of participants (including whether any of the participants is an influencer), types of visual representations used, how many audio messages received, whether a waitlist was established, date of audio creation, etc.

Figure 4:
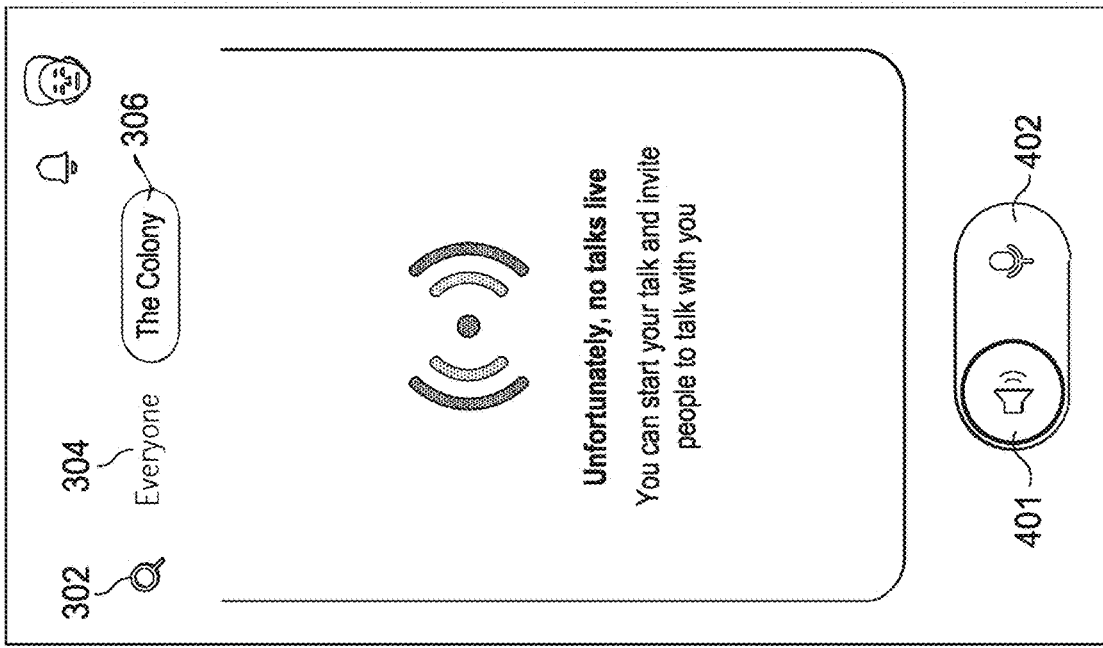
Figure 3:
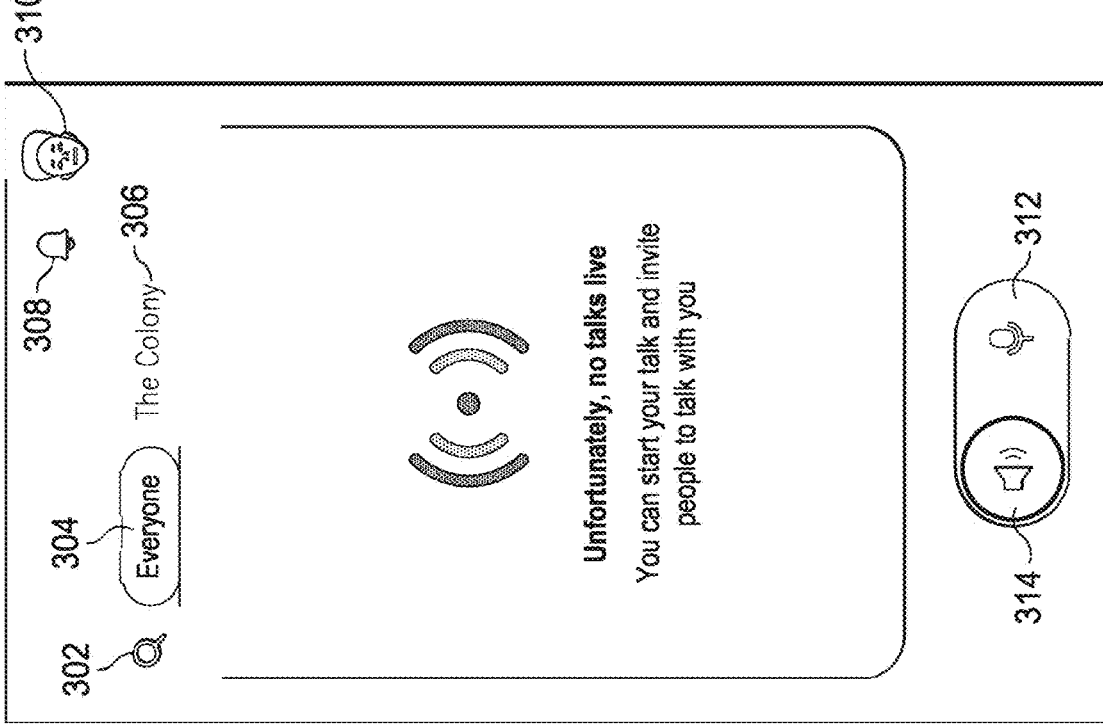
Figures 5, 6:
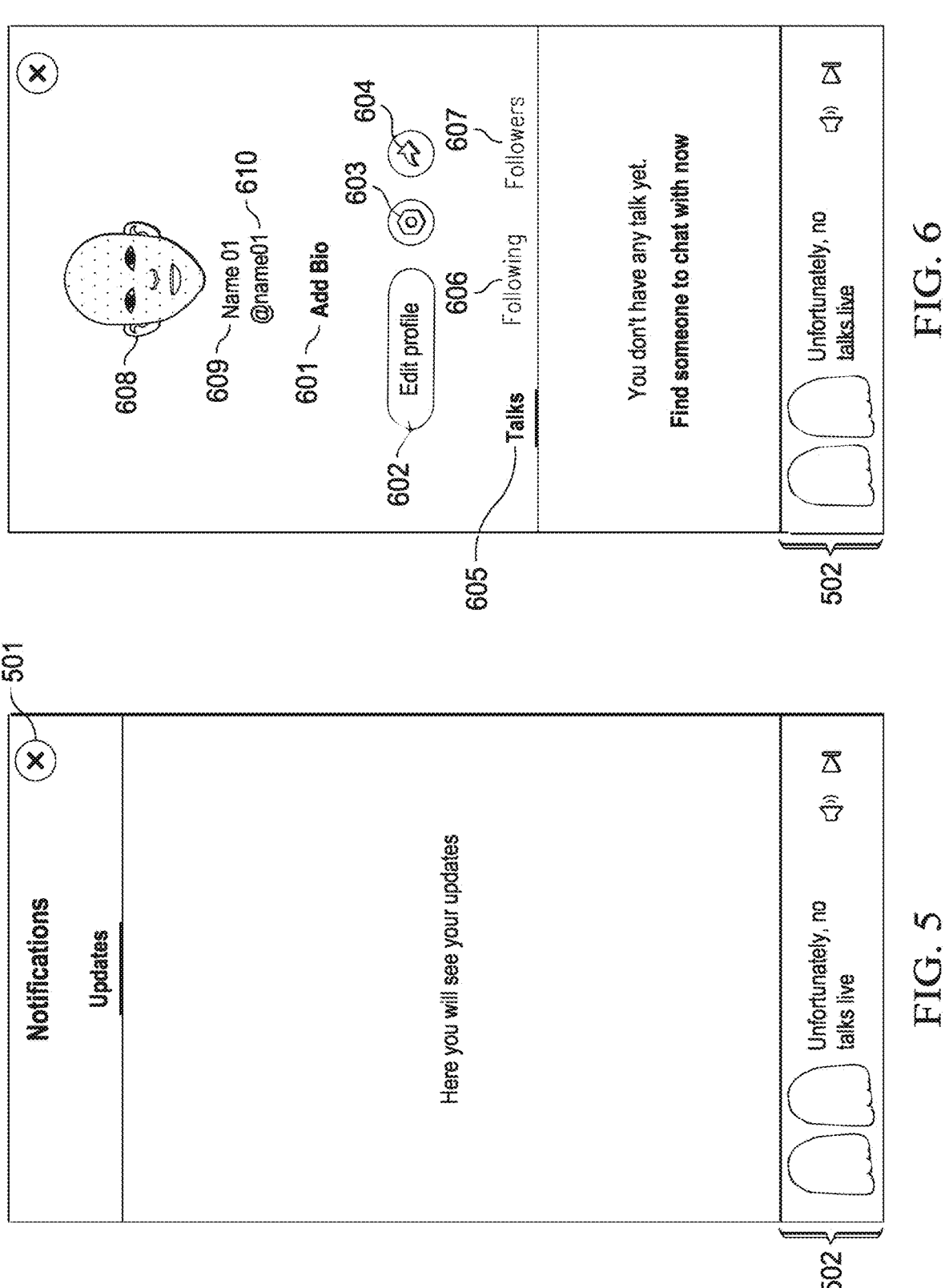

FIGS. 3 and 4 illustrate example screenshots of a home screen of a mobile application on a mobile device. From this screen, a user may choose to view notifications 308, change settings 310, search for users 302, search for talks 304 and 306, switch between conversation and listening modes 314 and 312, and/or perform another action. For example, a user may search for talks with everyone 304 as shown in FIG. 3 or talks with other users in a specific location 306 as shown in FIG. 4. The specific location may be based on a physical location (or network location) of the mobile device on which the application is being accessed, such as a continent, a country, a state, a province, a city, a town, a village, or another type of location, and/or may include an area within 5 miles, 20 miles, or another distance from the determined location. The specific location may be determined in a variety of ways, for example based on user input or automatically detected by the application (in conjunction with GPS data provided by the mobile device), and may be changed by the user. In some embodiments, the location may be determined based on a router or Internet gateway or closest cellphone tower that provides network or Internet access to the mobile device.

Figure 55:
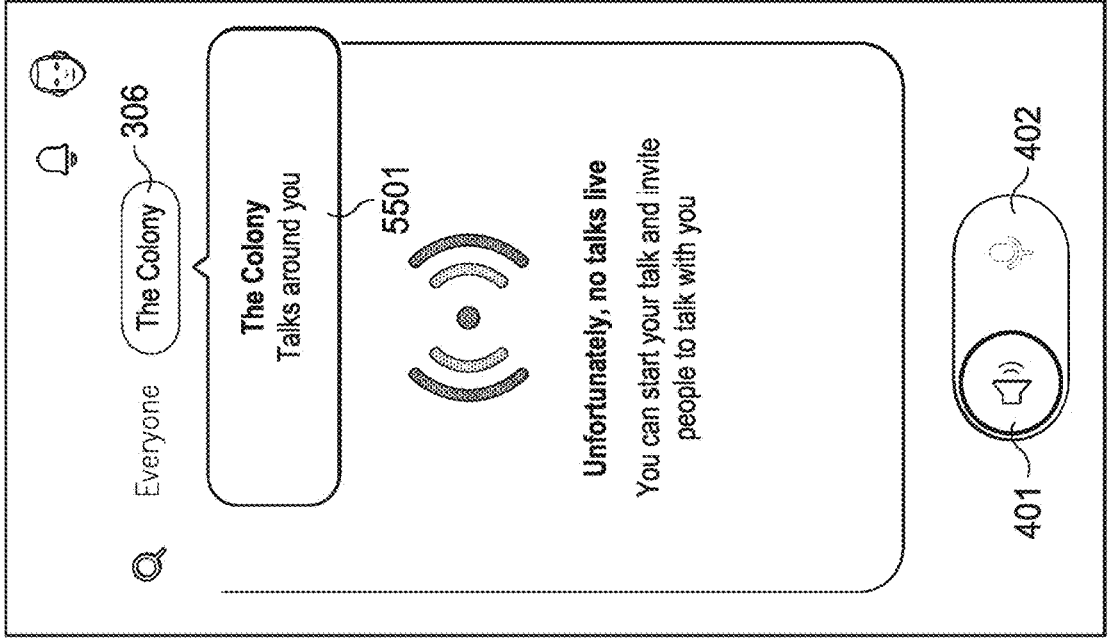
Figure 114:
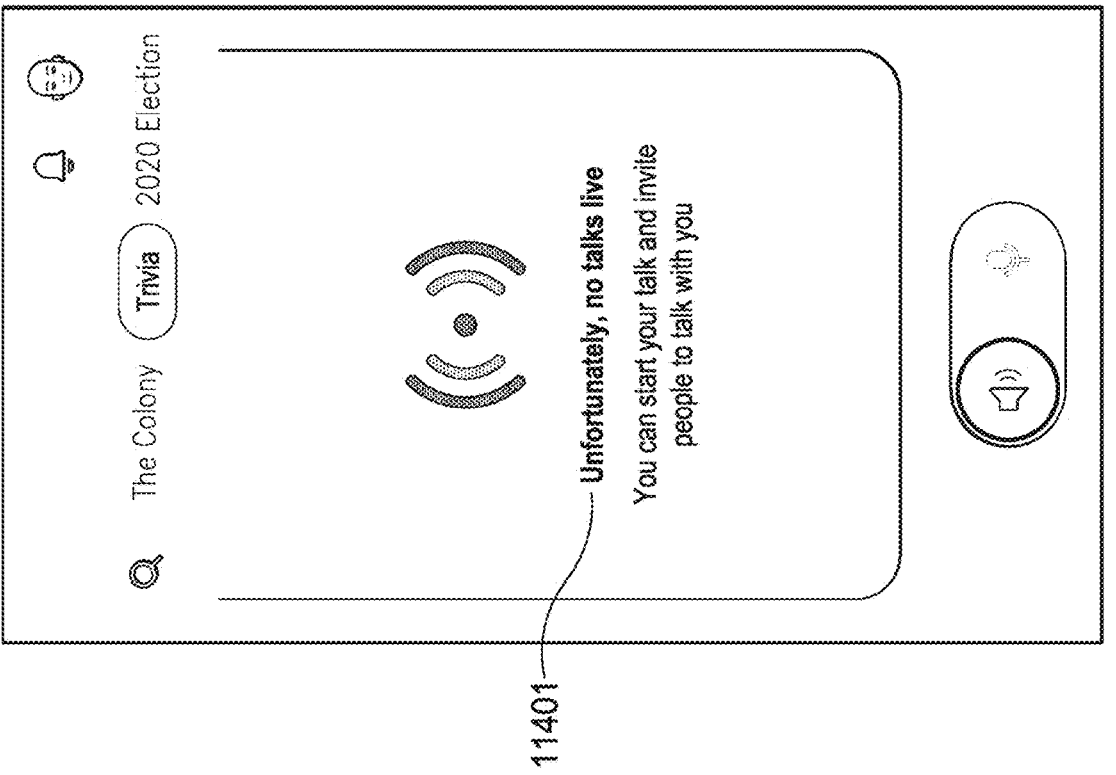

Additionally or alternatively, a user may search for another user among everyone as shown in FIG. 3, or in a specific location as shown in FIG. 4 or FIG. 55. A user may search for an audio conversation or a user using audio input. A user may search for an audio conversation or a user using text input. The terms "talk" and "audio conversation" may be used interchangeably hereinafter in this disclosure. If no live talk is going on, a message indicating there is no live talk may be displayed as shown in FIG. 3, 4, or 114. In some embodiments, an audio conversation may refer to an audio-only (no video) conversation. In other embodiments, an audio conversation may refer an audio and visual representation conversation such that the speakers in the conversation appear as visual representations (avatars, emojis, etc.) on the mobile device display screen. In still other embodiments, an audio conversation may also include video of the speakers. In some embodiments, the audio conversation includes two speakers. However, in other embodiments, the audio conversation may include just one speaker or more than two speakers, such as three speakers, four speakers, etc.

When in listening mode 314, the application may play live audio conversations using a smart data processing operations, e.g., based on one or more of a user's age, a user's demographic information, a user's membership type (free, paid, or premium), a user's interests, a user's visual representation (e.g., customized by the user based on selections provided by the application), conversation listening history (e.g., during a period), "following" users (e.g., users that the user is following), in-app information and/or history of the "following" users, followers (e.g., other users that follow the user), in-app information and/or history of the followers, current location (e.g., geographic or network location), location history, user profile information, social network information from user's connected social networks, search history (whether on the application or on a third-party site/application), time spent on application, duration of previous conversations, subjects/topics/hashtags a user may be interested in, trending topics, the user's predicted mood, etc. In some embodiments, the audio conversation starts playing without receiving approval from the user when the user is in listening mode. In some embodiments, live or historical audio conversations may be recommended to a user based on the smart data processing operation. A user may customize the home screen, e.g., hiding or un-hiding categories, editing layout of content, editing font, editing a background, editing a theme, editing colors, etc. Content of a user account may be synchronized among multiple devices including talks, user profile, followers, etc. The user's settings may be saved such that the user experience is substantially uniform regardless of the platform, operating system, etc., on which the user accesses the application and authenticates to the application.

When the user selects the notification option 308, a history 11501 and/or updates may be presented as shown in FIG. 5, 102, 115, or 116. The history may include a listen history, event history, etc. The notification updates may include new live talks, new recorded talks, new "following" events (i.e., new users that followed the users, etc.), new audio messages, and/or another type of update. When the user selects the avatar/persona/emoji icon 310, a configuration screen may be presented as shown in FIG. 6. The terms "avatar," "persona," and "emoji" may be used interchangeably hereinafter in this disclosure. In this example, the name 609 of the user is shown at the top, and the username 610 is shown at the bottom, but another type of arrangement of the name and username is also possible. From this screen, the user may select from a variety of options, e.g., "Add Bio" 601, "Edit profile" 602, "Change settings" 603, "Share profile" 604, "Talks" 605, "Following" 606, or "Followers" 607. Live talks (e.g., talks that the user is participating in or listening to right now) and/or historical talks (e.g., talks that the user previously participated in or listened to) may be displayed under the "Talks" category 605. In an embodiment, public live talks and/or historical talks may be published on a curated conversation-publication platform, such that a user may search for conversations and listen to them. A user may name/categorize a talk, group talks, and/or name/categories different groups of talks, or names or categories may be automatically assigned by the application or the applications server based on an analysis of the talk. Talks may be sorted based on various parameters such as a number of participant(s), name(s) of participant(s), public or private settings, length of a talk, name of a talk, number of listeners, text extracted from a talk, subject of a talk based on analysis of content of the talk, or date, etc.

Figure 8:
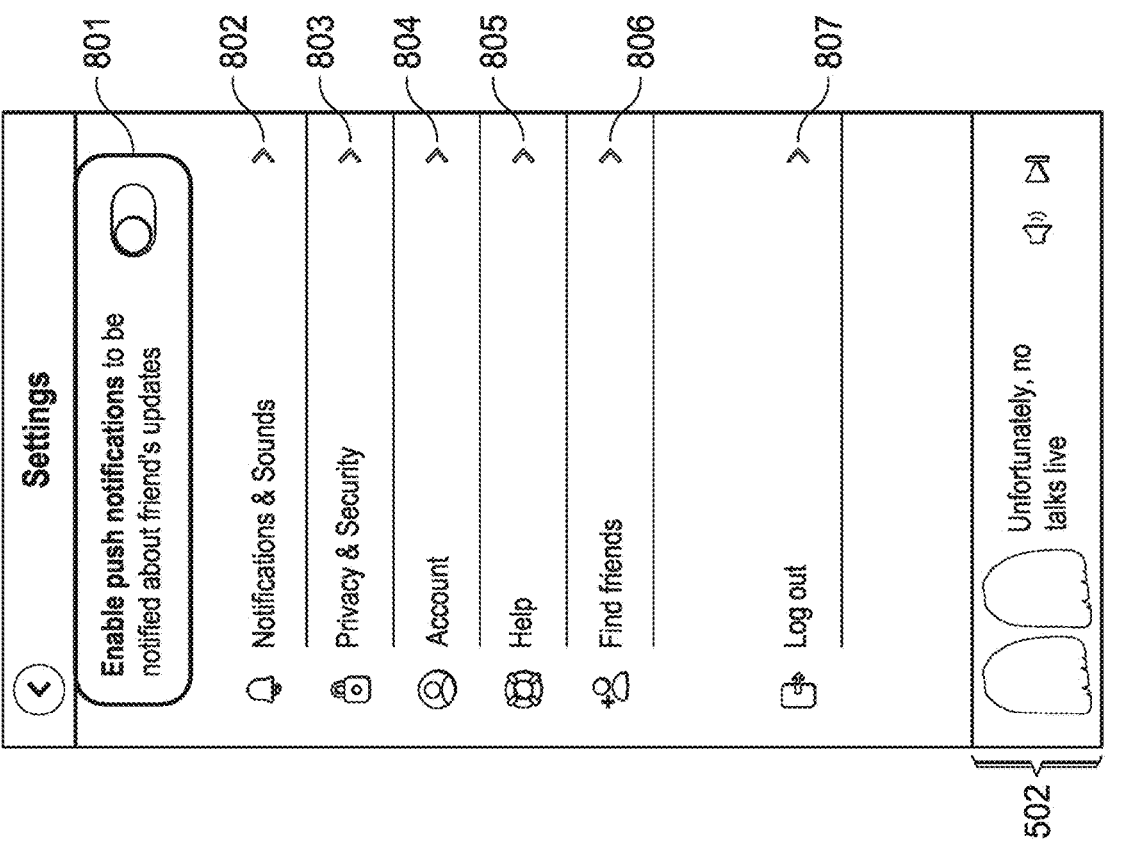
Figure 7:
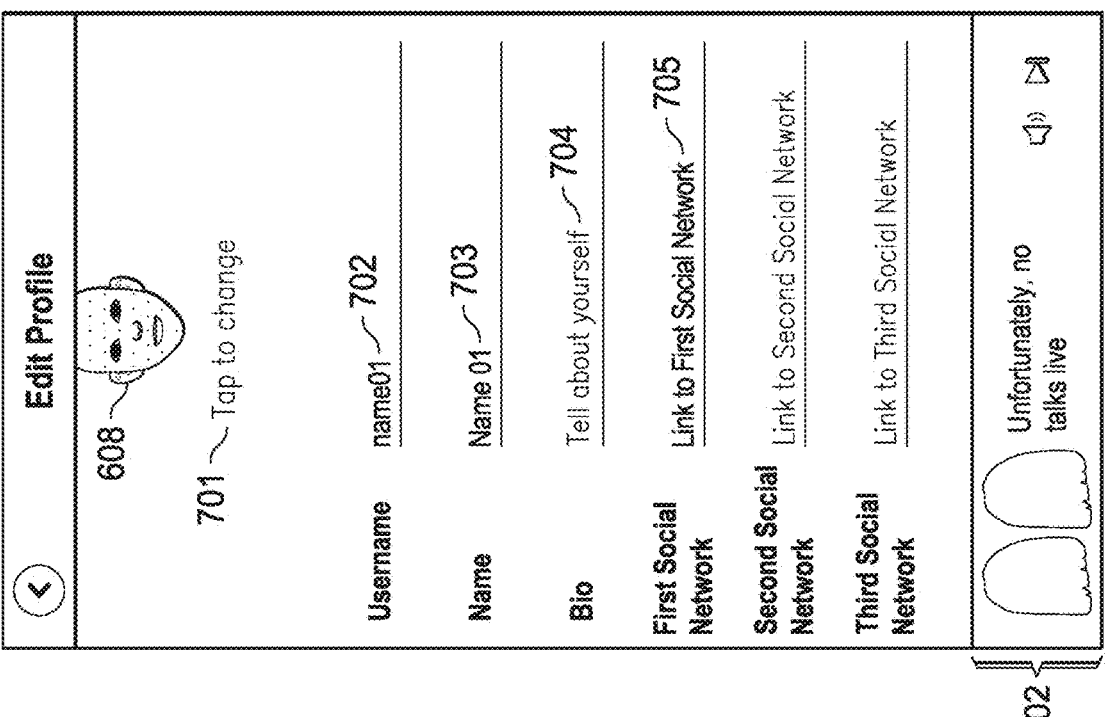

If the user selects the "Edit profile" option 602, a screen for editing the user profile may be presented as shown in FIG. 7. The user may edit the username 702, edit the name 703, edit the bio 704, select a "Tap to change" option 701 to edit the avatar 608, link/unlink to a social media account 705, link/unlink to a social network channel, or perform another function. If the user selects the "Change settings" icon 603, a variety of options may be presented as shown in FIG. 8 such as a "Enable push notifications" option 801 (e.g., such that notifications from the application are presented on a display screen of the mobile device (and/or sound is played) when the mobile application is not in use and the user needs to be notified of activity on the application), "Notifications and sounds" option 802, "Privacy and Security" option 803, "Account" option 804, "Help" option 805, "Find friends" option 806, or "Log out" option 807. A version number of the application may also be shown on this screen.

Figures 9, 10:
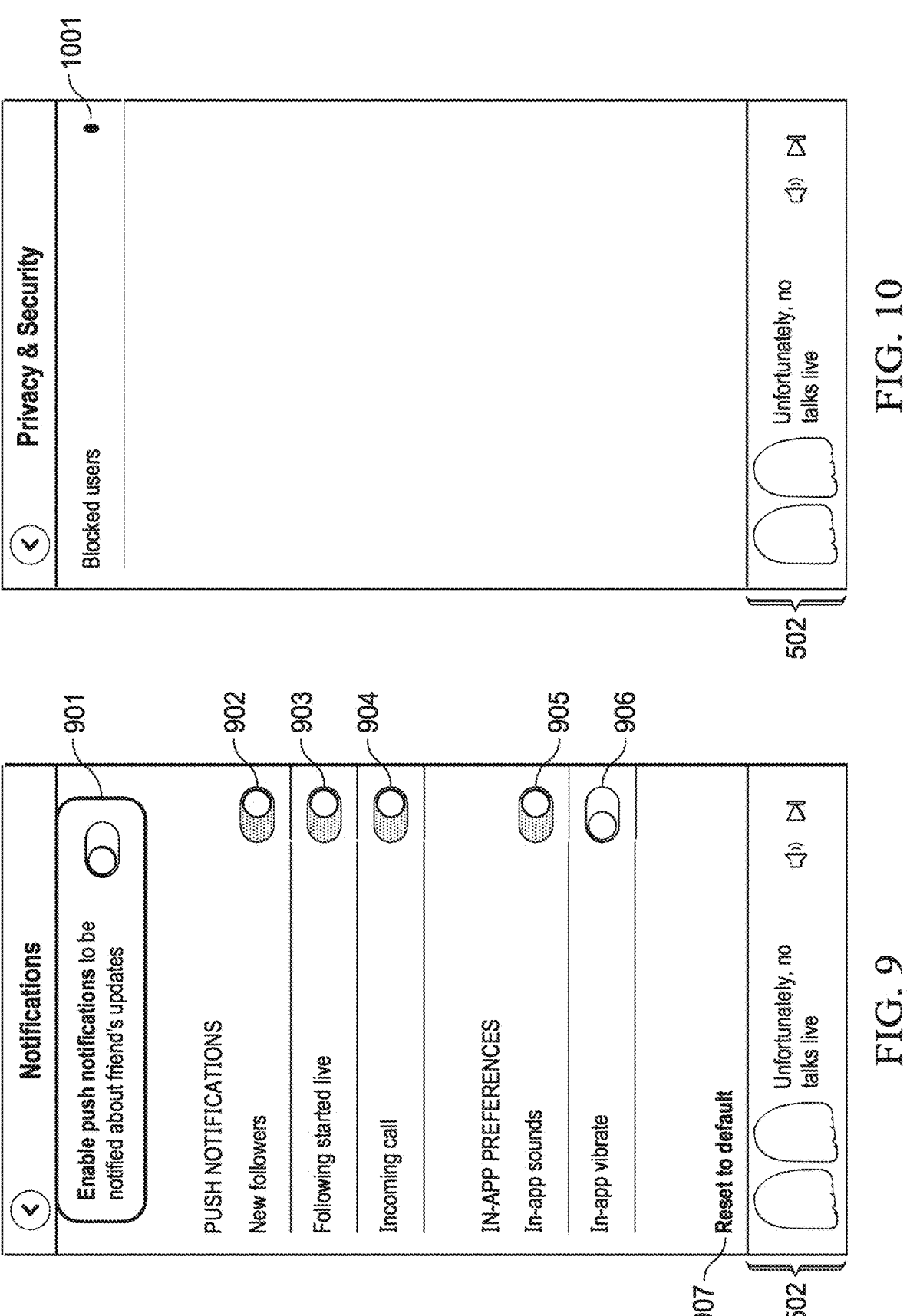

If the user selects the "Notifications and sounds" option 802, a variety of elements of the notifications and sounds settings may be displayed as shown in FIG. 9. The elements may include enable or disable options of new followers 902 (e.g., for notifications associated with the new followers' activities on the mobile application), following started live 903 (e.g., for notifications associated with other users that the user follows), incoming call 904, in-app sounds 905, or in-app vibrate 906, a "Reset to default" icon 907, or another element.

Figures 11, 12:
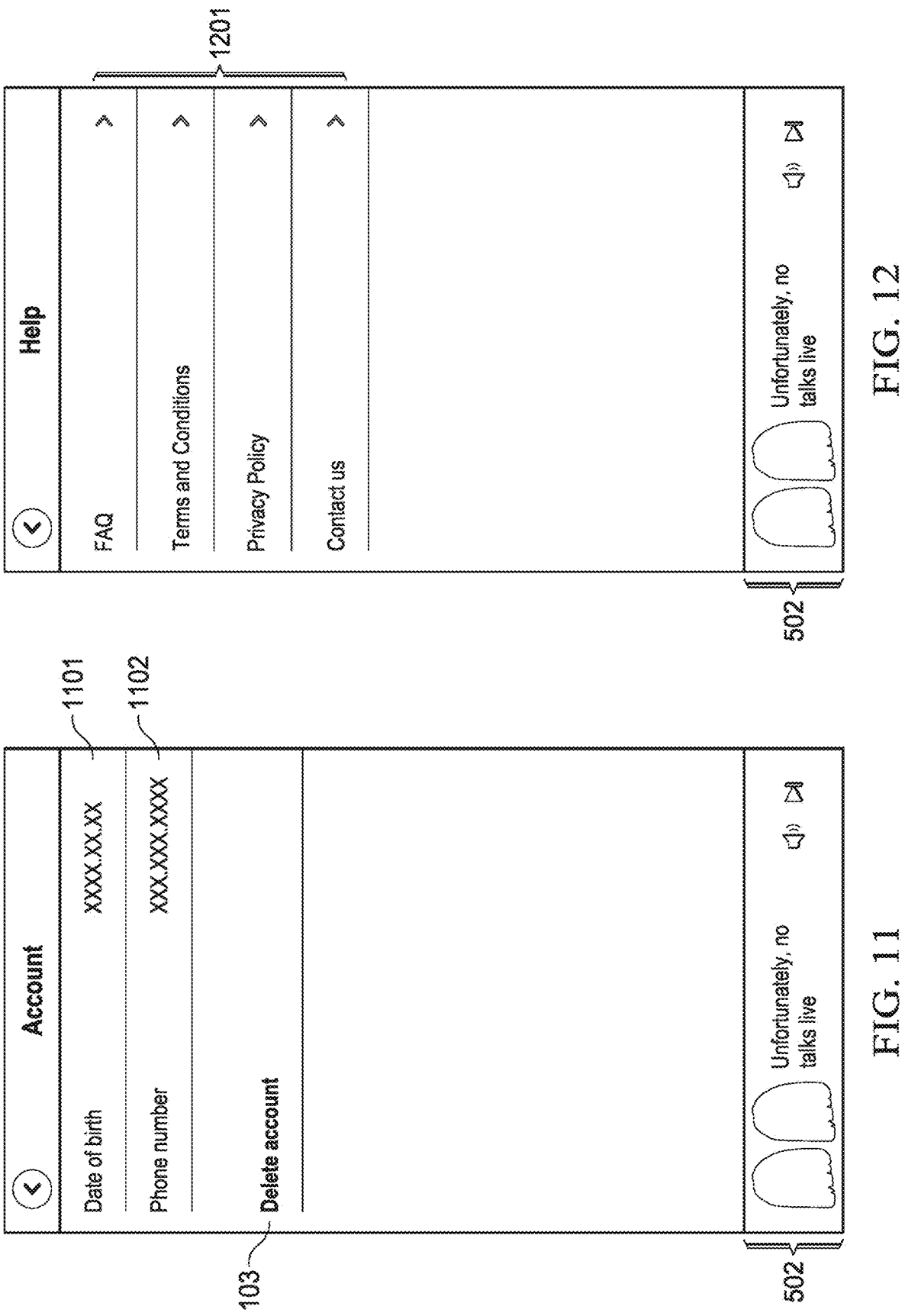
Figure 95:
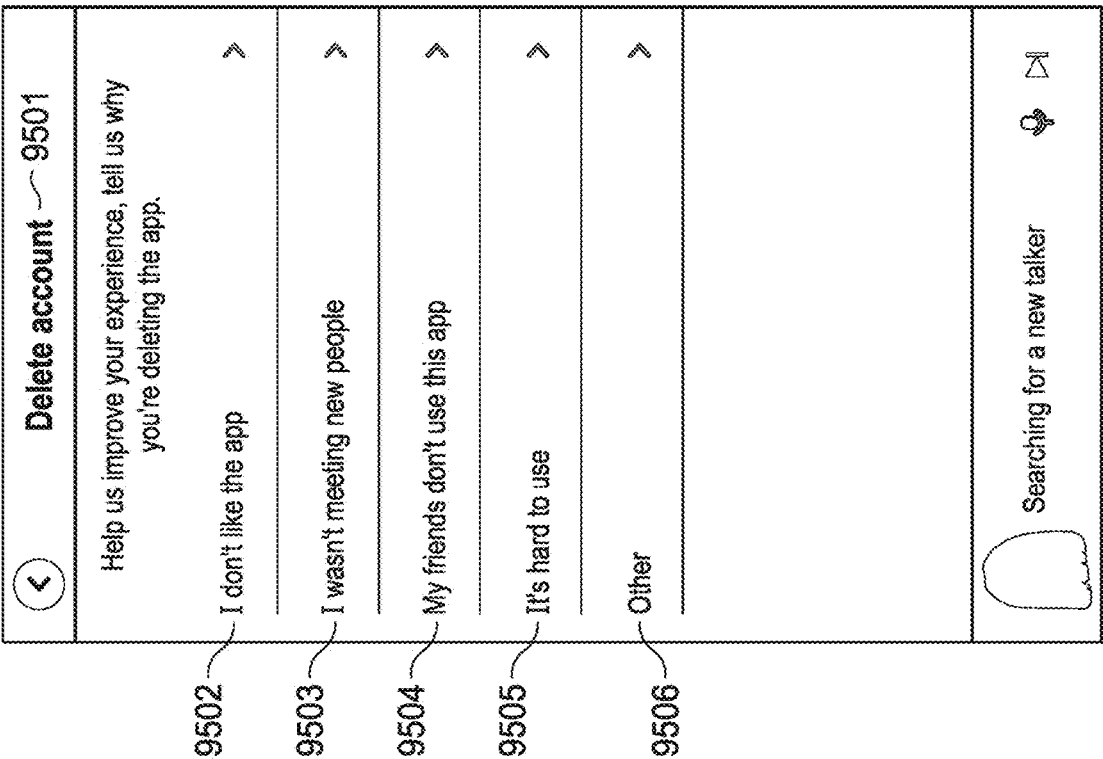
Figure 94:
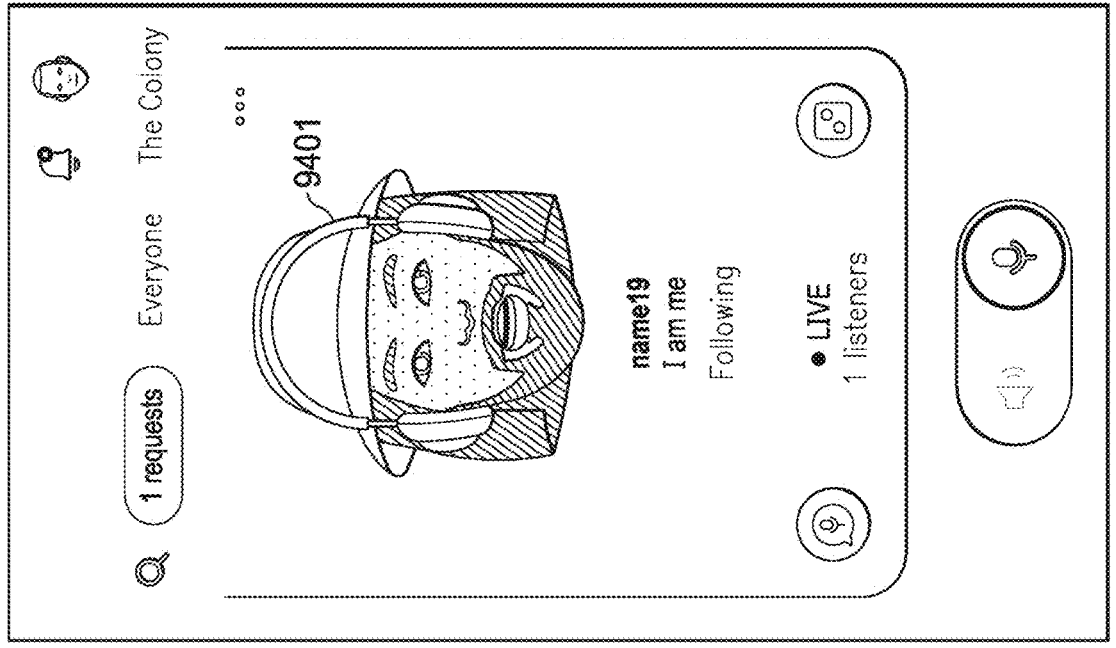
Figure 97:
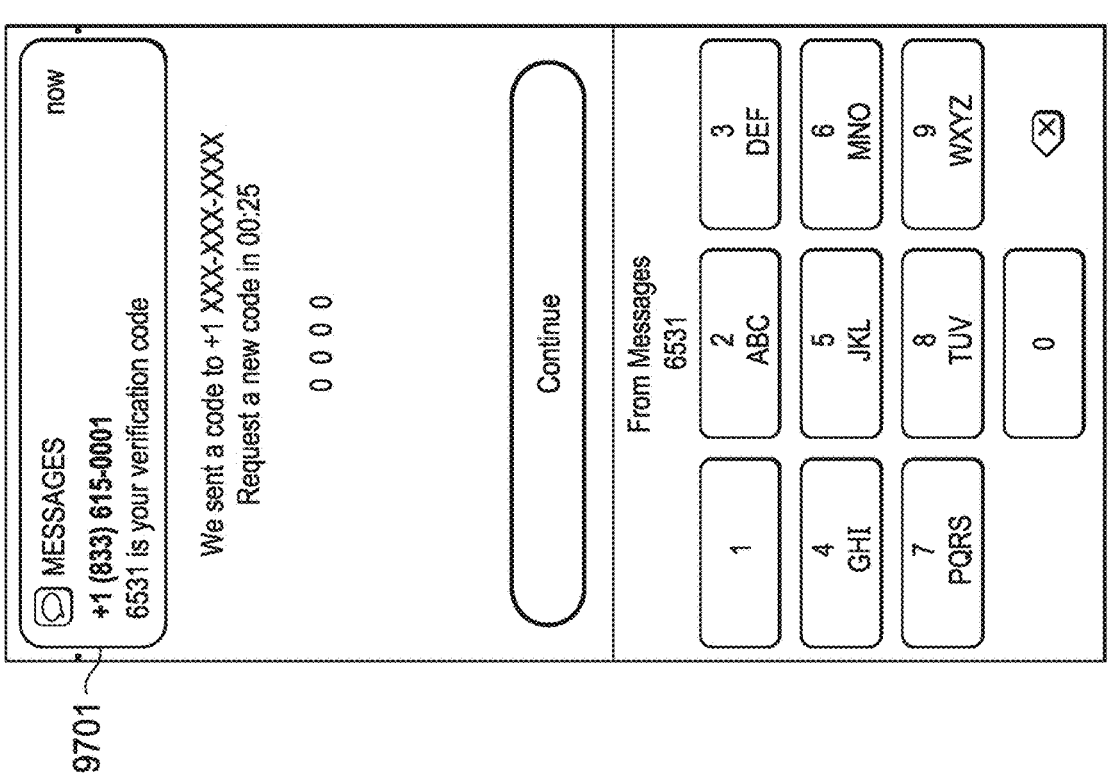

If the user selects the "Privacy and Security" option 803, elements of the privacy and security 803 settings may be displayed as shown in FIG. 10 such as a "Blocked users" icon 1001 or a white-listed users icon. The user may enable or disable being found by contacts through his/her phone number, auto adding contacts as friends, being auto added by contacts as friends, etc. The user may configure viewing privileges of content such as talks, user profile, location, followers, "following" users, or contact information for individual followers (or following users) or groups of followers (or following users). The user may configure displaying options of content such as talks, user profile, location, followers, "following" users, or contact information for individual "following" users or groups of "following" users. If the user selects the "Account" option 804, elements of the "Account" 804 settings may be displayed as shown in FIG. 11, such as "Date of birth" 1101, "Phone number" 1102, or "Delete account" 1103. The user may edit the date of birth or phone number, or delete the account. When a user selects the "Delete account" option 1103 in FIG. 11 or 9501 in FIG. 95, a variety of reasons may be presented to the user, e.g., "I don't like the app" 9502, "I wasn't meeting new people" 9503, "My friends don't use this app" 9504, "It's hard to use" 9505, or "Other" 9506.

Figures 13, 14:
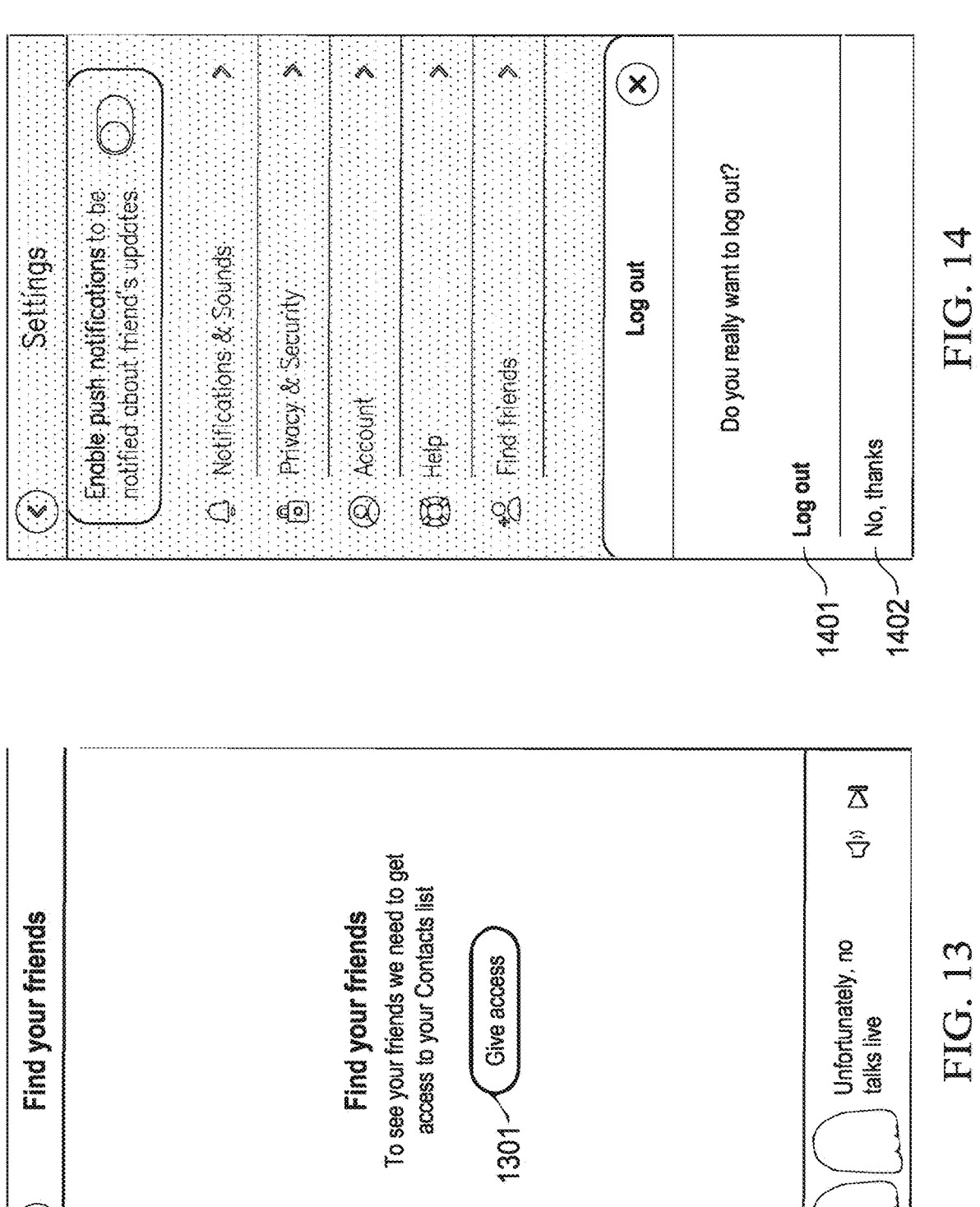

If the user selects the "Help" option 805, elements of the "Help" option 805 may be displayed as shown in FIG. 12 such as FAQ (frequently asked questions), terms and conditions, privacy policy, or contact us. If the user selects the "Find friends" option 806, elements of the "Find friends" 806 may be displayed as shown in FIG. 13 such as a "Give access" option 1301. In an embodiment, the "Give access" option 1301 grants the mobile application access to the contacts list of the user or the user equipment so that the mobile application may extract friends from the contacts list. In another embodiment, the "Give access" option 1301 may grant the mobile application access to the friends list of a linked social media account and may extract friends from the linked social media account. If a contact is blocked on the contacts list, the corresponding account or user in the application may not be displayed. If the user selects the "Log out" option 807, a pop up window may be displayed for the user to confirm the log out process or choose to go back to the previous screen as shown in FIG. 14.

Figures 15, 16:
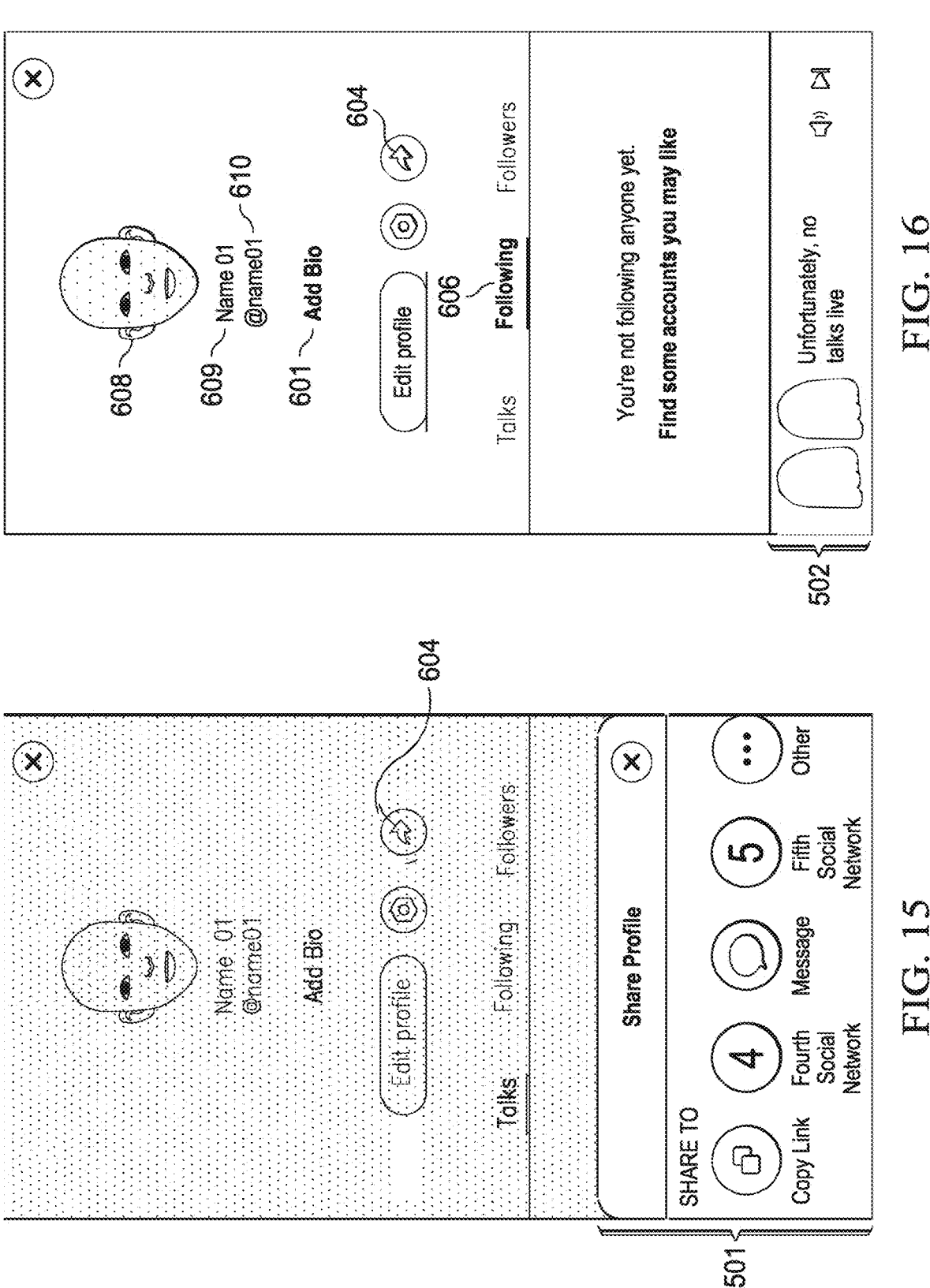
Figures 17, 18:
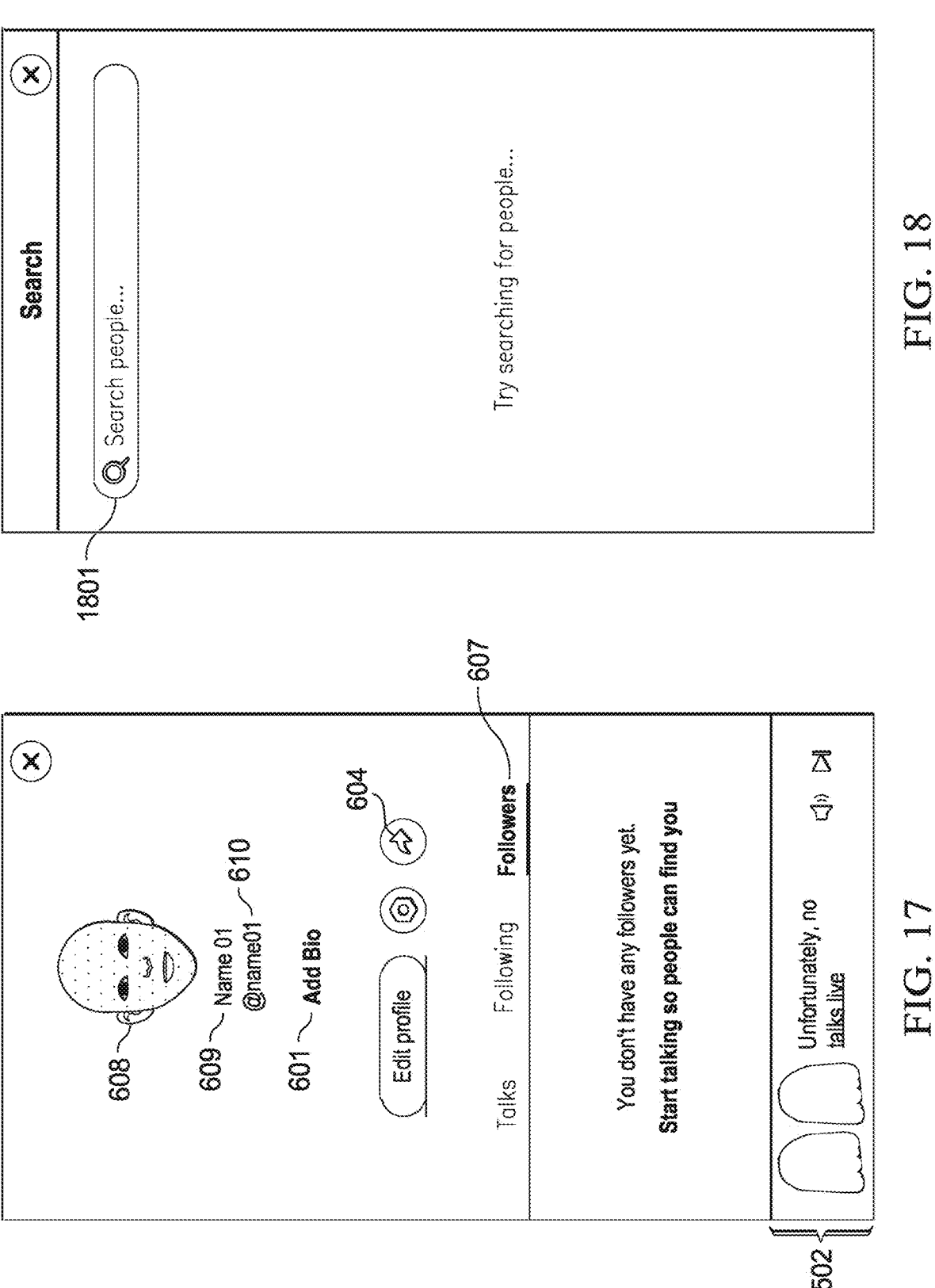

If the user selects the right arrow icon 604, a share profile screen may pop up as shown in FIG. 15. The user may choose to copy a link for profile sharing, share his/her profile to an instant message application or social media network, or perform another function to share the profile. If the user selects the "Following" icon 606, a screen of "following" users may be presented as shown in FIG. 16. If the user selects the "Followers" icon 607, a screen that displays followers of the user may be presented as shown in FIG. 17. The user may organize the "following" users and/or followers into groups. The user may initiate talks with individual users or groups of users such as individual "following" users, individual followers, groups of "following" users and/or followers.

Figure 20:
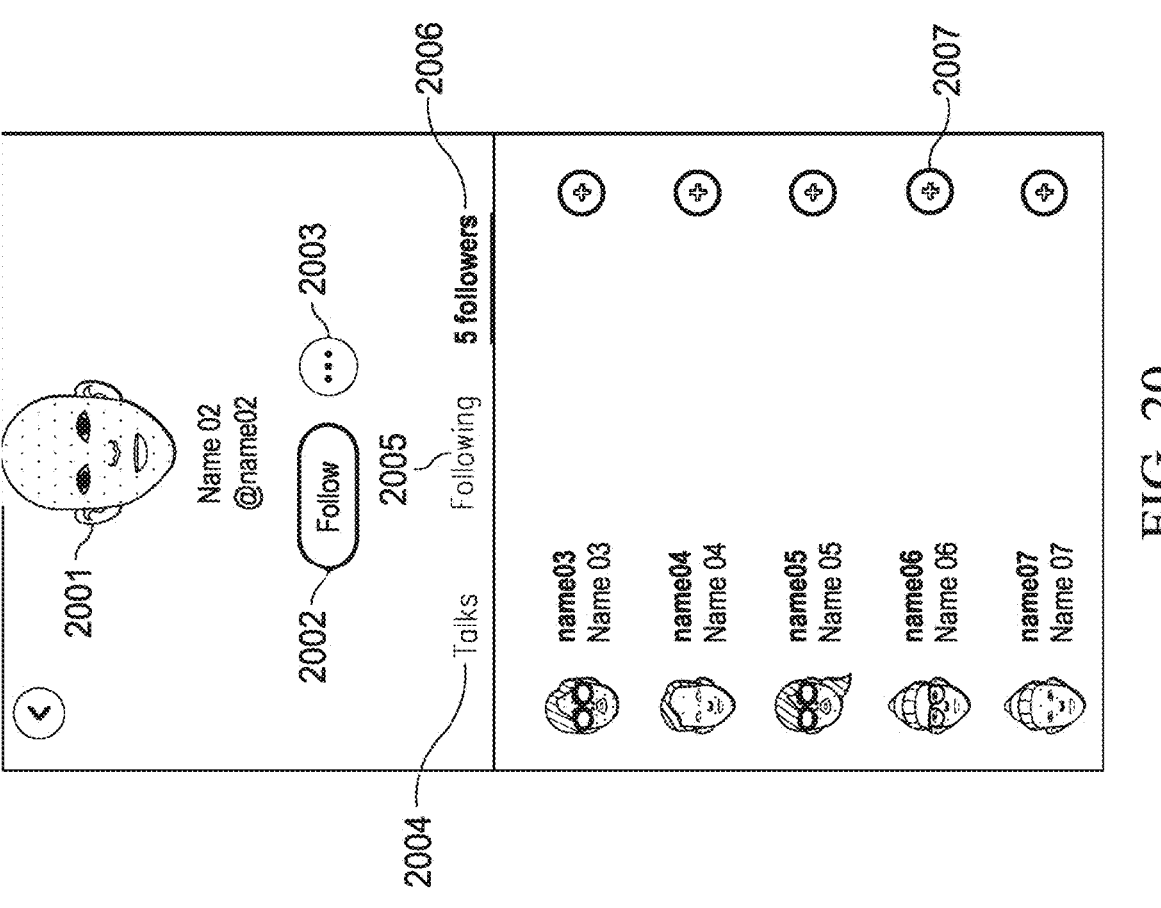
Figure 19:
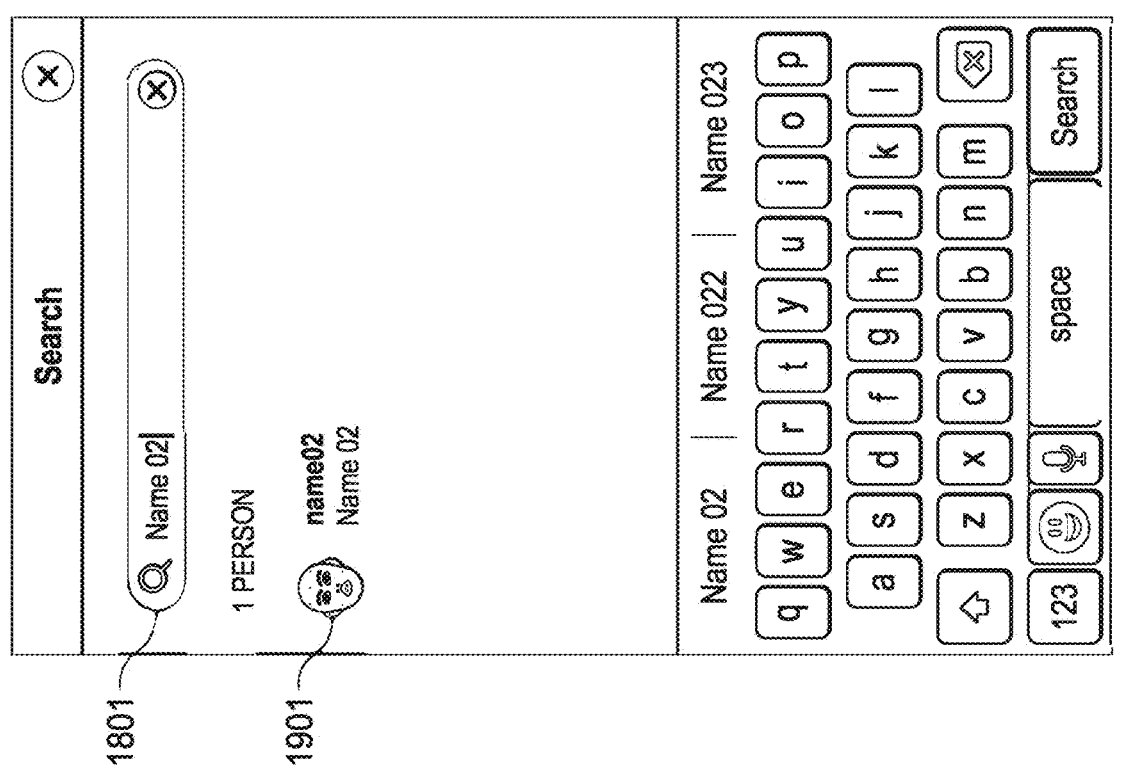

If the user selects the search icon 302 on the home screen of the application, a search bar 1801 may be presented as shown in FIG. 18. As shown in FIG. 19, a user may input keywords such as letters, numbers, or special characters into the search bar 1801 and search for a user/account/group of users. If the user uses a string of characters as a keyword, accounts comprising the string of characters in their user-name or name may be displayed as search results. In this example, when the user searches for "Name 02," an account with "name02" as part of its username is found. When the newly found user "name02" is selected, different aspects of the user "name02" may be presented as shown in FIG. 20. Here the five followers of the user "name02" are displayed with a plus icon next to each of the followers. A first user may add a second user by selecting the corresponding plus icon. In this example, a follower with a username "name06" and name "Name 06" is added by the user and the plus icon next to the follower "name06" changes to a check mark as shown in FIG. 21.

A follower may receive updates regarding the user being followed, the "following" user, on a variety of categories such as new live talks, new recorded talks, profile updates, location updates, updates for followers of the "following" user, updates for the "following" users of the "following" user, name updates, username updates, or bio updates. The follower and/or the "following" user may enable notifica-tions for updates on one or more of the above individual categories. The user "name06" may be added directly or with permission from the user "name06." In other words in some embodiments, the plus icon next to the follower may be displayed as pending before it changes to a check mark.

Figures 21, 22:
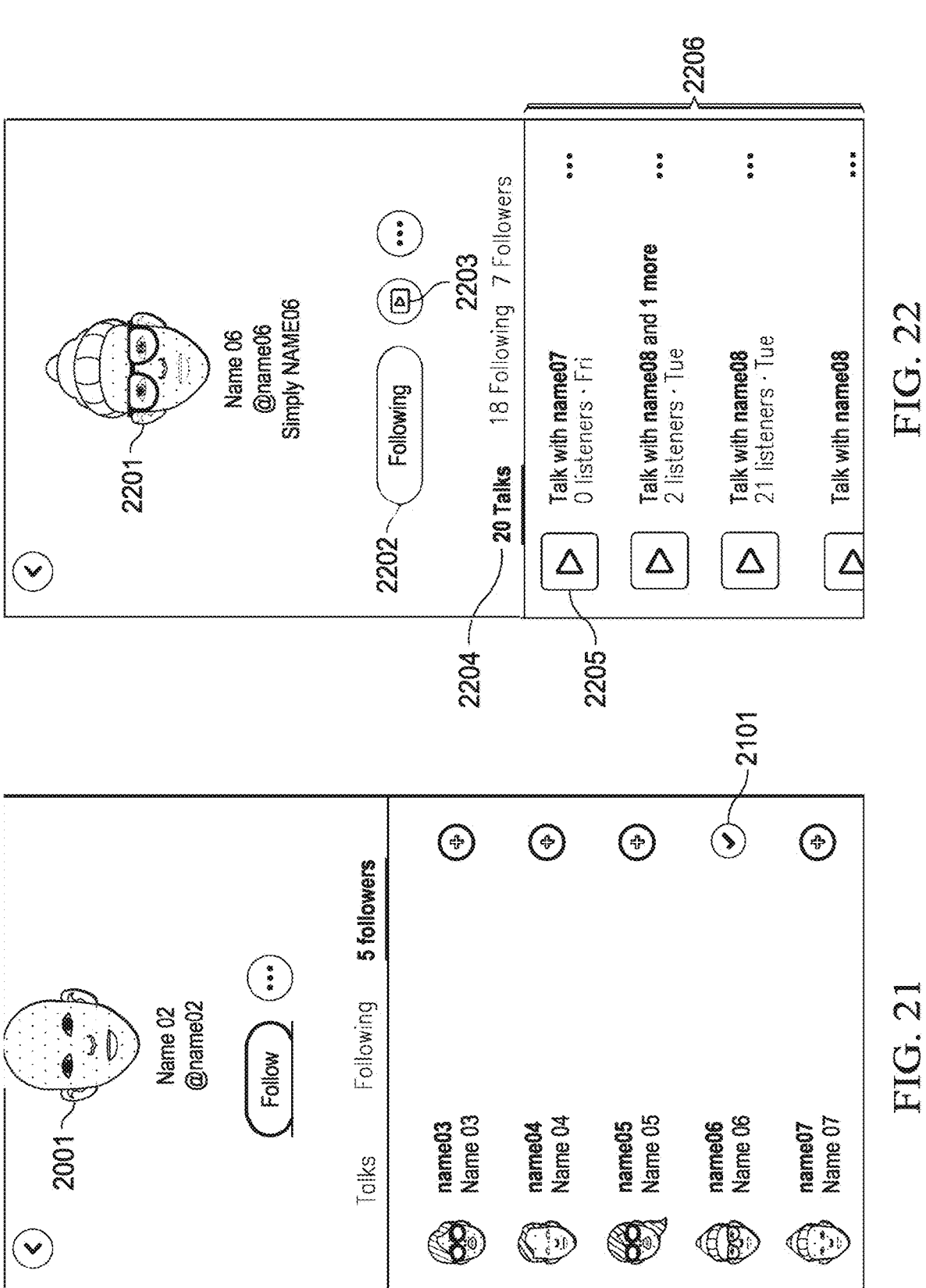
Figure 23:
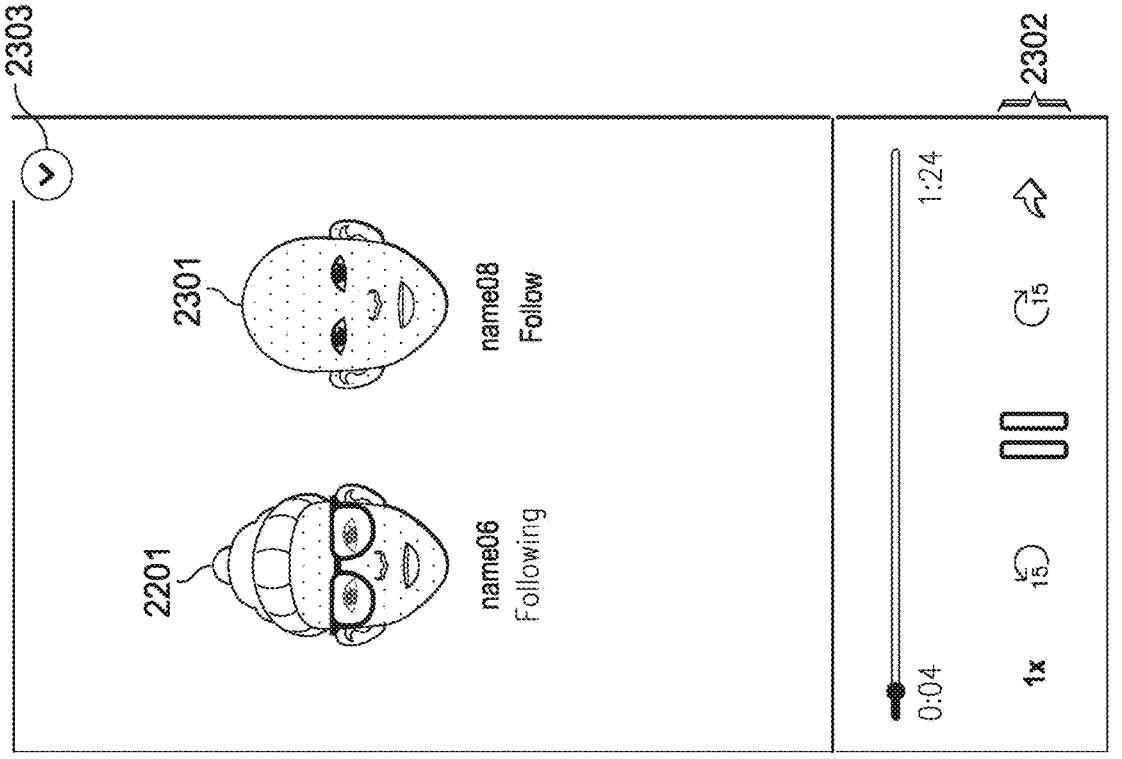
Figure 58:
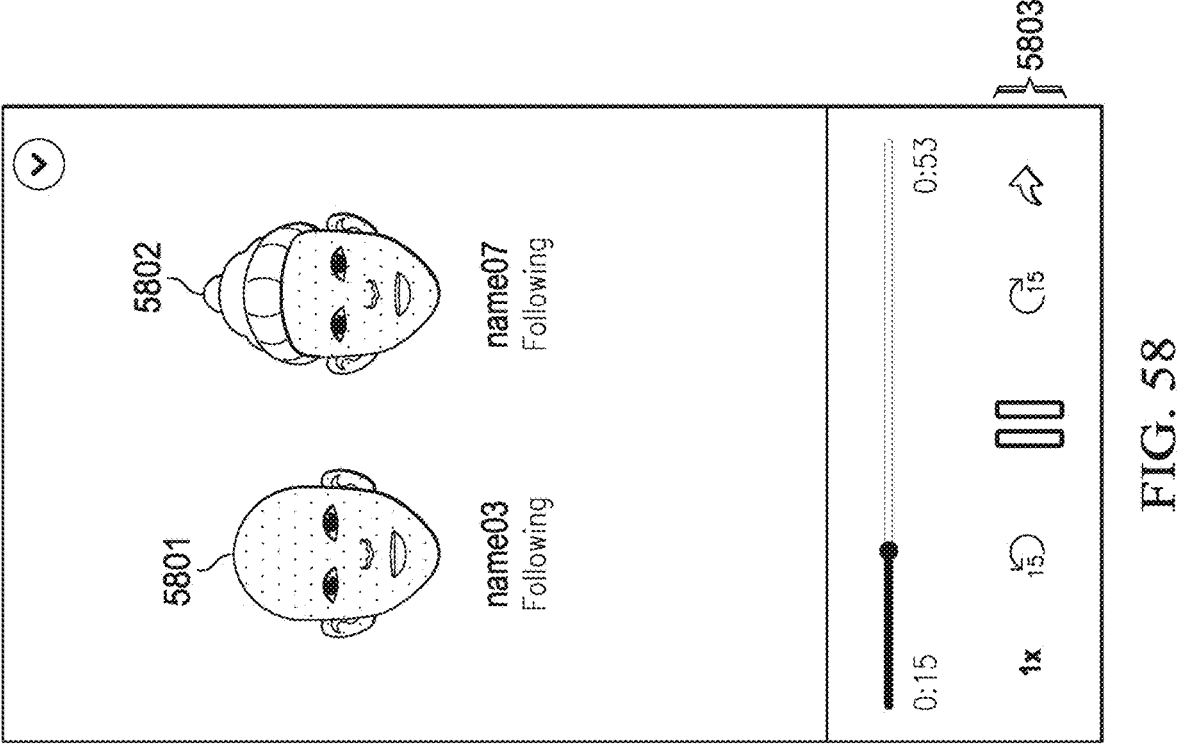
Figure 57:
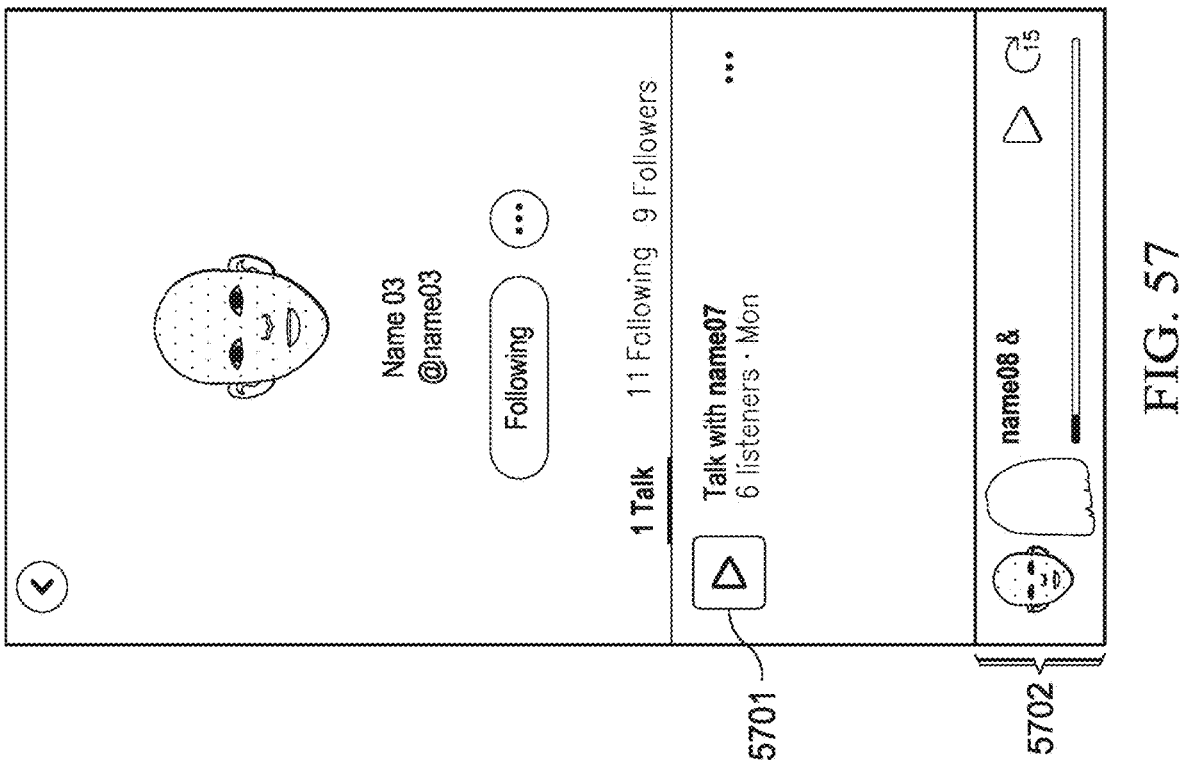
Figure 60:
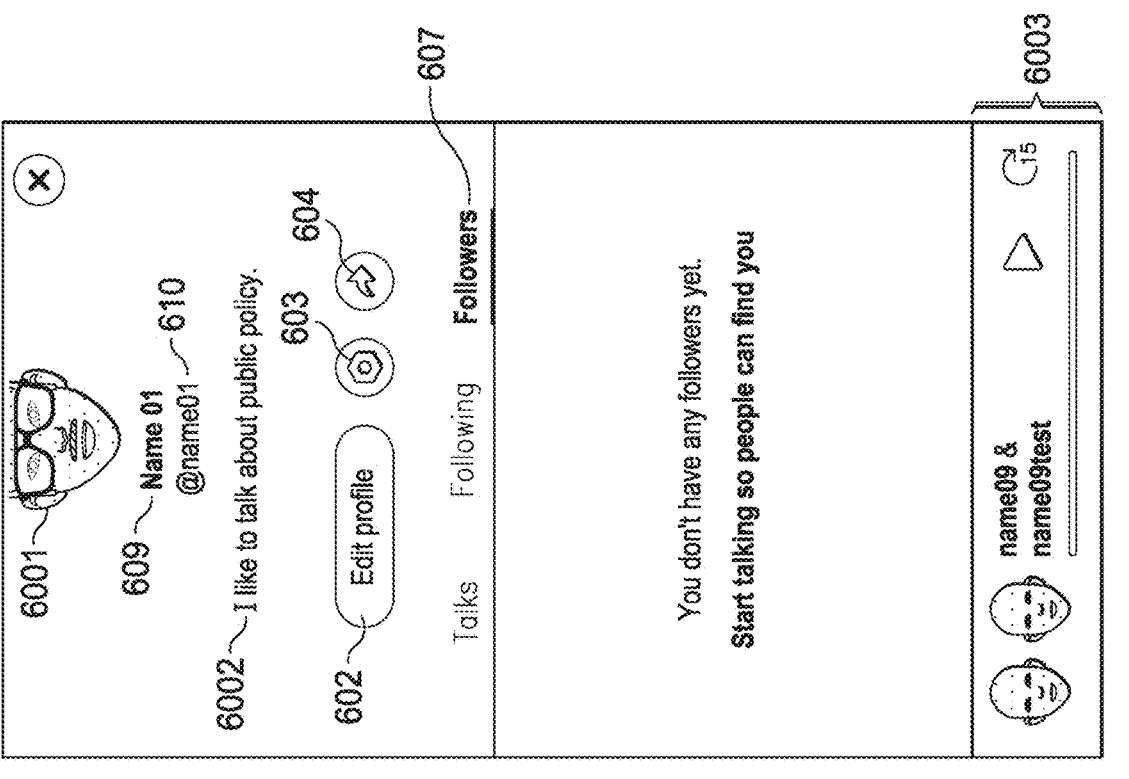

An information page for the second user "name06" may be presented as shown in FIG. 22 if the first user selects the emoji of the second user. Since now the first user is following the second user, a "Following" icon 2202 is displayed on the information page of the second user. The first user may unfollow the second user by selecting the "Following" icon. The information page as shown in FIG. 22 or FIG. 57 may include a username of a user, a name, a description/bio of the user, a talks icon for a list of talks associated with the user, a following icon for a list of "following" users, and/or a followers icon for a list of followers. The list of talks may include public talks that are visible to everyone, private talks that are visible only to following user and/or followers of the profile owner of the information page, etc. In an embodiment, the profile owner may edit viewing privilege of individual public and/or private talks. In an embodiment, the number of listener(s) or usernames of the listener(s) associated with the talks may be displayed, e.g., with permission from the listener(s) and/or the speaker(s). The number of listeners of a recorded talk may be the number of listeners of the talk when it was live, or the number of listeners of the talk after it is recorded, or the total number of listeners of the talk whether when it was live or recorded. The information page may also include an icon indicating the first user is following the user "name06." By selecting one from the list of talks from "name06," the first user may listen to the selected talk. For example, if the user taps a "talk with ###" icon, a screen for playing back the recorded talk may be presented as shown in FIGS. 23, 58 with emojis of both "name06" and the other speaker and/or a playback control bar 2302, 5803 with various function icons. In some embodiments, the emojis remain static during the playback. In other embodiments, the emojis change shape or form during the playback based on the speech being stated by the user. In some embodiments, artificial intelli-gence functions may be used to indicate emotion, mood, feedback, etc., by the non-speaking user when the other user speaks. Any and all functions described herein are appli-cable equally to live and recorded talks. The function icons may include fast forward, rewind, playback speed, play, pause icons, and/or a playback progress bar. A following/follow icon may be displayed indicating whether or not each of the speakers is a "following" user (i.e., the user follows the speaker) or may allow the user to follow a speaker. In some embodiments, the user may be able to select the "following" icon to unfollow the speaker.

Live or recorded audio conversations may be analyzed and/or manipulated where needed, e.g., to adjust accent or tone, to block 'bad' words, to create hashtags or another searchable parameter, to create trending topics, etc. The analysis or manipulation of audio conversations may be performed by at least one of the application server or the mobile application. In an embodiment, a user may be provided with functionality to analyze and/or manipulate the audio conversations. For example, a user may edit a recorded audio conversation by filtering out certain words, clipping the length of the conversation, adjusting the user's voice such as an accent, etc. In some embodiments, these functions may be automatically performed by the mobile application (e.g., in conjunction with the applications server) and may be implemented when the user is operating the application in conversation mode.

Audio or visual advertisements may be delivered in the mobile application using a smart data operation, e.g., based on one or more of a user's age, a user's demographic information, a user's membership type (free, paid, or pre-mium), a user's interests, a user's emoji, conversation lis-tening history, "following" users, in-app information and/or history of the "following" users, followers, in-app informa-tion and/or history of the followers, current location, loca-tion history, user profile information, social network infor-mation from user's connected social networks, search history (whether on the mobile application or on a third-party site/application), time spent on app, duration of pre-vious conversations, a user's mood, subjects/topics/hashtags a user may be interested in, trending topics, prior ad-presentation history, ad preferences set by user, etc. In some embodiments, the advertisements may be referred to as targeted communications. In some embodiments, a user may select to opt out of such targeted communications. The targeted communications may be presented in visual or audio form, and may be presented on any user interface described herein or in conjunction with any user interface described herein.

Figure 88:
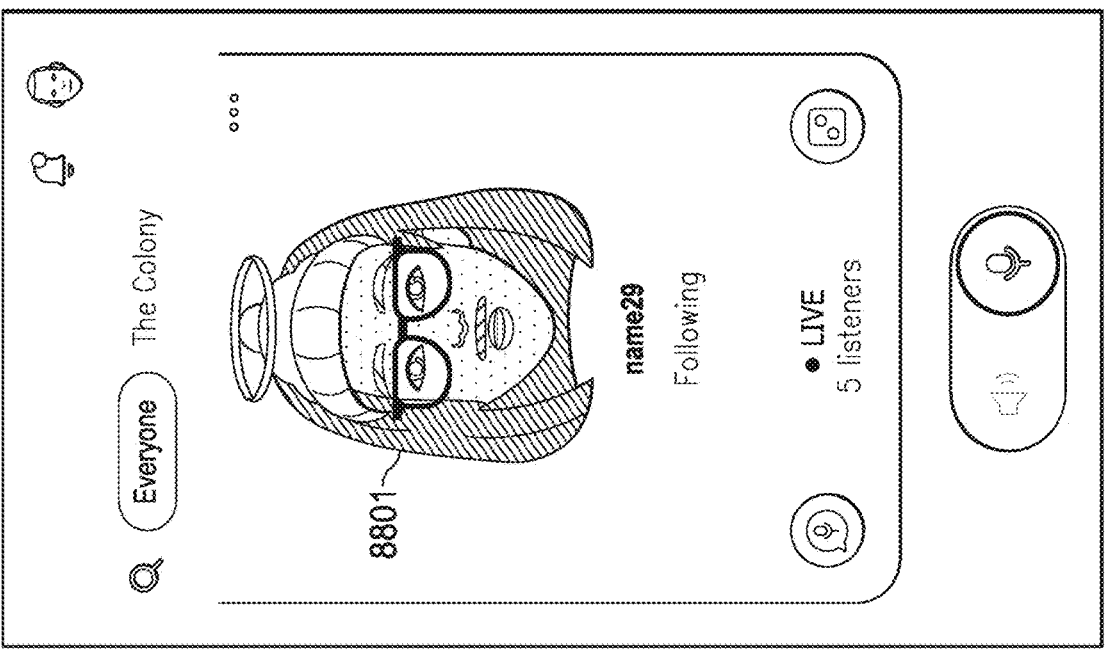

Mouth shapes, facial expressions, or moods of an emoji may change according to words being said, content of the talk, tone of the talk, and/or another factor of the talk as shown by an emoji 8801 in FIG. 88, e.g., just like a person would change the mouth shapes, facial expressions, and/or moods when talking in real life or on a video call. In some embodiments, the mouth or lips associated with a user's visual representation may move, or change shape or form when the user speaks, and the mouth or lips associated with the user's visual representation may not move, and not change shape or form when the user does not speak, during the audio conversation. Proper changing of the mouth shapes, facial expressions, or moods of the emoji may be implemented with artificial intelligence (AI) operations. Even though an emoji (or avatar) is discussed here as an example of a graphical visual representation of a user, it should be appreciated that other types of graphical visual representations of the user are also possible. It should also be appreciated that other ways of implementing hardware and/or software described in this disclosure are possible, e.g., by a physical device such as a toy radio or talking doll. For example, any of the devices described herein may be embedded in a toy radio or talking doll. Audio-only avatars may better help people with psychological barriers and/or hearing problems compared to video conferencing or radios.

Figure 30:
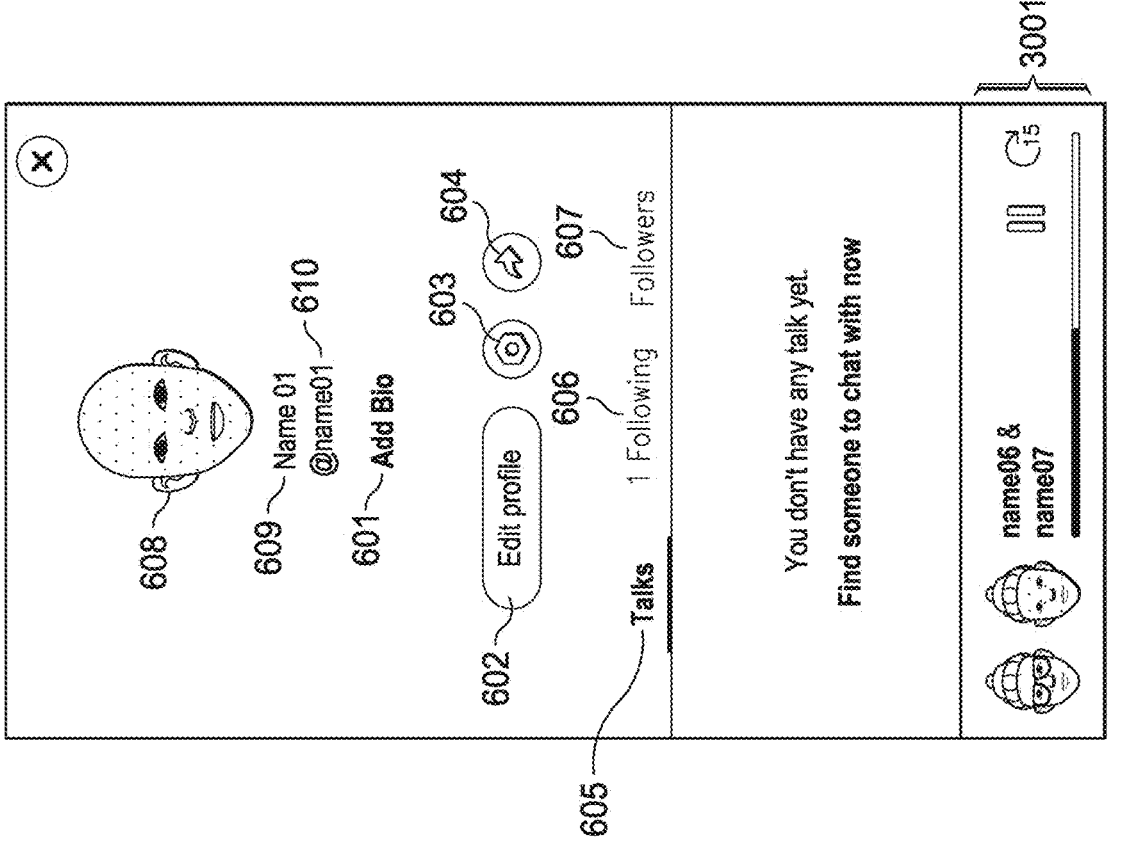
Figure 48:
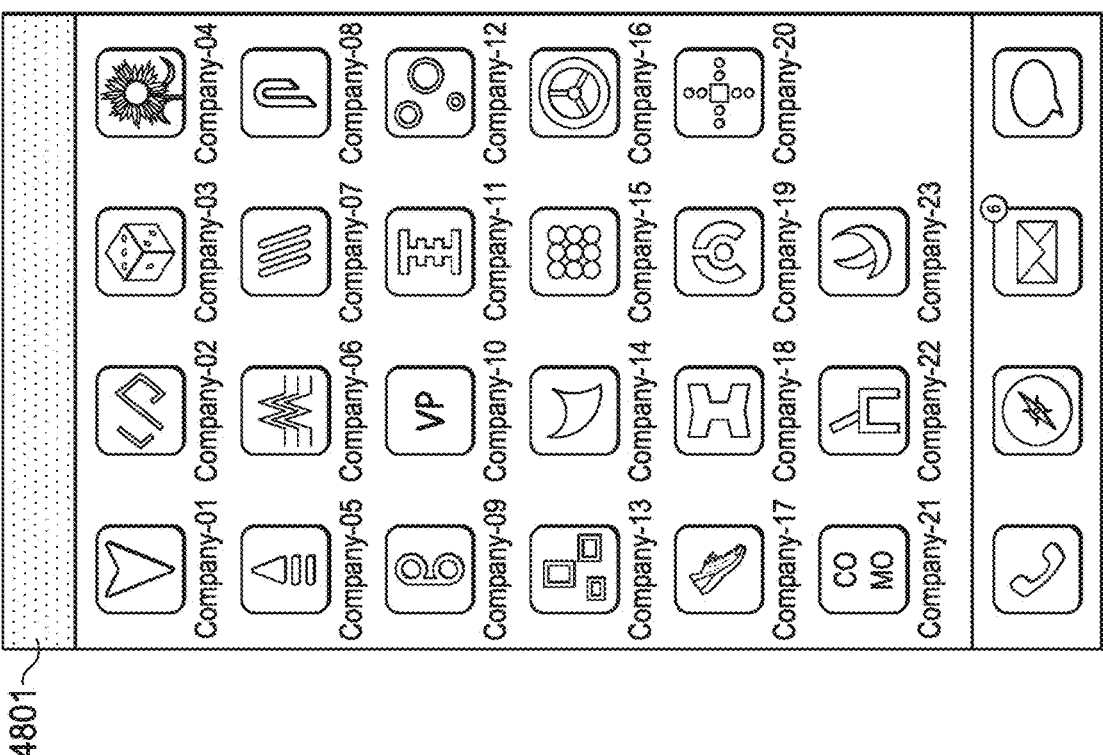
Figure 52:
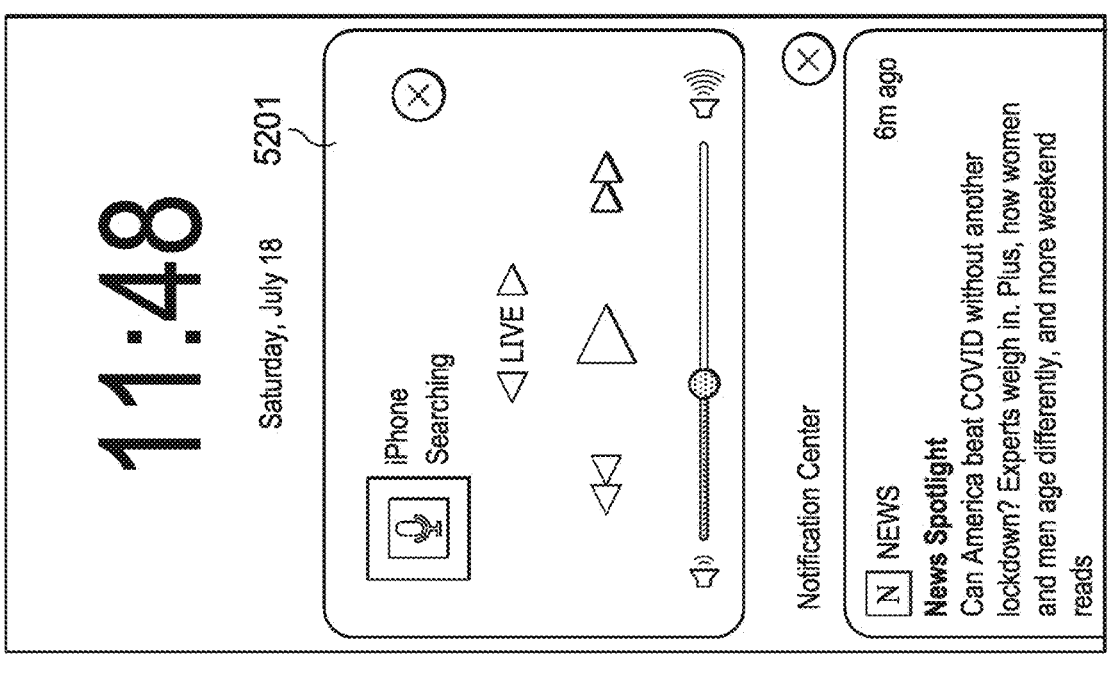
Figure 51:
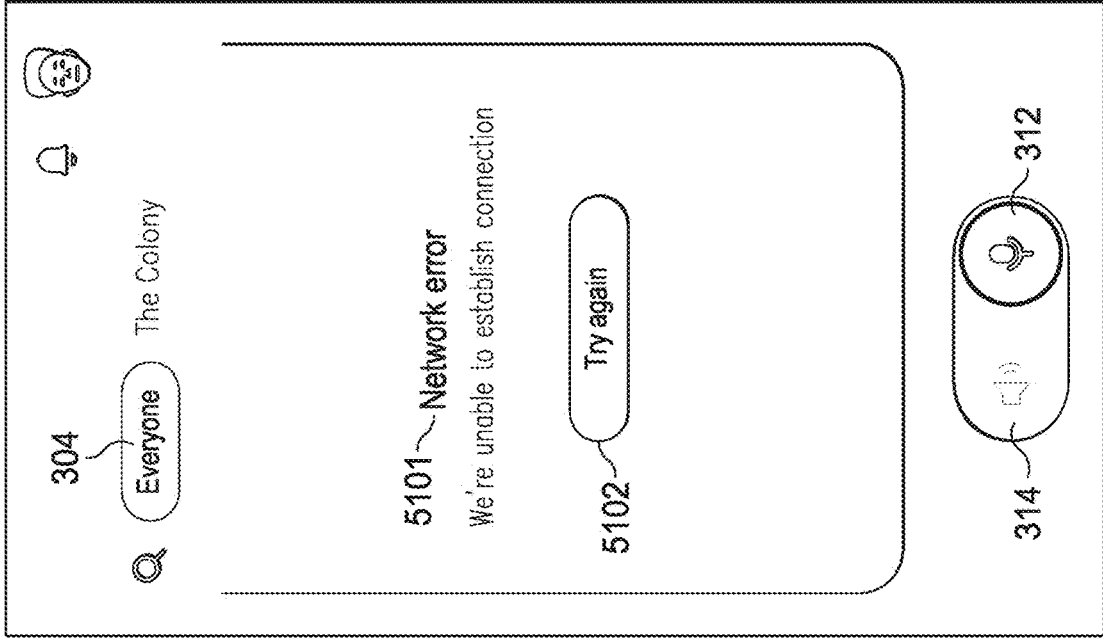
Figure 109:
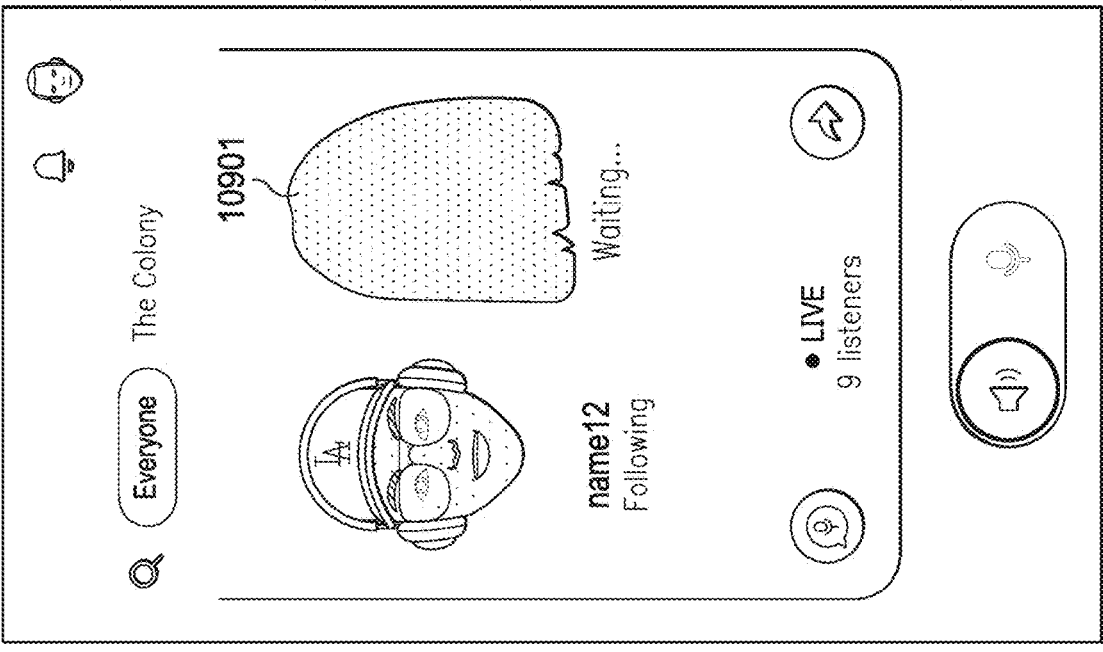

By selecting the down arrow 2303 on the top right section of the screen in FIG. 23, the mobile application may be minimized while a talk is still running as shown in FIG. 52. In an embodiment, when the user exits the mobile application, the talk may continue as shown in FIG. 48. A first user may listen to or participate in a conversation while viewing a second user's profile, editing his or her own profile, or conducting another non-conversation/non-listening function as shown in FIG. 30. In some embodiments, a conversation may be allowed to continue while a user works outside the mobile application or performs other non-conversation/non-listening functions in app. Even though only two speakers/talkers are shown in this example, it should be appreciated that other numbers of speakers are also possible such as one, three, or any other number. For example, a single user such as an influencer conducting a live talk is shown in FIG. 109. Only speakers that are actively talking may be displayed, some of the active speakers may be displayed (and some of the non-talking speakers may be hidden), and/or all speakers associated with the talk (i.e., whether currently talking or not) may be displayed. Only speakers that are actively talking may be highlighted, some of the active speakers may be highlighted, and/or all speakers involved in the talk may be highlighted. In some embodiments, a listener may decide and select to see certain speakers that are part of the conversation. In some embodiments, FIG. 109 shows an instance where a speaker "name12" was having a conversation with a user, and that user dropped off or terminated the conversation from his or her end. The speaker "name12" and one or more listeners are still part of the conversation and the mobile application is searching for a new user to add to the conversation with "name12." The mobile application (in cooperation with the application server) may search for users based on any of the techniques described herein. In some embodiments, the mobile application may select a next user from the waiting list associated with "name12" or associated with the conversation in which "name12" is participating.

When two users are in a live conversation and a third user wants to join the conversation, the third user may send a request for permission to talk. When the permission is granted (by the first user or the second user currently in the conversation, or permission may need to obtained from both the first user and the second user), the third user may start talking in the conversation. In an embodiment, one additional user may join an ongoing live talk at a time. In another embodiment, up to a different (higher) number of additional users may join an ongoing live talk at a time. In some embodiments, only two users may talk simultaneously while in other embodiments, more than two users may talk simultaneously.

Figure 24:
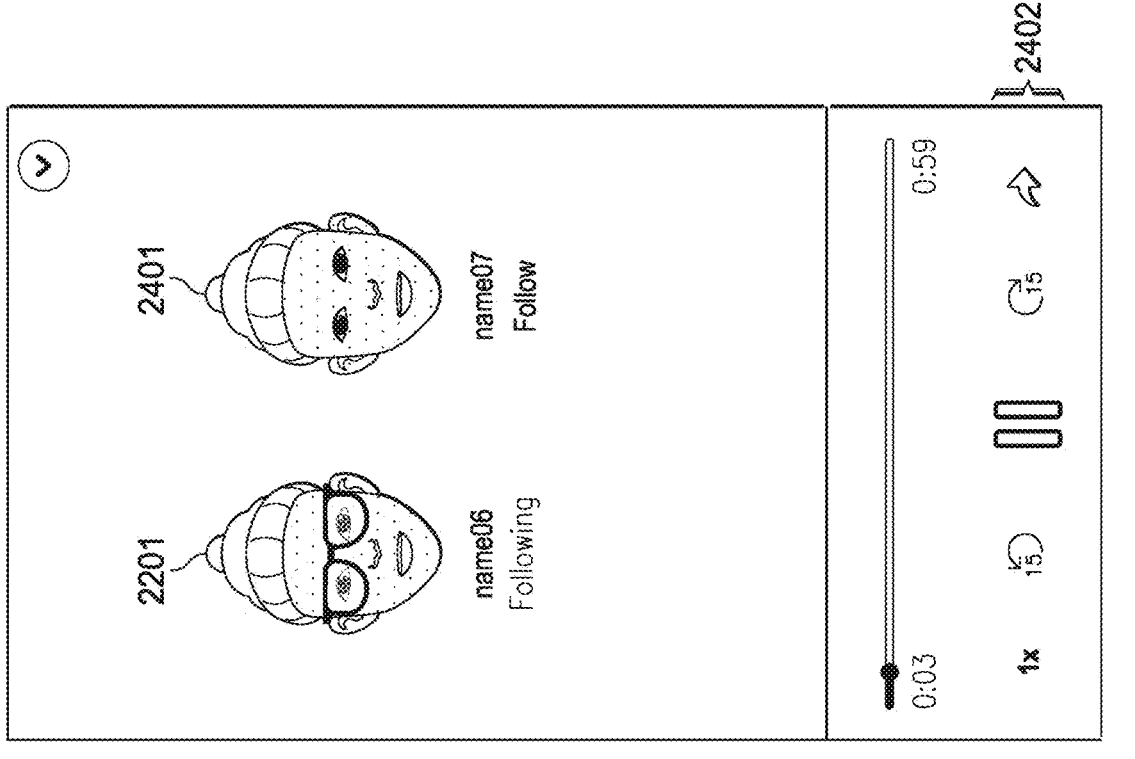
Figure 25:
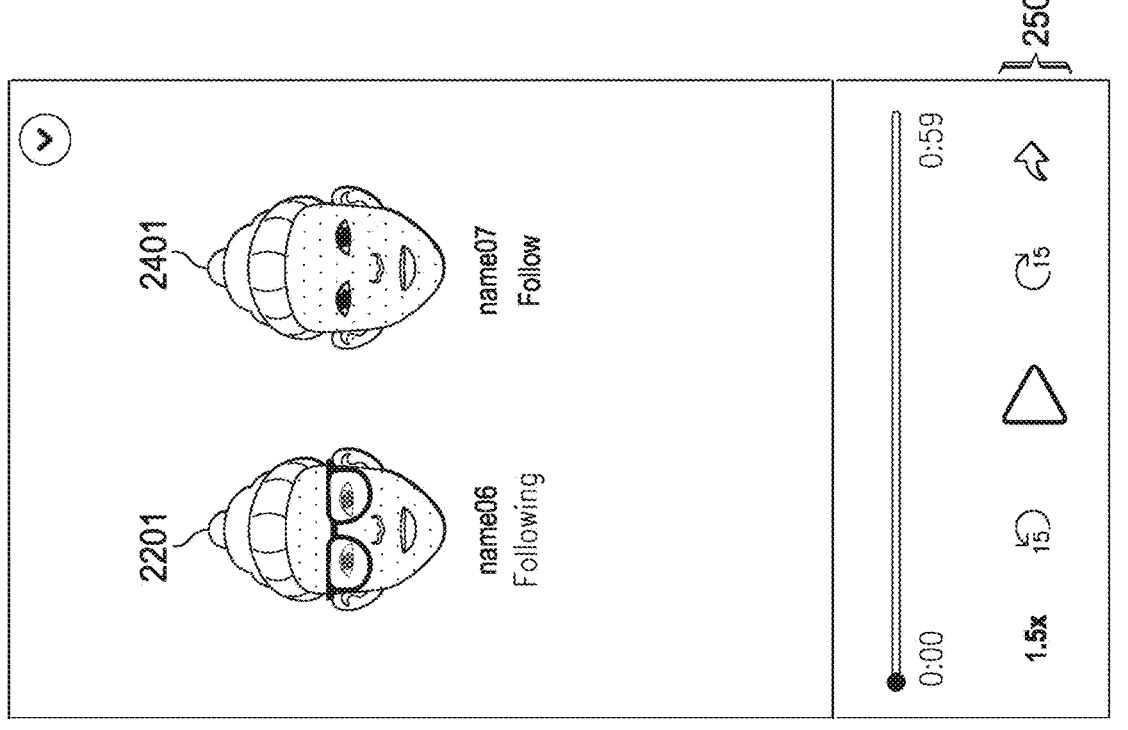

If a user selects the "talk with name07" icon on the screen as shown in FIG. 22, a screen for the talk between "name06" and "name07" with emojis of both users may be presented as shown in FIG. 24. Compared to FIG. 24 where the talk is played at the normal speed, the same talk is played at 1.5 times normal speed in FIG. 25.

Figure 26:
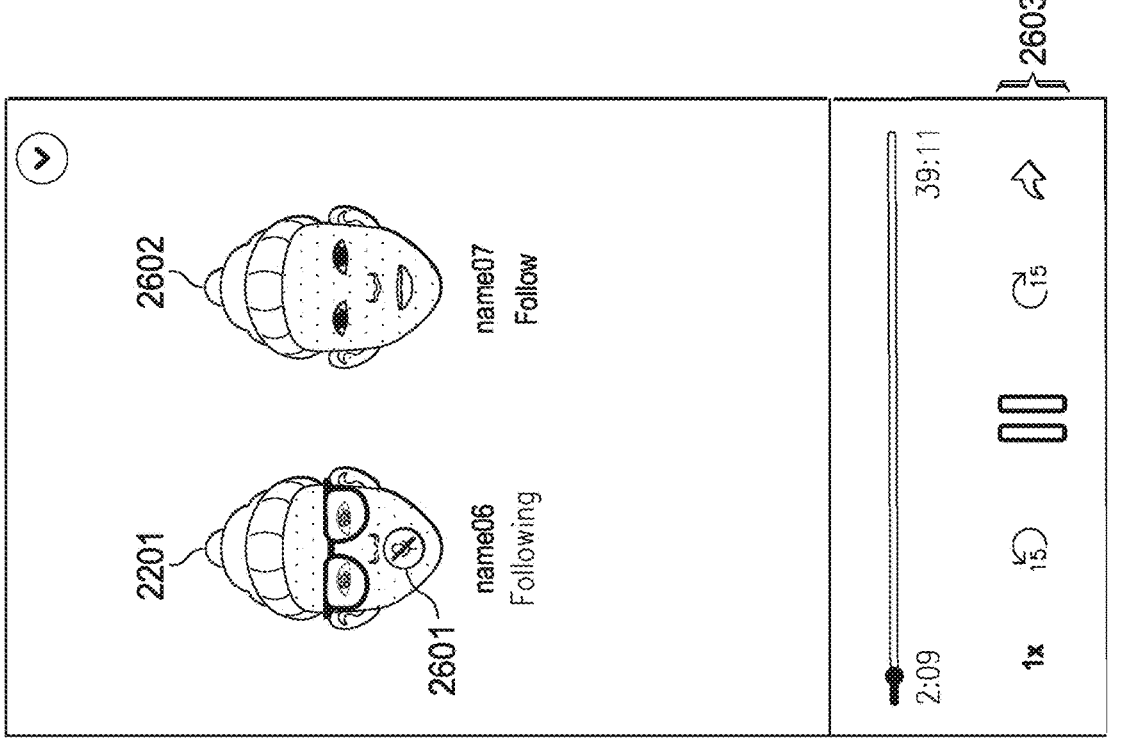
Figure 81:
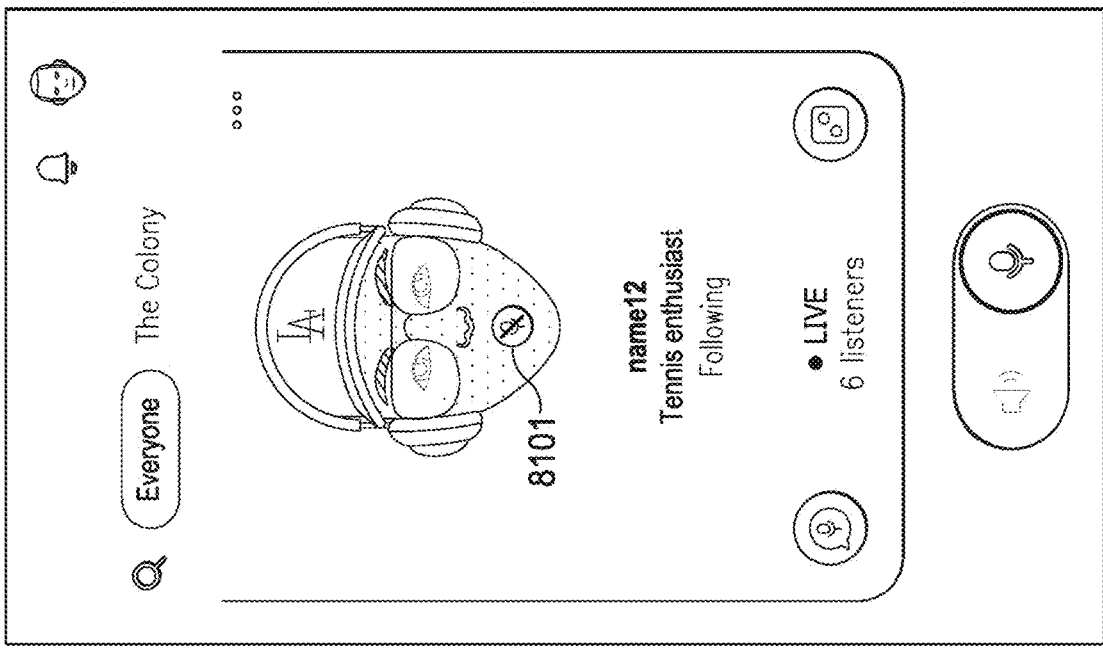
Figure 89:
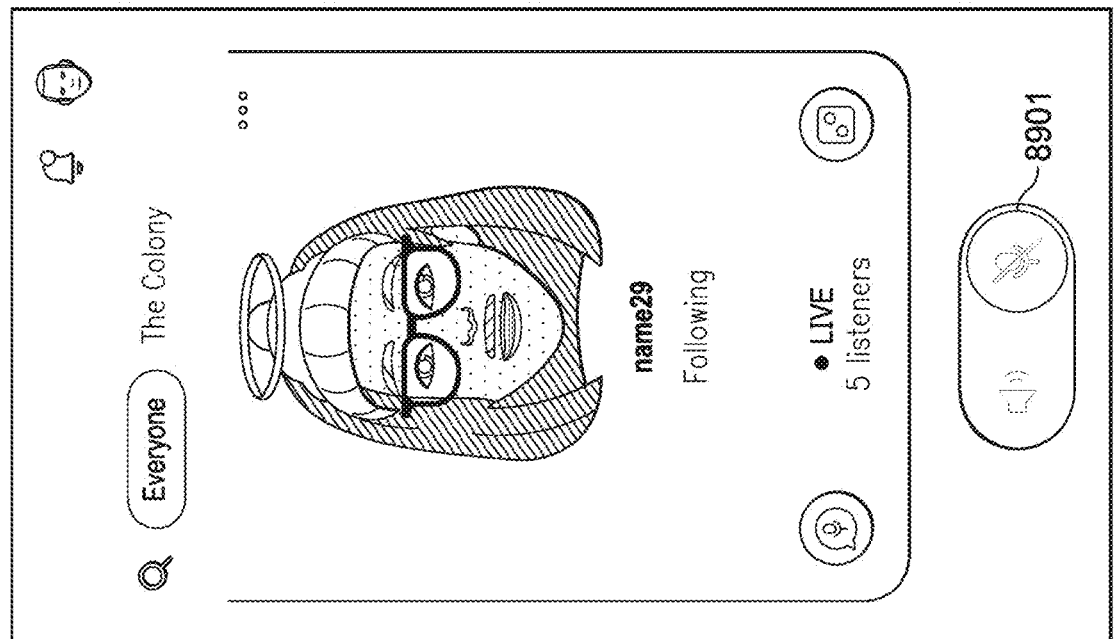
Figure 100:
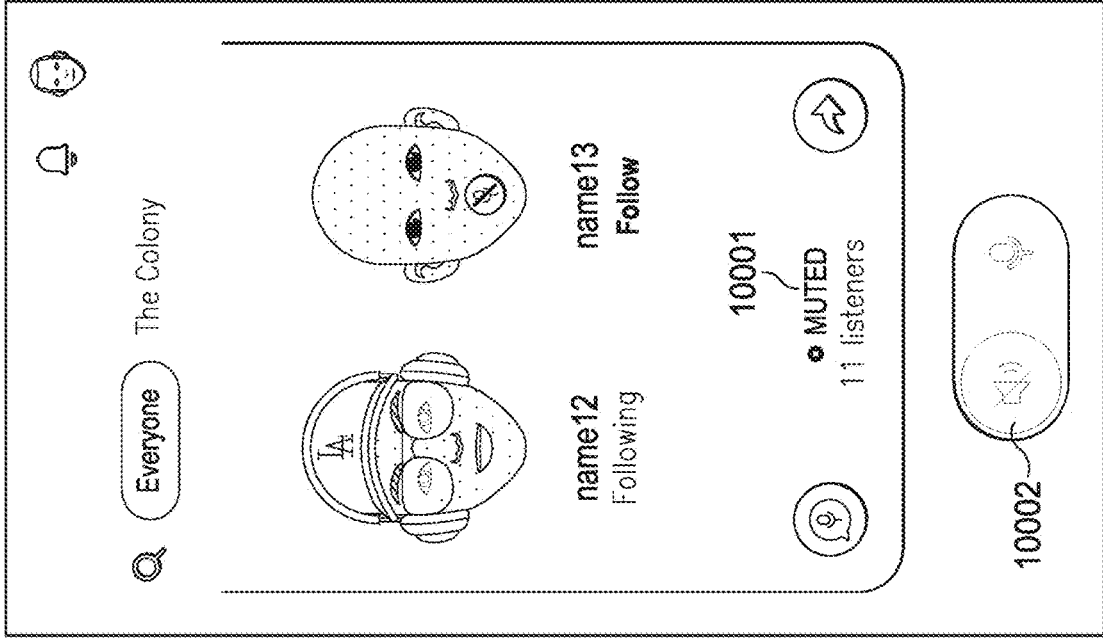

A speaker may mute himself/herself during a conversation as indicated by the mute icon 2601 in FIG. 26, the mute icon 8101 in FIG. 81, or the mute icon 8901 in FIG. 89. Additionally or alternatively, a listener may mute a conversation while listening to a talk as indicated by a "muted" icon 10001 in FIG. 100. Alternatively, a listener may mute selected speakers in a conversation.

Figure 28:
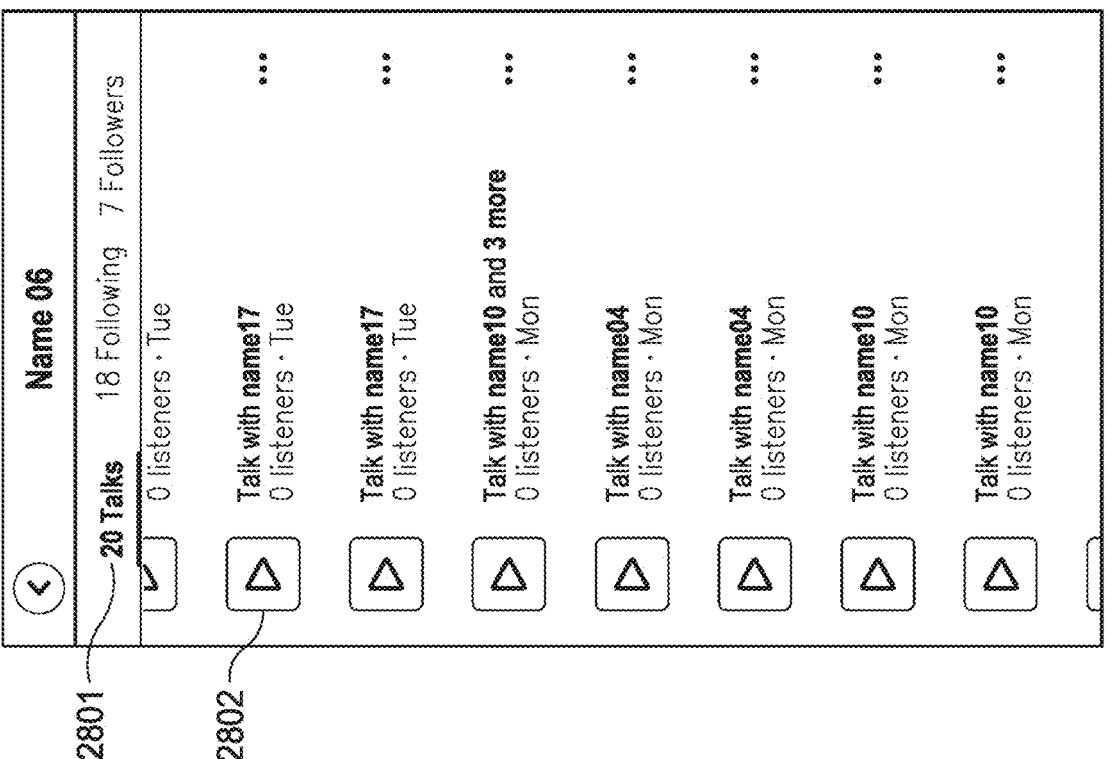
Figure 27:
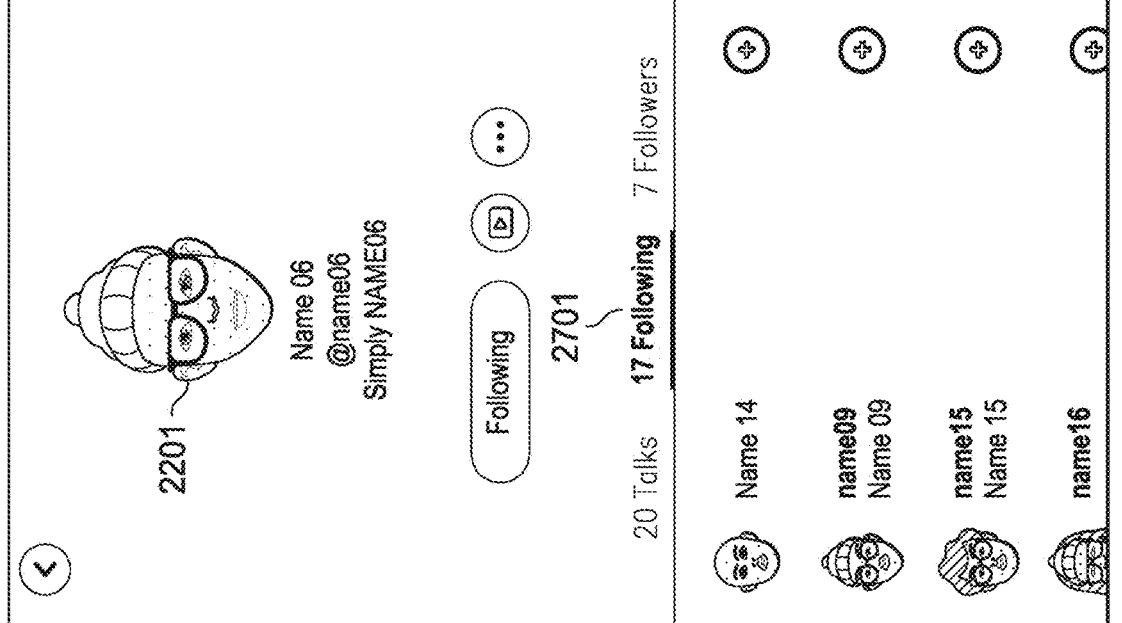
Figure 29:
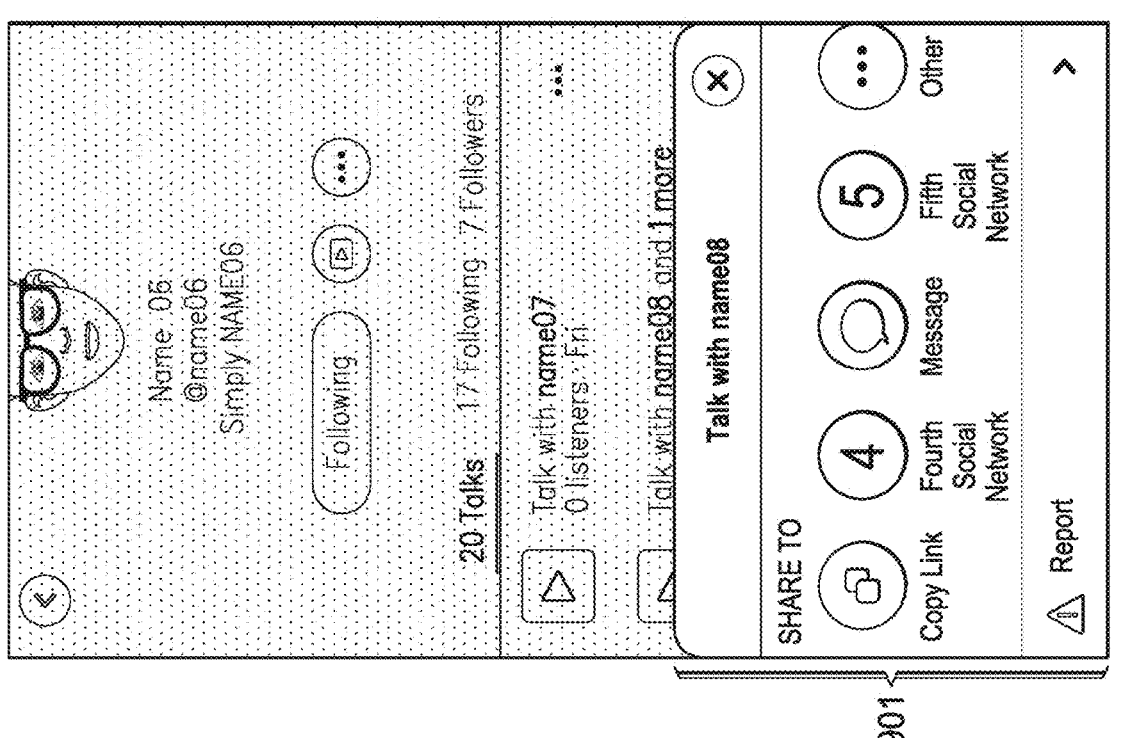

If the user taps the "18 following" icon on the screen shown in FIG. 22, the list of "following" users of "Name 06" may be presented as shown in FIG. 27. The screen shown in FIG. 22 may be scrolled down and the remaining of the list of talks associated with "Name 06" may be presented as shown in FIG. 28. If the user taps the ellipsis icon corresponding to the "Talk with name08" from FIG. 22, a window may pop up as shown in FIG. 29 with options to share the talk such as to copy the link of the talk, to share the talk to an instant messenger or a social media network, and/or another sharing option. The pop up window 2901 may include a report icon where a user can report the talk or speaker(s) to the mobile application (e.g., because the speaker may have said something inappropriate). In some embodiments, the mobile application may analyze, in near real-time, conversations and may censor speech that is deemed offensive, inappropriate for certain audience, etc.

When a user listens to a talk, information on the talk such as the talkers or playback control options may be presented in the bottom section 3001 of a screen as shown in FIG. 30. The bottom section may be a conversation between "name06" and "name07" that "Name 01" is currently listening to.

Figure 32:
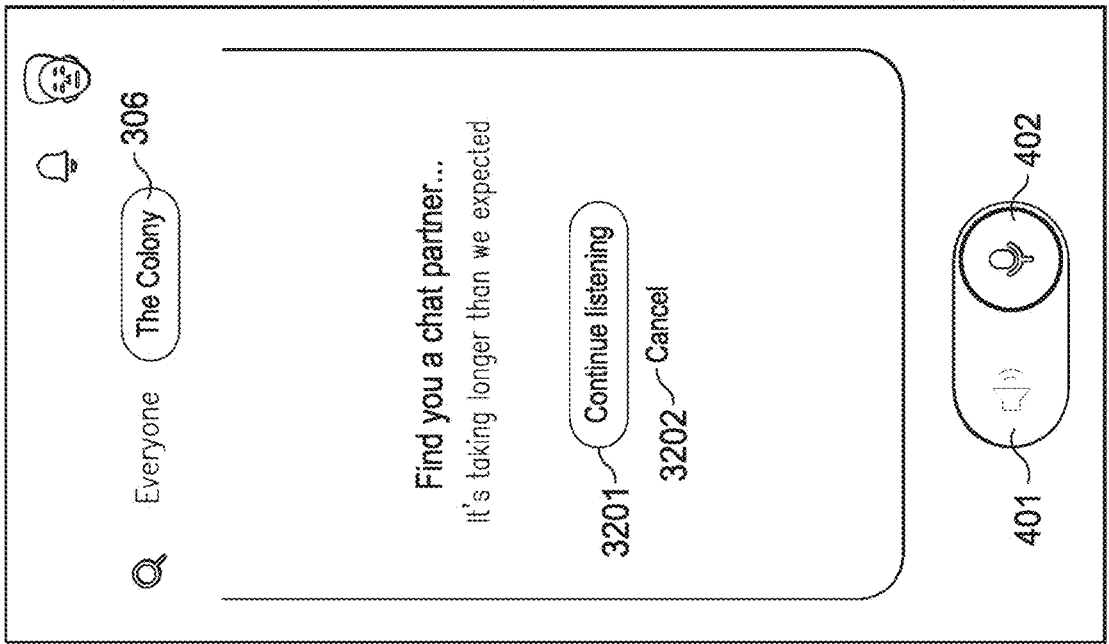
Figure 31:
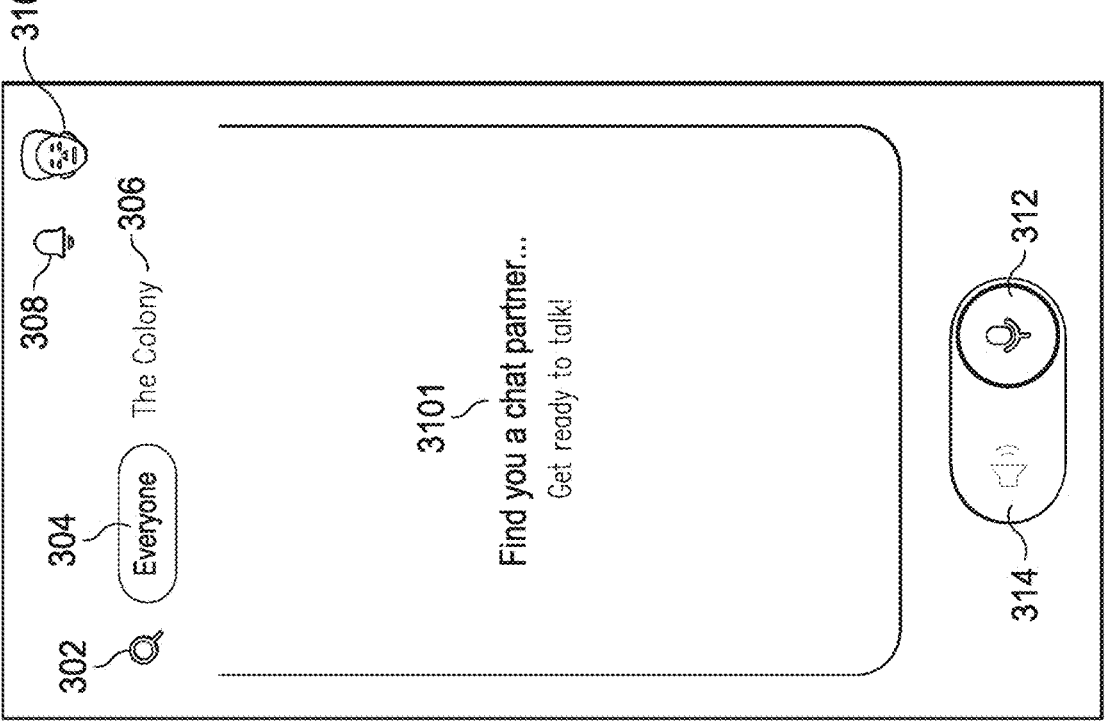
Figure 34:
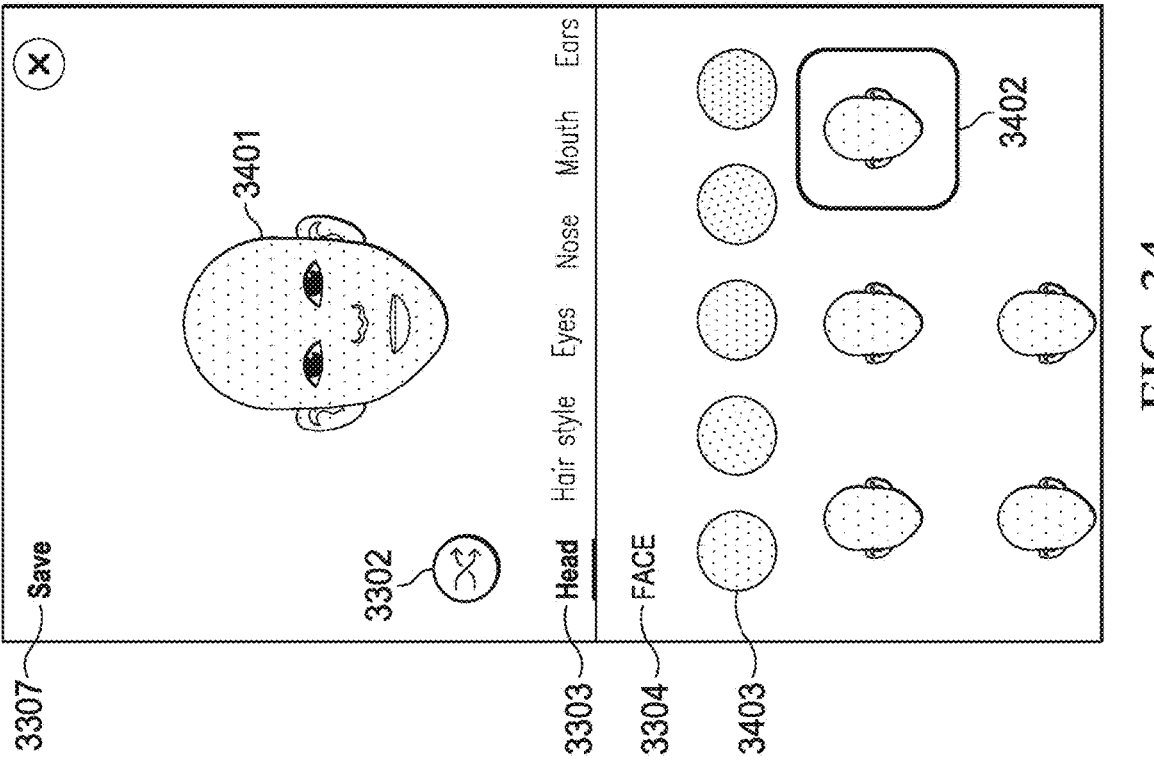

If a user selects a "Find someone to chat with now" option beneath the "Talks" option 605 as shown in FIG. 30, a screen of finding a chat partner for the user among everyone (see user's selection of 304) may be presented as shown in FIG. 31, or if the user so chooses, another screen of finding a chat partner for the user within a specific location may be presented as shown in FIG. 32. The chat partner may be found using a smart data operation described herein such that a chat partner is determined based on one or more of a variety of parameters such as a user's age, a user's other demographic information, a user's membership type (free, paid, or premium), a user's interests, a user's emoji, conversation listening history, "following" users and their data, in-app information and/or history of the "following" users, followers and their data, in-app information and/or history of the followers, current location, location history, user profile information, social network information from user's connected social networks, search history (whether on the mobile application or on a third party site/app), time spent on app, duration of previous conversations, a user's mood, subjects/topics/hashtags a user may be interested in, trending topics, etc. If the mobile application fails to find a chat partner after a predetermined period of time, options such as "Continue listening" 3201 or "Cancel" 3202 may be displayed. The matching of the chat partner with a user may be substantially real-time or instantaneous.

Figure 33:
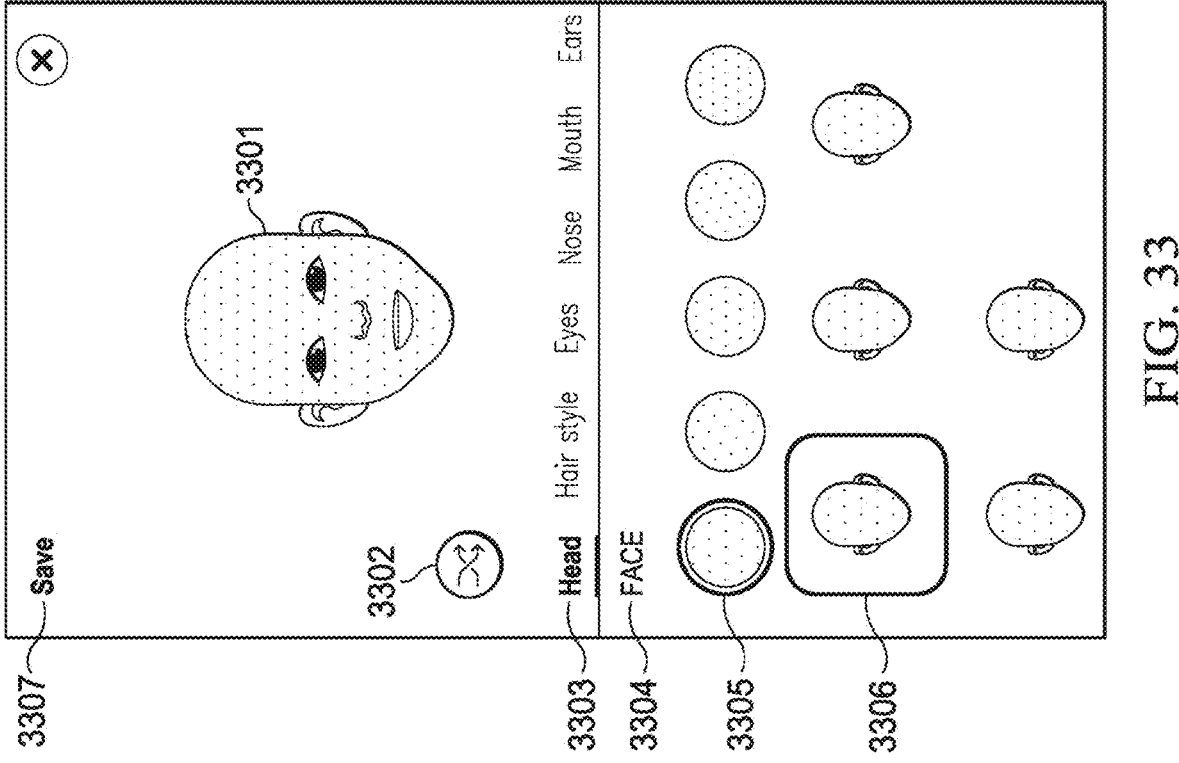
Figure 36:
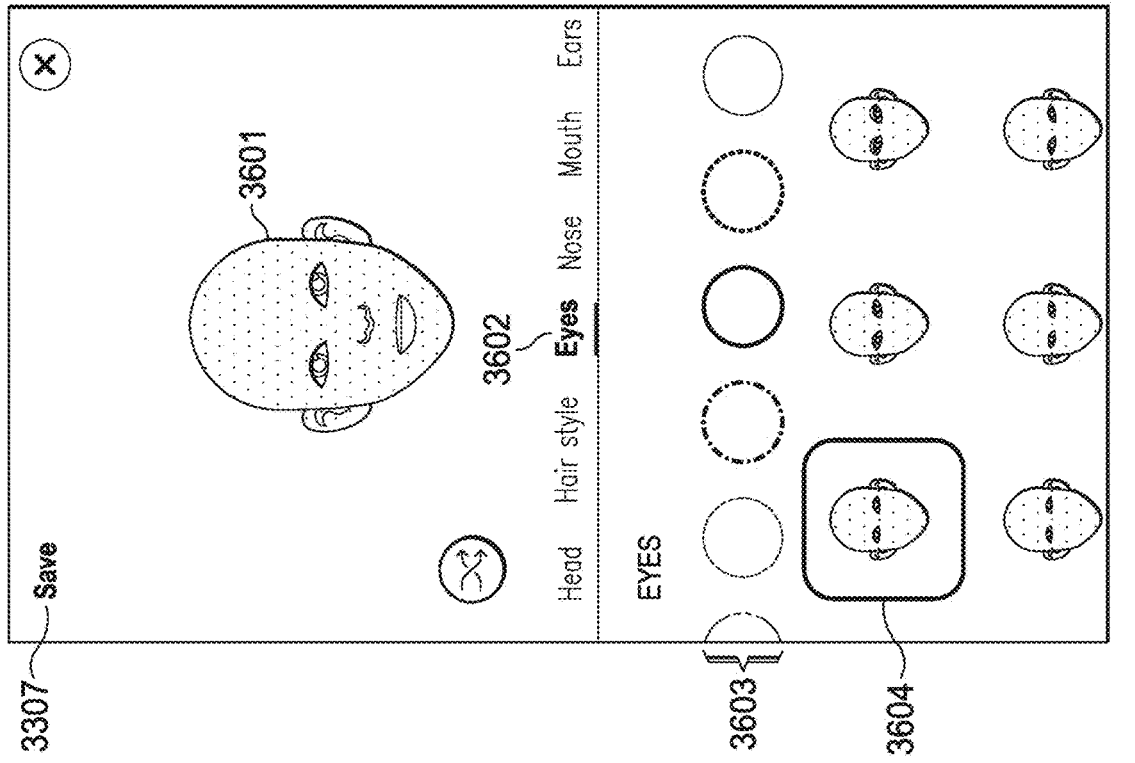
Figure 35:
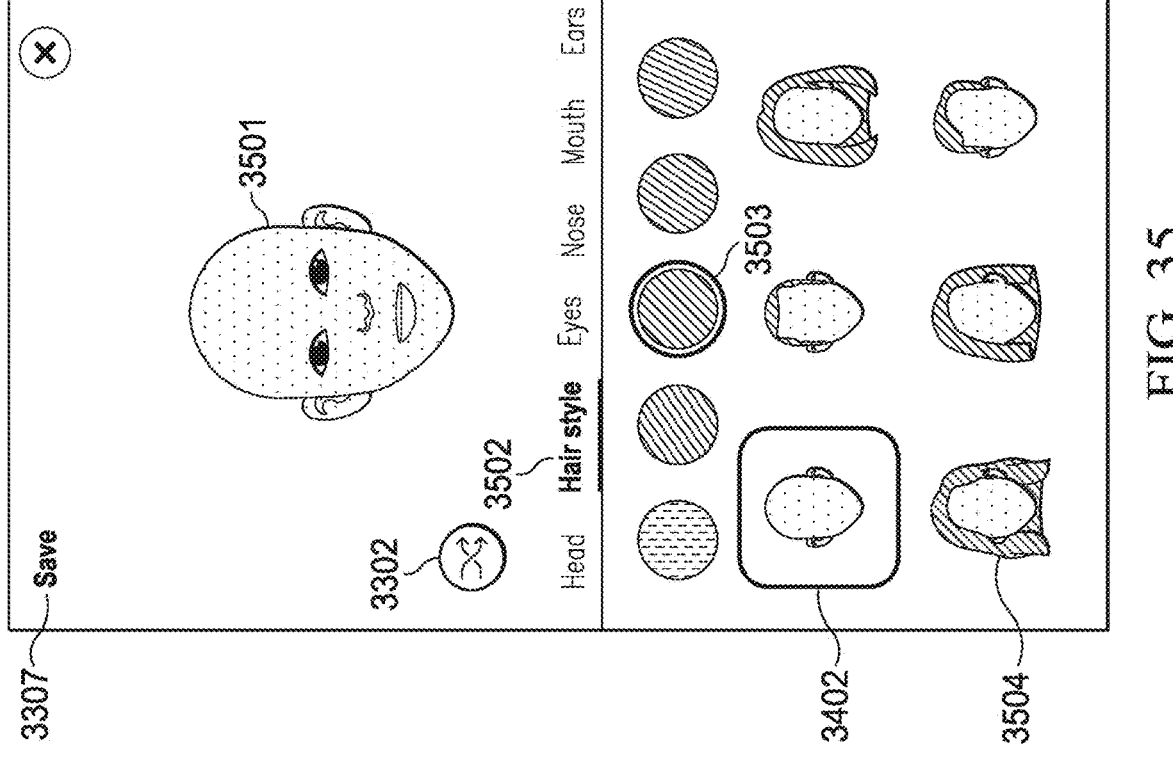
Figure 38:
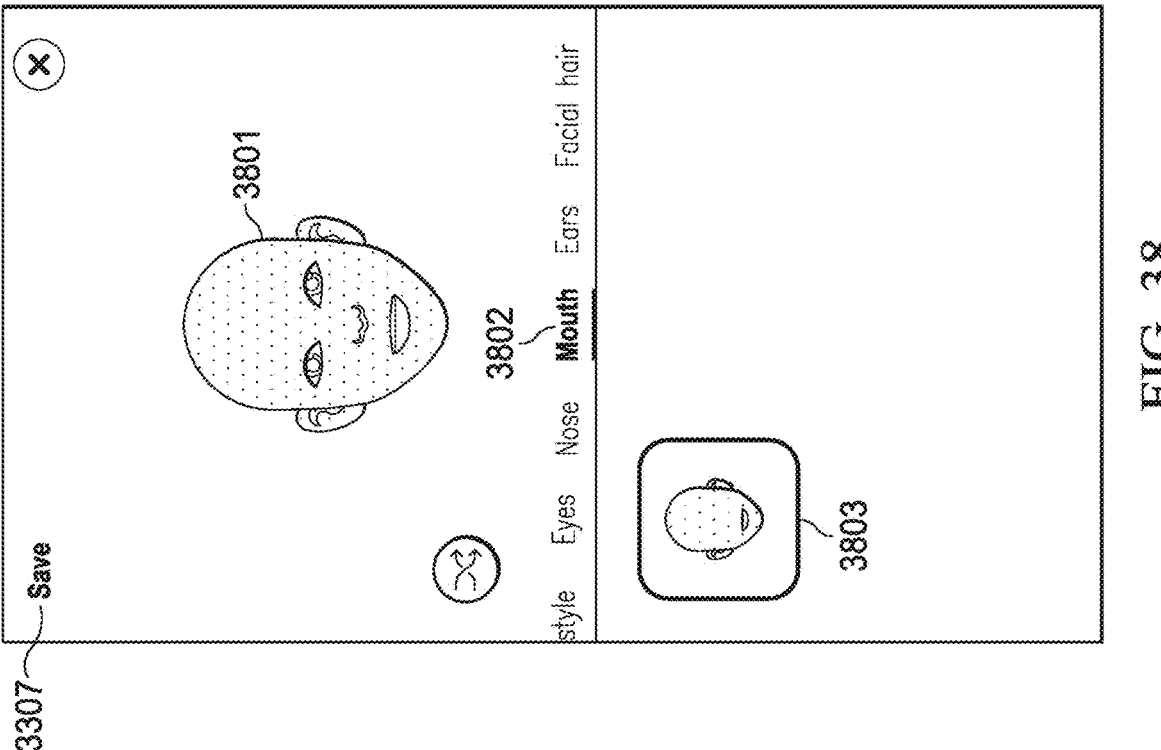
Figure 37:
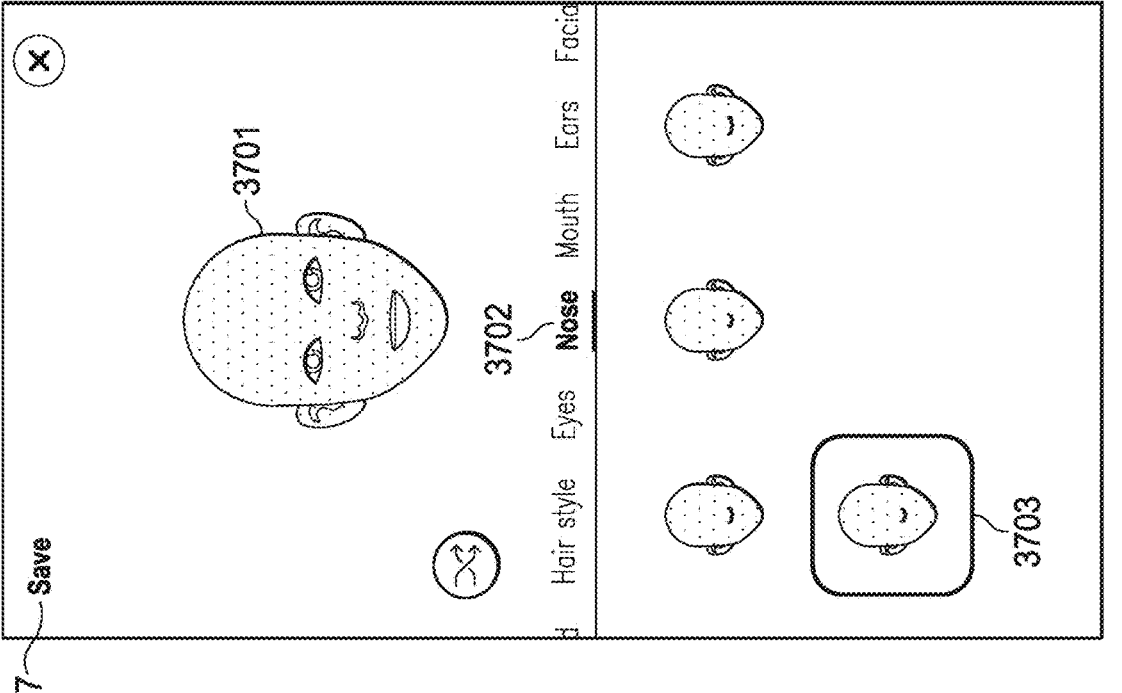
Figure 40:
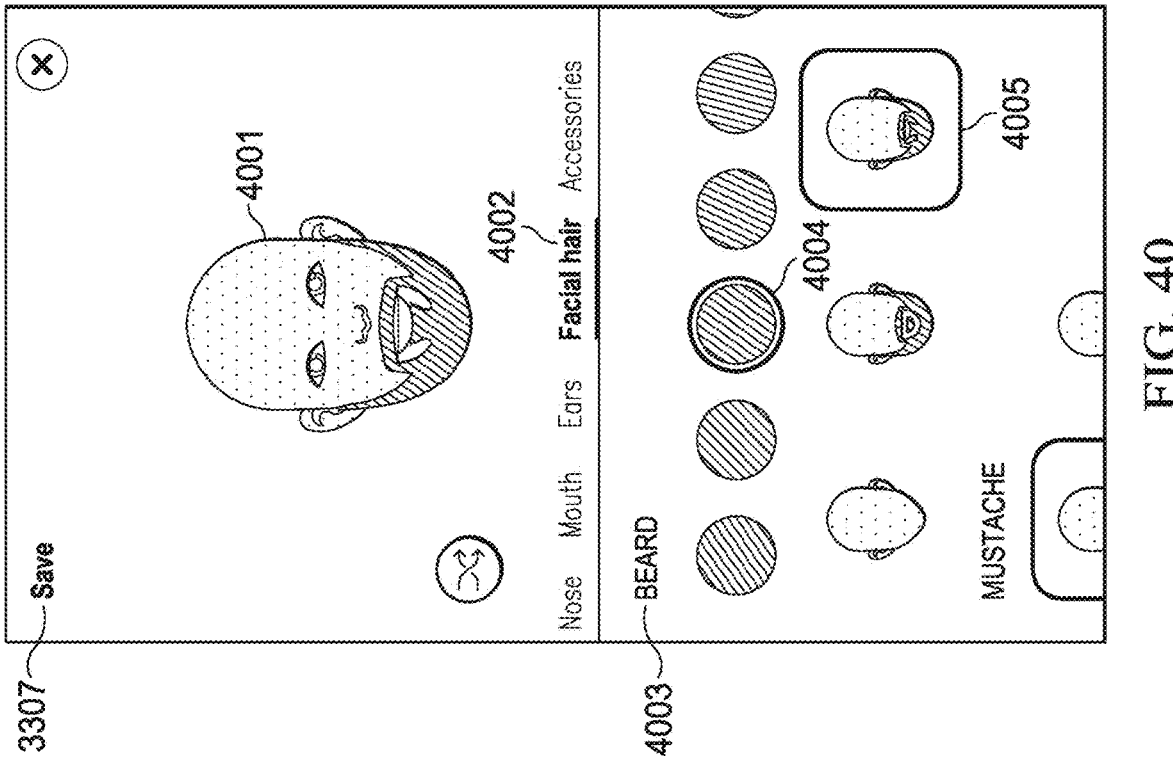
Figure 39:
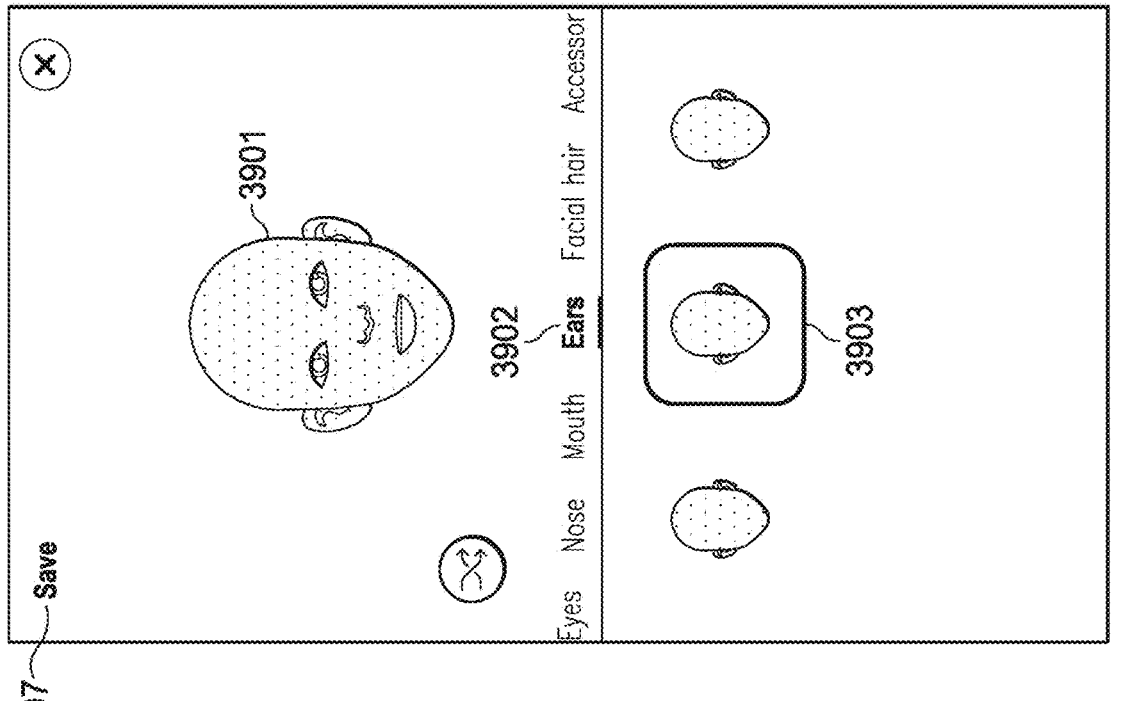
Figure 42:
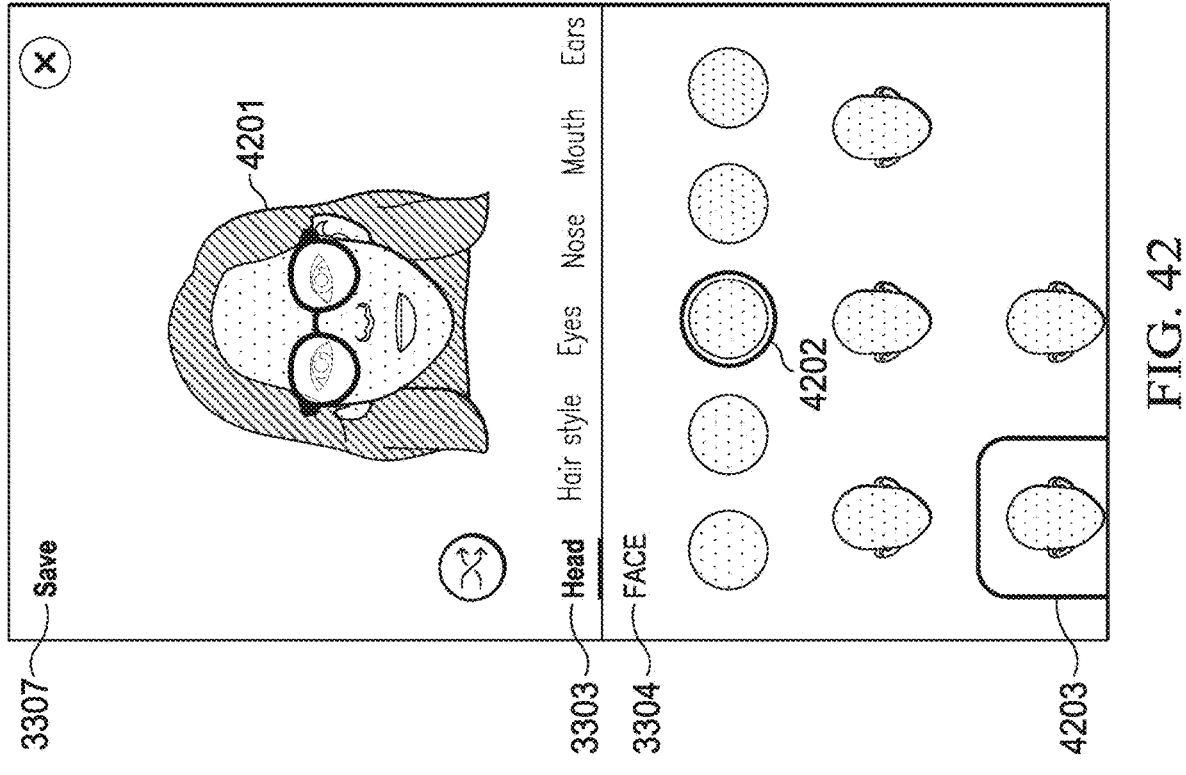
Figure 41:
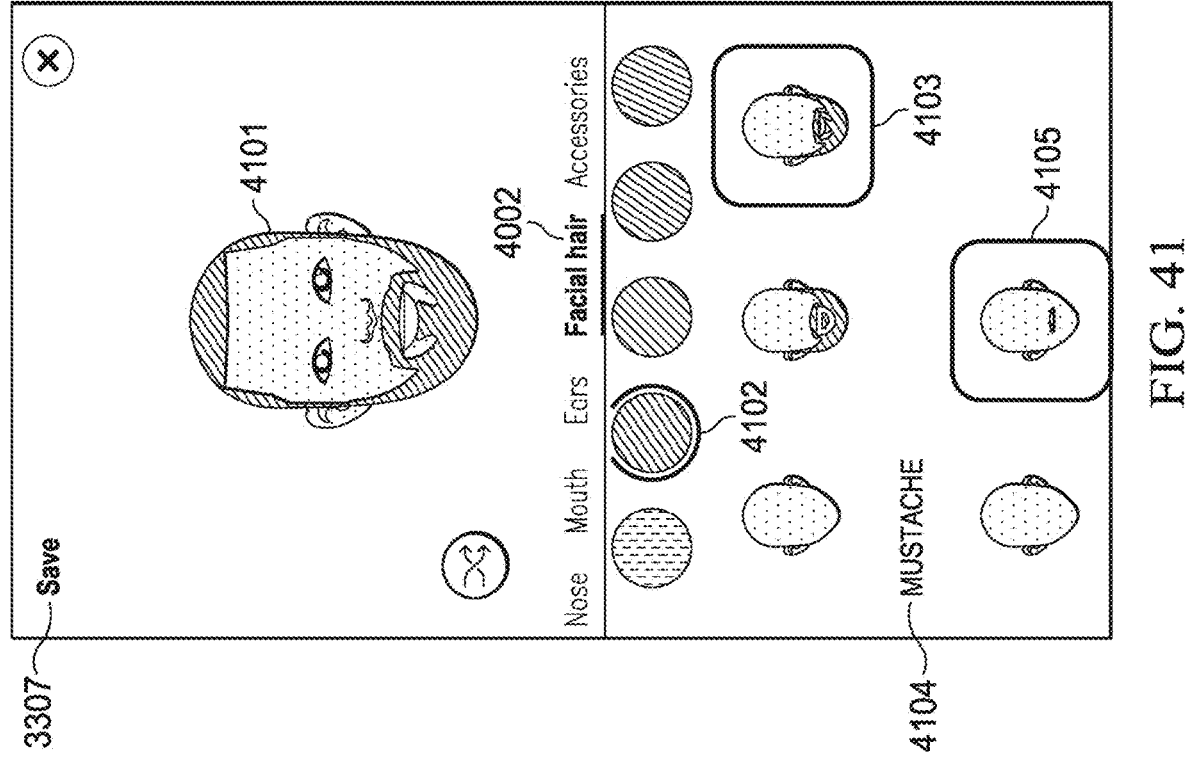
Figure 43:
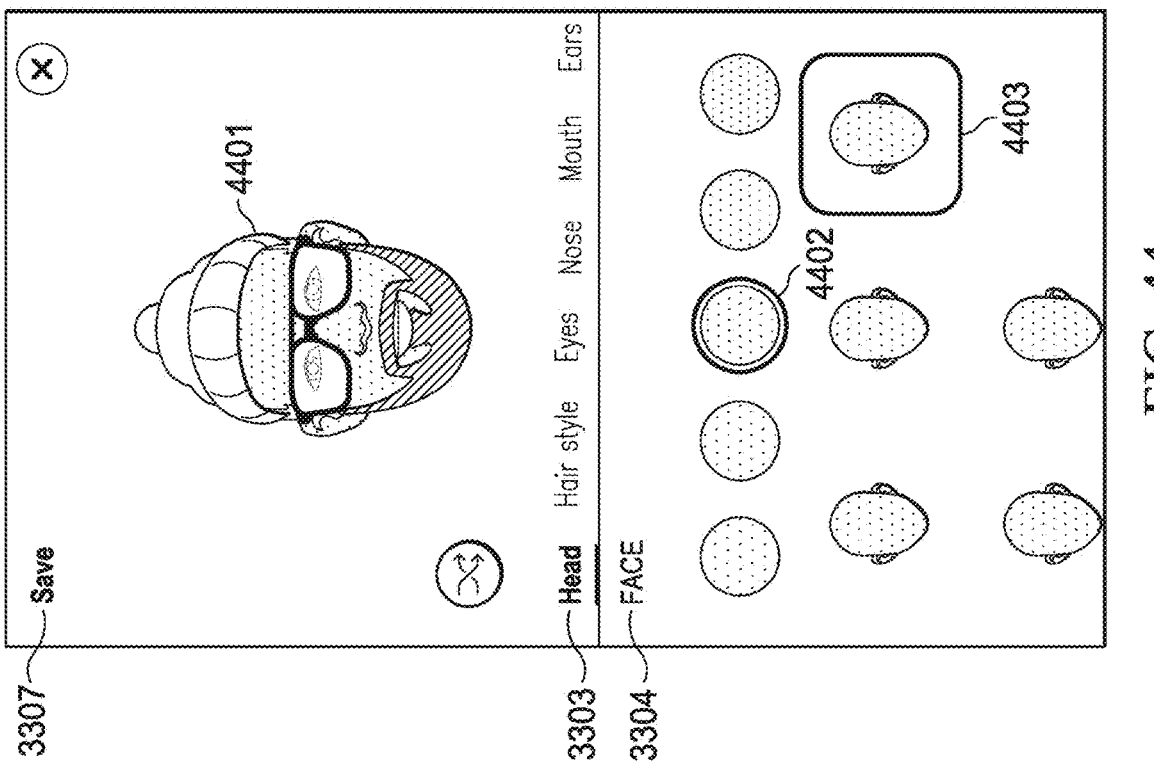
Figure 44:
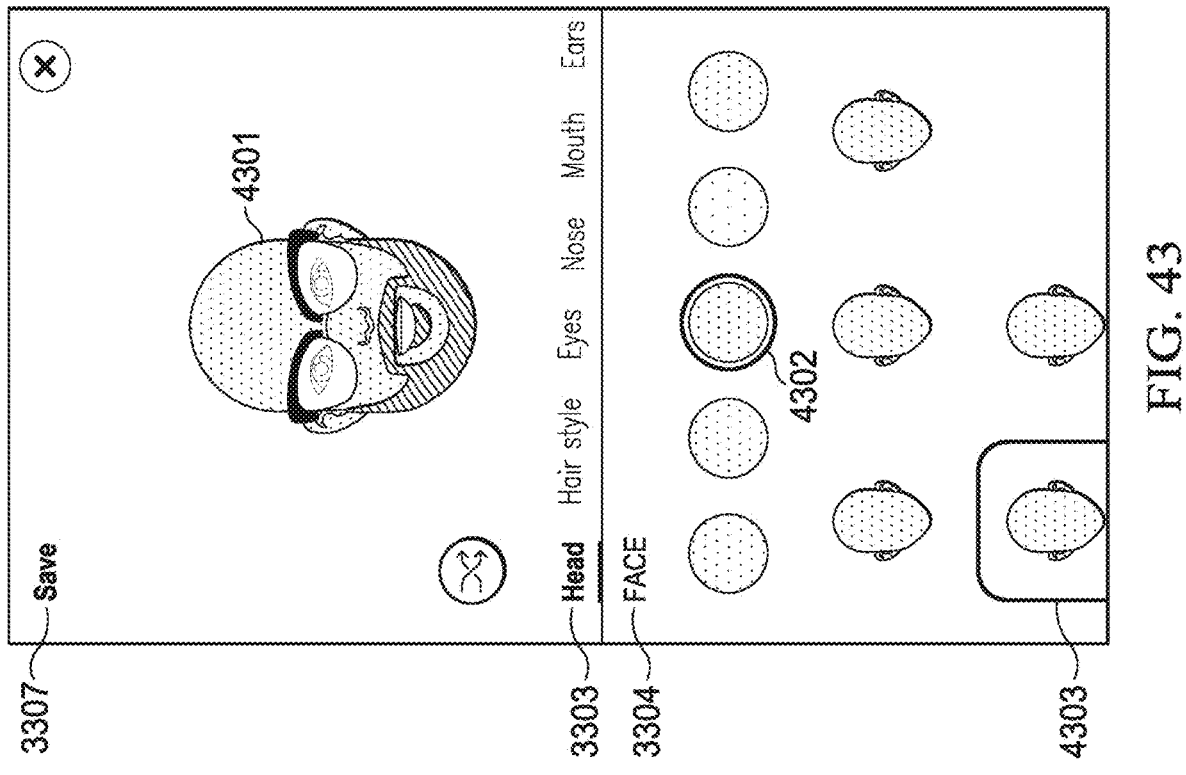
Figure 46:
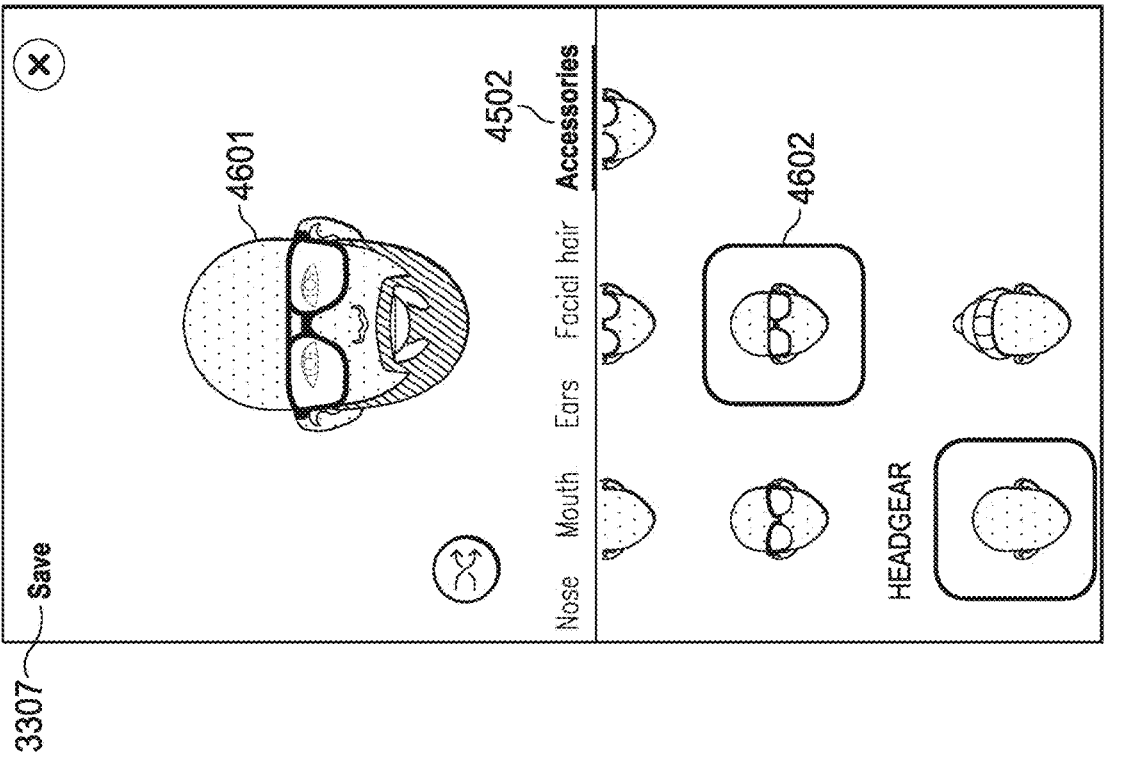
Figure 45:
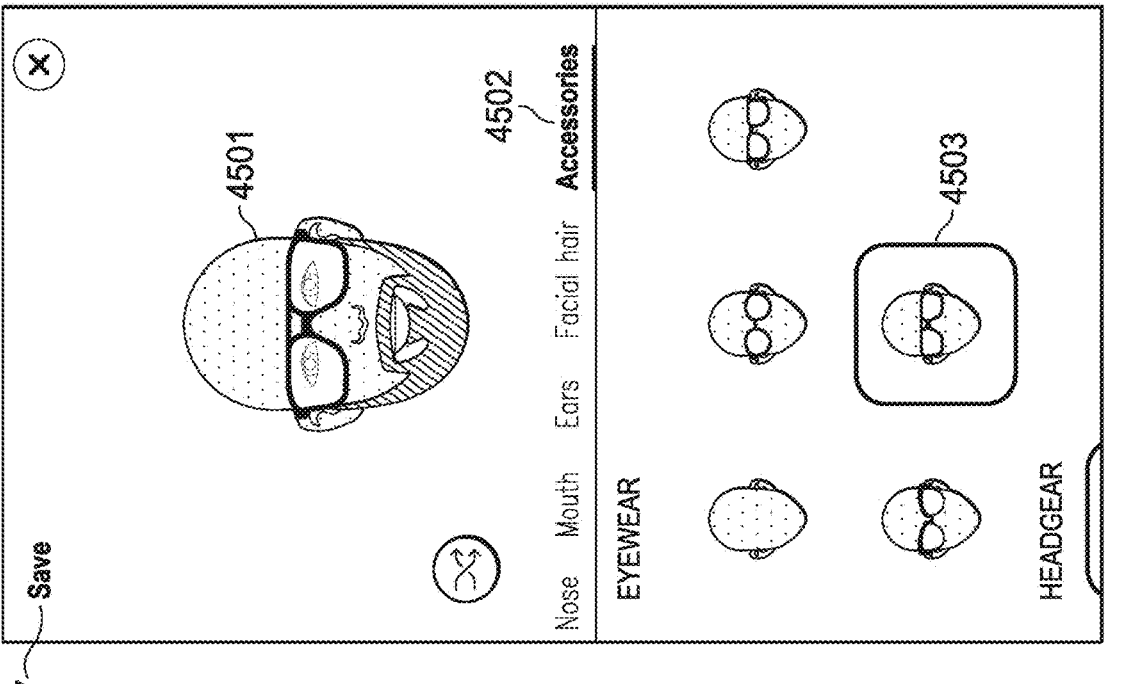
Figure 47:
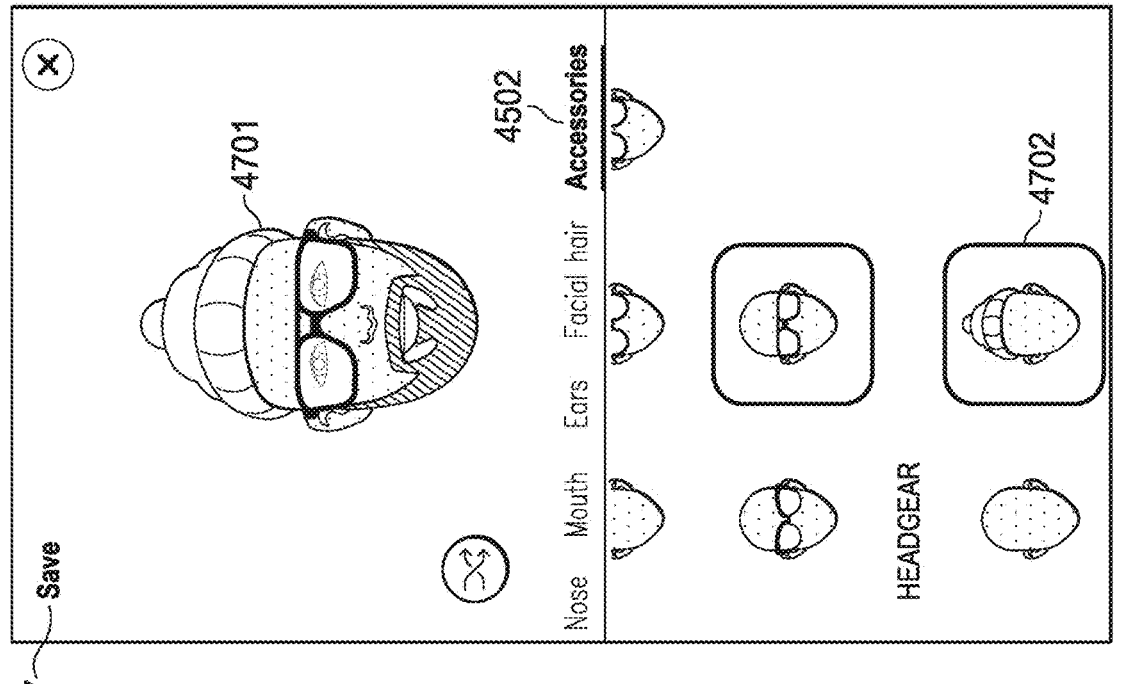
Figure 50:
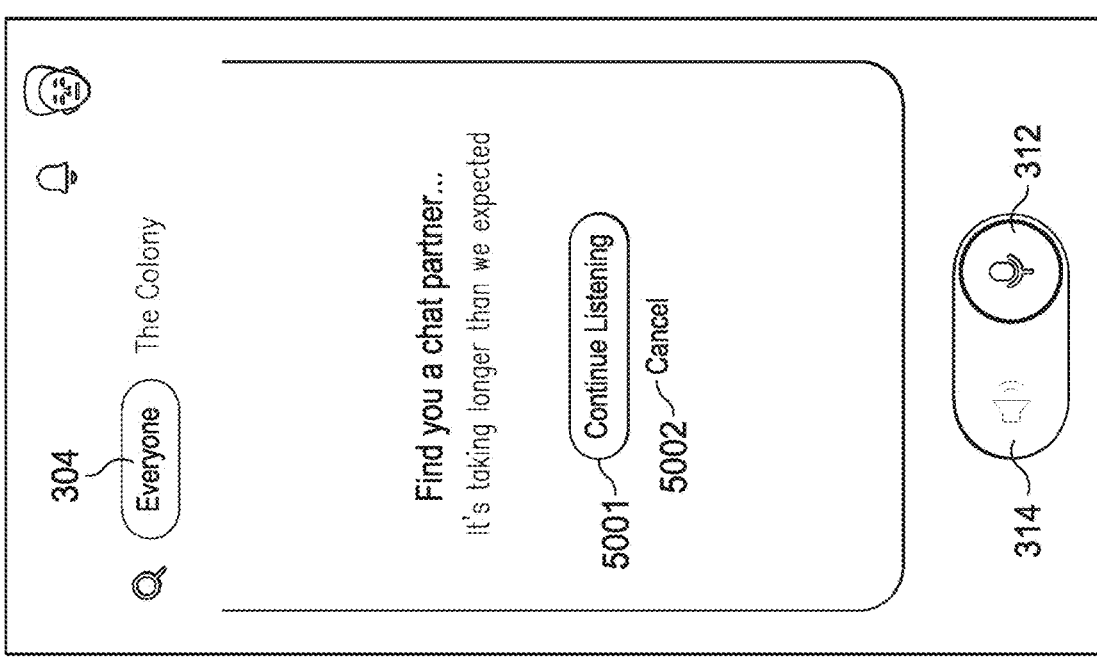

If the user selects the "Tap to change" icon 701 to change the emoji of the account, a screen for changing the emoji may be presented as shown in FIG. 33. Different characteristics of the emoji may be edited including the head, a hair style, the eyes, the nose, the mouth, the ears, facial hair, accessories, etc. The complexion, face shape, or another characteristic of the head may be edited as shown in FIGS. 33, 34, 42, 43, and 44, the color or style of the hair may be edited as shown in FIG. 35, the color or shape of the eyes or the color or style of the eyeliner may be edited as shown in FIG. 36, and the length, size, or shape of the nose may be edited as shown in FIG. 37. The color, size, or shape of the mouth may be edited as shown in FIG. 38, the size or shape of the ears may be edited as shown in FIG. 39, the color or style of facial hair such as different styles of a beard or mustache may be edited as shown in FIGS. 40 and 41, and accessories such as eyewear or headwear may be edited as shown in FIGS. 45-47. If the user selects a randomization icon 3302, a predetermined or preset emoji may be presented as shown in FIG. 41, 42, 43, or 44. The user may further modify the predetermined emoji.

Figure 49:
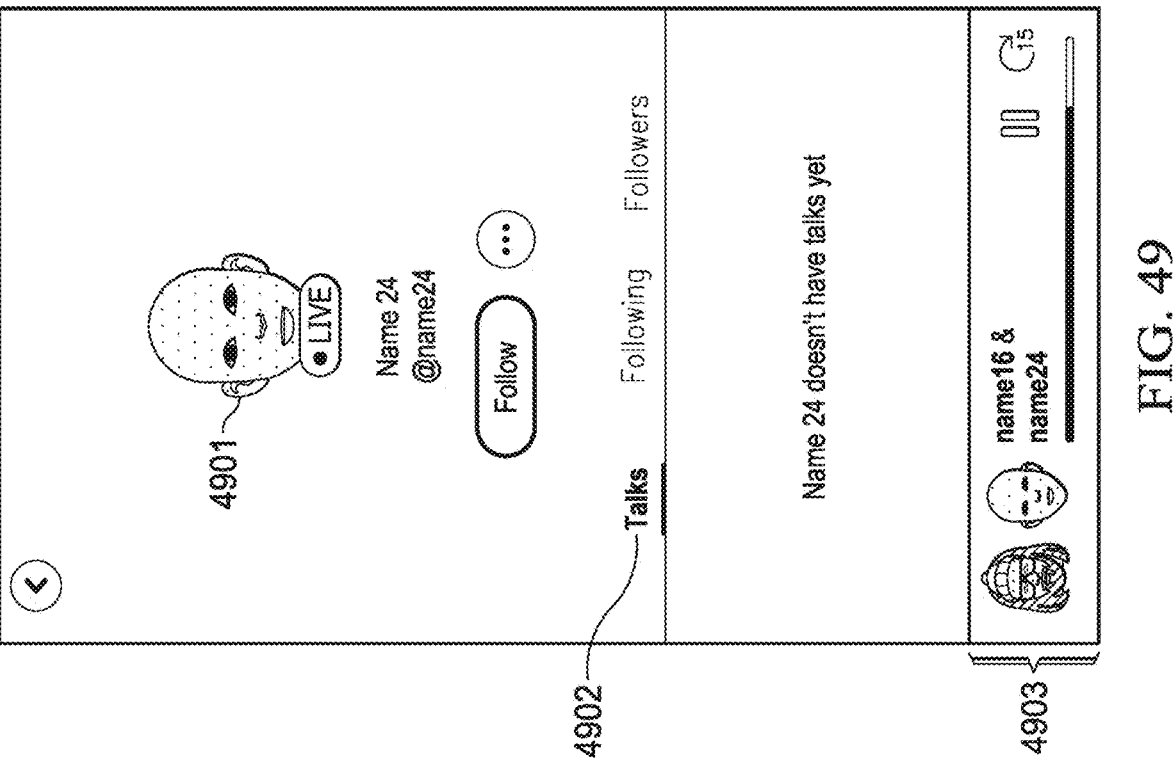

When playing a recorded or live talk, or participating in a live talk, if the user exits the application's user interface (but does not exit the application), e.g., by hitting the home option of a mobile device, the mobile application may continue to run in the background as shown in FIG. 48. If a live audio conversation is being listened to and the profile of a user 4901 in the live audio conversation is selected to be viewed, a "Live" icon may be displayed next to the user 4901 as shown in FIG. 49, the conversation may be displayed under the "Talks" icon 4902, and/or the audio conversation may be displayed in the bottom section 4903 of the profile page.

If the user experiences network issues such as with an unstable network, the application may display a network error message(s) 5101 and/or 5102. The user may toggle between the conversation mode 312 and listening mode 314. In some embodiments, the conversation mode 312 and listening mode 314 icons are adjacent to each other. In some embodiments, they may located far apart. In some embodiments, a single icon may be provided that, when selected, switches to the conversation mode, if currently in listening mode, and switches to listening mode, if currently in conversation mode.

Figures 53, 54:
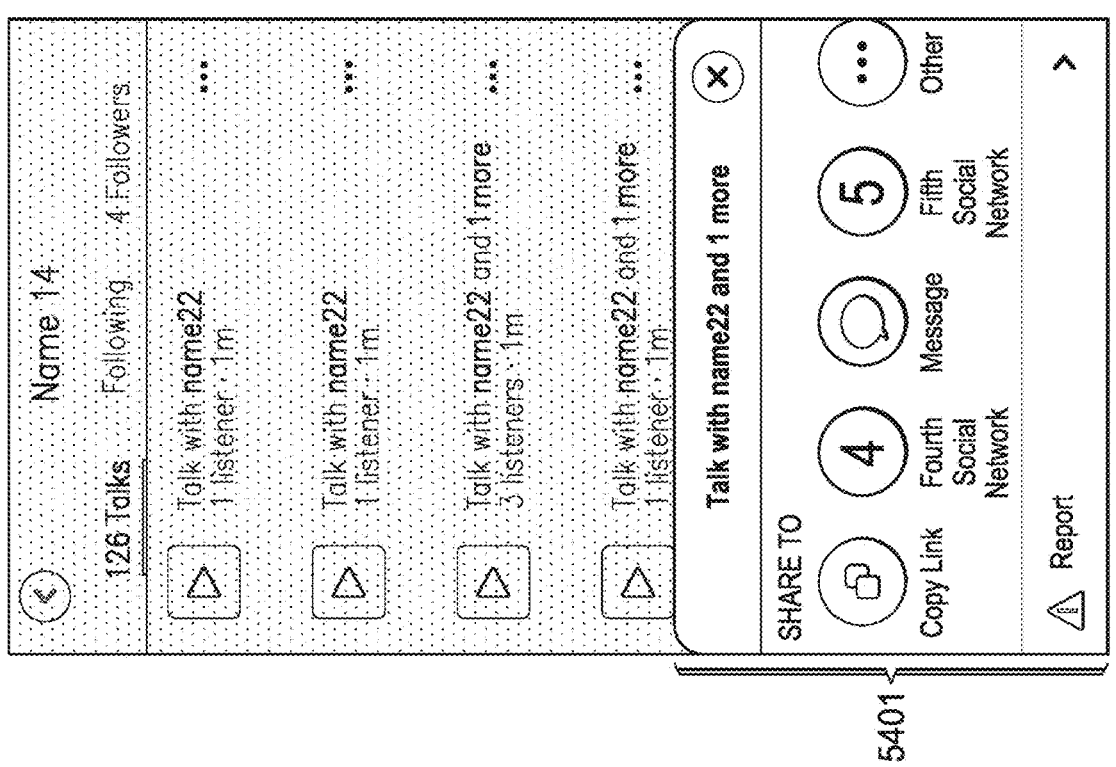
Figure 56:
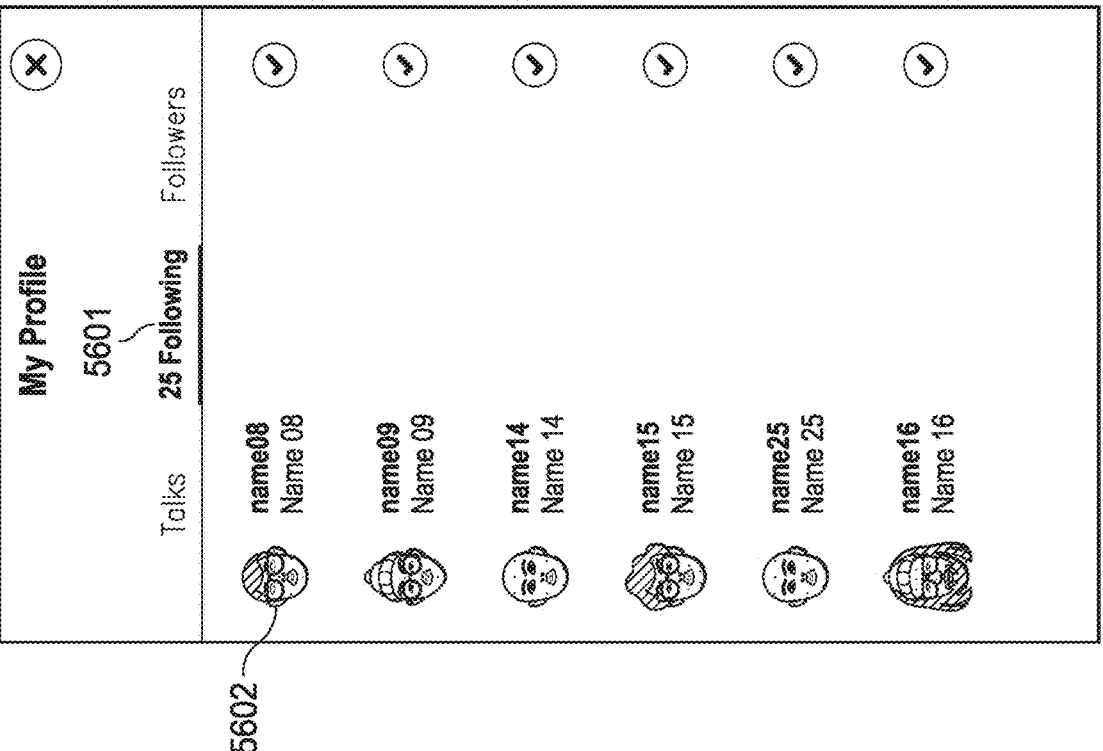

In an embodiment, a user might not be allowed to simultaneously listen to a talk while talking as shown in FIG. 53. In another embodiment, a user may listen to a live or recorded talk while also talking in a different conversation from the conversation being listened to. In yet another embodiment, a user may only listen to a recorded talk while talking or a user may only listen to a live talk while talking. As discussed before, a user may review the users being followed by selecting the "25 following" icon 5601.

Figure 59:
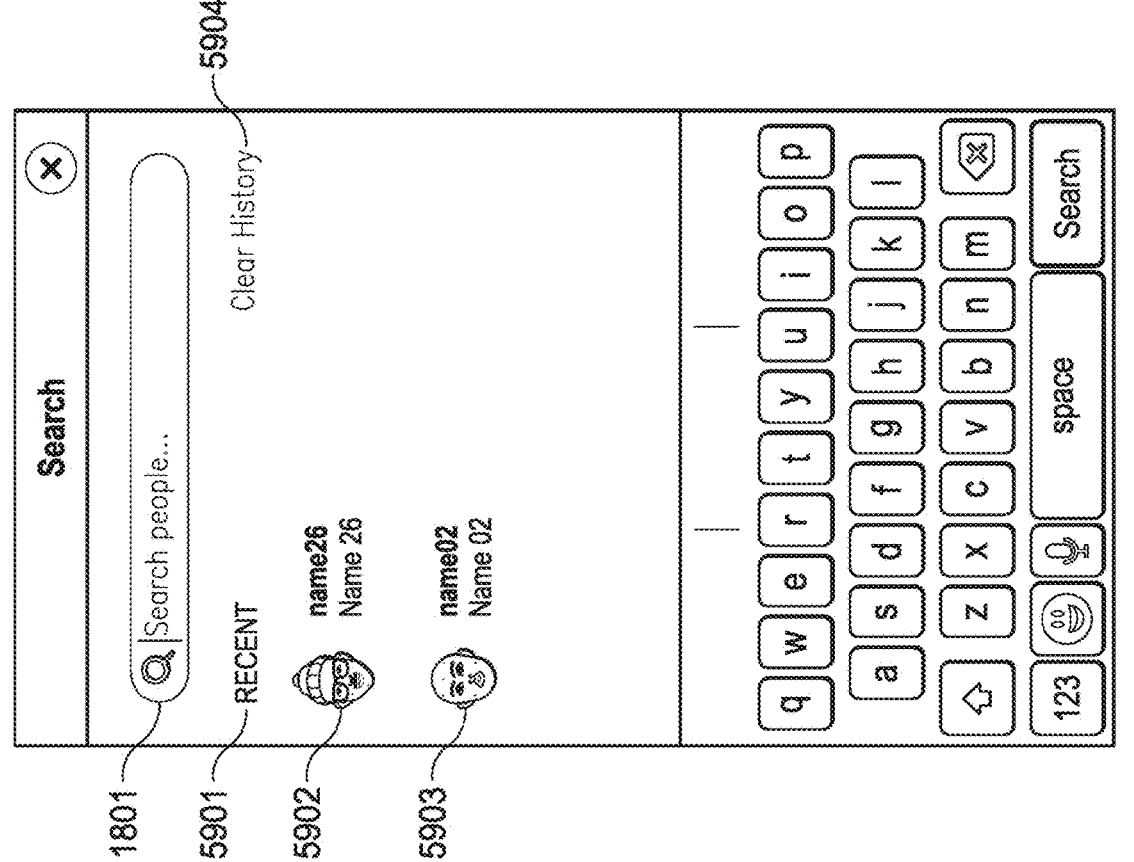

Referring to FIG. 59, if the search icon 302 is selected, search history 5901 may be displayed, e.g., with search results 5902 and 5903. A user may select a "Clear history" icon 5904 to clear the search history. In an embodiment, it may be more likely for a user to be found by other users if the user participates in more talks, e.g., through a talk associated with a hashtag, a date, a length, a number of speakers involved, a speaker, text or hashtags extracted from or associated with the user's prior or live talks, etc.

Figure 62:
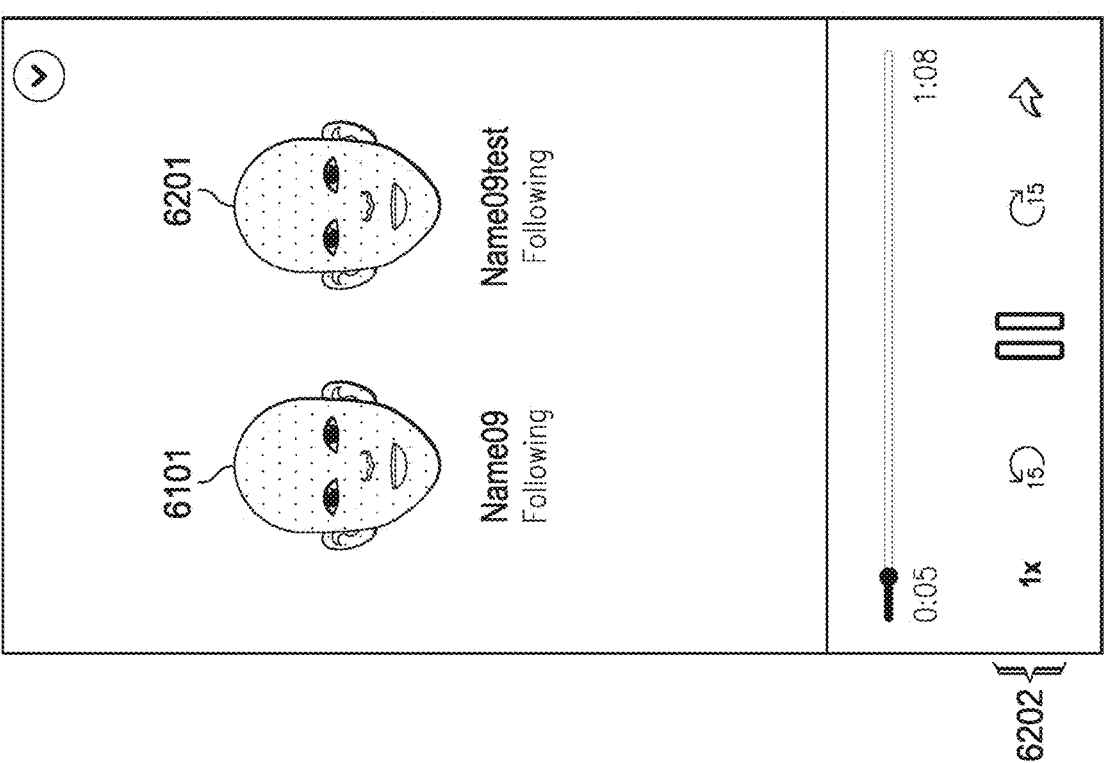
Figure 61:
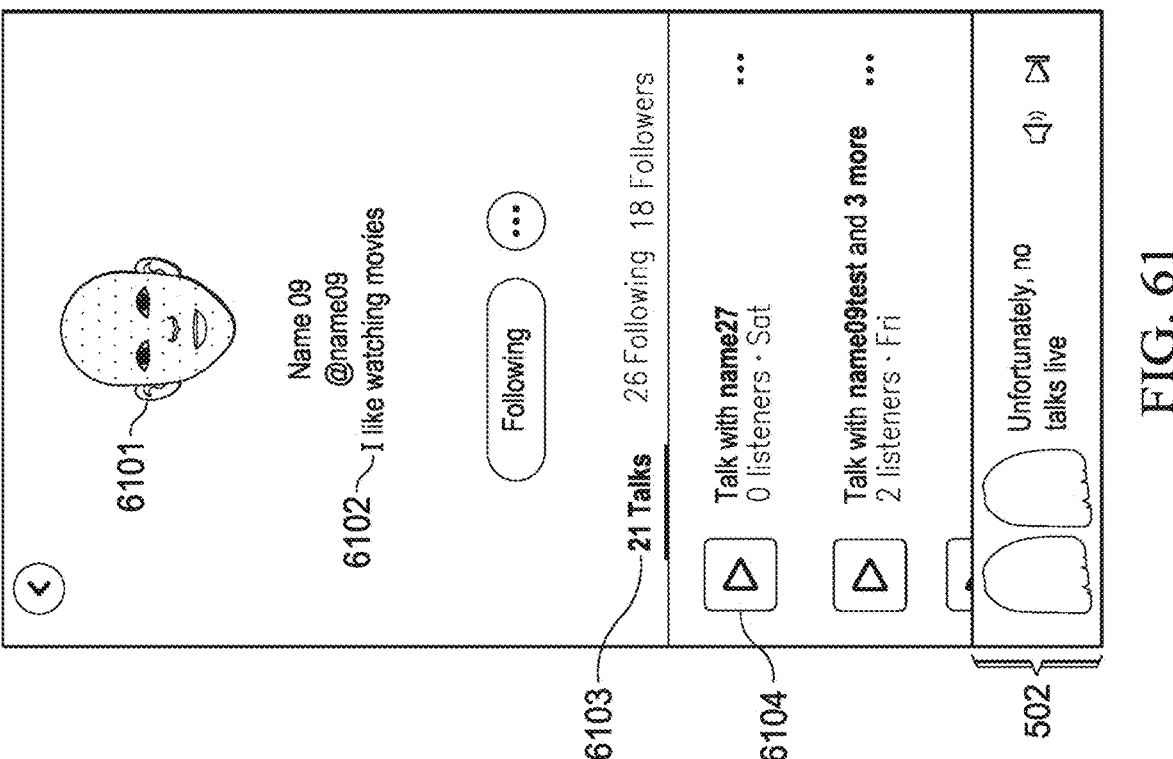

In an embodiment, when the page of a user 6101 is viewed as shown in FIG. 61 for the first time and no live talk is ongoing (user is in listening mode), one of the past talks such as the talk with name27 6104 may be selected to be played, and a screen as shown in FIG. 62 may be presented that shows users Name09 and Name09test and a playback control bar 6202.

Figures 63, 64:
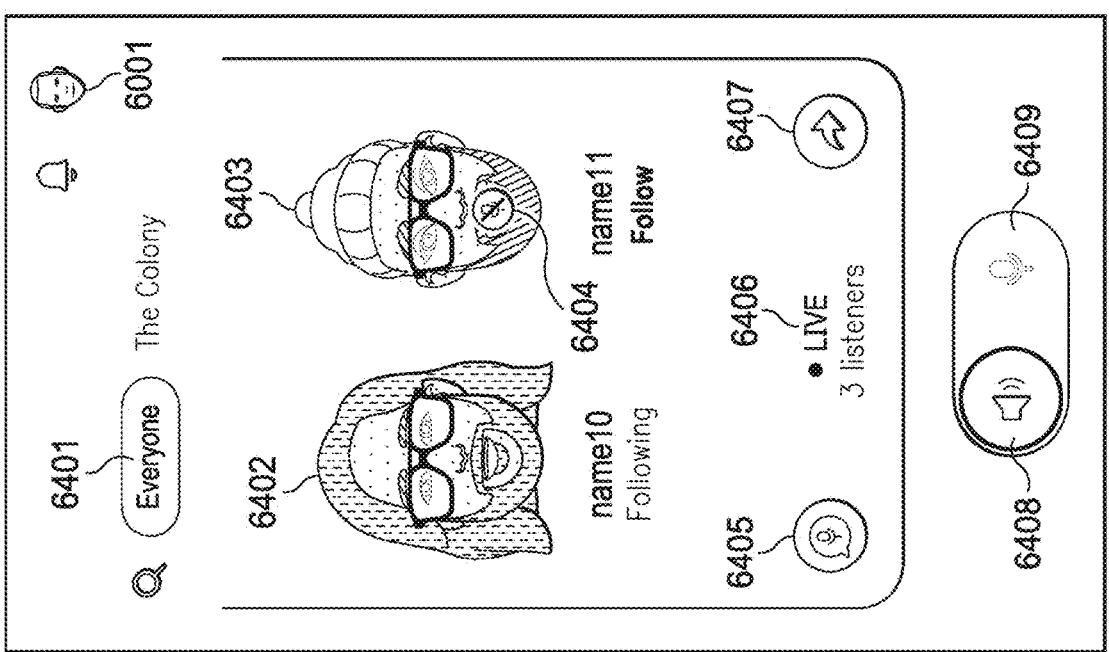
Figures 65, 66A:
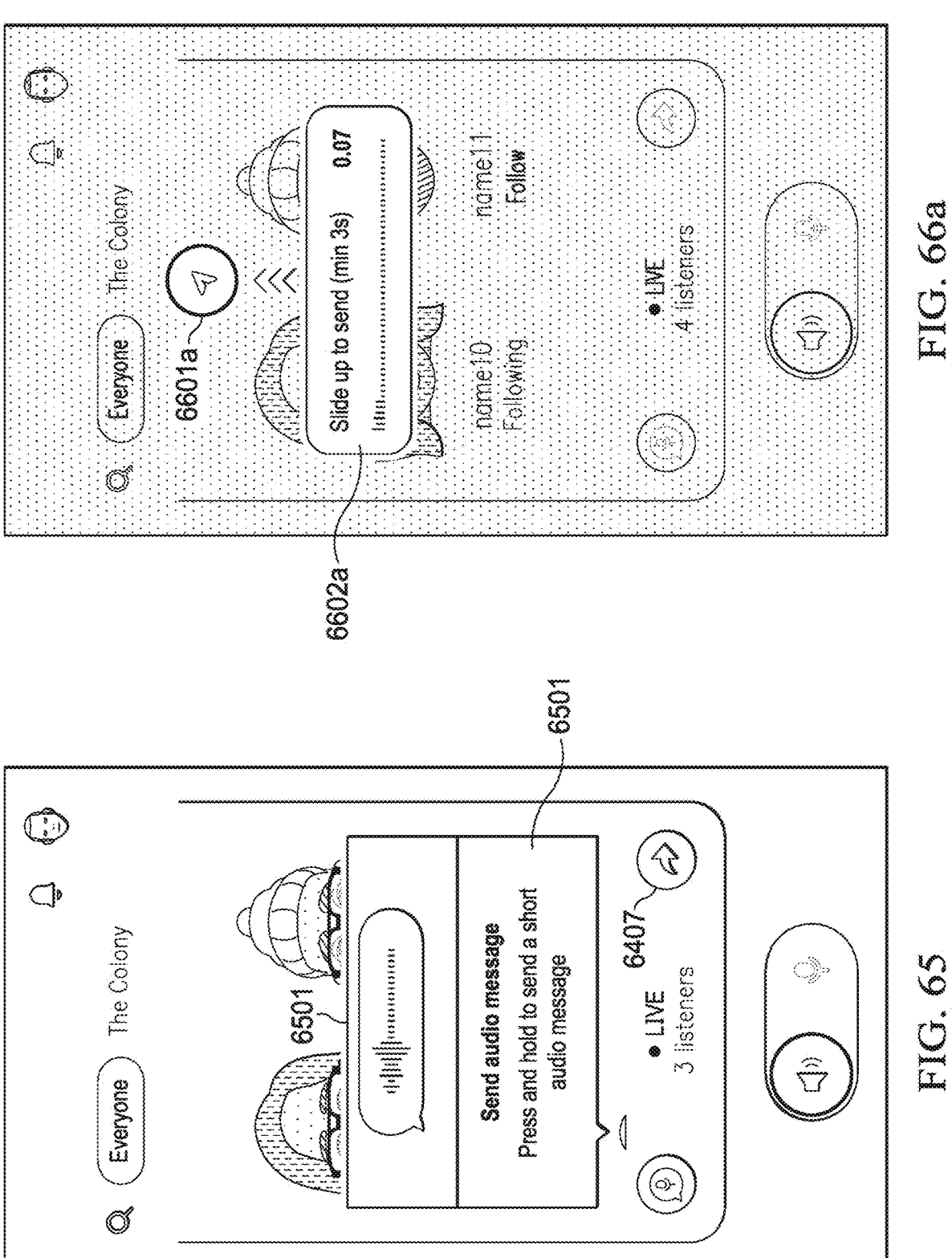

A muted icon 6404 as in FIG. 64 may indicate that a speaker is muted (i.e., the listeners and the other speaker cannot hear the muted speaker). A user (e.g., listener) may record and send an audio message 6501 to a speaker of a live talk while listening to the live talk as shown in FIG. 65. The audio message may be transmitted via an application server as described in this disclosure. In another embodiment, the user may choose to simultaneously send the audio message to more than one speaker of the live talk at once. The audio message may be limited to a predetermined length, e.g., 10 seconds, 15 seconds, etc. In an embodiment, a user may send pre-recorded audio messages, e.g., short audio messages, for most common usages such as greetings, introducing oneself, etc.

Figure 66B:
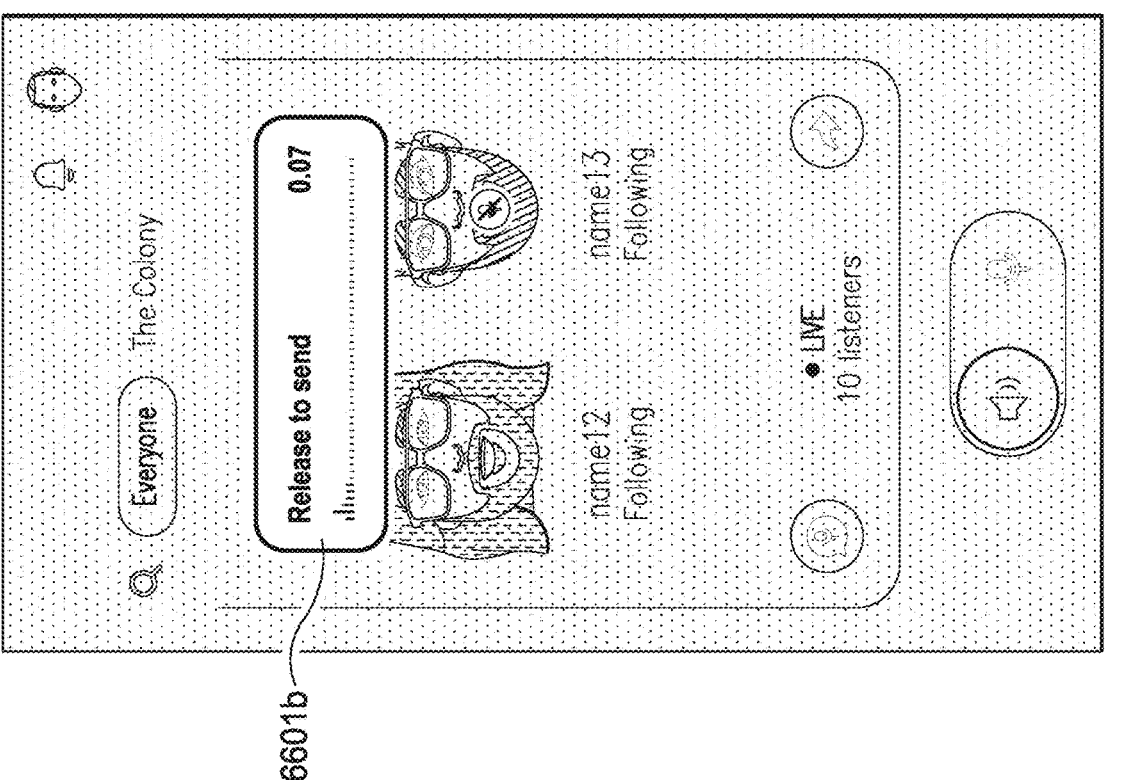
Figure 69:
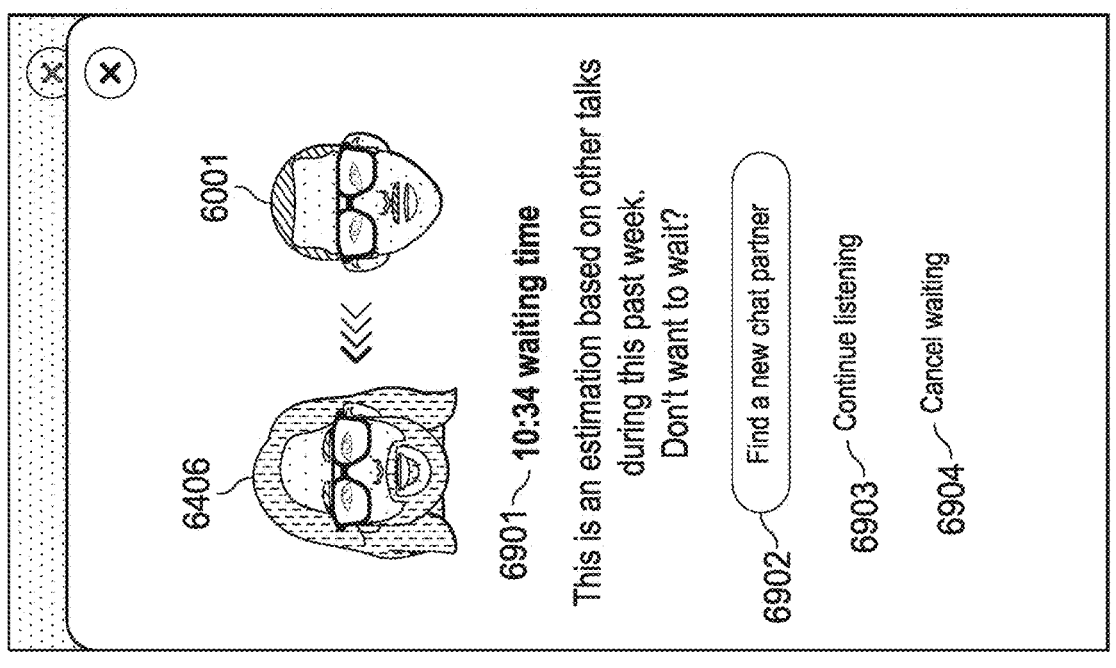

The user may send the audio message when the user finishes recording the audio message, e.g., by sliding up a finger on a screen and releasing the finger to send as shown in FIGS. 66a and 66b. When the audio message is received by a speaker, the speaker may select a play option to play the audio. In some embodiments, a speaker may play the audio only once or only a predetermined number of times. The audio is stored with the conversation such that the audio is either integrated into the conversation or stored as a separate file, such that the audio played back during a future playback of the audio conversation. In some embodiments, a listener may comment on the live talk via another method, e.g., using a "like" icon, a smiley, a sticker etc. A user may comment on a historical talk in a similar way. A listener may share a live talk with options 6701 while listening to the talk by selecting a right arrow icon 6407. The user may choose to copy a link for live talk sharing, share the live talk to an instant message application or social media network, or perform another function to share the live talk. The user may also report the live talk, e.g., if the user thinks there is an issue with the live talk.

Figure 67:
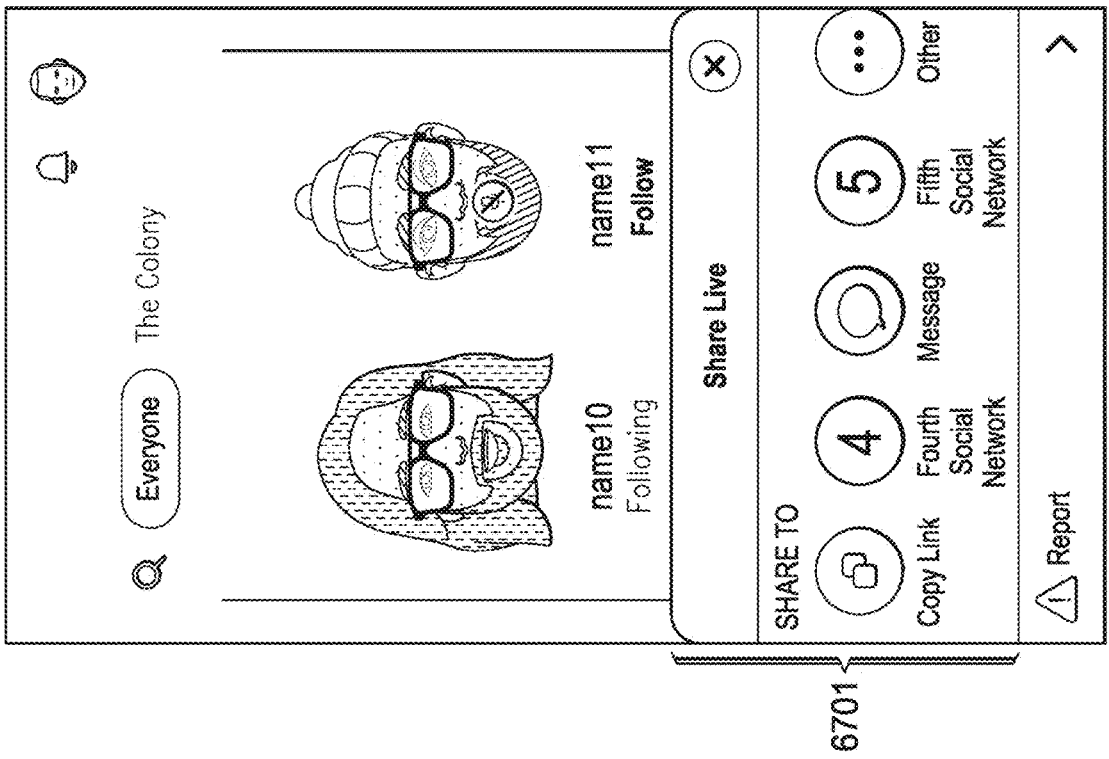
Figure 68:
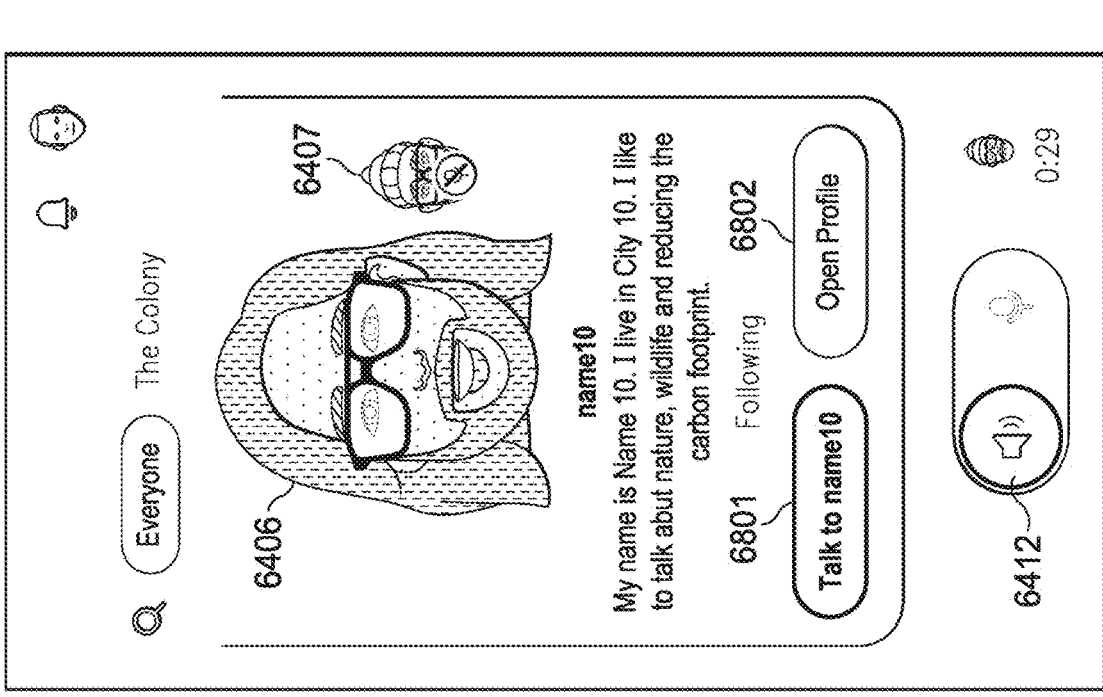
Figure 103:
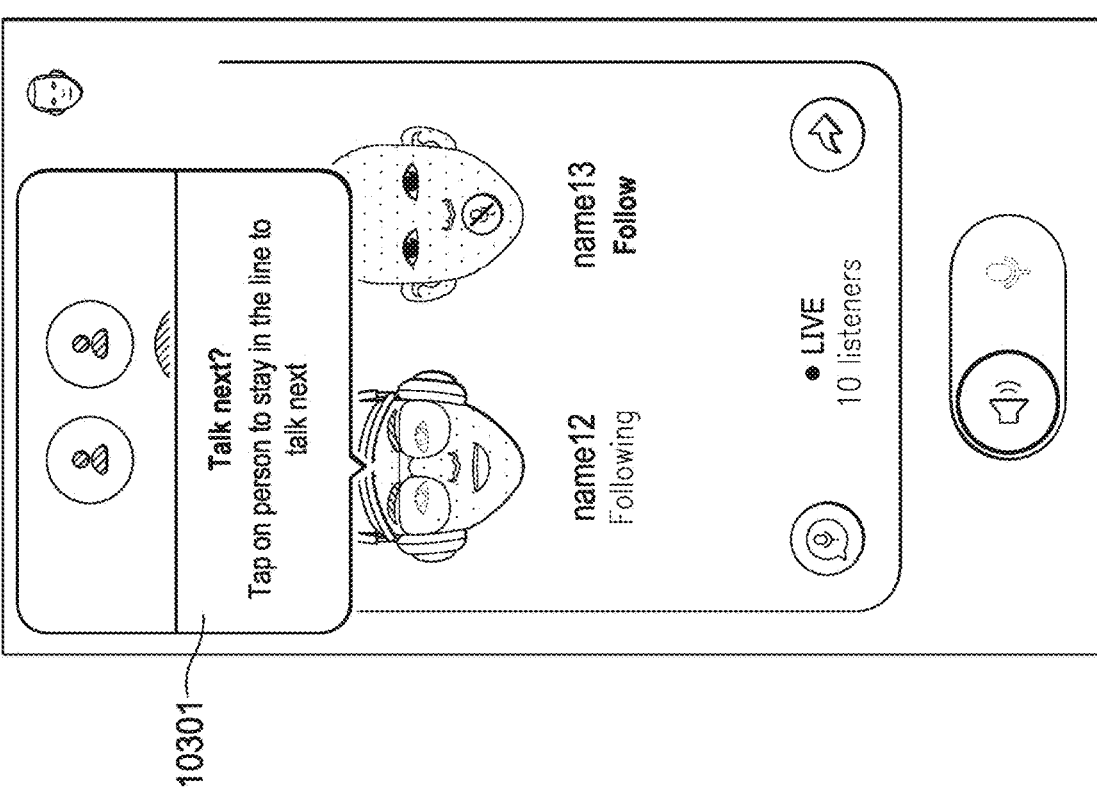
Figure 102:
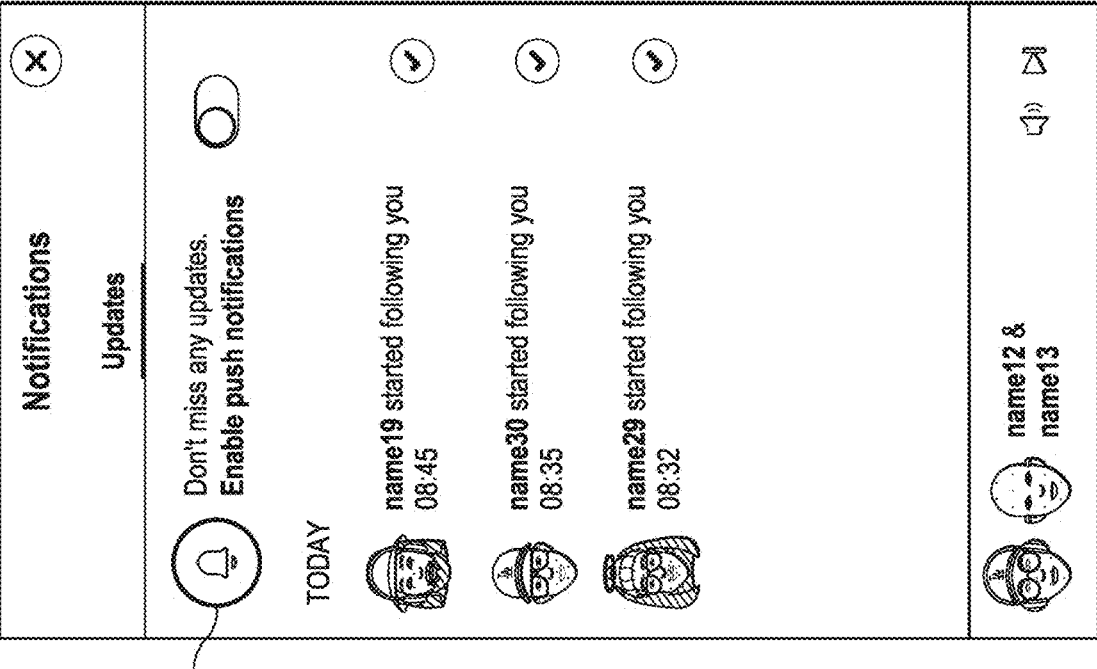

If a user would like to initiate a talk with one of the speakers, e.g., name10 in FIG. 67, who is currently on a live talk, the user may select the speaker (e.g., by tapping on the speaker), and then press the "Talk to name10" icon 6801. The user is then added onto a waitlist associated with name10. In some embodiments, a pop up window such as 10301 in FIG. 103 may indicate that the user may choose a speaker to talk to next. When the speaker, in this case name10, is selected, the corresponding emoji may enlarge as shown in FIG. 68, and an icon 6802 for examining the profile of the speaker may be displayed. After selecting the icon to talk to the speaker currently in a live talk, an estimated waiting time 6901 for how long the user may wait before speaking to the speaker may be displayed. This estimated waiting time may be based on a number of factors including, but not limited to, prior conversation durations (or other statistics) associated with one or both speakers in conversations, current conversation duration, number of listeners, number of users on the waitlist, user's position on the waiting list, etc.

Figure 71:
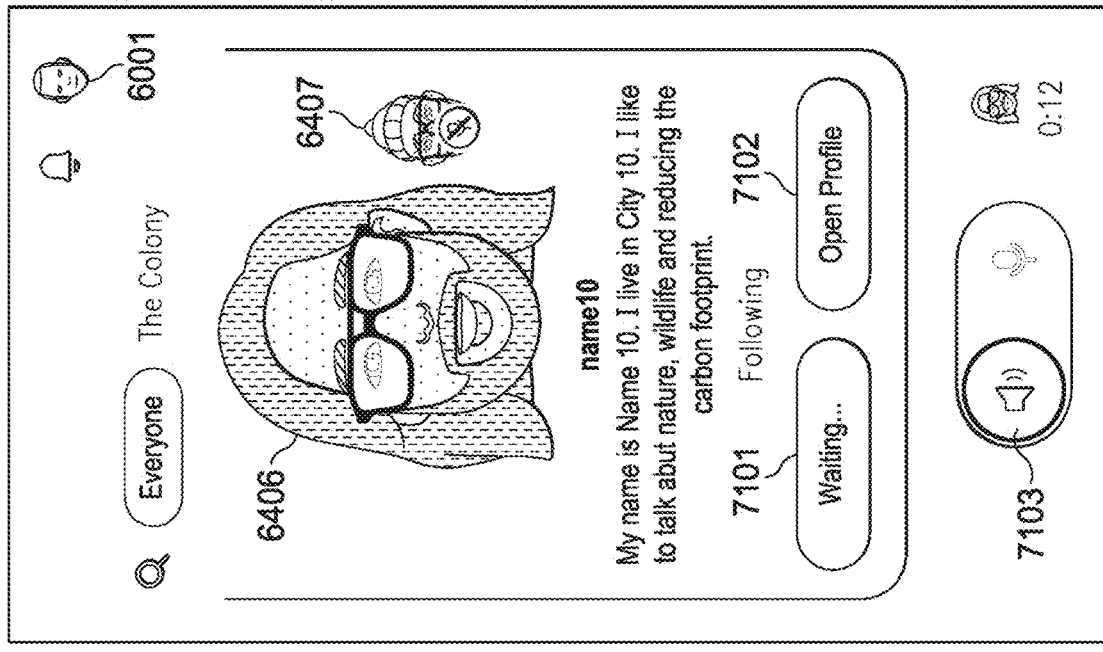
Figure 70:
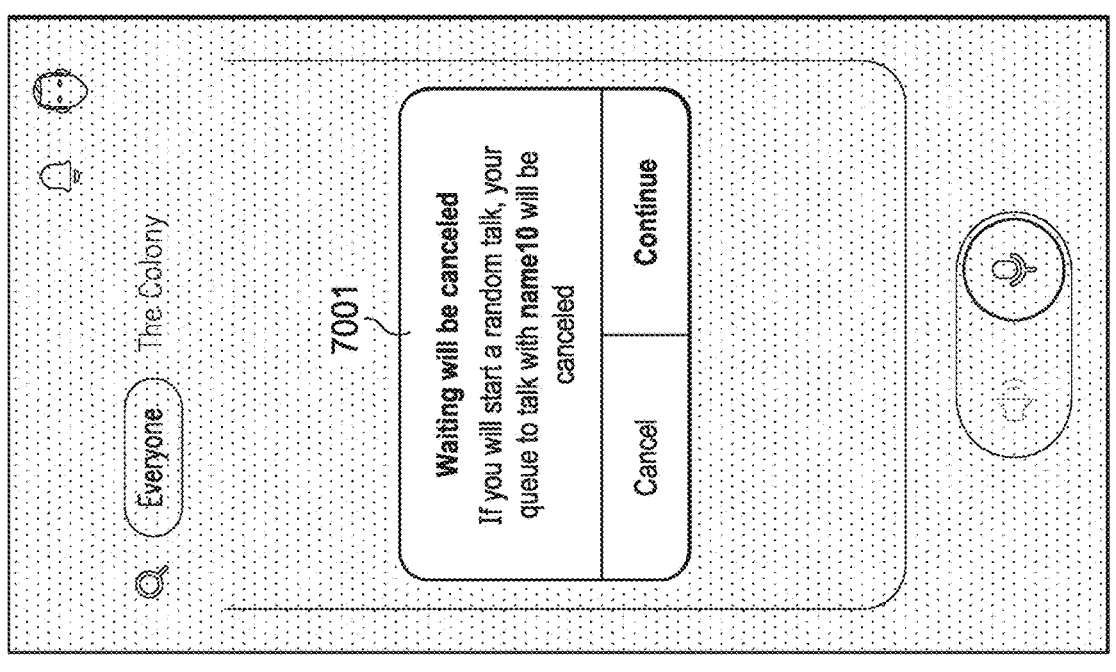
Figure 105:
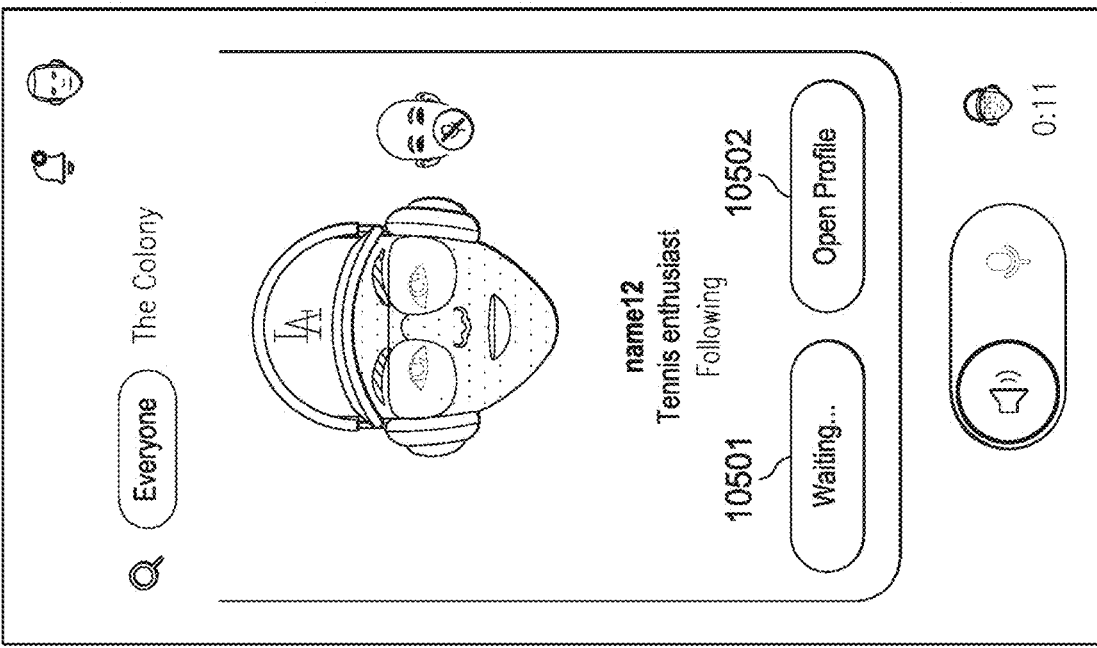
Figure 104:
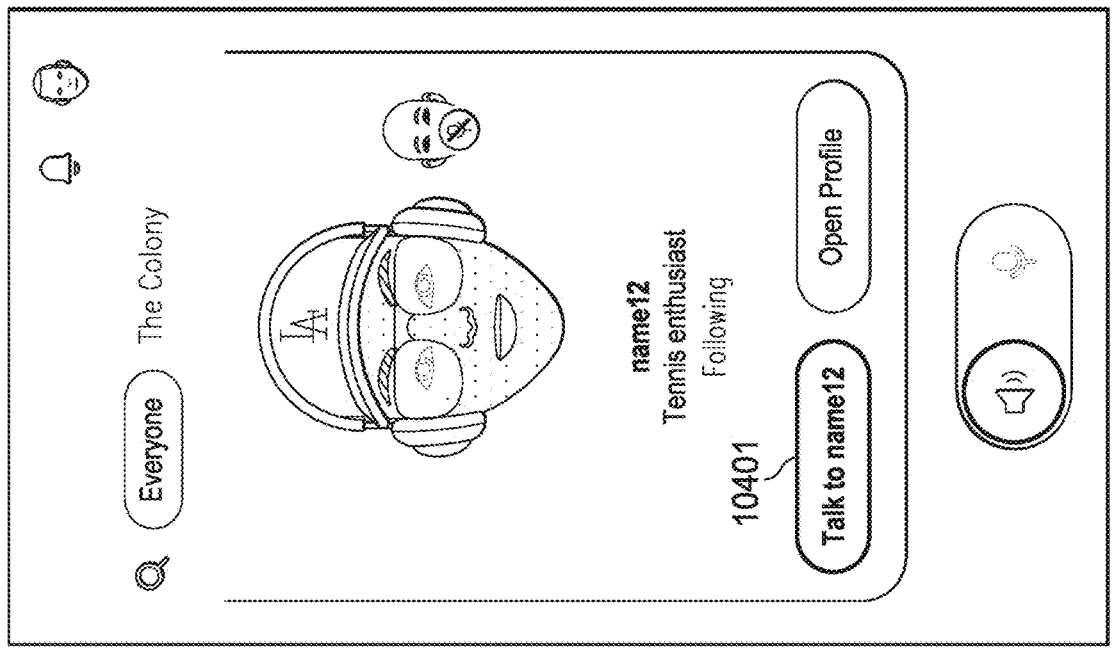
Figure 106:
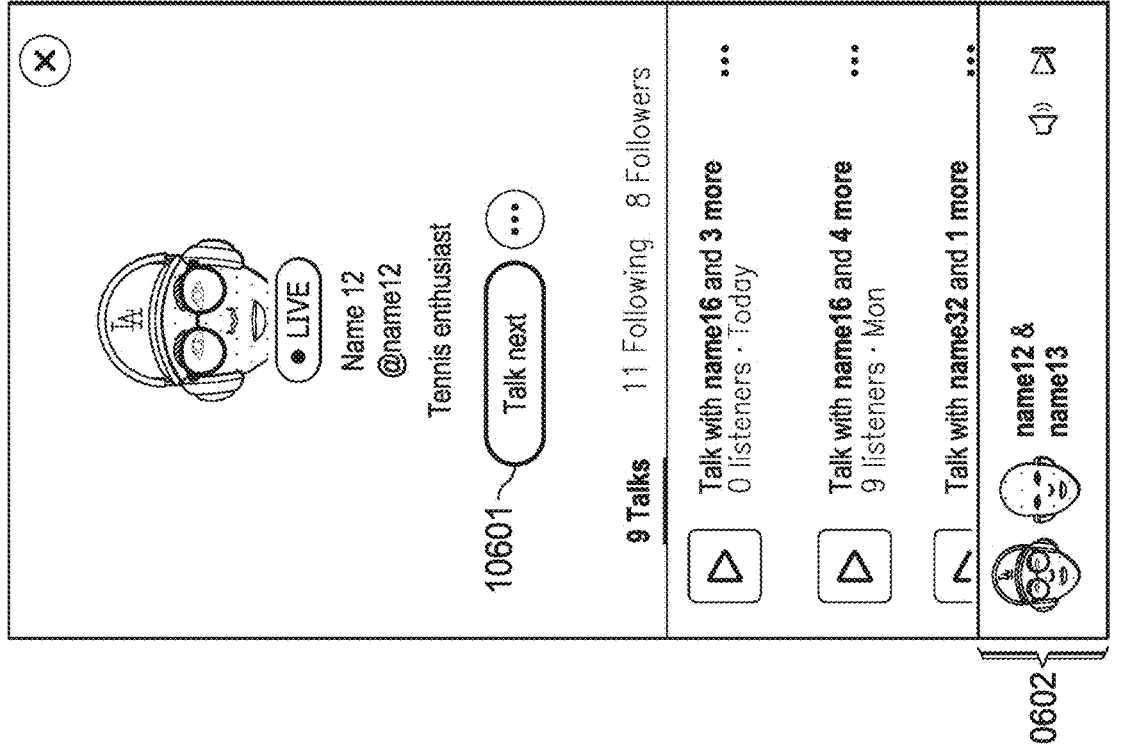

The user may choose a "Find a new chat partner" icon 6902, "Continue listening" icon 6903, or "Cancel waiting" icon 6904. If the user cancels waiting, a message 7001 indicating that the waiting will be cancelled may be displayed as shown in FIG. 71. Alternatively, if the user chooses not to cancel waiting, a "Waiting" icon 7101 may be presented as shown in FIG. 71. While waiting in line, the user may tap the "Open profile" icon 7102 to review the speaker's profile. Alternatively or additionally, if the user wishes to talk next to a user that is in a live conversation, instead of selecting a "Talk to name12" icon 10401 as shown in FIG. 104 to initiate a talk with one of the speakers, the "Open Profile" icon 7102 or 10502 of FIG. 105 may be selected, and a "Talk next" icon 10601 may then be selected as shown in FIG. 106.

Figure 101A:
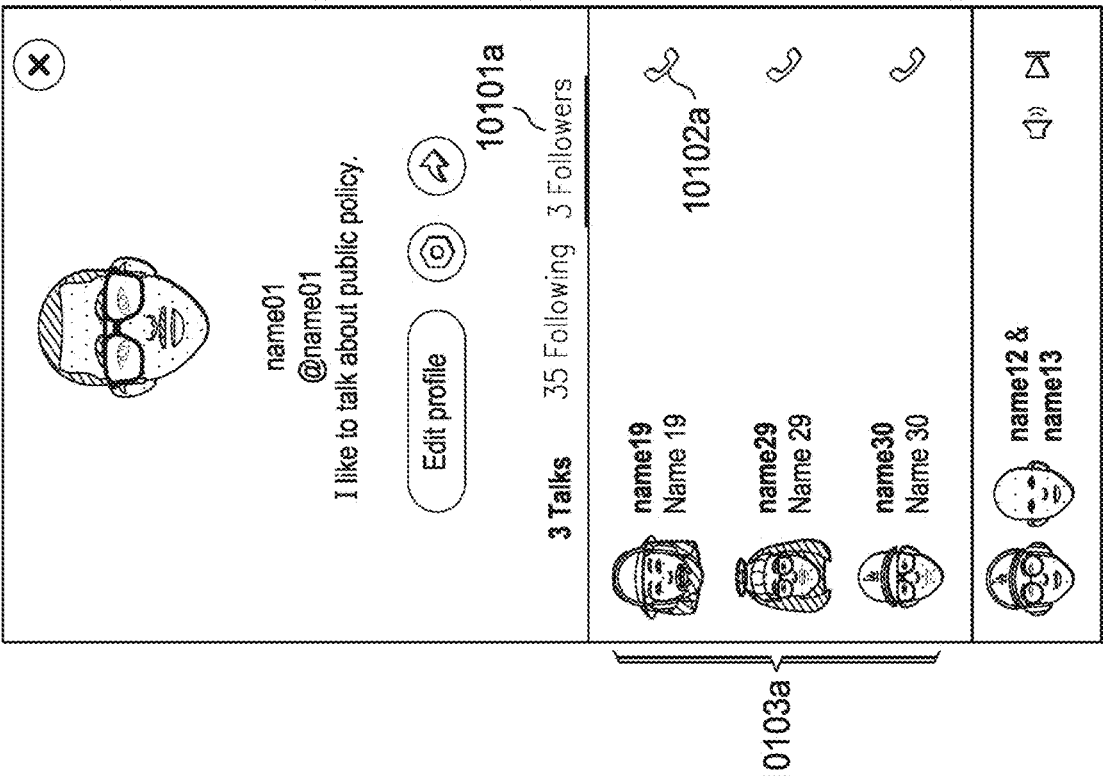

It should be appreciated that the live talk may continue and a control bar may be displayed at the bottom section 10602 when the profile of name12 is viewed. When the waiting is over or the current conversation ends, the mobile application may transition into the requested conversation, e.g., instantaneously. In some embodiments, the speaker (i.e., name12) may have to actively select an option to speak to the next user on the waitlist. Similarly, the transition from the conversation mode to the listening mode (i.e., for the listener) may be substantially real-time or instantaneous. A user may initiate a talk with a follower or "following" user by tapping a telephone icon 10102a in FIG. 101a next to the follower. In some embodiments, this telephone icon is available only if both users follow each other. Instead of initiating a talk in real-time or waiting for a user to end a live talk and then starting a talk right after the live talk ends, a user may schedule a talk for a later time with a follower(s), a following user(s), or speaker(s) of a live talk. The follower, following user, or speaker may receive notification associated with the scheduled talk and may have an option to either accept or decline the scheduled talk request.

Figure 72:
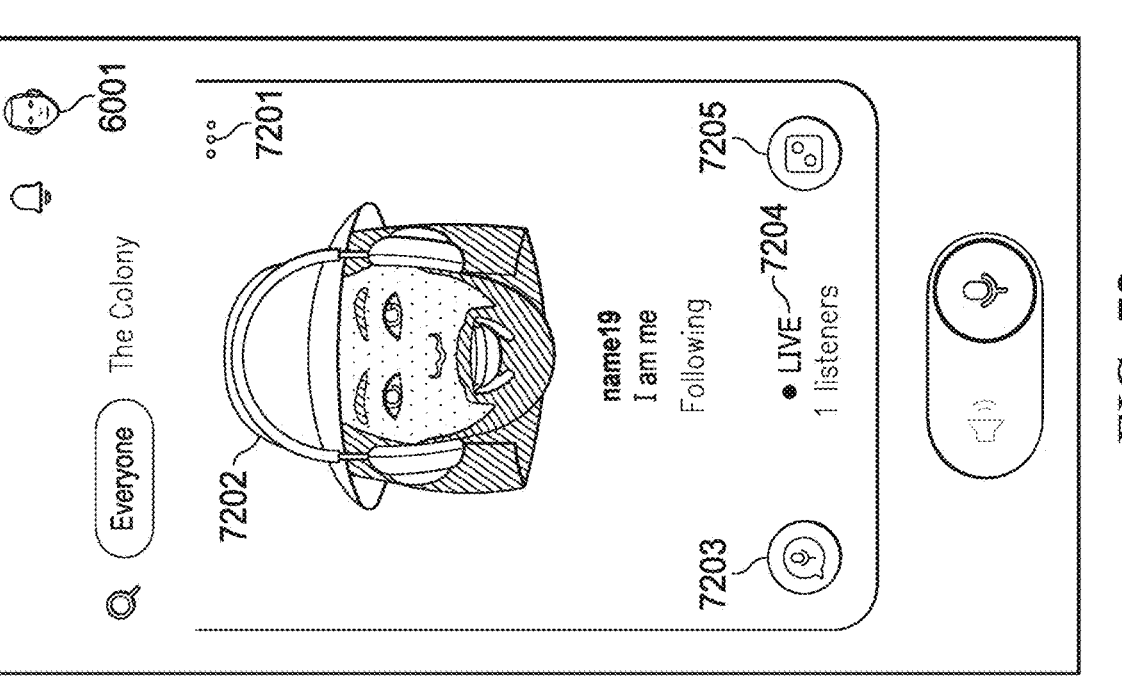
Figure 75:
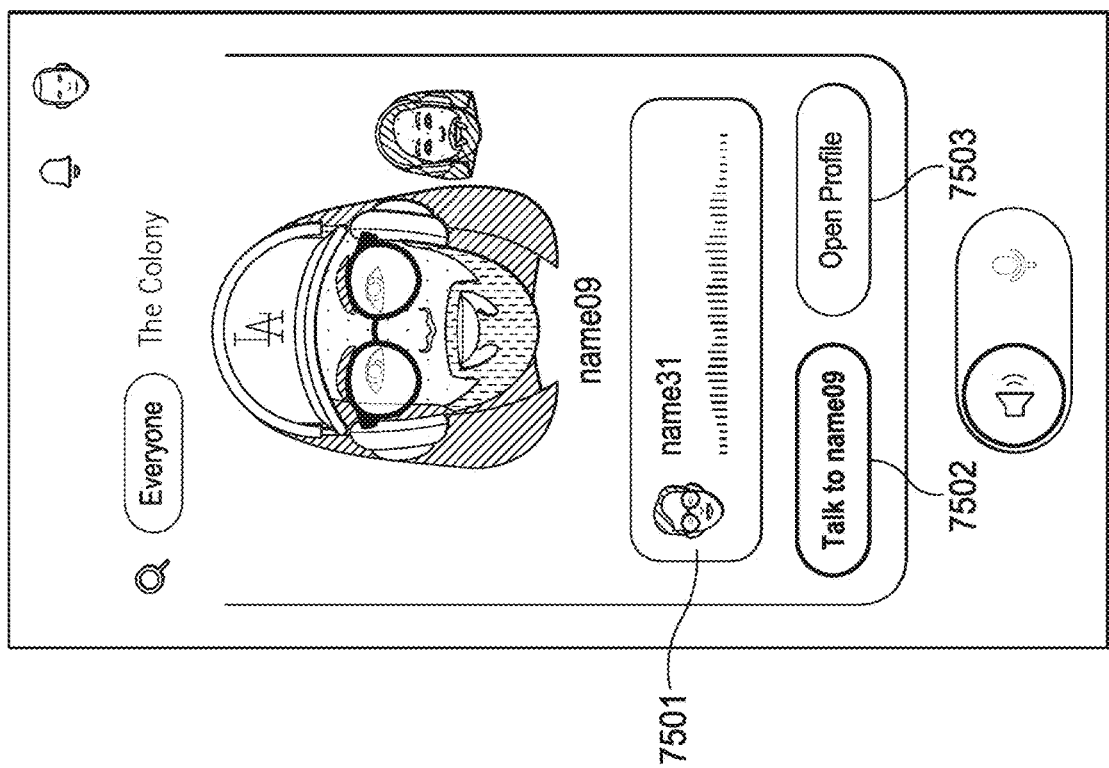
Figure 74:
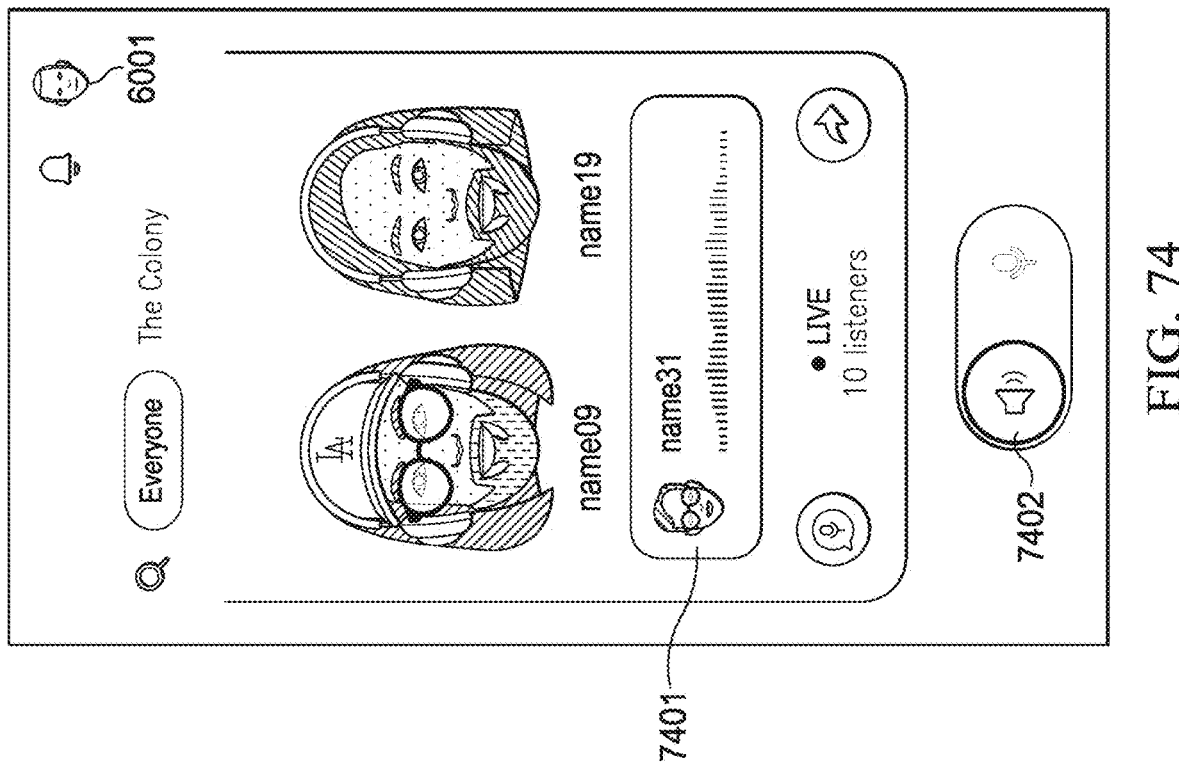
Figure 77:
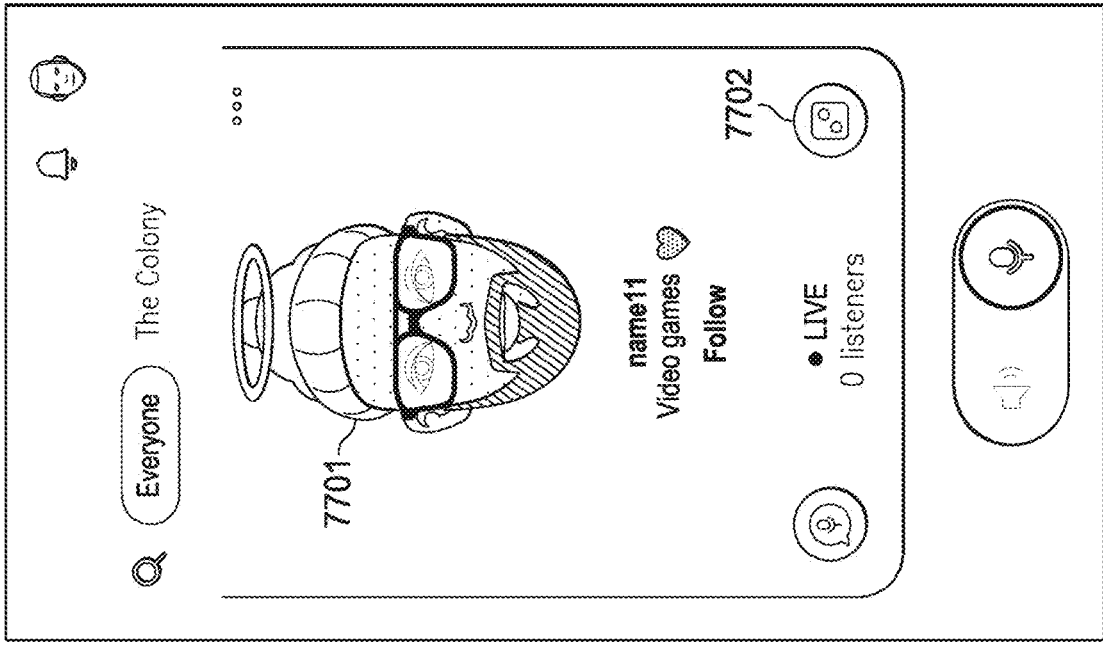
Figure 76:
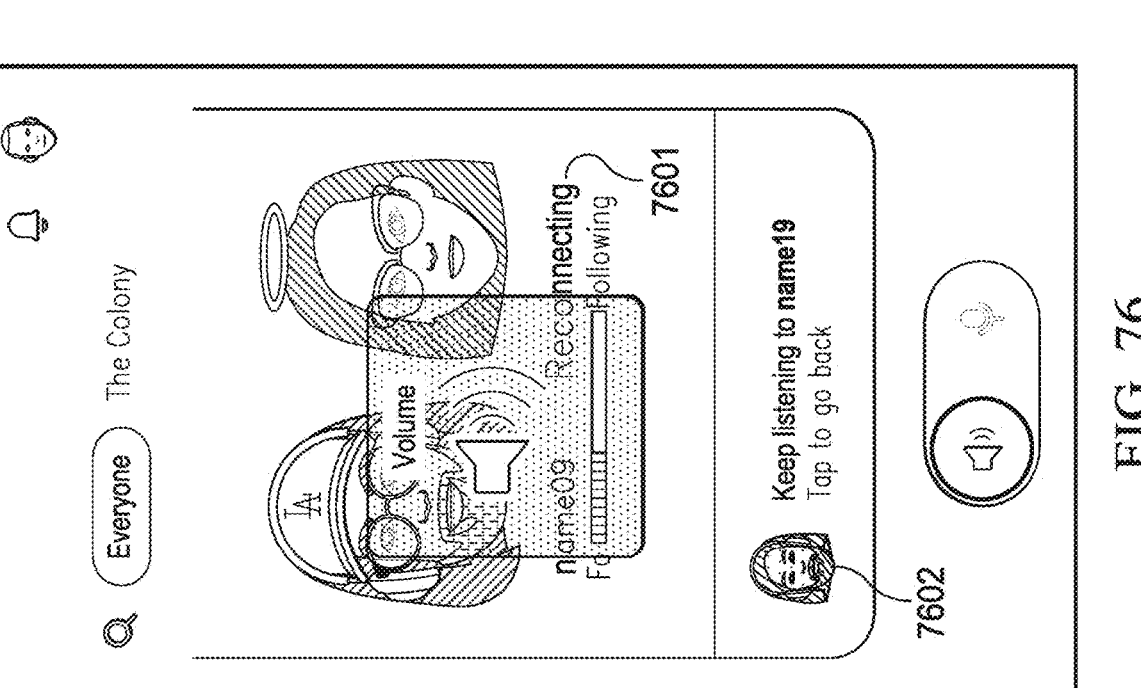
Figure 79:
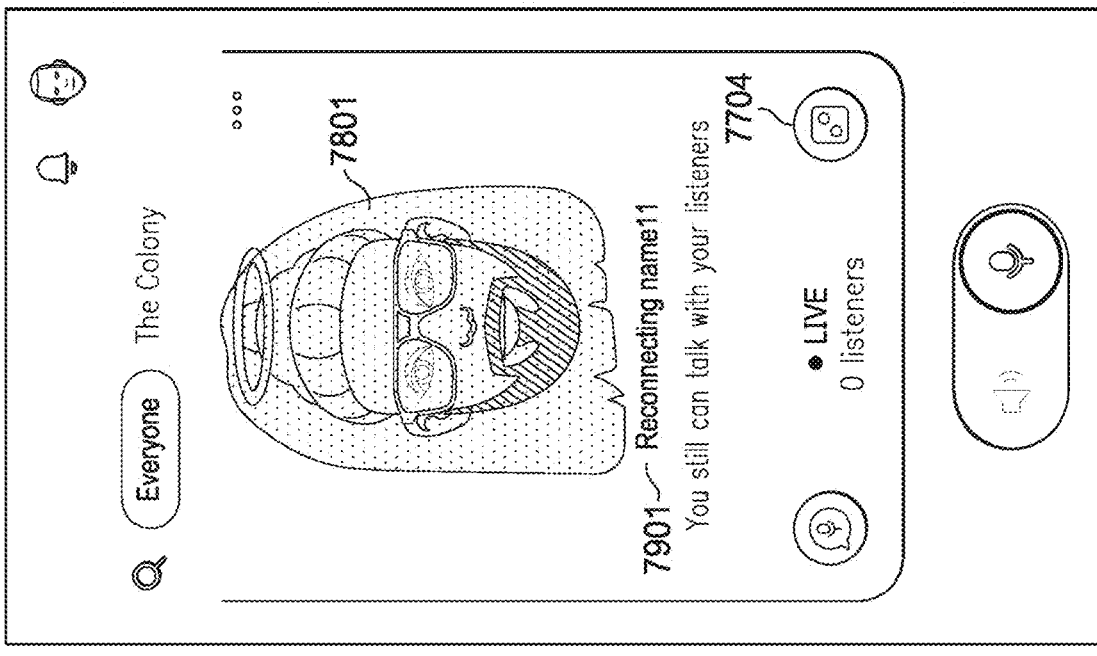
Figure 78:
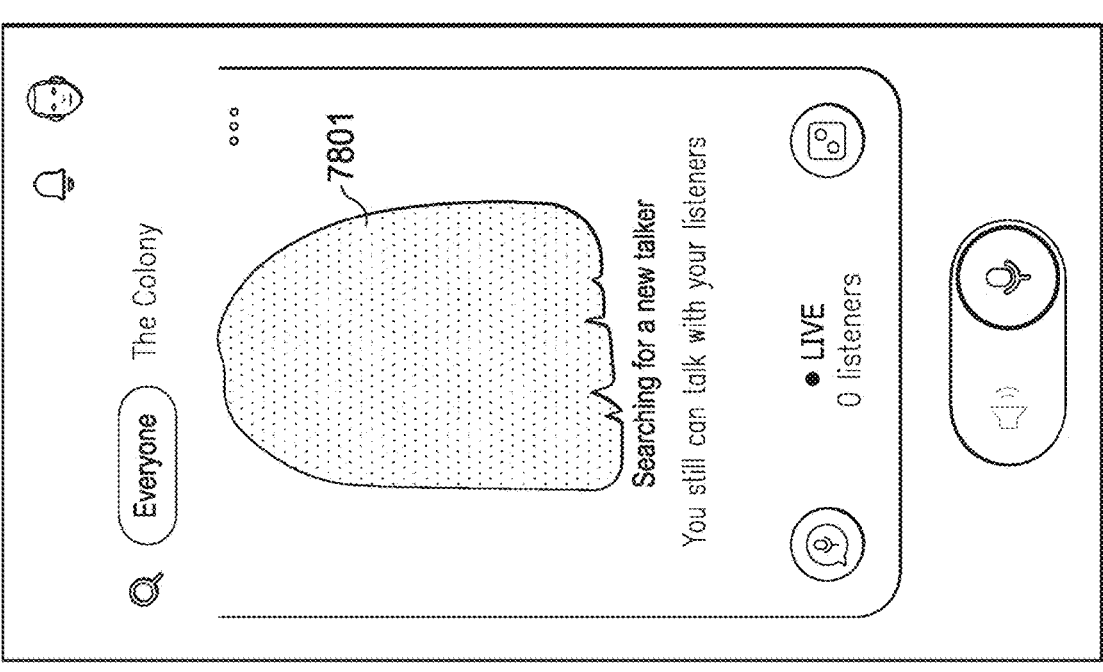
Figure 80:
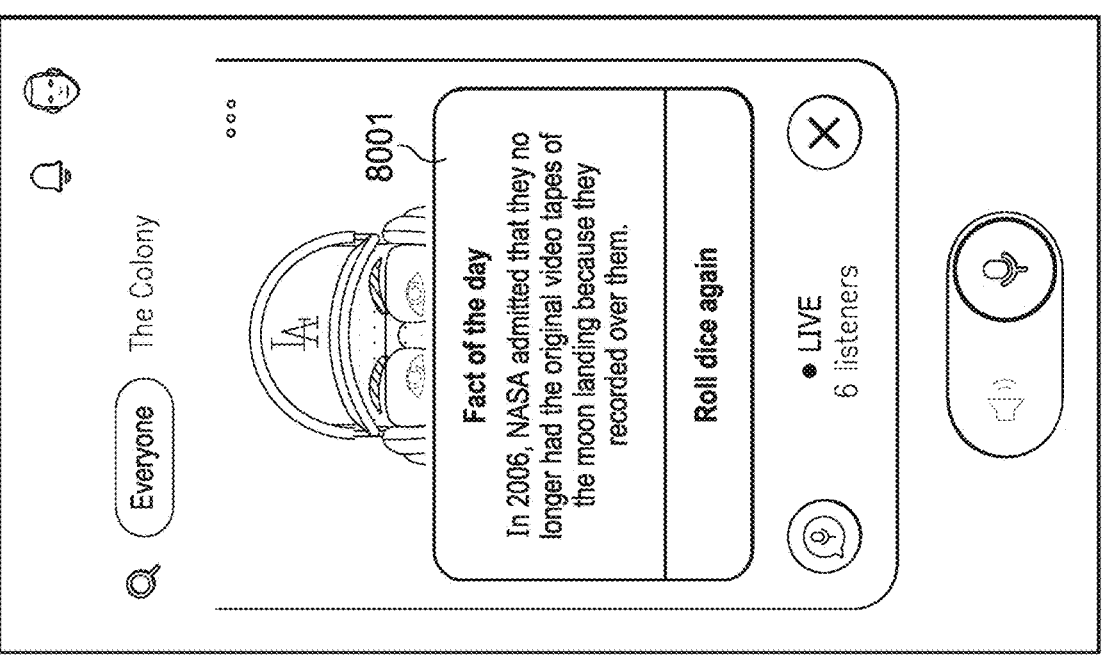

FIG. 72 or FIG. 77 shows an example screenshot of the mobile application when a user 6001 is conducting a live audio conversation with another user 7202 (i.e., name 19). In this example, a microphone icon at the bottom of the screen indicates the conversation mode, a "Live" icon 7204 indicates an ongoing live talk, a dice icon 7205 allows a user to view "Fact of the day," and the number of listeners is displayed. With "Fact of the day," fun facts may be presented in a pop up window 8001 as shown in FIG. 80 to spur discussion between the speakers. In some embodiments, the "Fact of the day" may be replaced with other conversation starting hints. The hints may be based on any user data described herein associated with either of the speakers. Artificial intelligence functions may be used to generate the hints. When a speaker/talker goes out of range or drops out of the audio conversation for another reason, the application may search for a new talker as shown in section 7801 of FIG. 78 and/or reconnect to the talker that is out of range as shown in section 7901 of FIG. 79. In some embodiments, the other talker(s) participating or remaining in the audio conversation (along with the listeners) may be available for new talker(s) to join the conversation when one speaker drops out of the audio conversation.

Figure 73:
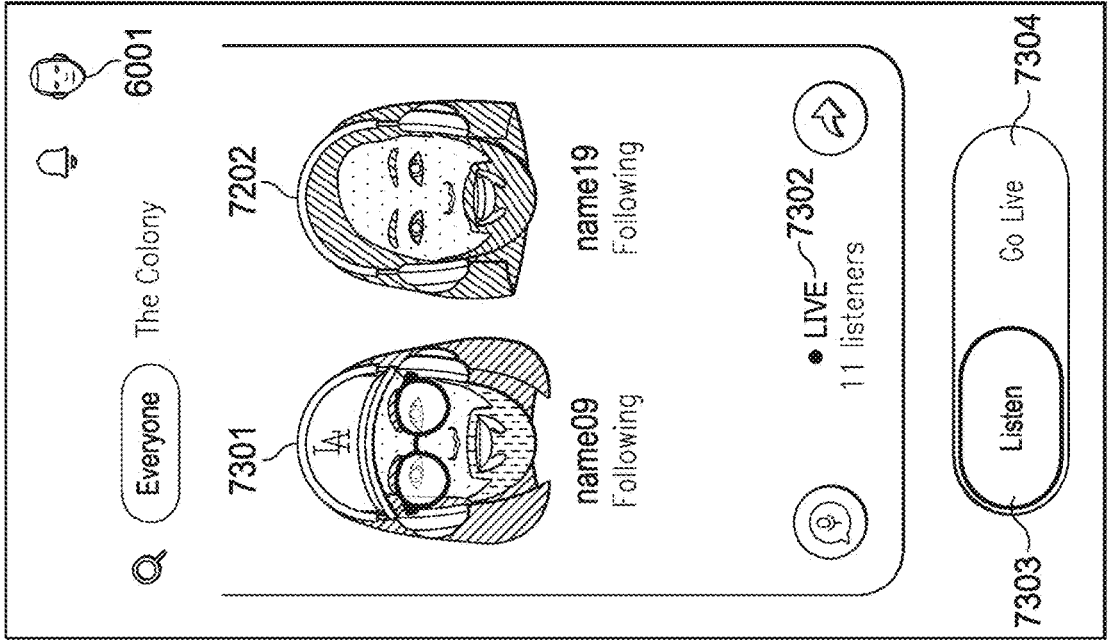

FIG. 73 shows an example screenshot of the user 6001 in a listening mode 7303 listening to a live conversation between speakers name09 7202 and name19 7301. During this live conversation, when a user (e.g., name31) listening to the live conversation sends an audio message 7401, the speakers, name09 and name19, may decide when to play the audio message, whether to make it public, etc. For example, when to play the audio message may need to be approved by one of name09 and name19 (e.g., if the audio message is directed to or associated with one of respective user) or both name09 and name19 (e.g., if the audio message is directed to or associated with the conversation). The audio message may be played during the live talk, after the live talk ends, or both. In some embodiments, the user who sends the message can select how long the audio message can remain available, how many times it can be played, etc.

Figure 85:
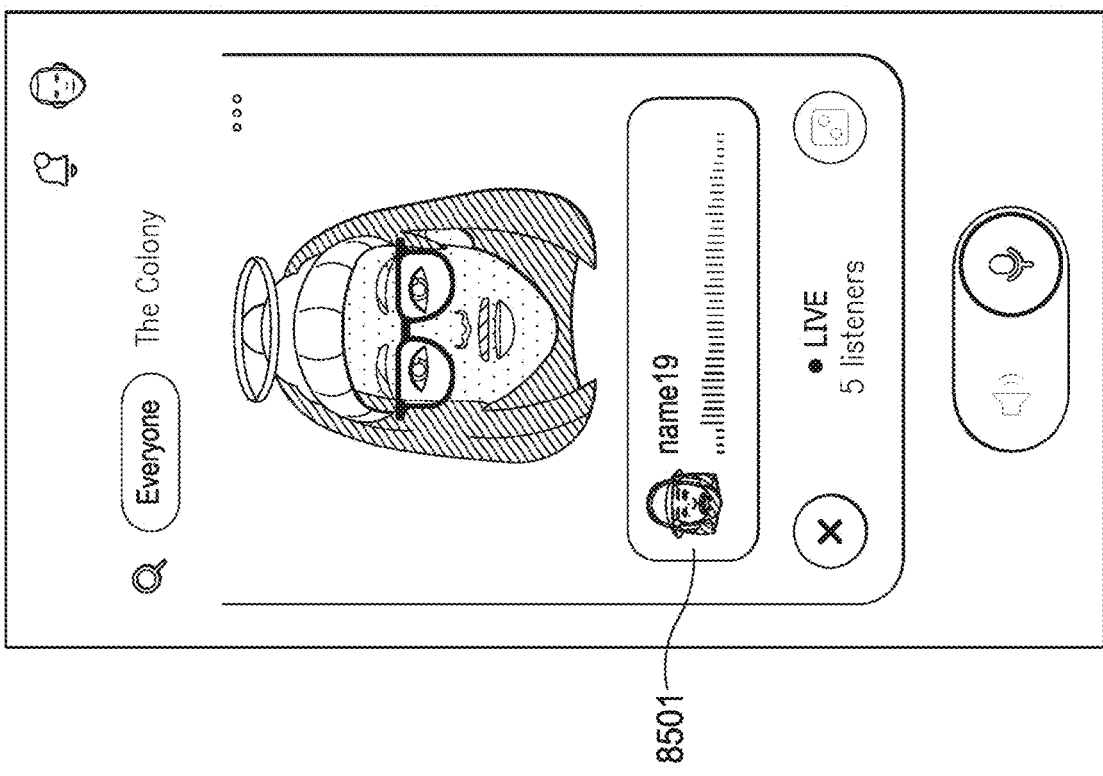
Figure 84:
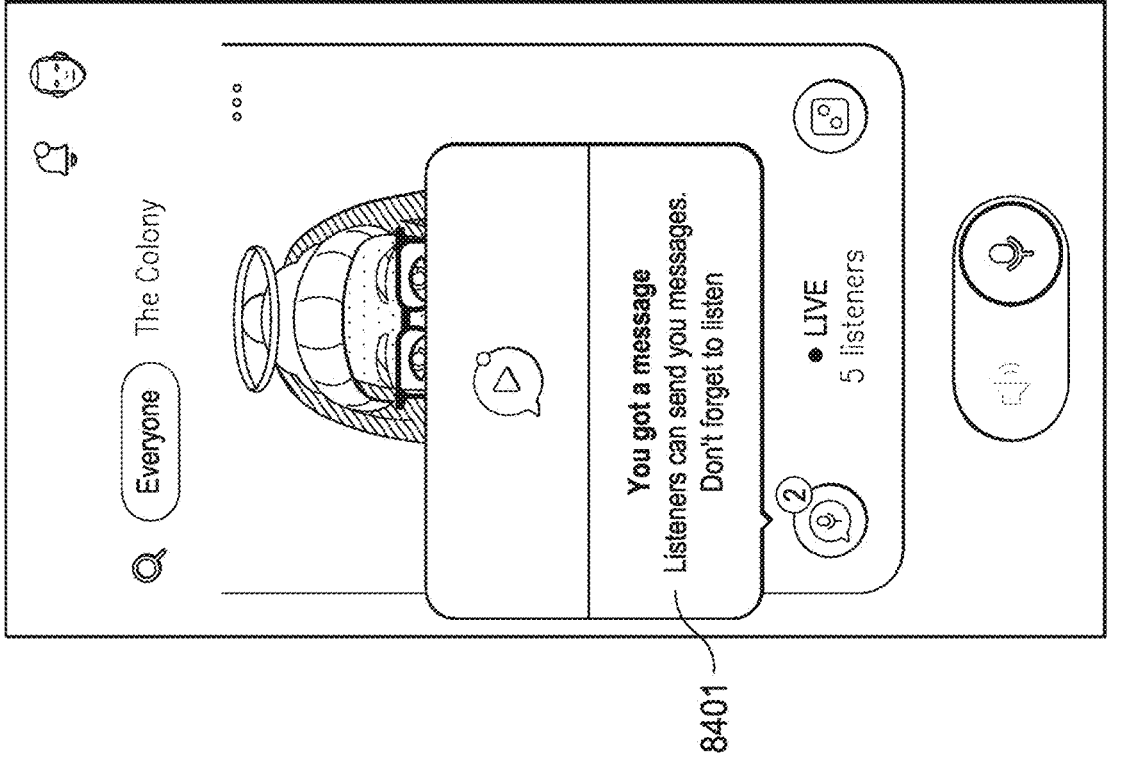
Figure 87:
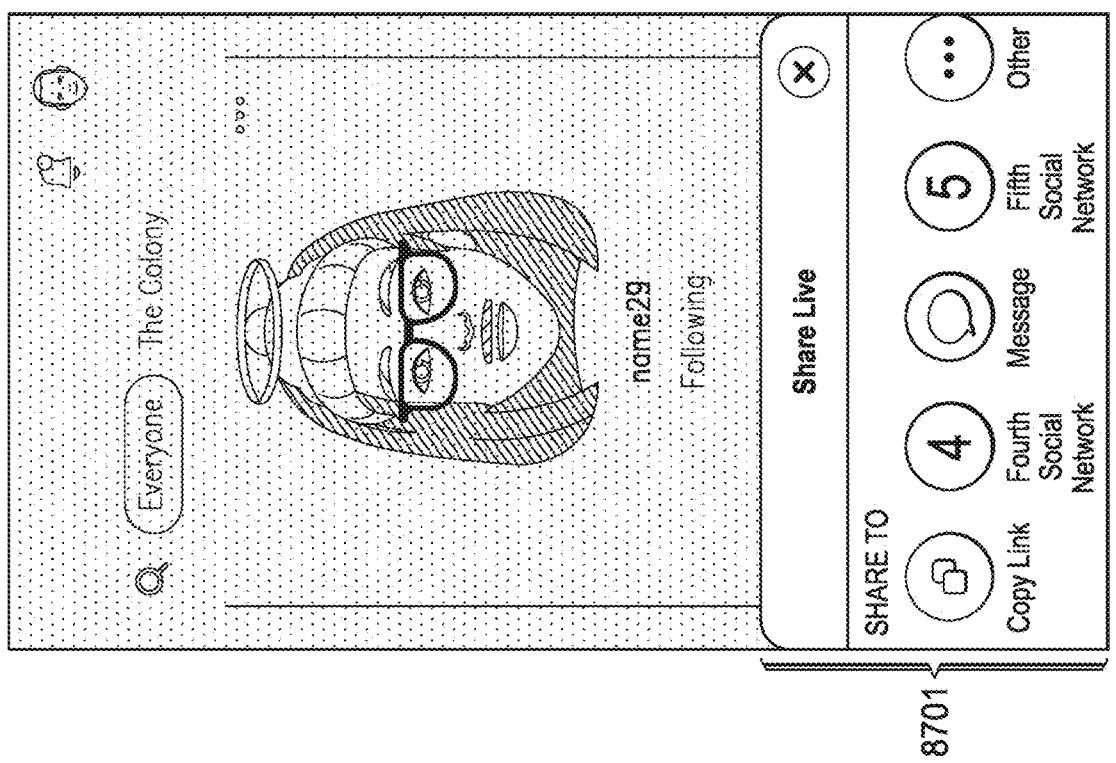
Figure 86:
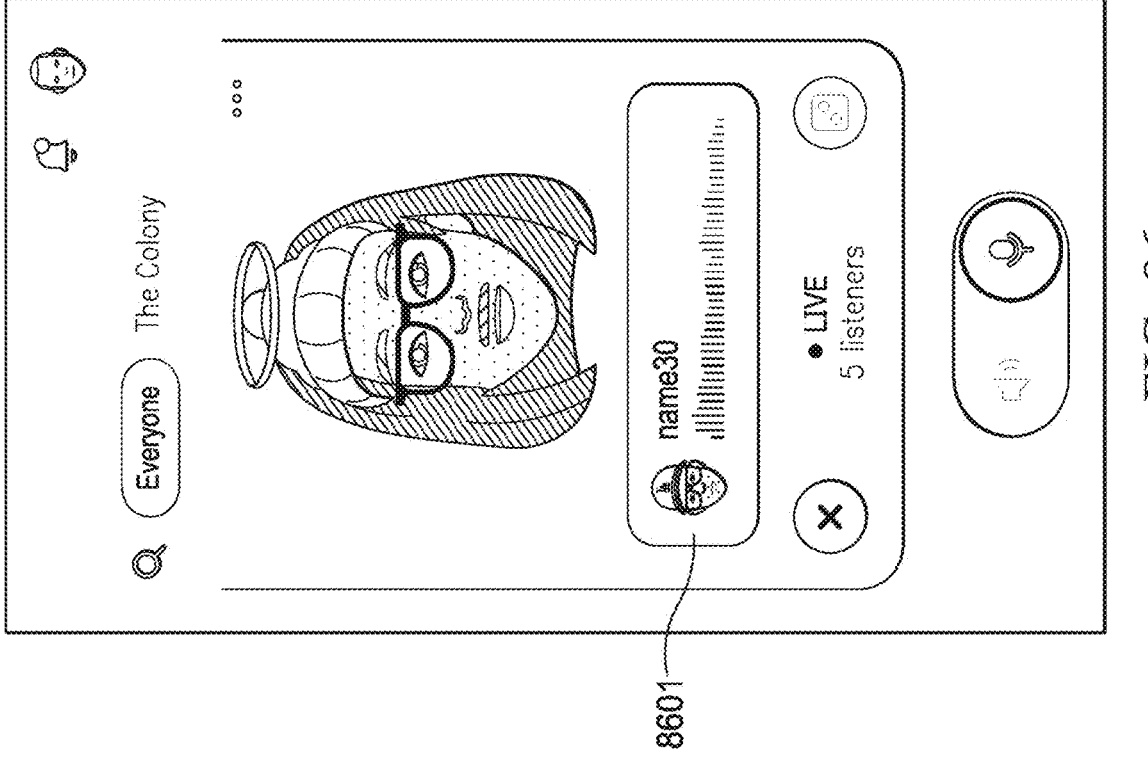

The notification icon 8201 may indicate a notification, e.g., with an orange (or other color) dot as shown in FIG. 83. The notification may be for an audio message such as indicated by a pop up window 8401 in FIG. 84. When the audio message is selected and played as in section 8501 of FIG. 85, it may be made available for all listeners and all speakers of the live talk, a selected some of the listeners (e.g., as determined by the speaker to which the audio message is directed and/or as determined by the sender of the audio message) and all the speakers of the live talk, no listeners but only the speakers of the live talk, or no listeners but only certain speaker(s) of the live talk. When a user is waiting to speak to a speaker who may be currently in conversation, the speaker may be presented with a request notification icon 9101 and/or a more detailed notification 9102 (e.g., when the speaker selects 9101) as shown in FIG. 91. When a user is connecting to another user to start an audio conversation, a message indicating the connection is being set up may be displayed as shown in FIG. 92.

Figure 96:
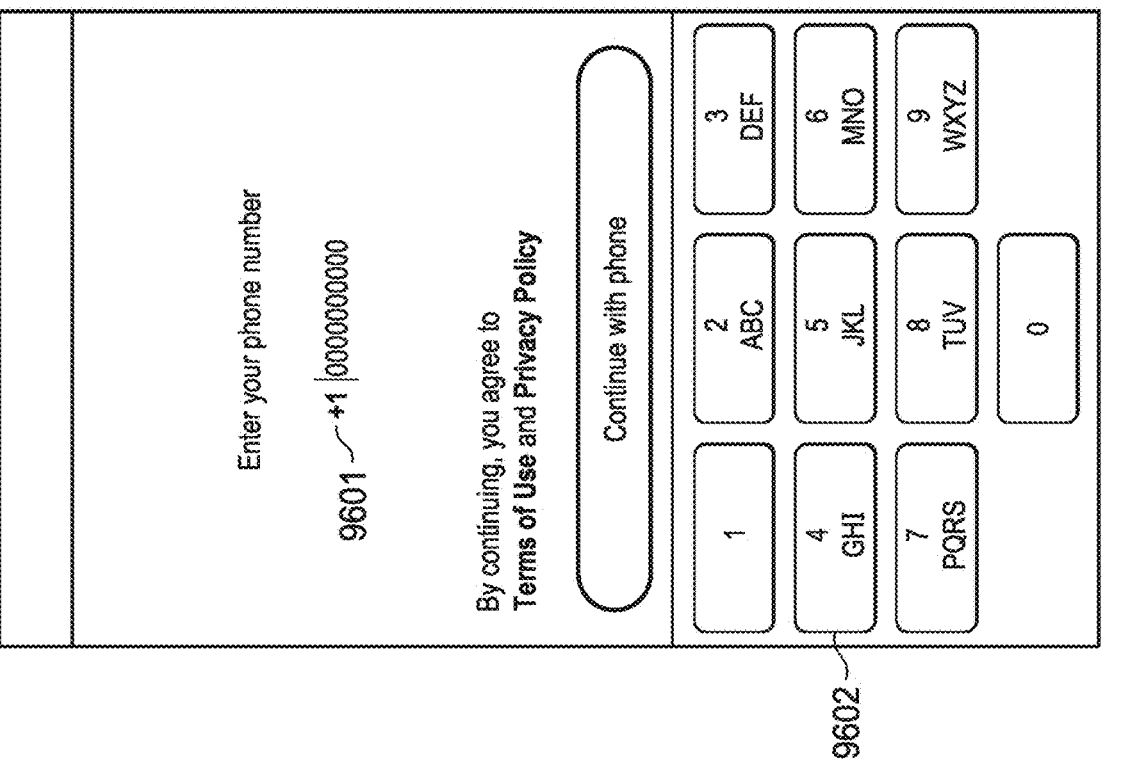
Figures 98, 99:
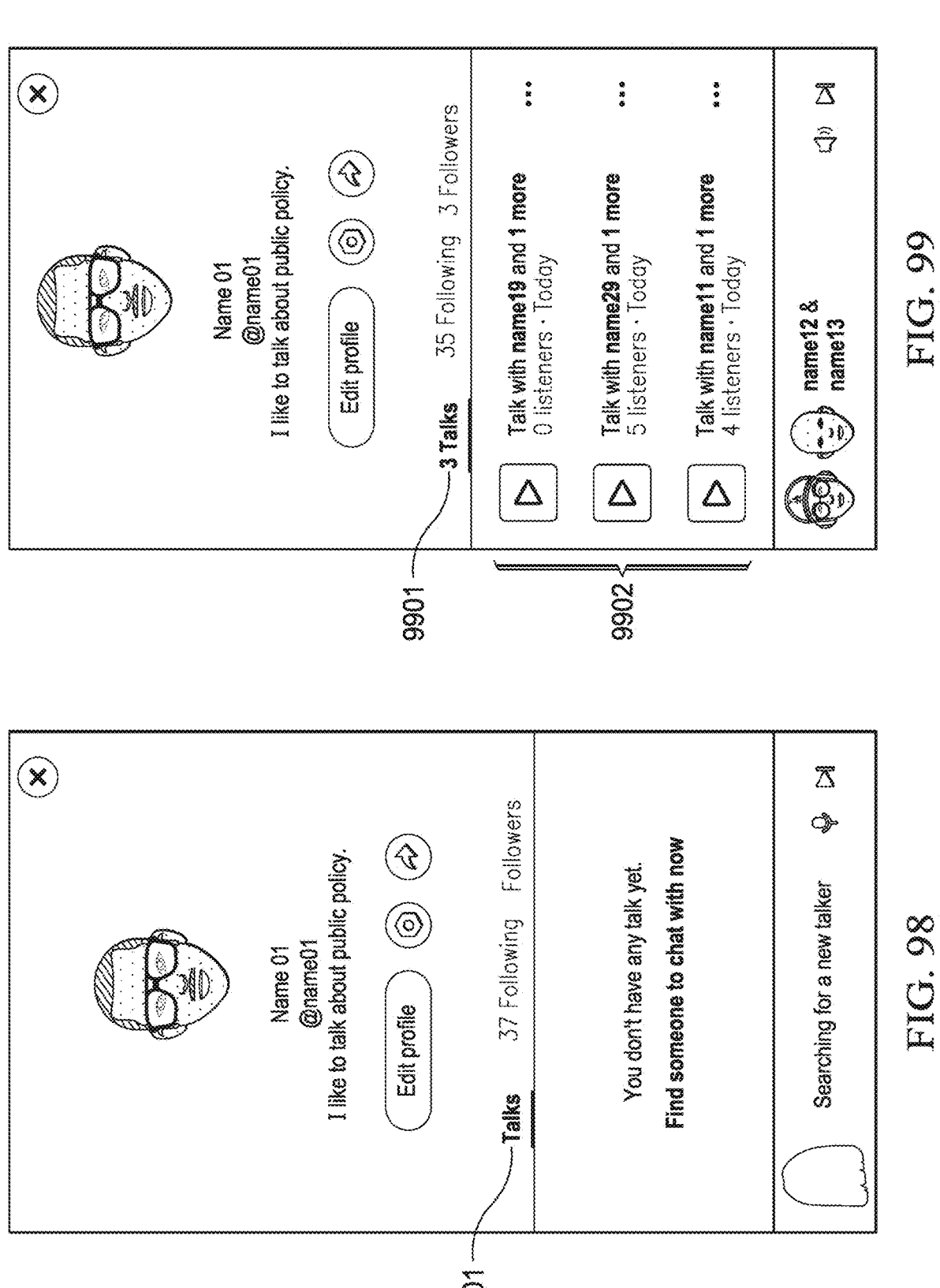

When a user signs up for an account for the first time, the user may be asked to provide a phone number as shown in section 9601 of FIG. 96. The user may use a virtual keyboard 9602 to input the phone number. A verification code like the one shown in a box 9701 may be sent to the user's device to verify the provided phone number.

Figure 107:
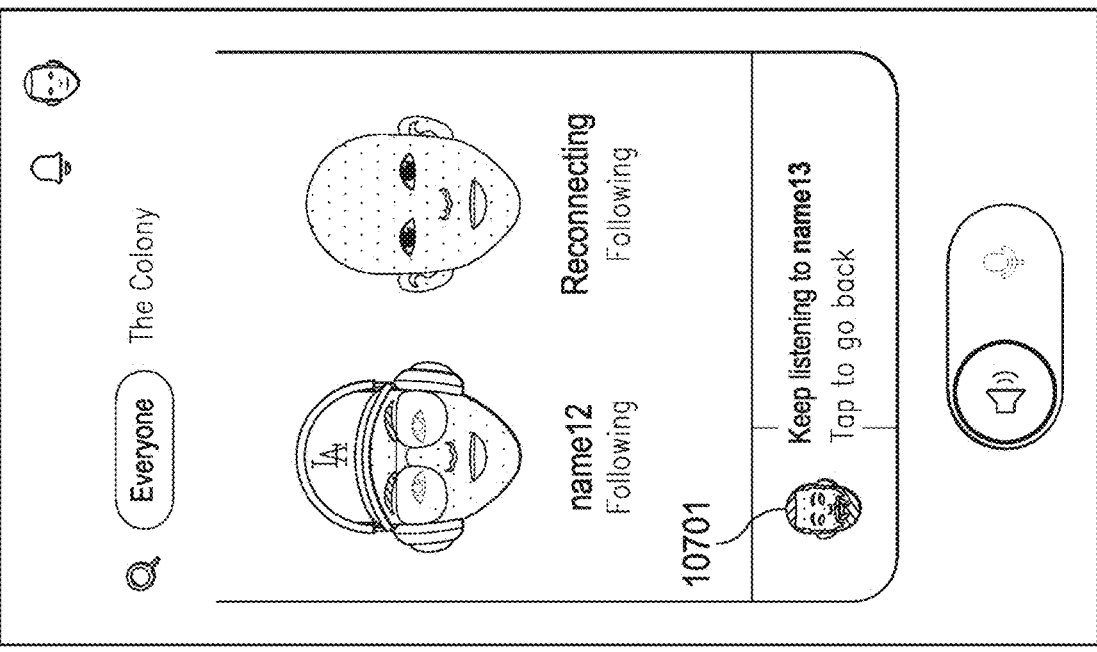
Figure 108:
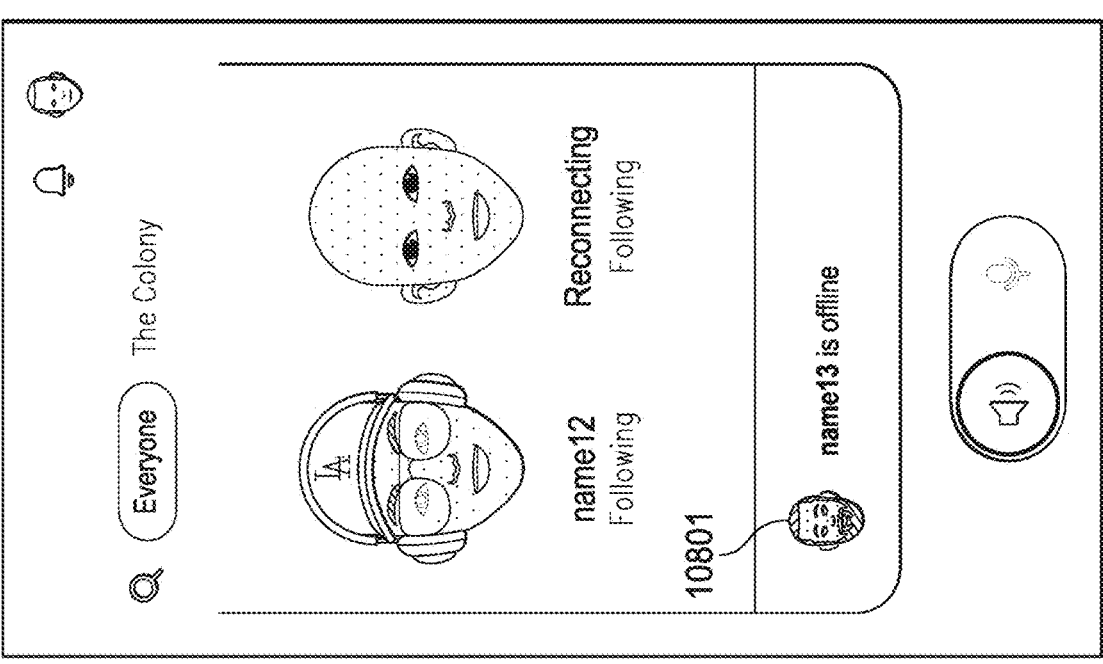
Figure 111:
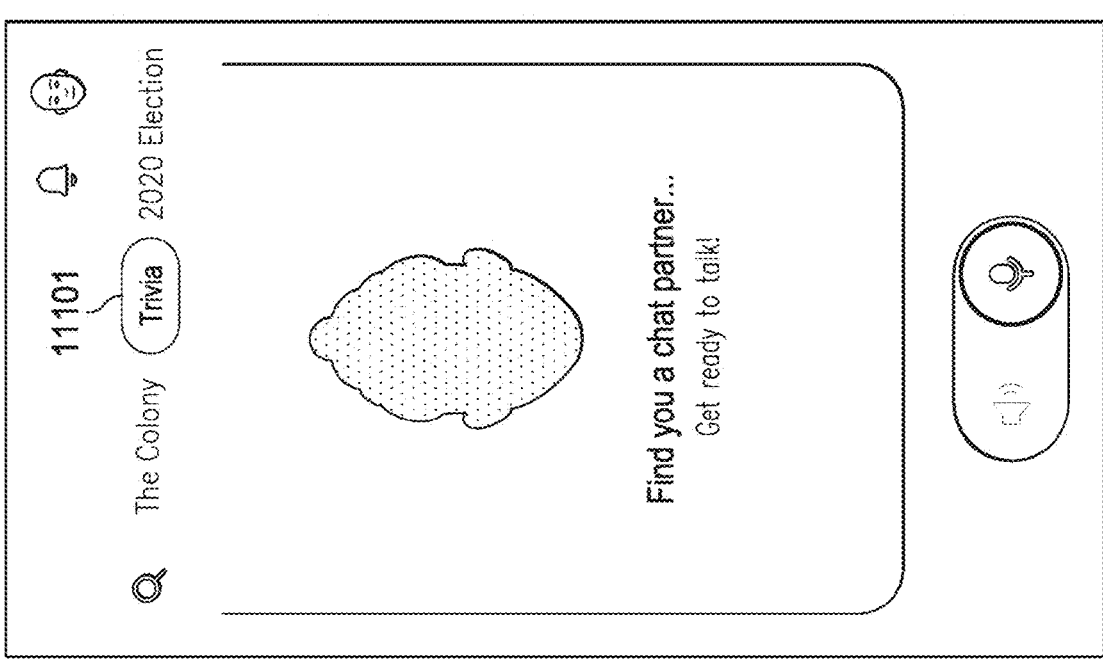
Figure 110:
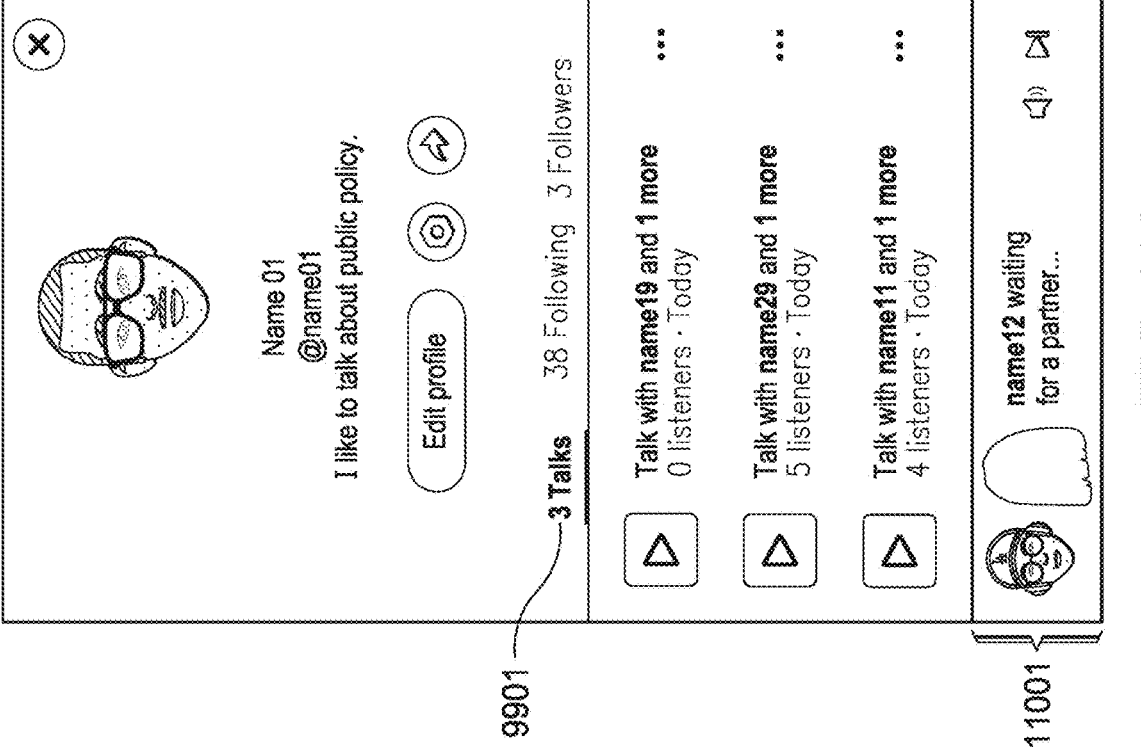

When a user is listening to a talk, a "Tap to go back" icon as shown in FIG. 107 may be selected to go back to a previous screen, or a "Keep listening" icon may be selected to stay on the current screen. A status bar 10801 may indicate if a speaker of a live talk goes offline (e.g., during a conversation) as shown in FIG. 108.

Figure 101C:
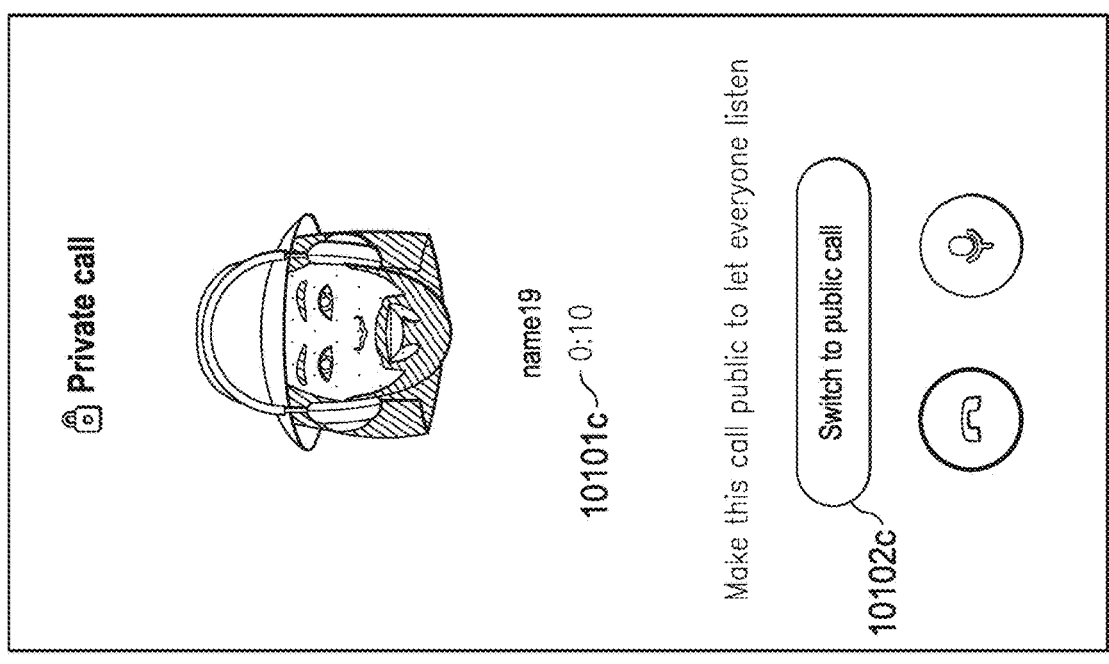
Figure 101B:
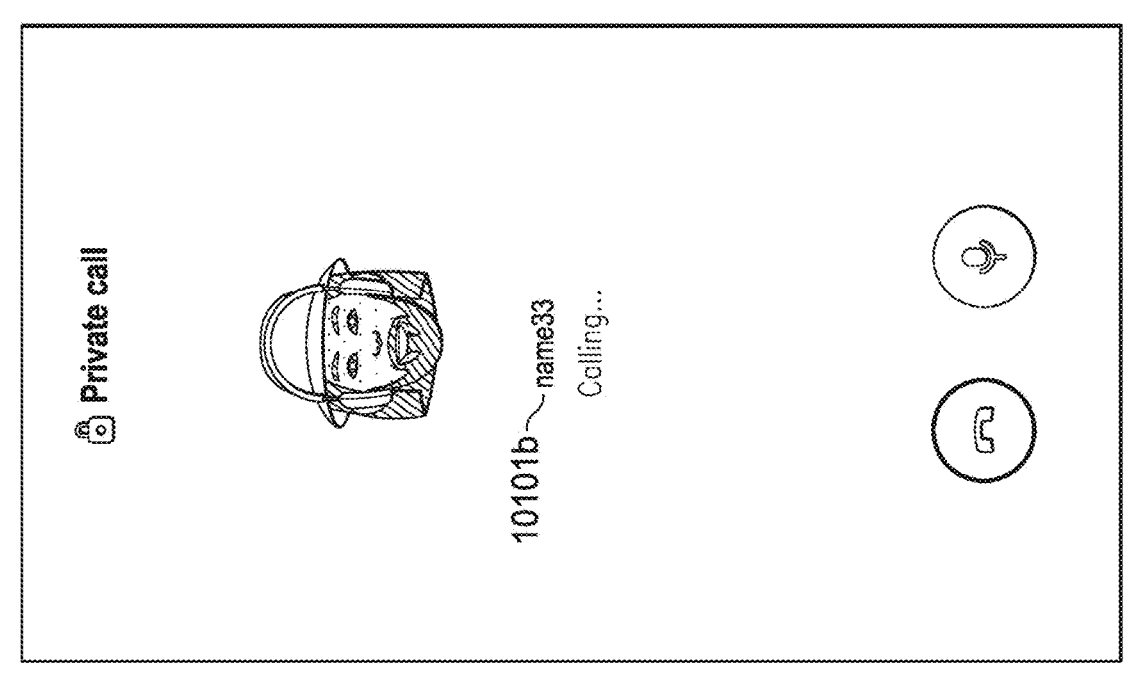

Besides the public audio conversations discussed above, a first user 10101b may request a private audio conversation with a second user as shown in FIG. 101b. A private audio conversation might not be viewable or searchable for non-participants, e.g., a user other than the first user and the second user. The second user may receive a message indicating that the first user wants to initiate the private audio conversation with the second user. When receiving an approval from the second user in response to the message, the private audio conversation may be initiated between the first user and the second user, e.g., by a server and/or the mobile application implemented on a mobile device of the first user or the second user.

Figure 101E:
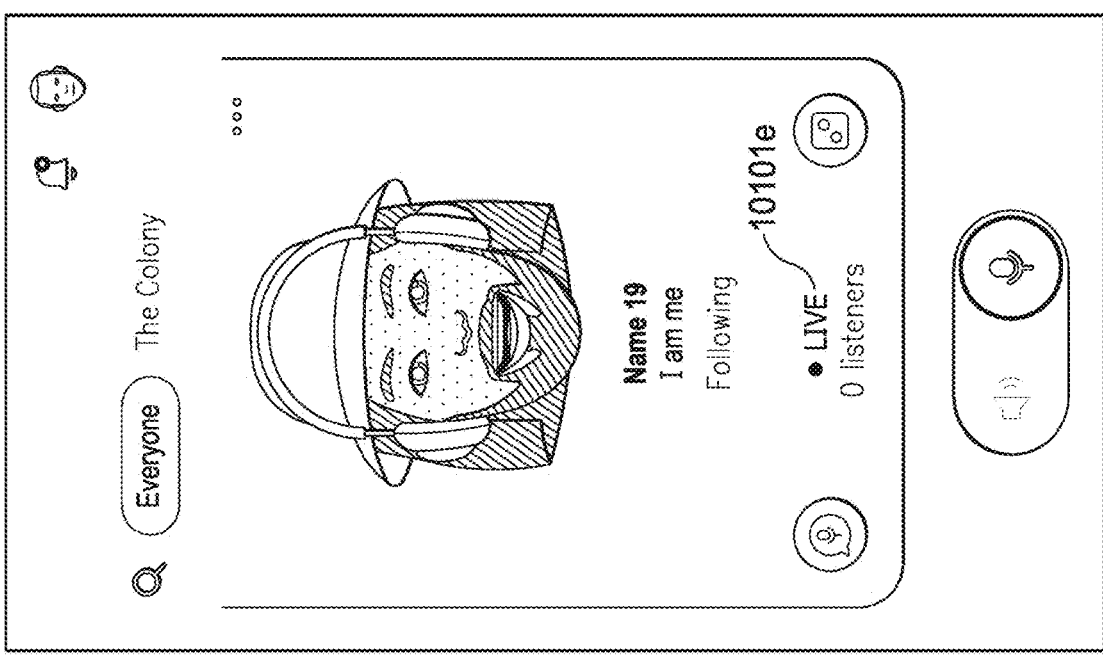
Figure 101D:
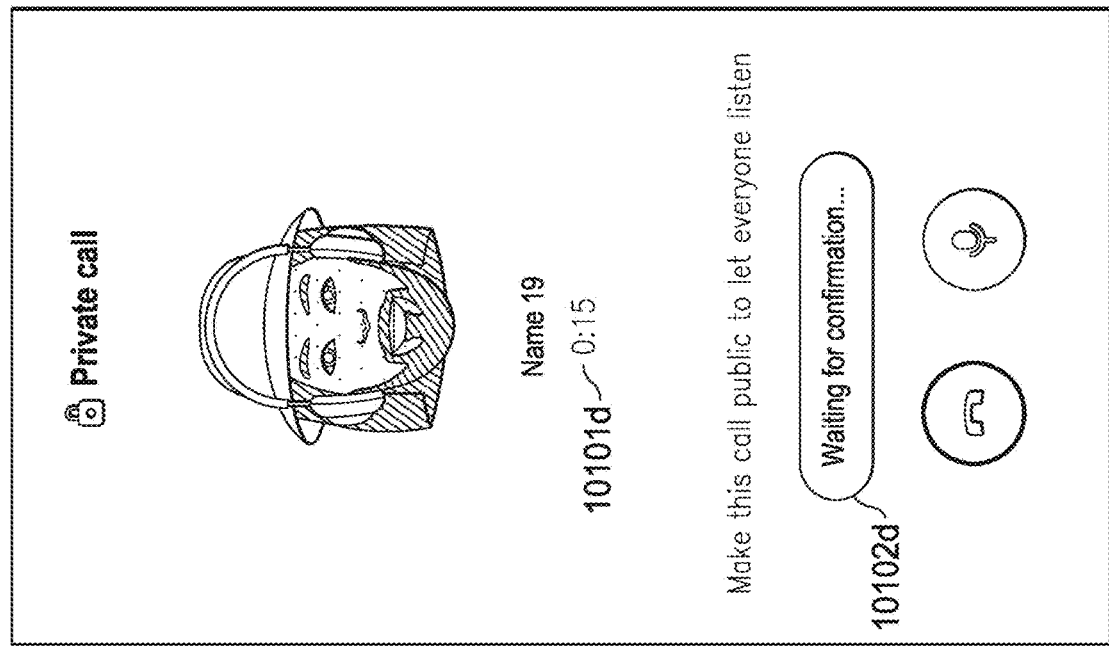

The first user and/or the second user may have the option to switch the private audio conversation to a public audio conversation, e.g., by selecting an icon 10102c as shown in FIG. 101c. An instruction or request may be received, e.g., at the server, from the first user to switch the private audio conversation to a public audio conversation. The public audio conversation may be audible (and searchable) to at least one user other than the first user and the second user. A message may be transmitted to the second user (from the application server) indicating that the first user wants to switch the private audio conversation to the public audio conversation. A message such as a "Waiting for confirmation" message 10102d shown in FIG. 101d may be presented to the first user indicating that a request for switching the private audio conversation to the public audio conversation has been sent. When approval is received from the second user in response to the message, the private audio conversation may be switched by the server to the public audio conversation as shown in FIG. 101e. A third user may be enabled to listen to the public audio conversation.

Figure 113:
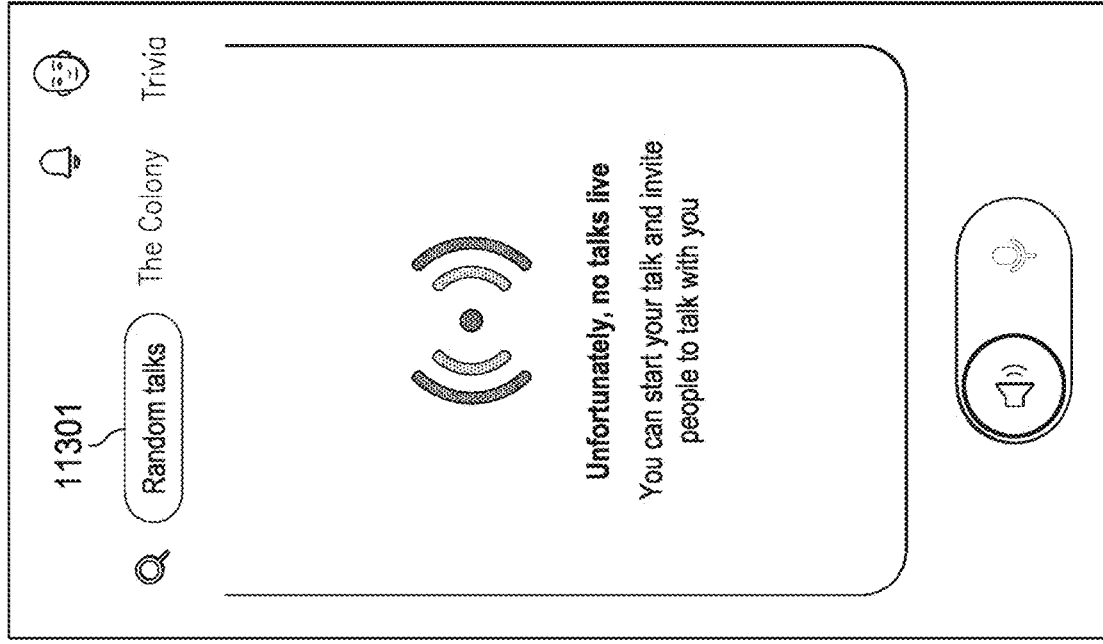
Figure 112:
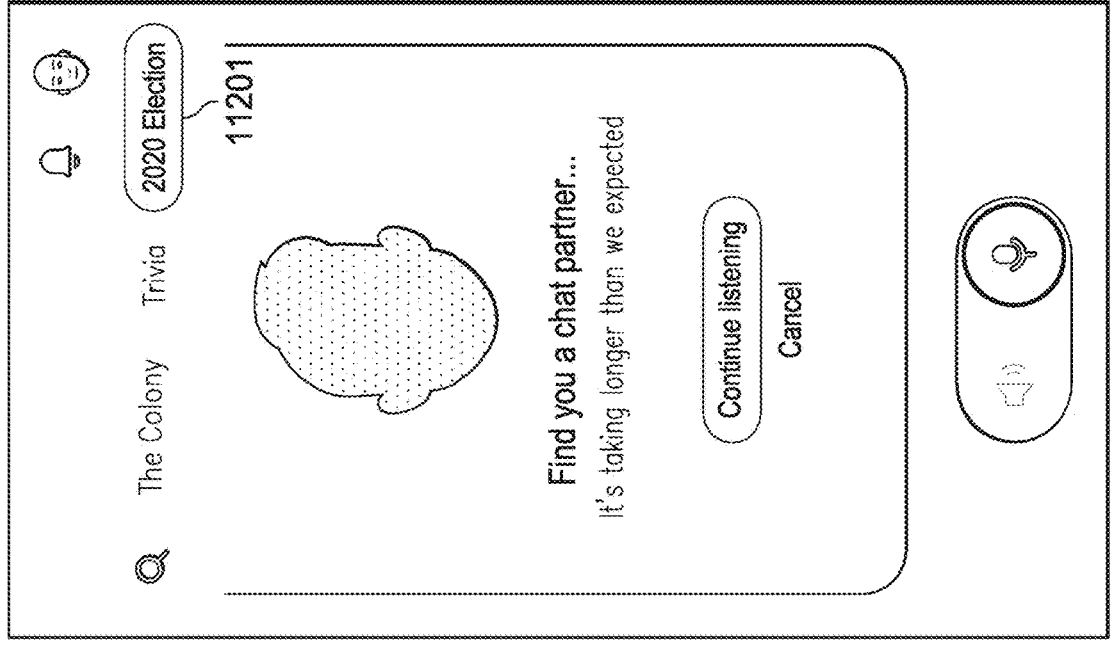
Figure 115:
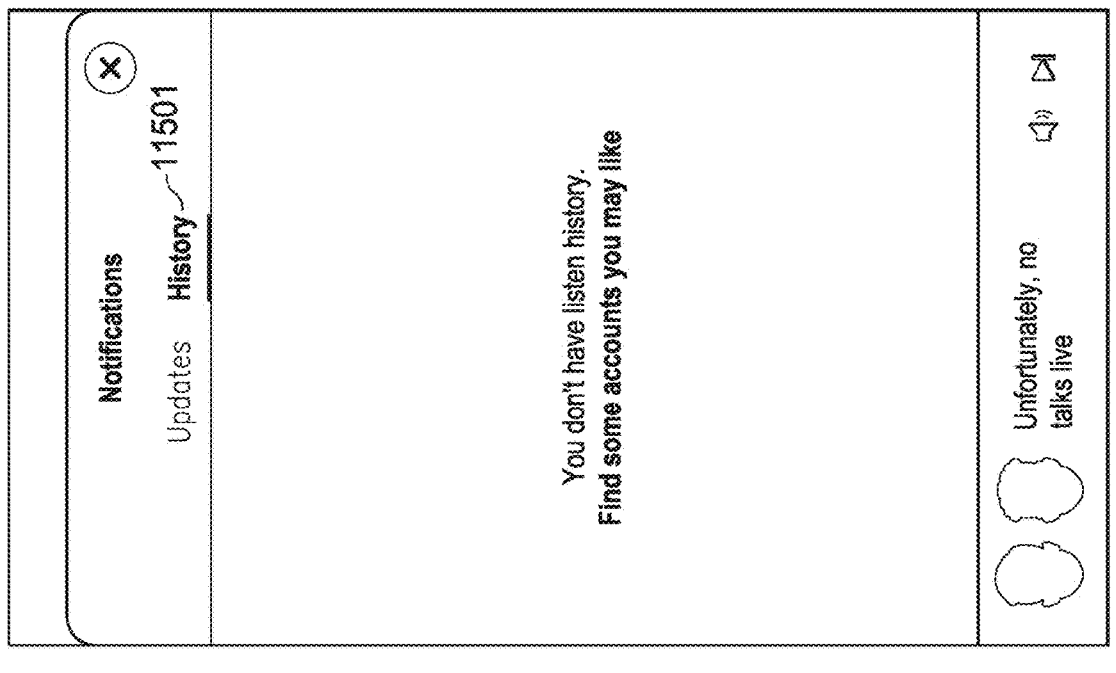

Trending topics such as "Trivia" 11101 or "2020 Election" 11201 may be displayed in the mobile application, e.g., on the home screen of the mobile application. As shown in FIG. 113, a "Random talks" icon 11301 may be presented, e.g., on the home screen, to allow a user to listen to random talks instead of talks resulted from searching the network with keywords. The same trending topics are available when a user is in speaking mode such that a user may either select "Random talks" or may select another one of the trending topics to initiate a conversation with another user. In some embodiments, the trending topics may be determined based on topics trending on other social media platforms or networks, a survey of news sources, length of historical or current conversations for particular topics, number of listeners or listening time for particular topics, etc. Big data computing operations may be used to analyze any of the data described herein and establish the trending topics.

In some embodiments, a first user (e.g., a listener) may execute an operation (e.g., payment operation or other activity or non-payment computing operation) to move up a waitlist to talk to a speaker in the conversation. The payment operation may refer to a monetary payment operation wherein the amount is determined by the mobile application or the application server. In other embodiments, the payment operation may refer to virtual currency payments or points or other achievement levels, which the user can purchase using actual currency or which may be obtained through certain activity on the mobile application (e.g., number of talks previously participated in, total amount of speaking time, total amount of listening time, average amount of time on the mobile application, etc.).

In some embodiments, a user may execute the operation to "talk next" or move up on the waitlist. In some embodiments, such a user may be highlighted (e.g., using an indicator such as color, bold font, icon, etc.) in a waitlist presented to the speaker. In some embodiments such a speaker may be an influencer. A speaker may reach the status of influencer based on user data associated with the speaker (e.g., the number of conversations the speaker has participated in, the total amount of conversation time, the number of followers that the speaker has achieved, etc.). In some embodiments, a user may brand his or her profile (e.g., using a company's logo, product, etc., located adjacent to the user's emoji or the user's emoji is branded with the company's logo, product, promotion, etc., such as the emoji wearing a hat with the company's logo). Such a user may initiate a talk with the speaker (e.g., an influencer speaker) to talk about a product, a promotion associated with a product, the organization of the user, etc. In some embodiments, such a user with an indicator or icon such that the speaker (e.g., an influencer speaker) recognizes this type of user on a speaker waitlist or invite to initiate a conversation. In some embodiments, such a user may have to pay more or execute different computing operations compared to regular users to initiate a conversation with an influencer. In some embodiments, such an advertiser is added to a feed. For example, an advertisement associated with an advertiser is presented when a user (e.g., influencer) browses through other users, or when an advertisers browses through influencers. The browsing may be implemented by swiping (e.g., left or right) across users that are presented on a user interface. Users that are swiped right may be selected for a function, e.g., joining an audio conversation, advertising during an audio conversation, for example. Users that are swiped left may not be selected for the function. Selecting the advertisement may cause a user to link to another application or webpage.

In some embodiments, a user may compete with other users, e.g., in an auction for an opportunity to talk next with the speaker (e.g., an influencer speaker) when the speaker's current conversation ends or when the speaker makes himself or herself available to talk. The auction may be associated with a limited auction period. In some embodiments, only a select number or type of listeners (e.g., listeners who are advertisers) can participate in the auction. In some embodiments, a user may execute a computing operation (e.g., a payment operation using actual or virtual currency, a non-payment operation, etc.) to pay for a minimum or maximum period of talking with the speaker (e.g., an influencer speaker) to talk about the user's product, promotion, etc., a minimum or maximum number of listeners, a minimum of maximum period of listening time associated with one or more listeners, etc. This period of talking with the speaker (e.g., an influencer speaker) may function as an advertisement for the product, promotion, etc. While the speaker (e.g., an influencer speaker) is talking, a live estimate of a gain (e.g., actual currency, virtual currency, etc.) from speaking with the user (e.g., the user conducting the advertisement) may be displayed to the speaker, motivating the speaker to talk longer. This estimate may be based on a number of factors including the type of user (there may be several levels of users), the amount of virtual or currency the user paid to speak with the influencer, the number of listeners, the average listening time per listener, the duration of the conversation, etc. In some embodiments, any features described with respect to a talker or speaker or user may also apply to any influencer talker, influencer speaker, or influencer user. Any parameter, factor, data, or information that is used in one function may also be used in any other function described herein, even if it not explicitly described.

Data on influencers may be displayed on a front-end targeted communication (e.g., advertising) platform with their approximate price per unit time of talking such as second, minute, or hour, their topics of interests (e.g., based on talk history, influencer's self-provided information, or influencer's user data, etc.), data on the users typically listening in to the influencers (e.g., age, location, interests, demographics, any other user data described herein etc.), etc. The platform may also enable determination of influencers that are similar to each other in terms of the profiles of users that typically listen to them, topics that the influencers discuss, location of the influencers, or other user data of the influencers, etc. For example, when a user of the platform looks up a first influencer, a second influencer similar to the first influencer is also is displayed. The platform may enable initiating communication with the influencers to schedule talks with them or begin talks with if they are online or join their waitlist if they are online and currently in conversation. In some embodiments, the platform may also be able browsing influencers that are offline and scheduling talks with the offline influencers (e.g., by sending them an invite for a talk).

Figure 117:
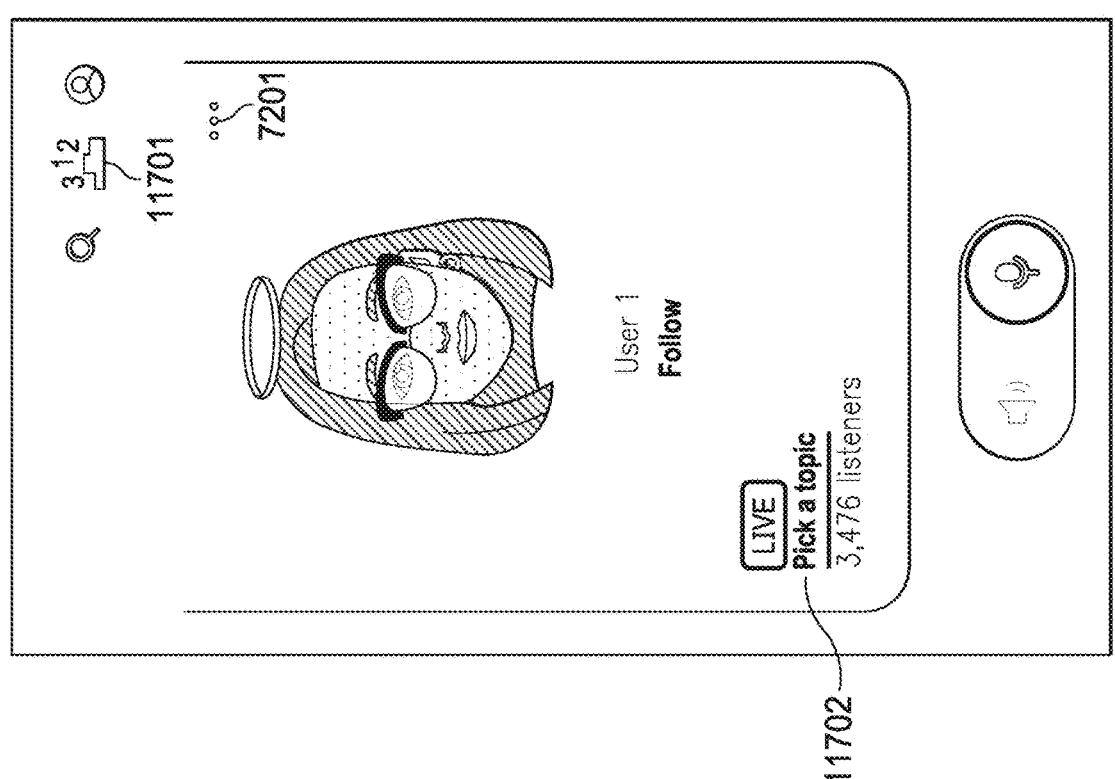
Figure 116:
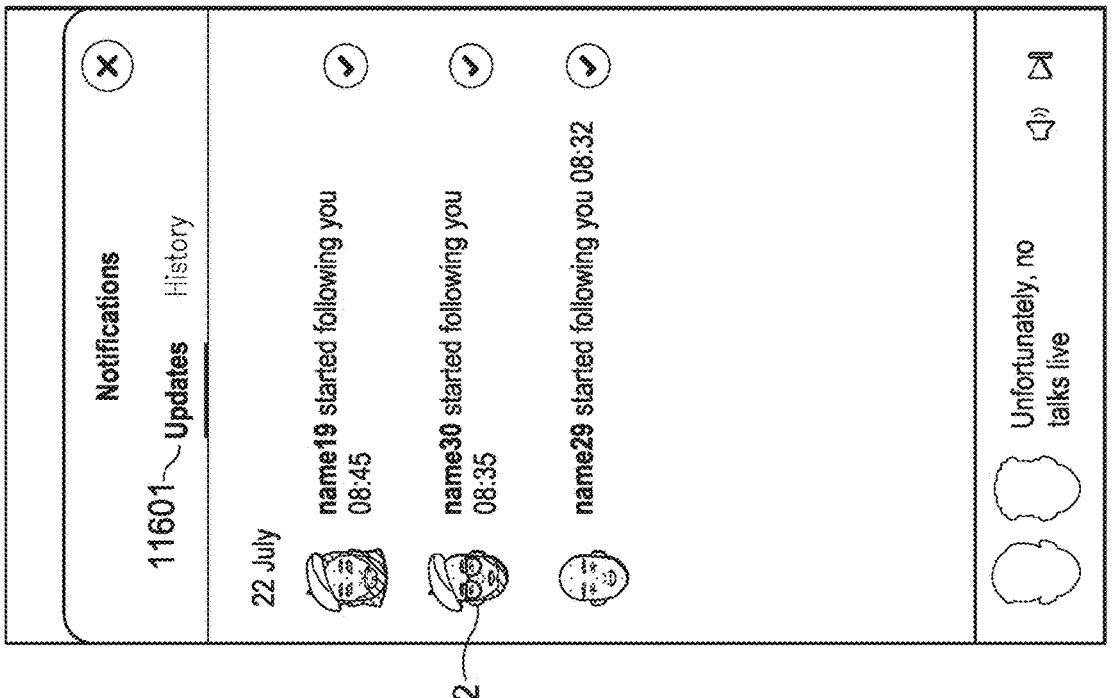
Figure 119:
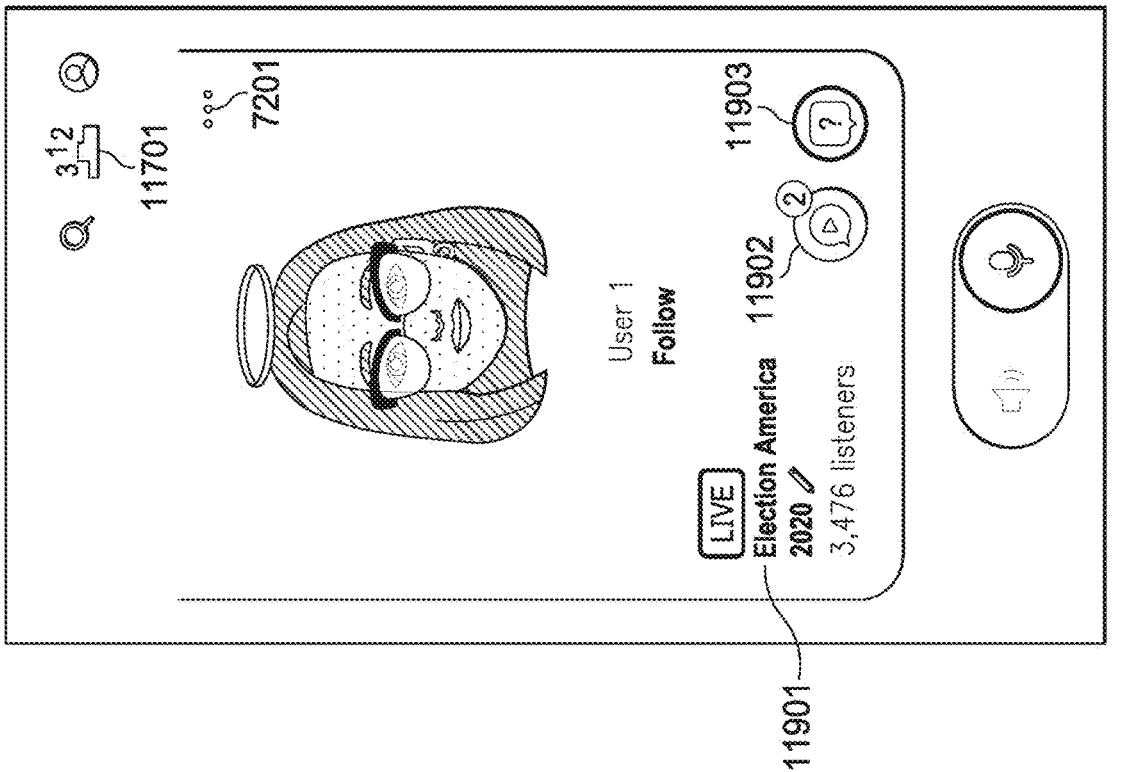
Figure 118:
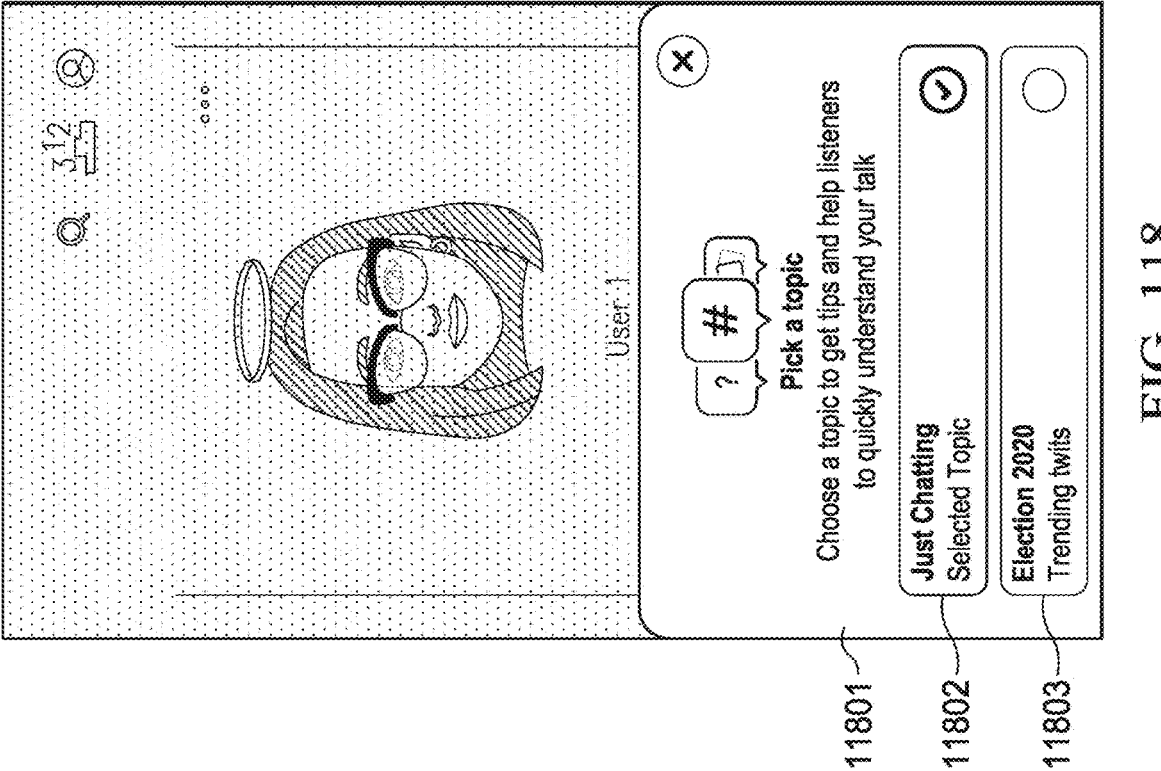

FIG. 117 shows an example screenshot of a conversation cube function of the mobile application. In this example, trending topics may be displayed by selecting a trending topics option 11701, and/or various other functions may be displayed by pressing a second button 7201. A user may choose "Pick a topic" option 11702 when joining an audio conversation and/or during an audio conversation. A pop up window 11801 as shown in FIG. 118 may display a "Just Chatting" option 11802 and/or a variety of topics such as an "Election 2020" topic 11803. When a topic is selected, a hint button 11903 as shown in FIG. 119 may allow questions, hints, quotes, and/or other information associated with the selected topic to be displayed to at least one audio conversation participant (e.g., either the participant who selected the option or both participants in the conversation) when the hint option 11903 is selected. One or more these options may allow audio conversation participants to conduct a debate, improvise and/or play games such as word games, trivia games, social games, and role playing. The information associated with the selected topic displayed to multiple audio conversation participants may be the same or different. In some embodiments, the displayed information associated with the selected topic may be extracted from a third-party social network and/or from one or more third-party social network accounts associated with the audio conversation participants. In some embodiments, an option 11902 may allow a user (e.g., a speaker) to play an audio message received from another user (e.g., a speaker or a listener).

Figure 120:
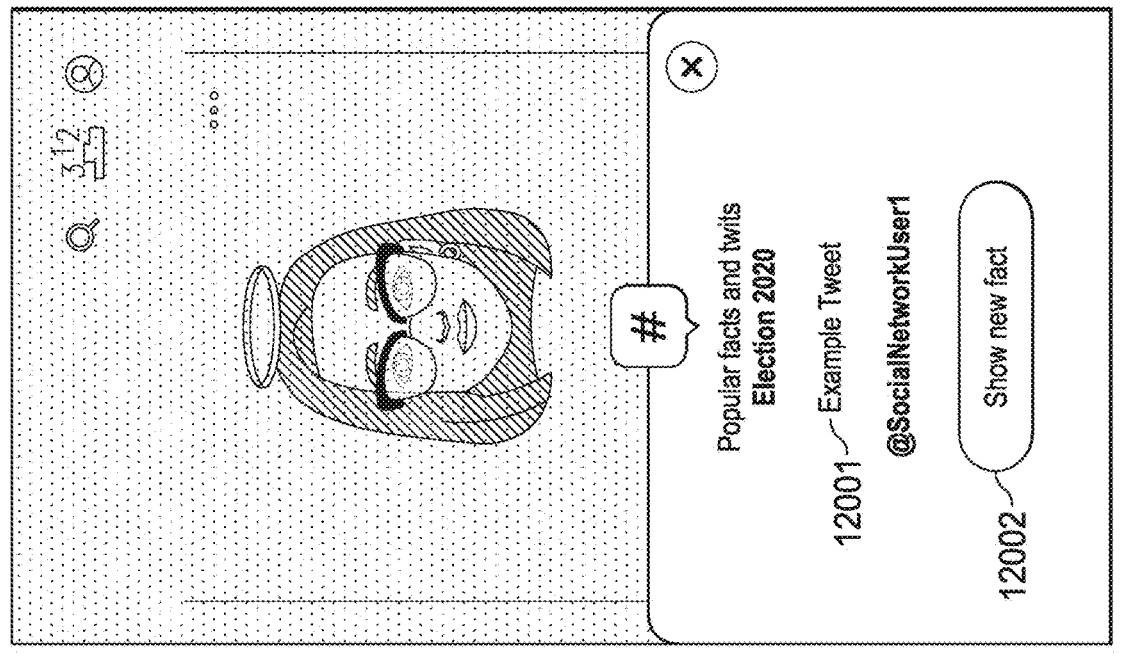

In this example, the "Election America 2020" topic 11901 is selected, and questions, hints, quotes, and/or other information associated with "Election America 2020" may be displayed to the at least one audio conversation participant. For example, a short message 12001 posted by SocialNetworkUser1 extracted from a social network (e.g., a third party social network) may be displayed as shown in FIG. 120. In some embodiments, the short message may be text extracted from audio conversations that were conducted on the mobile application. An option 12002 may allow a user to view more information regarding the selected topic and/or a new short message.

FIG. 121 shows an exemplary process flow implemented using the hardware and software described herein. Note that steps of the process flow may be optional and may be performed in a different order from that illustrated in FIG. 121. At step 12102, the method comprises determining, using one or more computing device processors, a first user accesses a mobile application on a first mobile device of the first user. At step 12104, the method comprises determining, using the one or more computing device processors, a second user accesses the mobile application on a second mobile device of the second user. At step 12106, the method comprises selecting, using the one or more computing device processors, the first user and the second user for participating in an audio conversation based on at least first user information associated with the first user and second user information associated with the second user. At step 12108, the method comprises initiating, using the one or more computing device processors, the audio conversation between the first user and the second user, wherein the audio conversation is broadcasted to a third user who accesses the mobile application on a third mobile device of the third user. Any of the processes, functions, techniques, procedures, methods, etc., all of which may be used interchangeably, described herein may be performed using one or more of any systems, devices, servers, etc., described herein. Any of the servers described herein may be cloud servers. In some embodiments, any of the systems, devices, servers, etc., all of which may be used interchangeably, may comprise one or more memory systems comprising instructions for performing any of the processes described herein. In such embodiments, one or more computing device processors may be provided to execute these instructions. In some embodiments, one or more computer program products may be provided. Such computer program products may comprises one or more non-transitory computer-readable medium comprising code for performing any of the processes described herein. In some embodiments, many of the processes described herein are intelligent in that the application server (and mobile application) learn a user's likes or preferences and dislikes based on constant analysis of user data such that, over time, the user is provided with better audio conversations that increase the user's listening time and better speakers that increase the user's talking time.

In some embodiments, a speaker may associate hashtags with live or recorded audio conversations. Multiple hashtags may be associated with a single audio conversation. For example, if a speaker tags an audio conversation with "#football," the system may also associate "#sports" or "#athlete" with the audio conversation. If a speaker does not tag an audio conversation with any hashtags, any hashtags associated with a speaker (or hashtags based on a speaker's speaking or listening history over a period of time, or any hashtags based on a listener's speaking or listening history over a period of time) may be associated with the audio conversation. In some embodiments, a hashtag is associated with a "#" operator preceding a keyword. In alternate embodiments, any other operator and any other operator position may be used with respect to the keyword. In alternate embodiments, the hashtag may be associated with a listener (or may be defined based on a listener's input or selections) or the hashtag may be defined or associated with the audio conversation based on extraction and analysis of the content (e.g., based on a frequency of keywords) in the audio conversation. In some embodiments, hashtags may refer to any visual descriptive operators associated with the audio conversation. In some embodiments, the hashtags may be edited by at least one of the speaker or the listener at least one of before, during, after the initial recording of the audio conversation. In some embodiments, hashtags might be associated with an audio conversation based on the other hashtags already associated with the audio conversation. For example, if an audio conversation is associated with the hashtags "#NFL," "#Super Bowl," and "#Tom Brady," the mobile application may associate "#Tampa Bay" with the audio conversation as well. This embodiment may make such associations by way of machine learning ("ML"), heuristics, artificial intelligence, big data operations, hierarchical data structures, mind mapping, tree-based structures, etc. In some embodiments, hashtags may be referred to as descriptors or descriptive operators or descriptive operators.

In some embodiments, users may be asked to follow hashtags (i.e., selection of hashtags) at the time of registration, or may be asked to follow hashtags periodically upon logging into the mobile application. These selections may be reset by users, as desired. In some embodiments, other users may be able to suggest hashtags for a user to follow, or the mobile application may periodically suggest hashtags based on the users listening history, speaking history, currently followed hashtags, etc. For a particular user, the hashtag selections may be used to filter audio conversations, speakers to talk to (conversation mode), speakers or audio conversations to listen to (listening mode), etc. The hashtag selections may be based on the user's speaking or listening history (e.g., hashtags associated with audio conversations that the user participated in or listened to), searching history (e.g., hashtags that the user searched for), or the speaking, listening, or searching history associated with the user's followers, followed users, or other users that substantially match the user in terms of age, location, speaking, listening, followed hashtags, or searching history, etc. The speaking, listening, searching history, or user's connected users may be determined from the subject mobile application or from any other third-party mobile application.

In some embodiments, the mobile application may scrape or pull data from other third-party mobile applications or social networks, and may use that information to suggest new hashtags for a user to follow. The mobile application may suggest hashtags that are directly taken from other third-party mobile applications or social networks that utilize hashtags. In other embodiments, the mobile application may generate new hashtags based on the scraped or pulled data.

Users may follow hashtags from multiple places in the mobile application (e.g., in the search results, from audio conversations that they are listening to, from other user profiles, from a suggested list of hashtags, from a "trending" page, from alerts for hashtags a user might be interested in, from messages or content shared by other users, etc.). Hashtags may be associated with users based on their speaking history, listening history, followers, followed users, location, information from other third-party mobile applications or social networks, preferences or information input into the mobile application, user information as described in this disclosure associated with the speaker or listener, other followed hashtags, etc.

In some embodiments, the mobile application may utilize back-end hierarchical structuring, mind mapping, or tree-based structuring of live audio conversations, recorded audio conversations, and users (e.g., speakers, listeners, etc.) based on hashtags. The mobile application may create relationships between audio conversations (whether live or recorded), relationships between users and audio conversations, or relationships between users. Connections or relationships may be established between users if they follow common hashtags (e.g., both users follow "#NFL"), if they follow hashtags that are related to each other (e.g., one user follows "#NFL" and a second user follows "#sports"), or if they follow similar speakers. Hierarchies, mind maps, tree-based structures, and relationships may include primary, secondary, and tertiary relationships, etc. For example, a primary relationship is when a user/hashtag/audio conversation has a direct connection to, or first degree of separation from, another user/hashtag/audio conversation, a secondary relationship is when a user/hashtag/audio conversation has an indirect connection, or second degree of separation from, another user/hashtag/audio conversation via an intermediate user/hashtag/audio conversation, a tertiary relationship is based on an even more indirect connection and third degree of separation, and so on and so forth, etc.

In some embodiments, relationships may be generated between hashtags (i.e., hierarchical, mind mapping, or tree-based structuring similar to above). "High-level" categories of hashtags (e.g., "#sports") may include secondary level hashtags (e.g., "#football," "#rugby," etc.), which may further include tertiary level hashtags (e.g., "#Super Bowl," "#World Cup," etc.). Associated categories or hashtags may be connected by separate, non-hierarchical connections. For example, "#sports" might be connected with "#athletics," even though one may not be hierarchically subsumed by the other. Category levels and other connections may be extended as far as needed to properly utilize hashtag relationships. Connections may be established between hashtags based on user activity (e.g., multiple users follow "#NFL," and "#sports," so the system may then create a relationship between "#NFL" and "#sports"). In other embodiments, connections may be established based on the frequency of hashtags being associated with the same audio conversations (e.g., "#NFL" and "#football" are associated with many of the same audio conversations, so they may become connected), or by the hashtags proximity to each other within an audio conversation (if data from an audio conversation is extracted, transcribed, or analyzed).

In some embodiments, hashtags may be created for searched keywords (if such a hashtag does not exist for the searched keyword), after verifying that the search is an authentic one. In some embodiments, an authentic search is one where the searched keyword is not a random collection of characters or a typo, or where the keyword relates to an existing or actual person, place, object, or concept.

In some embodiments, selecting hashtags from anywhere in the mobile application leads users to: (1) view information associated with a hashtag (live shows, upcoming shows, recorded shows, followers, speakers, etc.) and (2) the option to follow or share a hashtag. The hashtag may be selected from an audio conversation, may be selected from a user profile, may be selected from search results, may be selected from a recommended or associated hashtags page, etc. A hashtag page may aggregate all information associated with a hashtag.

In some embodiments, hashtags may be used (in addition to other parameters) to match speakers or filter speakers in conversation mode. A speaker feed for a speaker user may be ordered by using hashtag-based matching of speakers (e.g., two speakers may follow the same or related hashtags or may have listened to or participated in audio conversations tagged with the same or related hashtags). For example, speakers that match better with the speaker user will be placed higher in the speaker user's feed such that the speaker views such speakers first when swiping through a speaker feed. Hashtags may be used to recommend speakers to speak with each other. Hashtags may be used to recommend speakers to schedule audio conversations with other speakers. In some embodiments, the mobile application is constantly learning (using artificial intelligence, machine learning, heuristics, and/or big data operations) users' preferences (hashtags serving as a factor in this process). In some embodiments, this may entail analyzing which hashtags a user follows or which audio conversations or speakers they have listened to, and generating a list of preferences associated with that user. These preferences may help to improve personalization, over time, of the speakers being presented to the speaker user to establish or schedule audio conversations. The mobile application may also provide speaker users with recommendations of hashtags to follow based on their speaking history, listening history, etc. (whether of the user, their followers, their followed users, similarly matched users, etc.).

In some embodiments, hashtags may be used (in addition to other parameters) to match or filter audio conversations in listening mode. Hashtags may also be used to match or filter speakers associated with audio conversations in listening mode. An audio feed for a listener user may be ordered using hashtag-based matching of listeners (e.g., listener follows a hashtag (or has previously listened to audio conversations with said hashtag) and an audio conversation (or speaker participating in an audio conversation) is associated with a same or related hashtag). For example, speakers that match better with the listener user will be placed higher in the listener user's feed such that the listener views such speakers first when swiping through an audio feed. Hashtags may be used to recommend that a listener listen to certain speakers or certain pieces of audio conversations. In some embodiments, the mobile application is constantly learning (using artificial intelligence, machine learning, heuristics, and/or big data operations) users' preferences (hashtags serving as a factor in this process). In some embodiments, this may entail analyzing which hashtags a user follows or which audio conversations or speakers they have listened to, and generating a list of preferences associated with that user. These preferences may help to improve personalization, over time, of the audio conversations being presented to the listener user in listening mode. The mobile application may also provide listener users with recommendations of hashtags to follow based on their listening history, listening history, etc. (whether of the user, their followers, their followed users, similarly matched users, etc.).

Figure 122:
FIGS. 122, 123, and 124 illustrate ornamental designs for a display screen or portion thereof with graphical user interface, in accordance with example embodiments described herein.
Figures 123, 124:
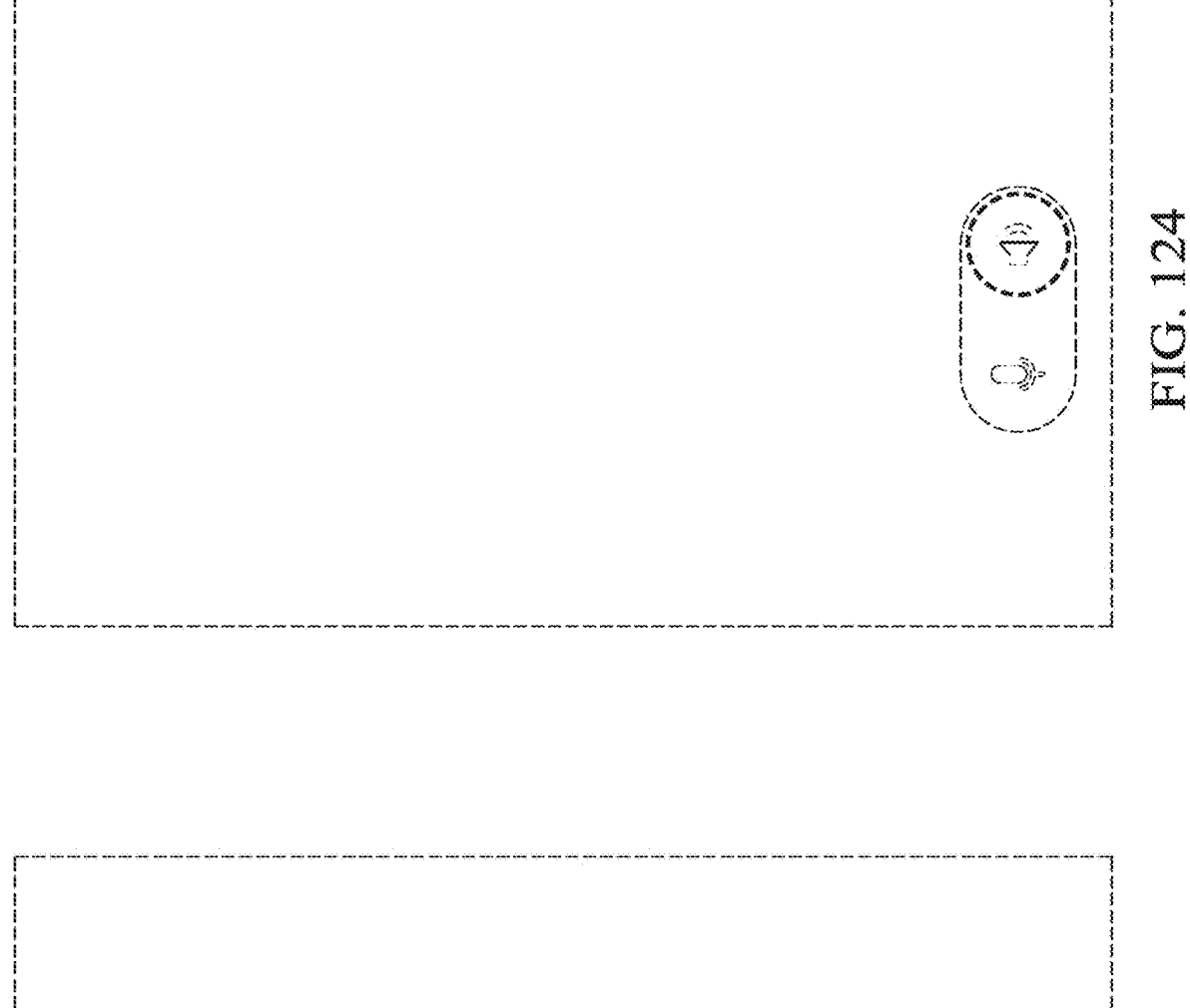

Referring now to FIGS. 122, 123, and 124, each figure is a front view of a display screen or portion thereof with graphical user interface showing a claimed design. The outermost broken lines in each of these figures show a display screen (e.g., of a mobile device) or portion thereof, and form no part of the claimed design. The other broken lines in each of these figures show portions of the graphical user interface that form no part of the claimed design. What is claimed in each of these figures is the ornamental design for a display screen or portion thereof with graphical user interface, as shown and described. In some embodiments, the broken lines in each of these figures may be converted to solid lines to form part of the claimed design. In other embodiments, the solid lines in each of these figures may be converted to broken lines to form part of the claimed design.

Figure 126:
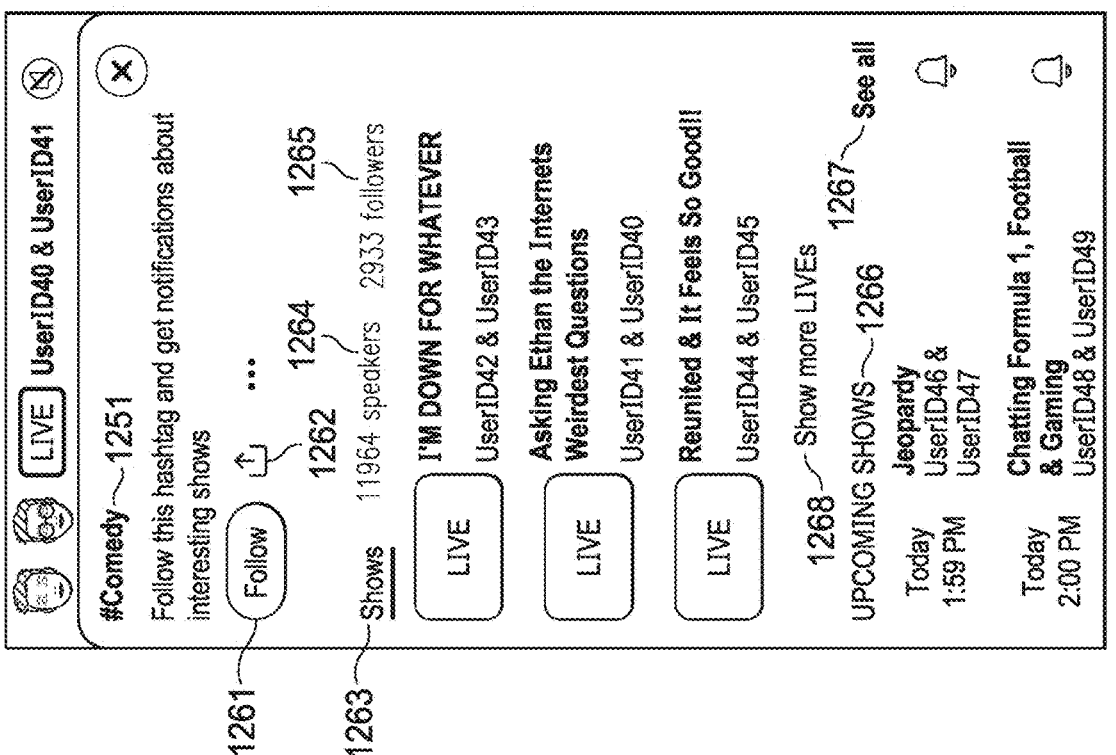
Figure 125:
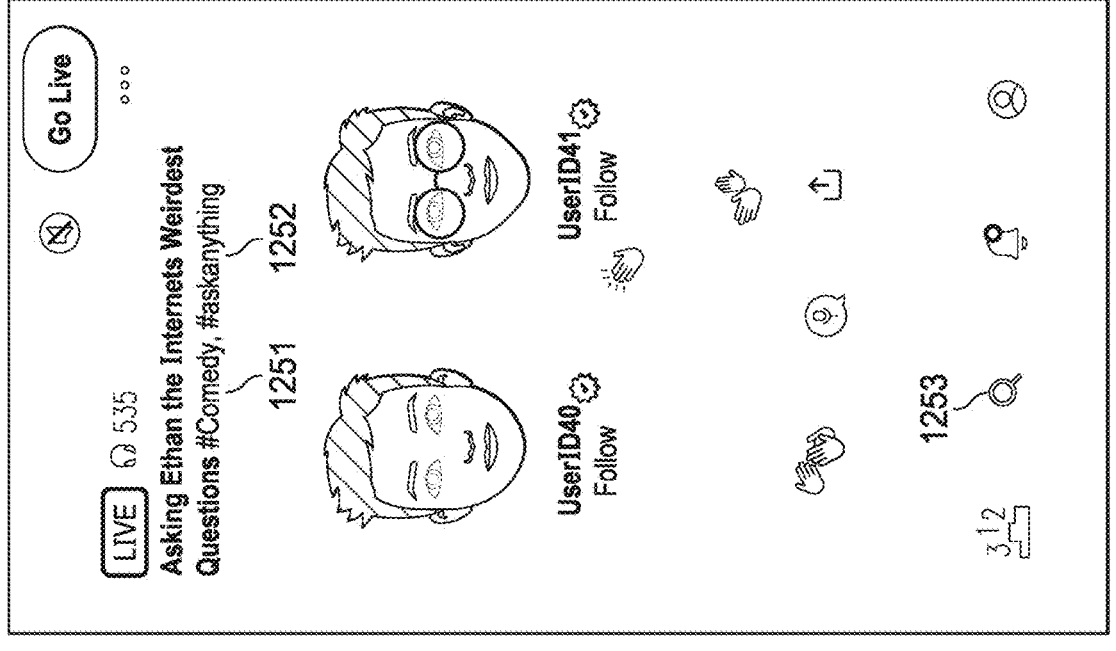
Figure 128:
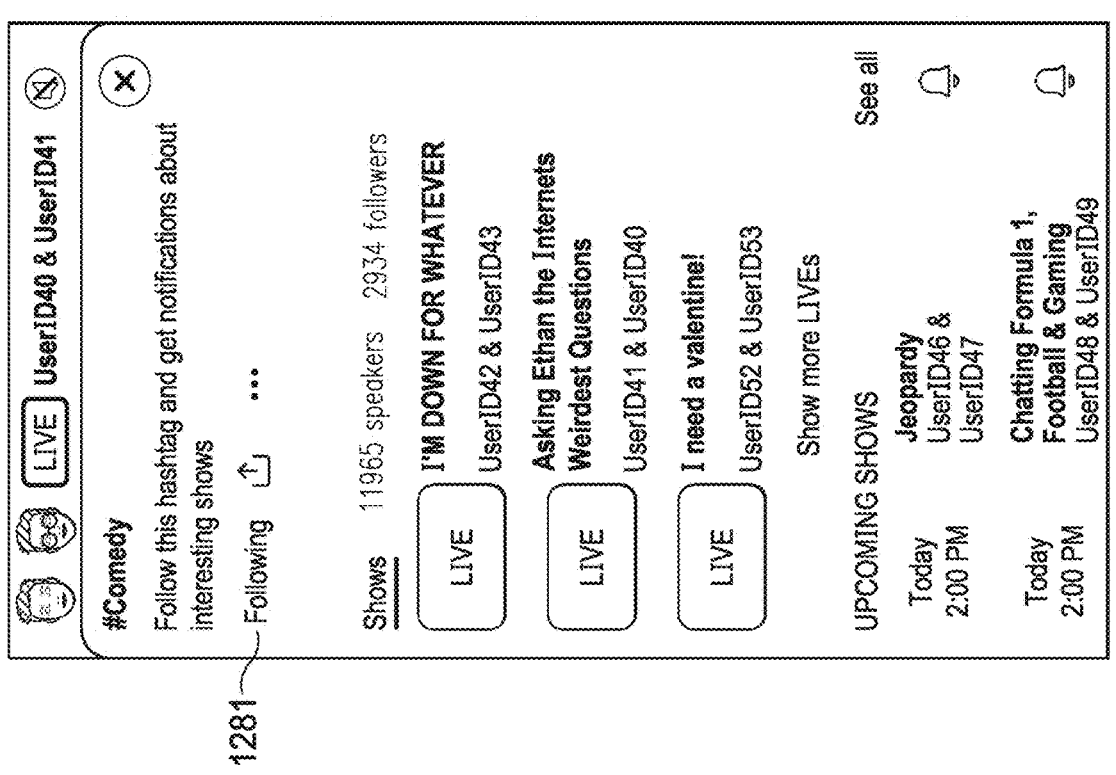
Figure 129:
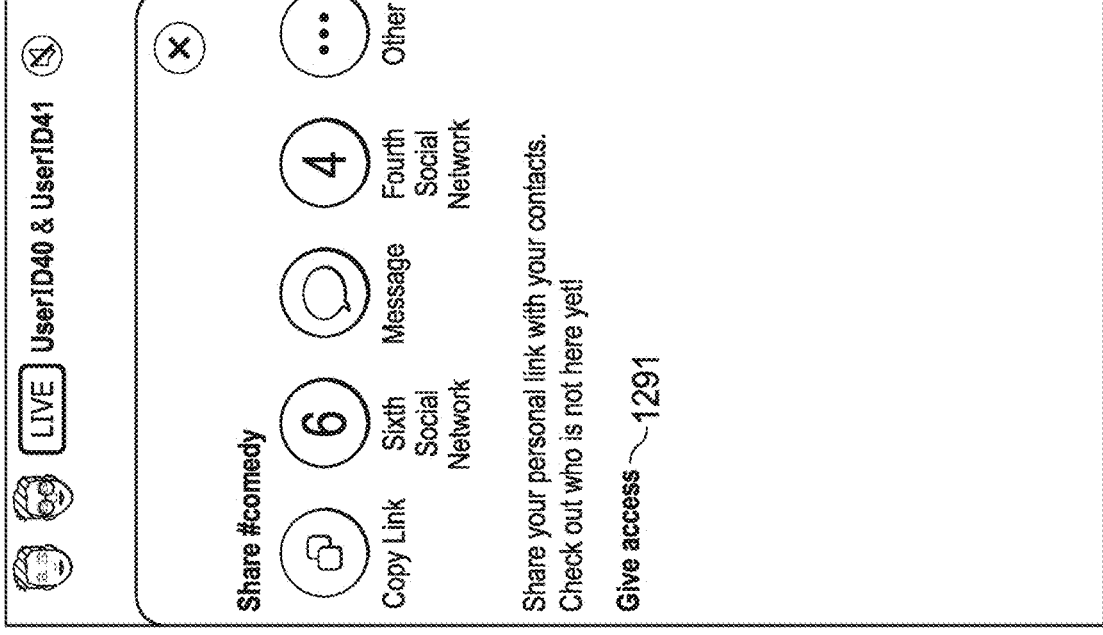

In an embodiment, hashtags such as "#Comedy" 1251 or "#askanything" 1252 may be displayed in the mobile application, e.g., along with a topic, theme, and/or title of a talk. As shown in FIG. 125, the hashtags 1251 and 1252 may be displayed next to a topic "Asking Ethan the Internet's Weirdest Questions," e.g., allowing a user to identify associated information of the talk, to search for topics related to a hashtag, etc. In some embodiments, a user may review more information associated with a hashtag by selecting it. Here, after a user selects on the hashtag "#Comedy" 1251, a pop-up window may display a "Follow" option 1261, a share option 1262, and/or another option as shown in FIG. 126. When a user selects the "Follow" option 1261, a "Following" icon 1281 may replace the "Follow" option 126 as in FIG. 128, indicating the user is now following the hashtag. When the user is following a hashtag, the user may get notifications about shows associated with the hashtag. The share option 1262 may allow a user to copy the link of the hashtag or share the hashtag through an instant message application or another social media application as shown in FIG. 129. The user may change corresponding settings of the operating system of the mobile device by selecting the "Give access" icon 1291 before sharing the hashtag. One or more shows 1263, one or more speakers 1264, one or more followers 1265, or other information associated with the hashtag may also be displayed. The "Upcoming Shows" icon 1266 may display one or more upcoming shows or talks below with corresponding times, and the "See all" icon 1267 may allow a user to see all shows, e.g., past/recorded shows and upcoming shows. A "show" may refer to an audio conversation.

Figure 127:
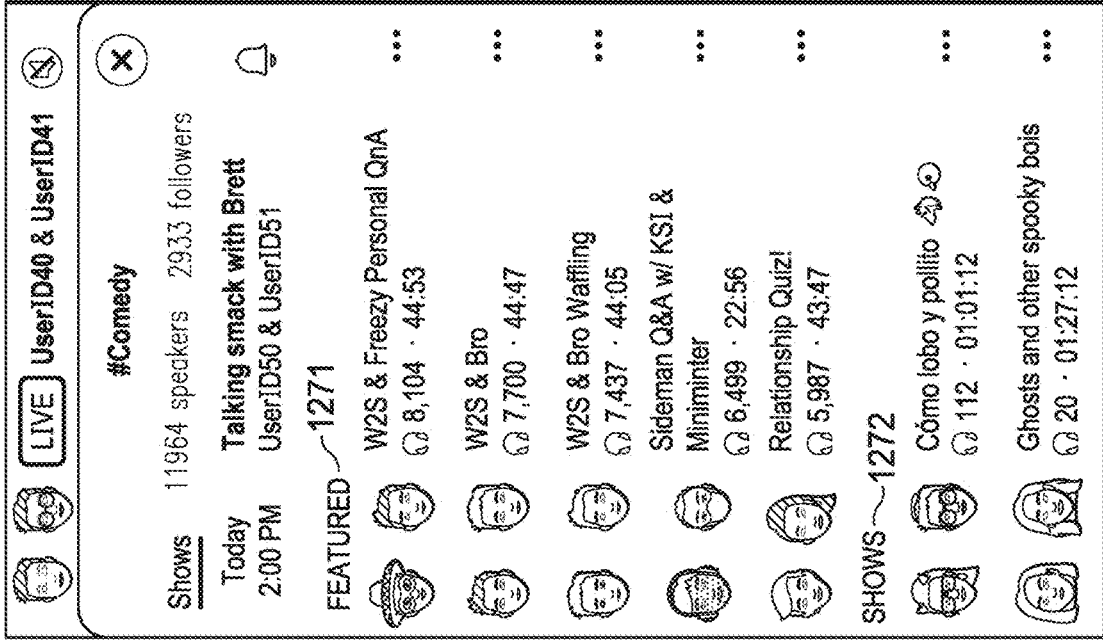
Figure 130:
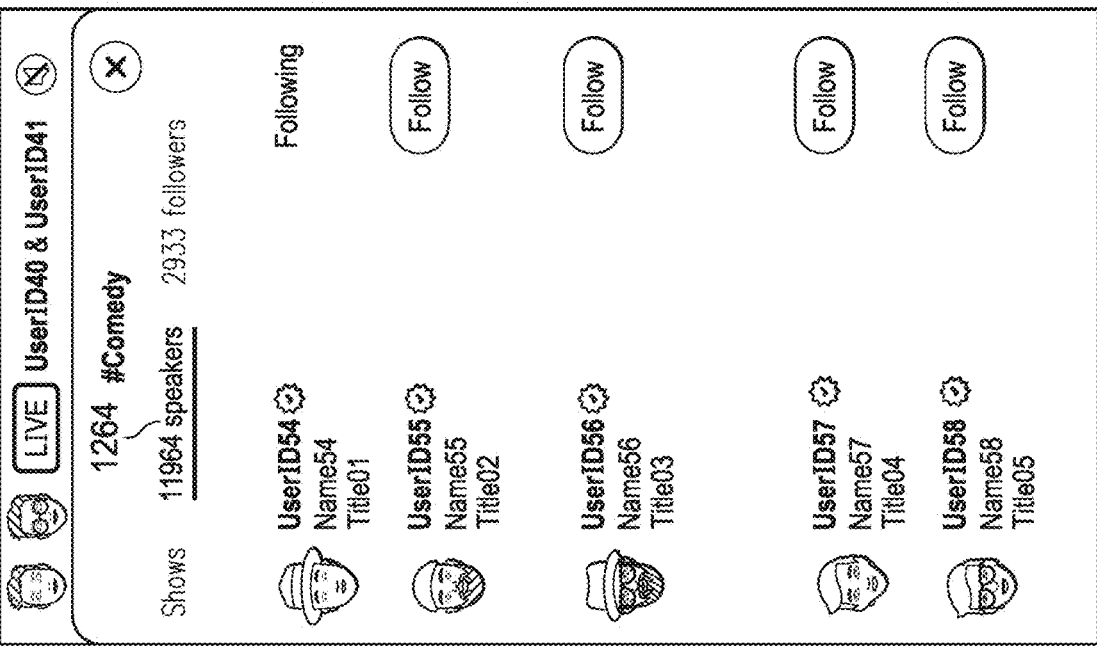
Figure 131:
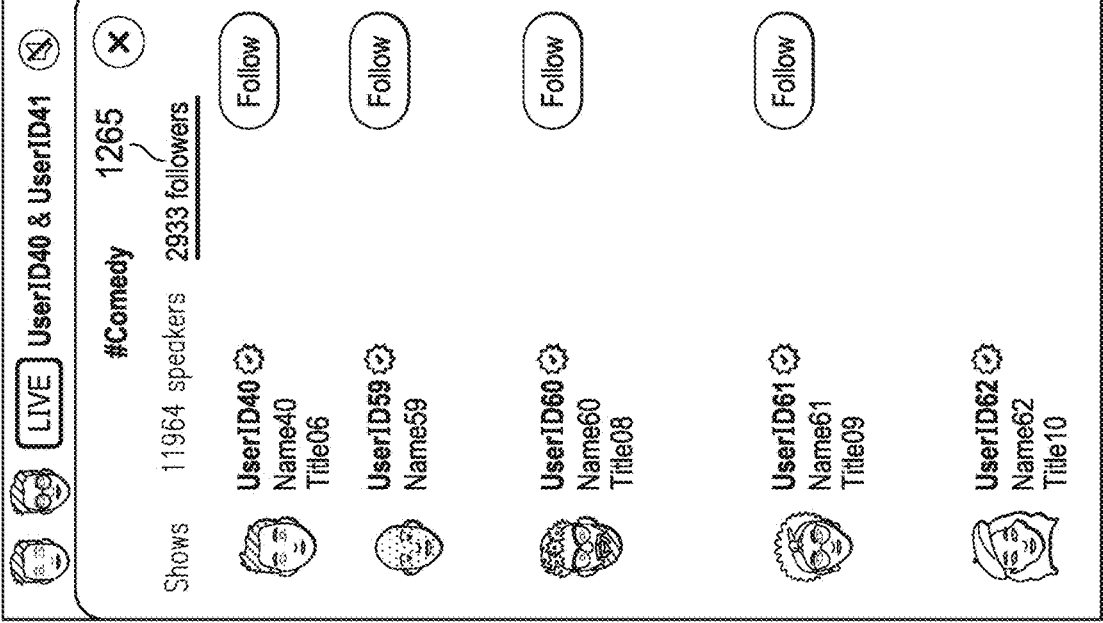

When the user chooses the "Show more LIVEs" option 1268, a list of live shows may be expanded to show more of the list. One or more shows, e.g., recorded shows, may be displayed under the "Featured" 1271 category, and the remaining one or more shows may be displayed under the "Shows" 1272 category as in FIG. 127. When the user selects the "speakers" icon 1264, one or more speakers associated with the hashtag, e.g., speakers of the hashtag topic, may be displayed as in FIG. 130. Similarly, when the user selects the "followers" icon 1265, one or more followers associated with the hashtag, e.g., followers of the hashtag, may be displayed as in FIG. 131.

Figure 132:
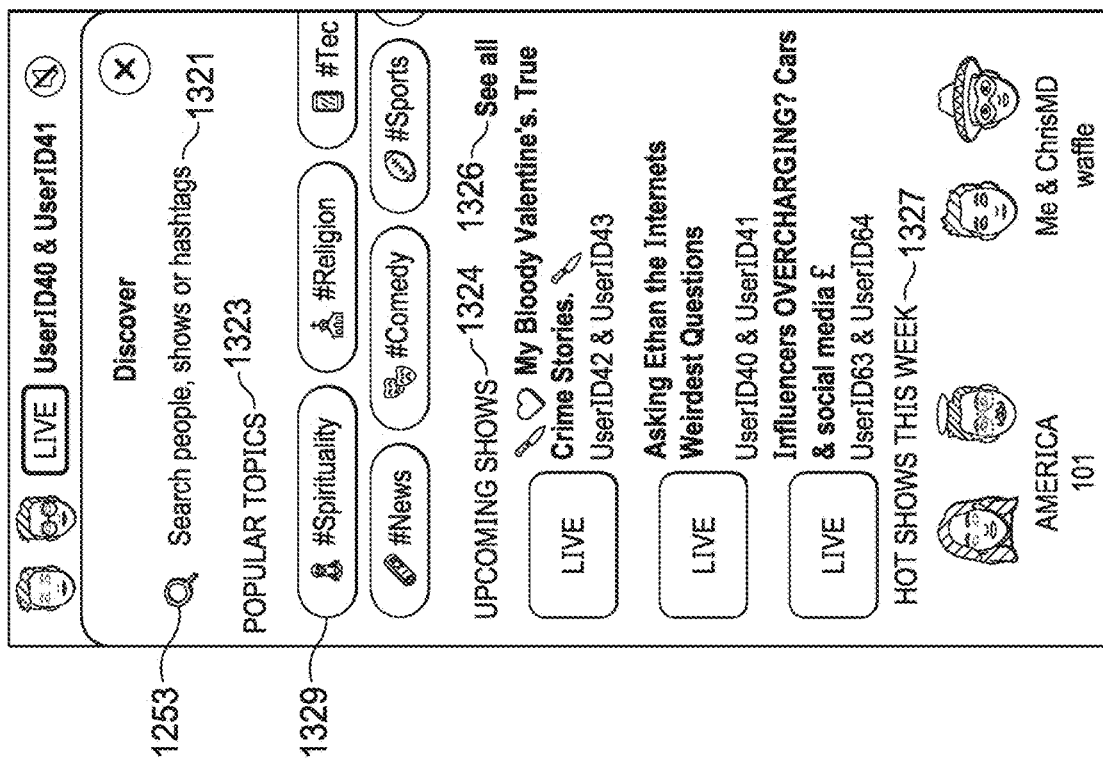

In an embodiment, selecting a magnifying glass icon 1253 as in FIG. 125 leads to a pop-up window as shown in FIG. 132. A user may input different search terms into a search bar 1321. The mobile application may display popular topics 1323, e.g., in the form of hashtags such as "#Spirituality" 1329 near the search bar 1321. Other examples of popular topics hashtags may include "#Religion," "#Tech," "#News," and "#Sports." Upcoming shows 1324 may be displayed near the popular topics 1323. A "See all" icon 1326 may be displayed for a user to select to see an expanded list of all upcoming shows with corresponding times. One or more popular shows of the week may be displayed below a "Hot Shows This Week" icon 1327.

Figure 134:
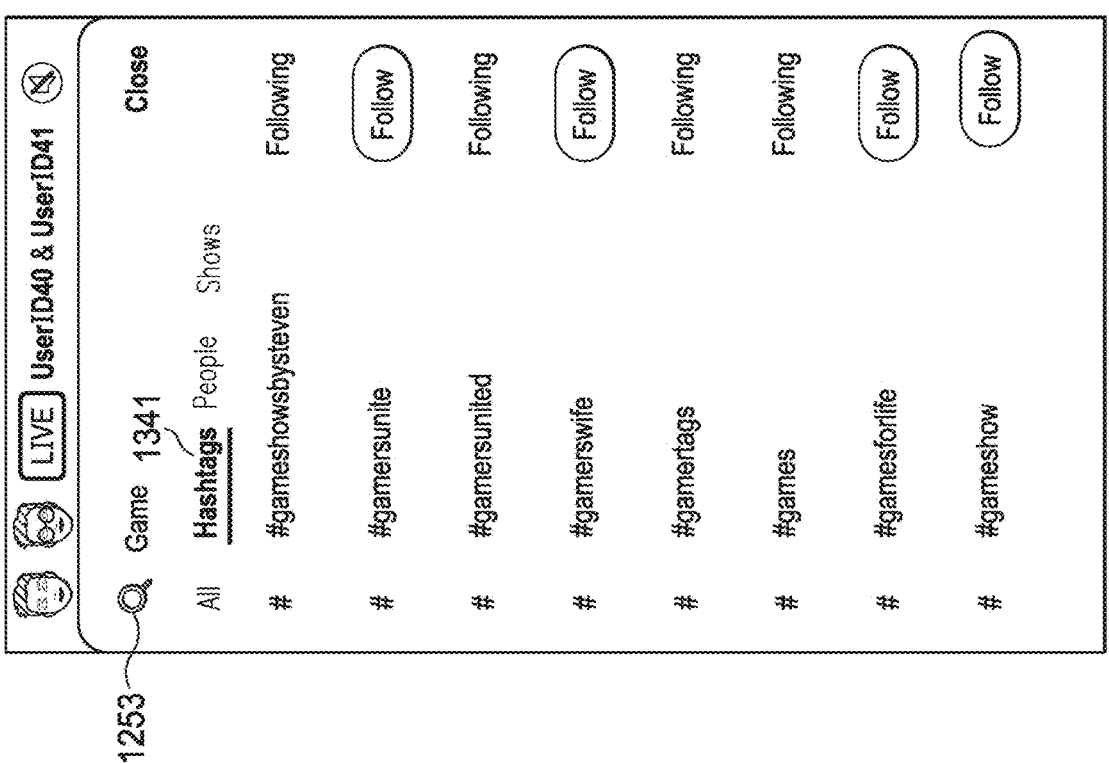
Figure 133:
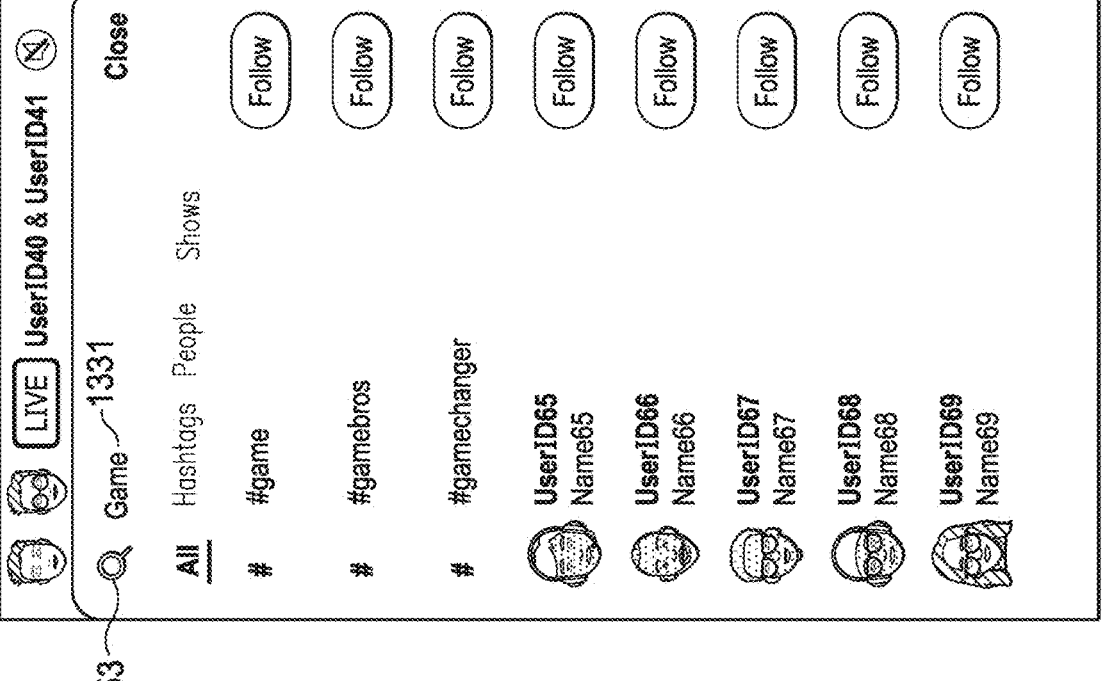
Figure 135:
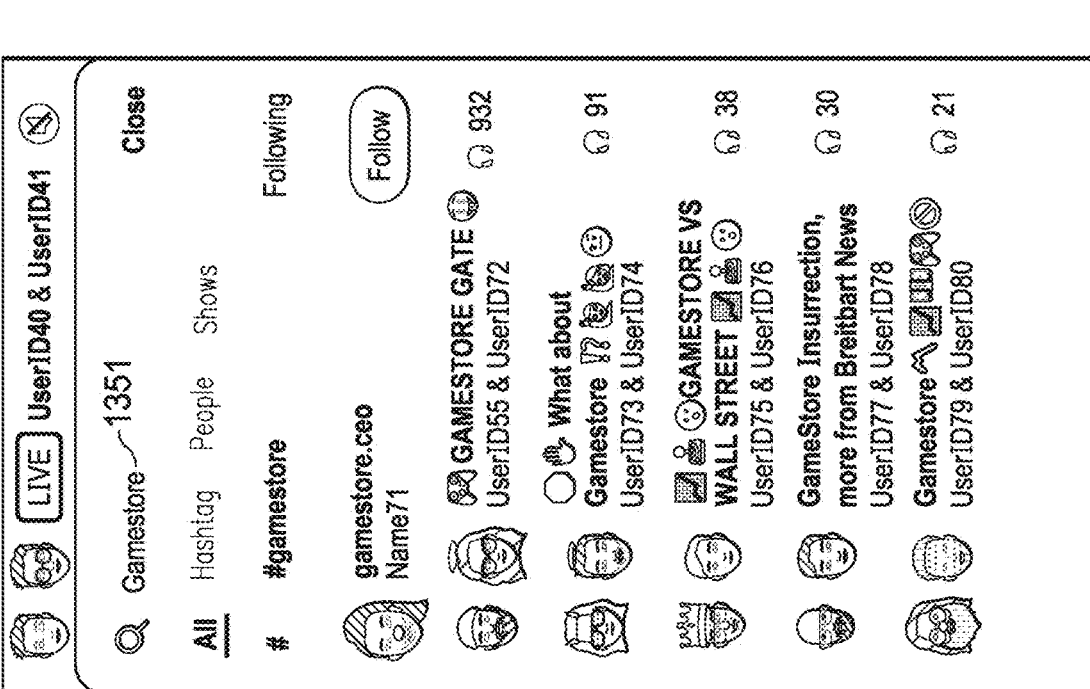

FIG. 133 shows a user interface of the mobile application when a user inputs a search term such as "Game" 1331 in the search bar. In the "All" category, all search results such as hashtags, users/people, shows, etc. associated with the term "Game" may be displayed. A "Hashtags" icon 1341 as shown in FIG. 134 may display hashtags associated with the term "Game" such as "#gamersunited," "#gamesforlife," etc. FIG. 135 shows another user interface of the mobile application when a user inputs another search term "Gamestore" 1351 in the search bar. The mobile application may display hashtags, shows, and users associated with the search term "Gamestore."

Figure 136:
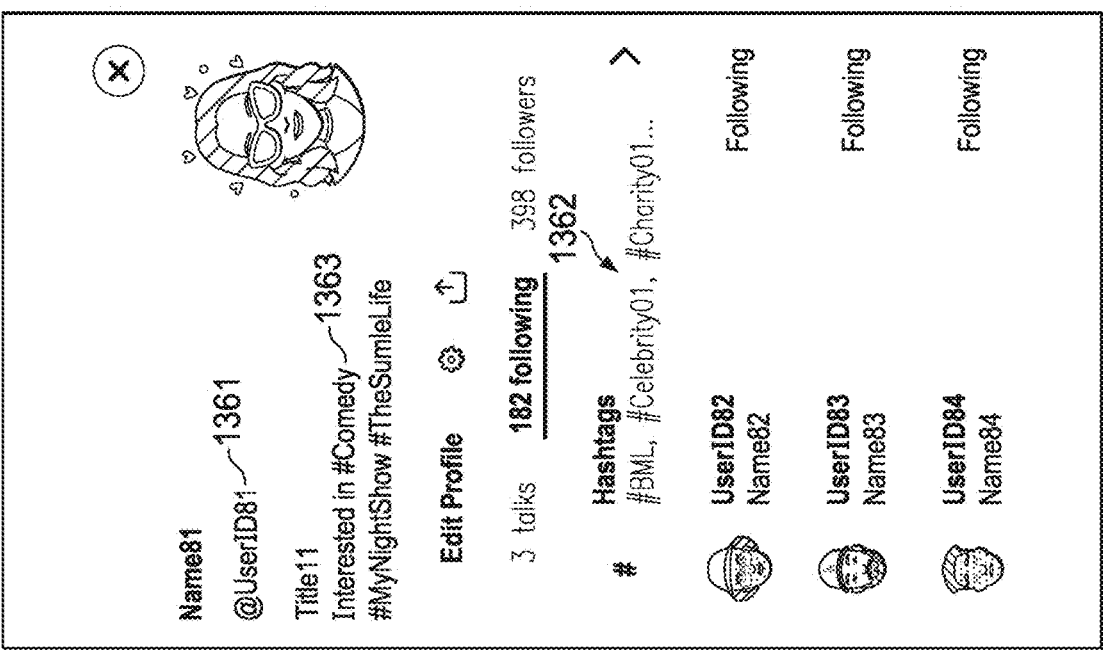

A user's following hashtags may be displayed on the home or information page of the user as shown in FIG. 136. For example, a user "Name81," whose attention could be obtained with "@UserID81" 1361, is following hashtags "#Comedy" 1363, "#MyNightShow," and "#TheSumle-Life." Hashtags 1362 associated with following users of the user "Name81" may be displayed below or near the "following" category icon along with the following user list.

Figure 137:
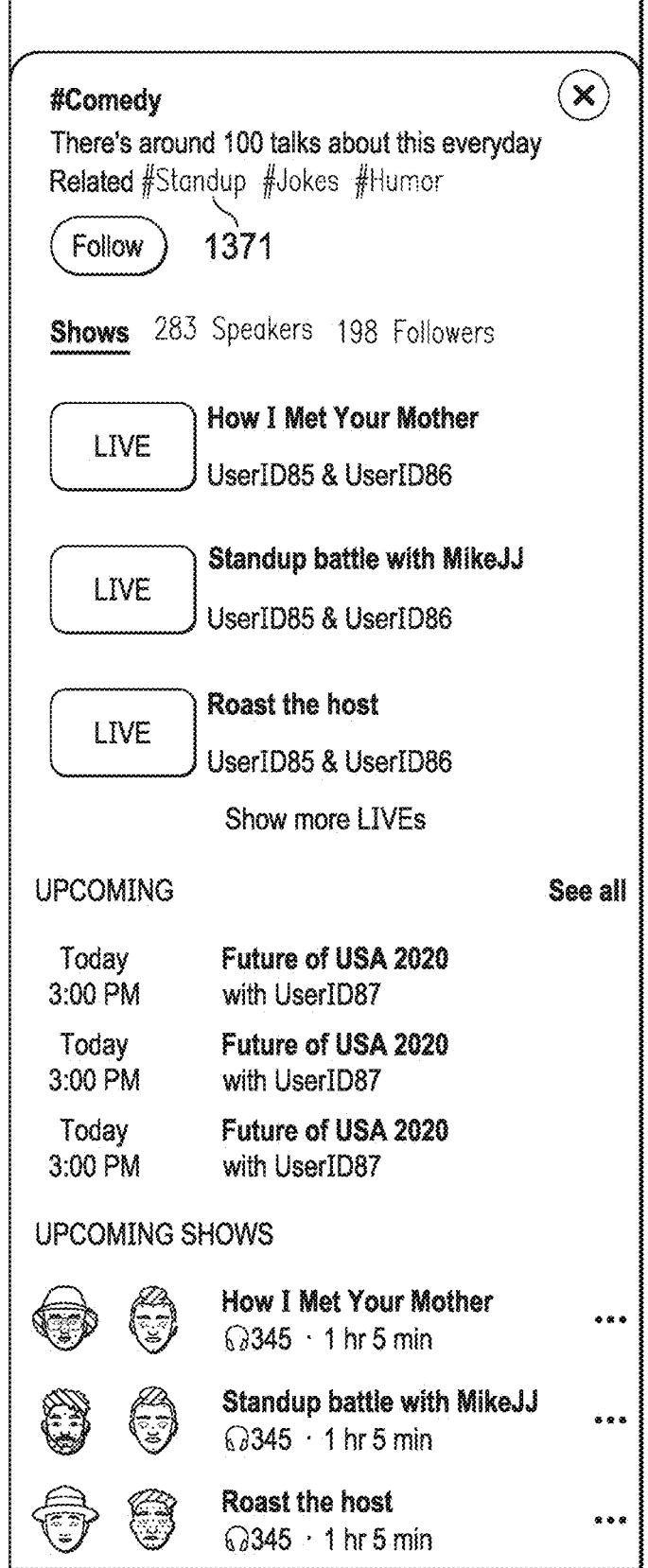

The mobile application may display related hashtags of a hashtag as shown in FIG. 137. For example, hashtags such as "#Standup," 1371 "#Jokes," and "#Humor" may be displayed along with the hashtag "#Comedy."

Figure 139:
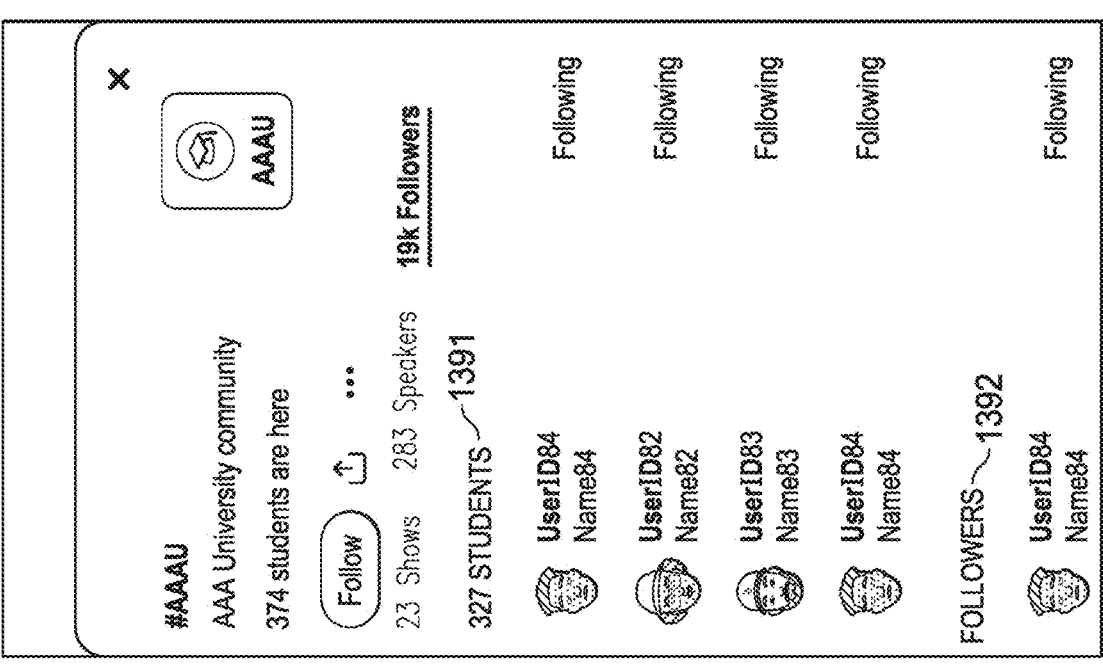
Figure 138:
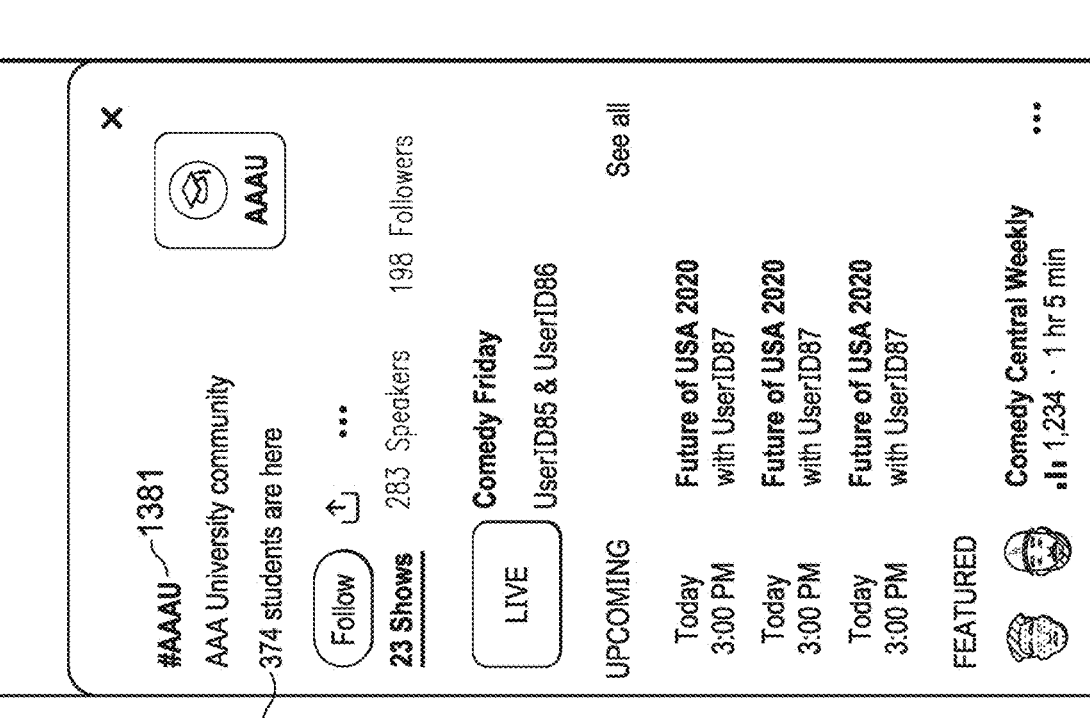

A business, organization, or community may have its own hashtag such as "#AAAU" 1381 shown in FIG. 138. The hashtag "#AAAU" 1381 may function as a user name for the community of AAA University. The number of community members like the icon 1382 may be displayed on the information page of the community. Some credentials, e.g., a school-issued email address, may be required to join the AAA University community as a member. For example, members in the "Students" category 1391 shown in FIG. 139 may join the community with a valid email address issued by AAA University. On the other hand, users in the "Followers" category 1392 of the community might not need an email address from AAA University to join the community.

Figures 140, 141:
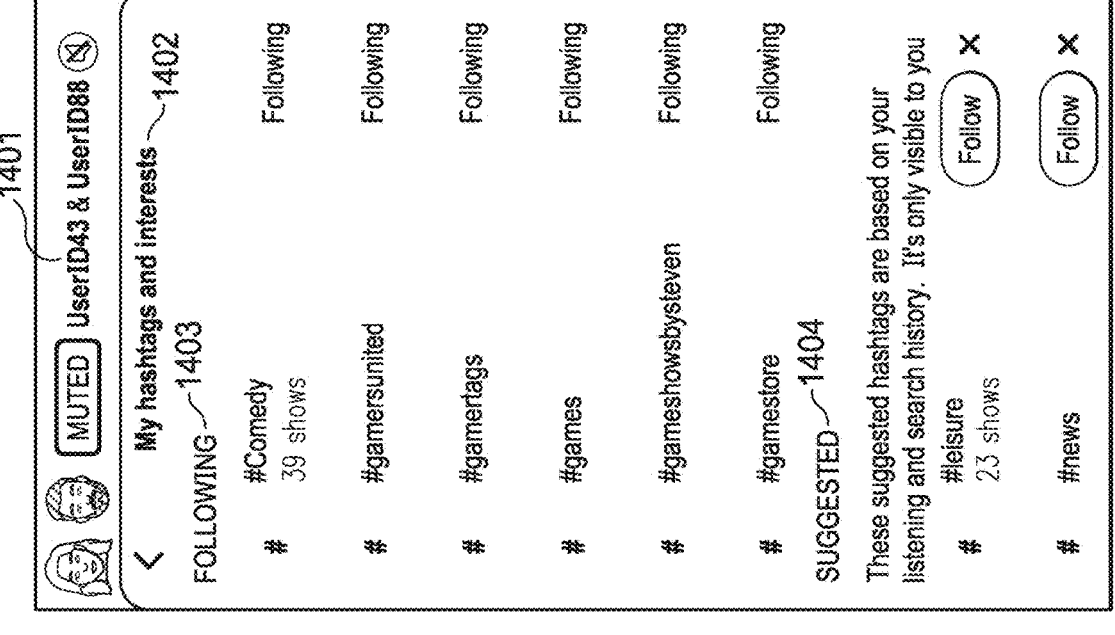

FIG. 140 shows that a user may manage and/or manipulate hashtag functions while listening to a live or recorded talk 1401. For example, the user may review following 1403 hashtags under his or her "My hashtags and interests" category 1402 while listening to the talk 1401. One or more suggested 1404 hashtags may be generated and/or displayed, e.g., based on at least one of the user's listening history, the user's search history, listening history of followed users of the user, search history of followed users of the user, listening history of followers of the user, search history of followers of the user, etc. The mobile application may also recommend hashtags based on field(s) of interest indicated by the user, e.g., at registration of a user account for the mobile application as shown in FIG. 141.

In some embodiments, the application contains an option for a listening user to execute a computing operation, by which they send a digital exchangeable to a speaking user. A listening user may be able to send a digital exchangeable to a speaking user while listening to the speaking user's audio conversation. A listening user may be able to send a digital exchangeable by selecting a link presenting the option to send a digital exchangeable, which may be displayed on the speaking user's profile.

In some embodiments, a speaking user may create a tracked goal or challenge on their profile. This goal or challenge may be accompanied by an associated description of the goal or challenge's purpose. This goal or challenge may be tracked by use of a graph, table, or other visual display. A listening user may execute a computing operation to send a digital exchangeable to the speaking user, which will cause a progression within the tracked goal or challenge. In some embodiments, the goal or challenge may be displayed during an audio conversation that the speaking user is participating in. In some embodiments, the goal or challenge may be viewable by all listening users or certain listening users that are subscribed to the speaking user.

In some embodiments, executing a computing operation to send a digital exchangeable to a speaking user may display a visual effect on the mobile application. Executing the computer operation to send a digital exchangeable to a speaking user may also produce an audio effect to be played out of the mobile device that is running the mobile application. The visual effect may include lights, color changes, confetti displays, balloon displays, other celebratory displays, or messages. The audio effect may include bings, alerts, chimes, etc.

In some embodiments, a listener user may execute a computing operation to send a digital exchangeable to the application or to a speaker user, which will cause the listener user's audio message to appear higher in a list of audio messages that may be presented to a speaker user for playing to listeners. When the listener user is recording an audio message (e.g., before, after, or during the recording of the audio message), he or she may be presented with the option to execute a computing operation to send a digital exchangeable to the application or to the user speaking (e.g., to a particular speaker user or to the audio conversation itself) in the audio conversation. Executing this computer operation will cause the audio message to appear higher in any feed or display that the speaker user uses to view their audio messages during an audio conversation. Audio messages that have been sent accompanied by executing the computing operation to send a digital exchangeable to the speaker user may have a different color, appearance, or associated symbol than other audio messages that are not accompanied by executing a computing operation to send a digital exchangeable to the speaker user.

In some embodiments, the listener execute a computing operation to send a first digital exchangeable (e.g., a first type of digital exchangeable) to the application, which, in turn, provides the speaker with a second digital exchangeable (e.g., a second type of digital exchangeable) based on the amount and type of the first digital exchangeable. In some embodiments, these digital exchangeables may also be sent from the listener to the application and/or to the speaker, which will cause the listening users audio message to appear higher in a list of audio messages that may be played by the listening user. Any references to the application may include at least one of a mobile device, a server that performs computing operations and connected to the mobile device via one or more networks, and/or one or more software or applications being executed on the at least one of the mobile device or the server. In some embodiments, a mobile device may include a desktop computer, a laptop, a mobile phone, a tablet, a motor vehicle, a wearable device, etc.

In some embodiments, a listener may execute multiple computing operations to send a digital exchangeable to the application or a speaker. These computer operations may be used to make an audio message from the listener appear higher in a speaker's list or feed of audio messages multiple times. For example, a transmission of a single digital exchangeable may bump up a listener's audio message by one spot in the queue, while two digital exchangeables may bump up a listener's audio message by two spots. The visual appearance (e.g., color, font, symbol, etc.) of the audio message in the list or feed may change depending on how many times the computing operation has been executed. Audio messages that have had the computing operation executed more times (e.g., from a first listener) may appear higher than audio messages that have had the computing operation executed less times (e.g., from a second listener). For example, an audio message that has had the computing operation executed three times may appear higher than an audio message that has had the computing operation executed two times. In some embodiments, the number of times an audio message has had the computing operation executed may be indicated by the audio message's appearance, or may appear next to the audio message in the list or feed displayed during the audio conversation.

In some embodiments, a speaker may select an option when beginning or participating in an audio conversation that prevents listeners (or selected listeners associated with a certain parameter) from executing a computer operation to send a digital exchangeable to the application or to the speaker.

In some embodiments, a listener may execute a computing operation to send a digital exchangeable to the application or a speaker, such that the listener subscribes to a speaker. The computing operation may cause a digital exchangeable to be sent to the application or a speaker multiple times or a single time. A digital exchangeable may represent a certain quantity of digital exchangeables, which may be greater than zero. The listener may be presented with an option to execute the computing operation to send a digital exchangeable to subscribe to a speaker when viewing the speaker's profile on the application. The listener may be presented with an option to execute the computing operation to send a digital exchangeable to subscribe to a speaker when viewing or listening to an audio conversation that the speaker is participating in or has participated in.

In some embodiments, when a listener has executed a computing operation for sending a digital exchangeable, there may be a visual or audio indication presented by the application (e.g., to the speaker or the user who receives the digital exchangeable). The visual indication may include lights, color changes, effects, or may grey out or remove the option to execute the computing operation again. The audio indication may include bings, alert tones, etc. In some embodiments, execution of any computing operation described in this disclosure may require or be accompanied by an exchange of one or more digital exchangeables. In some embodiments, a record of any exchange described herein may be stored on a distributed ledger.

In some embodiments, after executing a computing operation to send a digital exchangeable to the application or a speaker to subscribe to a speaker, a listener may be able to listen to certain audio conversations that they might not otherwise be able to listen to. A nonsubscribed listener (or listener who has not subscribed to the speaker) may be prevented from listening to an audio conversation (e.g., live or recorded) that only allows subscribed listeners. A nonsubscribed listener may see such an audio conversation being played on their application (e.g., when swiping through audio conversations) that he or she cannot listen to. A nonsubscribed listener may view past recorded audio conversations (that the speaker made available only to subscribed listeners) that they cannot listen to. A subscribed listener will be able to listen to these audio conversations as if they were normal audio conversations.

In some embodiments, after executing a computing operation to send a digital exchangeable to the application or a speaker to subscribe to a speaker, a listener may submit audio messages to a speaker that he or she is subscribed to, and those audio messages will appear higher in the list or queue (e.g., compared to audio messages received from non-subscribing listeners) that the speaker views when participating in an audio conversation. These audio messages may appear differently or have symbols displayed next to them in the list or display indicating that they were submitted by a subscribed user. A speaker does not have to play or select on these audio messages sooner than they play or select on other audio messages, but they may appear higher in the list.

In some embodiments, after executing a computing operation to send a digital exchangeable to the application or a speaker to subscribe to a speaker, a subscribed listener may transmit audio messages to a speaker during an audio conversation involving the speaker, whereas nonsubscribed users cannot. In some embodiments, a nonsubscribed listener may be able to listen to an audio conversation, but may be unable to submit audio messages to the speaker during the audio conversation.

In some embodiments, after executing a computing operation to send a digital exchangeable to the application or a speaker to subscribe to a speaker, a subscribed listener may be able to access audio conversation content that a nonsubscribed user cannot. During an ongoing audio conversation, a speaker may cause the conversation to be interrupted or the conversation may interrupted automatically. Interrupting the audio conversation may involve playing an audio targeted communication or advertisement (which may be accompanied by a visual targeted communication or advertisement), playing an audio message, blocking out the sound completely, etc. When the audio conversation is interrupted, nonsubscribed listeners will hear the advertisement (and, in some embodiments, the accompanied visuals), audio message, silence, etc. When the audio conversation is interrupted, subscribed listeners will continue to hear the live audio conversation and/or may even be able to participate in the audio conversation. During the interruption, the nonsubscribed listener may be presented with an option to execute a computing operation to send a digital exchangeable to the application or a speaker to subscribe to the speaker. In some embodiments, any features associated with audio messages may instead refer to call requests where the audio messages transmitted from the listener to the speaker represent call requests, which, if accepted by the speaker, will cause the listener to be able to join the audio conversation with the speaker (e.g., for a limited period or for a period determined by the speaker).

In some embodiments, a speaker or speaker may have listeners subscribe to them, by having the listeners execute a computing operation to send a digital exchangeable to the application or the speaker. A speaker may control or limit their content and audio conversations based around listeners that have subscribed to them. Speakers may be able to view their subscribed users in a list accessible from their profile. Speakers may be able to message (e.g., audio message, or visual message, etc.) their subscribed users or organize them within the mobile application.

In some embodiments, the speaker must be verified in order to have listeners execute a computing operation to send a digital exchangeable to the application or the speaker. A speaker may become verified by entering an access code into the application, or may become verified when the mobile application (or a server associated with the mobile application) approves a verification application, which is filled out and submitted by the speaker.

In some embodiments, a verified speaker may execute a computing operation thereby sending an invitation (e.g., comprising an access code) to other users or individuals who are registered users of the mobile application (or, in alternate embodiments, are not yet registered users of the mobile application). Another user or an individual who is not a verified speaker may respond to this invitation (e.g., by accepting this invitation) and thereby become a verified speaker on the application. If the individual did not previously have an account, that individual would first need to create an account prior to becoming a verified speaker.

In some embodiments, the first verified speaker who sent the invitation to the individual who becomes the new verified speaker may receive digital exchangeables from the application (or from or on behalf of the new verified speaker), whenever the new verified speaker receives digital exchangeables from listeners (e.g., subscribing listeners, or listeners who execute "Rise up" computing operations, or listeners who otherwise execute computing operations that cause digital exchangeables to be transmitted to the new verified speaker) or from the application. Therefore, in some embodiments, the first verified speaker may receive a portion of digital exchangeables that the new verified speaker collects from listeners to shows of the new verified speaker. Therefore, the first verified speaker may receive exchangeables associated with other verified speakers' shows or their digital exchangeables' collections (regardless of whether obtained from shows or other means).

In some embodiments, a speaker may be able to withdraw digital exchangeables that they have received from users or the application. A speaker may receive digital exchangeables from listeners executing computer operations, whether the computer operation is executed to send digital exchangeables for the purpose of subscribing to the speaker, to contribute to a goal or challenge of the speaker, or some other purpose. Digital exchangeables may be stored in a digital exchangeable container or account or wallet. The container may be processed within the mobile application (or a server associated with the mobile application) or may be processed at a third-party server. The container may have security measures or encryption in place protecting the digital exchangeables contained therein. In some embodiments, the container and the digital exchangeables may be secured and verified through a blockchain network. The container may display its contents on the speaker's mobile application. The container may present options for the speaker to withdraw the digital exchangeables or send them to another location or application and/or convert them to a different form (e.g., Stars to dollars, euros, or other fiat or cryptocurrency). The container may present an option for the speaker to send the contents (e.g., the digital exchangeables) to another user on the application.

In some embodiments, when initiating an audio conversation, a speaker may be presented with the option to only allow subscribed listeners to listen to the audio conversation. In some embodiments, when saving a recorded audio conversation, a speaker may be presented with the option to only allow subscribed listeners to listen to the audio conversation in the future. In some embodiments, when initiating an audio conversation, a speaker will be presented with the option to only allow subscribed listeners to send audio messages to the speaker and/or the other audio conversation participants.

In some embodiments, when a speaker is reviewing the list or display of audio messages sent to him or her during an audio conversation, any audio messages sent by a subscribed listener may appear higher than other audio messages and may be visually distinct from the other audio messages (e.g., associated with non-subscribers). The audio message may be visually distinct by use of a different color, appearance, or associated symbol. The speaker does not need to select or play these audio messages, but they may be displayed higher than the other audio messages submitted (e.g., from non-subscribers).

In some embodiments, a speaker may interrupt an ongoing audio conversation, or the audio conversation may be automatically interrupted based on certain parameters (e.g., periodically, based on the completed or pending duration of the audio conversation, etc.). A speaker may interrupt the audio conversation with an advertisement, a prerecorded message, with silence, etc. During the interruption, the speaker may allow subscribed listeners to continue listening to the audio conversation, and may allow them to not hear the interruption.

In some embodiments, a platform for targeted communication (e.g., advertising) synchronization is provided. The platform may be accessed from within the mobile application or may be a standalone application. The platform for targeted communication synchronization may be associated with a computing network that is part of the same computing network operating the mobile application, or it may be part of a distinct computing network. Advertisers (e.g., those who want to place targeted communications (e.g., audio, visual, etc.) during shows) and speakers may host profiles on the platform. Speakers may browse advertisers on the platform and solicit them or send them messages. Advertisers may browse speakers on the platform and solicit them or send them messages. Advertisers may send large-scale group messages or solicitations to speakers. Speakers may send large-scale group messages or solicitation to advertisers. In some embodiments, advertisers may be provided with analytics associated with speakers and their shows (e.g., content of shows, descriptive operators associated with shows, listeners' location associated with shows, listeners' age or demographics or education associated with shows, number of listeners associated with shows, duration of shows, speaker's location or other information associated with speaker, engagement associated with shows including number of and/or type of and/or length of audio messages received during shows, number of subscribers associated with speaker, history of receipt of digital exchangeables of the speaker from listeners, etc.). In some embodiments, a matching operation may be performed based on comparing wants of an advertiser (e.g., type of target listener or speaker, target descriptive operators, etc.) and the statistics associated with speakers' shows and presenting the optimal speaker based on the wants of the advertiser.

In some embodiments, advertisers may be connected with speakers via the platform. When connected, speakers and advertises may agree to engage in targeted communication agreements. Targeted communication agreements may call for a speaker to play a prerecorded advertisement during an audio conversation, or may call for the speaker to personally read or perform a targeted communication (e.g., advertisement) during an audio conversation. An advertiser may send digital exchangeables to a speaker in exchange for playing, reading, or performing the targeted communication. The platform may process computing operations (optionally, in association with a third party processor) to send digital exchangeables from the advertiser to the speaker. The platform may retain a portion of the digital exchangeables sent from an advertiser to a speaker.

In some embodiments, a digital exchangeable may comprise a medium of exchange on the mobile application, e.g., a fiat currency, a digital currency, an application token, a virtual currency, a cryptocurrency, a tangible asset, an intangible asset, a non-fungible token, a unit of value such that the unit of value enables certain functions or features or operations on the mobile application, etc.

In some embodiments, when a listener wishes to execute a computing operation to send a digital exchangeable to a speaker, if there are multiple speakers engaged in a conversation, the listener may be able to select which speaker the computing operation is directed towards, or which speaker the digital exchangeable is sent to. In alternate embodiments, the digital exchangeable may be associated with and sent to an audio conversation such that the digital exchangeable is shared among the speakers of the audio conversation.

In some embodiments, a user (e.g., a listener) may execute a computing operation to send a first digital exchangeable to the application, whereby the application distributes a different digital exchangeable (e.g., amount or type when compared to the first digital exchangeable) to a second user (e.g., a speaker).

Figure 142:
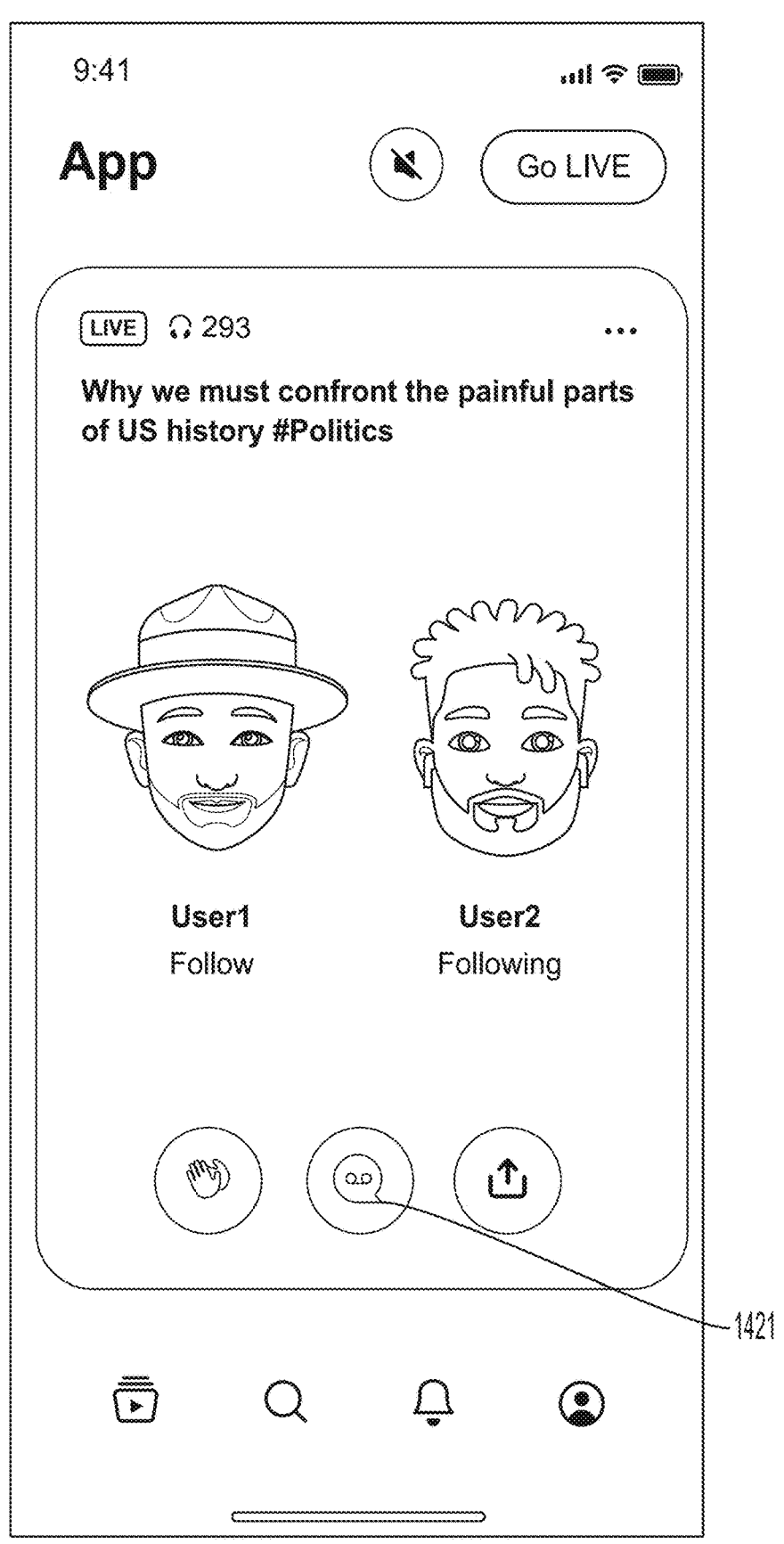
Figure 143:
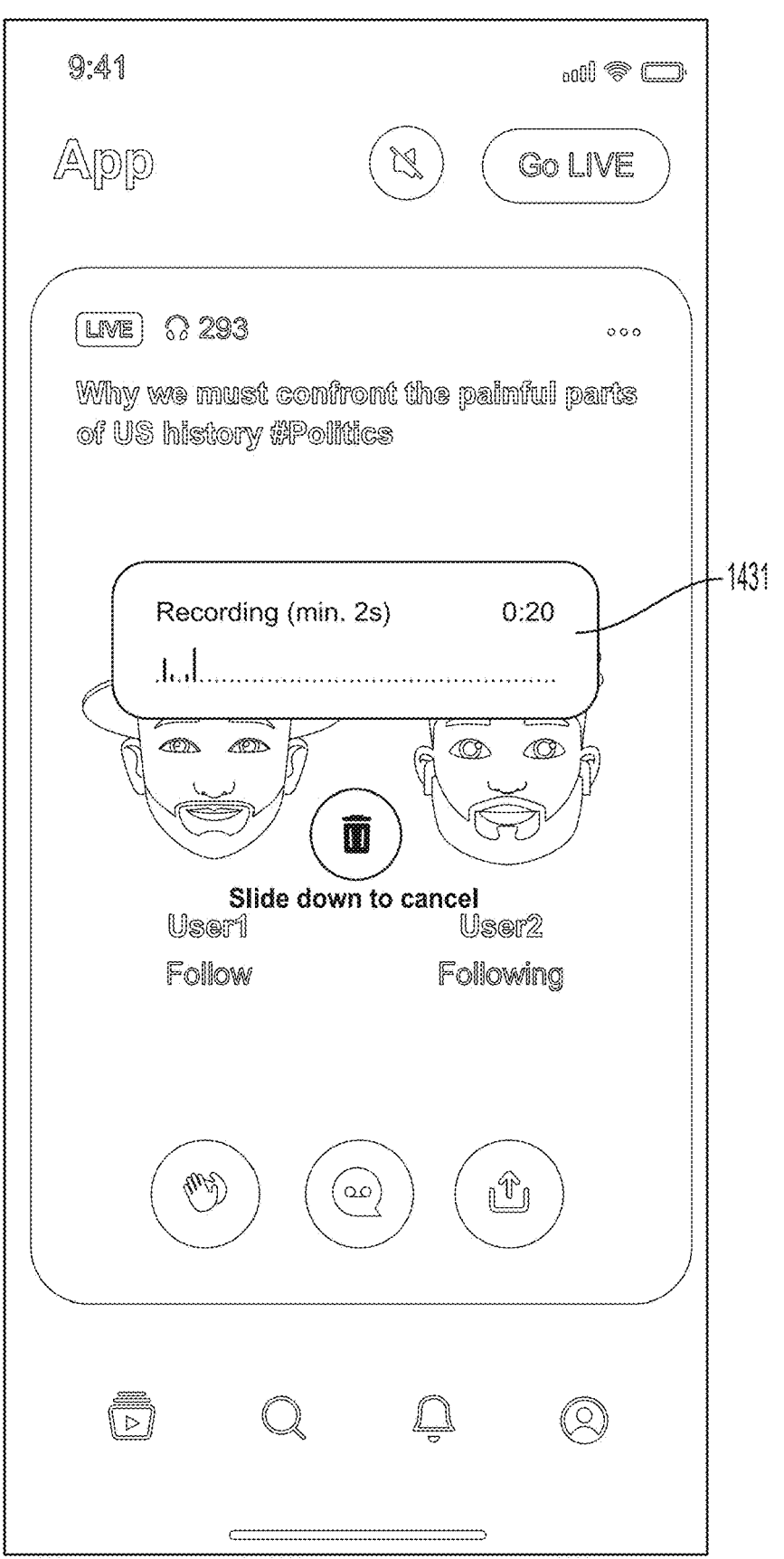
Figure 144:
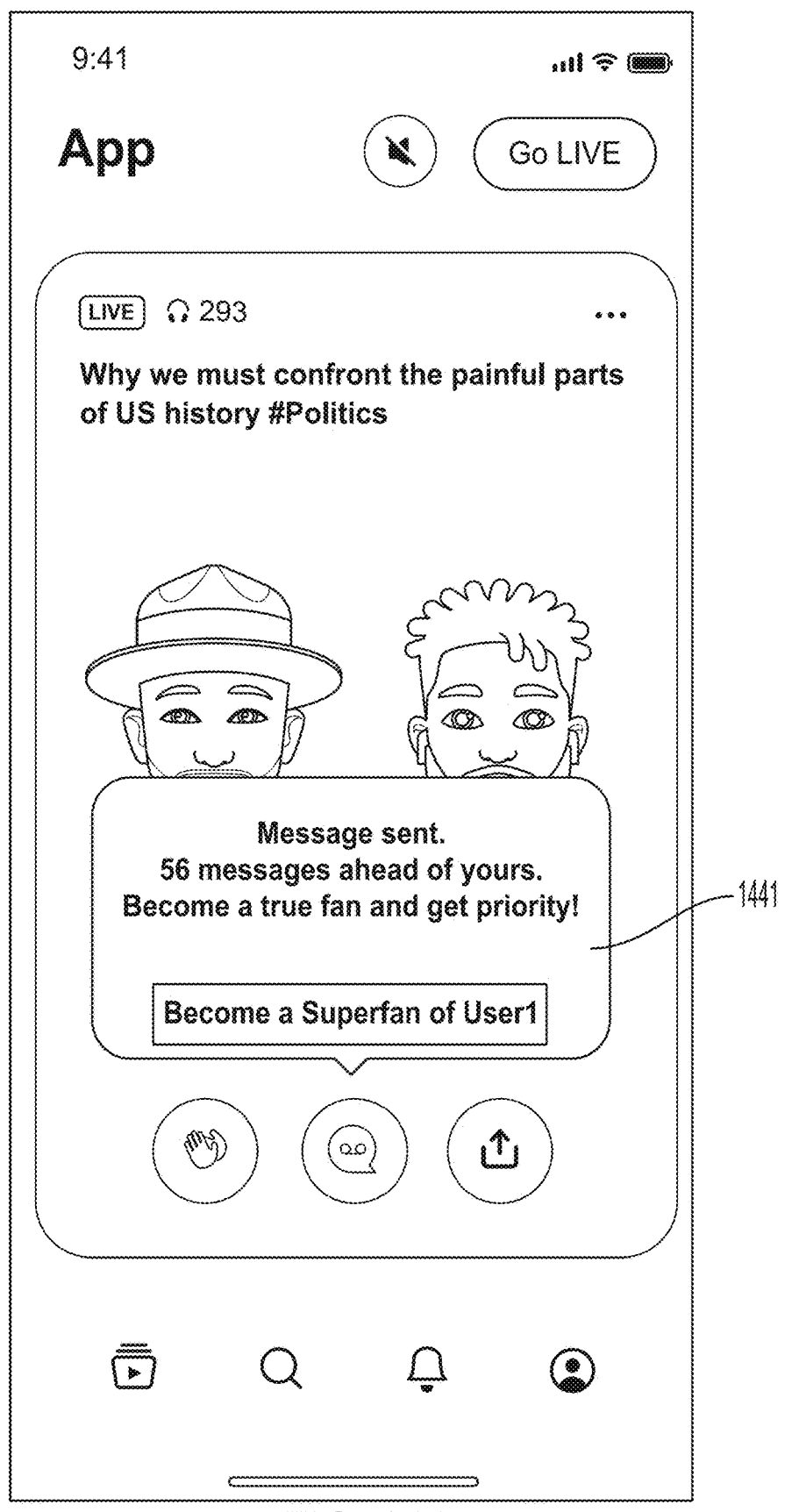
Figure 145:
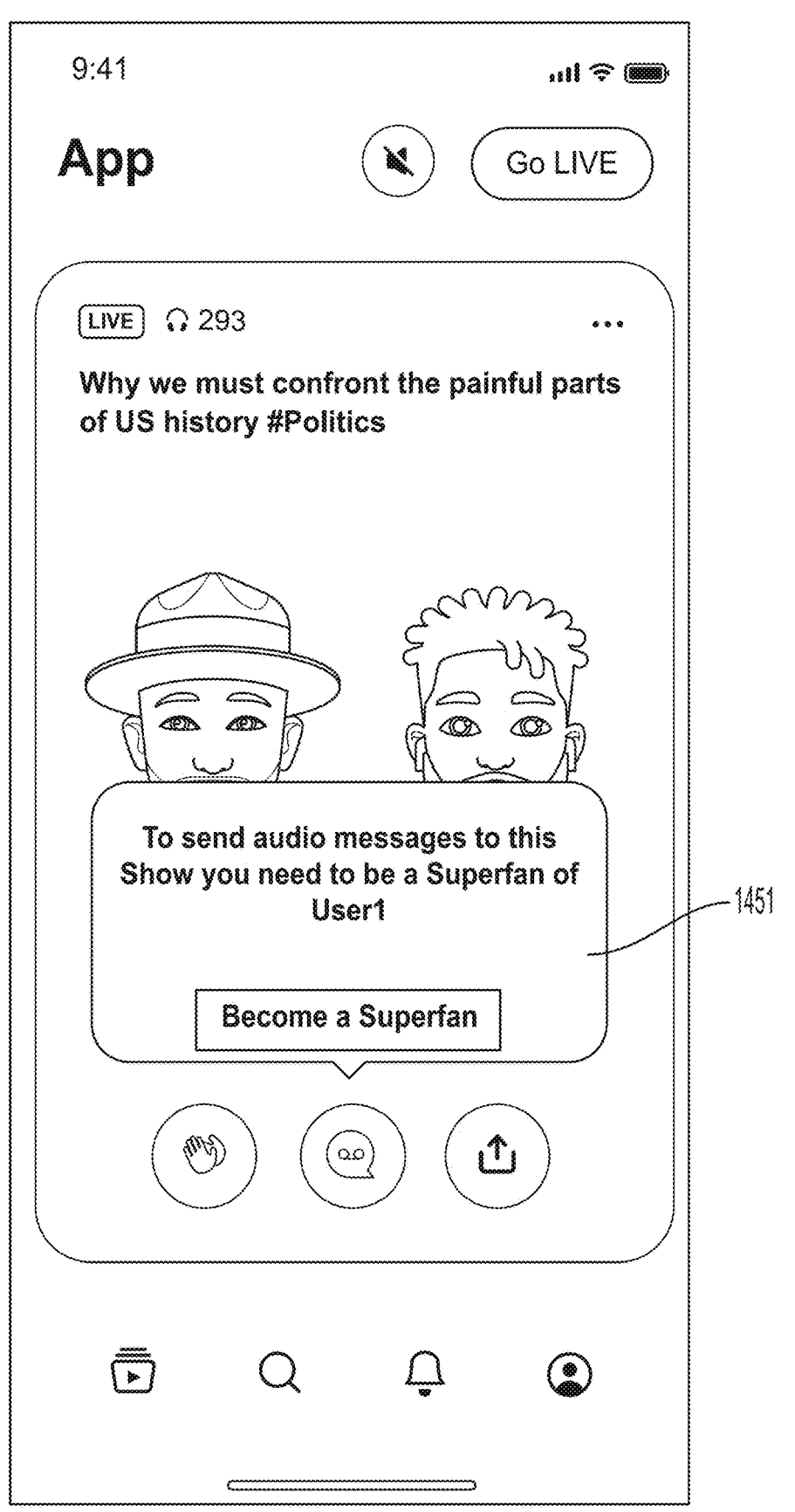
Figure 147:
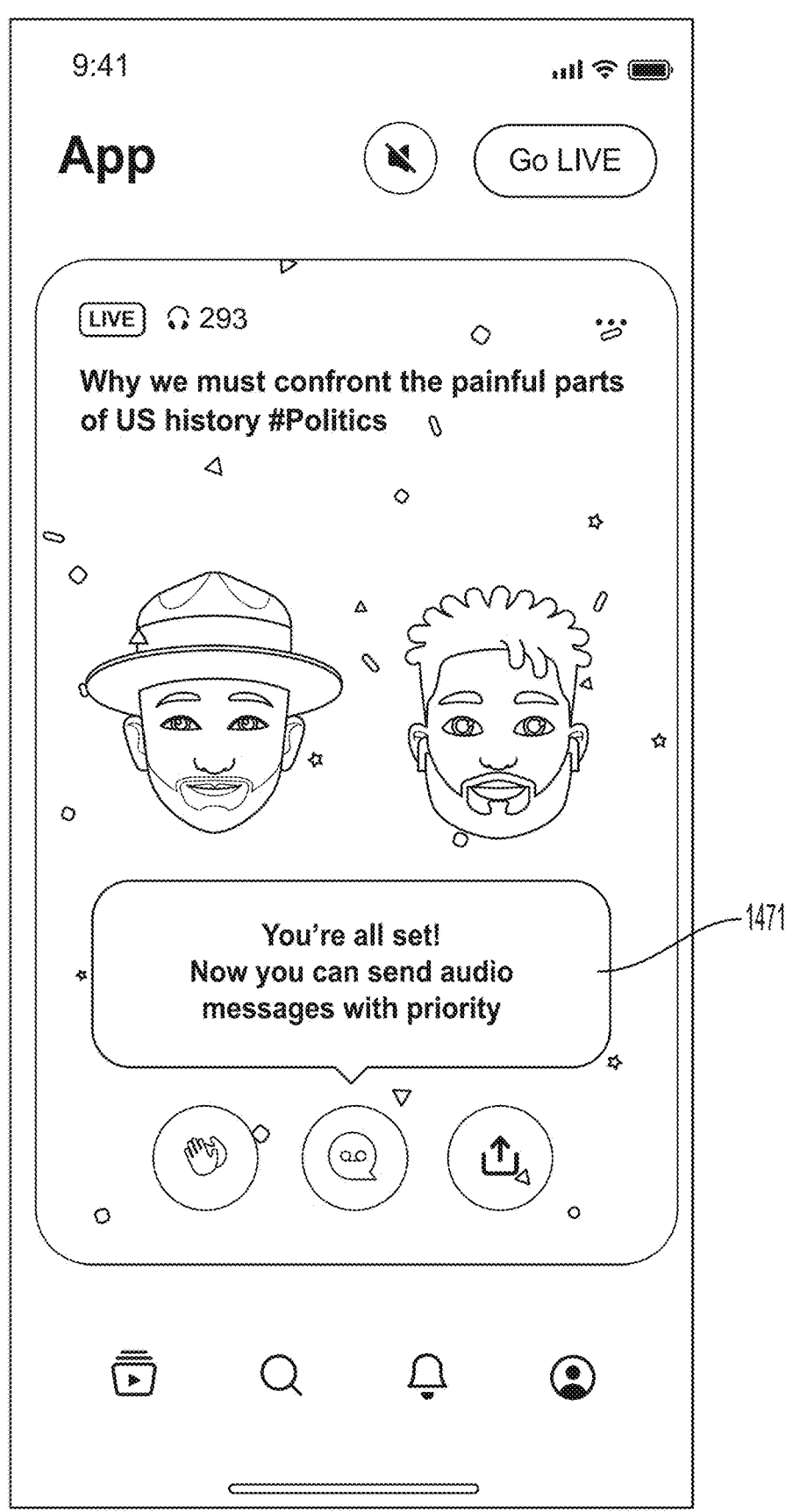

FIG. 142 shows the application screen during an audio conversation and the option for a listener to record an audio message 1421. Selecting 1421 brings up a popup screen to indicate the duration of an audio messages a listener is recording, as seen in FIG. 143. After recording and sending an audio message from the listener's mobile device to the speaker's mobile device (e.g., via a server), the application may display a message such as 1441 informing the listener that the audio message has been sent to the speaker, and informing the listener that a certain number of audio messages are ahead of the listener's audio message. The message will prompt the listener to become a "Superfan" of the speaker so that their audio message will obtain priority (e.g., such that the audio message is placed ahead of other non-priority audio messages in a queue of audio messages to be played by the speaker). In some embodiments, an audio message may alternatively be replaced by a listener's call request. Alternatively, selecting option 1421 may bring up a message such as 1451, as seen in FIG. 145, informing the listener that they may not send audio messages unless they are a "Superfan" of the speaker, and prompting the listener to become a "Superfan" of the speaker. After becoming a "Superfan," message 1471, as seen on FIG. 147, will appear, informing the user that they may now send audio messages with priority. In some embodiments, a listener may become a "Superfan" or subscriber by subscribing to the speaker. This may include the listener executing a computing operation that transmits digital exchangeables from the listener's account (e.g., wallet) to the speaker's account. In some embodiments, the computing operation may be a periodic computing operation.

Figure 146:
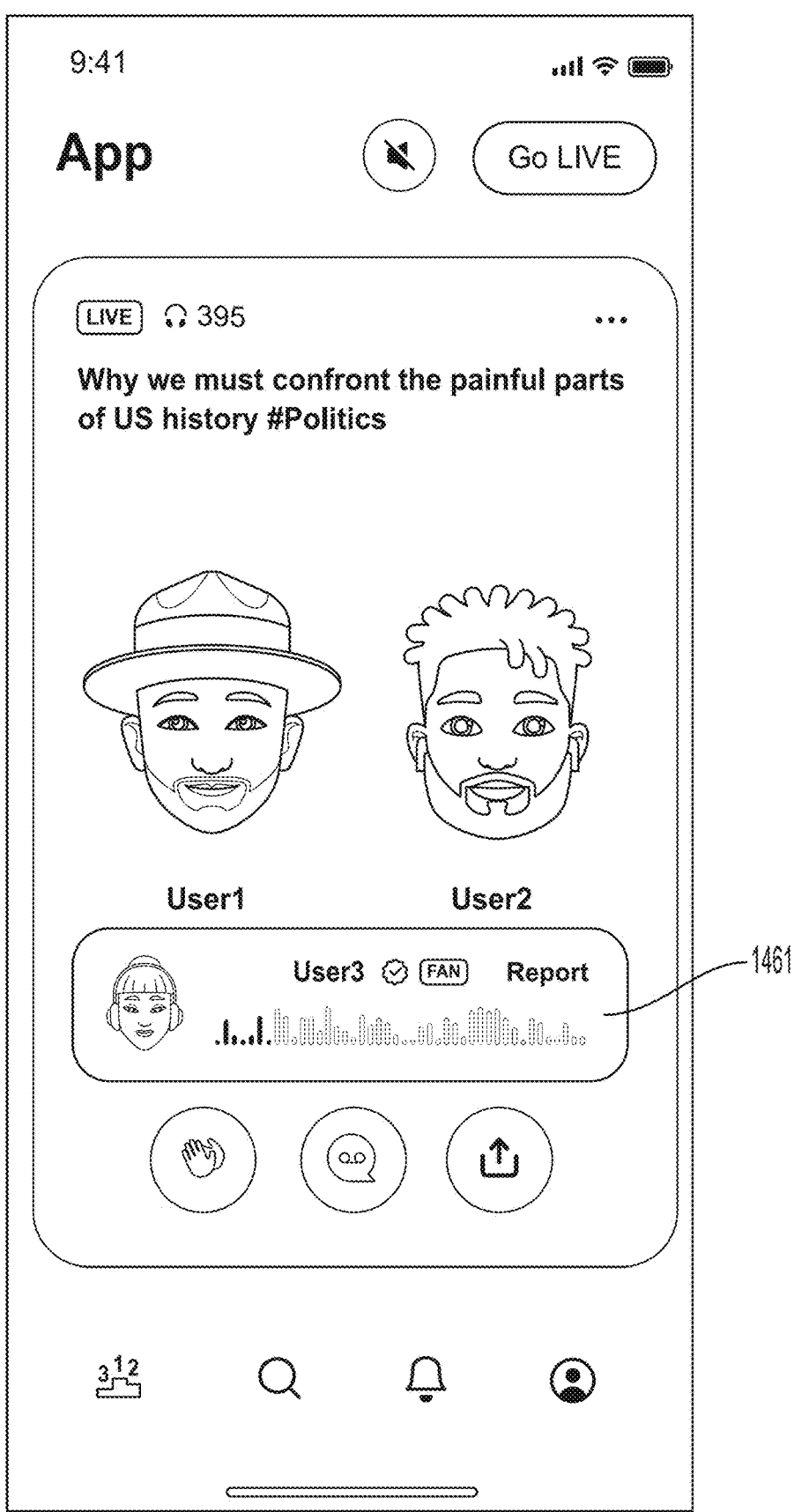

FIG. 146 displays an audio message being played by the audio conversation speakers (one of or both speakers may have the ability or access to play the audio message). The progress of the audio message, listener identity, listener verification check (e.g., where the listener's identity is verified using identification information provided by the listener or obtained from a third party source), status as a "fan," and an option to report the user who sent the audio message are all displayed on in a pop up window 1461 that is superimposed on the base screen or user interface.

Figure 148:
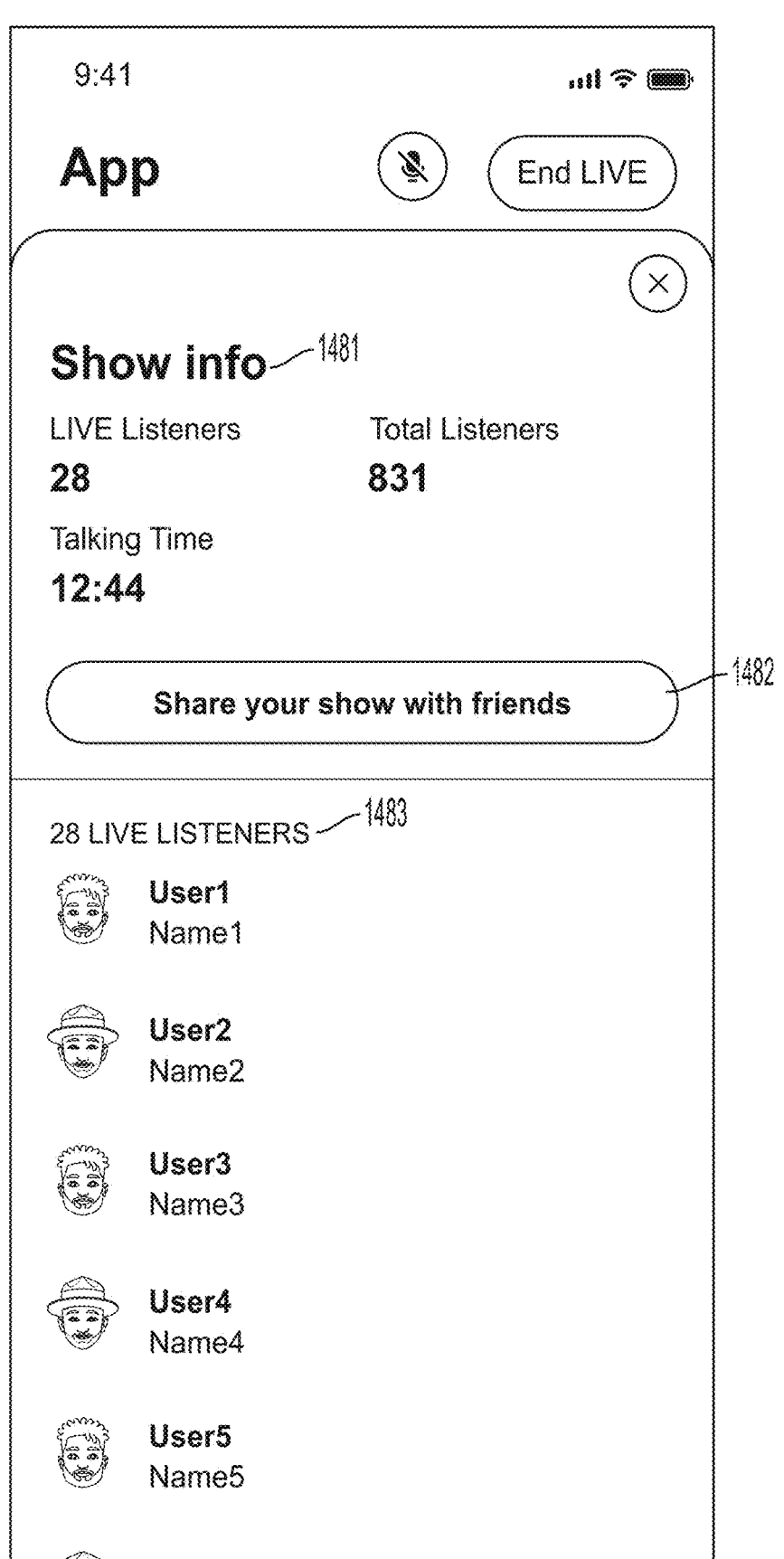

FIG. 148 provides the show information that can be viewed by the speakers (e.g., one of the speakers or both speakers in other embodiments) participating in an audio conversation. The header of the information screen displays "Show info" 1481. The screen provides statistics about the ongoing audio conversation, and also gives an option for the speaker to share the show with friends 1482. The live listeners are listed out 1483, and they may have their "fan" status displayed next to their username. An option to end the show "End LIVE" may also be presented on the screen.

Figure 149:
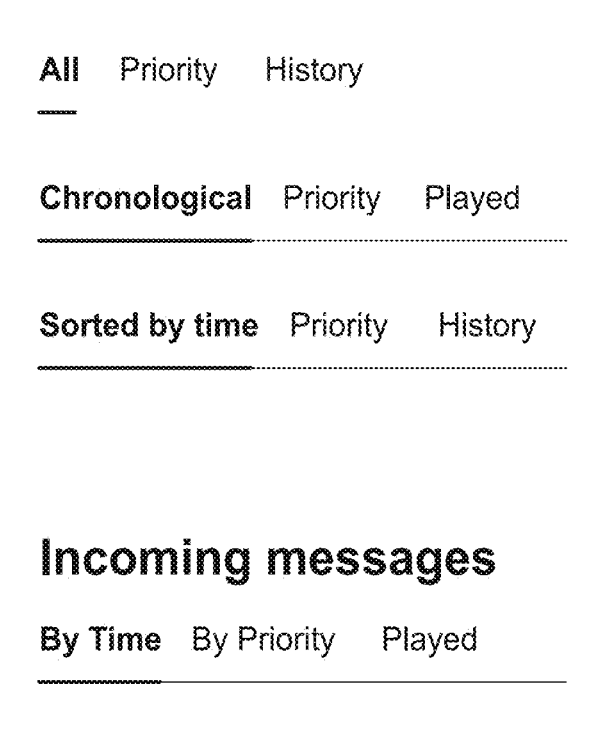
Figure 150:
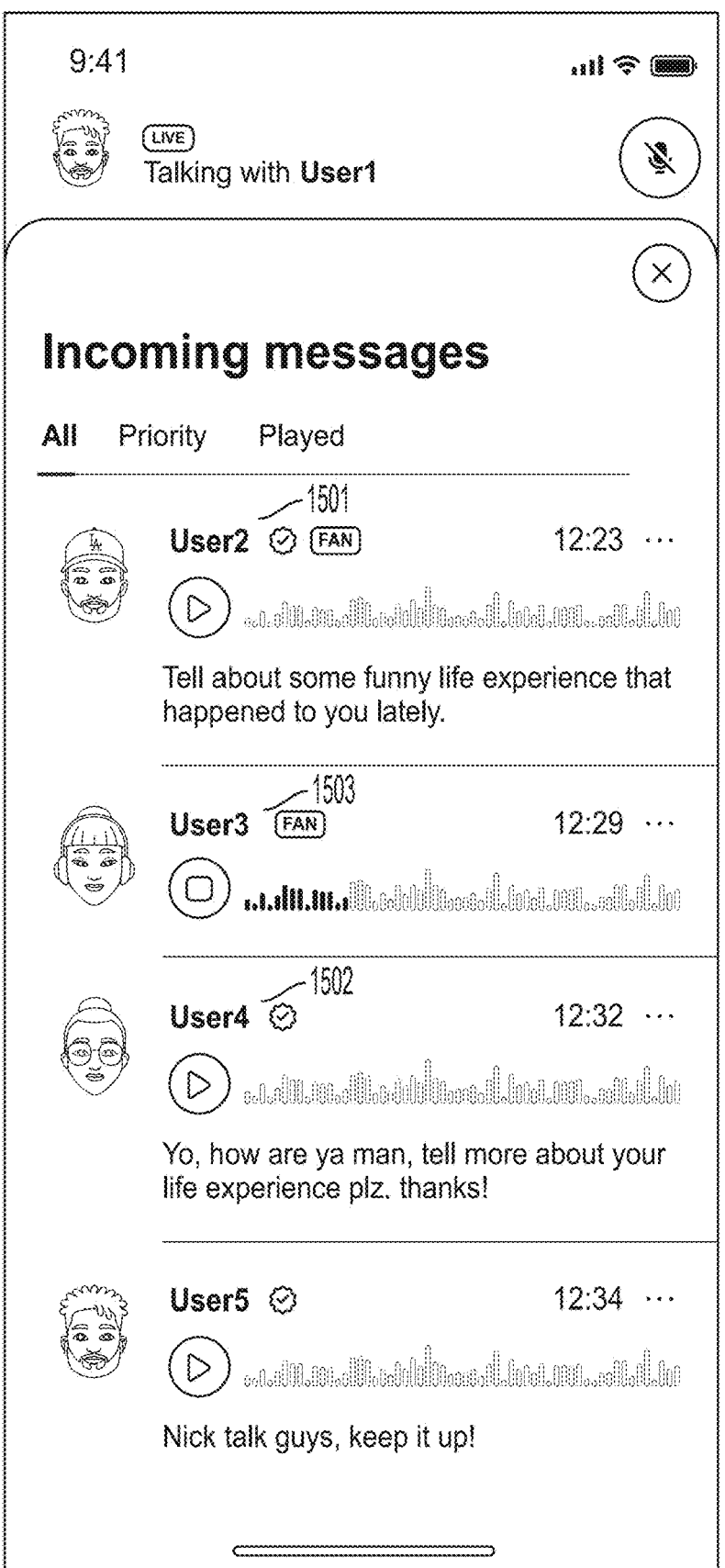
Figure 151:
Figure 152:
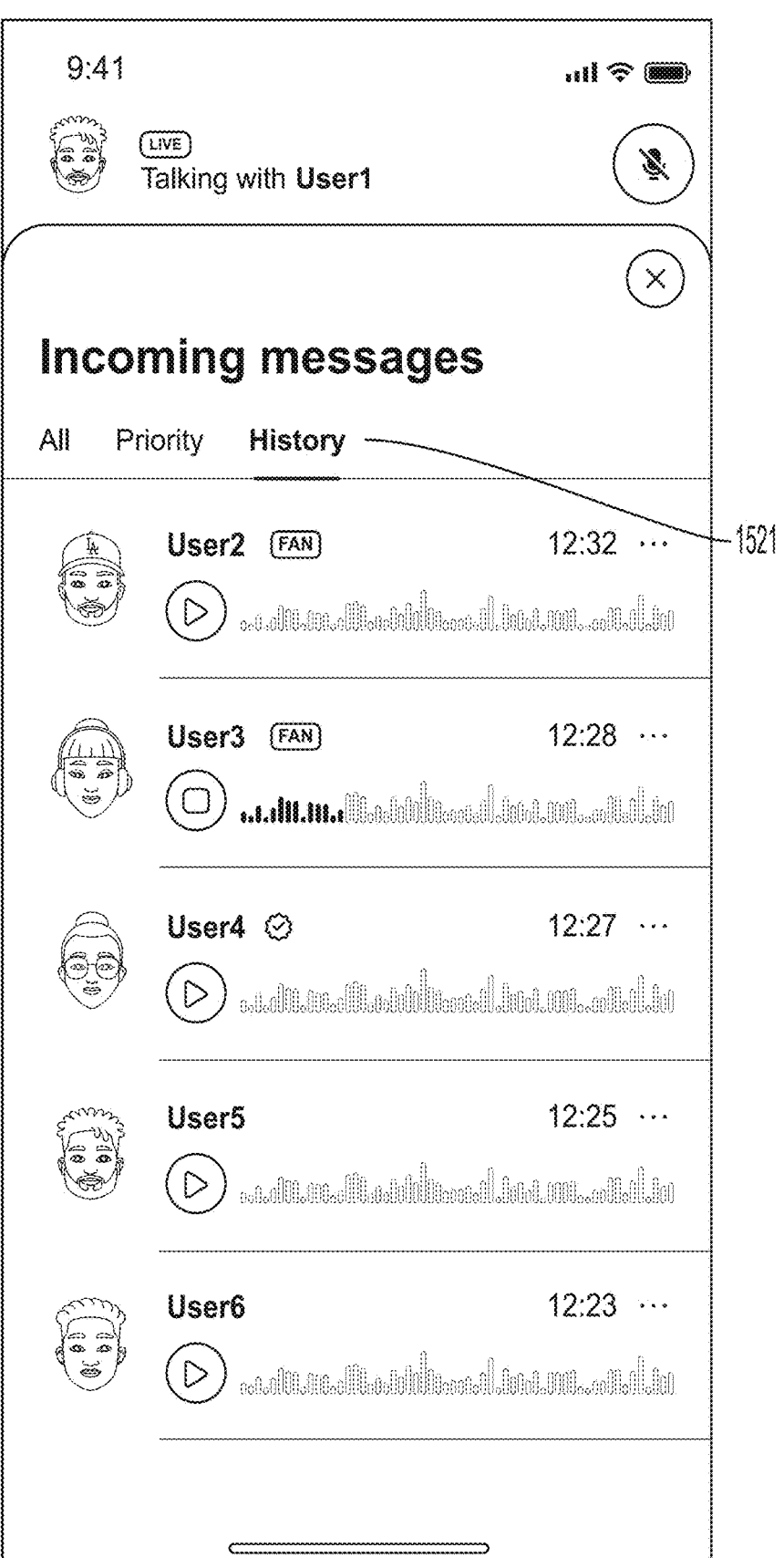

FIG. 149 shows the application screen when a speaker user is viewing the audio messages that are incoming during the audio conversation. Audio messages may be sorted by priority, history, time submitted, played status, etc. FIG. 150 also shows the incoming messages. These are listed with the associated user who submitted the message 1501, 1502, 1503. A user may have their "fan" status (e.g., subscription status) 1501, 1503 and identity verification status 1502 identified next to their username. Messages may have transcripts or associated text messages displayed underneath them. If a speaker selects on an individual user's username, they may be presented with an option to hide their messages, block, or report them, as seen in FIG. 151. FIG. 152 shows audio messages sorted by their history. Selecting "History" 1521 may black in the "History" 1521 indicator and will grey out other sorting options. The messages from the users (e.g., listeners) who are "Superfans" are placed above those associated with other listeners even if the messages from the "Superfans" are received after the messages associated with the other listeners. Among the "Superfans," the listeners messages may be positioned in the queue in order of receipt, or based on some other ordering mechanism (e.g., based on listener's audio message frequency in the current conversation, duration of audio message, status of listener with respect to the speakers (e.g., if the listener is a follower or followed by one of the speakers), etc.)

Figure 153:
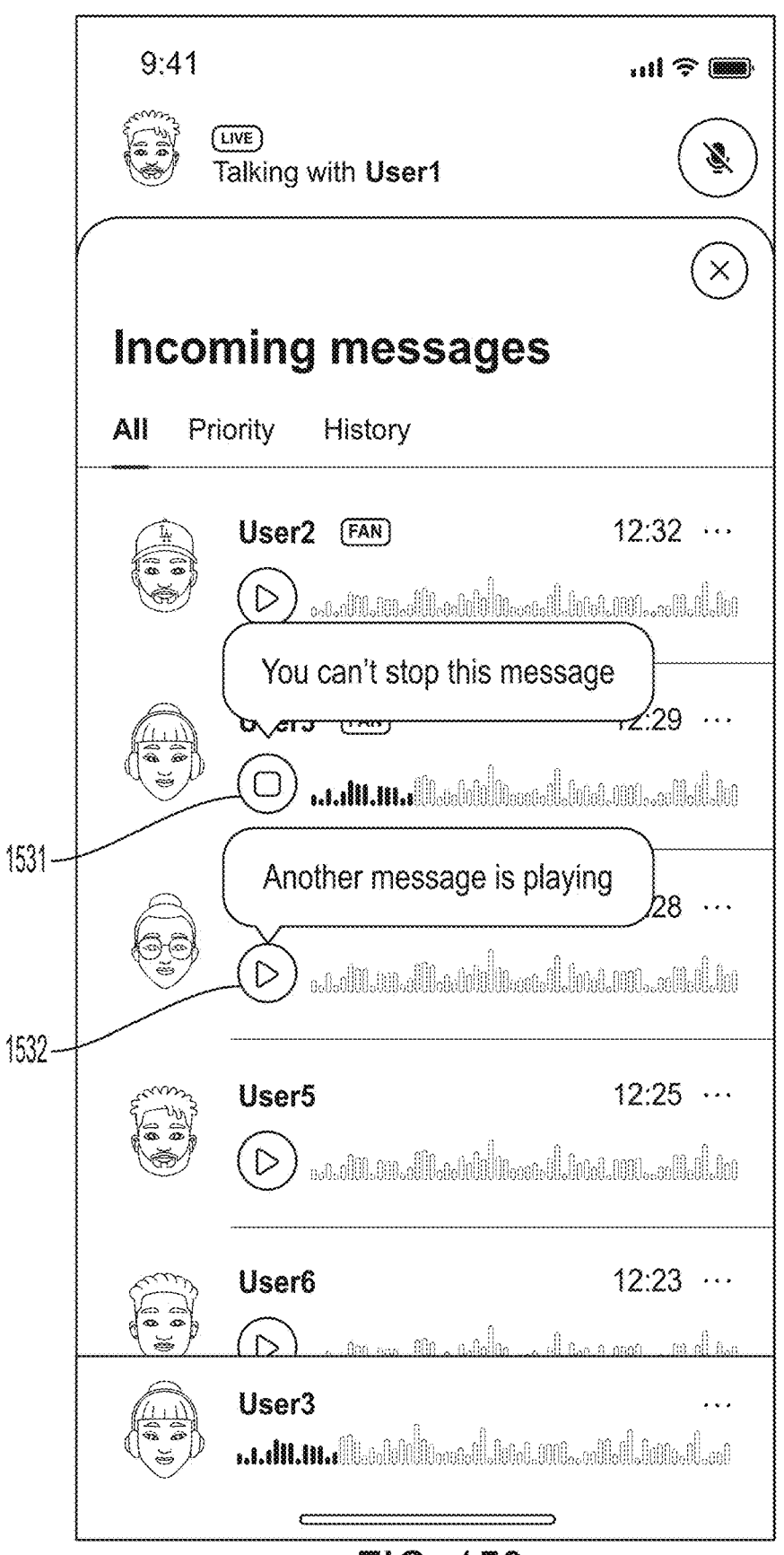
Figure 154:
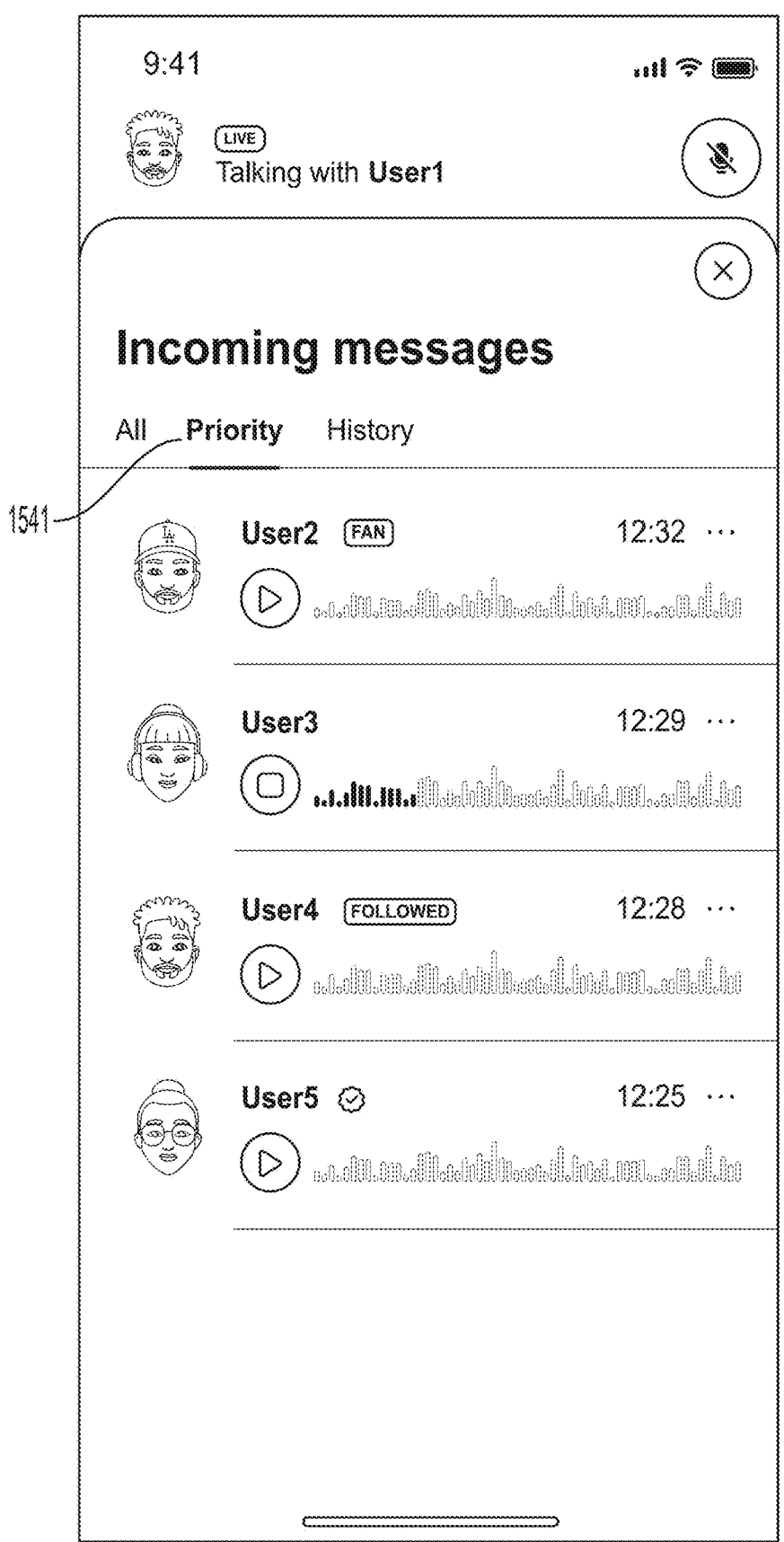
Figure 155:
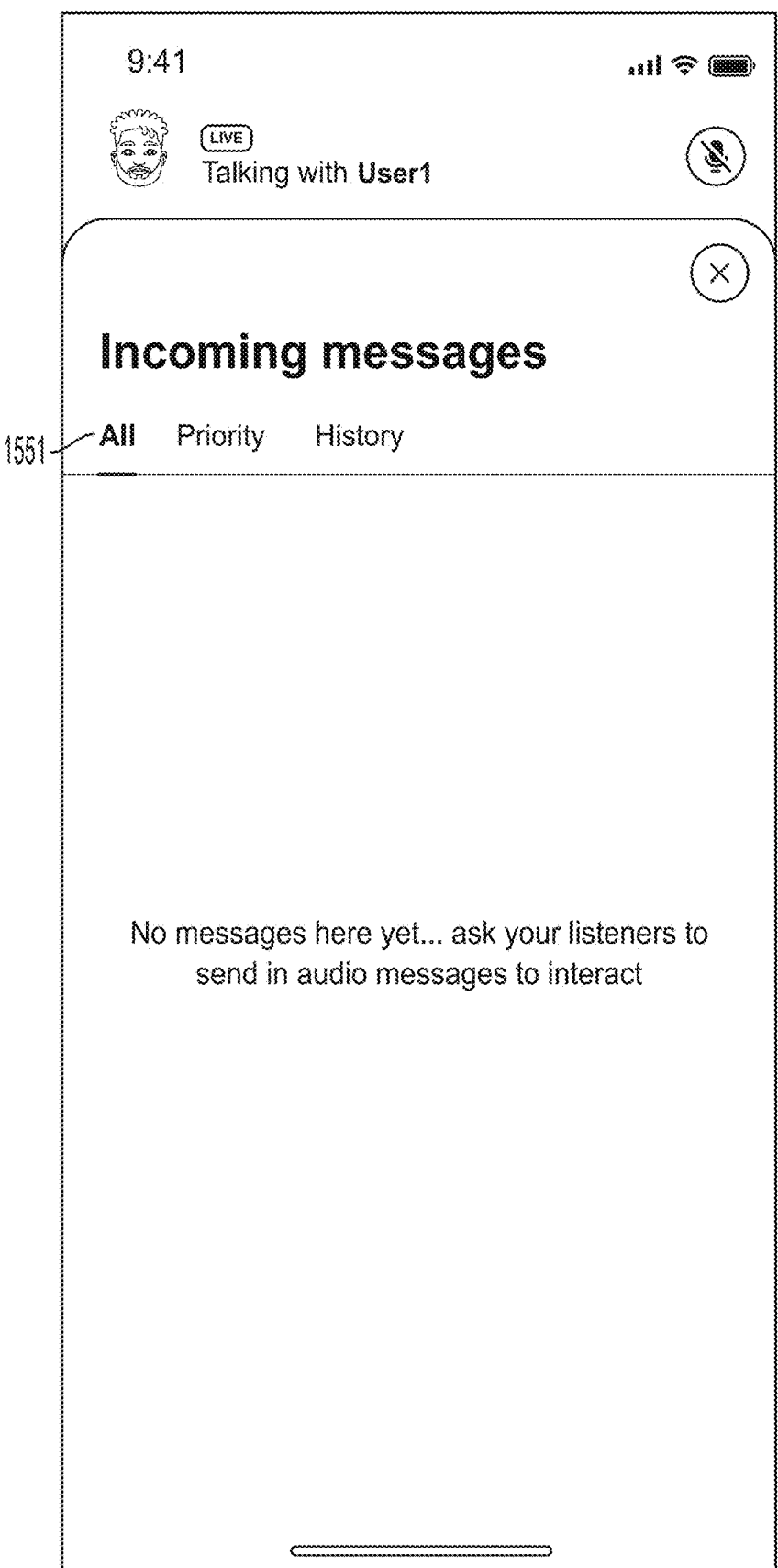

FIG. 153 shows the incoming message screen (showing "all" messages), whilst the speaker is in the middle of playing an audio message from a Superfan (or subscriber). After beginning to play an audio message, the application may display a message saying "You can't stop this message" 1531 if the speaker attempts to stop the message. If a speaker attempts to play a second audio message while a first audio message (e.g., from a superfan) is playing, the application may display a message saying "Another message is playing" 1532. A speaker may stop messages from regular (not superfan) users after partially playing them. FIG. 154 shows the incoming message screen where the speaker selects view of only priority audio messages (not all audio messages which includes messages from listeners who are not superfans or who do not have priority status). In some embodiments, a listener user has priority status if the listener user at least one of is a superfan, is followed by the speaker, is a listener whose identify has been verified, is a listener who executed a computing operation sending a digital exchangeable to the speaker, etc. Selecting the "priority" indicator 1541 may cause the "priority" indicator be become blacked in, while the other sorting options are greyed out. In alternate embodiments, selecting the "priority" indicator 1541 causes the messages to be arranged in terms of priority (e.g., based on factors associated with the status of the user, the time the audio message is received, the duration of the audio message, the identity verification status of the listener who sent the audio message, etc.). FIG. 155 shows an incoming messages screen, where no audio messages have yet been received. Selecting the "All" indicator 1551, may cause the "All" indicator 1551 to become blacked in, while the other options may be greyed out. The All option may display all audio messages received.

Figure 156:

FIG. 156 shows the incoming messages screen, whilst the History option is selected but there are no messages present. Selecting the "History" indictor 1561 may cause the "History" indicator 1561 to be blacked in, while the other sorting options may be greyed out. The History option may display audio messages that have already been played.

Figure 157:
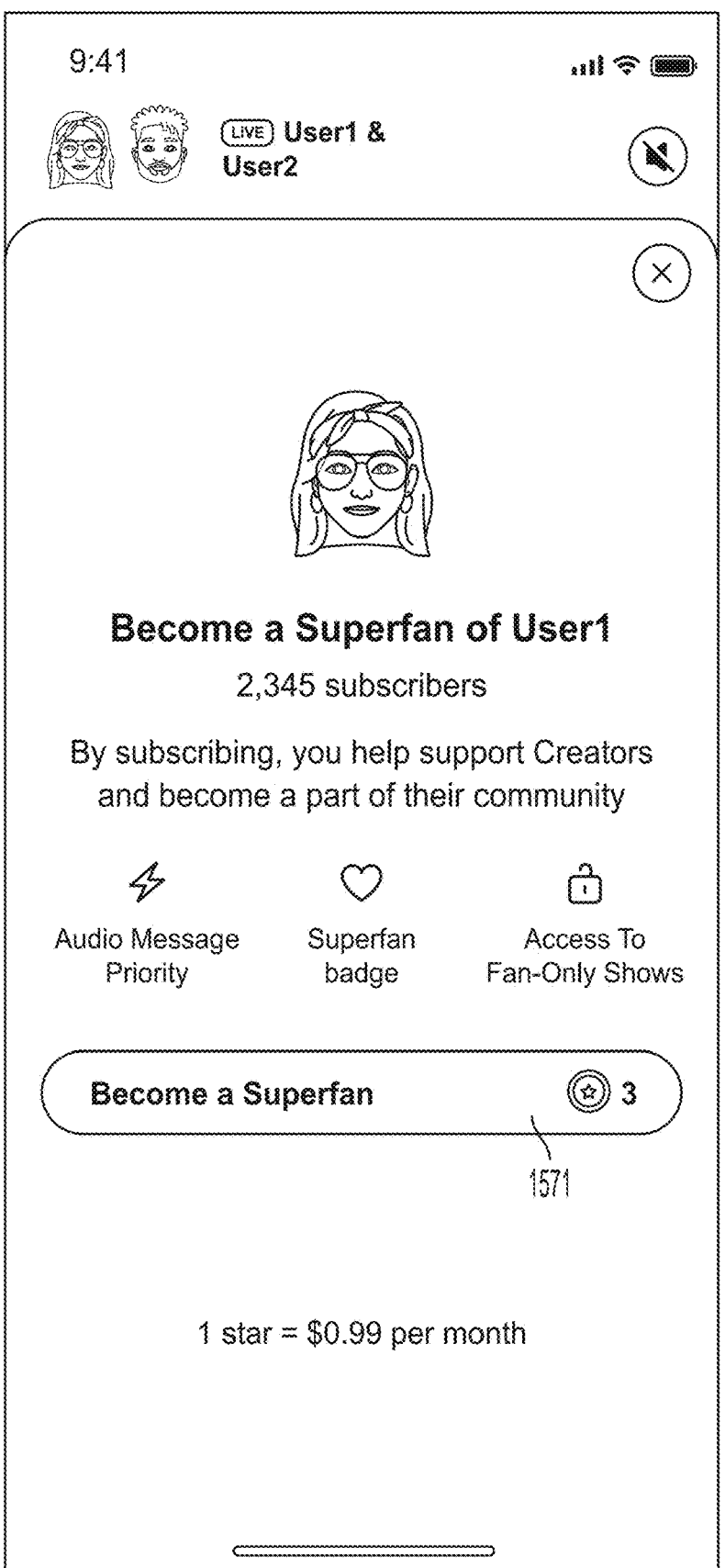

FIG. 157 shows a mobile application user interface that provides the option to become a "Superfan" of that user. Users may navigate to this screen when prompted by the application to become a "Superfan" during an audio conversation involving the user (or otherwise from the user's profile page). In other embodiments, the application may prompt the listener when they try to listen to an audio conversation involving the user, when they try to send an audio message to the user (when the user is a speaker), or in some other circumstance. The page may display the general benefits of becoming a "Superfan," such as having audio message priority, a "Superfan" badge, access to "Fan-Only"

shows (e.g., shows that can only be listened to by superfans), or other benefits. The screen may have an option 1571 to become a "Superfan," which may display the necessary number of "Stars" needed to become a "Superfan." The page may display the "Stars" equivalent value in US$ or in some other currency. A "Star" may be a form of a digital exchangeable as defined in the specification.

Figure 158:
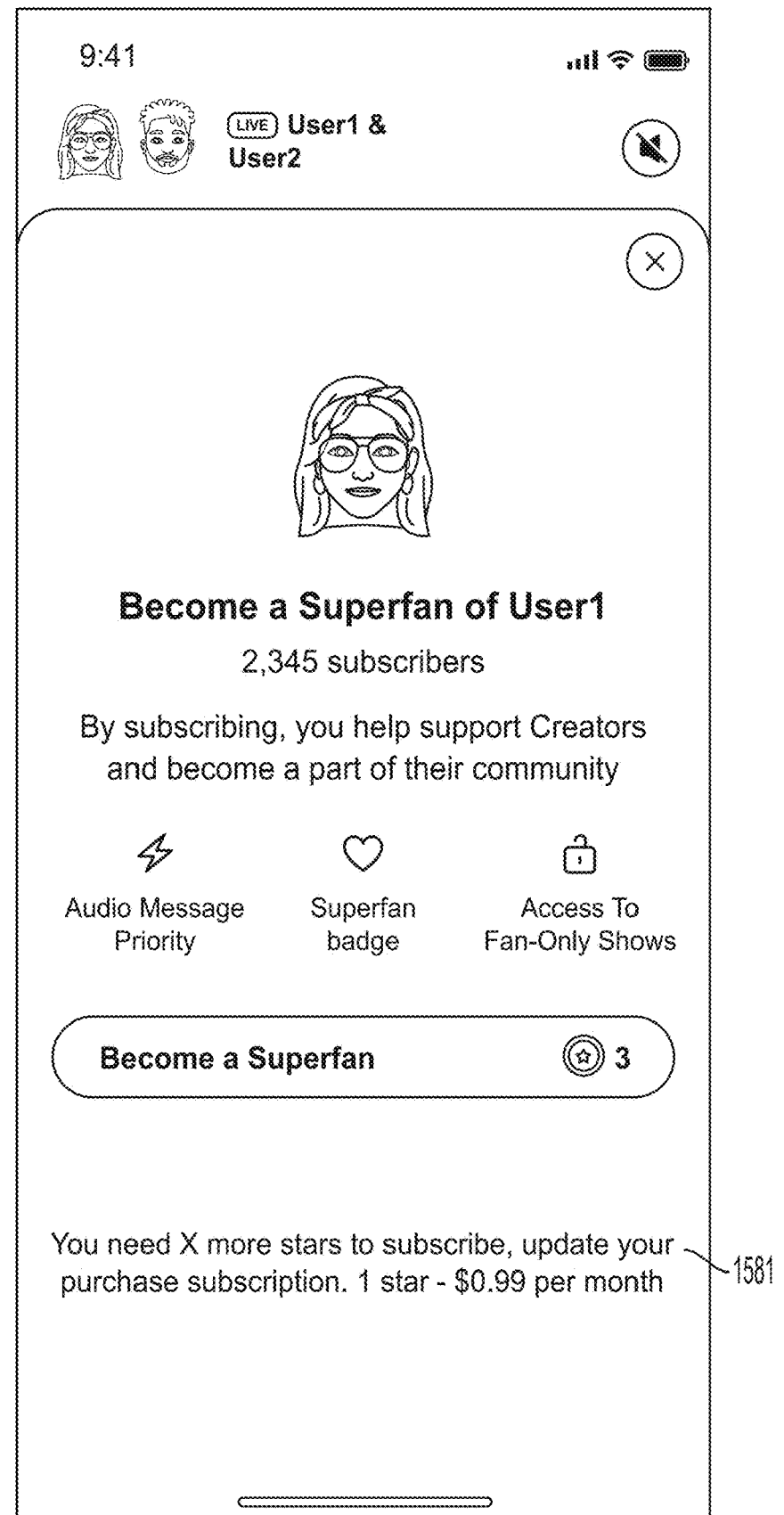
Figure 159:
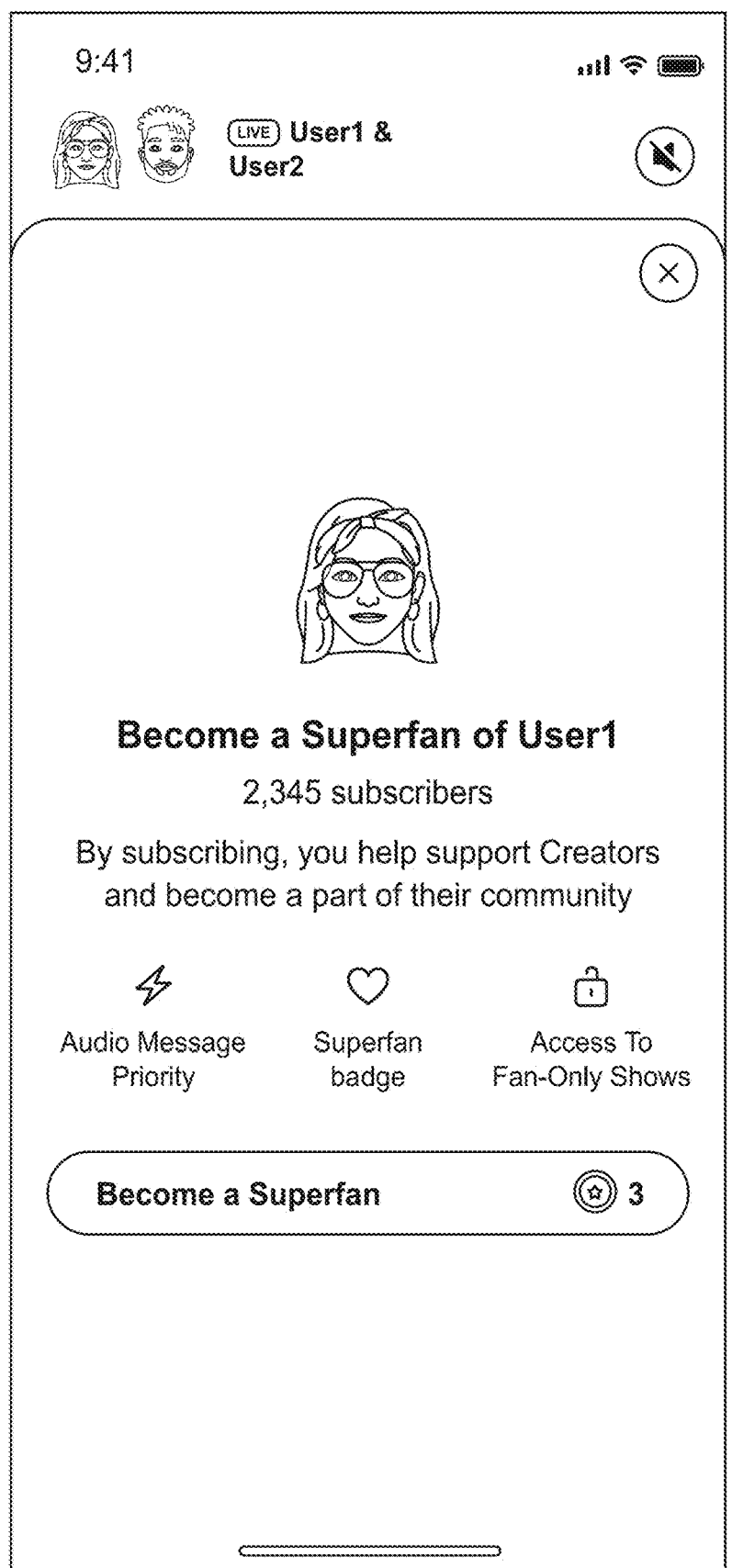

If the user (e.g., the listener user) lacks the necessary number of "Stars" in an account associated with the user, the application may display the number of additional "Stars" needed to subscribe via a message 1581, as seen in FIG. 158. No message dealing with necessary numbers of "Stars" or equivalent "Stars" value may be displayed, instead leaving a blank space, as seen in FIG. 159.

Figure 160:
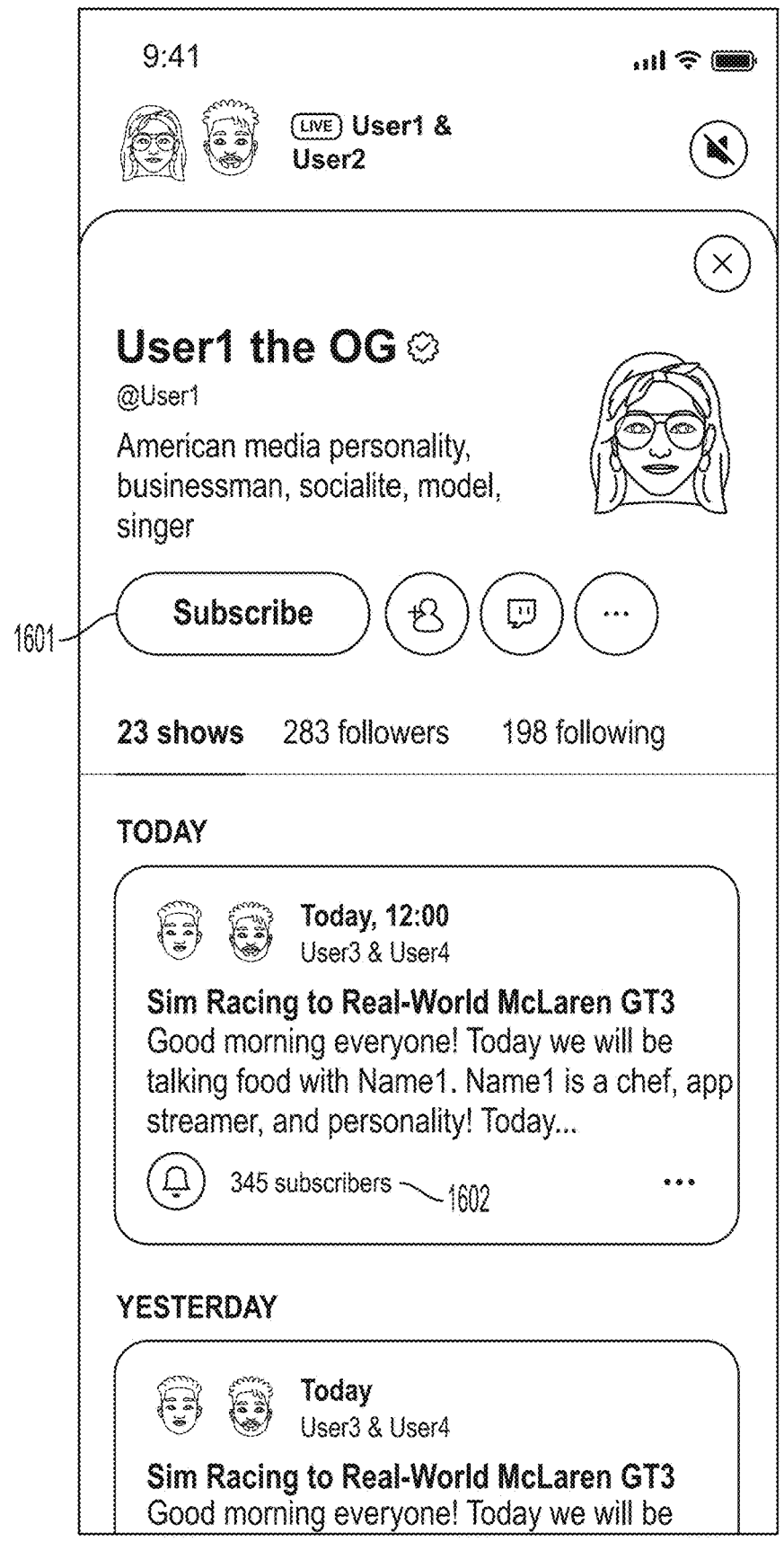
Figure 161:
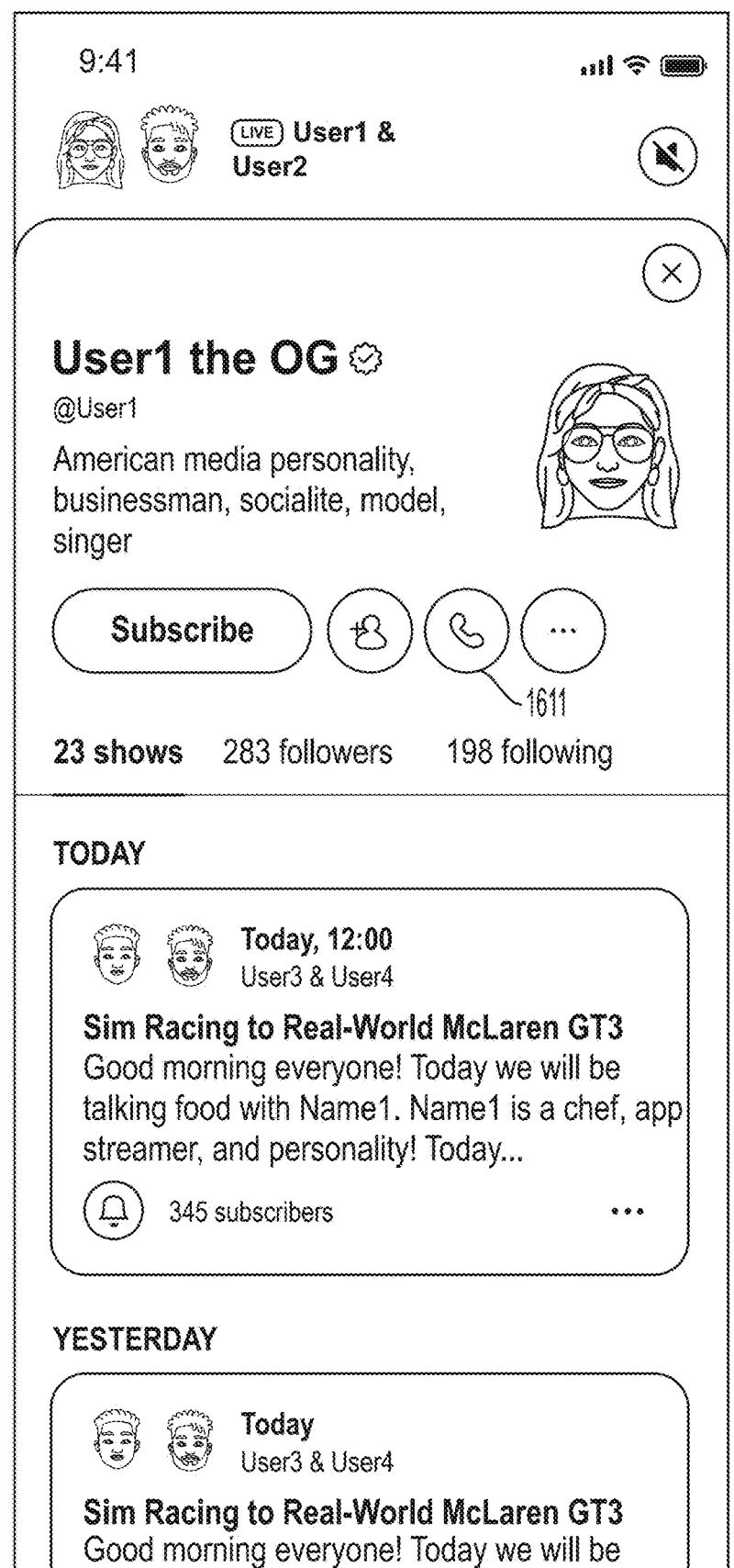
Figure 162:
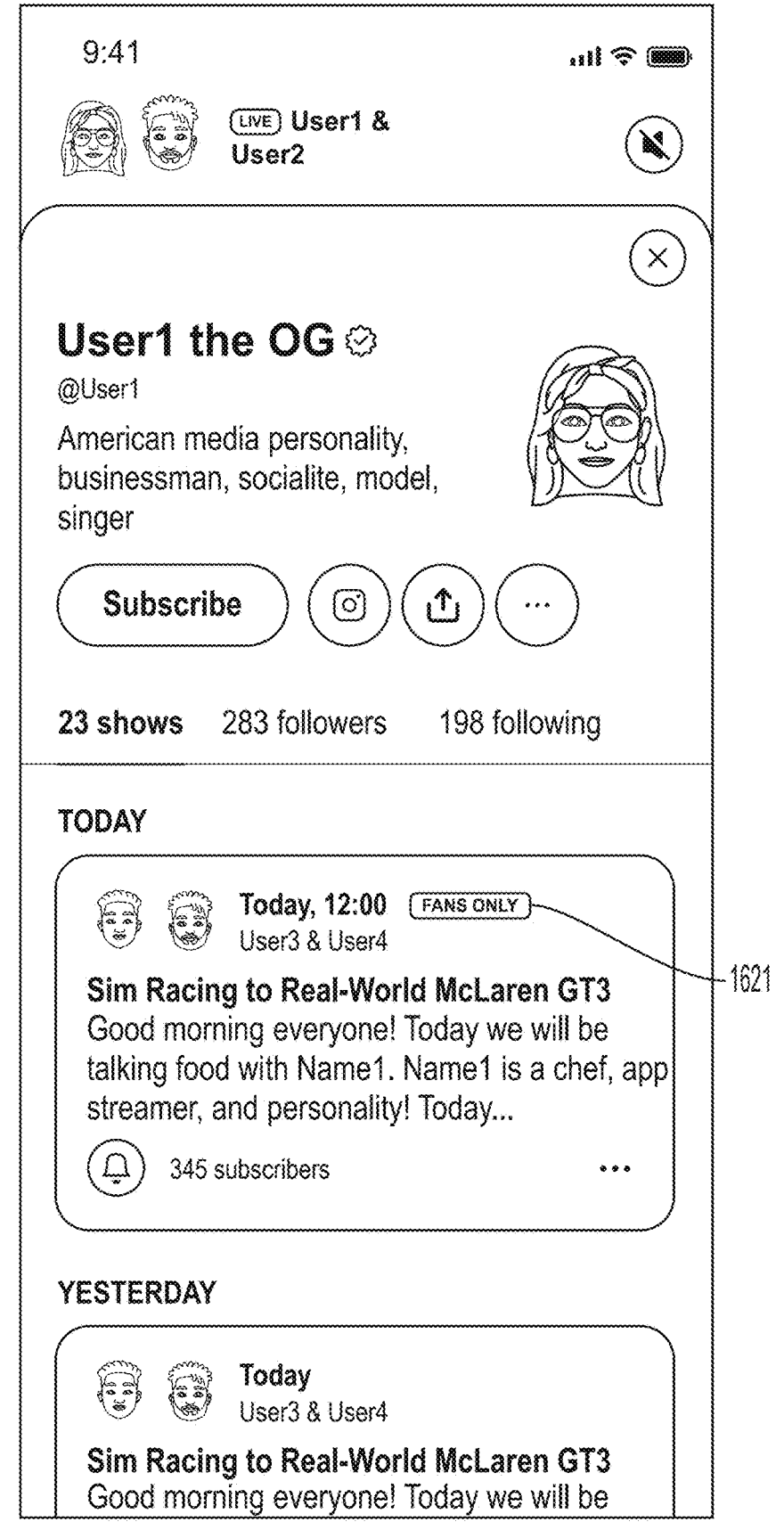
Figure 167:
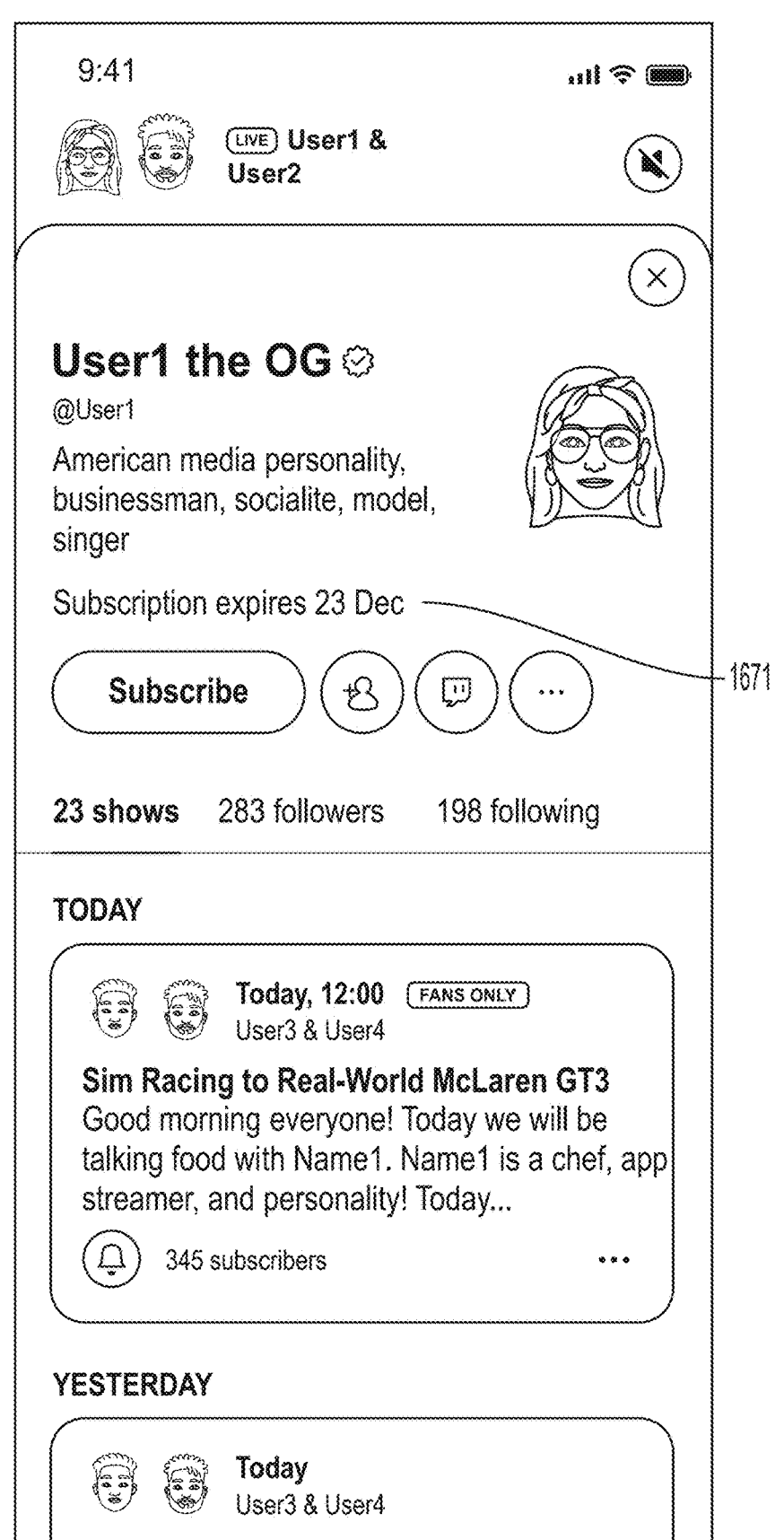

FIG. 160 displays a user's profile page. An option to subscribe to a user may be displayed on the user's profile page. A user may subscribe to another user by selecting the "Subscribe" button 1601. Selecting the "Subscribe" button 1601 may take a user to a page with information about becoming a "Superfan." A user's profile page may display upcoming or past shows, which may display the number of users 1602 subscribed to a show, and/or subscribed to one or both speakers participating in a show. The user profile page may also present an option to initiate an audio conversation (e.g., a private or public audio conversation), by selecting the option 1611, as seen in FIG. 161. Past or upcoming shows may be displayed with a "Fans Only" indicator 1621, if subscribers or "Superfans" are the only users allowed to listen to an audio conversation, as seen in FIG. 162. The profile page (e.g., or a speaker user) may include an indication of when a subscription expires if a user has already subscribed to another user or if a user has yet to subscribe to the other user, as seen in FIG. 167.

Figure 163:
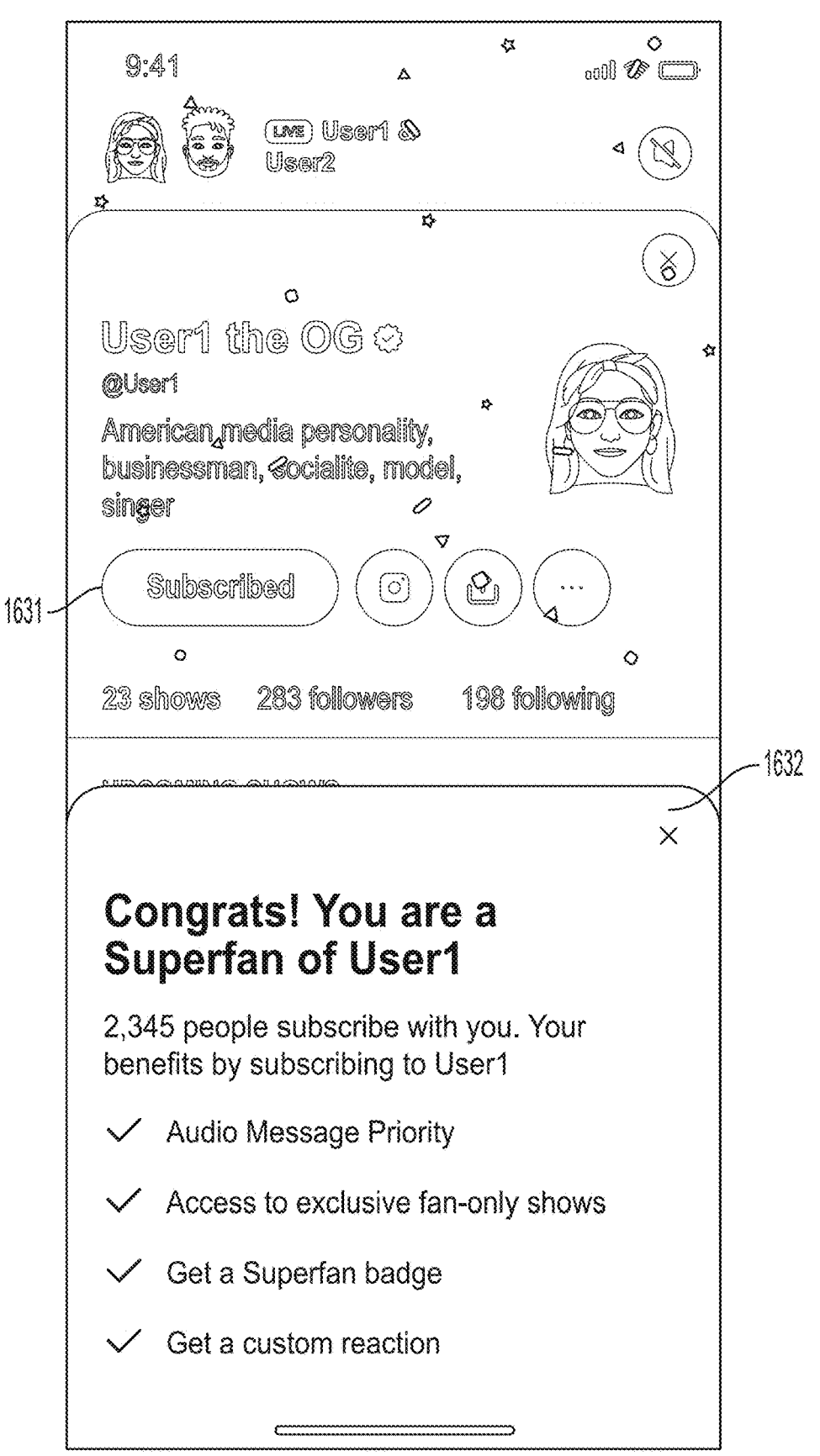
Figure 164:
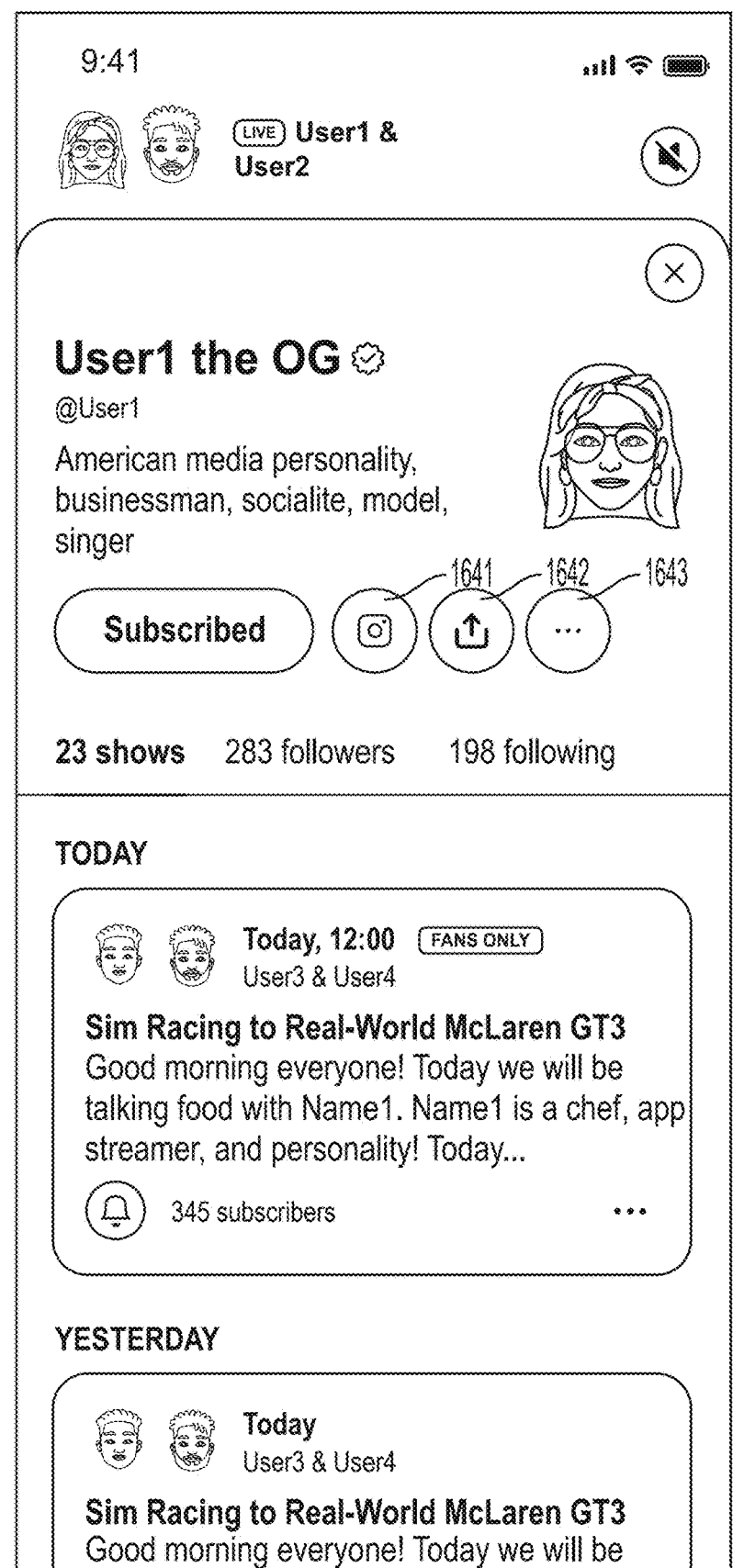

After subscribing or becoming a "Superfan" of a user, the application may display a confirmation message, as seen in FIG. 163. The confirmation message may list out the benefits of being a subscriber or a "Superfan" of a user, including: audio message priority, access to "fan-only" shows, a "Superfan" badge, custom reactions (e.g., visual or audio reactions during audio conversations not available to other listeners who are not subscribers), etc. After subscribing or becoming a "Superfan" of a user, the option 1601 may become greyed out and/or the text on the user's profile may be changed to "Subscribed," as seen in FIG. 164 (or as seen in the background of FIG. 163). In some embodiments, upon subscribing to the user, the "Subscribed" option may be replaced with an "Unsubscribe" option.

Figure 165:
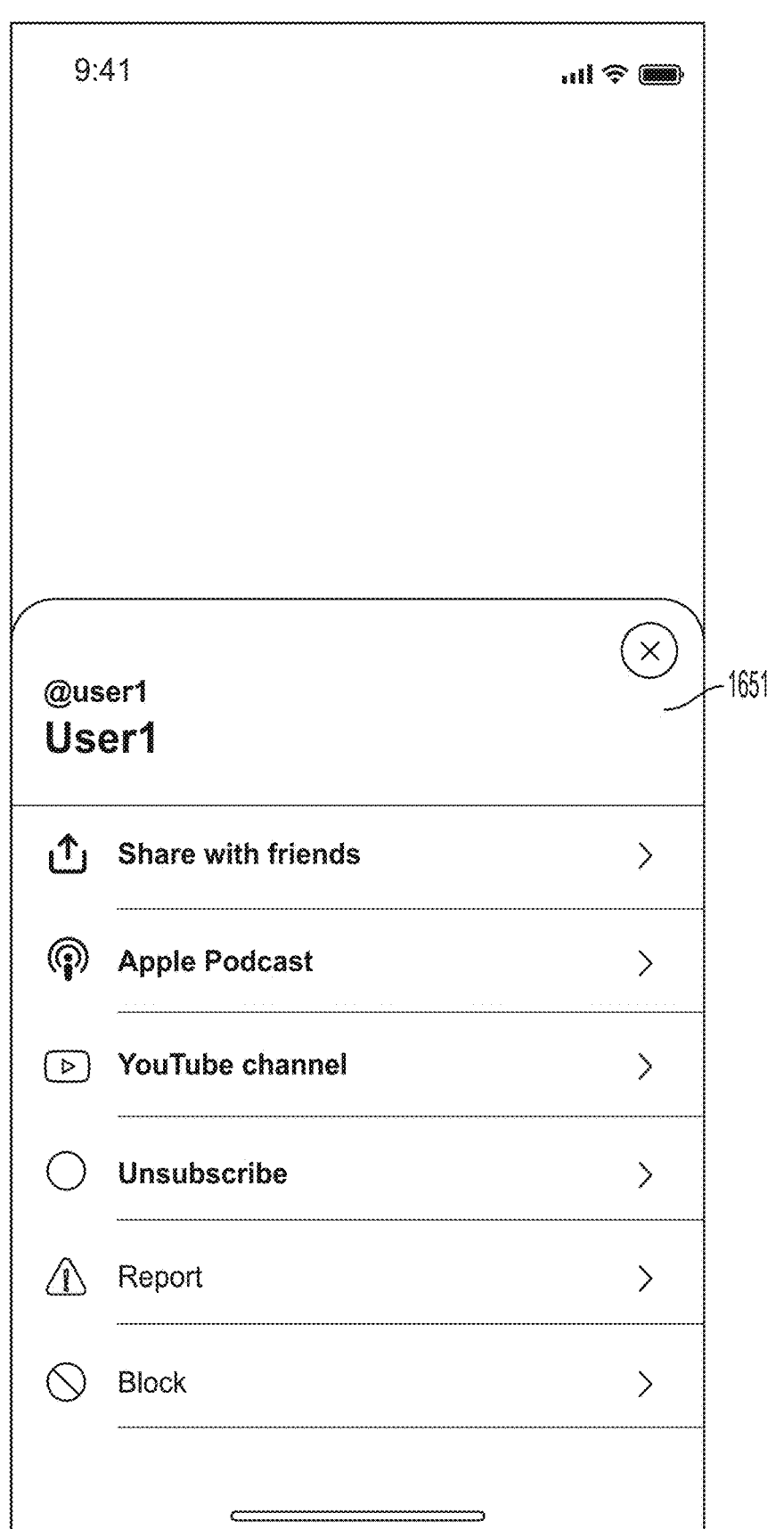
Figure 166:
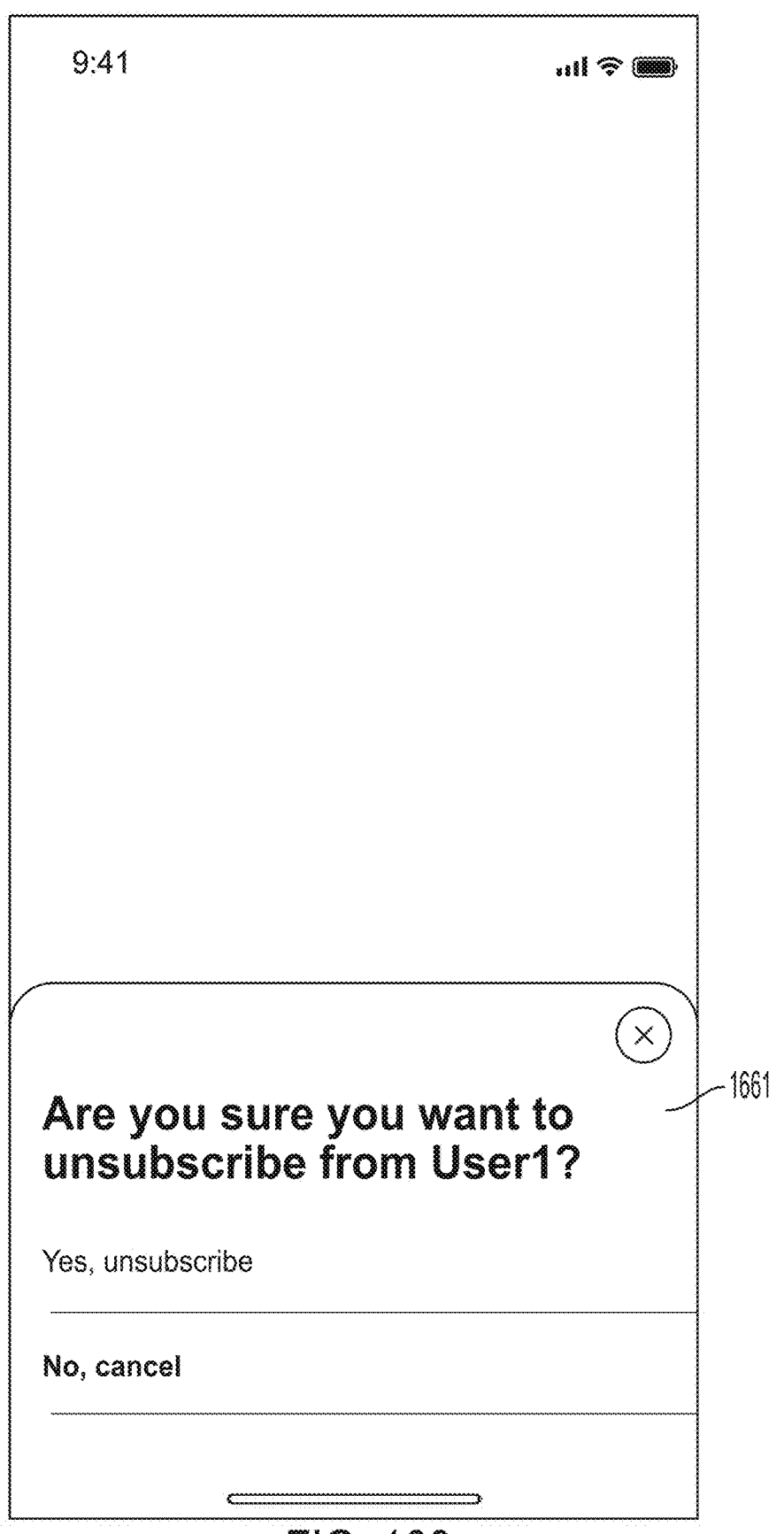

When selecting an option from a user's (e.g., speaker's) profile page, a user may be presented with a list of options relating to that user's profile, as seen in FIG. 165. These options may include: sharing the user's profile (e.g., via a messaging platform), connecting via other social media applications, reporting the user, blocking the user, or unsubscribing from the user if the listener is subscribed to or is a "Superfan" of the user. If the listener selects the unsubscribe option, he or she may be asked to confirm their decision to unsubscribe, as seen in FIG. 166.

Figure 168:
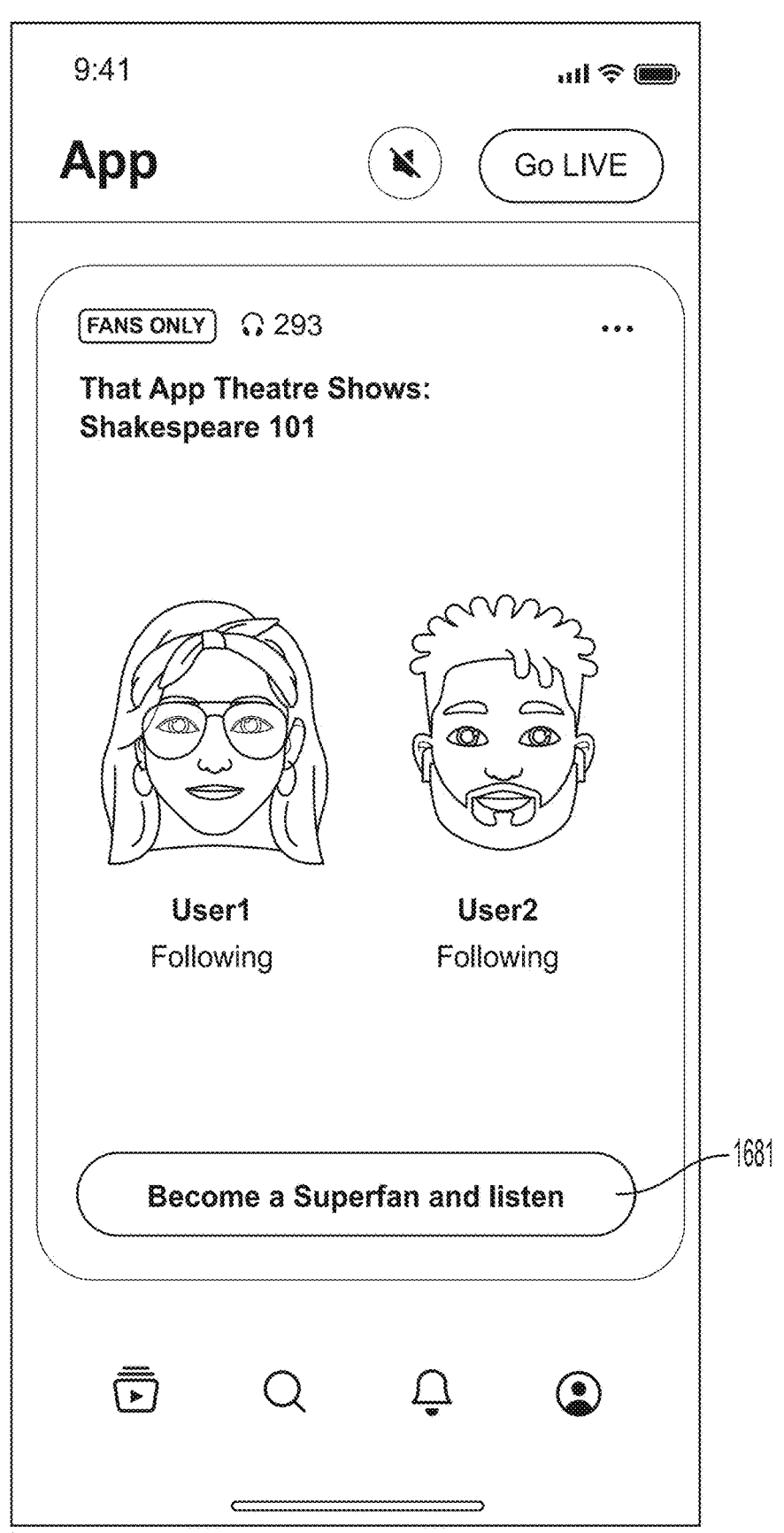

If a listener selects on a live show or recorded show (or if such a show is presented when a user is swiping through a feed of live or recorded shows) that is limited to subscribers or "Superfans," a display of the audio conversation may be presented, as seen in FIG. 168. On such a display, the listener may visually notice that that a conversation is being played however no audio output can be heard by the user. To activate the audio output such that the listener can listen to the audio conversation, the user would have to become a subscriber. The listener may be presented with an option

Figure 169:
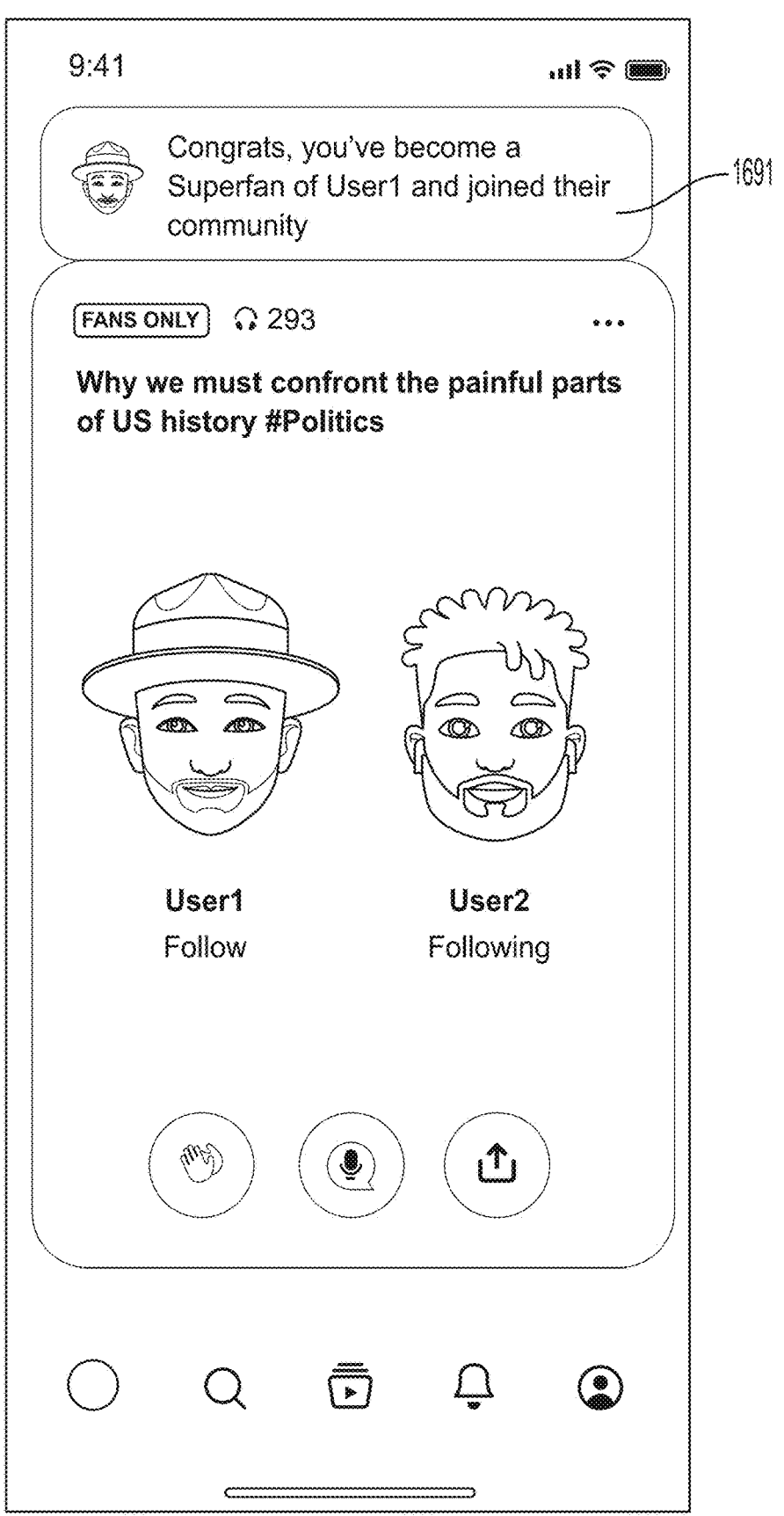

1681 to become a "Superfan," so that he or she may listen to the audio conversation after executing a computing operation to become a Superfan. The audio conversation may have a "FANS ONLY" display near the title of the conversation to indicate that the audio output is available only to Superfans. If a user selects the button 1681 and proceeds with the process of becoming a subscriber or "Superfan," (e.g., by executing a computing operation in which one or more digital exchangeables are transmitted from the listener's account to the speaker's account, the listener may be presented with a confirmation message 1691, stating that they have become a "Superfan," as seen in FIG. 169. The confirmation message may be a temporary pop-up that may or may not cover the underlying display on which the audio conversation participants are presented. In some embodiments, the account holding or managing the exchangeables may be managed outside the mobile application or by the mobile application. The terms Superfan, fan, subscriber may be interchangeably in some embodiments. As used herein, a talk, show, or audio conversation may include one, two, or more two speakers.

Figure 170:
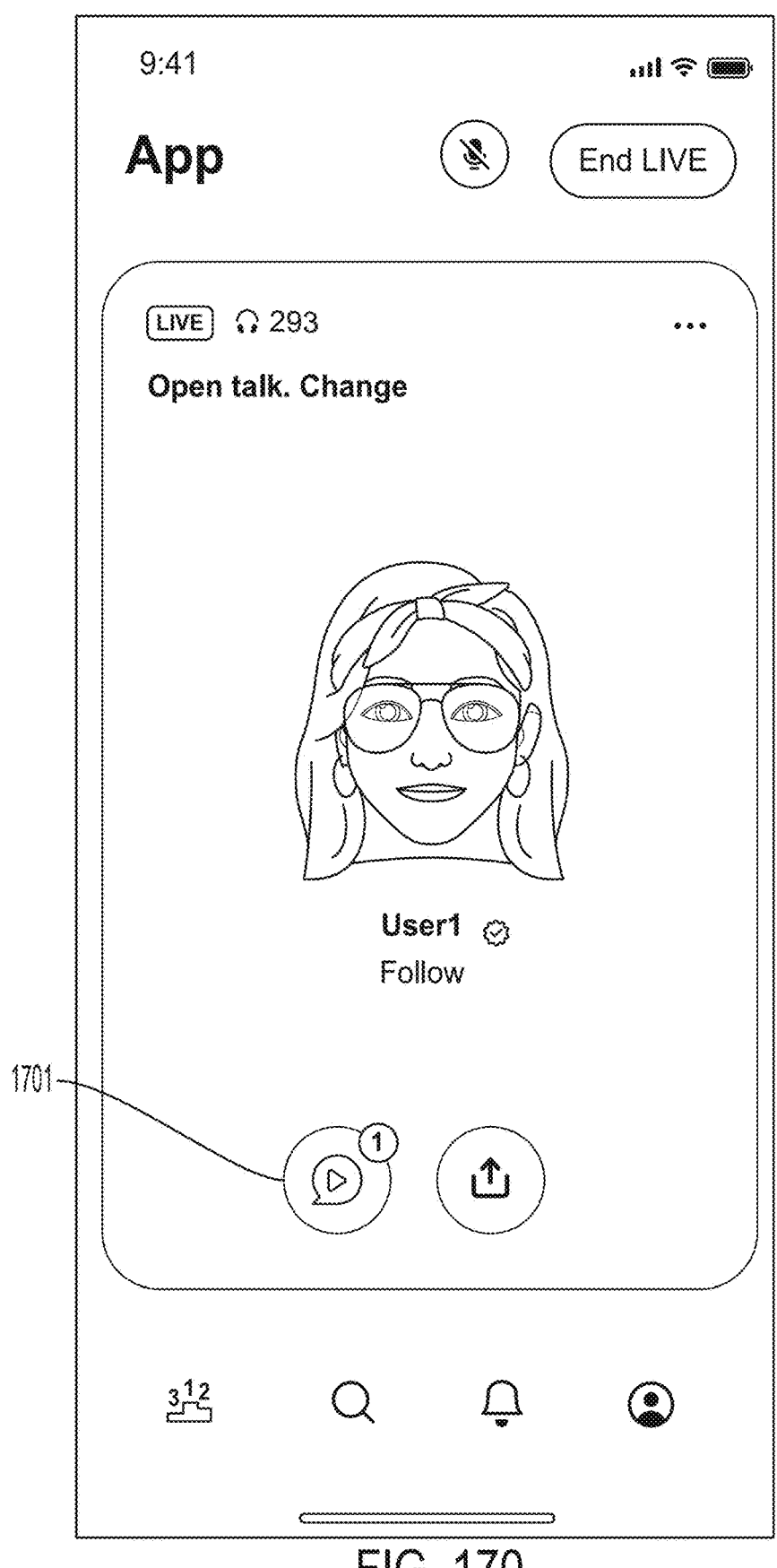
Figure 171:
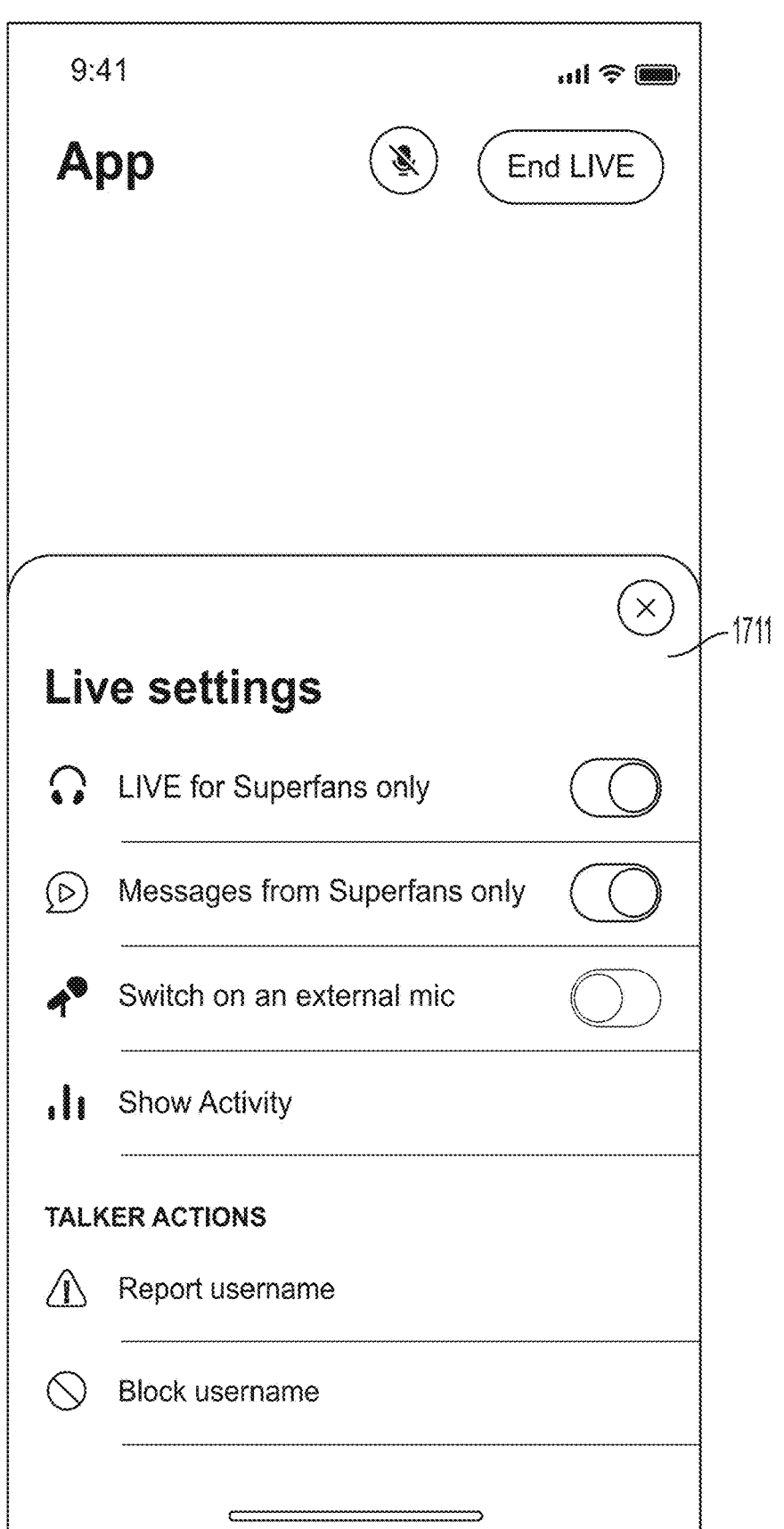
Figure 172:
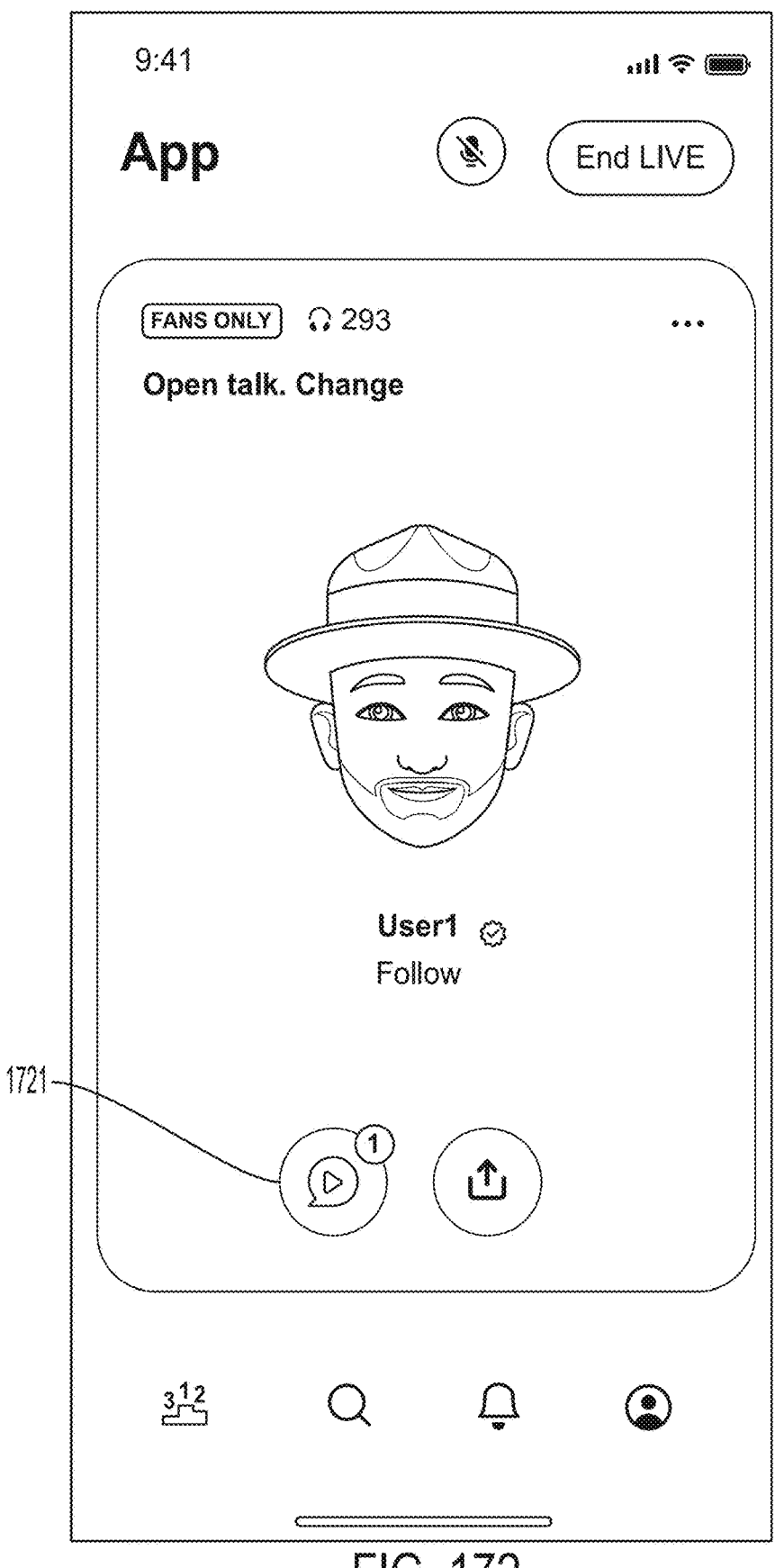
Figure 173:
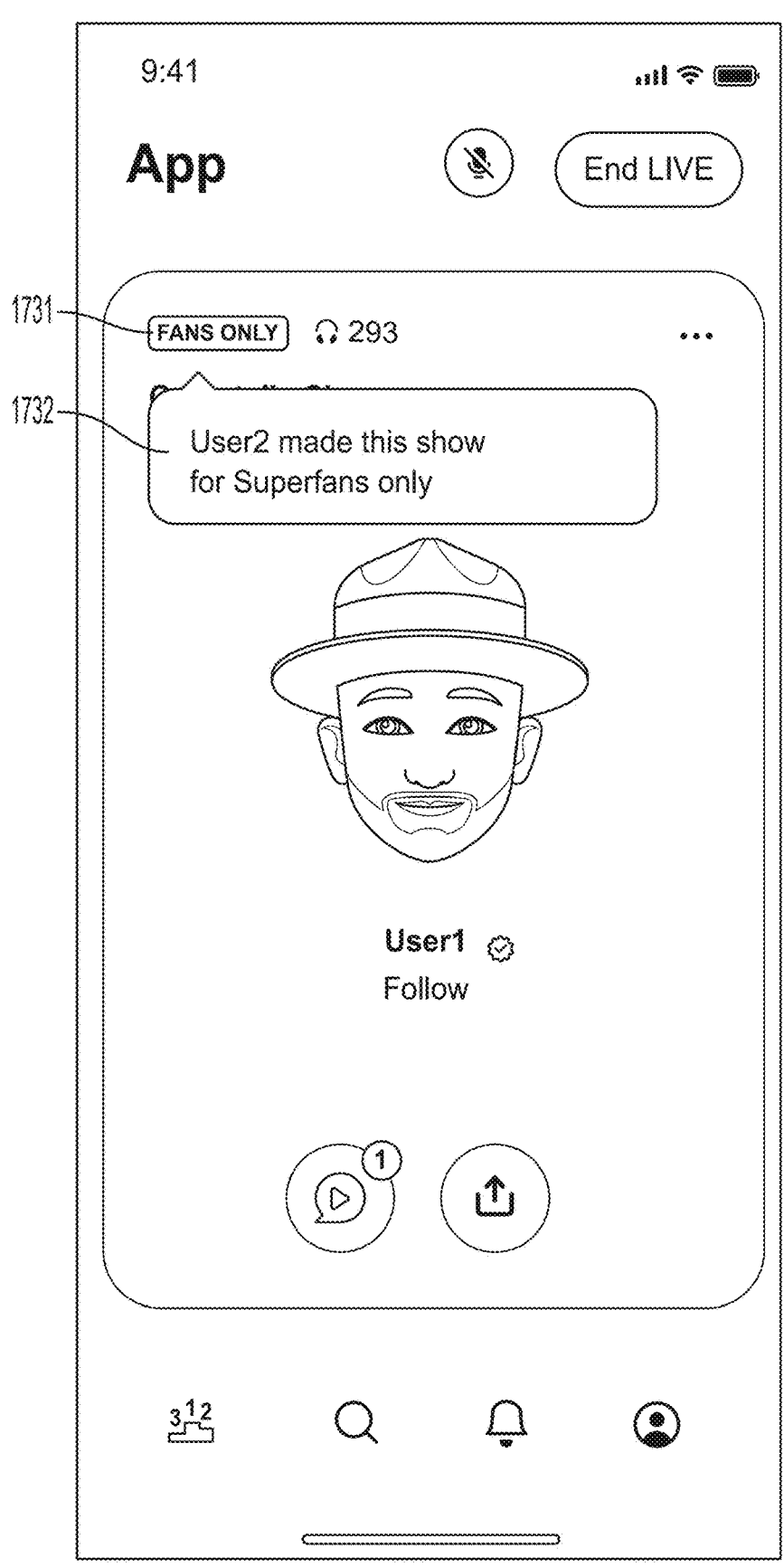
Figure 174:
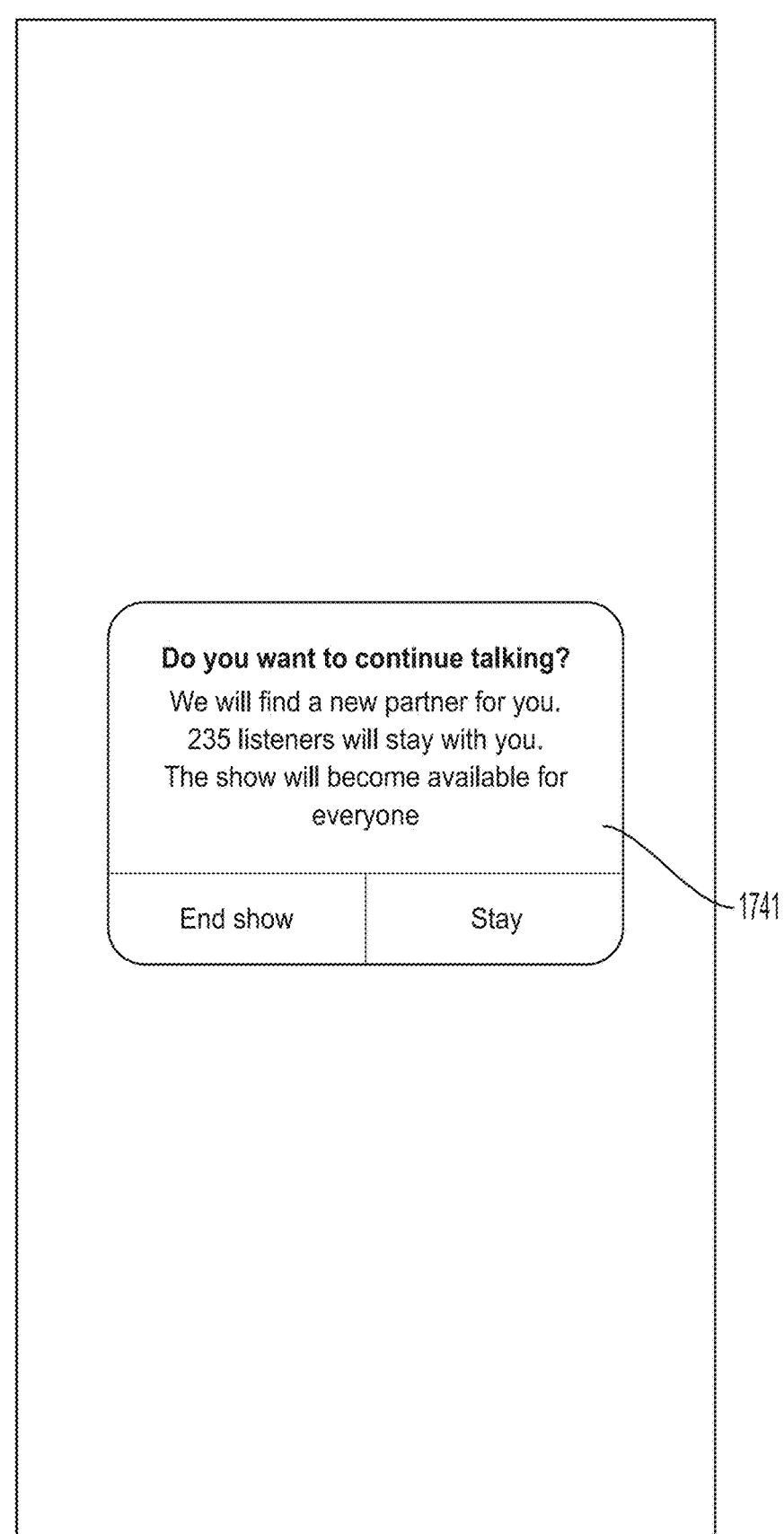

In FIG. 170 and FIG. 172, a speaking mode (conversation mode) display is shown. The display has a "Live" tag. The "User1" is the speaker talking to the user associated with the mobile device showing the display of FIG. 170. The speaker may select an option 1701, 1721 that allows the speaker to play (e.g., play a next audio message on an audio message queue) or view audio messages (e.g., view audio messages comprised in the list or queue of audio messages). The option 1701, 1721 may have a smaller symbol adjacent to it that displays the number of pending audio messages (i.e., yet to be played) in the audio message queue. If a speaker selects a settings option associated with a live or future audio or previously recorded audio conversation, the application may display a Live settings menu, as seen in FIG. 171. The Live settings menu may display options to make a Live broadcast available only to "Superfans," make it so only "Superfans" can send audio messages to the speaker (can be opened or played by a particular speaker in a conversation) or to the conversation (e.g., can be opened by either speaker), switch on an external microphone, or show activity (e.g., associated with a listener, speaker, audio conversation (e.g., how many listeners are listening right now, how many total listeners listened to the audio conversations, peak listener count during audio conversation, audio message information including identity of listeners who sent the audio messages, how many audio messages have been received during the audio conversation, duration of audio messages, statistics associated with any of the data described herein, etc.). When broadcasting a show, if the speaker makes the broadcast for "Superfans" only, then the mobile application may display a popup message 1732, stating the show has been made to allow "Superfans" only, as indicated in FIG. 173. The application may also add a "Fans Only" indicator 1731 to the display, as indicated in FIG. 173. If a speaker is no longer able to participate in an audio broadcast because another speaker has disconnected, then the application may present a message 1741 that asks if the user if he or she wants to stay in conversation mode, as shown in FIG. 174. This message 1741, may give a user the option to stay in their current mode or to end their show, presented by two different buttons. The message notes that the listeners who were present prior to the other speaker disconnecting will not have to reconnect to the show. In some embodiments, the speaker may be presented with an option to continue the show in solo mode.

Figure 175:
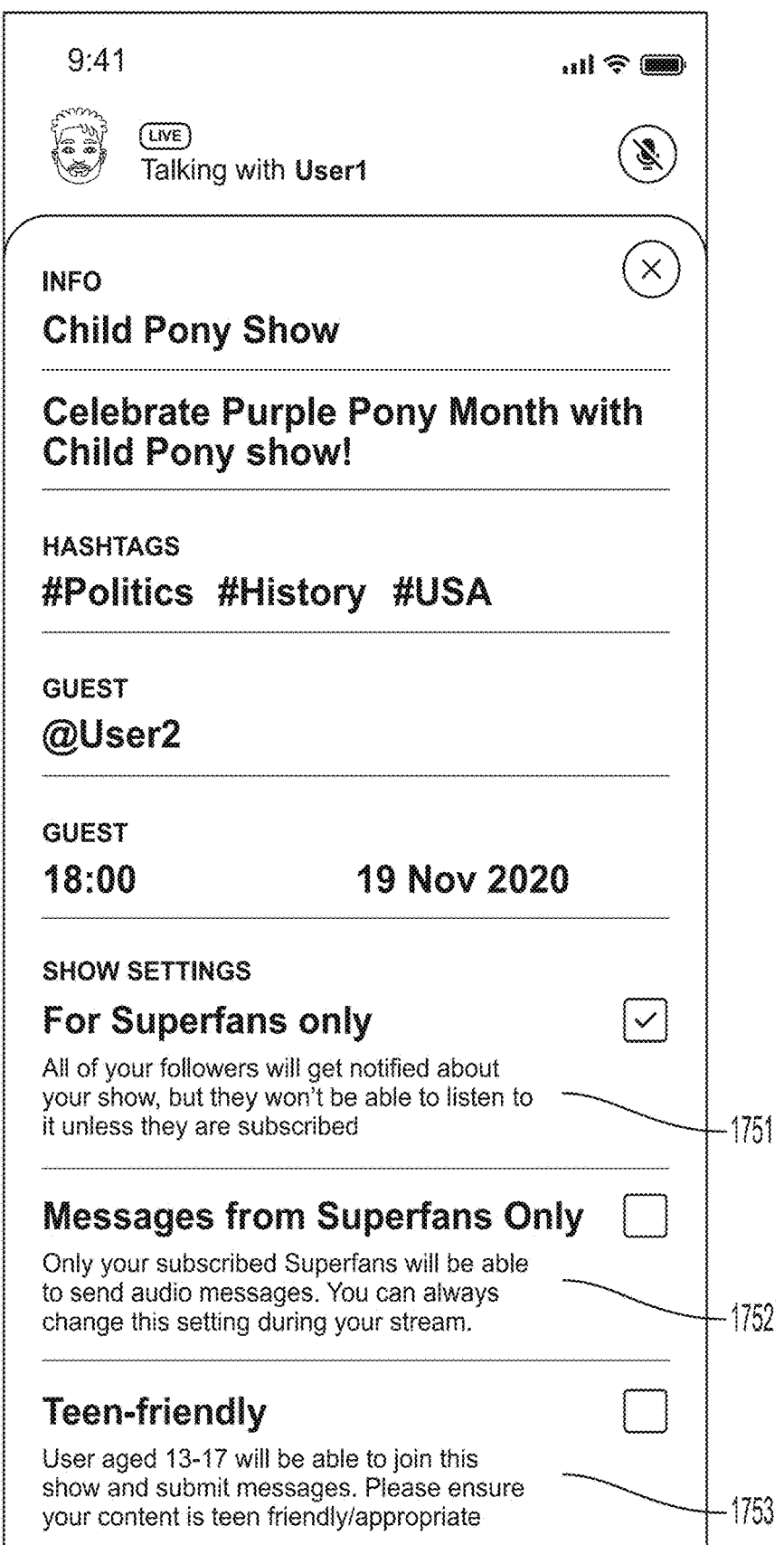

FIG. 175 shows an application screen that presents the settings for a scheduled show or audio conversation. A speaker may access the settings when scheduling a show or audio conversation. In some embodiments, the scheduled show may be a previously recorded show that is being scheduled to play at a future time. The settings on this page include an option 1751 to make a show or audio conversation accessible by "Superfans" or subscribers only, an option 1752 to allow only "Superfans" or subscribers to send audio messages during the show or audio conversation to the speaker, and an option 1753 to make a show or audio conversation accessible to teenage users. All of these options may be toggled on and off and may display check marks when selected by the speaker. Additionally, the speaker may input the names or usernames of listeners (or speakers) to be invited to the show, the time of the show, descriptive indicators (e.g., hashtags) associated with the show, and the name of or other information associated with the show. In some embodiments, the same settings may be accessed for a live conversation such that the speaker can access the options for a live conversation.

Figure 176:
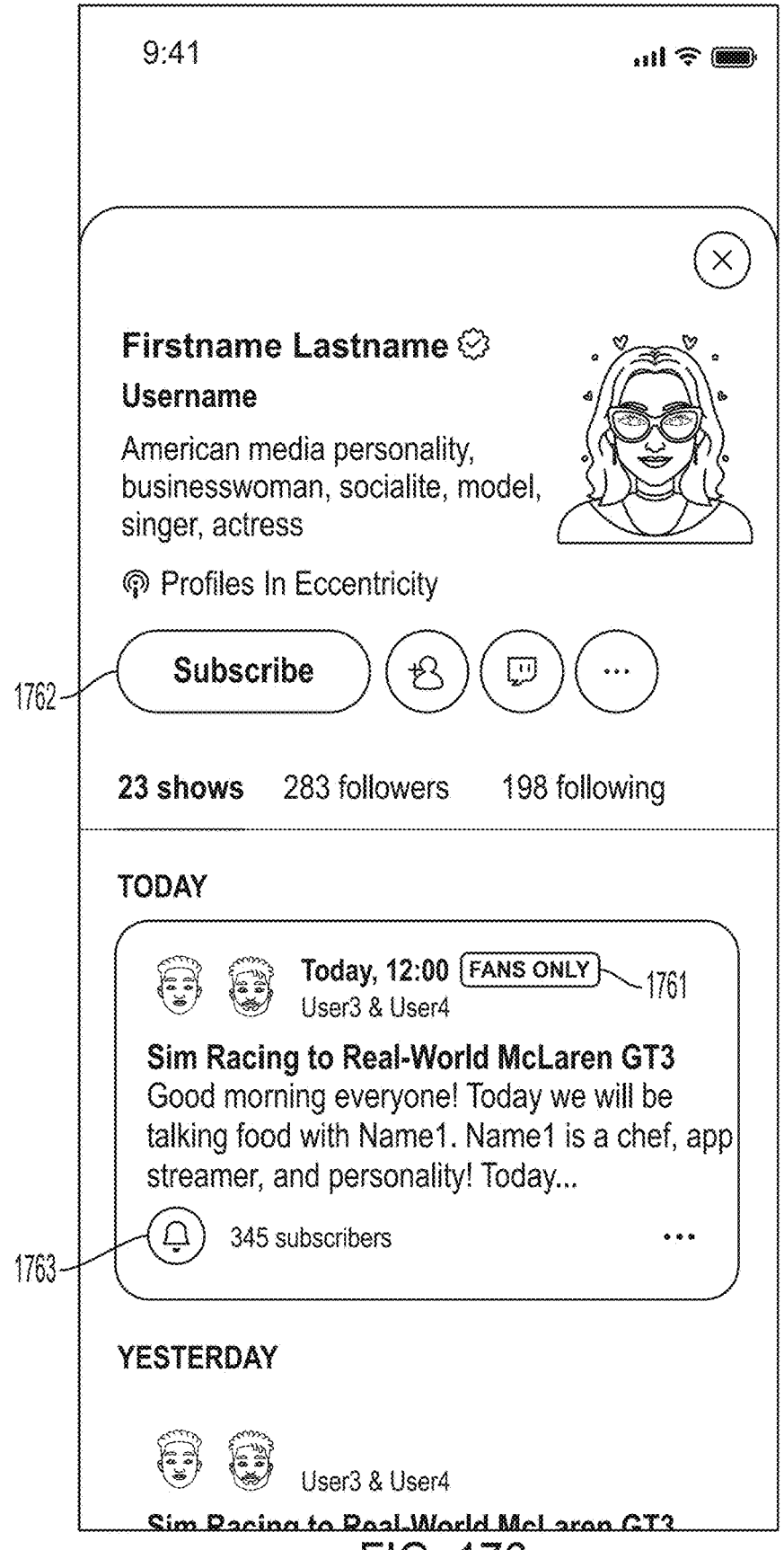
Figure 177:
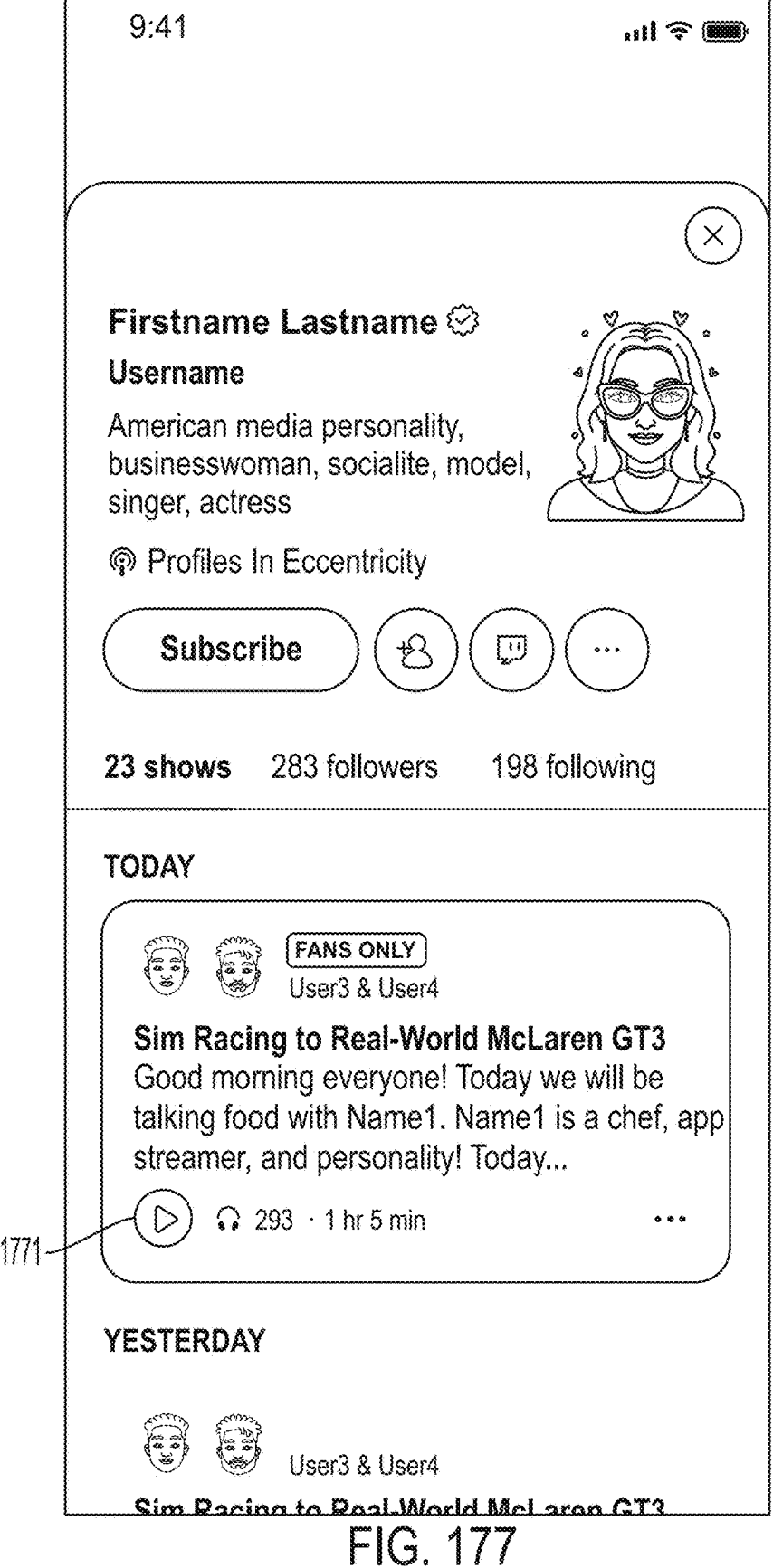
Figure 178:
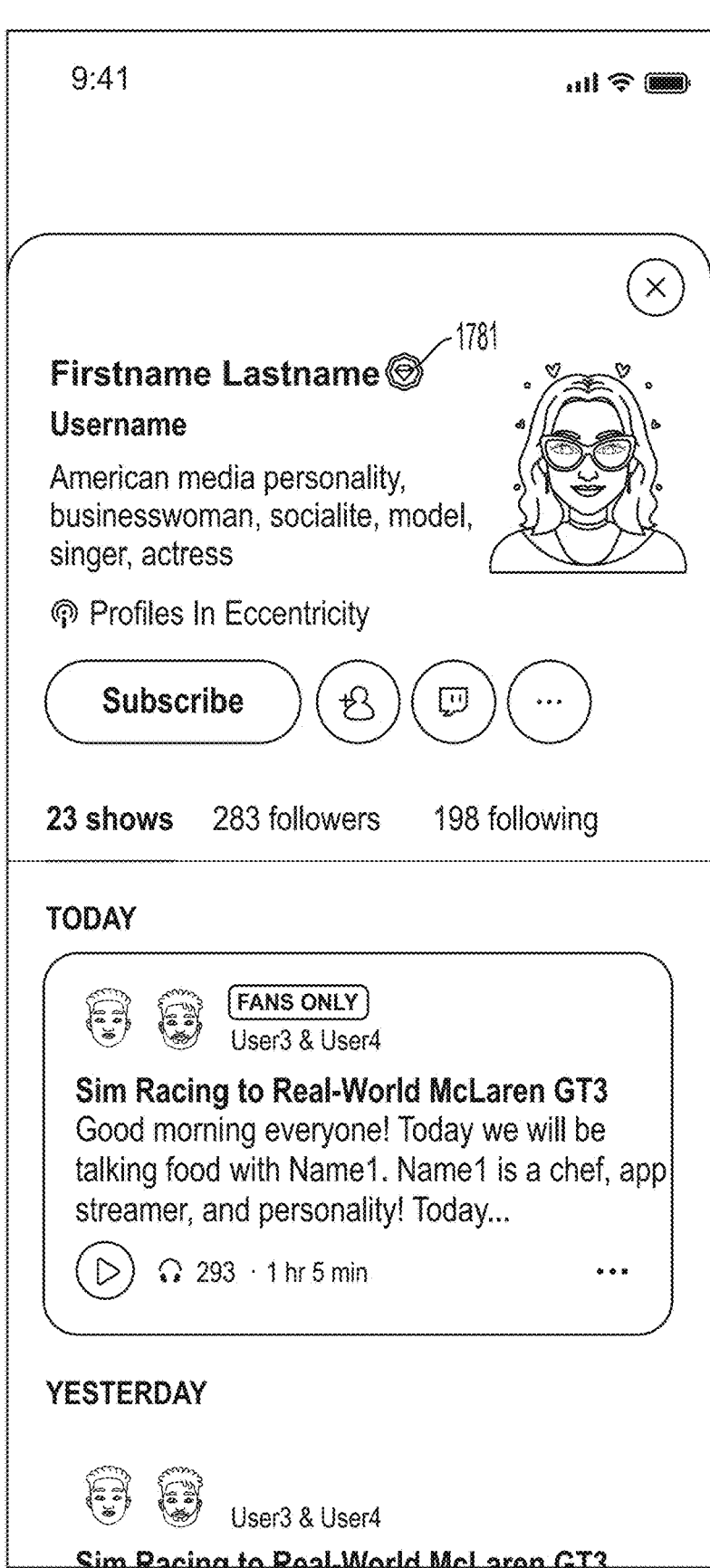
Figure 180:
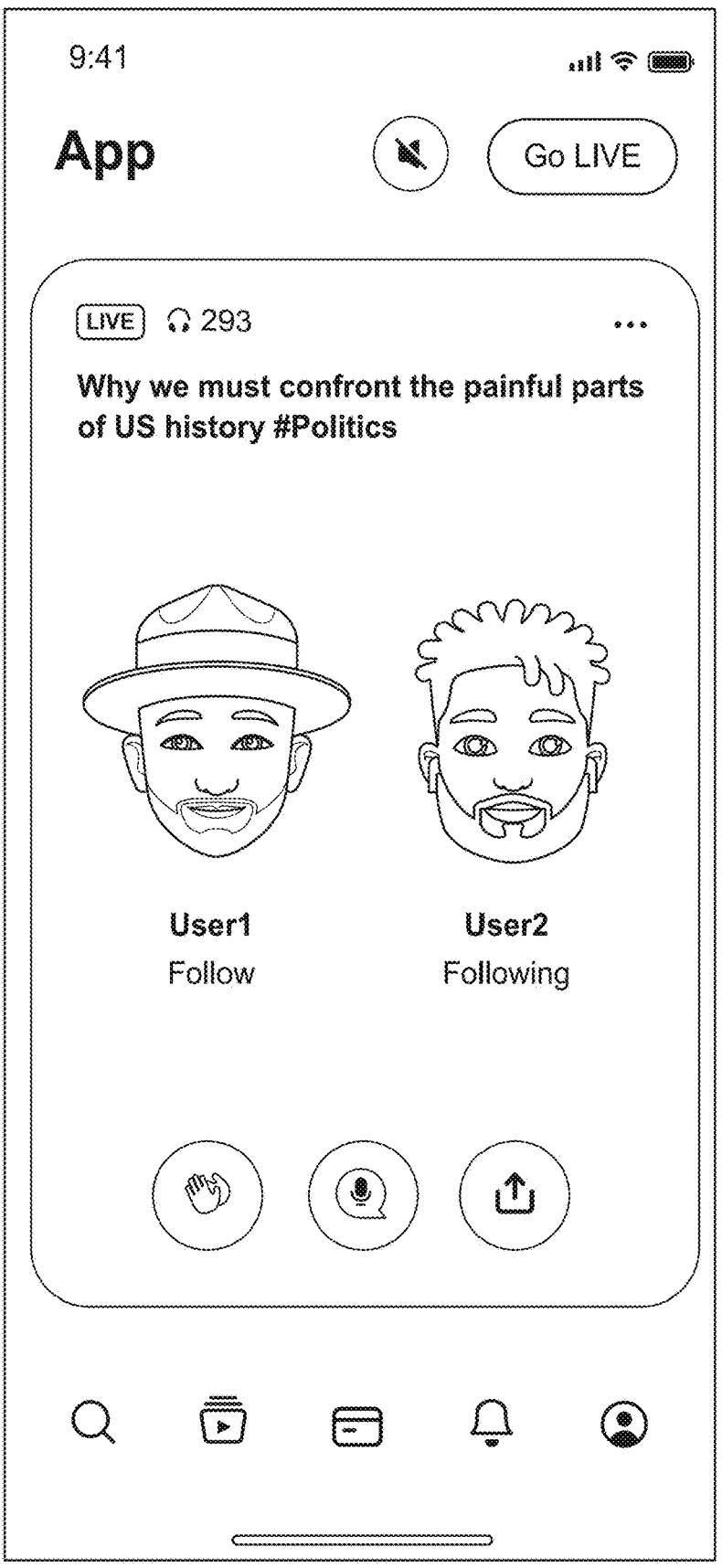

FIG. 176 shows a user's profile page, which may have an option 1762 allowing other users (e.g., listeners or speakers) to subscribe to, or become a "Superfan" of, that user. The profile page may also show upcoming shows or audio conversations. Upcoming shows or audio conversations may have a tag or label 1761 that shows the show's or audio conversation's status as "FANS ONLY." The show or audio conversation may also have an option 1763 that will create a notification (e.g., for subscribers or superfans, followers, etc.) so that they may be alerted to the show or audio conversation when it begins in the future (or prior to when the audio conversation begins). FIG. 177 shows an option to play a show 1771 that is available to subscribers. This may be a previously recorded show that is available to subscribers (and not to listeners who are not subscribers). The profile page might also display a badge or icon 1781, 1791 next to a user's username, to display different statuses in relation to the user, as seen on FIG. 178 and FIG. 179. FIG. 180 shows a live audio conversation between User1 and User2.

Figure 181:
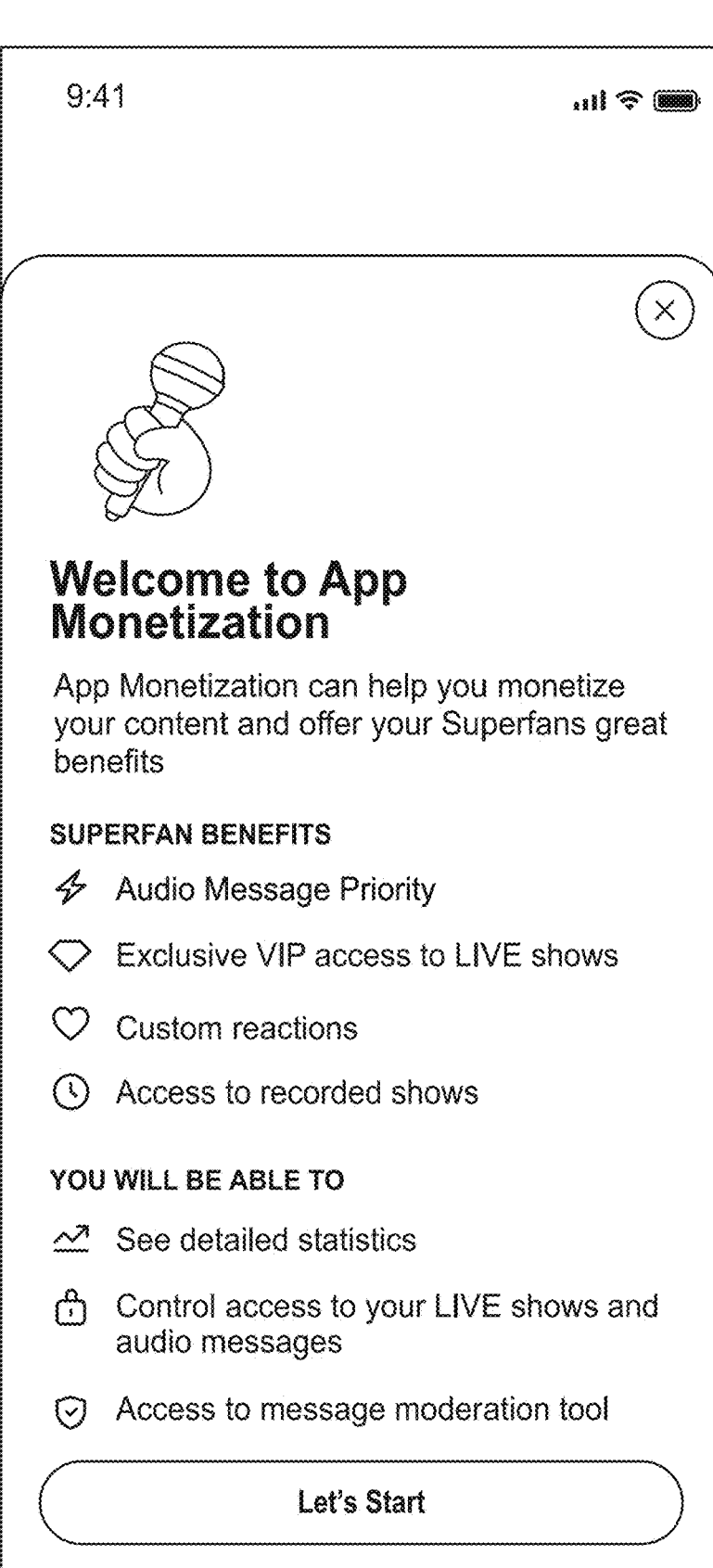

FIG. 181 is a display that the application may present to a speaker to present information on monetization. This may be navigated to from multiple screens within the application, including mid audio conversation such as in FIG. 180. The "Application Monetization" screen may present the benefits of obtaining "Superfans" who subscribe to the speaker, and tells the speaker the possible actions that they will gain through the "Application Monetization" process, such as: detailed statistics associated with shows and/or audio messages, controlling access to shows and audio messaging (e.g., defining who can listen to shows and send audio messages (e.g., shows and/or audio messages may be limited to subscribers, followers, following users, users associated with certain attributes (e.g., talking or listening minutes, number of followers, age, descriptive indicators associated with user, etc.), and access to an audio message moderation tool (e.g., the tool may enable automatic filtering of audio messages that are insensitive, insulting, rude, or contain inflammatory material or bad or negative language, or may enable filtering of audio messages based on an attribute associated with the audio message sender, including any attributes described in this disclosure). The screen may present an option for the speaker to begin the "Application Monetization" process.

Figure 183:
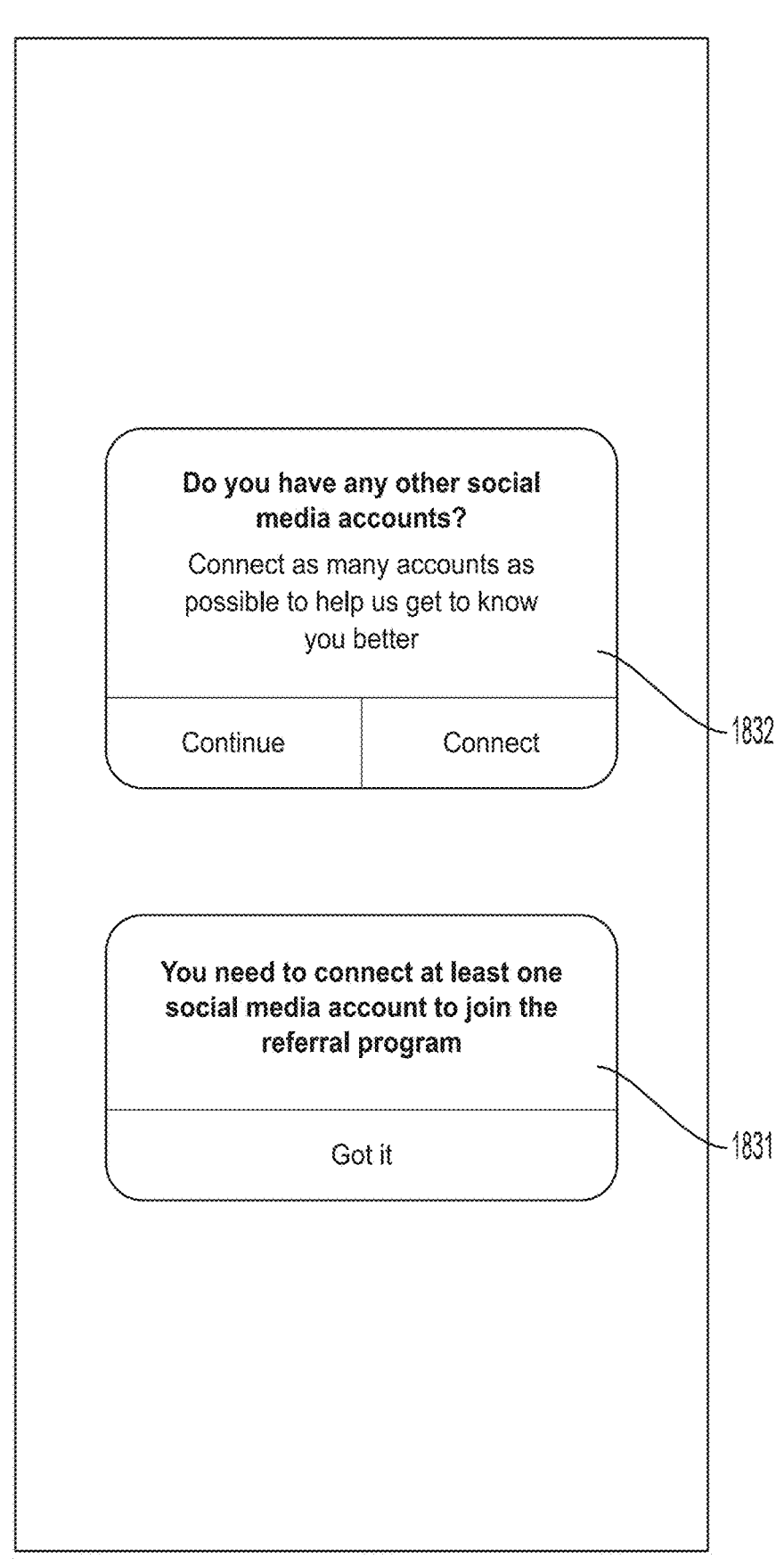
Figure 184:
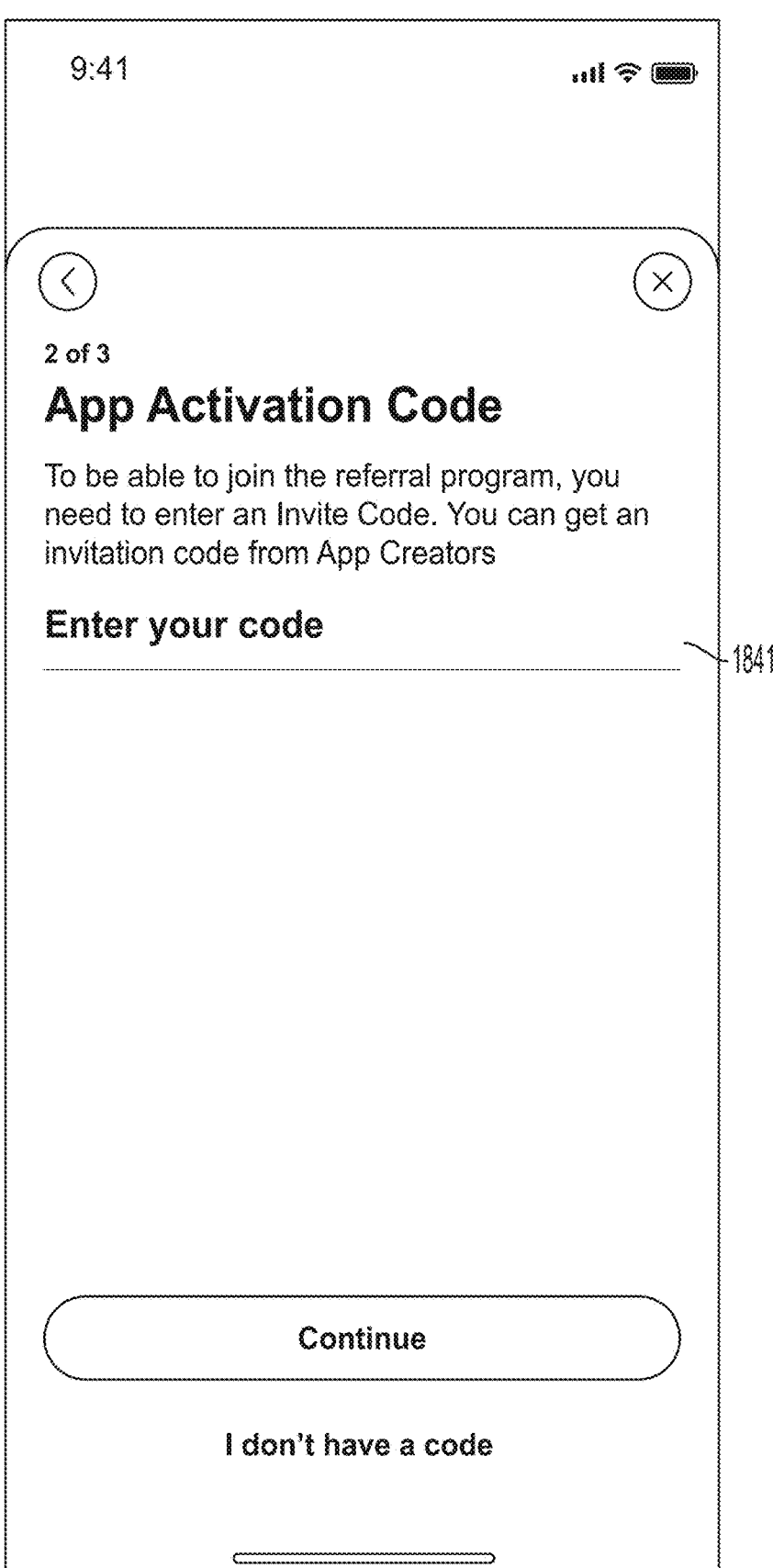
Figure 185:
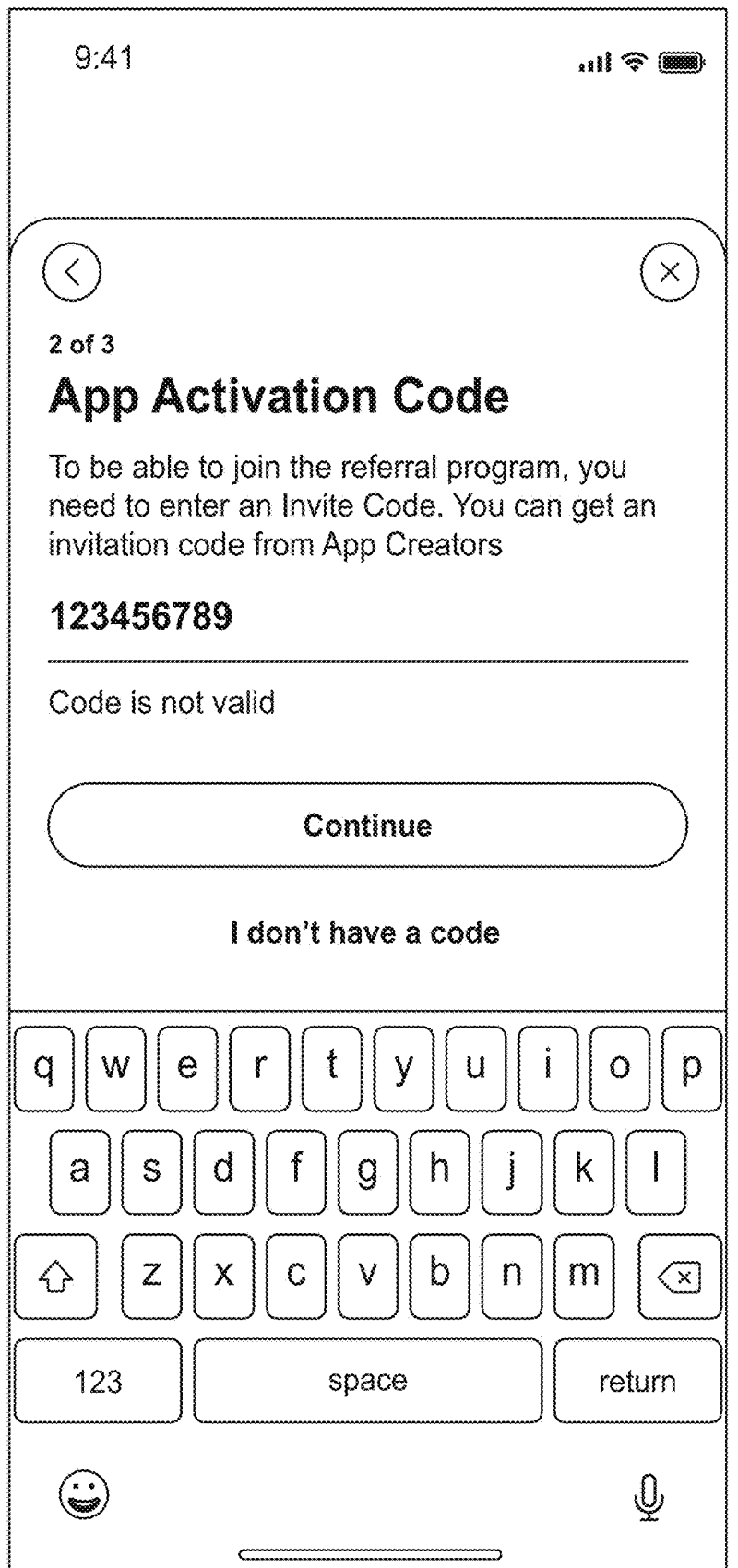
Figure 189:
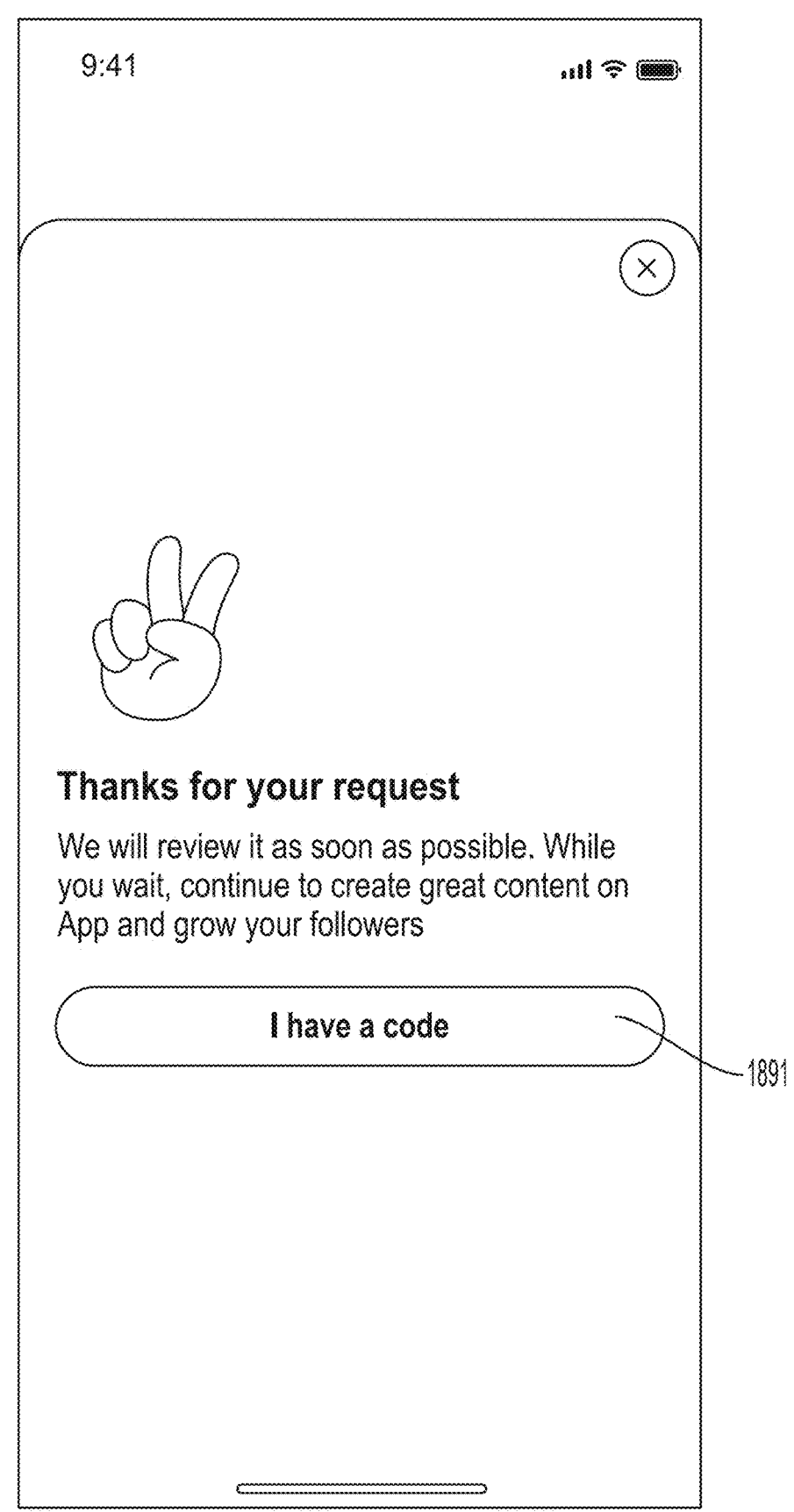

Once a speaker begins the "Application Monetization" process, they may be brought to a screen such as FIG. 182, which presents the speaker with the option to connect different social media accounts with the speaker's account on the mobile application. After selecting the applicable social media accounts, the speaker may be brought to another screen like FIG. 183, which may ask if there are any other social media accounts he or she might have. This screen may redirect them back to a screen like FIG. 182. The speaker may also be brought to a screen with a message 1831 that tells them he or she needs to connect at least one social media account (if he or she did not enter any social media accounts on the screen of FIG. 182). After receiving the inputted social media accounts from the speaker, the application may bring the speaker to a screen like FIG. 184, which may ask the speaker to enter an activation code. The speaker may be prompted to enter a code into a field 1841. Selecting the field 1841 may pull up the speaker's keypad like in FIG. 185. Selecting that the speaker does not have a code (e.g., on FIG. 185) may bring up a screen like FIG. 189, which thanks the speaker for their request. This screen may allow the speaker to go back to the code entry screen by selecting a button 1891. The speaker may need to enter an activation code to progress or to join the "Application Monetization" process. The screen may present options to continue after entering a code, or to denote that a speaker does not have a code.

Figure 186:
Figure 187:
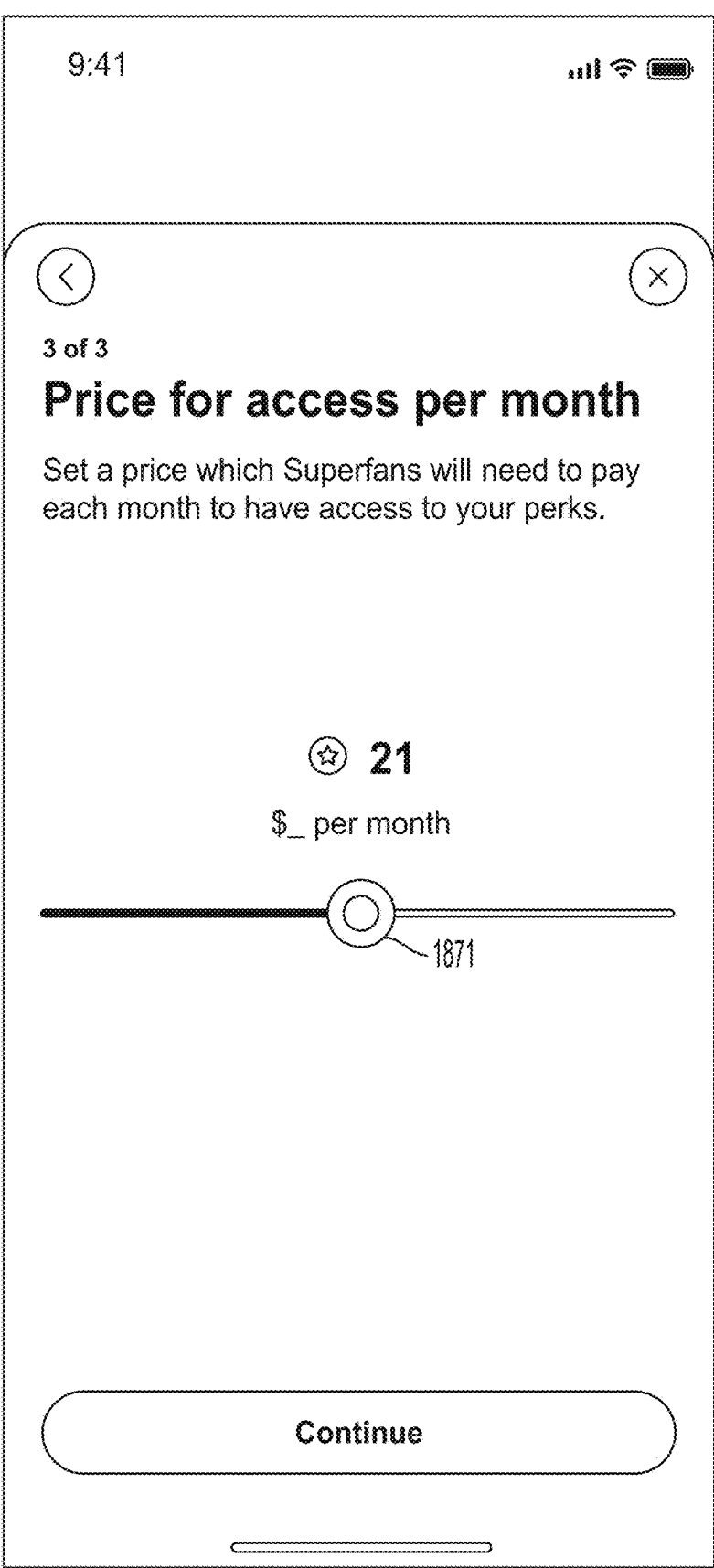
Figure 188:
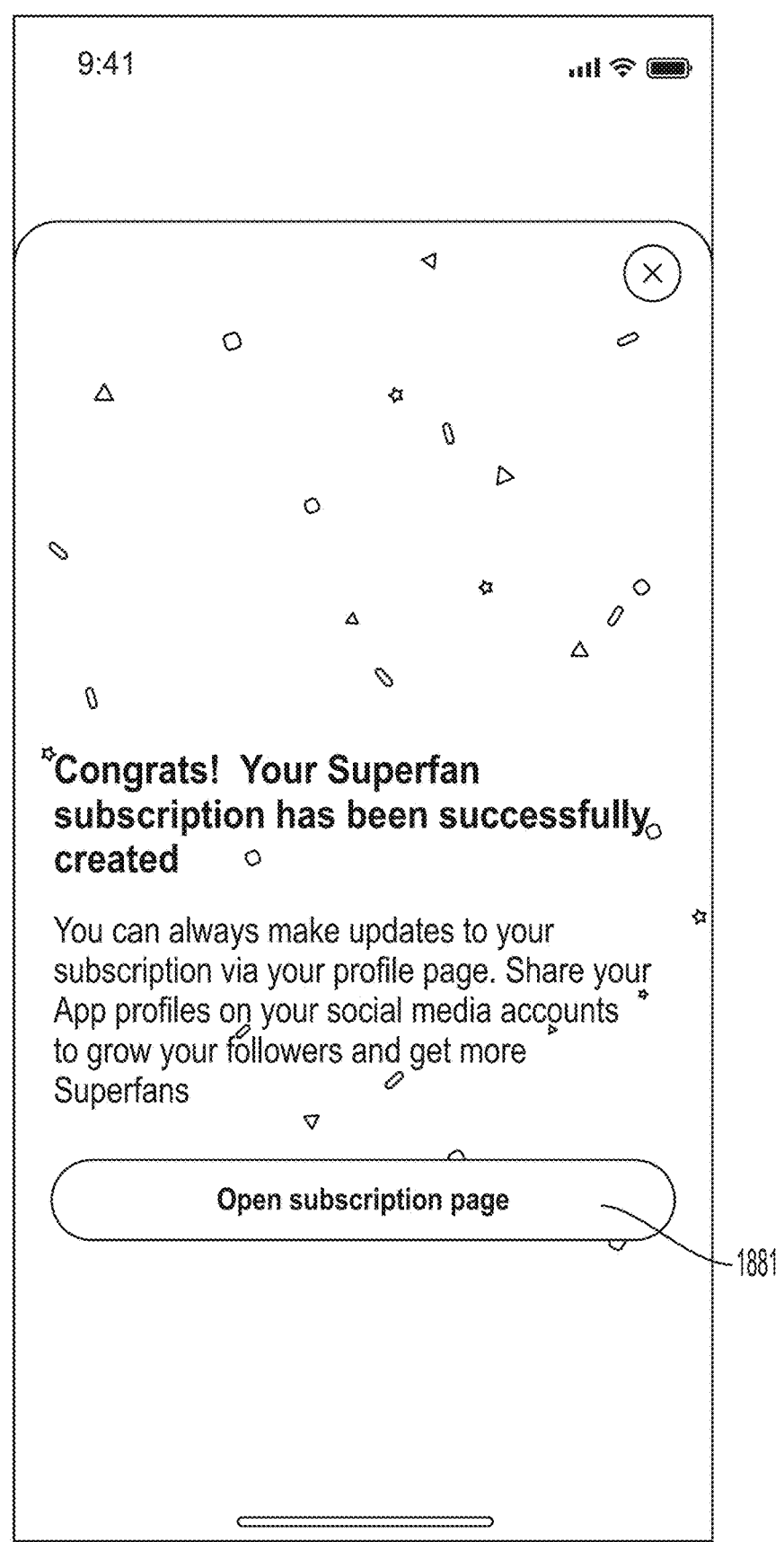

After progressing, a speaker may be brought to a screen like FIG. 187, which may allow the speaker to set a rate (e.g., price) for access per month. This rate may be the amount of "Stars" required for other users (e.g., listeners, speakers, etc.) to subscribe to the speaker or become their "Superfan." A "Star" may be a type of digital exchangeable and may represent a certain amount of currency. The screen may have a slider 1871 that allows the speaker to dial in a "Star" amount. Once a speaker has progressed through all of the necessary screens, they may be brought to a screen like in FIG. 186, which may congratulate them on joining the "Application Monetization" program. The speaker may have to agree to a set of terms and conditions, or select an agree button, to progress.

Figure 190:
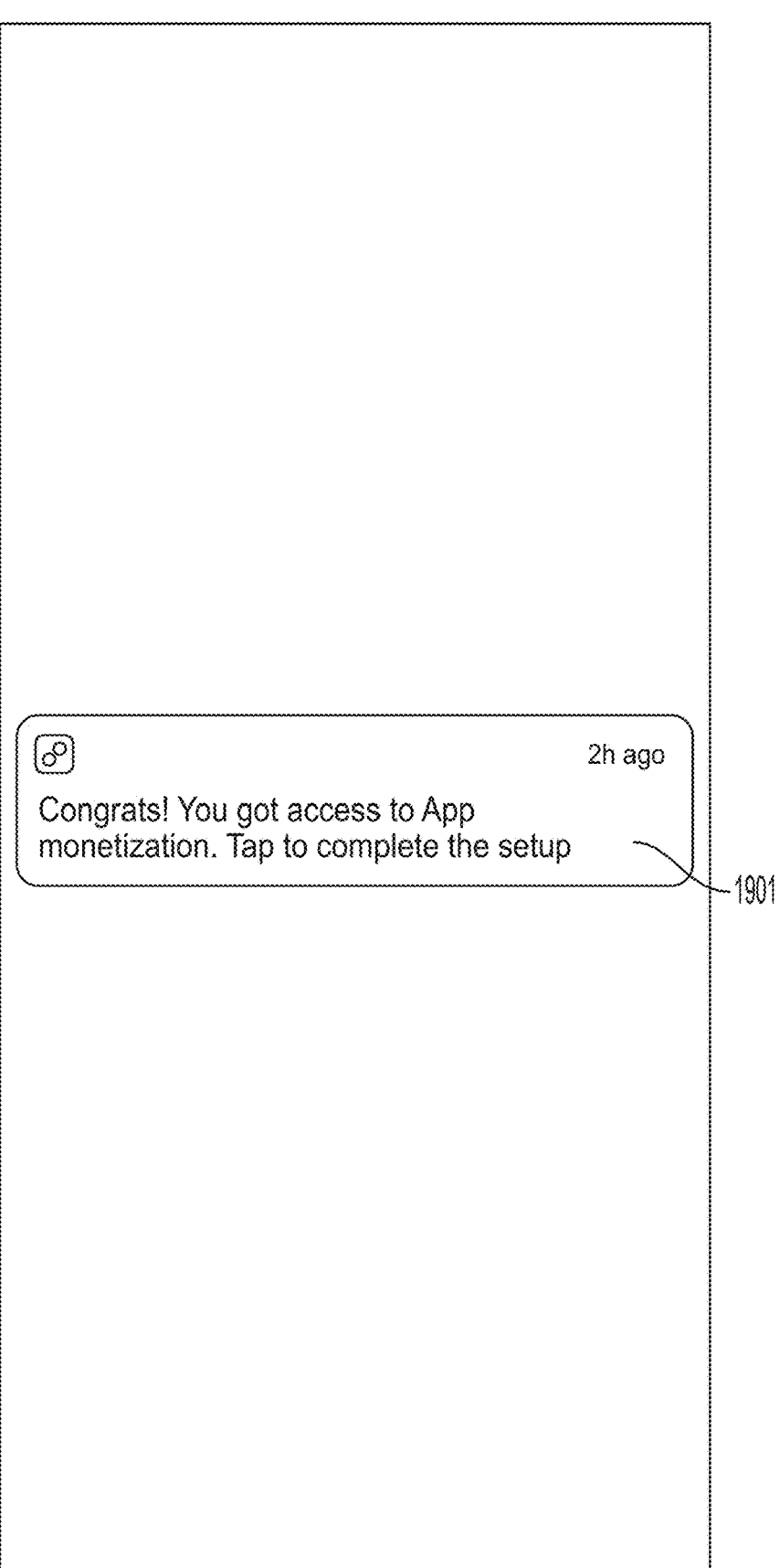

If a speaker was able to enter a code, their mobile device may get a notification 1901, alerting them to the fact that they gained access to the "Application Monetization" program, as seen in FIG. 190.

Figure 191:
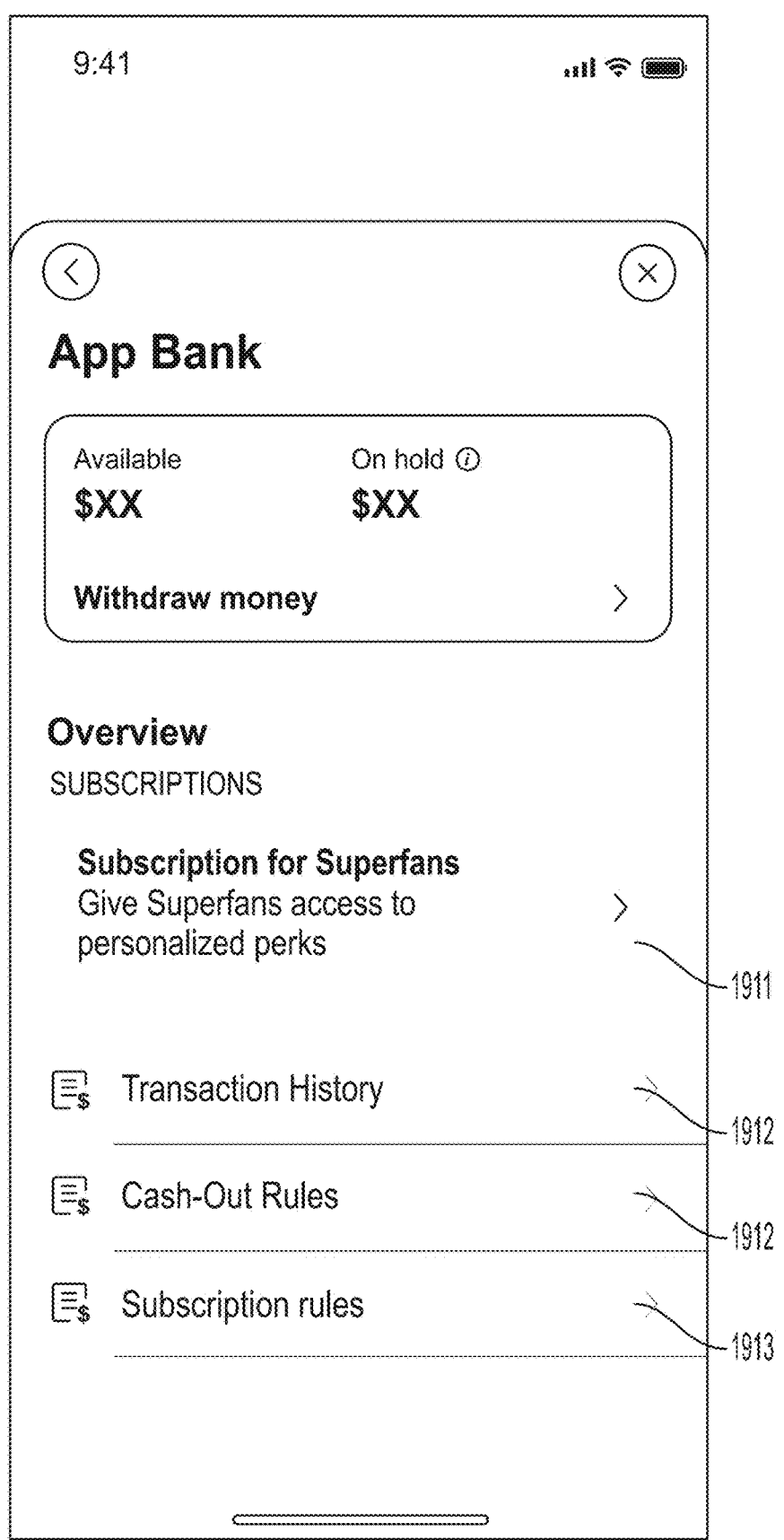
Figure 192:
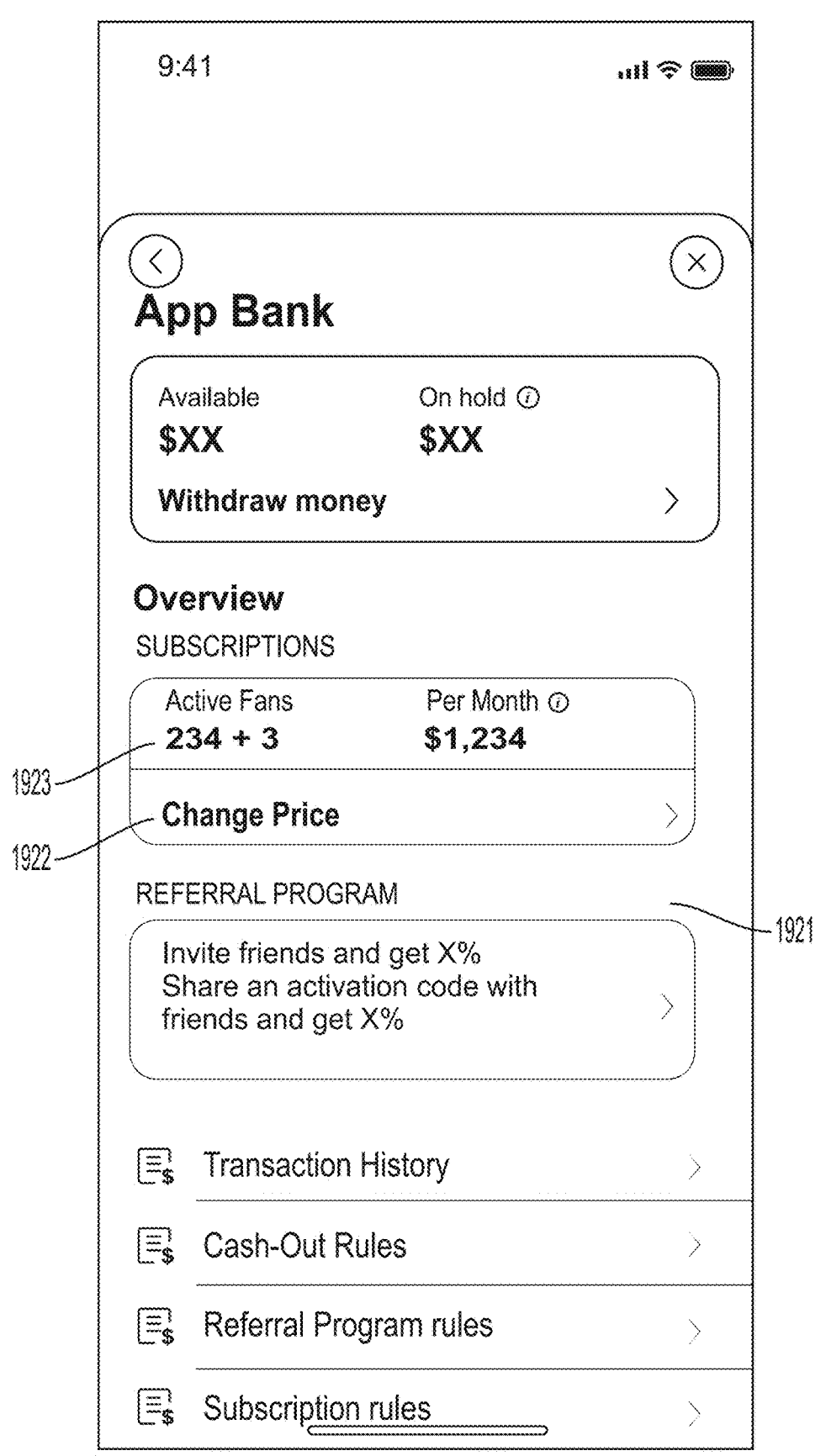
Figure 193:
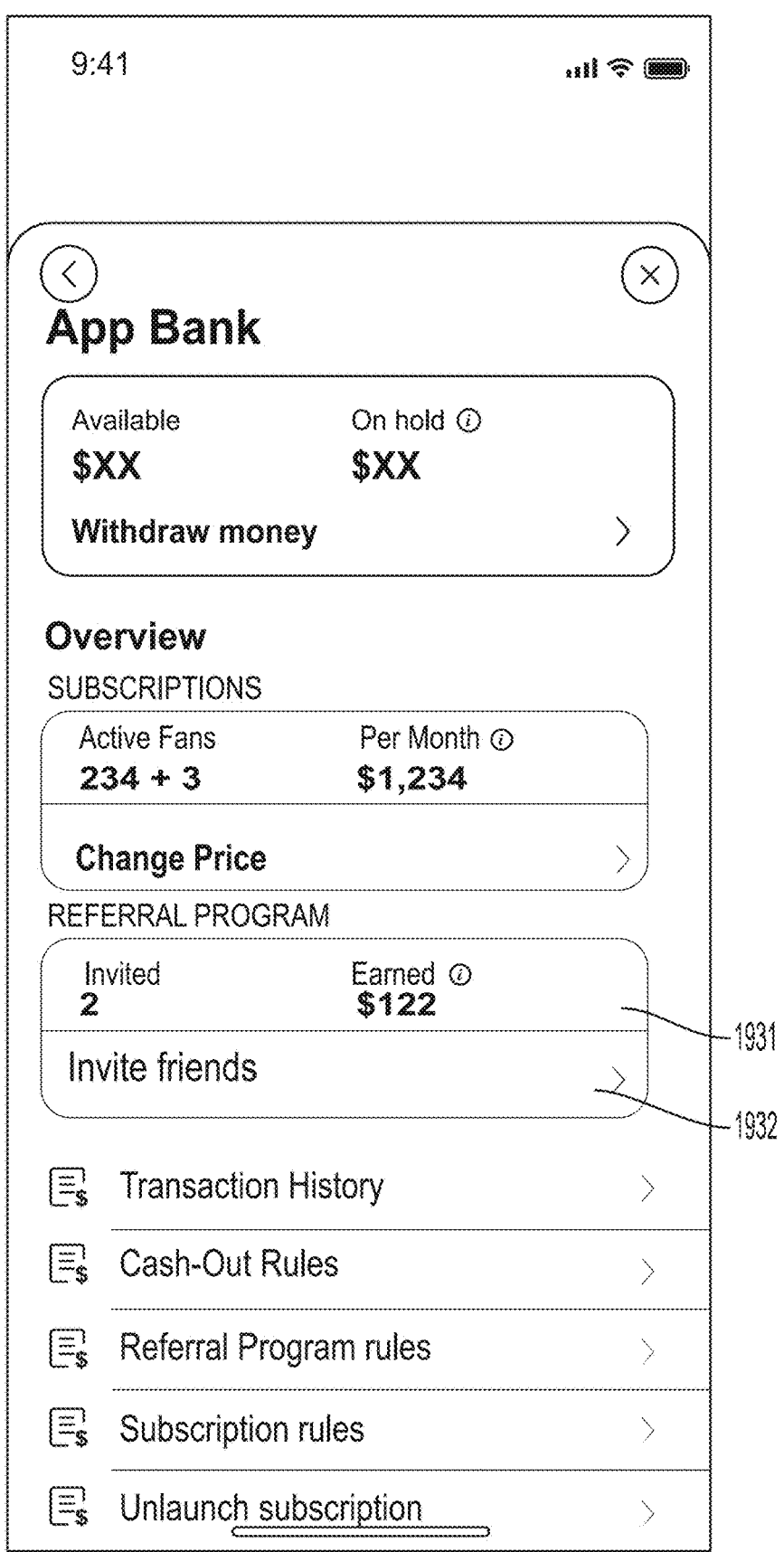
Figure 197:
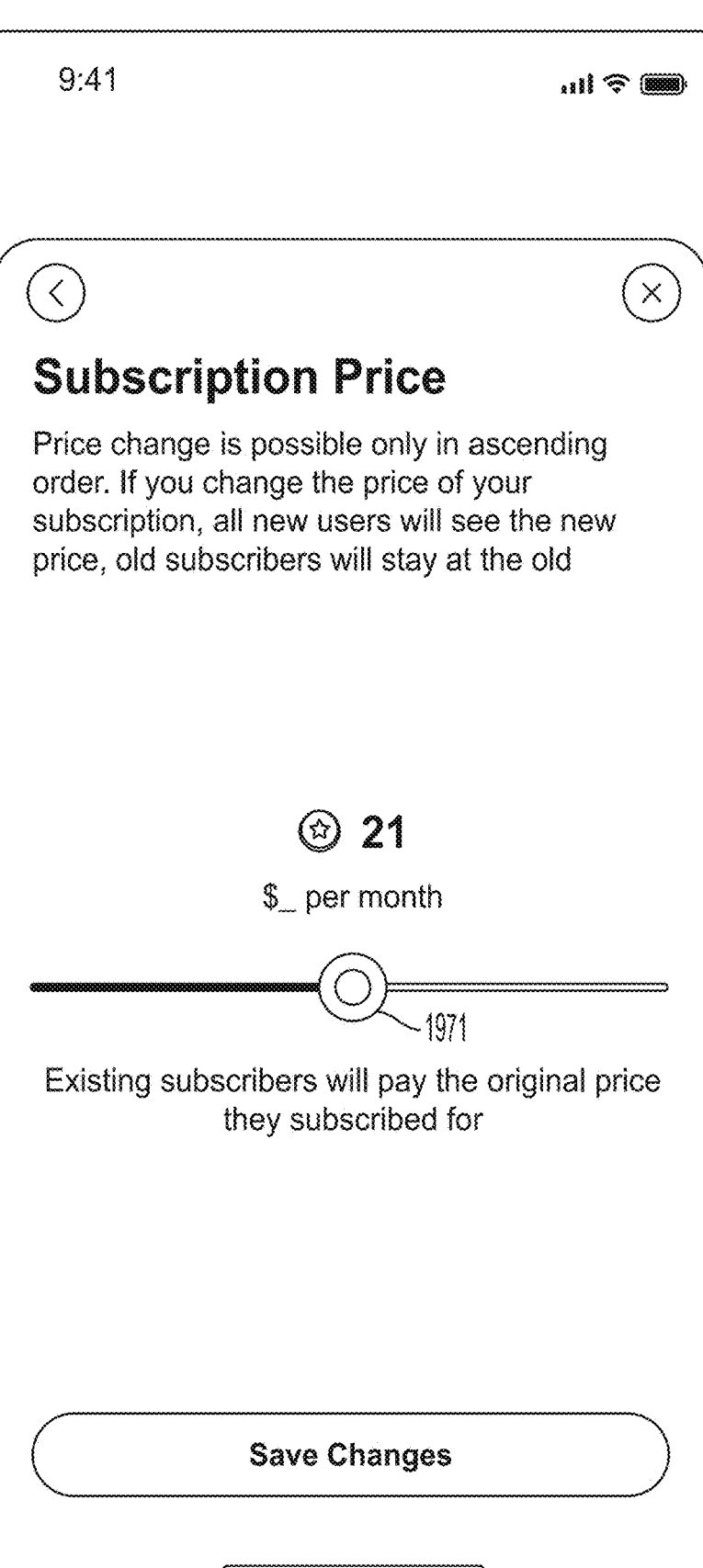
Figure 198:
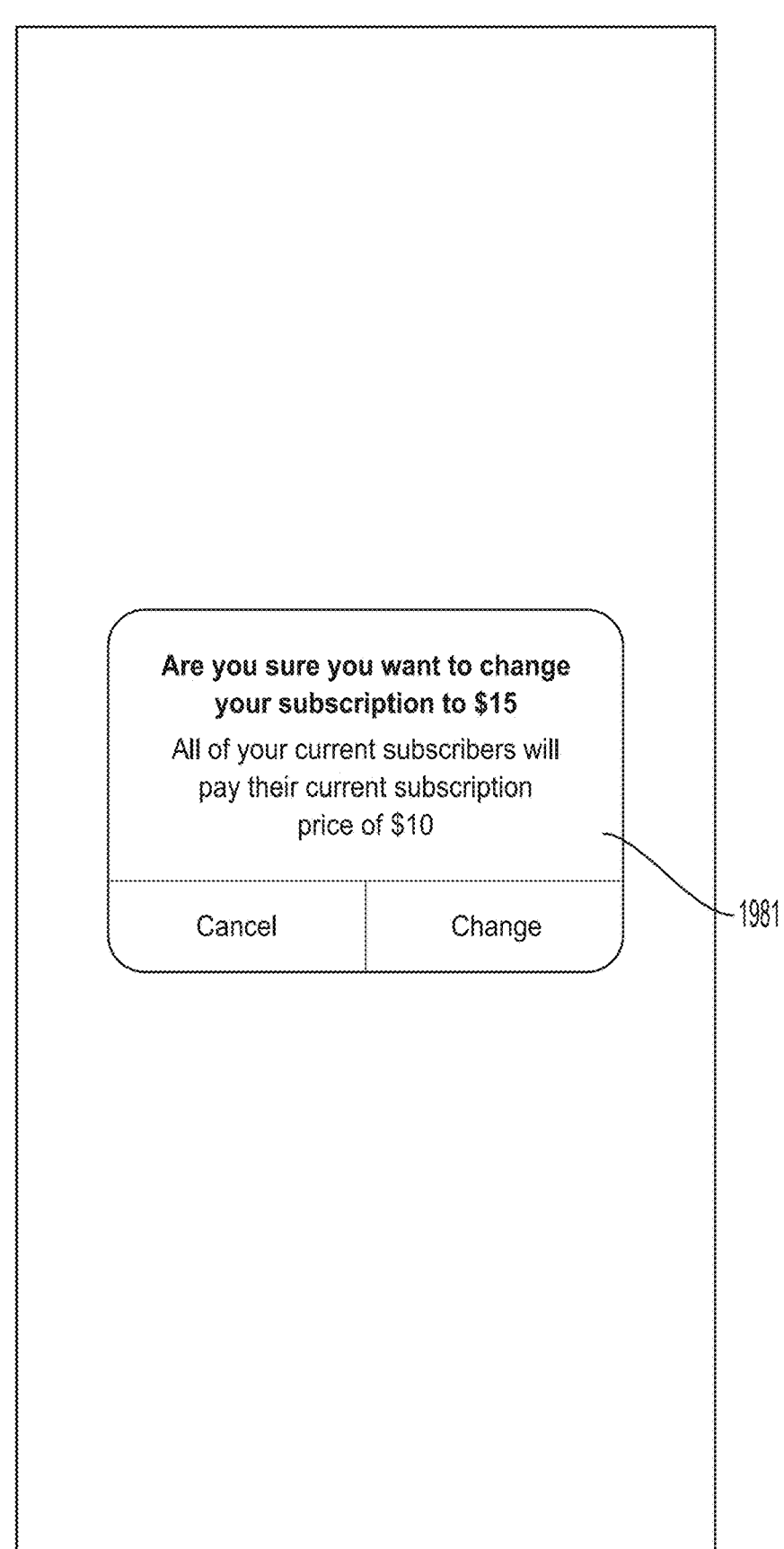

A speaker may navigate to an "Application Bank" (e.g., digital exchangeables account) screen, like that in FIG. 191, FIG. 192, and FIG. 193. The screen may present an option 1911 to give subscribers of "Superfans" access to perks, an option 1912 to view the speaker's transaction history, an option 1912 to view "Cash-Out Rules," or an option 1913 to view subscription rules. The screen may display an available balance (e.g., an amount of digital exchangeables, or an amount of currency or cryptocurrency based on the amount of digital exchangeables available in the bank) and a balance amount that is "On hold," as well as an option withdraw (e.g., to an external currency or cryptocurrency account) from the balance. The screen may present a list 1923 of how many active "Superfans" or subscribers a speaker has. The screen may present an option 1922 to change the price or number of "Stars" needed to subscribe to a speaker. Selecting this option 1922 may bring the speaker to a screen like FIG. 197, which has a slider 1971, allowing the speaker to modify the number of "Stars" (e.g., digital exchangeables) required for a user to subscribe to the speaker. Using this slider 1971 and selecting "Save changes" may bring the speaker to a screen like FIG. 198, which displays a message 1981 asking them if they are sure they want to change the number of "Stars" required for a subscription. The screen also notes that the new price is applicable only to new subscribers after the change is effected and does not affect the price paid by prior or current subscribers. The screen may present an option 1921 to view the application's referral program. The screen may present a display 1931 showing the number of other users or individuals outside of the application who have been invited through the referral program, or the amount of digital exchangeables or "Stars' gained through the referral program.

Figure 195:
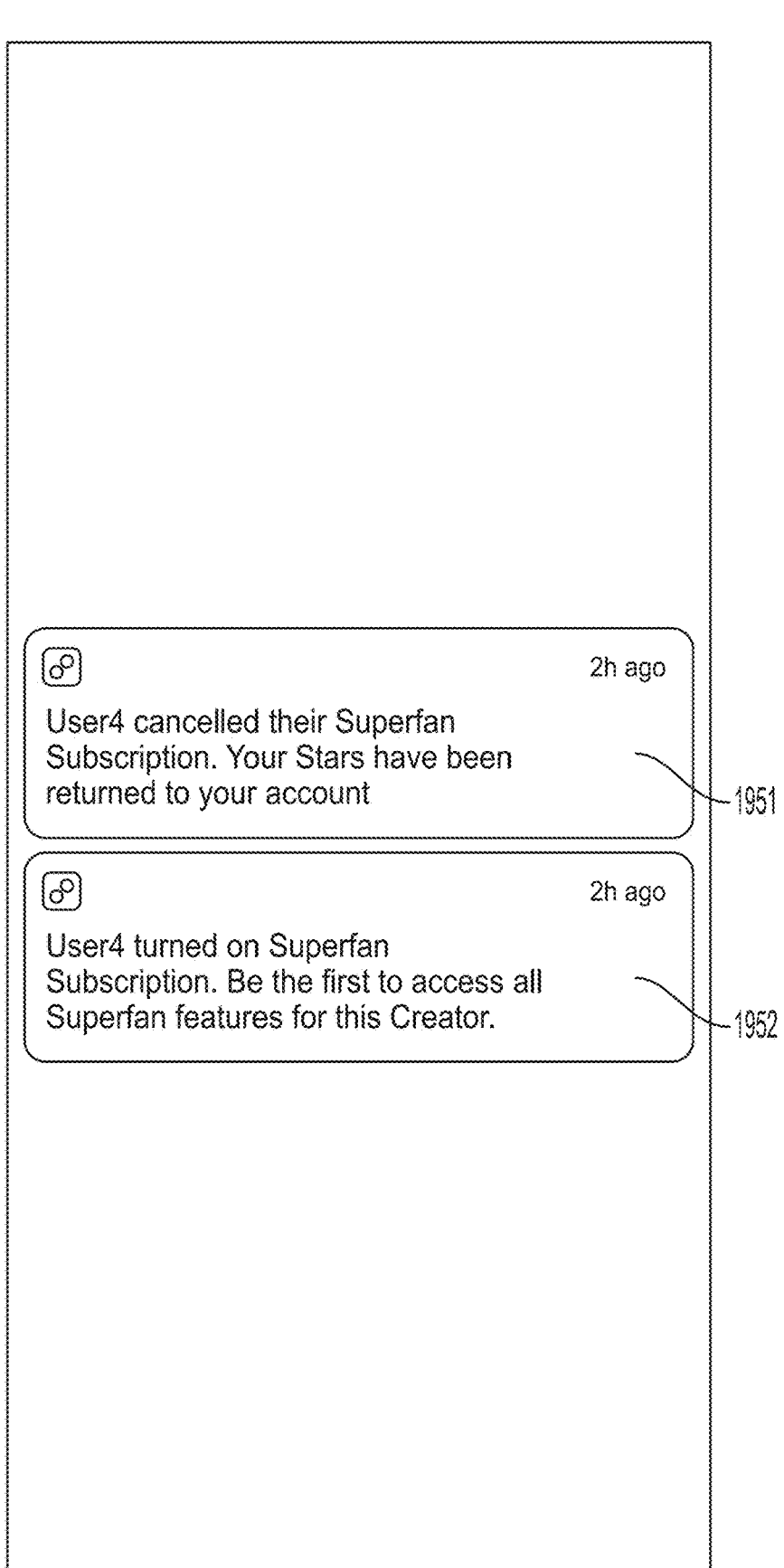

If a speaker selects an "Unlaunch subscription" option on FIG. 193, the speaker may be brought to a screen like FIG. 194. This screen may present a message 1941, asking the speaker if he or she is sure they want to unlaunch the subscription service. If a speaker ends their subscription service, users (e.g., listeners) who are subscribed may be given a notification 1951 informing them that the speaker has ended their subscription, as seen in FIG. 195. The digital exchangeables (or a portion of the digital exchangeables) that the listener previously transmitted to the application or speaker for achieving "Superfan" status may be returned to the listener. Alternatively, if a speaker turns on a subscription service, the option to become a "Superfan" may be presented to a listener (e.g., a listener or other user who follows the speaker or who may share the same or similar descriptive operator as the speaker) via a notification 1952.

Figure 196:
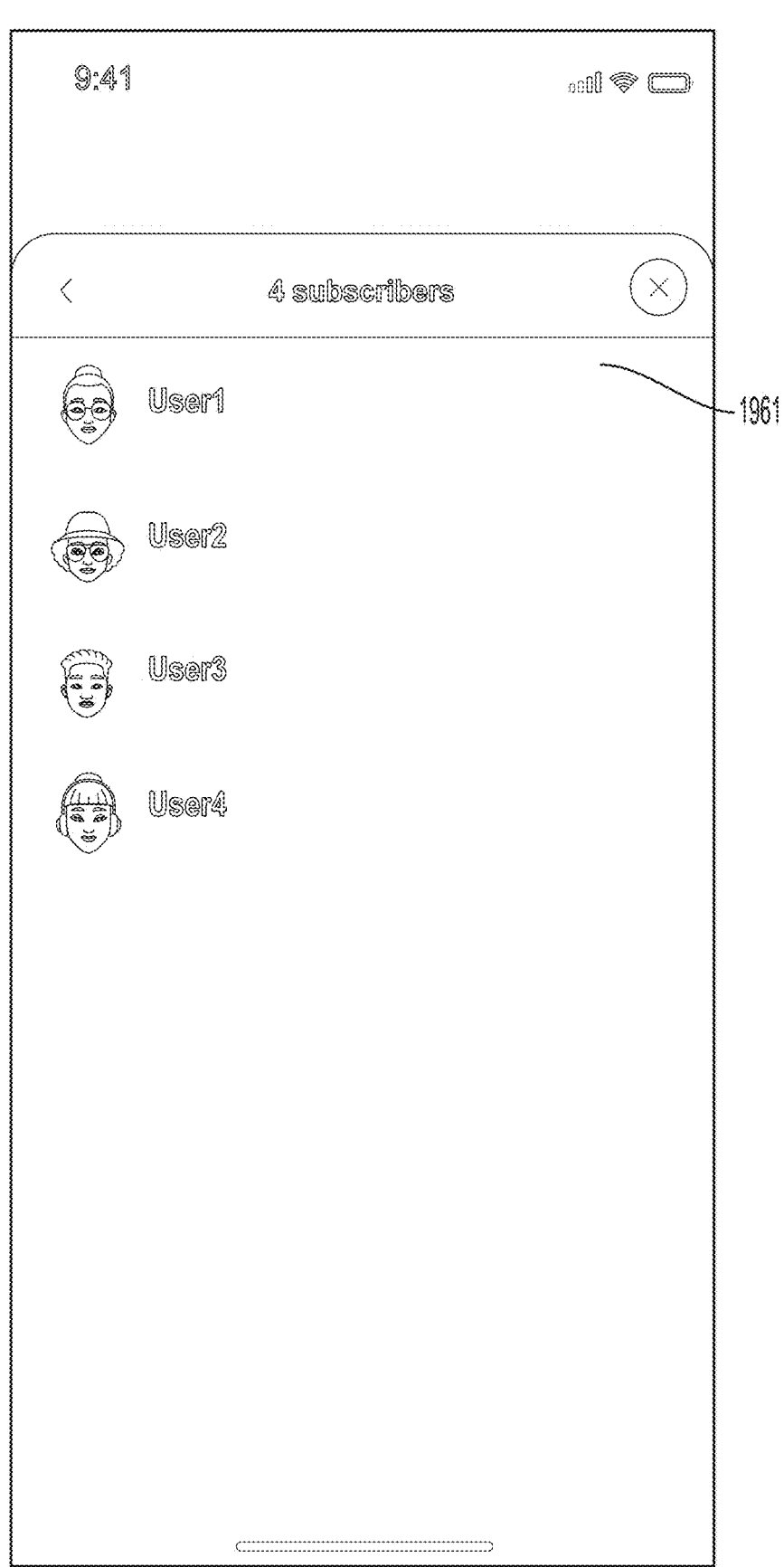

Selecting option 1923 may pull up a display 1961, showing the speaker's active "Superfans" or subscribers 1961, as seen in FIG. 196. This screen may display "Superfans" or subscribers by their visual representation or their username.

Figure 199:
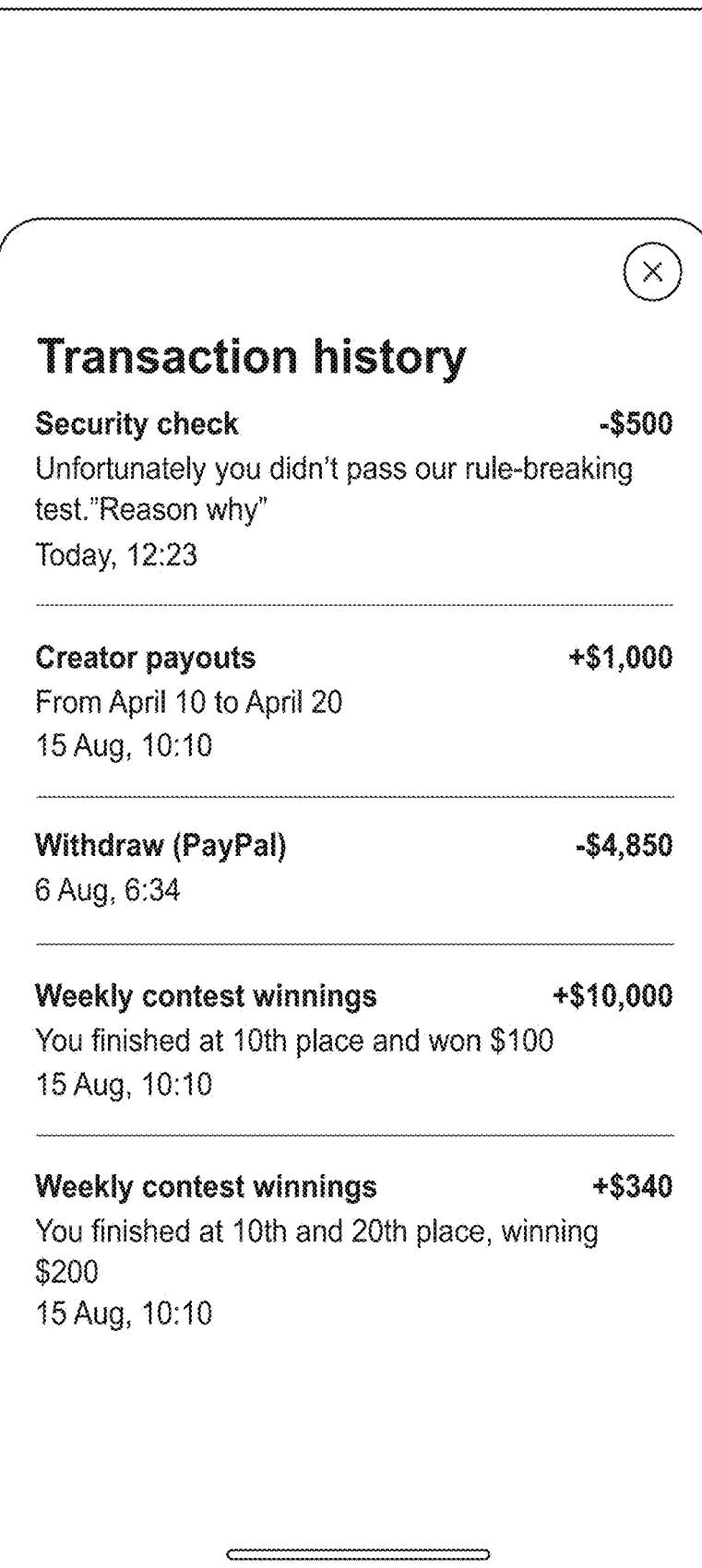
Figure 200:
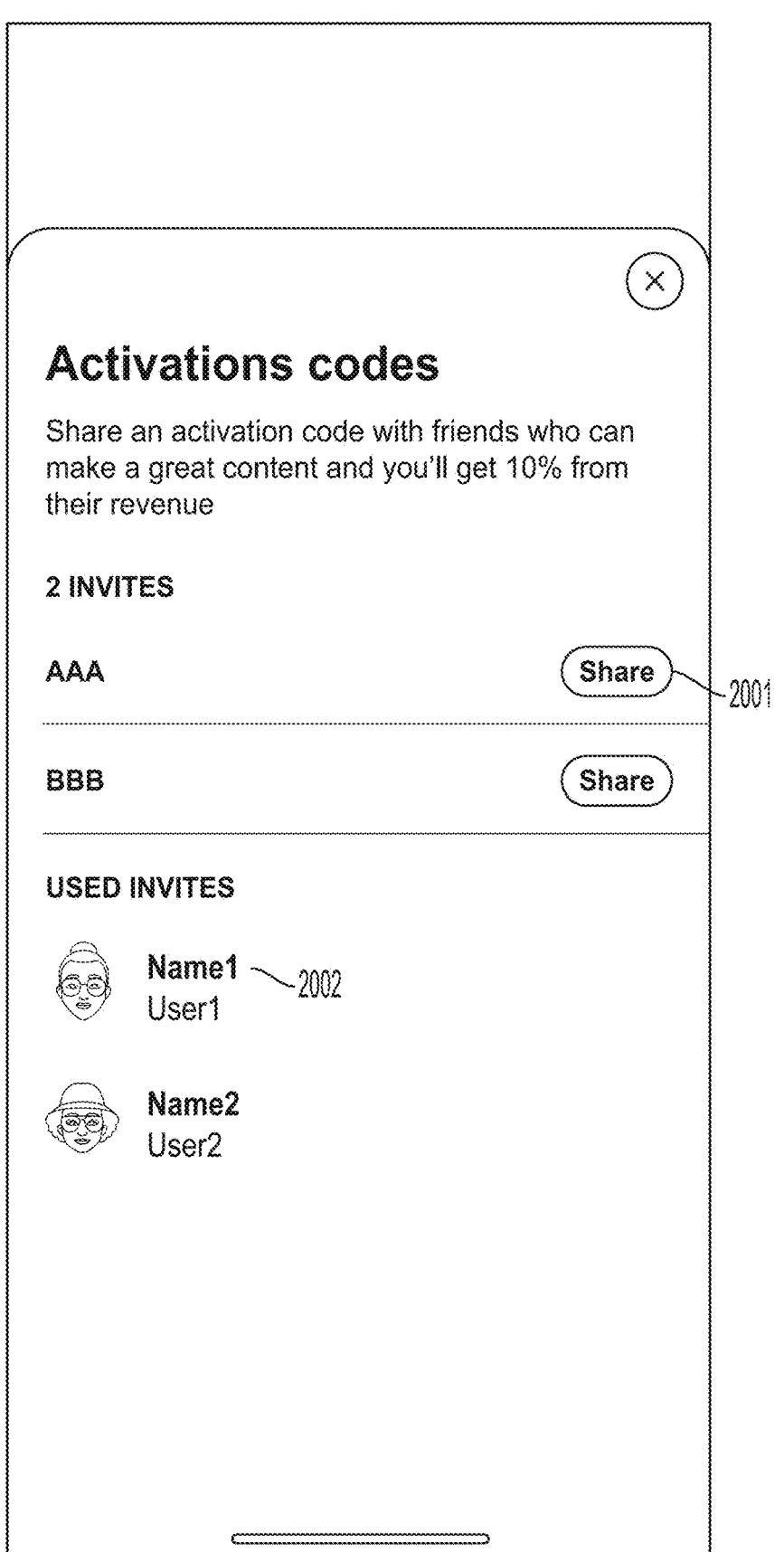

If a speaker selects their transaction history 1912 (e.g., associated with their digital exchangeables account), the speaker may be brought to a screen similar to FIG. 199. This screen shows transaction history and may include credits and debits to a speaker's balance associated with their digital exchangeables account, paired with associated amounts. Selecting option 1921 may bring up a screen where a speaker can invite friends/users (e.g., who have registered user accounts on the mobile application, or who do not yet have registered user accounts on the mobile application, etc.) to join the application as speakers who can be subscribed to by listeners or other users, as seen in FIG. 200. This screen may allow a speaker to share activation codes with other users of the mobile application (and/or other future users of the mobile application who do not yet have an account on the application). Access codes might have options 2001 next to them allowing them to be shared. If the speaker has already send out invites, the screen may display names and/or usernames 2002 of people who have already been invited and used the codes. If no one has used the activation codes, that area of the screen 2011 might appear blank, like in FIG. 201. Therefore, a speaker can bypass the process of requesting a code from the mobile application (for creating a subscription-only show) if the speaker receives a code from another speaker. In some embodiments, a speaker can use a single code to create a single subscription-only show, whereas in other embodiments, a speaker can use a single code to multiple subscription-only shows.

Figure 202:
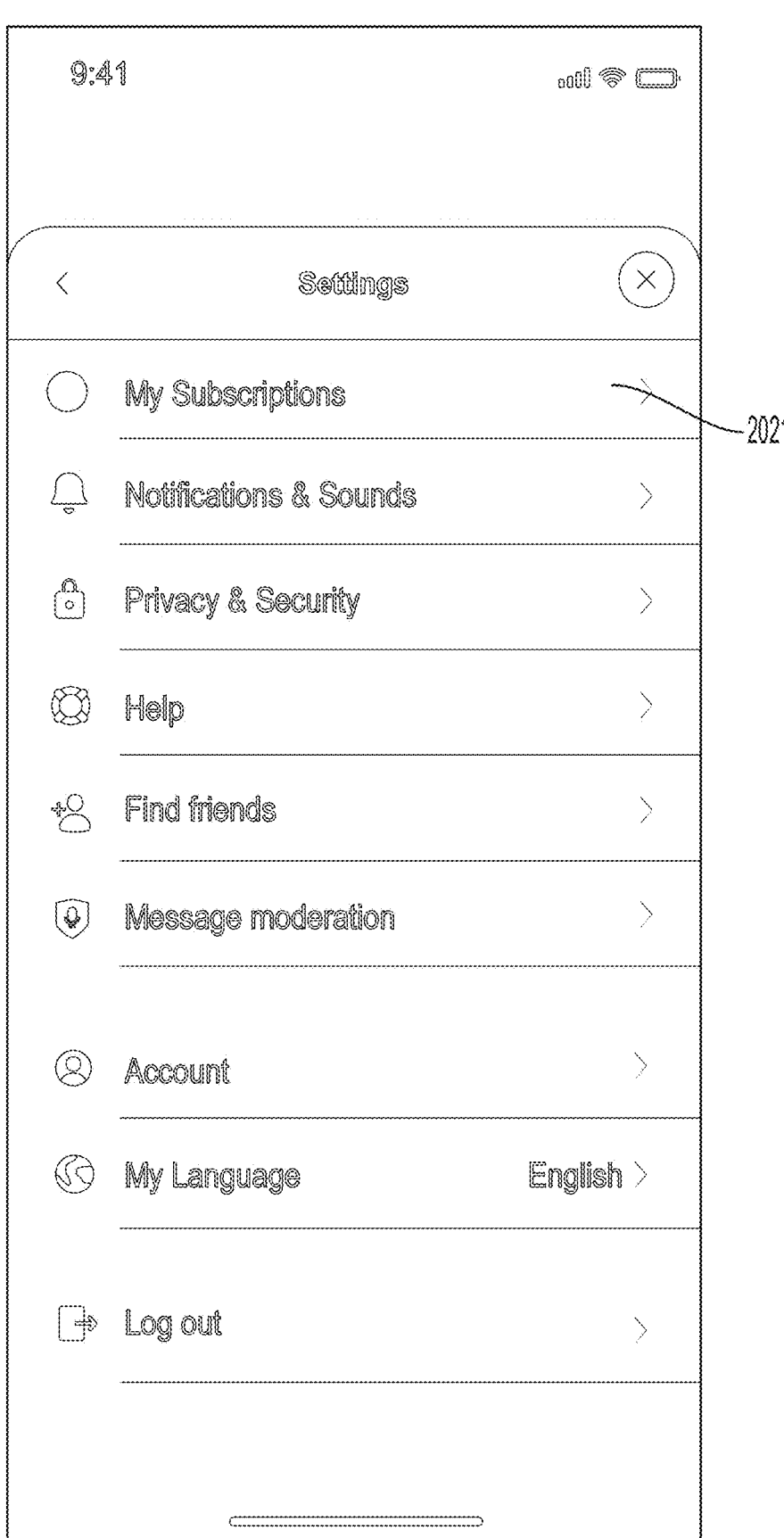
Figure 203:
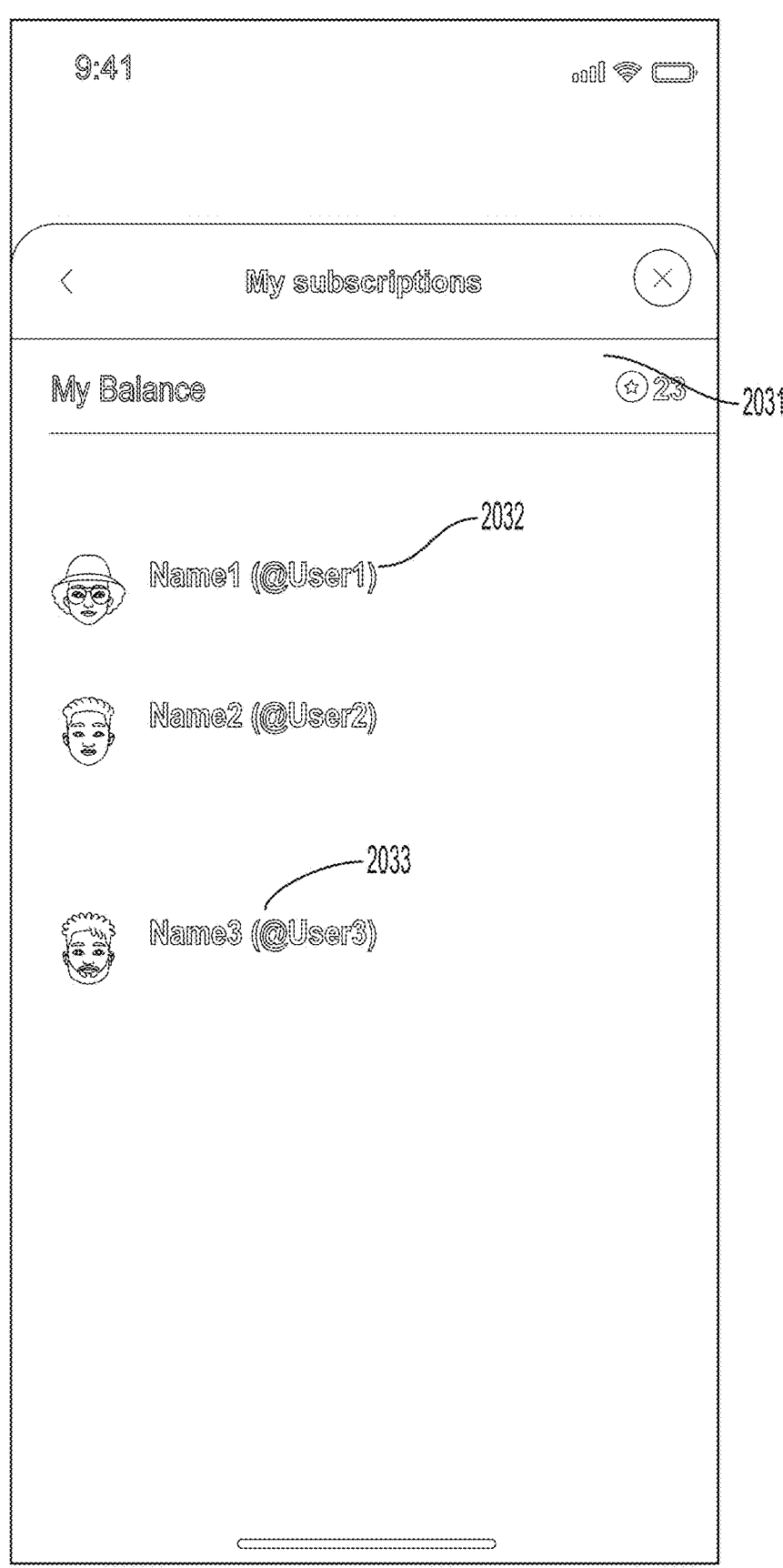
Figure 204:

From the home page of the mobile applications, or from other locations in the mobile application, a user may navigate to the settings page, like that shown in FIG. 202. A speaker (or listener) may have an option 2021 on the settings page that allows them to view his or her subscriptions (e.g., users or shows he or she has subscribed to, subscription-only shows that he or she has established, etc.), potentially bringing them to a screen like FIG. 203. FIG. 203 shows a page displaying a user's subscriptions and a balance associated with the user's digital exchangeables account. Active subscriptions may be listed 2032 along with subscriptions to speaker users that will expire soon 2033. A subscription to a speaker user may be associated with a period of time. Alternatively, the list of users in FIG. 203 represent a list of subscribing listeners (or subscribers) to a speaker user's show, and the balance represents the balance a speaker has gained from receiving digital exchangeables from the subscribing listeners. FIG. 204 is an example of a subscriptions page with no balance and no active subscriptions.

Figure 205:
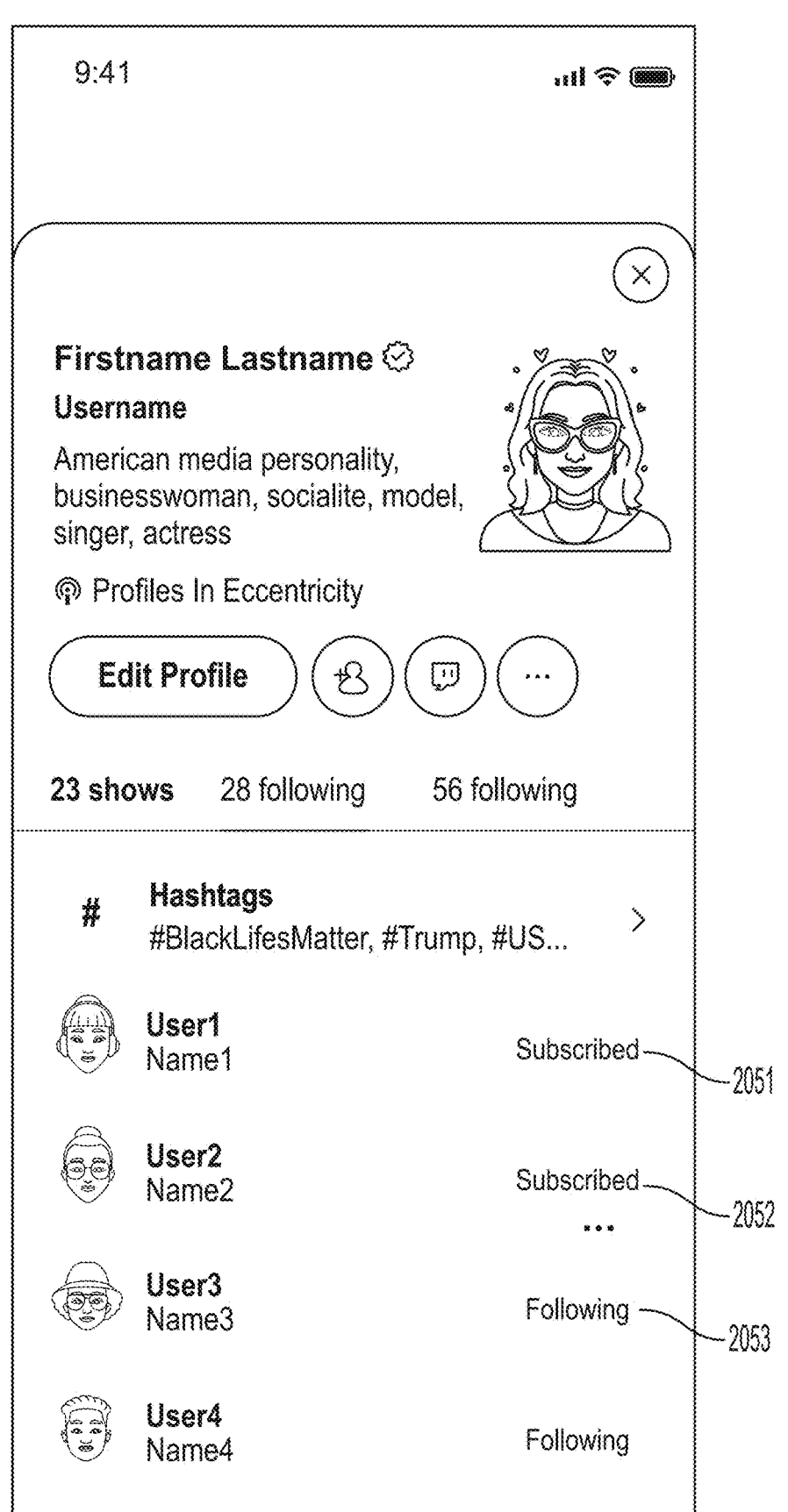

FIG. 205 shows a user's profile page. A user may have a "following" tab on their profile page, which when selected, may display users following the user associated with the profile page. If these followers are subscribed to the user, or are "Superfans" of the associated user, they may have a tag or label 2051, 2051 next to their username indicating such. If they are not subscribed, they may have a tag or label 2053 indicating that they are only "following."

Figure 206:
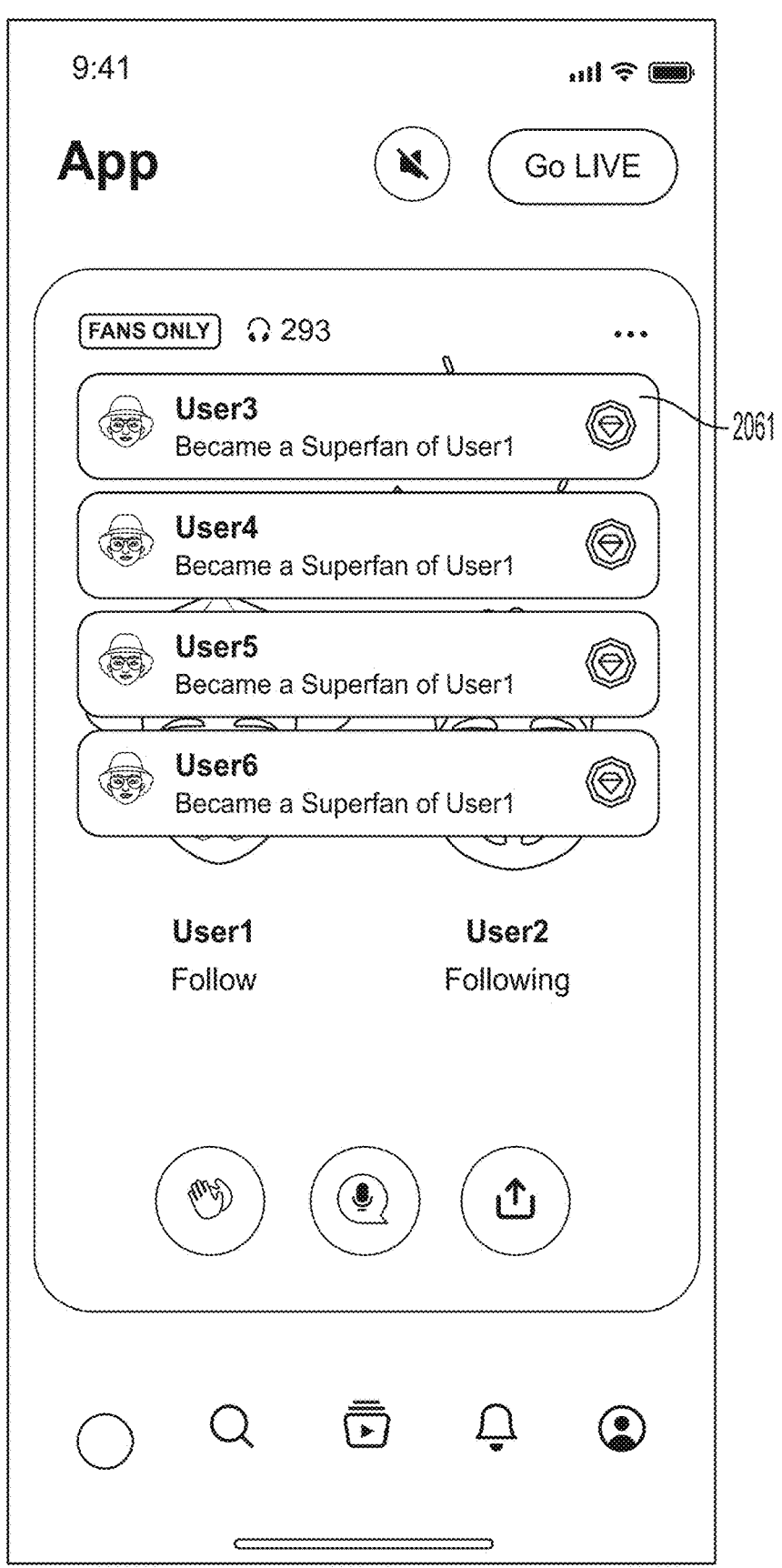
Figure 207:
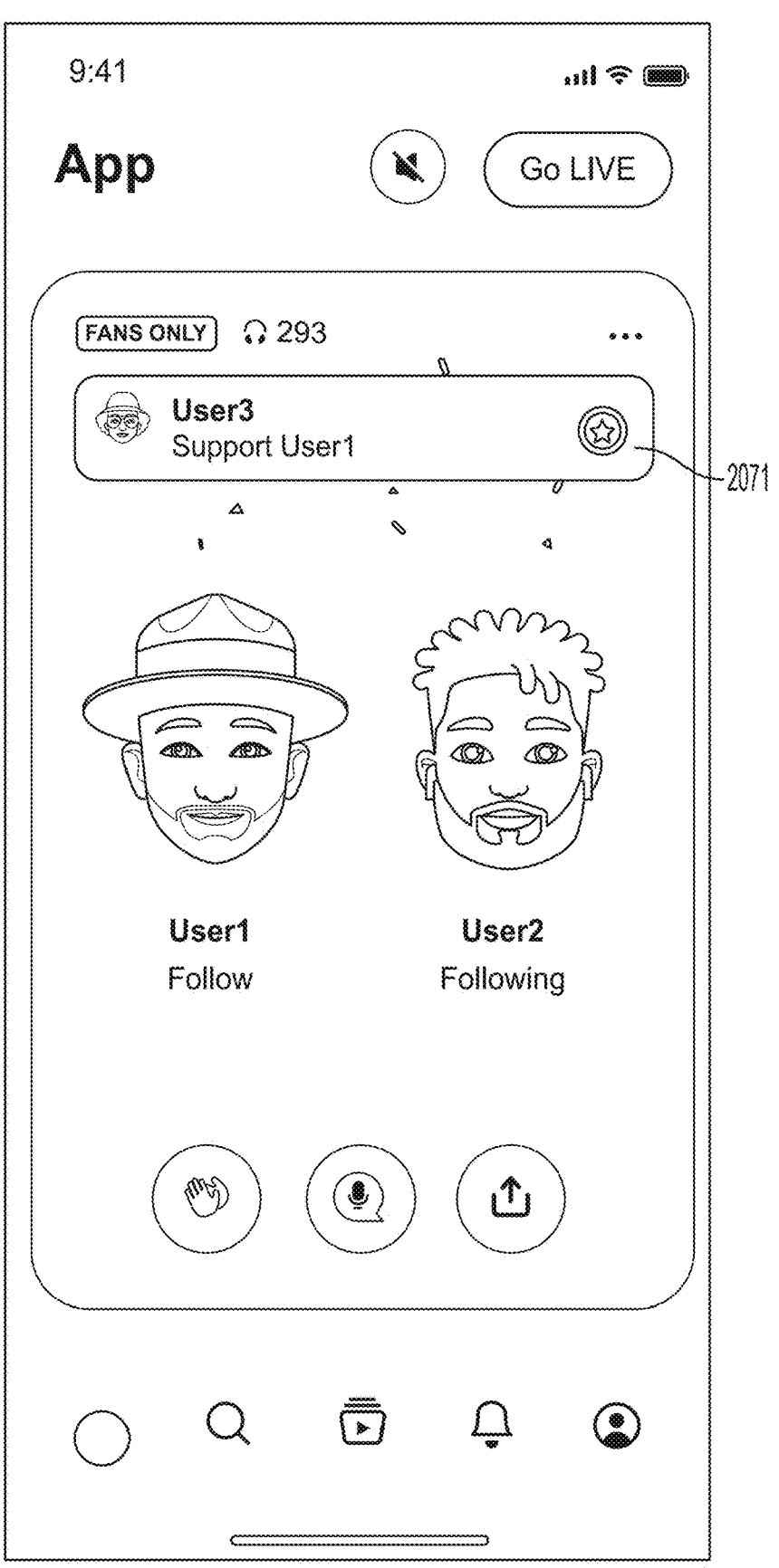
Figure 208:
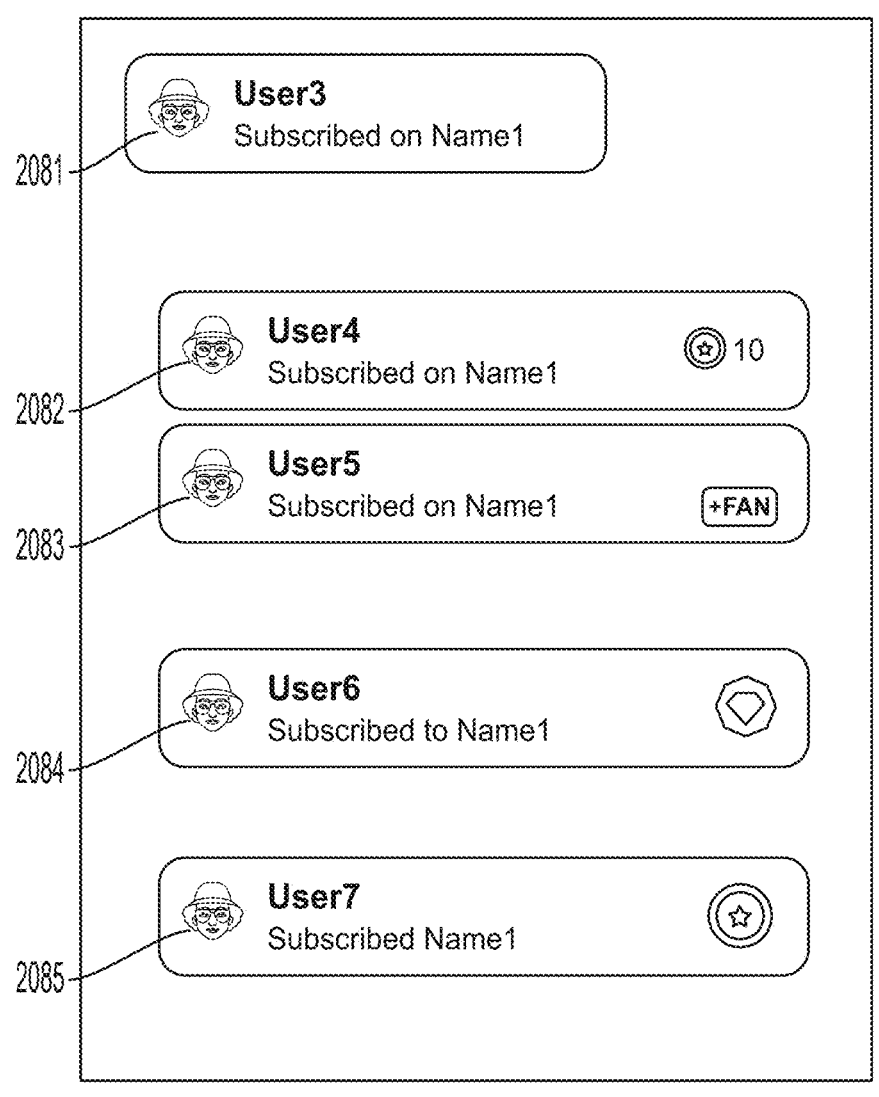

During a live show or audio conversation, as seen in FIG. 206 and FIG. 207, listening users may become "Superfans" of, or subscribe to, one of the speaking users. This may cause a notification 2061 to appear on the application screen (of one of the listeners, including those other than User3, User4, User5, or User6) during the show or audio conversation broadcast. Alternatively, a listening user may support one of the speaking users in some other way (e.g., by sending a digital exchangeable to the application or to the speaker in the audio conversation), causing a distinct notification 2071 to appear on screen (of one of the listeners including listeners other than User3) during the show or audio conversation. Notifications 2081, 2082, 2083, 2084, 2085 may be directed to a number of other user actions, and may be pushed to the mobile device that the application is installed on, or may display on the application screen while using the application, as seen in FIG. 208.

Figure 209:
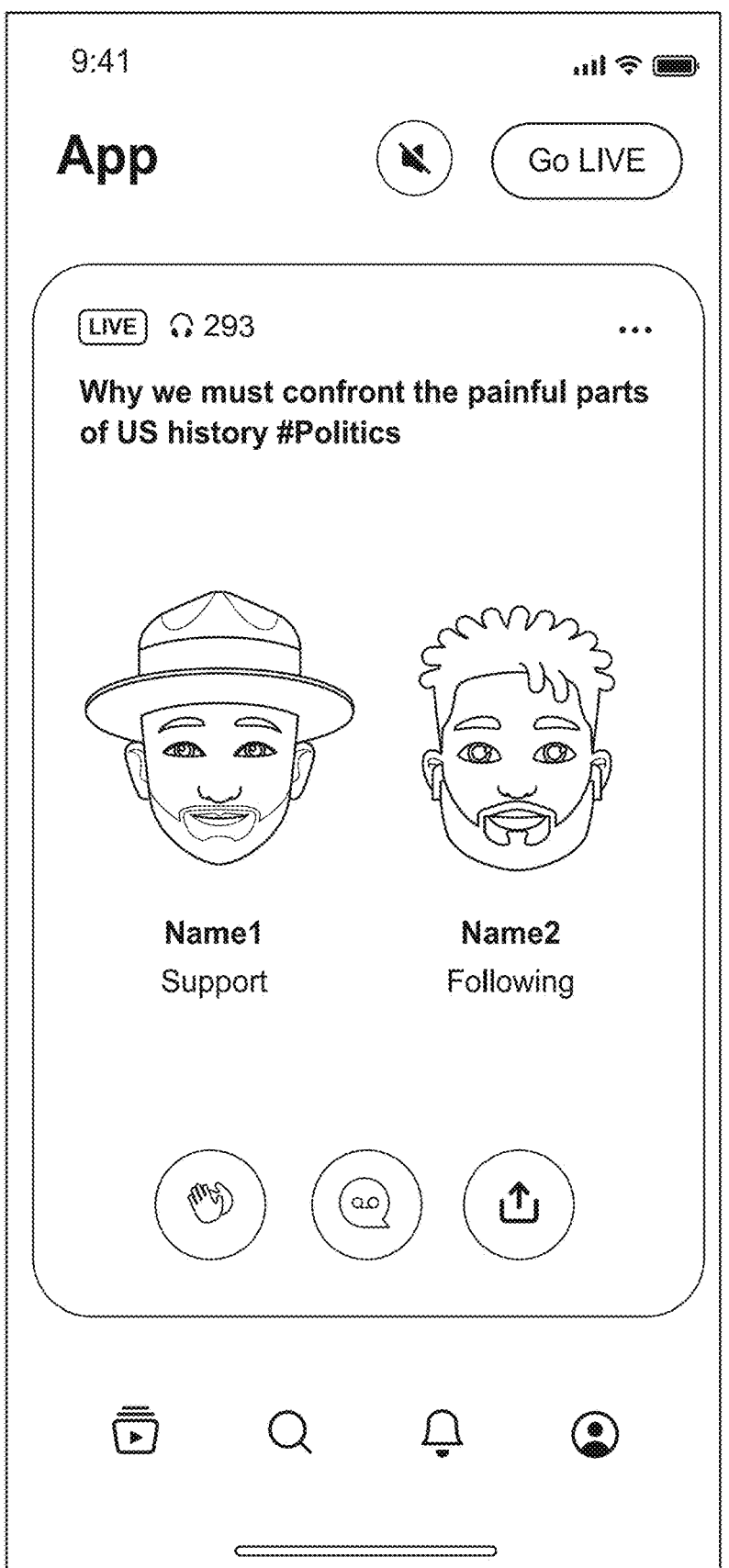
Figure 210:
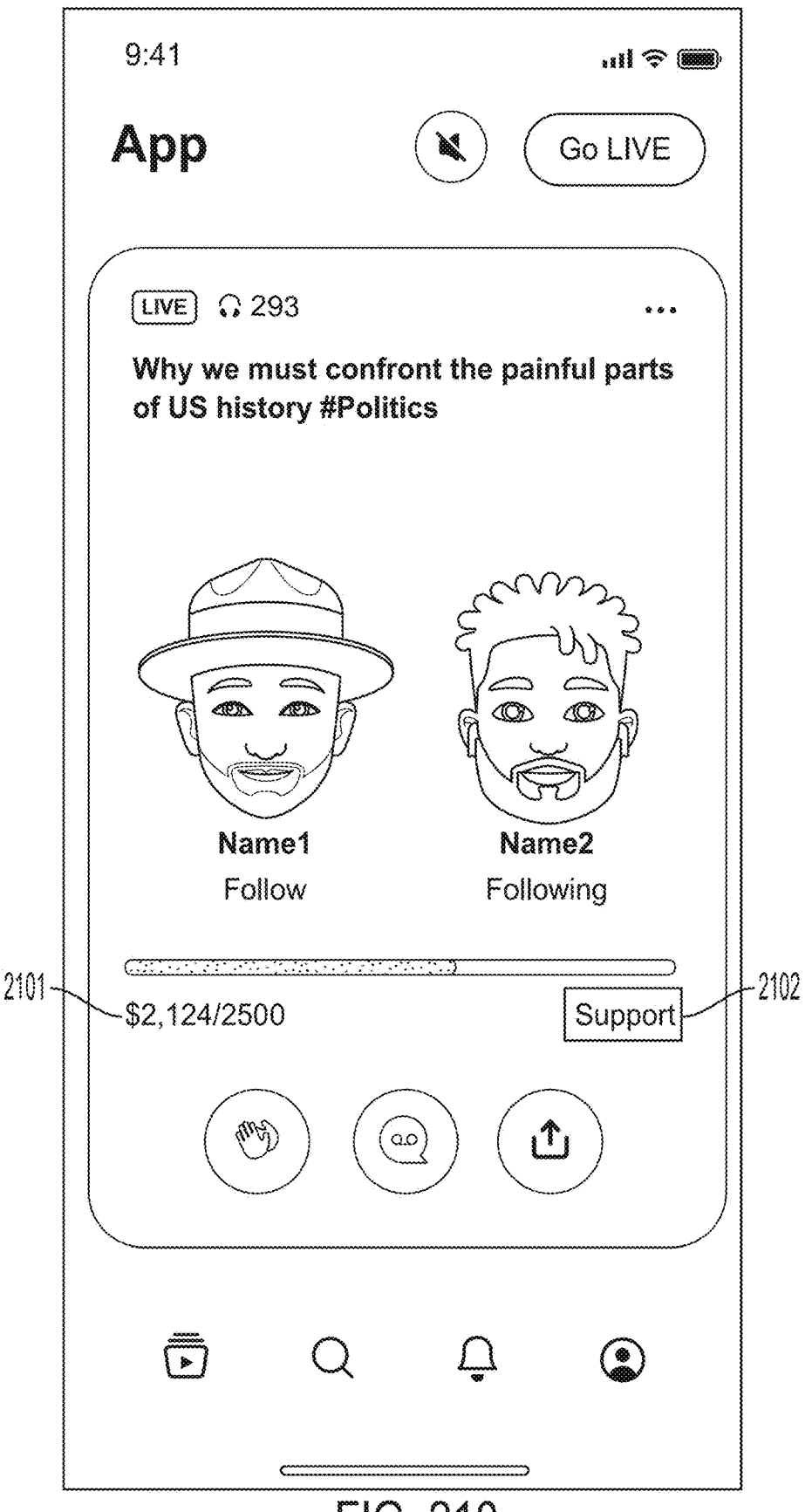
Figure 211:
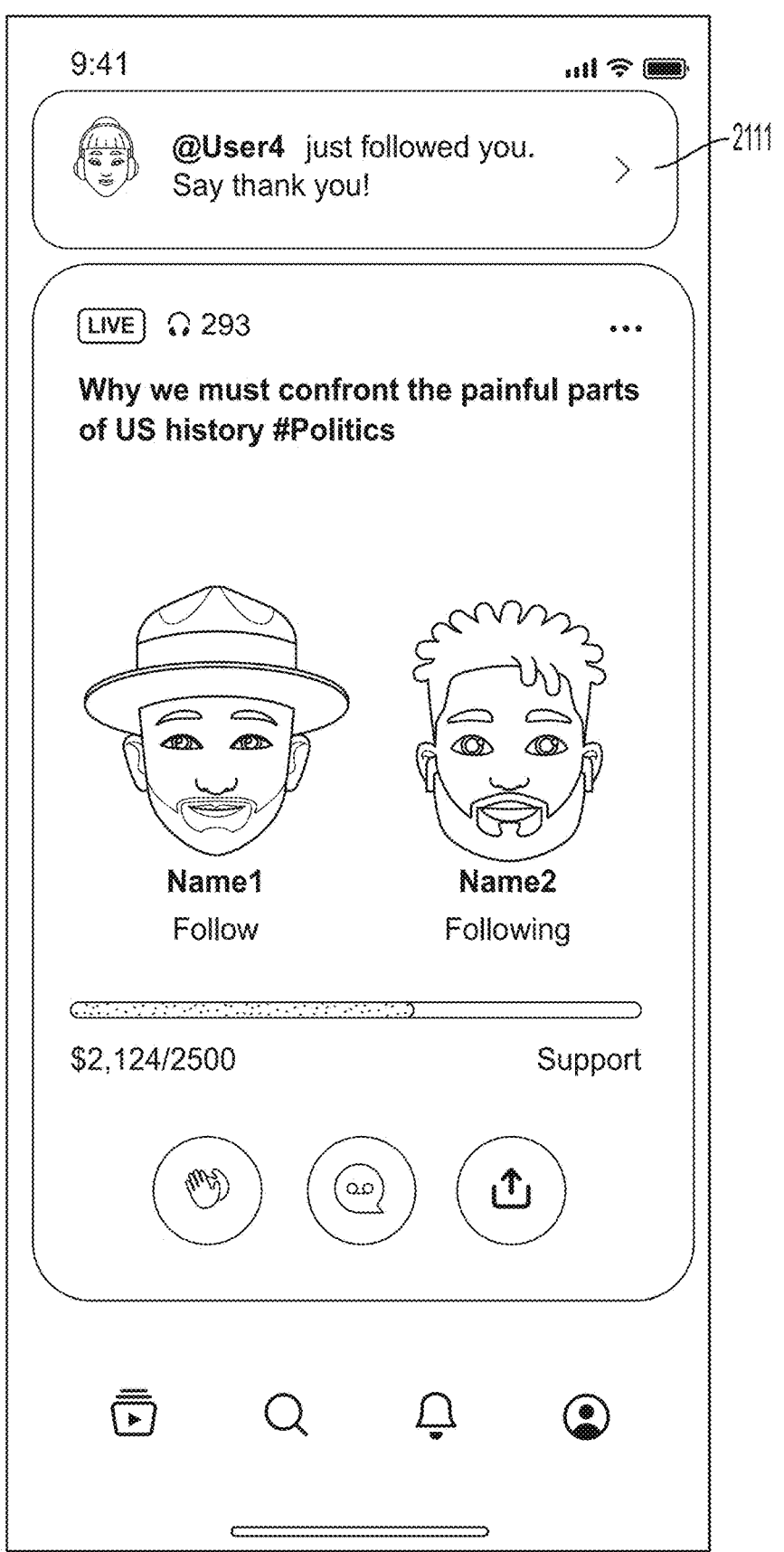

FIG. 209 shows what the application screen may look like (e.g., from the perspective of a listener) when viewing a live show or audio conversation. It may include the visual representations of the speakers and a host of options to interact with the show or audio conversation. Alternatively, a show or conversation screen might display a bar 2101 tracking the progress on some goal or challenge (e.g., as established by the speaker), as seen in FIG. 210. A listening user may be able to select button 2102 to contribute (e.g., transfer digital exchangeables to the speaker and/or the application) to the goal or challenge. A speaker may see that a user has followed them during a show or audio conversation, by the presence of a notification 2111, as seen on FIG. 211. The speaker may also be presented with a message recommending that the speaker thank the user for following them (e.g., by naming them during the audio conversation).

Figure 212:
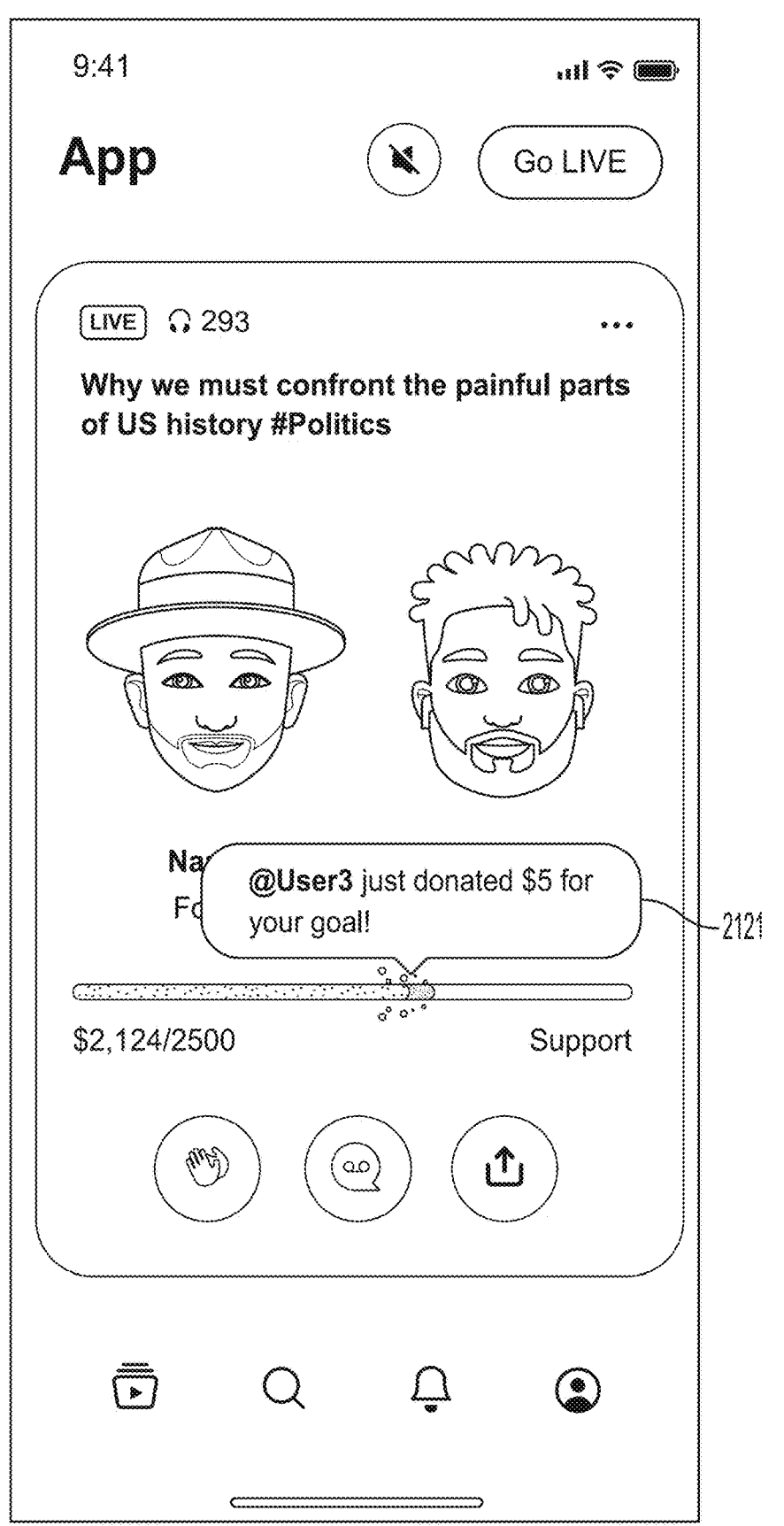
Figure 213:
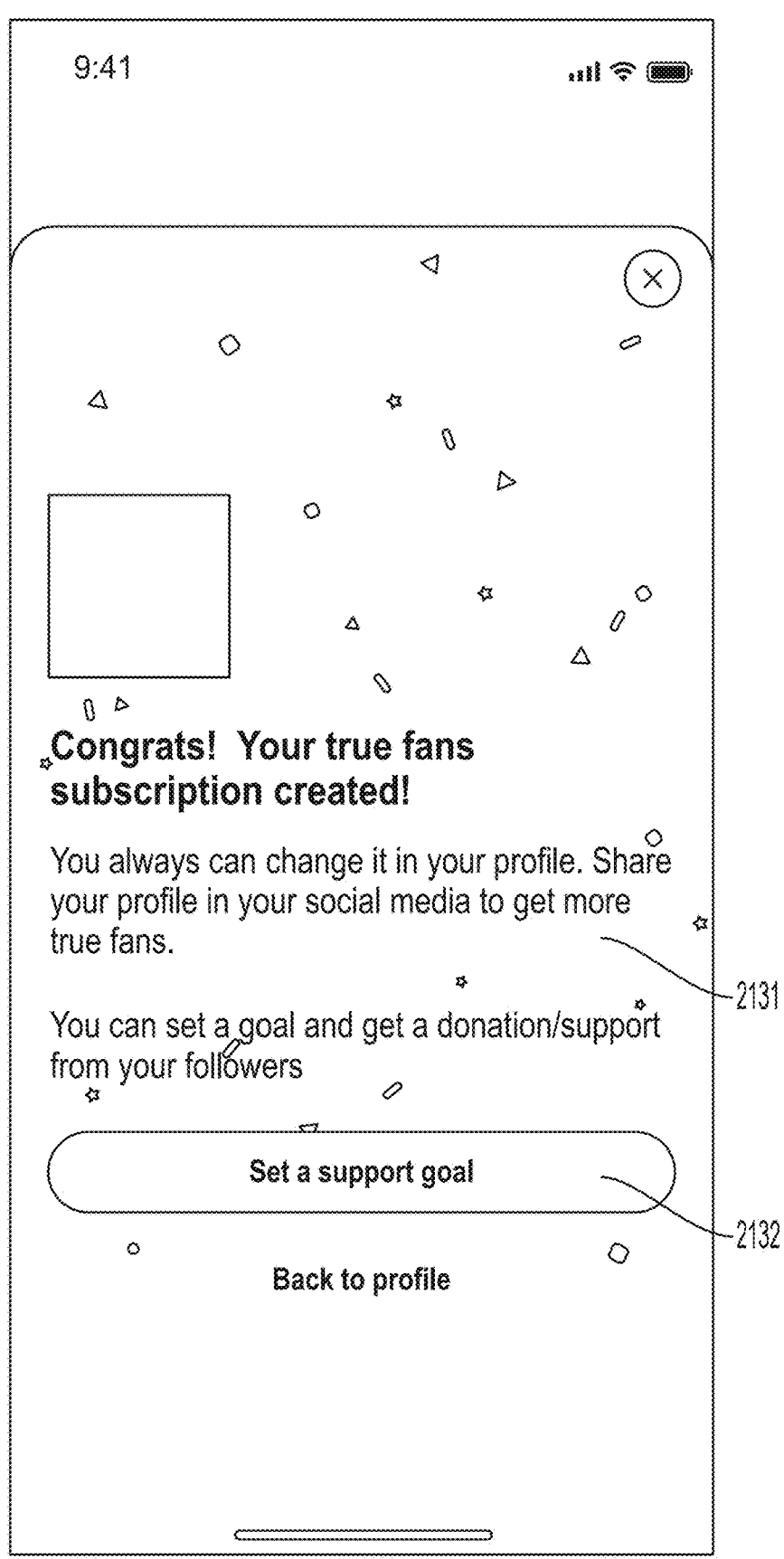

A speaker may see that a user has contributed to a goal or challenge when a message 2121 pops up above the tracking bar, as seen in FIG. 212. A tracking bar might be added to a screen (e.g., an audio conversation display for a listener) when a speaker selects a button 2132 to set up a goal or challenge, which may be displayed on a screen like FIG. 213, which may appear after setting up a subscription or "Superfans" program. The option 2132 may appear underneath a message 2131 informing the speaker that the program was successfully initiated. In some embodiments, transferring or transmitting or sending digital exchangeables from one mobile application user to another mobile application user involves sending digital exchangeables to the mobile application (or a server associated with the mobile application), and the mobile application, in turn, sending the digital exchangeable to the other mobile application user.

Figure 214:
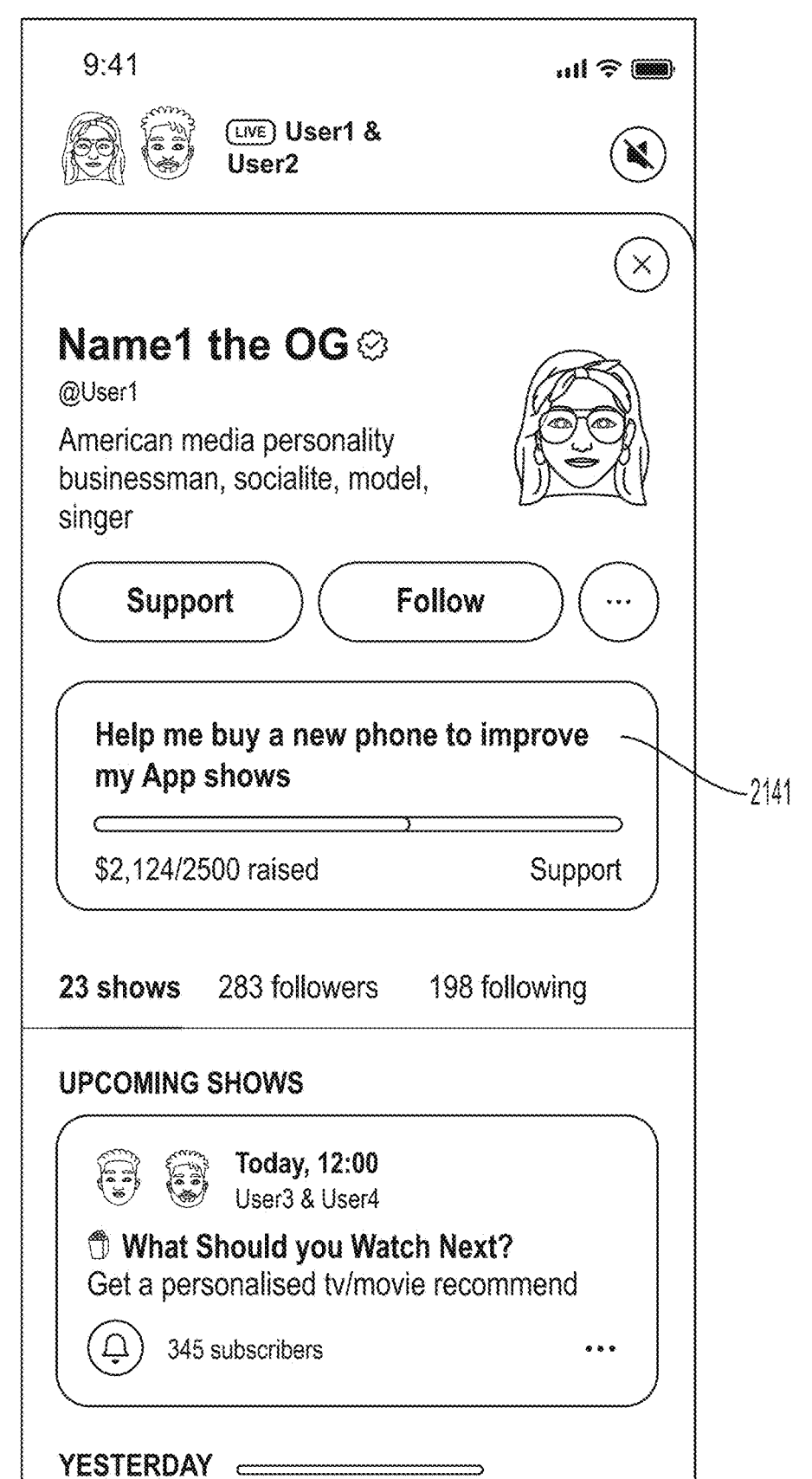
Figure 217:
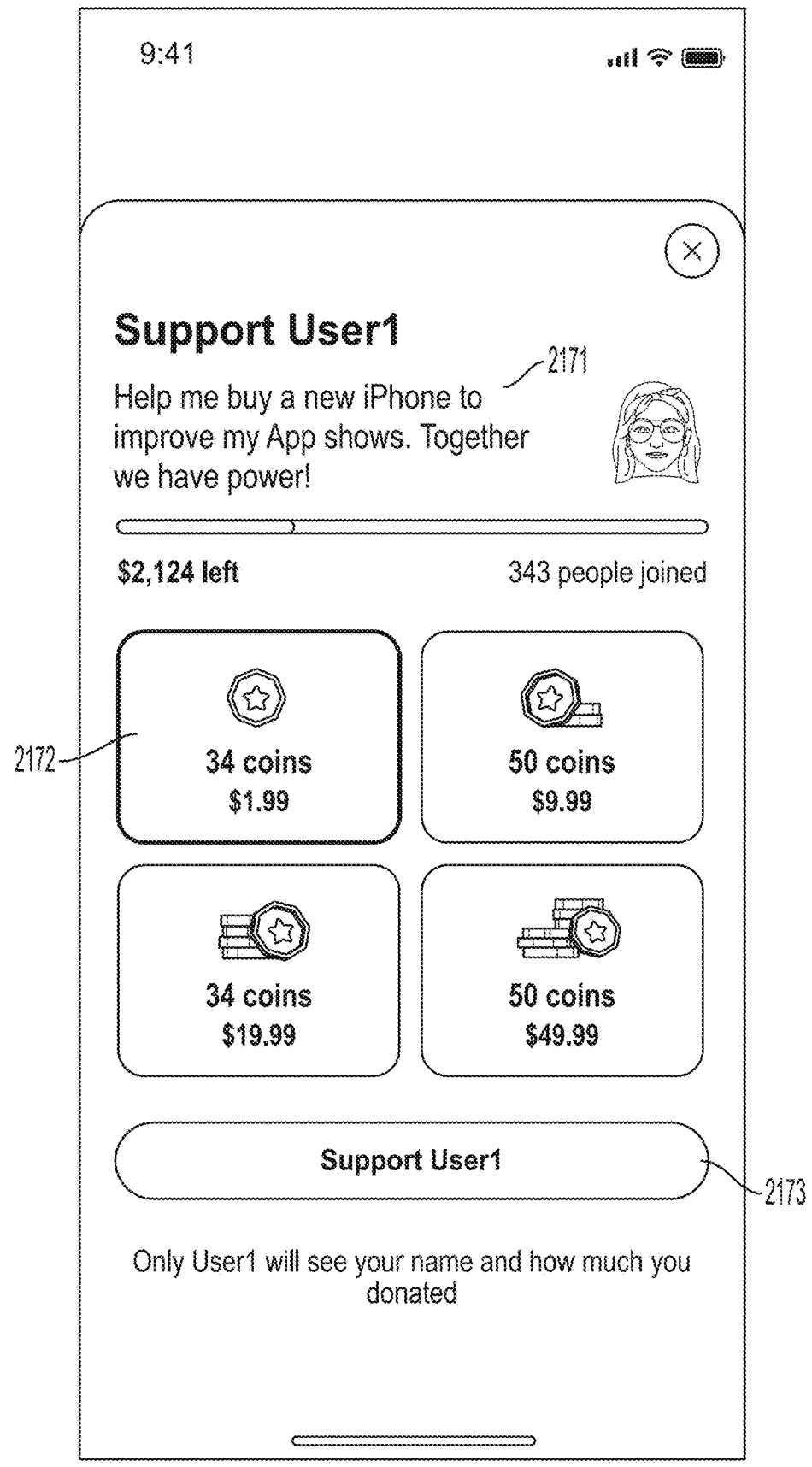

FIG. 214 shows a user profile page, which may be visible to other users on the mobile application. The profile page may have a tracking bar that shows the progress on some goal or challenge. The tracking bar may be accompanied by some message 2141 that describes the purpose of the goal or challenge. If a user selects on the "Support" option on a user profile page, they may be brought to a screen like in FIG. 217. This screen may display a message 2171 that describes an ongoing goal or challenge. The user may be presented with a number of different "Star" options 2172, where they can select a number of "Stars" to contribute to the goal or challenge. The selected amount may be finalized by selecting the "Support User" button 2173 at the bottom of the screen. A "Star" may be a type of digital exchangeable. This disclosure is not limited to any particular type of digital exchangeable.

Figure 215:
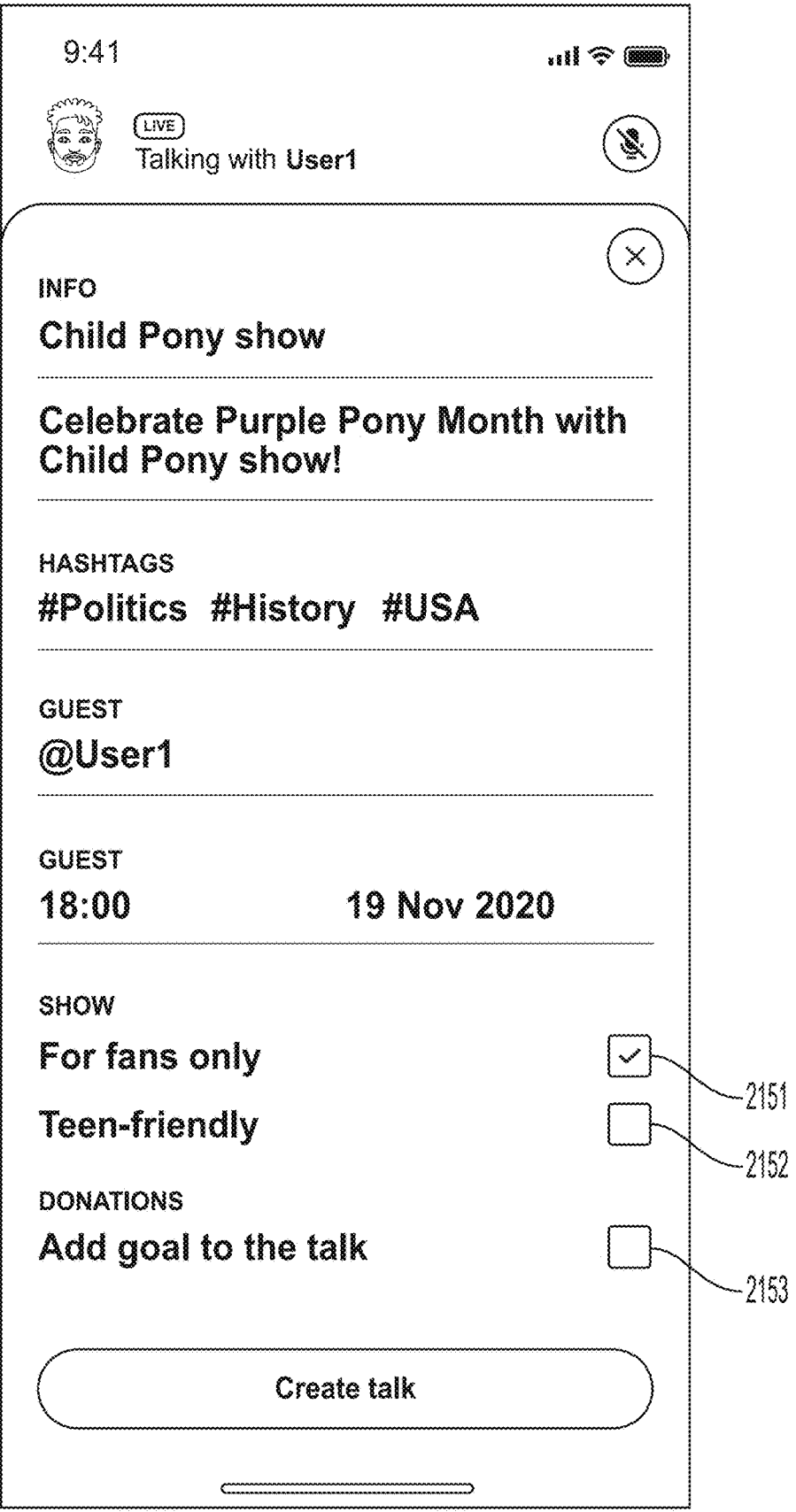
Figure 216:
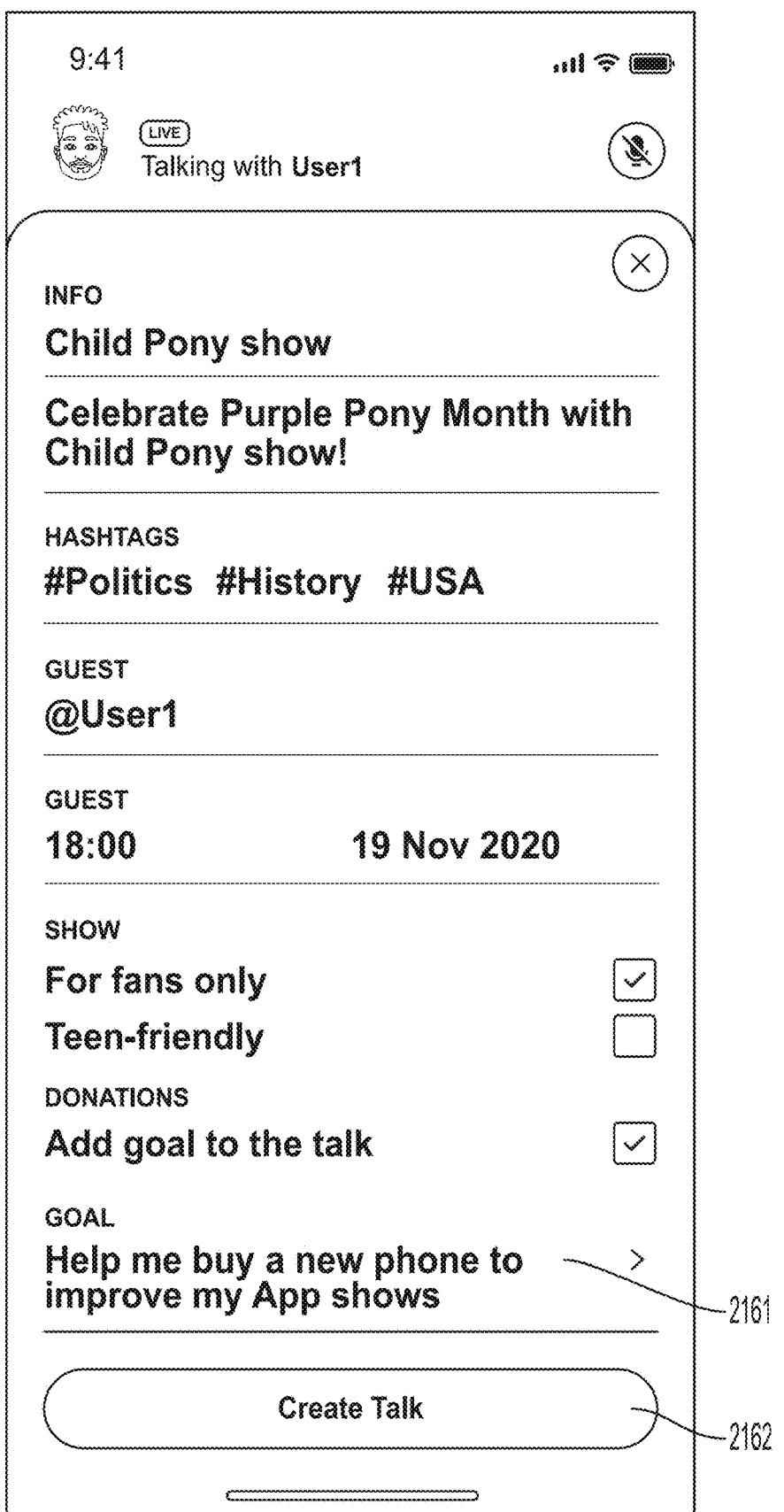

When setting up a show or audio conversation, a speaker may see a screen like that in FIG. 215 and FIG. 216. This screen may present the options 2151, 2152, 2153 to make a show for subscribers or "Superfans" only, to make a show teen-friendly, or to add a tracker for a goal or challenge to the show. These options 2151, 2152, 2153 may have a check mark or blank box displayed next to them that can be toggled on or off. If a speaker selects option 2153 to add a goal or challenge, they may be able to edit the accompanying text in field 2161 that will be displayed during the show or audio conversation.

Figure 218:
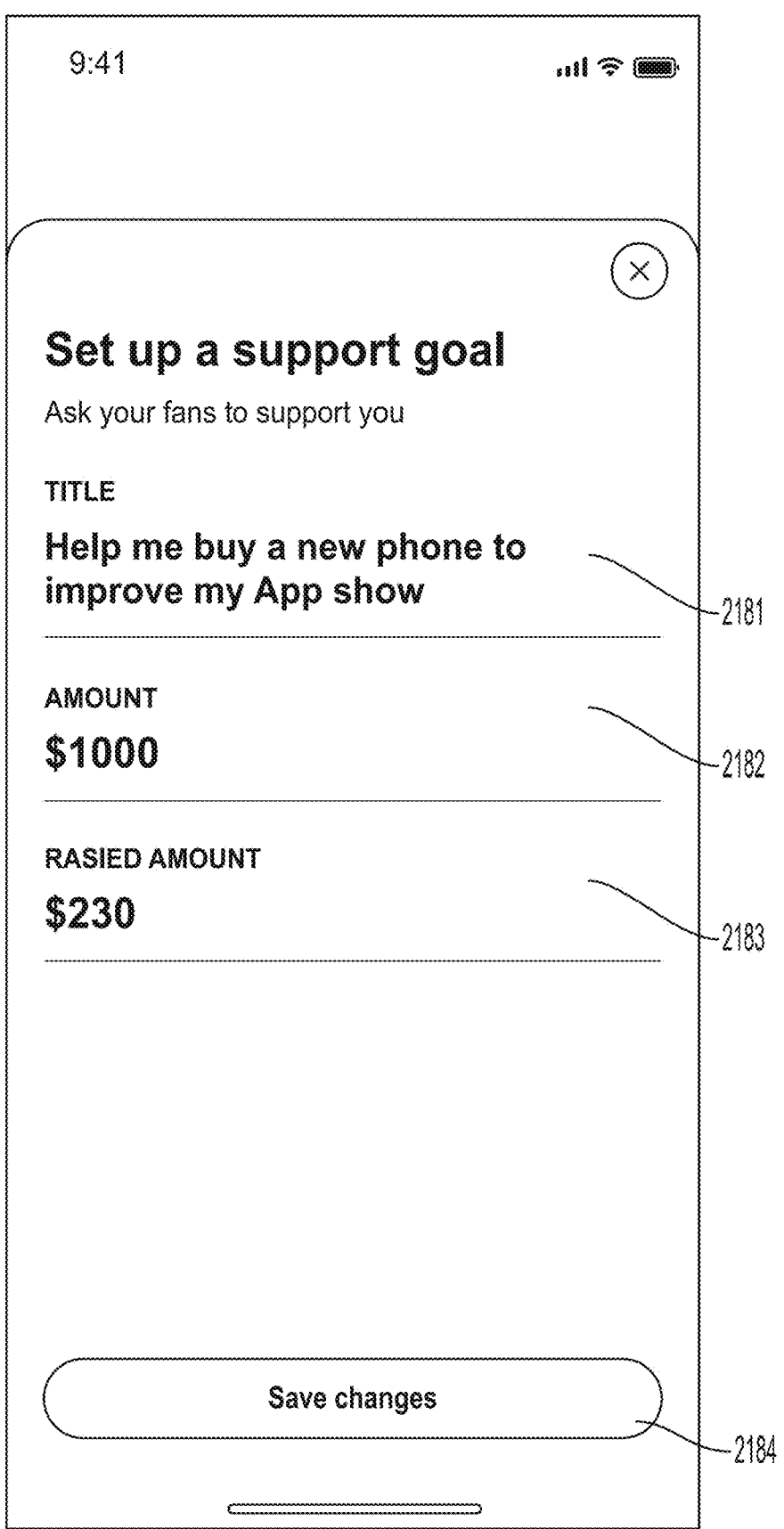
Figure 219:
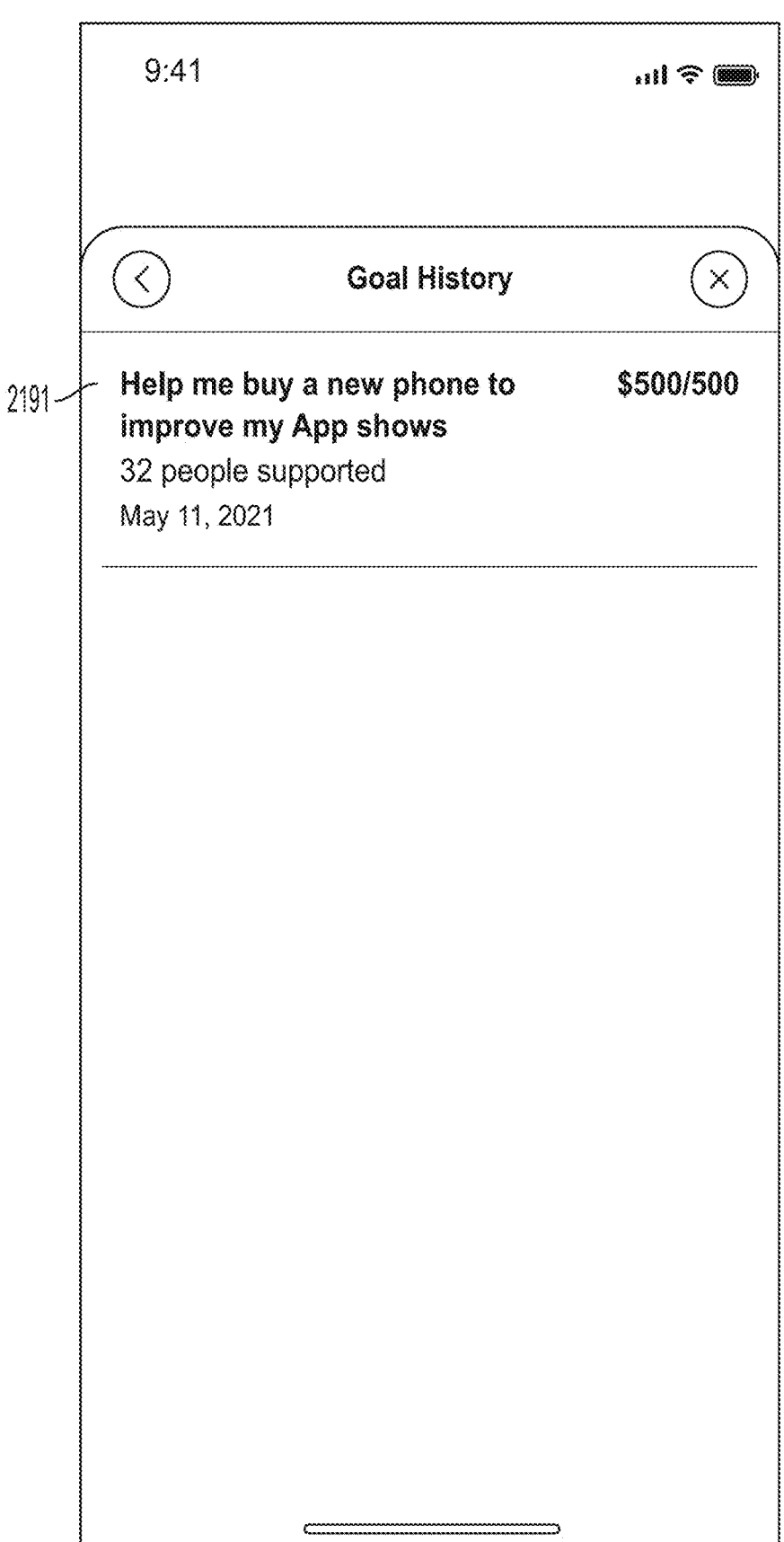

When setting up or editing a support goal, a speaker may be presented with a screen like in FIG. 218. This screen may have an editable "Title" field 2181, where the speaker can edit the description of the goal or challenge. They may be able to set an amount for the goal or challenge by editing field 2182. They may be able to see how much has been raised (e.g., amount of received digital exchangeables) already by viewing field 2183. A speaker may view their history associated with goal or challenges, as seen in FIG. 219. The speaker may see a past goal or challenge 2191 that is described and has associated amounts (e.g., raised amount/goal amount of digital exchangeables) displayed next to it.

Figure 220:
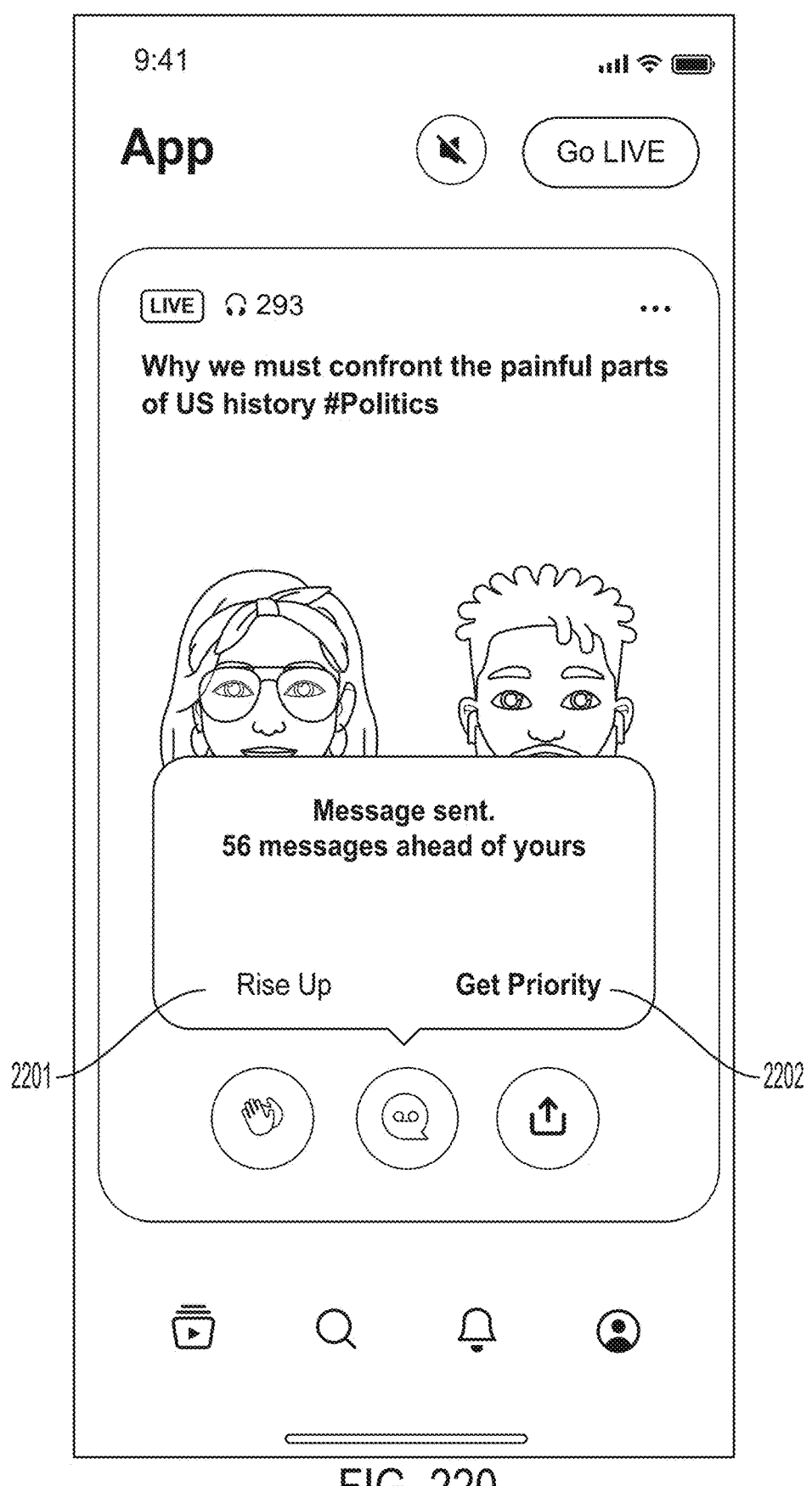

When sending an audio message, a listening user may see a message, as seen in FIG. 220. This message may present an option 2201 to "Rise Up," or an option 2202 to "Get Priority." Both of these options 2201 and 2202 may present a user with different means to make their audio message more visible to the speaking user. In some embodiments, audio messages on an audio message queue or list are arranged from top to bottom in order of which they are received by the speaker. For example, selecting "Rise Up" and executing a computing operation that transmits a digital exchangeable to the speaker enables a first listener's message to rise up to the top of the audio message queue (along with an indication to the speaker that the listener executed a computing operation to rise to the top of the audio message queue). If a second listener executes a "Rise Up" computing operation after the first user executes their "Rise Up" computing operation, that user's audio message will rise up to the top of the audio message queue. If the first listener wants his or her audio message to be back up at the top of the audio message queue, that first listener will have to execute another "Rise Up" computing operation. The amount of digital exchangeables associated with a "Rise Up" computing operation may be fixed by the mobile application or may be defined by the speaker in some embodiments.

Figure 221:
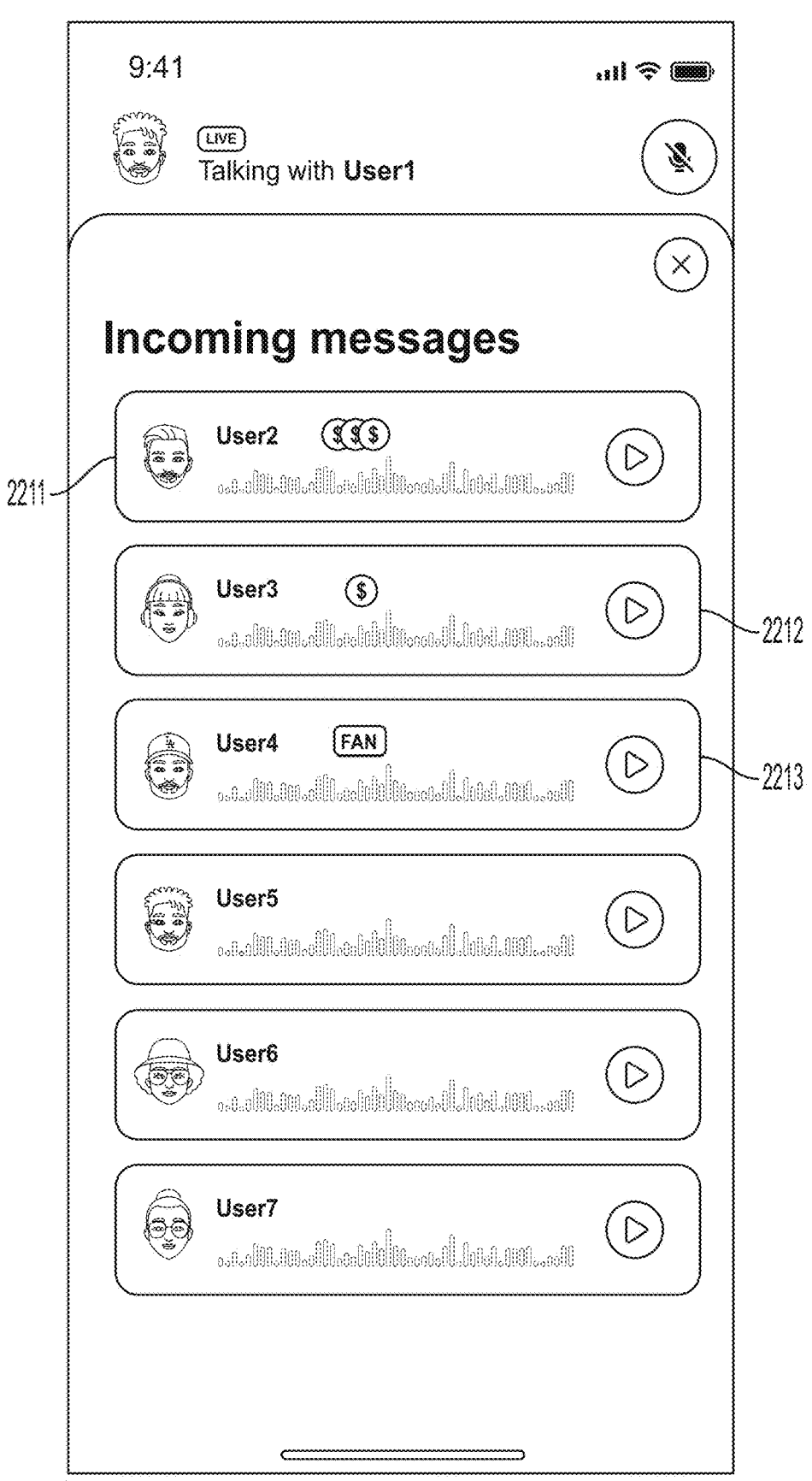

FIG. 221 shows the incoming audio messages from the perspective of a speaking user. Messages 2211 will have an associated play button 2212 and a soundwave description 2213 indicating the content of the audio message. The messages 2211 may have different colors or associated tags, labels, or symbols based on whether they came from a subscriber or "Superfan" or if they have been given priority through some other means. For example, in FIG. 221, User2 executed a "Rise Up" computing operation three times for User2's audio message 2211 to be placed at the top of the audio message queue. As a further example, User3 executed a "Rise Up" computing operation once for User3's audio message 2212 to be placed second on the audio message queue. As further example, User4 is a "Superfan" or sub- scriber and therefore is placed below the listener users who have executed "Rise Up" computing operations but above regular listener users whose audio messages are arranged in the other in which they are received. In some embodiments, a speaker may decide which of the audio messages in the queue to play and in what order. In some alternate embodi- ments, the speaker may be unable to play the audio messages from User5, User6, and User7 unless the speaker plays the audio messages from User 2 and/or User3 and/or User4. In some embodiments, the speaker may not be able to stop playing messages from User2, User3, and/or User4 once they begin playing. In some embodiments, the speaker may be able to stop playing messages from User5, User6, User7, and/or User4 once they begin playing.

Figure 222:
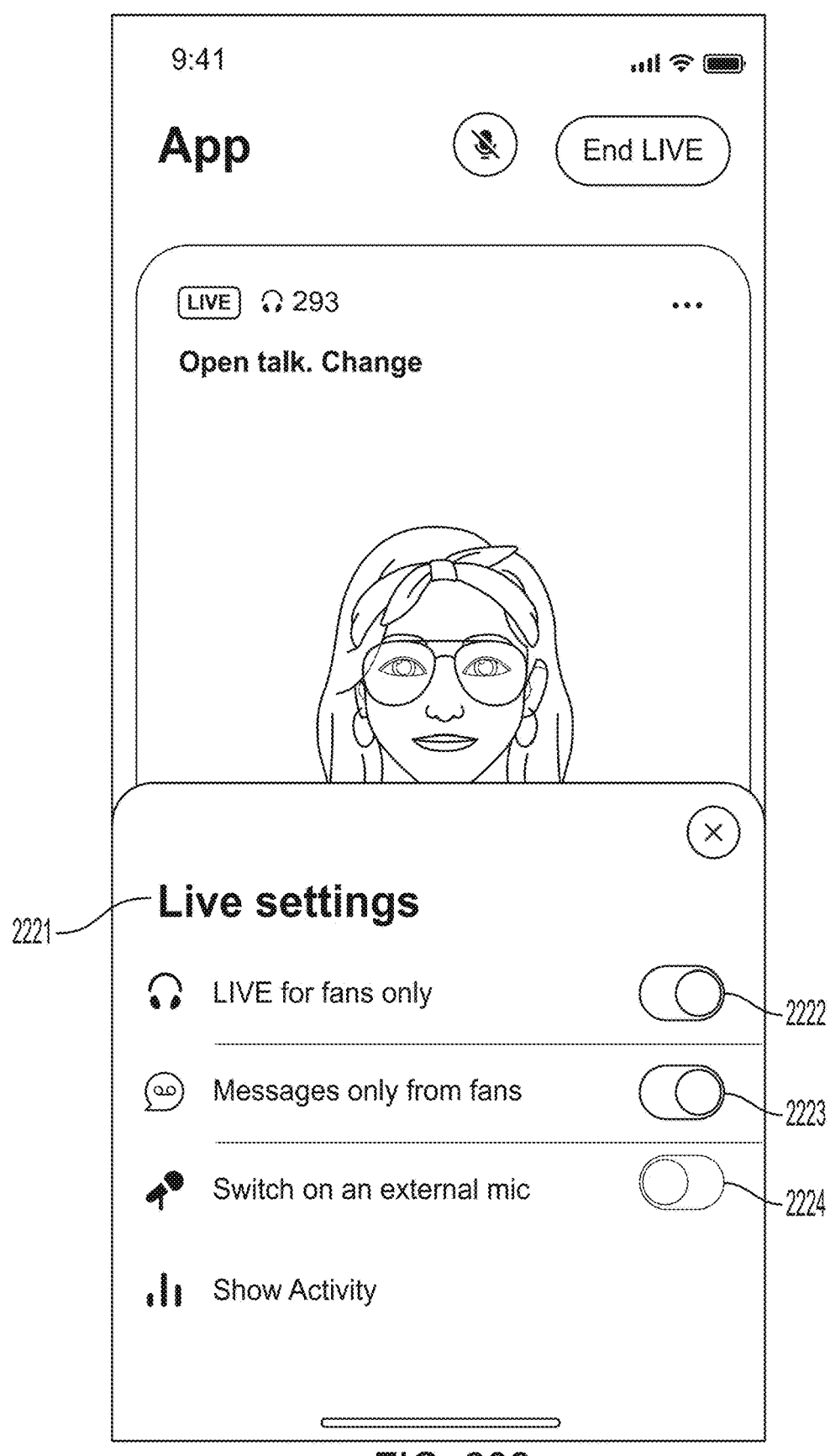

As seen in FIG. 222, prior to or during a live show or audio conversation, a speaker may change the settings 2221, to allow only subscribers or "Superfans" to listen to the show when it is live 2222, and/or allow only audio messages from subscribers during the show 2223, and/or turn on microphone 2224. A speaker may also be able to view activity associated with the show including statistics asso- ciated with listeners joining the show, subscribing to the show, viewing the display associated with the show, etc.

In some embodiments, a first user may log onto a mobile application on their mobile device (or other computing device). A second user may also log onto the application on their mobile device (or other computing device). Upon logging in, in some embodiments, the first user may be presented with a user interface that displays another user's profile (when in conversation mode) as part of a feed of user profiles, or that displays the first user's profile. The feed may be established when the first user enters conversation mode and may refresh (or remain static) when the first user swipes (e.g., left or right) or performs another action to move to a conversation with a third user. The feed includes users who are indicated as being live (or logged in, e.g., in conversation mode) to the mobile application at the time the feed is generated. In embodiments where the mobile application has both conversation mode and listening mode, both users would need to be in conversation mode. In some embodi- ments, the mobile application may have only conversation mode and not listening mode. In conversation mode, the second user (who is also in conversation mode) is matched or selected for the first the user, and the first user is placed in an instantaneous audio conversation with the second user. The audio conversation may be for a limited initial or first period (e.g., 30 seconds, 1 minute, 3 minutes, 5 minutes, etc.), and the duration used or the duration remaining of the first period in the audio conversation may be visible to at least one of the first user or the second user. In some embodiments, the duration used or remaining may not be visible to the second user on the second mobile device. In some embodiments, a countdown clock may be present to indicate the duration used or remaining.

The second user may be selected for placement into the feed for the first user based on preferences or attributes (e.g., first user information) set by the first user, preferences or attributes (e.g., second user information) set by the second user, other rules established by the mobile application, mobile application history associated with the first user or the second user, etc. For example, preferences (set by a user as to what they are looking for) or attributes (e.g., the user's attributes) may include age, location, distance from user's location, gender, sexual preference, hobbies, physical char- acteristics, languages spoken, education, profession, salary or pay, demographic preferences, etc. Matching history or the user's activity on the mobile application may also be considered. For example, if the second user was previously presented to the first user and the first user terminated the audio conversation with the second user prior to the end of the first period, the second user may not again be part of the feed (unless the first user refreshed the settings or matches on their mobile application). During the audio conversation, the first user's visual representation (established by the first user) may be visible on the mobile device of the second user, and the second user's visual representation (established by the second user) may be visible on the mobile device of the first user. In some embodiments, the audio conversation may start off such that the first user cannot view the visual representation of the second user, and may be viewed after the conclusion of the first period (or the entire audio con- versation including the extended periods). In some embodi- ments, the first user may execute a digital exchangeables- based operation to view the visual representation of the second user. The visual representation of any user described herein may include a visual representation such as an avatar, emoji, or other non-photo or video visual representation of the user, or any other visual representation described in this disclosure. In alternate embodiments, the visual representa- tion of any user described herein may include a photo or video of the user (e.g., captured within the mobile applica- tion by the user or uploaded by the user). In alternate embodiments, the visual representation of any user may include a live video of the user. A user may also choose to not present a visual representation. The first user may move through a user feed by swiping left (or right) (or by selecting an option such as 'x' associated with the second user) on the user interface of the first user's mobile device for ending the live conversation with the second user and moving on to an instantaneous live audio conversation for a limited initial or first period with a third user. When viewing the second user's profile during the audio conversation, the first user may view a limited amount of information on the profile. The first user may need to execute a digital exchangeables- based computing operation to view additional information associated with the second user (e.g., photos, links to third-party social media account, videos, stories or updates posted by the second user to their mobile application profile, etc.).

In some embodiments, any functions executed by a first user may only be executed after the first user executes a computing operation that results in transmission of digital exchangeables from the first user's account or bank or wallet (located in the mobile application or external to the mobile application) to an account or bank or wallet belonging to the mobile application, and/or to an account or bank or wallet of the second user (located in the mobile application or external to the mobile application). Any reference to a digital exchangeables-based computing operation includes a com- puting operation that results in transmission of digital exchangeables from a user's account or bank or wallet (located in the mobile application or external to the mobile application) to an account or bank or wallet belonging to the mobile application, and/or to an account or bank or wallet of a second or other user (located in the mobile application or external to the mobile application). Any features associated with any functions described herein may be combined with any other features associated with any other functions described herein.

During the initial period of conversation (or during any other extended period of conversation), either user may terminate the audio conversation by selecting an option on the user interface or performing an action (e.g., a swipe right, left, top, or bottom on the screen displaying the visual representation or other information of the user who is being spoken to). If neither user terminated the conversation, upon termination of the initial period or prior to the termination of the initial period, the first user (or the second user) is presented with an option to extend the audio conversation with the other user. In some embodiments, selection of the option causes a digital exchangeable-based computing operation to be executed, and upon successful execution of that computing operation, the audio conversation is extended for a certain period (e.g., 3 minutes, 5 minutes, etc.). The audio conversation may continue seamlessly while the computing operation is executed, and the second user may be aware or receive notification (and in some embodiments, may not be aware or receive notification) that the first user extended the conversation. In some embodiments, the first user may execute a digital exchangeables-based computing operation such that the first user achieves a higher status (e.g., subscriber status). The subscriber status may be obtained prior to or during the audio conversation (e.g., the initial period or an extended period) with the second user. A subscriber user may benefit by having longer initial periods of conversation, longer extended periods, higher number of audio conversation extensions, etc. In some embodiments, a regular user may extend the conversation only a certain number of times (e.g., by executing a digital exchangeables-based computing operation each time). In some embodiments, the amount of digital exchangeables may be proportion to the duration of the extension and may be set or selected by the first user at the time of or prior to executing the digital exchangeables-based computing operation. In some embodiments, executing a digital exchangeables-based operation may additionally or alternatively provide the first user with access to view or access at least one of the second user's social media account information (e.g., associated with third party social media accounts), photos, videos, other information provided by the second user, contact information, etc. In some embodiments, the first user may execute a digital exchangeables-based computing operation (e.g., transmitting a larger number of digital exchangeables compared to that required to obtain extension periods), that enables the first user to have a conversation of unlimited duration with the second user.

In some embodiments, if the first user does not execute a digital exchangeables-based computing operation prior to or immediately at termination of the first period, the next user (e.g., a third user) in the user feed is presented to the first user on the first user's mobile device, and an audio conversation (e.g., a for a limited first period unless the first user is a subscriber) is immediately started between the first mobile device of the first user and the third mobile device of the third user. The third user is selected in the same way as the second user was selected. The second user may be added to the first user's conversation history.

In some embodiments, the first user may have access, on the mobile application, to their speaking history on the mobile application. This includes the list of and information associated with users that they talked to and statistics associated with those audio conversations (duration of audio conversation, whether extended, who terminated the audio conversation and after how long, etc.). If the user talked to a certain user for less than a certain amount of time (e.g., 30 seconds), such a user may not be included in the history. In some embodiments, all users may be included in the history. The user may need to obtain a subscription (e.g., by executing a digital exchangeables-based computing operation) or execute a different digital exchangeables-based computing operation to view additional information (e.g., social media profiles, profile updates, additional media such as photos or videos, etc.) associated the users that the user previously talked to, as indicated in the history portion of the user's mobile application account. If the user is a subscriber or executes another digital exchangeables-based computing operation, the first user may have (1) an option to propose (e.g., send an invitation) or schedule an audio conversation with users listed in the first user's history or other users recommended to the first user or other users that the user uncovers in a search of offline (e.g., those currently not online or logged into the mobile application or those logged in and in listening mode) and online users (e.g., those currently online and logged into the mobile application and in conversation mode), and/or (2) an option to receive a notification when certain users (e.g., as selected by the first user from the first user's history) are live or online or logged into the mobile application (i.e., in conversation mode). In some embodiments, the first user may be provided with an option to rate (e.g., like or dislike) users listed in the first user's history. If the first user liked certain users, the first user may be alerted when those users are live or have logged into the mobile application. In some embodiments, if the first user is a subscriber or executes a digital exchangeables-based computing operation, the first user can presented to the target user (selected as a target by the first user) in the target user's feed when the first user is live or has logged into the mobile application (in conversation mode). In some embodiments, during or after termination of the audio conversation with the second user, the first user may have an option to rate the second user (e.g., with a like or dislike) and an option to enter notes or thoughts associated with the second user. In some embodiments, the mobile application may learn potential likes or dislikes for a user over time (e.g., using big data or artificial intelligence operations) and improve the quality of matches presented in the user's feed. A user's previous audio conversations, including content, tone, mood, accent, etc., may be taken into account in such big data or artificial intelligence operations. In some embodiments, a user may establish some preferences for matches only if the user becomes a subscriber or executes a digital exchangeables-based computing operation.

Either the first user or the second user, or a listener of the audio conversation, may share a link with other users of the mobile application or to external users (e.g., via text message or social media message) with a link to listen in to the conversation. Therefore, the present disclosure provides a method for a first user to crowdsource feedback associated with a second user, or vice versa.

In some embodiments, a listener who access the mobile application (in listening mode) on the listener's mobile device may listen in to the audio conversation between the first user and the second user. During the audio conversation (e.g., initial period or extensions), the listener may provide feedback individually to either of the speakers or to the speakers collectively, e.g., via visual or audio reactions which may be automatically played by the mobile application during the audio conversation and/or via audio messages (e.g., associated with less than or equal to a certain duration) or calls to one or both of the speakers in the audio conversation or via visual messages (e.g., using graphics, text, etc., to one or both of the speakers in the audio conversation) such that the speaker who receives the message has the ability to view it or play it (whenever they decide to) in private or public (e.g., to the listeners and speakers in the conversation). In some embodiments, the listener may be provided with a voting option for either liking or disliking at least one of the audio conversation, the first user, or the second user. In some embodiments, if the "like" votes for the audio conversation exceed a certain threshold by the termination of the first period, the audio conversation may be automatically extended into the first extension period (e.g., without the first user having to execute a digital exchangeable-based computing operation). In some embodiments, prior to or at termination of the first period of the audio conversation, a listener may execute a digital exchangeables-based computing operation so that the audio conversation between the first user and the second user can be extended into the first extension (e.g., without the first user having to execute a digital exchangeables-based computing operation). In some embodiments, the audio conversation between the first user and the second user may be automatically extended based on positive reactions (e.g., exceeding a certain threshold) of the listeners. In some embodiments, a listener may execute a digital exchangeables-based computing operation to appear as the next user (or join the waitlist) to talk to either the first user or the second user (as selected by the listener). As more users join the waitlist, the user may be able to rise up further on the waitlist by executing more digital exchangeables-based computing operations compared to the other users on the waiting list. Any features described herein with regard to audio messages (e.g., rise up features) may apply to this embodiment in that the listener may rise up on the waitlist to talk to the first user or the second user.

In some embodiments, the audio conversation between the first user and the second user may be conducted in private without any listeners. In some embodiments, both the first user and the second user would need to select an option to broadcast for the conversation to be broadcasted to listeners. In some embodiments, a single user's approval would not be enough. In some embodiments, the conversation during the initial period is broadcast to listeners, but conversations in extended periods can be private (not audible to listeners) if either or both of the speakers select the option to speak in private. In some embodiments, the conversation during the initial period (and/or the extended periods) can be private if the first user executes a digital exchangeables-based computing operation.

The second user may be logged into the application (e.g., in conversation mode) simultaneously as the first user for them to be matched with each other or placed in each other's user feeds and thereby appear on each other's user interface or screen. In some embodiments, the first user may then be able to input a positive or negative indication based on the other user's presented profile. A positive or negative indication may be input by selecting positive or negative options on the user's interface, swiping left or right, or some other interaction (including voice instructions) with the mobile device screen.

In some alternate embodiments, if both users input a positive indication upon viewing each other's profile, they may enter into an instantaneous voice chat with each other. There may be some visual indication on the application screen to indicate that one of the users is speaking. The voice chat may be limited in time or duration, and may instantly end once the time is up. The application screen may display some visual indication that the voice chat is about to end, such as a timer, change in color, etc.

In some embodiments, the users presented to another user might be determined in advance or in real-time. The users presented might be presented based on some set of rules or preferences. A user might input their age, gender, location, education, social media information, sexual preference, hobbies, interests, physical attributes, etc. A user might input preferences for another user's age, gender, location, education, social media information, sexual preference, hobbies, interests, physical attributes, etc. These input preferences might be compared to another user's input attributes, to assist a matching computing operation in presenting users to another user's screen.

In some embodiments, a user profile may contain questions or statements for another user to view or respond to. These questions or statements might appear during an audio conversation, or may appear when a user is viewing another user's profile. A user may be able to create a response to the questions or statements. Questions, statements, or responses may be in text form or they may be audio clips.

In some embodiments, a user profile may contain "boxes." These boxes may be comprised of images, videos, comments, biographical information or statistics, preferences, attributes, prompts, etc. One user may be able to view and "like" boxes, and doing so may prompt the user to interact further with the user associated with the boxes.

In some embodiments, a user may receive a notification when another user interacts with an element on their profile. A user may only be able to see a limited amount of information about another user who has interacted with their profile. Any photos or visual representations associated with a user may be blurred when interacting in this manner. A user may be able to unlock further information about the other user based on how they respond to a notification or initial interactions.

In some embodiments, a user may be continuously presented with users who have "liked" or interacted with content on the original user's profile. The original user may select to move forward with responding to one user, or may be immediately presented with another user. When responding, a user may be able to create a response, which may be comprised of text or audio.

In some embodiments, a user's profile might be represented by a visual representation. This visual representation might include a photo, a video, a .gif or looped image, an avatar, or some other depiction. A user might be able to change the visual representation associated with their account. A user might be able to add additional visual representations to their account or profile. This visual representation might be presented to another user whenever a user's account information or profile is presented on the application on the other user's mobile device.

In some embodiments, upon the termination of a voice chat (or talk) between users, a user may be presented with the option to extend the voice chat for an additional amount of time or duration. A user may select this option by executing a computer operation to send a digital exchangeable to the application and/or to the other user. In some embodiments, a user may be notified that another user has extended the voice chat session they were participating in. The users may be reconnected for another voice chat session. The voice chat session may be extended in this fashion a limited number of times, or may be extended an infinite number of times. A user may be presented with the option to make the voice chat continue indefinitely.

In some embodiments, upon the termination of a voice chat between users, a user may presented with the option to view the other user's full profile and information. This profile may include a user's social media information, contact information, additional visual representations, etc. A user may select this option by executing a computer operation to send a digital exchangeable to the application. In some embodiments, a user may be notified that another user has accessed their full profile.

In some embodiments, the option to extend a voice chat or view a user's profile might be available to a user with a subscription. A user may obtain a subscription by executing a computing operation to send a digital exchangeable to the application.

In some embodiments, if a user inputs a negative indication for a user presented on the user's screen, a user may be presented with a screen displaying a new user's profile, and may be connected to a voice chat with a new user. The profile might have a visual representation associated with it, similar to above. The voice chat may be of limited duration, similar to above. A user might be presented with the option to input a positive or negative indication, similar to above. The users presented to another user might be based on a computing operation utilizing a user's input preferences or attributes, similar to above.

In some embodiments, when a voice chat has terminated, a user may be presented with a screen displaying a new user's profile, or may be connected to a voice chat with a new user. The profile might have a visual representation associated with it, similar to above. The voice chat may be of limited duration, similar to above. A user might be presented with the option to input a positive or negative indication, similar to above. The users presented to another user might be based on a computing operation utilizing a user's input preferences or attributes, similar to above.

In some embodiments, a user may view a list of other users that they have engaged in voice chats with. The users who they have engaged in a voice chat with may be displayed with an associated visual representation. A user may be able to select a user that they have engaged in voice chat with and may be presented with a list of options. These options may include: viewing the other user's full profile information (which may include the user's social media information or additional visual representations), initiating or proposing to initiate a new voice chat session (which may be of limited duration) or letting the user know that they have logged into the mobile application and are available to have a voice chat, or enabling notifications to be sent to the user's mobile application when the user that they have engaged in voice chat with logs back into the application. These options may be selected by way of the user executing a computing operation to send a digital exchangeable to the application. Alternatively, these options might be available to a user with a subscription. A user may obtain a subscription by executing a computing operation to send a digital exchangeable to the application. In some embodiments, a voice chat or an audio conversation is an audio-only conversation (and no video). In some embodiments, a voice chat or an audio conversation includes video along with audio.

In some embodiments, users may be able to listen to voice chats between two users paired via the processes above. The voice chat may be broadcast to an audience of users logged (e.g., in listening mode) into the mobile application. The users engaged in the conversation may not be able to see any indication of who is listening. Alternatively, there may be a list or display of the users listening to the voice chat that the speaking users may view. In some embodiments, the listeners may view the profiles of other listeners listening in to the audio conversation.

In some embodiments, users listening to the voice chat may be able to signal to the speaking users. They may be able to send messages or reactions to the speaking users. Messages or reactions might be displayed on the application screen for both listening and speaking users to view. Alternatively, the messages or reactions may be visible only to the speaking users. Messages may include audio or text based messages. Reactions may include images, emojis, or other visual displays and effects.

In some embodiments, a voice chat may be extended based on the input of the listening users. At the end of the voice chat, listening users may be able to signal that they want the chat extended. This may be input by voting, or sending appropriate reactions or messages. In alternative embodiments, a voice chat might be extended by a computing operation that looks at and interprets the messages or reactions submitted during the duration of the voice chat.

In some embodiments, listening users might be able to select the profiles of the users participating in the voice chat. Once a profile is selected, a listening user might be able to initiate or propose to initiate a new voice chat with the user who was participating in the voice chat (or join the voice chat with the users). Initiating the voice chat (or joining the voice chat) might be enabled by the user executing a computing operation to send a digital exchangeable to the application.

In alternative embodiments, a user may be connected with another user for a voice chat automatically. The voice chat may be of limited time or duration. The users might be connected based on a computing operation using a user's input preferences. A user might input their age, gender, location, education, social media information, sexual preference, hobbies, interests, physical attributes, etc. A user might input preferences for another user's age, gender, location, education, social media information, sexual preference, hobbies, interests, physical attributes, etc. These input preferences might be compared to another user's input attributes, to assist an algorithm or computer operation in presenting users to another user's screen. During the voice chat, a user might be presented with the option to extend the voice chat before it ends. The voice chat session may be extended in this fashion a limited number of times, or may be extended an infinite number of times. A user may be presented with the option to make the voice chat continue indefinitely. Extending the conversation may require a user to execute a computing operation to send a digital exchangeable to the application. A user may be shown a timer or visual indication of how much time is remaining or how much time has elapsed. A user may be presented with the option to skip to a new voice chat with a different user. Upon termination of the voice chat, a user may be automatically connected with a new user to begin a new voice chat.

FIG. 223 shows the application screen when the application may be searching for a user to voice chat with the current user. Selecting option 2231, 2241, 2255 may allow a user to view their notifications. Selecting option 2232 may allow a user to view their profile. FIG. 224 may show the application screen when a user has been paired with another user to live voice chat 7204 with. The user who is being chatted with may be shown by visual representation 2242.

Figure 226:
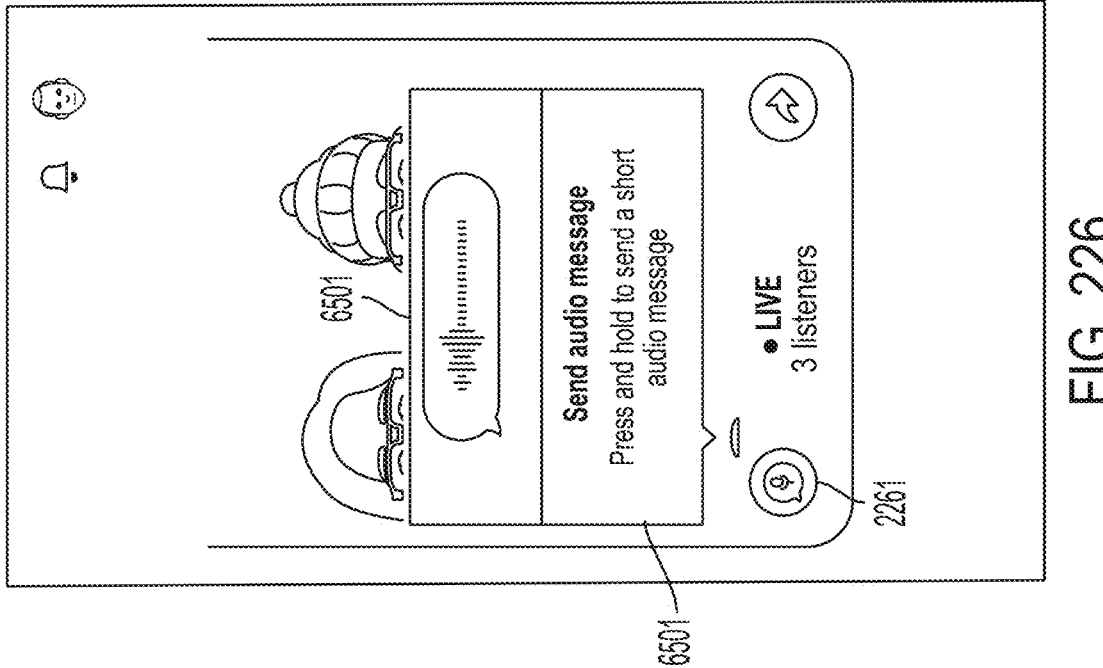
Figure 225:
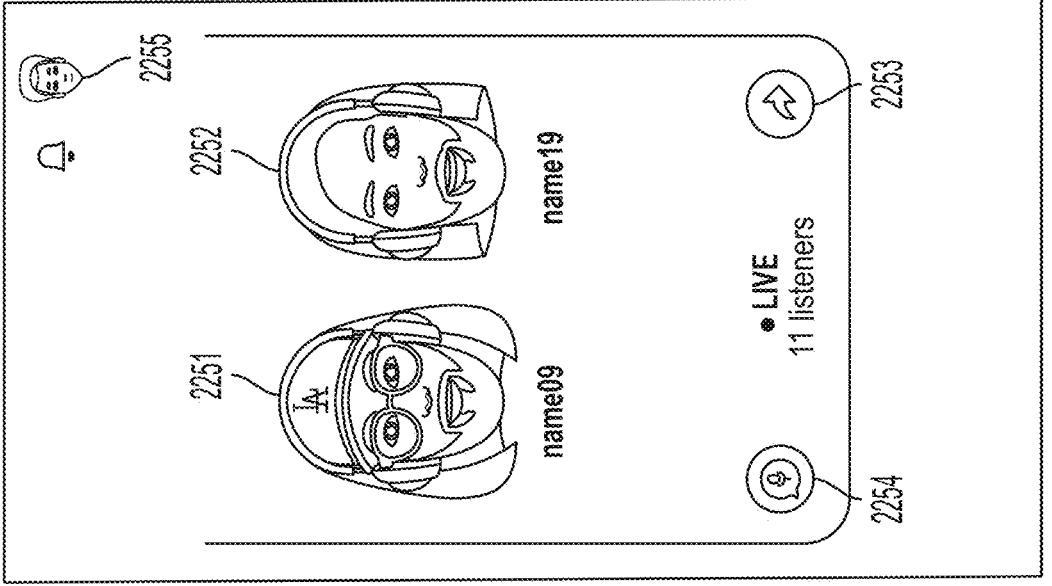
Figure 227:
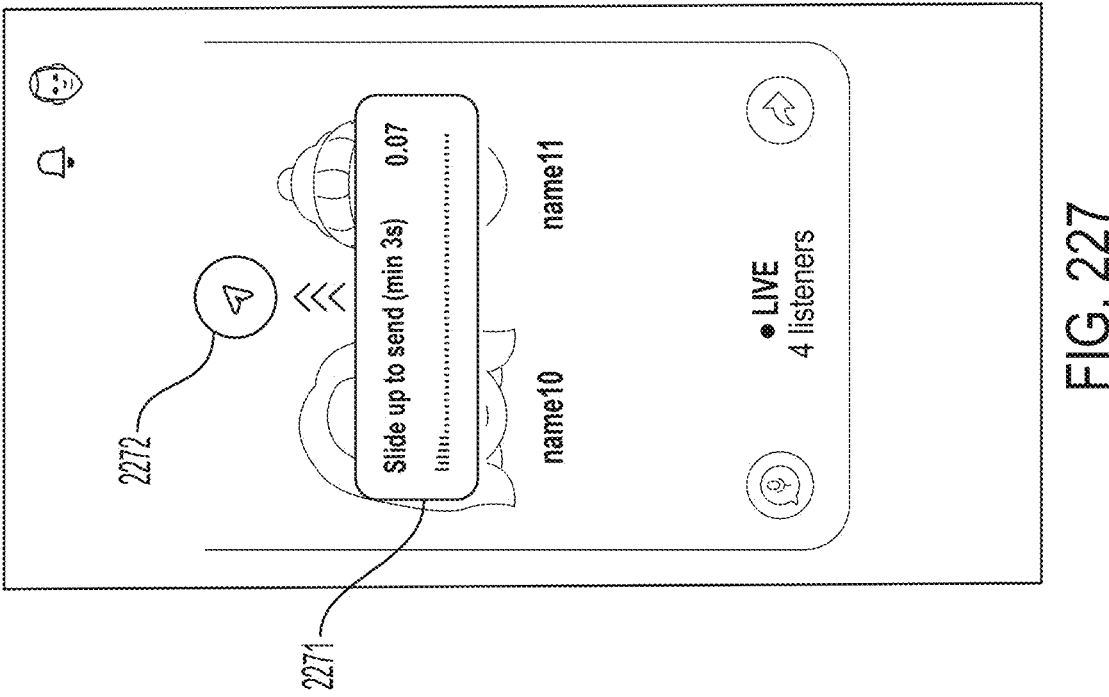
Figure 230:
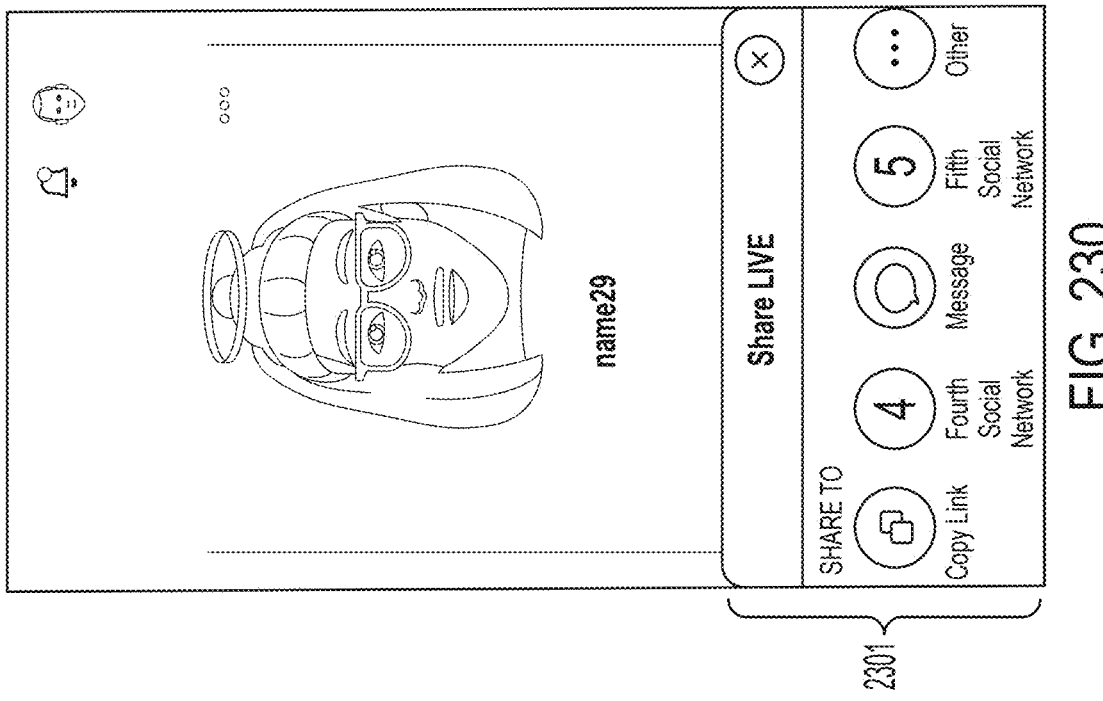

FIG. 225 shows the application screen when a user may be listening to a voice chat between two different users. The users in the voice chat may be shown by their visual representations 2251 and 2252. Selecting option 2254, 2261 may allow a listening user to send a message (e.g., audio, text, etc.) to one or both of the speaking users, or to send a reaction. Alternatively, positive reactions may be sent by first pressing repeatedly on the user interface, and negative reactions may be sent by second pressing repeatedly on the user interface. Selecting option 2253 may allow a listening user to share the voice chat they are listening to. Selecting option 2253 may bring up a list of options 2301 for sharing a link to the voice chat, as seen in FIG. 230. FIG. 226 shows the application screen when a listening user may be recording a message to send to one or both of the speaking users. FIG. 227 shows the application screen when a listening user may be able to send a finalized message. They may be prompted to send by a message 2271, and may swipe up towards symbol 2272 to send the message.

Figure 228:
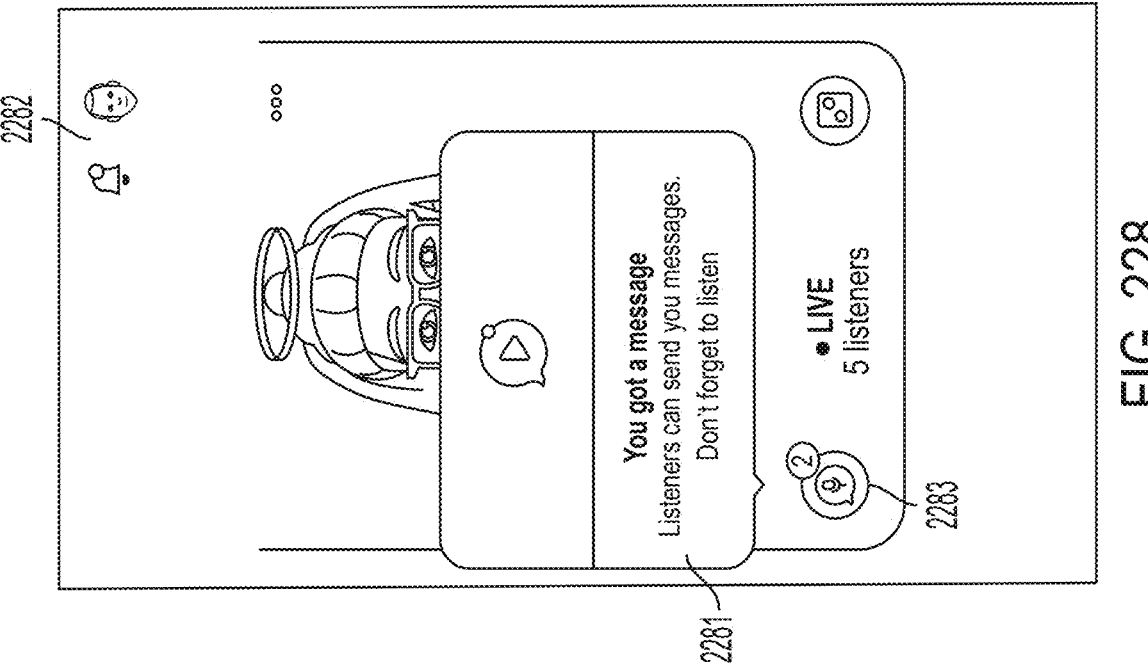
Figure 229:
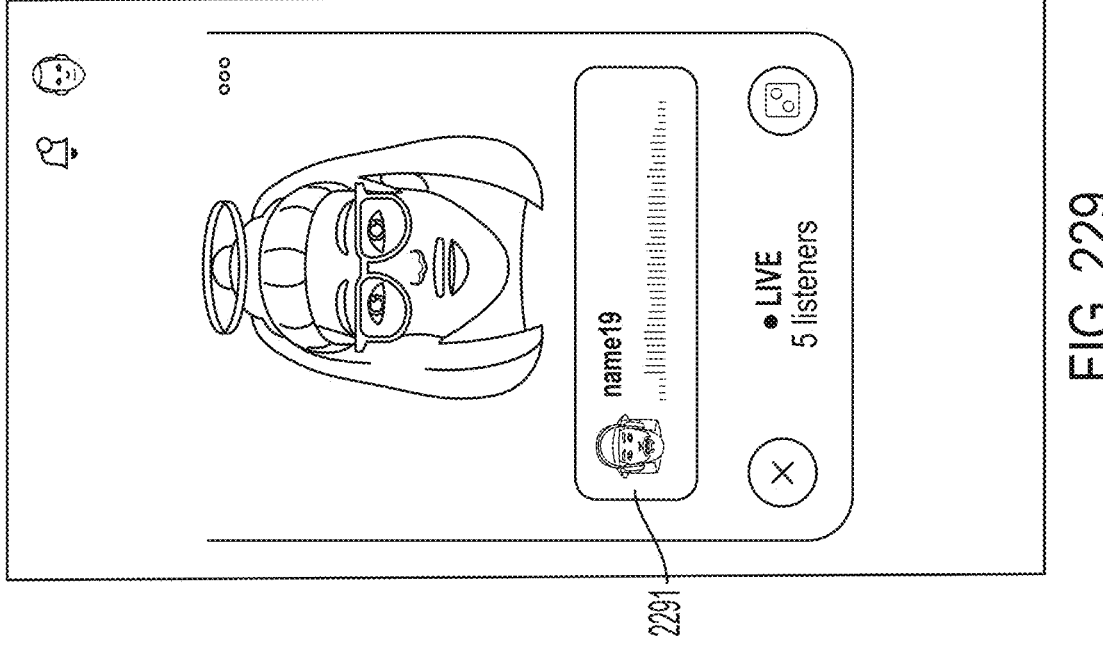

FIG. 228 shows the application screen as it may appear to a speaking user participating in the voice chat. When the speaking user receives a message from a listening user, it may be indicated by a symbol or number appearing over the message option 2283, a message 2281 appearing on the screen, or a symbol or number appearing over their notification option 2282. The speaking user may select on the message 2281 to play the message to one or more speaking and listening users. While the message plays the application screen may show a visual mapping 2291 of the message, as seen on FIG. 229.

Figure 231:
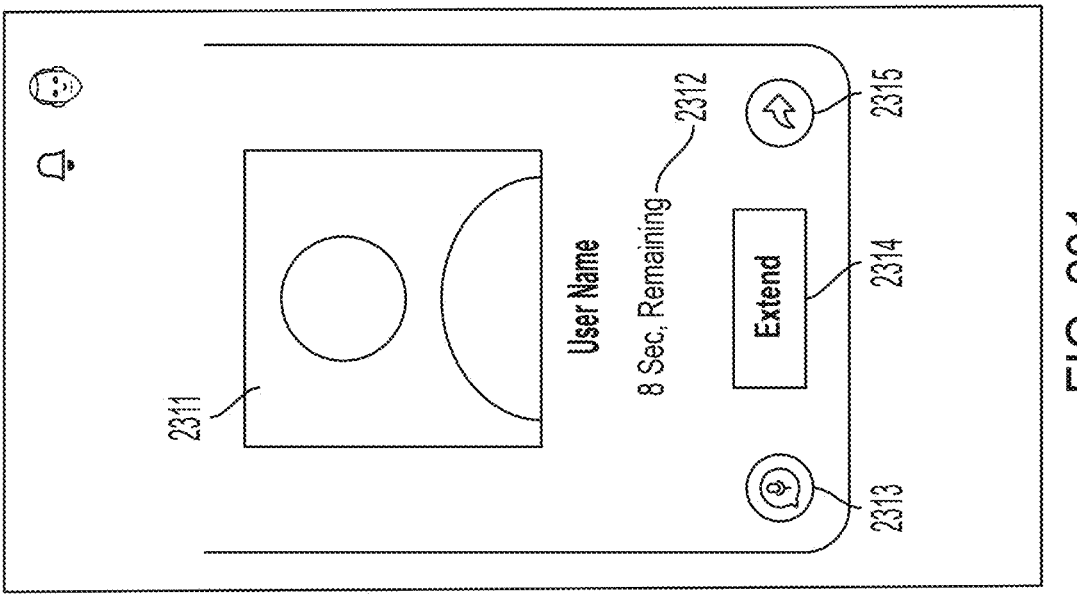

FIG. 231 shows an alternative application screen during a voice chat with another user. The screen may include a user profile or visual representation 2311, and a timer 2312 showing the amount of time remaining. A user may select option 2313 to mute themselves. A user may select option 2314 to extend the conversation. A user may select option 2315 to skip to a voice chat with a new user before the duration of the current voice chat has ended. Selecting one or more of these options might require a user to execute a computing operation to send a digital exchangeable to the application.

Figure 232:
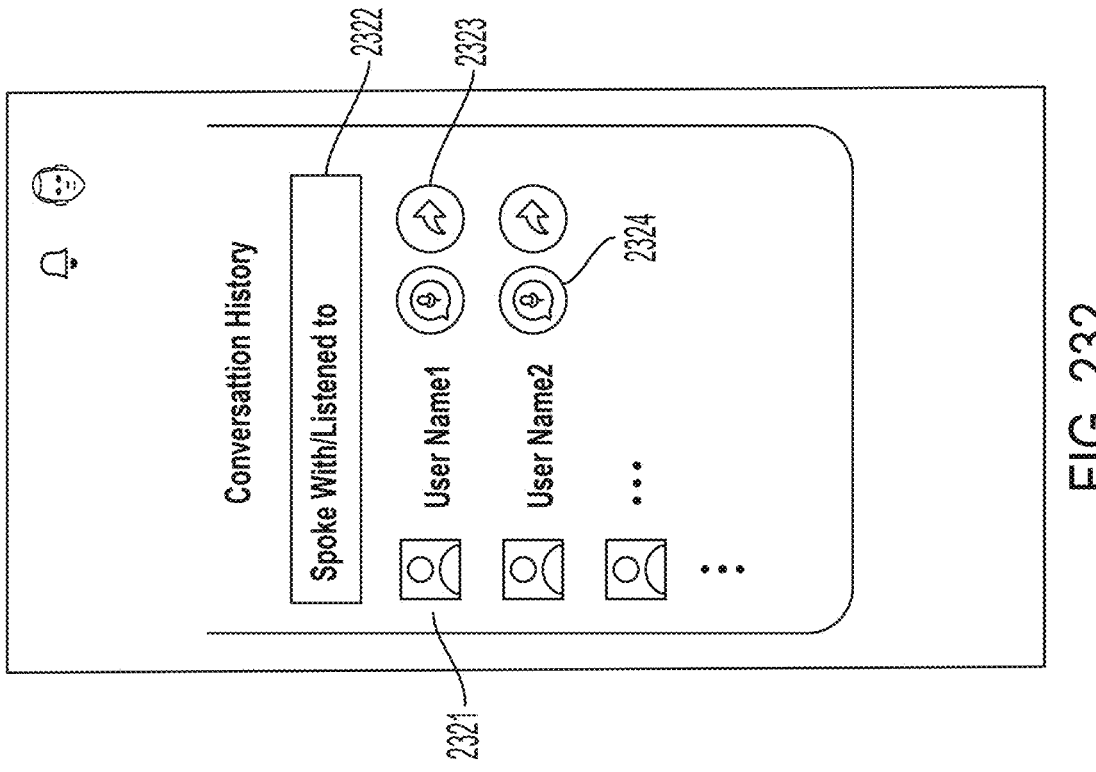
Figure 234:
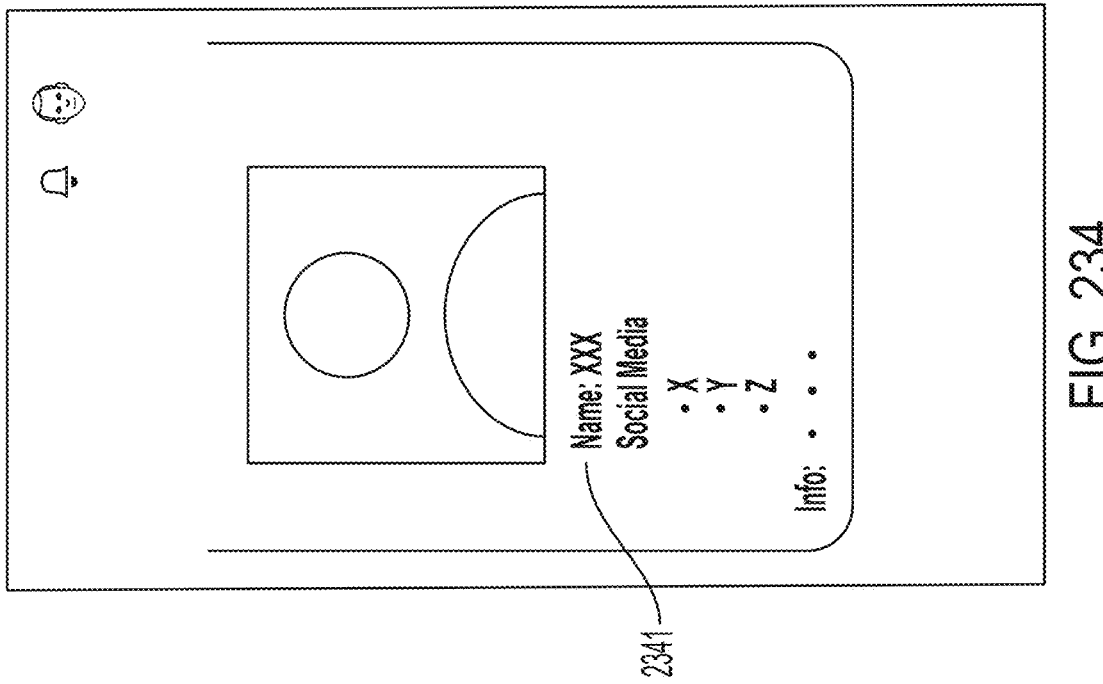
Figure 233:
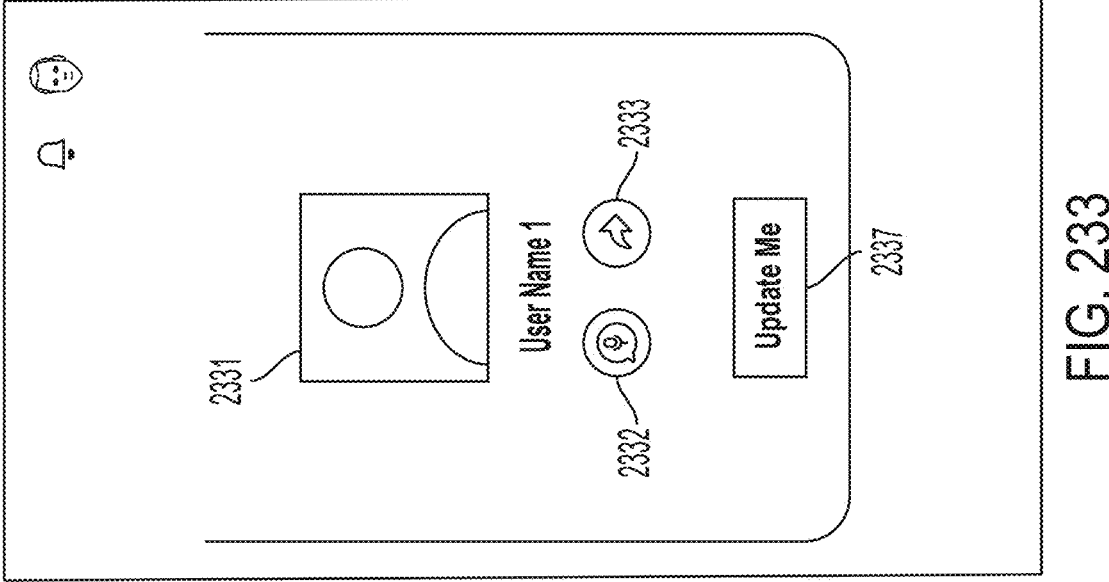

FIG. 232 shows the application screen when a user may be viewing their conversation history. An option 2322 may be selected to toggle the display between the history of voice chats they participated in and voice chats they listened to. Past users they listened to or spoke to may be displayed with their name and visual representation 2321. Next to the username may be an option 2323 that enables a user to view their full profile, or an option 2324 that initiates or proposes to initiate a voice chat. Selecting on either one of these options 2323, 2324 may require a user to execute a computing operation to send a digital exchangeable to the application prior to performing those functions. Selecting on a username or visual representation 2321 may bring up a screen like that in FIG. 233. That screen may include a close up of the user's visual representation 2331. The screen may include an option 2332, which initiates or proposes to initiate a voice chat. The screen may include an option 2333, which enables a user to view their full profile. The screen may include an option 2334, which enables updates or notification to be sent to the user's mobile device when the user associated with the currently displayed profile logs into the application. Alternatively, the option 2334 enables an update to be sent to the target user's mobile device indicating when the user who selected the option 2334 logs into the mobile application. Selecting on any of these options may require a user to execute a computing operation to send a digital exchangeable to the application prior to performing these functions. Selecting on option 2323 may bring up a screen like that in FIG. 234. This screen may include a full user profile with information about the associated user's social media, biographic data, preference information, or other information.

Figures 235, 236:
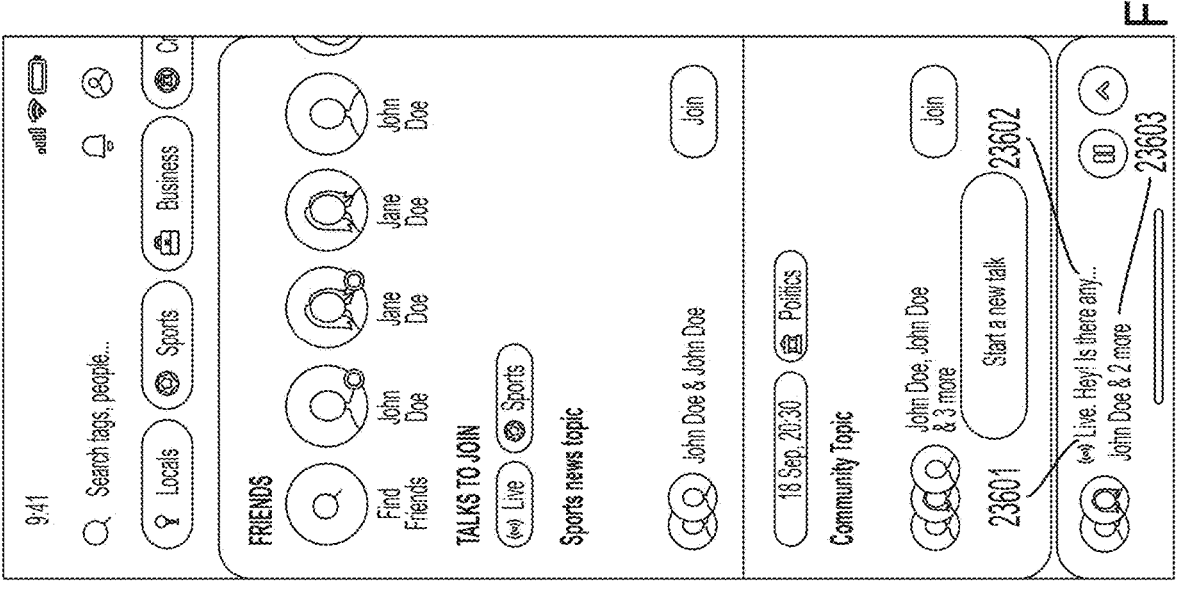

FIG. 235 and FIG. 236 show the application screen when a user is using the Discover feature, browsing, or searching through content. The application screen may display a list 23501 of audio conversations that a user can join. These audio conversations may include visual indicators 23502, 23505, 23801, 23802, 23804, 23807, 23808, 23821 signaling a topic category or descriptive operator associated with the audio conversation. The topic 23503, 23507 of the audio conversation may be displayed as well. Additionally, participating users 23504, 23507 may be displayed near the audio conversation. The screen may display a button 23509 allowing a user to start a new audio conversation. An audio conversation may display where it is live, recorded, ongoing, upcoming, etc. In some embodiments, the term "button" may refer to an option on the screen.

Figure 237:
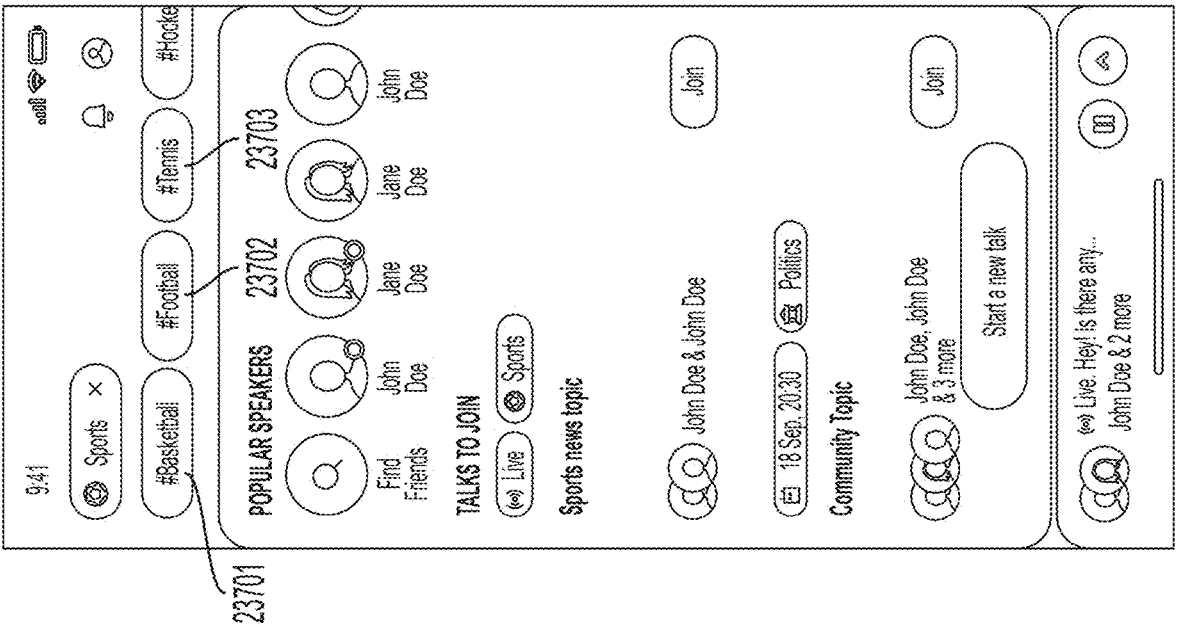

Selecting an audio conversation topic category or descriptive operator may bring you (e.g., the user) to a screen as shown in FIG. 237. The audio conversation topic category or descriptive operator may then be displayed near the top of the screen to signal that it has been selected. Other conversation topic categories or descriptive operators 23701, 23702, 23703 that fall within, or are associated with, the selected one may be displayed near the top of the screen as well. Selecting a conversation topic category or descriptive operator may cause the mobile application to display different audio conversations (e.g., any type, i.e., live, upcoming, auto, scheduled, recorded, etc.) on the screen.

Figure 238:
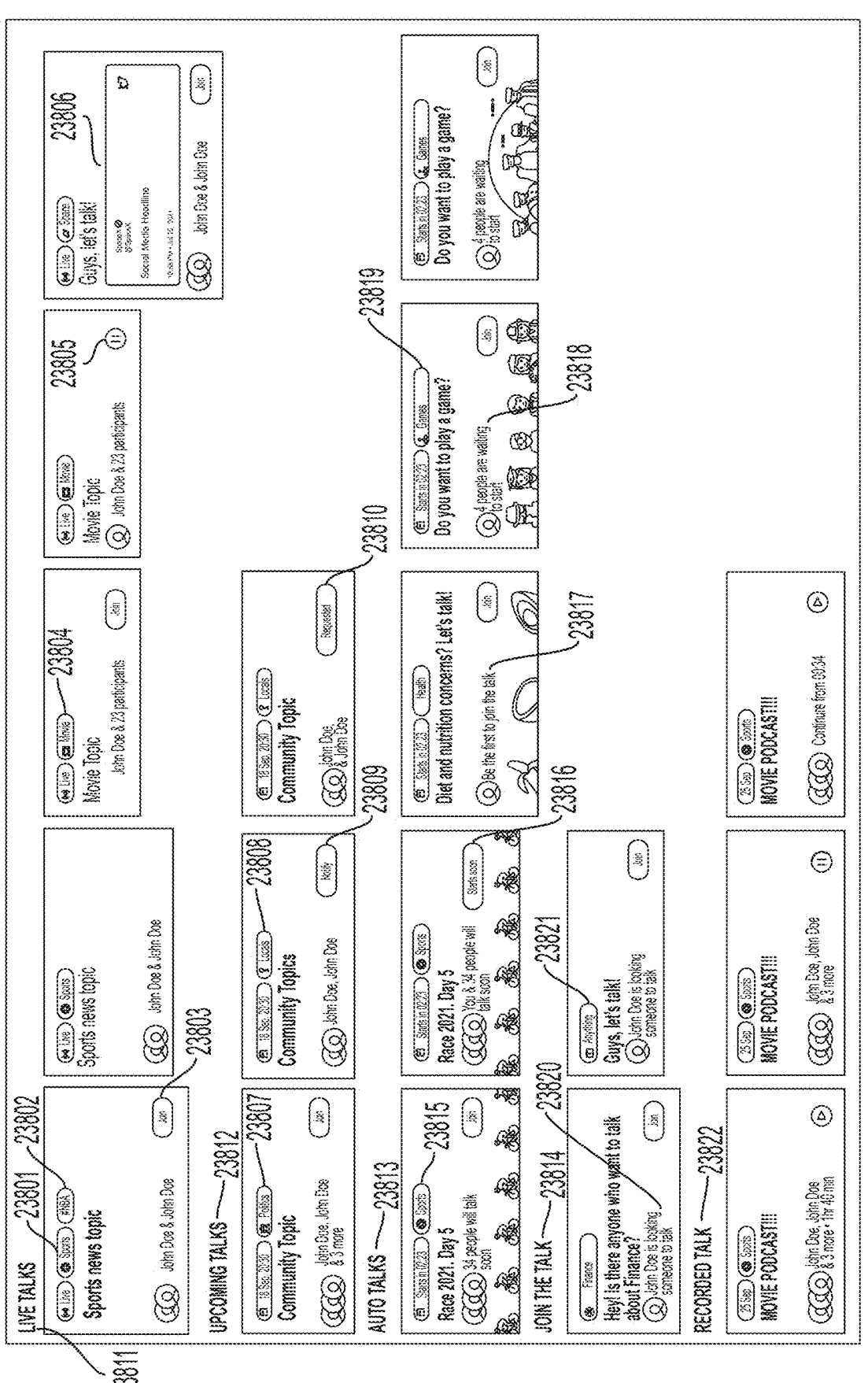

FIG. 238 shows a variety of different types of audio conversations that might be displayed on the mobile application. One or more of these audio conversations may be presented on the same or different user interfaces, or may be presented as a user scrolls through Discover section. An audio conversation might be a live talk 23811, or an audio conversation that is currently ongoing. These audio conversations may have a visual indicator showing that the audio conversation is currently ongoing. These audio conversations might have a button 23803, 23805 that allows a user to join the audio conversation as they scroll past. Selecting this button 23803, 23805 might put a user into a conversation as a speaker or listener, whereby the button 23803, 23805 might turn into an option to leave or pause the audio conversation. In some embodiments, an audio conversation may include a shared piece of information 23806 from another social media application or some other website.

An audio conversation might be an upcoming talk 23812, or an audio conversation that is occurring in the future. These audio conversations may have a button 23809, 23810 that allows a user to join, or be notified, of an upcoming audio conversation. Selecting the button 23809, 23810 may cause the option to change to an indication that participation in the upcoming audio conversation has been requested. A notification of an upcoming audio conversation may be sent to a user's mobile device outside of the mobile application. An upcoming talk may be scheduled by a user.

An audio conversation might be an auto talk 23813, or an audio conversation that is generated by the mobile application. These audio conversations may be scheduled manually or may be generated automatically by the mobile application. These audio conversations may be generated and scheduled by the mobile application and may be placed in a user's Discover section, search section, or browsing section of the mobile application. These audio conversations may be generated by the mobile application based on scraped information from other websites, other social media sites, or activity on the mobile application. These audio conversations may be generated by the mobile application based on topics received from television, Internet sources, other mobile applications, etc. These audio conversations may be generated by a third-party, or based on a third-party service. This generation could be done via an application programming interface (API) such as a media (e.g., social media, videos, etc.) monitoring API. These audio conversations may include timers 23815 that indicate when the audio conversation is going to begin. These audio conversations may be presented alongside buttons 23816 allows a user to join, or be notified, of a generated audio conversation. Selecting the button 23816 may then provide a user with a notification that the audio conversation may start soon. These audio conversations might have associated games 23819, that can be played within an audio conversation. These audio conversations may display a list of users 23818 who are waiting to start participating in an audio conversation or game. In some embodiments, live conversations can be "auto talks" in that live conversations are automatically generated.

In some embodiments, if multiple users choose to join an upcoming auto talk, the mobile application may split the users who select (or are selected by the mobile application) to participate into multiple simultaneous audio conversations with a specific number of users in each (e.g., each audio conversation may be associated with a maximum number of users).

An audio conversation might include one user who is waiting for someone to join the talk 23814 or join the audio conversation. These audio conversations may include an indication that another user 23820 has initiated the conversation. These audio conversations may be initiated, and a topic may be set, by a different user. These audio conversations may be live, as one user waits for a second user to join. These audio conversations may be about to begin, once a second user chooses to participate. These audio conversations, as presented, may include an option to join the audio conversation.

An audio conversation might be a recorded talk 23822, or an audio conversation that has already occurred and can be played back. These audio conversations may be played back and paused but cannot be joined by a user (as a speaker) or be listened to live. These audio conversations may be presented with an option to pause or play the audio conversation.

Figure 240:
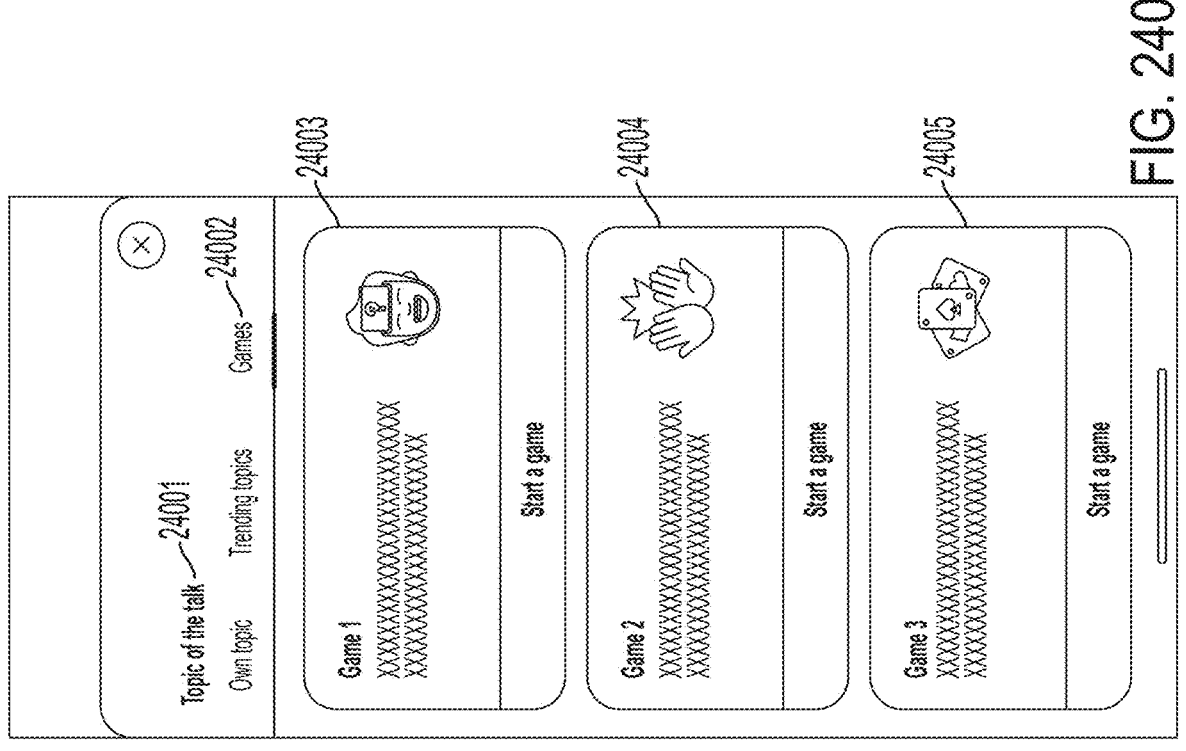
Figure 239:
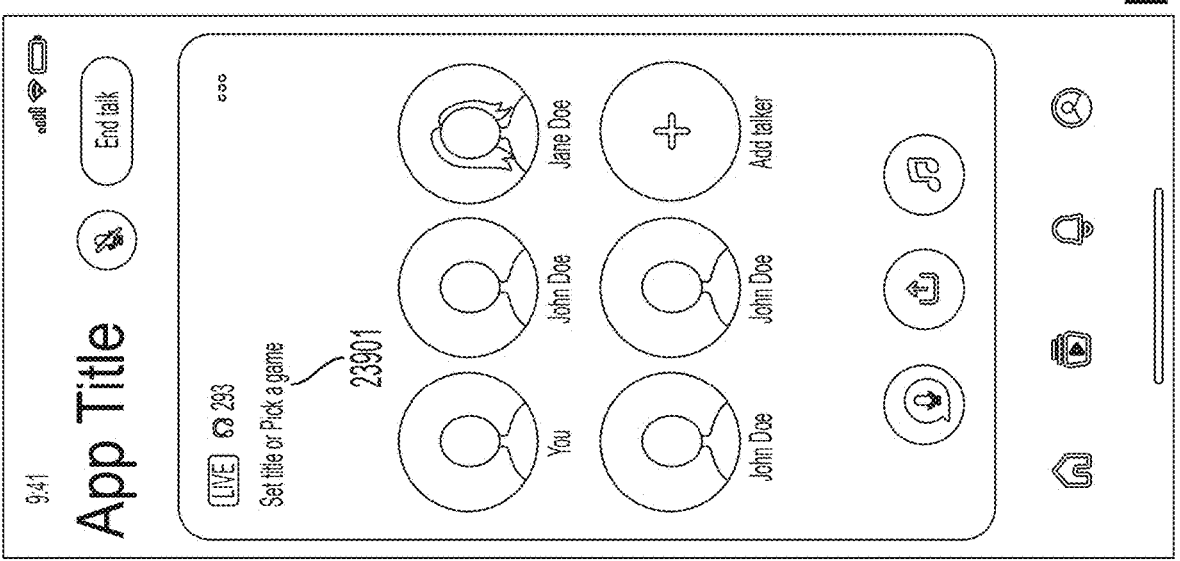

FIG. 239 shows an audio conversation when it presents the option 23901 to title the audio conversation or select a game for the audio conversation participants to play. Selecting the option 23901 may present a screen, as seen in FIG. 240, which allows a user to set a topic or initiate a game 24002. Multiple games 24003, 24004, 24005 may be presented and selected by a user, to be played by users in the audio conversation.

Figure 241:
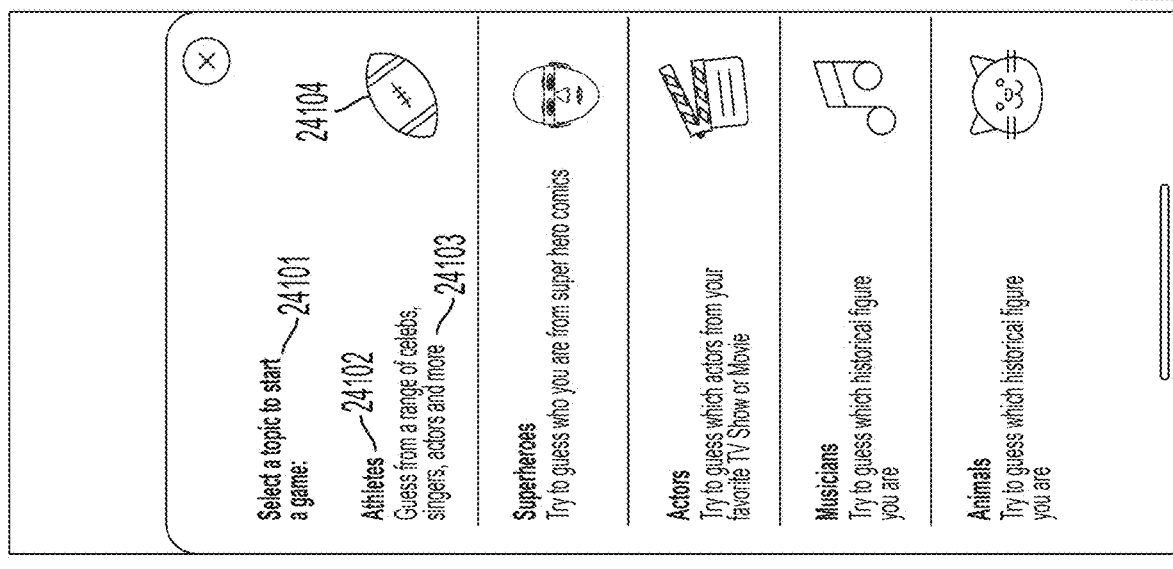

FIG. 241 shows a screen with further settings based on a game that a user may select. Instructions 24101 might be given that help a user set the parameters of a game. Further options 24102, 24103, 24104 for the game may be selected prior to initiating a game within an audio conversation.

Figure 242:
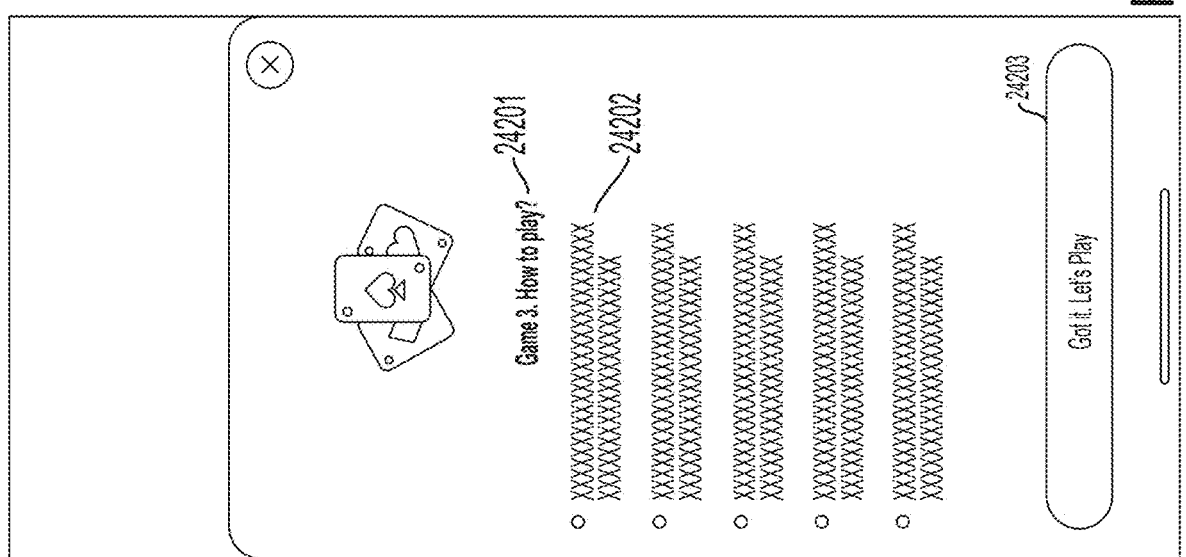

FIG. 242 shows instructions 24201, 24202 for playing a game within an audio conversation, which may be shown to a user before the game is initiated. A button 24203 may be presented that allows a user to initiate a game in an audio conversation.

Figure 243:
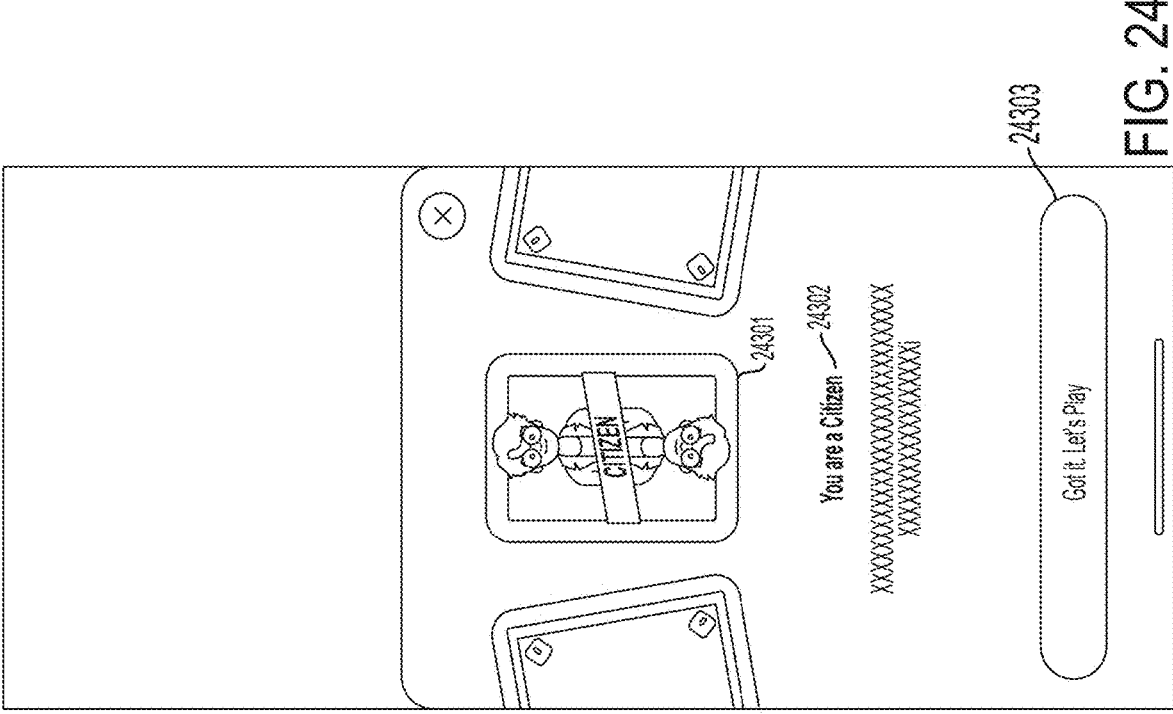

In some embodiments, a screen, such as that in FIG. 243, may present to a user instructions 24301, 24302 for a game that are specific to them. Instructions may include text 24302 or visual 24301 indications. A button 24303 may be presented that allows a user to acknowledge that they are ready for initiation of the game in the audio conversation.

Figure 244:
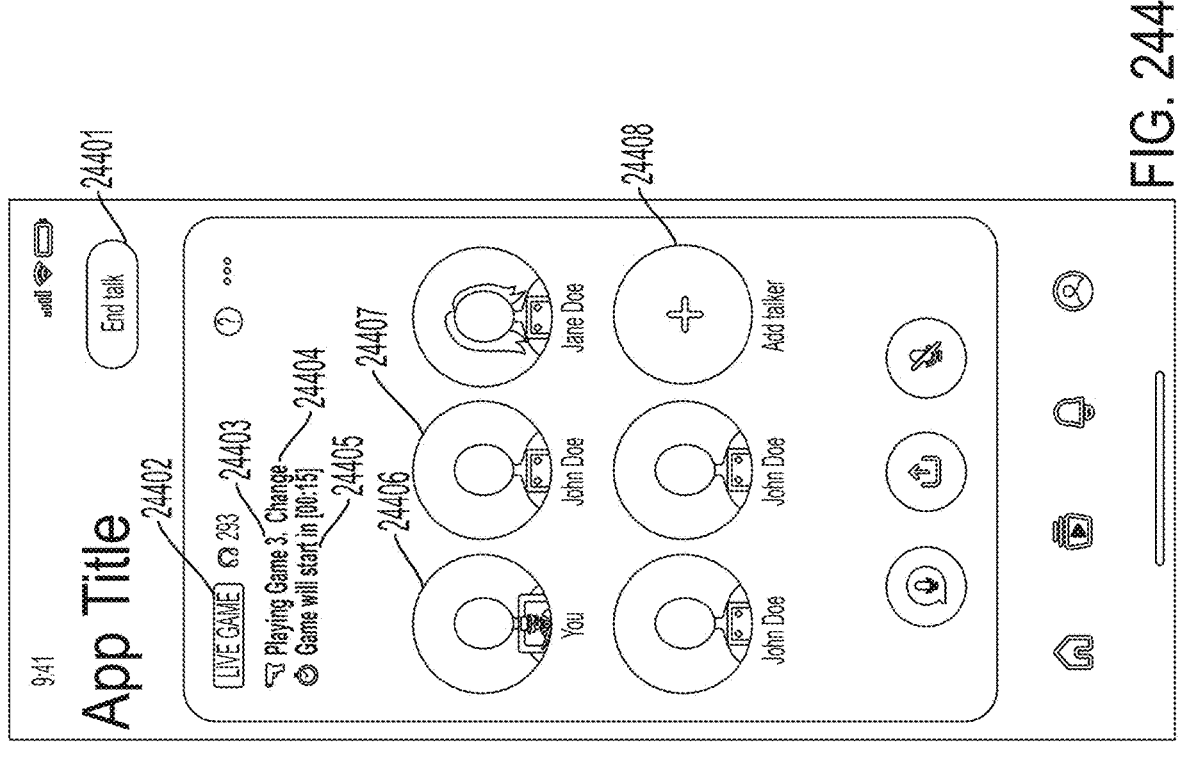

Once a game has been initiated, the mobile application may present a screen such as that in FIG. 244, which depicts users playing a game in the audio conversation. The screen may display an option 24401 to end the game or audio conversation, an indication 24402 that a game is currently being played, a title 24403 for the game, an option 24404 to change the game, a timer 24405 indicating when the game will start, visual representations 24406, 24407 of users playing the game (which may include changes from the normal visual representation of a user), and an option 24408 to add another user to the game (as a player or a host of the game.

Figure 245:
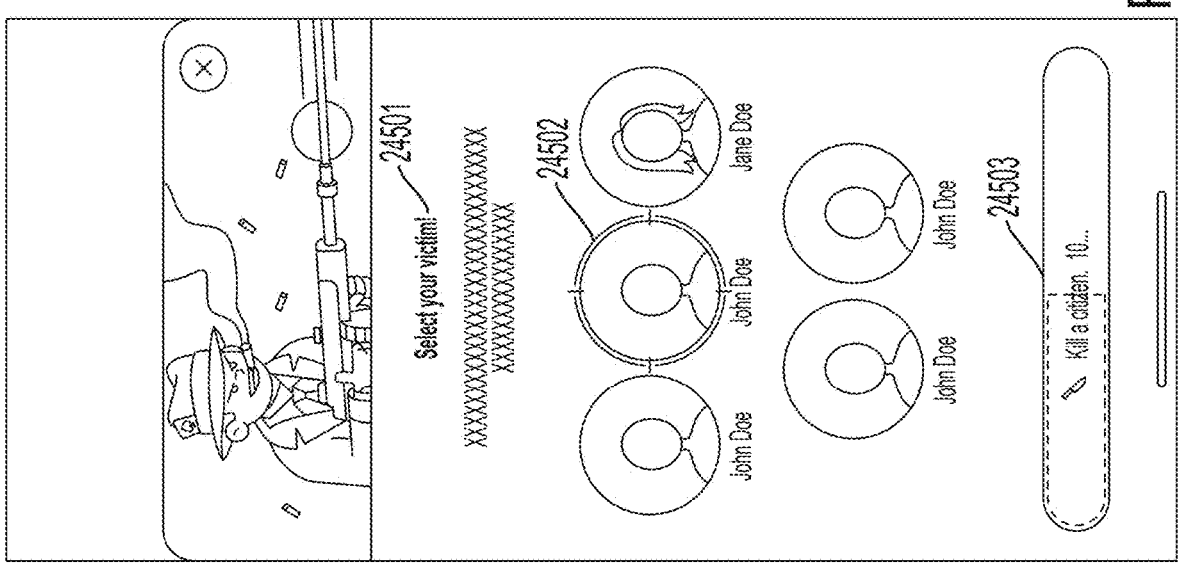

Whilst playing a game, the mobile application may present a screen such as the one in FIG. 245, which may give a user specific actions that they might take to progress a game. The instructions 24501, 24502, 24503 may be comprised of text 24501, physical cursors 24502 that can be moved, or buttons 24503 to execute an action.

Figure 246:
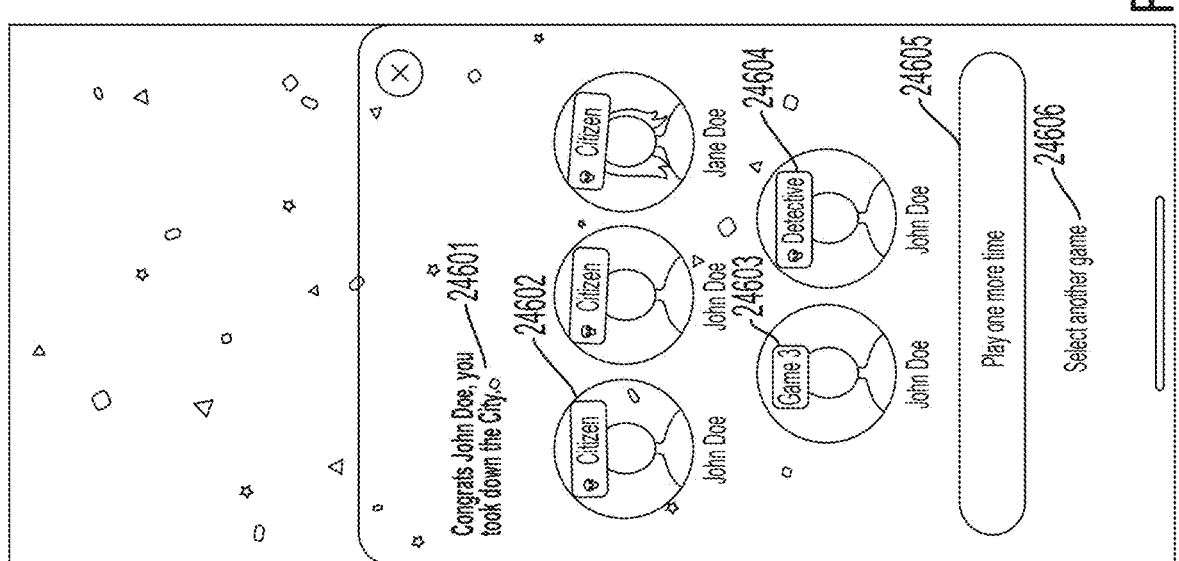

After a game has concluded, the mobile application may present a screen such as the one in FIG. 246, which presents the results 24601 of the game. The results 24601 may be collective or they may be targeted to an individual user. The screen may display a status or outcome 24602, 24603, 24604 associated with individual users who participated in the game. The screen may present a button 24605 to initiate the same game again, or may present a button 24606 to select a different game to be played in the audio conversation. In some embodiments, a message page (e.g., social media message page associated with a user's account) may be provided and audio conversations associated with messages or descriptive operators on the message page may be presented on the user interface such that user can join the audio conversations.

Figure 247:
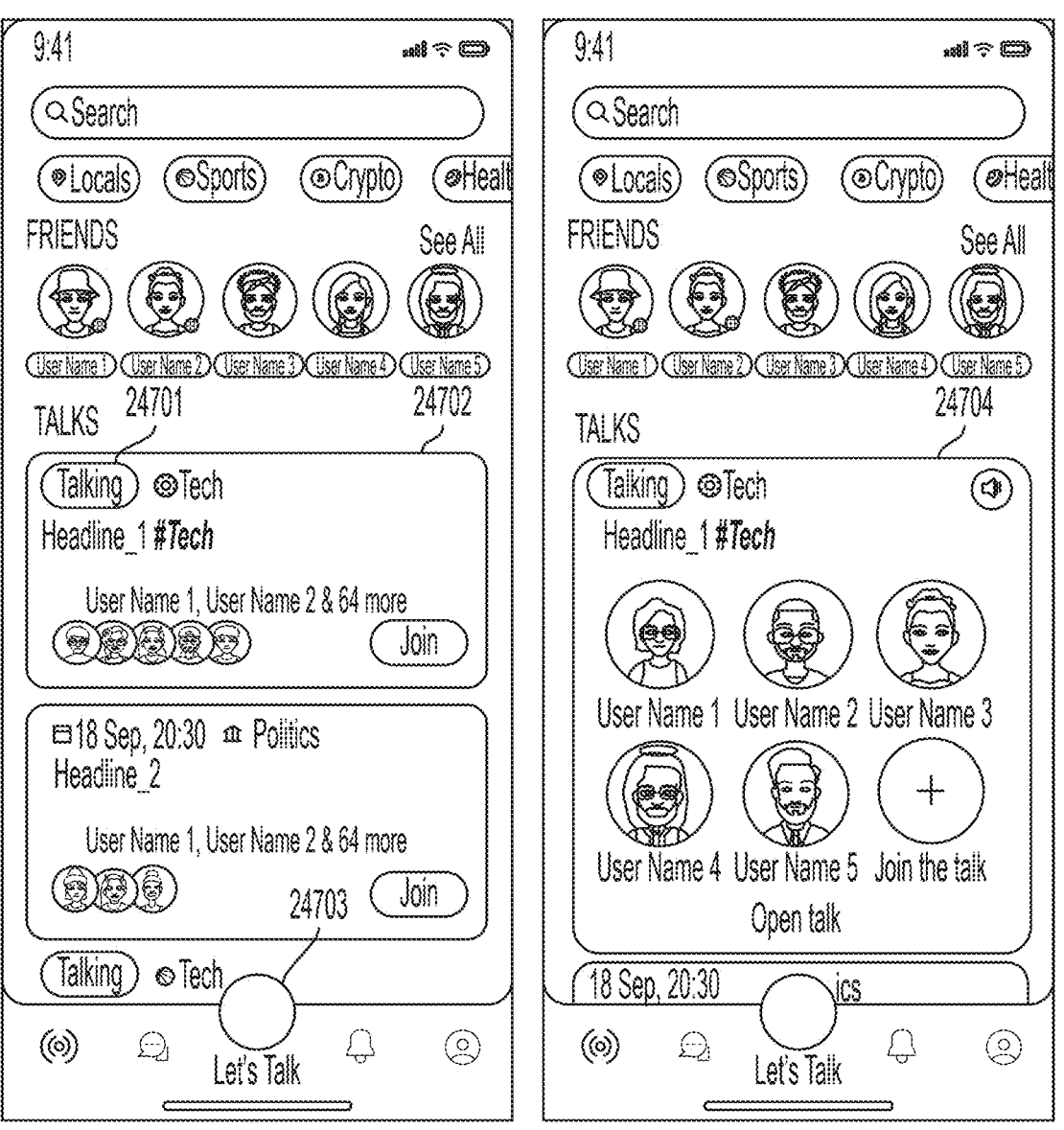

FIG. 247 shows the mobile application display when a user may be browsing the Discover section. The Discover section may display ongoing or past audio conversations 24702, 24704. These audio conversations 24702, 24704 may have a visual indicator 24701, which may let a user know that an audio conversation is currently ongoing. The visual indicator 24701 may display words such as "Live," "Ongoing," "Talking," etc.

A button 24703 may appear at the bottom of the mobile application's display, and may be displayed at the bottom of the Discover section. The button 24703 may stay at the bottom of the display as a user scrolls. The term "button" may be used interchangeably with the term "option."

FIG. 248 shows the mobile application display when a user is viewing a messages page. A tab 24801 at the top of the screen may highlight that a user is currently viewing messages. The messages screen might display other users who have exchanged messages with a user. The display may include a visual indication 24802 that a user is currently engaged in an audio conversation. The display may show a date or timestamp 24803 indicating when messages were last exchanged with a user. The display may show a number 24804 that may show an amount of messages associated with a user. The number 24804 may indicate unread messages, total messages, recent messages, etc.

A button 24805 may appear at the top of the display, allowing a user to initiate an audio conversation. Selecting a user from the first screen on FIG. 248 may take a user to the second screen on FIG. 248, which may display audio messages 24806 exchanged between users. Audio messages 24806 may be displayed as a sound wave or other representation of associated audio. The audio messages 24806 may have buttons on them that initiate playback of associated audio.

Figure 249:
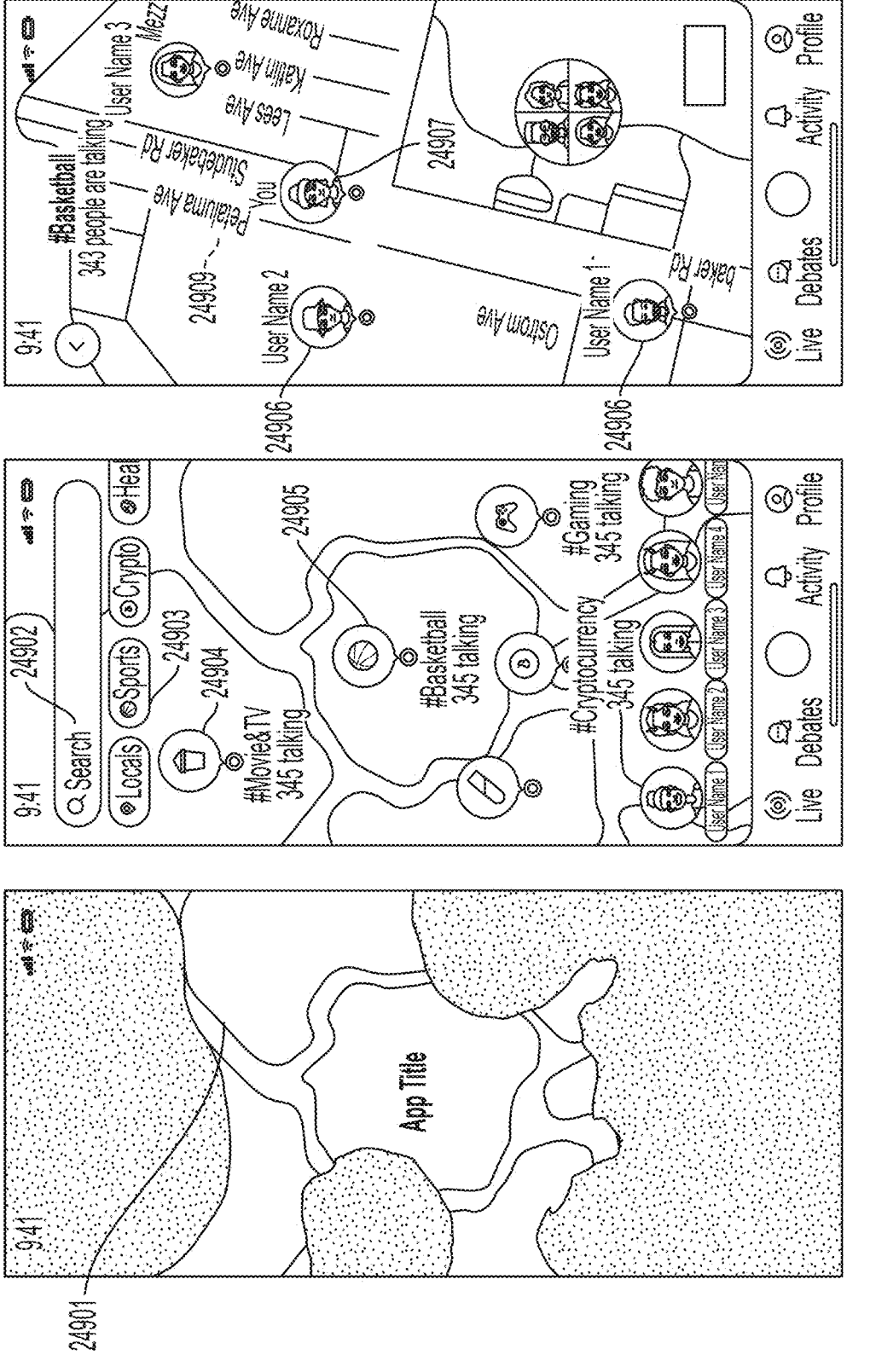

FIG. 249 shows the mobile application when viewing a topographical view or social audio "map." FIG. 249 has three screens showing various levels of zoom on the topographical view or social audio "map." When zoomed sufficiently far out, the mobile application may display islands 24901 or other geographical features. When zoomed in closer, the mobile application may display visual indicators 24905 associated with islands 24901 or other geographical features. These visual indicators 24905 may be associated with categories 24903, audio conversation topics, or descriptive operators. Categories 24903 may be displayed at the top of the screen on the mobile application. A search bar 24902 may be displayed at the top of the screen on the mobile application. Using the search bar 24902 or the categories 24903 may pull the screen to associated locations on the topographical view or social audio "map."

When zoomed in closer, the mobile application may display geographical features like streets or neighborhoods 24909. Users 24906, 24907, 25909 may appear on the topographical view or social audio "map." The location of the users 24906, 24907, 25909 may be based on the topic of the audio conversation they are engaged in. Users 24906, 24907, 25909 may appear at the bottom of the screen when sufficiently zoomed out. Groups of users 24906, 24907, 25909 may appear on the display in a cluster to signify that an audio conversation is ongoing.

FIG. 250 shows the mobile application when displaying a debate based screen. The screen may include audio conversations or messages boards 25002 that are focused on debating a certain topic. The screen may display comments 25003 or number of reactions 25004 associated with a debate. The screen may include a button that may allow a user to initiate a debate audio conversation or message board 25002. Selecting an audio conversation or message board 25002 on the first screen of FIG. 250 may take a user to the second screen of FIG. 250, which may display audio messages 25006 posted or shared by users. A user may be able to add their own audio message 25006 by selecting button 25007 that allows a reply, or button 25008 that allows recording of a comment. Topics for debates may be generated by a user or may be pulled into the mobile application from a third party website or other social media application.

Figure 251:
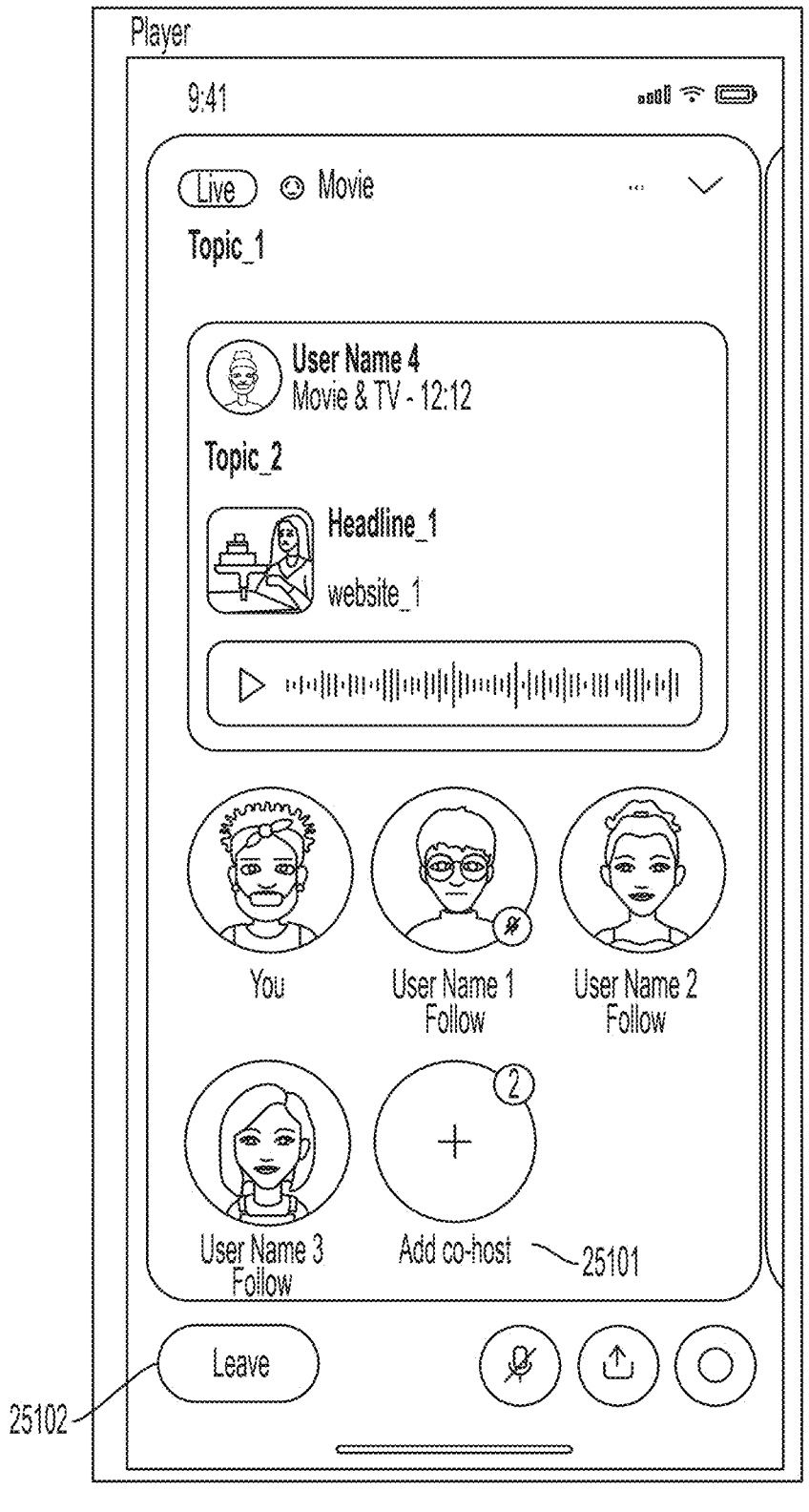

FIG. 251 shows the mobile application when displaying an ongoing audio conversation that is being debated. A user may reach this screen by selecting an audio conversation or message board 25002 from FIG. 250. This screen may include features typically seen in other audio conversations, but with the inclusion of the debate topic. There may be a button 25101 to add a co-host to the audio conversation or a button 25102 to leave the audio conversation.

Figure 252:
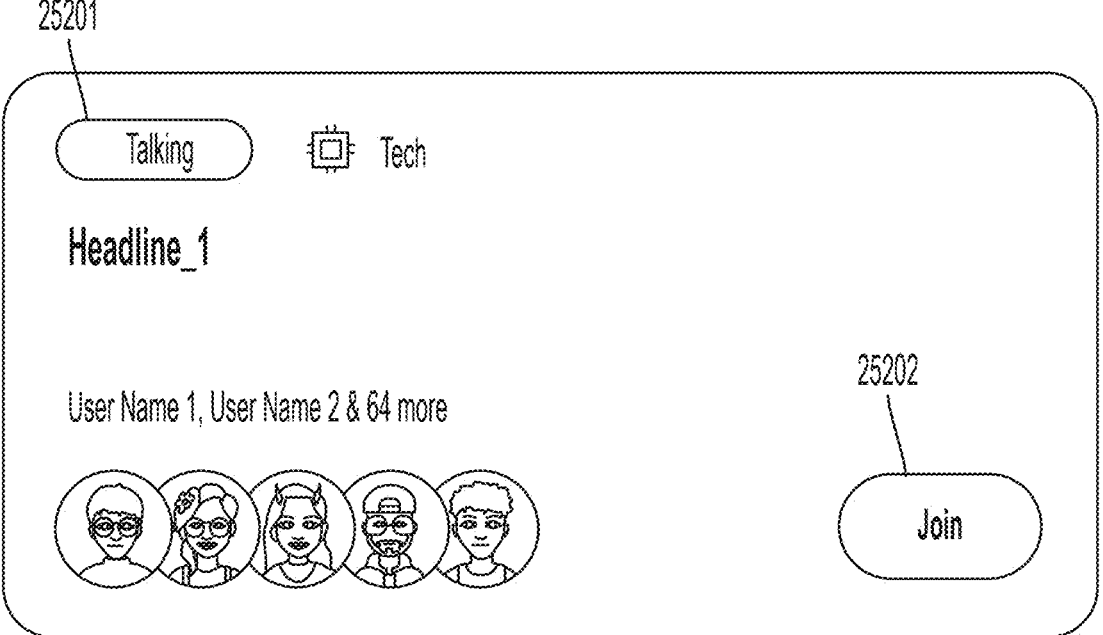

FIG. 252 shows a possible display for an audio conversation. The display may include a visual indicator 25201 that may show the status of the audio conversation. The visual indicator 25201 may appear in various colors and may include words such as "Live," "Ongoing, "Talking," etc. The display may include a button 25202 that allows a user to join an audio conversation.

Figure 253:
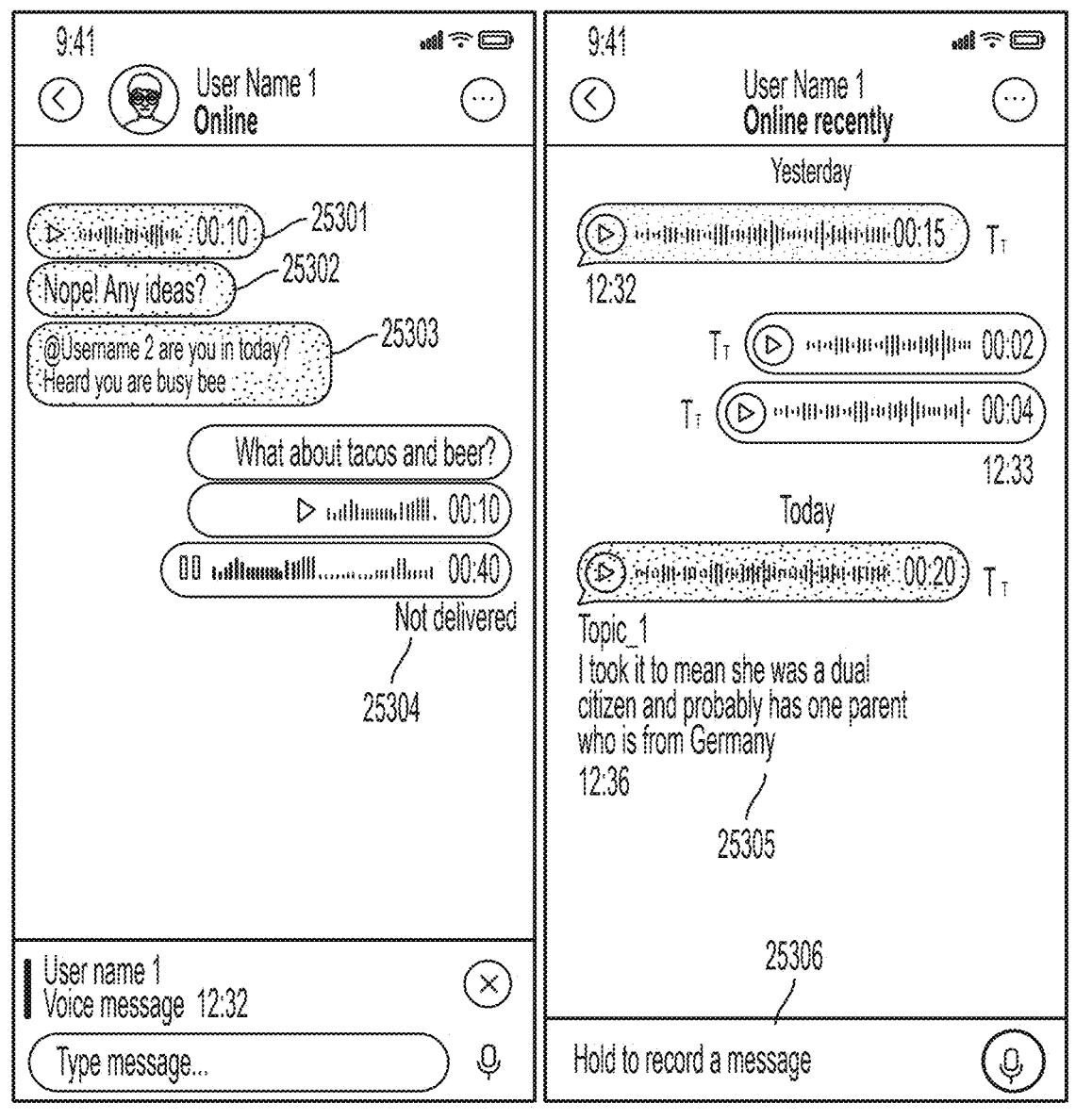

FIG. 253 shows a display for messages sent between users. A user may send audio messages 25301 or text messages 25302, 25303. Audio messages 25301 may have an associated soundwave or other indication of the audio contents. If a message is unable to be delivered there may be a visual indication 25304 of such. A user may record a message by using a recording button 25306 that may be found on the bottom of the display. The mobile application may be able to transcribe the contents of an audio message 25301 which will create a text display 25305 of the audio message's 25301 contents.

Figure 254B:
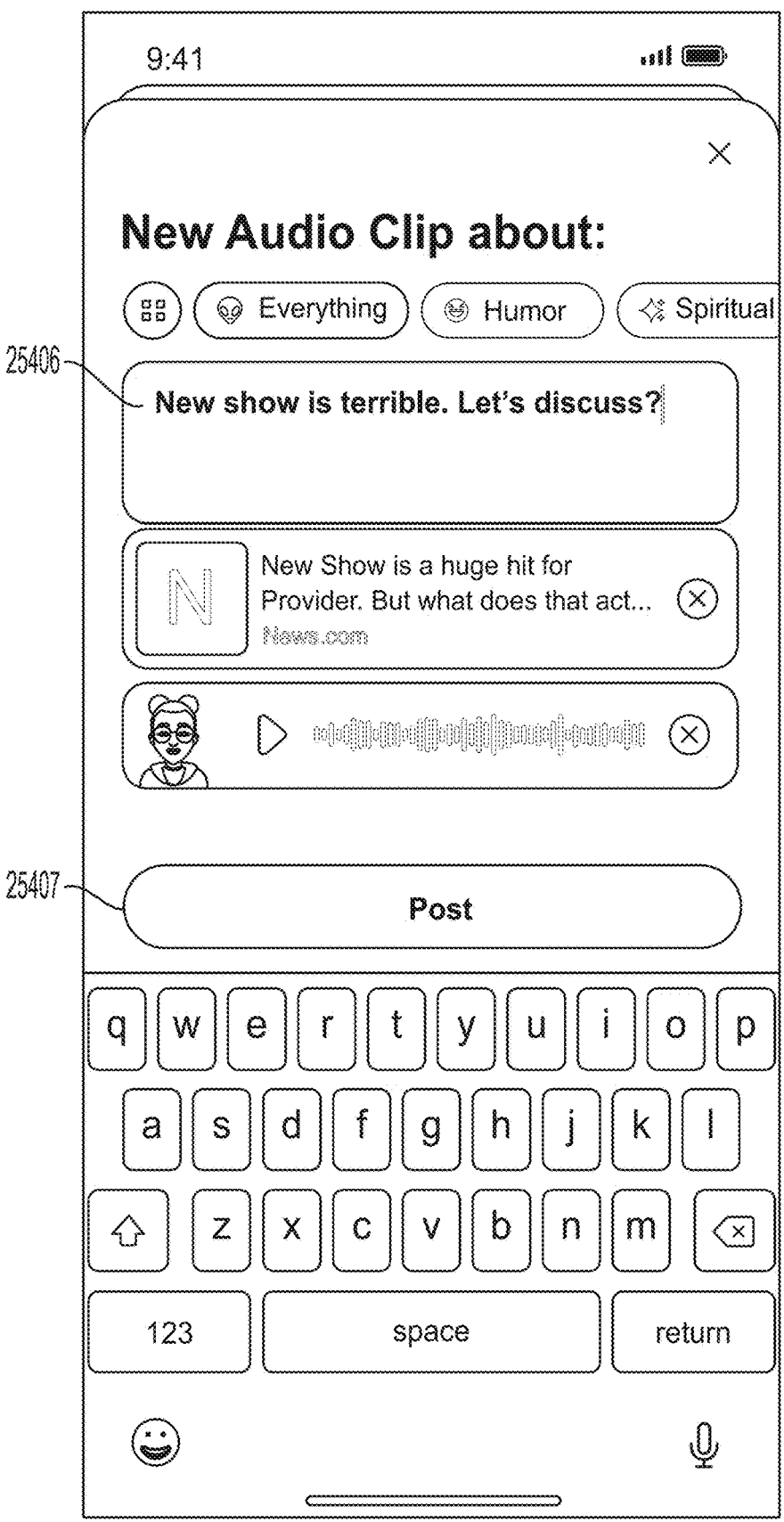
Figure 254C:
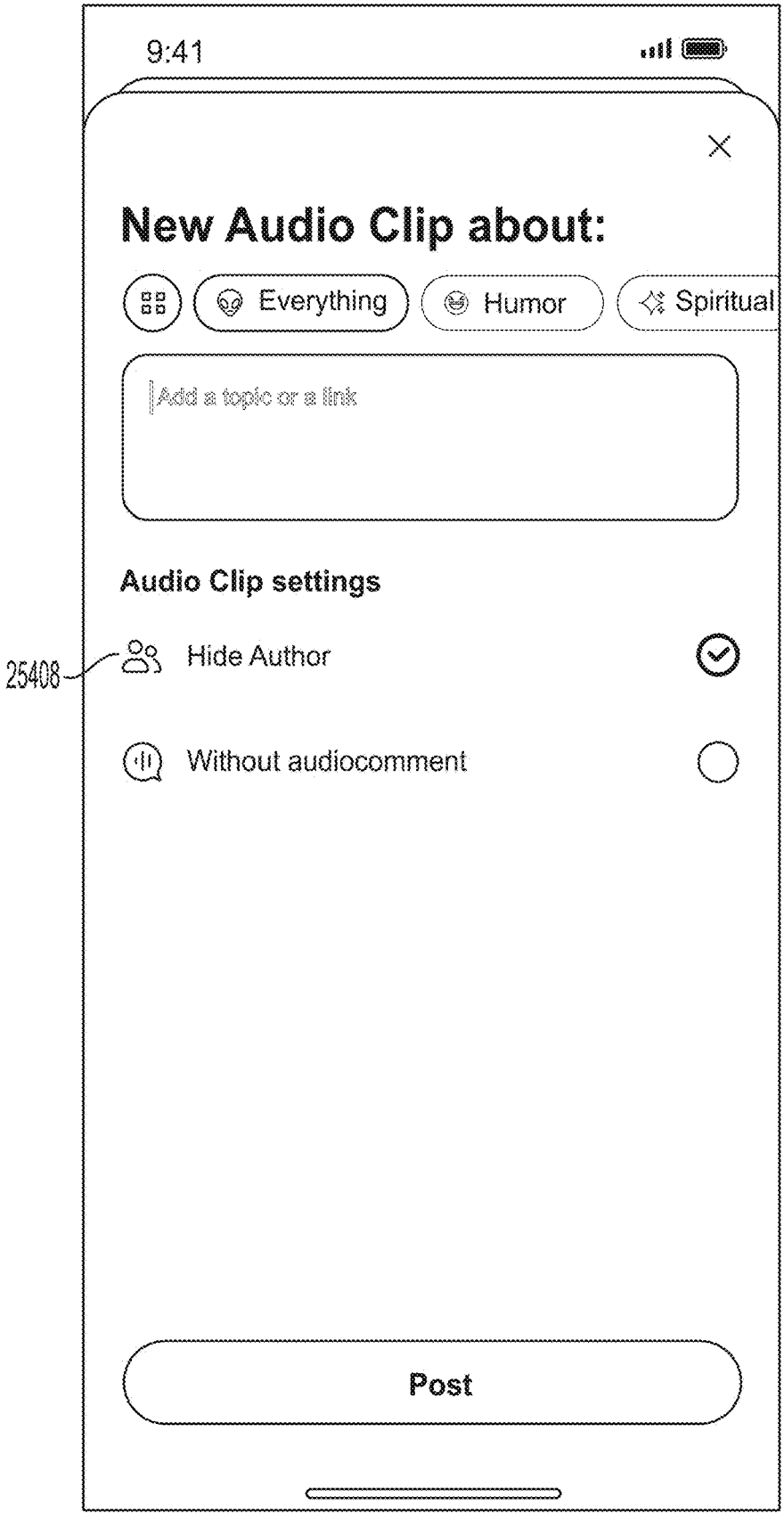

FIGS. 254a, 254b, and 254c show a mobile application display for creation of an audio clip. In some embodiments, a user may be presented with a list of options 25401, 25402, 25403, 25404, 25405 for creating content or engaging with the mobile application. These options 25401, 25402, 25403, 25404, 25405 may include starting an audio conversation 25401, recording an audio clip 25402, playing a game 25403, communicating with friends 25404, or scheduling a future audio conversation 24505. If a user selects to record an audio clip 25402, a user may be brought to a new screen prompting them to record an audio clip, input text 25406 associated with the audio clip, or insert a link or image. After taking some or all of these actions, a user may be able to post or share 25407 the audio clip in various locations of the mobile application. These audio clips may be of a limited duration. A user may be able to access audio clip settings 25408, such that they may hide author information or post without any audio clip.

Figure 255A:
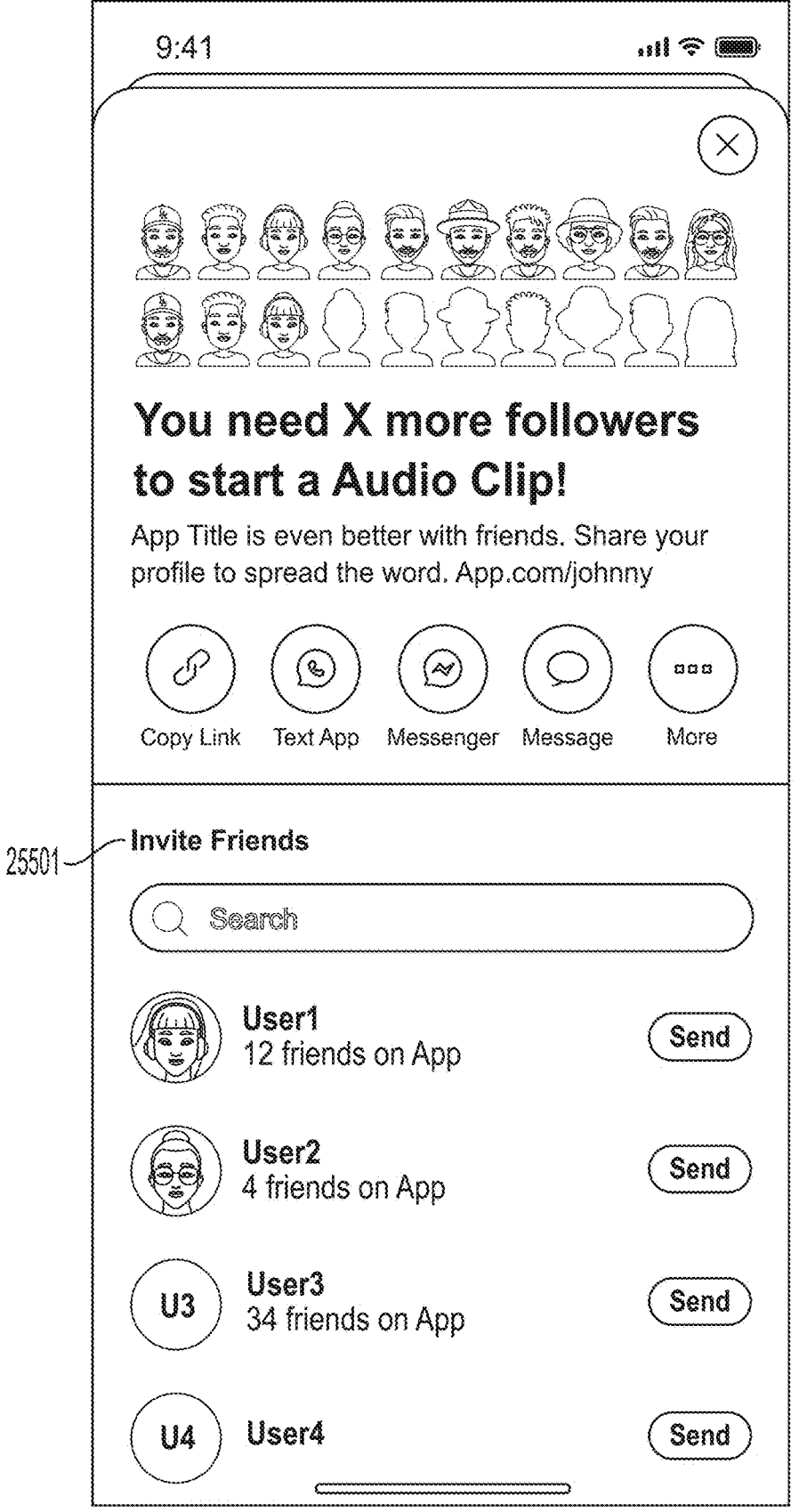
Figure 255B:
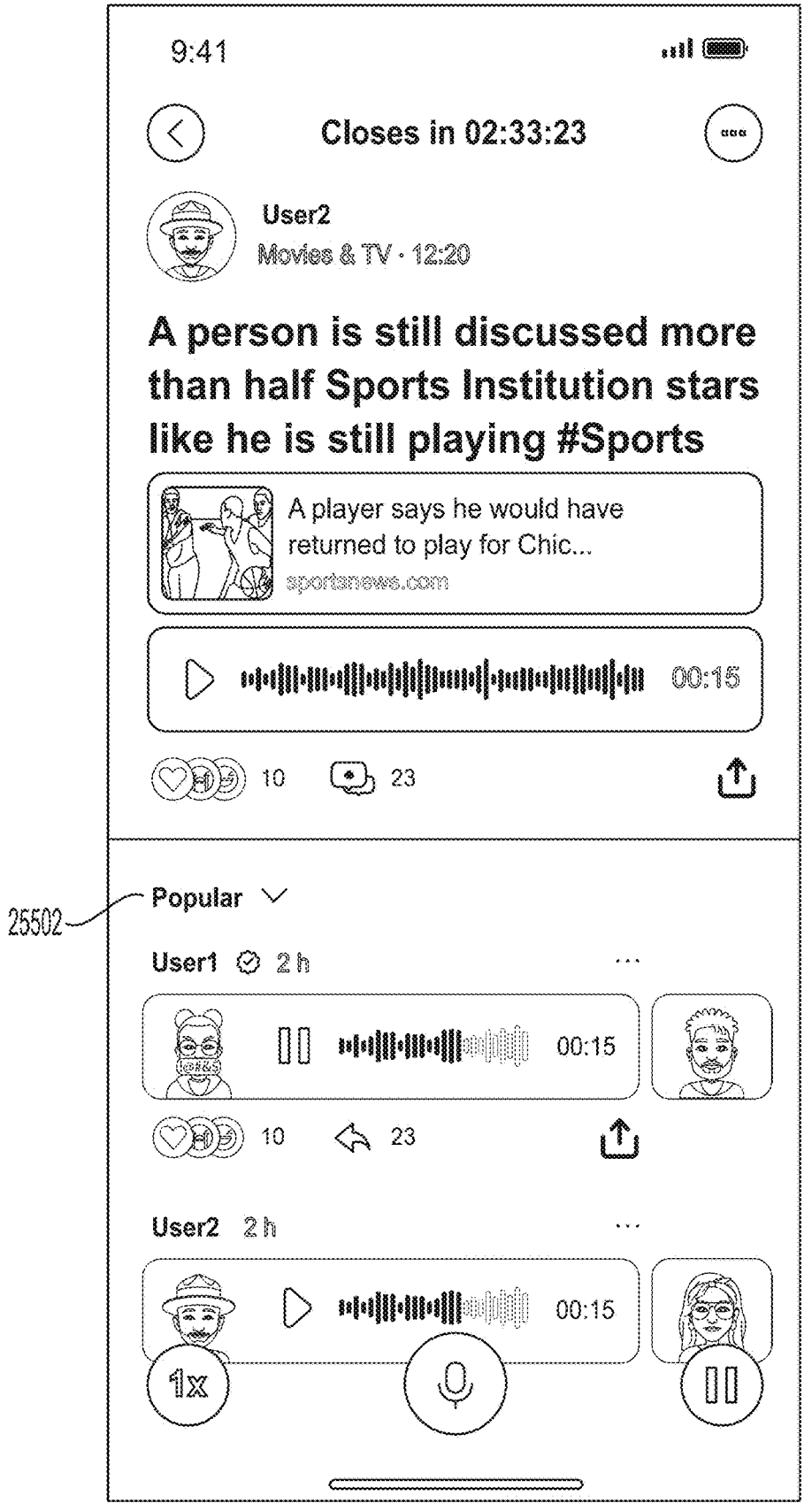
Figure 255C:
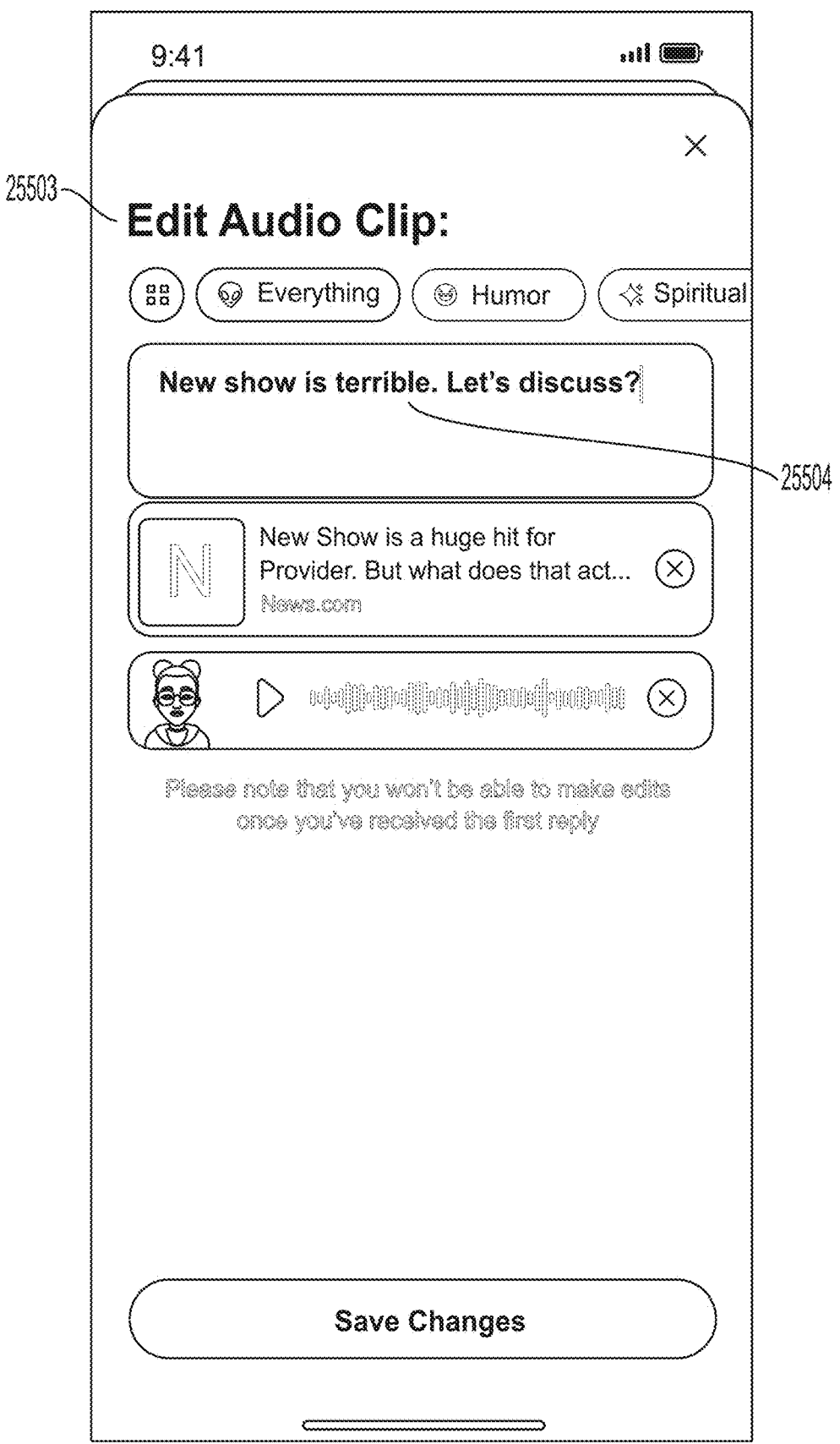

FIGS. 255a, 255b, and 255c show additional mobile application screens relating to the creation of an audio clip. When attempting to post or share an audio clip, the mobile application may alert a user that they need more followers in order to do so, as shown in FIG. 255A. This screen may present an option 25501 to invite potential users to join the mobile application. Once an audio clip has been posted or shared, it may be displayed as shown in FIG. 255B. This screen may be how other uses see the audio clip when they click into it. This screen may show audio comments or other audio clips that have been posted in response to the original audio clip, which may be sorted by option 25502. These audio comments or responsive audio clips may have their own associated responses, which may appear horizontally adjacent to the first audio comment or responsive audio clip. Users may be able to react to, "like," share, or respond to these audio comments or responsive audio clips. After an audio clip has been posted or shared, the user who recorded the audio clip may be able to edit 25503, 25504 the audio clip or elements associated with the audio clip 25504, as shown in FIG. 255C. In some embodiments, editing the audio clip may be allowed if no other user has viewed or responded to the audio clip.

Figure 256A:
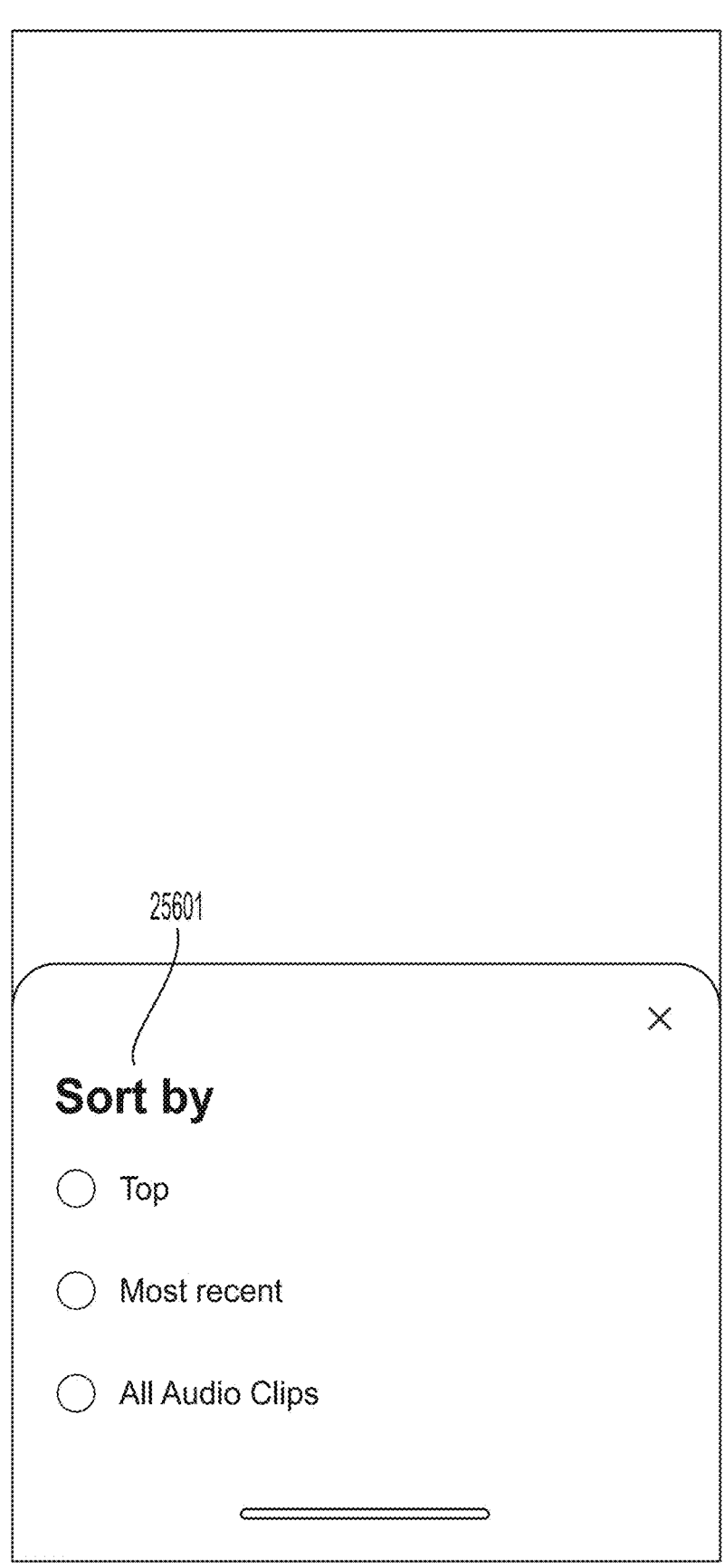
Figure 256B:
Figure 256C:
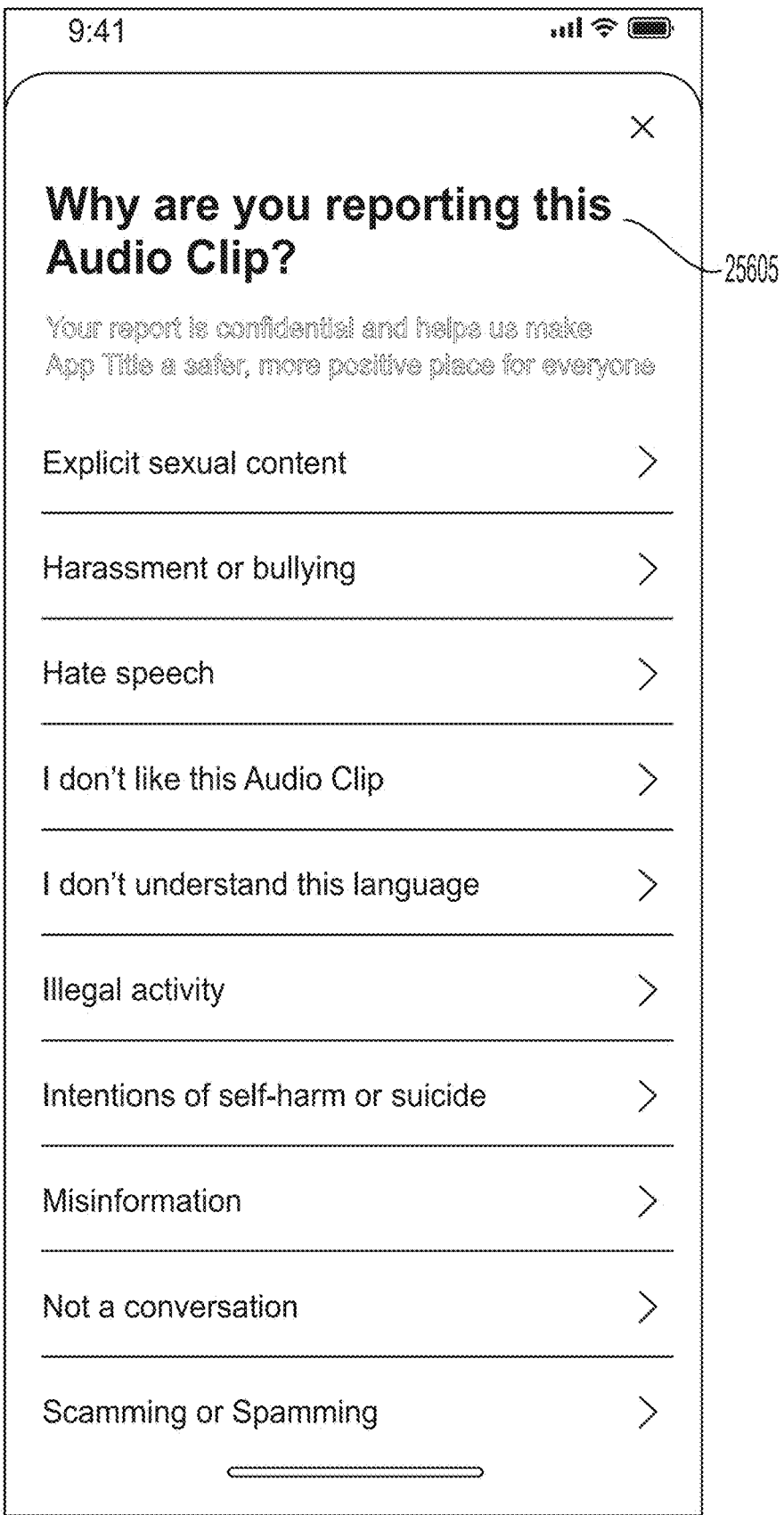

FIGS. 256a, 256b, and 256c show additional options for sorting and interacting with audio clips. A user may be able to sort 25601 audio clips. Sorting may be done based on popularity of an audio clip, how may responses an audio clip has garnered, how recently an audio clip was posted, etc. When viewing an audio clip, a user may be able to post a responsive audio clip 25602, 25604. These audio clips may be of a limited duration. A user may be able to associate a visual reaction 25603 with the audio clip. Visual reactions 25603 may utilize a visual representation of the user recording or posting the audio clip. A user may be able to report 25605 an audio clip that has been posted or shared. Reporting 25605 an audio clip may be done for a variety of reasons, including: explicit sexual content, bullying, harassment, hate speech, illegal activity, misinformation, spam, etc.

Figure 257A:
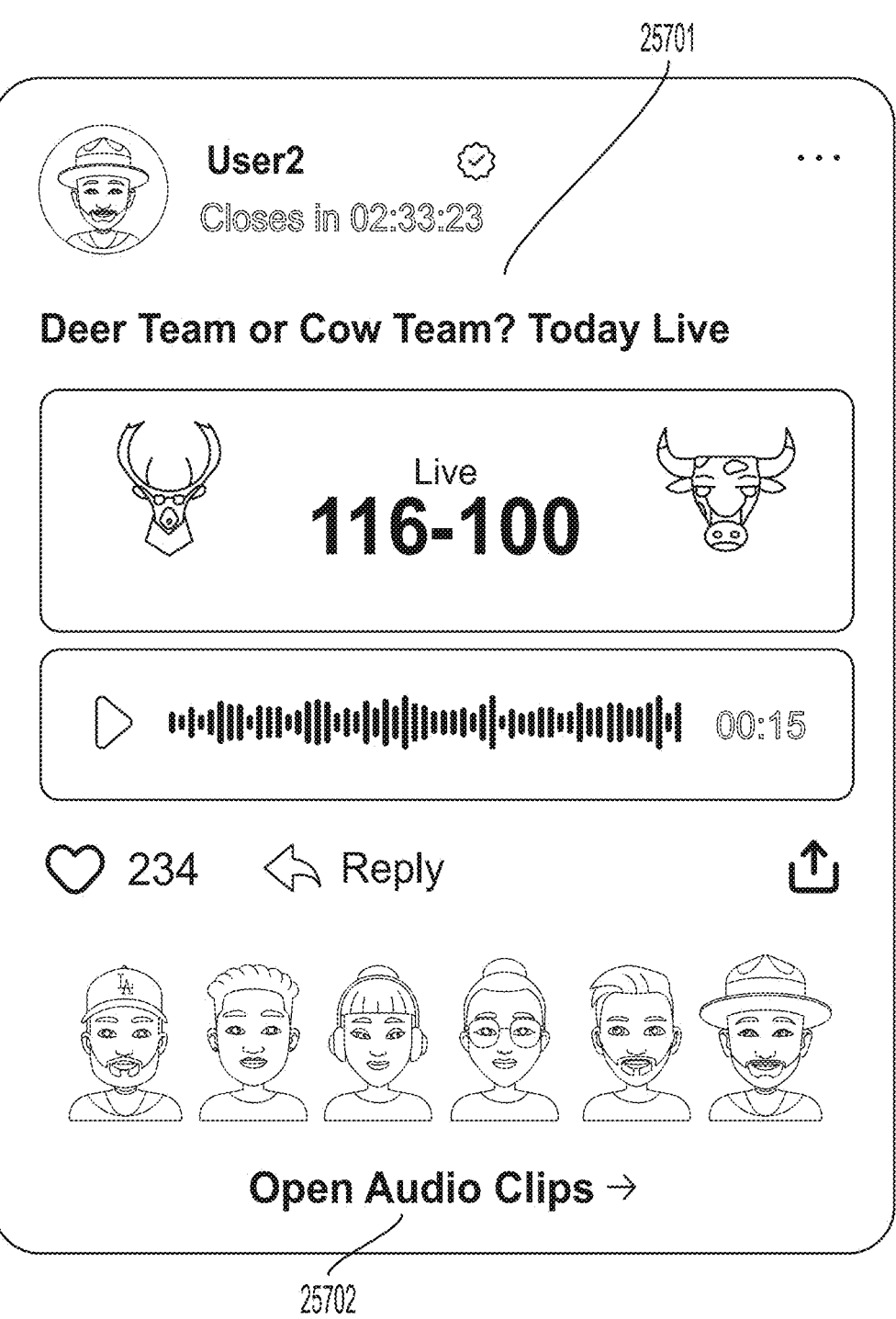
Figure 257B:
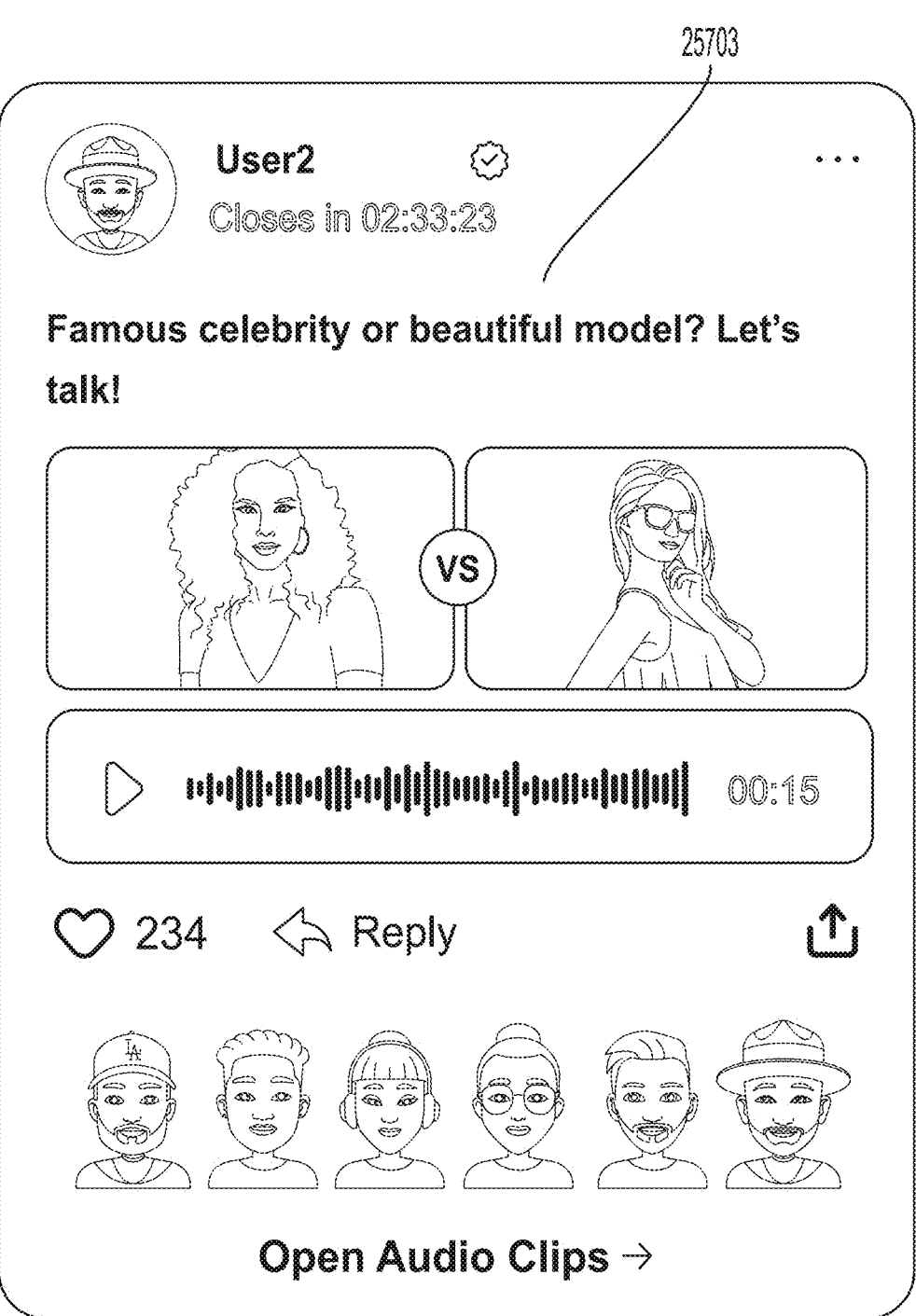

FIGS. 257a, 257b, and 257c show potential "widgets" or multimedia attachments that the mobile application may generate based on content within the mobile application. These widgets or multimedia attachments may present live sports scores 25701, polls 25703, or other live or interactive content. These widgets or multimedia attachments may include associated audio clips from the mobile application.

These widgets or multimedia attachments may include a link 25702 to audio clips or other content within the mobile application.

Figure 258A:
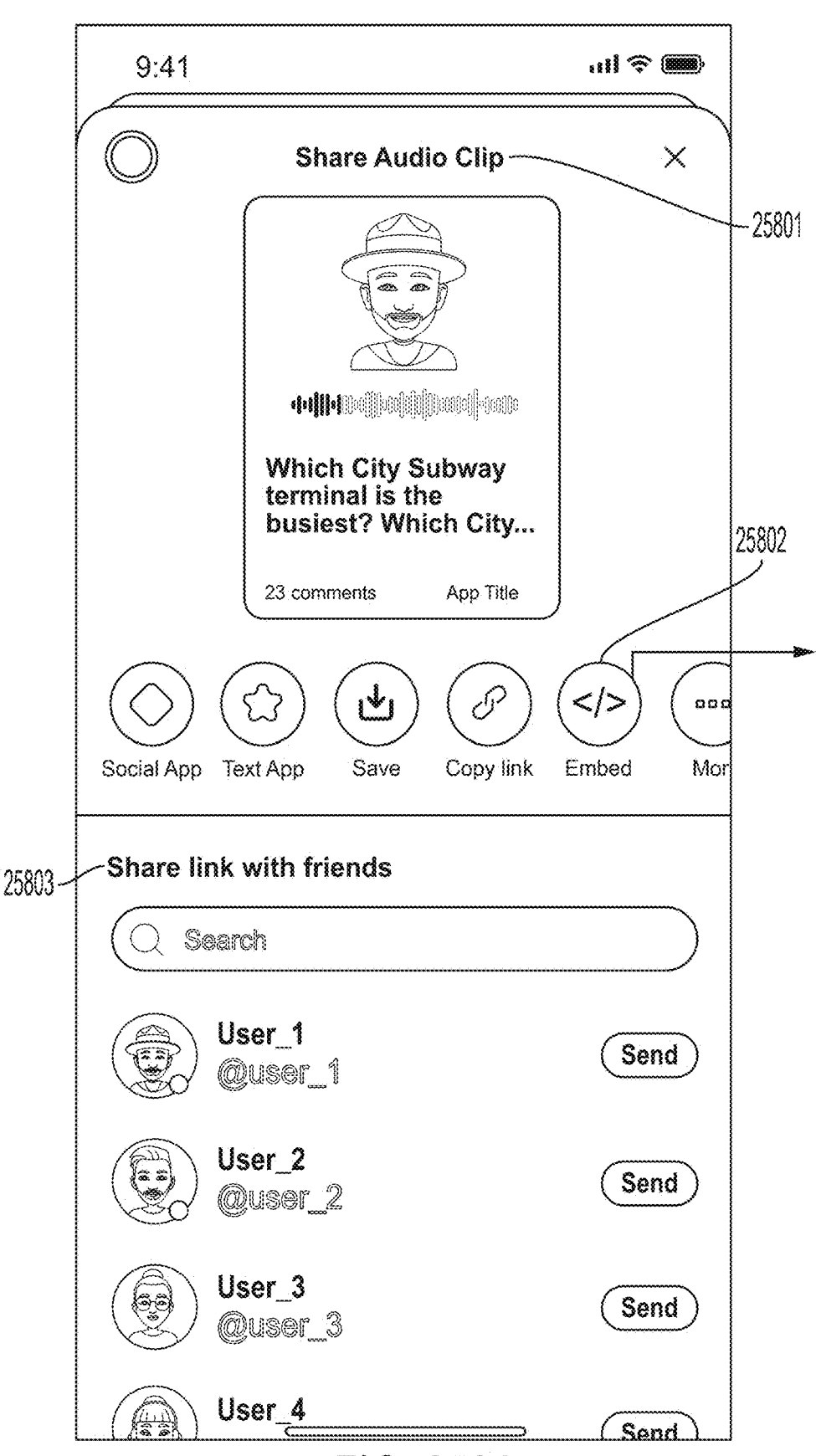
Figure 258B:
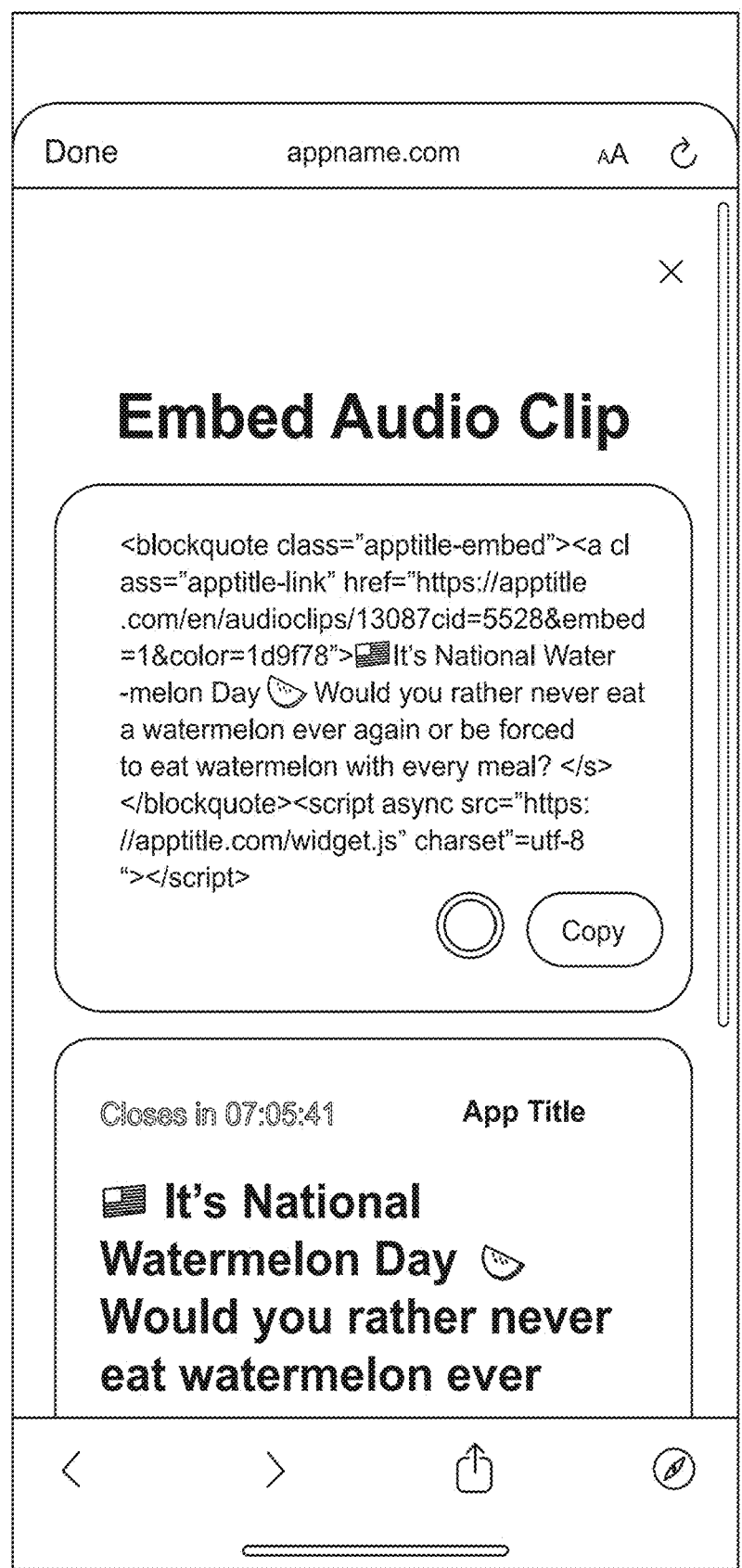
Figure 258C:
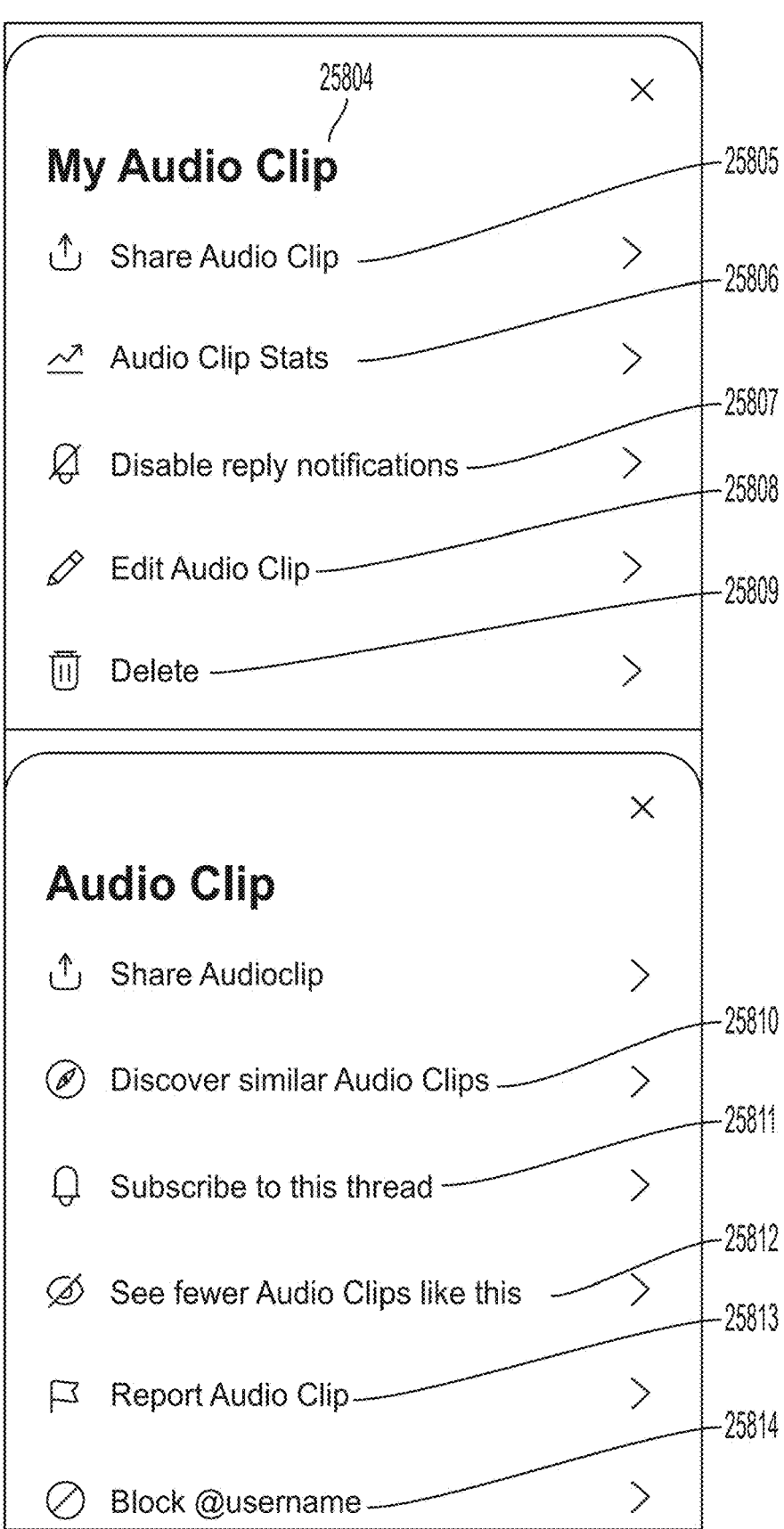

FIGS. 258a, 258b, and 258c shows how a user may export an audio clip, or other mobile application content, to some other website or social media platform. FIG. 258A shows how a user may share 25801 an audio clip, which may include sharing of the audio clip (or portion of the audio clip), associated text, and a visual representation of a user. The mobile application screen may present options 25802 to share the exporting audio clip or content to various social media sites, or to embed or copy the link to the audio clip or content elsewhere. The mobile application may prompt a user during export to share the link with their friends 25803. Selecting the option 25802 to embed a link to the audio clip or content may bring a user to the screen shown on FIG. 258B, where a user may be able to copy the link address. Going into the options for an audio clip 25804 on the mobile application may present a user with a variety of options 25805, 25806, 25807, 25808, 25809, 25810, 25811, 25812, 25813, 25814. These options 25805, 25806, 25807, 25808, 25809, 25810, 25811, 25812, 25813, 25814 may include the ability to share an audio clip, view statistics related to an audio clip, edit an audio clip, delete an audio clip, find similar audio clips, report the audio clip, etc. The options 25805, 25806, 25807, 25808, 25809, 25810, 25811, 25812, 25813, 25814 may differ if a user is the user who recorded the audio clip and the user is only viewing the audio clip.

Figure 259:
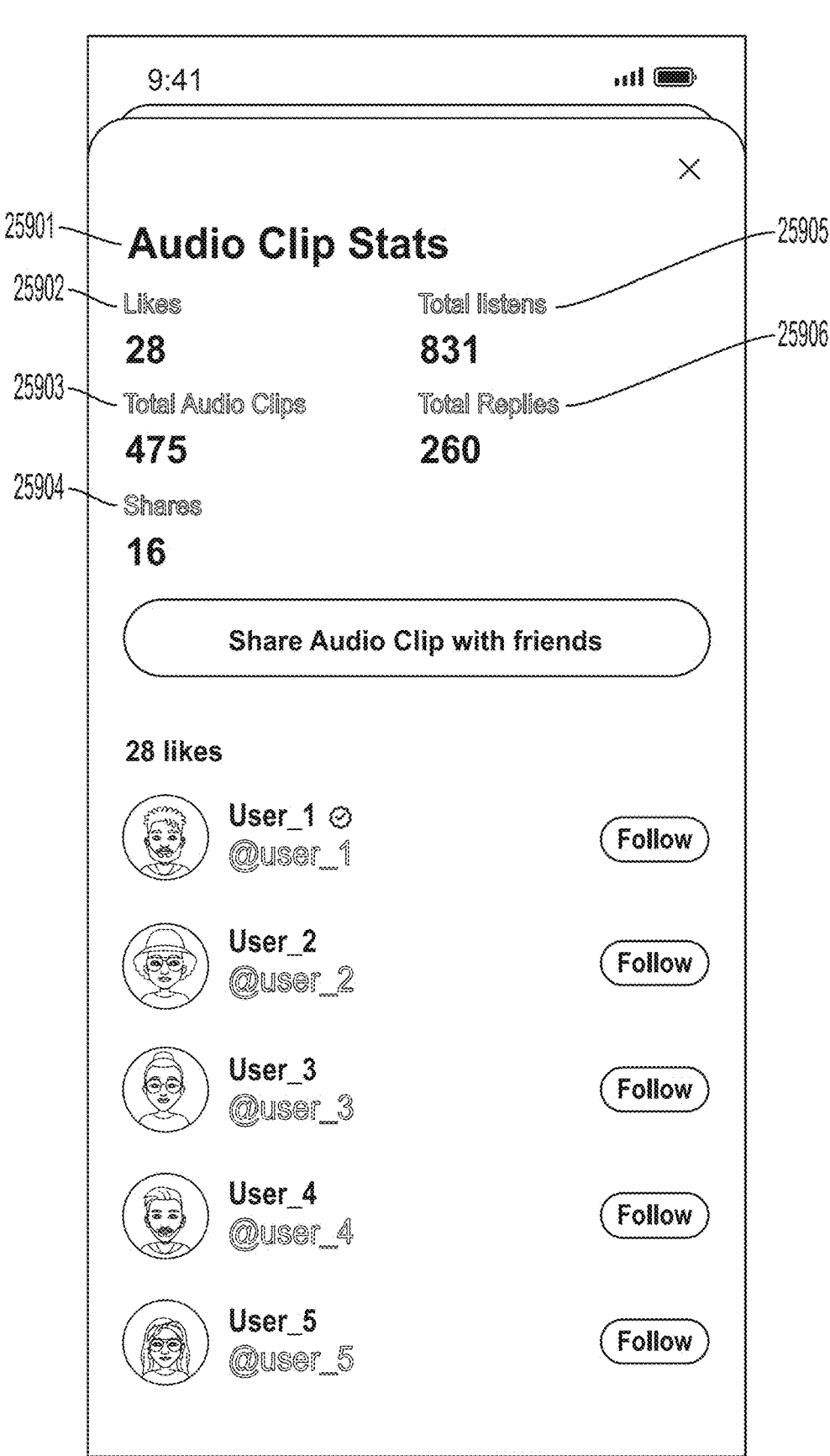

FIG. 259 shows a mobile application screen that may display statistics 25901 associated with an audio clip or other content within the mobile application. Statistics 25901 may show number of "likes" 25902 an audio clip or content has garnered, the total number 25903 of audio clips a user has generated, the total number 25904 of times an audio clip or content has been shared, the total number 259095 of times the audio clip or content has been listened to, the total number 25906 of replies or responses an audio clip or content has garnered, etc. The display may list out mobile application users who have "liked" or responded to an audio clip or piece of content.

Figure 260:
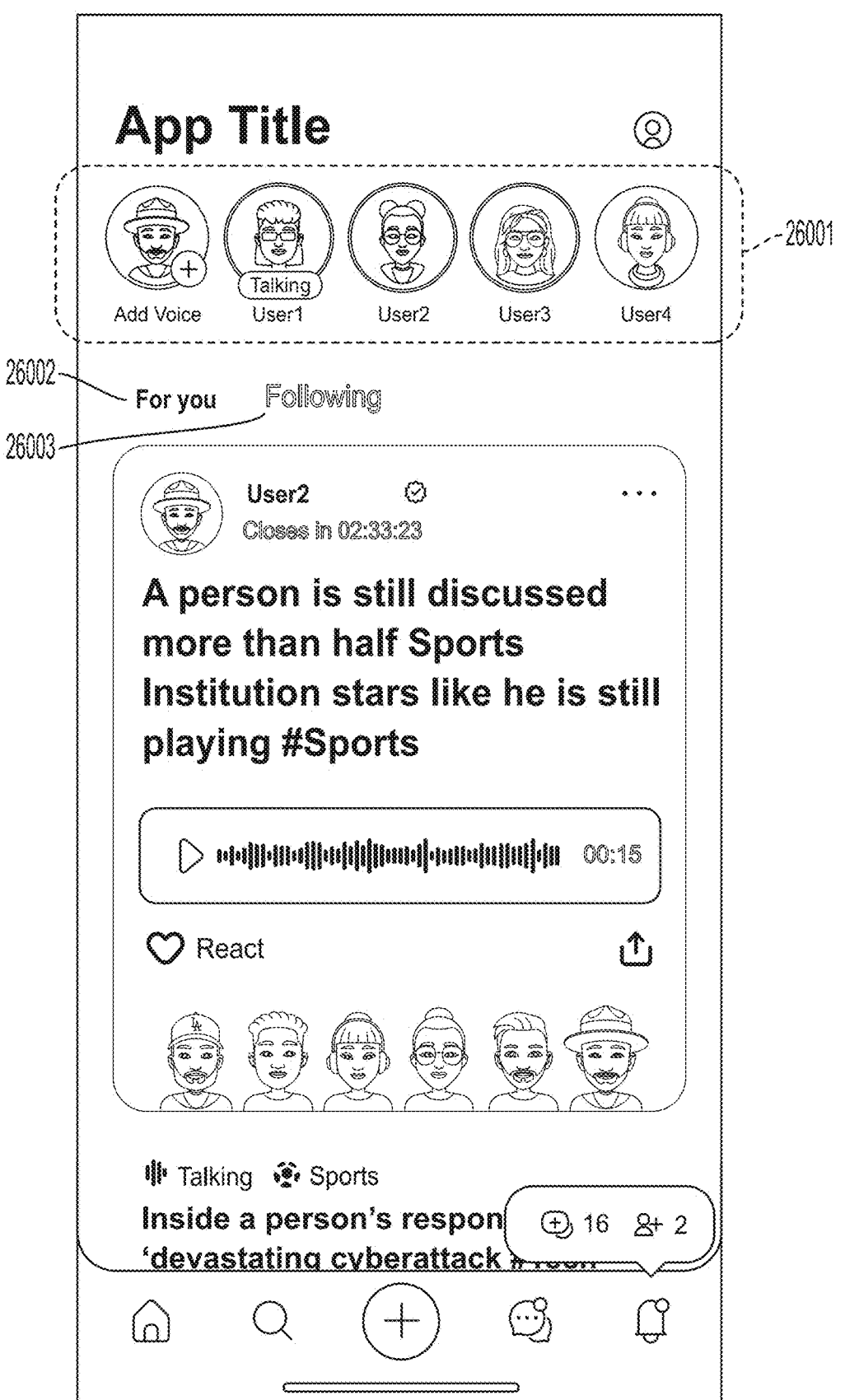

FIG. 260 shows a screen that the mobile application may present for browsing content housed within the mobile application. This screen may display threads that contain audio clips, audio clips themselves, ongoing audio conversations, scheduled conversations, etc. A user may be able to sort this content based on recommendations 26002 from the mobile application or based on which other users a user may follow 26003. The mobile application may display a row or feed 26001 of highlighted content occurring in the mobile application. The content that is displayed in the row or feed 26001 may be from other users that a user follows or interacts with frequently. The content may be represented by a visual representation of the posting or recording user.

Figure 261A:
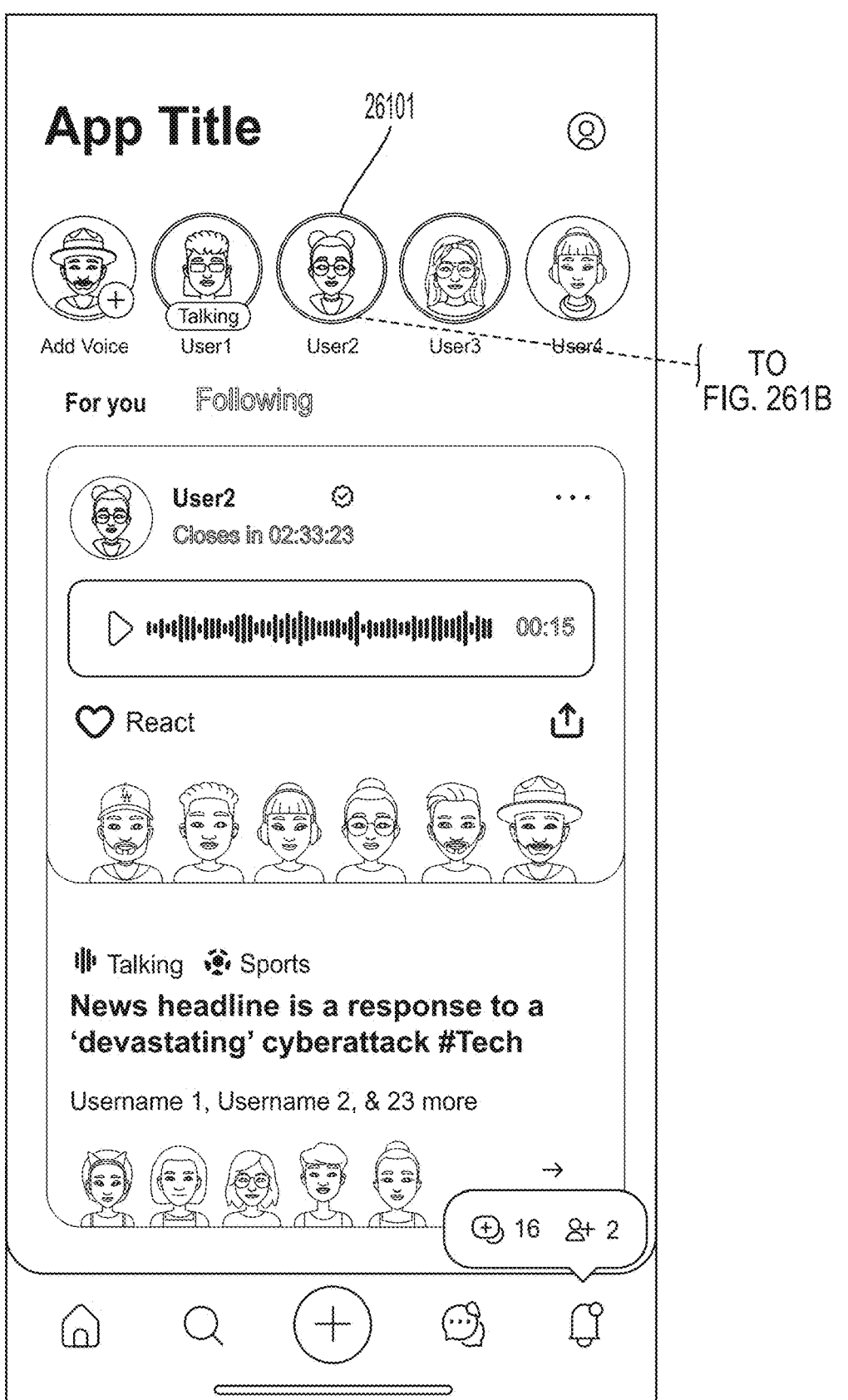
Figures 261A, 261B, 261C:
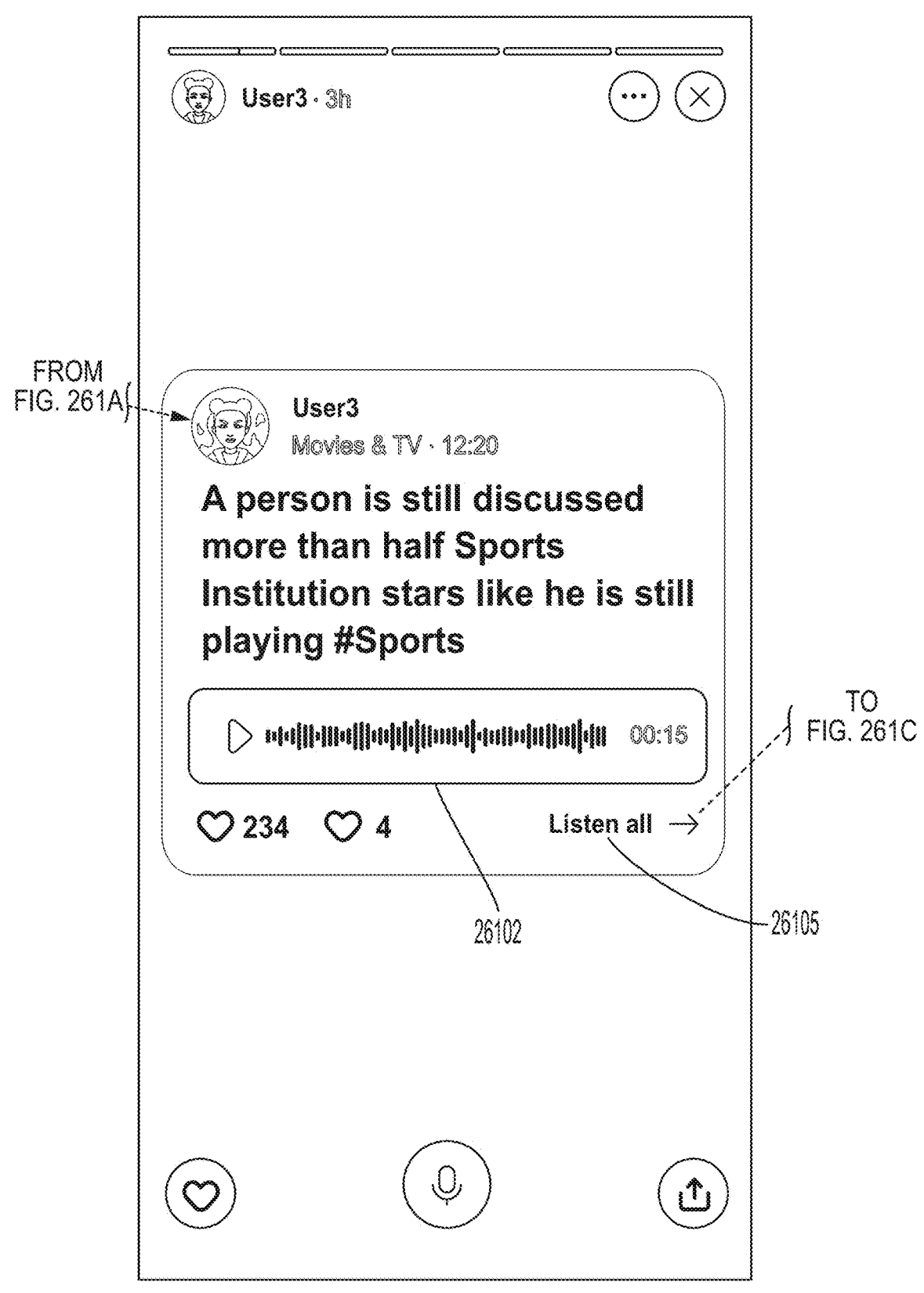
Figure 261C:
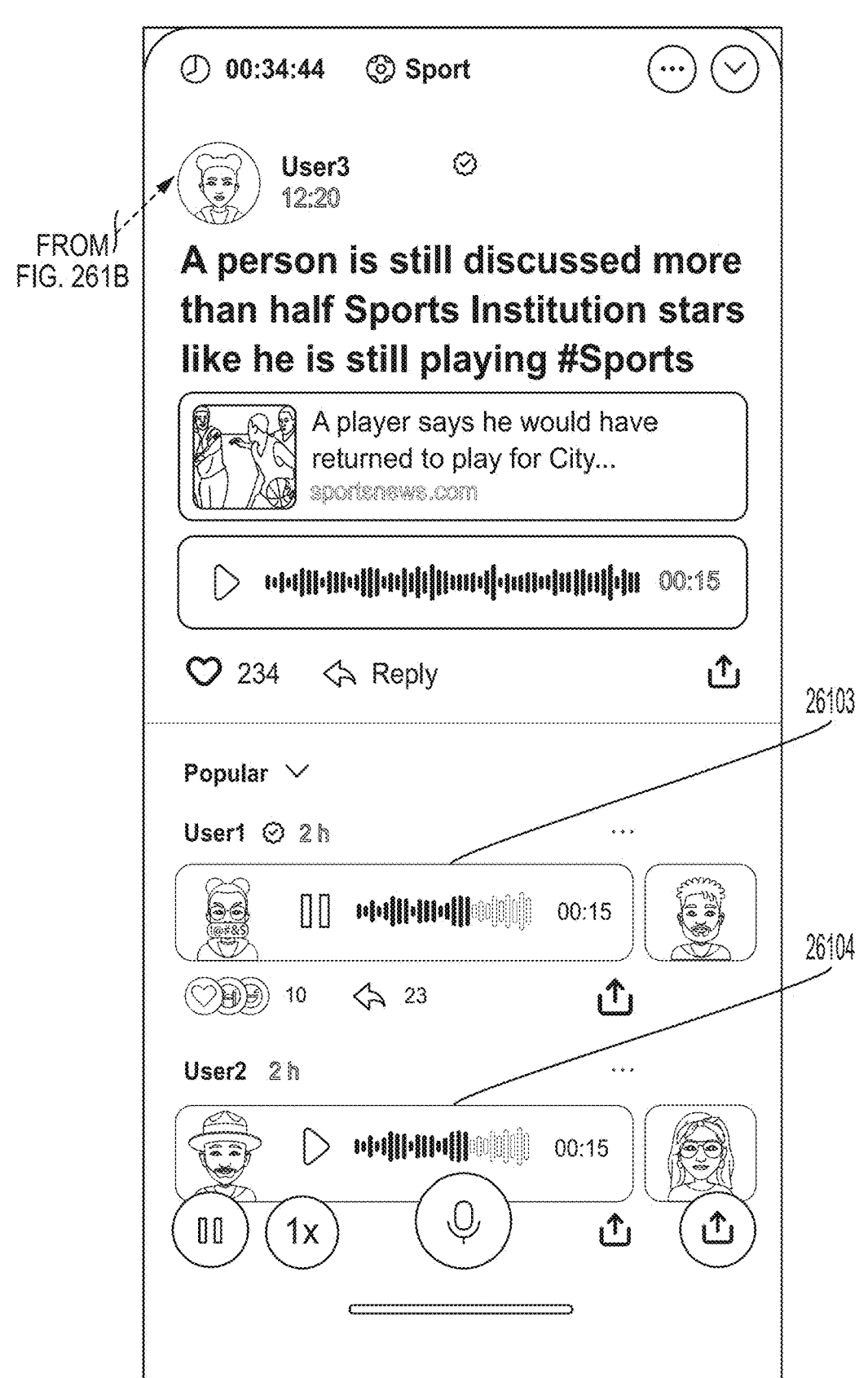

FIGS. 261a, 261b, and 261c show mobile application screens that a user may be presented with when clicking on content from a row or feed 26001. Clicking on an individual visual representation of a user may bring a user to a screen like that in FIG. 261B, which shows the audio clip 26102 or content associated that was being highlighted in the row or feed 26001. A user may be able to click an option like "Listen all" 26105 that takes them to a screen like that in FIG. 261C. This screen may display the entire thread containing the audio clip and any responsive audio clips or replies 26103, 26104.

Figure 262A:
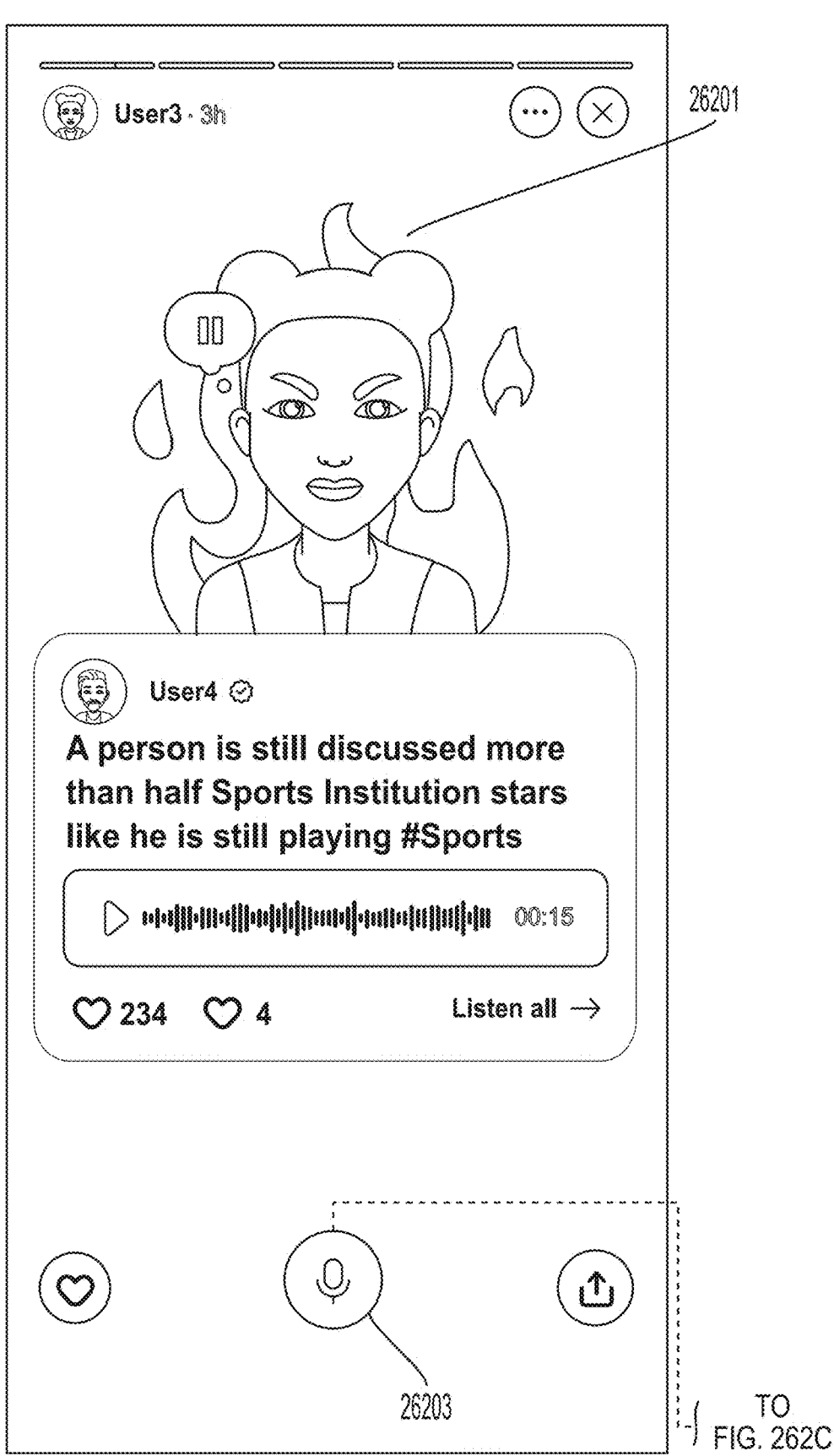
Figure 262B:
Figure 262C:
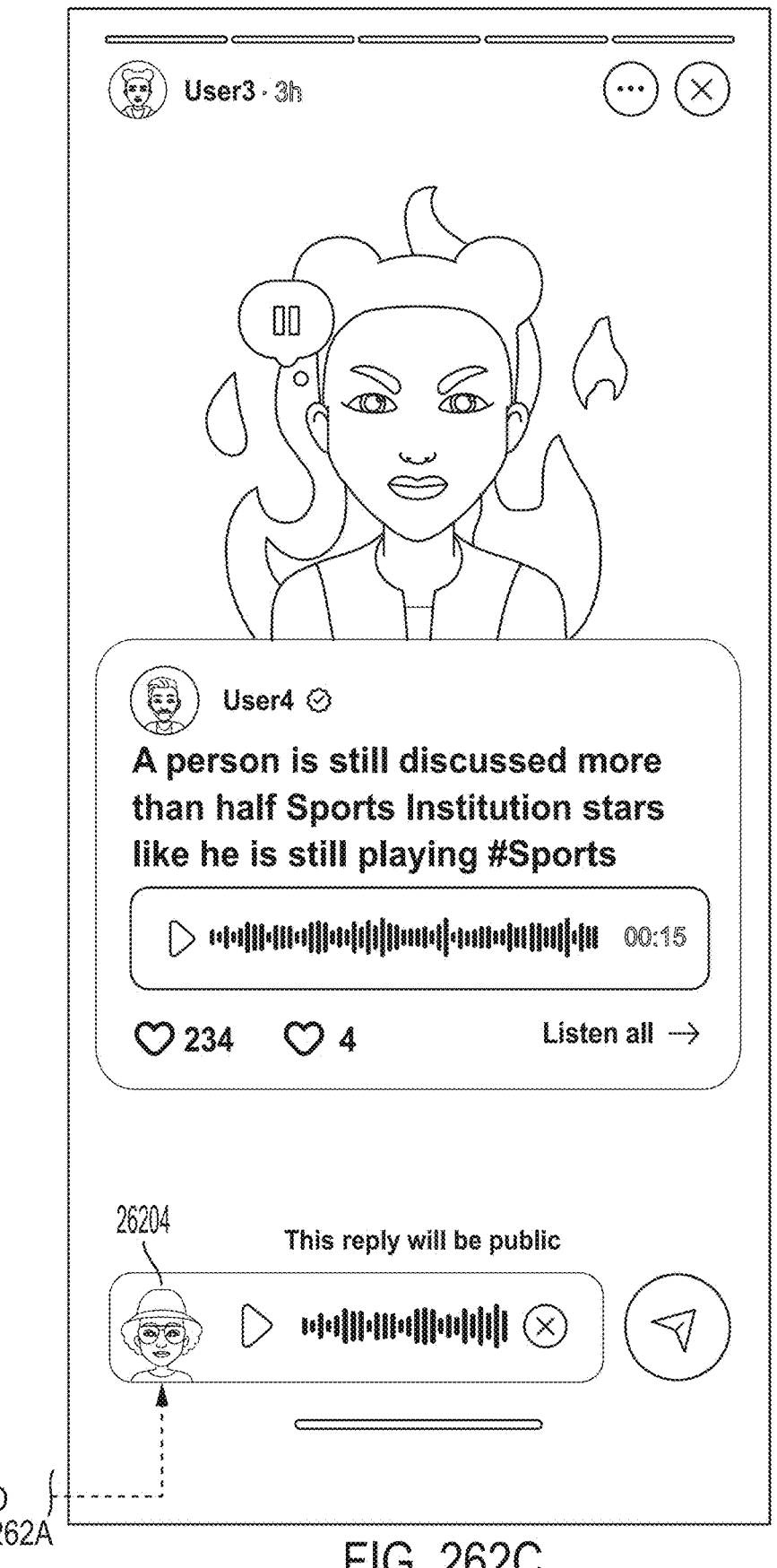

FIGS. 262a, 262b, and 262c show mobile application screens that a user may be presented with when clicking on content from a row or feed 26001. A user may be presented with an audio clip 26201 that was posted in response to, or within the thread of, an audio clip post or share. A user may be able to click an option 26105 to see the thread itself, as shown in FIG. 262B. Viewing the thread may have the previously displayed response 26202 shown in the context of the original post. A user may have an option 26203 to record a response 26204 to the audio clip 26201, which may also be posted in the original thread as shown in FIG. 262B.

Figure 263A:
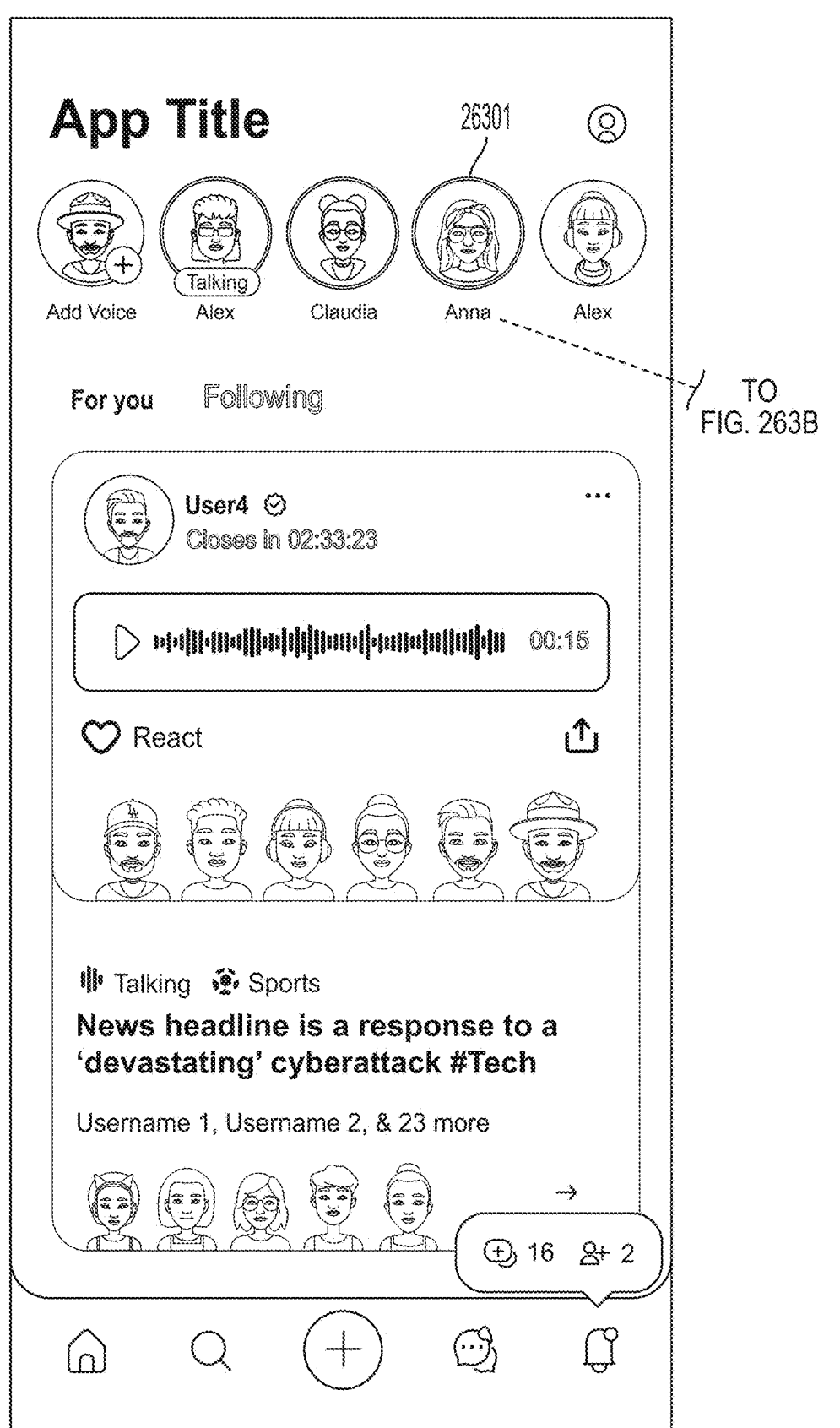
Figures 263A, 263B, 263C:
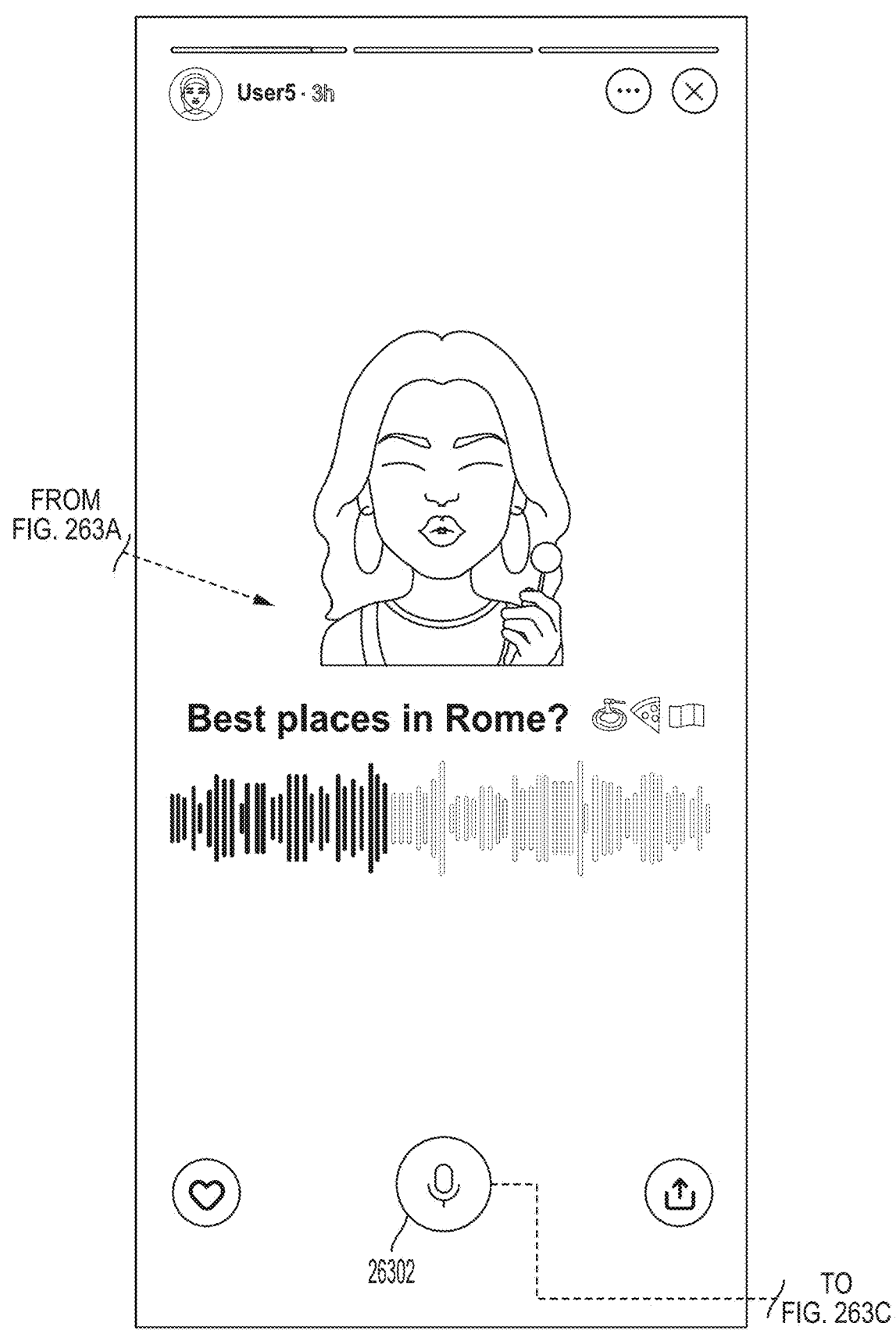
Figures 263B, 263C:
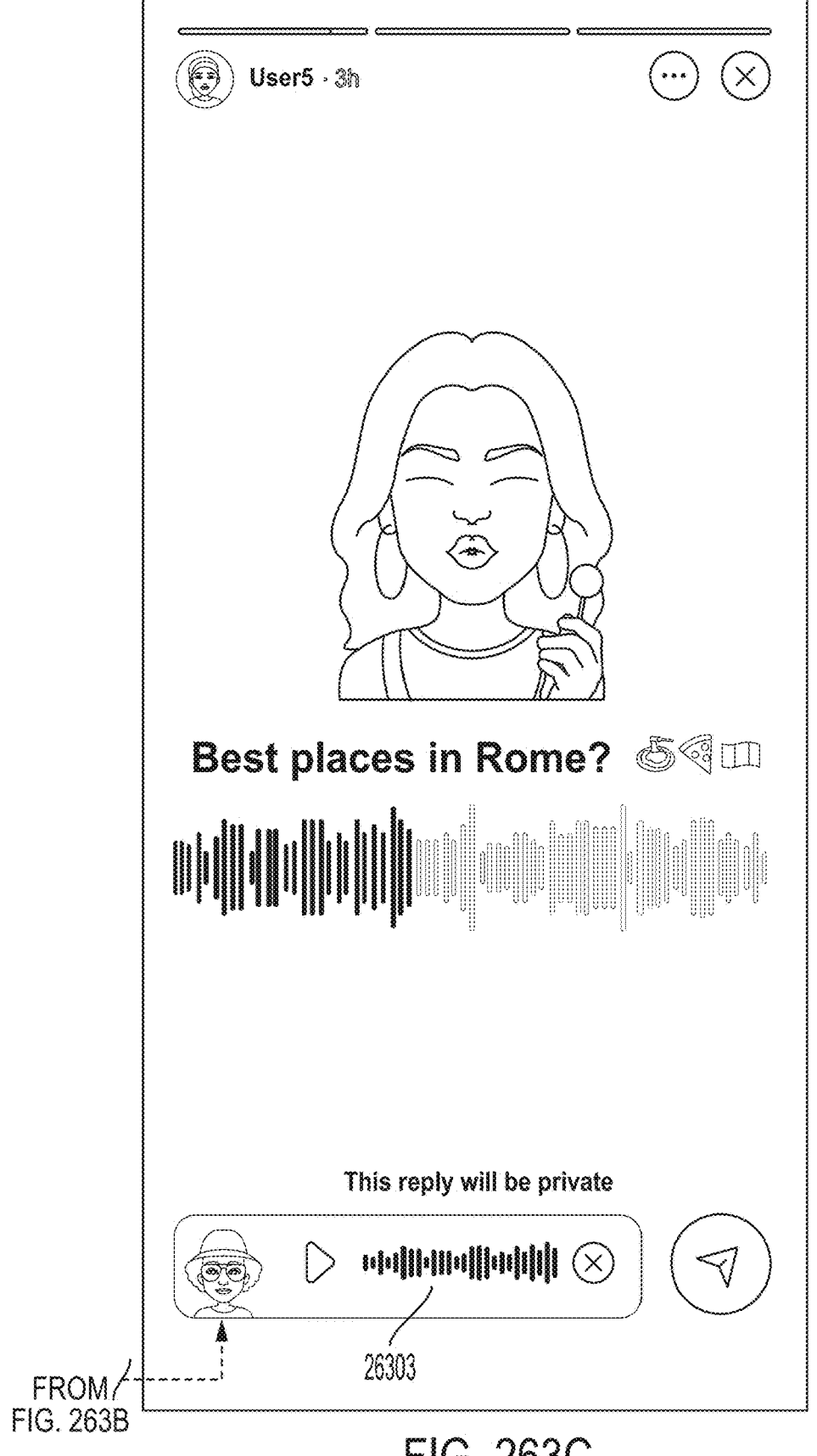

FIGS. 263a, 263b, and 263c show mobile application screens that a user may be presented with when clicking on content from a row or feed 26301. A user may be presented with an audio clip that has been posted or shared on a user's account, as shown in FIG. 263B. This audio clip may be viewable on a user's profile for a limited duration. This audio clip may be viewable by users who follow the recording user. A user may have an option 26302 to record a response 26303 to the audio clip, which may be sent to the original audio clip's recording user as a private message.

Figure 264A:
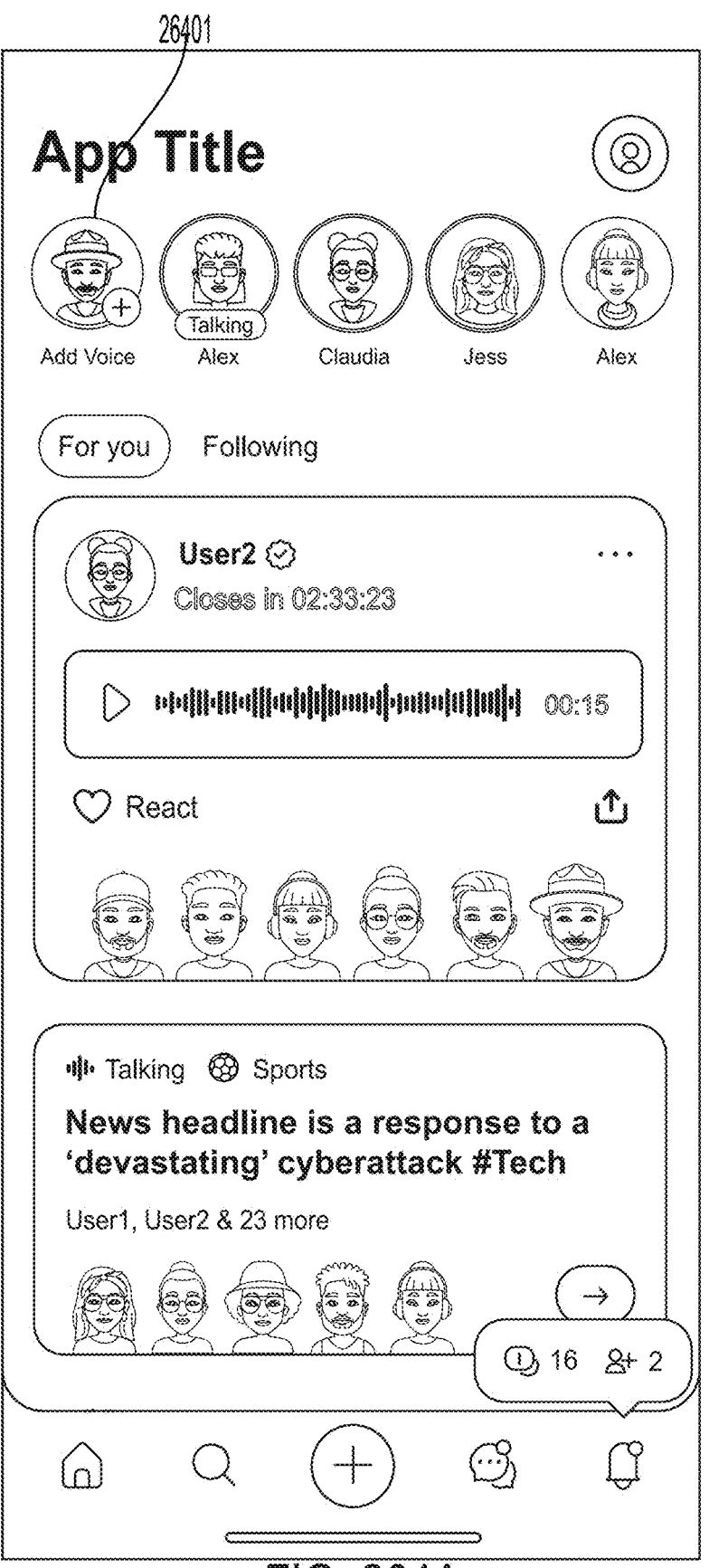
Figure 264B:
Figure 264C:

FIGS. 264a, 264b, and 264c show mobile application screens that a user may be presented with when recording 26402 an audio clip 26403. A user may click on their own visual representation 26401 within a row or feed, which may bring them to a screen as shown in FIG. 264B. A user may be able to record 26402 an audio clip 26403 for posting, sharing, or sending from this screen. A user may be able to add associated text or visual elements 26404 to be posted, shared, or sent alongside the audio clip 26403. Visual elements 26404 may include customized movements or reactions from a visual representation or avatar.

Figure 265A:
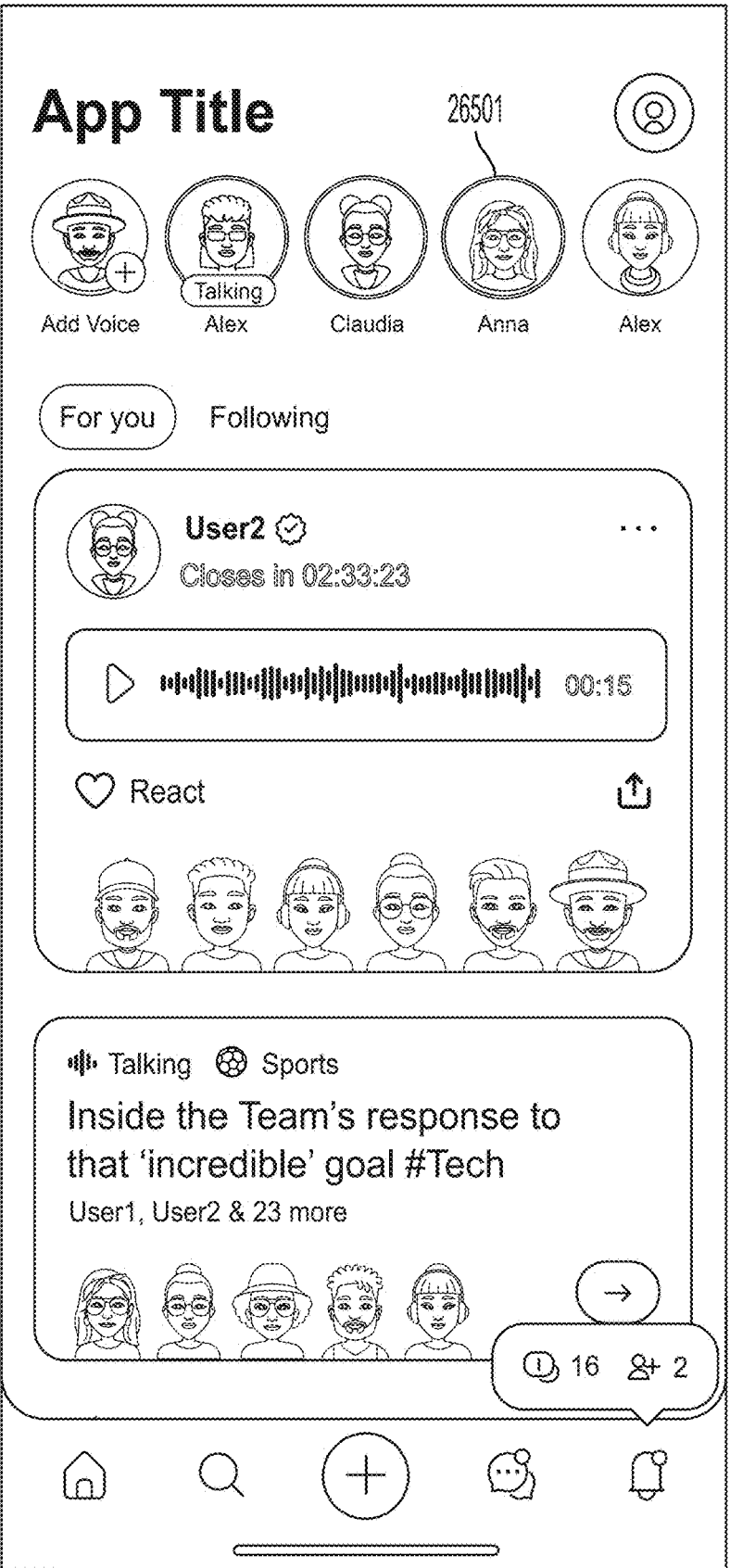
Figure 265B:
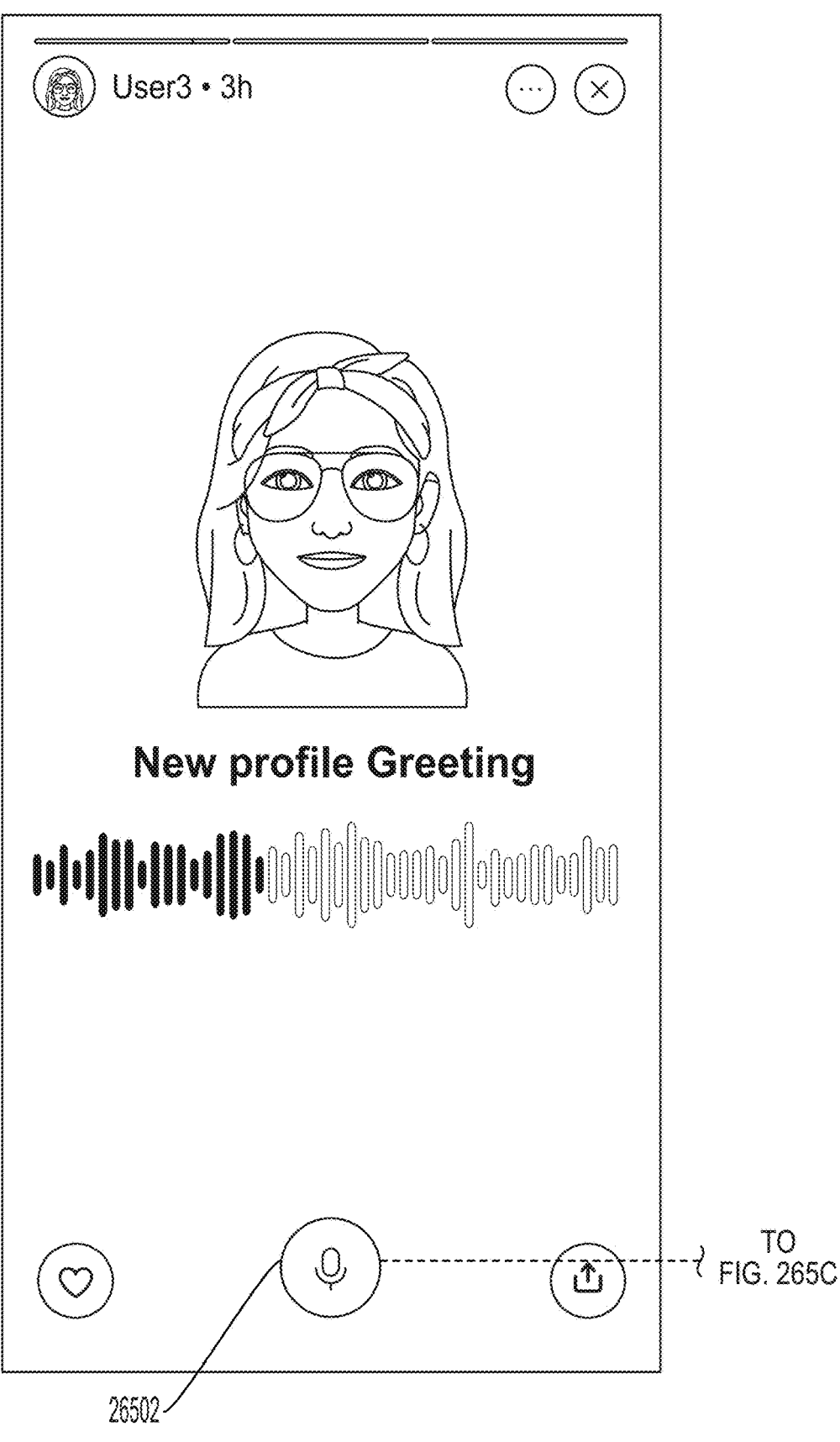
Figure 265C:
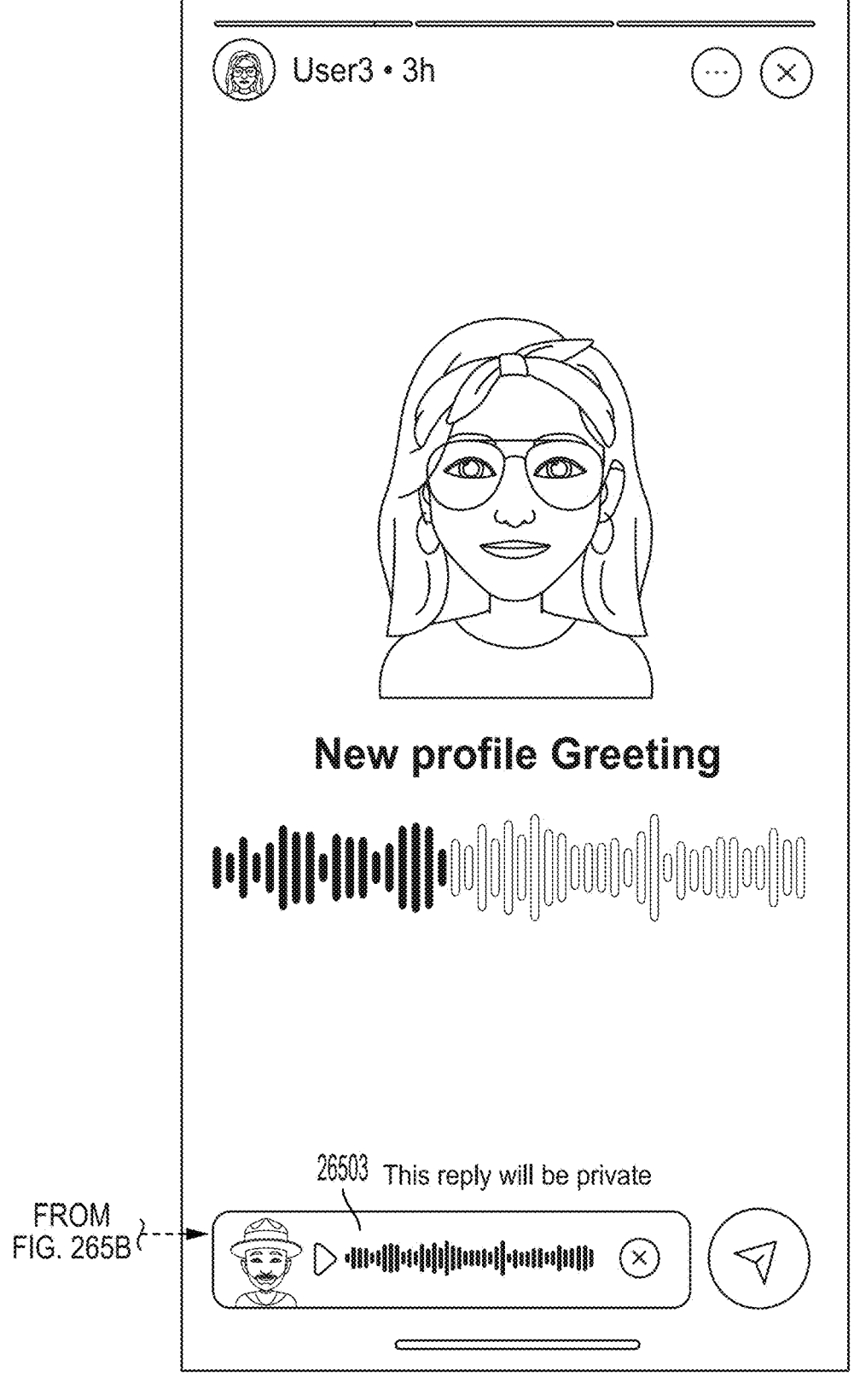

FIGS. 265a, 265b, and 265c show mobile application screens that a user may be presented with when clicking on content from a row or feed 26501. Selecting the content from a row or feed 26501 may bring a user to a screen like that shown in FIG. 265B. A user may record an audio clip that is associated with their profile, and may be viewable by anyone who is viewing their profile or who may follow their profile. This audio clip may allow other users to respond, "like" 26502, or reply 26503 via audio clip. This responsive audio clip may be sent to the original audio clip's recording user as a private message.

Figure 266A:
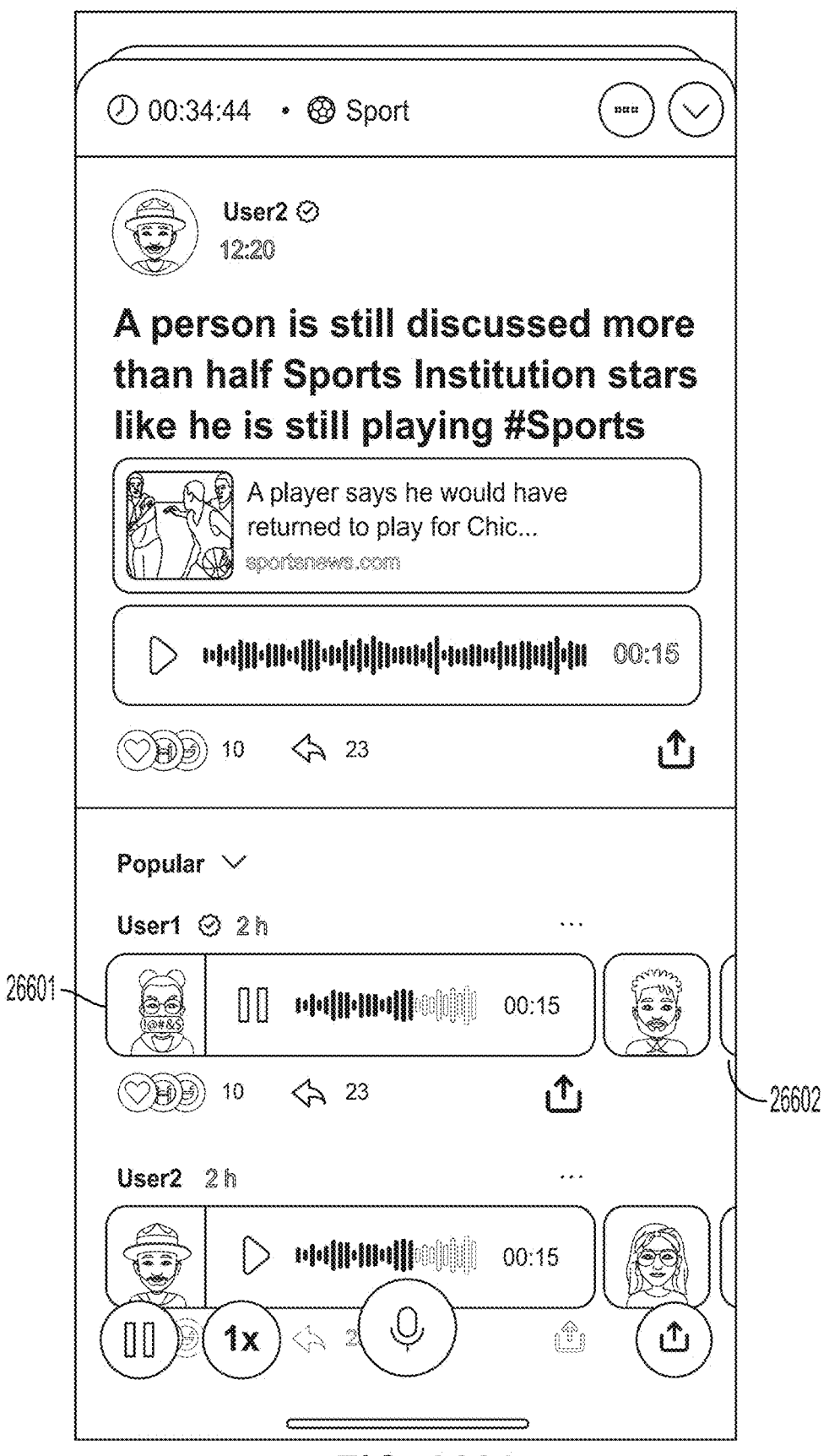
Figure 266B:
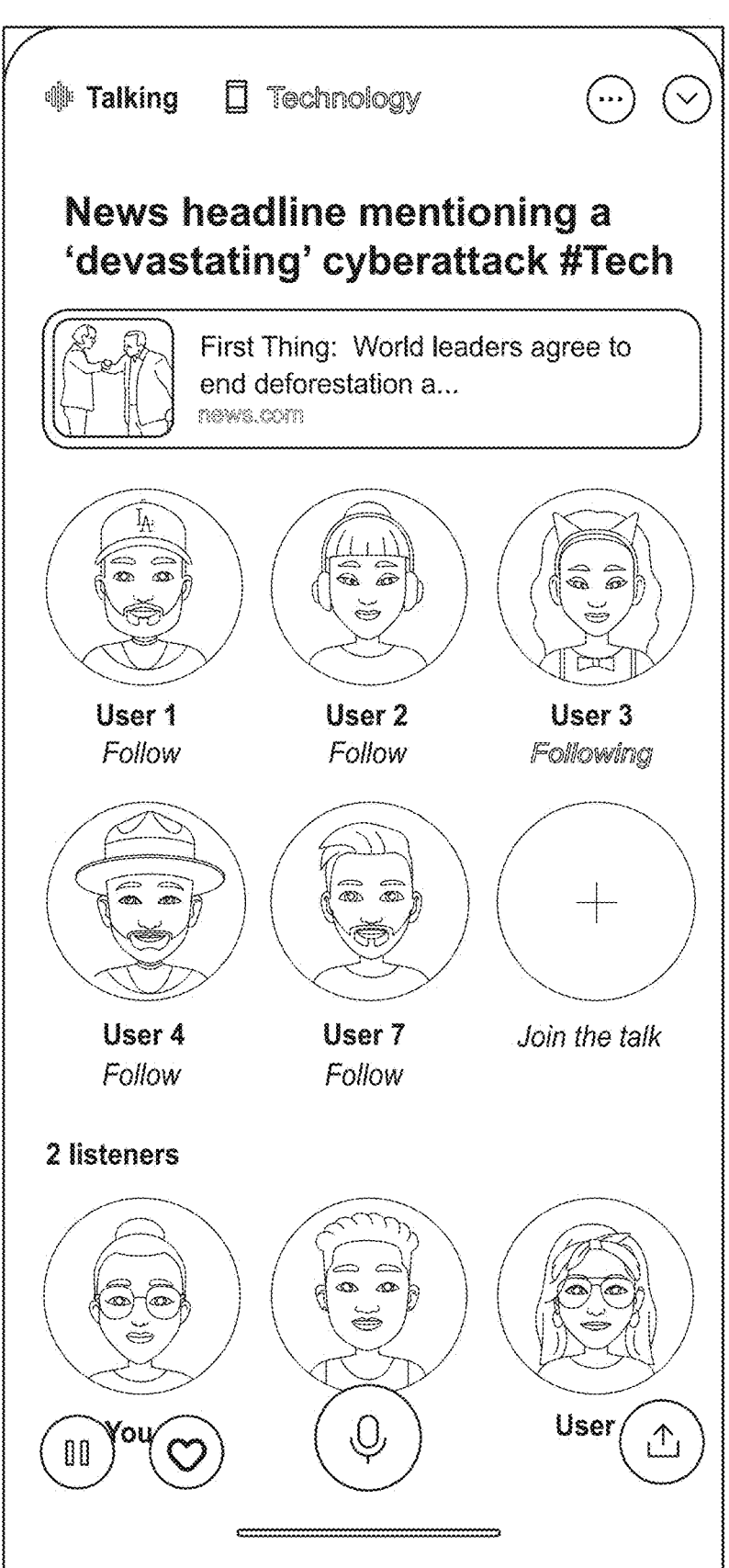
Figure 266C:
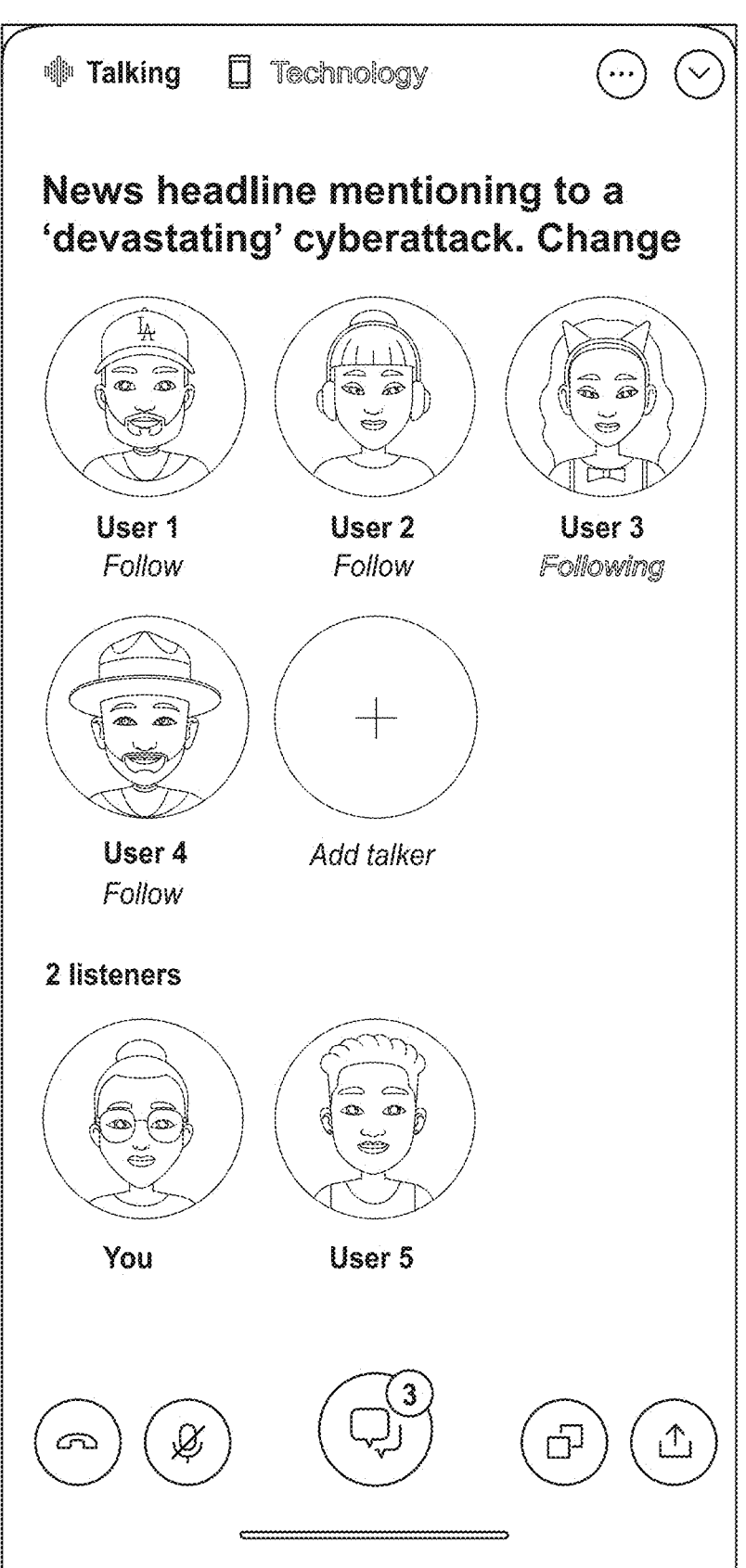

FIGS. 266a, 266b, and 266c show a series of screens at a user may be presented with when navigating different types of content within the mobile application. When viewing one type of content, such as the thread containing audio clips and audio clip replies 26601, 26602 shown in FIG. 266A, A user may be able to swipe or navigate to other content, such as the audio conversations seen occurring in FIGS. 266B and 266C, from the content that is currently presented. The mobile application may suggest or automatically determine which new content will be presented to a user when a user swipes.

Figure 267:
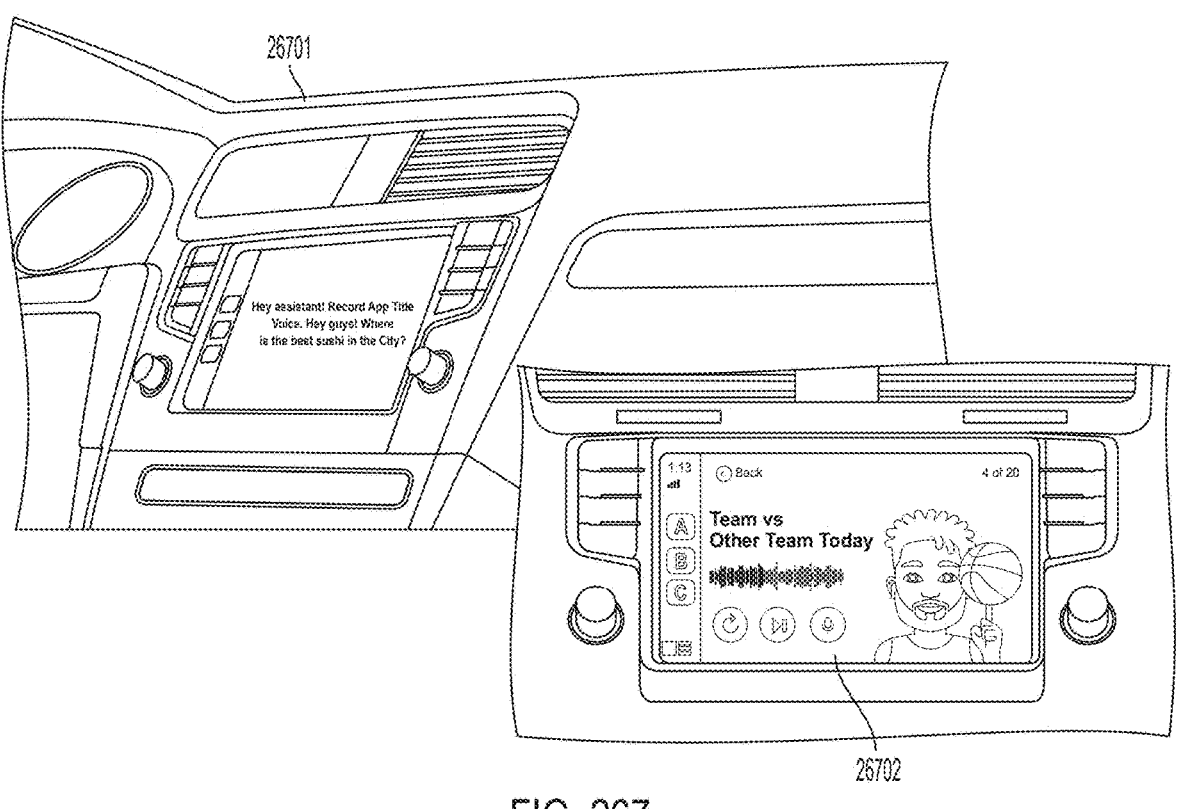

FIG. 267 shows an implementation of mobile application connectivity with a vehicle 26701. Content 26702, such an audio clip or audio conversation, from the mobile application may be integrated with a vehicle 26701, such that the content 26702 may be played through the vehicle's 26701 audio system. A user may utilize vehicle 26701 voice commands to interact with the mobile application.

Figure 268A:
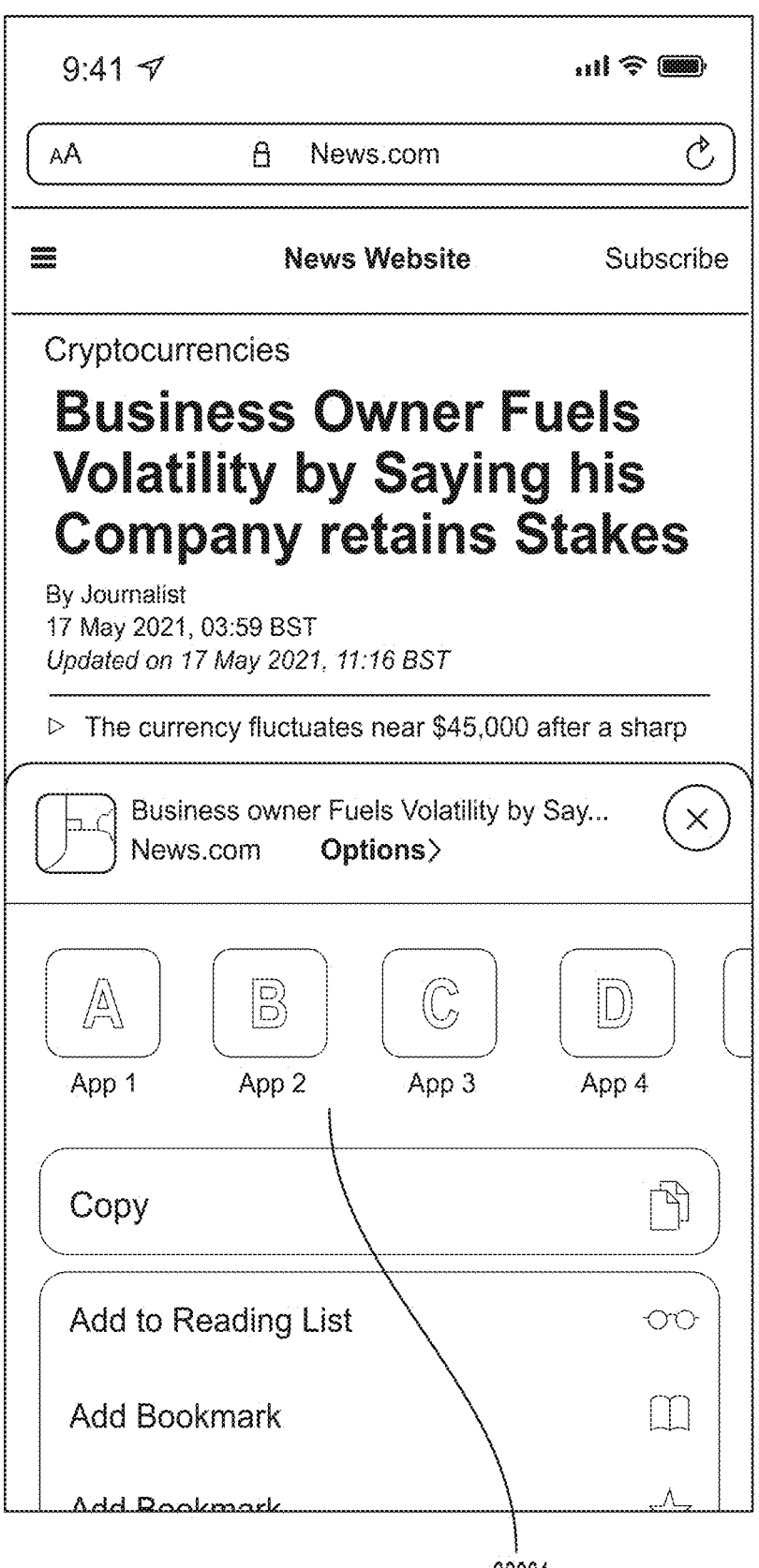
Figure 268B:
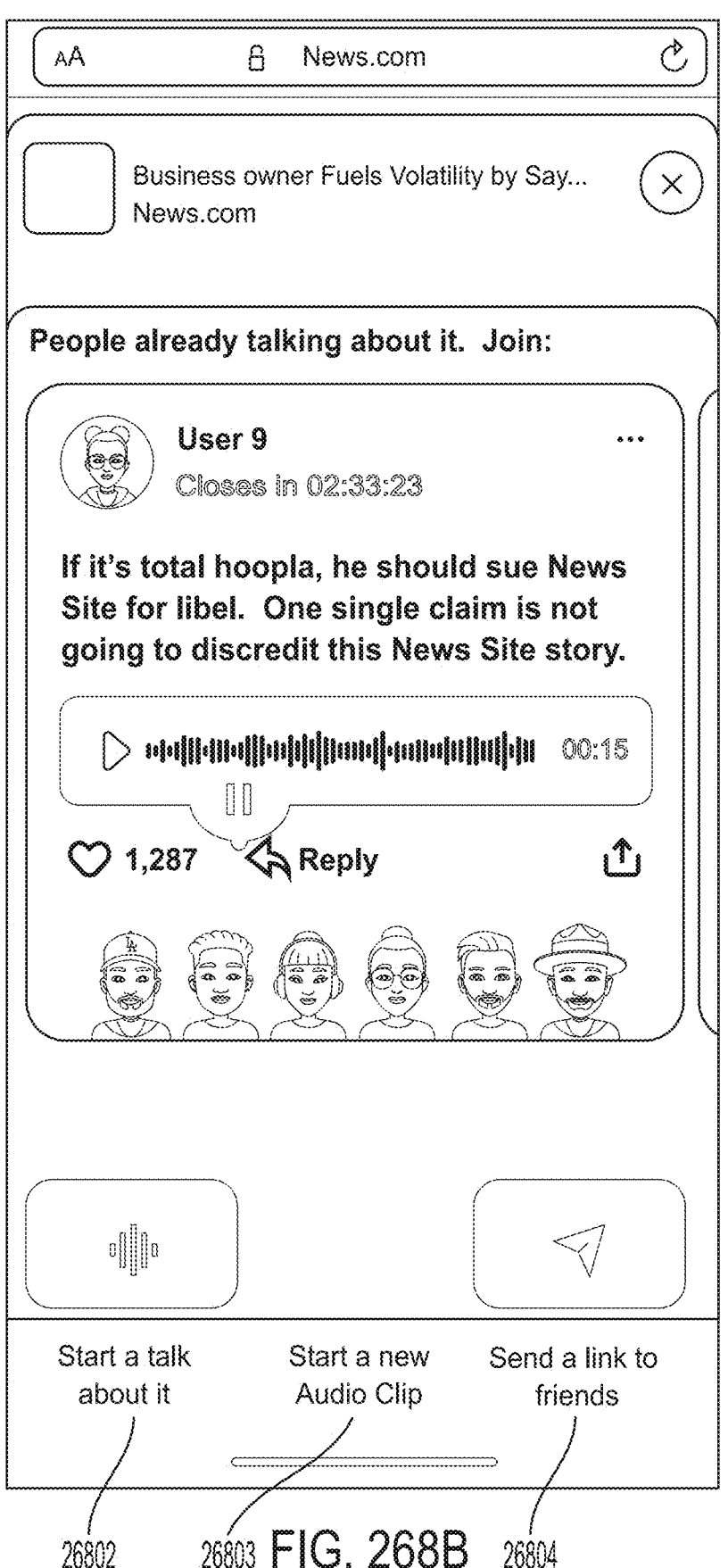
Figure 268C:
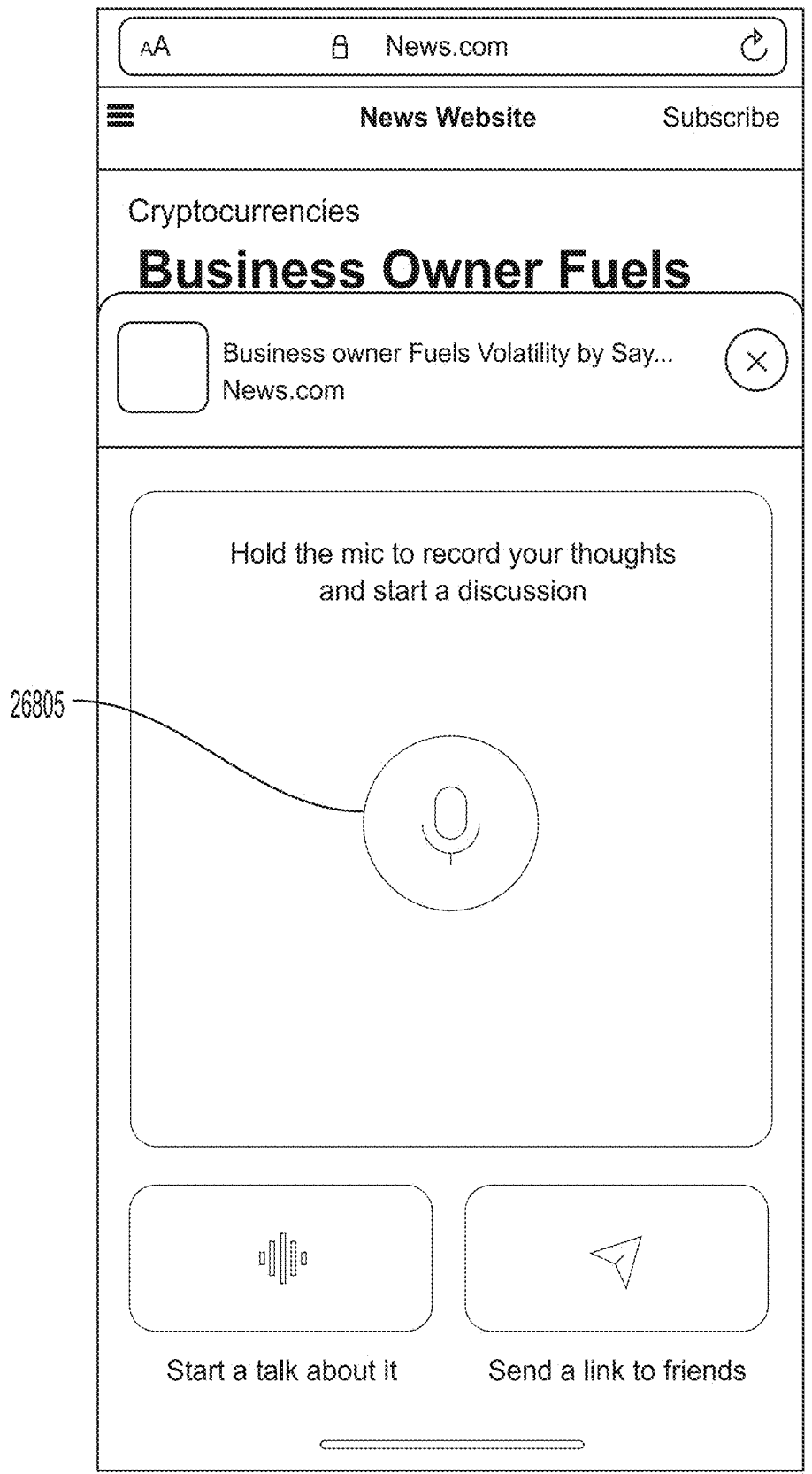

FIGS. 268a, 268b, and 268c show screens from a web browser or application that may be presented to a user if the mobile application is integrated with such a web browser or application. When interacting with a webpage or other content within a web browser or application, a user may be able to select the mobile application 26801 and bring up a set of options 26802, 26803, 26804, for using the content within the mobile application. As shown in FIG. 268B, the mobile application may inform the user if there is already mobile application content based around the web content. In addition to this, the mobile application may present options to start an audio conversation 26802 about the web content, record an audio clip 26803 about the web content, or send a link 26804 to the web content to other uses within the mobile application. If a user selects to record an audio clip 26803, they may be presented with the options 26805 shown in FIG. 268C.

Figure 269:

FIG. 269 shows a potential "widget" or multimedia attachment 26901 that the mobile application may generate based on content within the mobile application. A widget or multimedia attachment 26901 may be embedded on a web browser or application, such that a user may interact with mobile application content from the web browser or application.

Figure 270A:
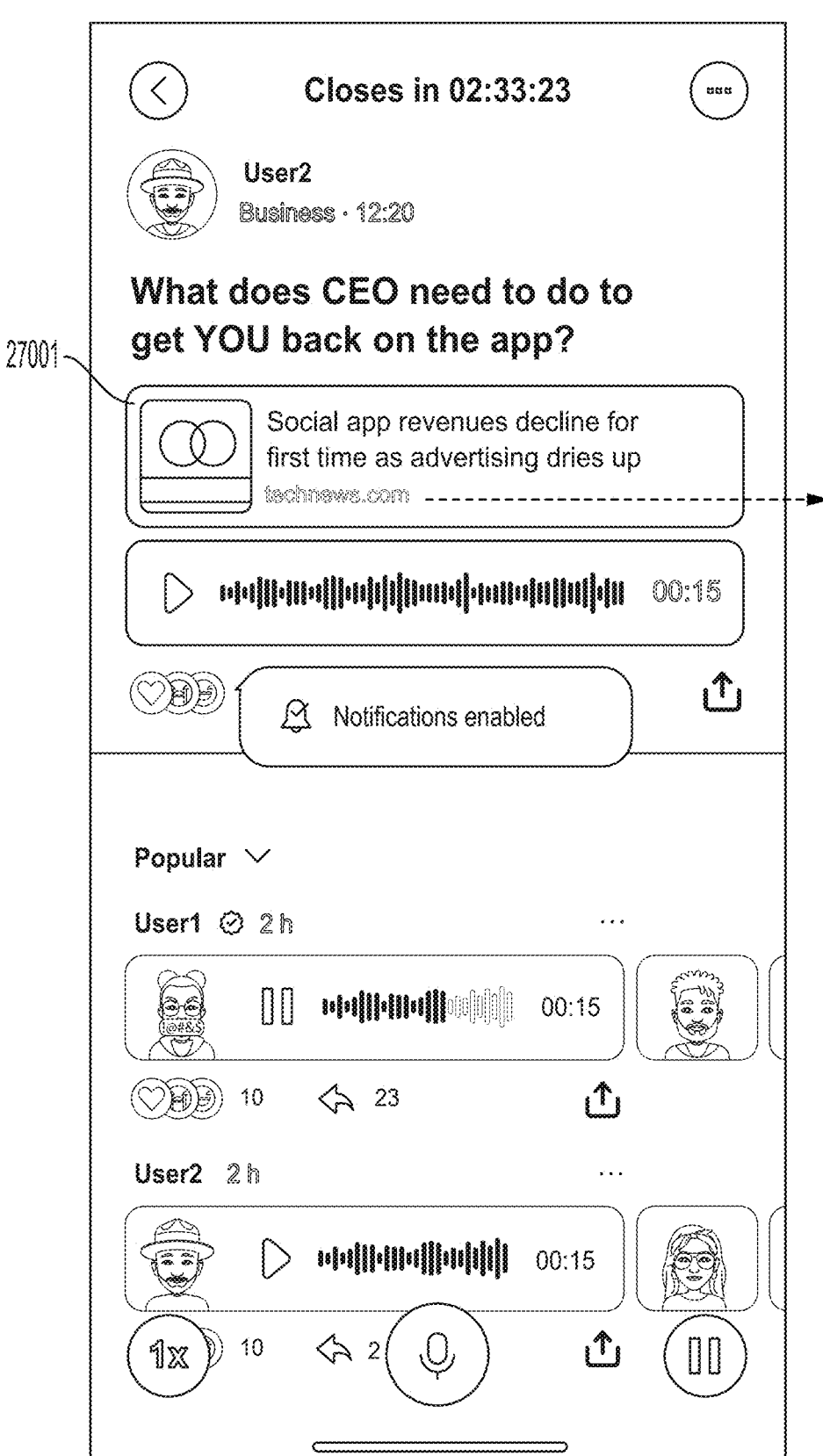
Figure 270B:
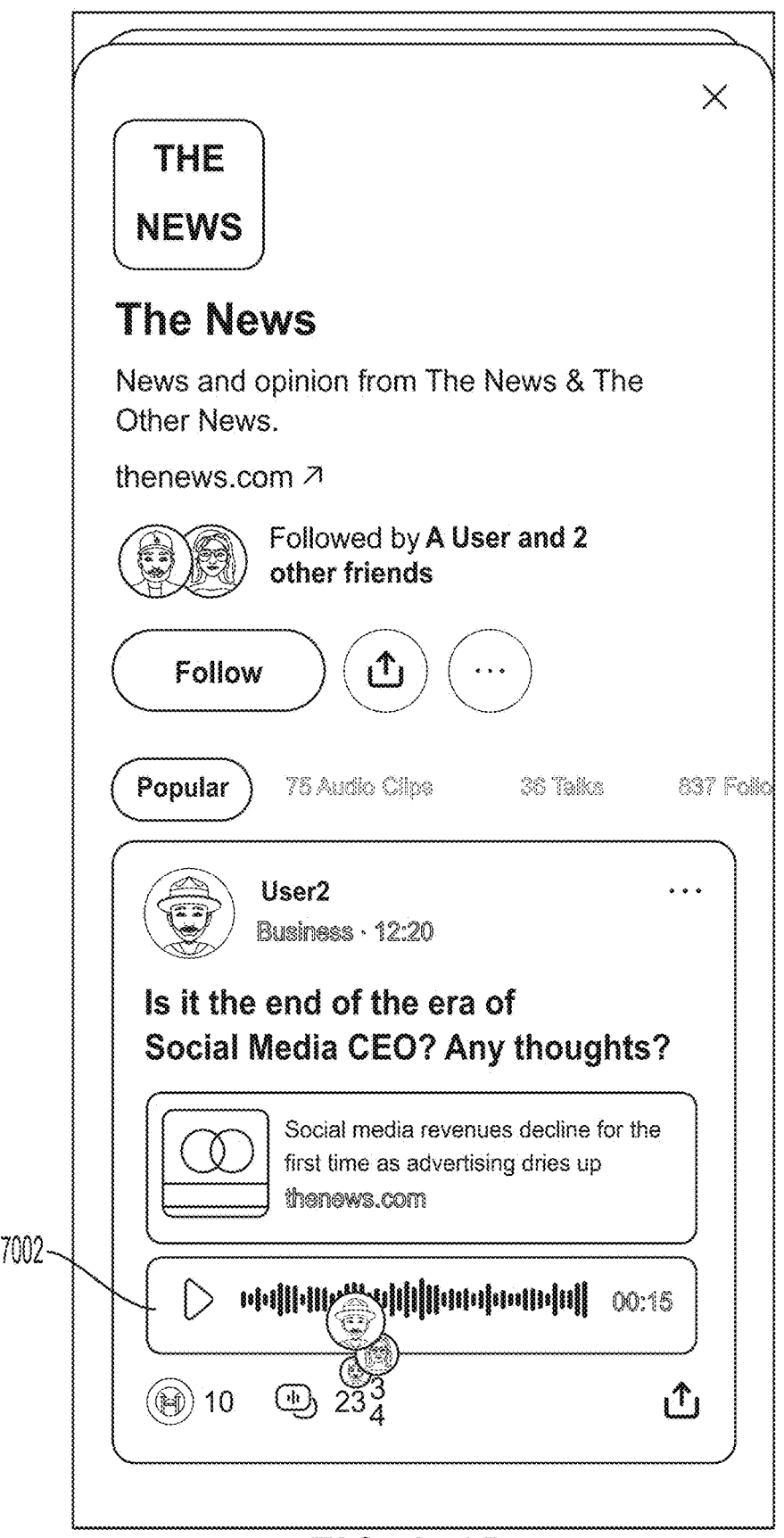

FIG. 270a, and 270b show screens from the mobile application that a user may be presented with when viewing and interacting with content within the mobile application. Some audio clips or content within the mobile application may include links to news sources 27001 or other external content. Clicking on these links 27001 may bring a user to a screen like that shown in FIG. 270B. This screen may show a profile or account associated with the news source or external content provider, and may present an option for a user to view audio clips or contents 27002 that have made mention of news or external content related to this profile or account.

Figure 271A:
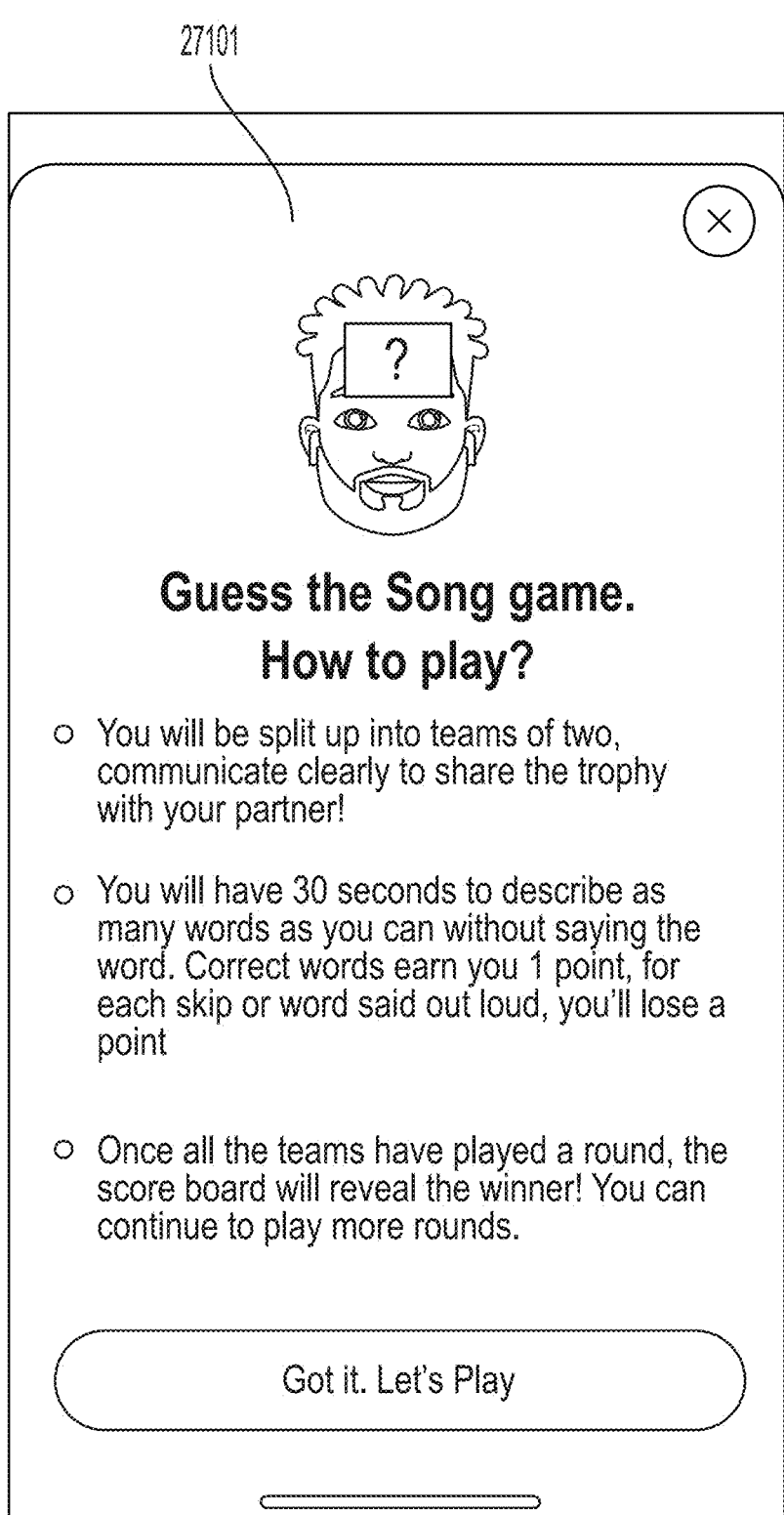
Figure 271B:
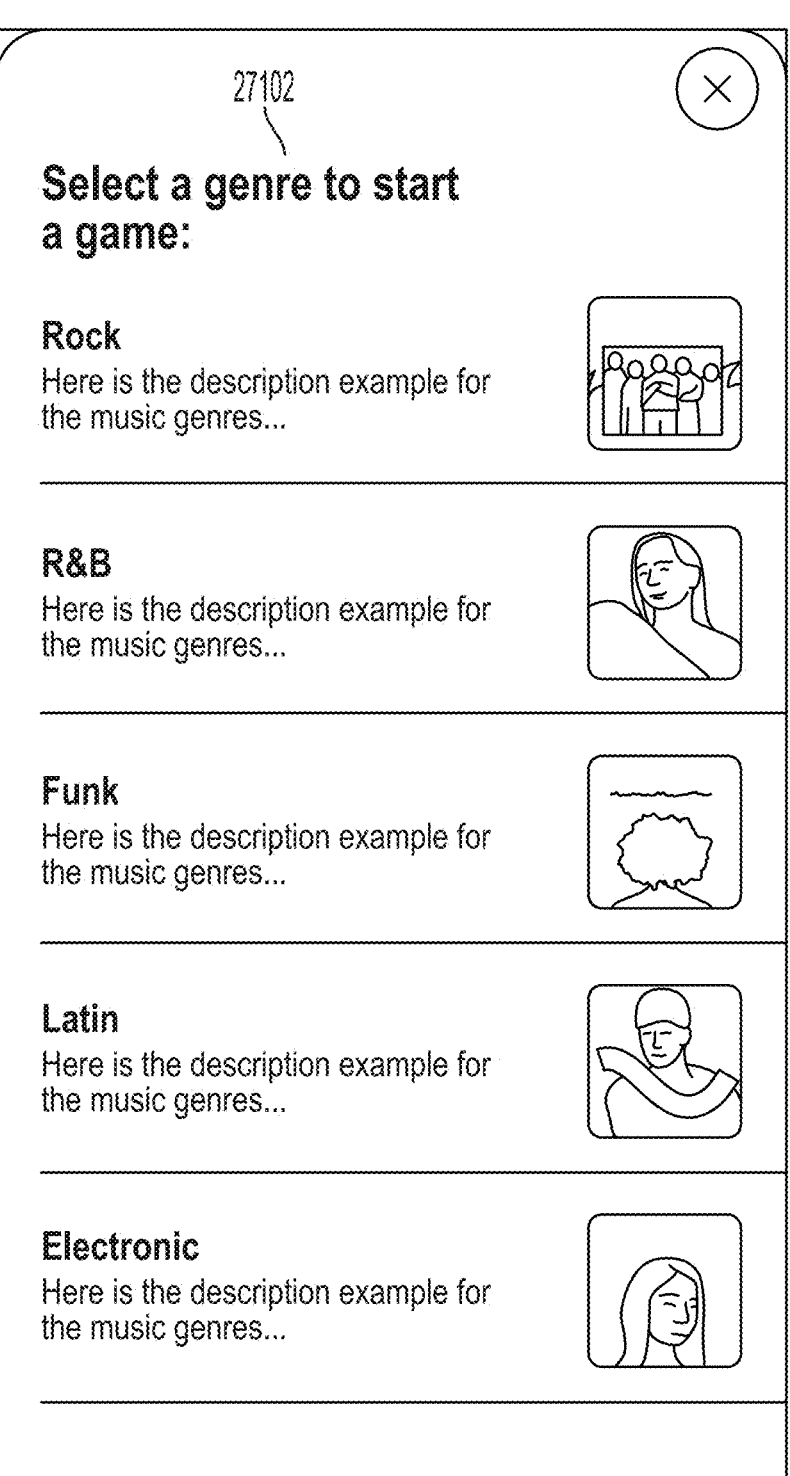
Figure 271C:
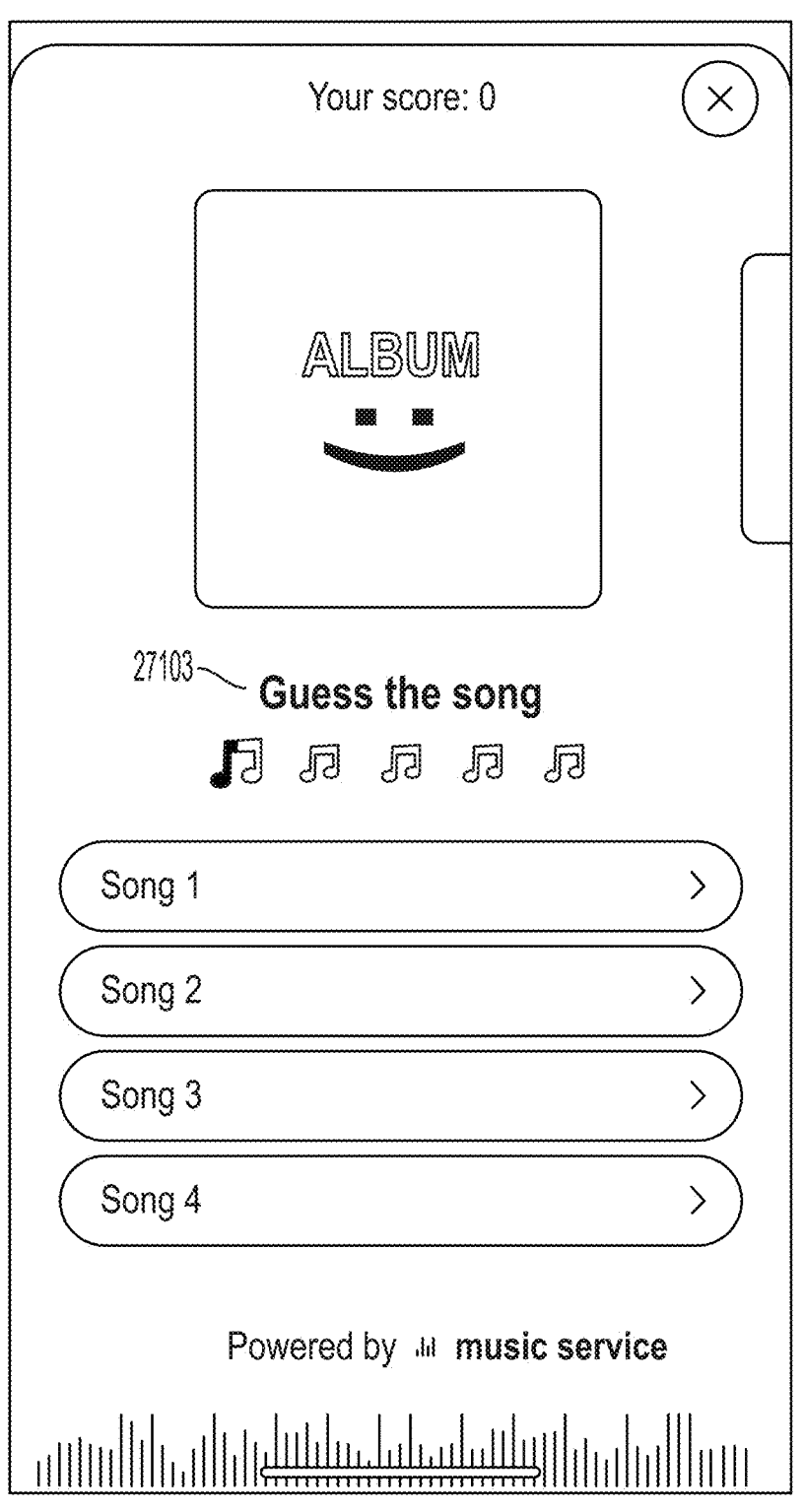

FIGS. 271a, 271b, and 271c show screens from the mobile application that a user may be presented with when participating in or interacting with playing a game within the mobile application. A user may be presented with various types of games 27101 that may be played within or outside of an audio conversation. One type of game may be a musical guessing game 27101. In a musical guessing game 27101, a user may be able to select a genre 27102 of music to limit the game's song library to. A user may be able to guess a song 27103 that is being played through the mobile application, as shown in FIG. 271C.

Figure 272A:
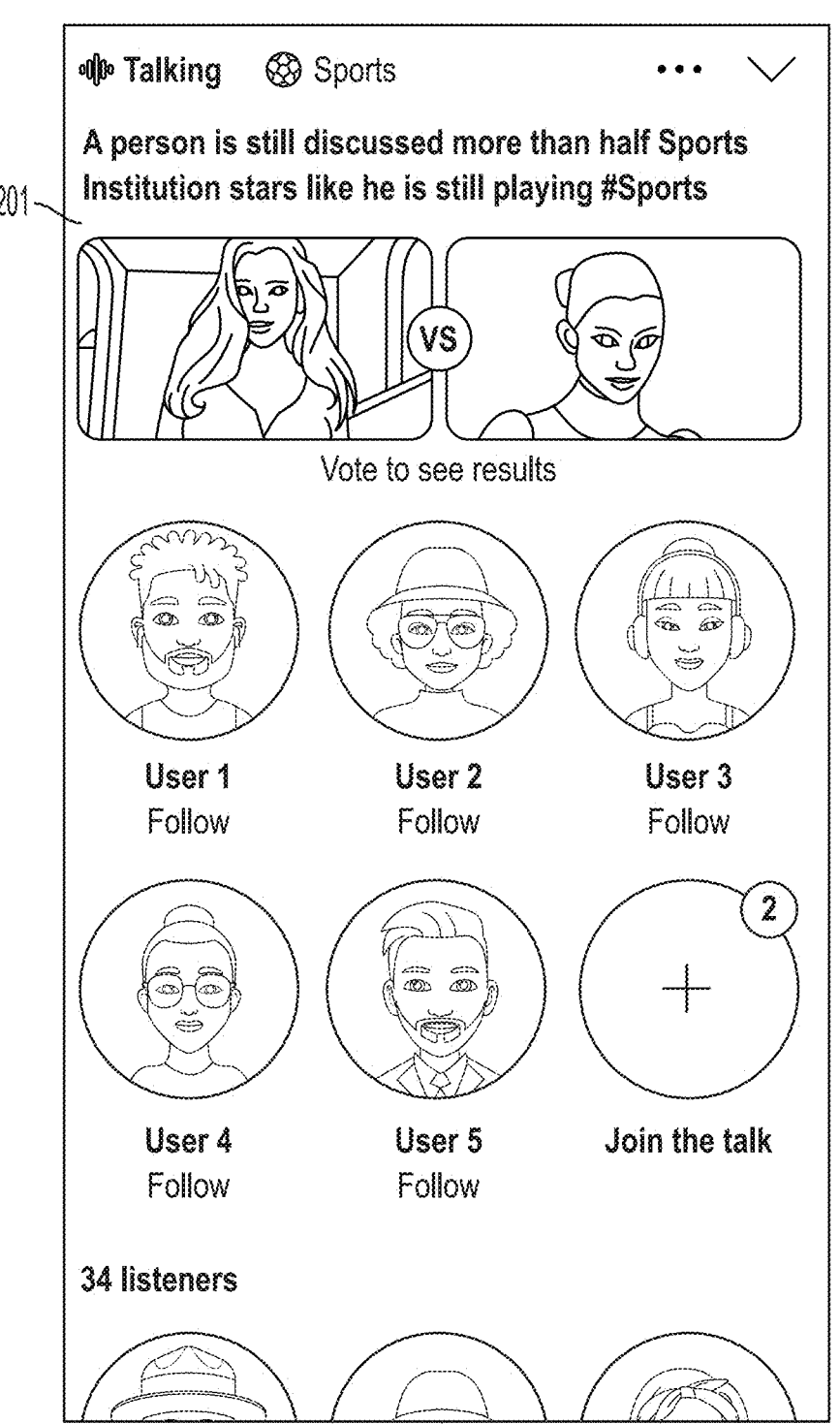
Figure 272B:
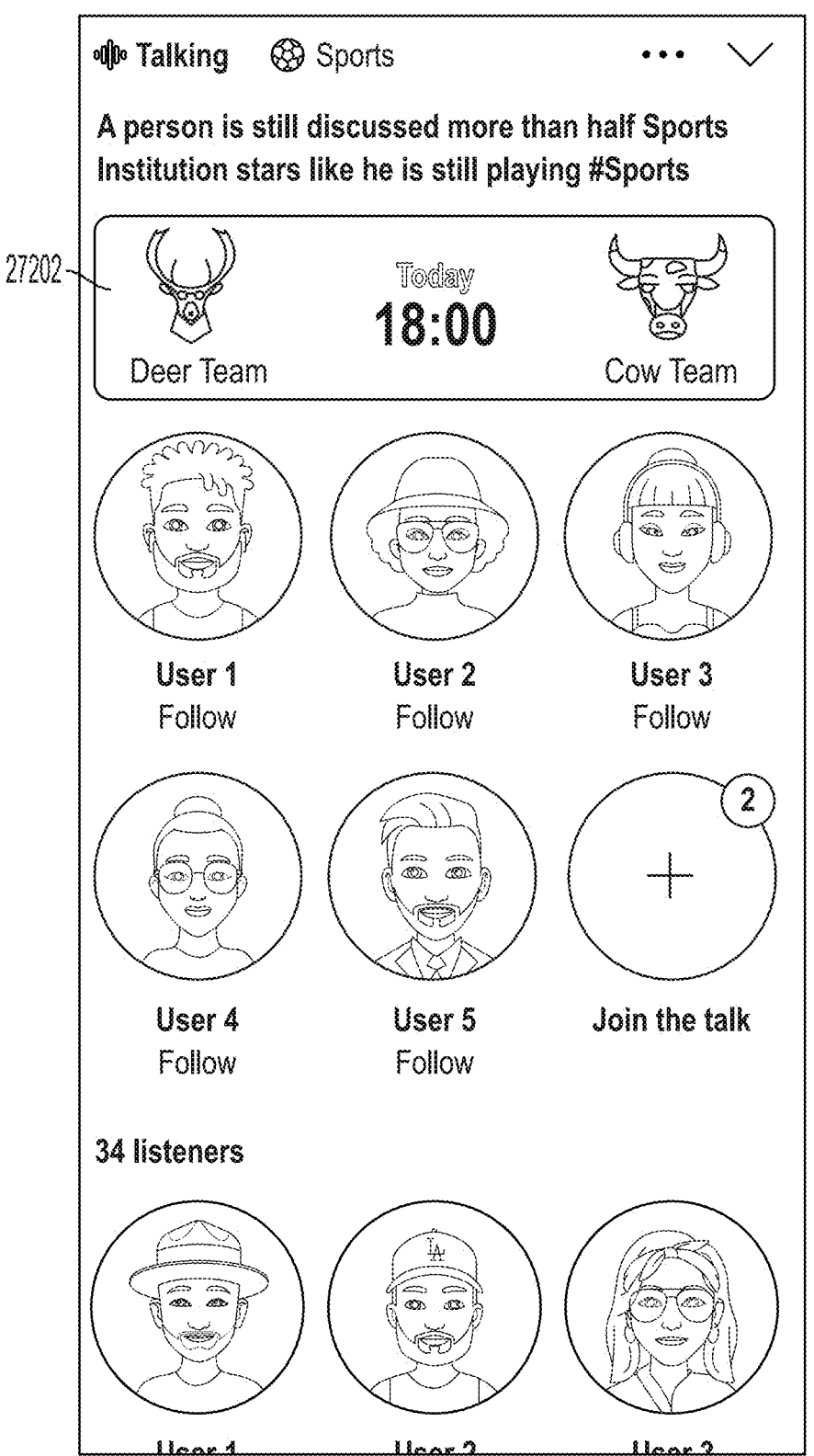
Figure 274:
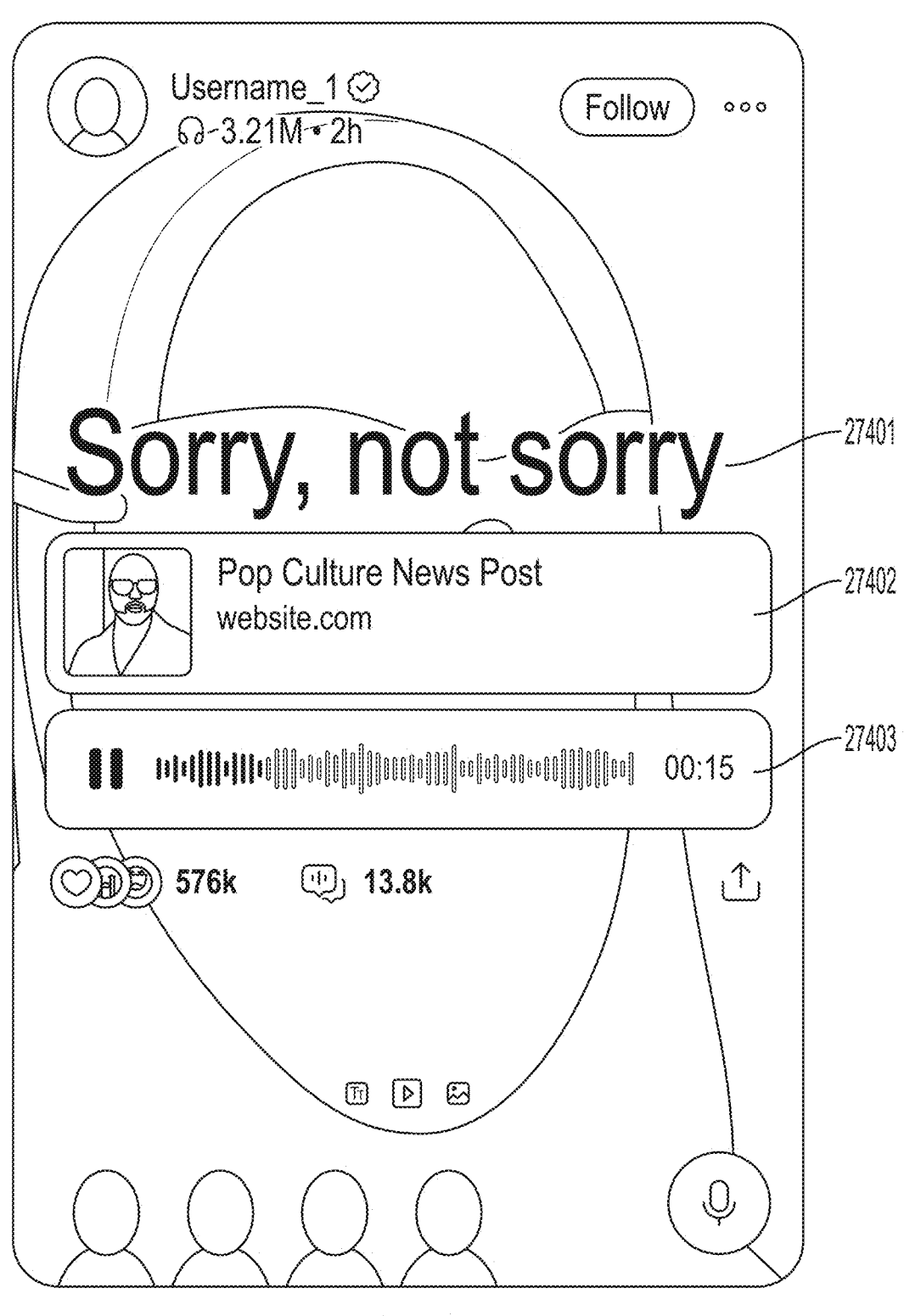
Figure 275:
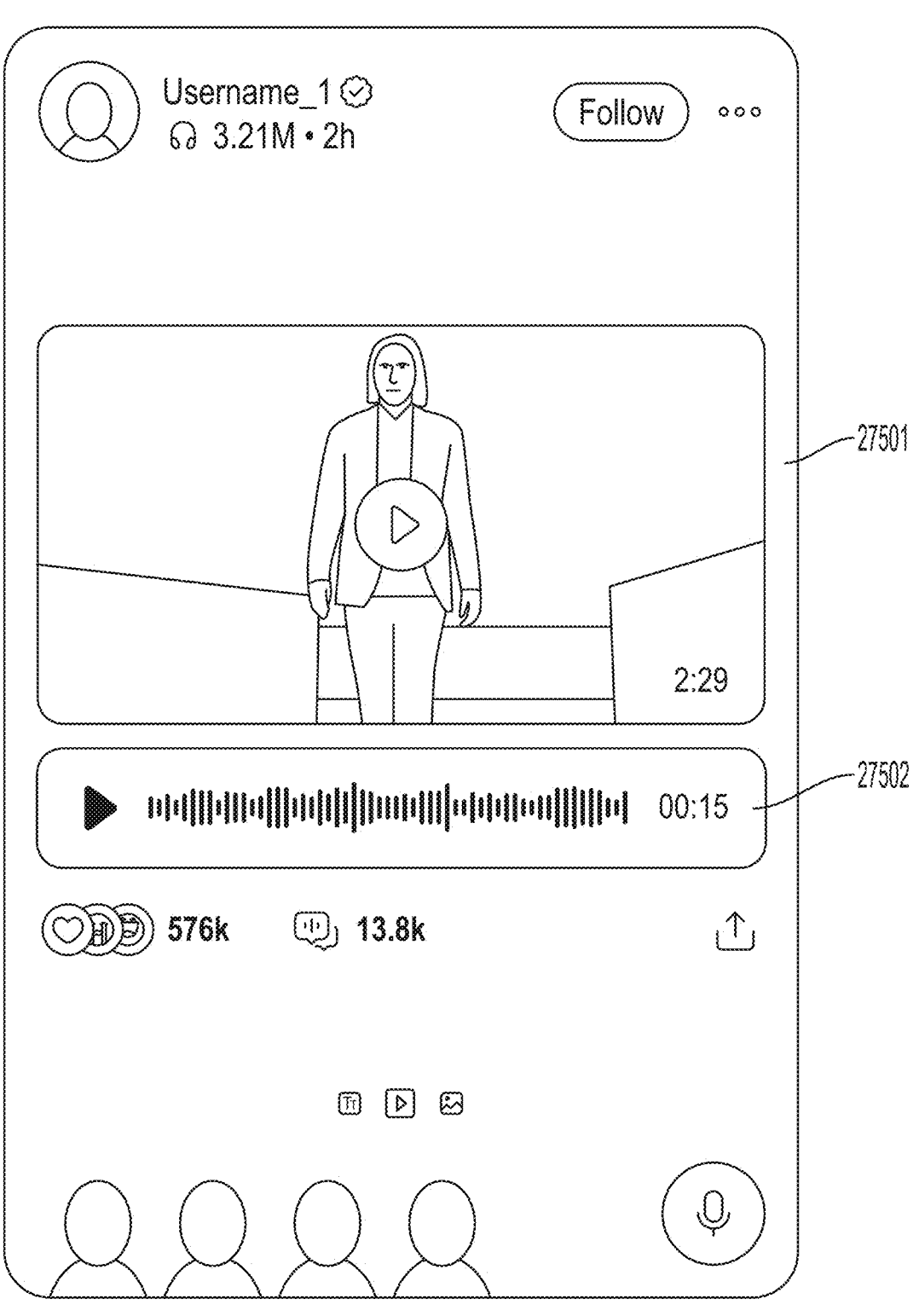
Figure 276:
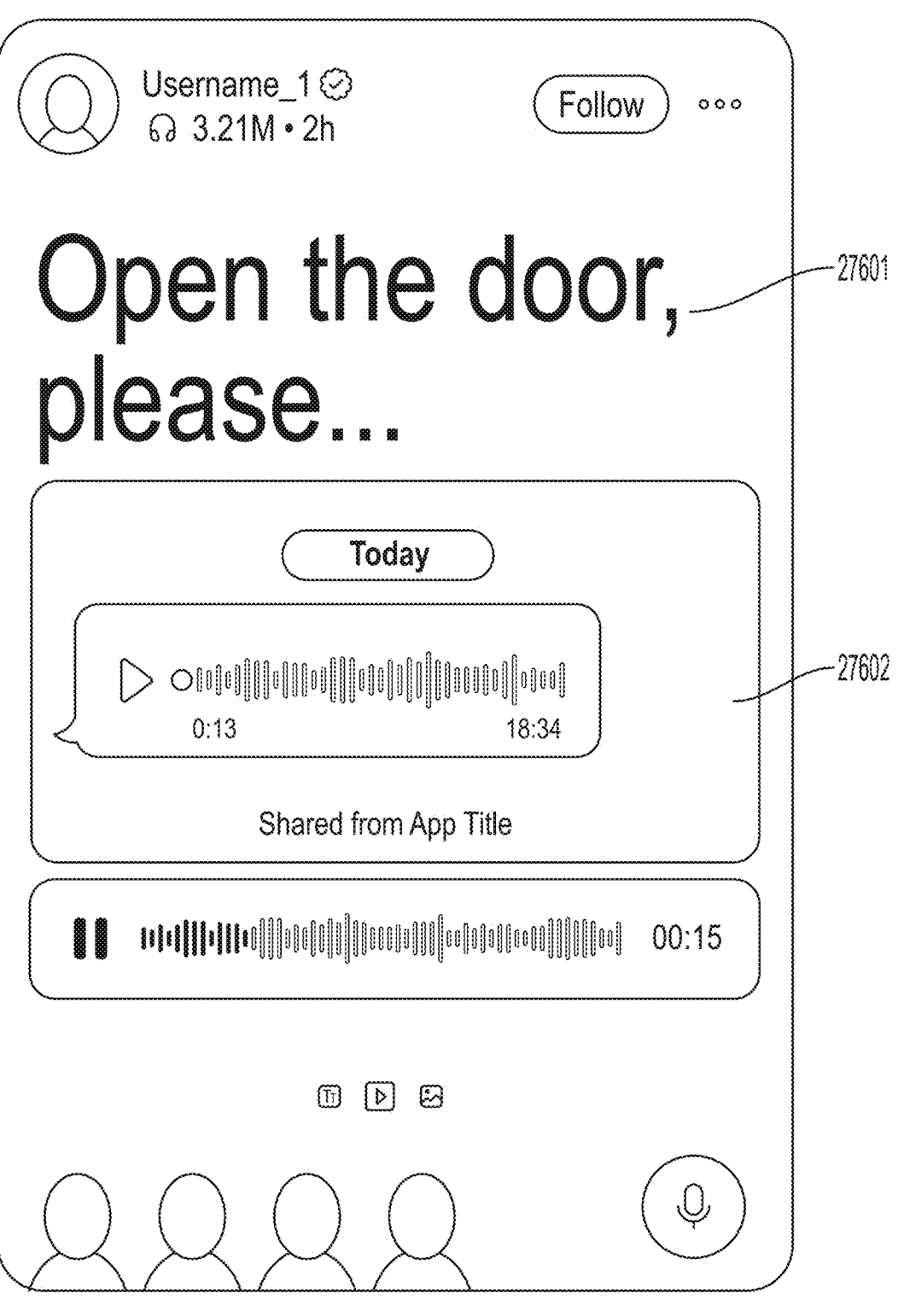
Figure 277:
Figure 278:
Figure 279:
Figure 280:
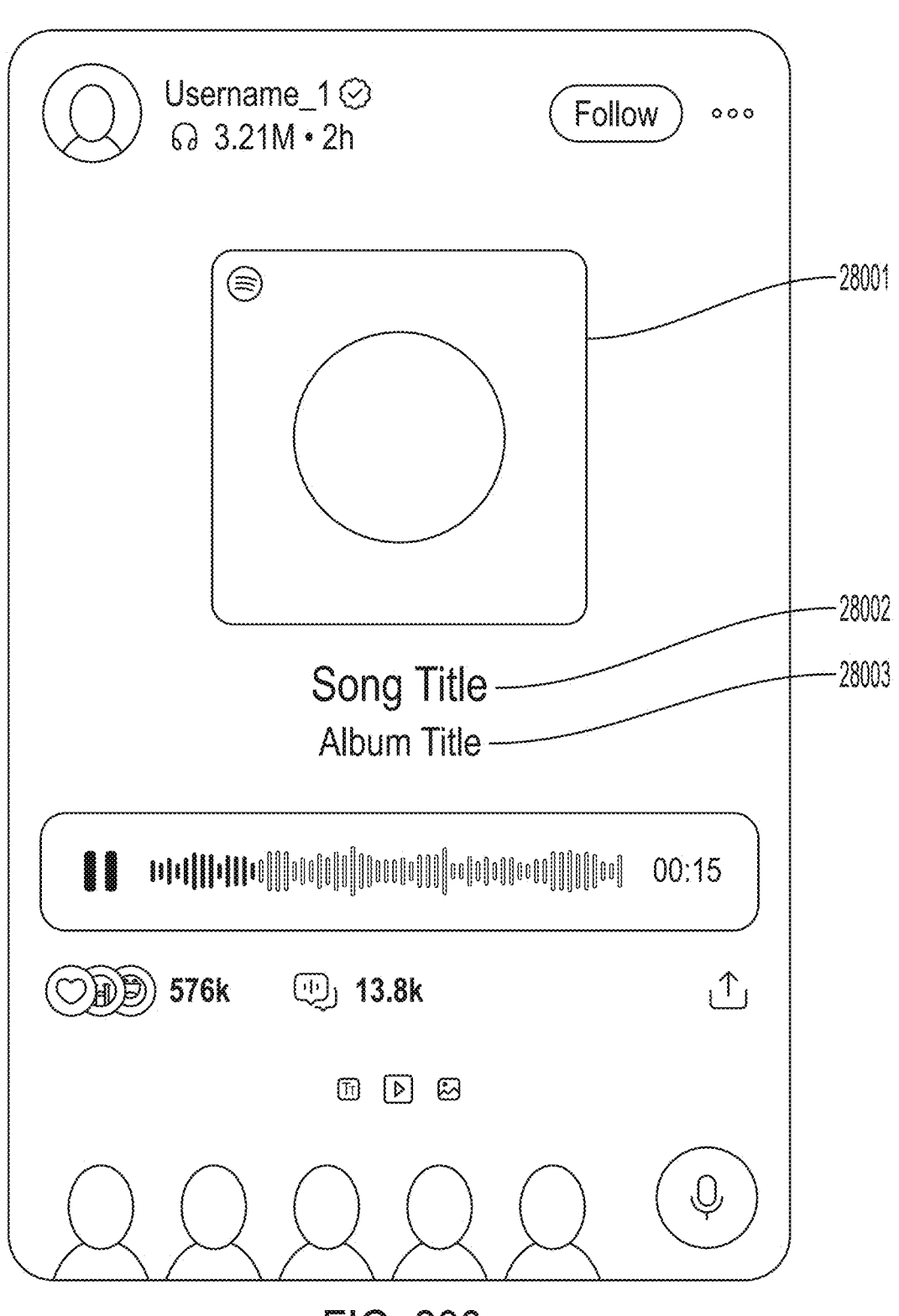

FIG. 272a, and 272b show screens from the mobile application that a user may be presented with when viewing polls 27201 or other interactive media. A user may be presented with polls 27201 or other interactive media, such as live sports scores 27202. A user may be presented with this functionality when browsing the mobile application or when participating in an audio conversation, whether as speaker or listener. The information within the functionality may be updated in real time. A user may be able to interact with the polls 27201 or interactive media, such as voting in the poll 27201 in real time.

FIGS. 273a and 273b show screens from the mobile application that a user may be presented with when interacting with location based features within the mobile application. A user may be able to view pages 27301 associated with groups or locations. Groups or locations may have associated location based tags, which may enable identification of users or locations 27302, to be displayed on a topographical representation, as shown in FIG. 273B.

FIGS. 274, 275, 276, 277, 278, 279, and 280 show screens from the mobile application that a user may be presented with when viewing a post on the mobile application. A user may be able to make a post that contains a text description or title 27401, 27601, 27801. A user may be able to make a post that contains a link to a news story or headline 27402. A user may be able to make a post that contains a video 27501. In some embodiments, the audio is embedded into the video. In some embodiments, the embedded audio (or audio timecode) is synchronized with the video timecode. In other embodiments, the embedded audio (or audio timecode) is not synchronized with the video timecode. A user may be able to make a post that contains a message, post, or audio clip from another social media site/network or mobile application 27602, 27701. A user may be able to make a post that contains a link to another post or piece of content (e.g., audio, video, images, visual representations, or any other data described in this disclosure) in the mobile application 27802. A user may be able to make a post that contains music or podcasts. The post may display the album cover or artwork 28001, title 28002, or artist 28003 for the relevant music or podcast. Any of these elements enumerated above may have an associated audio clip 27403, 27502. The audio clip may correspond to the other elements of the post, or may be recorded by the posting user as a complementary aspect to the remainder of the post. A user may be able to combine multiple elements like those described above in a single post. The post may be posted or shared in different parts of the mobile application. A user may be able to modify visual elements of the post, such as the background 27901. A background 27901 may use a photo, a video, a gif, etc. Videos or gifs may automatically play or loop as you are viewing the post. A user may be able to swipe or motion on the mobile application in order to view the background 27901 without the other elements of the post.

Figure 281:
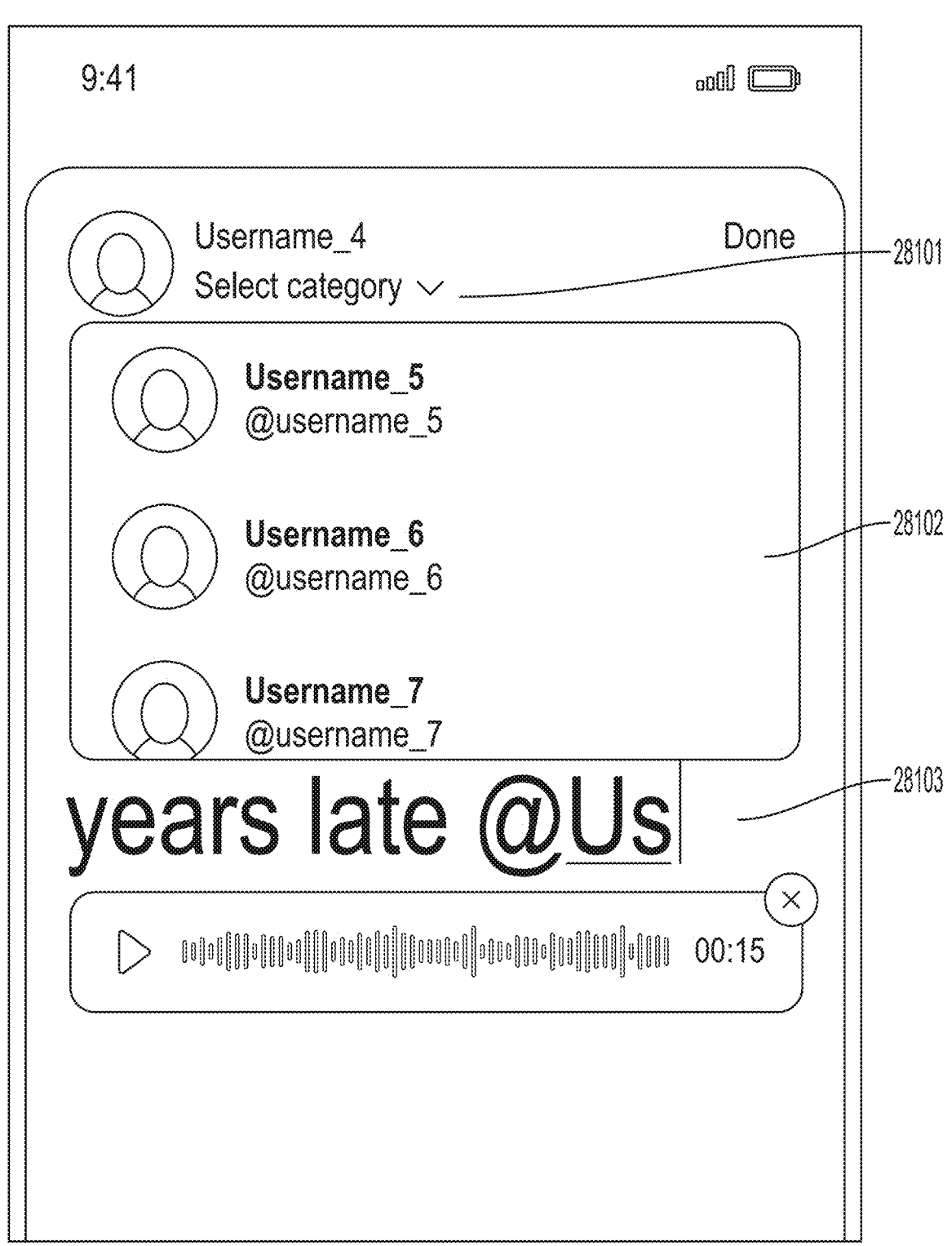
Figure 282:
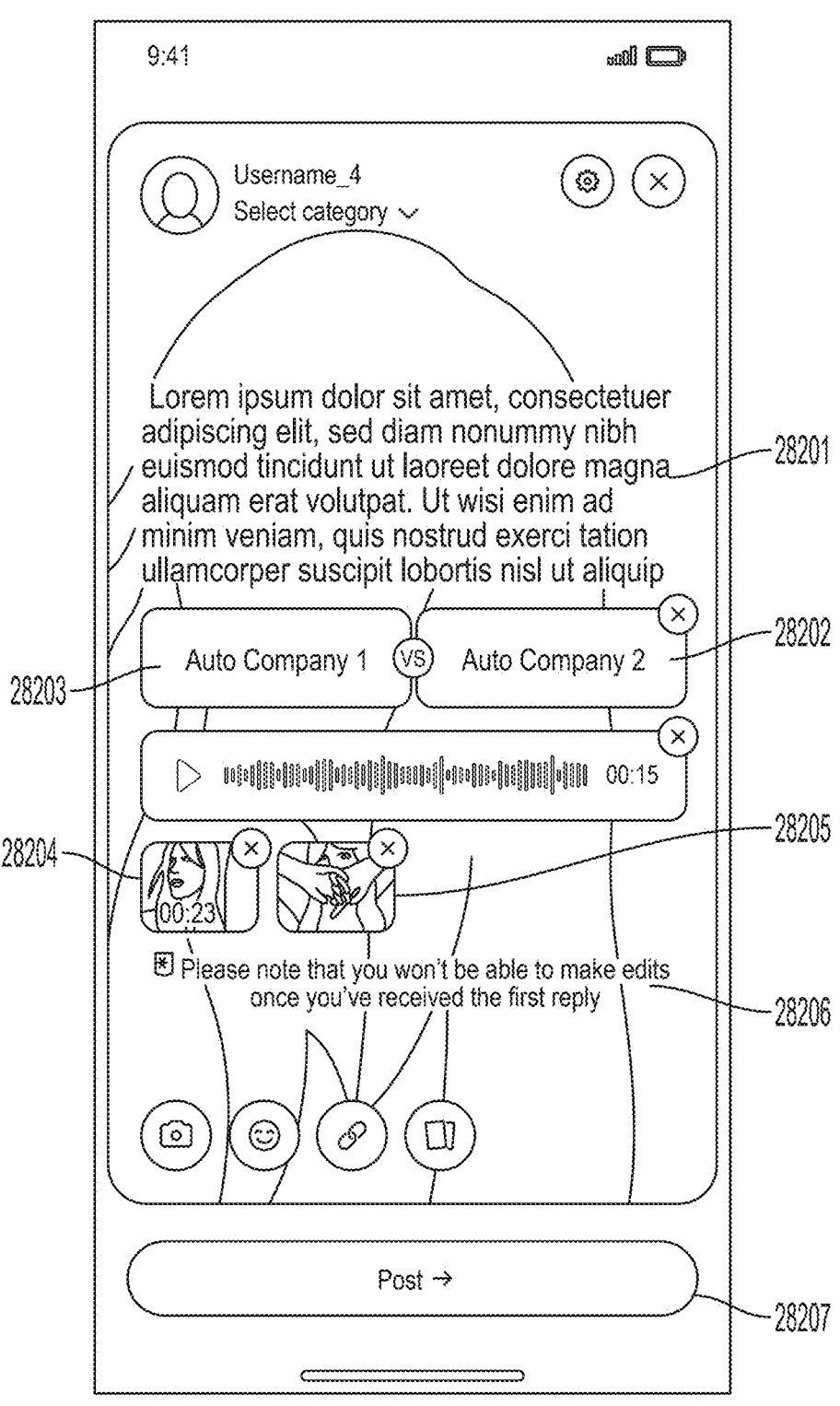
Figure 283:
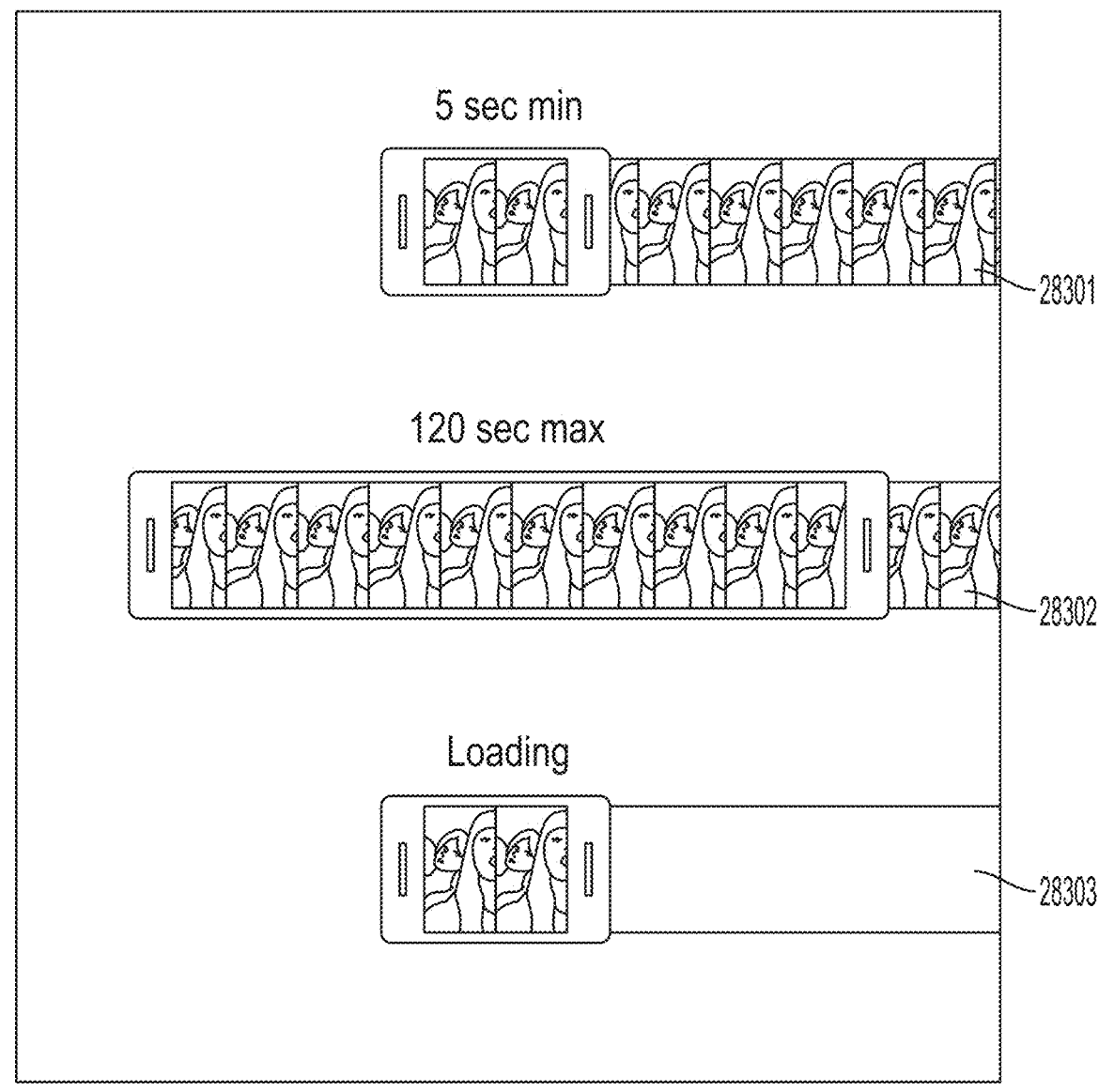

FIGS. 281, 282, and 283 show screens from the mobile application that a user may be presented with creating a post or content to be posted or shared 28207 on the mobile application. A user may be able to select a category 28101 that a post or piece of content will be associated with. A user may be able to tag another user 28102 in a post or piece of content by typing out a reference 28103 to said user. A user may be able to type text 28201 associated with a post or piece of content. A user may be able to add interactive elements, like polls 28202, 28203, to a post or piece of content. A user may be able to embed videos 28204 or photos 28205 into a post or piece of content. These photos or videos may be arranged to be viewed in a certain order. This method viewing may be synchronized to the timing of other content in a post, such as a song or audio clip. A viewing user may be able to swipe or motion on their device screen to progress through the photos or videos. When adding embedded videos 28204 or photos 28205 a user may be able to edit them 28301, 28302, 28303 in order to add filters, excerpt clips, edit sounds, etc.

Figure 284:
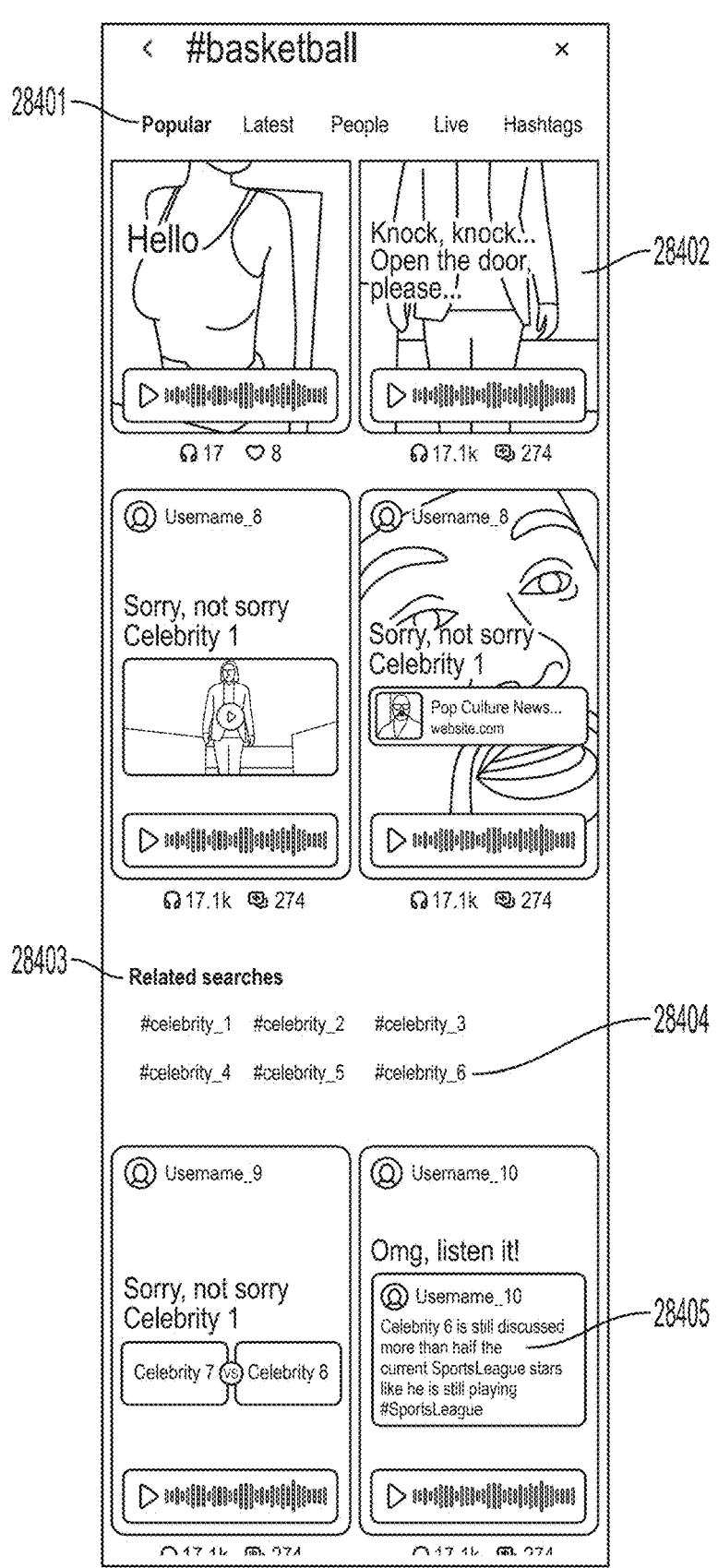

FIG. 284 shows a screen from the mobile application that may be presented to a user when they are searching for posts or content 28402, 28405. Search results may be optimized (e.g., presented on the user interface) based on a user's history, preferences, or trending content, etc., and multiple pieces of content may be displayed simultaneously. Simultaneous display of pieces content may include organizations of display where each piece of content may be displayed within its own panel or box, which can be organized into different visual displays enabling a user to select any piece of content individually. Simultaneous display of pieces content may include content being displayed on a screen that can be continuously scrolled or navigated through by a user. Search results may be sorted by tags 28401, 28404 that sort information in a variety of ways, such as by popularity, number of interactions, subject of the content, descriptive operators, etc. The mobile application may suggest searches 28403 related to what a user is searching for themselves.

Figure 285:
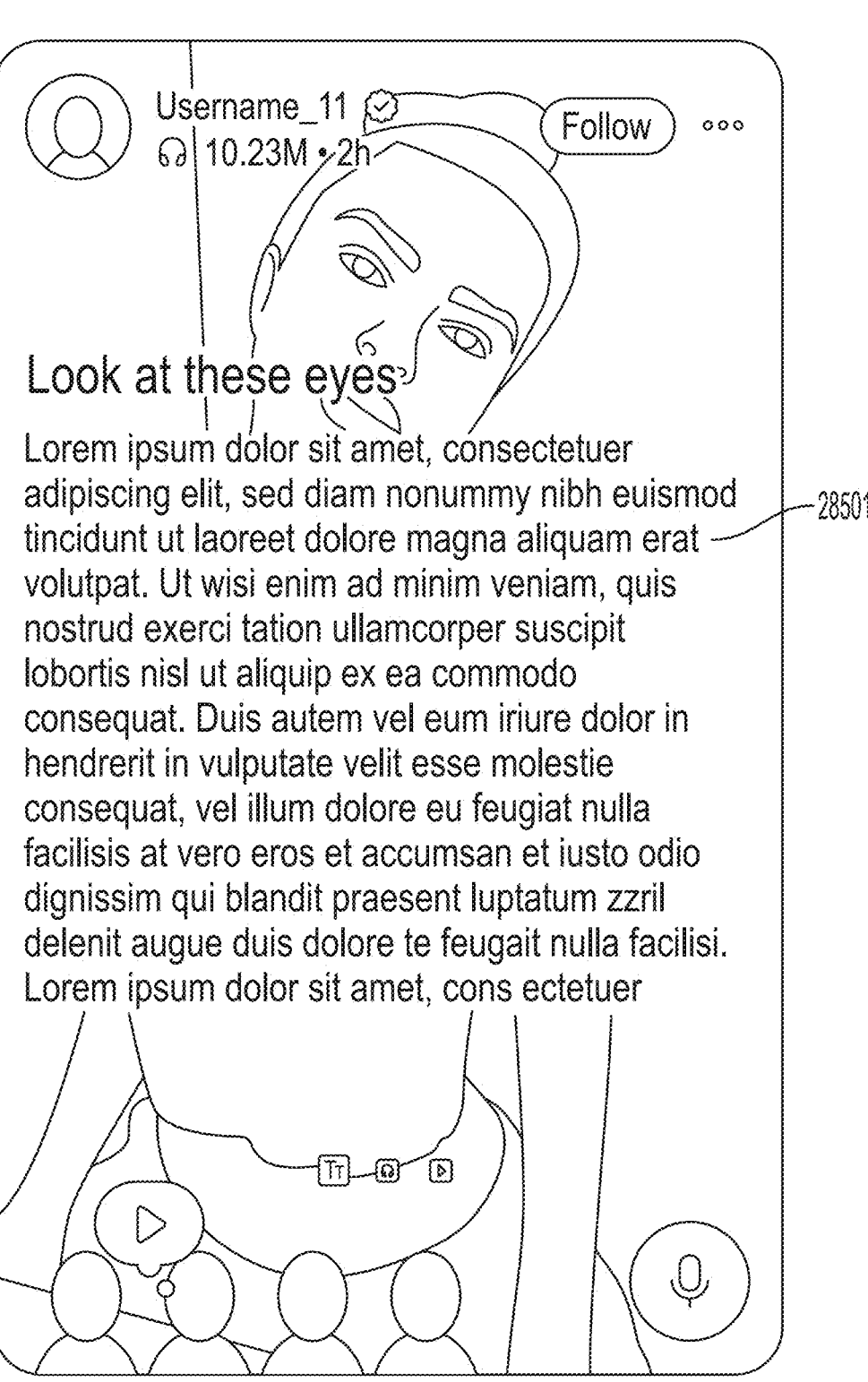
Figure 286:
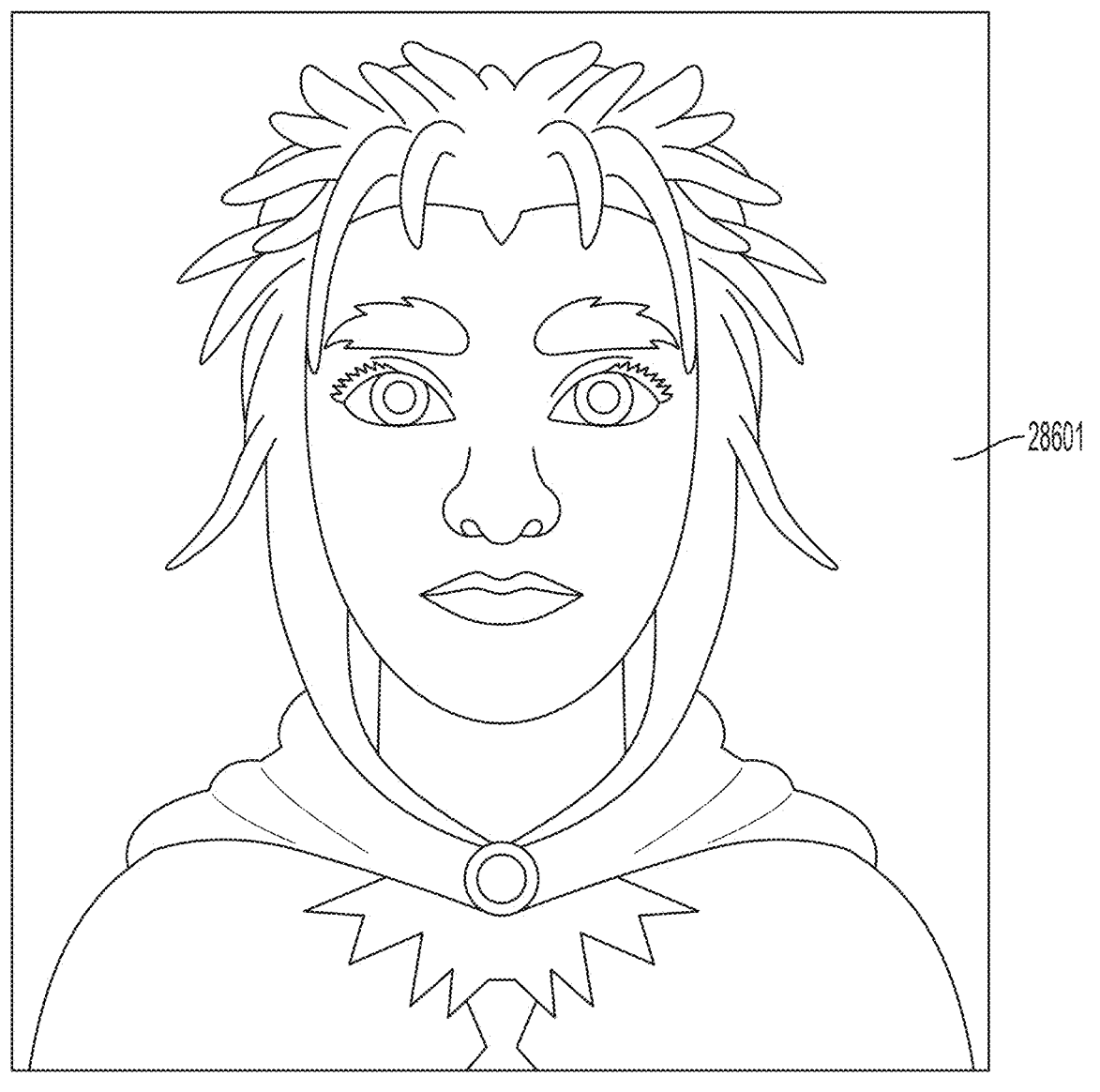
Figure 287:
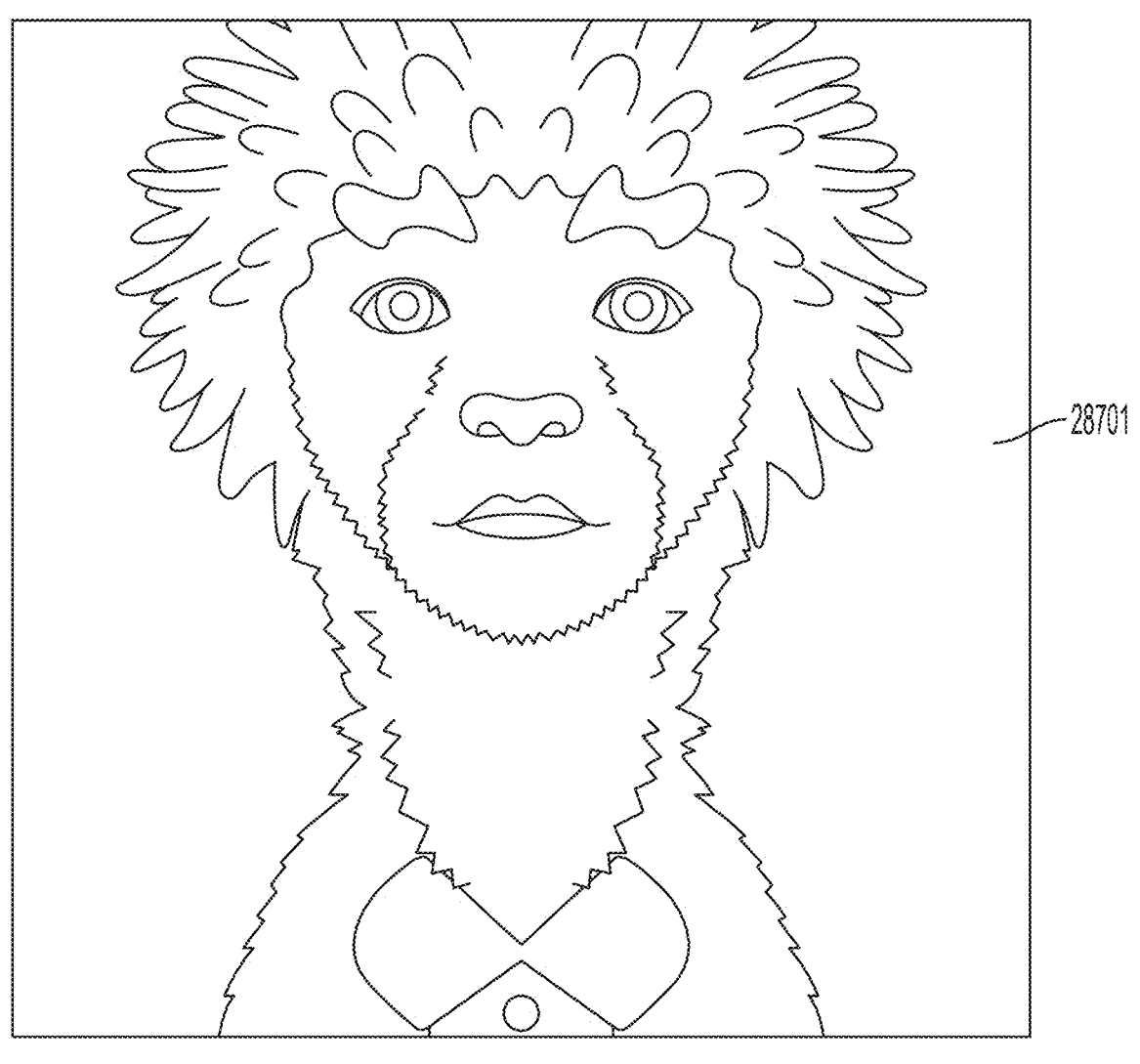
Figure 288:
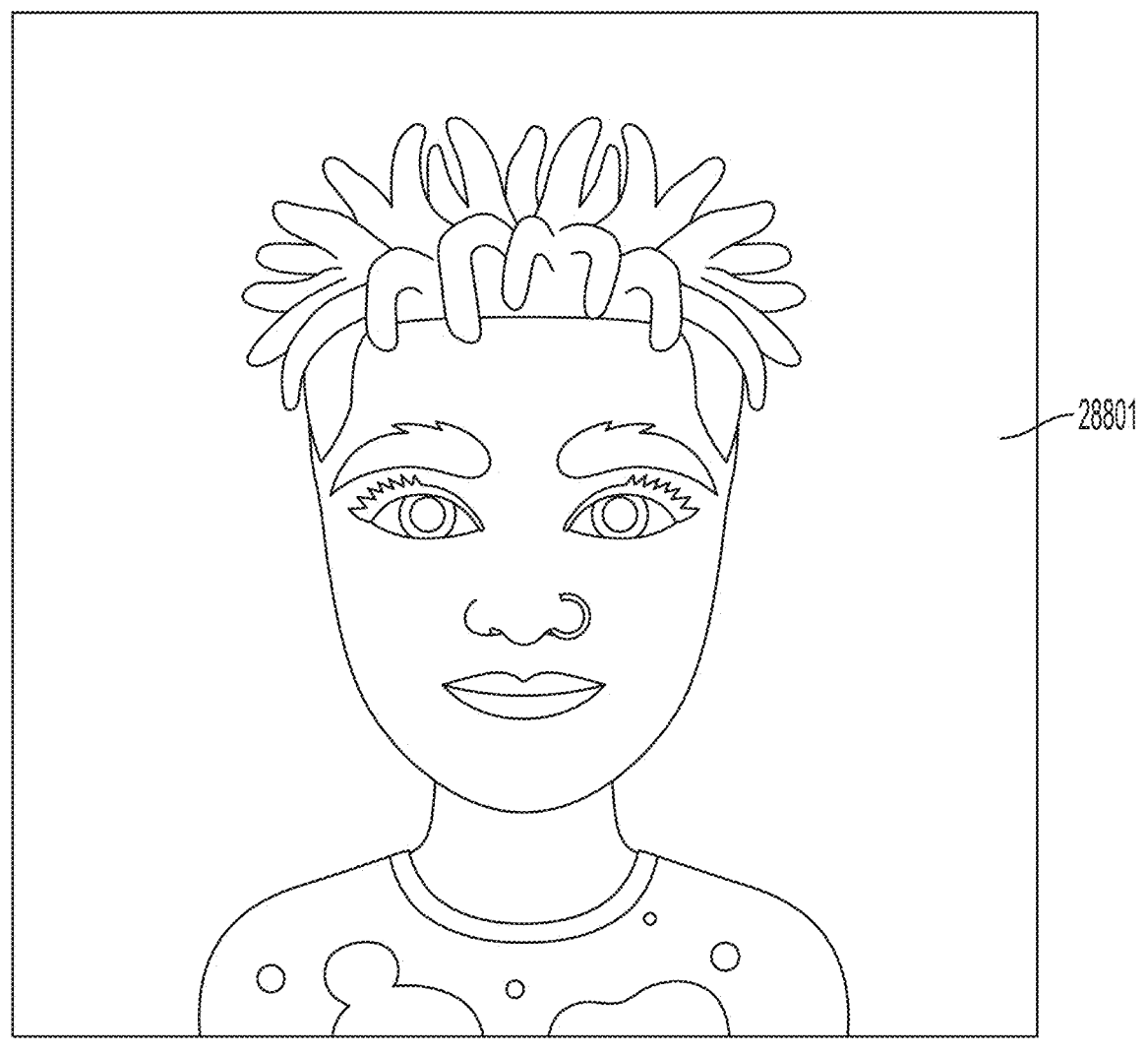
Figure 289:
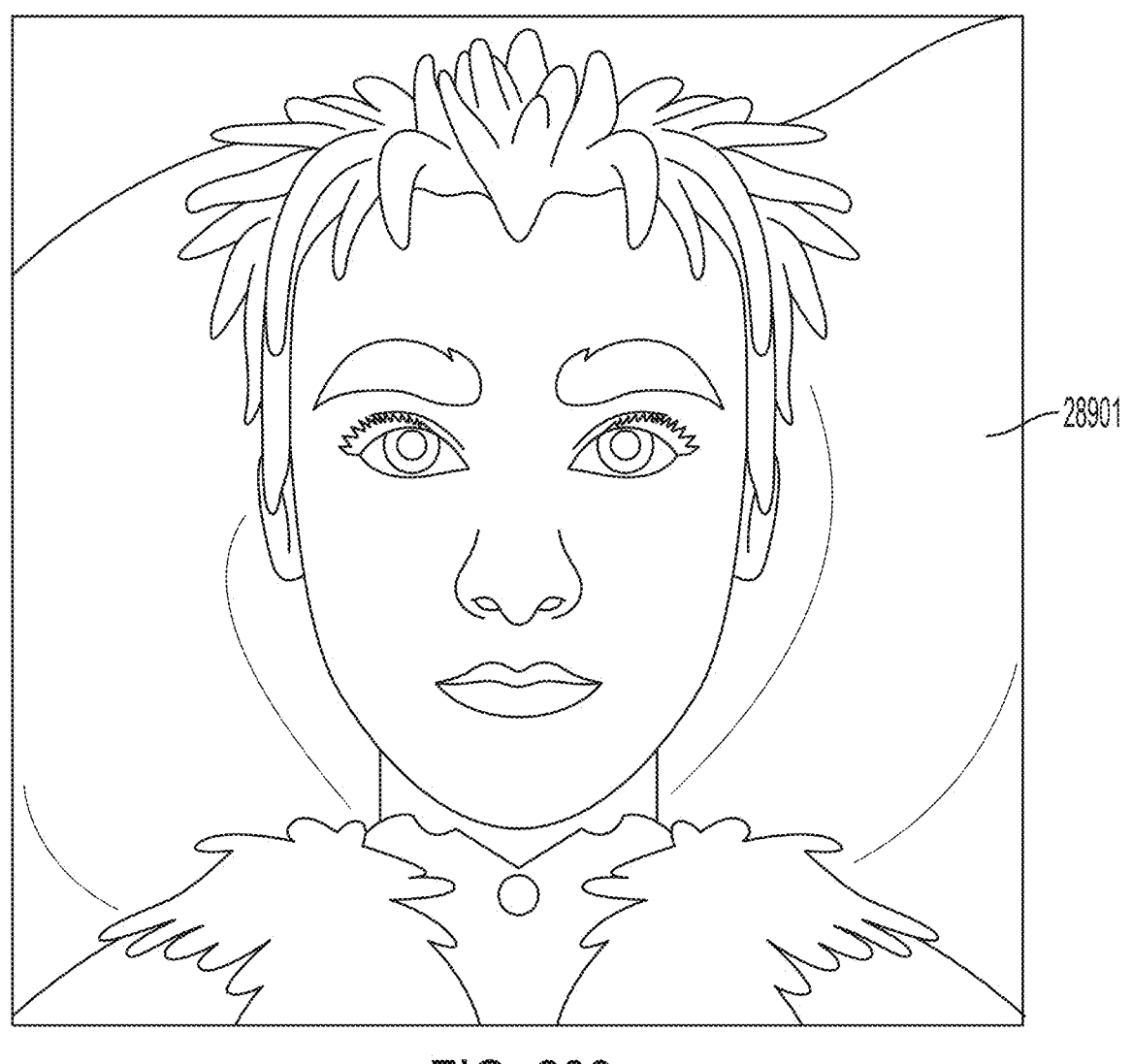
Figure 290:
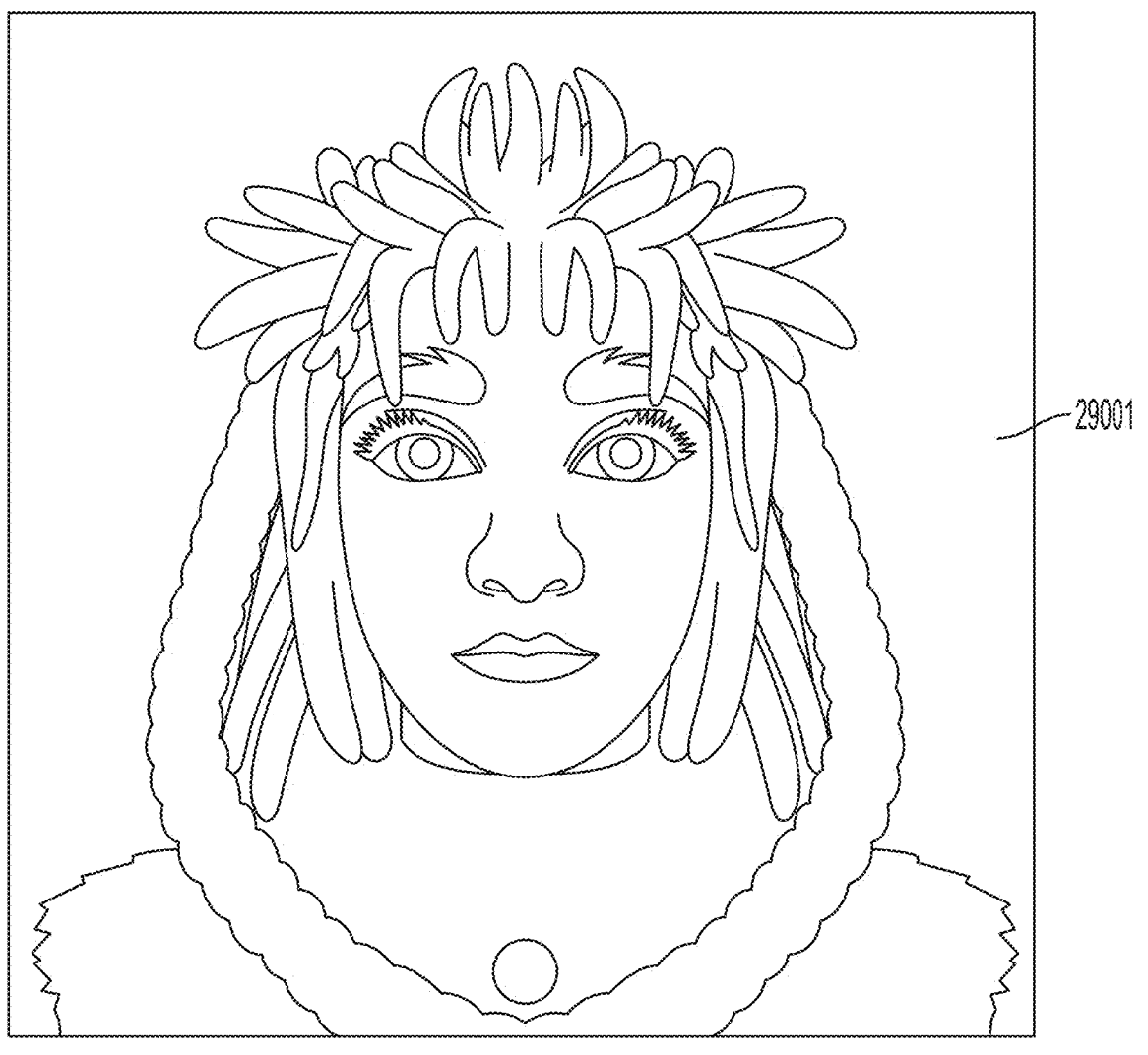
Figure 291:
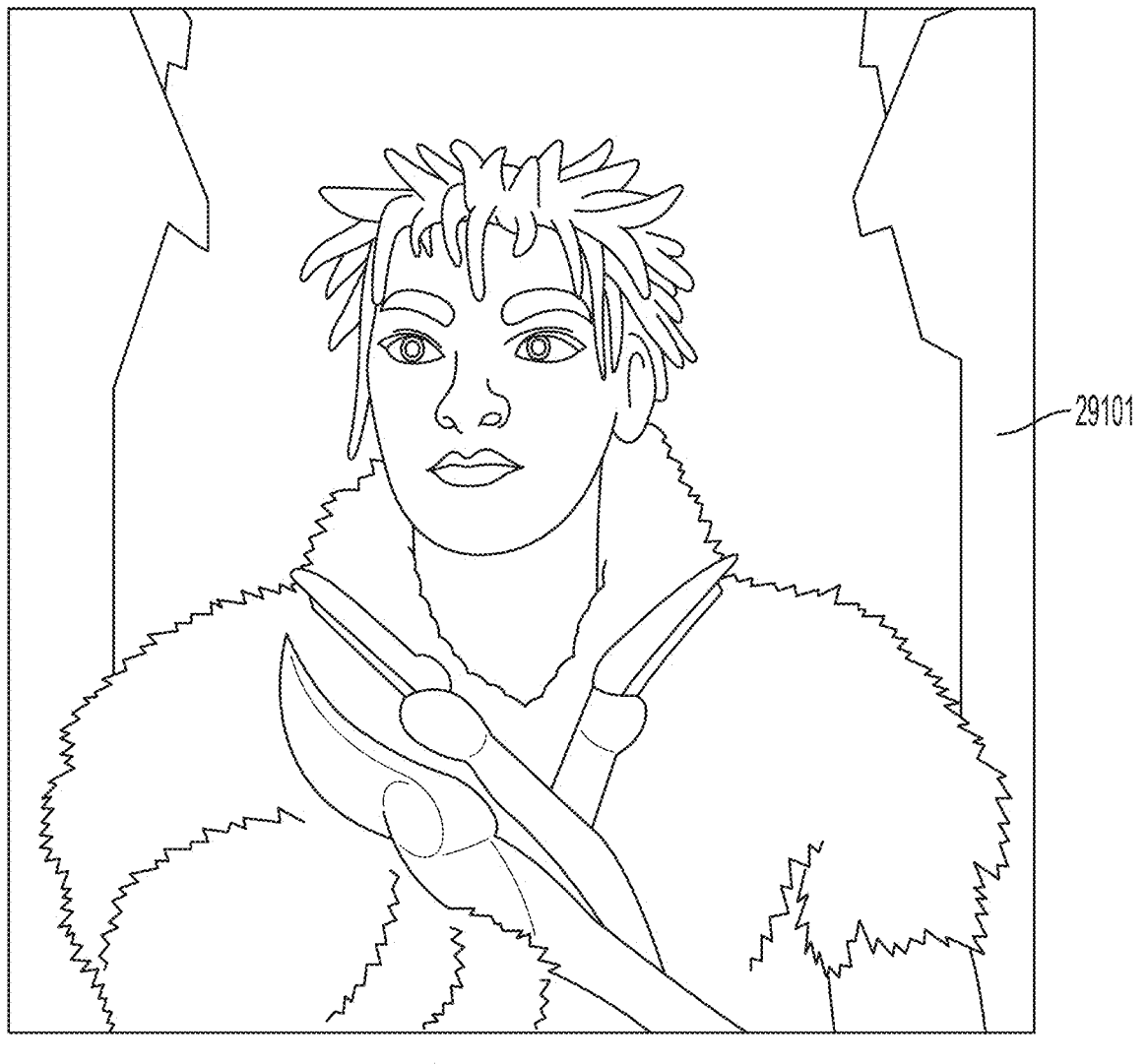
Figure 292:
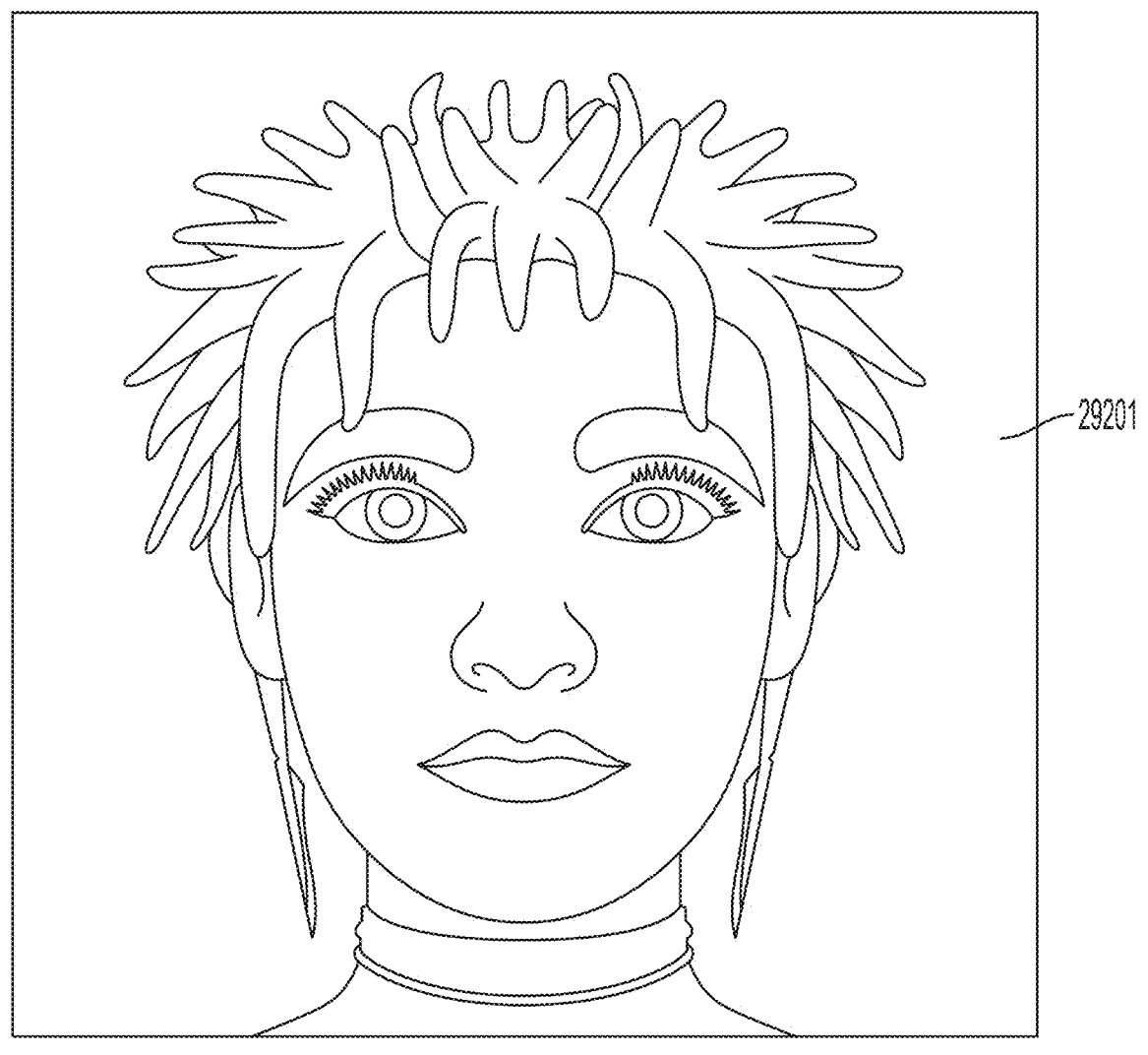

FIG. 285 shows a screen from the mobile application that may be presented to a user when they are viewing a post or piece of content. Posts or pieces of content may have associated text or descriptions 28501. A user may be able to swipe or motion on their mobile device screen to pull up or hide the text or descriptions 28501.

FIGS. 286, 287, 288, 289, 290, 291, and 292 show different visual representations 28601, 28701, 28801, 28901, 29001, 29101, 29201 that may be associated with a user on the mobile application. These visual representations 28601, 28701, 28801, 28901, 29001, 29101, 29201 may be customized by the user or they may be automatically generated by the mobile application. Visual representations 28601, 28701, 28801, 28901, 29001, 29101, 29201 may be automatically generated by use of an AI or machine learning tool. AI or machine learning tools may aggregate and process visual information scrapped from a variety of sources across the Internet and/or using data from the mobile application and/or using data from accessible data sources, and generate visual representations 28601, 28701, 28801, 28901, 29001, 29101, 29201 based on the aggregated information or based on an additional set of input characteristics or information in unison with the aggregated information.

Figure 293:
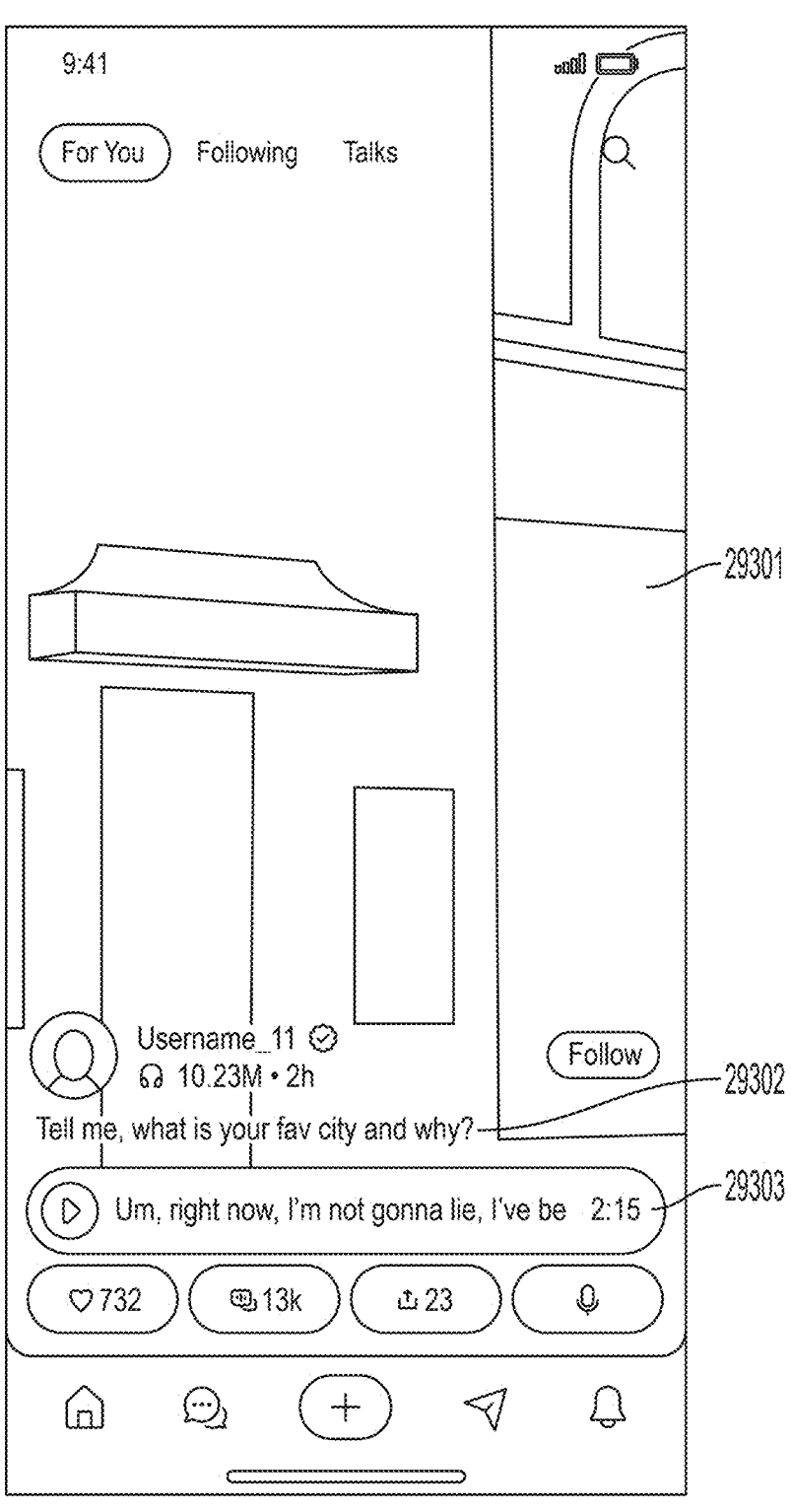

FIG. 293 shows a screen from the mobile application that may be presented to a user when they are viewing another user's content or post. The other user's content or post may contain photos 29301 or text 29302. The viewing user may be able to respond with their own audio message 29303 that can be sent to the posting user.

Figure 294:
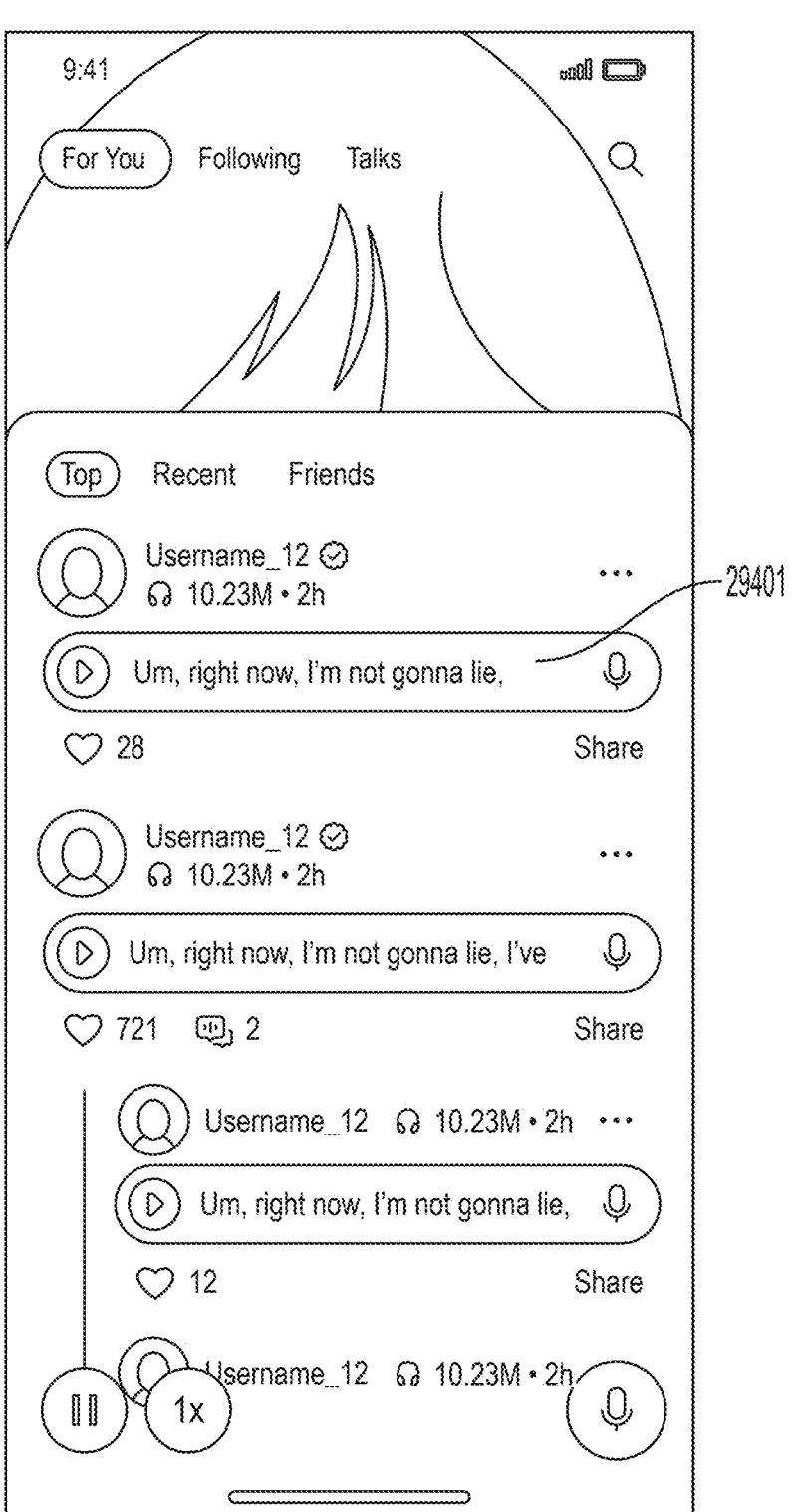

FIG. 294 shows a screen from the mobile application where a user may be viewing different audio clips. In some embodiments, when a user selects an audio clip to play, the mobile application may display a transcript 29401 of the content in the audio clip. In other embodiments, the transcript 29401 may automatically be generated and displayed when an audio is played in the mobile application. When displaying the transcript 29401, individual words may be bolded as they are being read aloud in the audio clip. In some embodiments, the transcript is generated while the audio is being played. In other embodiments, the transcript is generated before the audio is played.

Figure 295:
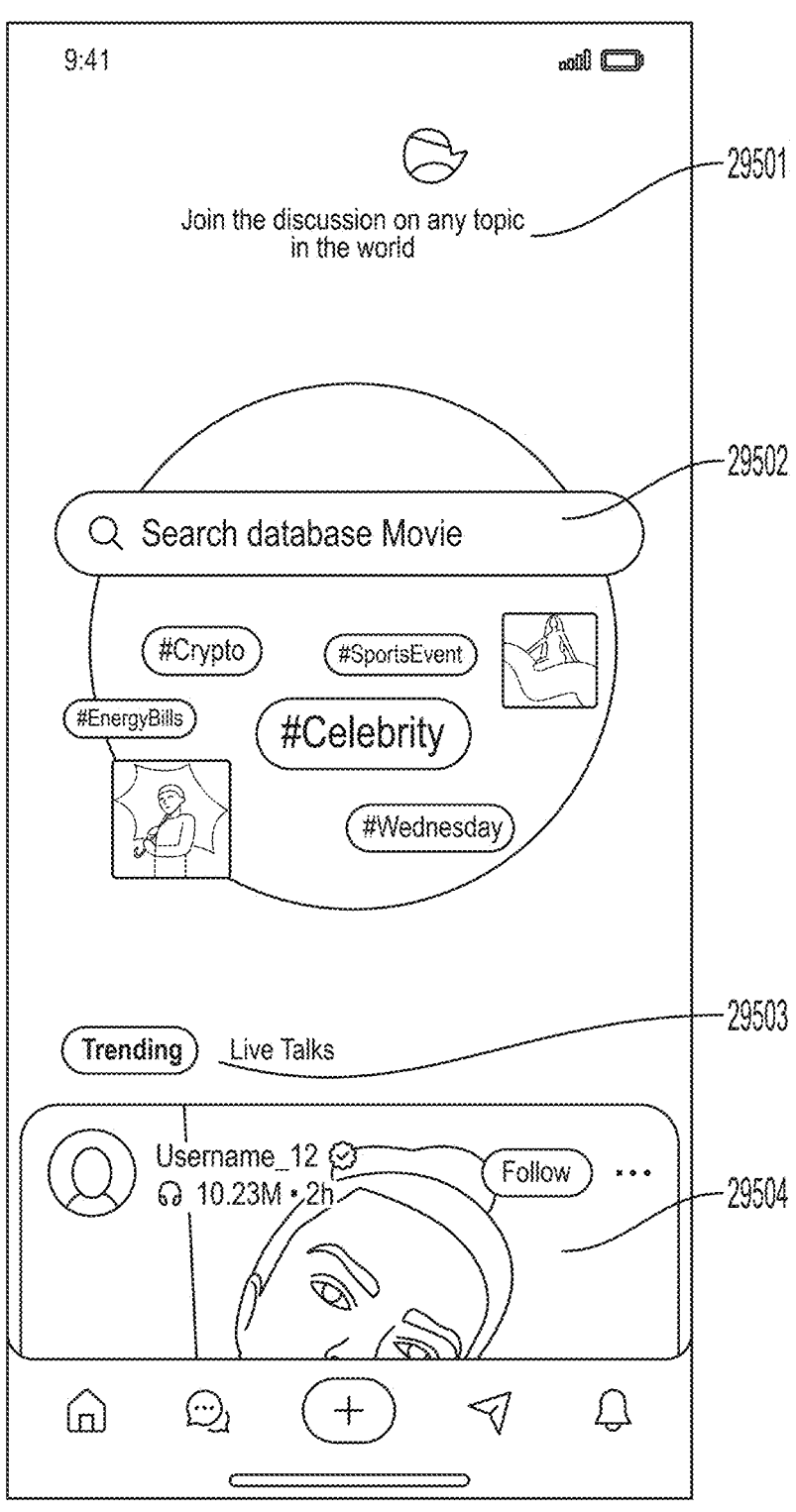

FIG. 295 shows a screen from the mobile application where a user may be able to view content that is trending. The mobile application may present a description of the trending hub 29501, a search bar 29502 to navigate trending topics, and a button 29503 giving the ability to toggle between trending and live content. Scrolling down on this screen may present the trending content 29504 itself. The mobile application may present a "cloud" of operators, buzzwords, and/or headlines for trending content, or may present other visual representations of the currently trending content. Currently trending content may be generated based on the mobile application's analysis of user activity on the mobile application (and/or on other social networks or mobile applications), real world headlines and activity (e.g., external to the mobile application), user engagement (e.g., on the mobile application), sponsored audio/video/text posts (e.g., on the mobile application), age of audio/video/text posts, etc. Different users may be presented with different trending content depending on their activity, preferences, history on the mobile applications, other users following or followed by the user, etc.

Figure 296:
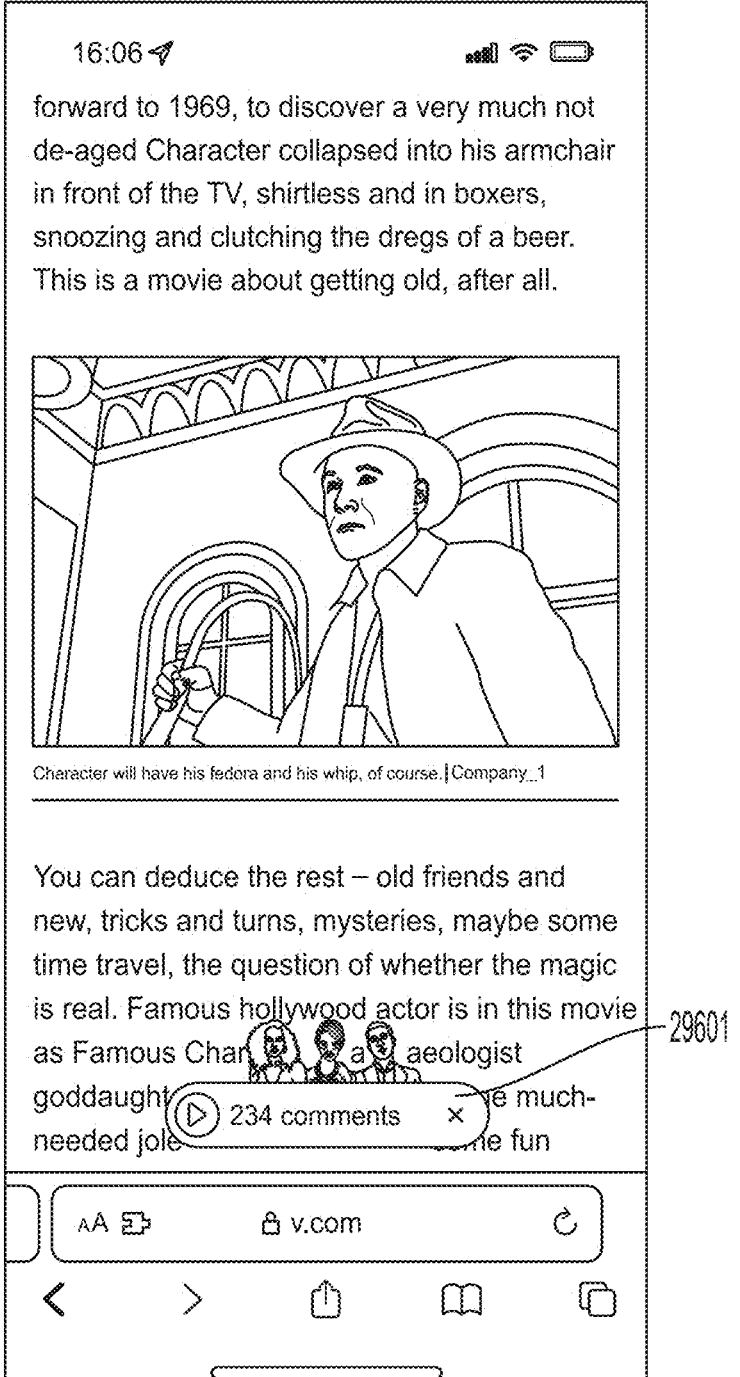

FIG. 296 shows a screen from a web browser that may have a plug-in associated with the mobile application enabled. A user may be able to browse any and all types of content within a web browser application on a mobile device or computer, wherein the user may be able to view comments 29601 provided by users of the mobile application. Clicking on the comments 29601 may bring up an expanded view as demonstrated in FIG. 297.

Figure 297:
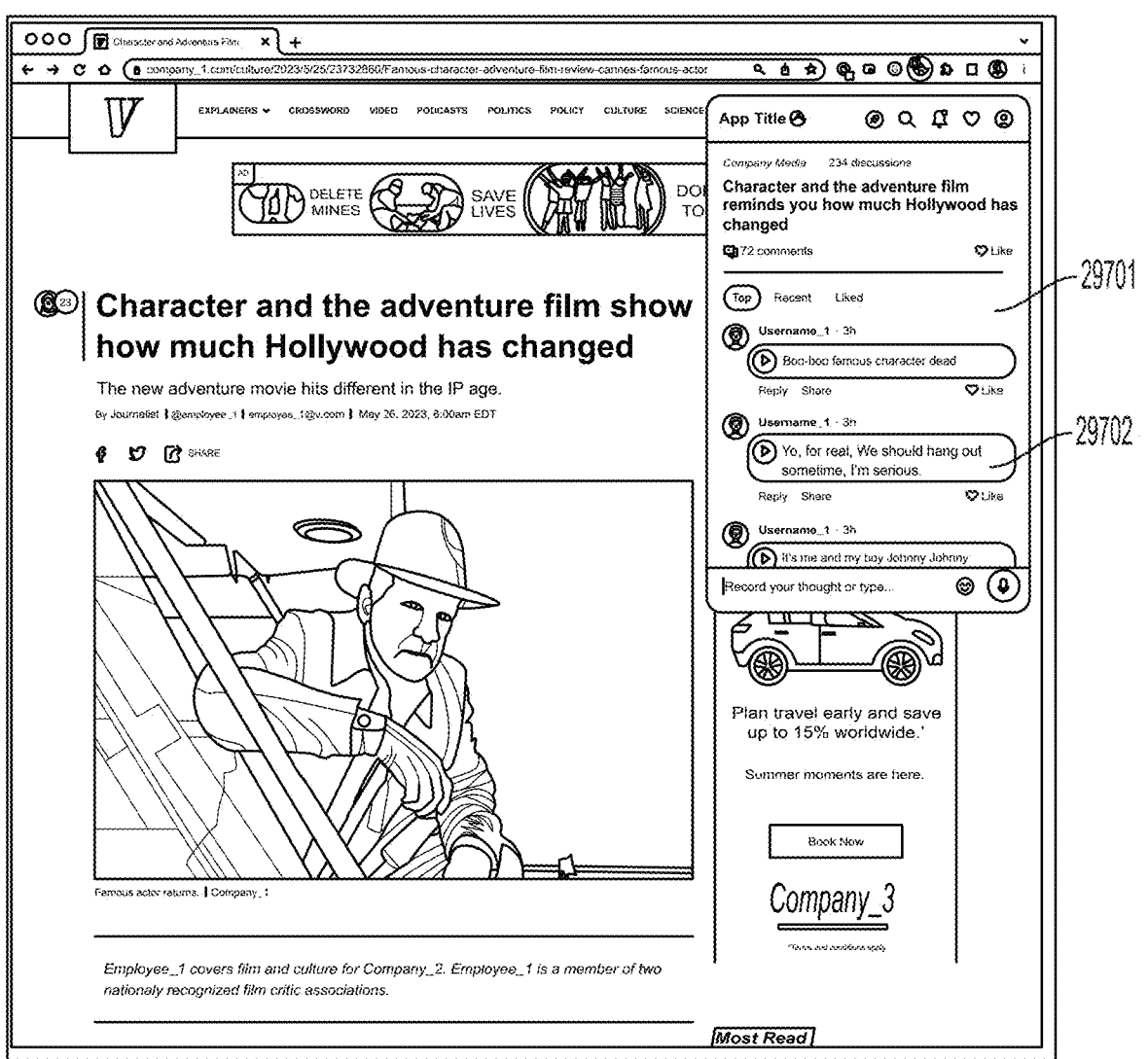

FIG. 297 shows a screen from a web browser that may have a plug-in associated with the mobile application enabled. Clicking on elements of the plug in or comments 29601 may bring up a field of comments that have been left by users of the mobile application, and are associated with the content being viewed in the web browser. A user may be able to sort 29701 the expanded comments 29702. The comments 29702 may be comprised of readable text, but may also have associated audio clips that can be played by tapping on the comment 29702. A user may be able to scroll through the expanded comments 29702 and respond to existing comments 29702 or record or post their own.

Figure 298:
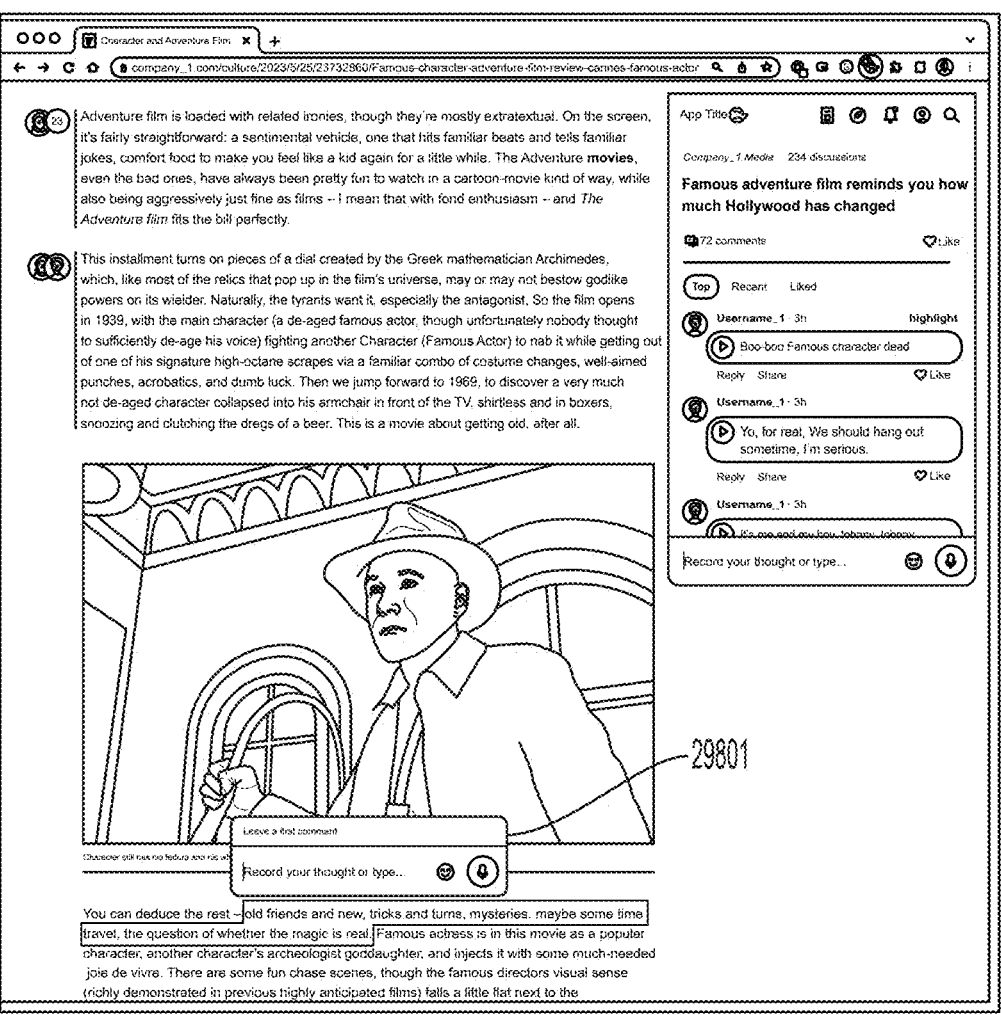
Figure 299:
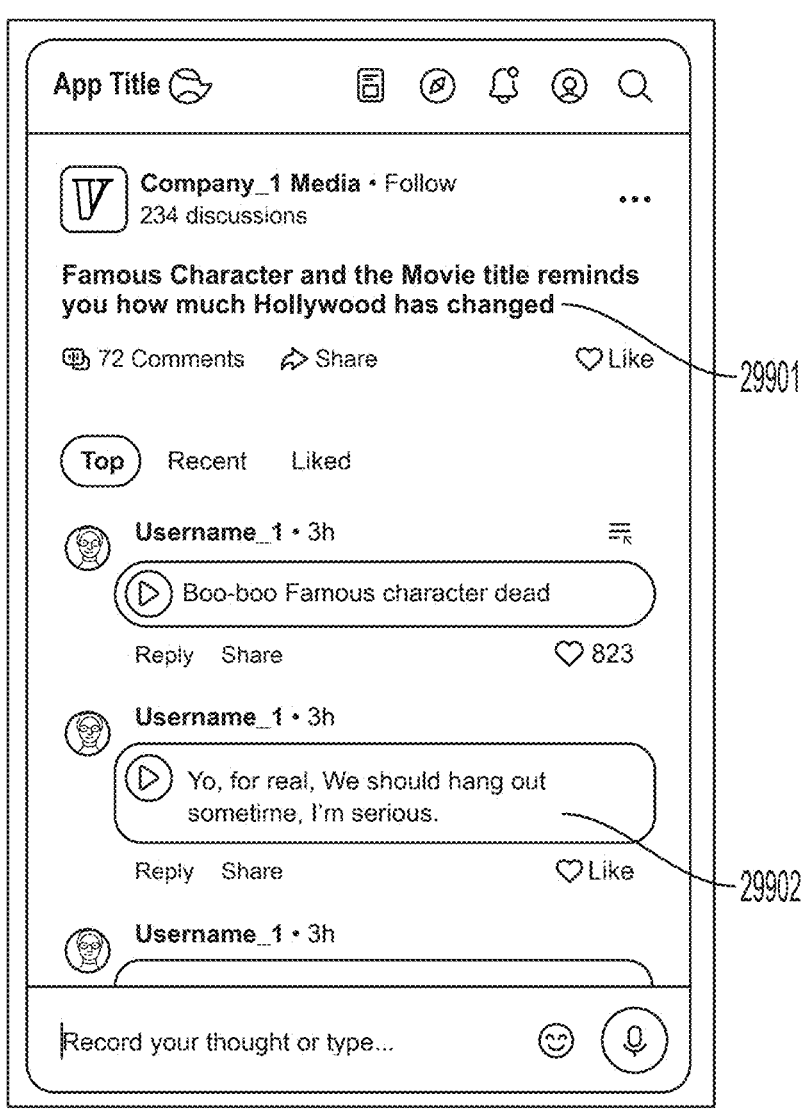

FIG. 298 shows a screen from a web browser that may have a plug-in associated with the mobile application enabled. Comments 29702 may be associated with specific portions of the content displayed in a mobile browser. For example, a user may be able to leave a comment 29801 associated with a specific piece of highlighted text when viewing an article. If the content being displayed by the browser is video or audio content, comments 29801 may be associated with specific timestamps within the content.

FIG. 298 shows a screen from the mobile application, wherein a user may be able to view information associated with an account or platform associated with online web content. A user may be able to view the same comments 29702 from the web content, within the mobile application itself. Headlines 29901 or other portions of the web content itself may be displayed, and links to the web content may be included therein. A user may be able to view comments 29902 within the mobile application that reflect the comments 29702 left on the web content itself. Clicking on an image or name associated with the account or platform that posted the content may bring a user to a screen as demonstrated in FIG. 300.

Figure 300:
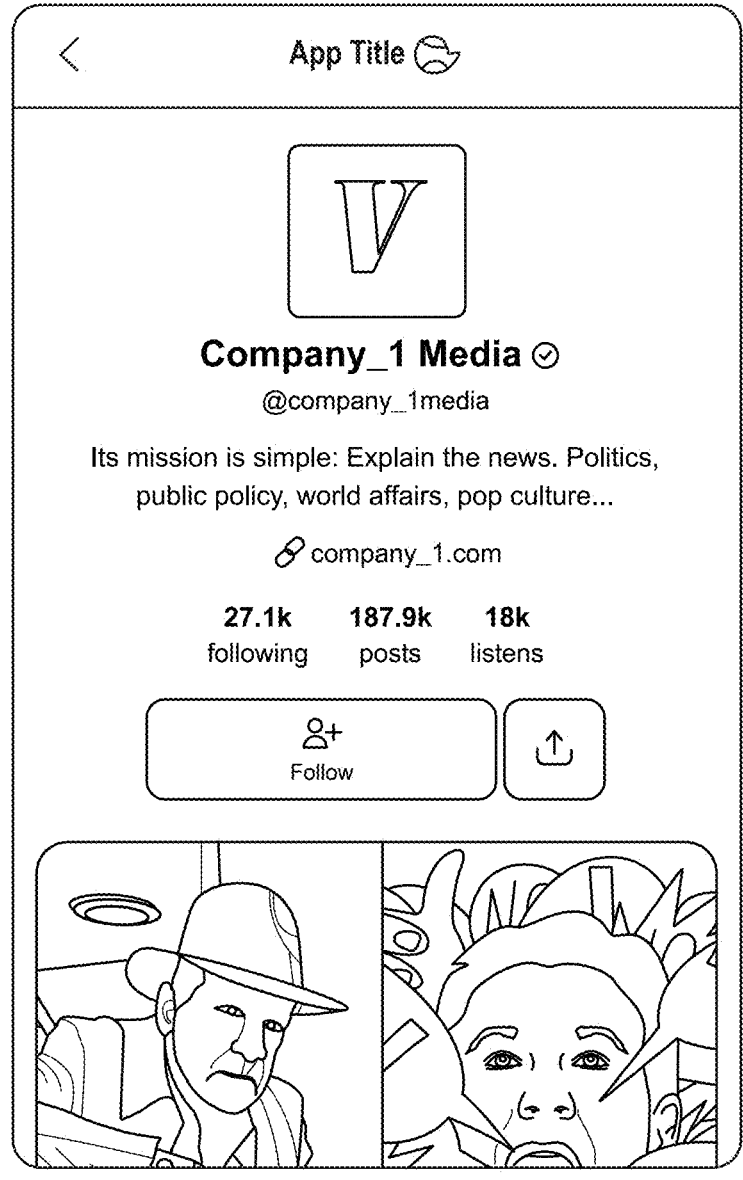

FIG. 300 shows a screen from the mobile application, wherein a user may be able to view information associated with an account or platform associated with online web content. A profile or account page liked the one pictured may be automatically generated for a website or publication that has its content shared on the mobile application or has its content engaged with via the mobile application plug-in. A platform or individual who owns the publication creating the relevant content may be able to take over the automatically generated profile associated with the content. A platform or individual may need to interact with an administrator for the mobile application in order to take over the account.

Figure 301:
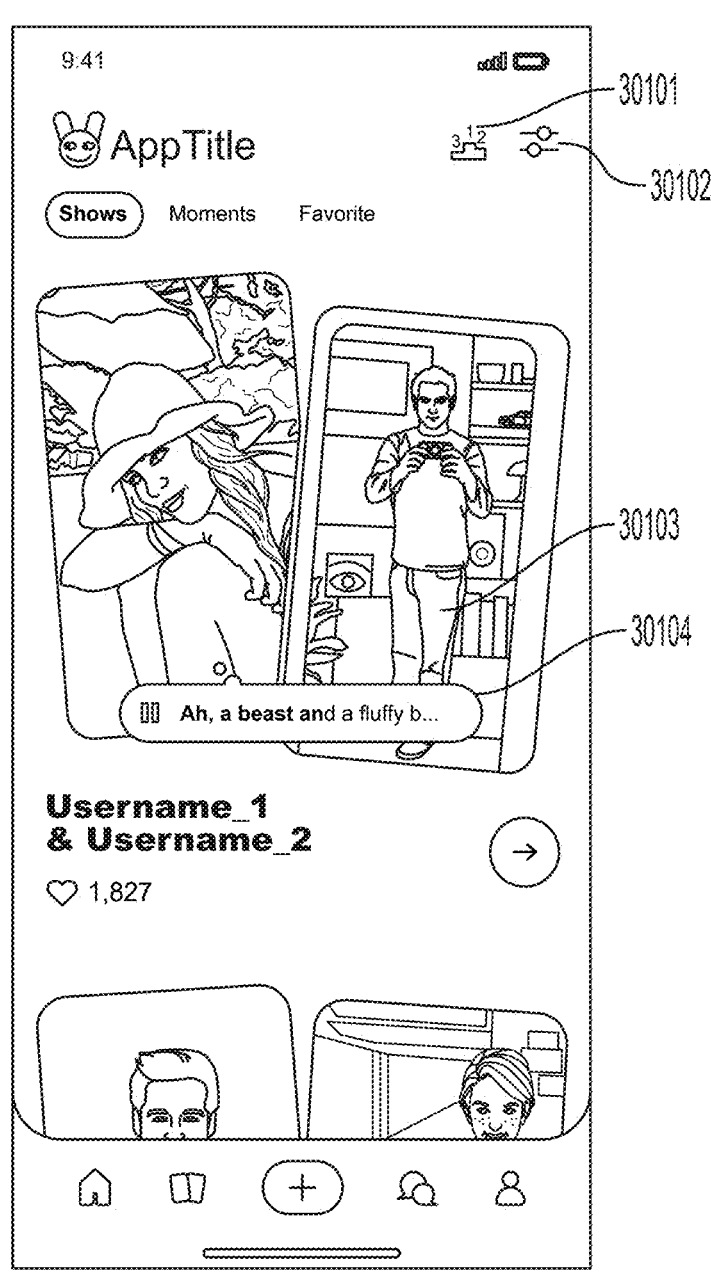

FIG. 301 shows a screen from the mobile application depicting how the mobile application may look when a user is browsing to view a show or ongoing conversation between two other users. While browsing, which may be accomplished via a scrolling motion, a user may be presented with profile pictures 30103 and excerpts 30104 from a show on ongoing conversation. Clicking on the profile pictures 30103 may take the user to view the show or ongoing conversation, via a screen similar to that shown in FIG. 304. Clicking on the excerpt 30104 may play a portion of the audio content from the show or ongoing conversation. These excerpts 30104 may have text captions mirroring the audio content, which may change visually as the audio excerpt progresses. While browsing, a user may be able to view rankings 30101 of shows or ongoing conversations. Rankings 3010 may be generated based on engagement received by a show or ongoing conversation or may be based on votes from users. While browsing, a user may be able to adjust their preferences 30102, which are demonstrated by the screen shown in FIG. 303.

Figure 302:
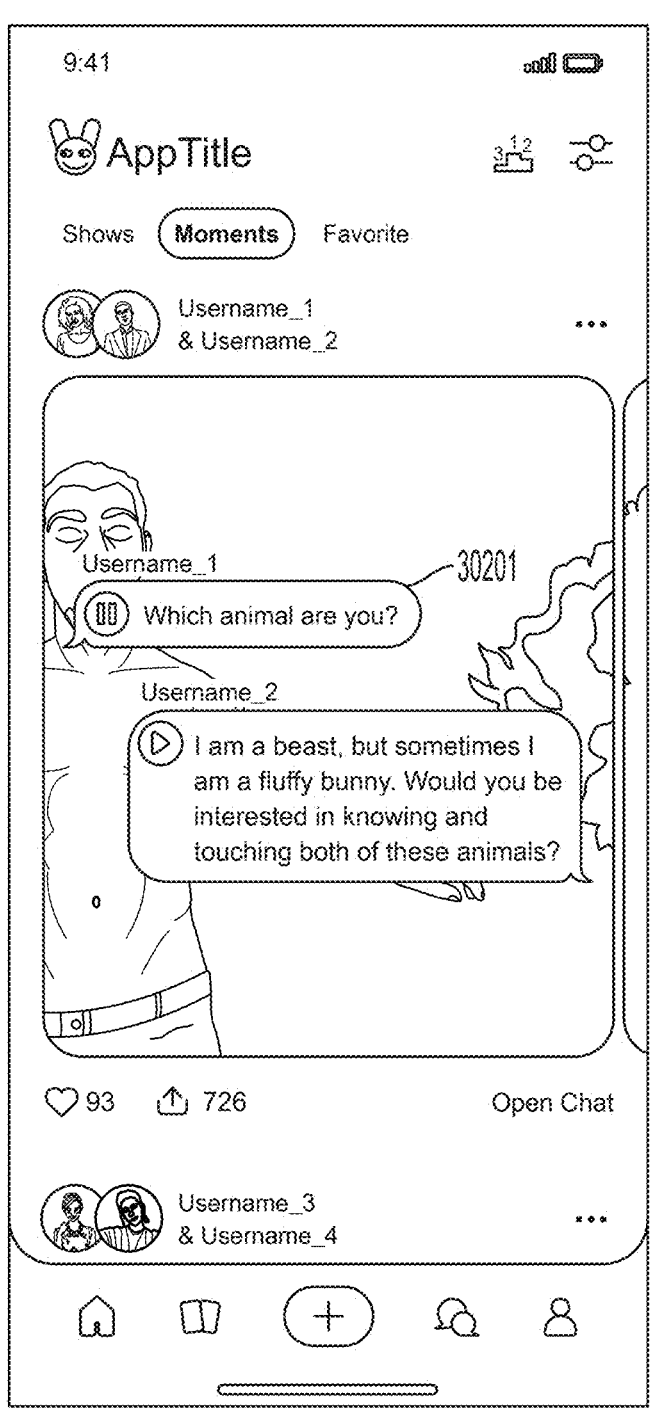

FIG. 302 shows a screen from the mobile application depicting an alternative view that a user may see when browsing to view a show or ongoing conversation between two users. Shows on ongoing conversations may have animated images or gifs 30201 that may automatically play when a user is browsing. These animated images or gifs 30201 may be pulled from the shows on ongoing conversations themselves, or may be automatically generated based on the content and context of the show or ongoing conversation. Text excerpts or audio clips from the show or ongoing conversation may be overlaid on top of the animated background or gif 30201. A user may be able to navigate between viewing whole shows or viewing these "moments" when they are browsing the mobile application.

Figure 303:
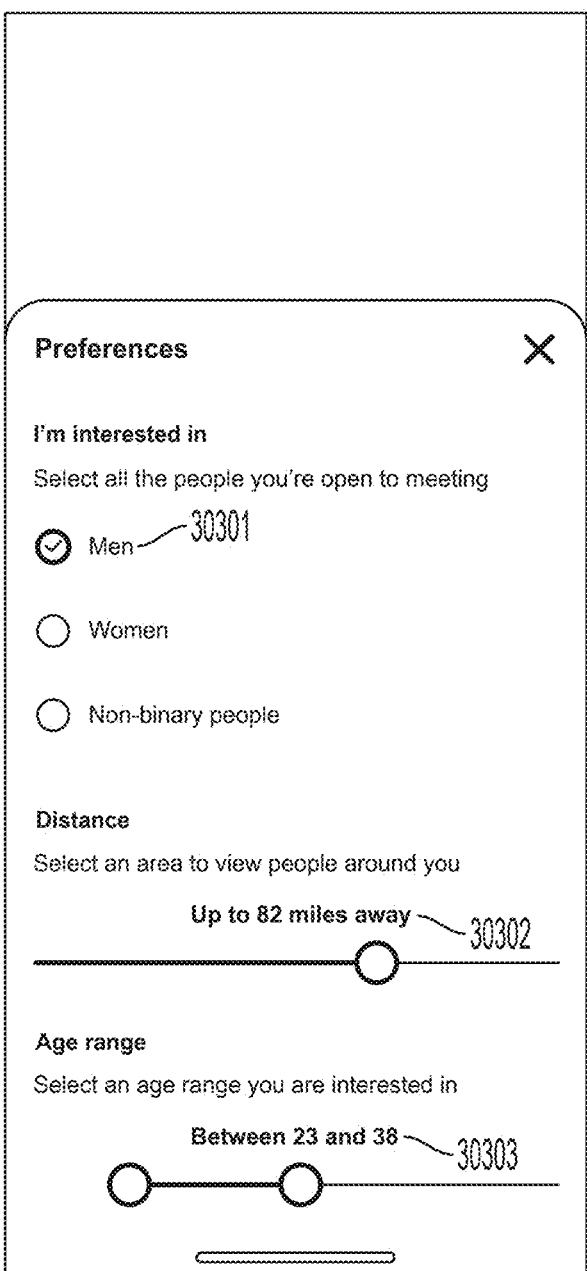

FIG. 303 shows a screen from the mobile application depicting preferences for browsing shows or ongoing conversations, or preferences for other users to potentially be matched with by the mobile application. These preferences may be able to be changed by a user and may impact the shows, conversations, or matched users that a user may be presented with while browsing the mobile application. These preferences may include sliders or checklists for gender 30301, distance 30302, or age 30303. Setting a preference for gender 30301 may change the gender of users a user may be matched with by the mobile application or may change the genders of the show or ongoing conversation participants that a user is presented with. Setting a preference for distance 30302 may change the physical location of users a user may be matched with by the mobile application or may change the physical locations of the show or ongoing conversation participants that a user is presented with. Setting a preference for age 30303 may change the age of users a user may be matched with by the mobile application or may change the ages of the show or ongoing conversation participants that a user is presented with.

Figure 304:
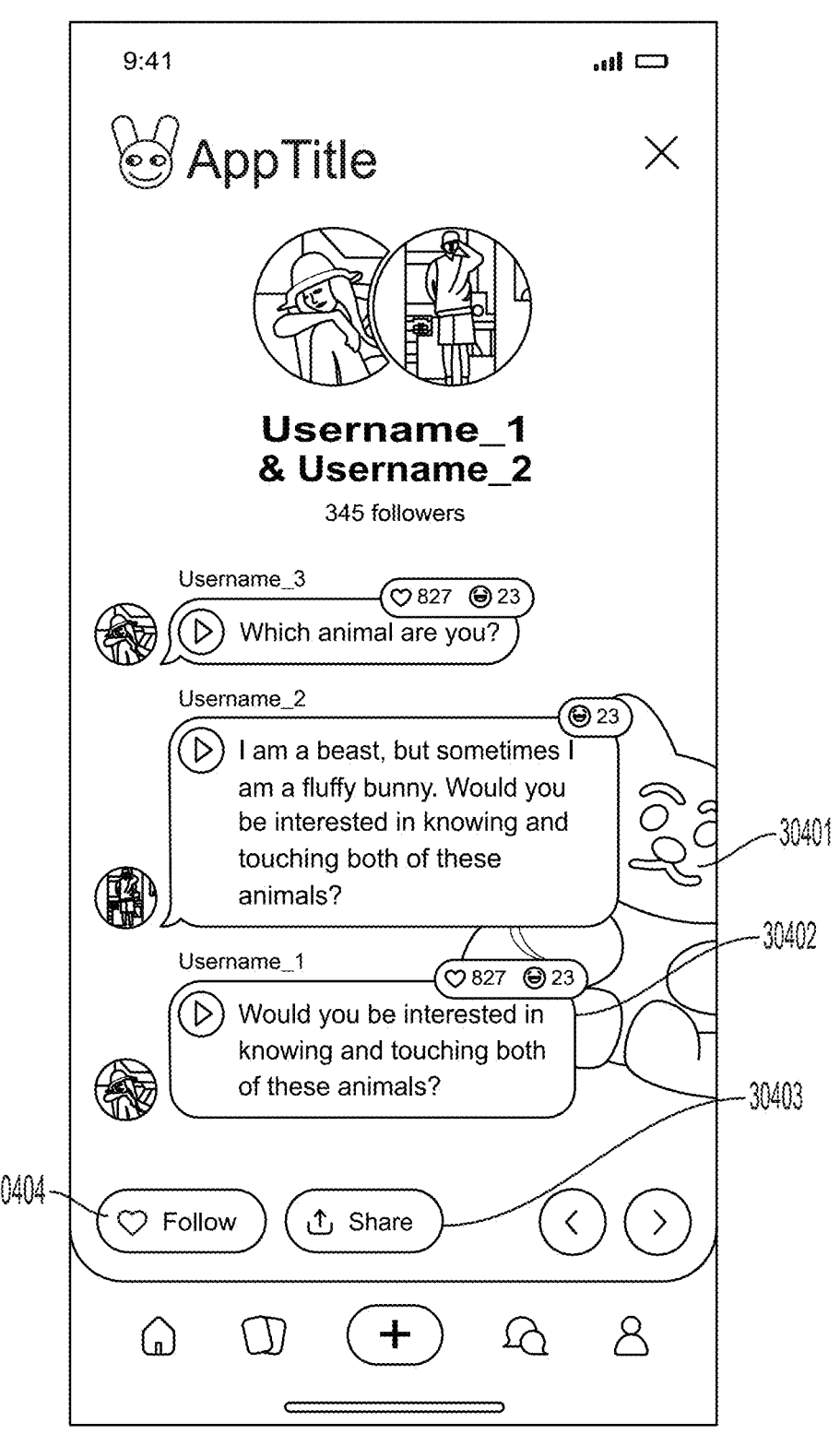
Figure 306:
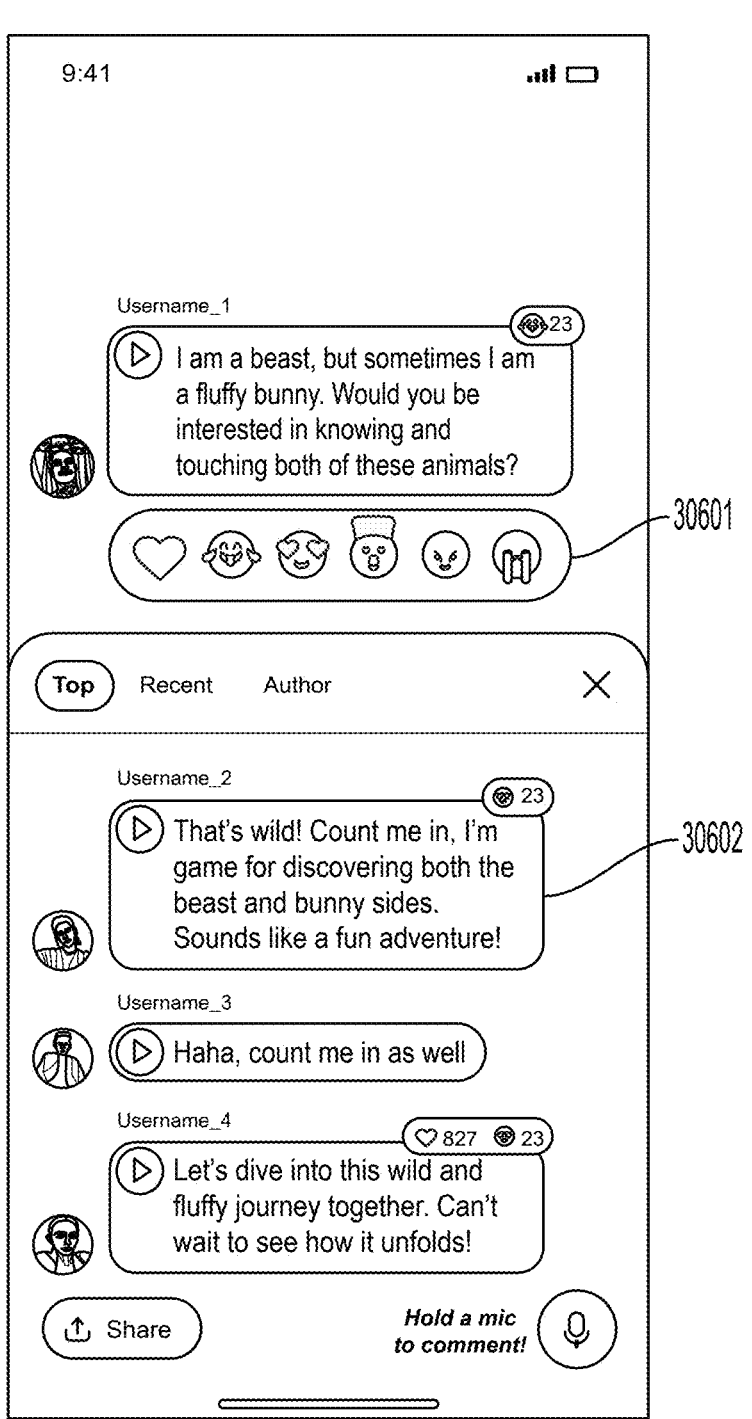

FIG. 304 shows a screen from the mobile application depicting a show or ongoing conversation between two users, which may be viewed by other users on the mobile application. The participating users can exchanges messages 30402, whether text based on audio messages, or can engage in live conversations. A user may be able to navigate the show or ongoing conversation by scrolling. The viewing user will be able to see messages 30402, including playing them out loud if they have audio components, and can react to messages, as depicted in FIG. 306. A viewing user may be able to follow 30404 or share 30403 a show or ongoing conversation. The background while viewing the show or ongoing conversation may comprise different colors, designs, or images 30401. The images may be automatically generated by the mobile application based on the content or context of the show or ongoing conversation. The images may move and may move across the background of the screen.

Figure 305:
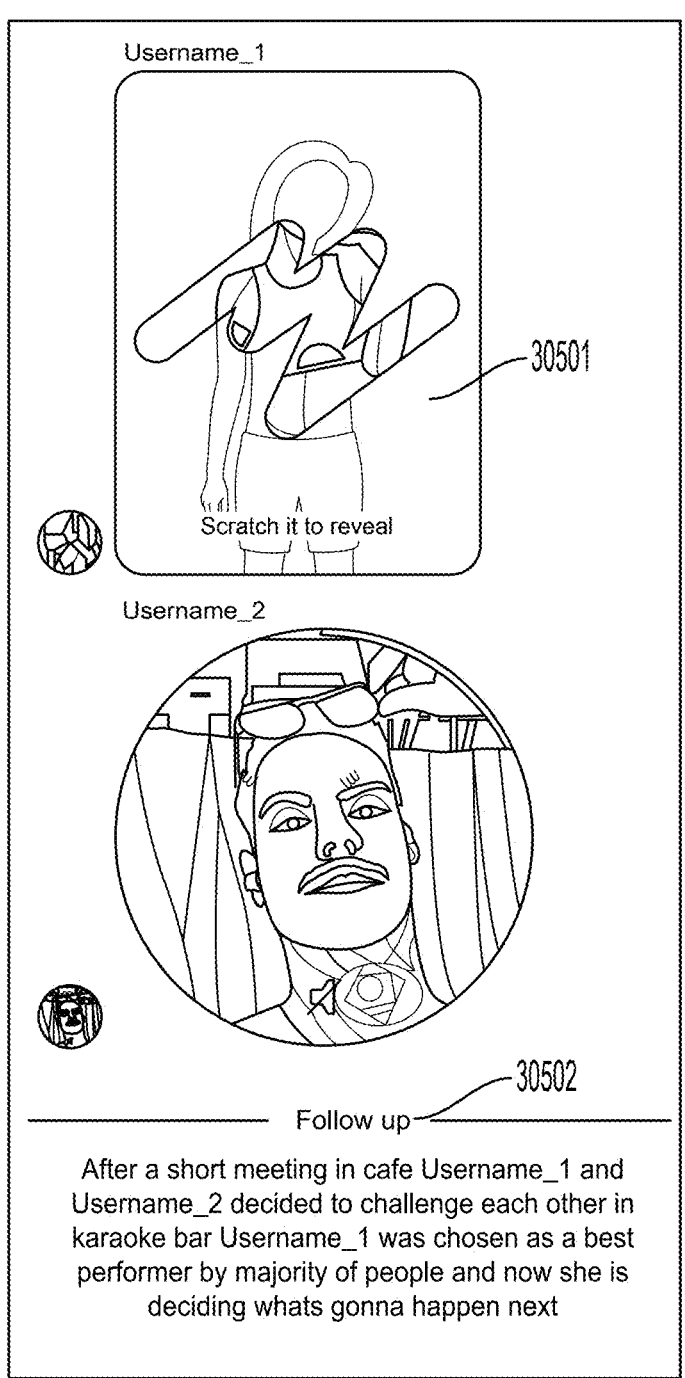

FIG. 305 shows a screen from the mobile application depicting a show or ongoing conversation between two users, which may be viewed by other users on the mobile application. A user participating in a show or ongoing conversation may be able to submit images 30501, whether depicting themselves or depicting anything else. These images 30501 may be able to be interacted with, for example, a viewing user may have to "scratch" the image to reveal portions of it, where "scratching" would entail rubbing the screen where the image is located. Shows or ongoing conversations may have "Follow Up" 30502 summaries in between messages or other pieces of content within the show or ongoing conversation. "Follow Up" 30502 summaries may summarize the show or ongoing conversation as it has progressed thus far or may summarize interactions that may have occurred off the mobile application, such as in a public setting.

FIG. 306 shows a screen from the mobile application depicting a show or ongoing conversation between two users, which may be viewed by other users on the mobile application. A user viewing a show on ongoing conversation may be able to react 30601 or respond to messages within the show or ongoing conversation via commenting 30602. Reactions 30601 may comprise different visual indicators or emojis, which may display above the relevant message in the show or ongoing conversation. Responses via comments 30602 may be comprised of text or audio messages, and may be displayed on an overlay screen that pulls out over the show or ongoing conversation's normal display. These comments 30602 may be sorted by different metrics such as "Top," "Recent," "Author," etc.

Figure 307:
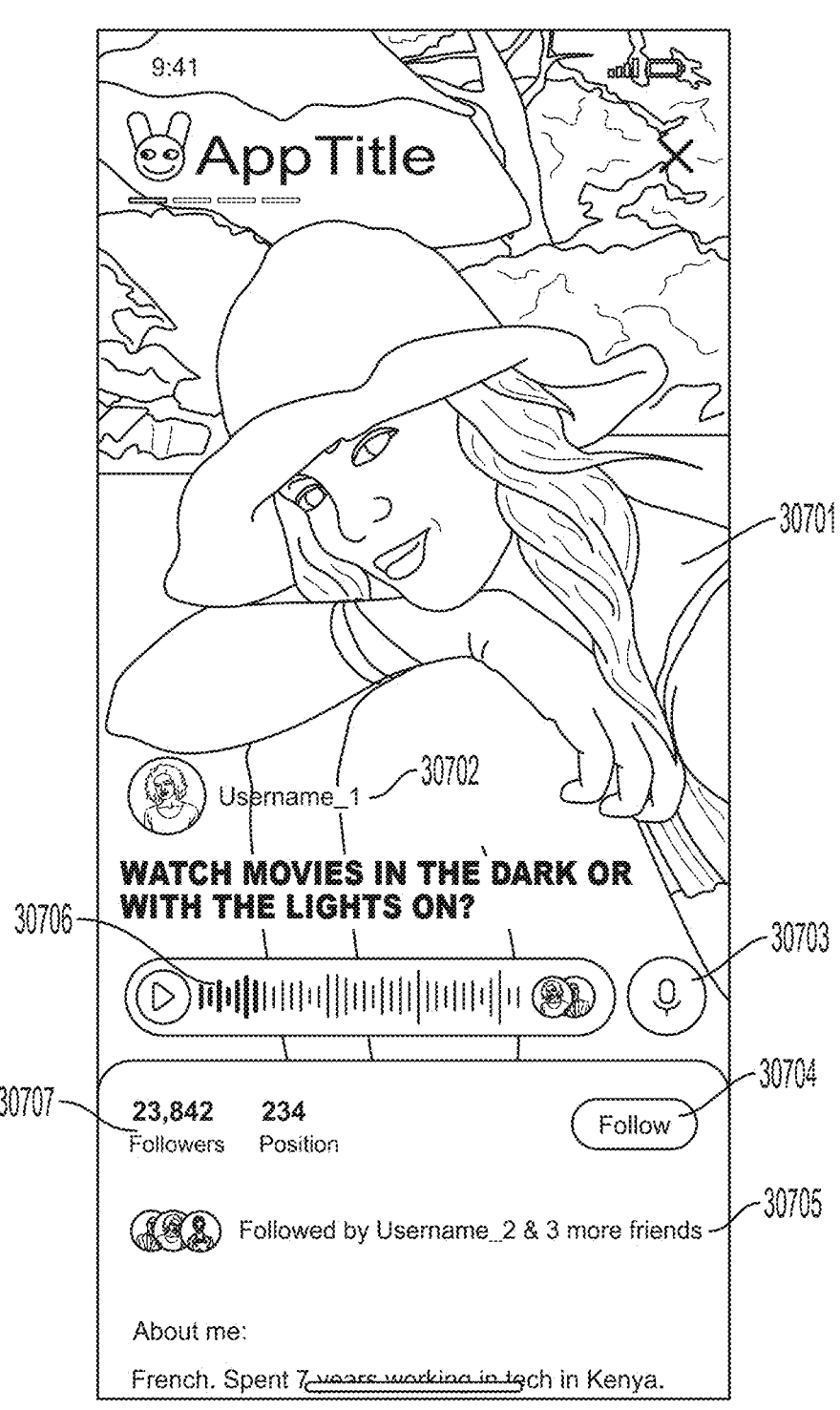

FIG. 307 shows a screen from the mobile application depicting a user profile, which may be used for general matching, dating, or social networking purposes within the mobile application. A user profile on the mobile application may be comprised of a profile photo 30701, a username 30702, audio messages or prompts 30706, a button 30703 to enable responding to an audio message or prompt 30706, information on number of followers 30707, specific followers that a user may know 30705, or a follow button 30704. A user may be able to respond to an audio message or prompt 30706 on a profile in order to initiate a conversation with the profile's owner. A user may be able to navigate different profile photos 30701 on the profile by swiping to the right or left, or may be able to indicate whether or not they wish to be matched with the profile owner by making a swiping motion. Scrolling down, or swiping up, may navigate a viewing user to an expanded view of the profile information as demonstrated on FIG. 308. Responding to an audio message or prompt 30706 may bring a user to a screen like those demonstrated in FIG. 309 or 310.

Figure 308:
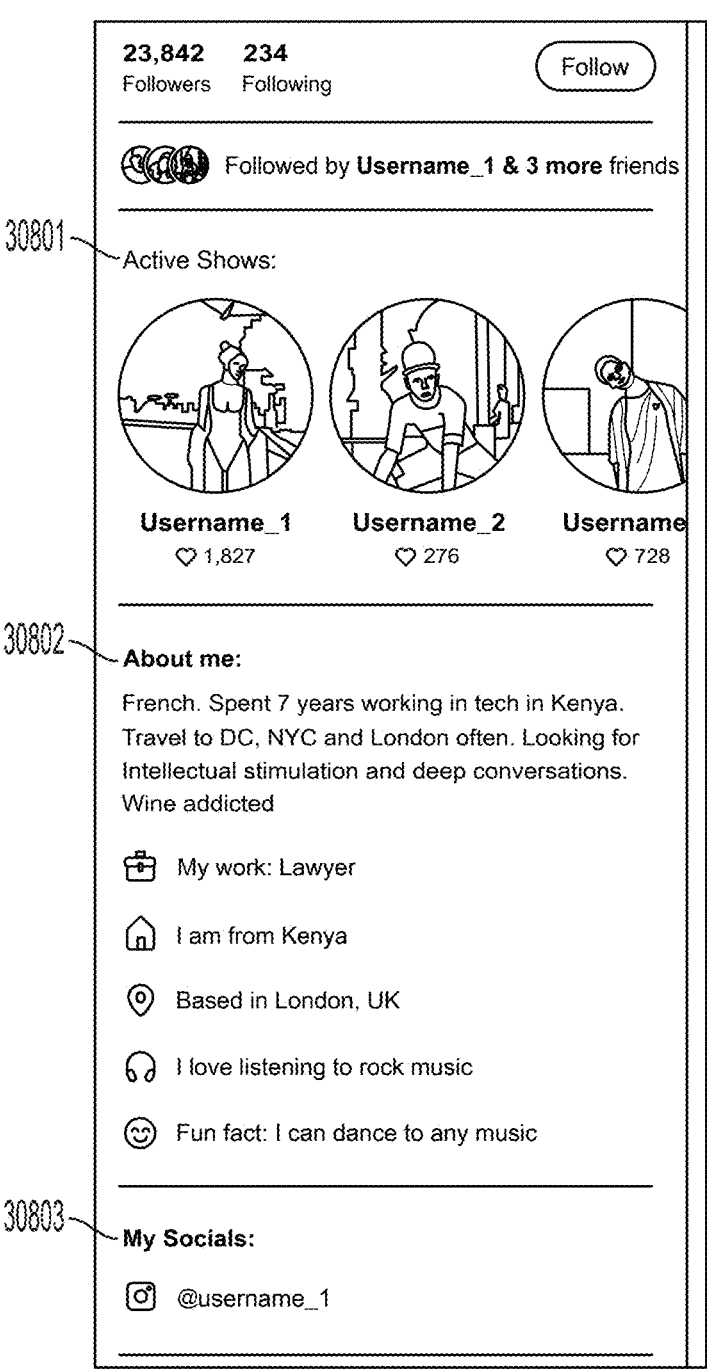

FIG. 308 shows a screen from the mobile application depicting a user profile, which may be used for general matching, dating, or social networking purposes within the mobile application. This expanded view of a user profile may be comprised of a listing or display of active shows or ongoing conversations 30801, a section for biographic information 30802, and a section for links to external sites or social media 30803. The active shows or ongoing conversations display 30801 may display profile pictures of the users whom the profile owner is engaged with. The biographic information 30802 may include information about jobs, location, interests and hobbies, etc.

Figure 309:
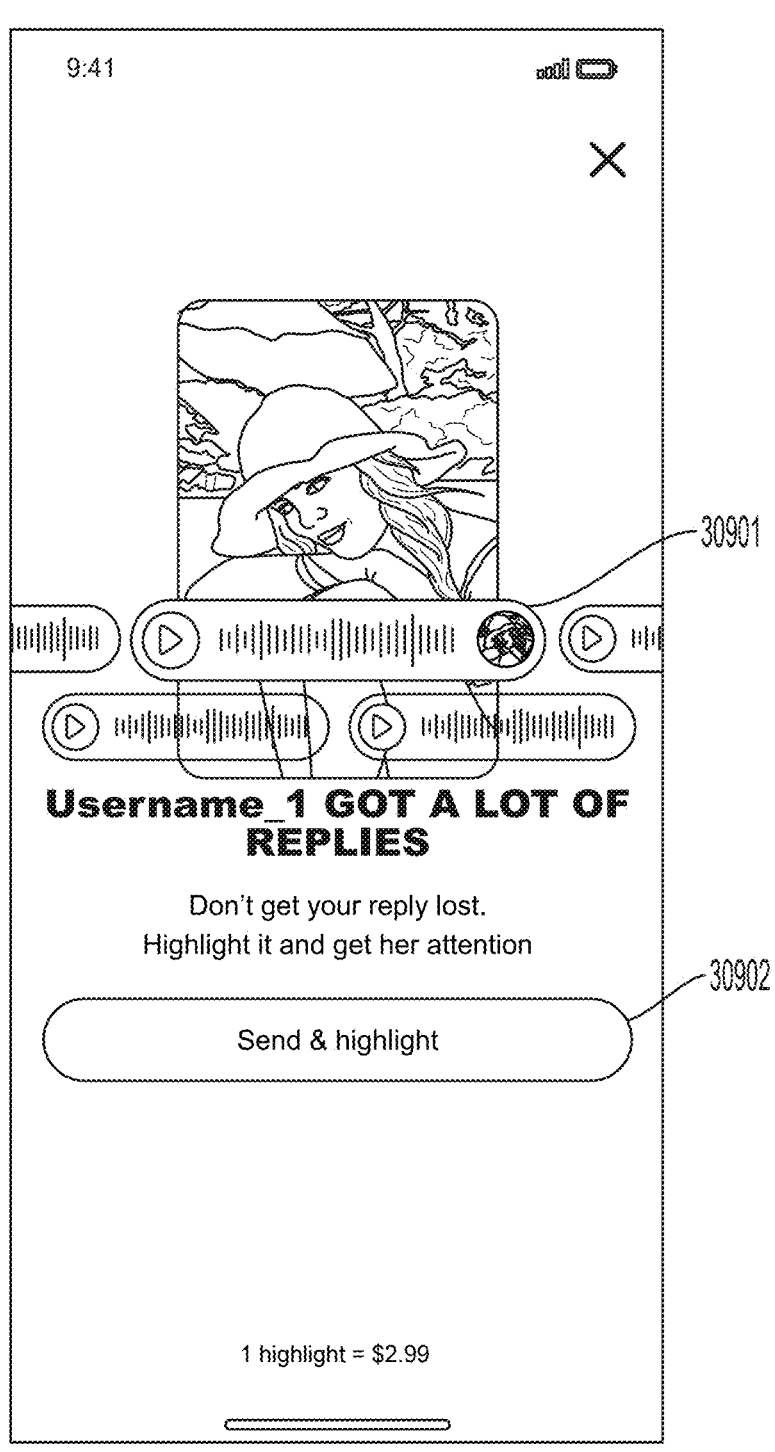

FIG. 309 shows a screen from the mobile application that may appear when a user responds to an audio message or prompt 30706. The response 30901 may be displayed among a grouping of other responses to the same audio message or prompt, and a user may be able to click the response 30901 to play it back. This screen may indicate to the responding user that the profile owner has received a high number of replies, and may prompt the responding user to highlight 30902 the response when sending it. Highlighting 30902 the response may require the payment of a fee to the mobile application or the execution of a computer transaction.

Figure 310:
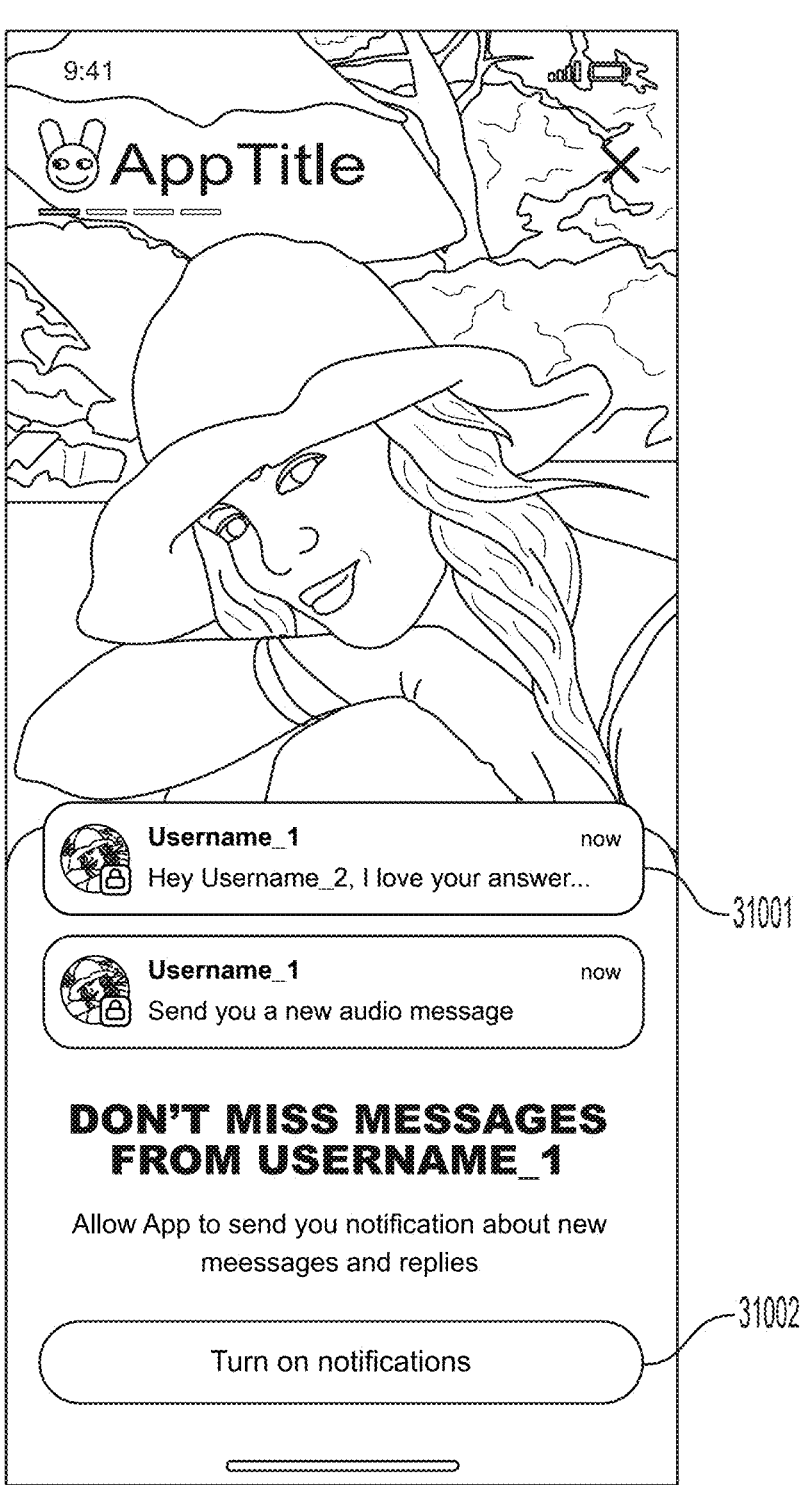

FIG. 310 shows a screen from the mobile application that may appear when a user responds to an audio message or prompt 30706. The profile owner may respond 31001 to the user, either via text or audio message. A user may be able to enable notifications 31002 of future messages or other updates received from the profile owner.

Figure 311:
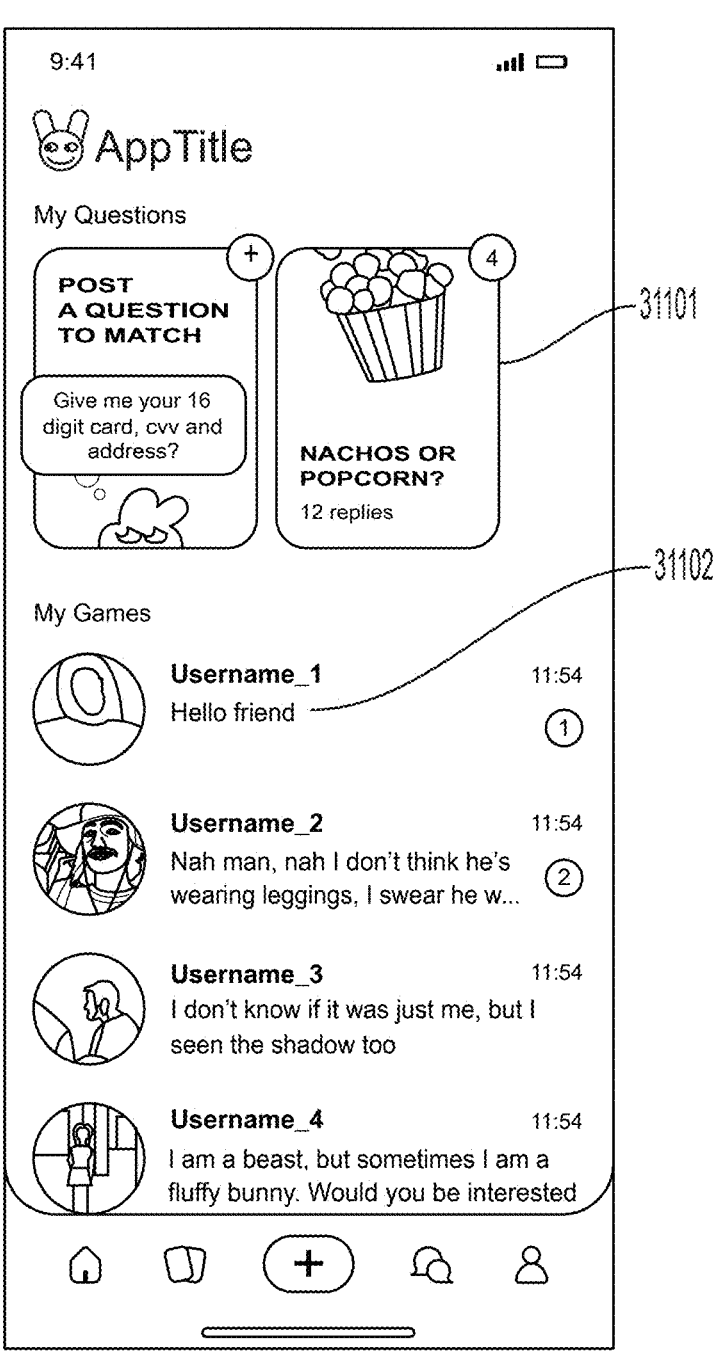

FIG. 311 shows a screen from the mobile application that may appear when a user is viewing content or information associated with their own profile. A user may be able to view prompts or questions 31101 they have created, or may be able to create prompts or questions 31101. A user may also be presented with games, shows, messages, or ongoing conversations 31102 they are currently engaged in with other users on the mobile application. Clicking on a prompt or question 31101 icon may bring the user to a screen focused on the prompt or question 31101, such as those screens demonstrated by FIG. 312 and FIG. 313.

Figure 312:
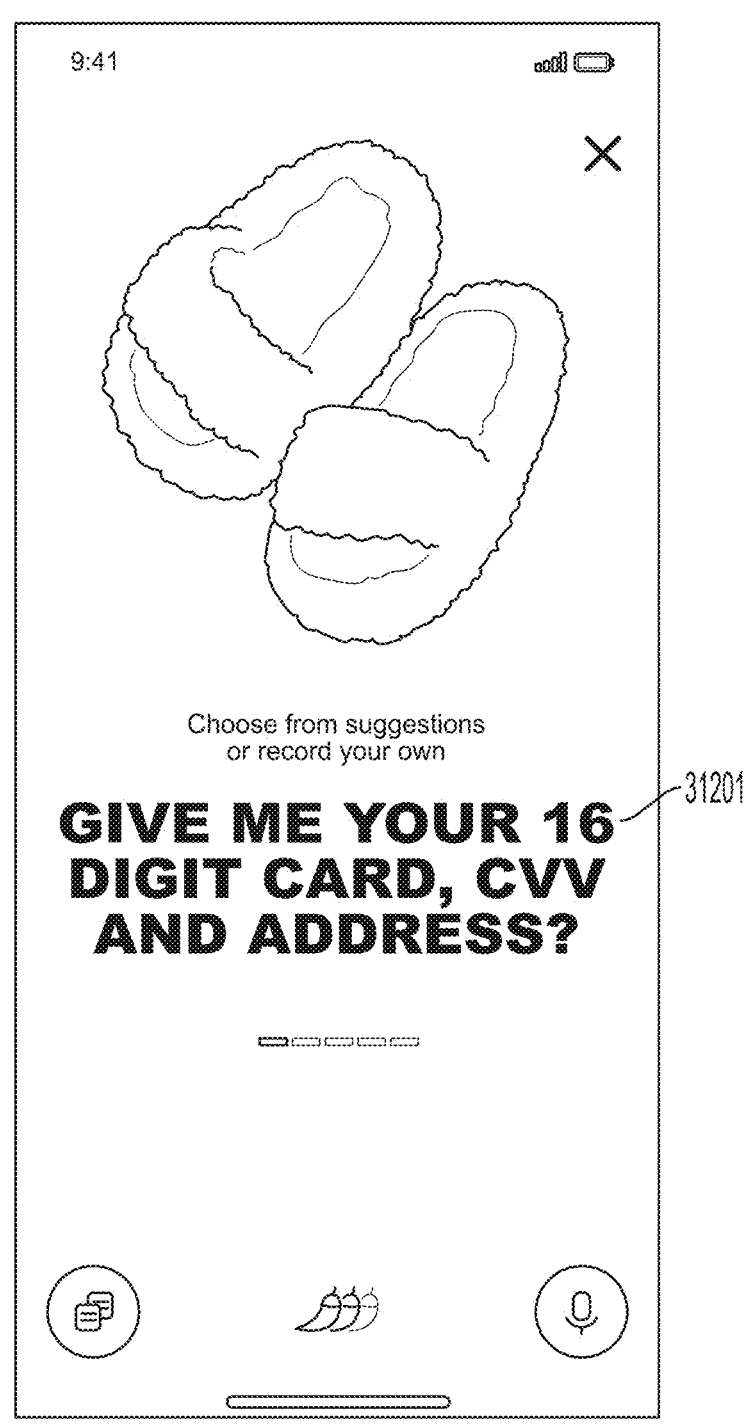

FIG. 312 shows a screen from the mobile application that may appear when a user click on a prompt or questions 31101 associated with their own profile—where the user is attempting to create a new prompt or question 31101. Here a user may be presented with suggested questions 31201 that they may add to their profile in order to solicit responses from other users. A user may be able to record or type their own question 31201 as an alternative to using the mobile application's suggested options. A user may be able to filter suggested questions 31201 by "spiciness"—factor of how suggestive a questions is—or other factors.

Figure 313:
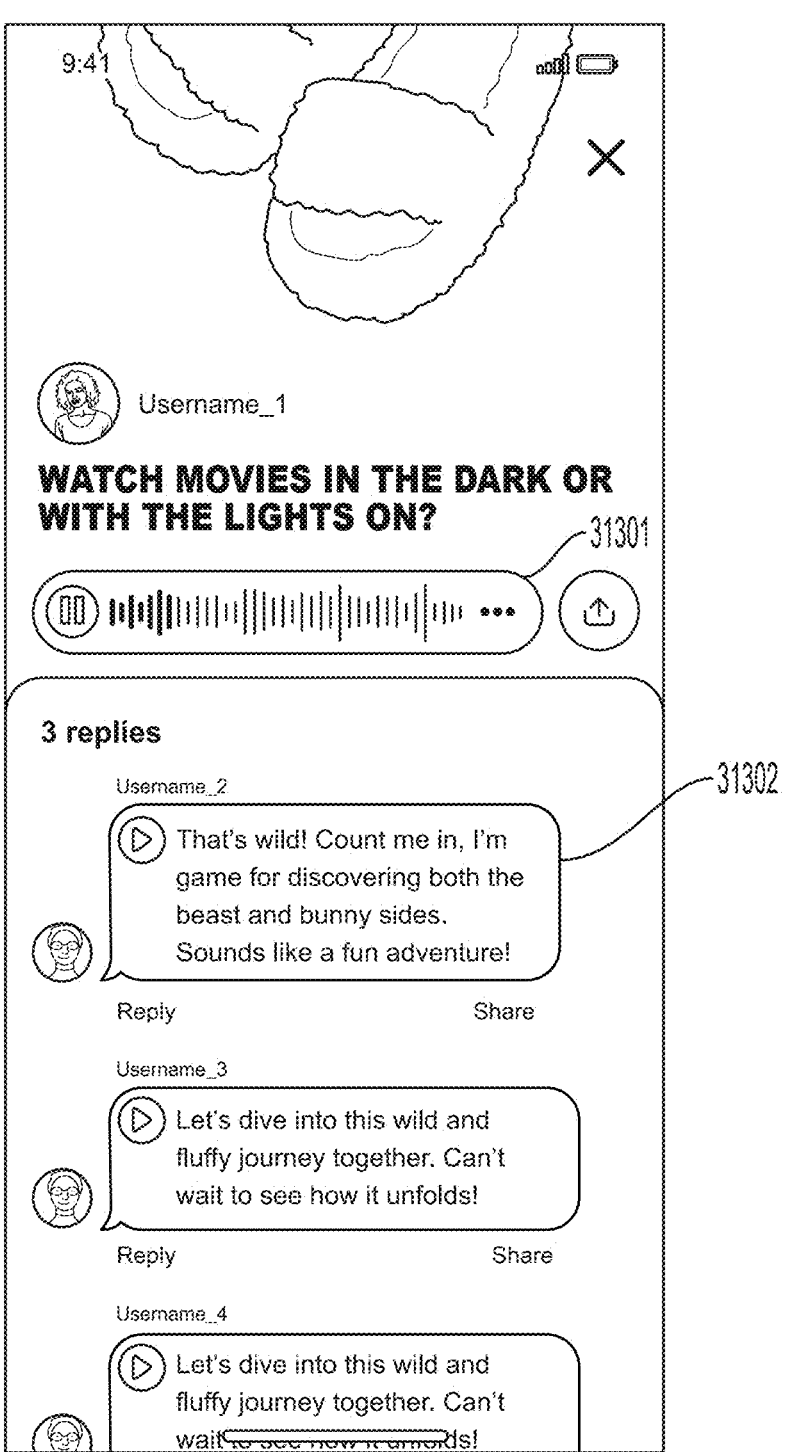

FIG. 313 shows a screen from the mobile application that may appear when a user click on a prompt or questions 31101 associated with their own profile—where the user is attempting to view an existing new prompt or question 31101. The user may be able to playback or share the existing question 31301 with other people. The user may be able to view replies 31302 that have been submitted as responses to the existing prompt or question 31101.

Figure 314:
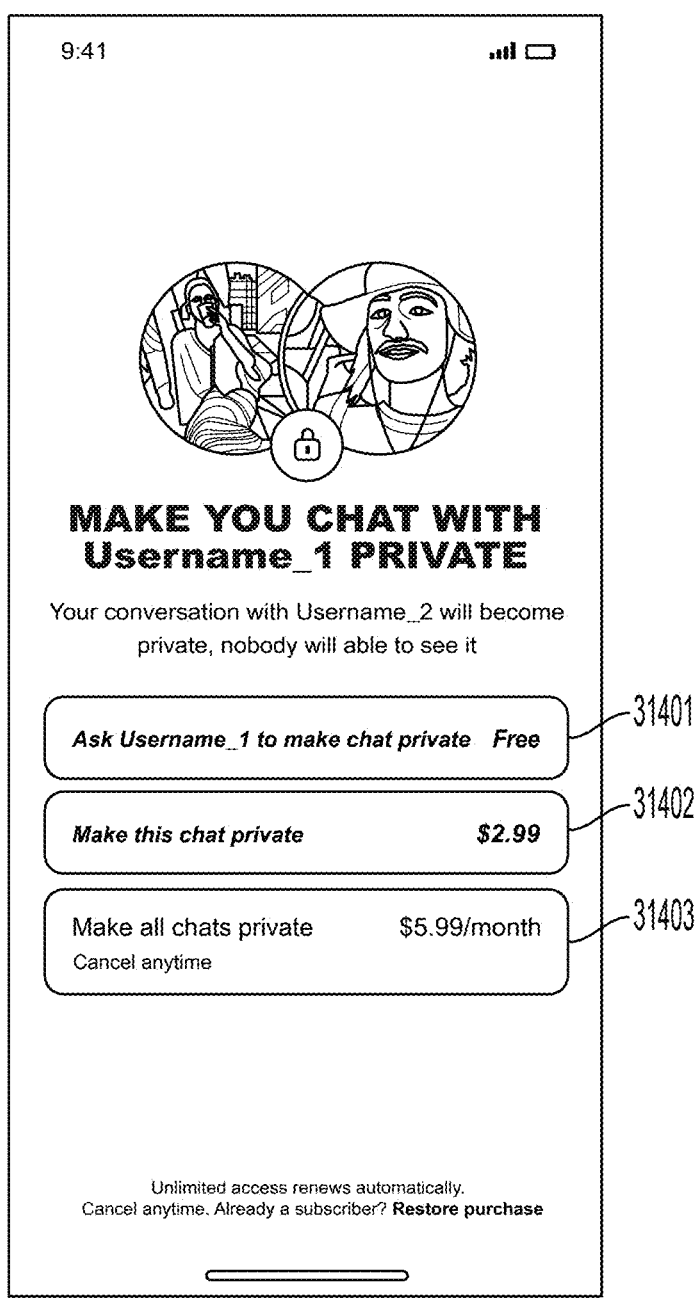
Figure 317:
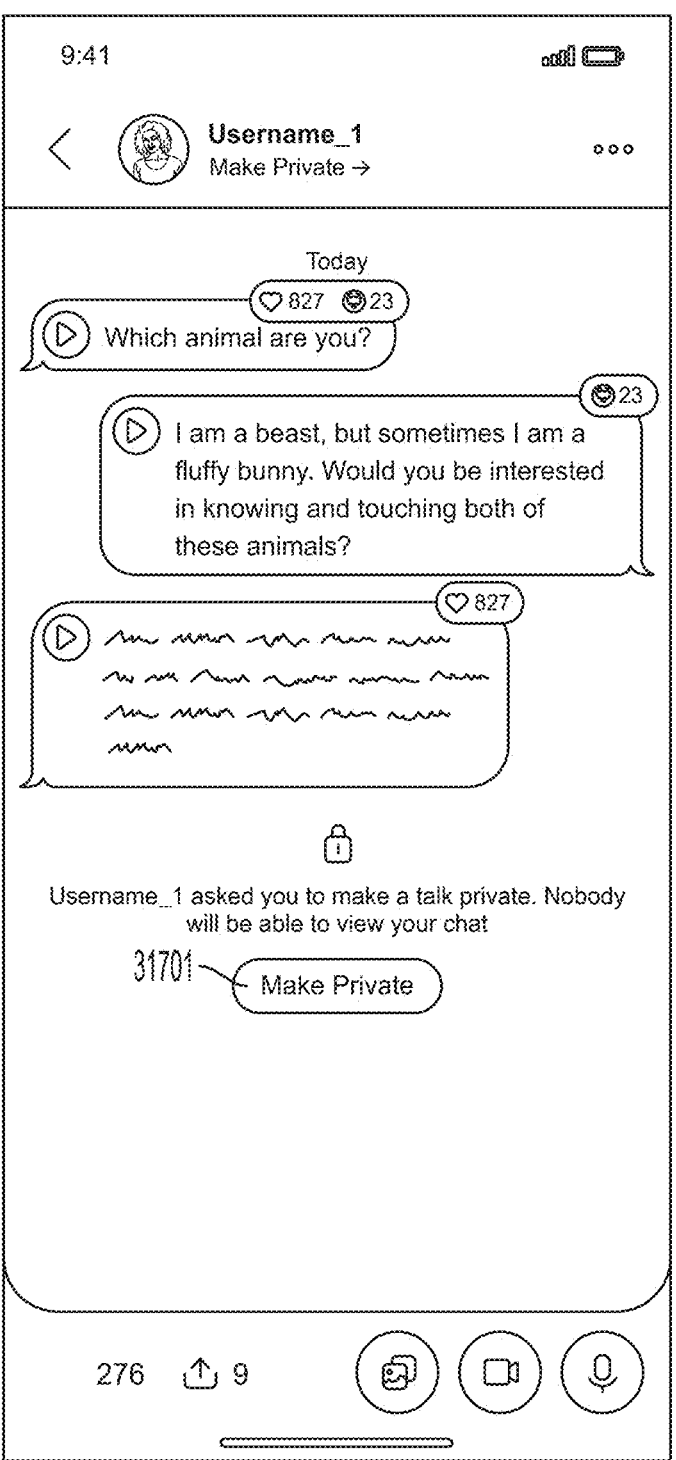

FIG. 314 shows a screen from the mobile application that may appear when a user has requested, or another user they are engaged with in conversation has requested, to make a show or ongoing conversation become "private." Typically, shows or ongoing conversations are publicly viewable by all users on the mobile application, but a participating user may be able to initiate a process to make the show or ongoing conversation go private-viewable only by the conversation participants, as demonstrated by FIG. 317. A user may be able to ask their conversation partner to make the conversation private 31401, make the conversation private themselves 31402, or make all ongoing conversations private 31403. Utilization of any of these options may require the payment of a fee to the mobile application or the execution of a computer transaction.

Figure 315:
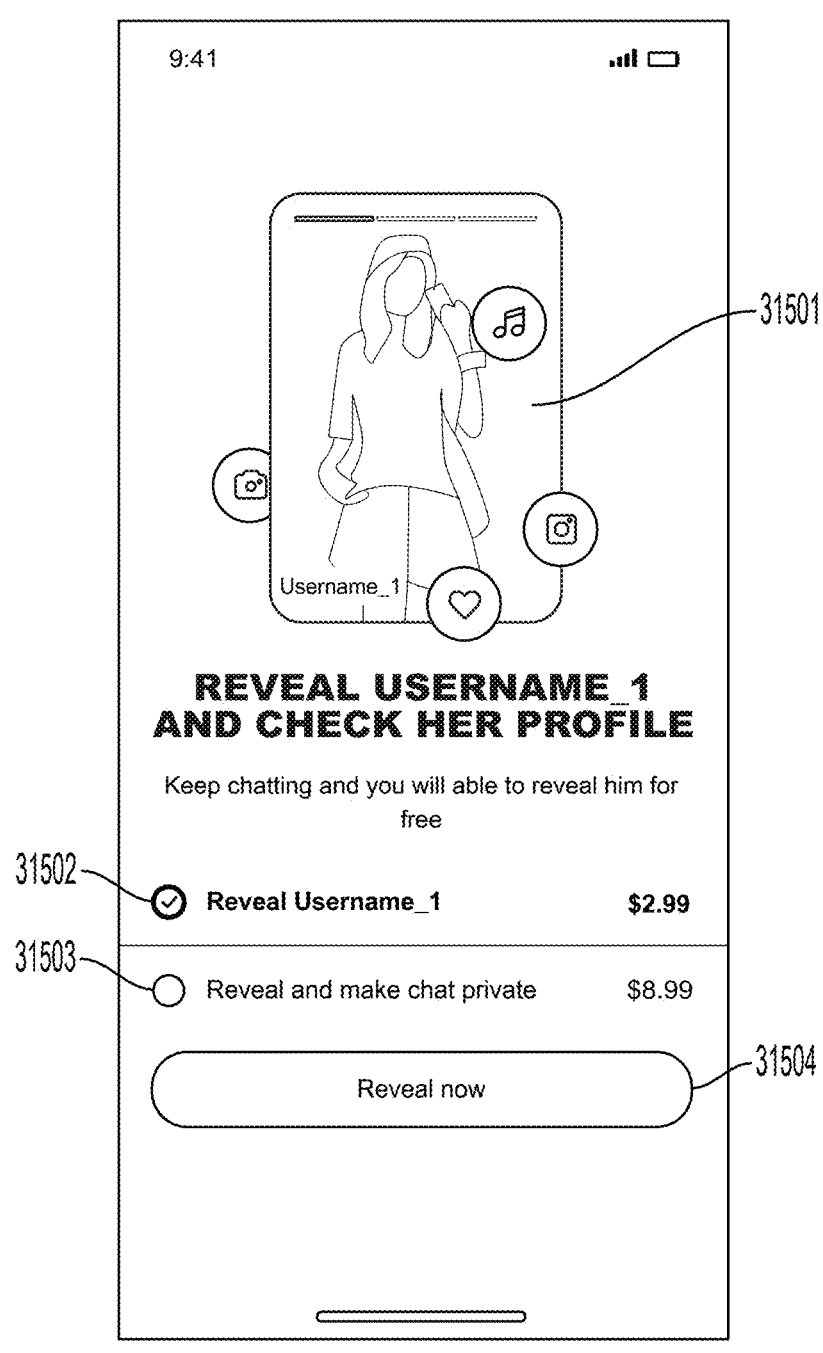

FIG. 315 shows a screen from the mobile application that may appear when a user is engaged in a show or ongoing conversation with another, anonymous, user. Shows or conversations, which may be initiated by a matching of users through the mobile application, may sometimes keep the identities of the conversation participants private. After a certain number of messages have been exchanged, or time has elapsed, within a show or ongoing conversation a user may be presented with this screen by the mobile application, or a user may navigate to this screen from within a show or ongoing conversation. This screen may include a blurred depiction of the other participating user 31501, as well as different options for revealing the user's identity 31502, 31503, 31504. Utilization of any of these options may require the payment of a fee to the mobile application or the execution of a computer transaction.

Figure 316:
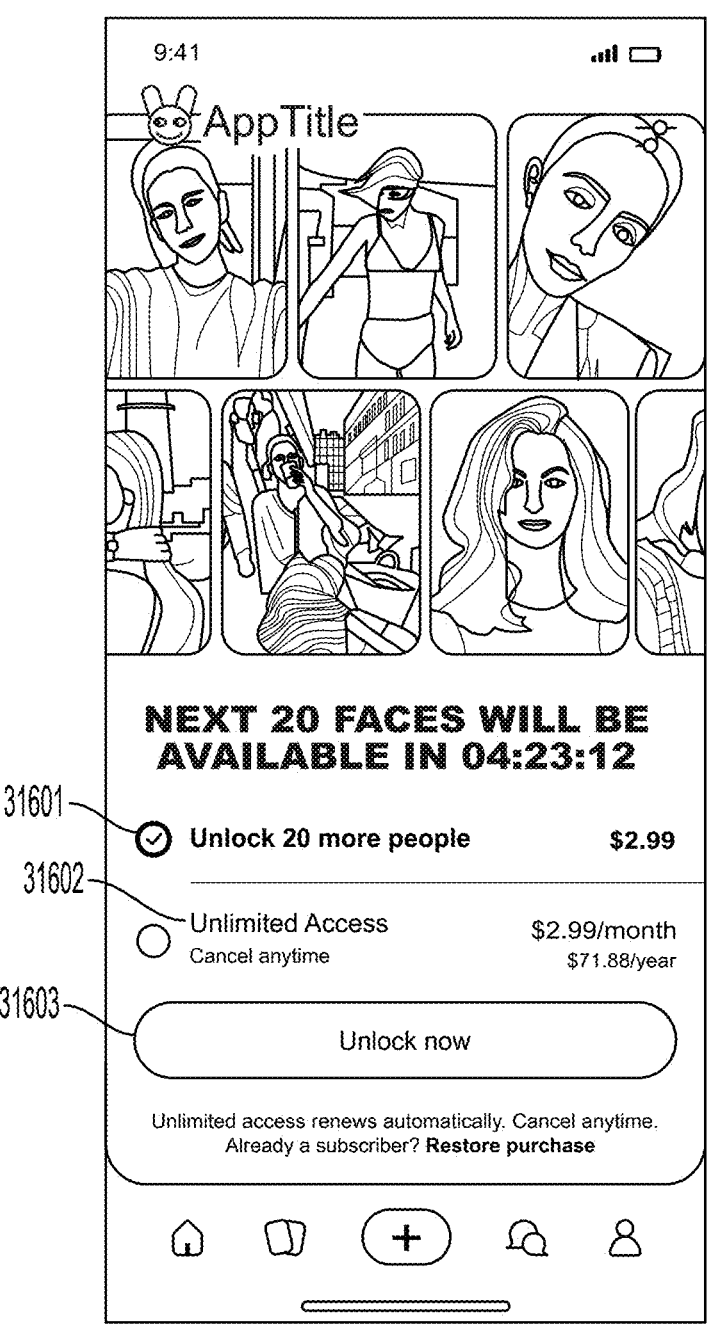

FIG. 316 shows a screen from the mobile application that may appear when a user has been navigating or "swiping" through different user profiles to identify potential matches or conversation partners. After a user has navigated or "swiped" through a certain number of different user profiles, they may be presented with this screen. The number of user profiles that can be reviewed may be evaluated within a certain timeframe, such as a number of user profiles per day. This screen may include options to unlock an extra amount of user profiles to identify potential matches or conversation partners 31601, 31602, 31603. Utilization of any of these options may require the payment of a fee to the mobile application or the execution of a computer transaction.

FIG. 317 shows a screen from the mobile application that depicts an ongoing show or conversation between users. Shows or ongoing conversations may include a button 31701 that may enable a user to initiate a process to make the show or ongoing conversation private. This process is depicted in FIG. 314. The button 31701 may appear by request of the other user participating in the show or ongoing conversation.

Figure 318:
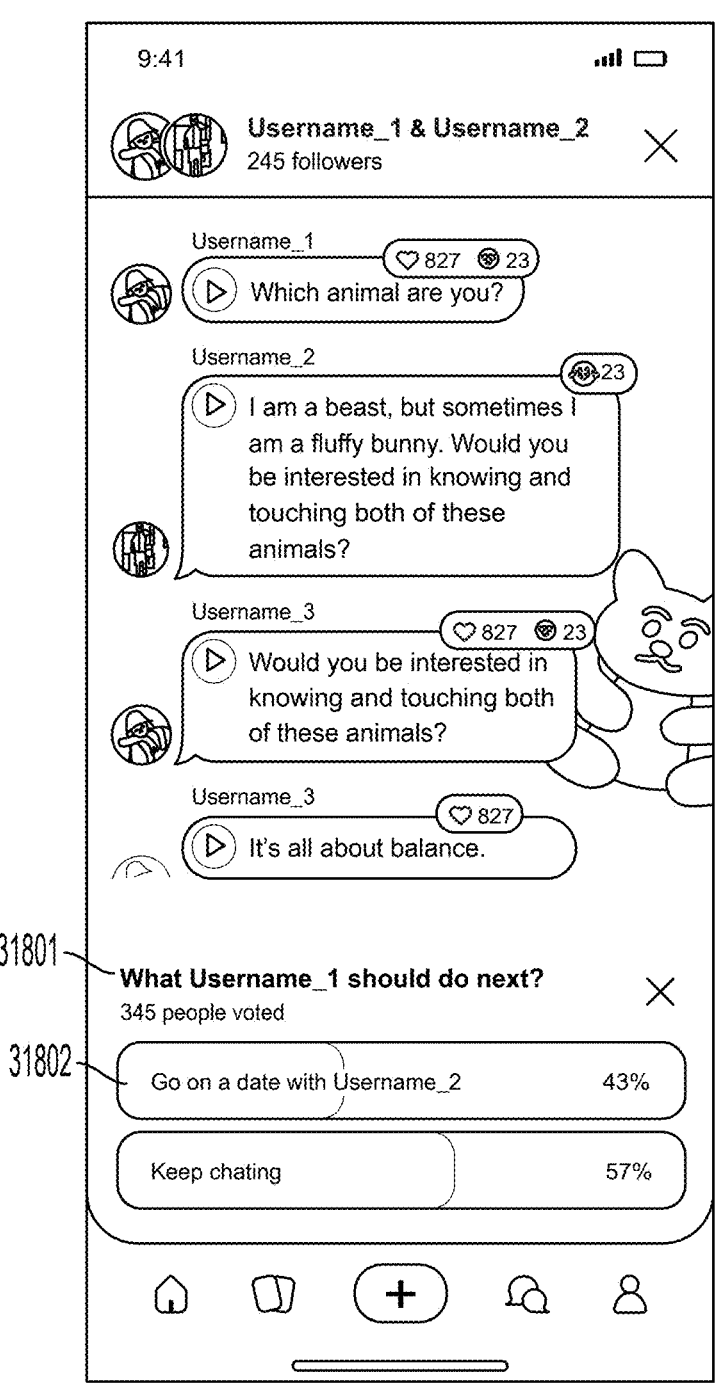

FIG. 318 shows a screen from the mobile application that depicts an ongoing show or conversation between users. Shows or ongoing conversations may include a poll or quiz 31801, which may be initiated by the participating users, the mobile application automatically, or by viewing users. Viewing users may be able to vote or select options 31802 in response to the poll or quiz 31801 being presented, and the results of the same may be displayed within the show or ongoing conversation.

In some embodiments, another mobile application is provided. The mobile application may include any of the features described in this disclosure including features described above this paragraph and features described below this paragraph, or any combination thereof. The interfaces below are provided for exemplary purposes only. Any interfaces presented or described in this disclosure may include fewer than or more than the features presented or described. The use of digital exchangeables may be required for one or more actions described in this disclosure.

Figure 319:

FIG. 319 shows a screen from the mobile application that depicts user account registration. A user account registration screen may comprise at least one of: a first field, a first continue option, a terms of use option, and a privacy policy option. In some embodiments, the user may use a virtual keyboard to input an email upon selection of the first field. In one embodiment, the email comprises a university email. A verification code may be sent to the email to verify the email. According to some embodiments, the user may select the first continue option after providing the email. In some cases, if the user provides an invalid email, or fails to provide the email, selection of the first continue option may produce an error.

In one embodiment, the user may be routed to an external website and/or application and/or document upon selection of the terms of use option. In another embodiment, a first popup page may appear upon selection of the terms of use option. The first popup page may comprise terms of use information associated with the mobile application. In some embodiments, the user may be routed to an external website and/or application and/or document upon selection of the privacy policy option. In another embodiment, a second popup page may appear upon selection of the privacy policy option. The second popup page may comprise privacy policy information associated with the mobile application. In some embodiments, selection of the first continue option may take the user to an email verification screen (e.g., the screen of FIG. 320).

Figure 320:
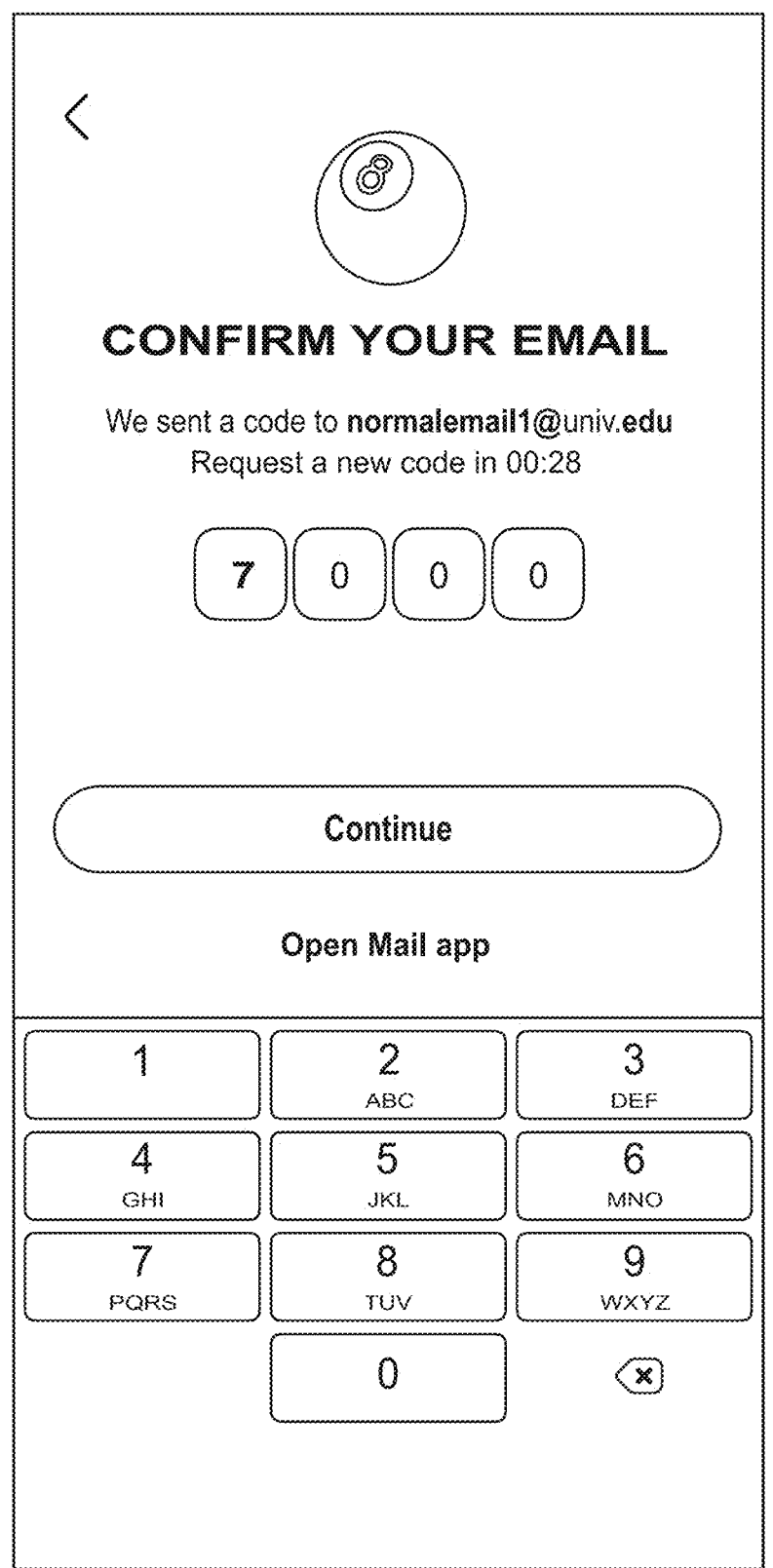

FIG. 320 shows a screen from the mobile application that depicts verification of the email. The email verification screen may comprise at least one of: a first back option, a second field, a second continue option, and a mail option. In one embodiment, the user may use a virtual keypad to input the verification code upon selection of the second field. Additionally or alternatively, the user may, in some embodiments, route to a mail application on the user's device upon selection of the mail option. In one embodiment, the mail option comprises an "Open Mail app" option. According to some embodiments, the user may select the second continue option after providing the verification code. In some cases, if the user provides an invalid verification code, or fails to provide the verification code, selection of the second continue option may produce an error.

The user may return to the user account registration screen (e.g., the screen of FIG. 319) upon selection of the first back option. In some embodiments, the first back option comprises a back arrow. In some embodiments, there is a limited amount of time that the user has to provide the verification code. In other embodiments, there is a countdown on the screen displaying an amount of time left to provide the verification code. In some cases, if the user exceeds the limited amount of time, the user may have an option to request a second verification code. Furthermore, the second verification code may be sent to the email to verify the email. In some embodiments, selection of the second continue option may take the user to a first user account information screen (e.g., the screen of FIG. 321).

Figure 321:

FIG. 321 shows a screen from the mobile application that depicts first user account information. The first user account information screen may comprise at least one of: a second back option, a third field, a fourth field, a gender menu, and a third continue option. The user may use a virtual keyboard to input a first name upon selection of the third field. In one embodiment, the first name comprises a limited amount of characters (e.g., 24 characters). The user may use a virtual keypad to input a date of birth upon selection of the fourth field. In some embodiments, the date of birth must be before a given date (e.g., the date of birth must indicate a user is at least 18 years old). The user may select a gender from the gender menu. In some embodiments, the menu comprises options, wherein the options comprise at least one of male, female, more, other, nonbinary, transgender, genderfluid, etc.

The user may return to the email verification screen (e.g., the screen of FIG. 320) upon selection of the second back option. In some embodiments, the second back option comprises a back arrow. According to one embodiment, the user may select the third continue option after providing the first name, the date of birth, and the gender. In some embodiments, at least one of the first name, the date of birth, and the gender is not provided. Furthermore, in some embodiments, if the user does not provide the at least one of the first name, the date of birth, and the gender, selection of the third continue option may produce an error. In some embodiments, selection of the third continue option may take the user to a second user account information screen (e.g., the screen of FIG. 322).

Figure 322:
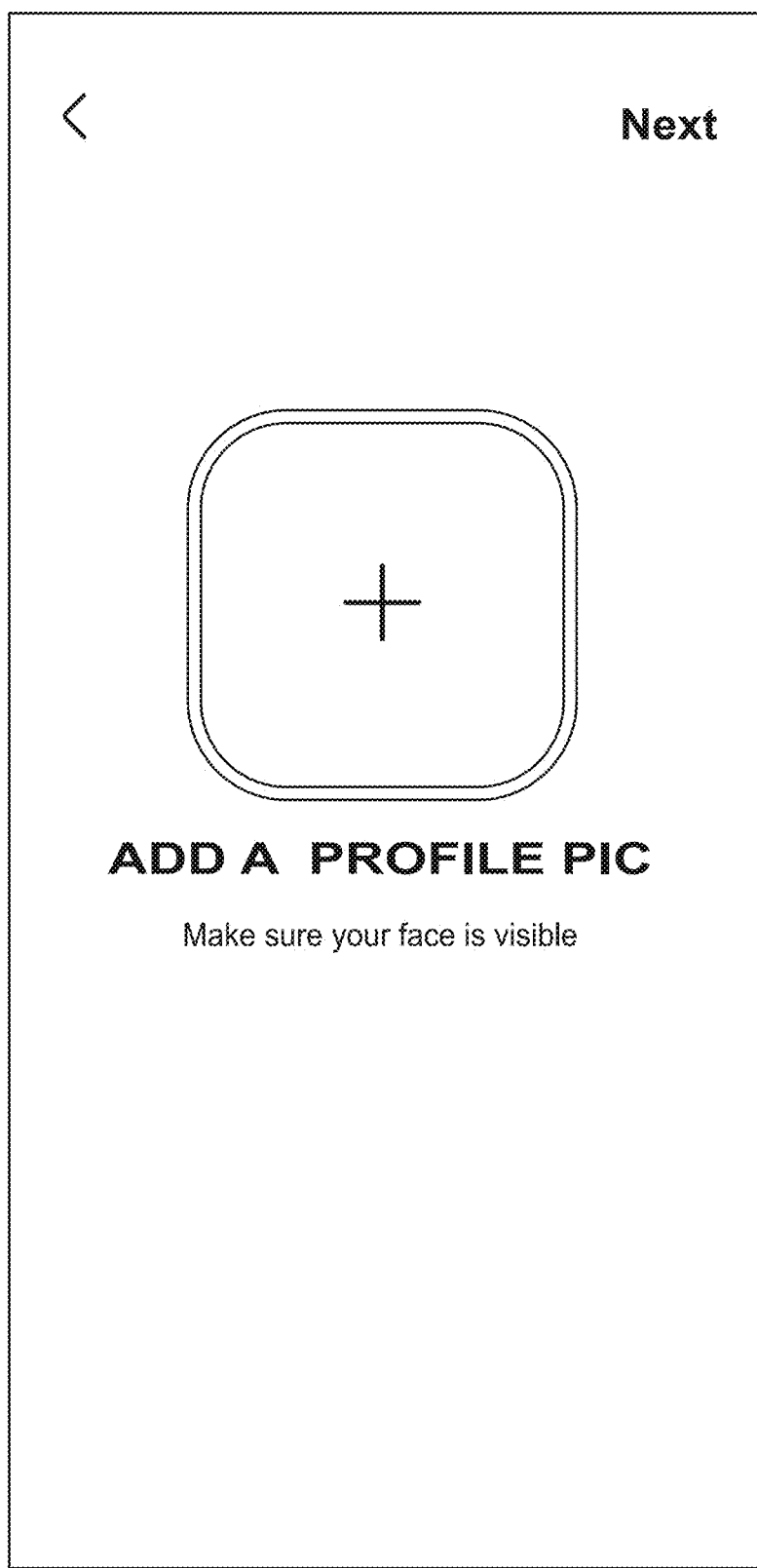

FIG. 322 shows a screen from the mobile application that depicts second user account information. The second user account information screen may comprise at least one of: a third back option, a profile picture option, and a fourth continue option. The user may route to a photo application on the user's device upon selection of the profile picture option. In some embodiments, the profile picture option comprises an "Add a Profile Pic" option. In one embodiment, the profile picture option comprises an addition sign. The user may return to the first user account information screen (e.g., the screen of FIG. 321) upon selection of the third back option. In some embodiments, the third back option comprises a back arrow. The user may select the fourth continue option after providing an image. Alternatively, the user may opt out of providing an image upon selection of the fourth continue option. In one embodiment, the fourth continue option comprises a "Next" option. In some embodiments, the fourth continue option may take the user to a third user account information screen (e.g., the screen of FIG. 323).

Figure 323:
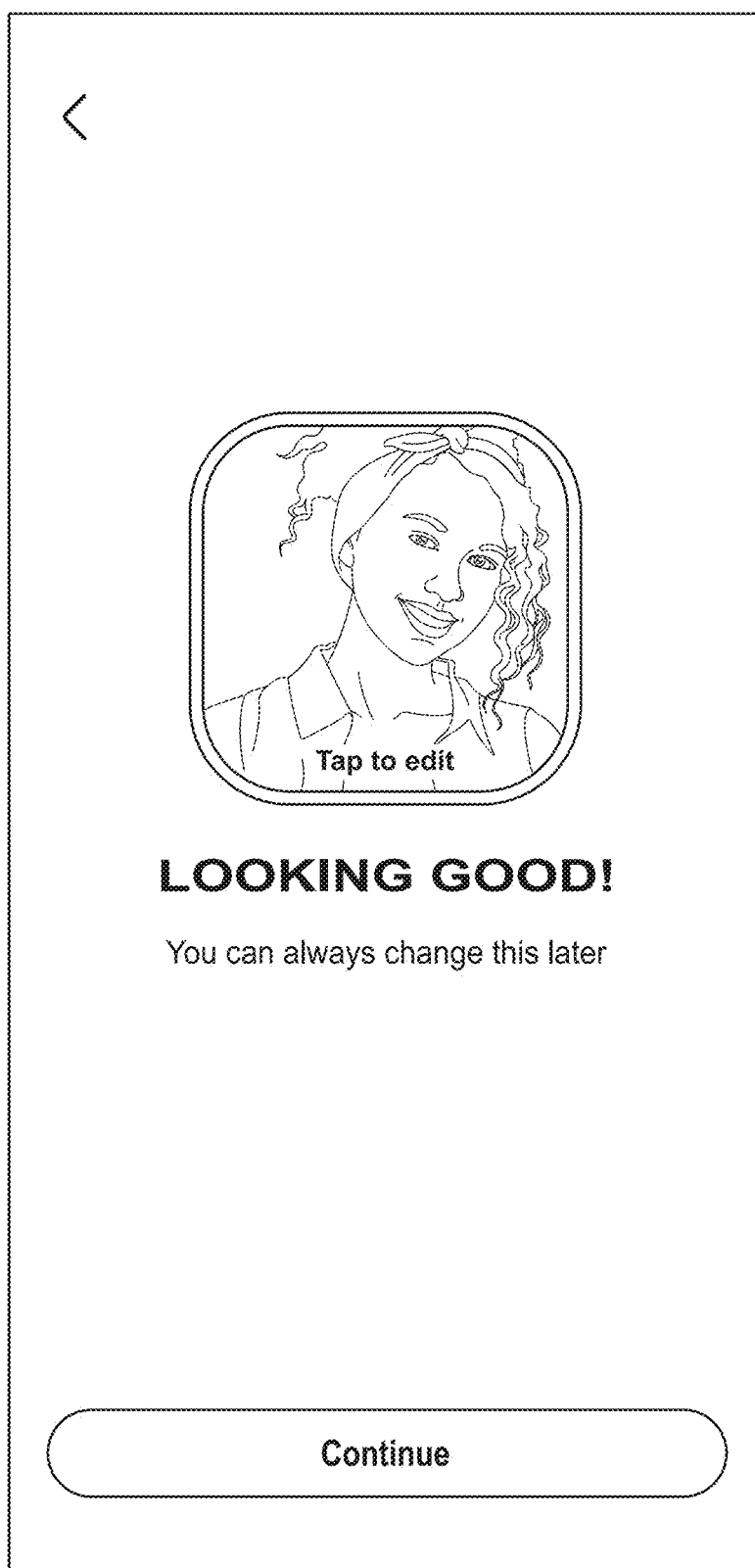

FIG. 323 shows a screen from the mobile application that depicts third user account information. The third user account information screen may comprise at least one of: a fourth back option, an edit picture option, and a fifth continue option. The user may edit the image upon selection of the edit picture option. In some embodiments, the edit picture option comprises text comprising "Tap to Edit." According to some embodiments, the user may route to a photo application on the user's device upon selection of the edit picture option. The user may return to the second user account information screen (e.g., the screen of FIG. 322) upon selection of the fourth back option. In some embodiments, the fourth back option comprises a back arrow. In some embodiments, selection of the fifth continue option may take the user to a fourth user account information screen (e.g., the screen of FIG. 324).

Figure 324:
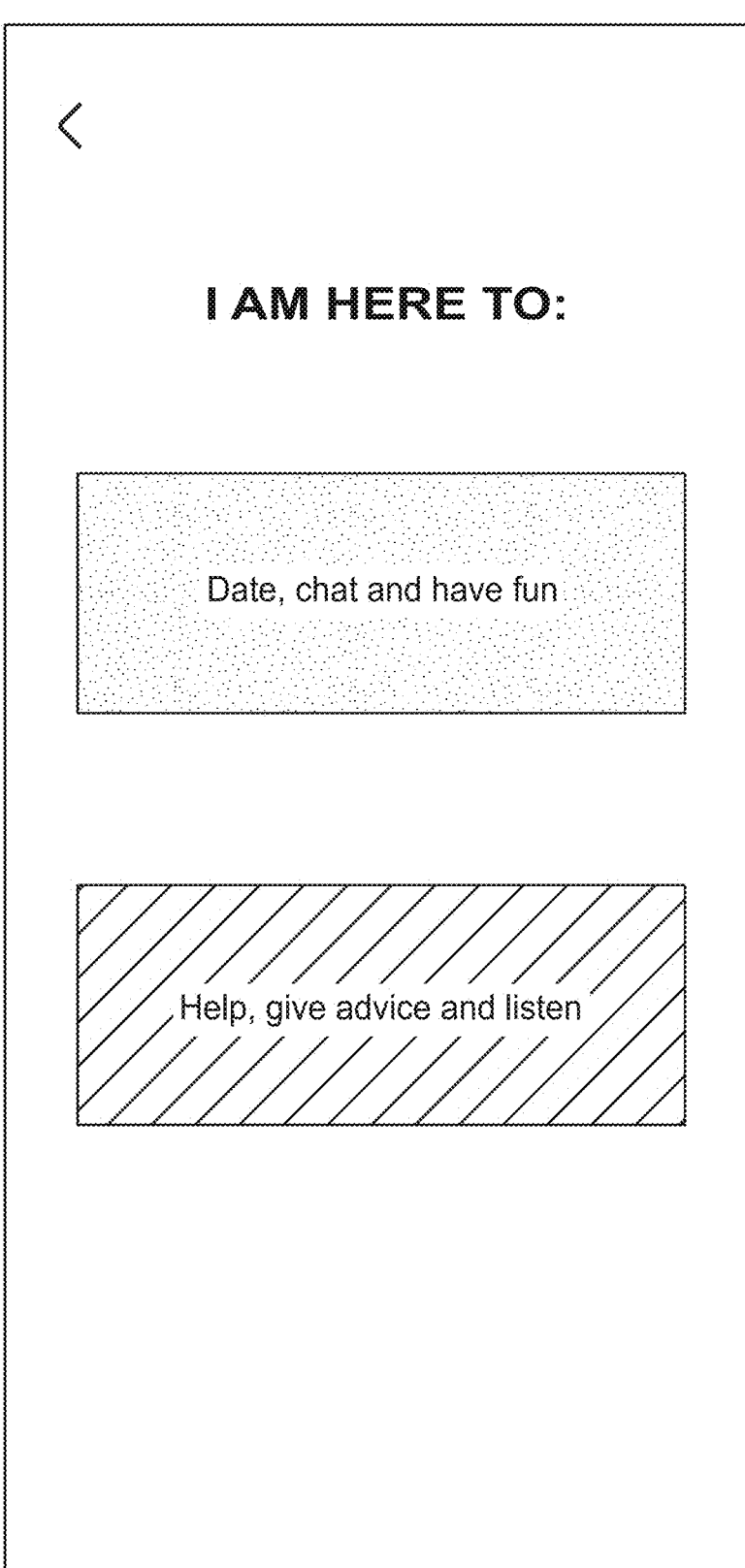

FIG. 324 shows a screen from the mobile application that depicts fourth user account information. The fourth user account information screen may comprise at least one of: a fifth back option, a first account type option, and a second account type option. In some embodiments, the user may select the first account type option. In some cases, the first account type option comprises an option to "Date, chat, and have fun." In one embodiment, selection of the first account type option may take the user to a terms and conditions screen (e.g., the screen of FIG. 325). In other embodiments, the user may select the second account type option. According to some embodiments, the second account type option comprises an option to "Help, give advice, and listen." In one embodiment, selection of the second account type option may take the user to a second terms and condition screen (e.g., the screen of FIG. 325, a screen similar to that of FIG. 325, etc.). In some embodiments, there are at least three account types. The user may return to the third user account information screen (e.g., the screen of FIG. 323) upon selection of the fifth back option. In some embodiments, the fifth back option comprises a back arrow.

Figure 325:
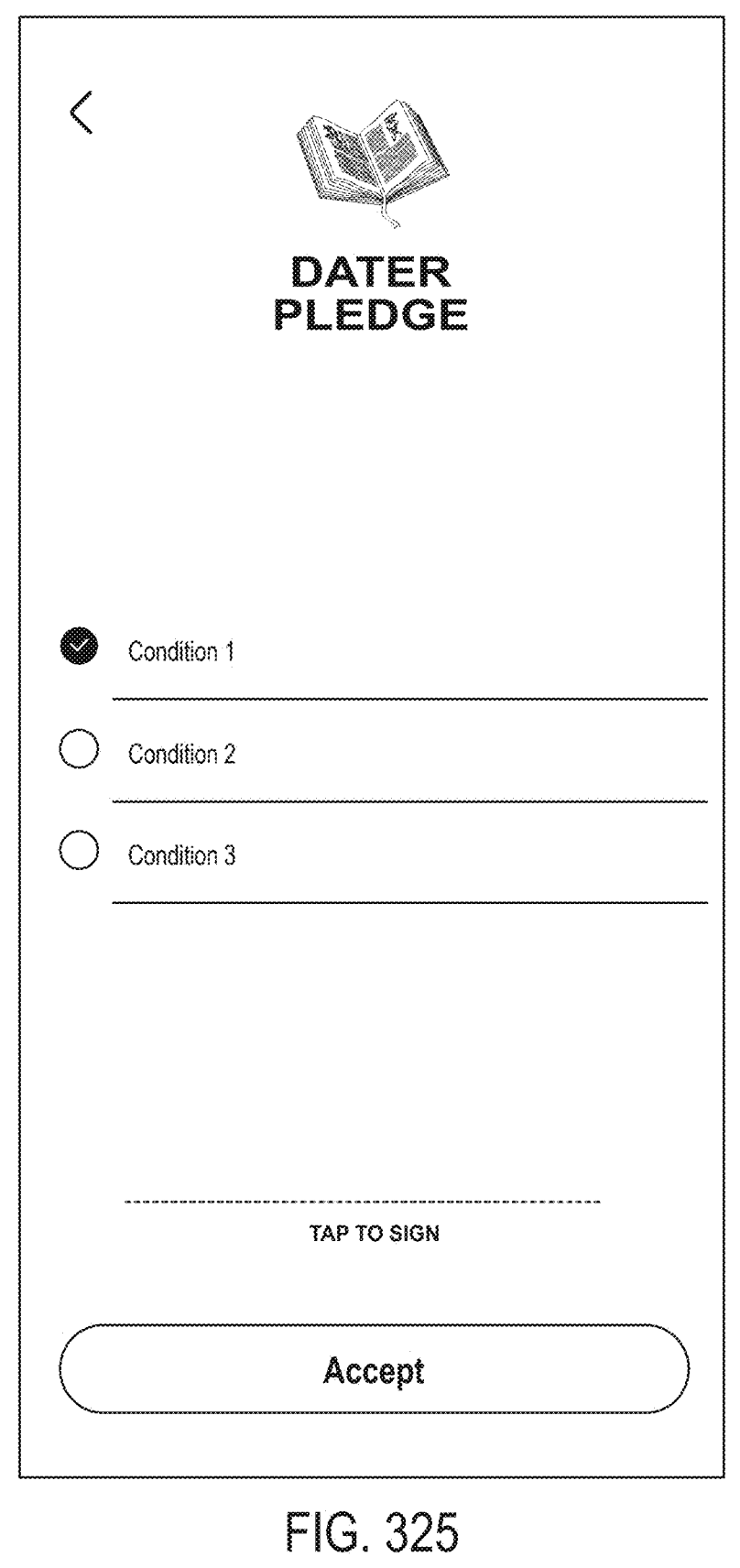

FIG. 325 shows a screen from the mobile application that depicts acceptance of terms and conditions. The terms and conditions screen may comprise at least one of: a sixth back option, a list of conditions, a fifth field, and an accept option. According to one embodiment, the user may select at least one condition in the list of conditions. In some embodiments, all conditions must be selected in order to create an account. The user may interact with the fifth field to apply a signature to the terms and conditions. In some embodiments, this may comprise the user drawing the signature within the fifth field. In other embodiments, this may comprise the user tapping the fifth field, generating the signature automatically. In yet other embodiments, this may comprise the user typing the signature on a virtual keyboard associated with the fifth field. In some cases, the accept option is only available once the user has provided the signature. In other cases, the accept option is only available once the user has provided the signature and selected the at least one condition in the list of conditions. In some embodiments, selection of the accept option may take the user to a feed screen (e.g., the screen of FIG. 327, the screen of FIG. 332, etc.). In other embodiments, the accept option may take the user to a profile associated with the user (e.g., the screen of FIG. 344). The user may return to the fourth user account information screen (e.g., the screen of FIG. 324) upon selection of the sixth back option. In some embodiments, the sixth back option comprises a back arrow.

Figure 326:
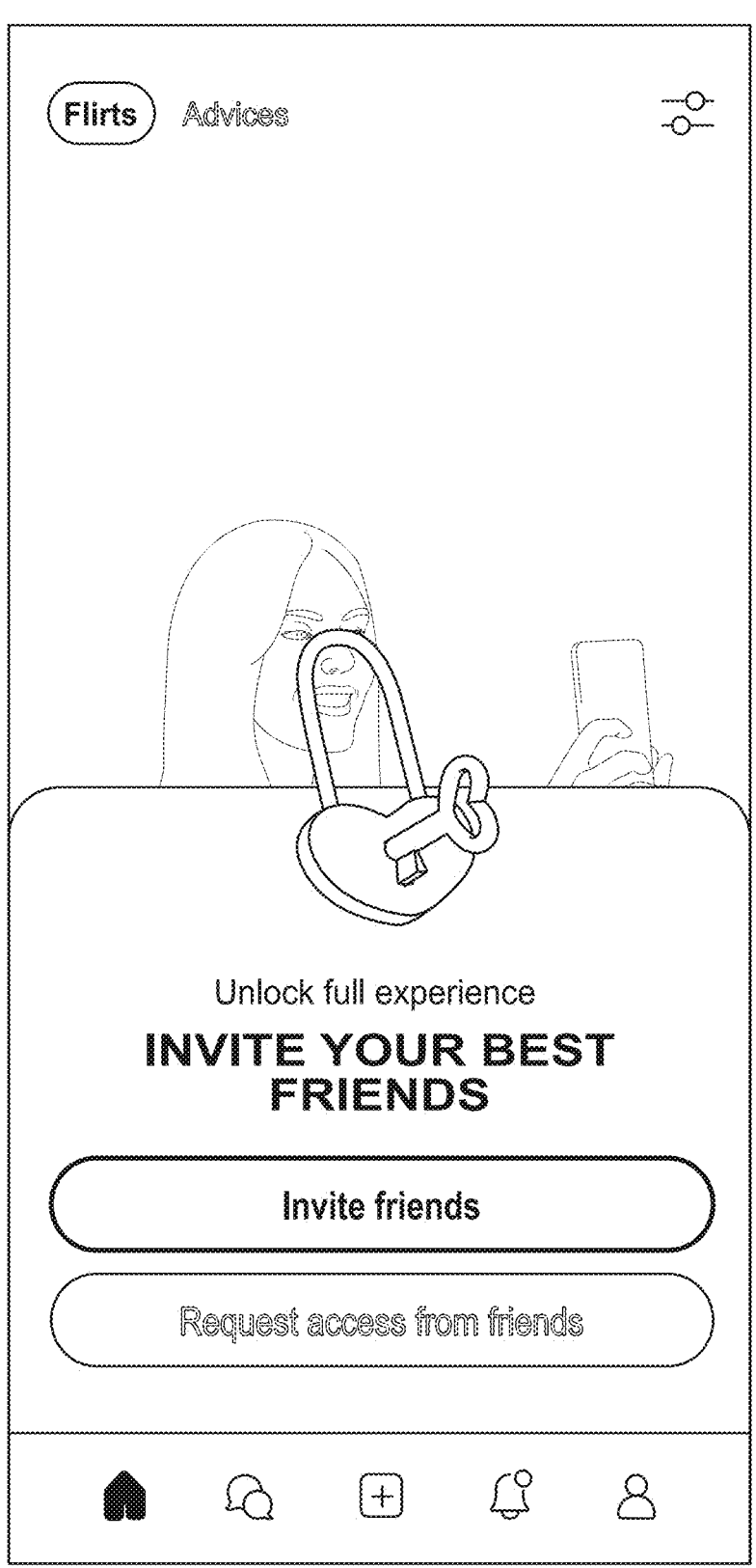

FIG. 326 shows a screen from the mobile application that depicts a popup to promote friends. The screen may include a menu bar comprising at least one of: a feed tab (i.e., a home tab), a messaging tab, a content creation tab, a notifications tab, and a profile tab. In one embodiment, selection of the feed tab may send the user to a feed screen (e.g., the screen of FIG. 327, the screen of FIG. 332, etc.). In another embodiment, selection of the messaging tab may send the user to a messaging screen (e.g., the screen of FIG. 335, the screen of FIG. 340, etc.). In yet another embodiment, selection of the content creation tab may send the user to a recording screen (e.g., the screen of FIG. 333, the screen of FIG. 334, etc.). In still another embodiment, selection of the notifications tab may send the user to a notifications screen (e.g., the screen of FIG. 345). In yet another embodiment, selection of the profile tab on the menu bar may send the user to a profile screen associated with the user (e.g., the screen of FIG. 344).

Turning back to FIG. 326, the user may select an option to "Invite friends" (e.g., an invite option) to use the mobile application. In some embodiments, the option to "Invite friends" may route to a messaging application on the user's device. Additionally or alternatively, the user may select an option to "Request access from friends" (e.g., a request option) to use the mobile application. In some embodiments, the option to "Request access from friends" may route to a messaging application on the user's device. In one embodiment, the user may dismiss the popup by swiping the popup away. In another embodiment, the user may dismiss the popup by tapping somewhere on the screen outside of the popup (i.e., above the popup). In yet another embodiment, the user may dismiss the popup by selecting at least one of the feed tab, the messaging tab, the content creation tab, the notifications tab, or the profile tab from the menu bar. In some cases, dismissing the popup may take the user to the feed screen (e.g., the screen of FIG. 327).

Figure 327:

FIG. 327 shows a screen from the mobile application that depicts the feed tab. The feed screen may include the menu bar (e.g., the menu bar in FIG. 326). The feed tab may comprise two additional tabs, a flirts tab (e.g., a first feed mode) and an advice tab (e.g., a second feed mode). In FIG. 327, the flirts tab is active. In some embodiments, the flirts tab may be associated with a user of the first account type. In other embodiments, the advice tab may be associated with a user of the second account type. The flirts tab may comprise at least one of a filter option, a post associated with a second user, at least one reply to the post associated with the second user, a replies option, a first share option, and a first reply option. In one embodiment, the filter option comprises: an age filter, a location filter, and a gender filter. In some embodiments, the feed tab is organized by user data. For example, in one embodiment, posts from friends of the user (i.e., users that the user is following) may appear first in the feed tab (i.e., friends are given priority). In another embodiment, posts from friends of the user's friends may appear first in the feed tab (i.e., friends of friends are given priority).

In some embodiments, the post associated with the second user may comprise a first message. In some embodiments, the first message may comprise at least one of: a first audio message or a first video message. According to one embodiment, the post associated with the second user further comprises a first transcription of the first message. Furthermore, the first transcription of the first message may change color (i.e., from grey to white), in real-time, as the first message plays (i.e., the color tracks the progression of the transcription). In one embodiment, the post associated with the second user begins playing automatically upon entering the flirts tab.

According to some embodiments, the at least one reply to the post associated with the second user may comprise a first reply and a second reply. In some cases, the first reply comprises a second message. According to one embodiment, the second message may comprise at least one of a second audio message or a second video message. In some embodiments, the first reply begins playing automatically (i.e., dynamically) upon completion of the first message. In some cases, the second reply comprises a third message. According to one embodiment, the third message may comprise at least one of a third audio message or a third video message. In other embodiments, the second reply begins playing automatically upon completion of the first reply. In some embodiments, the at least one reply to the post associated with the second user may comprise a least three replies.

In other embodiments, the at least one reply to the post associated with the second user may further comprise at least one of: first profile information, and first audience information. The first profile information, according to some embodiments, comprises at least one profile picture associated with the at least one reply to the post associated with the second user, or at least one video message associated with the at least one reply to the post associated with the second user. In one embodiment, the at least one video message may comprise at least one of the second video message, or the third video message.

In some embodiments, the first audience information may comprise at least one of: at least one first positive reaction associated with the at least one reply to the post associated with the second user, or at least one first negative reaction associated with the at least one reply to the post associated with the second user. According to some embodiments, the at least one reply to the post associated with the second user may be ordered based on the first audience information (i.e., a reply with more reactions (e.g., positive reactions, negative reactions, etc.) may appear and/or play before a reply with fewer reactions). Furthermore, in one embodiment, if the audience information results in a tie between a first post and a second post, the post created by the user with a higher user score may appear and/or play before the other post. In some embodiments, the user score comprises or is based on user activity.

In some embodiments, the second user may reply (i.e., send a video message, send an audio message, send a message, send a reaction, etc.) to the at least one reply to the post associated with the second user. Furthermore, when the second user replies to the at least one reply to the post associated with the second user, the second user matches with the user associated with the at least one reply to the post associated with the second user (i.e., the second user and the user associated with the at least one reply to the post associated with the second user generate a conversation in a dates tab within the messaging tab).

In one embodiment, the first share option may comprise at least one of: sharing via a messaging application on the user's device, sharing to a friend on the mobile application, or sharing to a team on the mobile application. In one embodiment, the user may add a comment (e.g., "Boys, what do you think?" in FIG. 341) when the user shares (i.e., selects the first share option) the post associated with the second user. In some embodiments, selecting the first share option may result in a second popup comprising the post associated with the second user. According to one embodiment, selection of the replies option may take the user to a replies page (e.g., the screen of FIG. 328). In some embodiments, selecting the first reply option may enable the user to record a response to the post associated with the second user. In other embodiments, selecting the first reply option may take the user to an audio recording screen (e.g., the screen of FIG. 333). In yet other embodiments, selecting the first reply option may take the user to a video recording screen (e.g., the screen of FIG. 334). According to one embodiment, replying to the post associated with the second user may generate a conversation in a replies tab within the messaging tab.

Figure 328:
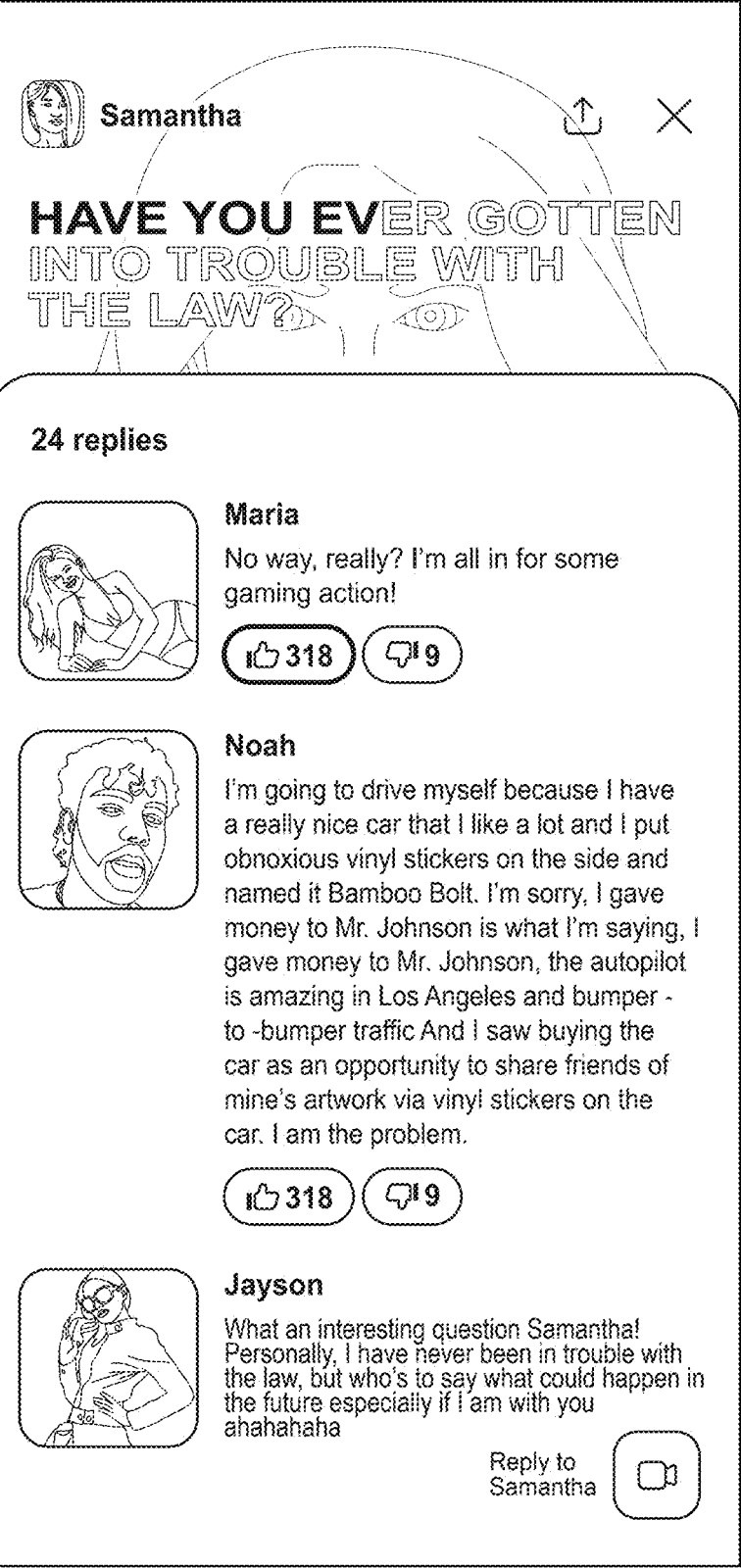

FIG. 328 shows a screen from the mobile application that depicts a replies page. The replies page may comprise at least one of: a first close option, the at least one reply to the post associated with the second user, second profile information associated with the at least one reply to the post associated with the second user, second audience information associated with the at least one reply to the post associated with the second user, and the first reply option. The first close option may return the user to the feed screen (e.g., the screen of FIG. 327). In some embodiments, the first close option comprises an "X." The second profile information associated with the at least one reply to the post associated with the second user, according to some embodiments, comprises at least one of: at least one profile picture associated with the at least one reply to the post associated with the second user, the at least one video message associated with the at least one reply to the post associated with the second user, and at least one first name associated with the at least one reply to the post associated with the second user.

In some embodiments, the second audience information associated with the at least one reply to the post associated with the second user may comprise at least one of: at least one second positive reaction associated with the at least one reply to the post associated with the second user, and at least one second negative reaction associated with the at least one reply to the post associated with the second user. In one embodiment, the second audience information comprises at least one option (i.e., button) for reactions (e.g., a positive reaction, a negative reaction, an image, a gif, an emoji, etc.). Furthermore, upon selection of the at least one option, the at least one option may change color (e.g., grey to blue) to indicate the selection.

Figure 329:

FIG. 329 shows a screen from the mobile application that depicts the flirts tab of the feed tab from FIG. 327 once the first message has played to completion. The feed screen may include the menu bar (e.g., the menu bar in FIG. 326). The first reply may automatically begin playing immediately or at a given time (i.e., three seconds) after completion of playing the first message. In some cases, profile information associated with the first reply may be emphasized (i.e., highlighted, enlarged, etc.). In other cases, audience information associated with the first reply may be emphasized (i.e., highlighted, enlarged, etc.). In one embodiment, a status (i.e., progress) of the first reply may be indicated via a status bar (i.e., a bar filling up according to progression of the first reply). In one embodiment, the user may select the first reply to view the first reply by itself on a full screen. According to some embodiments, the user may scroll vertically to a next post. In one such embodiment, the scroll may take the user to a user post in the feed screen (e.g., the screen of FIG. 330). In another such embodiment, the scroll may take the user to an out of posts screen (e.g., the screen of FIG. 331).

Figure 330:
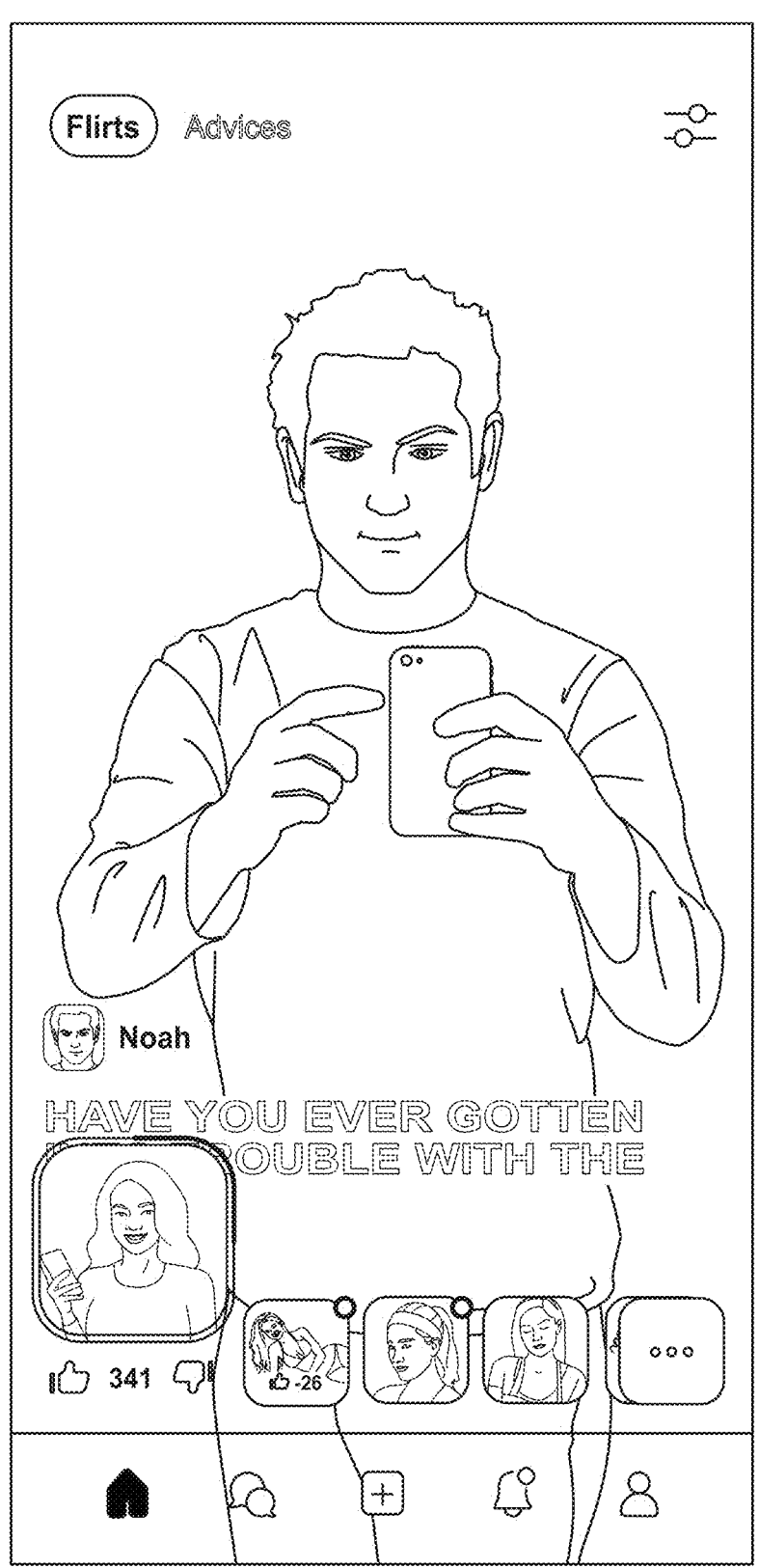

FIG. 330 shows a screen from the mobile application that depicts a post from the user in the flirts tab of the feed tab. The user post in the feed screen may include the menu bar (e.g., the menu bar in FIG. 326). In some embodiments, at least one post from the user may appear in the feed tab. In one embodiment, the at least one post from the user may appear in the feed tab when the at least one post receives a given number (i.e., three) of replies that have not been seen by the user. According to some embodiments, a third reply comprised in the replies may begin playing automatically. In one embodiment, the third reply comprised in the replies may further comprise at least one of: third profile information, and third audience information. The third profile information, according to some embodiments, comprises a profile picture associated with the third reply, or a fourth video message associated with the third reply. In some embodiments, the third audience information may comprise at least one of: at least one third positive reaction associated with the third reply, or at least one third negative reaction associated with the third reply. In some embodiments, the user may use digital exchangeables to boost the user post (i.e., cause the post to show up in the feed of other and/or more users).

In some cases, profile information associated with the third reply may be emphasized (i.e., highlighted, enlarged, etc.). In other cases, audience information associated with the third reply may be emphasized (i.e., highlighted, enlarged, etc.). In one embodiment, a status (i.e., progress) of the first third may be indicated via a status bar (i.e., a bar filling up according to progression of the third reply). According to some embodiments, the replies that have not been seen by the user may be emphasized in some way (i.e., marked with a dot, highlighted, etc.). In one embodiment, the user may select the third reply to view the third reply in a full screen mode. According to some embodiments, the user may scroll vertically to the next post. In one such embodiment, the scroll may take the user to a second new post in the feed screen (e.g., the screen of FIG. 327). In another such embodiment, the scroll may take the user to an out of posts screen (e.g., the screen of FIG. 331).

Figure 331:
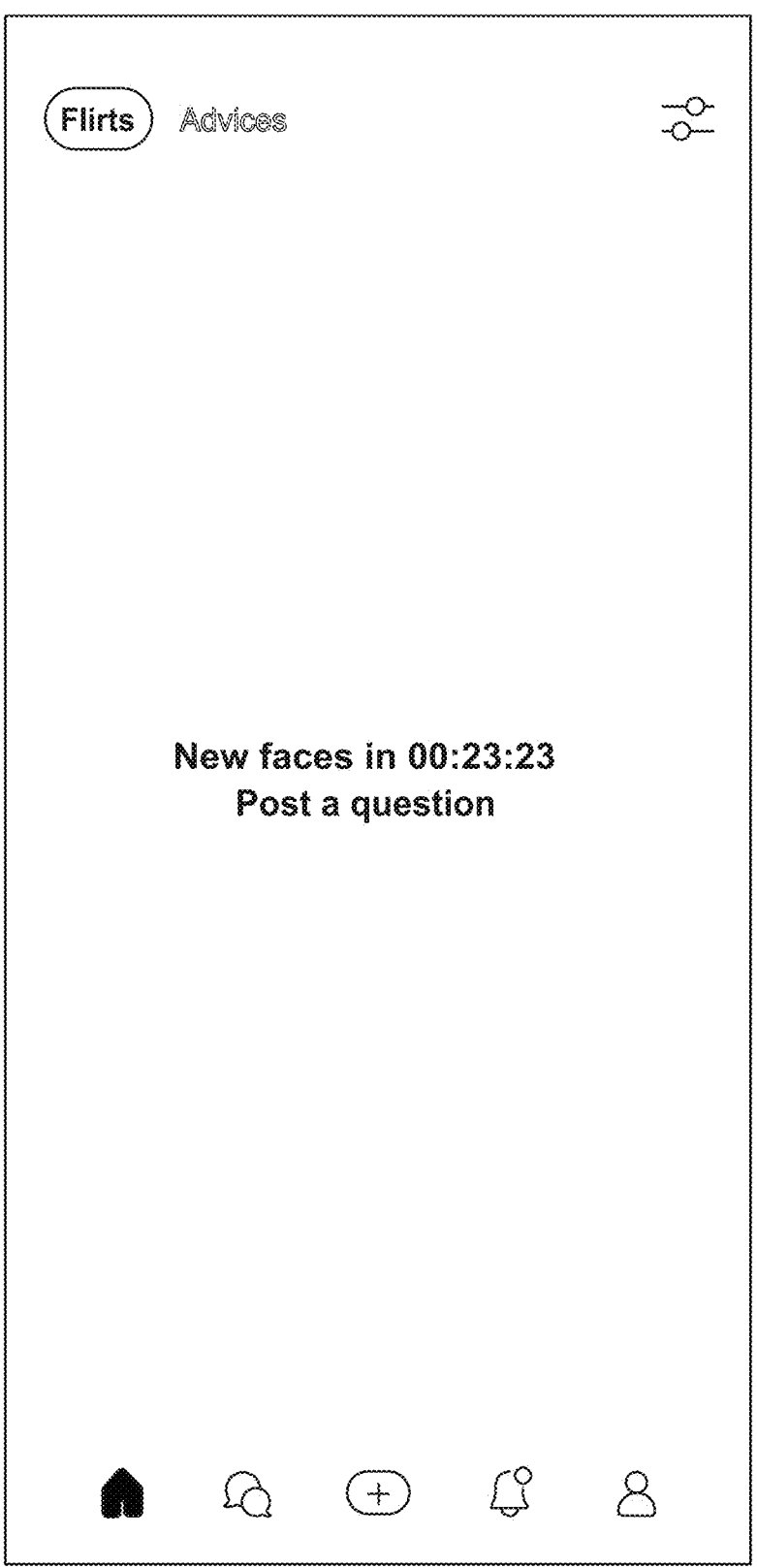

FIG. 331 shows a screen from the mobile application that depicts the flirts tab of the feed tab after running out of posts (e.g., viewing a threshold number of posts). The out of posts screen may include the menu bar (e.g., the menu bar in FIG. 326). In some embodiments, the user may have to wait a given amount of time (i.e., 30 minutes, 4 hours, etc.) to access new posts. In other embodiments, the user may use digital exchangeables to access new posts. In yet other embodiments, the user may be prompted to complete an activity to access new posts. According to one embodiment, the activity may comprise at least one of: the user creating a new post, the user inviting friends to the mobile application, etc. In some embodiments, the out of posts screen further comprises an option to complete the activity. Furthermore, selection of the option to complete the activity may take the user to a relevant screen associated with the activity. For example, if the activity comprises the user creating a new post, selection of the option to complete the activity may take the user to the content creation tab (e.g., the screen of FIG. 333, the screen of FIG. 334, etc.). In one embodiment, the user may select the advice tab. Furthermore, selecting the advice tab may take the user to the advice tab screen (e.g., the screen of FIG. 332).

Figure 332:
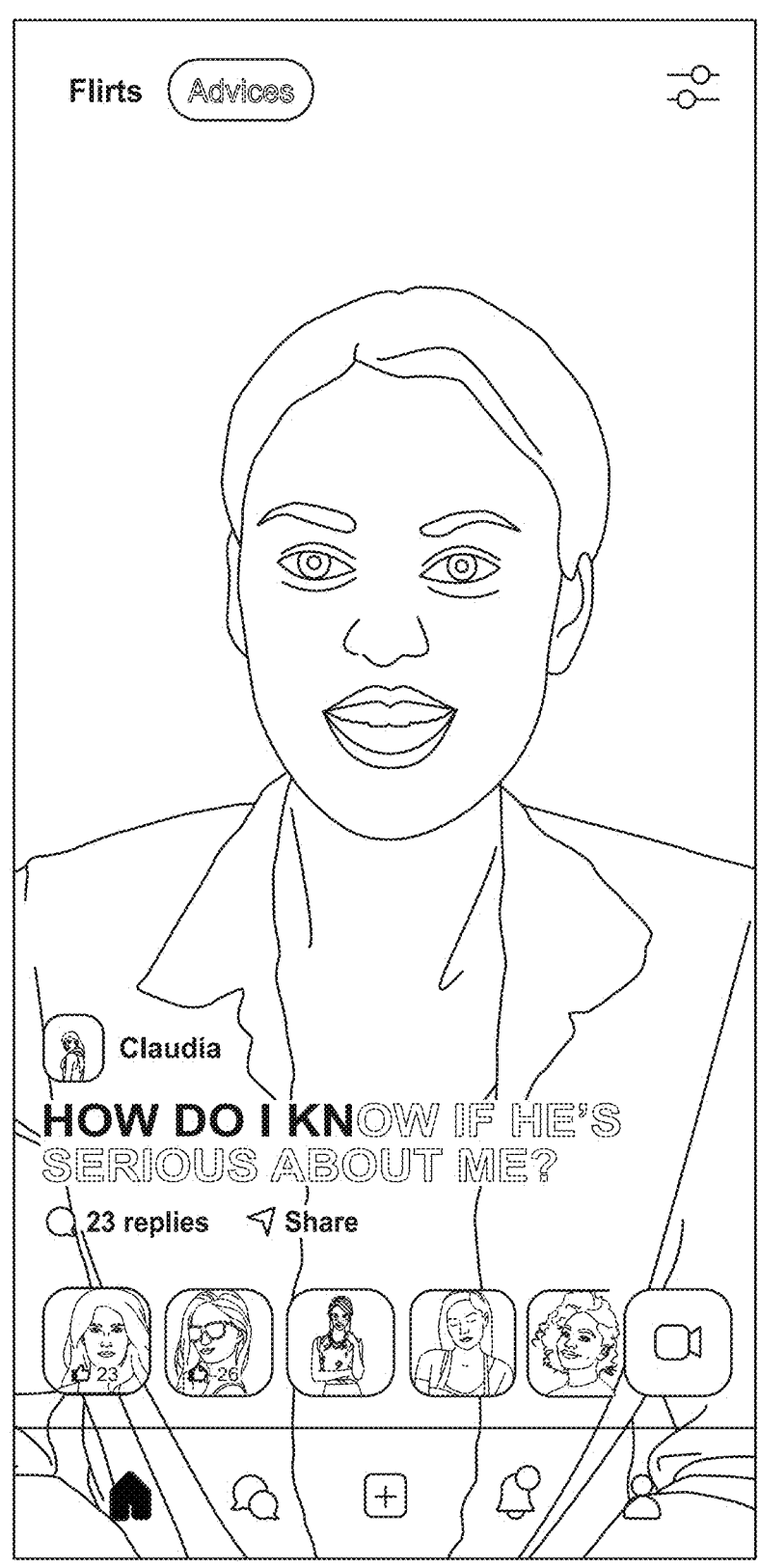

FIG. 332 shows a screen from the mobile application that depicts the advice tab of the feed tab. The advice tab screen may include the menu bar (e.g., the menu bar in FIG. 326). The advice tab may comprise at least one of the filter option, a post associated with a third user, at least one reply to the post associated with the third user, the replies option, the second share option, and a second reply option. According to some embodiments, the user may scroll vertically to a next post.

In some embodiments, the post associated with the third user may comprise a fourth message. In some embodiments, the fourth message may comprise at least one of: a fourth audio message or a fifth video message. According to one embodiment, the post associated with the third user further comprises a second transcription associated with the fourth message. Furthermore, the second transcription associated with the fourth message may change color (i.e., from grey to white) in real-time as the message plays (i.e., the color follows the progression of the transcription as it plays). In one embodiment, the post associated with the third user begins playing automatically upon entering the advice tab.

According to some embodiments, the at least one reply to the post associated with the third user may comprise a fourth reply and a fifth reply. In some cases, the fourth reply comprises a fifth message. According to one embodiment, the fifth message may comprise at least one of a fifth audio message or a sixth video message. In some embodiments, the fourth reply begins playing automatically upon completion of the fourth message. In other cases, the fifth reply comprises a sixth message. According to one embodiment, the sixth message may comprise at least one of a sixth audio message or a seventh video message. In other embodiments, the fifth reply begins playing automatically upon completion of the fourth reply. In some embodiments, the at least one reply to the post associated with the third user may comprise a least three replies.

In other embodiments, the at least one reply to the post associated with the third user may further comprise at least one of: fourth profile information, and fourth audience information. The fourth profile information, according to some embodiments, comprises at least one profile picture associated with the at least one reply to the post associated with the third user, or at least one video message associated with the at least one reply to the post associated with the third user. In one embodiment, the at least one video message may comprise at least one of the sixth video message, or the seventh video message. In some embodiments, the fourth audience information may comprise at least one of: at least one fourth positive reaction associated with the at least one reply to the post associated with the third user, or at least one fourth negative reaction associated with the at least one reply to the post associated with the third user.

In one embodiment, the second share option may comprise at least one of: sharing via a messaging application on the user's device, sharing to a friend on the mobile application, or sharing to a team on the mobile application. In some embodiments, the user may add a comment (e.g., "Boys, what do you think?" in FIG. 341) when the user shares (i.e., selects the second share option) the post associated with the third user. According to some embodiments, selecting the second share option may result in a third popup comprising the post associated with the third user.

In some embodiments, selecting the second reply option may enable the user to record a response to the post associated with the third user. In other embodiments, selecting the second reply option may take the user to the audio recording screen (e.g., the screen of FIG. 333). In yet other embodiments, selecting the second reply option may take the user to the video recording screen, (e.g., the screen of FIG. 334). In still other embodiments, selecting the second reply option may take the user to the content creation tab of the menu bar.

Figure 333:
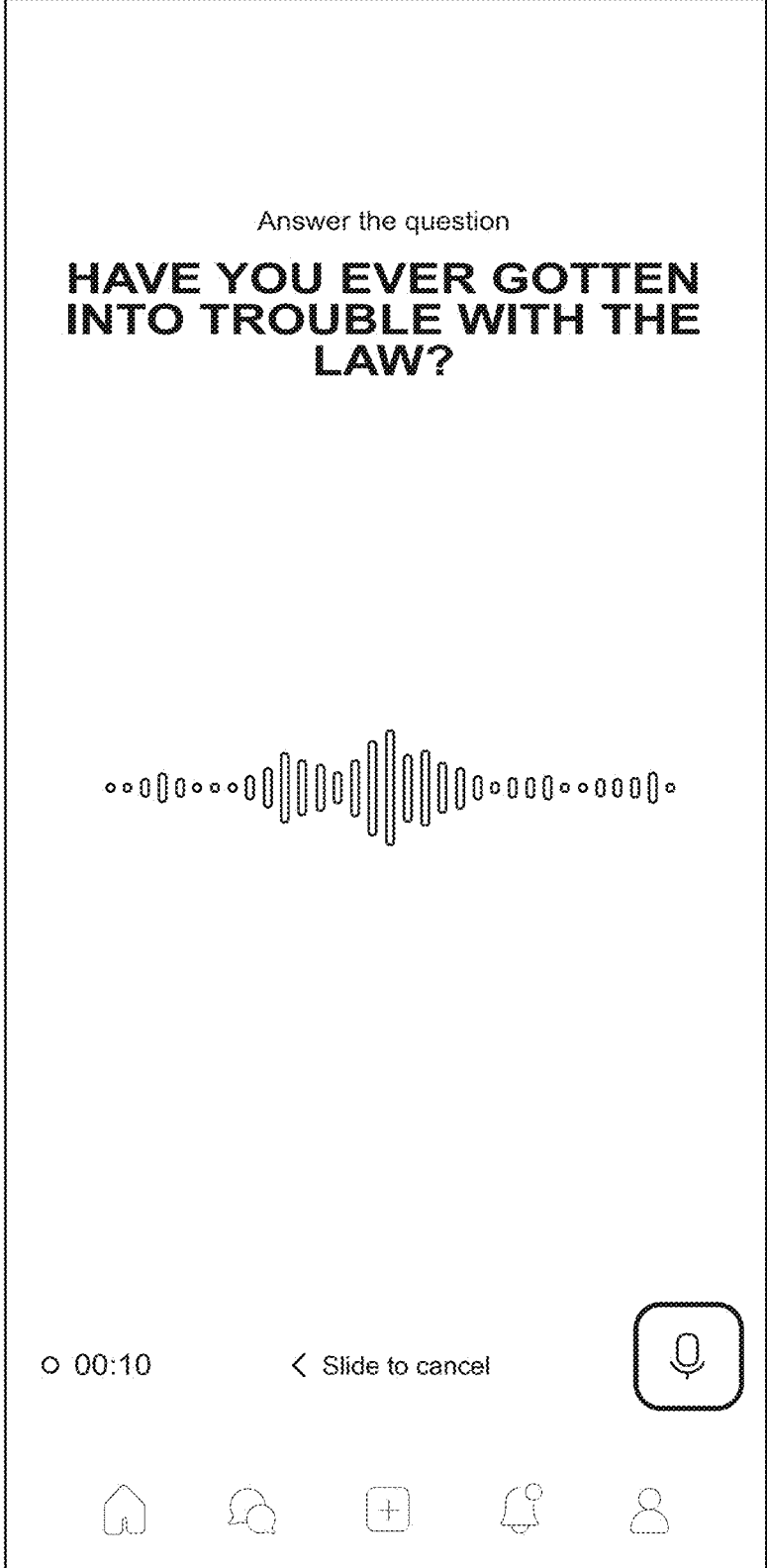

FIG. 333 shows a screen from the mobile application that depicts recording an audio message (i.e., the first audio message, the fifth audio message, etc.). An audio recording may comprise: a message (i.e., the first message, the fourth message, etc.) to which the user is responding, an audio gauge, a recording time, a suggestion prompt, a cancel option, and a recording option. In some embodiments, the audio gauge comprises a graph of the sound as the user is recording. In other embodiments, the recording time is limited to at least one of: a minimum recording time (i.e., 2 seconds, 5 seconds, etc.) and a maximum recording time (i.e., 2 minutes, 5 minutes, etc.).

According to some embodiments, the suggestion prompt may comprise an idea, a suggestion, a commonly asked question, etc. Furthermore, the suggestion prompt may, in some embodiments, be comprised in a fourth popup. In one embodiment, to begin the audio recording, the user may hold down the recording option. In another embodiment, the user may tap the recording option to begin the audio recording. In yet another embodiment, the user may tap the recording option to switch to recording a video message (i.e., the screen of FIG. 334). The cancel option may, in some embodiments, return the user to the feed tab (e.g., the screen of FIG. 332, the screen of FIG. 327, the screen of FIG. 329, etc.). In some embodiments, the cancel option comprises swiping horizontally across the screen.

Figure 334:

FIG. 334 shows a screen from the mobile application that depicts recording the video message (i.e., the third video message, the fifth video message, etc.). A video recording may comprise: the message (i.e., the first message, the fourth message, etc.) to which the user is responding, a video, the suggestion prompt, the recording time, the cancel option, and the recording option. In some embodiments, the video comprises a real-time, live view of the user as the user is recording. In one embodiment, the user may hold the recording option to begin the video recording. In another embodiment, the user may tap the recording option to begin the video recording. In yet another embodiment, the user may tap the recording option to switch to recording the audio message (i.e., the screen of FIG. 333).

Figure 335:
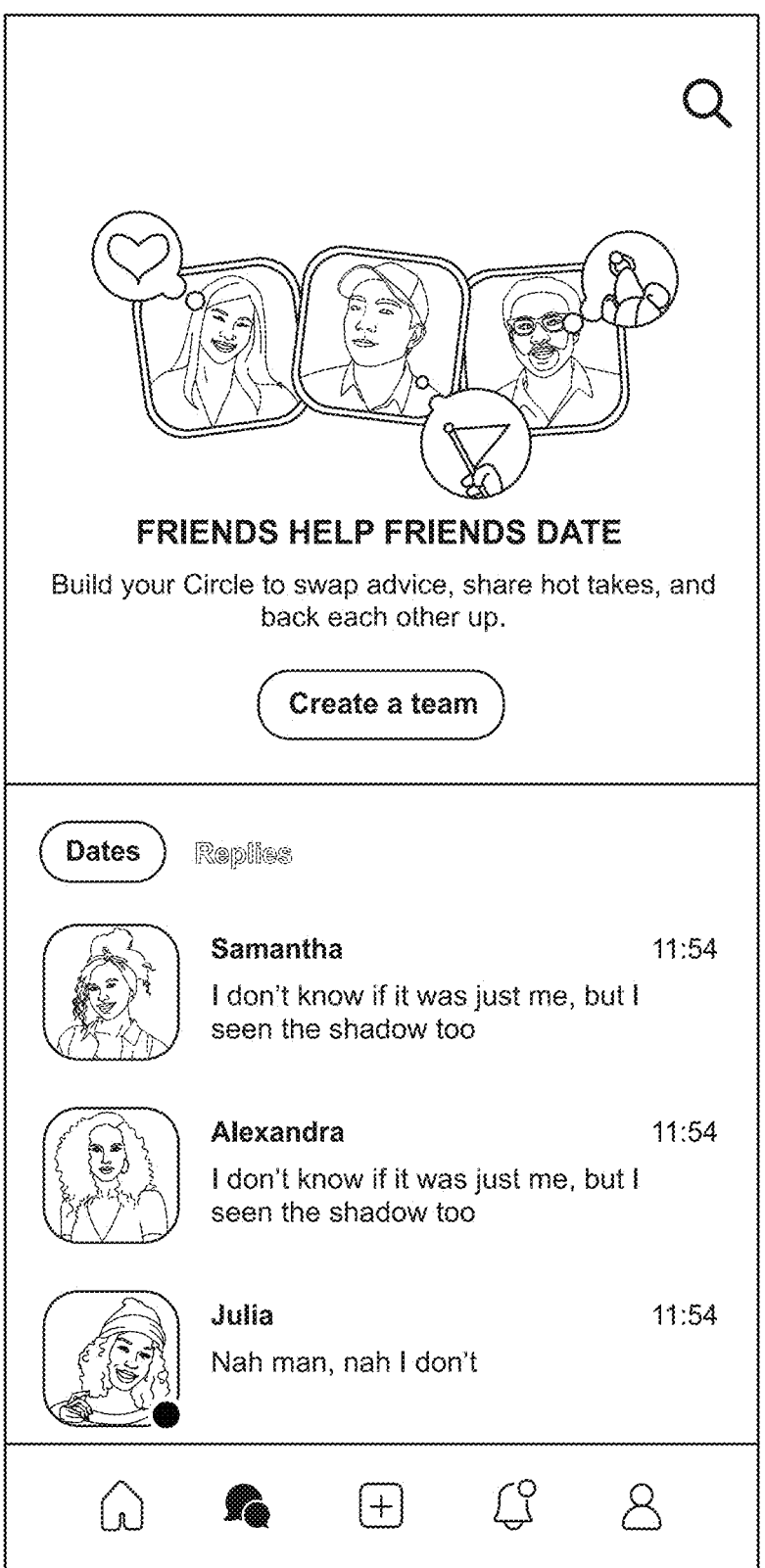

FIG. 335 shows a screen from the mobile application that depicts the messaging tab. The messaging screen may include the menu bar (e.g., the menu bar in FIG. 326). The messaging tab may comprise at least one of: a search option, an option to create a team, the dates tab (e.g., a first message mode), and the replies tab (e.g., a second message mode). In FIG. 335, the dates tab is active. In one embodiment, the search option may comprise a magnifying glass icon. In some embodiments, the user may use a virtual keyboard to input search criteria upon selection of the search option. In some embodiments, the search criteria may yield results from at least one of: conversations in the dates tab, conversations in the replies tab, and conversations in a team.

The dates tab may further comprise at least one conversation. The at least one conversation may comprise: at least one user associated with the at least one conversation, at least one last activity in the conversation, and at least one time associated with the at least one last activity in the conversation. According to some embodiments, the user may scroll vertically on the dates tab to view the at least one conversation. In some embodiments, the user may select a first conversation from the at least one conversation to see more information associated with the first conversation. In some embodiments, selecting the first conversation may take the user to a date conversation screen (e.g., the screen of FIG. 336). In some embodiments, the at least one conversation may be used interchangeably with (i.e., means the same as) at least one date, and/or at least one match.

The replies tab may further comprise at least one reply. The at least one reply may comprise: at least one user associated with the at least one reply, at least one last activity in the reply, and at least one time associated with the at least one last activity in the reply. According to some embodiments, the user may scroll vertically on the replies tab to view the at least one reply. In some embodiments, the user may select a first reply from the at least one reply to see more information associated with the first reply. In some embodiments, selecting the first reply may take the user to a reply screen (e.g., a screen similar to that of FIG. 336). In some embodiments, the at least one reply may turn into a conversation if the user to which the reply was sent chooses to reply (i.e., sends a video message, sends an audio message, sends a message, sends a reaction, etc.). Furthermore, the conversation would, in some embodiments, be relocated to the dates tab.

Figure 336:
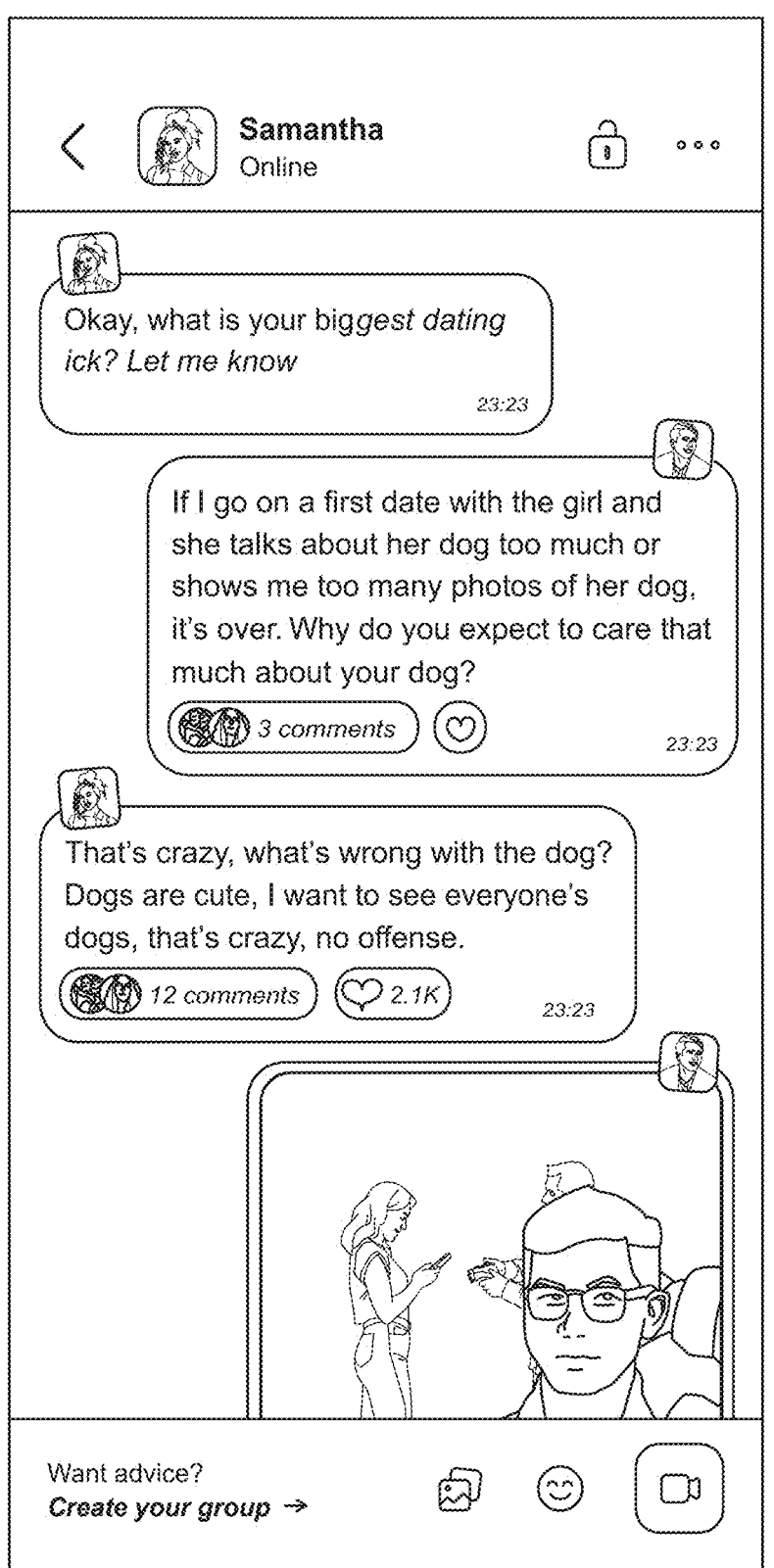

FIG. 336 shows a screen from the mobile application that depicts a date conversation associated with the user. The date conversation associated with the user may comprise: a seventh back option, a fourth user associated with the date conversation associated with the user, a status of the fourth user, a status of the date conversation associated with the user, conversation data associated with the date conversation associated with the user, a first settings option, an advice option, a fifth field, a media option, an emoticon option, and a third reply option. According to some embodiments, the seventh back option may, upon selection, return the user to the messaging screen (e.g., the screen of FIG. 335). In some embodiments, the seventh back option comprises a back arrow. In one embodiment, the status of the fourth user comprises an indication of whether the fourth user is currently on the mobile application. In some embodiments, the status of the date conversation associated with the user may comprise private or public. The first settings option, according to one embodiment, comprises date conversation settings (e.g., the status of the date conversation, a block option, a remove option, etc.). In some cases, user may edit the date conversation settings upon selection of the first settings option.

In some embodiments, the conversation data associated with the date conversation associated with the user may comprise at least one of: text, a ninth message, an image, a gif, an emoticon, an emoji, an eighth video message, a seventh audio message, a profile picture associated with the user, a profile picture associated with the fourth user, a first reaction (i.e., positive, negative, an image, an emoji, etc.), a reply, and a time stamp. According to some embodiments, the user may scroll vertically on the date conversation associated with the user to view the conversation data associated with the date conversation associated with the user.

Figure 337:
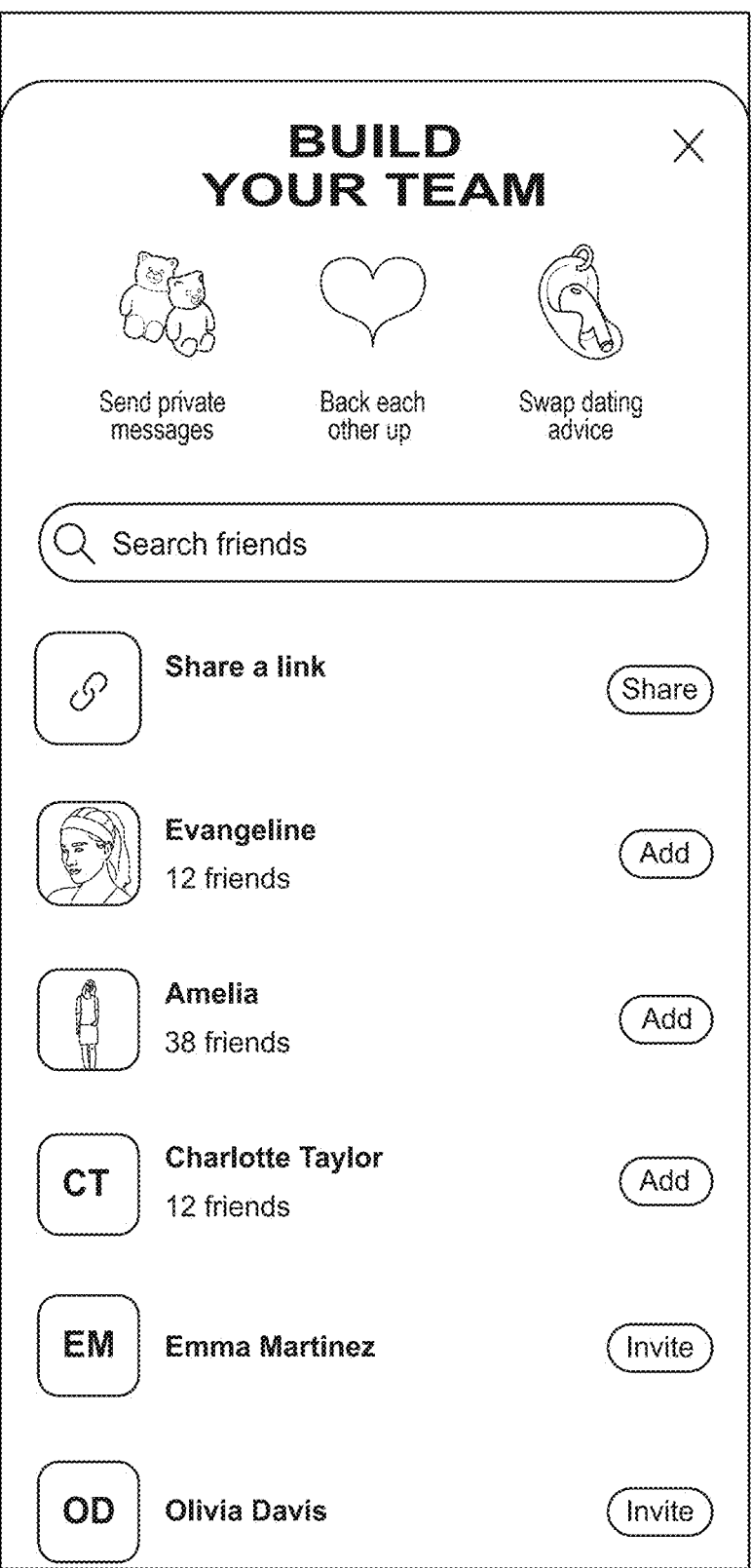

In one embodiment, selection of the advice option may take the user to a first building a team screen (e.g., the screen of FIG. 337). Selection of the advice option, according to another embodiment, allows the user to share the date conversation with a team (i.e., a previously created team) for the user. In one embodiment, the user may add a comment when the user shares the date conversation associated with the user with the team for the user (e.g., "Boys, what do you think?" in FIG. 341). In some embodiments, the fourth user cannot see the comment and/or the team and/or the team conversation.

According to some embodiments, the user may select a first comment option associated with a seventh message from the conversation data associated with the date conversation associated with the user. Selection of the first comment option associated with the seventh message, according to another embodiment, allows the user to share the seventh message with a team (i.e., a previously created team) for the user. In one embodiment, the user may add a comment when the user shares the seventh message with the team for the user (e.g., "Boys, what do you think?" in FIG. 341).

In some embodiments, the user may use a virtual keyboard to input a text message to be sent in the date conversation associated with the user upon selection of the fifth field. In other embodiments, the media option enables the user to send at least one of: a photo, a video, a gif, etc. to the fourth user. In one embodiment, the emoticon option enables the user to send at least one of: an emoticon, an emoji, etc. to the fourth user. According to some embodiments, a private date conversation may not be shared with a team. In one embodiment, the user may use digital exchangeables to set and/or change the status of the date conversation associated with the user. In some embodiments, selecting the third reply option may enable the user to record an audio or video message to be sent in the date conversation associated with the user. In other embodiments, selecting the third reply option may take the user to the audio recording screen (e.g., the screen of FIG. 333). In yet other embodiments, selecting the third reply option may take the user to the video recording screen (e.g., the screen of FIG. 334). In still other embodiments, selecting the third reply option may take the user to the content creation tab of the menu bar.

FIG. 337 shows a screen from the mobile application that depicts first building a team. The first building the team screen may comprise at least one of: a second close option, a search field, a link, and a list of suggestions. In one embodiment, the search field may comprise a magnifying glass icon. In some embodiments, the user may use a virtual keyboard to input second search criteria upon selection of the search field. In some embodiments, the second search criteria may yield results from at least one of: friends with an account on the mobile application, contacts without an account on the mobile application, or friends of the friends with the account on the mobile application.

In some embodiments, the list of suggestions may comprise at least one of: at least one friend with an account on the mobile application, at least one contact without an account on the mobile application and at least one friend of the at least one friend with the account on the mobile application. In one embodiment, the user may select an add option to add the friend with the account on the mobile application to the team. In another embodiment, the user may select an invite option to add the contact without the account on the mobile application to the team. In yet another embodiment, the user may select a third share option to send the link via an external messaging application on the user's device. In some embodiments, selection of at least one of: the add option, the invite option, and the third share option, may take the user to a second building a team screen (e.g., the screen of FIG. 338). According to one embodiment, the second close option may, upon selection, return the user to the date conversation associated with the user screen (e.g., the screen of FIG. 336). In another embodiment, selection of the second close option may take the user to the messaging tab (i.e., the screen of FIG. 335). In some embodiments, the second close option comprises an "X."

Figure 338:
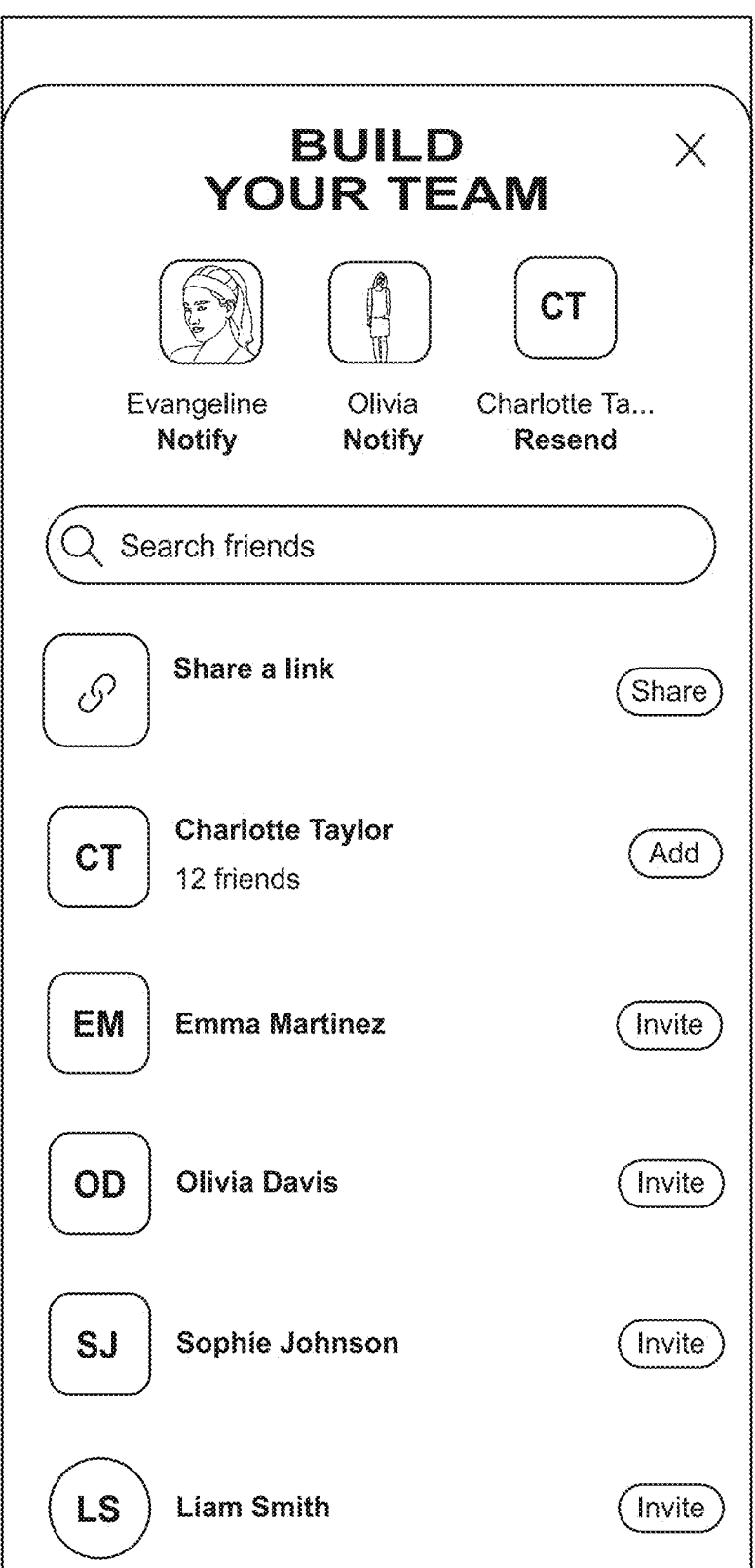

FIG. 338 shows a screen from the mobile application that depicts second building the team. The second building the team screen may comprise at least one of: the second close option, a list of selected members, the search field, the link, the list of suggestions, and a sixth continue option. According to one embodiments, the list of selected members may comprise at least one of: the friends with the account on the mobile application, the contacts without the account on the mobile application, or the friends of the friends with the account on the mobile application. In one embodiment, the list of selected members may further comprise at least one of: a notify option and a resend option. Furthermore, the notify option may send a notification to a member of the list of selected members. According to another embodiment, the resend option may send a second notification to the member of the list of selected member. In some embodiments, at least one of: the notification and the second notification may appear on the notifications tab on the menu bar (e.g., on the screen of FIG. 345). In some embodiments, the sixth continue option may take the user to a third building a team screen (e.g., the screen of FIG. 339).

Figure 339:
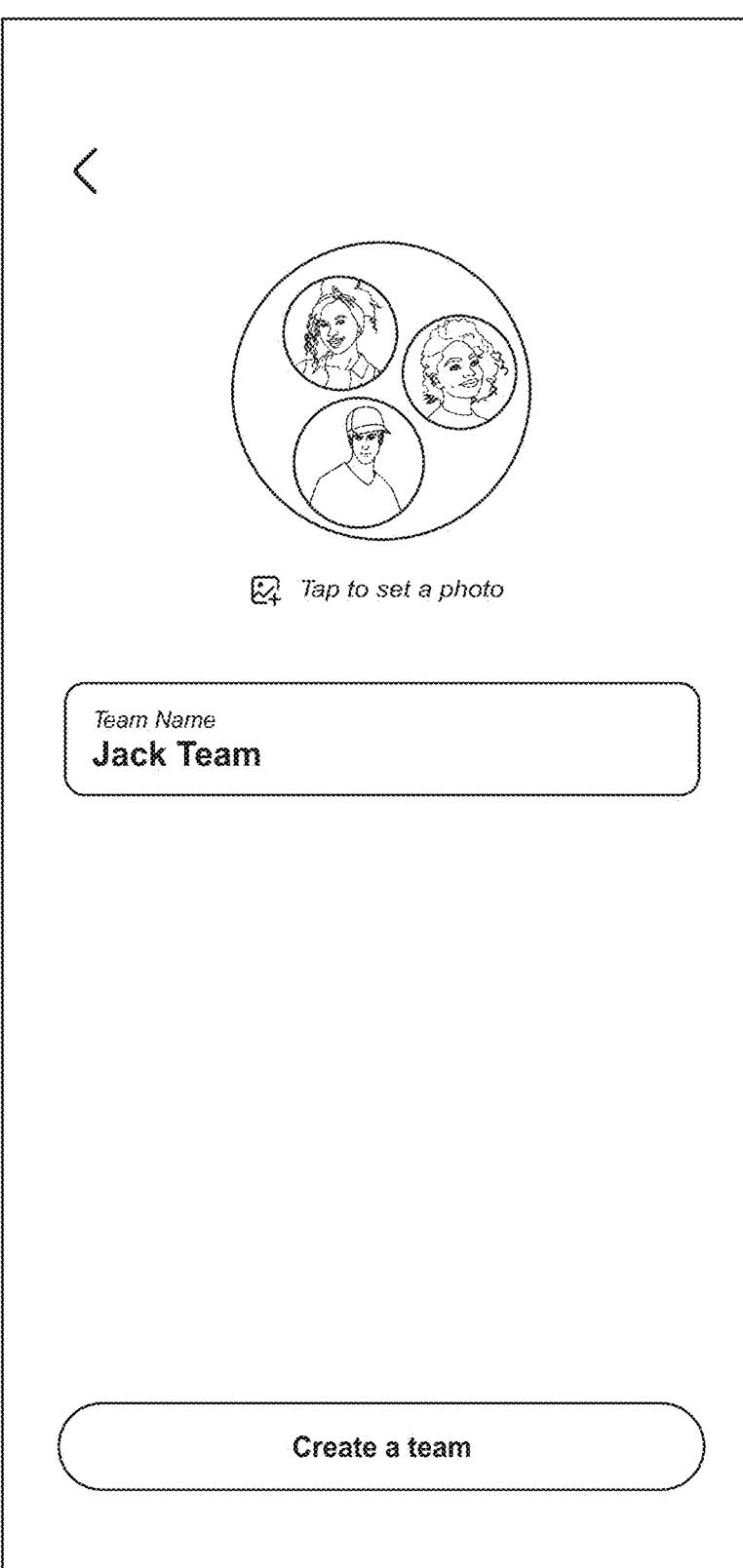

FIG. 339 shows a screen from the mobile application that depicts third building the team. The third building the team screen may comprise at least one of: an eighth back option, a photo option, a team name field, and a create team option. The user may return to the second building the team screen (e.g., the screen of FIG. 338) upon selection of the eighth back option. In some embodiments, the eighth back option comprises a back arrow. In one embodiment, upon selection of the photo option, the user may route to a photo application on the user's device. According to some embodiments, the user may use a virtual keyboard to input a team name upon selection of the team name field. The user may create the team upon selection of the create team option. In some embodiments, the user must have completed the team name field in order to select the create team option. In some embodiments, the create team option may take the user to the messaging tab (e.g., the screen of FIG. 340, the screen of FIG. 335, etc.).

Figure 340:

FIG. 340 shows a screen from the mobile application that depicts the messaging tab of FIG. 335 after at least two teams have been created and/or joined. The screen may include the menu bar (e.g., the menu bar in FIG. 326). The messaging tab, in some embodiments, may comprise at least one of: the search option, the option to create the team, at least one team, the dates tab, and the replies tab. In one embodiment, the option to create the team may comprise an addition sign. In some embodiments, the user may scroll horizontally to view the at least one team.

A first team from the at least one team may comprise at least one of: at least one user associated with the first team, a last activity in a first team conversation, a notification icon, and at least one photo associated with the first team. In some embodiments, the at least one photo associated with the first team may comprise a team photo selected upon creation of the team (i.e., the user selected the photo option in FIG. 339). In other embodiments, the at least one photo associated with the first team may comprise at least one profile picture corresponding with the at least one user associated with the first team. According to some embodiments, the user may select the first team from the at least one team to see more information associated with a first team conversation. In some embodiments, selecting the first team (e.g., "My Team" in FIG. 340, "Alex Team" in FIG. 340, etc.) may take the user to a team conversation screen (e.g., the screen of FIG. 341). In some embodiments, the first team is a team for the user. In other embodiments, the first team is a team for a given user from the at least one user associated with the first team. Furthermore, in one embodiment, the first team (i.e., the at least one user associated with the first team) may view all interactions the user has on the mobile application (i.e., all dates associated with the user, all replies associated with the user, all posts associated with the user, all date conversations associated with the user, etc.).

Figure 341:
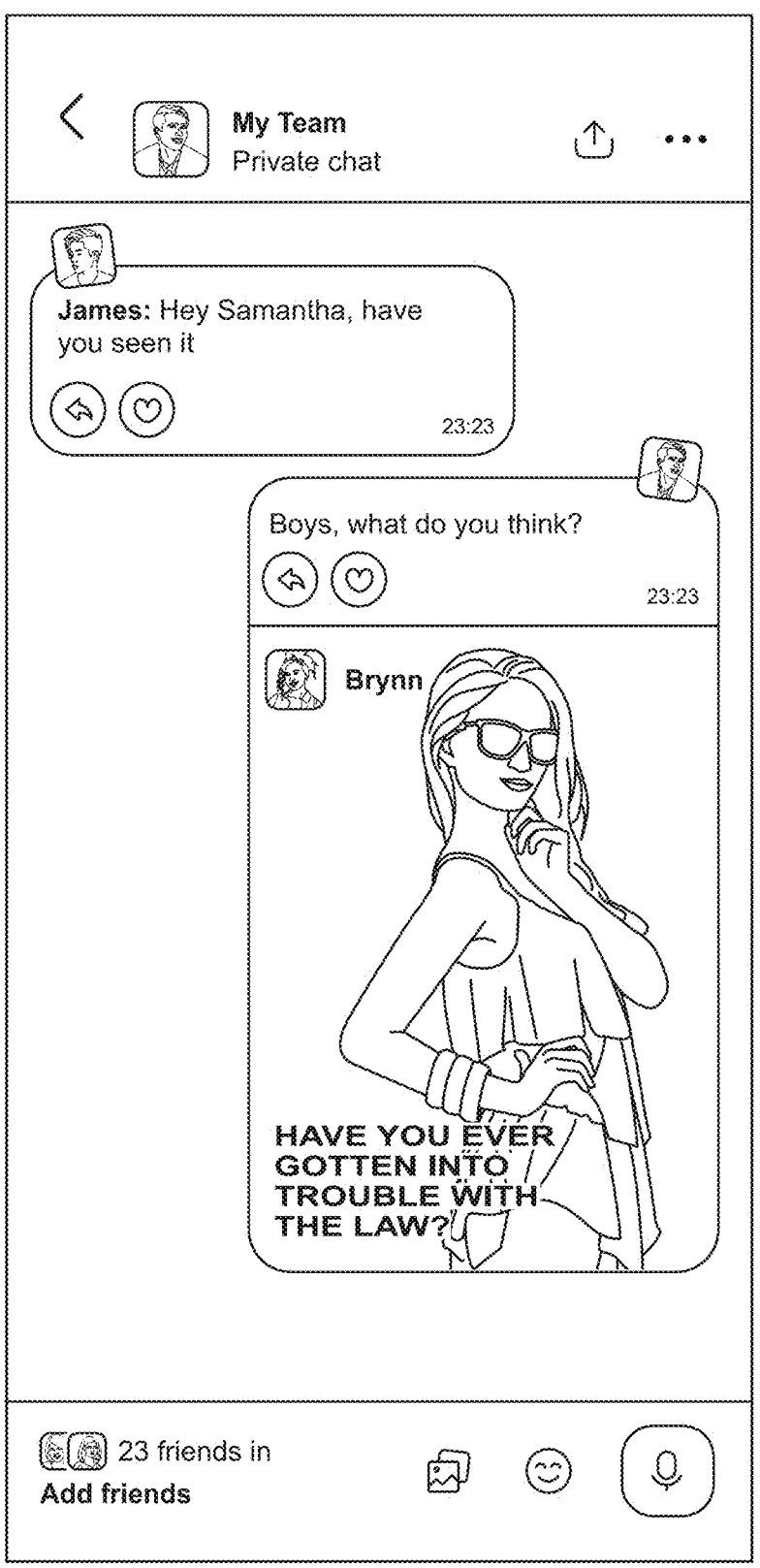

FIG. 341 shows a screen from the mobile application that depicts a team conversation within a team (e.g., the first team) for the user. The team conversation may comprise at least one of: a ninth back option, the team name, a status of the team conversation, a second settings option, conversation data associated with the team conversation, an add friends option, a sixth field, the media option, the emoticon option, and a fourth reply option. According to some embodiments, the ninth back option may return the user to the messaging tab (e.g., the screen of FIG. 335, the screen of FIG. 340, etc.) upon selection. In some embodiments, the ninth back option comprises a back arrow. The second settings option, according to one embodiment, comprises team conversation settings (e.g., the status of the team conversation, a remove user option, an add user option, etc.). In some cases, user may edit the team conversation settings upon selection of the second settings option.

In some embodiments, the status of the team conversation may comprise private or public. In some cases, if the status of the team conversation comprises public, a fifth user not in the team conversation may be able to access the team conversation. In one embodiment, the fifth user not in the team conversation may use digital exchangeables to access the team conversation. The add friends option, in some embodiments, may allow the user to add friends on the mobile application and/or contacts not on the mobile application and/or friends of the friends on the mobile application to the team and/or the team conversation. In some embodiments, the add friends option takes the user to a building the team screen (e.g., the screen of FIG. 337, the screen of FIG. 338, etc.). In some embodiments, the user may use a virtual keyboard to input a second text message to be sent in the team conversation upon selection of the sixth field. In some embodiments, a date conversation or a user may be associated with one or more team conversations. In some embodiments, a team conversation or a user may be associated with one or more date conversations.

In other embodiments, the conversation data associated with the team conversation comprises data (e.g., messages, media, emoticons, texts, etc.) sent in the team conversation. According to some embodiments, the user may scroll vertically on the team conversation to view the conversation data associated with the team conversation. According to some embodiments, the user may select a second comment option and/or a first react option associated with a tenth message from the conversation data associated with the team conversation. Selection of the second comment option associated with the tenth message, according to one embodiment, allows the user to add a comment to the tenth message in the team conversation. In another embodiment, selection of the first react option associated with the tenth message allows the user to add a second reaction to the tenth message in the team conversation.

In some embodiments, selecting the fourth reply option may enable the user to record a second audio or video message to be sent in the team conversation. In other embodiments, selecting the fourth reply option may take the user to the audio recording screen (e.g., the screen of FIG.

333). In yet other embodiments, selecting the fourth reply option may take the user to the video recording screen (e.g., the screen of FIG. 334). In one embodiment, the user may use or transmit digital exchangeables to at least one of: delete or disable the team conversation, delete a user from the team conversation, disable a user (e.g., from a team conversation) from accessing or viewing the date conversation, etc.

Figure 342:
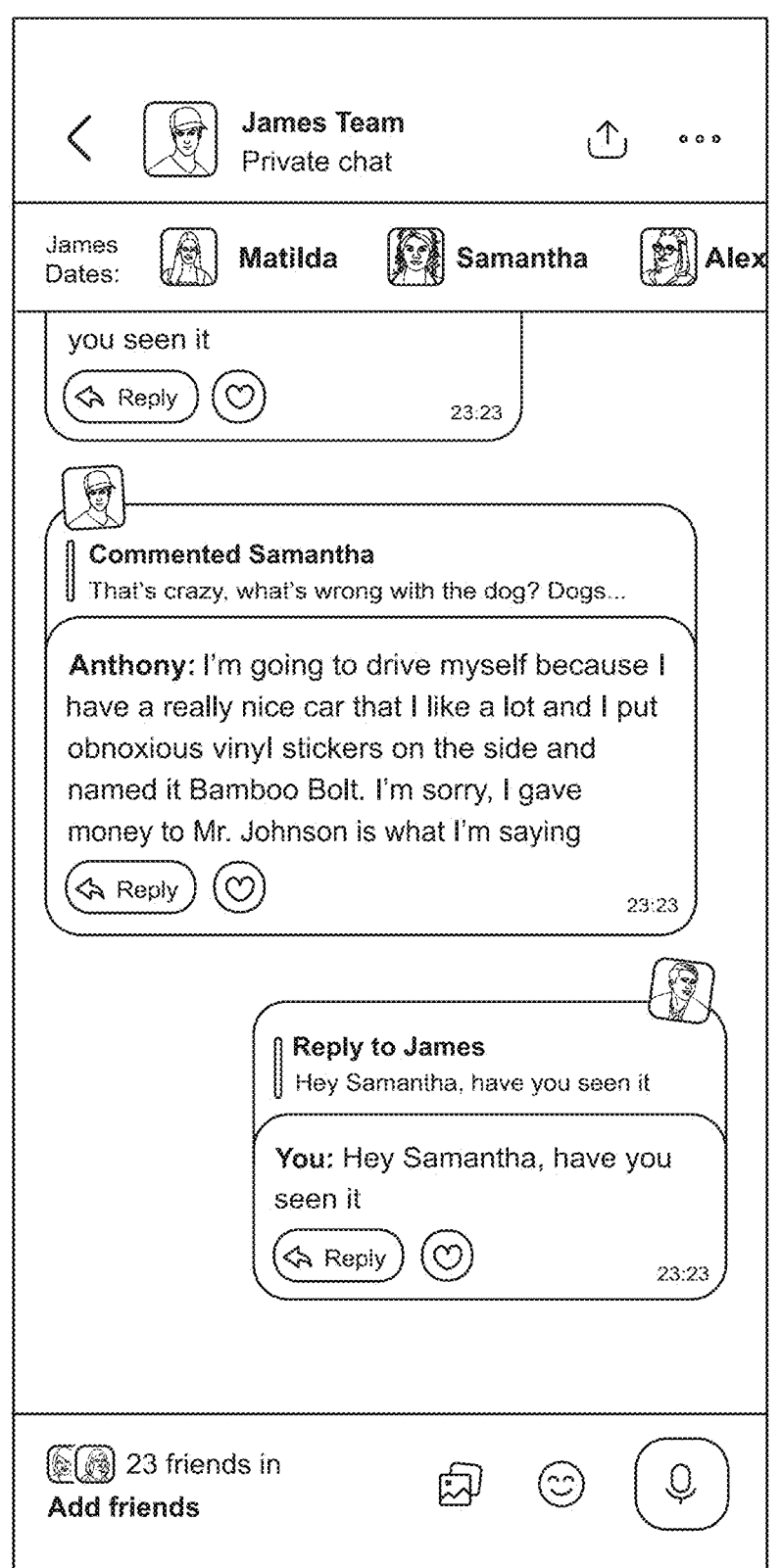

FIG. 342 shows a screen from the mobile application that depicts a team conversation within a team for a sixth user. The team conversation may comprise at least one of: a tenth back option, the team name, the status of the second team conversation, the second settings option, a dates bar, the conversation data associated with the team conversation, the sixth field, the media option, the emoticon option, and the fourth reply option. According to some embodiments, the tenth back option may, upon selection, return the user to the messaging tab (e.g., the screen of FIG. 340, the screen of FIG. 335, etc.). In some embodiments, the tenth back option comprises a back arrow. In one embodiment, the user may have an option to share any and/or all interactions the user has on the mobile application (i.e., all dates associated with the user, all replies associated with the user, all posts associated with the user, all date conversations associated with the user, etc.) in the team for the sixth user.

In some embodiments, the dates bar comprises a list of users that the sixth user is currently conversing with in the dates tab. In one embodiment, a seventh user from the list of users that the sixth user is currently conversing with may comprise: a first name associated with the seventh user and a profile photo associated with the seventh user. According to some embodiments, the user may select the seventh user from the list of users that the sixth user is currently conversing with to see more information associated with the date conversation associated with the sixth user. In some embodiments, selecting the seventh user from the list of users that the sixth user is currently conversing with (i.e., "Matilda" in FIG. 342) may take the user to a second date conversation screen (e.g., the screen of FIG. 343).

Figure 343:
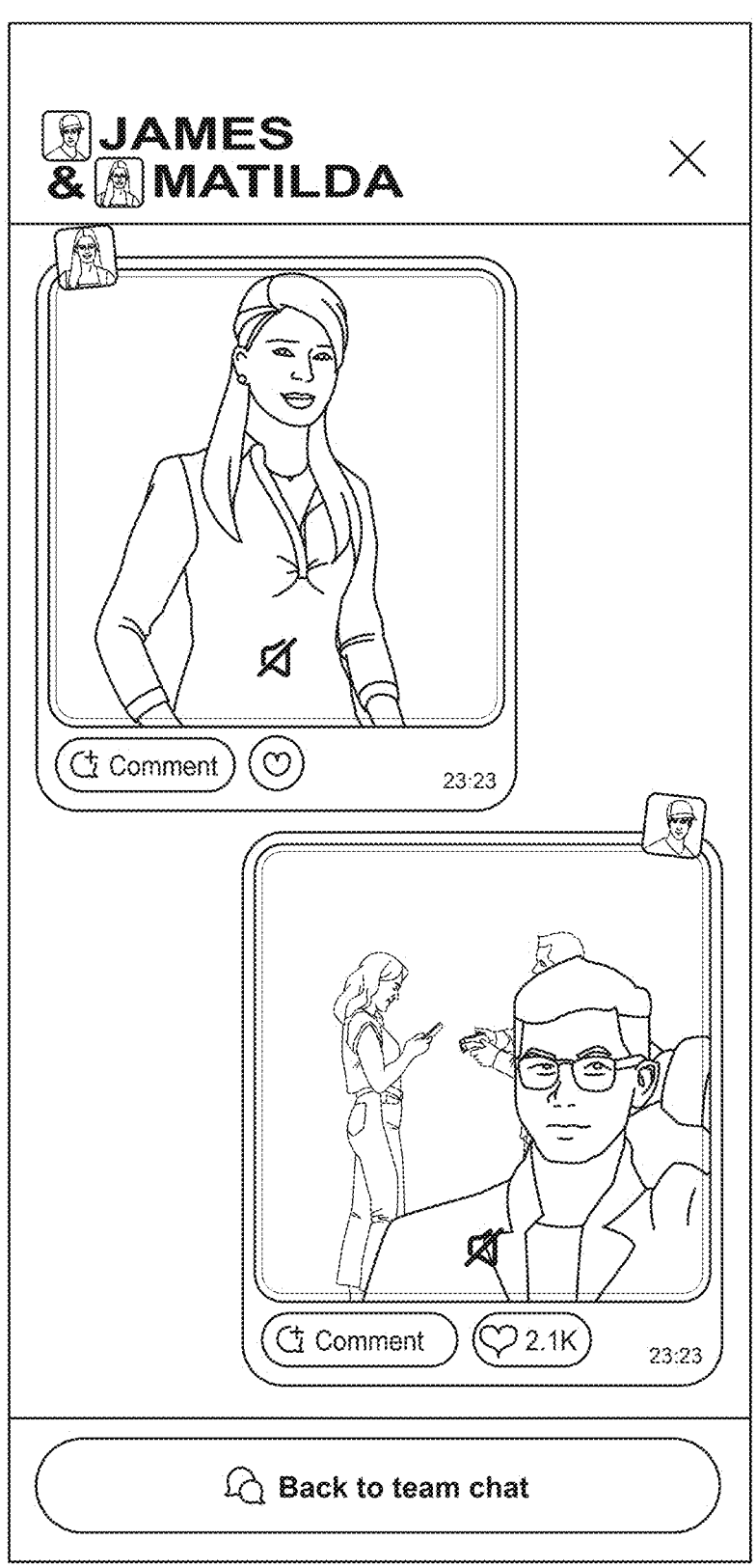

FIG. 343 shows a screen from the mobile application that depicts the date conversation associated with the sixth user. The date conversation associated with the sixth user may comprise: the sixth user, the seventh user, a third close option, the conversation data associated with the date conversation associated with the sixth user, and an eleventh back option. According to some embodiments, upon selection, the third close option may return the user to the team conversation screen (e.g., the screen of FIG. 342). In other embodiments, the third close option, upon selection, may return the user to the messaging tab (e.g., the screen in FIG. 340, the screen in FIG. 335, etc.). In some embodiments, the third close option comprises an "X."

In one embodiment, the user may return to the team conversation screen (e.g., the screen of FIG. 342) upon selection of the eleventh back option. In some embodiments, the eleventh back option comprises a back arrow. In other embodiments, the eleventh back option comprises a "Back to team chat" option. According to one embodiment, the sixth user matched with the seventh user, and/or the seventh user matched with the sixth user.

In some embodiments, the conversation data associated with the date conversation associated with the sixth user may comprise at least one of: text, at least one message, at least one image, at least one gif, at least one emoticon, at least one emoji, at least one video message, at least one audio message, a profile picture associated with the sixth user, a profile picture associated with the seventh user, at least one first reaction (i.e., positive, negative, etc.), at least one reply, at least one comment, at least one time stamp, etc. According to some embodiments, the user may scroll vertically on the date conversation associated with the sixth user to view the conversation data associated with the date conversation associated with the sixth user.

In one embodiment, the user may select a given video message comprised in the conversation data associated with the date conversation associated with the sixth user to play it. In another embodiment, the given video message comprised in the conversation data associated with the date conversation associated with the sixth user may play automatically. In some embodiments, the user may select the given video message comprised in the conversation data associated with the date conversation associated with the sixth user to mute and/or unmute it. According to one embodiment, the user may select a second react option associated with an eighth message comprised in the conversation data associated with the date conversation associated with the sixth user. In another embodiment, selection of the second react option associated with the eighth message allows the user to add a third reaction to the eighth message.

According to another embodiment, the user may select a third comment option associated with the eighth message comprised in the conversation data associated with the date conversation associated with the sixth user. Selection of the third comment option associated with the eighth message comprised in the conversation data associated with the date conversation associated with the sixth user, according to another embodiment, allows the user to share the eighth message with the team (i.e., the team conversation associated with the sixth user) for the user. In one embodiment, the user may add a comment when the user shares the eighth message comprised in the conversation data associated with the date conversation associated with the sixth user with the team for the sixth user (e.g., "Boys, what do you think?" in FIG. 341).

Figure 344:
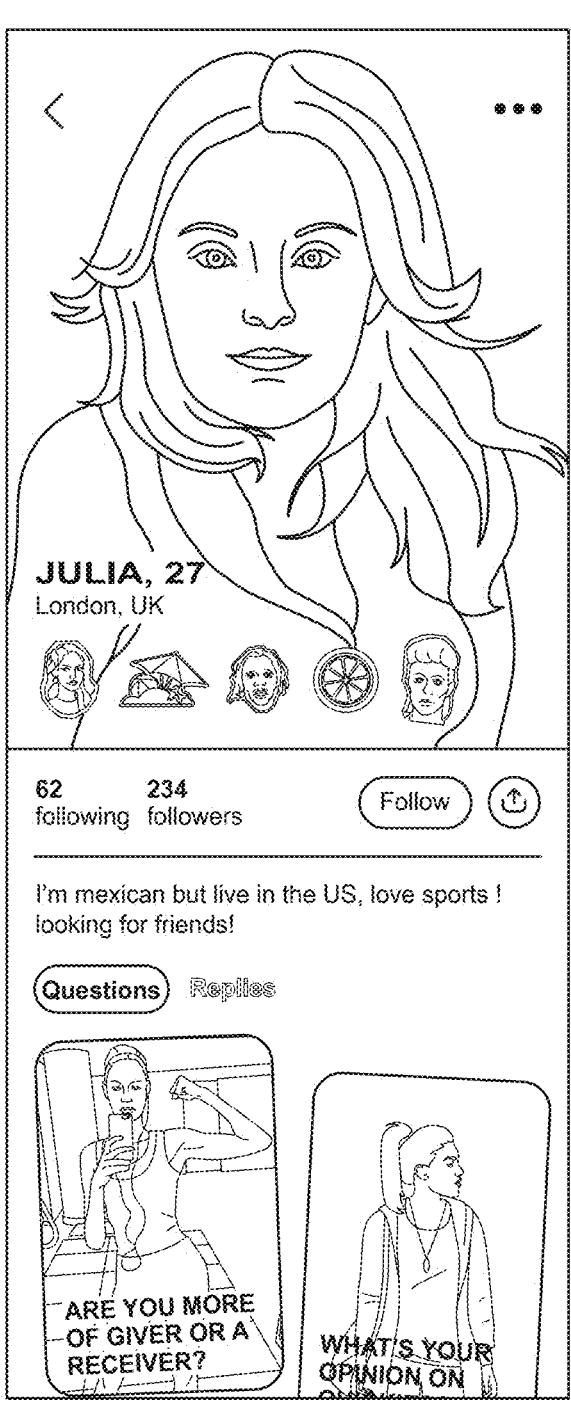

FIG. 344 shows a screen from the mobile application that depicts user profile information. In some embodiments, a user profile associated with an eighth user may comprise at least one of: a twelfth back option, a more option, a profile picture associated with the eighth user, a name associated with the eighth user, an age associated with the eighth user, a location associated with the eighth user, at least one sticker associated with the eighth user, follow information associated with the eighth user, a fourth share option, a bio associated with the eighth user, a posts tab (e.g., a first profile mode), a user replies tab (e.g., a second profile mode), and an information tab (e.g. a third profile mode). In FIG. 344, the posts tab is active.

The twelfth back option may, in some embodiments, return the user to a previous screen (e.g., the screen of a date conversation associated with the eighth user, the screen of a team conversation comprising the eighth user, etc.). In some embodiments, the twelfth back option comprises a back arrow. In one embodiment, the more option may comprise at least one of: a report profile option, a block profile option, an unmatch option, etc. The block profile option, in some embodiments, may ensure the eighth user cannot view the user's profile. In other embodiments, the block profile option may stop the eighth user from interacting with the user and/or the user's profile. According to one embodiment, the unmatch option may remove the user from the dates tab of the eighth user, and/or may remove the eighth user from the dates tab of the user.

In some embodiments, the at least one sticker associated with the eighth user may be chosen by the eighth user to personalize the eighth user's profile. Furthermore, the at least one sticker associated with the eighth user may be at least one of: chosen from a collection of stickers on the mobile application, or created by the eighth user from a media application on the eighth user's device. In one embodiment, the follow information associated with the eighth user may comprise at least one of: a following indicator, a follower indicator, and a follow option. According to some embodiments, the following indicator may comprise a first number of accounts associated with the eighth user (i.e., a number of accounts that have added the eighth user as a friend). In other embodiments, the following indicator may, upon selection, produce a list of users that the eighth user follows (i.e., a list of users that the eighth user has as a friend on the mobile application).

According to other embodiments, the follower indicator may comprise a second number of accounts associated with the eighth user (i.e., a number of accounts that the eighth user has added as a friend). In other embodiments, the follower indicator may, upon selection, produce a list of users that follow the eighth user (i.e., a list of users that have the eighth user as a friend on the mobile application. The user may, in some embodiments, follow the eighth user upon selection of the follow option. In some embodiments, selecting the follow option may cause the follow option to change to an unfollow option and/or a following option. In one embodiment, upon selection of the follow option, the follower indicator automatically adjusts accordingly. In another embodiment, upon selection of the unfollow option and/or the following option, the follower indicator automatically adjusts.

In one embodiment, the fourth share option may comprise at least one of: sharing the profile associated with the eighth user via a messaging application on the user's device, sharing the profile associated with the eighth user to a friend on the mobile application, or sharing the profile associated with the eighth user to a team on the mobile application. In one embodiment, the user may add a comment (e.g., "Boys, what do you think?" in FIG. 341) when the user shares (i.e., selects the fourth share option) the profile associated with the eighth user. In some embodiments, selecting the fourth share option may result in a fifth popup comprising the profile associated with the eighth user. The bio associated with the eighth user, according to some embodiments, may comprise data (i.e., text, emoticons, emojis, etc.) associated with the eighth user.

In some embodiments, the posts tab comprises at least one post associated with the eighth user. According to one embodiment, the at least one post associated with the eighth user may comprise: at least one photo associated with the at least one post, at least one prompt associated with the at least one post, and at least one second reaction associated with the at least one post. In some embodiments, the at least one photo associated with the at least one post is comprised in a ninth video message comprised in the at least one post. According to some embodiments, the user may scroll vertically on the posts tab to view the at least one post associated with the eighth user. In one embodiment, the user may select the at least one post to view the at least one post in the full screen mode.

In some embodiments, the user replies tab comprises at least one reply associated with the eighth user. According to one embodiment, the at least one reply associated with the eighth user may comprise: at least one photo associated with the at least one reply, at least one prompt associated with the at least one reply, and at least one third reaction associated with the at least one reply. In some embodiments, the at least one photo associated with the at least one reply is comprised in a tenth video message comprised in the at least one reply. According to some embodiments, the user may scroll vertically on the user replies tab to view the at least one reply associated with the eighth user. In one embodiment, the user may select the at least one reply to view the at least one reply in the full screen mode.

In some embodiments, the information tab associated with the eighth user may comprise at least one of: work information (e.g., a job title, a company, etc.) associated with the eighth user, location information (e.g., a city, a state, a distance, etc.) associated with the eighth user, hometown information associated with the eighth user, language information associated with the eighth user (e.g., languages the eighth user can speak, languages the eighth user is fluent in, etc.), education information (e.g., a school, a degree, a major, etc.) associated with the eighth user, height information associated with the eighth user, personal information (e.g., interests, hobbies, etc.) associated with the eighth user, social media information (e.g., an Instagram profile, a Snapchat profile, etc.) associated with the eighth user, etc. According to some embodiments, the user may scroll vertically on the information tab to view additional information.

In other embodiments, a user profile associated with the user may comprise at least one of: an edit option, a third settings option, the profile picture associated with the user, the name associated with the user, the age associated with the user, the location associated with the user, the at least one sticker associated with the user, follow information associated with the user, a post option, the fourth share option, the bio associated with the user, the posts tab (e.g., the first profile mode), the user replies tab (e.g., the second profile mode), and the information tab (e.g. the third profile mode). A user profile screen may include the menu bar (e.g., the menu bar in FIG. 326).

According to some embodiments, the user may edit the user profile upon selection of the edit option. Furthermore, editing the user profile may comprise editing at least one of: the profile picture associated with the user, the name associated with the user, the location associated with the user, the at least one sticker associated with the user, the bio associated with the user, the work information associated with the user, the location information associated with user, the hometown information associated with the user, the language information associated with the user, the education information associated with the user, the height information associated with the user, the personal information associated with the user, the social media information associated with the user, etc.

In some embodiments, the follow information associated with the user may comprise at least one of: the following indicator, the follower indicator. In one embodiment, selection of the post option may take the user to the audio recording screen (e.g., the screen of FIG. 333). In another embodiment, selection of the post option may take the user to the video recording screen (e.g., the screen of FIG. 334). Selection of the third settings option, in some embodiments, may take the user to a settings page. The settings page may comprise at least one of: account information (e.g., a phone number, an email, etc.) associated with the user, privacy information (e.g., password information) associated with the user, security information (e.g., authentication information) associated with the user, profile information associated with the user, financial information (i.e., a payment method, a credit card, etc.) associated with the user, preferences information (e.g., privacy preferences, account preferences, aesthetic preferences, etc.) associated with the user, notifications information associated with the user, help information (e.g., a link to a help center), support information (e.g., information on a report) associated with the user, etc.

Figure 345:
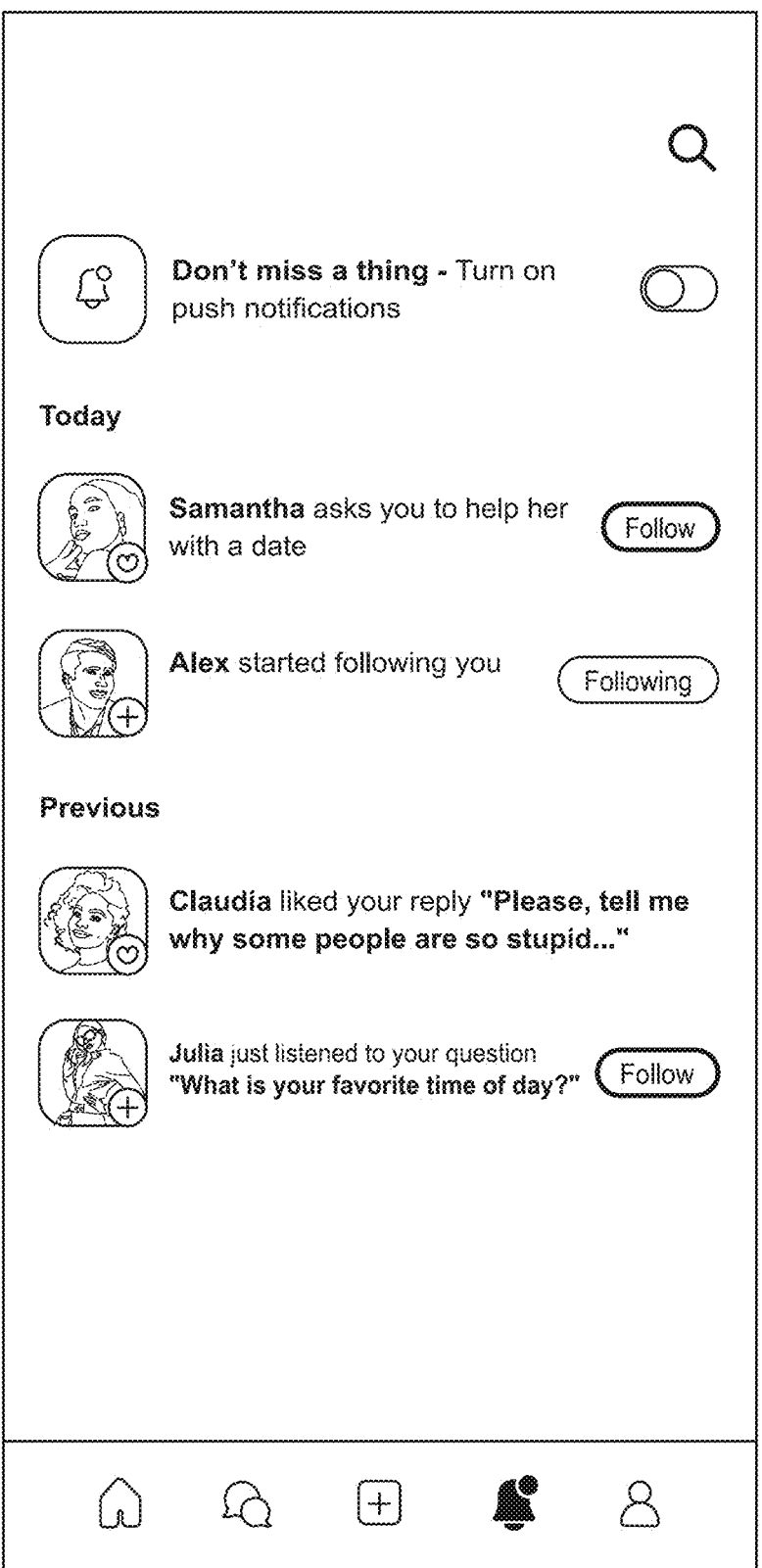

FIG. 345 shows a screen from the mobile application that depicts the notifications tab. The notifications screen may include the menu bar (e.g., the menu bar in FIG. 326). The notifications tab may comprise at least one of: a second search option, an enable notifications option, and at least one notification. According to some embodiments, the user may scroll vertically on the notifications tab to view the at least one notification. In one embodiment, the second search option may comprise a magnifying glass icon. In some embodiments, the user may use a virtual keyboard to input third search criteria upon selection of the second search option. In some embodiments, the third search criteria may yield results comprising a first notification from the at least one notification. In other embodiments, the third search criteria may yield results comprising at least two notifications. In yet other embodiments, the third search criteria may yield no results.

In one embodiment, the enable notifications option may, upon selection, enable the user to receive notifications from the mobile application on the user's device. The first notification from the at least one notification may comprise at least one of: a ninth user, a profile picture associated with the ninth user, an explanation associated with the first notification from the at least one notification, and an action option associated with the first notification from the at least one notification. The ninth user may be, in some embodiments, at least one of: a friend on the mobile application, a follower on the mobile application, the fourth user associated with the date conversation associated with the user, the second user, the third user, etc.

According to some embodiments, the explanation associated with the first notification from the at least one notification may comprise at least one of: the ninth user has started following the user, the ninth user listened to a post by the user, the ninth user replied to a post by the user, the ninth user reacted to a post by the user, the ninth user listened to a reply by the user, the ninth user reacted to a reply by the user, the ninth user invited the user to a team associated with the ninth user, etc. In some embodiments, the at least one notification is organized into groups. For example, in one embodiment, the groups may comprise new notifications, previous notifications, today's notifications, yesterday's notifications, last week's notifications, etc.

In some embodiments, the action option associated with the first notification from the at least one notification may comprise: a second follow option, and a second unfollow option. In one embodiment, the second unfollow option may comprise a second following option. The user may, in some embodiments, follow the ninth user upon selection of the second follow option. In some embodiments, selecting the second follow option may cause the second follow option to change to the second unfollow option. According to other embodiments, the user may unfollow the ninth user upon selection of the second unfollow option. In one such embodiment, selecting the second unfollow option may cause the second unfollow option to change to the second follow option.

In one embodiment, the first notification from the at least one notification may be selected. Furthermore, selecting the first notification from the at least one notification, may take the user to a screen associated with the first notification from the at least one notification. For example, if the explanation associated with the first notification from the at least one notification comprises: the ninth user replied to a post by the user, selecting the first notification from the at least one notification may take the user to a screen with the post by the user (e.g., the screen of FIG. 330).

Figure 346:

FIG. 346 shows a screen from the mobile application that depicts a feed tab. The feed tab may include a menu bar (e.g., the menu bar in FIG. 326). The feed tab may comprise at least one of a filter option, a search option, a first post associated with a first user and a first prompt, a share option, a favorite option, and a match option. In one embodiment, the filter option comprises at least one of: an age filter, a location filter, and a gender filter. According to one embodiment, selecting the filter option may take the user to a filter screen (e.g., the screen of FIG. 350). In some embodiments, the feed tab is organized by user data. For example, in one embodiment, posts from friends of the current user (i.e., users that the current user is following, users that the current user has matched with, etc.) may appear first and/or more frequently in the feed tab (i.e., friends and/or matches are given priority). In another embodiment, posts from friends of the current user's friends may appear first in the feed tab (i.e., friends of friends are given priority).

According to some embodiments, the search option may comprise a magnifying glass icon. In some embodiments, the current user may use a virtual keyboard to input search criteria upon selection of the search option. In some cases, the search criteria may yield results based on a user, a name, a prompt, a designation, etc. Selection of the search option, in some embodiments, may display suggested and/or recent search criteria.

In some embodiments, the first post associated with the first user and the first prompt may comprise the first prompt (e.g., a first question), a first message, and profile information associated with the first user. According to one embodiment, selecting the first prompt may take the user to a second post associated with a second user and the first prompt (e.g., the screen of FIG. 347). In some embodiments, the first message may comprise at least one of: a first audio message or a first video message. Furthermore, in one embodiment, the first audio message or the first video message may paused and/or muted by selecting (e.g., tapping) the first post associated with the first user. In one embodiment, selecting the post associated with the first user begins playing automatically upon entering the feed tab. The profile information associated with the first user may, in some embodiments, comprise at least one of a first image, a first name, and a first designation (e.g., a university, a college, a school, a company, a job, etc.). In some cases, selecting the profile information associated with the first user may take the current user to a profile screen (e.g., the screen of FIG. 344, the screen of FIG. 353, etc.) associated with the first user.

In one embodiment, the share option may comprise at least one of: sharing via a messaging application on the current user's device, sharing to a friend on the mobile application, or sharing to a group (e.g., a team) on the mobile application. In one embodiment, the current user may add a comment (e.g., "Boys, what do you think?" in FIG. 341) when the current user shares (i.e., selects the share option) the post associated with the second user. In some embodiments, selecting the share option may result in a second popup comprising the post associated with the second user. According to one embodiment, selecting the favorite option may result in the first post associated with the first user and the first prompt to be saved for ease of access by the current user. In another embodiment, selecting the favorite option may result in the first user or a profile associated with the first user to be saved for ease of access by the current user. Furthermore, in one embodiment, selecting the favorite option may result in a chat with the first user to be moved to a different area (e.g., the chat is moved from regular chats to favorite chats).

In some embodiments, selecting the match option (e.g., the match option of FIG. 349) may take the user to a conversation associated with the first user and the current user. According to other embodiments, selecting the match option (e.g., the match option of FIG. 346, the match option of FIG. 347, etc.) may take the current user to a recording screen (e.g., the screen of FIG. 348, the screen of FIG. 333, the screen of FIG. 334, etc.). In other embodiments, selecting the match option (e.g., the match option of FIG. 346, the match option of FIG. 347, etc.) may enable the current user to record a response associated with the first prompt (e.g., the first question). According to yet other embodiments, the match option (e.g., the match option of FIG. 349) is not selectable. In one embodiment, upon the current user recording a response associated with the first prompt, a conversation may be generated in a messaging tab (e.g., the screen of FIG. 351) associated with the first user. In one embodiment, the conversation may be generated in a first message area (e.g., the "Potential Matches" section of FIG. 351). Furthermore, in another embodiment, upon the current user recording a response associated with the first prompt, the response may appear on a profile tab (e.g., the screen of FIG. 353) associated with the current user.

Figure 347:

Turning back to FIG. 346, according to some embodiments, the current user may scroll horizontally (e.g., at least partially horizontally) to a second post associated with a second user and the first prompt (e.g., the screen of FIG. 347). In other embodiments, the current user may scroll vertically (i.e., at least partially vertically) to a third post associated with a third user and a second prompt (i.e., the screen of FIG. 349). According to some embodiments, scrolling may refer to a transitional interaction with a user interface.

FIG. 347 shows a screen from the mobile application that depicts a feed tab. The feed tab may include a menu bar (e.g., the menu bar in FIG. 326). The feed tab may comprise at least one of the filter option, the search option, a second post associated with a second user and the first prompt, the share option, the favorite option, and the match option. According to some embodiments, the current user may scroll horizontally (e.g., at least partially horizontally) to a third post associated with a third user and the first prompt (e.g., the screen of FIG. 346). In other embodiments, the current user may scroll vertically (i.e., at least partially vertically) to a fourth post associated with a fourth user and a second prompt (i.e., the screen of FIG. 349).

Figure 348:
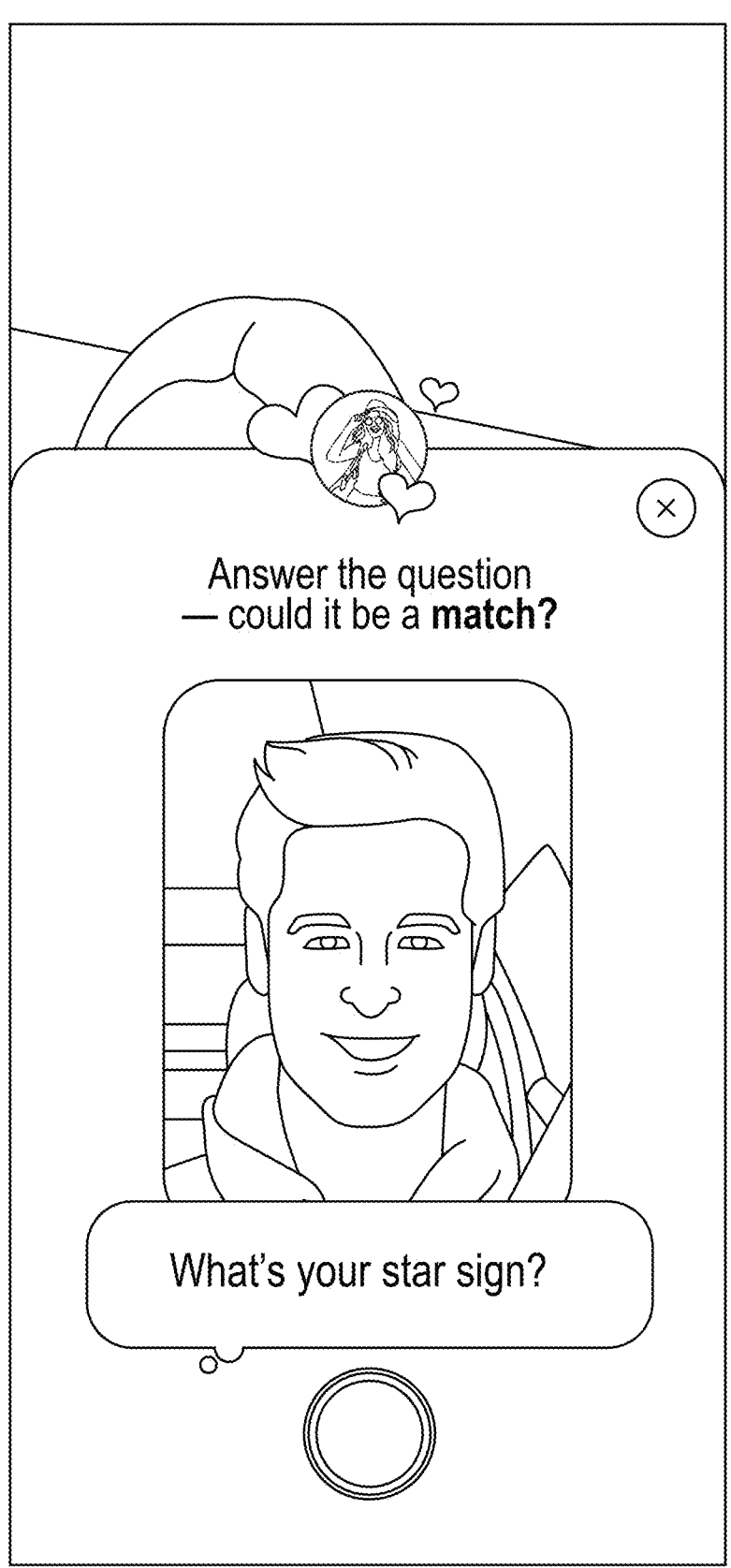

FIG. 348 shows a screen from the mobile application that depicts a recording screen. The recording screen, in some embodiments, may be accessed via selection of a content creation tab from a menu bar (e.g., the menu bar of FIG. 326). The recording screen may comprise at least one of a video, a prompt, a record option, and a generate option. According to some embodiments, the recording screen may allow the current user to record a video or an audio message associated with the prompt (e.g., the first prompt, the second prompt, a third prompt, etc.). In some embodiments, the video comprises a real-time, live view of the current user as the current user is recording. According to one embodiment, the current user may hold the record option to begin recording the video. In another embodiment, the current user may tap the record option to begin and/or end recording the video. In some cases, the recording screen may require the current user to allow the mobile application to access the camera and/or microphone of a mobile device of the current user. According to one embodiment, selecting the generate option may randomly or automatically generate a prompt to which the current user may respond.

In some embodiments, the current user may record a post responding to a user (e.g., the current user selects match on a post associated with the user, the current user selects match on a user's profile, etc.). For example, according to one embodiment, if the current user selects the match option on the first post associated with the first user, the current user will be directed to a recording screen to respond to the first prompt. Upon completion, the post will be sent directly (e.g., at least partially directly, in a private chat, in a chat between the first user and the current user, etc.) to the first user, and the current user will be returned to the feed tab (e.g., the screen of FIG. 346, the screen of FIG. 347, etc.). In some embodiments, the post will be posted and/or visible to the current user's profile (and therefore will appear to other users on the other users' feed tabs). In other embodiments, the current user may change account settings such that the post will not be posted to the current user's profile (and therefore will not appear to other users on the other users' feed tabs). In another embodiment, the current user may record a post responding to a randomly generated prompt, upon selecting the content creation tab from the menu bar. This post will be posted to the current user's profile, but will not be sent directly to any users.

Figure 349:
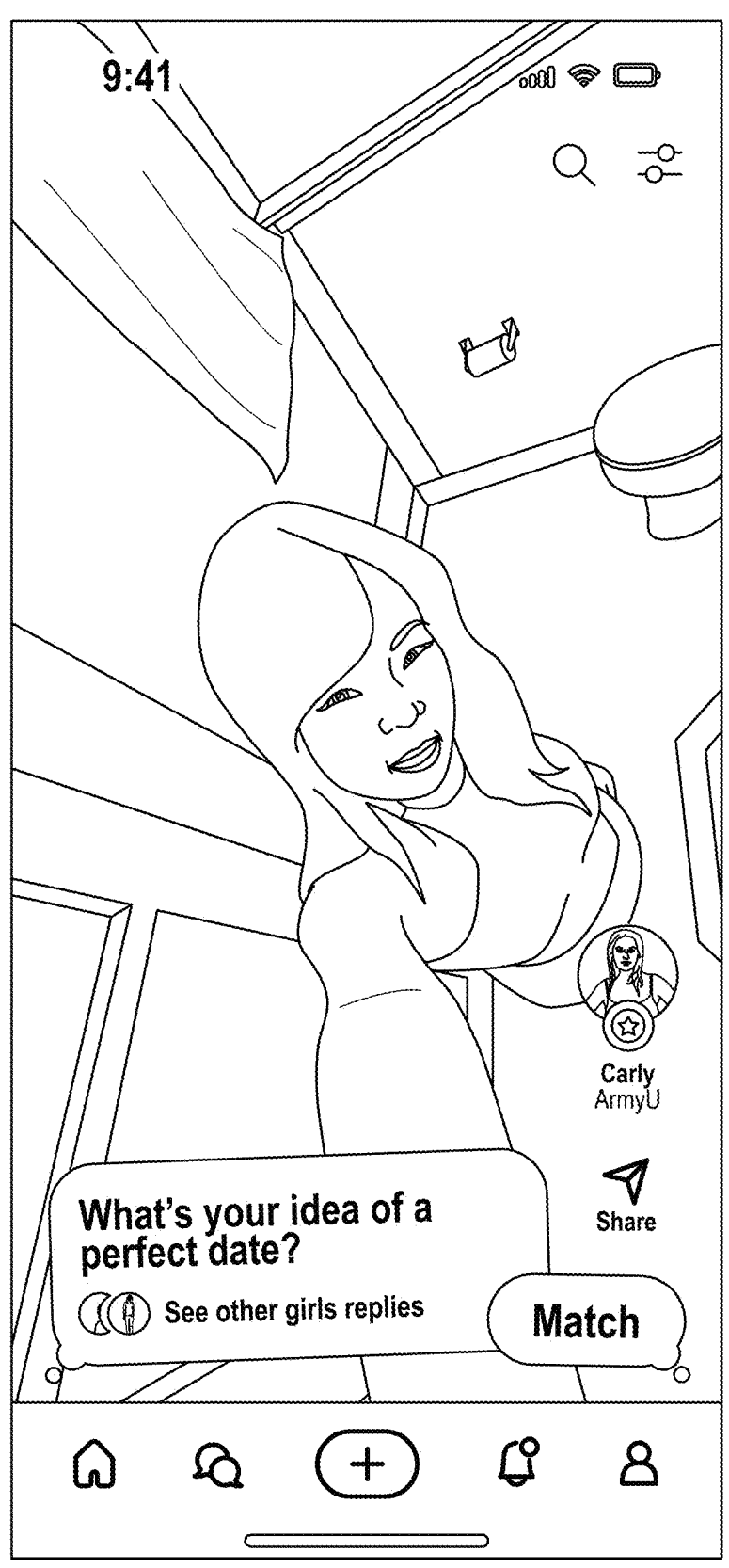

FIG. 349 shows a screen from the mobile application that depicts a feed tab. The feed tab may include a menu bar (e.g., the menu bar in FIG. 326). The feed tab may comprise at least one of the filter option, the search option, a third post associated with a third user and a second prompt, the share option, the favorite option, and the match option. According to some embodiments, the current user may scroll horizontally (e.g., at least partially horizontally) to a fourth post associated with a fourth user and the first prompt. In other embodiments, the current user may scroll vertically (i.e., at least partially vertically) to a fifth post associated with a fifth user and a third prompt (e.g., the screen of FIG. 346, the screen of FIG. 347, etc.).

FIG. 350 shows a screen from the mobile application that depicts a filter screen. In one embodiment, the filter screen comprises at least one of: an age filter, a location filter, and a gender filter. According to one embodiment, the age filter may comprise an age, and/or an age range, and/or a minimum age, and/or a maximum age. In another embodiment, the location filter may comprise a distance, and/or a distance range, and/or a minimum age, and/or a maximum age. In yet another embodiment, the gender filter may comprise at least one gender.

Figure 351:
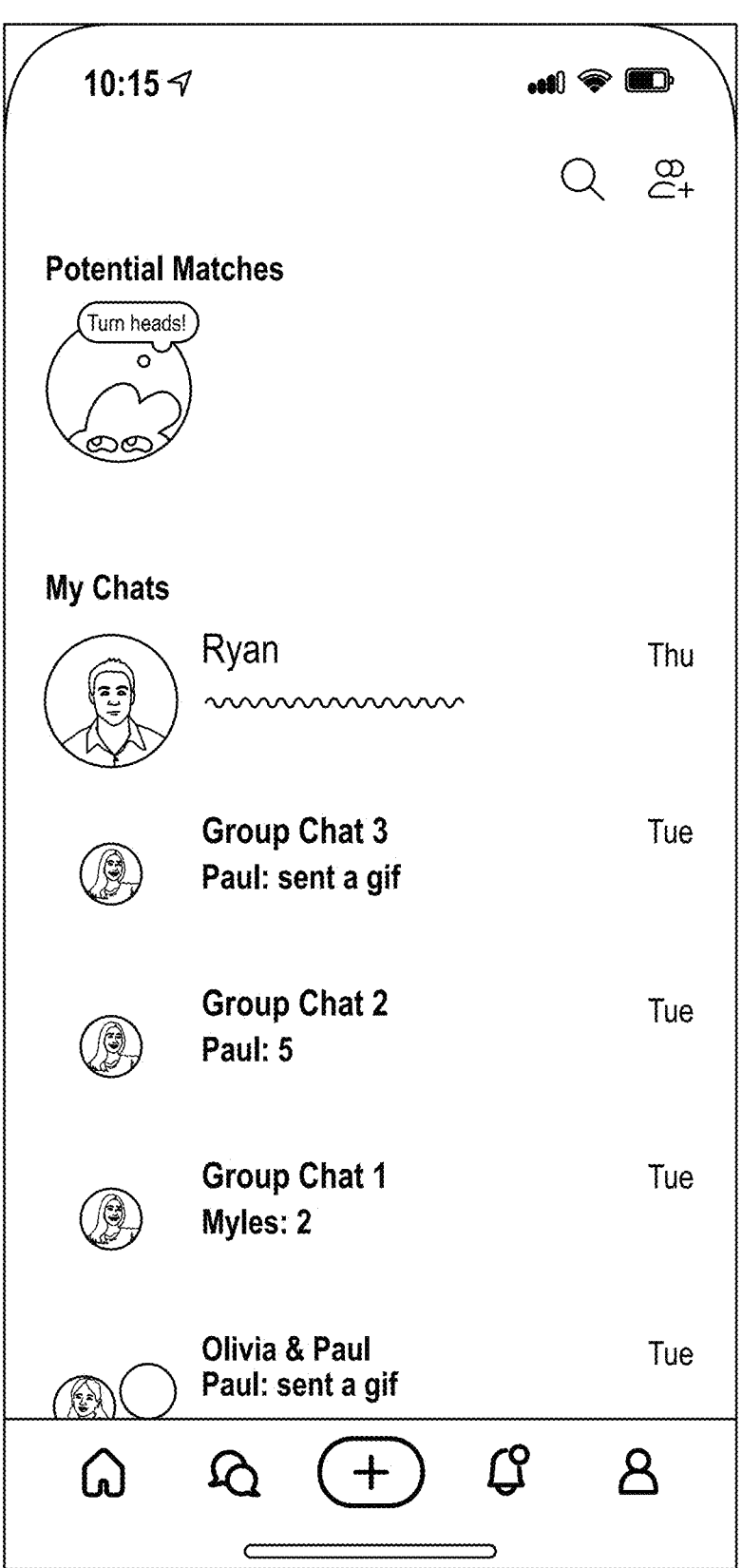

FIG. 351 shows a screen from the mobile application that depicts a messaging tab. In one embodiment, the messaging tab may include the menu bar (e.g., the menu bar in FIG. 326). The messaging tab may comprise at least one of: a search option, a new chat option, a first message area (e.g., the "Potential Matches" section), a first message tab (e.g., the "My Chats" tab), and a second message tab (e.g., the "Favorites" tab in FIG. 352). In FIG. 351, the first message tab is active. According to one embodiment, the search option may comprise a magnifying glass icon. In some embodiments, the current user may use a virtual keyboard to input search criteria upon selection of the search option. In other embodiments, the search criteria may yield results from conversations in the first message area and/or conversations in the second message area. According to some embodiments, selection of the search option may display suggested friends on the mobile application, and/or recent search criteria.

In one embodiment, selecting the new chat option may allow the user to start a new conversation with a friend and/or a group of friends, and/or a suggested friend and/or a group of suggested friends, and/or a group of friends and suggested friends. According to some embodiments, the first message area may comprise a first chat. The first chat, in one embodiment, may comprise at least one of: a user, an image associated with the user, and a recent activity. In some embodiments, the recent activity may comprise a message received from the user. According to one embodiment, the first chat may comprise an indication on whether the current user has opened the chat since the recent activity was received (e.g., the color of the recent activity may change once the current user has seen it). The current user may respond to the recent activity in the first chat. Once the current user responds to the recent activity in the first chat, the first chat moves from the first message area to the first message tab. In some embodiments, selecting the first chat may take the current user to a chat screen (e.g., the screen of FIG. 336). In some cases, upon entering the chat screen, the current user may accept or decline the chat. If the chat is accepted, it may be moved to the first message tab. If the chat is declined, it may be removed from the first message area. According to one embodiment, if the current user does not respond in the first chat within a week of receiving the recent activity, the first chat will be removed from the first message area.

The first message tab may comprise a second chat associated with a user or a group of users. According to one embodiment, the second chat may comprise at least one of: a name, at least one image, and a recent activity. In one embodiment, the name comprises a user. In another embodiment, the name comprises a group chat name. According to some embodiments, the at least one image may comprise an image associated with the user or users within a group chat. In some cases, the recent activity may comprise a message sent by or received from the user or the current user. In other cases, the recent activity may comprise a user within the group chat and a message sent by or received from the user within the group chat. In one embodiment, the recent activity further comprises a temporal indicator (e.g., a time, a date, a day of the week, etc.). According to one embodiment, the second chat may further comprise an indication on whether the current user has opened the chat since the recent activity was received (e.g., the color and/or shade of the recent activity may change once the current user has seen it). In some embodiments, selecting the second chat may take the current user to a chat screen (e.g., the screen of FIG. 336, the screen of FIG. 341, etc.). In some cases, upon selection of the second chat, the current user may select a favorite option associated with the user. Upon selection of the favorite option, the second chat may move from the first message tab to the second message tab.

Figure 352:
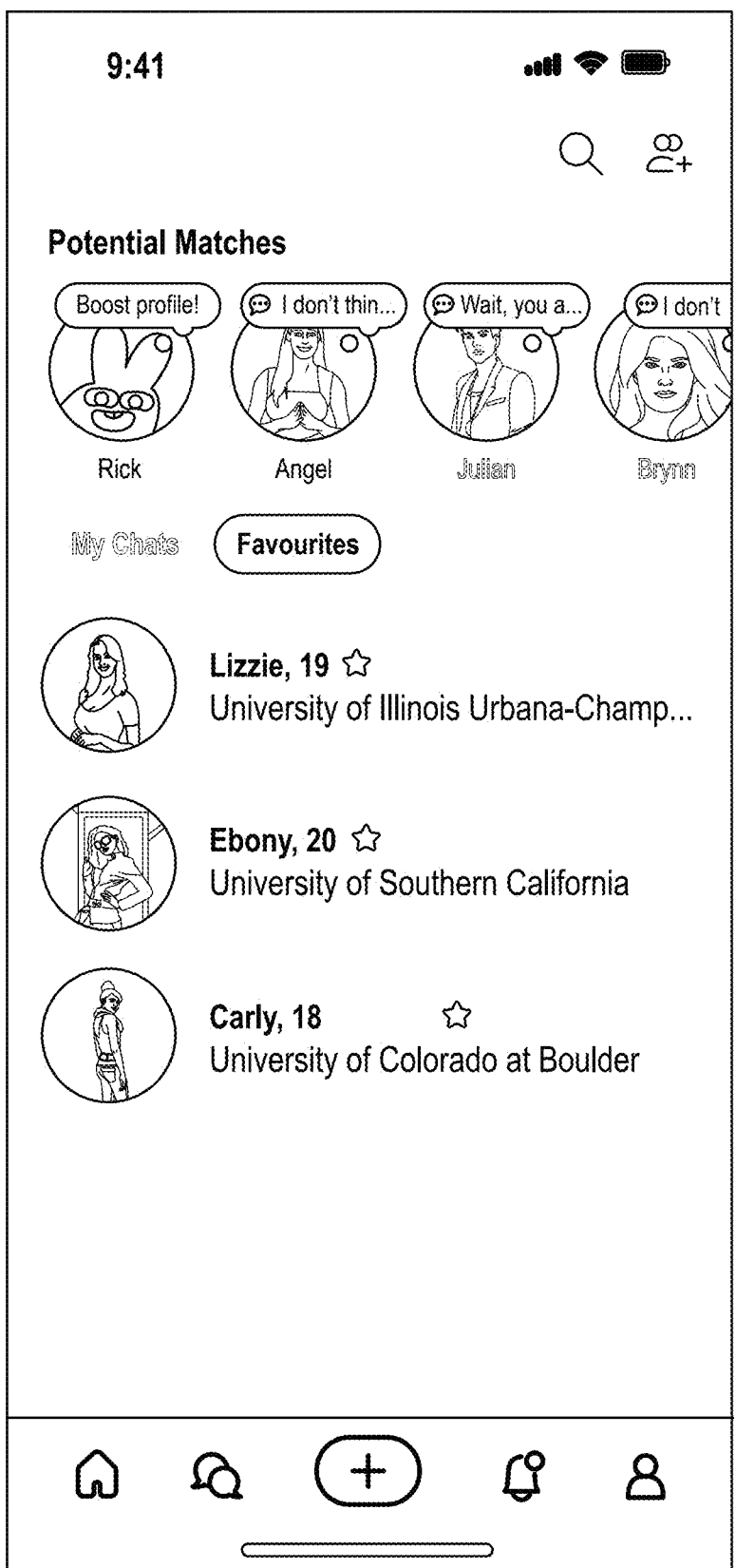

FIG. 352 shows a screen from the mobile application that depicts a messaging tab. In FIG. 351, the second message tab is active. The second message tab may comprise a third chat associated with a user. The third chat, in some embodiments, comprises at least one of: a user, an age associated with the user, a favorite indicator, an image associated with the user, and a designation associated with the user (e.g., a school, a college, a university, a company, a business, a place of employment, etc.). According to one embodiment, selecting the third chat may take the current user to a chat screen (e.g., the screen of FIG. 336). In some cases, the third chat is within the second messaging tab after being favorited by the current user (e.g., the current user favorited the user or the user's chat for easy access). In one embodiment, selecting the favorite indicator, may cause the third chat to move from the second message tab to the first message tab.

Figure 353:
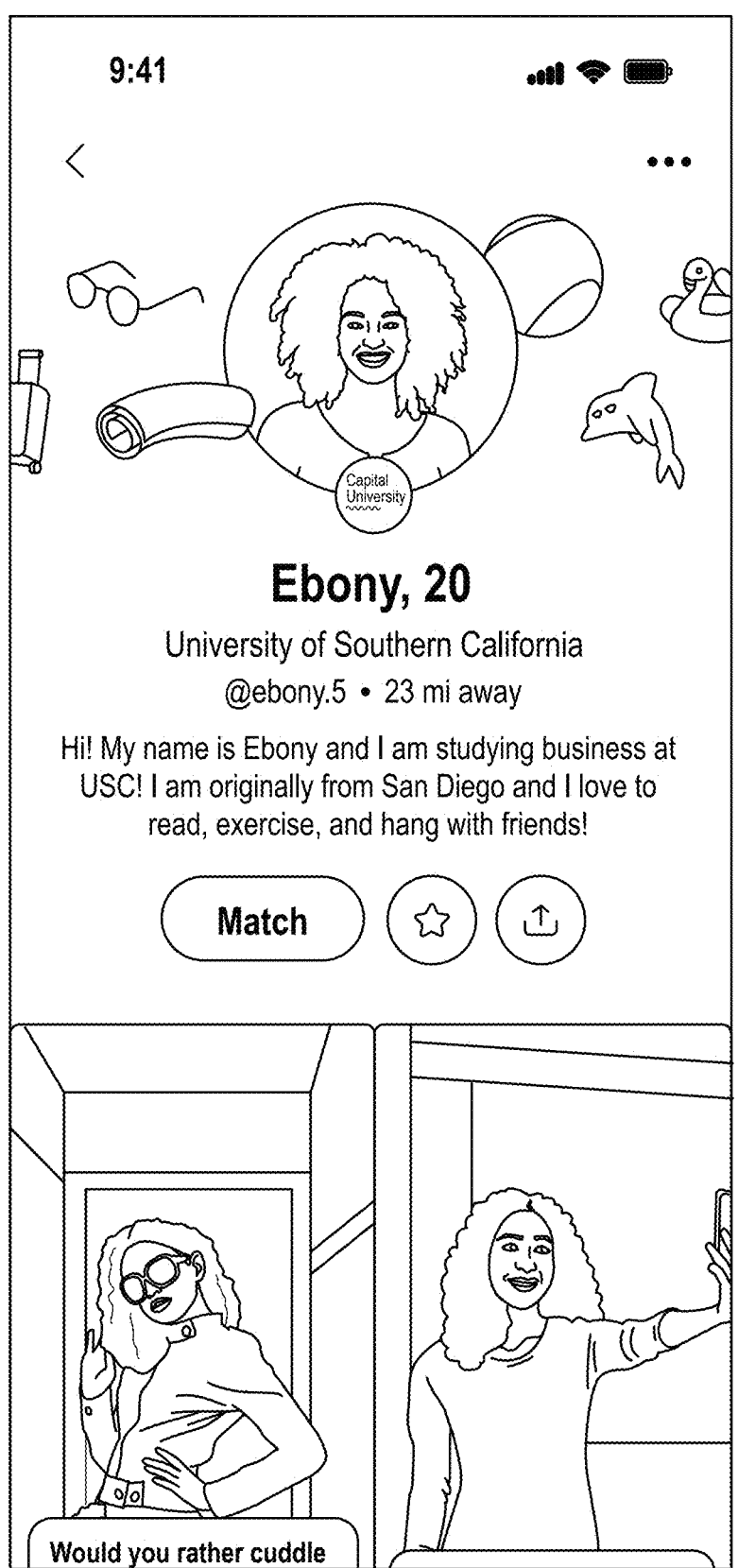

FIG. 353 shows a screen from the mobile application that depicts a profile tab. In some embodiments, a user profile associated with a user may comprise at least one of: a back option, a more option, a profile picture associated with the user, a name associated with the user, an age associated with the user, a username associated with the user, a location associated with the user, a match option, a favorite option, a share option, a bio associated with the user, a posts tab, and an information tab. In FIG. 353, the posts tab is active.

The back option may, in some embodiments, return the user to a previous screen (e.g., the screen of a chat associated with the user, the screen of a group chat comprising the user, the feed screen with a post associated with the user, etc.). In some embodiments, the back option comprises a back arrow or an 'x.' In one embodiment, the more option may comprise at least one of: a report profile option, a block profile option, an unmatch option, etc. The block profile option, in some embodiments, may ensure the user cannot view the current user's profile. In other embodiments, the block profile option may stop the user from interacting with the current user and/or the current user's profile.

In one embodiment, the share option may comprise at least one of: sharing the profile associated with the user via a messaging application on the current user's device, sharing the profile associated with the user to a friend on the mobile application, or sharing the profile associated with the user to a group chat or team on the mobile application. In one embodiment, the current user may add a comment (e.g., "Boys, what do you think?" in FIG. 341) when the current user shares the profile associated with the user. In some embodiments, selecting the share option may result in a popup comprising the profile associated with the user. According to one embodiment, selecting the favorite option may result in the user or the profile associated with the user to be saved for ease of access by the current user. Furthermore, in one embodiment, selecting the favorite option may result in a chat with the first user to be moved to a different area (e.g., the chat is moved from regular chats to favorite chats).

According to some embodiments, selecting the match option may take the current user to a recording screen (e.g., the screen of FIG. 348, the screen of FIG. 333, the screen of FIG. 334, etc.). In some embodiments, selecting the match option may enable the current user to record a response associated with a prompt that the user has responded to previously (e.g., a question that the user has answered in a post on the user's profile). According to one embodiment, the prompt is the most popular prompt on the user's profile. In another embodiment, the prompt is the most recent prompt on the user's profile. According to yet another embodiment, the prompt is randomly chosen from the prompts on the user's profile. In one embodiment, upon the current user recording a response associated with the prompt, a conversation may be generated in a messaging tab (e.g., the screen of FIG. 351) associated with the first user. In one embodiment, the conversation may be generated in a first message area (e.g., the "Potential Matches" section of FIG. 351). Furthermore, in another embodiment, upon the current user recording a response associated with the prompt, the response may appear on a profile tab (e.g., the screen of FIG. 353) associated with the current user. The bio associated with the user, according to some embodiments, may comprise data (i.e., text, emoticons, emojis, etc.) associated with the user.

In some embodiments, the posts tab comprises a post associated with the user. According to one embodiment, the post associated with the user may comprise a photo associated with the post and/or a prompt associated with the post. In some embodiments, the photo associated with the post is comprised in a video message comprised in the post. According to some embodiments, the current user may scroll vertically on the posts tab to view posts made by the user. In one embodiment, the current user may select the post to view the post in full screen mode (e.g., the screen of FIG. 346, the screen of FIG. 347, the screen of FIG. 349, etc.) The current user may then, according to some embodiments, interact with and/or scroll through posts as the current user would in the feed tab.

The information tab, in some embodiments, comprises data associated with the user. The data may comprise at least one of: location information, language information, status information (e.g., reason for joining the mobile application, what the user is looking for on the mobile application, when the user joined the mobile application, etc.), interest or hobby information, employment information, education information, physical information (e.g., height), activity information, habit information (e.g., smoking habits, drinking habits, etc.), child information (e.g., whether the user has kids, whether the user wants kids, etc.).

Figure 354:
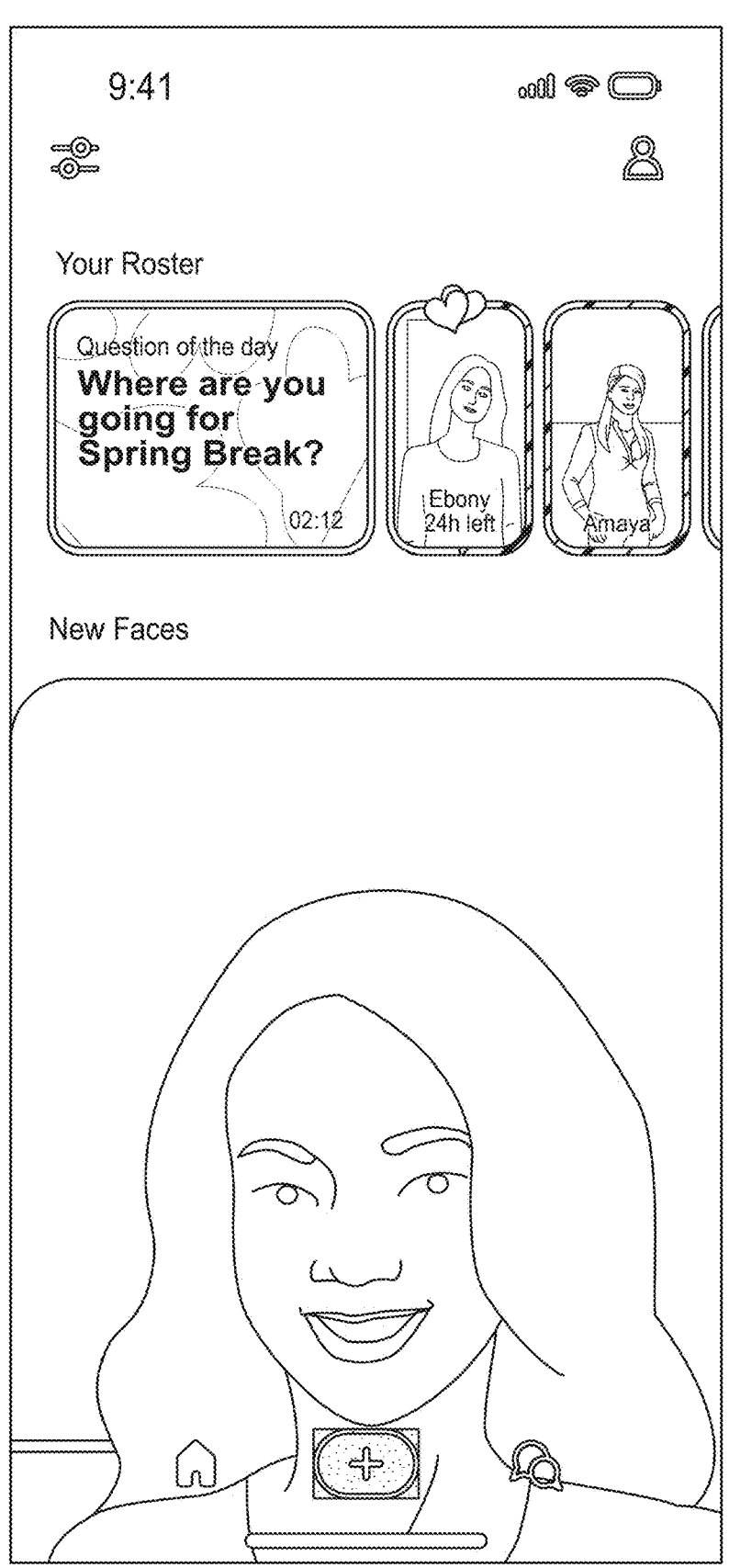

FIG. 354 shows a screen from the mobile application that depicts a feed tab for a first user. The feed tab may include a menu bar. The screen may include a menu bar comprising at least one of: the feed tab (i.e., a home tab), a content creation tab, or a messaging tab. In one embodiment, selection of the feed tab may send the user to a feed screen (e.g., the screen of FIG. 355, the screen of FIG. 357, etc.). According to another embodiment, selection of the feed tab may refresh or reload the feed tab. In another embodiment, selection of the content creation tab may send the first user to a recording screen (e.g., the screen of FIG. 359). In yet another embodiment, selection of the messaging tab may send the first user to a messaging screen (e.g., the screen of FIG. 360).

The screen may further include at least one of: a filter option, a profile option, a suggested prompt, a roster associated with the first user, or a first post associated with a second user. In one embodiment, the filter option comprises at least one of: an age filter, a location filter, or a gender filter. In another embodiment, selection of the profile option may send the first user to a profile screen associated with the first user (e.g., the screen of FIG. 362). In some embodiments, the feed tab is organized by first user data associated with the first user (e.g., filter data associated with the first user, recent activity data associated with the first user, preferences associated with the first user, etc.). For example, in one embodiment, posts from friends of the first user (e.g., users that the user is following) may appear first or earlier in the feed tab (e.g., friends are given priority). In another embodiment, posts from friends of the first user's friends may appear first or earlier in the feed tab (e.g., friends of friends are given priority).

According to one embodiment, the suggested prompt may comprise or be associated with a question of the day. In some cases, the suggested prompt comprises or is associated with a time limit for creating a post associated with the suggested prompt. In one embodiment, a post associated with the suggested prompt may be boosted (e.g., more likely to show up in the feed tab of other users). According to another embodiment, once the first user creates a post associated with the suggested prompt, the first user may be enabled to view posts associated with the suggested prompt from other users (e.g., the posts associated with the suggested prompt from the other users are not available to view by the first user until the first user creates a post associated with the suggested prompt). In yet another embodiment, once the first user creates a post associated with the suggested prompt (e.g., the question of the day), the first user may be enabled to view a post associated with a user that has liked the first user (e.g., a secret crush user). It is appreciated that the post created by the first user associated with suggested prompt may be added to the first user's profile and/or the content associated with the first user.

According to some embodiments, the roster associated with the first user may comprise at least one of: at least one user that the first user has liked, at least one user that has liked the first user, or at least one user that the first user has matched with. In some cases, the first user may view a profile and/or a post associated with a roster user (e.g., the first user may view potential matches from the roster and, if the first user opts to like the user, generate a match with the roster user). In some embodiments, a first roster user comprised in the roster may comprise at least one of: a name associated with the first roster user, an age associated with the first roster user, or a time limit associated with the first roster user (e.g., a remaining amount of time before the match expires). In some cases, selection of the roster associated with the first user may send the first user to a likes screen (e.g., the screen of FIG. 361). According to one embodiment, an at least partially vertical swipe may refresh or reload the page. In another embodiment, a selection of the first post associated with the second user and/or an at least partially vertical swipe may send the first user to a second feed tab (e.g., the screen of FIG. 355).

Figure 355:

FIG. 355 shows a screen from the mobile application that depicts a feed tab for the first user. The feed tab may include at least one of: the menu bar, the filter option, the profile option, or the first post associated with the second user. It is appreciated that the first post associated with the second user may comprise at least one of: a first video, at least some data associated with the second user, or at least one interaction option. In some embodiments, the first video may be associated with and/or responsive to a first prompt. Furthermore, according to other embodiments, the first post associated with the second user may further comprise the first prompt. According to some embodiments, selection of the first prompt may send the user to a recording screen (e.g., the screen of FIG. 359) from which the first user can create a post associated with the first prompt. In some cases, the first video (e.g., content) may be recorded and/or captured within the mobile application. In other cases, the first video may be uploaded to the mobile application. In some embodiments, the first user may edit the first video prior to posting the first video on the mobile application. According to other embodiments, the first post associated with the second user may further comprise a link (e.g., a selectable link) to a fourth user and/or to the fourth user's profile (e.g., the first user may tag the fourth user in the first post).

In some cases, posts in the feed tab of the first user may be sequenced and/or organized and/or added based on filter data associated with the first user (e.g., the user's selections from the screen of FIG. 350). In other cases, posts in the feed tab of the first user (e.g., a content list) may be sequenced and/or organized and/or added based on at least one activity associated with the first user (e.g., recent activity associated with the first user, a post the first user has liked, a post the first user has disliked, a post the first user has skipped, etc.). In one embodiment, the first post associated with the second user begins playing and/or streaming automatically upon entering the feed tab. According to another embodiment, the at least some data associated with the second user may comprise at least one of: a name associated with the second user, an age associated with the second user, a school associated with the second user, a location associated with the second user, a distance associated with the second user, etc. The at least one interaction option, in yet other embodiments, may comprise at least one of: a like option, a dislike option, a share option, a message option, or a settings option.

It is appreciated that, in some embodiments, a horizontal swipe (e.g., an at least partially horizontal swipe) may have the same functionality as selecting the like option (e.g., a swipe in a first direction) or the dislike option (e.g., a swipe in a second direction). In some cases, if the first user selects the like option, it may result in a match (e.g., if the second user has already liked the first user). If selection of the like option results in a match, it may send the first user to a match screen (e.g., the screen of FIG. 358). In other cases, selection of the like option may initiate display of a second post associated with a third user. According to some embodiments, the second user may be notified if and/or when the first user likes the second user.

According to one embodiment, selection of the dislike option may initiate display of the second post associated with the third user. According to another embodiment, selection of the share option may prompt the first user to save (e.g., to the first user's device or to an application on the first user's device) or send the first post associated with the second user to a friend and/or a contact and/or a group chat internally (e.g., within the mobile application) or externally (e.g., via a messaging application, via a social media application, etc.). In another embodiment, selection of the settings option may enable the first user to report and/or block the first post associated with the second user and/or the second user.

Figure 356:
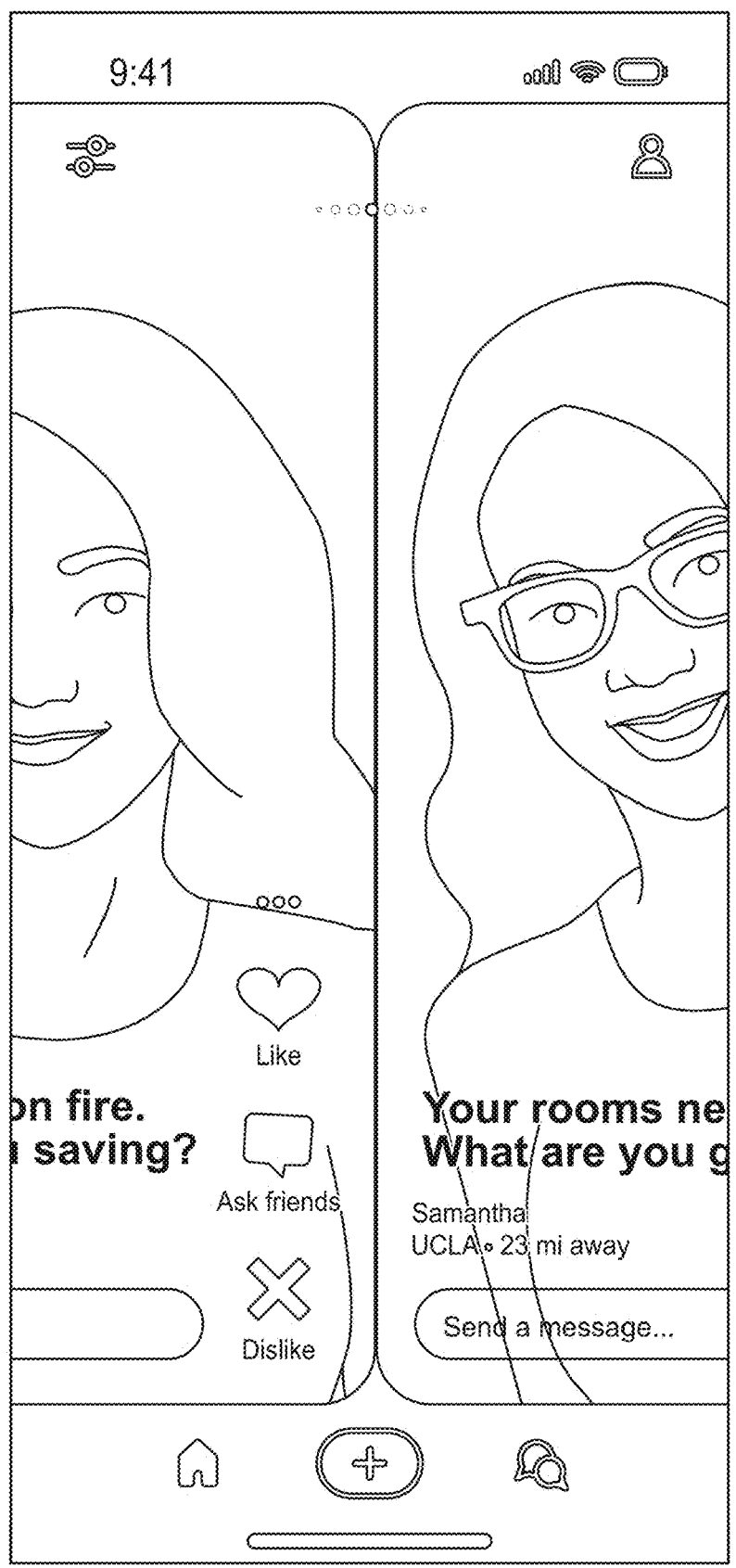

FIG. 356 shows a screen from the mobile application that depicts a first transition in the feed tab for the first user. In some embodiments, the second user may have more than one post associated with their profile. In such cases, in one embodiment, once the first video and/or the first post has played to completion, the mobile application may automatically navigate to and/or play and/or stream a third post associated with the second user. According to some embodiments, the first user may swipe (e.g., at least partially horizontally) to be presented with the third post associated with the second user. Furthermore, in some embodiments, the first user may swipe (e.g., at least partially vertically) to be presented with the second post associated with the third user (e.g., the first user may skip the first post associated with the second user). In some cases, the third post associated with the second user may be presented to the first user in the feed tab at a later time (e.g., after the first user likes, dislikes, or skips the first post associated with the second user, the third post associated with the second user may appear at a later time in the feed tab of the first user).

Figure 357:
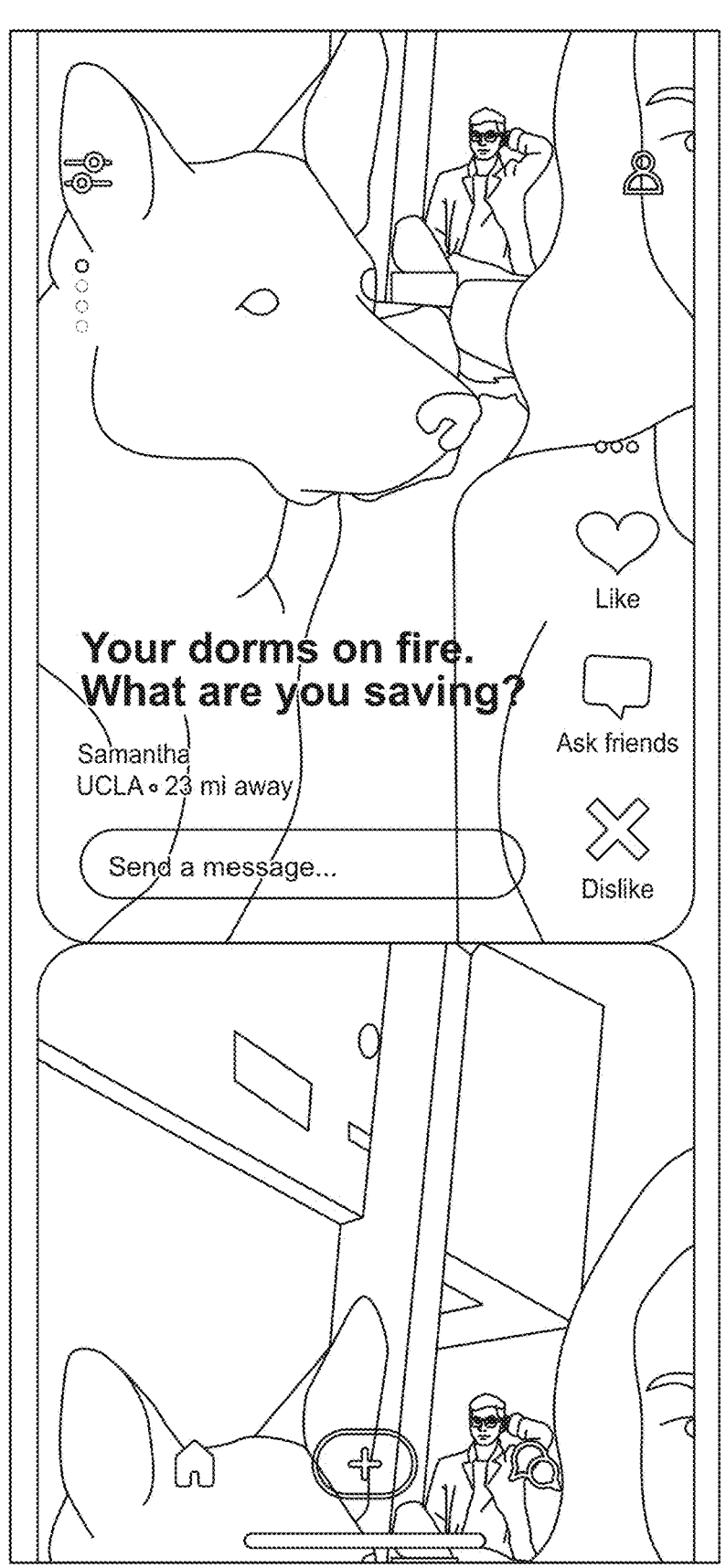

FIG. 357 shows a screen from the mobile application that depicts a second transition in the feed tab for the first user. According to other embodiments, the first user may swipe (e.g., at least partially vertically) to be presented with the third post associated with the second user. Furthermore, in some cases, the first user may swipe (e.g., at least partially horizontally) to indicate a like or a dislike of the second user and/or the first post associated with the second user and/or the third post associated with the second user. It is appreciated that any selection and/or swipe and/or interaction the first user completes may be logged by the mobile application. In some cases, the resulting log may be associated with at least one of: the first user, the second user, the third user, a fourth user, etc. In other cases, the resulting log may be associated with at least one data store or at least one system component associated with the mobile application.

In some embodiments, the first user may not view any profiles associated with other users (e.g., the second user, the third user, a fourth user, etc.) on the mobile application (e.g., there is no way for the first user to click into the profile of a user while viewing content from the user). Rather, the first user may, according to one embodiment, view any and/or all content associated with a fourth user by swiping through posts associated with the fourth user. In some embodiments, the content associated with the fourth user is organized by second user data associated with the first user (e.g., recent activity data associated with the first user, preferences associated with the first user, prompts the first user has previously responded to, etc.).

For example, according to one embodiment, a first post associated with a third prompt and comprised in the content associated with the fourth user may be presented to the first user first and/or before a second post comprised in the content associated with the fourth user if the first user has also created a post associated with the third prompt. According to another embodiment, a first post comprised in the content associated with the fourth user may be presented to the first user first and/or before a second post comprised in the content associated with the fourth user based on a previous action associated with the first user, and/or an action history associated with the first user.

In some cases, an information card associated with the fourth user may be generated based on information the fourth user has input into the mobile application (e.g., while creating their account, while editing their profile, while adding information to the information tab comprised in their profile, etc.). Furthermore, it is appreciated that the information card associated with the fourth user may be comprised in the content associated with the fourth user (e.g., the first user may be presented with the information card associated with the fourth user while swiping through the posts associated with the fourth user).

In some embodiments, the first user may be prompted to add information to their profile (e.g., a bio, education information, employment information, relationship information, physical information, religion information, political information, pet information, music information, hobby information, lifestyle information, etc.) in order to view similar information associated with the fourth user (e.g., to view religion information associated with the fourth user, the first user must input their own religion information). According to other embodiments, the information card may comprise a paragraph and/or a list and/or bullet points and/or an amalgamation of information generated by the mobile application based on input information associated with the fourth user.

Figure 358:
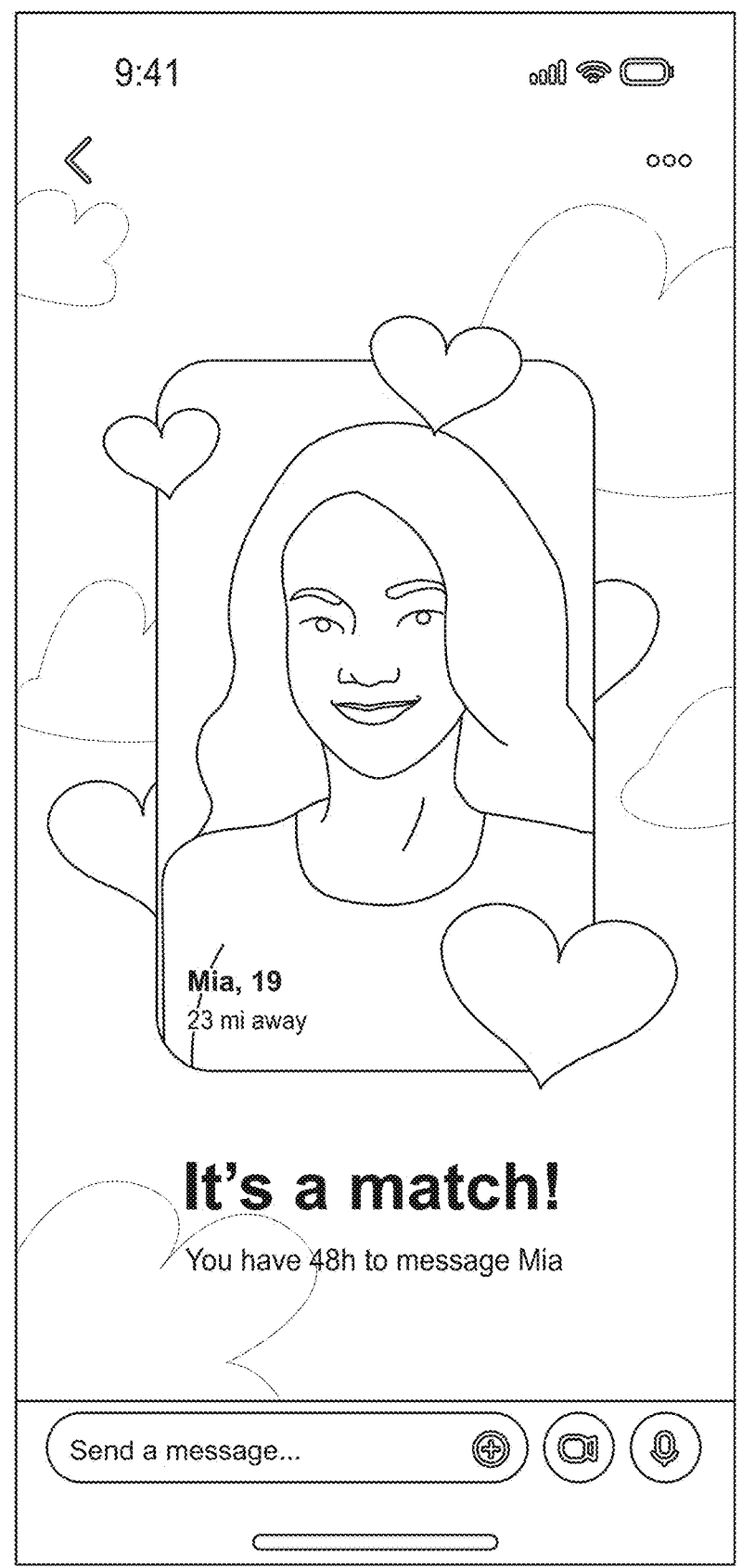

FIG. 358 shows a screen from the mobile application that depicts a match screen for the first user. The match screen may comprise at least one of: a back option, a settings option, at least some data associated with the second user, or at least one message option. In one embodiment, selection of the back option may send the first user to the feed tab (e.g., the screen of FIG. 355). According to another embodiment, selection of the settings option may enable the first user to unmatch the second user, report the second user, block the second user, commit an action associated with the second user, etc. In some cases, the at least some data associated with the second user may comprise at least one of: a name associated with the second user, an age associated with the second user, a school associated with the second user, a location associated with the second user, a distance associated with the second user, a photo associated with the second user (e.g., a clip from the first post associated with the second user, a clip from the third post associated with the second user, a clip from a fourth post associated with the second user, a profile picture associated with the second user, a photo uploaded by the second user, etc.), etc.

It is appreciated that, in one embodiment, the at least one message option may comprise at least one of: a text message option, an attachment option, a video message option, or an audio message option. According to one embodiment, selection of the text message option may enable the user to type out a message using a virtual keyboard. In another embodiment, selection of the attachment option may enable the user to add an attachment (e.g., a photo, a gif, a sticker, etc.). According to yet another embodiment, selection of the video message option may enable the user to record a video message and/or initiate a video call. In still another embodiment, selection of the audio message option may enable the user to record an audio message and/or initiate an audio call. According to some embodiments, sending a message using the at least one message option may generate a chat (e.g., a data chat) associated with the first user.

Figure 359:
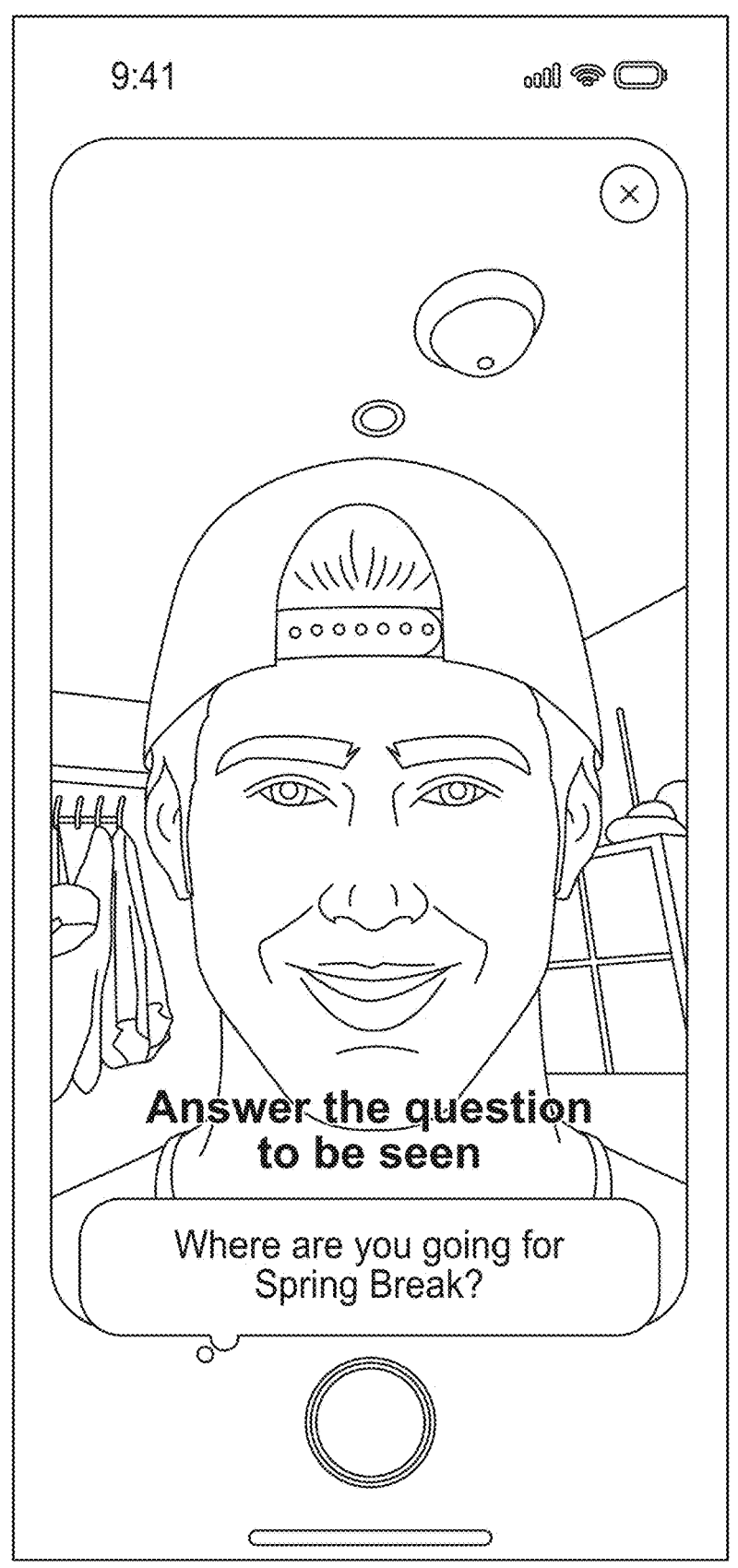

FIG. 359 shows a screen from the mobile application that depicts recording screen for the first user. The recording screen may comprise at least one of: a cancel option, a video, a prompt to which the first user is responding, and a record option. According to some embodiments, selection of the cancel option may send the user to a previous screen (e.g., the feed tab, the messaging tab, the screen of FIG. 355, the screen of FIG. 360, etc.). In other embodiments, the video comprises a real-time (e.g., live) view of the first user as the first user is recording. According to yet other embodiments, the video may comprise at least one of: a flash option, a face indicator, or a recording time. In some cases, the face indicator indicates whether the first user is well positioned while recording the video. According to one embodiment, the recording time may count down a time the first user has left while recording the video. According to another embodiment, the recording time may indicate a time the first user has been recording and/or has to record the video.

According to some embodiments, the prompt to which the first user is responding may be selected. Furthermore, a selection of the prompt to which the first user is responding may update or change the prompt to which the user is responding from a first prompt to a second prompt. The prompt to which the first user is responding may, in some embodiments, be received from the first user, be received from a fourth user, be selected (e.g., randomly, based on user data associated with the first user, etc.) by the mobile application, etc. In one embodiment, the user may hold the record option to begin recording the video. In another embodiment, the user may tap the record option to begin recording the video. In yet another embodiment, the user may tap the record option to stop recording the video.

Upon completion of recording the video, the first user may select a post option or a cancel option. According to some embodiments, selecting the post option adds the video to a profile associated with the first user and/or add the video to a content list to be shown to other users on the mobile application. In other embodiments, selecting the cancel option deletes the video. In some cases, selecting the cancel option may return the first user to a recording screen (e.g., the screen of FIG. 359). In other cases, selecting the cancel option may return the user to a previous screen (e.g., the feed tab, the messaging tab, the screen of FIG. 355, the screen of FIG. 360, etc.).

Figure 360:
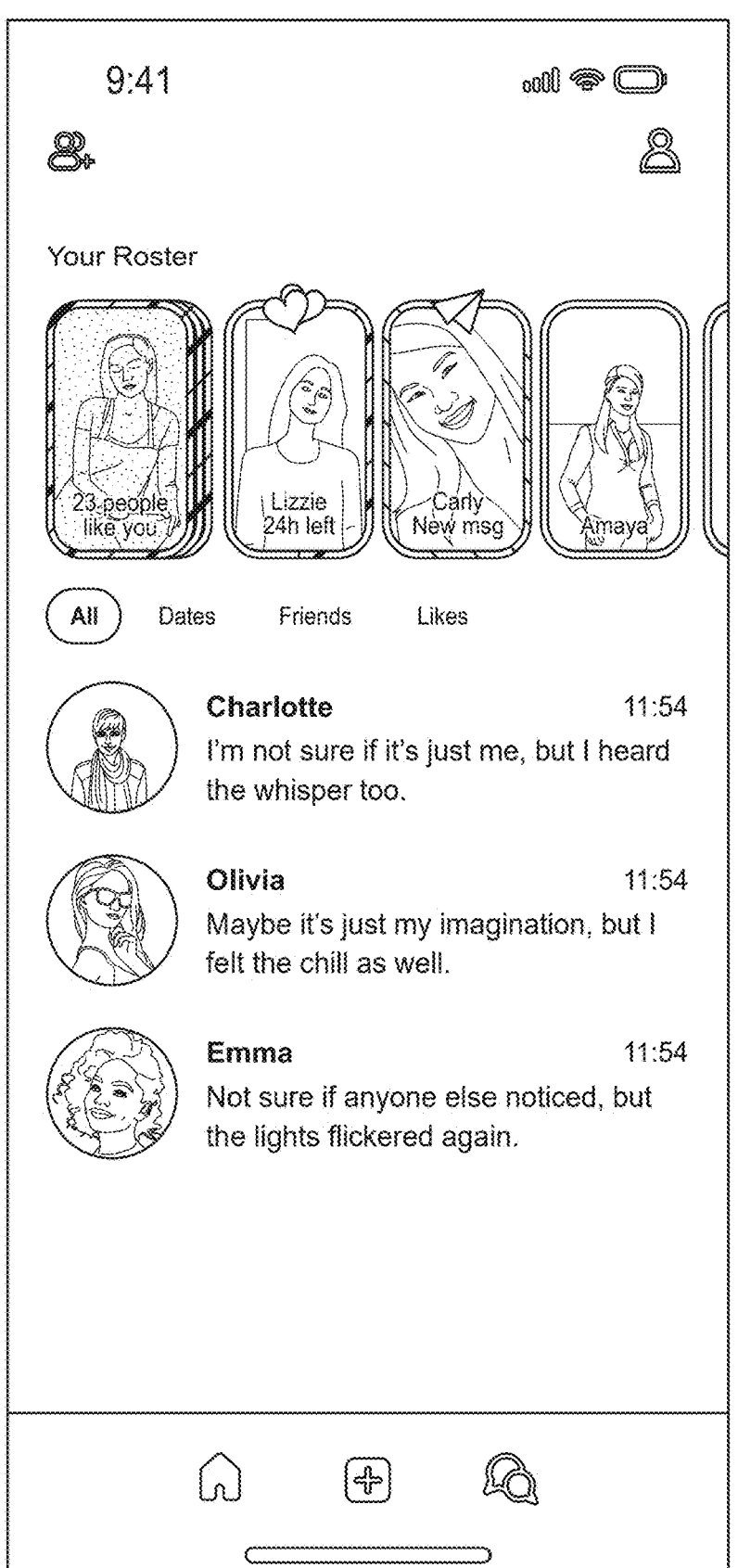

FIG. 360 shows a screen from the mobile application that depicts a messaging tab for the first user. The messaging tab may comprise at least one of: the menu bar, an add friends option, the profile option, the roster associated with the first user, or at least one chat associated with the first user. In some embodiments, selection of the add friends option enables the first user to invite contacts to join the mobile application and/or add contacts already on the mobile application as friends. According to other embodiments, selection of the add friends option enables the first user to create a group chat. In yet other embodiments, the group chat may comprise a name and at least one user. In some cases, the group chat further comprises at least one photo (e.g., at least one photo associated with the at least one user, at least one photo selected by the at least one user, etc.). According to still other embodiments, the group chat, upon creation, may be comprised in the at least one chat associated with the first user.

The at least one chat associated with the first user may comprise at least one of: at least one date chat, at least one friend chat, at least one group chat, or at least one like chat. In one embodiment, the mobile application may enable sorting or filtering the at least one chat based on their categorization (e.g., the first user may view only the at least one date chat). According to another embodiment, the first user may share a first date chat comprised in the at least one date chat and/or a link to the first date chat with a first group chat comprised in the at least one group chat and/or a first friend chat comprised in the at least one friend chat.

A first chat (e.g., a date chat, a friend chat, a like chat, etc.) comprised in the at least one chat may comprise at least one of: the first user, a fourth user, a photo associated with the fourth user, at least one message, and the at least one message option. In some embodiments, the first user and fourth user may have previously matched. In other embodiments, the first user may have previously liked the fourth user. According to one embodiment, a first message comprised in the at least one message may comprise text, a photo, an audio message, a video message, an emoji, a gif, a sticker, etc. In some cases, the first user may have to initiate a computing operation associated with digital exchangeables in order to message the fourth user (e.g., the first user may have to pay to send a message to the fourth user (e.g., if the fourth user has not liked the first user back)). In other cases, the first chat may expire and/or delete after a first time if the first user does not transmit a first message (e.g., interaction) to the fourth user and/or the fourth user does not transmit a second message (e.g., interaction) to the first user. Furthermore, once the first chat has expired, the first user and/or the fourth user may the first user may initiate a computing operation associated with digital exchangeables in order to revive the first chat.

Figure 361:
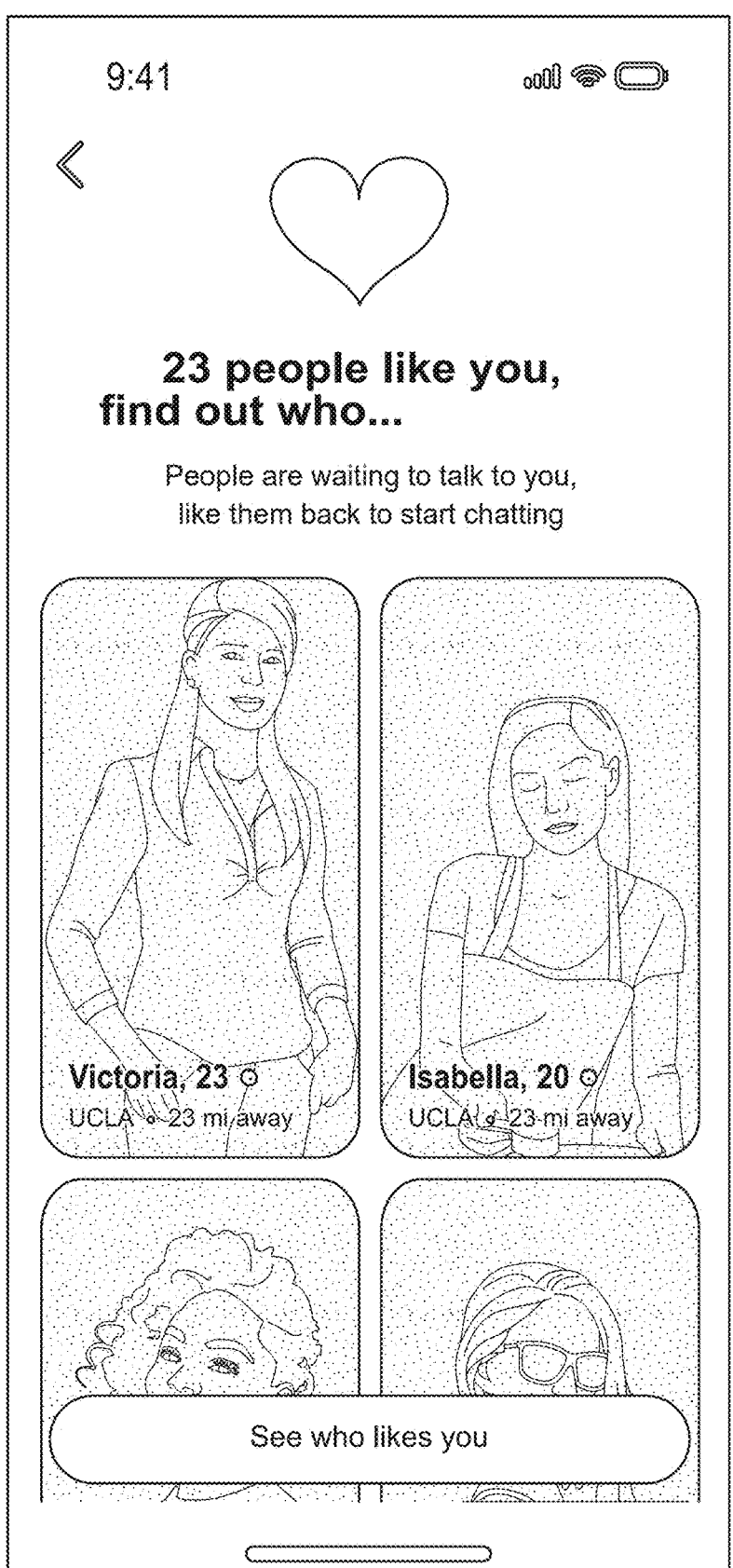

FIG. 361 shows a screen from the mobile application that depicts a likes screen for the first user. The likes screen may comprise at least one of: a back option, at least one user, and a continue option. In some embodiments, selection of the back option may return the first user to a previous screen (e.g., the feed tab, the messaging tab, the screen of FIG. 355, the screen of FIG. 360, etc.). The at least one user, in other embodiments, may comprise at least one user that has liked the first user and/or a post associated with the first user. In some cases, a fifth user comprised in the at least one user may comprise a name associated with the fifth user, an age associated with the fifth user, a location associated with the fifth user, a school associated with the fifth user, a distance associated with the fifth user, a photo (e.g., clipped from a video on the fifth user's profile) associated with the fifth user, etc.

According to one embodiment, the at least one user may be blurred or obscured from view unless or until the first user initiates a computing operation associated with digital exchangeables (e.g., the first user may have to pay to unlock and/or view the at least one user). In one embodiment, selection of the continue option may prompt the user to initiate the computing operation associated with the digital exchangeables. In another embodiment, selection of the continue option may enable the user to view the at least one user.

Figure 362:
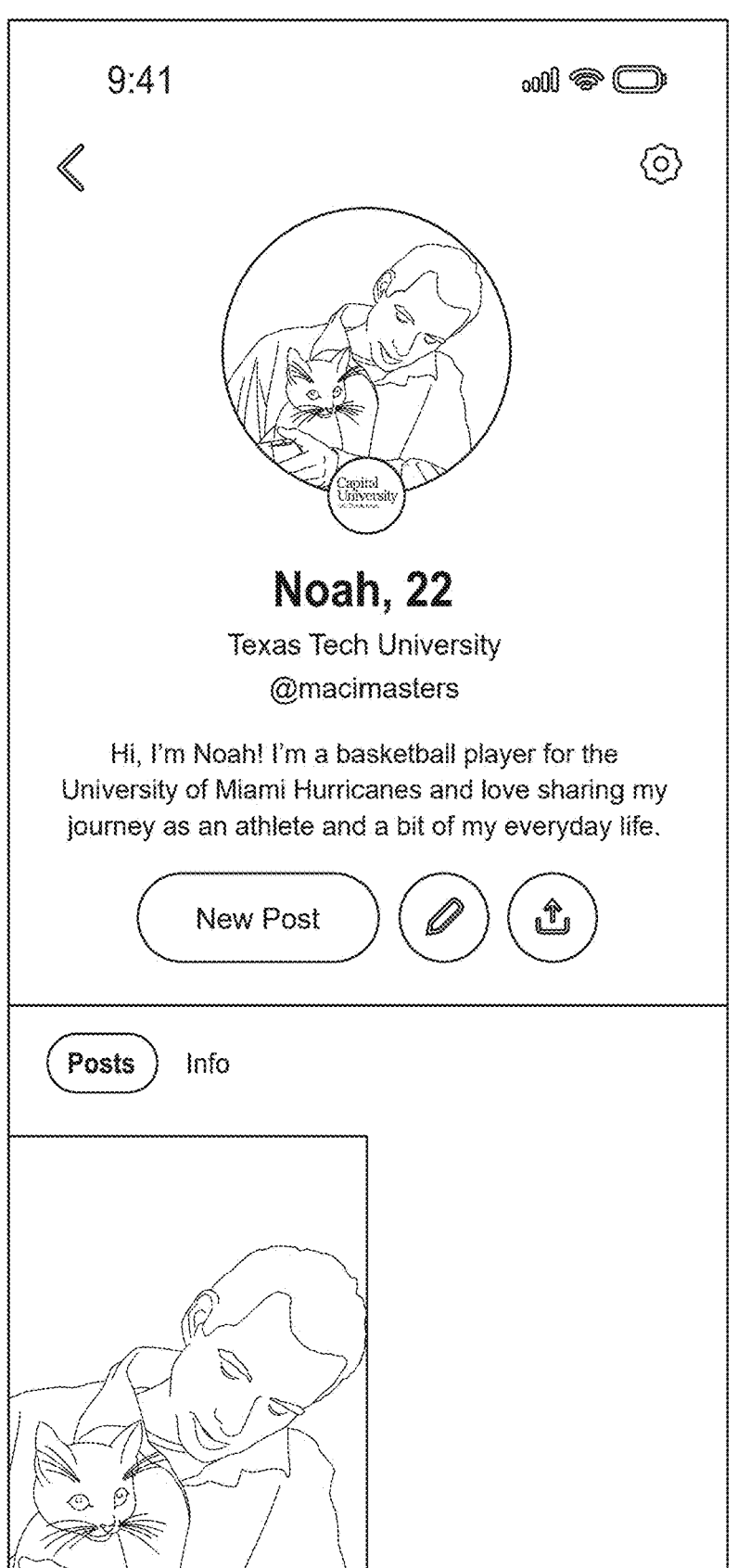

FIG. 362 shows a screen from the mobile application that depicts a profile screen for the first user. The profile screen associated with the first user may comprise at least one of: a back option, a settings option, a profile picture associated with the first user, a name associated with the first user, an age associated with the first user, a username associated with the first user, a location associated with the first user, a school associated with the first user, a distance associated with the first user, a post option, an edit option, a share option, a bio associated with the first user, a posts tab, or an information tab.

In some embodiments, selection of the back option may return the first user to a previous screen (e.g., the feed tab, the messaging tab, the screen of FIG. 355, the screen of FIG. 360, etc.). According to other embodiments, selection of the settings option may enable the user to edit or update at least one setting (e.g., a notification setting, an account setting, a privacy setting, a security setting, a message setting, a preference setting, etc.) associated with the first user's profile. In some cases, the profile picture associated with the first user may be uploaded by the first user. In other cases, the profile picture associated with the first user may be a clip from a post on the first user's profile. Selection of the post option, in one embodiment, may send the user to a recording screen (e.g., the screen of FIG. 359).

According to another embodiment, selection of the edit option may enable the first user to edit and/or update the first user's profile (e.g., edit the name associated with the first user, edit the username associated with the first user, edit the bio associated with the first user, edit information comprised in the information tab, etc.). In yet another embodiment, selection of the share option may enable the first user to save (e.g., to the first user's device or to an application on the first user's device) or send the first user's profile associated with the second user to a friend and/or a contact and/or a group chat internally (e.g., within the mobile application) or externally (e.g., via a messaging application, via a social media application, etc.).

The posts tab may comprise at least one post associated with (e.g., posted by, recorded by, etc.) the first user. The information tab may comprise at least one of: education information associated with the first user, employment information associated with the first user, relationship information associated with the first user, physical information associated with the first user (e.g., height of the first user), religion information associated with the first user, political information associated with the first user, pet information associated with the first user, music information associated with the first user, hobby information associated with the first user (e.g., a sport the first user likes and/or plays, a book the first user likes, a movie the first user likes, a team the first user likes, etc.), lifestyle information associated with the first user (e.g., drinking habits of the first user, smoking habits of the first user, exercise habits of the first user, etc.), or social media information associated with the first user (e.g., a link to a profile of the first user on a social media application).

Figure 363:
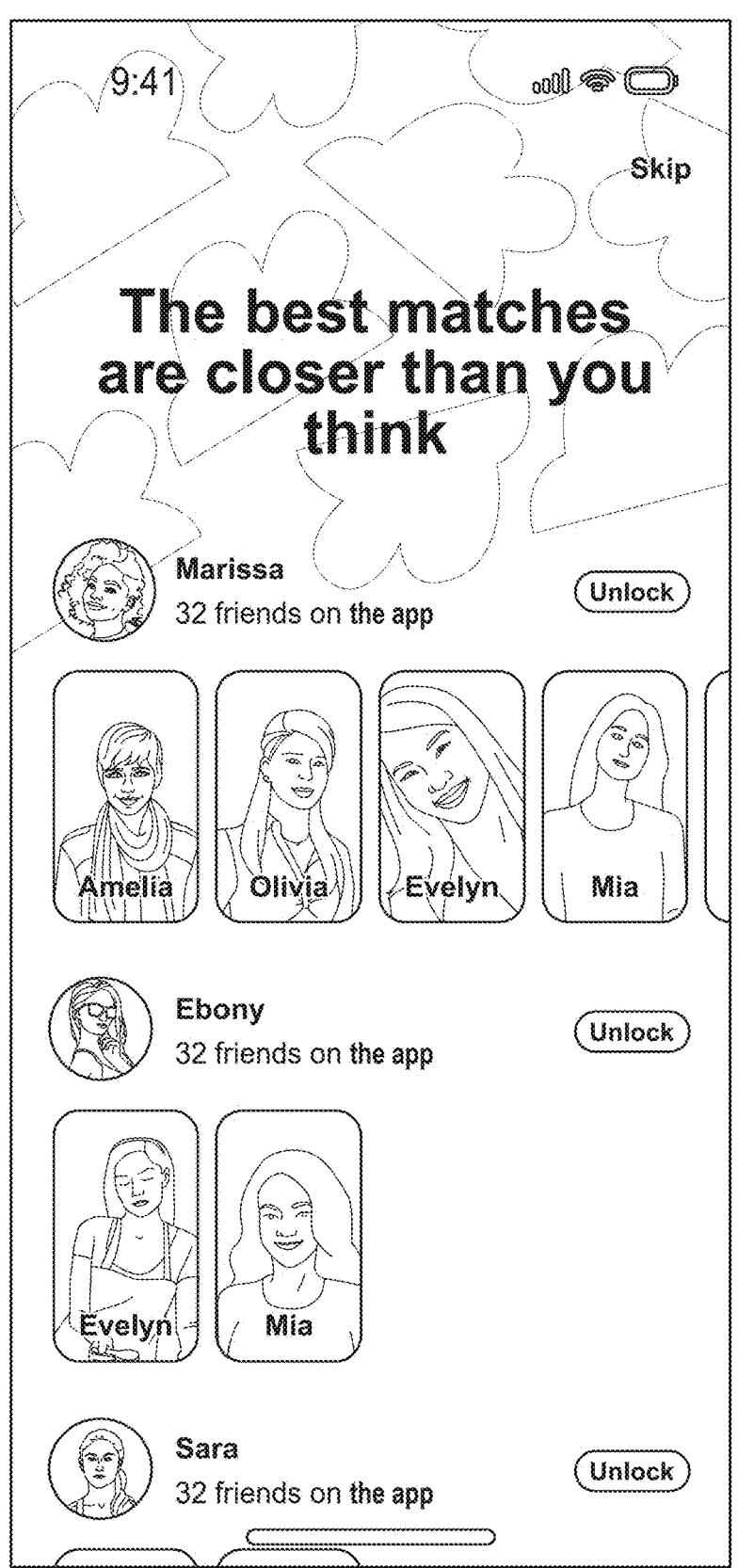

FIG. 363 shows a screen from the mobile application that depicts a friends of friends screen for the first user. The friends of friends screen associated with the first user may comprise a skip option and/or at least one contact. In some embodiments, selection of the skip option may return the first user to a previous screen or send the user to an alternate screen (e.g., the feed tab, the messaging tab, the screen of FIG. 355, the screen of FIG. 360, etc.). According to one embodiment, a first contact comprised in the at least one contact may comprise at least one of: a name associated with the first contact, an image associated with the first contact, an unlock option, or at least one application user. In another embodiment, the first contact does not have an account on the mobile application. In some cases, selection of the unlock option may enable and/or prompt the first user to initiate a computing operation associated with digital exchangeables. In other cases, selection of the unlock option may enable and/or prompt the first user to invite the first contact to join the mobile application.

The first user, in some embodiments, cannot view the at least one application user and/or posts created by the at least one application user unless and/or until the first contact creates an account on the mobile application. In some embodiments, a first application user comprised in the at least one application user has the first contact in a contacts list associated with the first application user (e.g., a contacts application on a mobile device associated with the first application user). According to other embodiments, the first user has the first contact in a contacts list associated with the first user (e.g., a contacts application on a mobile device associated with the first user). It is appreciated that the friends of friends screen may be presented to the first user in the feed tab and/or in the messaging tab and/or while the first user is creating an account on the application, etc. In one embodiment, the first user is incentivized to invite the first contact to join the mobile application so the first user can view the at least one application user and/or the posts created by the at least one application user. According to some embodiments, the at least one application user may be sorted and/or displayed based on preferences associated with the first user and/or an activity history associated with the first user.

Figure 364:

FIG. 364 shows a screen from the mobile application that depicts a second chance screen for the first user. The second chance screen may comprise at least one of: an exit option or at least one second chance user. In some embodiments, selection of the exit option (e.g., a back option, a skip option, etc.) may return the first user to a previous screen or send the user to an alternate screen (e.g., the feed tab, the messaging tab, the screen of FIG. 355, the screen of FIG. 360, etc.). According to one embodiment, the first user has previously disliked or skipped the at least one second chance user. In one embodiment, the at least one second chance user has previously liked the first user. In another embodiment, the at least one second chance user has previously skipped the first user. In yet another embodiment, the at least one second chance user has never seen the first user before.

According to some embodiments, the at least one second chance user has posted additional content. In some cases, the additional content was posted after the first user disliked or skipped the at least one second chance user. In other cases, the additional content was posted before the first user disliked or skipped the at least one second chance user, but the first user has not seen the additional content (e.g., the first user swiped on or made a decision associated with the at least one second chance user prior to viewing the additional content). It is appreciated that the first user may select a first second chance user comprised in the at least one second chance user. In some embodiments, the first user can only select one user comprised in the at least one second chance user. According to other embodiments, selection of the first second chance user may enable the user to view and/or interact with an additional post associated with the first second chance user (e.g., gives the first user a second chance to match and/or like the first second chance user).

Figure 365:
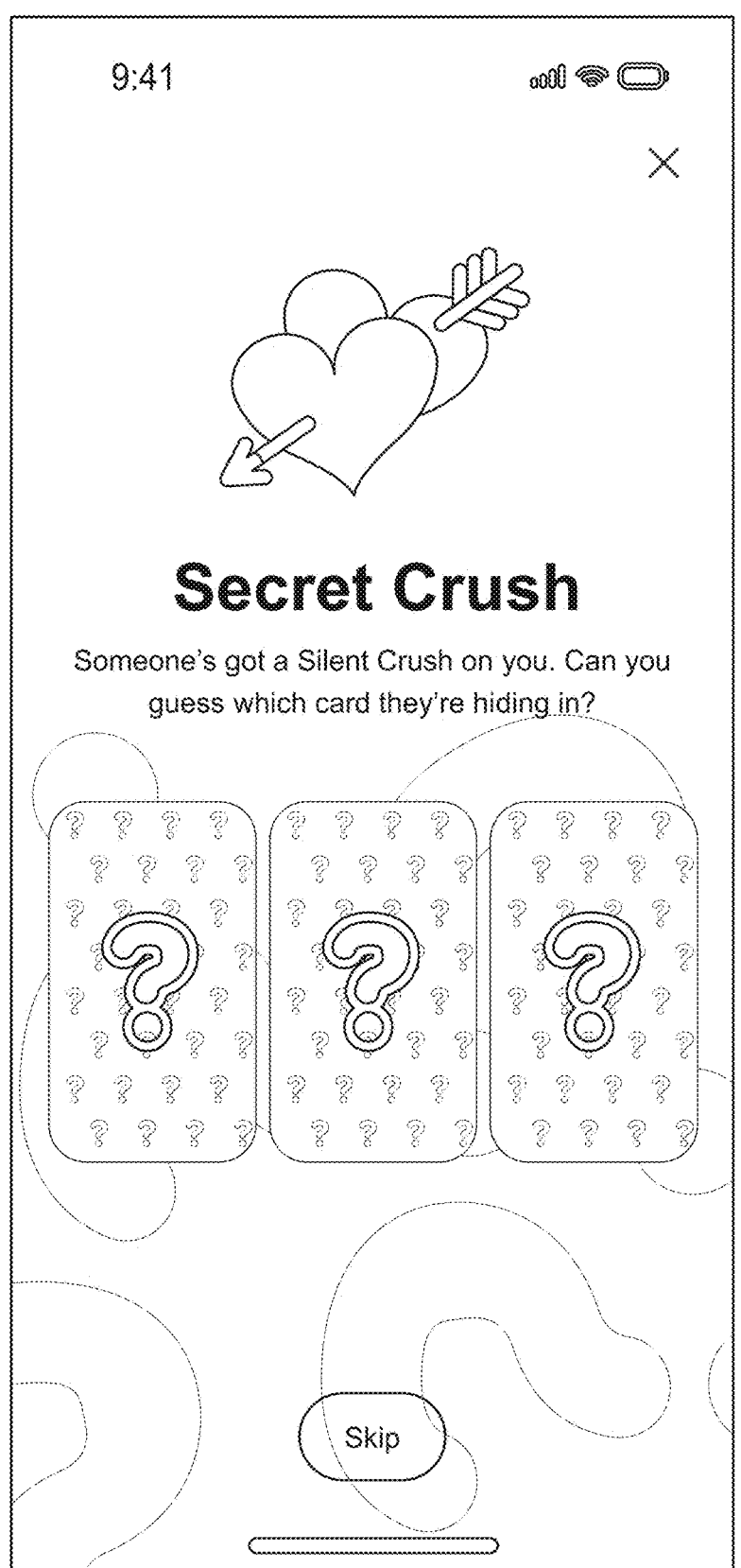

FIG. 365 shows a screen from the mobile application that depicts a secret crush screen for the first user. The secret crush screen may comprise at least one of: an exit option, at least one card, or a skip option. In some embodiments, selection of the exit option may return the first user to a previous screen and/or send the user to an alternate screen (e.g., the feed tab, the messaging tab, the screen of FIG. 355, the screen of FIG. 360, etc.). According to other embodiments, selection of the skip option may return the first user to a previous screen and/or send the user to an alternate screen (e.g., the feed tab, the messaging tab, the screen of FIG. 355, the screen of FIG. 360, etc.).

In one embodiment, the first user can select a first card comprised in the at least one card. In some cases, selection of the first card may initiate display of a post associated with a first crush user. In other cases, selection of the first card may initiate display of a secret crush user screen associated with the first crush user (e.g., the screen of FIG. 366). According to some embodiments, selection of a second card comprised in the at least one card may initiate display of a post associated with a second crush user. In other embodiments, selection of the second card comprised in the at least one card may initiate display of the secret crush user screen associated with the second crush user (e.g., the screen of FIG. 366). According to one embodiment, a crush user (e.g., the first crush user, the second crush user, etc.) comprises a user that has liked the first user.

Figure 366:

FIG. 366 shows a screen from the mobile application that depicts a secret crush user screen for the first user. The secret crush user screen may comprise at least one of: an exit option or a post associated with a secret crush user. In some embodiments, selection of the exit option may return the first user to a previous screen and/or send the user to an alternate screen (e.g., the feed tab, the messaging tab, the screen of FIG. 355, the screen of FIG. 360, etc.). According to one embodiment, the post associated with the secret crush may begin playing (e.g., automatically, after a tap by the first user, after a first time, etc.) upon selection of the first card and/or the second card comprised in the at least one card. In some cases, the first user may like the secret crush user or dislike the secret crush user (e.g., by swiping at least partially horizontally on the post associated with the secret crush user). In other cases, the first user may view at least one additional post associated with the secret crush user (e.g., by swiping at least partially vertically on the post associated with the secret crush user).

Figure 367:
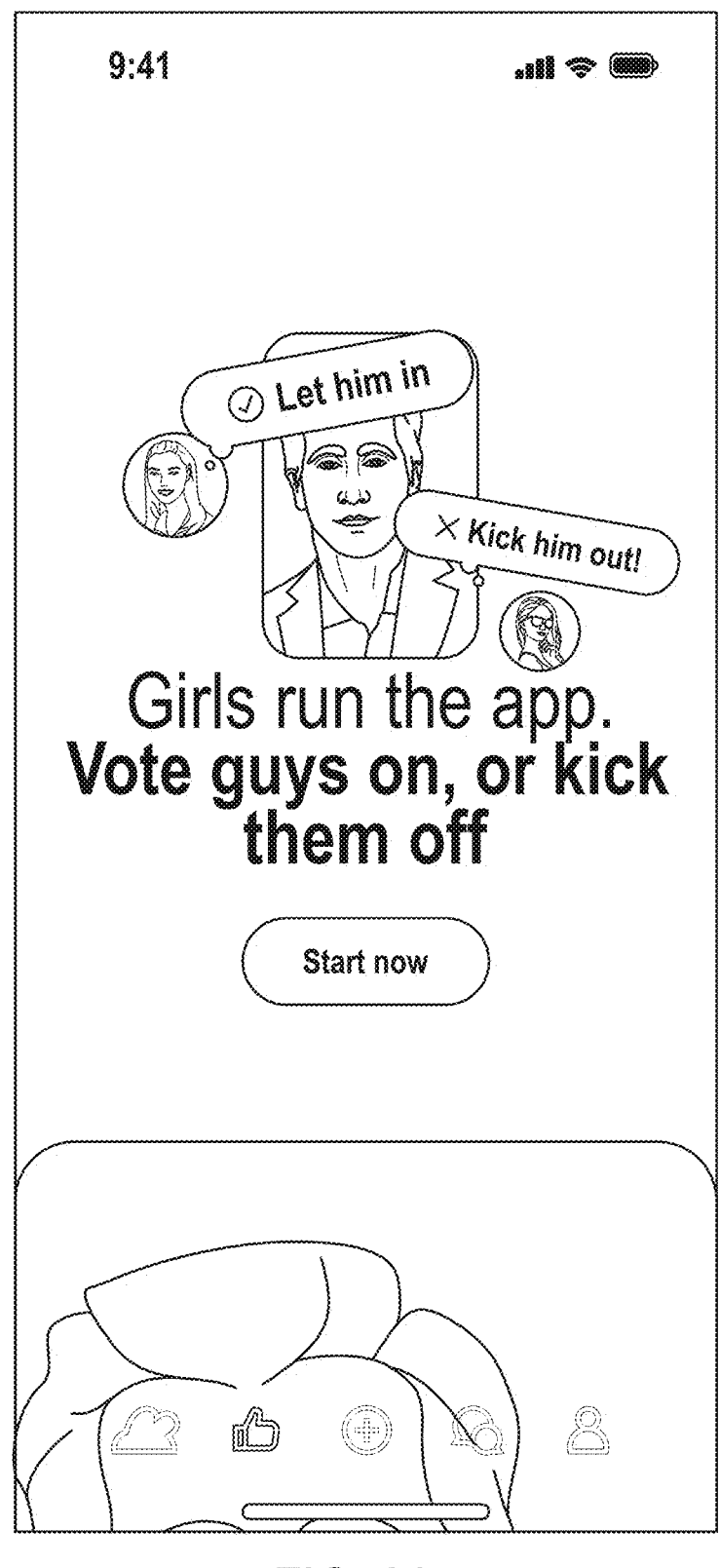

FIG. 367 shows a screen from the mobile application that depicts a voting tab introduction screen for the first user. The voting tab introduction screen may comprise at least one of: a menu bar, a start option, or a dismiss option. In some embodiments, the menu bar comprises at least one of: a feed tab (e.g., a home tab) option, a voting tab option, a messaging tab (e.g., a notifications tab, a likes tab, a conversation tab, etc.) option, a content creation tab option, or a profile tab option. In one embodiment, selection of the feed tab option may send the user to a feed screen (e.g., the screen of FIG. 354, the screen of FIG. 355, etc.). In another embodiment, selection of the messaging tab option may send the user to a messaging screen (e.g., the screen of FIG. 360, etc.). According to one embodiment, selection of the voting tab option may send the user to a voting screen (e.g., the screen of FIG. 369, etc.). In yet another embodiment, selection of the content creation tab option may send the user to a recording screen (e.g., the screen of FIG. 359, etc.). In still another embodiment, selection of the profile tab option may send the user to a profile screen associated with the user (e.g., the screen of FIG. 362).

Turning back to FIG. 367, the user may select the start option. In some cases, selecting the start option may send the user to an instructions screen (e.g., the screen of FIG. 368, etc.). In other cases, selecting the start option may send the user to a voting tab screen (e.g., the screen of FIG. 369, etc.). It is appreciated that, according to some embodiments, the voting tab introduction screen may comprise a pop-up (e.g., a pop-up on the feed tab, a pop-up on the messaging tab, etc.). In other embodiments, the first user may select the dismiss option. According to yet other embodiments, selecting the dismiss option may send the user to a previous screen accessed by the first user (e.g., the screen of FIG. 354, the screen of FIG. 360, etc.). In still other embodiments, the voting tab introduction screen may be comprised in the voting tab (e.g., at a first time when the first user selects and/or accesses the voting tab).

Figure 368:
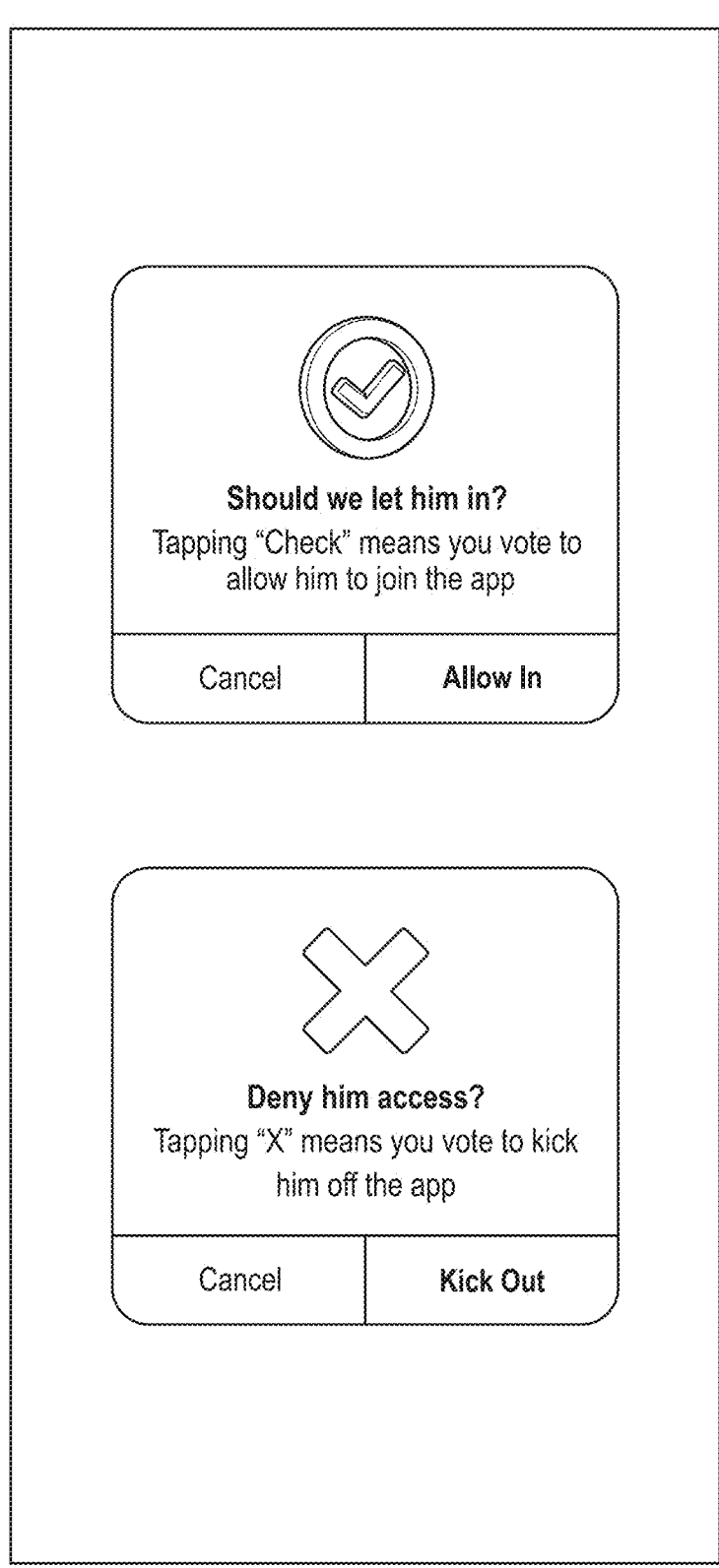

FIG. 368 shows a screen from the mobile application that depicts a voting tab instruction screen for the first user. The voting tab instruction screen may comprise at least one of: the menu bar, at least one instruction, a continue option, or a dismiss option. In one embodiment, the at least one instruction is associated with the voting tab (e.g., what the first user is voting on in the voting tab, how to operate the voting tab, etc.). According to some embodiments, the first user may select the continue option. In some cases, selecting the continue option may send the user to a voting tab screen (e.g., the screen of FIG. 369, etc.). In other embodiments, the first user may select the dismiss option. In other cases, selecting the dismiss option may send the first user to a previous screen accessed by the first user (e.g., the screen of FIG. 354, the screen of FIG. 360, etc.).

Figure 369:
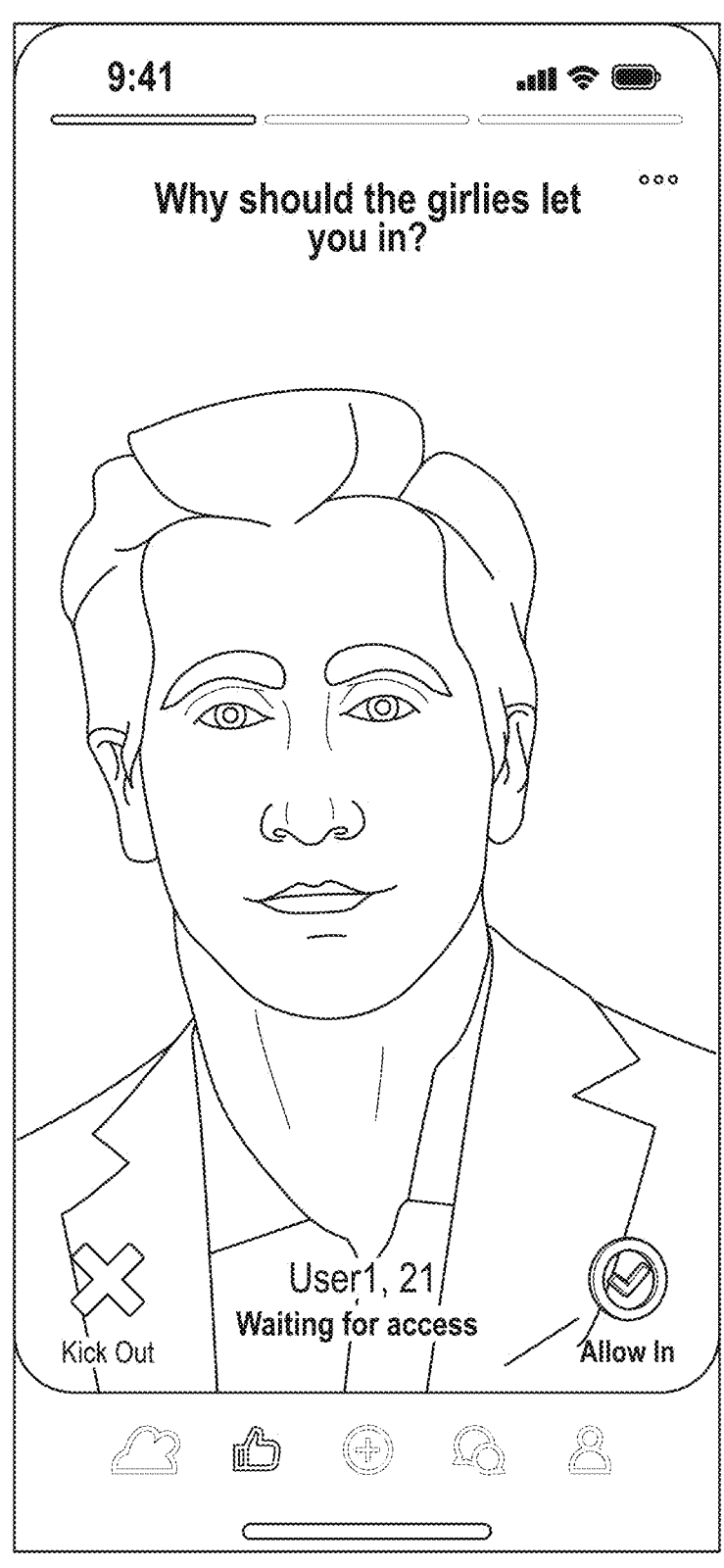

FIG. 369 shows a screen from the mobile application that depicts a voting tab screen for the first user. The voting tab screen may comprise at least one of: the menu bar, a first post associated with a second user, a settings option, or at least one voting option. In some embodiments, the first post associated with the second user comprises a first prompt and/or a first video and/or first data associated with the second user. According to other embodiments, the first data associated with the second user comprises at least one of: a name associated with the second user, an age associated with the second user, a location associated with the second user, a status associated with the second user, etc.

In yet other embodiments, the first video is associated with the first prompt (e.g., the first video comprises a response to the first prompt). It is appreciated that the first user may select the settings option. According to still other embodiments, selecting the settings option may enable the first user to select and/or edit at least one option associated with the first post associated with the second user and/or associated with the second user (e.g., at least one share option, a report option, a block option, etc.). In one embodiment, the at least one voting option comprises an in option and an out option. It is appreciated that interacting with a user on the mobile application may comprise at least one of:

voting on the user, viewing the user, swiping on the user, liking the user, disliking the user, skipping the user, matching with the user, messaging with the user, chatting with the user, etc. (e.g., interacting with a user does not always comprise communicating directly with the user).

In some cases, the first user may select the in option (e.g., a positive option). According to one embodiment, the voting tab comprises a first content list. In another embodiment, selecting the in option may add the first post associated with the second user to a second content list (e.g., an alternate voting tab, a feed tab, etc.). According to yet another embodiment, selecting the in option enables the second user to interact with and/or execute an action associated with the first user and/or at least one other user. In other cases, the first user may select the out option (e.g., a negative option). In some embodiments, selecting the out option may remove the first post associated with the second user from the first content list or a second content list (e.g., an alternate voting tab, a feed tab, etc.). According to other embodiments, selecting the out option may not enable (e.g., prevent, prevent for a first time, etc.) the second user to interact with and/or execute an action associated with the first user and/or at least one other user.

It is appreciated that not enabling the second user to interact with and/or execute the action associated with the first user and/or the at least one other user comprises at least one of: removing the first post associated with the second user from a content list associated with the first user, removing the first post associated with the second user from a content list associated with multiple users, removing the first post associated with the second user from a content list associated with the first user, removing the first user from the mobile application (e.g., indefinitely, for a first time period, etc.), removing posts associated with the second user from a content list and/or all content lists, preventing the second user from creating additional posts, or not adding posts associated with the second user to a content list.

According to one embodiment, an at least partially vertical swipe (e.g., a transactional interaction) on the voting tab screen may refresh or reload the page. In another embodiment, an at least partially vertical swipe may send the first user to a second voting tab screen (e.g., a voting tab screen comprising a second post associated with a third user). According to yet another embodiment, an at least partially horizontal swipe (e.g., a transactional interaction) on the voting tab screen may select the in option. In still another embodiment, an at least partially horizontal swipe may select the out option.

Figure 370:
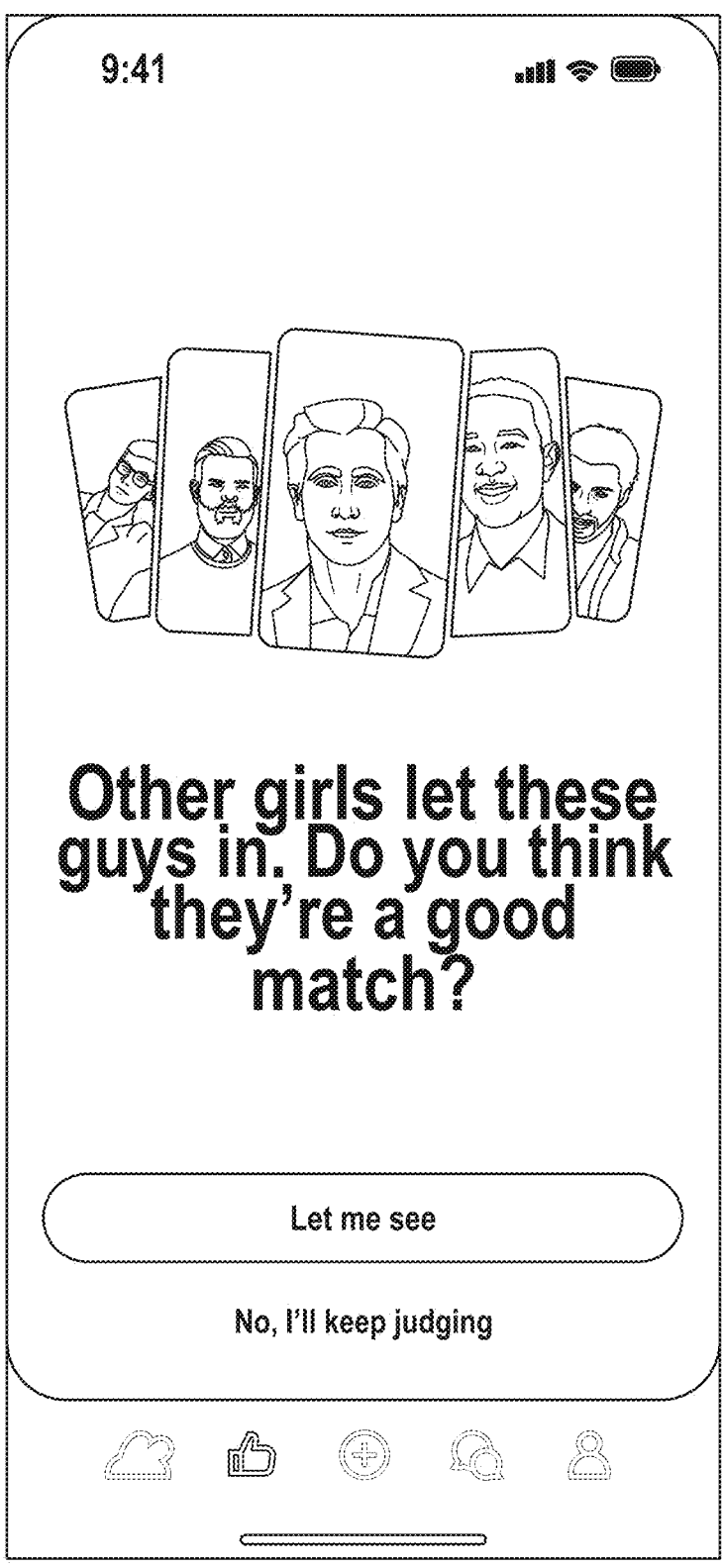

FIG. 370 shows a screen from the mobile application that depicts a feed tab option screen for the first user. The feed tab option screen may comprise at least one of: the menu bar, an accept option, a decline option, or a dismiss option. In some embodiments, the first user may select the accept option. According to other embodiments, selecting the accept option may direct and/or send the first user to the feed tab (e.g., an alternate content list). In yet other embodiments, the first user may select the decline option. According to still another embodiment, selecting the decline option may direct and/or send the first user to a previous screen accessed by the first user (e.g., the screen of 369, the voting tab, etc.). In some embodiments, the first user may select the dismiss option. According to other embodiments, selecting the dismiss option may send the first user to a previous screen accessed by the first user (e.g., the screen of FIG. 369, the voting tab, etc.).

Figure 371:
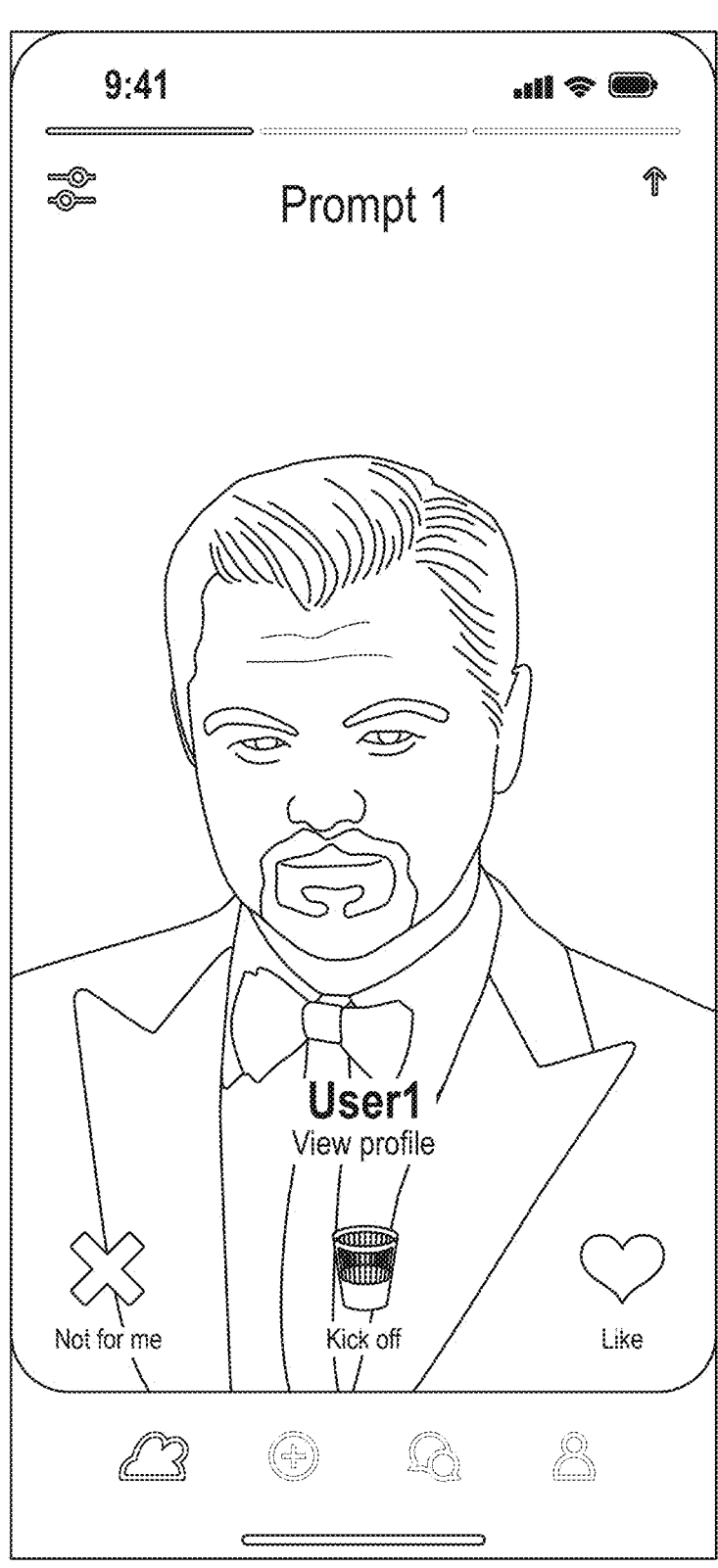

FIG. 371 shows a screen from the mobile application that depicts an integrated voting feed tab screen for the first user.

The integrated voting feed tab screen may comprise at least one of: the menu bar, at least one post associated with a second user, a filter option, a settings option, or at least one interaction option. In some embodiments, the at least one post associated with the second user comprises at least one prompt and/or at least one video and/or data associated with the second user. According to other embodiments, the data associated with the second user comprises at least one of: a name associated with the second user, an age associated with the second user, a location associated with the second user, a status associated with the second user, etc.

In yet other embodiments, the at least one video is associated with the at least one prompt (e.g., a first video comprised in the at least one video comprises a response to a first prompt comprised in the at least one prompt). It is appreciated that the first user may select the filter option. In one embodiment, selecting the filter option enables the first user to edit at least one filter (e.g., an age filter, a location filter, a gender filter, etc.) associated with a content list (e.g., the feed tab). It is further appreciated that the first user may select the settings option.

According to still other embodiments, selecting the settings option may enable the first user to select at least one option associated with the at least one post associated with the second user and/or associated with the second user (e.g., at least one share option, a report option, a block option, etc.). According to another embodiment, the at least one share option may comprise an option to save (e.g., to the first user's device or to an application on the first user's device) or send the at least one post associated with the second user to a friend and/or a contact and/or a group chat internally (e.g., within the mobile application) or externally (e.g., via a messaging application, via a social media application, etc.).

In one embodiment, the at least one interaction option comprises at least one of: a like option, a dislike option, or an out option. In some cases, the first user selecting the like option results in a match (e.g., if the second user has already liked the first user). If selection of the like option results in a match, it may send the first user to a match screen (e.g., the screen of FIG. 358). In other cases, selecting the like option may initiate display of a new post associated with a third user. According to some embodiments, the second user may be notified if and/or when the first user likes the second user. According to one embodiment, selecting the dislike option may initiate display of the new post associated with the third user.

In yet other cases, the first user may select the out option (e.g., a kick out option). In some embodiments, selecting the out option may remove the at least one post associated with the second user from the first content list or a second content list (e.g., the feed tab, a voting tab, an alternate feed tab, etc.). According to other embodiments, selecting the out option may not enable the second user to interact with and/or execute an action associated with the first user and/or at least one other user (e.g., may prevent the second user from interacting with users and/or matching with users and/or executing actions associated with users, etc., may prevent the second user from interacting with users and/or matching with users and/or executing actions associated with users, etc. for a first time, etc.). In yet other embodiments, selecting the out option may send the first user to a confirmation screen (e.g., the screen of FIG. 372).

According to one embodiment, an at least partially vertical swipe (e.g., a transactional interaction) on the voting tab screen may refresh or reload the page. In another embodiment, an at least partially vertical swipe may send the first user to a second feed screen (e.g., a screen comprising a new post associated with a third user). According to yet another embodiment, an at least partially horizontal swipe (e.g., a transactional interaction) on the feed tab screen may select the like option. In still another embodiment, an at least partially horizontal swipe may select the dislike option. According to another embodiment, an at least partially horizontal swipe may display a next post (e.g., content) comprised in the at least one post associated with the second user. It is appreciated that the at least one post may comprise at least one of: at least one video, at least one image, data, text, etc.

In yet another embodiment, a tap on and/or selection of the at least one post may display the next post comprised in the at least one post associated with the second user. It is appreciated that the first post comprised in the at least one post may begin playing automatically (e.g., at least partially automatically). It is further appreciated that the next post comprised in the at least one post may begin playing automatically upon completion of the first post comprised in the at least one post.

Figure 372:
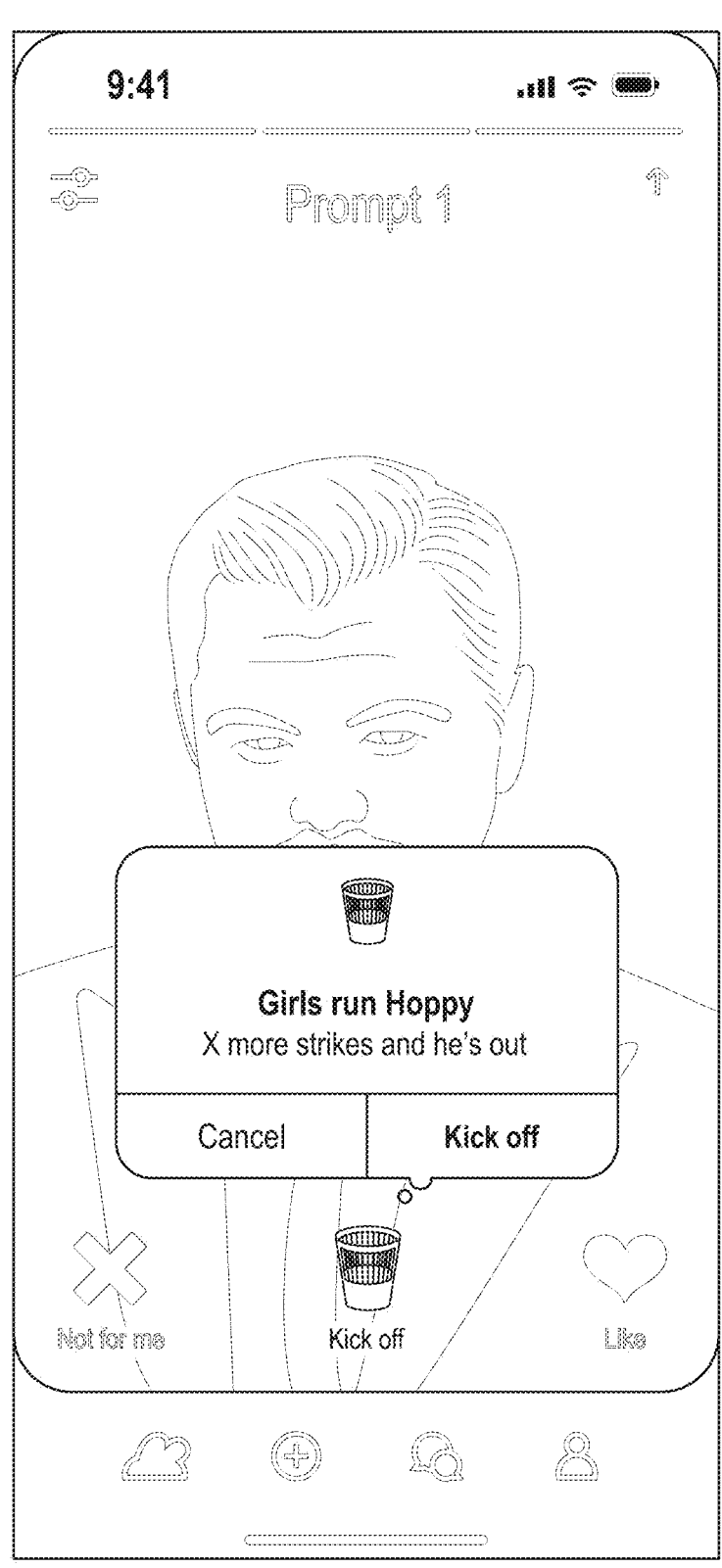

FIG. 372 shows a screen from the mobile application that depicts an off vote confirmation screen for the first user. The off vote confirmation screen may comprise at least one of: a message, a cancel option or a proceed option. In some cases, the message comprises a number of votes associated with the proceed option. In other cases, the message comprises a number of votes associated with removing the second user from the mobile application and/or the feed tab and/or a content list, etc. It is appreciated that the first user may select the cancel option. In one embodiment, selecting the cancel option sends the first user to a previous screen accessed by the first user (e.g., the screen of FIG. 371, the feed tab, etc.). It is further appreciated that the first user may select the proceed option. According to another embodiment, selecting the proceed option may initiate display of a new post associated with a third user on the feed tab.

In some embodiments, the various features described in this disclosure can be used for a dating/friends application. A first user or User 1 (e.g., a man or a person of any other gender(s)) accesses the mobile application, and a second user or User 2 (e.g., a woman or a person of any gender(s)) access the mobile application (e.g., at the same time or at different times). User 1 matches or connects with User 2 based on preference(s) established by User 1 and/or User 2 (e.g., User 2 shows up in User 1's stack or list, or vice versa). User 1's profile information (e.g., partial user profile information, not full user profile information, etc.) is transmitted to User 2 or is viewable on User 2's mobile device. User 1's profile information (e.g., partial user profile information, not full user profile information) is transmitted to User 3 (e.g., a man, a woman, a person of any gender(s)) or is viewable on User 3's mobile device. User 2's profile information (e.g., partial user profile information, not full user profile information) is transmitted to User 4 (e.g., a man, a woman, a person of any gender(s)) or is viewable on User 4's mobile device. User 1's visual representation (not video, in some embodiments) is transmitted to User 2 and/or User 3 or is viewable on each of their mobile devices. In some embodiments, visual representation, as used in this disclosure, may mean a blurred/altered image; alternatively it can mean an unaltered image. User 2's visual representation (not video, in some embodiments) is transmitted to User 1 and User 4 or is viewable on each of their mobile devices.

An option for User 1 is provided on the mobile application to record and send an audio message to User 2. User 1 sends an audio message of limited duration to User 2. The audio message is added to User 2's waitlist, which includes users that have sent audio messages (e.g., during a period such as a day, a week, etc.) to User 2. User 2 receives a notification of audio message receipt (e.g., for the audio message from User 1). User 2 plays the audio message on User 2's mobile device, without the audio message being broadcasted to User 3 or User 4 who access the mobile application either at the same time as or at a different time from the time of access of the mobile application by User 2. During or after playing the audio message, User 2 can execute an action with regard to User 1's profile or audio message (e.g., "liking" User 1's profile or audio message). In some embodiments, this action triggers further activations or options for User 2 to interact with User 1's profile (e.g., view unblurred photo/image of User 1, view portion of User 1's profile (e.g., additional photos/images/videos or text), option to send a text message to User 1, option to send an audio message to User 1, option to have an audio conversation (e.g., of a limited duration) with User 1, etc.). In some embodiments, at the time of matching User 1 and User 2 (e.g., they show up in each other's stack/list based on preferences of User 1 and/or User 2), User 1's photo/image may be blurred or not visible to User 2, and User 2's photo/image may be blurred or not visible to User 1. In some embodiments, any instance of photo described herein may be replaced with any image, moving image, video, or visual representation, as described in this disclosure.

User 1 is presented with option to record and send an audio message of limited duration to User 2 in response to a prompt (e.g., icebreaker question) on User 2's profile or in response to User 1's action on User 2's profile (e.g., "liking" a box (e.g., photo/image, comment, user profile element, etc.)). In some embodiments, User 1 has to "like" User 2's profile (or portion of User 2's profile such as photo/image or comment) for the prompt to show up on User's 1 mobile application interface. The prompt may be in the form of an audio or text question. In some embodiments, User 1 may need to answer multiple prompts, and multiple audio message responses are sent together to User 2. Any feature described with respect to one user may be applied to or implemented for any other user described in this disclosure.

User 1's photo/image or a portion of User 1's profile remains blurred/not visible during or after playing of the audio message by User 2. User 1's photo/image or a portion of User 1's profile turns visible during or after playing of the audio message by User 2 in response to an action executed by User 2 (e.g., "liking" the audio message or "liking" User 1's profile). "Liking" may refer to selecting a "Like" option on a user interface of the mobile application. User 2 has an option of "liking" or otherwise interacting with User 1's audio message or profile which leads to User 1 and User 2 being able to view each other's profiles, exchange text messages, exchange audio messages, have an audio conversation (e.g., of a limited duration), etc. User 1 and User 2 may not be "on" the mobile application at the same time. User 2 can select an option on the mobile application to "dislike" the audio message. This returns User 2 to a main page of audio messages or profiles; alternatively, the next profile (e.g., who sent an audio message to User 2) in the stack/list/waitlist shows up with an option to play the audio message. By disliking the audio message, User 2 cannot see User 1's profile (or portion of profile), unblurred version of photo/image on User 1's profile, or initiate or conduct an audio conversation with User 1.

User 2 can reply (e.g., by sending a text or audio message) to the audio message (e.g., User 1's audio message) without "liking" the audio message. If User 2 does this, User 2 may not be able to view User 1's profile (or portion of profile), view unblurred version of photo/image of User 1, or initiate an audio conversation with (and/or send an audio message to) User 1. At the time of matching (e.g., between User 1 and User 2), at least one portion of User 1's profile is blurred/not visible/visible to User 2. At the time of matching (e.g., between User 1 and User 2), at least one portion of User 2's profile is blurred/not visible/visible to User 1. At the time of matching, User 1's photo is blurred/not visible/visible to User 2. At the time of matching, User 2's photo is blurred/not visible/visible to User 1. User 2 or User 1 may have activated an option of receiving/sending audio messages or initiating/receiving invitations/initiations of audio conversations on the mobile application. Users can read transcription of audio messages which are generated either prior to or upon playing the audio messages.

In some embodiments, a visual representation can mean an altered photo. In some embodiments, the audio message may be blocked (e.g., not delivered to the recipient) based on content of the audio message (for blocking offensive content). Liking the audio message triggers further activations or options to interact with User 1's profile (e.g., view unblurred photo of User 1, view portion of User 1's profile (e.g., additional photos or text), option to send text message to User 1, option to send audio message to User 1, option to have an audio conversation with User 1, etc.). In some embodiments, a visual representation can mean just text (e.g., name of user only). In some embodiments, User 1 accesses the mobile application at a first time and User 2 accesses the mobile application at a second time different from the first time. In some embodiments, audio messages can be downloaded or exported outside the mobile application. In some embodiments, any visual representation described herein is part of a user profile established by the user.

In some other embodiments, User 1 accesses the mobile application and User 2 also accesses the mobile application, either at the same time or at a different times. User 1 matches with User 2 based on preference(s) established by User 1 and/or User 2. User 1's profile information (e.g., partial profile information, not full user profile information, etc.) is transmitted to User 2. User 2's profile information (e.g., partial profile information, not full user profile information, etc.) is transmitted to User 1. User 1's profile information (e.g., partial user profile information, not full user profile information) is transmitted to User 3. User 2's profile information (e.g., partial user profile information, not full user profile information) is transmitted to User 4. User 1's visual representation (not video, in some embodiments) is transmitted to User 2 and/or User 3. In some embodiments, visual representation may mean a blurred/altered photo (or just text); alternatively it can mean an unaltered photo. User 2's visual representation (not video, in some embodiments) is transmitted to User 1 and User 4. User 1 and User 2 can start an audio conversation (e.g., of limited duration), without the audio conversation being broadcasted to User 3 and User 4. User 3 can see User 1's visual representation (e.g., in User 3's stack/list based on User 3's preference(s) or settings at least partially matching with User 1's preference (s) or settings, or vice versa) when User 1 and User 2 are having an audio conversation. User 4 can see User 2's visual representation (e.g., in User 4's stack/list based on User 4's preference(s) or settings at least partially matching with User 2's preference(s) or settings, or vice versa) when User 1 and User 2 are having an audio conversation. During or after the audio conversation, User 2 can execute an action with regard to User 1's profile or audio message (e.g., "liking" User 1's profile or audio conversation/message) and User 1 can execute a similar action with regard to User 2's profile or audio conversation/message. This action triggers further selectable activations or options to interact (e.g., for a limited period) with User 1's profile (e.g., view unblurred photo/image of User 1, view portion of User 1's profile (e.g., additional photos or text), option to send text message to User 1, option to send audio message to User 1, option to have an audio conversation with User 1, etc.). In some embodiments, both User 1 and User 2 will need to like each other's profile or audio conversation/message or these additional activations/options to be available to each user. For example, both User 2 will need to like User 1 and User 1 will need to like User 2 for User 2 to receive selectable activations or options to interact (e.g., for a limited period) with User 1's profile (e.g., view unblurred photo/image of User 1, view portion of User 1's profile (e.g., additional photos or text), option to send text message to User 1, option to send audio message to User 1, option to have an audio conversation with User 1, etc.)

In some embodiments, a speaker in an audio conversation may be able to show visual stimuli (e.g., photo or video) to the listeners when talking about a particular subject (e.g., as part of a learning talk). The visual stimuli may be presented on the mobile application user interfaces or screens (e.g., in a window) of the speakers and listeners. Speakers (e.g., those with certain control permissions) may be able to modify the visual stimuli but listeners may not be able to modify the visual stimuli. The size and placement of the visual stimuli on the mobile application user interface may be modified as needed or customized by each listener. This visual stimuli is different from the speaker's visual representation. In this way, the speaker is able to speak in reference to a picture, chart, graph, new article, video (e.g., recorded or live) without having to change the speaker's visual representation to that visual stimuli and without having to refer to a source outside the mobile application. In some embodiments, a link can be used to fill up the area of the visual stimuli such that the content at the link is visible in the visual stimuli area or window. In other embodiments, the speaker may upload a photo or video in the visual stimuli area or window. In some embodiments, at least one of the speaker and the listener may be able to interact with the visual stimuli such that the presentation of the visual stimuli changes for other speakers or listeners. In some embodiments, a speaker may freestyle draw or write in the area of the visual stimuli such that the speaker's input is displayed, in substantially real-time, on the listeners' user interfaces.

In some embodiments, methods, systems, and computer program products are provided for establishing and broadcasting communication between users. An exemplary method comprises: determining, using one or more computing device processors, a first user accesses a mobile application on a first mobile device of the first user; determining, using the one or more computing device processors, a second user accesses the mobile application on a second mobile device of the second user; selecting, using the one or more computing device processors, the first user and the second user for participating in an audio conversation based on at least first user information associated with the first user and second user information associated with the second user; initiating, using the one or more computing device processors, the audio conversation between the first user and the second user; broadcasting, using the one or more computing device processors, the audio conversation to a third user who accesses the mobile application on a third mobile device of the third user; transmitting, to the third mobile device for visual display, during the audio conversation, on a user interface of the mobile application on the third mobile device, a first visual representation of the first user not comprising a first photographic or video image of the first user; and transmitting, to the third mobile device for visual display, during the audio conversation, on the user interface of the mobile application on the third mobile device, a second visual representation of the second user not comprising a second photographic or video image of the second user.

In some embodiments, the first user information comprises at least one of an interest; the first visual representation; profile information; listening history on the mobile application; speaking history on the mobile application; usage history on the mobile application; a fourth user that follows the first user on the mobile application; third user information associated with the fourth user; a fifth user that the first user follows on the mobile application; fourth user information associated with the fifth user; third-party social network information associated with the first user; search history on the mobile application; search history on a third-party application or website; time spent on the mobile application; duration of at least one previous audio conversation on the mobile application; at least one statistic associated with multiple previous audio conversations on the mobile application; current location; location history; device information associated with the first mobile device; network information associated with the first mobile device; a previous, current, or predicted mood of the first user during a period; a subject, topic, or hashtag that the first user is predicted to be interested in; predicted audio content associated with the audio conversation; predicted conversation duration associated with the audio conversation; predicted number of listeners associated with the audio conversation; an average listening time for one or more listeners associated with one or more current, previous, or future audio conversations involving the first user as a speaker; a listening time statistic or information for the one or more listeners associated with the one or more current, previous, or future audio conversations involving the first user as the speaker; or a speaking time statistic or information for the one or more current, previous, or future audio conversations involving the first user as the speaker.

In some embodiments, the audio conversation is added to a first user profile of the first user and a second user profile of the second user.

In some embodiments, the audio conversation indicates a number of listeners listening to the audio conversation.

In some embodiments, the method further comprises recording the audio conversation.

In some embodiments, the audio conversation is indexed for publication on an audio publication platform.

In some embodiments, the method further comprises extracting a keyword from the audio conversation and associating the keyword with the audio conversation.

In some embodiments, at least one keyword is determined based on analyzing the audio conversation using an artificial intelligence (AI) or big data or deep learning computing operation.

In some embodiments, the first user and the second user are selected based on optimizing a predicted duration of the audio conversation.

In some embodiments, the audio conversation can be continued when the first user accesses, during the audio conversation, a second mobile application on the first mobile device or a home screen of the first mobile device.

In some embodiments, another method comprises determining, using one or more computing device processors, a first user accesses a mobile application on a first mobile device of the first user; initiating, using the one or more computing device processors, a listening mode on the mobile application and searching for audio conversations; determining, using the one or more computing device processors, the first user switches to a conversation mode on the mobile application; stopping, using the one or more computing device processors, the listening mode and searching for users for initiating an audio conversation with the first user; selecting, using the one or more computing device processors, based on first user information associated with the first user and second user information associated with a second user, the second user and initiating the audio conversation involving the first user and the second user; and enabling, using the one or more computing device processors, a third user to listen to the audio conversation on a second mobile device of the third user, wherein the second user is selected based on first user information associated with the first user and second user information associated with the second user, wherein a first visual representation of the first user is presented on a user interface of the second mobile device during the audio conversation, and wherein a second visual representation of the second user is presented on the user interface of the second mobile device during the audio conversation.

In some embodiments, the searching for users is conducted based on a location parameter selected or input by the first user on the mobile application.

In some embodiments, an apparatus is provided. The apparatus comprises one or more computing device processors; and one or more memory systems comprising code, executable by the one or more computing device processors, and configured to: determine a first user accesses a mobile application on a first mobile device of the first user; determine a second user accesses the mobile application on a second mobile device of the second user; select the first user and the second user for participating in an audio conversation based on at least first user information associated with the first user and second user information associated with the second user; initiate the audio conversation between the first user and the second user; broadcast the audio conversation to a third user who accesses the mobile application on a third mobile device of the third user; transmit, to the third mobile device for visual display, during the audio conversation, on a user interface of the mobile application on the third mobile device, a first visual representation of the first user not comprising a first photographic or video image of the first user; and transmit, to the third mobile device for visual display, during the audio conversation, on the user interface of the mobile application on the third mobile device, a second visual representation of the second user not comprising a second photographic or video image of the second user.

In some embodiments, the apparatus comprises at least one of an application server, the first mobile device, the second mobile device, or the third mobile device.

In some embodiments, the audio conversation is searchable, using an audio or text query, based on at least one of user information associated with at least one of the first user or the second user, or based on content of the audio conversation.

In some embodiments, the audio conversation is sharable with a social network outside the mobile application.

In some embodiments, the audio conversation can be continued when the first user accesses a non-conversation function in the mobile application.

In some embodiments, the audio conversation is terminated when the first user switches to the listening mode in the mobile application.

In some embodiments, a listening mode in the mobile application cannot be initiated or executed simultaneously with a conversation mode in the mobile application.

In some embodiments, the code is further configured to provide an option to the first user to substantially instantaneously switch from the audio conversation with the second user to a second audio conversation with a fourth user.

In some embodiments, the first user cannot view user profile information associated with one or more users listening to the audio conversation, or wherein a first listener cannot view listener profile information associated with a second listener listening to the audio conversation.

In some embodiments, the code is further configured to select the first user and the second user for participating in an audio conversation based on at least partially matching the first user information associated with the first user and the second user information associated with the second user.

In some embodiments, the first visual representation comprises at least one of an avatar, an emoji, a symbol, a persona, an animation, a cartoon, an indicia, an illustration, a histogram, or a graph. In other embodiments, the first visual representation comprises at least one of: an image or a video.

In some embodiments, at least a portion of the first visual representation on the user interface of the mobile application on the third mobile device changes shape or form when the first user speaks during the audio conversation; and wherein the at least the portion of the first visual representation on the user interface of the mobile application on the third mobile device does not change shape or form when the first user does not speak during the audio conversation, or wherein the at least the portion of the first visual representation on the user interface of the mobile application on the third mobile device does not change shape or form when the second user speaks during the audio conversation.

In some embodiments, the first visual representation comprises a facial representation.

In some embodiments, the at least the portion of the first visual representation comprises a lip or a mouth.

In some embodiments, at least a portion of the first visual representation on the user interface of the mobile application on the third mobile device moves when the first user speaks during the audio conversation; and wherein the at least the portion of the first visual representation on the user interface of the mobile application on the third mobile device does not move when the first user does not speak during the audio conversation, or wherein the at least the portion of the first visual representation on the user interface of the mobile application on the third mobile device does not move when the second user speaks during the audio conversation.

In some embodiments, the first visual representation on the user interface of the mobile application on the third mobile device is dynamically modifiable by the first user during the audio conversation.

In some embodiments, any visual representation described herein may comprise a still image or video of the user associated with the visual representation. Therefore, any audio conversation may refer to an audio and still image/video conversation, in some embodiments. In other embodiments, any audio conversation may be an audio-visual conversation, wherein the visual portion of the con- versation comprises visual representations of the users in the conversation being presented on a user interface. In some embodiments, an audio conversation may comprise an audio-only conversation, without images, visuals, video, etc.

In some embodiments, the first user information comprises static user information, wherein the static user information does not substantially change during a period, and dynamic user information, wherein the dynamic user information partially or substantially changes during the period. A period may be a period of a minutes, hours, days, etc. The dynamic user information may be determined by one or more AI operations, big data operations, or machine learning operations.

In some embodiments, the first user information comprises a previous, current, or predicted mood (e.g., based on analysis of the first user's audio content) of the first user during one or more previous, current, or future audio conversations involving the first user, and wherein the second user information comprises a previous, current, or predicted mood of the second user during one or more previous, current, or future audio conversations involving the second user.

In some embodiments, the first user information comprises a first average listening time, for one or more listeners, for one or more previous, current, or future audio conversations involving the first user as a first speaker during a first period, and wherein the second user information comprises a second average listening time, for the one or more listeners, for one or more previous, current, or future audio conversations involving the second user as a second speaker during the first period or a second period.

In some embodiments, the first user and the second user are selected based on comparing the first average listening time with the second average listening time, or based on comparing the first average listening time and the second average listening time with one or more average listening times, for the one or more listeners, associated with other users available as speakers for the audio conversation.

In some embodiments, the first user has a first higher or highest average listening time, for the one or more listeners, as the first speaker compared to one or more other users available as speakers for the audio conversation, and wherein the second user has a second higher or highest average listening time, for the one or more listeners, as the second speaker compared to the one or more other users available as the speakers for the audio conversation.

In some embodiments, the first user information comprises a first listening time statistic or information, associated with one or more listeners, for one or more previous, current, or future audio conversations involving the first user as a first speaker during a first period, and wherein the second user information comprises a second listening time statistic or information, associated with the one or more listeners, for one or more previous, current, or future audio conversations involving the second user as a second speaker during the first period or a second period.

In some embodiments, the first user and the second user are selected based on comparing the first listening time statistic or information with the second listening time statistic or information, or based on comparing the first listening time statistic or information and the second listening time statistic or information with one or more third listening time statistics or information, associated with the one or more listeners, associated with other users available as speakers for the audio conversation.

In some embodiments, the first user has a first better or best listening time statistic or information, for the one or more listeners, as the first speaker compared to one or more other users available as speakers for the audio conversation, and wherein the second user has a second better or best listening time statistic or information, for the one or more listeners, as the second speaker compared to the one or more other users available as the speakers for the audio conversation.

In some embodiments, methods, systems, and computer program products are provided for selecting and initiating streaming (or playing, which is equivalent to streaming) of audio conversations. An exemplary method comprises: determining, using one or more computing device processors, a first user accesses a mobile application on a mobile device associated with the first user; selecting, using the one or more computing device processors, an audio conversation for the first user, wherein the audio conversation involves at least a second user, wherein the audio conversation is selected for the first user based on at least one of first user information associated with the first user, second user information associated with the second user, or conversation information associated with the audio conversation; initiating playing of, using the one or more computing device processors, the audio conversation on the mobile application on the mobile device; and transmitting, using the one or more computing device processors, to mobile device for visual display, during the playing of the audio conversation, on a user interface of the mobile application on the second mobile device, a first visual representation of the at least the second user not comprising a first photographic or video image of the second user.

In some embodiments, a method is provided for selecting and initiating streaming of audio conversations, the method comprising: determining, using one or more computing device processors, a first user accesses a mobile application on a first mobile device associated with the first user; selecting, using the one or more computing device processors, an audio conversation for the first user, wherein the audio conversation involves at least a second user who accesses the mobile application on a second mobile device associated with the second user, and a third user located remotely from the second user who accesses the mobile application on a third mobile device associated with the third user, wherein the audio conversation is selected for the first user based on at least one of first user information associated with the first user, second user information associated with the second user, or conversation information associated with the audio conversation; streaming, using the one or more computing device processors, the audio conversation to the mobile application on the first mobile device; recording, using the one or more computing device processors, the audio conversation; transmitting, using the one or more computing device processors, to the first mobile device for visual display, during the streaming of the audio conversation, on a first user interface of the mobile application on the first mobile device, a selectable first visual representation of the second user not comprising a first video of the second user and, simultaneously with the visual display of the selectable first visual representation on the first user interface of the mobile application on the first mobile device, a selectable second visual representation of the third user not comprising a second video of the third user; adding, using the one or more computing device processors, the conversation information associated with the audio conversation to user profile information associated with the second user; receiving, using the one or more computing device processors, a selection of the selectable first visual representation of the second user not comprising the first video of the second user; and in response to receiving the selection of the selectable first visual representation of the second user not comprising the first video of the second user, transmitting, using the one or more computing device processors, to the first mobile device for visual display, during the streaming of the audio conversation, on a second user interface, different from the first user interface, of the mobile application on the first mobile device, the user profile information associated with the second user, wherein the conversation information, comprised in the user profile information, is displayed on the second user interface or a third user interface, different from the first user interface, of the mobile application on the first mobile device, wherein the user profile information associated with the second user is editable by the second user during the audio conversation involving the at least the second user and the third user, wherein second user profile information associated with the first user is editable by the first user during the audio conversation involving the at least the second user and the third user being streamed to the mobile application on the first mobile device, and wherein the audio conversation involving the at least the second user and the third user continues to stream when the second user accesses, during the audio conversation, a second mobile application on the second mobile device of the second user.

In some embodiments, the first user information comprises at least one of an interest associated with the first user; a third visual representation associated with the first user; the second user profile information associated with the first user; listening history, associated with the first user, on the mobile application; speaking history, associated with the first user, on the mobile application; usage history, associated with the first user, on the mobile application; a fourth user that follows the first user on the mobile application; third user information associated with the fourth user; a fifth user that the first user follows on the mobile application; fourth user information associated with the fifth user; third-party social network information associated with the first user; search history, associated with the first user, on the mobile application; search history, associated with the first user, on a third-party application or website; time spent on the mobile application by the first user; duration of at least one previous audio conversation, associated with the first user, on the mobile application; at least one statistic associated with multiple previous audio conversations, associated with the first user, on the mobile application; current location associated with the first user; location history associated with the first user; device information associated with the first mobile device; network information associated with the first mobile device; a previous, current, or predicted mood of the first user during a period; an average listening time for one or more listeners associated with one or more current, previous, or future audio conversations involving the first user as a speaker; a listening time statistic or information for the one or more listeners associated with the one or more current, previous, or future audio conversations involving the first user as the speaker; a speaking time statistic or information for the one or more current, previous, or future audio conversations involving the first user as the speaker; or a subject, topic, or hashtag that the first user is predicted to be interested in.

In some embodiments, the conversation information comprises at least one of: the second user information associated with the second user; a topic, subject, or hashtag associated with the audio conversation; location information associated with the audio conversation; user information or location information associated with at least one listener who is listening to or has listened to the audio conversation; number of current listeners associated with the audio conversation; current duration of the audio conversation; waitlist information associated with the audio conversation; followers associated with the second user; users followed by the second user; an audio message transmitted to the second user during the audio conversation; an average listening time associated with one or more previous or current listeners in the audio conversation; a listening time statistic or information associated with the one or more previous or current listeners in the audio conversation; a speaking time statistic or information associated with the one or more previous or current speakers in the audio conversation; predicted audio content associated with a remaining portion of the audio conversation; predicted conversation duration associated with the remaining portion of the audio conversation; and predicted number or location of listeners associated with the remaining portion of the audio conversation.

In some embodiments, the method further comprises selecting the audio conversation for the first user based on at least partially matching the first user information with at least one of the second user information or the conversation information.

In some embodiments, the method further comprises selecting the audio conversation based on at least one parameter input by the first user.

In some embodiments, the at least one parameter comprises a topic, subject, or hashtag.

In some embodiments, the at least one parameter is selected from multiple parameters available for selection in the mobile application.

In some embodiments, the multiple parameters are extracted from an external social network.

In some embodiments, the least one parameter comprises location information.

In some embodiments, the audio conversation is added to a first user profile of the first user.

In some embodiments, the audio conversation comprises a live audio conversation.

In some embodiments, the audio conversation comprises a recorded audio conversation.

In some embodiments, the first user interface indicates a number of listeners listening to the audio conversation.

In some embodiments, the method further comprises selecting the audio conversation based on optimizing a listening time, associated with the audio conversation, for the first user.

In some embodiments, an apparatus is provided for selecting and initiating playing of audio conversations. The apparatus comprises one or more computing device processors; one or more memory systems comprising code, executable by the one or more computing device processors, and configured to: determine a first user accesses a mobile application on a mobile device associated with the first user; select an audio conversation for the first user, wherein the audio conversation involves at least a second user, wherein the audio conversation is selected for the first user based on at least one of first user information associated with the first user, second user information associated with the second user, or conversation information associated with the audio conversation; initiate playing of the audio conversation on the mobile application on the mobile device; and transmit, to mobile device for visual display, during the playing of the audio conversation, on a user interface of the mobile application on the second mobile device, a first visual representation of the at least second user not comprising a first photographic or video image of the second user.

In some embodiments, an apparatus is provided for selecting and initiating streaming of audio conversations, the apparatus comprising: one or more computing device processors; one or more memory systems comprising code, executable by the one or more computing device processors, and configured to: determine a first user accesses a mobile application on a first mobile device associated with the first user; selecting an audio conversation for the first user, wherein the audio conversation involves at least a second user who accesses or accessed the mobile application on a second mobile device associated with the second user, and a third user who accesses or accessed the mobile application on a third mobile device associated with the third user, wherein the audio conversation is selected for the first user based on at least one of first user information associated with the first user, second user information associated with the second user, or conversation information associated with the audio conversation; streaming the audio conversation on the mobile application to the first mobile device; transmit, to the first mobile device for visual display, during the streaming of the audio conversation, on a first user interface of the mobile application on the first mobile device, a selectable first visual representation of the second user not comprising a first video of the second user and, simultaneously with the visual display of the selectable first visual representation on the first user interface of the mobile application on the first mobile device, a selectable second visual representation of the third user not comprising a second video of the third user; receive a selection of the selectable first visual representation of the second user not comprising the first video of the second user; and in response to receiving the selection of the selectable first visual representation of the second user not comprising the first video of the second user, transmit, to the first mobile device for visual display, during the streaming of the audio conversation, on a second user interface, different from the first user interface, of the mobile application on the first mobile device, user profile information associated with the second user, wherein the user profile information associated with the second user is editable by the second user during the audio conversation involving the at least the second user and the third user, wherein second user profile information associated with the first user is editable by the first user during the audio conversation involving the at least the second user and the third user being streamed to the mobile application on the first mobile device, and wherein the audio conversation involving the at least the second user and the third user continues to stream when the second user accesses, during the audio conversation, a second mobile application on the second mobile device of the second user.

In some embodiments, the apparatus comprises at least one of an application server or the first mobile device.

In some embodiments, the first user cannot converse, in substantially real-time, with the second user.

In some embodiments, the code is further configured to provide an option to the first user to substantially instantaneously switch from listening to the audio conversation involving the at least the second user and the third user to initiating a second audio conversation with a fourth user.

In some embodiments, the code is further configured to provide an option to the first user to substantially instantaneously switch from the audio conversation involving the at least the second user and the third user to a second audio conversation involving a fourth user.

In some embodiments, a number of listeners listening to the audio conversation is presented on the user interface of the mobile application on the first mobile device, and wherein the first user cannot view listener user information associated with a listener of the audio conversation.

In some embodiments, the selectable first visual representation comprises at least one of an avatar, an emoji, a symbol, a persona, an animation, a cartoon, an indicia, an illustration, a histogram, or a graph.

In some embodiments, at least a portion of the selectable first visual representation on the user interface of the mobile application on the first mobile device changes shape or form when the second user speaks during the audio conversation, and wherein the at least the portion of the selectable first visual representation on the user interface of the mobile application on the first mobile device does not change the shape or form when the second user does not speak during the audio conversation.

In some embodiments, the selectable first visual representation comprises a facial representation.

In some embodiments, the at least the portion of the selectable first visual representation comprises a lip or a mouth.

In some embodiments, the second user information comprises an average listening time, for one or more listeners, for one or more previous, current, or future audio conversations involving the second user as a speaker during a first period.

In some embodiments, the second user information comprises a listening time statistic or information, for one or more listeners, for one or more previous, current, or future audio conversations involving the second user as a speaker during a first period, or a speaking time statistic or information for the one or more previous, current, or future audio conversations involving the second user as the speaker during the first period.

In some embodiments, the second user information comprises a link to a social network account associated with the second user that is viewable on a third mobile application different from the mobile application.

In some embodiments, the audio conversation is selected based on a smart data processing operation.

In some embodiments, the smart data processing operation is based on a listening history of the first user.

In some embodiments, methods, systems, and computer program products are provided for generating visual representations for use in communication between users. An exemplary method comprises: receiving, using one or more computing device processors, user information associated with a first user; receiving, using the one or more computing device processors, visual representation information input by the first user, wherein the visual representation information comprises a first facial feature, and wherein the visual representation information further comprises a second facial feature distinct from the first facial feature; generating, using the one or more computing device processors, a visual representation based on the visual representation information, wherein the generating comprises combining the first facial feature and the second facial feature; wherein the visual representation is presented to a second user during an audio conversation between the first user and a second user, wherein at least one of the first facial feature or the second facial feature constantly changes form when the first user speaks during the audio conversation, and wherein both the first facial feature and the second facial feature remain static when the second user speaks during the audio conversation; and generating, using the one or more computing device processors, a user profile for the first user, wherein the user profile is accessible to the second user, and wherein the user profile comprises the visual representation.

In some embodiments, a method is provided for generating visual representations for use in audio conversations, the method comprising: receiving, using one or more computing device processors, user information associated with a first user; receiving, using the one or more computing device processors, visual representation information input by the first user, wherein the visual representation information comprises a first facial feature, and wherein the visual representation information further comprises a second facial feature distinct from the first facial feature; generating, using the one or more computing device processors, a visual representation based on the visual representation information, wherein the generating comprises combining the first facial feature and the second facial feature, wherein the visual representation is not generated based on a video image or a still image of the first user captured by a user device associated with the first user, wherein the visual representation is presented to a second user during an audio conversation between the first user and the second user, wherein at least one of the first facial feature or the second facial feature constantly changes form when the first user speaks during the audio conversation, wherein both the first facial feature and the second facial feature remain static when the second user speaks during the audio conversation, wherein the visual representation of the first user and a second visual representation of the second user are presented simultaneously to a third user listening to the audio conversation between the first user and the second user during the audio conversation between the first user and the second user; and generating, using the one or more computing device processors, a user profile for the first user, wherein the user profile is accessible to the second user, wherein the user profile comprises the visual representation, wherein the user profile comprises users followed by or following the first user, wherein the user profile is editable by the first user during the audio conversation between the first user and the second user, wherein the audio conversation is added to the user profile either during or after conclusion of the audio conversation between the first user and the second user, and wherein the user profile comprises an option to play the audio conversation between the first user and the second user.

In some embodiments, the visual representation does not comprise the video image or the still image of the first user.

In some embodiments, the first facial feature or the second facial feature comprises at least one of a head, a lip, a mouth, eyes, an ear, a nose, and hair.

In some embodiments, the first facial feature or the second facial feature comprises at least one of headgear, glasses, or an accessory.

In some embodiments, the first user is added to a list of followers comprised in a second user profile of the second user.

In some embodiments, the user profile comprises a list of following users added by the first user.

In some embodiments, the first user can establish a private call with a following user based on the following user also adding the first user to a second list of following users associated with the following user.

In some embodiments, the first user can establish a private call with a fourth user following the first user based on the first user also following the fourth user.

In some embodiments, the audio conversation is added to the user profile either during or after conclusion of the audio conversation, and wherein the user profile comprises an option to play the audio conversation.

In some embodiments, a second audio conversation is added to the user profile upon scheduling of the second audio conversation.

In some embodiments, the user profile comprises a list of conversations that the first user has participated in, is currently participating in, has previously listened to, or is currently listening to.

In some embodiments, the user profile presents an option to share the audio conversation with the third user on a mobile application on which the audio conversation is conducted, or with an external social network.

In some embodiments, the form associated with the first facial feature or the second facial feature comprises a shape or a size.

In some embodiments, the visual representation comprises at least one of an avatar, an emoji, a symbol, a persona, an animation, a cartoon, an indicia, or an illustration.

In some embodiments, the user profile comprises a suggested audio conversation to listen to or a suggested user to follow.

In some embodiments, the user profile is editable by the first user on a mobile application while conducting the audio conversation on the mobile application or while listening to a second audio conversation on the mobile application.

In some embodiments, an apparatus is provided for generating visual representations for use in audio conversations. The apparatus comprises one or more computing device processors; one or more memory systems comprising code, executable by the one or more computing device processors, and configured to: receive user information associated with a first user; receive visual representation information input by the first user, wherein the visual representation information comprises a first feature, wherein the visual representation information further comprises a second feature distinct from the first feature, and wherein the first feature comprises a facial feature; generate a visual representation based on the visual representation information, wherein the visual representation is presented to a second user during an audio conversation between the first user and a second user, wherein at least one of the first feature or the second feature changes form when the first user speaks during the audio conversation, wherein both the first feature and the second feature remain static when the second user speaks during the audio conversation, wherein the visual representation does not comprise a video image or still image of the first user, and wherein the visual representation associated with the first user is presented to a third user listening to the audio conversation.

In some embodiments, an apparatus is provided for generating visual representations for use in audio conversations, the apparatus comprising: one or more computing device processors; one or more memory systems comprising code, executable by the one or more computing device processors, and configured to: receive user information associated with a first user; receive visual representation information input by the first user, wherein the visual representation information comprises a first feature, wherein the visual representation information further comprises a second feature distinct from the first feature, and wherein the first feature comprises a facial feature; and generate a visual representation based on the visual representation information, wherein the visual representation is not generated based on a video image or a still image of the first user captured by a user device associated with the first user, wherein the visual representation is presented to a second user during an audio conversation between the first user and the second user, wherein the visual representation does not comprise the video image or the still image of the first user, wherein the visual representation of the first user and a second visual representation of the second user are presented simultaneously to a third user listening to the audio conversation between the first user and the second user during the audio conversation between the first user and the second user, wherein a user profile comprises users followed by or following the first user, and wherein the user profile is editable by the first user during the audio conversation between the first user and the second user.

In some embodiments, the apparatus comprises at least one of an application server or a mobile device.

In some embodiments, methods, systems, and computer program products are provided for generating visual representations for use in communication between users. The method comprises receiving, using one or more computing device processors, user information associated with a first user; receiving, using the one or more computing device processors, visual representation information input by the first user, wherein the visual representation information comprises a first feature, wherein the visual representation information further comprises a second feature distinct from the first feature, and wherein the first feature comprises a facial feature; and generating, using the one or more computing device processors, a visual representation based on the visual representation information, wherein the visual representation is presented to a second user during an audio conversation between the first user and a second user, wherein at least one of the first feature or the second feature moves when the first user speaks during the audio conversation, and wherein both the first feature and the second feature remain unmoved when the second user speaks during the audio conversation, wherein the visual representation does not comprise a video image or still image of the first user, and wherein the visual representation associated with the first user is presented to a third user listening to the audio conversation.

In some embodiments, a method is provided for generating visual representations for use in audio conversations, the method comprising: receiving, using one or more computing device processors, user information associated with a first user; receiving, using the one or more computing device processors, visual representation information input by the first user, wherein the visual representation information comprises a first feature, wherein the visual representation information further comprises a second feature distinct from the first feature, and wherein the first feature comprises a facial feature; and generating, using the one or more computing device processors, a visual representation based on the visual representation information, wherein the visual representation is not generated based on a video image or a still image of the first user captured by a user device associated with the first user, wherein the visual representation is presented to a second user during an audio conversation between the first user and the second user, wherein the visual representation does not comprise the video image or the still image of the first user, wherein the visual representation of the first user and a second visual representation of the second user are presented simultaneously to a third user listening to the audio conversation between the first user and the second user during the audio conversation between the first user and the second user, wherein a user profile comprises users followed by or following the first user, and wherein the user profile is editable by the first user during the audio conversation between the first user and the second user.

In some embodiments, the visual representation comprises at least one of an avatar, an emoji, a symbol, a persona, an animation, a cartoon, an indicia, an illustration, a graph, or a histogram, or further comprising associating the visual representation with the user profile of the first user.

In some embodiments, the facial feature comprises a lip, and wherein the lip tracks speech of the first user during the audio conversation.

In some embodiments, an option to generate a second visual representation for the first user based on automatically selected features.

In some embodiments, the visual representation comprises a video image or still image of the first user.

In some embodiments, methods, systems, and computer program products are provided for handling audio messages received during audio conversations. An exemplary method comprises: determining, using one or more computing device processors, a first user accesses a mobile application on a first mobile device of the first user; broadcasting, using the one or more computing device processors, on the mobile application, to the first user, an audio conversation involving a second user and a third user conducted via the mobile application, wherein the second user accesses the mobile application on a second mobile device of the second user, and wherein the third user accesses the mobile application on a third mobile device of the third user; receiving, using the one or more computing device processors, a first audio message from the first user during the audio conversation involving the second user and the third user, wherein the first audio message is associated with or directed to at least one of the second user or the third user; initiating, using the one or more computing device processors, storage of the first audio message, wherein an option to play the first audio message is displayed on a first user interface, associated with the mobile application, of the at least one of the second mobile device of the second user or the third mobile device of the third user; and broadcasting, using the one or more computing device processors, the first audio message during the audio conversation, in response to receiving selection of the option to play the first audio message by the at least one of the second user or the third user, to the first user, the second user, the third user, and a fourth user accessing the mobile application on a fourth mobile device of the fourth user.

In some embodiments, a method is provided for handling audio messages received during audio conversations, the method comprising: determining, using one or more computing device processors, a first user accesses a mobile application on a first mobile device of the first user; broadcasting, using the one or more computing device processors, on the mobile application, to the first user, an audio conversation involving a second user and a third user conducted via the mobile application, wherein the second user accesses the mobile application on a second mobile device of the second user, and wherein the third user accesses the mobile application on a third mobile device of the third user; receiving, using the one or more computing device processors, a first audio message from the first user during the audio conversation involving the second user and the third user, wherein the first audio message is associated with or directed to at least one of the second user or the third user; initiating, using the one or more computing device processors, storage of the first audio message, wherein an option to play the first audio message is displayed on a first user interface, associated with the mobile application, of at least one of the second mobile device of the second user or the third mobile device of the third user; and broadcasting, using the one or more computing device processors, the first audio message during the audio conversation, in response to receiving selection of the option to play the first audio message by the at least one of the second user or the third user, to the first user, the second user, the third user, and a fourth user accessing the mobile application on a fourth mobile device of the fourth user, wherein at least one of a first visual representation of the second user not comprising a first photographic or video image of the second user, a second visual representation of the third user not comprising a second photographic or video image of the third user, is displayed on a second user interface, associated with the mobile application, of the fourth mobile device of the fourth user during the broadcasting of the audio conversation involving the second user and the third user, and wherein at least a portion of the first visual representation of the second user dynamically changes shape or form, in substantially real-time, when the second user speaks during the audio conversation, and wherein the at least the portion of the first visual representation of the second user remains substantially static when the second user does not speak during the audio conversation.

In some embodiments, when the first audio message is played is determined by the at least one of the second user or the third user.

In some embodiments, at least one of a first visual representation of the second user not comprising a first photographic or video image of the second user, a second visual representation of the third user not comprising a second photographic or video image of the third user, is displayed on a user interface, associated with the mobile application, of the fourth mobile device of the fourth user during the broadcasting of the audio conversation involving the second user and the third user.

In some embodiments, at least a portion of the first visual representation of the second user dynamically changes form, in substantially real-time, when the second user speaks during the audio conversation, and wherein the at least the portion of the first visual representation of the first user remains substantially static when the first user does not speak during the audio conversation.

In some embodiments, when the first audio message is played during the audio conversation is determined by both the second user and the third user.

In some embodiments, when the first audio message is played during the audio conversation is determined by only one of the second user and the third user.

In some embodiments, the first audio message is less than or equal to a maximum duration established by the mobile application.

In some embodiments, an indicator or a status associated with the first audio message is presented on the second user interface, associated with the mobile application, of the fourth mobile device of the fourth user listening to the audio conversation.

In some embodiments, the status indicates whether the first audio message has been played or is yet to be played.

In some embodiments, the status indicates user information associated with the first user.

In some embodiments, an indicator associated with the first audio message is based on a category or type of the first user, and wherein the indicator is displayed on the first user interface, associated with the mobile application, of the at least one of the second mobile device or the third mobile device.

In some embodiments, user information associated with the first audio message is accessible by at least one of the second user, the third user, or the fourth user.

In some embodiments, user information associated with the first audio message is accessible by the at least one of the second user or the third user, and is not accessible by the fourth user.

In some embodiments, the at least one of the second user or the third user comprises an influencer, wherein the influencer has equal to or greater than a minimum number of followers.

In some embodiments, the first audio message is added to an audio message waitlist associated with the at least one of the second user or the third user, and wherein audio messages from the audio message waitlist are played as determined by the at least one of the second user or the third user.

In some embodiments, an indicator, or position in an audio message waitlist, associated with the first audio message, presented on the first user interface, associated with the mobile application, of the at least one of the second mobile device or the third mobile device, is based on a category or type of the first user.

In some embodiments, the first user executes a computing operation on the mobile application to achieve a certain category or type.

In some embodiments, the first audio message is searchable using an audio or text query.

In some embodiments, a second audio message received by the at least one of the second user or the third user is playable privately by the at least one of the second user or the third user, without being broadcasted to the fourth user.

In some embodiments, the method further comprises analyzing the first audio message and extracting at least one of text, keyword, hashtag, or user information; or blocking or highlighting the first audio message based on content of the first audio message.

In some embodiments, the method further comprises a buffer for storing the first audio message.

In some embodiments, the first audio message is playable after termination of the audio conversation, or wherein the first audio message is stored or saved separately from the audio conversation.

In some embodiments, the first audio message comprises a first audio-video message.

In some embodiments, the method further comprises recording the audio conversation, wherein playback of the first audio message is recorded during the recording of the audio conversation such that the first audio message is played during future playback of the audio conversation on the mobile application by a fifth user.

In some embodiments, the first visual representation comprises at least one of an avatar, an emoji, a symbol, a persona, an animation, a cartoon, an indicia, an illustration, a histogram, or a graph.

In some embodiments, the at least the portion of the first visual representation comprises a lip or a mouth.

In some embodiments, the method further comprises further comprising recording the audio conversation.

In some embodiments, a method comprises: determining, using one or more computing device processors, a first user accesses a mobile application on a first mobile device of the first user; broadcasting, using the one or more computing device processors, on the mobile application, to the first user, an audio conversation involving a second user and a third user conducted via the mobile application, wherein the second user accesses the mobile application on a second mobile device of the second user, and wherein the third user accesses the mobile application on a third mobile device of the third user; receiving, using the one or more computing device processors, a call request from the first user during the audio conversation involving the second user and the third user, wherein the call request is associated with at least one of the second user or the third user; in response to receiving acceptance of the call request by the at least one of the second user or the third user, adding, using the one or more computing device processors, the first user to the audio conversation such that that the first user can speak to, in substantially real-time, the at least one of the second user or the third user; broadcasting, using the one or more computing device processors, the audio conversation involving the first user, the second user, and the third user to a fourth user accessing the mobile application on a fourth mobile device of the fourth user, wherein at least one of a first visual representation of the first user not comprising a first photographic or video image of the first user, a second visual representation of the second user not comprising a second photographic or video image of the second user, or a third visual representation of the third user not comprising a third photographic or video image of the third user, is displayed on a user interface, associated with the mobile application, of the fourth mobile device of the fourth user during the broadcasting of the audio conversation involving the first user, the second user, and the third user, and wherein at least a portion of the first visual representation of the first user dynamically changes form, in substantially real-time, when the first user speaks during the audio conversation, and wherein the at least the portion of the first visual representation of the first user remains substantially static when the second user or the third user speaks during the audio conversation. In some embodiments, the call may be an audio-video call or audio-still image call. In some embodiments, the call may be an audio-visual call. In some embodiments, the call may be an audio-only call.

In some embodiments, an apparatus for handling audio messages received during audio conversations, the apparatus comprises one or more computing device processors; one or more memory systems comprising code, executable by the one or more computing device processors, and configured to: determine a first user accesses a mobile application on a first mobile device of the first user; broadcast, on the mobile application, to the first user, an audio conversation involving a second user and a third user conducted via the mobile application, wherein the second user accesses the mobile application on a second mobile device of the second user, and wherein the third user accesses the mobile application on a third mobile device of the third user; receive a first audio message from the first user during the audio conversation involving the second user and the third user, wherein the first audio message is associated with at least one of the second user or the third user; initiate storage of the first audio message, wherein an option to play the first audio message is displayed on a first user interface, associated with the mobile application, of the at least one of the second mobile device of the second user or the third mobile device of the third user; and broadcast the first audio message during the audio conversation, in response to receiving selection of the option to play the first audio message by the at least one of the second user or the third user, to the at least one of the first user, the second user, the third user, and a fourth user accessing the mobile application on a fourth mobile device of the fourth user.

In some embodiments, the apparatus comprises at least one of an application server or at least one of the first mobile device, the second mobile device, the third mobile device, or the fourth mobile device.

In some embodiments, the apparatus comprises a buffer for storing the first audio message.

In some embodiments, the first audio message is playable after termination of the audio conversation, or wherein the first audio message is stored or saved separately from the audio conversation.

In some embodiments, the first audio message comprises a first audio-video message.

In some embodiments, playback of the first audio message is saved during recording of the audio conversation such that the first audio message is played during future playback of the audio conversation on the mobile application by a fifth user.

In some embodiments, the first visual representation comprises at least one of an avatar, an emoji, a symbol, a persona, an animation, a cartoon, an indicia, an illustration, a histogram, or a graph.

In some embodiments, the at least the portion of the first visual representation comprises a lip or a mouth.

In some embodiments, methods, systems, and computer program products are provided for handling dropping of users during audio conversations. An exemplary method comprises: determining, using one or more computing device processors, a first user accesses a mobile application on a first mobile device of the first user; determining, using the one or more computing device processors, a second user accesses the mobile application on a second mobile device of the second user; establishing, using the one or more computing device processors, on the mobile application, an audio conversation between the first user and the second user; broadcasting, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user not comprising a first photographic or video image of the first user; and transmitting, using the one or more computing device processors, to the third mobile device for visual display, during the audio conversation, on the user interface of the mobile application on the third mobile device, a second visual representation of the second user not comprising a second photographic or video image of the second user; determining, using the one or more computing device processors, the second user drops out of the audio conversation; initiating, using the one or more computing device processors, removal of the second visual representation of the second user from the user interface of the mobile application on the third mobile device; adding, using the one or more computing device processors, a fourth user to the audio conversation; broadcasting, using the one or more computing device processors, on the mobile application, to the third mobile device of the third user, the audio conversation involving the first user and the fourth user; and transmitting, using the one or more computing device processors, to the third mobile device for visual display, during the audio conversation, on the user interface of the mobile application on the third mobile device, a third visual representation of the fourth user not comprising a third photographic or video image of the fourth user.

In some embodiments, the adding the fourth user to the audio conversation comprises: searching for the fourth user to add to the audio conversation; and selecting the fourth user based on at least one of first user information associated with the first user, second user information associated with the second user, third user information associated with the fourth user, or conversation information associated with the audio conversation.

In some embodiments, the first user information comprises at least one of an interest associated with the first user; the first visual representation; profile information associated with the first user; listening history, associated with the first user, on the mobile application; speaking history, associated with the first user, on the mobile application; usage history, associated with the first user, on the mobile application; the fourth user that follows the first user on the mobile application; the third user information associated with the fourth user; a fifth user that the first user follows on the mobile application; fourth user information associated with the fifth user; third-party social network information associated with the first user; search history, associated with the first user, on the mobile application; search history, associated with the first user, on a third-party application or website; time spent by the first user on the mobile application; duration of at least one previous audio conversation, associated with the first user, on the mobile application; at least one statistic associated with multiple previous audio conversations, associated with the first user, on the mobile application; current location associated with the first user; location history associated with the first user; device information associated with the first mobile device; network information associated with the first mobile device; an average listening time for one or more listeners associated with one or more current, previous, or future audio conversations involving the first user as a speaker; a listening time statistic or information for the one or more listeners associated with the one or more current, previous, or future audio conversations involving the first user as the speaker; a speaking time statistic or information for the one or more current, previous, or future audio conversations involving the first user as the speaker; or a previous, current, or predicted mood of the first user during a period.

In some embodiments, selecting the fourth user comprises at least partially matching the second user information with at least one of the first user information or the conversation information.

In some embodiments, the conversation information comprises at least one of: user information associated with the second user; a topic, subject, or hashtag associated with the audio conversation; location information associated with the audio conversation; user information or location information associated with at least one listener who is listening to or has listened to the audio conversation; number of current listeners associated with the audio conversation; current duration of the audio conversation; waitlist information associated with the audio conversation; followers associated with the second user; users followed by the second user; an audio message transmitted to the first user or the second user during the audio conversation; predicted audio content associated with a remaining portion of the audio conversation; predicted conversation duration associated with the remaining portion of the audio conversation; and predicted number or location of listeners associated with the remaining portion of the audio conversation.

In some embodiments, when searching for the fourth user, a message or graphic is presented on the user interface of the mobile application on the third mobile device indicating that the searching for the fourth user is being executed.

In some embodiments, when searching for the fourth user, the first user can continue to speak.

In some embodiments, the searching is conducted for a predetermined period or until the fourth user is determined.

In some embodiments, the fourth user is comprised in a waitlist associated with at least one of the first user or the audio conversation.

In some embodiments, the fourth user is selected by the first user.

In some embodiments, the first visual representation of the first user is maintained on the user interface of the mobile application on the third mobile device when the second user drops out of the audio conversation.

In some embodiments, the second user drops out of the audio conversation when at least one of: the second user exits the audio conversation on the mobile application on the second mobile device, the second user switches to a second audio conversation on the mobile application on the second mobile device, the second user switches to listening mode on the mobile application on the second mobile device, the second user exits the mobile application on the second mobile device, or the second user is removed from the audio conversation based on a statement or word stated by the second user during the audio conversation.

In some embodiments, an apparatus for handling users no longer present in audio conversations, the apparatus comprises one or more computing device processors; one or more memory systems comprising code, executable by the one or more computing device processors, and configured to: determine a first user accesses a mobile application on a first mobile device of the first user; determine a second user accesses the mobile application on a second mobile device of the second user; establish, on the mobile application, an audio conversation between the first user and the second user; broadcast the audio conversation to a third user who accesses the mobile application on a third mobile device of the third user; transmit, to the third mobile device for visual display, during the audio conversation, on a user interface of the mobile application on the third mobile device, a first visual representation of the first user not comprising a first photographic or video image of the first user; and transmit, to the third mobile device for visual display, during the audio conversation, on the user interface of the mobile application on the third mobile device, a second visual representation of the second user not comprising a second photographic or video image of the second user; determine the second user is no longer present in the audio conversation; and initiate removal of the second visual representation of the second user from the user interface of the application on the third mobile device; search for a new user for adding to the audio conversation.

In some embodiments, the code is further configured to search for the new user based on a parameter input by the first user.

In some embodiments, the code is further configured to terminate the audio conversation in response to not finding the new user in a predetermined period.

In some embodiments, the first user can continue to speak in response to not finding the new user in a predetermined period.

In some embodiments, a method for handling users no longer present in audio conversations, the method comprises: determining, using one or more computing device processors, a first user accesses a mobile application on a first mobile device of the first user; determining, using the one or more computing device processors, a second user accesses the mobile application on a second mobile device of the second user; establishing, using the one or more computing device processors, on the mobile application, an audio conversation between the first user and the second user; broadcasting, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user not comprising a first photographic or video image of the first user; and transmitting, using the one or more computing device processors, to the third mobile device for visual display, during the audio conversation, on the user interface of the mobile application on the third mobile device, a second visual representation of the second user not comprising a second photographic or video image of the second user; determining, using the one or more computing device processors, the second user is no longer present in the audio conversation, wherein the second visual representation of the second user is removed from the user interface of the mobile application on the third mobile device when the second user is no longer present in the audio conversation; and searching, using the one or more computing device processors, for a new user to add to the audio conversation.

In some embodiments, the user interface of the mobile application on the third mobile device indicates a number of listeners listening to the audio conversation.

In some embodiments, the first visual representation comprises at least one of an avatar, an emoji, a symbol, a persona, an animation, a cartoon, an indicia, an illustration, a histogram, or a graph.

In some embodiments, reconnecting the second user to the audio conversation either automatically or in response to receiving a request from the second user to reconnect to the audio conversation; and in response to reconnecting the second user to the audio conversation, stopping the searching for the new user.

In some embodiments, at least a portion of the first visual representation on the user interface of the mobile application on the third mobile device changes shape or form when the first user speaks during the audio conversation, and wherein the at least the portion of the first visual representation on the user interface of the mobile application on the third mobile device does not change the shape or the form when the first user does not speak during the audio conversation.

In some embodiments, the first visual representation comprises a facial representation.

In some embodiments, the at least the portion of the first visual representation comprises a lip or a mouth.

In some embodiments, methods, systems, and computer program products are provided for handling waitlists associated with users during audio conversations. In some embodiments, a method is provided for handling waitlists associated with users during audio conversations, the method comprises: determining, using one or more computing device processors, a first user accesses a mobile application on a first mobile device of the first user; broadcasting, using the one or more computing device processors, on the mobile application, to the first user, a first audio conversation involving a second user and a third user, wherein the second user accesses the mobile application on a second mobile device of the second user, and wherein the third user accesses the mobile application on a third mobile device of the third user; receiving, using the one or more computing device processors, a request from the first user, listening to the first audio conversation involving the second user and the third user, to join a waitlist associated with the second user or the first audio conversation; adding, using the one or more computing device processors, the first user to the waitlist associated with the second user or the first audio conversation; enabling, using the one or more computing device processors, the second user to view the waitlist; and initiating, using the one or more computing device processors, a second audio conversation between the second user and a next user on the waitlist upon termination of the first audio conversation.

In some embodiments, a method is provided for handling waitlists associated with users during audio conversations, the method comprising: determining a first user accesses a mobile application on a first mobile device of the first user; broadcasting, on the mobile application, to the first user, a first audio conversation involving a second user and a third user, wherein the second user accesses the mobile application on a second mobile device of the second user, and wherein the third user accesses the mobile application on a third mobile device of the third user; receiving a request from the first user, listening to the first audio conversation involving the second user and the third user, to join a waitlist associated with the second user or the first audio conversation; adding the first user to the waitlist associated with the second user or the first audio conversation; enabling the second user to view the waitlist; and initiating a second audio conversation between the second user and a next user on the waitlist upon termination of the first audio conversation.

In some embodiments, the method comprises generating the waitlist associated with the second user or the first audio conversation.

In some embodiments, at least one of a first visual representation of the second user not comprising a first photographic or video image of the second user, or a second visual representation of the third user not comprising a second photographic or video image of the third user, is displayed on a user interface, associated with the mobile application, of the first mobile device of the first user during the broadcasting of the audio conversation involving the second user and the third user. In some embodiments, the terms streaming, playing, and broadcasting may be used interchangeably.

In some embodiments, at least a portion of the first visual representation of the second user dynamically changes form, in substantially real-time, when the second user speaks during the audio conversation, and wherein the at least the portion of the first visual representation of the second user remains substantially static when the second user does not speak during the audio conversation.

In some embodiments, the first visual representation comprises at least one of an avatar, an emoji, a symbol, a persona, an animation, a cartoon, an indicia, or an illustration.

In some embodiments, user information associated with one or more users on the waitlist is viewable to the second user.

In some embodiments, information associated with the waitlist is not viewable to a fourth user listening to the first audio conversation on a fourth mobile device.

In some embodiments, the information comprises a number of users on the waitlist or user information associated with one or more users on the waitlist.

In some embodiments, information associated with the waitlist is viewable to a fourth user listening to the first audio conversation.

In some embodiments, an audio message from the first user is received by the second user during the first audio conversation such that the audio message is playable by the second user during the first audio conversation.

In some embodiments, the second audio conversation is automatically initiated upon the termination of the first audio conversation, or wherein the second audio conversation is initiated upon receiving approval from the second user to initiate the second audio conversation.

In some embodiments, the second user can modify the waitlist such that the second user can delete a fourth user from the waitlist or add a fifth user to the waitlist.

In some embodiments, the next user on the waitlist is the first user.

In some embodiments, the first user executed a computing operation on the mobile application to become the next user.

In some embodiments, an indicator is provided to the second user indicating that the first user executed a computing operation.

In some embodiments, the indicator is provided in the waitlist such that the indicator is viewable by the second user.

In some embodiments, a fourth user executed a computing operation on the mobile application to obtain a higher position in the waitlist compared to a current position of the fourth user in the waitlist.

In some embodiments, an apparatus for handling waitlists associated with users during audio conversations, the apparatus comprises one or more computing device processors; one or more memory systems comprising code, executable by the one or more computing device processors, and configured to: determine a first user accesses a mobile application on a first mobile device of the first user; broadcast, on the mobile application, to the first user, a first audio conversation involving a second user and a third user, wherein the second user accesses the mobile application on a second mobile device of the second user, and wherein the third user accesses the mobile application on a third mobile device of the third user; receive a request from the first user, listening to the first audio conversation involving the second user and the third user, to join a waitlist associated with at least one of the second user, the third user, or the first audio conversation; add the first user to the waitlist associated with the at least one of the second user, the third user, or the first audio conversation; enable the at least one of the second user or the third user to view the waitlist; and initiate a second audio conversation between or among the at least one of the second user or the third user, and a user on the waitlist, upon termination of the first audio conversation.

In some embodiments, an apparatus is provided for handling waitlists associated with users during audio conversations, the apparatus comprising: one or more computing device processors; one or more memory systems comprising code, executable by the one or more computing device processors, and configured to: determine a first user accesses a mobile application on a first mobile device of the first user; broadcast, on the mobile application, to the first user, a first audio conversation involving a second user and a third user, wherein the second user accesses the mobile application on a second mobile device of the second user, and wherein the third user accesses the mobile application on a third mobile device of the third user; receive a request from the first user, listening to the first audio conversation involving the second user and the third user, to join a waitlist associated with at least one of the second user, the third user, or the first audio conversation; add the first user to the waitlist associated with the at least one of the second user, the third user, or the first audio conversation; enable at least one of the second user or the third user to view the waitlist; and initiate a second audio conversation between or among the at least one of the second user or the third user, and a user on the waitlist, upon termination of the first audio conversation.

In some embodiments, the apparatus comprises at least one of an application server and at least one of the first mobile device, second mobile device, or the third mobile device.

In some embodiments, a method for handling waitlists associated with users during audio conversations, the method comprising: determining, using one or more computing device processors, a first user accesses a mobile application on a first mobile device of the first user; broadcasting, using the one or more computing device processors, on the mobile application, to the first user, a first audio conversation involving a second user and a third user, wherein the second user accesses the mobile application on a second mobile device of the second user, and wherein the third user accesses the mobile application on a third mobile device of the third user; receiving, using one or more computing device processors, a request from the first user, listening to the first audio conversation involving the second user and the third user, to join a waitlist associated with at least one of the second user, the third user, or the first audio conversation; adding, using the one or more computing device processors, the first user to the waitlist associated with at least one of the second user, the third user, or the first audio conversation; enabling, using the one or more computing device processors, at least one of the second user or the third user to view the waitlist; and initiating, using the one or more computing device processors, a second audio conversation between or among the at least one of the second user or the third user, and a user on the waitlist, upon termination of the first audio conversation.

In some embodiments, a method is provided for handling waitlists associated with users during audio conversations, the method comprising: determining a first user accesses a mobile application on a first mobile device of the first user; broadcasting, on the mobile application, to the first user, a first audio conversation involving a second user and a third user, wherein the second user accesses the mobile application on a second mobile device of the second user, and wherein the third user accesses the mobile application on a third mobile device of the third user; receiving a request from the first user, listening to the first audio conversation involving the second user and the third user, to join a waitlist associated with at least one of the second user, the third user, or the first audio conversation; adding the first user to the waitlist associated with the at least one of the second user, the third user, or the first audio conversation; enabling at least one of the second user or the third user to view the waitlist; and initiating a second audio conversation between or among the at least one of the second user or the third user, and a user on the waitlist, upon termination of the first audio conversation.

In some embodiments, the user on the waitlist is selected by the second user.

In some embodiments, the user on the waitlist is the first user.

In some embodiments, the user on the waitlist comprises a top-most user on the waitlist.

In some embodiments, the waitlist comprises a fourth user.

In some embodiments, the fourth user is presented with an option to drop off from the waitlist.

In some embodiments, the fourth user is deleted from the waitlist in response to the fourth user initiating a third audio conversation with a fifth user on the mobile application.

In some embodiments, the fourth user is presented with an estimated waiting time to initiate a third audio conversation with the at least one of the second user or the third user.

In some embodiments, the estimated waiting time is based on a conversation history, on the mobile application, of the at least one of the second user or the third user during a period.

In some embodiments, the conversation history comprises a conversation duration associated with one or more previous conversations.

In some embodiments, the first audio conversation is terminated by at least one of the mobile application, the second user, or the third user.

Systems, methods, and computer program products are provided for connecting users and speakers via audio conversations on a mobile application. In some embodiments, a method for connecting users and speakers via audio conversations on a mobile application, the method comprising: providing, using one or more computing device processors, speaker information associated with a speaker, wherein the speaker accesses a mobile application on a first mobile device of the speaker; determining, using the one or more computing device processors, a user accesses a mobile application on a second mobile device of the user; initiating, using the one or more computing device processors, an audio conversation between the speaker and the user; broadcasting, using the one or more computing device processors, on the mobile application, to a listener, an audio conversation involving the speaker and the user, wherein the listener accesses the mobile application on a third mobile device of the listener, wherein at least one of a first visual representation of the speaker not comprising a first photographic or video image of the speaker, and a second visual representation of the user not comprising a second photographic or video image of the user, is displayed on a user interface, associated with the mobile application, of the third mobile device of the listener during the broadcasting of the audio conversation involving the speaker and the user.

In some embodiments, a method is provided for connecting users and speakers via audio conversations on a mobile application, the method comprising: providing, using one or more computing device processors, speaker information associated with a speaker, wherein the speaker accesses a mobile application on a first mobile device of the speaker; determining, using the one or more computing device processors, a user accesses the mobile application on a second mobile device of the user; initiating, using the one or more computing device processors, an audio conversation between the speaker and the user; broadcasting, using the one or more computing device processors, on the mobile application, to a listener, the audio conversation involving the speaker and the user, wherein the listener accesses the mobile application on a third mobile device of the listener, wherein at least one of a first visual representation of the speaker not comprising a first photographic or video image of the speaker, and a second visual representation of the user not comprising a second photographic or video image of the user, is displayed on a user interface, associated with the mobile application, of the third mobile device of the listener during the broadcasting of the audio conversation involving the speaker and the user, and wherein at least a portion of the first visual representation of the speaker dynamically changes form, in substantially real-time, when the speaker speaks during the audio conversation, and wherein the at least the portion of the first visual representation of the speaker remains substantially static when the speaker does not speak during the audio conversation; and transmitting or initiating presentation of, to the user, second speaker information associated with a second speaker similar to the speaker.

In some embodiments, at least a portion of the first visual representation of the speaker dynamically changes form, in substantially real-time, when the speaker speaks during the audio conversation, and wherein the at least the portion of the first visual representation of the speaker remains substantially static when the speaker does not speak during the audio conversation.

In some embodiments, the first visual representation comprises at least one of an avatar, an emoji, a symbol, a persona, an animation, a cartoon, an indicia, or an illustration.

In some embodiments, the second visual representation is associated with or comprises a product, a service, or a logo.

In some embodiments, the user accesses the speaker information on a platform available to selected users.

In some embodiments, the speaker information comprises at least one of an interest associated with the speaker; the first visual representation; profile information associated with the speaker; listening history, associated with the speaker, on the mobile application; speaking history, associated with the speaker, on the mobile application; usage history, associated with the speaker, on the mobile application; follower user information associated with followers that follow the speaker on the mobile application; number of followers that follow the speaker; users followed by the speaker on the mobile application; user information associated with the users followed by the speaker on the mobile application; third-party social network information associated with the speaker; search history or search results, associated with the speaker, on the mobile application; search history or search results, associated with the speaker, on a third-party application or website; time spent by the speaker on the mobile application; duration of at least one previous audio conversation, associated with the speaker, on the mobile application; at least one statistic associated with multiple previous audio conversations, associated with the speaker, on the mobile application; current location associated with the speaker; location history associated with the speaker; device information associated with the first mobile device; network information associated with the first mobile device; a subject, topic, or hashtag that the speaker is interested in; audio content associated with previous audio conversations or live audio conversation associated with the speaker; conversation duration associated with the previous audio conversations or the live audio conversation associated with the speaker; number, location, listener user information, or interest information of listeners associated with the previous audio conversations or the live audio conversation associated with the speaker; a previous, current, or predicted mood of the speaker during a period; or an average listening time for one or more listeners associated with one or more current, previous, or future audio conversations involving the speaker; a listening time statistic or information for the one or more listeners associated with the one or more current, previous, or future audio conversations involving the speaker; or a speaking time statistic or information for the one or more current, previous, or future audio conversations involving the speaker. In some embodiments, the speaker is currently live on the mobile application. In some embodiments, the method further comprises sending a notification to the speaker indicating that the user wants to initiate the audio conversation between the speaker and the user. In some embodiments, the speaker is offline. In some embodiments, the speaker is presented with an indicator on a second user interface of the mobile application on the first mobile device, wherein the indicator provides first data associated with a completed portion of the audio conversation, and predicted second data associated with a remaining portion of the audio conversation.

In some embodiments, the method further comprises transmitting or initiating presentation of, to the user, second speaker information associated with a second speaker similar to the speaker.

In some embodiments, the second speaker is similar to the speaker based on a number or type of common listeners shared between the speaker and the second speaker.

In some embodiments, the method further comprises providing the speaker information and providing second speaker information simultaneously on the second user interface of the mobile application on the second mobile device.

In some embodiments, the method further comprises transmitting a notification to the speaker that the user executed a computing operation to initiate the audio conversation between the speaker and the user.

In some embodiments, the method further comprises transmitting a notification to the speaker that the user executed a computing operation to obtain a next or top-most position to speak with the speaker on a waitlist associated with the speaker.

In some embodiments, the notification is displayed in the waitlist viewable by the speaker.

In some embodiments, the method further comprises determining the user executed a computing operation; and in response to determining the user executed the computing operation, adding the user to a waitlist associated with the speaker.

In some embodiments, initiating the audio conversation between the speaker and the user comprises terminating a second audio conversation between the speaker and a second user, wherein the second audio conversation is terminated either automatically or by the speaker.

In some embodiments, the speaker comprises an influencer.

In some embodiments, the speaker is in a solo audio conversation (no users present; only speaker is present such that the listeners are listening to the speaker) before the audio conversation between the speaker and the user is initiated.

In some embodiments, an apparatus is provided for connecting users and speakers via audio conversations on a mobile application. The apparatus comprising: one or more computing device processors; one or more memory systems comprising code, executable by the one or more computing device processors, and configured to: provide speaker information associated with a speaker, wherein the speaker accesses a mobile application on a first mobile device of the speaker; determine a user accesses a mobile application on a second mobile device of the user; initiate an audio conversation between the speaker and the user; broadcast, on the mobile application, to a listener, a first audio conversation involving the speaker and the user, wherein the listener accesses the mobile application on a third mobile device of the listener, wherein at least one of a first visual representation of the speaker not comprising a first photographic or video image of the speaker, and a second visual representation of the user not comprising a second photographic or video image of the user, is displayed on a user interface, associated with the mobile application, of the third mobile device of the listener during the broadcasting of the audio conversation involving the speaker and the user.

In some embodiments, an apparatus is provided for connecting users and speakers via audio conversations on a mobile application. The apparatus comprises: one or more computing device processors; one or more memory systems comprising code, executable by the one or more computing device processors, and configured to: provide speaker information associated with a speaker, wherein the speaker accesses a mobile application on a first mobile device of the speaker; determine a user accesses the mobile application on a second mobile device of the user; determine the user executed a computing operation; in response to determining the user executed the computing operation, add the user to a waitlist associated with the speaker; terminate a first audio conversation between the speaker and a second user, wherein the first audio conversation is terminated either automatically or by the speaker; initiate a second audio conversation between the speaker and the user; and broadcast, on the mobile application, to a listener, the second audio conversation involving the speaker and the user, wherein the listener accesses the mobile application on a third mobile device of the listener, wherein at least one of a first visual representation of the speaker not comprising a first photographic or video image of the speaker, and a second visual representation of the user not comprising a second photographic or video image of the user, is displayed on a user interface, associated with the mobile application, of the third mobile device of the listener during the broadcasting of the second audio conversation involving the speaker and the user, and wherein at least a portion of the first visual representation of the speaker dynamically changes form, in substantially real-time, when the speaker speaks during the second audio conversation, and wherein the at least the portion of the first visual representation of the speaker remains substantially static when the speaker does not speak during the second audio conversation.

In some embodiments, the apparatus comprises at least one of an application server and at least one of the first mobile device, the second mobile device, or the third mobile device. In some embodiments, the first visual representation comprises a facial representation. In some embodiments, the at least the portion of the first visual representation comprises a lip or a mouth.

In some embodiments, at least one of the speaker, the user, or the listener is added to a feed presented to at least one second user, such that each of the at least one of the speaker, the user, or the listener is presented on a user interface of a mobile device of the at least one second user, and the at least one second user is presented with at least one option to approve, disapprove, or interact with the at least one of the presented speaker, the user, or the listener.

In some embodiments, the method further comprises inserting a targeted communication such as an advertisement in the feed, such that the targeted communication is presented on the user interface of the mobile device of the at least one second user.

In some embodiments, the at least one of the speaker, the user, the listener, or the targeted communication is presented individually on the user interface of the mobile device of the at least one second user.

In some embodiments, a method is provided for connecting users and speakers via audio conversations on a mobile application. In some embodiments, the method comprises:

providing, using one or more computing device processors, speaker information associated with a speaker, wherein the speaker accesses a mobile application on a first mobile device of the speaker; determining, using the one or more computing device processors, a user accesses the mobile application on a second mobile device of the user; determining, using the one or more computing device processors, the user executed a computing operation; in response to determining the user executed the computing operation, adding, using the one or more computing device processors, the user to a waitlist associated with the speaker; terminating, using the one or more computing device processors, a first audio conversation between the speaker and a second user, wherein the first audio conversation is terminated either automatically or by the speaker; initiating, using the one or more computing device processors, a second audio conversation between the speaker and the user; and broadcasting, using the one or more computing device processors, on the mobile application, to a listener, the second audio conversation involving the speaker and the user, wherein the listener accesses the mobile application on a third mobile device of the listener, wherein at least one of a first visual representation of the speaker not comprising a first photographic or video image of the speaker, and a second visual representation of the user not comprising a second photographic or video image of the user, is displayed on a user interface, associated with the mobile application, of the third mobile device of the listener during the broadcasting of the second audio conversation involving the speaker and the user, and wherein at least a portion of the first visual representation of the speaker dynamically changes form, in substantially real-time, when the speaker speaks during the second audio conversation, and wherein the at least the portion of the first visual representation of the speaker remains substantially static when the speaker does not speak during the second audio conversation.

In some embodiments, at least one of the speaker, the user, or the listener is added to a feed presented to at least one third user, such that each of the at least one of the speaker, the user, or the listener is presented on a user interface of a mobile device of the at least one third user, and the at least one third user is presented with at least one option to approve, disapprove, or interact with the at least one of the presented speaker, the user, or the listener.

In some embodiments, the first visual representation or the second visual representation comprises at least one of an avatar, an emoji, a symbol, a persona, an animation, a cartoon, an indicia, an illustration, a histogram, or a graph.

In some embodiments, the code is further configured to add at least one of the speaker, the user, or the listener to a feed presented to at least one third user, such that each of the at least one of the speaker, the user, or the listener is presented on a user interface of a mobile device of the at least one third user, and the at least one third user is presented with at least one option to approve, disapprove, or interact with the at least one of the presented speaker, the user, or the listener.

In some embodiments, methods, systems, and computer program products are provided for enabling substantially instantaneous switching between conversation mode and listening mode on a mobile application. An exemplary method comprises: determining, using one or more computing device processors, a first user accesses a mobile application on a first mobile device of the first user; enabling, using the one or more computing device processors, the first user to select a conversation mode option or a listening mode option on the mobile application, wherein the conversation mode option and the listening mode option are presented simultaneously on a user interface of the mobile application on the first mobile device of the first user, wherein the first user cannot simultaneously select both the conversation mode option and the listening mode option; in response to the first user selecting the conversation mode option, modifying, using the one or more computing device processors, visual display of the conversation mode option, and determining, using the one or more computing device processors, a second user for conversing with the first user, wherein the second user accesses the mobile application on a second mobile device of the second user; or in response to the first user selecting the listening mode option, modifying, using the one or more computing device processors, visual display of the listening mode option, and determining, using the one or more computing device processors, an audio conversation involving a third user for broadcasting to the first user on the mobile application, wherein the third user accesses the mobile application on a third mobile device of the third user.

In some embodiments, a method is provided for enabling substantially instantaneous switching between conversation mode and listening mode on a mobile application. The method comprises: determining, using one or more computing device processors, a first user accesses a mobile application on a first mobile device of the first user; enabling, using the one or more computing device processors, the first user to select a conversation mode option or a listening mode option on the mobile application, wherein the conversation mode option and the listening mode option are presented simultaneously on a user interface of the mobile application on the first mobile device of the first user, wherein the first user cannot simultaneously select both the conversation mode option and the listening mode option; in response to the first user selecting the conversation mode option, modifying, using the one or more computing device processors, a first image of the conversation mode option, and determining, using the one or more computing device processors, a second user for conversing with the first user, wherein the second user accesses the mobile application on a second mobile device of the second user, or in response to the first user selecting the listening mode option, modifying, using the one or more computing device processors, a second image of the listening mode option, and determining, using the one or more computing device processors, a first audio conversation involving a third user for broadcasting to the first user on the mobile application, wherein the third user accesses the mobile application on a third mobile device of the third user; and in response to selecting, using the one or more computing device processors, the listening mode option, a first visual representation of the third user not comprising a first photographic or video image of the third user, is displayed on the user interface, associated with the mobile application, on the first mobile device of the first user during the broadcasting of the first audio conversation involving the third user, wherein the first visual representation comprises at least one of an avatar, an emoji, a symbol, a persona, an animation, a cartoon, an indicia, an illustration, a histogram, or a graph.

In some embodiments, in response to selecting the conversation mode option, a first visual representation of the second user not comprising a first photographic or video image of the second user is displayed on the user interface, associated with the mobile application, on the first mobile device of the first user during a second audio conversation between the first user and the second user.

In some embodiments, in response to selecting the listening mode option, a first visual representation of the third user not comprising a first photographic or video image of the third user, is displayed on the user interface, associated with the mobile application, on the first mobile device of the first user during the broadcasting of the audio conversation involving the third user.

In some embodiments, at least a portion of the first visual representation of the third user dynamically changes form, in substantially real-time, when the third user speaks during the first audio conversation, and wherein the at least the portion of the first visual representation of the third user remains substantially static when the third user does not speak during the first audio conversation.

In some embodiments, the first visual representation comprises at least one of an avatar, an emoji, a symbol, a persona, an animation, a cartoon, an indicia, or an illustration.

In some embodiments, the conversation mode option comprises an audio-only conversation mode option and the listening mode option comprises a listening-only conversation mode option.

In some embodiments, the conversation mode comprises an audiovisual conversation mode option and the listening mode option comprises an audiovisual listening mode option.

In some embodiments, the conversation mode option and the listening mode option are presented near each other on the user interface of the first mobile device of the first user.

In some embodiments, the conversation mode option and the listening mode options are presented within at least one of 1 inch, 0.75 inches, 0.5 inches, 0.25 inches, 0.1 inches, 0.05 inches, 0.025 inches, 0.01 inches, 0.005 inches, or 0.0025 inches of each other on a bottom portion of the user interface of the first mobile device of the first user.

In some embodiments, the conversation mode option and the listening mode option are adjacent to each other on the user interface of the first mobile device of the first user.

In some embodiments, the first image of the conversation mode option is highlighted when selected by the first user, or wherein the second image of the listening mode option is highlighted when selected by the first user.

In some embodiments, the first image of the conversation mode option is highlighted and the second image of the listening mode option is unhighlighted in response to the first user switching the mobile application from operating in listening mode to operating in conversation mode.

In some embodiments, the second image of the listening mode option is highlighted and the first image of the conversation mode option is unhighlighted in response to the first user switching the mobile application from operating in conversation mode to operating in listening mode.

In some embodiments, an apparatus for enabling substantially instantaneous switching between conversation mode and listening mode on a mobile application, the apparatus comprises one or more computing device processors; one or more memory systems comprising code, executable by the one or more computing device processors, and configured to: determine a first user accesses a mobile application on a first mobile device of the first user; enable the first user to select a conversation mode option or a listening mode option on the mobile application, wherein the conversation mode option and the listening mode option are presented together on a user interface of the mobile application on the first mobile device of the first user, wherein the first user cannot simultaneously select both the conversation mode option and the listening mode option; in response to the first user selecting the conversation mode option, modify visual display of the conversation mode option, and determine a second user for conversing with the first user, wherein the second user accesses the mobile application on a second mobile device of the second user; or in response to the first user selecting the listening mode option, modify visual display of the listening mode option, and determine an audio conversation involving a third user for broadcasting to the first user on the mobile application, wherein the third user accesses the mobile application on a third mobile device of the third user.

In some embodiments, an apparatus is provided for enabling substantially instantaneous switching between conversation mode and listening mode on a mobile application. The apparatus comprises: one or more computing device processors; one or more memory systems comprising code, executable by the one or more computing device processors, and configured to: determine a first user accesses a mobile application on a first mobile device of the first user; enable the first user to select a conversation mode option or a listening mode option on the mobile application, wherein the conversation mode option and the listening mode option are presented together on a user interface of the mobile application on the first mobile device of the first user, wherein the first user cannot simultaneously select both the conversation mode option and the listening mode option; in response to the first user selecting the conversation mode option, modify a first image of the conversation mode option, and determine a second user for conversing with the first user, wherein the second user accesses the mobile application on a second mobile device of the second user, or in response to the first user selecting the listening mode option, modify a second image of the listening mode option, and determine a first audio conversation involving a third user for broadcasting to the first user on the mobile application, wherein the third user accesses the mobile application on a third mobile device of the third user; and in response to the first user selecting the conversation mode option, a first visual representation of the second user not comprising a first photographic or video image of the second user is displayed on the user interface, associated with the mobile application, on the first mobile device of the first user during a second audio conversation between the first user and the second user, wherein the first visual representation comprises at least one of an avatar, an emoji, a symbol, a persona, an animation, a cartoon, an indicia, an illustration, a histogram, or a graph.

In some embodiments, the apparatus comprises at least one of an application server and at least one of the first mobile device, the second mobile device, or the third mobile device.

In some embodiments, a method for enabling substantially instantaneous switching between conversation mode and listening mode on a mobile application, the method comprises: determining, using one or more computing device processors, a first user accesses a mobile application on a first mobile device of the first user; enabling, using the one or more computing device processors, the first user to select a conversation mode option or a listening mode option on the mobile application, wherein the conversation mode option and the listening mode option are presented on a user interface of the mobile application on the first mobile device of the first user, wherein the first user cannot simultaneously select both the conversation mode option and the listening mode option; in response to the first user selecting the conversation mode option, modifying, using the one or more computing device processors, visual display of the conversation mode option, and determining, using the one or more computing device processors, a second user for conversing with the first user, wherein the second user accesses the mobile application on a second mobile device of the second user; or in response to the first user selecting the listening mode option, modifying, using the one or more computing device processors, visual display of the listening mode option, and determining, using the one or more computing device processors, an audio conversation involving a third user for broadcasting to the first user on the mobile application, wherein the third user accesses the mobile application on a third mobile device of the third user.

In some embodiments, a method is provided for enabling substantially instantaneous switching between conversation mode and listening mode on a mobile application. The method comprises: determining, using one or more computing device processors, a first user accesses a mobile application on a first mobile device of the first user; enabling, using the one or more computing device processors, the first user to select a conversation mode option or a listening mode option on the mobile application, wherein the conversation mode option and the listening mode option are presented on a user interface of the mobile application on the first mobile device of the first user, wherein the first user cannot simultaneously select both the conversation mode option and the listening mode option; in response to the first user selecting the conversation mode option, modifying, using the one or more computing device processors, a first image of the conversation mode option, and determining, using the one or more computing device processors, a second user for conversing with the first user, wherein the second user accesses the mobile application on a second mobile device of the second user, or in response to the first user selecting the listening mode option, modifying, using the one or more computing device processors, a second image of the listening mode option, and determining, using the one or more computing device processors, a first audio conversation involving a third user for broadcasting to the first user on the mobile application, wherein the third user accesses the mobile application on a third mobile device of the third user; and in response to selecting, using the one or more computing device processors, the conversation mode option, a first visual representation of the second user not comprising a first photographic or video image of the second user is displayed on the user interface, associated with the mobile application, on the first mobile device of the first user during a second audio conversation between the first user and the second user, wherein the first visual representation comprises at least one of an avatar, an emoji, a symbol, a persona, an animation, a cartoon, an indicia, an illustration, a histogram, or a graph.

In some embodiments, the method comprises in response to the first user selecting the conversation mode option, modifying, using the one or more computing device processors, the first image of the conversation mode option and the second image of the listening mode option.

In some embodiments, the method comprises in response to the first user selecting the listening mode option, modifying, using the one or more computing device processors, the second image of the listening mode option and the first image of the conversation mode option.

In some embodiments, the mobile application cannot be operated in any other mode other than conversation mode or listening mode.

In some embodiments, the conversation mode option and the listening mode option are integrated into a single option such that when the first user selects the single option when the mobile application, on the first mobile device, is in conversation mode, the mobile application switches from the conversation mode to listening mode, and when the user selects the single option when the mobile application, on the first mobile device, is in the listening mode, the mobile application switches from the listening mode to the conversation mode.

In some embodiments, the first audio conversation or the second audio conversation comprises an audio-only conversation.

In some embodiments, the first audio conversation or the second audio conversation comprises an audio-video conversation.

In some embodiments, the first audio conversation or the second audio conversation comprises an audio-visual conversation.

Therefore, in some embodiments, the user interface comprises visual representations of the users/speakers may be replaced by still images or substantially live video of the users/speakers.

In some embodiments, the conversation mode option comprises a video conferencing mode option such that the first user enters a video conference with the second user, conducted on the mobile application, when selecting the conversation mode option.

In some embodiments, the listening mode option comprises a video watching mode option such that the first user watches, on the mobile application on the first mobile device, a video or video conference associated with or involving the third user, when selecting the listening mode option.

In some embodiments, the first visual representation comprises a facial representation.

In some embodiments, the at least the portion of the first visual representation comprises a lip or a mouth.

Systems, methods, and computer program products are provided for initiating and extending audio conversations among mobile device users on a mobile application. In some embodiments, a method comprises: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first user and the second user; transmitting, using the one or more computing device processors, audio conversation information to at least one of the first user or the second user; broadcasting, using the one or more computing device processors, the audio conversation to a third user who accesses the mobile application on a third mobile device of the third user; transmitting, using the one or more computing device processors, to the first mobile device for visual display, during the audio conversation, on a user interface of the mobile application on the first mobile device, a visual representation of the second user not comprising a photographic or video image of the second user; and transmitting, using the one or more computing device processors, to the second mobile device for visual display, during the audio conversation, on a user interface of the mobile application on the second mobile device, a visual representation of the first user not comprising a photographic or video image of the first user.

In some embodiments, a method is provided for initiating and streaming audio conversations. The method comprises: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between at least the first user and the second user, wherein the audio conversation does not comprise a video conversation between the at least the first user and the second user; transmitting, using the one or more computing device processors, audio conversation information to at least one of the first user or the second user; streaming, using the one or more computing device processors, the audio conversation to a third user who accesses the mobile application on a third mobile device of the third user; streaming, using the one or more computing device processors, the audio conversation to a fourth user who accesses the mobile application on a fourth mobile device of the fourth user; transmitting, using the one or more computing device processors, to the first mobile device for visual display, during the audio conversation, on a user interface of the mobile application on the first mobile device, a visual representation of the second user not comprising a video of the second user; transmitting, using the one or more computing device processors, to the second mobile device for visual display, during the audio conversation, on a user interface of the mobile application on the second mobile device, a visual representation of the first user not comprising a video of the first user; transmitting, using the one or more computing device processors, to the third mobile device for visual display, during the audio conversation, on a user interface of the mobile application on the third mobile device, both the visual representation of the first user not comprising the video of the first user, and the visual representation of the second user not comprising the video of the second user; transmitting, using the one or more computing device processors, to the fourth mobile device for visual display, during the audio conversation, on a user interface of the mobile application on the fourth mobile device, both the visual representation of the first user not comprising the video of the first user, and the visual representation of the second user not comprising the video of the second user; receiving, using the one or more computing device processors, from the fourth mobile device, a selection of the visual representation of the first user not comprising the video of the first user; and in response to receiving the selection of the visual representation of the first user not comprising the video of the first user, transmitting, using the one or more computing device processors, to the fourth mobile device for visual display, during the streaming of the audio conversation between the at least the first user and the second user, on a second user interface, different from the user interface, of the mobile application on the fourth mobile device, user profile information associated with the first user, wherein the user profile information associated with the first user is editable by the first user during the audio conversation between the at least the first user and the second user, and wherein voice input of the third user received from the third mobile device is output on the fourth mobile device, during the audio conversation, in response to a request received from the third mobile device and transmitted to the first mobile device or the second mobile device, and approval of the request received from the first mobile device or the second mobile device.

In some embodiments, the method further comprises: transmitting, using the one or more computing device processors, to the third mobile device for visual display, during the audio conversation, on a user interface of the mobile application on the third mobile device, the visual representation of the first user not comprising the first photographic or video image of the first user; and transmitting, using the one or more computing device processors, to the third mobile device for visual display, during the audio conversation, on the user interface of the mobile application on the third mobile device, the visual representation of the second user not comprising a second photographic or video image of the second user.

In some embodiments, the audio conversation information comprises at least one of game information, a hint, a quote, a question, trivia information, role-playing information, improvisation information, social game information, word game information, debate information, or social game information.

In some embodiments, the audio conversation information is usable by at least one of the first user or the second user to initiate or extend the audio conversation. In some embodiments, the audio conversation information comprises trending information extracted from a third-party social network. In some embodiments, the audio conversation information is transmitted to the first user and second audio conversation information, different from the audio conversation information, is transmitted to the second user.

In some embodiments, the audio conversation information is transmitted to the first user and second audio conversation information, different from the audio conversation information, is transmitted to the second user either before, after, or substantially simultaneously with the audio conversation information transmitted to the first user.

In some embodiments, the method further comprises receiving a topic from at least one of the first user or the second user, wherein the audio conversation information is based on the topic. In some embodiments, the method further comprises initiating presentation of a prompt on the user interface of the mobile application on the first user device, wherein the prompt prompts the first user to pick a topic. In some embodiments, the topic comprises at least one trending topic received or obtain from at least one social network.

In some embodiments, the topic comprises at least one topic associated with general chatting. In some embodiments, the topic is presented on the user interface of the mobile application on the first mobile device during the audio conversation between the first user and the second user. In some embodiments, the topic is presented simultaneously with the visual representation of the second user on the user interface of the mobile application on the first mobile device during the audio conversation between the first user and the second user. In some embodiments, the topic is presented simultaneously with the visual representation of the first user on the user interface of the mobile application on the second mobile device during the audio conversation between the first user and the second user.

In some embodiments, the topic is presented on the user interface of the mobile application on the first mobile device during the audio conversation.

In some embodiments, the topic is presented simultaneously with the visual representation of the second user on the user interface of the mobile application on the first mobile device during the audio conversation.

In some embodiments, the topic is presented simultaneously with the visual representation of the first user on the user interface of the mobile application on the second mobile device during the audio conversation.

In some embodiments, the user interface of the mobile application on the first user device comprises an option to request new audio conversation information.

In some embodiments, the audio conversation information is based on at least one of first user information associated with the first user or second user information associated with the second user.

In some embodiments, the audio conversation information is presented on a user interface associated with at least one of the first mobile device or the second mobile device during the audio conversation between the first user and the second user.

In some embodiments, the audio conversation information is presented on a user interface associated with at least one of the first mobile device or the second mobile device during the audio conversation.

In some embodiments, the visual representation comprises at least one of an avatar, an emoji, a symbol, a persona, an animation, a cartoon, an indicia, an illustration, a graph, or a histogram.

In some embodiments, at least a portion of the visual representation of the first user dynamically changes form, in substantially real-time, when the first user speaks during the audio conversation, and wherein the at least the portion of the visual representation of the first user remains substantially static when the first user does not speak during the audio conversation.

In some embodiments, the method further comprises selecting, using the one or more computing device processors, the first user and the second user for participating in an audio conversation based on at least first user information associated with the first user and second user information associated with the second user.

In some embodiments, the method further comprises selecting, using the one or more computing device processors, the first user and the second user for participating in the audio conversation based on at least first user information associated with the first user and second user information associated with the second user.

In some embodiments, the first user information comprises at least one of an interest associated with the first user; the visual representation associated with the first user; profile information associated with the first user; listening history, associated with the first user, on the mobile application; speaking history, associated with the first user, on the mobile application; usage history, associated with the first user, on the mobile application; a user that follows the first user on the mobile application; third user information associated with the user; a fifth user that the first user follows on the mobile application; fourth user information associated with the fifth user; third-party social network information associated with the first user; search history, associated with the first user, on the mobile application; search history, associated with the first user, on a third-party application or website; time spent by the first user on the mobile application; duration of at least one previous audio conversation, associated with the first user, on the mobile application; at least one statistic associated with multiple previous audio conversations, associated with the first user, on the mobile application; current location associated with the first user; location history associated with the first user; device information associated with the first mobile device; network information associated with the first mobile device; a previous, current, or predicted mood of the first user during a period; a subject, topic, or hashtag that the first user is predicted to be interested in; predicted audio content associated with the audio conversation; predicted conversation duration associated with the audio conversation; predicted number or location of listeners associated with the audio conversation; an average listening time for one or more listeners associated with one or more current, previous, or future audio conversations involving the first user as a speaker; a listening time statistic or information for the one or more listeners associated with the one or more current, previous, or future audio conversations involving the first user as the speaker; or a speaking time statistic or information for the one or more current, previous, or future audio conversations involving the first user as the speaker.

In some embodiments, an apparatus is provided for initiating and broadcasting audio conversations, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; initiate an audio conversation between the first user and the second user; transmit audio conversation information to at least one of the first user or the second user; broadcast the audio conversation to a third user who accesses the mobile application on a third mobile device of the third user; transmit, to the first mobile device for visual display, during the audio conversation, on a user interface of the mobile application on the first mobile device, a visual representation of the second user not comprising a photographic or video image of the second user; and transmit, to the second mobile device for visual display, during the audio conversation, on a user interface of the mobile application on the second mobile device, a visual representation of the first user not comprising a photographic or video image of the first user.

In some embodiments, an apparatus is provided for initiating and streaming audio conversations. The apparatus comprises one or more computing device processors; one or more memory systems comprising code, executable by the one or more computing device processors, and configured to: determine a first user accesses a mobile application on a first mobile device of the first user; determine a second user accesses the mobile application on a second mobile device of the second user; initiate an audio conversation between at least the first user and the second user, wherein the audio conversation does not comprise a video conversation between the at least the first user and the second user; transmit audio conversation information to at least one of the first user or the second user; stream the audio conversation to a third user who accesses the mobile application on a third mobile device of the third user; stream the audio conversation to a fourth user who accesses the mobile application on a fourth mobile device of the fourth user; transmit, to the first mobile device for visual display, during the audio conversation, on a user interface of the mobile application on the first mobile device, a visual representation of the second user not comprising a video of the second user; transmit, to the second mobile device for visual display, during the audio conversation, on a user interface of the mobile application on the second mobile device, a visual representation of the first user not comprising a video of the first user; transmit, to the third mobile device for visual display, during the audio conversation, on a user interface of the mobile application on the third mobile device, both the visual representation of the first user not comprising the video of the first user, and the visual representation of the second user not comprising the video of the second user; transmit, to the fourth mobile device for visual display, during the audio conversation, on a user interface of the mobile application on the fourth mobile device, both the visual representation of the first user not comprising the video of the first user, and the visual representation of the second user not comprising the video of the second user; receive, from the fourth mobile device, a selection of the visual representation of the first user not comprising the video of the first user; and in response to receiving the selection of the visual representation of the first user not comprising the video of the first user, transmit, to the fourth mobile device for visual display, during the streaming of the audio conversation between the at least the first user and the second user, on a second user interface, different from the user interface, of the mobile application on the fourth mobile device, user profile information associated with the first user, wherein the user profile information associated with the first user is editable by the first user during the audio conversation between the at least the first user and the second user, wherein the audio conversation between the at least the first user and the second user continues to stream to the fourth mobile device when the fourth user, accesses, during the audio conversation, a second mobile application on the fourth mobile device, and wherein voice input of the third user received from the third mobile device is output on the fourth mobile device, during the audio conversation, in response a request transmitted to the first mobile device or the second mobile device, and approval of the request received from the first mobile device or the second mobile device.

In some embodiments, the apparatus comprises at least one of an application server, the first mobile device, the second mobile device, the third mobile device, or the fourth mobile device. In some embodiments, the visual representation of the first user comprises a facial representation. In some embodiments, the at least the portion of the visual representation of the first user comprises a lip or a mouth.

In some embodiments, an exemplary method is provided comprising: receiving, using one or more computing device processors, an instruction from a first user to initiate a private audio conversation with a second user, wherein the second user and the first user are connected on a network associated with a mobile application; transmitting, using the one or more computing device processors, a message to the second user indicating that the first user wants to initiate the private audio conversation with the second user; receiving, using the one or more computing device processors, approval from the second user in response to the message; and initiating, using the one or more computing device processors, the private audio conversation between the first user and the second user; receiving, using the one or more computing device processors, a second instruction from the first user to switch the private audio conversation to a public audio conversation, wherein the public audio conversation is audible to at least one user other than the first user and the second user; transmitting, using the one or more computing device processors, a second message to the second user indicating that the first user wants to switch the private audio conversation to the public audio conversation; receiving, using the one or more computing device processors, second approval from the second user in response to the second message; switching, using the one or more computing device processors, the private audio conversation to the public audio conversation; and enabling, using the one or more computing device processors, a third user to listen to the public audio conversation.

In some embodiments, a method is provided for initiating and streaming audio conversations. The method comprises: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between at least the first user and the second user, wherein the audio conversation does not comprise a video conversation between the at least the first user and the second user; transmitting, using the one or more computing device processors, audio conversation information to at least one of the first user or the second user; streaming, using the one or more computing device processors, the audio conversation to a third user who accesses the mobile application on a third mobile device of the third user; streaming, using the one or more computing device processors, the audio conversation to a fourth user who accesses the mobile application on a fourth mobile device of the fourth user; transmitting, using the one or more computing device processors, to the first mobile device for visual display, during the audio conversation, on a user interface of the mobile application on the first mobile device, a visual representation of the second user not comprising a video of the second user; transmitting, using the one or more computing device processors, to the second mobile device for visual display, during the audio conversation, on a user interface of the mobile application on the second mobile device, a visual representation of the first user not comprising a video of the first user; transmitting, using the one or more computing device processors, to the third mobile device for visual display, during the audio conversation, on a user interface of the mobile application on the third mobile device, both the visual representation of the first user not comprising the video of the first user, and the visual representation of the second user not comprising the video of the second user; transmitting, using the one or more computing device processors, to the fourth mobile device for visual display, during the audio conversation, on a user interface of the mobile application on the fourth mobile device, both the visual representation of the first user not comprising the video of the first user, and the visual representation of the second user not comprising the video of the second user; receiving, using the one or more computing device processors, from the fourth mobile device, a selection of the visual representation of the first user not comprising the video of the first user; and in response to receiving the selection of the visual representation of the first user not comprising the video of the first user, transmitting, using the one or more computing device processors, to the fourth mobile device for visual display, during the streaming of the audio conversation between the at least the first user and the second user, on a second user interface, different from the user interface, of the mobile application on the fourth mobile device, user profile information associated with the first user, wherein voice input of the third user received from the third mobile device is output on the fourth mobile device, during the audio conversation, in response to a request transmitted to the first mobile device or the second mobile device, and approval of the request received from the first mobile device or the second mobile device.

In some embodiments, the first user is comprised in a user connections list on a user profile of the second user. In some embodiments, the second user is comprised in a user connections list on a user profile of the first user. In some embodiments, the private audio conversation is not added to a first user profile of the first user and a second user profile of the second user. In some embodiments, the public audio conversation is added to a first user profile of the first user and a second user profile of the second user.

In some embodiments, the learning by the application server or mobile application is achieved based on analysis of many users' data such that learning obtained from one user's data may be applied to another user.

In some embodiments, a method is provided for initiating and broadcasting audio conversations, and transmitting hashtags, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first mobile device of the first user and the second mobile device of the second user; receiving, using the one or more computing device processors, from at least one of the first mobile device or the second mobile device, a hashtag associated with the audio conversation; initiating, using the one or more computing device processors, the audio conversation between the first user and the second user; broadcasting, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user not comprising a first photographic or video image of the first user; transmitting, using the one or more computing device processors, to the third mobile device for visual display, during the audio conversation, on the user interface of the mobile application on the third mobile device, a second visual representation of the second user not comprising a second photographic or video image of the second user; and transmitting, using the one or more computing device processors, to the third mobile device for visual display, during the audio conversation, on the user interface of the mobile application on the third mobile device, the hashtag associated with the audio conversation, wherein selecting the hashtag initiates visual display of information associated with the hashtag on a second user interface, different from the user interface, or on the first user interface, of the mobile application on the third mobile device.

In some embodiments, the hashtag is received at least one of before, after, or during the audio conversation.

In some embodiments, the method further comprises establishing a relationship between the hashtag and at least one of the first user or the second user.

In some embodiments, the method further comprises establishing a relationship between the audio conversation and a second audio conversation based on the hashtag associated with the audio conversation and a second hashtag associated with the second audio conversation.

In some methods, a method is provided for initiating and broadcasting audio conversations, and transmitting descriptive operators, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first mobile device of the first user and the second mobile device of the second user; determining, using the one or more computing device processors, a descriptive operator for the audio conversation; initiating, using the one or more computing device processors, the audio conversation between the first mobile device of the first user and the second mobile device of the second user; broadcasting, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user not comprising a first photographic or video image of the first user; transmitting, using the one or more computing device processors, to the third mobile device for visual display, during the audio conversation, on the user interface of the mobile application on the third mobile device, a second visual representation of the second user not comprising a second photographic or video image of the second user; and transmitting, using the one or more computing device processors, to the third mobile device for visual display, during the audio conversation, on the user interface of the mobile application on the third mobile device, the descriptive operator associated with the audio conversation, wherein selecting the descriptive operator initiates visual display of information associated with the descriptive operator on a second user interface, different from the user interface, or on the first user interface, of the mobile application on the third mobile device.

In some embodiments, the descriptive operator comprises a hashtag or a selectable hashtag.

In some embodiments, the descriptive operator is received from at least one of the first mobile device of the first user or the second mobile device of the second user.

In some embodiments, the first visual representation comprises at least one of an avatar, an emoji, a symbol, a persona, an animation, a cartoon, an indicia, an illustration, a histogram, or a graph.

In some embodiments, the method further comprises searching, based on the descriptive operator, an external social network or a second mobile application, and integrating a search result associated with the external social network or the second mobile application into the second user interface or a third user interface associated with the mobile application. In some embodiments, a link associated with the audio conversation (associated with the descriptive operator) on the mobile application is presented on a user interface of the external social network or the second mobile application that presents visual or audio posts associated with the same or related descriptive operator. Selecting the link may take the user to the mobile application or open the audio conversation within the external social network or second mobile application.

In some embodiments, the descriptive operator is automatically determined based on the audio conversation.

In some embodiments, the method further comprises determining a second descriptive operator for the audio conversation.

In some embodiments, the descriptive operator is related to the second descriptive operator, or wherein the second descriptive operator is determined based on the descriptive operator.

In some embodiments, the descriptive operator and the second descriptive operator are part of a descriptive operator hierarchy or tree-like structure.

In some embodiments, the audio conversation is displayed as a search result when a fourth user on a fourth mobile device searches for at least a portion of the descriptive operator in a search query associated with or in the mobile application.

In some embodiments, at least one of the first user or the second user is displayed as a search result when a fourth user on a fourth mobile device searches for at least a portion of the descriptive operator in a search query associated with or in the mobile application.

In some embodiments, at least one of the first user or the second user can edit the descriptive operator at least one of before, during, or after the audio conversation. In some embodiments, the descriptive operator may be locked from editing a certain period. In some embodiments, the descriptive operator may be edited, replaced (or other descriptive operators may be added or deleted) as the mobile applications or system learns and analyzes audio conversations over time.

In some embodiments, the descriptive operator comprises at least two descriptive operators.

In some embodiments, the descriptive operator comprises an operative indicator.

In some embodiments, the descriptive operator is received from the third mobile device of the third user.

In some embodiments, the descriptive operator is a suggested descriptive operator presented to and selected by at least one of the first user on the mobile device, the second user on the mobile device, or the third user on the third mobile device.

In some embodiments, the method further comprises establishing, based on the descriptive operator, a relationship between the first user and the second user.

In some embodiments, the method further comprises establishing, based on the descriptive operator, a relationship between the third user and at least one of the first user or the second user.

In some embodiments, the method further comprises establishing, based on the descriptive operator, a relationship between the audio conversation and at least one of the first user, the second user, or the third user.

In some embodiments, the method further comprises associating a descriptive operator with the first user based on at least one of a speaking, listening, or searching history of the user, one or more users that follow the first user, one or more second users that the user follows, a location associated with the first user, mobile application information associated with the first user, or social network information associated with the first user.

In some embodiments, an apparatus is provided for initiating and broadcasting audio conversations, and transmitting descriptive operators, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; initiate an audio conversation between the first user and the second user; determine a descriptive operator associated with the audio conversation; initiate, the audio conversation between the first user and the second user; broadcast the audio conversation to a third user who accesses the mobile application on a third mobile device of the third user; transmit, to the third mobile device for visual display, during the audio conversation, on a user interface of the mobile application on the third mobile device, a first visual representation of the first user; transmit, to the third mobile device for visual display, during the audio conversation, on the user interface of the mobile application on the third mobile device, a second visual representation of the second user; and transmit, to the third mobile device for visual display, during the audio conversation, on the user interface of the mobile application on the third mobile device, the descriptive operator associated with the audio conversation, wherein selecting the descriptive operator initiates visual display of information associated with the descriptive operator on a second user interface, different from the user interface, or on the first user interface, of the mobile application on the third mobile device.

In some embodiments, the apparatus comprises at least one of an application server, the first mobile device, the second mobile device, or the third mobile device.

In some embodiments, the code is further configured to filter audio conversations, speakers to talk to, or speakers to listen to based on a descriptive operator associated with or input by a fourth user on the mobile application on a fourth mobile device.

In some embodiments, the code is further configured to automatically associate, with a second audio conversation, a descriptive operator associated with at least one of the first user or the second user, when the first user or the second user do not input a second descriptive operator to associate with the second audio conversation.

In some embodiments, the code is further configured to create, based on a search parameter, a descriptive operator and store the descriptive parameter in a database, in response to the search parameter not substantially matching descriptive operators in the database.

In some embodiments, a method is provided for initiating and broadcasting audio conversations, and transmitting information associated with descriptive operators, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first mobile device of the first user and the second mobile device of the second user, wherein a descriptive operator is associated with the audio conversation; initiating, using the one or more computing device processors, the audio conversation between the first user and the second user; broadcasting, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user; determine a descriptive operator associated with the audio conversation; transmitting, using the one or more computing device processors, to the third mobile device for visual display, during the audio conversation, on the user interface of the mobile application on the third mobile device, a second visual representation of the second user; transmitting, using the one or more computing device processors, to the third mobile device for visual display, during the audio conversation, on the user interface of the mobile application on the third mobile device, the descriptive operator associated with the audio conversation; and transmitting, using the one or more computing device processors, to the third mobile device for visual display on a second user interface, different from the user interface, of the mobile application on the third mobile device, information associated with the descriptive operator associated with the audio conversation. In some embodiments, the descriptive operator may be a selectable descriptive operator. In other embodiments, the descriptive operator may be a non-selectable descriptive operator.

In some embodiments, the information associated with the descriptive operator comprises one or more live, recorded, or upcoming audio conversations.

In some embodiments, the information associated with the descriptive operator comprises one or more speakers associated with one or more live, recorded, or upcoming audio conversations.

In some embodiments, the information associated with the descriptive operator comprises one or more listeners associated with one or more live, recorded, or upcoming audio conversations.

In some embodiments, the information comprises one or more users following the descriptive operator.

In some embodiments, the information comprises an option to share the descriptive operator with a fourth user on the mobile application or on a social network or a second mobile application different from the mobile application.

In some embodiments, the transmitting the information associated with the descriptive operator associated with the audio conversation is performed in response to receiving a selection of the descriptive operator from the user interface of the mobile application.

In some embodiments, the transmitting the information associated with the descriptive operator associated with the audio conversation is performed in response to receiving a selection of the descriptive operator from a user interface displaying a user profile on the mobile application.

In some embodiments, the user profile is associated with a fourth user associated with the descriptive operator.

In some embodiments, an association of the fourth user with the descriptive operator is established based on at least one of a speaking history, a listening history, or a searching history of the user.

In some embodiments, the method further comprises: receiving, from the third mobile device, a search parameter on a third user interface of the mobile application on the third mobile device; searching, based on the search parameter, at least one database; and performing the transmitting the information associated with the descriptive operator associated with the audio conversation in response to the searching the at least one database.

In some embodiments, the search parameter comprises a portion of the descriptive operator.

In some embodiments, the descriptive operator comprises a hash operator or a non-hash operator comprised in the descriptive operator.

In some embodiments, the descriptive operator is part of a descriptive operator hierarchy or tree-like structure and associated with at least one descriptive operator in the descriptive operator indicator hierarchy or tree-like structure.

In some embodiments, an apparatus is provided for initiating and broadcasting audio conversations, and transmitting information associated with descriptive operators, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; initiate an audio conversation between the first mobile device of the first user and the second mobile device of the second user, wherein a descriptive operator is associated with the audio conversation; initiate the audio conversation between the first user and the second user; broadcast the audio conversation to a third user who accesses the mobile application on a third mobile device of the third user; determine a descriptive operator associated with the audio conversation; transmit, to the third mobile device for visual display, during the audio conversation, on a user interface of the mobile application on the third mobile device, a first visual representation of the first user; transmit to the third mobile device for visual display, during the audio conversation, on the user interface of the mobile application on the third mobile device, a second visual representation of the second user; determine a descriptive operator associated with the audio conversation; transmit to the third mobile device for visual display, during the audio conversation, on the user interface of the mobile application on the third mobile device, the descriptive operator associated with the audio conversation; and transmit, to the third mobile device for visual display on a second user interface, different from the user interface, of the mobile application on the third mobile device, information associated with the descriptive operator associated with the audio conversation.

In some embodiments, the apparatus comprises at least one of an application server, the first mobile device, the second mobile device, or the third mobile device.

In some embodiments, the code is further configured to select the first user and the second user for participating in an audio conversation based on at least partially matching first user information associated with the first user and second user information associated with the second user.

In some embodiments, the second user interface periodically or dynamically aggregates the information associated with the descriptive operator.

In some embodiments, the method further comprises organizing or segmenting at least one of users or audio conversations associated with the mobile application based on at least one descriptive operator associated with the at least one of the user or the audio conversations.

In some embodiments, a method is provided for initiating and broadcasting audio conversations, and transmitting information associated with selectable descriptive operators, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation between the first mobile device of the first user and the second mobile device of the second user, wherein a descriptive operator is associated with at least one of the audio conversation, the first user, or the second user; initiating, using the one or more computing device processors, the audio conversation between the first user and the second user; broadcasting, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user; transmitting, using the one or more computing device processors, to the third mobile device for visual display, during the audio conversation, on the user interface of the mobile application on the third mobile device, a second visual representation of the second user; determining, using the one or more computing device processors, a selectable descriptive operator associated with the audio conversation; transmitting, using the one or more computing device processors, to the third mobile device for visual display, during the audio conversation, on the user interface of the mobile application on the third mobile device, the selectable descriptive operator associated with the audio conversation; and transmitting, using the one or more computing device processors, to the third mobile device for visual display on a second user interface, different from the user interface, of the mobile application on the third mobile device, information associated with the descriptive operator associated with the at least one of the audio conversation, the first user, or the second user.

In some embodiments, a method is provided for initiating and broadcasting audio conversations, and matching users based on descriptive operators, the method comprising: determining, using one or more computing device processors, a first user accesses a mobile application on a first mobile device of the first user, wherein the first user is associated with a first descriptive operator; determining, using the one or more computing device processors, a second user accesses the mobile application on a second mobile device of the second user; determining, using the one or more computing device processors, that the first user wants to establish an audio conversation; in response to determining the first user wants to establish an audio conversation, selecting, using the one or more computing device processors, based on the first descriptive operator, the second user; initiating, using the one or more computing device processors, an audio conversation between the first mobile device of the first user and the second mobile device of the second user; initiating, using the one or more computing device processors, the audio conversation between the first user and the second user; broadcasting, using the one or more computing device processors, the audio conversation to a third user who accesses the mobile application on a third mobile device of the third user; transmitting, using the one or more computing device processors, to the third mobile device for visual display, during the audio conversation, on a user interface of the mobile application on the third mobile device, a first visual representation of the first user, a first visual representation of the first user not comprising a first photographic or video image of the first user; transmitting, using the one or more computing device processors, to the third mobile device for visual display, during the audio conversation, on the user interface of the mobile application on the third mobile device, a second visual representation of the second user, a second visual representation of the second user not comprising a second photographic or video image of the second user.

In some embodiments, the first user is associated with the first descriptive operator based on the first descriptive operator being selected by or input by the first user.

In some embodiments, the first user is associated with the first descriptive operator based on the first descriptive operator being selected by or input by the first user at least one of when registering with the mobile application, when logging into the mobile application, when prompted by the mobile application.

In some embodiments, the first user is associated with the first descriptive operator based on at least one of speaking, listening, or searching history of the first user on the mobile application.

In some embodiments, the second user is associated with a second descriptive operator.

In some embodiments, the second user is selected based on the second descriptive operator substantially matching the first descriptive operator.

In some embodiments, the second user is selected based on the second descriptive operator being related to the first descriptive operator.

In some embodiments, the method further comprises associating the first descriptive operator with the second user.

In some embodiments, the method further comprises associating the first descriptive operator with the audio conversation.

In some embodiments, the method further comprises selecting the second user based on at least one of matching at least one of a first listening, speaking, or searching history of the first user on the mobile application with at least one of a second listening, speaking, or searching history of the second user on the mobile application.

In some embodiments, the method further comprises prompting, based on the first descriptive operator, the first user to speak with or schedule a second audio conversation with a third user.

In some embodiments, the first descriptive operator comprises a first hashtag.

In some embodiments, the method further comprises transmitting, to the first mobile device of the first user, one or more descriptive operators for the first user to follow on the mobile application.

In some embodiments, the one or more descriptive operators are determined based on at least one of a speaking, listening, or searching history of the first user on the mobile application.

In some embodiments, the one or more descriptive operators are determined using an artificial intelligence or big data operation.

In some embodiments, the method further comprises learning, during a period, at least one topic that the first user is interested in and transmitting, to the first user, and based on the learning, one or more speakers to talk to or schedule an audio conversation, or one or more descriptive operators or users to follow.

In some embodiments, an apparatus is provided for initiating and broadcasting audio conversations, and matching users based on descriptive operators, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; determine that the first user wants to establish an audio conversation; in response to determining the first user wants to establish an audio conversation, select, based on the first descriptive operator, the second user; initiate an audio conversation between the first mobile device of the first user and the second mobile device of the second user; initiate the audio conversation between the first user and the second user; broadcast the audio conversation to a third user who accesses the mobile application on a third mobile device of the third user; transmit, to the third mobile device for visual display, during the audio conversation, on a user interface of the mobile application on the third mobile device, a first visual representation of the first user; transmit, to the third mobile device for visual display, during the audio conversation, on the user interface of the mobile application on the third mobile device, a second visual representation of the second user.

In some embodiments, the apparatus comprises at least one of an application server, the first mobile device, the second mobile device, or the third mobile device.

In some embodiments, the code is further configured to select the first user and the second user for participating in an audio conversation based on at least partially matching first user information associated with the first user and second user information associated with the second user.

In some embodiments, the first descriptive operator comprises a selectable descriptive operator on the mobile application.

In some embodiments, the second user is part of a speaker feed.

In some embodiments, the code is further configured to provide a speaker feed to the first user, wherein the second user is part of the speaker feed.

In some embodiments, the first user can swipe through speakers comprised in the speaker feed.

In some embodiments, a position of the second user in the speaker feed is based on the first descriptive operator.

In some embodiments, a position of the second user in the speaker feed is based on matching, using at least one of the first descriptive operator, first user information associated with the first user, or second user information associated with the second user.

As used herein, a descriptive operator, a descriptive indicator, and a descriptor may refer to the same element. In some embodiments, this element may include a #symbol, a $ symbol, or any other symbol.

In some embodiments, a method is provided for broadcasting audio conversations, and matching users with audio conversations or speakers, based on descriptive operators, the method comprising: determining, using one or more computing device processors, a first user accesses a mobile application on a first mobile device of the first user, wherein the first user is associated with a first descriptive operator; determining, using the one or more computing device processors, that the first user wants to listen to an audio conversation; in response to determining the first user wants to listen to an audio conversation, selecting, using the one or more computing device processors, based on the first descriptive operator, an audio conversation involving a first speaker and a second speaker; broadcasting, using the one or more computing device processors, the audio conversation to the first mobile device of the first user; transmitting, using the one or more computing device processors, to the first mobile device for visual display, during the audio conversation, on a user interface of the mobile application on the first mobile device, a first visual representation of the first speaker, a first visual representation of the first speaker not comprising a first photographic or video image of the first speaker; and transmitting, using the one or more computing device processors, to the first mobile device for visual display, during the audio conversation, on the user interface of the mobile application on the first mobile device, a second visual representation of the second speaker, a second visual representation of the second speaker not comprising a second photographic or video image of the second speaker.

In some embodiments, the first user is associated with the first descriptive operator based on the first descriptive operator being selected by or input by the first user.

In some embodiments, the first user is associated with the first descriptive operator based on the first descriptive operator being selected by or input by the first user at least one of when registering with the mobile application, when logging into the mobile application, when prompted by the mobile application.

In some embodiments, the first user is associated with the first descriptive operator based on at least one of speaking, listening, or searching history of the first user on the mobile application.

In some embodiments, the first speaker or the audio conversation is associated with a second descriptive operator.

In some embodiments, the first speaker or the audio conversation is selected based on the second descriptive operator substantially matching the first descriptive operator.

In some embodiments, the first speaker or the audio conversation is selected based on the second descriptive operator being related to the first descriptive operator.

In some embodiments, the method further comprises associating the first descriptive operator with at least one of the first speaker or the second speaker.

In some embodiments, the method further comprises associating the first descriptive operator with the audio conversation.

In some embodiments, the method further comprises selecting the audio conversation based on at least one of matching at least one of a first listening, speaking, or searching history of the first user on the mobile application with at least one of a second listening, speaking, or searching history of the first speaker on the mobile application.

In some embodiments, the first descriptive operator comprises a first hashtag.

In some embodiments, the method further comprises transmitting, to the first mobile device of the first user, one or more descriptive indicators for the first user to follow on the mobile application.

In some embodiments, the one or more descriptive operators are determined based on at least one of a speaking, listening, or searching history of the first user on the mobile application.

In some embodiments, the one or more descriptive operators are determined using an artificial intelligence or big data operation.

In some embodiments, the method further comprises learning, during a period, at least one topic that the first user is interested in and transmitting, to the first user, and based on the learning, one or more speakers to listen to, one or more audio conversations for the user to listen to, or one or more descriptive indicators or users to follow.

In some embodiments, the audio conversation is selected based on partially matching, based on the descriptive operator, the first user and the first speaker.

In some embodiments, the audio conversation comprises either at least one of a live audio conversation, a recorded audio conversation, or an upcoming audio conversation.

In some embodiments, an apparatus is provided for broadcasting audio conversations, and matching users with audio conversations or speakers, the apparatus comprising: one or more computing device processors; one or more memory systems comprising code, executable by the one or more computing device processors, and configured to: determine a first user accesses a mobile application on a first mobile device of the first user, wherein the first user is associated with a first descriptive operator; determine that the first user wants to listen to an audio conversation; in response to determining the first user wants to listen to an audio conversation, select, based on the first descriptive operator, an audio conversation involving a first speaker and a second speaker; broadcast, using the one or more computing device processors, the audio conversation to the first mobile device of the first user; transmit, using the one or more computing device processors, to the first mobile device for visual display, during the audio conversation, on a user interface of the mobile application on the first mobile device, a first visual representation of the first speaker; transmit, using the one or more computing device processors, to the first mobile device for visual display, during the audio conversation, on the user interface of the mobile application on the first mobile device, a second visual representation of the second speaker.

In some embodiments, the apparatus comprises at least one of an application server, the first mobile device, the second mobile device, or the third mobile device.

In some embodiments, the first descriptive operator comprises a selectable descriptive operator on the mobile application.

In some embodiments, the audio conversation is part of an audio conversation feed.

In some embodiments, the code is further configured to provide an audio conversation feed to the first user, wherein the audio conversation is part of the audio conversation feed.

In some embodiments, the first user can swipe through audio conversations comprised in the audio conversation feed.

In some embodiments, a position of the audio conversation in the audio conversation feed is based on the first descriptive operator.

In some embodiments, a position of the audio conversation in the audio conversation feed is based on matching, using at least one of the first descriptive operator, first user information associated with the first user, and second user information associated with the first speaker or the second speaker.

In some embodiments, systems, methods, and computer program products are provided for initiating and streaming audio conversations. An exemplary method comprises: determining, using one or more computing device processors, a first user accesses a mobile application on a first mobile device of the first user; determining, using the one or more computing device processors, a second user accesses the mobile application on a second mobile device of the second user; receiving, using the one or more computing device processors, from the first mobile device of the first user, a selection of the second user; receiving, using the one or more computing device processors, from the first mobile device of the first user, audio conversation information associated with an audio conversation; initiating, using the one or more computing device processors, the audio conversation involving at least the first user and the second user; streaming, using the one or more computing device processors, the audio conversation to a third user who accesses the mobile application on a third mobile device of the third user; transmitting, using the one or more computing device processors, to the third mobile device for visual display, during the audio conversation, on a first user interface of the mobile application on the third mobile device, a first visual representation of the first user not comprising a first video of the first user; transmitting, using the one or more computing device processors, to the third mobile device for visual display, during the audio conversation, on the first user interface of the mobile application on the third mobile device, a second visual representation of the second user not comprising a second video of the second user; and transmitting, using the one or more computing device processors, to the third mobile device for visual display, during the audio conversation, on the first user interface of the mobile application on the third mobile device, the audio conversation information associated with the audio conversation.

In some embodiments, the audio conversation is added to a first user profile of the first user or a second user profile of the second user.

In some embodiments, the first user interface or a second user interface indicates a number of listeners or mobile application users listening to the audio conversation.

In some embodiments, the method further comprises recording the audio conversation.

In some embodiments, the audio conversation is indexed for publication on an audio publication platform or network.

In some embodiments, the audio conversation can be continued when the first user accesses, during the audio conversation, a second mobile application on the first mobile device, a home screen of the first mobile device, or a non-conversation function in the mobile application.

In some embodiments, the first user interface of the mobile application on the third mobile device presents a conversation mode option for the third user to request joining into the audio conversation, and wherein a visual representation of the conversation mode option is modified when the third user selects the conversation mode option.

In some embodiments, the first visual representation comprises at least one of an avatar, an emoji, a symbol, a persona, an animation, a cartoon, an indicia, an illustration, a histogram, or a graph.

In some embodiments, the first visual representation comprises a first image uploaded or captured by the first user.

In some embodiments, a method for initiating and streaming audio conversations is provided, the method comprising: determining, using one or more computing device processors, a first user accesses a mobile application on a first mobile device of the first user; receiving, using the one or more computing device processors, from the first mobile device of the first user, a selection of a second user, wherein the second user is on a second mobile device; receiving, using the one or more computing device processors, from the first mobile device of the first user, audio conversation information associated with an audio conversation; initiating, using the one or more computing device processors, the audio conversation involving at least the first user and the second user; streaming, using the one or more computing device processors, the audio conversation to a third user on a third mobile device of the third user; transmitting, using the one or more computing device processors, to the third mobile device for visual display, during the audio conversation, on a first user interface of the mobile application on the third mobile device, a first visual representation of the first user not comprising a first video of the first user; transmitting, using the one or more computing device processors, to the third mobile device for visual display, during the audio conversation, on the first user interface of the mobile application on the third mobile device, a second visual representation of the second user not comprising a second video of the second user; and transmitting, using the one or more computing device processors, to the third mobile device for visual display, during the audio conversation, on the first user interface of the mobile application on the third mobile device, the audio conversation information associated with the audio conversation.

In some embodiments, the method further comprises searching for users or audio conversations based on a search input parameter.

In some embodiments, the first user interface of the mobile application on the third mobile device presents a conversation mode option for the third user to request joining into the audio conversation, and wherein a visual representation of the conversation mode option is modified when the third user selects the conversation mode option.

In some embodiments, the first user interface of the mobile application on the third mobile device presents, during the audio conversation, a third visual representation of the third user not comprising a third video of the third user.

In some embodiments, the first visual representation comprises a first image uploaded or captured by the first user.

In some embodiments, the audio conversation is sharable with a social network outside the mobile application.

In some embodiments, the audio conversation is terminated when the first user terminates the audio conversation on the first mobile device.

In some embodiments, an apparatus is provided for initiating and streaming audio conversations, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; receive, from the first mobile device of the first user, a selection of the second user; receive, from the first mobile device of the first user, audio conversation information associated with an audio conversation; initiate the audio conversation involving at least the first user and the second user; stream the audio conversation to a third user on a third mobile device of the third user; transmit, to the third mobile device for visual display, during the audio conversation, on a first user interface of the mobile application on the third mobile device, a first visual representation of the first user not comprising a first video of the first user; transmit, to the third mobile device for visual display, during the audio conversation, on the first user interface of the mobile application on the third mobile device, a second visual representation of the second user not comprising a second video of the second user; and transmit, to the third mobile device for visual display, during the audio conversation, on the first user interface of the mobile application on the third mobile device, the audio conversation information associated with the audio conversation.

In some embodiments, the apparatus comprises at least one of an application server, the first mobile device, the second mobile device, or the third mobile device.

In some embodiments, the audio conversation is sharable with a social network outside the mobile application.

In some embodiments, the audio conversation is streamable on a social network outside the mobile application.

Systems, methods, and computer program products are provided for handling users during audio conversations. In some embodiments, a method is provided for handling users during audio conversations, the method comprising determining, using one or more computing device processors, a first user accesses a mobile application on a first mobile device of the first user; determining, using the one or more computing device processors, a second user accesses the mobile application on a second mobile device of the second user; establishing, using the one or more computing device processors, on the mobile application, an audio conversation among at least the first user and the second user; streaming, using the one or more computing device processors, the audio conversation to a third user who accesses the mobile application on a third mobile device of the third user; transmitting, using the one or more computing device processors, to the third mobile device for visual display, during the audio conversation, on the mobile application on the third mobile device, a first visual representation of the first user not comprising a first video of the first user; transmitting, using the one or more computing device processors, to the third mobile device for visual display, during the audio conversation, on the mobile application on the third mobile device, a second visual representation of the second user not comprising a second video of the second user; streaming, using the one or more computing device processors, the audio conversation to a fourth user who accesses the mobile application on a fourth mobile device of the fourth user; transmitting, using the one or more computing device processors, to the fourth mobile device for visual display, during the audio conversation, on the mobile application on the fourth mobile device, the first visual representation of the first user not comprising the first video of the first user; transmitting, using the one or more computing device processors, to the fourth mobile device for visual display, during the audio conversation, on the mobile application on the fourth mobile device, the second visual representation of the second user not comprising the second video of the second user; disabling, using the one or more computing device processors, the second user from speaking during the audio conversation by removing the second visual representation of the second user from a speaker area of the mobile application on the third mobile device and from the speaker area of the mobile application on the fourth mobile device; receiving, using the one or more computing device processors, a request from the fourth user to join the audio conversation; adding, using the one or more computing device processors, the fourth user to the audio conversation; and transmitting, using the one or more computing device processors, to the third mobile device for visual display, during the audio conversation, on the mobile application on the third mobile device, a third visual representation of the fourth user not comprising a third video of the fourth user simultaneously with the first visual representation of the first user not comprising the first video of the first user, wherein, during the streaming of the audio conversation to the third mobile device, the first visual representation of the first user is maintained on the mobile application on the third mobile device after the second user is disabled from speaking during the audio conversation, and wherein the audio conversation continues to stream to the third mobile device after the second user is disabled from speaking during the audio conversation and before the fourth user is added to the audio conversation.

In some embodiments, the fourth user is placed in a waitlist associated with at least one of the first user or the audio conversation.

In some embodiments, the fourth user is placed in the waitlist in response to receiving the request.

In some embodiments, the fourth user is added to the audio conversation in response to the fourth user being selected, from the waitlist, by the first user.

In some embodiments, the fourth user is added to the audio conversation without receiving approval from a moderator present in or associated with the audio conversation.

In some embodiments, the request is approved by the first user.

In some embodiments, the first user comprises a moderator associated with the audio conversation.

In some embodiments, the method further comprises enabling the first user to assign a privilege to the fourth user.

In some embodiments, the second user is disabled from speaking during the audio conversation when at least one of: the second user exits the audio conversation on the mobile application on the second mobile device, the second user switches to a second audio conversation on the mobile application on the second mobile device, the second user switches to listening mode on the mobile application on the second mobile device, the second user exits the mobile application on the second mobile device, the second user is automatically removed from the audio conversation, or the second user is removed from the audio conversation by the first user.

In some embodiments, the method further comprises recording the audio conversation.

In some embodiments, the method further comprises adding the audio conversation to profile associated with the first user.

In some embodiments, the first visual representation of the first user comprises an avatar associated with the first user.

In some embodiments, the avatar associated with the first user changes shape or form when the first user speaks during the audio conversation, and remains substantially still when the first user does not speak during the audio conversation.

In some embodiments, the fourth user is invited by the first user to the audio conversation.

In some embodiments, wherein upon removal of the second visual representation of the second user from the speaker area of the mobile application on the third mobile device and from the speaker area of the mobile application on the fourth mobile device, the second visual representation of the second user is presented in a listener area of the mobile application on the third mobile device and in the listener area of the mobile application on the fourth mobile device.

In some embodiments, an apparatus is provided for handling users during audio conversations, the apparatus comprising one or more computing device processors configured to: determine a first user accesses a mobile application on a first mobile device of the first user; determine a second user accesses the mobile application on a second mobile device of the second user; establish, on the mobile application, an audio conversation among at least the first user and the second user; stream the audio conversation to a third user who accesses the mobile application on a third mobile device of the third user; transmit, to the third mobile device for visual display, during the audio conversation, on the mobile application on the third mobile device, a first visual representation of the first user not comprising a first video of the first user; transmit, to the third mobile device for visual display, during the audio conversation, on the mobile application on the third mobile device, a second visual representation of the second user not comprising a second video of the second user; stream the audio conversation to a fourth user who accesses the mobile application on a fourth mobile device of the fourth user; transmit, to the fourth mobile device for visual display, during the audio conversation, on the mobile application on the fourth mobile device, the first visual representation of the first user not comprising the first video of the first user; transmit, to the fourth mobile device for visual display, during the audio conversation, on the mobile application on the fourth mobile device, the second visual representation of the second user not comprising the second video of the second user; disable the second user from speaking during the audio conversation based on removing the second visual representation of the second user from a speaker area of the mobile application on the third mobile device and from the speaker area of the mobile application on the fourth mobile device; add the fourth user to the audio conversation; and transmit, to the third mobile device for visual display, during the audio conversation, on the mobile application on the third mobile device, a third visual representation of the fourth user not comprising a third video of the fourth user simultaneously with the first visual representation of the first user not comprising the first video of the first user, wherein, during the streaming of the audio conversation to the third mobile device, the first visual representation of the first user is maintained on the mobile application on the third mobile device after the second user is disabled from speaking during the audio conversation, and wherein the audio conversation continues to stream to the third mobile device after the second user is disabled from speaking during the audio conversation and before the fourth user is added to the audio conversation.

In some embodiments, the one or more computing device processors are comprised in at least one of a server, the first mobile device, the second mobile device, the third mobile device, or the fourth mobile device.

In some embodiments, upon removal of the second visual representation of the second user from the speaker area of the mobile application on the third mobile device and from the speaker area of the mobile application on the fourth mobile device, the second visual representation of the second user is displayed in a listener area of the mobile application on the third mobile device and in the listener area of the mobile application on the fourth mobile device.

In some embodiments, the fourth user is added to the audio conversation in response to a request received, by the one or more computing device processors, from the first user.

In some embodiments, the first visual representation of the first user comprises an avatar associated with the first user, and the avatar associated with the first user changes shape or form when the first user speaks during the audio conversation, and remains substantially still when the first user does not speak during the audio conversation.

In some embodiments, a method for enabling conversation mode on a mobile device is provided, the method comprising: determining, using one or more computing device processors, a first user accesses a mobile application on a first mobile device of a first user; transmitting, using the one or more computing device processors, to the first mobile device of the first user, audio conversation information associated with a first audio conversation, wherein the first audio conversation involves a second user on a second mobile device of the second user and a third user on a third mobile device of the third user; streaming, using the one or more computing device processors, the first audio conversation to the first mobile device of the first user, wherein a first user interface of the first mobile device of the first user displays a first visual representation, not comprising a first video, of the second user involved in the first audio conversation and a second visual representation, not comprising a second video, of the third user involved in the first audio conversation, and wherein the first user interface of the first mobile device of the first user displays a conversation mode option simultaneously with both the first visual representation, not comprising the first video, of the second user involved in the first audio conversation, and the second visual representation, not comprising the second video, of the third user involved in the first audio conversation; receiving, using the one or more computing device processors, a selection of the conversation mode option from the first mobile device of the first user displaying the conversation mode option simultaneously with both the first visual representation, not comprising the first video, of the second user involved in the first audio conversation, and the second visual representation, not comprising the second video, of the third user involved in the first audio conversation; in response to receiving the selection of the conversation mode option from the first mobile device of the first user, initiating modification of, using the one or more computing device processors, a first image of the conversation mode option displayed on the first mobile device of the first user, and placing the first user in the first audio conversation with the second user and the third user; and streaming, using the one or more computing device processors, the first audio conversation to a fourth user on a fourth mobile device, wherein a second user interface of the fourth mobile device of the fourth user displays, during the first audio conversation, a third visual representation, not comprising a third video, of the first user, simultaneously with both the first visual representation, not comprising the first video, of the second user involved in the first audio conversation, and the second visual representation, not comprising the second video, of the third user.

In some embodiments, the method further comprises determining, using the one or more computing device processors, that the second user has dropped out of the first audio conversation.

In some embodiments, the method further comprises in response to determining, using the one or more computing device processors, that the second user has dropped out of the first audio conversation, initiating removal of, from the second user interface of the fourth mobile device of the fourth user, during the first audio conversation, the first visual representation, not comprising the first video, of the second user involved in the first audio conversation.

In some embodiments, a fourth visual representation, not comprising a fourth video, of the fourth user, is displayed, during the first audio conversation, on the second user interface of the fourth mobile device, simultaneously with both the first visual representation, not comprising the first video, of the second user involved in the first audio conversation, and the second visual representation, not comprising the second video, of the third user involved in the first audio conversation.

In some embodiments, the conversation mode option changes form, on the first user interface of the first mobile device of the first user, upon selection of the conversation mode option on the first mobile device of the first user.

In some embodiments, the method further comprises, in response to receiving the selection of the conversation mode option from the first mobile device of the first user, placing the first user in a waitlist.

In some embodiments, the method further comprises in response to receiving approval from at least one of the second mobile device of the second user or the third mobile device of the third user, placing the first user in the first audio conversation with the second user and the third user.

In some embodiments, the second user has a first status during the first audio conversation, and wherein the first user has second status during the first audio conversation.

In some embodiments, the method further comprises providing an option for the second user to change a status associated with the first user during the first audio conversation.

In some embodiments, the method further comprises in response to receiving a selection of the first audio conversation, or an option to play the first audio conversation, from the first mobile device of the first user, streaming, using the one or more computing device processors, the first audio conversation to the first mobile device of the first user.

In some embodiments, an apparatus is provided for enabling conversation mode on a mobile device, the apparatus comprising: one or more computing device processors; one or more memory systems comprising code, executable by the one or more computing device processors, and configured to: determine a first user accesses a mobile application on a first mobile device of the first user; transmit, to the first mobile device of the first user, audio conversation information associated with a first audio conversation, wherein the first audio conversation involves a second user on a second mobile device of the second user and a third user on a third mobile device of the third user; stream the first audio conversation to the first mobile device of the first user, wherein a first user interface of the first mobile device of the first user displays a first visual representation, not comprising a first video, of the second user involved in the first audio conversation and a second visual representation, not comprising a second video, of the third user involved in the first audio conversation, and wherein the first user interface of the first mobile device of the first user displays a conversation mode option simultaneously with both the first visual representation, not comprising the first video, of the second user involved in the first audio conversation, and the second visual representation, not comprising the second video, of the third user involved in the first audio conversation; receive a selection of the conversation mode option from the first mobile device of the first user displaying the conversation mode option simultaneously with both the first visual representation, not comprising the first video, of the second user involved in the first audio conversation, and the second visual representation, not comprising the second video, of the third user involved in the first audio conversation; in response to receiving the selection of the conversation mode option from the first mobile device of the first user, initiate modification of a first image of the conversation mode option, and place the first user in the first audio conversation with the second user and the third user; and stream the first audio conversation to a fourth user on a fourth mobile device, wherein a second user interface of the fourth mobile device of the fourth user displays a third visual representation, not comprising a third video, of the first user during the first audio conversation, simultaneously with both the first visual representation, not comprising the first video, of the second user involved in the first audio conversation, and the second visual representation, not comprising the second video, of the third user.

In some embodiments, the apparatus comprises at least one of an application server and at least one of the first mobile device, the second mobile device, the third mobile device, or the fourth mobile device.

In some embodiments, the code is further configured to determine that the second user has dropped out of the first audio conversation.

In some embodiments, the code is further configured to: in response to determining that the second user has dropped out of the first audio conversation, initiate removal of, from the second user interface of the fourth mobile device of the fourth user, during the first audio conversation, the first visual representation, not comprising the first video, of the second user involved in the first audio conversation.

In some embodiments, the code is further configured to: in response to receiving the selection of the conversation mode option from the first mobile device of the first user, place the first user in a waitlist.

In some embodiments, the code is further configured to in response to receiving approval from at least one of the second mobile device of the second user or the third mobile device of the third user, remove the first user from the waitlist, and place the first user in the first audio conversation with the second user and the third user.

In some embodiments, a method is provided for enabling conversation mode on a mobile device, the method comprising: determining, using one or more computing device processors, a first user accesses a mobile application on a first mobile device of the first user; transmitting, using one or more computing device processors, to the first mobile device of the first user, audio conversation information associated with a first audio conversation, wherein the first audio conversation involves a second user on a second mobile device of the second user and a third user on a third mobile device of the third user; streaming, using the one or more computing device processors, the first audio conversation to the first mobile device of the first user, wherein a first user interface of the first mobile device of the first user displays a first visual representation, not comprising a first video, of the second user involved in the first audio conversation and a second visual representation, not comprising a second video, of the third user involved in the first audio conversation, and wherein the first user interface of the first mobile device of the first user displays a conversation mode option simultaneously with both the first visual representation, not comprising the first video, of the second user involved in the first audio conversation, and the second visual representation, not comprising the second video, of the third user involved in the first audio conversation; receiving, using the one or more computing device processors, a selection of the conversation mode option from the first mobile device of the first user displaying the conversation mode option simultaneously with both the first visual representation, not comprising the first video, of the second user involved in the first audio conversation, and the second visual representation, not comprising the second video, of the third user involved in the first audio conversation; in response to receiving the selection of the conversation mode option from the first mobile device of the first user, initiating modification of, using the one or more computing device processors, a first image of the conversation mode option, and placing the first user in the first audio conversation with the second user and the third user, or in a second audio conversation with at least one of the second user, the third user, or a fourth user; and streaming, using the one or more computing device processors, the first audio conversation or the second audio conversation to a fifth user on a fourth mobile device, wherein a second user interface of the fourth mobile device of the fifth user displays a third visual representation, not comprising a third video, of the first user during the first audio conversation or the second audio conversation simultaneously with a visual representation of at least one user other than the first user.

In some embodiments, the conversation mode option changes form, on the first user interface of the first mobile device of the first user, upon selection of the conversation mode option on the first mobile device of the first user.

In some embodiments, the method further comprises providing an option for the first user to leave the first audio conversation or the second audio conversation.

In some embodiments, the method further comprises providing an option for the first user to mute the first user during the first audio conversation or the second audio conversation.

In some embodiments, a method is provided for initiating and streaming audio conversations, and transmitting hashtags, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation involving at least the first mobile device of the first user and the second mobile device of the second user; receiving, using the one or more computing device processors, from at least one of the first mobile device or the second mobile device, a hashtag associated with the audio conversation; initiating, using the one or more computing device processors, the audio conversation involving at least the first user and the second user; streaming, using the one or more computing device processors, the audio conversation to a third user who accesses the mobile application on a third mobile device of the third user; transmitting, using the one or more computing device processors, to the third mobile device for visual display, during the audio conversation, on a first user interface of the mobile application on the third mobile device, a first visual representation of the first user not comprising a first video of the first user; transmitting, using the one or more computing device processors, to the third mobile device for visual display, during the audio conversation, on the first user interface of the mobile application on the third mobile device, a second visual representation of the second user not comprising a second video of the second user; and transmitting, using the one or more computing device processors, to the third mobile device for visual display, during the audio conversation, on the first user interface of the mobile application on the third mobile device, the hashtag associated with the audio conversation, wherein selecting the hashtag initiates visual display of information associated with the hashtag on a second user interface, different from the first user interface, of the mobile application on the third mobile device.

In some embodiments, the information for the hashtag is received at least one of before, after, or during the audio conversation.

In some embodiments, the method further comprises establishing a relationship between the hashtag and at least one of the first user or the second user.

In some embodiments, the method further comprises establishing a relationship between the audio conversation and a second audio conversation based on the hashtag associated with the audio conversation and a second hashtag associated with the second audio conversation.

In some embodiments, a method is provided for initiating and streaming audio conversations, and transmitting descriptive operators, the method comprising: determining, using one or more computing device processors, a first user accesses a mobile application on a first mobile device of the first user; determining, using the one or more computing device processors, a second user accesses the mobile application on a second mobile device of the second user; initiating, using the one or more computing device processors, an audio conversation involving at least the first mobile device of the first user and the second mobile device of the second user; determining, using the one or more computing device processors, a descriptive operator for the audio conversation; initiating, using the one or more computing device processors, the audio conversation involving at least the first mobile device of the first user and the second mobile device of the second user; streaming, using the one or more computing device processors, the audio conversation to a third user who accesses the mobile application on a third mobile device of the third user; transmitting, using the one or more computing device processors, to the third mobile device for visual display, during the audio conversation, on a first user interface of the mobile application on the third mobile device, a first visual representation of the first user not comprising a first video of the first user; transmitting, using the one or more computing device processors, to the third mobile device for visual display, during the audio conversation, on the first user interface of the mobile application on the third mobile device, a second visual representation of the second user not comprising a second video of the second user; and transmitting, using the one or more computing device processors, to the third mobile device for visual display, during the audio conversation, on the first user interface of the mobile application on the third mobile device, the descriptive operator associated with the audio conversation, wherein selecting the descriptive operator initiates visual display of information associated with the descriptive operator on a second user interface, different from the first user interface, or on the first user interface, of the mobile application on the third mobile device.

In some embodiments, the descriptive operator comprises a hashtag or a selectable hashtag.

In some embodiments, the descriptive operator is received from at least one of the first mobile device of the first user or the second mobile device of the second user.

In some embodiments, the method further comprises searching, based on the descriptive operator, an external social network or a second mobile application, and integrating a search result associated with the external social network or the second mobile application into the second user interface or a third user interface associated with the mobile application; or wherein a link associated with the audio conversation, or the audio conversation, is presented on a fourth user interface of the external social network or the second mobile application that presents visual or audio posts associated with the descriptive operator or associated with a second descriptive operator related to the descriptive operator.

In some embodiments, the descriptive operator is automatically determined based on the audio conversation.

In some embodiments, the method further comprises determining a second descriptive operator for the audio conversation.

In some embodiments, the descriptive operator is related to the second descriptive operator, or wherein the second descriptive operator is determined based on the descriptive operator.

In some embodiments, the descriptive operator and the second descriptive operator are part of a descriptive operator hierarchy or tree-like structure.

In some embodiments, the audio conversation is displayed as a search result when a fourth user on a fourth mobile device searches for at least a portion of the descriptive operator in a search query associated with or in the mobile application.

In some embodiments, at least one of the first user or the second user is displayed as a search result when a fourth user on a fourth mobile device searches for at least a portion of the descriptive operator in a search query associated with or in the mobile application.

In some embodiments, at least one of the first user or the second user can edit the descriptive operator at least one of before, during, or after the audio conversation.

In some embodiments, the descriptive operator comprises at least two descriptive operators.

In some embodiments, the descriptive operator comprises an operative indicator or symbol.

In some embodiments, the descriptive operator is received from the third mobile device of the third user.

In some embodiments, the descriptive operator is a suggested descriptive operator presented to and selected by at least one of the first user on the first mobile device, the second user on the second mobile device, or the third user on the third mobile device.

In some embodiments, the method further comprises establishing, based on the descriptive operator, a relationship between the first user and the second user.

In some embodiments, the method further comprises establishing, based on the descriptive operator, a relationship between the third user and at least one of the first user or the second user.

In some embodiments, the method further comprises establishing, based on the descriptive operator, a relationship between the audio conversation and at least one of the first user, the second user, or the third user.

In some embodiments, the method further comprises associating a second descriptive operator with the first user based on at least one of a speaking, listening, or searching history of the first user, one or more users that follow the first user, one or more second users that the first user follows, a location associated with the first user, mobile application information associated with the first user, or social network information associated with the first user.

In some embodiments, an apparatus is provided for initiating and streaming audio conversations, and transmitting descriptive operators, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; initiate an audio conversation involving at least the first user and the second user; determine a descriptive operator associated with the audio conversation; initiate the audio conversation between the first user and the second user; stream the audio conversation to a third user who accesses the mobile application on a third mobile device of the third user; transmit, to the third mobile device for visual display, during the audio conversation, on a first user interface of the mobile application on the third mobile device, a first visual representation of the first user; transmit, to the third mobile device for visual display, during the audio conversation, on the first user interface of the mobile application on the third mobile device, a second visual representation of the second user; and transmit, to the third mobile device for visual display, during the audio conversation, on the first user interface of the mobile application on the third mobile device, the descriptive operator associated with the audio conversation, wherein selecting the descriptive operator initiates visual display of information associated with the descriptive operator on a second user interface, different from the first user interface, or on the first user interface, of the mobile application on the third mobile device.

In some embodiments, the apparatus comprises at least one of an application server, the first mobile device, the second mobile device, or the third mobile device.

In some embodiments, the code is further configured to filter audio conversations, speakers to talk to, or speakers to listen to based on a second descriptive operator associated with or input by a fourth user on the mobile application on a fourth mobile device.

In some embodiments, the code is further configured to automatically associate, with a second audio conversation, a second descriptive operator associated with at least one of the first user or the second user, when the first user or the second user do not input the second descriptive operator to associate with the second audio conversation.

In some embodiments, the code is further configured to create, based on a search parameter, a second descriptive operator and store the second descriptive operator in a database, in response to the search parameter not substantially matching descriptive operators in the database.

In some embodiments, the method further comprises organizing or segmenting at least one of users or audio conversations associated with the mobile application based on at least one descriptive operator associated with the at least one of the user or the audio conversations.

In some embodiments, the method further comprises receiving, using the one or more computing device processors, a selection of the first visual representation of the first user; and in response to receiving the selection of the first visual representation of the first user, transmitting, using the one or more computing device processors, to the third mobile device for visual display, during the streaming of the audio conversation, on a third user interface, different from the first user interface and the second user interface, of the mobile application on the third mobile device, user profile information associated with the first user, wherein the user profile information associated with the first user is editable by the first user during the audio conversation involving the at least the first user and the second user, wherein second user profile information associated with the third user is editable by the third user during the audio conversation involving the at least the first user and the second user being streamed to the mobile application on the third mobile device.

In some embodiments, the method further comprises wherein the audio conversation involving the at least the first user and the second user continues to stream when the second user accesses, during the audio conversation, a second mobile application on the second mobile device of the second user.

In some embodiments, the method further comprises organizing or segmenting at least one of users or audio conversations associated with the mobile application based on at least one descriptive operator associated with the at least one of the users or the audio conversations.

In some embodiments, a method is provided for initiating and streaming audio conversations, and providing audio conversation control, the method comprising: determining, using one or more computing device processors, a first user accesses a mobile application on a first mobile device of the first user; determining, using the one or more computing device processors, a second user accesses the mobile application or a second mobile application on a second mobile device of the second user; initiating, using the one or more computing device processors, an audio conversation between the first mobile device of the first user and the second mobile device of the second user; receiving, using the one or more computing device processors, an instruction from the first mobile device to enable a third user on a third mobile device to listen to the audio conversation and disable a fourth user on a fourth mobile device from listening to the audio conversation; streaming, using the one or more computing device processors, the audio conversation to the third mobile device of the third user; transmitting, using the one or more computing device processors, to the third mobile device for visual display, during the audio conversation, on a user interface of the third mobile device, a first visual representation of the first user not comprising a first video of the first user; transmitting, using the one or more computing device processors, to the third mobile device for visual display, during the audio conversation, on the user interface of the third mobile device, a second visual representation of the second user not comprising a second video of the second user; and transmitting, using the one or more computing device processors, to the third mobile device for visual display, during the audio conversation, on the user interface of the third mobile device, a label associated with the audio conversation.

In some embodiments, the third user is a subscriber of the first user or of the audio conversation.

In some embodiments, an indicator is displayed on the user interface or on a second user interface displaying user data associated with at least one of the first user or the second user, and wherein the indicator indicates that the third user is a subscriber of the first user or of the audio conversation.

In some embodiments, the method further comprises initiating storage of the audio conversation.

In some embodiments, after the audio conversation is stored, access to the audio conversation on a fifth mobile device of a fifth user is determined or controlled based on a second instruction received from the first mobile device.

In some embodiments, after the audio conversation is stored, access to the audio conversation on a fifth mobile device of a fifth user is granted in response to determining the fifth user is a subscriber of the first user or of the audio conversation.

In some embodiments, the fourth user is unable to access, on the fourth mobile device, an audio conversation user interface displaying the first visual representation of the first user not comprising the first video of the first user and the second visual representation of the second user not comprising the second video of the second user.

In some embodiments, the method further comprises transmitting, to the first mobile device and during the audio conversation, an audio message received from the third mobile device.

In some embodiments, the audio message received from the third mobile device is placed, in a queue of audio messages, ahead of a second audio message received from a fifth mobile device associated with a fifth user who is not a subscriber of the first user or of the audio conversation.

In some embodiments, the audio message received from the third mobile device is placed in a list of audio messages, and wherein a visual display associated with the audio message indicates that the audio message is associated with a subscriber.

In some embodiments, the first mobile device displays an option for the first user to play the audio message during the audio conversation.

In some embodiments, the method further comprises transmitting, to the fourth mobile device, for visual display, during the audio conversation, on a user interface of the fourth mobile device, the first visual representation of the first user not comprising the first video of the first user; transmitting, to the fourth mobile device, for visual display, during the audio conversation, on the user interface of the fourth mobile device, the second visual representation of the second user not comprising the second video of the second user; and transmitting, to the fourth mobile device for visual display, during the audio conversation, on the user interface of the fourth mobile device, a second label associated with the audio conversation, wherein the second label indicates that subscribers can listen to the audio conversation.

In some embodiments, the fourth user is not a subscriber of the first user or of the audio conversation.

In some embodiments, an option to subscribe is displayed on the user interface of the fourth mobile device.

In some embodiments, an option to subscribe is displayed on a user interface of a fifth mobile device of a fifth user displaying user data associated with at least one of the first user or the second user.

In some embodiments, an apparatus is provided for initiating and streaming audio conversations, and providing audio conversation control, the apparatus comprising: one or more computing device processors; one or more memory systems comprising code, executable by the one or more computing device processors, and configured to: determine a first user accesses a mobile application on a first mobile device of the first user; determine a second user accesses the mobile application or a second mobile application on a second mobile device of the second user; initiate an audio conversation between the first mobile device of the first user and the second mobile device of the second user; receive an instruction from the first mobile device to enable a third user on a third mobile device to listen to the audio conversation and disable a fourth user on a fourth mobile device from listening to the audio conversation; stream the audio conversation to the third mobile device of the third user; transmit, to the third mobile device for visual display, during the audio conversation, on a user interface of the third mobile device, a first visual representation of the first user not comprising a first video of the first user; transmit, to the third mobile device for visual display, during the audio conversation, on the user interface of the third mobile device, a second visual representation of the second user not comprising a second video of the second user; and transmit, to the third mobile device for visual display, during the audio conversation, on the user interface of the third mobile device, a label associated with the audio conversation.

In some embodiments, the apparatus comprises at least one of an application server, the first mobile device, the second mobile device, the third mobile device, or the fourth mobile device.

In some embodiments, a method is provided for initiating and streaming audio conversations, and providing audio conversation control, the method comprising: determining, using one or more computing device processors, a first user accesses a mobile application on a first mobile device of the first user; determining, using the one or more computing device processors, a second user accesses the mobile application or a second mobile application on a second mobile device of the second user; initiating, using the one or more computing device processors, an audio conversation between the first mobile device of the first user and the second mobile device of the second user; receiving, using the one or more computing device processors, an instruction from the first mobile device to enable a third user on a third mobile device to listen to at least a portion of the audio conversation or disable a fourth user on a fourth mobile device from listening to the at least the portion of the audio conversation; streaming, using the one or more computing device processors, the audio conversation to the third mobile device of the third user; transmitting, using the one or more computing device processors, to the third mobile device for visual display, during the audio conversation, on a user interface of the third mobile device, a first visual representation of the first user not comprising a first video of the first user; transmitting, using the one or more computing device processors, to the third mobile device for visual display, during the audio conversation, on the user interface of the third mobile device, a second visual representation of the second user not comprising a second video of the second user; and transmitting, using the one or more computing device processors, to the third mobile device for visual display, during the audio conversation, on the user interface of the third mobile device, a label associated with the audio conversation.

In some embodiments, the method further comprises transmitting an alert to the first mobile device when a fifth user subscribes to the first user or to the audio conversation.

In some embodiments, during the at least the portion of the audio conversation, the audio conversation continues streaming to the third mobile device.

In some embodiments, during the at least the portion of the audio conversation, an audio output, different from the at least the portion of the audio conversation, streams to the fourth user on the fourth mobile device.

In some embodiments, the audio output comprises an advertisement.

In some embodiments, during the at least the portion of the audio conversation, the audio conversation is not streamed to the fourth mobile device or is not output on the fourth mobile device.

In some embodiments, a method is provided for initiating and streaming audio conversations, and providing audio conversation control, the method comprising: determining, using one or more computing device processors, a first user accesses a mobile application on a first mobile device of the first user; determining, using the one or more computing device processors, a second user accesses the mobile application or a second mobile application on a second mobile device of the second user; initiating, using the one or more computing device processors, an audio conversation between the first mobile device of the first user and the second mobile device of the second user; receiving, using the one or more computing device processors, an instruction from the first mobile device to: enable a third mobile device of a third user to output at least a portion of the audio conversation and disable a fourth mobile device of a fourth user from outputting the at least the portion the audio conversation, or provide a messaging option for the third mobile device of the third user to transmit a first audio message to the first mobile device and not provide the messaging option for the fourth mobile device of the fourth user to transmit a second audio message to the first mobile device; streaming, using the one or more computing device processors, the audio conversation to the third mobile device of the third user; transmitting, using the one or more computing device processors, to the third mobile device for visual display, during the audio conversation, on a user interface of the third mobile device, a first visual representation of the first user not comprising a first video of the first user; transmitting, using the one or more computing device processors, to the third mobile device for visual display, during the audio conversation, on the user interface of the third mobile device, a second visual representation of the second user not comprising a second video of the second user; and transmitting, using the one or more computing device processors, to the third mobile device for visual display, during the audio conversation, on the user interface of the third mobile device, a label associated with the audio conversation.

In some embodiments, a method is provided for selecting users for and initiating audio conversations, the method comprising: determining, using one or more computing device processors, a first user accesses a mobile application on a first mobile device of the first user; determining, using the one or more computing device processors, a second user accesses the mobile application on a second mobile device of the second user; selecting, using the one or more computing device processors, based on a preference established by the first user on the mobile application and user information associated with the second user, the second user; initiating, using the one or more computing device processors, an audio conversation between the first mobile device of the first user and the second mobile device of the second user, wherein the audio conversation is associated with a first period; transmitting, using the one or more computing device processors, to the second mobile device for visual display, during the audio conversation, on the mobile application on the second mobile device, a first visual representation of the first user not comprising a first video of the first user; transmitting, using the one or more computing device processors, to the first mobile device for visual display, during the audio conversation, on the mobile application on the first mobile device, a second visual representation of the second user not comprising a second video of the second user; and prior to or upon termination of the first period, receiving, using the one or more computing device processors, from the first mobile device, selection of a first option to extend the audio conversation between the first mobile device of the first user and the second mobile device of the second user.

In some embodiments, the method further comprises: prior to or upon the termination of the first period, receiving, using the one or more computing device processors, from the first mobile device or the second mobile device, selection of a second option to terminate the audio conversation between the first mobile device of the first user and the second mobile device of the second user.

In some embodiments, the selection comprises a swiping action on a user interface.

In some embodiments, the method further comprises: prior to or upon the termination of the first period, receiving, using the one or more computing device processors, from the first mobile device, selection of a second option to at least one of terminate the audio conversation between the first mobile device of the first user and the second mobile device of the second user, or initiate a second audio conversation between the first mobile device of the first user and a third mobile device of a third user.

In some embodiments, the first option comprises initiation of a one-time or periodic transfer operation or computing operation.

In some embodiments, the first option comprises initiation of a subscription operation.

In some embodiments, the first option is associated with a limited extension period for the audio conversation.

In some embodiments, the first option is associated with an unlimited extension period for the audio conversation.

In some embodiments, a video option is presented to at least one of the first user or the second user during an extension period associated with the audio conversation.

In some embodiments, prior to receiving the selection of the first option from the first mobile device, at least some displayable user information associated with the second user is not displayed to or is hidden from the first user when the first user selects a profile of the second user.

In some embodiments, after receiving the selection of the first option from the first mobile device, displayable user information associated with the second user is displayed to the first user when the first user selects a profile of the second user.

In some embodiments, after receiving the selection of the first option from the first mobile device, a second option is displayed to the first user enabling the first user to schedule or propose a second audio conversation with the second user.

In some embodiments, the method further comprises prior to or upon the termination of the first period, receiving, from the first mobile device, an indicator associated with the second user.

In some embodiments, the method further comprises transmitting, to the first mobile device, based on the indicator associated with the second user, an update associated with the second user.

In some embodiments, the method further comprises: streaming, using the one or more computing device processors, the audio conversation to a third user on a third mobile device of the third user; transmitting, using the one or more computing device processors, to the third mobile device for visual display, during the audio conversation, on the third mobile device, the first visual representation of the first user not comprising the first video of the first user; and transmitting, using the one or more computing device processors, to the third mobile device for visual display, during the audio conversation, on the third mobile device, the second visual representation of the second user not comprising the second video of the second user.

In some embodiments, the method further comprises: receiving a message or a reaction from the third mobile device; and transmitting the message or the reaction to at least one of the first mobile device, the second mobile device, or a fourth mobile device to which the audio conversation is being streamed.

In some embodiments, a computation based on reactions received from mobile devices associated with users listening to the audio conversation is used to determine whether to extend the audio conversation.

In some embodiments, during the audio conversation, a third visual representation indicating an amount of time remaining in the first period is displayed on the first mobile device.

In some embodiments, an apparatus is provided for selecting users for and initiating audio conversations, the apparatus comprising: one or more computing device processors; one or more memory systems comprising code, executable by the one or more computing device processors, and configured to: determine a first user accesses a mobile application on a first mobile device of the first user; determine a second user accesses the mobile application on a second mobile device of the second user; select, based on a preference established by the first user on the mobile application and user information associated with the second user, the second user; initiate an audio conversation between the first mobile device of the first user and the second mobile device of the second user, wherein the audio conversation is associated with a first period; transmit, to the second mobile device for visual display, during the audio conversation, on the mobile application on the second mobile device, a first visual representation of the first user not comprising a first video of the first user; transmit, to the first mobile device for visual display, during the audio conversation, on the mobile application on the first mobile device, a second visual representation of the second user not comprising a second video of the second user; and upon termination of the first period, select, based on the preference established by the first user on the mobile application, a third user, and initiate a second audio conversation between the first mobile device of the first user and the third mobile device of the third user.

In some embodiments, the apparatus comprises at least one of an application server, the first mobile device, the second mobile device, or the third mobile device.

In some embodiments, the mobile application may include a method for sorting or browsing through content (e.g., audio conversations). This method may include content that is organized by different categories. Categories may include different topics organized by general labels such as sports, politics, news, video games, music, etc. In some embodiments, selecting a category may change the content that is being sorted or browsed. In some embodiments, a user may select a category, or group of categories, by selecting a button bearing a category title.

In some embodiments, selecting a category button may cause the mobile application screen to changes its organization of content. It may also cause the mobile application screen to change the content displayed. In some embodiments, the categories may be based on one or multiple descriptive operators. The descriptive operators may be based on past browsing or content organization history of a user. A category may be based on multiple descriptive operators at the same time. A descriptive operator may be related to similar topics as a category label, such as sports, politics, news, video games, music, etc. A descriptive operator may also be based on more specific topics such as football, a particular country, a particular music group or speaker, a particular game, etc.

In some embodiments, categories may include location-based categories. Location based categories may create groups of users based on their geographic location. These groups may be created by use of geolocation technology, or by users self-reporting their location. Locations used may be of a radius, boundary, and density of any size.

In some embodiments, the mobile application may display different types of content on one page that a user can scroll through. This content may include audio conversations. These audio conversations may include ongoing audio conversations, audio conversations that are scheduled to occur, or audio conversations that have already occurred. In some embodiments, the mobile application may also display topics that audio conversations might be scheduled (or started as live conversations) if enough users join a list of prospective conversation participants. In some embodiments, the mobile application may display a topic that will initiate a new audio conversation instantly. In some embodiments, the mobile application may display an option for a user to create their own topic and audio conversation. These audio conversations and other options may all be displayed on the same screen of the mobile application and a user may be able to scroll through them.

In some embodiments, the mobile application may display a search bar that allows a user to search for and navigate through all of the audio conversations and options listed above.

In some embodiments, the mobile application may display an associated date and time with an audio conversation that is scheduled to occur in the future.

In some embodiments, a graphical indicator may accompany a live or ongoing audio conversation, in order to signal that it is live or ongoing.

In some embodiments, an audio conversation may be displayed alongside the topic the conversation falls under, associated descriptive operators, an option to join the conversation, an option to notify the user when the conversation is starting, and a list of participating users.

In some embodiments, an audio conversation might be displayed alongside a timer showing when it might begin, or when multiple audio conversations on that topic might begin.

In some embodiments, a number of users that will participate in audio conversations about a given topic will be displayed next to the upcoming audio conversation.

In some embodiments, the mobile application may present topics, descriptive operators, or audio conversations based on the history of a user. This history may include past audio conversations that a user has participated in (as a listener or a speaker), descriptive operators or topics that a user follows or is subscribed to, other users that a user follows or is subscribed to, users or audio conversations that a user has selected, friends the user has on the mobile application, or preference data associated with a user. Preference data may be based on a set of interests input by a user, demographic data, data scraped from other social media sites, or user history on the mobile application. In some embodiments, the topics, descriptive operators, and audio conversations may change over time, in real time, based on the activity of a user. In some embodiments, the mobile application may present topics based on machine learning or artificial intelligence processes.

In some embodiments, the mobile application may include a method for generating audio conversations, where the mobile application may generate a topic for discussion, and present that topic to users who may then participate in an ongoing or future audio conversation about that topic. In order to generate the topic, the mobile application may scrape news data, scrape data from other websites, scrape data from other social media sites, review the activity and contents of the mobile application, look at other topics being generated on the mobile application, etc. In some embodiments, when users select to participate in the generated audio conversation, they may be placed immediately in an audio conversation with one other or multiple other users, or they may be placed in an audio conversation after some period of time.

In some embodiments, the mobile application may present an option to join an audio conversation that a user has already initiated. Selecting this option may place a user in an ongoing audio conversation with the user who initiated the audio conversation.

In some embodiments, the mobile application may present an option to create a topic for an audio conversation that other users may participate in. This may create an option on other user's mobile application displays to join an ongoing or scheduled audio conversation.

In some embodiments, the mobile application may allow a user, or multiple users, to play games over a social audio application, or play games during an audio conversation. These games may be audio based or may rely on a user speaking or listening to participate. These games may also include games where use of audio is not necessary for participation, but the game is carried out during an audio conversation.

In some embodiments, a user may be able to initiate a game during an ongoing audio conversation, or a user may be able to initiate a game from their home screen on some other screen displayed by the mobile application. Initiating a game may send an invite to other users to join the game, or may send a notification to users who are already in the audio conversation that a game is beginning.

In some embodiments, a game may utilize the display of the mobile application to send instructions on how to play the game, to modify the visual representation of a user based on what is occurring in the game, to send notifications or alerts when things happen in the game or a user wins or loses the game, countdowns or timers for when a game might begin, end, or progress to a new phase, prompts for a user to take some action to progress the game, prompts for a user to say something specific to progress a game, descriptions of instructions or notifications related to the game, settings for a game, a screen to select a game, etc.

In some embodiments, the mobile application may display a list of a user's friends on the mobile application. The friends displayed on the mobile application may be presented alongside information about the friends, including their username, active talks they are participating in. active games they are participating in, the last time they were on the mobile application, etc.

In some embodiments, the mobile application may allow for audio conversations with three or more users participating all at once. In some embodiments, the mobile application may allow for a user participating in the audio conversation to split the audio conversation into multiple new audio conversations containing some division of the same users. A user who splits the audio conversation may be able to select which users are placed into which new audio conversation or may be able to select the size of the new audio conversations. A user may be able to remove another user from an audio conversation.

In some embodiments, the mobile application may display audio conversations as a user navigates through the Discover section or through any other display screen in the mobile application. In some embodiments, hovering over a conversation or leaving the screen in place over a conversation may cause the audio conversation to automatically play or open. Automatically playing or opening an audio conversation may cause the audio from the conversation to play, may cause visual representations of the conversation participants to move, or may change the display so that you can see the screen as if a user were to click into the audio conversation.

In some embodiments, only one audio conversation may automatically play at a time. In other embodiments, multiple audio conversations may automatically play at a time. In some embodiments, different audio conversations may automatically play as a user scrolls through the display on the mobile application.

In some embodiments of the mobile application, a user may be able to send audio messages to a different user. Users may be able to send audio messages whether inside or outside of an audio conversation. Audio messages may be private or public. Private message may be viewable only by users actively engaged in a given conversation, or may be viewable only by users selected by the user who sent the message. Public audio messages may be viewable by any user who has access to the message.

In some embodiments, a user may record an audio message through their mobile device's microphone. In some embodiments, a user may select a prerecorded audio message to send. A user may be able to send an audio message to one or multiple other users. Audio messages may be displayed in a conversation log between users or between a group of users. Audio messages may be able to be played multiple times, or may disappear after being played a certain number of times or having been available for a certain period of time.

In some embodiments, sending audio messages may be available to every user at all times. In some embodiments, sending audio messages may only be available to certain users or may only be possible between certain users. A user may need to have been matched with a user before sending them a message or may need to have spoken with the other user in an audio conversation before sending them a message.

In some embodiments of the mobile application, a user may be able to send text messages to other users. In some embodiments, users might message each other using a combination of audio and text messages. In some embodiments, users might only be able to message each other with one type of message. In some embodiments, a user may be able to send both types of messages, but may be limited in how many of one type they may send. Messages between users may be private and viewable only by the users.

In some embodiments of the mobile application, an audio message may be transcribed to text by a recipient or the transcription may occur automatically. Messages might be displayed as both an audio version and a text version in the same conversation.

In some embodiments, sending text messages may be available to every user at all times. In some embodiments, sending text messages may only be available to certain users or may only be possible between certain users. A user may need to have been matched with a user before sending them a message or may need to have spoken with the other user in an audio conversation before sending them a message. Being matched with a user may involve a deliberate process initiated by a user to be matched with another user based on interests or characteristics. Matching may be initiated automatically by the mobile application, and may match users based on interests or characteristics.

In some embodiments, the mobile application may include a search engine. The search engine may be able to engage in text search within the mobile application. The search engine may apply this text search to text messages. In some embodiments, the search engine may work in unison with transcribing audio messages, in order to locate specific portions of an audio message.

In some embodiments of the mobile application, the search engine may work in unison with transcribing methodology, and may allow search of past or recorded audio conversations. The mobile application may transcribe past or recorded audio messages to text, and may run text search on the results, in order to locate specific words, location, or timestamps from an audio conversation.

In some embodiments of the mobile application, a user may be able to access a topographical view or social audio "map." The topographical view of social audio "map" may display a fictional view of a social audio "world." Categories or descriptive operators may be used to separate out different islands, nations, streets, neighborhoods, or other geographical features. Geographical features may be named or organized based on the content associated with them. Users' visual representations or avatars may be presented on the topographical view or social audio "map," and may be able to interact with other users who are present in the space.

In some embodiments, a user may be able to zoom in and out of the topographical view or social audio "map," or scroll it in different directions. Navigating the topographical view of social audio "map" in this way may allow a user to view different features or locations, or may allow a user to interact with different users. In some embodiments, zooming in towards a user or location or geographical feature may present some visual or audio indication of an ongoing audio conversation. A user may then be able to listen to an audio conversation while in the topographical view or social audio "map" or may be able to click the audio conversation to join it, either as a listener or as an active participant.

In some embodiments, clusters of users on the topographical view or social audio "map" may be represented by some visual indication. When a user is zoomed out sufficiently far enough, the visual indication may present the number of users in an area or may present ongoing topics of audio conversations.

In some embodiments, the mobile application may include an audio message board. The audio message board may be public and accessible by any user, or may be accessible only to a select group of users. In some embodiments, the audio message board may allow users to share external content. External content may include news articles, links to other social media applications, etc. In some embodiments, the audio message board may allow users to share internal content. Internal content may include audio conversations from the mobile application. Users may be able to add voice clips to the internal or external content on the audio message board.

In some embodiments, users may be able to vote on a post on the audio message board, or may be able to reply to a post on the audio message board. Replying to a post on the audio message board may involve recording a new audio message or may involve typing out a text response. Responses to a post may appear to be nested under one another on the audio message board.

In some embodiments, a user may be able to "share" posts on the audio message board. "Sharing" a post may involve sending the post to an individual, or posting a link to the post on a social media application or website. When a user is "sharing" a post, the mobile application may generate a video of a user's visual representation or avatar with an associated audio message. This video may be shared similar to how a post is shared.

In some embodiments, a user may be able to start an audio conversation in response to a post on the audio message board.

In some embodiments of the mobile application, a user may be able to use content to create a topic for their audio conversation. Content may be generated by the user, or may be pulled from other websites or social media applications. Content may be pulled from the audio message board. Content being used as a topic may appear on the mobile application's display during an audio conversation. Content may have an associated audio clip or audio message that can be played during an audio conversation. Content may be viewable from various parts of the mobile application.

In some embodiments, the mobile application may include features for matching users into an audio conversation. Users may have interacted on the mobile application before being matched, or they may have never interacted on the mobile application before being matched. The mobile application may present an option for a user to be placed in an audio conversation with a user they have never interacted with before on the mobile application, or who they may have never been in an audio conversation with before.

In some embodiments, users may be matched based on a data processing operation that may look at metrics about each user. Metrics may include listed interests for a user, past activity on the mobile application of a user, preferences input by a user, etc., or any other user data described in this disclosure.

In some embodiments of the mobile application, the mobile application may present a button or option that will present a list of actions when clicked on. These actions may include starting an audio conversation, being matched with a user, playing a game, listening to an audio conversation, making a post on an audio message board, going to a topographical view or social audio "map," etc., or any other action described in this disclosure.

In some embodiments of the mobile application, a user may be able to select a topic for an audio conversation before initiating the audio conversation. A topic may be created by a user, may be taken from a third party website or social media application, or may be generated by the mobile application. A topic may be based around a category. A category may include such things as health, sports, gaming, finance, news, etc. A topic may be displayed during an audio conversation when it is selected. The mobile application may place users in an audio conversation based around a topic they have selected or indicated a preference for.

In some embodiments of the mobile application, an ongoing conversation may have an associated visual indicator displayed alongside it. The visual indicator may use words such as "Talking," "Live," "Ongoing," etc.

In some embodiments of the mobile application, a user may be able to create an excerpt or recording of an audio conversation. A user may be able to share this excerpt or recording to different places on the mobile application or to third party websites or other social media applications. A user may be able to create an excerpt or recording from a live or a recorded audio conversation. The mobile application may generate a video of a user's visual representation or avatar with an associated excerpt or recording. This video may be shared similarly to how an excerpt or recording is shared.

In some embodiments of the mobile application, a user may be able to make their content appear higher or more frequently on the mobile application. A user may be able to make their content appear higher on a page of the mobile application dedicated to browsing and finding new content. A user may be able to make their content appear higher by numerous ways, including: paying a fee (or initiating execution of a data processing operation), engaging in a lot of activity on the mobile application (e.g., greater than a threshold level of activity), having a more in depth profile than other users (e.g., displaying more user data compared to a threshold level of data), etc.

In some embodiments of the mobile application, a user may customize their visual representation or avatar. A user may be able to select articles of clothing for their visual representation or avatar to wear. The articles of clothing may be able to have customized text appear on them. A user may be able to order replications of the digital articles of clothing through the mobile application or some third party website or mobile app. As used in this disclosure, the term "website" or "mobile app" can include any web application server.

In some embodiments of the mobile application, a user may be able to react to other users in an audio conversation. A user may be able to direct a reaction to a specific user in an audio conversation. Reacting may create an associated message, notification, or visual indication on the display of the mobile application. A reaction may involve selecting on one or more reactions from a list of different text, sound, or image responses, which may be sent to another user or be displayed by the mobile application.

In some embodiments, the mobile application may compile reactions sent by or sent to a user and use that information to create a profile of reactions, which may be associated with a user. A profile of reactions may contain information about the type and frequency of reaction that a user sends or receives. In some embodiments, the mobile application may assign a label or designation to a user based on the profile of reactions. A label or designation may be represented visually when a user's profile, visual representation, or avatar is displayed on the mobile application.

In some embodiments, the mobile application may generate labels or designations for a user. These labels and designations may be based on the overall activity of a user on the mobile application. Labels and designations may be represented visually when a user's profile, visual representation, or avatar is displayed on the mobile application.

In some embodiments, the mobile application may generate digital tokens for a user. These digital tokens may be based on the overall activity of a user on the mobile application. Digital tokens may include smart contracts (or other digital facilitators), in-app currency, etc. Digital tokens may be generated based on a user hitting certain milestones or accomplishing certain tasks within the mobile application.

In some embodiments, the mobile application may assign a smart contract or a non-fungible token to an audio conversation or an excerpt of an audio conversation. A smart contract or a non-fungible token associated with an audio conversation or an excerpt of an audio conversation may be used to verify the content or the origin of the audio conversation or excerpt of the audio conversation. This may allow audio conversations or excerpts of audio conversations to be distributed and verified via blockchain technology (i.e., a distributed ledger stored across a series of validating devices).

In some embodiments of the mobile application, audio conversations or excerpts of audio conversations that are associated with a smart contract or non-fungible token may be exported from the mobile application. Exporting may involve sharing the audio conversation or excerpt of the audio conversation to a third party website, third party blockchain, digital wallet, or other social media application.

In some embodiments of the mobile application, users may be able to send invitations or referrals to other users or potential users, who may begin using the mobile application in turn. In some embodiments, users may receive compensation for referrals or invitations they send to other potential users. Compensation may be in the form of increased benefits within the mobile application, financial compensation, compensation via in-app currency, digital tokens, etc.

In some embodiments of the mobile application, a user viewing an audio conversation may be able to toggle associated video or visual representations on and off. A user may be able to selectively decide which elements of an audio conversation are being viewed or played at a given time.

In some embodiments, a user can create an audio clip to share or post on the mobile application. This audio clip may be of a limited duration. A user may be able to add associated text to the audio clip. A user may be able to add other visual elements to be associated with the audio clip. A user may be able to add an interactive element to the audio clip. Interactive elements may be links to news or social media sites, interactive photos, live streams, information updated in real time, etc. A user may be able to save a draft of a recorded audio clip to be utilized later. A user may be able to list who the author of an audio clip is, or may opt to not list such information. A user may be able to disassociate the above mentioned information form the audio clip entirely.

A user may not be able to create audio clips, depending on the attributes or qualities of the user. A user may need a sufficient level of followers or friends on the mobile application, or may need to be given permissions to create audio clips by an administrative user. Other uses may be able to view or react to audio clips after they have been shared or posted by a user. A reply to an audio clip may be comprised of text, or it may be a responsive audio clip recorded by the responding user. This responsive audio clip may be of a limited duration and may be of a different duration than the original audio clip. In some embodiments, a user may be able to edit an audio clip after it has been posted or shared.

Audio clips that have been posted or shared may be sorted in some embodiments. Audio clips may be sorted by their timestamp, length, popularity, number of responses, posting user, etc. Users may react to an audio clip using their avatar or visual representation. An avatar or visual representation may be programmed to move or shift in a specific way. This specific movement may be used to react or respond to audio clips, or any other content in the mobile application. Users may report audio clips or other content if they believe them to be inappropriate.

In some embodiments, the mobile application may export an audio clip, or a thread containing an audio clip, as a "widget." A widget may be linked to the home screen of a mobile device, a web browser, a desktop screen, etc. Widgets may include links to, or displays of information relating to, sports, news, current events, etc. Widgets may also include information on live polls being conducted in the mobile application.

Users may export an audio clip, or a thread containing an audio clip, to social media sites. These exports may contain links to the audio clip or thread, or may contain audio and/or visual content from the mobile application itself. An embedded HTML version of the audio clip or thread may be executable from the export.

In some embodiments, a user may be able to have the mobile application suggest similar audio clips to the one(s) the user has viewed. A user may be able to hide, report, or block audio clips. A user may be able to access information or metadata associated with an audio clip. Metadata may include the associated number of "likes," number of times the audio clip has been listened to, total amount of audio clips a user has made, responses or reactions that an audio clip has generated, number of times an audio clip has been shared, etc.

In some embodiments, the mobile application may present content on a home page. This content may include ongoing audio conversations or may include audio clips that have been posted or shared by a user. This content may include links to content associated with other users. A user may need to follow these other uses in order for that content to appear. A user may need to have interacted with these other users in some way in order for that content to appear. A user may be able to customize the mobile application settings such that only specific content may appear. A user may be able to limit content that appears to be related to specific topics or from other uses that the user has followed.

In some embodiments the mobile application may display content that is the most popular, is trending, or has garnered the highest level of response. The mobile application may display content published by users you follow or interact with, which is viewable to users that follow or interact with the content generating user. A user may be able to record, share, or post audio clips that can be viewed by other users that follow or interact with them. If a user responds or reacts to that audio clip, a message may be sent to the generating user containing that responses or reaction. A user may be able to see how many views, listens, responses, or reactions that their audio clip has generated.

In some embodiments, a user may be able to post or share audio clips that may be viewable for a limited duration. An audio clip may appear on another user's mobile application or on the generating user's page for a limited duration. The duration that the audio clip is viewable may be 24 hours, or some other limited timeframe.

In some embodiments, a user may be able to listen to an audio clip and any associated or responsive audio clips consecutively. Any responses or reactions to an audio clip may be viewable when a user clicks into the mobile application screen associated with an audio clip.

In some embodiments, audio clips from a user's activity on the mobile application may be automatically sectioned out. These audio clips may be excerpted from audio conversations that the user has participated in, or may be audio clips of a limited duration that the user has posted or shared somewhere in the mobile application. These automatically sectioned out audio clips may be viewable by other users. Other uses may need to follow or interact with the generating user in order to view the automatically sectioned out audio clips. Some of the automatically sectioned out audio clips may be responses or reactions to another audio clip. When viewing an automatically sectioned out audio clip, the reactions or responses to the audio clip may be displayed alongside it. A user may be able to listen to responses to the audio clip from the same page on the mobile application. A user may be given the option to react or respond to the automatically sectioned out audio clip.

In some embodiments, a user may record an audio clip and associate visual elements with it. Visual elements may include movements, moods, or reactions made by a user's avatar or visual representation. Visual elements may include associated text or links. Other user may see previews of the content in the audio clip or associated visual elements when browsing in the mobile application. A user may be able to view a preliminary version of a post associated with an audio clip before sharing or posting. This preliminary version may include previews of the audio clip or associated visual elements, and may appear to the user in a similar manner to how it will appear to other uses.

In some embodiments, a user may be able to record an audio clip that may be associated with their profile. This audio clip may be of a limited duration. This audio clip may be permanently present on the generating user's profile page on the mobile application. A user associate visual elements with this audio clip. Visual elements may include movements, moods, or reactions made by a user's avatar or visual representation. Visual elements may include associated text or links. This audio clip may play prior to other audio clips that are associated with a user profile or generated by the user. Other uses may be able to react or respond to this audio clip associated with a profile. This response or reaction may be viewable by the user who generated the audio clip. This response or reaction may be sent via a message to the user who generated the audio clip.

In some embodiments, after a user has opened an audio conversation or audio clip page in the mobile application, the user may be able to navigate to a different piece of content provided for them by the mobile application. A different piece of content may be another audio conversation or audio clip page. A different piece of content may be generated by another user that the user follows or has interacted with. A different piece of content may be recommended by the mobile application. Recommendations may be based on a user's profile, past activity on the mobile application, or other characteristics.

In some embodiments, the mobile application may connect with a vehicle. In connecting with a vehicle, the mobile application may be able to play audio content through the vehicle's speaker systems. Other functions of the mobile application may be integrated to function in the vehicle's systems. A user may be able to activate the mobile application's features and functions through the vehicle's voice commands. A user may be able to create audio clips or participate in audio conversations using the vehicle's voice commands. A user may be able to listen to audio conversations or responses to audio clips using the vehicle's voice commands. Vehicles may include cars, boats, ATVs, planes, etc.

In some embodiments, a user may be able to share information or posts from social media sites or news sites to the mobile application. A user may see other posts or audio content on the mobile application dealing with the information or posts when they attempt to share it. A user may be given the option to create an audio clip or audio conversation related to the information to be posted or shared on the mobile application. The audio clip or audio conversation created by the user may have the link to the information or the information itself presented alongside it.

In some embodiments, the mobile application may be linked to third party websites, devices, or mobile applications, such that links to ongoing audio conversations or audio clips may be presented on the website, device, or mobile application. The link may be contained within a "widget" or other interface component, which may display details of the audio conversation or audio clip. Details may include participants, conversation status, images, etc.

In some embodiments, the mobile application may be integrated with third party recommendation engines, such that the recommendation engines may present content from the mobile application based on a potential user's activity on websites, devices, or other mobile applications. This potential user may not have any association with the mobile application.

In some embodiments, a user may associate third-party content with an audio clip or an audio conversation. The third-party content may be analyzed by the mobile application, such that the mobile application may create a user, account, or page that is associated with the third-party content. This user, account, or page may be based on the third-party content's provider. The user, account, or page may be associated with multiple pieces of content on the mobile application. Clicking on the user, account, or page may pull up a listing of all the content associated with that user, account, or page. In some embodiments, if an individual or entity associated with the content provider creates a user account within the mobile application, they may inherit the existing user, account, or page and any associated followers or content.

In some embodiments, the mobile application may include the functionality to play background audio during other activities on the mobile application. Background audio may include music, ongoing audio conversations, news, audio from a show or other mobile application, etc. Background audio may be set by a user, wherein the user may be in control of a show or channel that plays background audio. This show or channel for background audio may be presented through the mobile application's format for an audio conversation. A user may be able to communicate with the user in control of a show or channel. The option to communicate with the user in control of a show or channel may be present on the mobile application screen where the show or channel is occurring, or the option may be present somewhere on all mobile application screens while the background audio is playing.

In some embodiments, the mobile application may have game functionality related to music. The mobile application may integrate with third party music streaming services, or other sources of music, in order to access a music library. Users who a participating in a game may be presented with a portion of a song, and may be presented with an option to guess and identify the song being played. Users may be presented with a listing of potential songs to guess from. Users may have a limited time to guess the song being played. Users may be able to select genres of music to focus on when playing the game. Users may guess songs and be awarded points for correct guesses. Users may compete against other users in total number of points awarded.

In some embodiments, the mobile application may include interactive media. Interactive media may include polls, audio conversations about preselected topics, sports scores, photos, etc. Audio conversations or audio clips related to the interactive media may be presented alongside the interactive media. Polls may present an option for users to click and vote within the mobile application. Participating users or comments to interactive media may be displayed alongside the interactive media.

In some embodiments, the mobile application may include location based identifiers. Location based identifiers may be generated based off of location data associated with the mobile application, a mobile device, a user, an account, other third party location applications, etc. Location based identifiers may be linked in, or associated with, audio conversations or audio clip. A user, when making an audio clip, may be able to associate the audio clip with a location based identifier. Groups of users may be able to be created based on location identifiers or similar profile characteristics. The mobile application may present a topographical representation based on the location based identifiers. User avatars or visual representations may appear on the topographical representation based on the location based identifiers or activity of the users.

In some embodiments, the mobile application may give a user the ability to access another user's profile information. A user may be able to access preferences, biographic data, and personal information about another user. Information about another user may be accessible if a user sends a digital exchangeable to the mobile application.

In some embodiments of the mobile application, when a user may be matched with another user, the matching may occur if a user sends a digital exchangeable to the mobile application.

In some embodiments of the mobile application, a user may be able to make an ongoing audio conversation private, such that participating users can hear the audio from the ongoing audio conversation. Making an audio conversation private may remove any listening users from the audio conversations. Making an audio conversation private may require a user to send a digital exchangeable to the mobile application. In some embodiments, the mobile application may require a user to send a digital exchangeable to the mobile application in order to initiate being matched with another user, or to begin an audio conversations with another user.

In some embodiments of the mobile application, a user may be presented with options listing users to be matched with, or to start an audio conversation with. In some embodiments, the mobile application may automatically match a user with other users one after the other. A user may not be able to select users or initiate audio conversations unless they send a digital exchangeable to the mobile application. The mobile application may cease matching a user with other users unless the user sends a digital exchangeable to the mobile application.

In some embodiments, the mobile application may verify information about users or potential users before allowing them to access the mobile application. Verification may include checking that a user has a sufficient age or was born on a sufficient date. Verification may include checking information by processing a voice clip or a picture of the user. Voice clips of user may be used to verify a user or potential user's status as a person. Pictures of a user may be used to verify the user or potential user's appearance or identity. Videos may be used in combination to serve the same function as a separate voice clip and picture.

In some embodiments, the mobile application may allow users to attach video content to any posts on the mobile application. Video content may be a video recording, a video clip of longer duration (e.g., greater than a first duration), an animated video, a looped video clip, etc. A user may be able to attach photos or static images to any post on the mobile application.

In some embodiments, when viewing an audio clip, a user may be able to see transcripts of the audio clip. A user may be able to access the transcript, or other information associated with an audio clip, by swiping (or otherwise making a motion) on a device screen. Other information associated with an audio clip may include details on the number of listens, shares, or likes, information about replies, information about the origin of the clip, information about the posting user, etc.

In some embodiments, a user may be able swipe or motion on the screen of a device in order to perform a variety of functions in the mobile application. Different directional swipes, or types of motion on the screen may correspond to different actions taken within the mobile application. The actions tied to these swipes or motions may include: zooming into a video, displaying or hiding information about a post or item within the mobile application, pulling up or hiding captions or transcripts, reacting to a post or content, etc.

In some embodiments, the mobile application may provide a group of tools or functions for editing content that is to be posted on the mobile application. These tools and functions may allow for a user to add attachments to posts, forward messages or content from other applications or social media sites into the mobile application, associate one piece of content with another piece of content already found on the mobile application, provide links that take a user to other applications or social media sites, slow down or speed up audio content, cut portions of audio content, add images, visual representations, text, or emojis, etc.

In some embodiments, a user may be able to create a string of associated content in the mobile application, such as a slideshow. A user may be able to use different images, videos, or combinations of either to create a visual narrative that may be posted or shared as content on the mobile application.

In some embodiments, the mobile application may utilize AI or machine learning in order to generate different elements. The mobile application may utilize AI or machine learning to generate background images that can be used in content posted on the mobile application, images or videos, visual representations of users on the mobile application, content to be posted on the mobile application, etc. The material generated by AI or machine learning may be based on existing content or representations already within the mobile application, or it may draw from separate sources such as other websites, mobile applications, or anywhere that provides example content. A user may be able to submit their own material for the AI or machine learning to leverage in creating new content, which may be gathered from a variety of sources. The material generated by the AI or machine learning might be uniquely generated based off of analysis of audio content (e.g., words in the audio content), user behavior or preferences, history of users/content or trending content in the mobile application, etc.

In some embodiments, games within the mobile application may include replicas of traditional board games, such as poker, or may include card based games.

In some embodiments, the mobile application may sort users into different classes or groups. Each class or group may have its own internal structure, rules, and/or leaders. Some of these classes or groups may be closed to users not within the class or group, or may contain private content. The class or group that a user may be sorted into by the mobile application, or that they may have access to, may be based on the activity of the user in the mobile application. A user may be ranked or sorted based on the level of activity they engage in, the success of content that they drive, the amount of content that they post or are associated with, their number of connections in the mobile application, performance in games on the mobile application, etc. Users may be able to vote for changes within, or influence the classes or groups, and may have different levels of control or function within the classes or groups. Users may be able to elect a leader for a class or group. A user may be able to only be in one class or group at a time. In some embodiments, only users in the class or group may be able to contribute to the class or group. The class or group may be self-moderated such that users may be able to invite or remove other users from the class or group.

In some embodiments, the mobile application may display metrics or progress indicators for the level of engagement a user is generating, or the level of "points" that they have been assigned. A user may drive engagement or generate more "points" by taking part in different activities within the mobile application, such as creating more content, having content that receives a lot of feedback or responses, or inviting other users to the mobile application.

In some embodiments, the level of engagement or "points" that a user may have may allow them to access certain features of the mobile application. Digital assets or content with the mobile application may be acquired, either through payment of "points," promotions, or other means. These digital assets or pieces of content may have associated levels of rarity, which may be tiered and which may have associated colors or attributes. Users may be able to exchange digital assets or pieces of content with other users, or may be able to use them to modify their profile or visual representation cosmetically. Some of the content may include themes that change the appearance of function of the mobile application for a specific user.

In some embodiments, the mobile application may provide voice or sound filters, or voice or sound modulators. These filters or modulators may be applied to content posted or shared on the mobile application, or may be tied to the recording of sound or voice inputs to the mobile application. The filters or modulators may edit the tone or timber of a sound or voice. The filters or modulators may add different effects to the sound or voice.

In some embodiments of the mobile application, it may rank users based on the above described level of engagement or "points." A user's activity may cause them to be "de-ranked."

In some embodiments, the mobile application may have achievements or measures of success that it awards to users. Users may have to partake in certain activities, or certain levels of an activity, on the mobile application in order to be awarded an achievement or measure of success.

In some embodiments, a user may be able to save drafts of content to be posted or shared on the mobile application in the future. A user may be able to share these drafts with other users.

In some embodiments, the mobile application may display banners, backgrounds, videos, or other visual methods of engagement. These visual methods of engagement may link to other content on the mobile application, or may link to some location outside of the mobile application.

In some embodiments of the mobile application, a user's profile may include links to exterior websites, social media platforms, or applications. The mobile application may partner with different websites, social media platforms, or applications in order to provide cross functionality.

In some embodiments of the mobile application, audio clips may be mixed, edited, and ordered to create one (or more than one) large comprehensive audio clip(s) comprised of other individual audio clips. A user may be able to individually edit different sections of audio clips to manipulate and change the overall audio content, that they then may post or share on the mobile application (or share on other social networks). A user may be able to upload pre-recorded content on the mobile application that can be used in the creation of audio or visual content. The ability to access this functionality may only be granted to certain users in the mobile application.

In some embodiments of the mobile application, a user may only be able to view publicly accessible content or view public profiles unless they have specific permissions.

In some embodiments of the mobile application, users may be able to join private (only select users) groups or send private messages to one another. Private groups may have interactions, such as messaging, between all the included users that only they can view.

In some embodiments of the mobile application, a user may be able to increase the visibility of posts or content they have posted or shared on the mobile application. In order to this, the user may have to receive the ability to do so from the mobile application, and may only be able to do so a limited number of times.

In some embodiments, users may be able to send a digital piece of art or image to another user, or attach the digital piece of art or image to a piece of content in the mobile application.

In some embodiments, users may be able to send a reaction to another user, or attach the reaction to a piece of content in the mobile application.

In some embodiments, users may be able to impact an ongoing audio conversation with effects that alter or blur the visual display of the mobile application or the audio stream of the conversation.

In some embodiments, all of the above actions may be subject to a user needing to submit a digital asset to the mobile application.

In some embodiments of the mobile application, elements and functions of the mobile application may be integrated with web browsers. The mobile application may be connected to a corresponding browser plug-in that allows mobile application content to be viewed on a web page. This may provide the functionality for mobile application users to comment on any web content, including news articles, media content, streaming content, social media content, etc. Comments made by user may be linked to, or associated with, specific portions of the relevant content, like time-stamps in a video, or specific sentences in an article.

Clicking on the relevant portion of content, or viewing the relevant portion of a piece of media, may bring up the comment for display. Comments may be text based or comprised of audio messages. A web page or other piece of online content may have visual indicators of where comments have been left, and how many comments have been left on a given portion.

In some embodiments, web content that is receiving comments via the plug-in may be correspondingly displayed within the mobile application via normal use. Content which is "trending" online based on mobile application user engagement, may be displayed within portions of the mobile application where a user may be browsing. The content may appear in user search results or may be shared among users. Clicking on the content may allow a user to see or listen to the comments that have been made, or may allow a user to go to the web location of the content.

In some embodiments, "author" profiles may be automatically generated for the individual or entity that publishes content which appears on the mobile application. The profile may include aggregated links to all associated content from the mobile application or the web, and may include biographic information for the "author" based on metadata from the web. The content may be organized into different categories based on the type of content itself. The "author," may be able to take over administration of monitoring of the profile by reaching out to mobile application administrators or by verifying In some embodiments, the mobile application may have a "news" page or section dedicated to collecting articles and other content existing outside of the mobile application into a convenient location for users.

In some embodiments of the mobile application, audio messages or content may be edited with voice filters. Filters may leverage artificial intelligence or machine learning to assist with voice modulation. The mobile application may offer preset voice filter options.

In some embodiments of the mobile application, activities such as sending messages, sending audio messages, posting content, etc. may be done anonymously. Users viewing such content or messages may be able to execute a payment computing operation in order to reveal an anonymous posting user.

In some embodiments of the mobile application, a feature may allow for engagement with secret feedback posts. A user may make a post soliciting feedback, where responding users may be able to submit anonymous feedback.

In some embodiments of the mobile application, comments left by users may appear contemporaneously when viewing content with visual components. Such contemporaneously appearing comments may appear near the bottom portions of the content being viewed. Clicking on the comments may bring up a larger, interact-able field where a user can view multiple comments.

In some embodiments of the mobile application, the mobile application's processes of matching users, enabling users to engage in live audio conversations, send audio messages, etc. may be used to enable users to engage in dating or social matchmaking, whether as participants or viewers of a conversation. An ongoing conversation for purposes of dating or social matchmaking may occur through live audio conversations or through the exchange of messages, whether text based or audio.

In some embodiments, conversations between users for the purposes of dating or social matchmaking may be visible to other users on the mobile application. Users may be able to watch, engage with, and listen to ongoing conversations between other users on the mobile applications. These publicly viewable conversations may be switched to private conversations based on the actions of the participating users. These conversations may be related to dating, romance, social matchmaking, etc.

In some embodiments, when attempting to make a conversation "private," the process for such may be initiated by any participating user within the conversation. When initiating the process, a user may be able to make the conversation private themselves, or may be able to ask other participating user(s) to make the conversation private instead. Going "private" may, in some cases, require consent of all participating users.

In some embodiments of the mobile application, a user may be able to initiate a conversation with another user. A conversation may be initiated via one user directly messaging or notifying the second user, or two users may be paired via the mobile application. A message or notification may be sent in any instance in which one user can locate or view another user's profile. Users may be matched for a conversation by the mobile application based on a variety of past user activity and set user preferences. A user may be presented with information about, or the profile for, a second user when they are matched together. Upon being presented with the information about, or the profile for, a second user, the first user may be able to select whether or not they desire to engage in a conversation with the second user. Both users may need to select the other user in order for a conversation to be initiated.

In some embodiments, users may be able to browse through other users to potentially engage in conversations with, and the users may indicate their assent or dissent to initiating a conversation with the other user through a swiping motion or other physical gesture.

In some embodiments, the users another user may be matched with may be based on algorithmic analysis performed by the mobile application, which may take into account a set of preferences laid out by the user. A user may set preferences, whether in regards to potential matches or in regards to conversations they want to be suggested for viewing, in regards to gender of matches or conversation participants, age of matches or conversation participants, location of matches or conversation participants, interests of matches or conversation participants, sexual preferences of matches or conversation participants, etc.

In some embodiments, users may be engaged in a conversation, wherein the exchange between the users may consist of live audio conversations, or the exchange of messages, which may be text based or may be audio clips. These conversations, which is limited to a select number of users, may be public, such that they can be viewed by other users on the app, who are not engaged in the conversation themselves. These "viewing users" may have these conversations suggested to them by the mobile application, may discover the conversations by browsing within the mobile application, may have conversations shared with them by other users, or may subscribe to or "follow" certain users engaged in the conversation or the specific conversation itself.

In some embodiments, users engaged in, or viewing, the conversations may be able to perform a variety of actions by paying a fee to the mobile application or by executing a computing transaction within the mobile application. These actions may include: making a publicly visible conversation switch to private, sending a highlighted or emphasized message to conversation participants, revealing a user's profile photo or other image, view a more detailed history or information set for a user, send additional messages or view additional user profiles on top of a predetermined limit, resending existing messages, emphasizing or highlighting a sent message, extending an ongoing conversation, revive an old or expired conversation, etc.

In some embodiments, when engaged in searching for users, or having users suggested to you by the mobile application, a user may be able to view detailed information related to another user. This information may comprise detailed biographic data, such as location and occupation, or may comprise information dealing with dating or social matchmaking. Information dealing with dating or social matchmaking may comprise gender or sexuality preferences, history of conversations, messages, or interactions the user has had with other matches, timeframes and results from past matches, outcomes from past matches, metrics relating to all of the above, etc.

In some embodiments, the mobile application may take advantage of advanced metrics to match users and to enable other functionality within the application. These metrics may assist users and application administrators in viewing engagement statistics, see if users are engaging in conversations and seeking matches or if they are just viewing conversations, which users get the most attention and messages, etc.

In some embodiments, any ongoing audio conversations may be automatically converted into text transcripts for accessibility and easy viewing.

In some embodiments, ongoing conversations or shows may be limited in how many users can view the contents in real time, view the contents at all, react to the content within the ongoing conversation or show, etc.

In some embodiments, any ongoing conversation or show may have associated comments, which may be text based or audio based. These comments may automatically play, or be read aloud, when viewed within the comment section of a piece of content.

In some embodiments, a user may be able to share ongoing conversations or shows, or material excerpted from the same, via sending a link to different users or to distribute via text message, social media, etc.

In some embodiments, the mobile application may analyze the contents of an ongoing conversation or show and may generate a text summary of the past history of the ongoing conversation or show. Participating users may be able to input their own summary information about interactions with the other conversation or show participant, including information based on off-mobile application, which the mobile application may leverage in generating a summary.

In some embodiments, a user may be able execute certain actions based on actions they have already executed within the mobile application, or within the context of an existing ongoing conversation or show. A user may only be able to send photos or other visual content, take an ongoing conversation or show private, initiate a voice call, etc. only once they have sent a certain number of messages or have engaged in an ongoing conversation or show for a certain amount of time.

In some embodiments, during an ongoing conversation or show, viewing users may be able to make suggestions for how the participating users should communicate or behave, whether by voting on presented options or providing direct suggestions. Viewing users may be able to send messages or other content to the participating users, which the participating users may select to be published for all viewing users to see or respond to.

In some embodiments, the mobile application may analyze and rank ongoing conversations, shows, or other types of content for presentation to users. For example, a conversation with a large number of replies may be pushed to top of a feed for browsing users.

In some embodiments, some users may be classified as a higher tier than other users, such as a "Star." This higher tier of user may have access to additional features, whether within an ongoing conversation or show or within the mobile application at large. Some features that only higher tier users have access to include: conducting polls, having access to a larger amount of search options, more easily making a conversation private or public, having access to a higher number of effects, images, gifs and other options, etc.

In some embodiments, the mobile application may generate visual summaries or excerpts based on the content within an ongoing conversation or show. This summary or excerpt may be based on a certain timeframe from within the ongoing conversation or show, such as creating one summary per day.

In some embodiments, users on the mobile application may create prompts or questions to solicit responses or answers from other users, who may be viewing the posting user's profile. A prompt or question may be pre-generated by the mobile application or may be created by the posting user themselves. Pre-generated questions may have different levels of "spiciness"—or different levels of sexual suggestiveness to them. A posting user may be able to navigate through and view responses received.

In some embodiments, users may be able to subscribe to or follow another user or an ongoing conversation or show, in order to have the mobile application send updates based on new activities or developments of the same.

In some embodiments, a user may be able to browse through content on the mobile application by "scrolling" through screen where different types of content may be presented. This content may include ongoing conversations or shows, or other content related to dating or social matchmaking. The content presented to a user as they browse may be selected by the mobile application based on popularity or engagement of the relevant content, or based on other metrics. The mobile application may represent content with pictures, videos, moving images, depictions of involved users, etc. If there is audio associated with the content the mobile application may include excerpts our automatically play audio when browsing.

In some embodiments, a user may set preferences for what content, or what potential user matches, they are presented with when navigating the mobile application. These preferences may be based on the gender, sexuality, or location of other users, either in regards to the users engaged in ongoing conversations or shows or in regards to potential users to be matched with within a dating or social matchmaking context. Other preferences may be set as well, such as preferences on type of content, length of content, context of the content, source of the content, date of the content, etc.

In some embodiments, while browsing the mobile application or being presented with potential matches with other users, a user may be able to select different ways to engage with and connect with another user. A user may choose to message or initiate a conversation with another user whilst viewing the user's profile. These message or conversations may be based on prompts or information found on a user's profile. Viewing a user's profile may present metrics about the user's behavior or may present archives of past conversations the user was engaged in. A user may only be able to view a certain number of user profile or send a certain number of messages to other users within a given time period.

In some embodiments, the mobile application may organize and rank ongoing conversations or shows based on user engagement, or as part of a structured "competition." Shows, or participants in shows, may be selected to be a part of a "competition" where they will compete against other users or shows for votes, rankings, performance, etc. Performing well in a given "competition" may award participating users with prizes or benefits.

In some embodiments, the terms signal, data, and information may be used interchangeably. In some embodiments, a talk, conversation, stream and discussion may be used interchangeably. In some embodiments, a conversation or audio conversation or audio-based conversation may refer to an audio-only conversation between or among users. In some other embodiments, a conversation or audio conversation or audio-based conversation may refer to an audiovisual conversation involving audio and the speakers in the conversation being represented by visual representations, which may be avatars, emojis, personas, etc. In still other embodiments, a conversation or audio conversation or audio-based conversation may refer to an audio-visual image or audio-video conversation involving audio and still images or video (e.g., live video or image captures) associated with the users in the conversation. In some embodiments, any features associated with listening mode may also be applicable to conversation mode, and vice versa. In some embodiments, any features associated with historical conversation may also be applicable to live conversations, and vice versa. In some embodiments, any features that are applicable to live or recorded conversation may also apply to audio messages. In some embodiments, any reference to a mobile application may also refer to an instance of a mobile application. Any features that are applicable to any embodiments described herein may also be applicable to any other embodiments described herein.

This patent application incorporates by reference the following commonly owned applications:

(1) U.S. patent application Ser. No. 17/003,868, titled "COMPLEX COMPUTING NETWORK FOR IMPROVING ESTABLISHMENT AND BROADCASTING OF AUDIO COMMUNICATION AMONG MOBILE COMPUTING DEVICES," filed on Aug. 26, 2020;

(2) U.S. patent application Ser. No. 17/003,876, titled "COMPLEX COMPUTING NETWORK FOR PROVIDING AUDIO CONVERSATIONS AND ASSOCIATED VISUAL REPRESENTATIONS ON A MOBILE APPLICATION," filed on Aug. 26, 2020;

(3) U.S. patent application Ser. No. 17/003,878, titled "COMPLEX COMPUTING NETWORK FOR CUSTOMIZING A VISUAL REPRESENTATION FOR USE IN AN AUDIO CONVERSATION ON A MOBILE APPLICATION," filed on Aug. 26, 2020;

(4) U.S. patent application Ser. No. 17/003,885, titled "COMPLEX COMPUTING NETWORK FOR HANDLING AUDIO MESSAGES DURING AN AUDIO CONVERSATION ON A MOBILE APPLICATION," filed on Aug. 26, 2020;

(5) U.S. patent application Ser. No. 17/003,888, titled "COMPLEX COMPUTING NETWORK FOR HANDLING DROPPING OF USERS DURING AN AUDIO CONVERSATION ON A MOBILE APPLICATION," filed on Aug. 26, 2020;

(6) U.S. patent application Ser. No. 17/003,891, titled "COMPLEX COMPUTING NETWORK FOR GENERATING AND HANDLING A WAITLIST ASSOCIATED WITH A SPEAKER IN AN AUDIO CONVERSATION ON A MOBILE APPLICATION," filed on Aug. 26, 2020;

(7) U.S. patent application Ser. No. 17/003,893, titled "COMPLEX COMPUTING NETWORK FOR ESTABLISHING AUDIO COMMUNICATION BETWEEN SELECT USERS ON A MOBILE APPLICATION," filed on Aug. 26, 2020;

(8) U.S. patent application Ser. No. 17/003,895, titled "COMPLEX COMPUTING NETWORK FOR ENABLING SUBSTANTIALLY INSTANTANEOUS SWITCHING BETWEEN CONVERSATION MODE AND LISTENING MODE ON A MOBILE APPLICATION," filed on Aug. 26, 2020;

(9) U.S. patent application Ser. No. 17/003,896, titled "COMPLEX COMPUTING NETWORK FOR INITIATING AND EXTENDING AUDIO CONVERSATIONS AMONG MOBILE DEVICE USERS ON A MOBILE APPLICATION," filed on Aug. 26, 2020.

(10) U.S. patent application Ser. No. 17/219,880, titled "COMPLEX COMPUTING NETWORK FOR IMPROVING ESTABLISHMENT AND BROADCASTING OF AUDIO COMMUNICATION AMONG MOBILE COMPUTING DEVICES AND FOR PROVIDING RAPID AUDIO CONVERSATIONS," filed on Mar. 31, 2021.

(11) U.S. patent application Ser. No. 17/214,906, titled "COMPLEX COMPUTING NETWORK FOR IMPROVING ESTABLISHMENT AND BROADCASTING OF AUDIO COMMUNICATION AMONG MOBILE COMPUTING DEVICES AND FOR IMPROVING SPEAKER-LISTENER ENGAGEMENT USING AUDIO CONVERSATION CONTROL," filed on Mar. 28, 2021.

(12) U.S. patent application Ser. No. 17/175,435, titled "COMPLEX COMPUTING NETWORK FOR IMPROVING ESTABLISHMENT AND BROADCASTING OF AUDIO COMMUNICATION AMONG MOBILE COMPUTING DEVICES AND PROVIDING DESCRIPTIVE OPERATOR MANAGEMENT FOR IMPROVING USER EXPERIENCE," filed on Feb. 12, 2021.

(13) U.S. patent application Ser. No. 17/216,400, titled "COMPLEX COMPUTING NETWORK FOR IMPROVING ESTABLISHMENT AND BROADCASTING OF AUDIO COMMUNICATION AMONG MOBILE COMPUTING DEVICES", filed on Mar. 29, 2021.

(14) U.S. patent application Ser. No. 17/234,635, titled "COMPLEX COMPUTING NETWORK FOR IMPROVING ESTABLISHMENT AND STREAMING OF AUDIO COMMUNICATION AMONG MOBILE COMPUTING DEVICES AND FOR HANDLING DROPPING OR ADDING OF USERS DURING AN AUDIO CONVERSATION ON A MOBILE APPLICATION," filed on Apr. 19, 2021.

(15) U.S. patent application Ser. No. 17/222,795, titled "COMPLEX COMPUTING NETWORK FOR IMPROVING ESTABLISHMENT AND BROADCASTING OF AUDIO COMMUNICATIONS AMONG MOBILE COMPUTING DEVICES AND FOR IMPROVING SWITCHING FROM LISTENING MODE TO CONVERSATION MODE ON A MOBILE APPLICATION," filed on Apr. 5, 2021.

(16) U.S. patent application Ser. No. 17/367,494, titled "COMPLEX COMPUTING NETWORK FOR ESTABLISHING AUDIO COMMUNICATION BETWEEN USERS ON A MOBILE APPLICATION," filed on Jul. 5, 2021.

(17) U.S. patent application Ser. No. 17/372,911, titled "COMPLEX COMPUTING NETWORK FOR GENERATING AND HANDLING A WAITLIST ASSOCIATED WITH A SPEAKER IN AN AUDIO CONVERSATION ON A MOBILE APPLICATION," filed on Jul. 12, 2021.

(18) U.S. patent application Ser. No. 17/409,638, titled "COMPLEX COMPUTING NETWORK FOR IMPROVING STREAMING AND ESTABLISHMENT OF COMMUNICATION AMONG MOBILE COMPUTING DEVICES BASED ON GENERATING VISUAL REPRESENTATIONS FOR USE IN AUDIO CONVERSATIONS," filed on Aug. 23, 2021.

(19) U.S. patent application Ser. No. 17/467,405, titled "COMPLEX COMPUTING NETWORK FOR IMPROVING STREAMING OF AUDIO CONVERSATIONS AND DISPLAYING OF VISUAL REPRESENTATIONS ON A MOBILE APPLICATION," filed on Sep. 6, 2021.

(20) U.S. patent application Ser. No. 17/507,690, titled "COMPLEX COMPUTING NETWORK FOR IMPROVING ESTABLISHMENT AND BROADCASTING OF AUDIO COMMUNICATION AMONG MOBILE COMPUTING DEVICES AND PROVIDING DESCRIPTIVE OPERATOR ACCESS FOR IMPROVING USER EXPERIENCE," filed on Oct. 21, 2021.

(21) U.S. patent application Ser. No. 17/588,030, titled "COMPLEX COMPUTING NETWORK FOR IMPROVING ESTABLISHMENT AND STREAMING OF AUDIO COMMUNICATION AMONG MOBILE COMPUTING DEVICES," filed on Jan. 22, 2022.

(22) U.S. patent application Ser. No. 17/947,855, titled "COMPLEX COMPUTING NETWORK FOR IMPROVING ESTABLISHMENT AND STREAMING OF AUDIO COMMUNICATION AMONG MOBILE COMPUTING DEVICES," filed on Sep. 19, 2022.

(23) U.S. patent application Ser. No. 18/138,617, titled "COMPLEX COMPUTING NETWORK FOR IMPROVING ESTABLISHMENT AND STREAMING OF AUDIO COMMUNICATION AMONG MOBILE COMPUTING DEVICES," filed on Apr. 24, 2023.

(24) U.S. patent application Ser. No. 18/400,786, titled "COMPLEX COMPUTING NETWORK FOR IMPROVING ESTABLISHMENT AND ACCESS OF AUDIO COMMUNICATION AMONG MOBILE COMPUTING DEVICES," filed on Dec. 29, 2023.

(25) U.S. patent application Ser. No. 18/817,979, titled "COMPLEX COMPUTING NETWORK FOR IMPROVING ESTABLISHMENT AND ACCESS OF COMMUNICATION AND CONFIGURABLE USER GROUPS AMONG COMPUTING DEVICES," filed on Aug. 28, 2024.

(26) U.S. patent application Ser. No. 19/195,241, titled "COMPLEX COMPUTING NETWORK FOR IMPROVING ESTABLISHMENT AND ACCESS OF COMMUNICATION AMONG COMPUTING DEVICES," filed on Apr. 30, 2025.

(27) Patent Cooperation Treaty application No.—PCT/ US21/47799, titled "COMPLEX COMPUTING NETWORK FOR IMPROVING ESTABLISHMENT AND STREAMING OF AUDIO COMMUNICATION AMONG MOBILE DEVICES," filed on Aug. 26, 2021.

(28) Patent Cooperation Treaty application No.—PCT/ US21/47802, titled "COMPLEX COMPUTING NETWORK FOR IMPROVING ESTABLISHMENT AND STREAMING OF AUDIO COMMUNICATION AMONG MOBILE DEVICES," filed on Aug. 26, 2021.

(29) Patent Cooperation Treaty application No.—PCT/ US21/47804, titled "COMPLEX COMPUTING NETWORK FOR IMPROVING ESTABLISHMENT AND STREAMING OF AUDIO COMMUNICATION AMONG MOBILE DEVICES," filed on Aug. 26, 2021.

(30) Patent Cooperation Treaty application No.—PCT/ US22/47296, titled "COMPLEX COMPUTING NETWORK FOR IMPROVING ESTABLISHMENT AND STREAMING OF AUDIO COMMUNICATION AMONG MOBILE DEVICES," filed on Oct. 20, 2022.

The foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. Accordingly, the disclosure of the present disclosure is intended to be illustrative, but not limiting, of the scope of the present disclosure, which is set forth in the following claims.

The invention claimed is:

1. A method comprising:

determining, using one or more computing device processors, a first user accesses a mobile application using a first mobile device of the first user;

enabling, using the one or more computing device processors, the first user to create or modify a first user profile using the first mobile device of the first user;

determining, using the one or more computing device processors, a second user accesses the mobile application using a second mobile device of the second user;

enabling, using the one or more computing device processors, the second user to create or modify a second user profile using the second mobile device of the second user;

receiving, using the one or more computing device processors, from the first mobile device of the first user, first content;

adding, using the one or more computing device processors, the first content to a first content list;

streaming or transmitting, using the one or more computing device processors, the first content to the second mobile device of the second user;

transmitting, using the one or more computing device processors, to the second mobile device for visual display, on a first user interface of the mobile application, a first visual representation of the first user not comprising the first content, such that the first visual representation is displayable on the second mobile device during or prior to the streaming or transmitting the first content, to the second mobile device of the second user;

before, during, or after transmitting of the first content to the second mobile device of the second user, enabling, using the one or more computing device processors, the second user to execute a first action associated with the first user or associated with the first content;

logging, using the one or more computing device processors, the first action to a first log, wherein the first log is associated with at least one of: the first user or the second user, wherein the first log is associated with at least one data store;

after enabling the second user to execute the first action associated with the first user or associated with the first content, adding, using the one or more computing device processors, based on the first action, the first content or second content associated with the first user to a second content list, wherein the first user is enabled to interact with or execute a second action associated with the second user or at least one fourth user;

determining, using the one or more computing device processors, a third user accesses the mobile application using a third mobile device of the third user;

enabling, using the one or more computing device processors, the third user to create or modify a third user profile using the third mobile device of the third user;

receiving, using the one or more computing device processors, from the third mobile device of the third user, third content;

adding, using the one or more computing device processors, the third content to the first content list;

before, during, or after enabling the second user to execute the first action associated with the first user or associated with the first content, streaming or transmitting, using the one or more computing device processors, the third content to the second mobile device of the second user;

before, during, or after enabling the second user to execute the first action associated with the first user or associated with the first content, transmitting, using the one or more computing device processors, to the second mobile device for visual display, on the first user interface or a third user interface of the mobile application, a second visual representation of the third user not comprising the second content, such that the second visual representation is displayable on the second mobile device during or prior to the streaming or transmitting the third content to the second mobile device of the second user;

before, during, or after streaming or transmitting the third content to the second mobile device of the second user, enabling, using the one or more computing device processors, the second user to execute a third action associated with the third user or associated with the third content;

logging, using the one or more computing device processors, the third action to the first log or a second log, wherein the second log is associated with at least one of: the third user or the second user, wherein the second log is associated with the at least one data store; and after enabling the second user to execute the third action associated with the third user or associated with the third content, not adding, using the one or more computing device processors, based on the third action, at a first time, the third content or fourth content associated with the third user to the second content list, wherein the third user is not enabled to interact with or execute a fourth action associated with the second user or the at least one fourth user.

2. The method of claim 1, wherein at least one of:

the first action comprises a first voting action associated with first permissions associated with the first user and the mobile application, the first action comprises the second user voting to remove the first user, the first action comprises the second user voting to enable the first user to interact with one or more first users in the mobile application, the first action comprises the second user executing a first transitional interaction associated with the first user, the second action comprises a second voting action associated with second permissions associated with the third user and the mobile application, the second action comprises the second user voting to remove the third user from the mobile application, the second action comprises the second user voting to enable the third user to interact with one or more second users in the mobile application, the second action comprises the second user executing a second transitional interaction associated with the third user, the third action comprises the first user liking the second user or the at least one fourth user, the third action comprises the first user disliking the second user or the at least one fourth user, the third action comprises the first user skipping the second user or the at least one fourth user, the fourth action comprises the third user liking the second user or the at least one fourth user, the fourth action comprises the third user disliking the second user or the at least one fourth user, the fourth action comprises the third user skipping the second user or the at least one fourth user, or the first content list comprises a voting tab and the second content list comprises a feed tab.

3. The method of claim 1, further comprising transmitting, using the one or more computing device processors, a first notification associated with the first action associated with the first user or associated with the first content, to the first mobile device of the first user.

4. The method of claim 1, further comprising at least one of:

adding, using the one or more computing device processors, the first content or the second content to a third content list;

adding, using the one or more computing device processors, the third content or the fourth content to a fourth content list;

removing, using the one or more computing device processors, the third content from the first content list; or removing, using the one or more computing device processors, the first content from the first content list.

5. The method of claim 1, wherein the first user and the third user are associated with at least one of: a geographical area or at least one parameter that corresponds with or is associated with the second user or settings associated with the second user.

6. The method of claim 1, wherein at least one of:

the first content is associated with or responsive to a first prompt, or the second content is associated with or responsive to the first prompt or a second prompt.

7. The method of claim 1, further comprising adding, using the one or more computing device processors, at a second time after the first time, the third content or the fourth content associated with the third user to the second content list, wherein the third user is enabled to interact with or execute the fourth action associated with the second user or the at least one fourth user.

8. The method of claim 1, further comprising:

receiving, using the one or more computing device processors, from the second mobile device of the second user, fifth content;

streaming or transmitting, using the one or more computing device processors, the fifth content to the first mobile device of the first user;

transmitting, using the one or more computing device processors, to the first mobile device for visual display, on a fourth user interface of the mobile application, a third visual representation of the second user not comprising the fifth content, such that the third visual representation is displayable on the first mobile device during or prior to the streaming or transmitting the fifth content to the first mobile device of the first user;

enabling, using the one or more computing device processors, the first user to execute a fifth action associated with the second user or associated with the fifth content; and logging, using the one or more computing device processors, the fifth action to the first log, the second log, or a third log, wherein the third log is associated with at least one of: the first user or the second user, wherein the third log is associated with the at least one data store.

9. The method of claim 1, wherein the one or more computing device processors are comprised in one or more computing systems, wherein the one or more computing systems are located in one or more locations.

10. The method of claim 1, wherein adding, based on the first action, the first content or the second content associated with the first user to the second content list is further based on at least one additional action executed by the at least one fourth user.

11. The method of claim 1, wherein not adding, based on the third action, at the first time, the third content or the fourth content associated with the third user to the second content list is further based on at least one additional action executed by the at least one fourth user.

12. A method comprising:

determining, using one or more computing device processors, a first user accesses a mobile application using a first mobile device of the first user;

enabling, using the one or more computing device processors, the first user to create or modify a first user profile using the first mobile device of the first user;

determining, using the one or more computing device processors, a second user accesses the mobile application using a second mobile device of the second user;

enabling, using the one or more computing device processors, the second user to create or modify a second user profile using the second mobile device of the second user;

receiving, using the one or more computing device processors, from the first mobile device of the first user, first content;

adding, using the one or more computing device processors, the first content to a first content list;

streaming or transmitting, using the one or more computing device processors, the first content to the second mobile device of the second user;

transmitting, using the one or more computing device processors, to the second mobile device for visual display, on a first user interface of the mobile application, a first visual representation of the first user not comprising the first content, such that the first visual representation is displayable on the second mobile device during or prior to the streaming or transmitting the first content, to the second mobile device of the second user;

before, during, or after transmitting of the first content to the second mobile device of the second user, enabling, using the one or more computing device processors, the second user to execute a first action associated with the first user or associated with the first content;

logging, using the one or more computing device processors, the first action to a first log, wherein the first log is associated with at least one of: the first user or the second user, wherein the first log is associated with at least one data store;

before, during or after enabling the first user to execute the first action associated with the first user or associated with the first content, enabling, based on the first action, the first user to interact with or execute a second action associated with the second user or at least one fourth user;

determining, using the one or more computing device processors, a third user accesses the mobile application using a third mobile device of the third user;

enabling, using the one or more computing device processors, the third user to create or modify a third user profile using the third mobile device of the third user;

receiving, using the one or more computing device processors, from the third mobile device of the third user, second content;

adding, using the one or more computing device processors, the second content to the first content list;

before, during, or after enabling the second user to execute the first action associated with the first user or associated with the first content, streaming or transmitting, using the one or more computing device processors, the second content to the second mobile device of the second user;

before, during, or after enabling the second user to execute the first action associated with the first user or associated with the first content, transmitting, using the one or more computing device processors, to the second mobile device for visual display, on the first user interface or a third user interface of the mobile application, a second visual representation of the third user not comprising the second content, such that the second visual representation is displayable on the second mobile device during or prior to the streaming or transmitting the second content to the second mobile device of the second user;

before, during, or after streaming or transmitting the second content to the second mobile device of the second user, enabling, using the one or more computing device processors, the second user to execute a third action associated with the third user or associated with the second content;

logging, using the one or more computing device processors, the third action to the first log or a second log, wherein the second log is associated with at least one of: the third user or the second user, wherein the second log is associated with the at least one data store; and after enabling the second user to execute the third action associated with the third user or associated with the second content, not enabling, based on the third action, the third user to interact with or execute a fourth action associated with the second user or the at least one fourth user.

13. The method of claim 12, wherein at least one of:
the first action comprises the second user liking the first user,
the first action comprises the second user disliking the first user,
the first action comprises the second user skipping the first user,
the first action comprises the second user voting to remove the first user,
the first action comprises a first voting action associated with first permissions associated with the first user and the mobile application,
the first action comprises the second user executing a first transitional interaction associated with the first user,
the second action comprises the second user liking the third user,
the second action comprises the second user disliking the third user,
the second action comprises the second user skipping the third user,
the second action comprises the second user voting to remove the third user,
the second action comprises a second voting action associated with second permissions associated with the third user and the mobile application,
the second action comprises the second user executing a second transitional interaction associated with the third user,
the third action comprises the first user liking the second user or the at least one fourth user,
the third action comprises the first user disliking the second user or the at least one fourth user,
the third action comprises the first user skipping the second user or the at least one fourth user,
the fourth action comprises the third user liking the second user or the at least one fourth user,
the fourth action comprises the third user disliking the second user or the at least one fourth user, or
the fourth action comprises the third user skipping the second user or the at least one fourth user.

14. The method of claim 12, further comprising:
receiving, using the one or more computing device processors, from the second mobile device of the second user, fifth content;
streaming or transmitting, using the one or more computing device processors, the fifth content to the first mobile device of the first user; and
transmitting, using the one or more computing device processors, to the first mobile device for visual display, on a fourth user interface of the mobile application, a third visual representation of the second user not comprising the fifth content, such that the third visual representation is displayable on the first mobile device during or prior to the streaming or transmitting the fifth content to the first mobile device of the first user.

15. The method of claim 14, further comprising:
enabling, using the one or more computing device processors, the first user to execute a fifth action associated with the second user or associated with the fifth content;
logging, using the one or more computing device processors, the fifth action to the first log, the second log, or a third log, wherein the third log is associated with at least one of: the first user or the second user, wherein the third log is associated with the at least one data store; and before, during or after enabling the first user to execute the fifth action associated with the second user or associated with the fifth content, generating, using the one or more computing device processors, a first communication channel for the first user to interact with the second user and for the second user to interact with the first user.

16. The method of claim 15, wherein the first communication channel expires after a first time if at least one of: the first user does not transmit a first interaction to the second user in the first communication channel, or the second user does not transmit a second interaction to the first user in the first communication channel.

17. The method of claim 12, wherein the not enabling the third user to interact with or execute the fourth action associated with the second user or the at least one fourth user comprises at least one of:

removing the second content from the first content list or a second content list, or removing third content associated with the third user from the first content list or a third content list.

18. The method of claim 12, further comprising transmitting, using the one or more computing device processors, a first notification associated with the first action associated with the first user or associated with the first content, to the first mobile device of the first user.

19. The method of claim 12, wherein the first user and the third user are associated with at least one of: a geographical area or at least one parameter that corresponds with or is associated with the second user or settings associated with the second user.

20. The method of claim 12, wherein at least one of:

the first content is associated with or responsive to a first prompt, the second content is associated with or responsive to the first prompt or a second prompt, the first content is streamed or transmitted to the second mobile device of the second user based on a first filter associated with the second user or the second user profile, or the second content is streamed or transmitted to the second mobile device of the second user based on the first filter associated with the second user or the second user profile.

21. The method of claim 20, wherein the first filter comprises at least one of: an age filter, a gender filter, a location filter, or a preference filter.

22. The method of claim 12, wherein the one or more computing device processors are comprised in one or more computing systems, wherein the one or more computing systems are located in one or more locations.

23. The method of claim 12, wherein enabling, based on the first action, the first user to interact with or execute the second action associated with the second user or the at least one fourth user is further based on at least one additional action executed by the at least one fourth user.

24. The method of claim 12, wherein not enabling, based on the third action, the third user to interact with or execute the fourth action associated with the second user or the at least one fourth user is further based on at least one additional action executed by the at least one fourth user.

* * * * *